US005650703A

United States Patent [19]

Yardley et al.

[11] Patent Number: 5,650,703

[45] Date of Patent: Jul. 22, 1997

[54] DOWNWARD COMPATIBLE AGV SYSTEM AND METHODS

[75] Inventors: James V. Yardley, Centerville; Gary L. Whatcott, Holladay; John A. M. Petersen; Bryan A. Bloomfield, both of Bountiful; Vaughn W. Guest, Farmington; Rick S. Mottes, Roy; Robert K. Forman, Taylorsville; L. Bruce Christensen, Kaysville, all of Utah; Joseph Zuercher, Brookfield; Herman P. Schutten, Milwaukee, both of Wis.

[73] Assignee: HK Systems, Inc., New Berlin, Wis.

[21] Appl. No.: 637,919

[22] Filed: Apr. 25, 1996

Related U.S. Application Data

[62] Division of Ser. No. 251,560, Jul. 18, 1994, which is a division of Ser. No. 908,691, Jun. 26, 1992, Pat. No. 5,341,130, which is a division of Ser. No. 621,486, Dec. 3, 1990, Pat. No. 5,281,901, which is a continuation-in-part of Ser. No. 618,793, Nov. 27, 1990, Pat. No. 5,187,664, and Ser. No. 602,609, Oct. 24, 1990, Pat. No. 5,191,528, which is a continuation-in-part of Ser. No. 545,174, Jun. 28, 1990, abandoned.

[51] Int. Cl.[6] .......... B62D 1/28

[52] U.S. Cl. .......... 318/587; 318/586; 901/1; 180/167; 180/168

[58] Field of Search .......... 318/587, 139, 318/568.1–568.28, 586; 180/167–169; 901/1, 2, 3, 5, 9; 395/80–89; 364/424.01, 424.02, 426

[56] References Cited

U.S. PATENT DOCUMENTS

| | | | |
|---|---|---|---|
| 4,347,573 | 8/1982 | Friedland | 364/453 |
| 4,556,940 | 12/1985 | Katoo et al. | 364/424 |
| 4,680,715 | 7/1987 | Pawelek | 364/449 |
| 4,727,492 | 2/1988 | Reeve et al. | 364/424.02 |
| 4,817,000 | 3/1989 | Eberhardt | 364/443 |
| 5,075,693 | 12/1991 | McMillan et al. | 364/449 |
| 5,127,486 | 7/1992 | Yardley et al. | 180/168 |
| 5,175,480 | 12/1992 | McKeefery et al. | 318/587 |
| 5,179,329 | 1/1993 | Nishikawa et al. | 318/587 |
| 5,187,664 | 2/1993 | Yardley et al. | 364/424.02 |
| 5,191,528 | 3/1993 | Yardley et al. | 364/424.02 |

(List continued on next page.)

*Primary Examiner*—Paul Ip
*Attorney, Agent, or Firm*—Nilles & Nilles, S.C.

[57] ABSTRACT

An automated guided vehicle (AGV) control system which is downward compatible with existing guidewire systems providing both guidewire navigation and communication and autonomous navigation and guidance and wireless communication between a central controller and each vehicle. FIGS. 90, 91, 92, 93, and 94 provide a map showing relative orientation of the schematic circuits seen in FIGS. 90A–B, 91A–B, 92A–B, 93A–B, and 94A–B, respectively over paths marked by update markers which may be spaced well apart, such as fifty feet. Redundant measurement capability using inputs from linear travel encoders from the vehicle's drive wheels, position measurements from the update markers, and bearing measurements from a novel angular rate sensing apparatus, in combination with the use of a Kalman filter, allows correction for navigation and guidance errors caused by such factors as angular rate sensor drift, wear, temperature changes, aging, and early miscalibration during vehicle operation. The control system employs high frequency two-way data transmission and reception capability over the guidewires and via wireless communications. The same data rates and message formats are used in both guidewire and wireless communications systems. Substantially the same communications electronics are used for the central controller and each vehicle. Novel navigation and guidance algorithms are used to select and calculate a non-linear path to each next vehicle waypoint when the vehicle is operating in the autonomous mode. The non-linear path originates with an initial direction equal to the heading of the vehicle as it enters the path and a waypoint heading defined as part of the message received from the central control system which plans and controls travel of each vehicle in the system.

49 Claims, 98 Drawing Sheets

U.S. PATENT DOCUMENTS

| | | | |
|---|---|---|---|
| 5,202,832 | 4/1993 | Lisy | 364/424.02 |
| 5,204,814 | 4/1993 | Noonan et al. | 180/168 |
| 5,220,263 | 6/1993 | Onishi et al. | 318/587 |
| 5,245,335 | 9/1993 | Hill et al. | 340/941 |
| 5,267,173 | 11/1993 | Tanizawa et al. | 364/478 |
| 5,280,431 | 1/1994 | Summerville et al. | 364/424.02 |
| 5,329,449 | 7/1994 | Tanizawa et al. | 364/424.02 |
| 5,341,540 | 8/1994 | Soupert et al. | 180/169 |
| 5,347,456 | 9/1994 | Zhang et al. | 364/424.02 |
| 5,367,456 | 11/1994 | Summerville et al. | 364/424.02 |
| 5,369,591 | 11/1994 | Broxmeyer | 364/461 |
| 5,387,853 | 2/1995 | Ono | 318/587 |

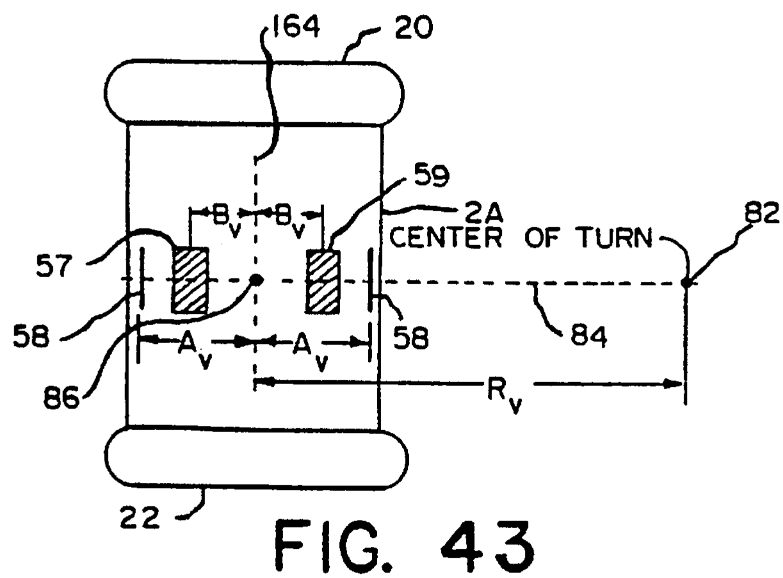
FIG. 43
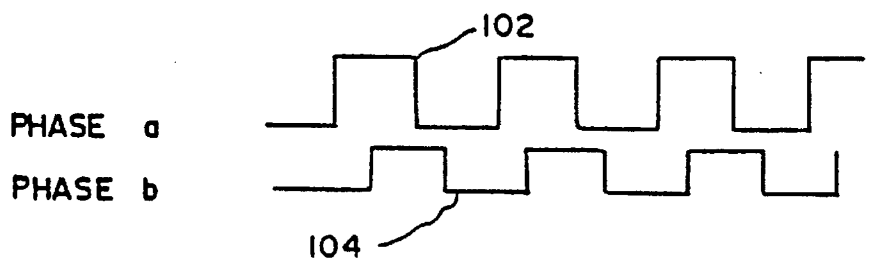
FIG. 45a
FIG. 45b
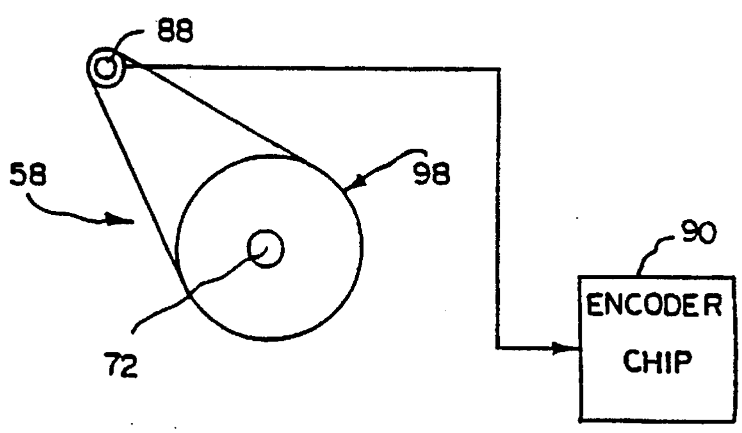
FIG. 44

UMS

DOWNWARD COMPATIBLE AGV SYSTEM AND METHODS

This application is a division of application U.S. Ser. No. 08/251,560, filed Jul. 18, 1994, which is a division of U.S. application Ser. No. 07/908,691, filed Jun. 26, 1992, now U.S. Pat. No. 5,341,130, issued Aug. 23, 1994, which is a division of U.S. application Ser. No. 07/621,486, filed Dec. 3, 1990, now U.S. Pat. No. 5,281,901, issued Jan. 24, 1994, which is a continuation-in-part of U.S. Ser. No. 07/618,793, filed Nov. 27, 1990, now U.S. Pat. No. 5,187,664 and a continuation-in-part of U.S. Ser. No. 07/602,609, filed Oct. 24, 1990, now U.S. Pat. No. 5,191,528,which is a continuation-in-part of U.S. Ser. No. 07/545,174, filed June 28, 1990, now abandoned.

FIELD OF INVENTION

The field of the invention is control, communication systems, and automatic navigation and guidance of vehicles, including vehicles that navigate without a driver on board either by self-contained navigation and guidance with occasional calibrating updates or, alternatively, by following a guide wire which is activated by an AGV controller which is not on the vehicle or, otherwise, activated by energy sources on the vehicle itself.

BACKGROUND AND DESCRIPTION OF RELATED ART

Automated guidance over a wire-guide path has been used in the guidance of a driverless automatically controlled vehicle (AGV) along a desired course have been set forth in U.S. Pat. Nos. 3,009,525 and 3,147,817 issued to Robert DeLiban. In such disclosures, the AGV followed a traffic path defined by a conductor energized by source not on the vehicle.

Later U.S. Pat. Nos. 4,791,570 and 4,902,948 of this assignee describe communication systems and methods for controlling a plurality of task-performing AGV's along a network of guide wires. U.S. Pat. Nos. 4,791,570 and 4,902,948 describe a guide wire logic and communications capability which provides for infinite expansion as to the number of guide wire loops and vehicles which comprise the system; accommodates polling of vehicles of the system not at predetermined times by only upon the occurrence of certain events, causes high data transmission rates to occur over low frequency carriers using the guide wires.

Today, there are a large number of installations of AGV systems which employ guide wires. However, the cost of installing and remodeling guide wire paths has proved to be a deterrent to purchase of new systems and the expansion of older installations. Factory layout flexibility and related installation and operational cost reduction, not realized with guide-wire systems, is possible with autonomously operating AGV's. Apparatus and methods of guide-wireless control of AGV's are found in U.S. Pat. Nos. 4,908,557 and 4,847,769 and in published European Patent Application 193,985.

U.S. Pat. No. 4,908,557 issued to Masahiro Sudara discloses a control apparatus which navigates along a path defined by update magnets arranged in the floor such that a null or bipolar signal is produced in each detecting sensor of a Hall sensor array located in each AGV. An algorithm is described which calculates position of the magnet based upon treating each sensor as a point or unit of measurement and performs calculations based upon a minimum distance in units of sensor positions. The precision of measurement is statistically dependent upon the physical displacement of each of the Hall sensors and the steepness of the signal about the transition between the magnet's North and South fields. As such, the precision of measurement of a magnet's position by the method described by Masahiro Sudara is of the order of magnitude of the center-to-center spacing of the Hall sensors. This level of measurement precision produces errors in vehicle bearing estimates which markedly restricts allowable distance of separation between the update magnets in the vehicle path, significant precision being required to provide assurance the vehicle will retain sufficient bearing accuracy to acquire to stay on a planned path between widely separated magnets.

U.S. Pat. No. 4,847,769 issued to Peter J. Reeve discloses a navigation system which carries out a dead reckoning calculation of the vehicles position based upon inputs from linear and angular measurements from a steering wheel and a bearing and/or a range to a target. The bearing and/or range to the target, determined by laser bearing finding equipment, provides updating data which are used to recalibrate to periodically reduce errors due to drift and other factors in the heading angle and spatial position of the AGV, angular drift in the steering angle, crabbing angle, and variations in the measured radius of the steering wheel. A Kalman filter is used to calculate corrective calibrations which are derived from the bearing and/or range to the target measurements. The laser bearing finding equipment comprises a laser emitter located at an obstruction free position on the AGV such that the vehicle may confirm its position by seeking a number of targets distributed about the AGV in a factory frame of reference.

European Patent Application 193,985 describes a grid-wireless system for navigating a free ranging vehicle. The system employs a grid of marker elements which are closely spaced to eliminate the measurement problems encountered with prior known navigation systems.

However, none of the related art addresses problems related to compatibility with existing guide-wire systems, providing the capability to operate along an existing guide-wire path and in an autonomous mode as well. Further, problems related to minimizing the numbers of floor markers required and, therefore, long distance autonomous operation between floor markers and providing unrestricted top loading surfaces for vehicles have likewise not been addressed in the known related art.

BRIEF SUMMARY AND OBJECTS OF THE INVENTION

For completeness in describing the entire invention, some information from copending applications PROPORTIONAL POSITION SENSING SYSTEM FOR AN AUTOMATIC GUIDED VEHICLE, application Ser. No. 07/618,570, filed Nov. 27, 1990, now U.S. Pat. No. 5,187,664, which issued Feb. 16, 1993, and Continuation-in-part UPDATE MARKER SYSTEM FOR NAVIGATION OF AN AUTOMATIC GUIDED VEHICLE, application Ser. No. 07/544, 693, filed Jun. 27, 1990, inventors Bryan A. Bloomfield, et al., being assign to the same assignee, is repeated herein. Another invention in which a guided vehicle follows passive conductors on the floor is described in U.S. Pat. No. 4,613, 804, issued Sep. 23, 1986, entitled "Floor Position Sensing Apparatus and Method, " invented by R. R. Swenson and assigned to the assignee of the present invention. That Patent is also made a part of the present application by reference.

In brief summary, the present invention comprises an automated guided vehicle (AGV) control system which is downward compatible with existing guide-wire systems, providing both AGV guide-wire navigation and communication and autonomous navigation and guidance and guidance and wireless communication within the same vehicle. The AGV control system comprises an AGV controller, a plurality of types of guide path marking apparatus, at least one AGV capable of a plurality of navigation and guidance modes, including autonomous operation, and a two-way communication system between the AGV controller and each AGV.

The AGV controller controls the movement of each individual AGV along predetermined path segments. Two-way communications comprise guide-wire carried messages and wireless messages provided over short access period links between the each AGV and the AGV controller. Guide path marking types of apparatus comprise vehicle powered and non-vehicle powered guide-wire loops and guide path update markers.

The navigation and guidance system comprises redundant measurement capability such that measurement errors caused by factors comprising drift temperature change, wear, and aging are dynamically evaluated during each AGV operating mission and sensor inputs are calibrated in real time to reduce the effect of such errors. A Kalman filter is used to determine calibrating updates. Sensor measurement precision and calibration and novel navigation methods provide autonomous operation such that an AGV operating in the autonomous mode experienced an error having a deviation standard no greater than two inches when traveling between update markers which are fifty feet apart. The AGV controller sends and each individual AGV receives and acknowledges each next path segment end position and exit bearing from that path segment. Thereby, incremental control of each vehicle over presegmented portions of a path is provided by the AGV controller. From the position and bearing received from the AGV controller, each AGV calculates a non-linear path for self-contained guidance control of the AGV over the path segment whereby vehicle guidance accuracy is improved. Such vehicle navigation and guidance accuracy provides a system which comprises widely spaced update markers and a resultingly low guide path installation and remodeling cost. Further, passive guide wire apparatus, which is manually portable, provides a temporary path for vehicles during remodeling and the like and a high accuracy guide path for positioning an AGV at a terminal. Through the use of measurements which provide redundant estimates of vehicle distance and bearing and, thereby, concurrent estimates of measurement errors, such as angular rate sensor drift, a low cost rate sensor is effectively used in the vehicle navigation and guidance system. Aperiodic sampling of the angular rate sensor apparatus with drift corrections, provides an effective redundant measurement in the vehicle sensor matrix. All of the AGV sensors and communications systems reside below the top surface of the AGV, freeing the top surface for loading and unloading cargo and for attaching to other vehicles.

Accordingly, it is a primary object to provide an AGV control system which controls at least one AGV which navigates over paths marked by guide-wires and, alternatively, over paths marked by intermittently placed update markers.

It is a further primary object to provide an AGV control system which comprises autonomously operating AGV's and wireless communications and is downwardly compatible with existing AGV guide-wire installations.

It is a still further primary object to provide a system for controlling a plurality of unmanned, task-performing vehicles whereby the travel paths and tasks performed by the vehicles are strictly controlled by an AGV controller on a path segment by path segment basis.

It is another primary object to provide at least two navigation and guidance systems within at least on AGV, at least one navigation and guidance system providing greater accuracy and precision than at least one of the other navigation and guidance systems, whereby at least one AGV is selectively more accurately and precisely guided over selected segments of the guide path and less accurately and precisely guided over other segments whereby a cost effective selection of guide path markers may be made, based upon accuracy and precision requirements of each guide path segment.

It is another primary object to provide a digital computer based, automated guided vehicle controller which provide centralized planning and control for at least one AGV whereby each AGV is sent a control message which defines a limited activity to be performed by the vehicle.

It is yet another primary object to provide an AGV controller which sends position and bearing of the end of a next-to-be-traveled path segment by which the AGV calculates a guide path.

It is another object to provide an AGV controller comprising a compiler which provides position and bearing, for the end of each path segment sent to a vehicle, calculated from previously entered input data which defines a plurality of markers and paths within a factory frame of reference.

It is another object to provide an AGV controller which is programmably changeable using a higher programming language, such as a "C" compiler.

It is another object to provide an AGV control system which comprises update markers in the floor of an AGV path comprising marker to marker spacing which may be widely separated, such as fifty feet between markers, thereby reducing installation and remodeling costs.

It is another object to provide an AGV control system which comprises a combination of markers in the floor, the combination comprising update markers and guide-wires.

It is another object to provide an AGV control system which comprises a combination of markers in and on the floor, the combination comprising update markers and guide-wires.

It is another object to provide an AGV control system wherein the update markers in the floor of an AGV path comprise magnets.

It is another object to provide an AGV control system which comprises update markers in the floor of an AGV path, the markers comprising magnets oriented such that only a South or a North field is sensible by superiorly disposed sensors.

It is another object to provide an AGV control system which comprises a combination of markers in and on the floor, the combination comprising guide-wires which are activated by an energy source on an AGV and guide-wires which are activated by an energy source not on the AGV.

It is another object to provide an AGV control system which comprises a combination of markers in and on the floor, the combination comprising markers which are activated by an energy source on an AGV and markers which are activated by an energy source not on the AGV.

It is a principal object to provide an AGV and AGV controller communication system which assigns tasks by polling each AGV.

It is another principal object to provide AGV/AGV controller communications which comprise wireless communications apparatus.

It is another principal object to provide receiving AGV communications which acquire an incoming message in less than five milliseconds.

It is another principal object to provide AGV communications which alternatively use wireless or guide-wire communications links.

It is a further principal object to provide an AGV and AGV controller communication system which communicates over wireless communications wherein each AGV is polled, not at predetermined times, but only upon the occurrence of certain events.

It is a still further principal object to provide an AGV and AGV controller communication system which communicates over wireless communications wherein each message is acquired by the receiving apparatus in less than five milliseconds.

It is another principal object to provide an AGV and AGV controller communication system which communicates over wireless communications wherein each message is uniquely addressable to a single AGV.

It is a main object to provide a navigation and guidance system for an AGV which is totally contained below the top surface of the AGV, such that the top surface is free for loading and unloading and for attachment to other apparatus.

It is another main object to provide a navigation and guidance system for an AGV which comprises the two-way communications apparatus, whereby at least task direction is received from an AGV controller and message acknowledgement and AGV status is transmitted to the AGV controller.

It is further main object to provide a navigation and guidance system which comprises a redundancy in sensor measurement capability such that sensor-based errors due to factors comprising temperature, wear, drift, aging, and earlier incorrect calibration are quantifiable.

It is a still further main object to provide a navigation and guidance system which recalibrates sensor inputs in real time with quantified values derived from processing redundant data from the sensors whereby the accuracy and precision of the navigation and guidance system is improved.

It is another further main object to provide a Kalman filter by which the sensor based errors are quantified.

It is another object to provide navigation and guidance apparatus for enabling an AGV to ascertain and control its position rather precisely at a predetermined area on the floor, such as at a terminal.

It is another object to provide navigation and guidance apparatus which enables an AGV to ascertain not only its position relative to a floor reference system, but also its heading, by sensing the lateral positions of two sensors on the vehicle that are spaced apart longitudinally.

It is another object to provide position-sensing navigation and guidance apparatus in which only passive elements are required on (or in) the floor and all energy required for the sensing of position comes from the vehicle, at least at certain areas such as in a terminal.

It is another object to provide navigation and guidance position-sensing apparatus in which the passive elements of equipment at the floor comprise one or more passive loops of electrical conductor.

It is another object to provide a navigation and guidance position-sensing apparatus having a magnetic-signal receiving system that compensates for undesired signals, such as those received directly from its transmitting antennas on the vehicle, and responds only to signals received indirectly via floor-mounted passive loops.

It is another object to provide a navigation and guidance position-sensing apparatus on an AGV in which two receiving coils are spaced apart on only one high-permeability magnetic core to improve the linearity of response of the signals as a function of the amount of their offset from a passive loop on the floor.

It is another object to provide navigation and guidance apparatus to enable an AGV to utilize equipment in common to ascertain and control both its lateral and longitudinal positions relative to a known reference on the floor at, for example, a terminal.

It is another object to provide a navigation and guidance system for positioning an AGV in which the AGV is automatically guided to a predetermined station or terminal by one type of guidance mode and is precisely positioned within the station by another type of guidance mode.

In a system having at least one AGV capable of ordinarily navigating without any guidewires in the floor between terminals and of positioning itself accurately at terminals, an inventive object is to provide terminal-positioning apparatus of a type that enables the same AGV to operate also in hybrid factory installations that have some guidewires in the floor; the terminal-positioning portions of the guidance apparatus are utilized for the additional purpose of following the guidewires in the floor in order to navigate between stations.

It is another object to provide AGV terminal-positioning apparatus that enables an AGV to operate in a hybrid installation that has active guidewires (i.e., guidewires energized by conductive connection) at the floor within some of its terminals, and that has passive loops (i.e., conductive loops energized by magnetic induction) at the floor within others of its terminals.

It is another object, in one embodiment, to utilize one or more phase-locked loops to process signals received by receiving antennas in detecting a passive conductive floor loop, and in which the receiving circuits have capability for initialization and for automatic gain control of the phase-locked signal level.

It is another object to provide navigation and guidance apparatus for measuring, with improved accuracy, the position of a vehicle relative to a known marker at the floor to ascertain the vehicle's position relative to a factory reference system.

It is another object to utilize a generally transverse array of sensors on the vehicle to sense the marker and to process the sensed data regarding marker position in a particular way to determine the relative position of the vehicle with improved accuracy.

It is another object to determine intermittently placed guide path marker-AGV relative position by taking readings with a plurality of intermittent guide path marker sensor, including the sensor having the greatest reading, the two sensors immediately on one side of it, and the two sensors immediately on the other side of it, and correlating and interpolating the readings with a stored spatial pattern of magnetic field strength whereby the determination of the relative position of the vehicle with improved accuracy is realized.

It is another object to ascertain the longitudinal position of the vehicle by means of the intermittently placed guide path marker by sensing the occurrence of maximum readings of the sensors as the vehicle passes over the marker.

It is another object to utilize the generally transverse array of sensors to concurrently sense two closely positioned markers having predetermined relative and factory reference locations and, thereby, provide concurrent measurements for ascertaining the attitude of the array of sensors, associated bearing of the vehicle in addition to determination of lateral and longitudinal vehicle position.

It is a chief object to provide a navigation and guidance system which comprises redundant measurements of AGV position and bearing.

It is another chief object to provide a navigation and guidance system which comprises guide-wire sensing apparatus, wheel encoding apparatus, and update marker sensors, thereby providing redundancy of measurement.

It is another chief object to provide a navigation and guidance system which comprises guide-wire sensing apparatus, wheel encoding apparatus, angular rate sensing apparatus, and update marker sensors, thereby providing increased redundancy of measurement.

It is another chief object to provide a navigation and guidance system which comprises angular rate sensing apparatus which further comprises an inertial platform which rotates to follow angular travel of the angular rate sensor whereby the maximum offset of the angular rate sensor is reduced and gain of the output sensors are increased, thereby increasing angular rate sensor sensitivity without saturation.

It is another chief object to provide a navigation and guidance system for an AGV which comprises a one dimensional angular rate sensor.

It is another chief object to provide a navigation and guidance system for an AGV which comprises a low cost, long lived angular rate sensor.

It is a key object to provide frequent calibration of drift for a low cost, highly reliable AGV navigation and guidance system angular rate sensor, which may have a high drift rate, such that an error having a standard deviation of not greater than 2 inches results in fifty feet of AGV travel.

It is another key object to use a Kalman filter to quantify values for the frequent drift calibration.

It is a significant object to provide guide-wire and update markers sensors sufficiently longitudinally symmetrically disposed such that the AGV may operate bidirectionally as well as unidirectionally.

It is a further significant object to provide guidewire and update marker sensing which allows correction for any offsets from symmetry such that the AGV operates bidirectionally.

It is an important object to provide an onboard AGV traffic controller which comprises at least one digital processor whereby messages received from the AGV communication system are processed, navigation and guidance parameters are calculated, communication and sensor control switches are controlled, and rate and direction of vehicle travel and function is regulated.

It is another important object to provide a navigation and guidance system which comprises a programmed "E" stop, which is triggered by a digital processor interrupt and brings an AGV to a slow, controlled stop when an emergency stop requirement is detected.

It is another important object to provide navigation and guidance system which comprises a backup to the "E" stop which immediately halts progress of the AGV when an "E" stop malfunction is detected.

It is another important object to provide a navigation and guidance system comprising an onboard digital processor which calculates a guide path derived from current position and bearing of the AGV and the target position and bearing at the end-of-next-path segment received from the AGV controller.

It is another important object to provide a navigation and guidance system which calculates a guide path which comprises one dependent and one independent variable and which is independent of vehicle speed.

It is another important object to provide a navigation and guidance system which calculates a non-linear guide path defined in Cartesian coordinates.

It is another important object to provide a navigation and guidance system which calculates a non-linear guide path defined in polar coordinates.

It is another important object to provide a navigation and guidance system comprising a program in the onboard digital processor which selects between and sequences implementation of calculated cartesian and polar coordinate, non-linear guide paths along which the vehicle is guided.

These and other objects and features of the present invention will be apparent from the detailed description taken with reference to accompanying drawings.

BRIEF DESCRIPTION OF THE FIGURES

FIG. 43 is a simplified top view of the vehicle showing relative positions of wheels and travel measuring encoders.

FIG. 44 is a simplified block diagram representation of a wheel travel measuring encoder.

FIGS. 45A and 45B are graphical drawings of internally produced waveforms of a travel measuring encoder.

DETAILED DESCRIPTION OF THE ILLUSTRATED EMBODIMENTS

Figure 95:
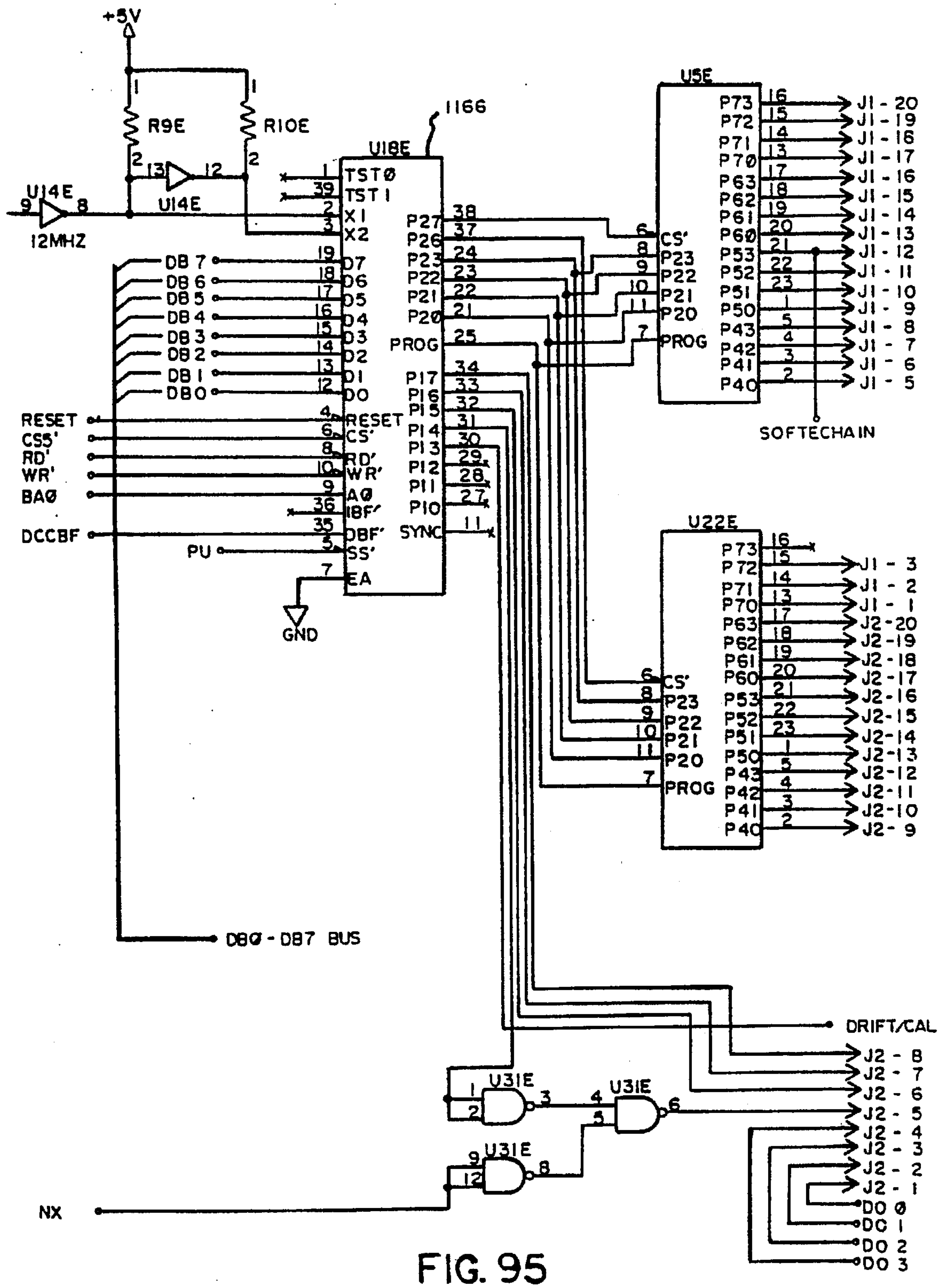

In this description, two sets of terms are used to reference angular direction of travel of an automatic guided vehicle (AGV), port and starboard and left and right. Port and starboard are directional references of left and right, respectively, to the true vehicle front which may be identified by the presence of a light, placement of a grill, indicia, or other accessory at the front of the AGV. Right and left are references with regard to the direction of travel of the AGV. As an example, because the vehicle operatively travels both forward and backward, port is left when the vehicle is traveling in the direction of the true vehicle front and right when the vehicle is traveling in the reverse direction. Reference is now made to the embodiments illustrated in FIGS. 1–95 wherein like numerals are used to designate like parts throughout.

Overview of an Automatic Guided Vehicle (AGV) Control System

The AGV control system comprises an automatic guided vehicle controller (AGVC), at least one of a plurality of types of guide path marking systems, at least one AGV comprising navigation and guidance systems capable of operating over the plurality of types of guide path marking systems, and a two-way communication system between each AGV and the AGVC. The plurality of types of guide path marking systems and AGV navigation and guidance systems comprise guidewire marking and navigation and guidance, such that new AGV's and AGVC's are downward compatible with current guidewire installations.

Figure 1:
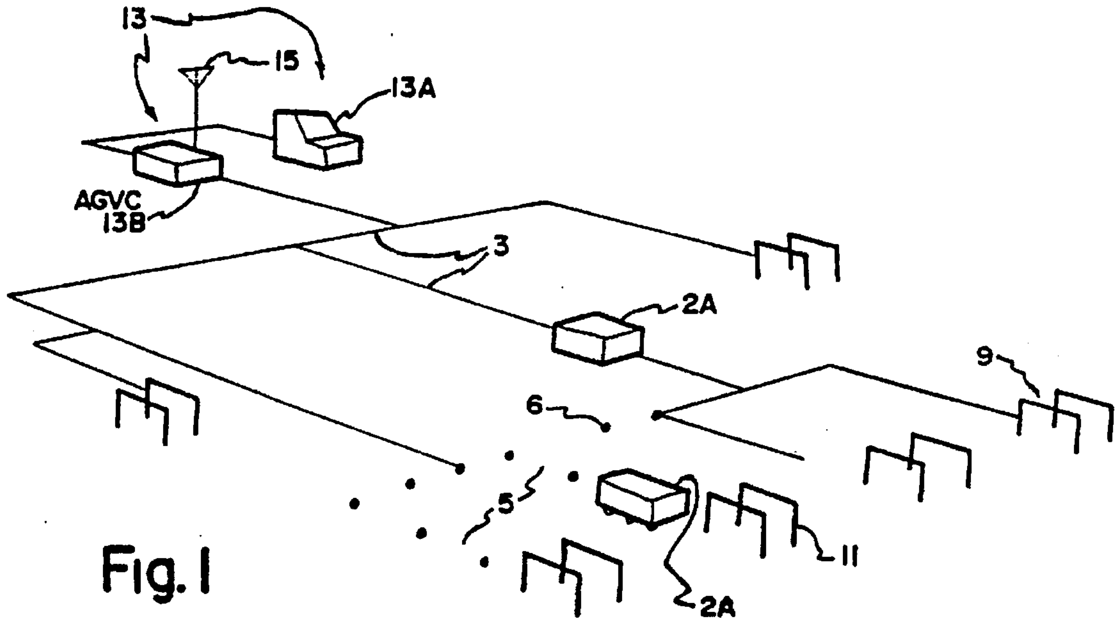
FIG. 1 overview of an illustrative application of a preferred embodiment of the invention, including vehicular routes and some terminals for pickup and delivery.

In FIG. 1 the interior of a warehouse building, in which automated guided vehicles, generally designated 2A, travel about on routes such as routes 3 and 5 among a number of terminals such as terminals 9 and 11, is schematically shown. This is an example of a hybrid facility. The routes 3 have guidewires in the floor to define the routes and guide and communicate with AGV's travelling thereon. The routes 5 are traversed by self-contained navigation and guidance and wireless communicating AGV's which follow paths marked by update markers 6 located at irregular intervals as much as 50 feet apart along the routes 5. The same vehicles are used on both types of routes. Routes 3 shown as single wires in FIG. 1 represent guidewire loops as is well known in the art. Each guidewire receives power from AGVC 13. Update markers 6, constituting, in combination, guide path 5, represent devices from which accurate positioning may be derived and which may be magnets as described in detail later.

Figure 55:
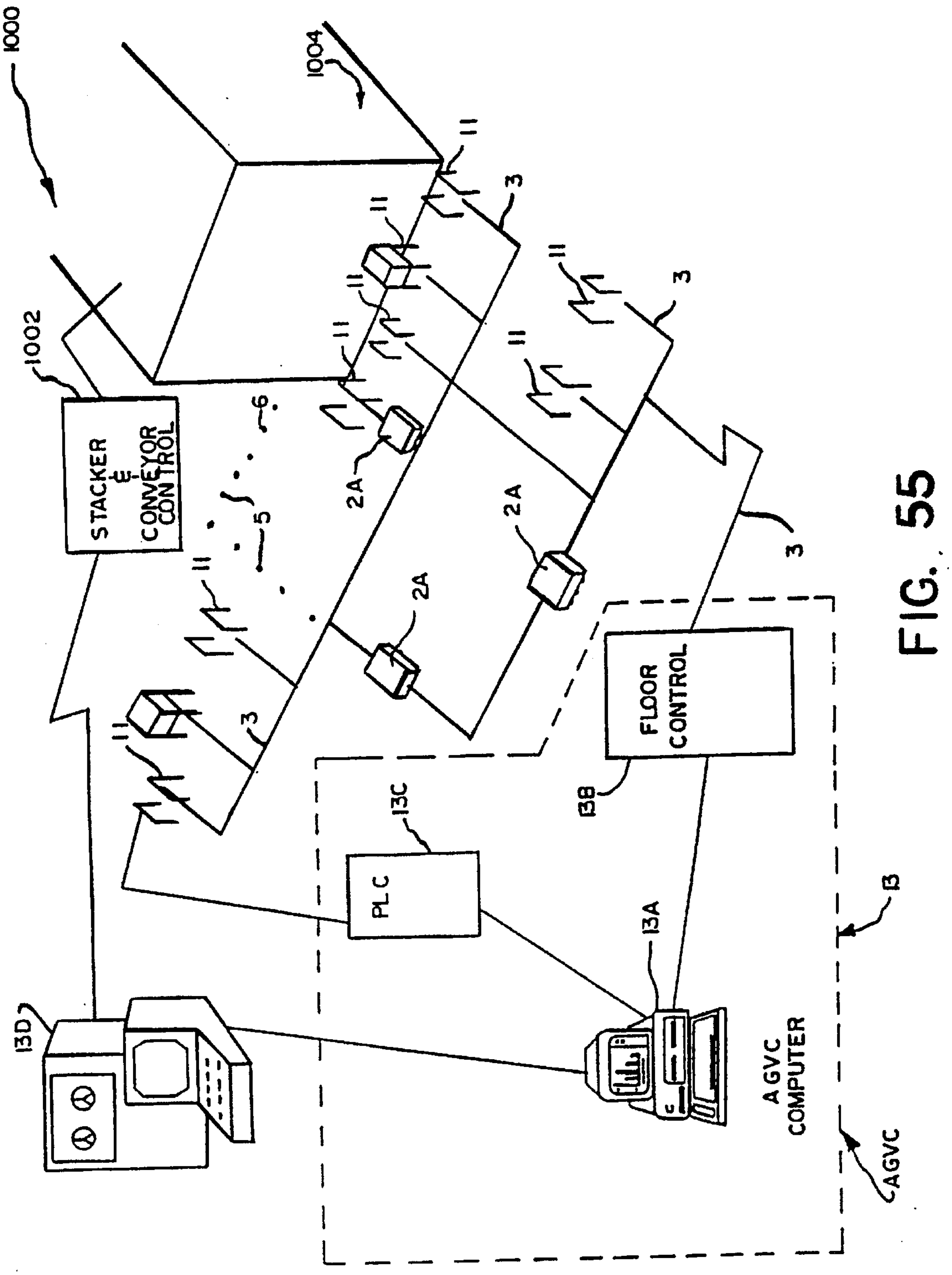
FIG. 55 is a simplified block diagram of an inventory management system showing interconnections between a vehicle controller (AGVC computer) and a management system controller.

Referring to FIG. 55, AGVC 13 comprises an AGVC computer 13A and at least one floor controller 13B, and may further comprise at least one programmable logic controller (PLC 13C). AGVC 13 software is currently commercially available in AGV 2A guidewire systems sold and distributed by Easton-Kenway, 515 East 100 South, Salt Lake City, Utah 84102. As seen in FIG. 55, the AGVC comprises a communications link whereby a management computer 13D is connected and through which tasks are assigned to AGVC 13. Thus, AGVC 13 may be part of a larger inventory management system 1000 which is controlled by management computer 13D. In addition to controlling AGVC 13, management computer 13D processes orders, maintains an inventory, produces reports, and manages conveyer tracking and operation of vertical stacker controllers 1002 whereby material is moved to stacks and retrieved from within a storage facility 1004.

Upon receipt of load movement task from management computer 13D, AGVC computer 13A selects an AGV 2A and schedules an optimum path for the selected AGV 2A. Based upon the path scheduled and the current position of each AGV 2A, AGVC computer 13A provides path segment by path segment control of movement of each AGV 2A under its control through two-way communications between the AGVC and each of the AGV's 2A. The length of each path segment ranges from a fraction of the length of an AGV 2A to a length greater than an AGV 2A length, which can be a plurality of AGV lengths.

AGVC 13 provides signals to the vehicles via guidewires embedded in the floor when they are operating on the routes 3. As described in U.S. Pat. No. 4,791,570, AGVC 13 can communicate with a plurality of communication circuits each connected to a guidewire. As seen in FIG. 1, it also sends the same data through wireless antenna 15 for vehicles not on a guidewire path or otherwise unable to receive communications from AGVC 13.

In order to keep transmission and reception from AGVC 13 and each AGV 2A, mutually exclusive in the currently preferred embodiment, a communications protocol has been adopted for both the guidewire and wireless modes of communication. The protocol gives priority to transmission from AGVC 13 such that no data is transmitted from any AGV 2A when the AGVC 13 is transmitting. All data transmitted by AGVC 13 is transmitted globally, that is, it is transmitted by each and every communication circuit in the system. To avoid data collision, each AGV 2A only attempts to transmit data when it has been poled by AGVC 13.

In addition, AGVC 13 monitors obstacle (such as fire control, exit doors, etc.) and other discreet devices, AGV 2A battery status, sizing measurements in sizing stations and controls site specific devices such as lights. All monitoring and controlling is performed over both hard wired and wireless communications, as available.

The AGVC Communications System

AGVC 13 comprises multiple communications modes. As seen in FIG. 1, an AGV 2A can travel over a guidewire route 3 or a ground marker route 5. When AGV 2A travels over guidewire route 3, communicating messages can be used over the guidewire or via wireless communications. When AGV 2A traverses a path 5 of ground markers 6, a wireless communications system 1110 (see FIG. 71) is used. In a hybrid facility comprising both guidewire and ground marked paths where at least one AGV 2A may be on each route 3, 5 at any time, AGVE 13 must communicate over both modes concurrently. The circuits and methods for communicating over a guidewire are the same as those described in U.S. Pat. Nos. 4,791,570 and 4,902,948, which are the property of the assignee of this invention and which are made a part hereof by reference.

Figure 71:
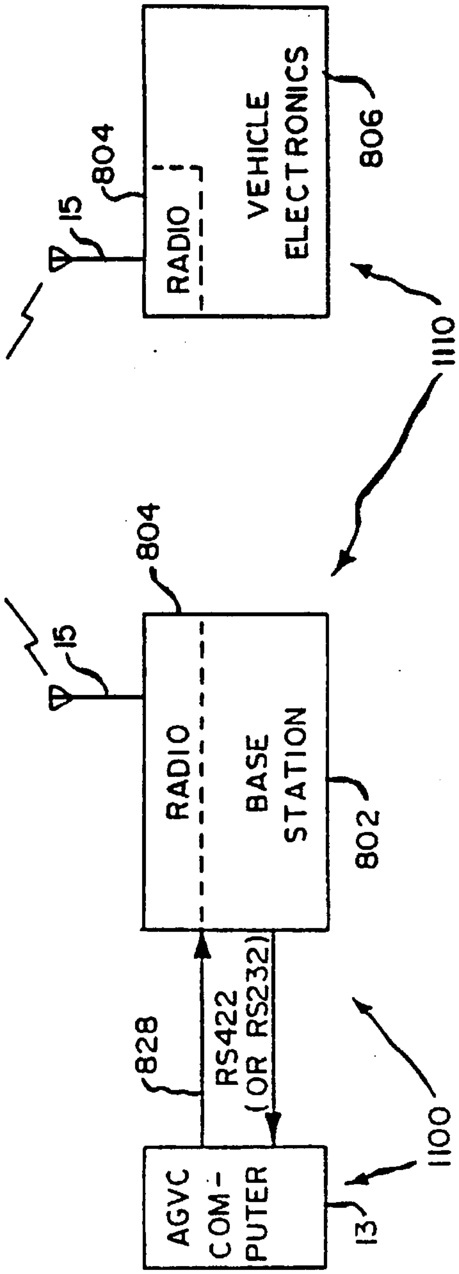
FIG. 71 is a simplified block diagram of a wireless communication system showing source of control from an automated guided vehicle controller and two-way communications between the controller and a related base station and at least one vehicle electronics.

As seen in FIG. 71, the wireless communications system 1110 comprises a non-vehicle portion 100 and a vehicle portion 806. The non-vehicle portion 1100 comprises AGVC 13 which includes an AGVC computer 13A interconnected to base station 802 by either an RS422 or an RS232 communicating link 828. Base station 802 is electrically connected to a radio 804 which sends and receives through an antenna 15 whereby wireless communications are sent to and received from the plurality of vehicles 2A in the facility. In the currently preferred embodiment, radio 804, commonly used by both base station 802 and each AGV 2A, is a model KS-900, available from TEKK Inc., 224 N.W. Platte Valley Drive, Kansas City, Mo. 64150, although other radios can be used within the scope of the invention.

Figure 72:
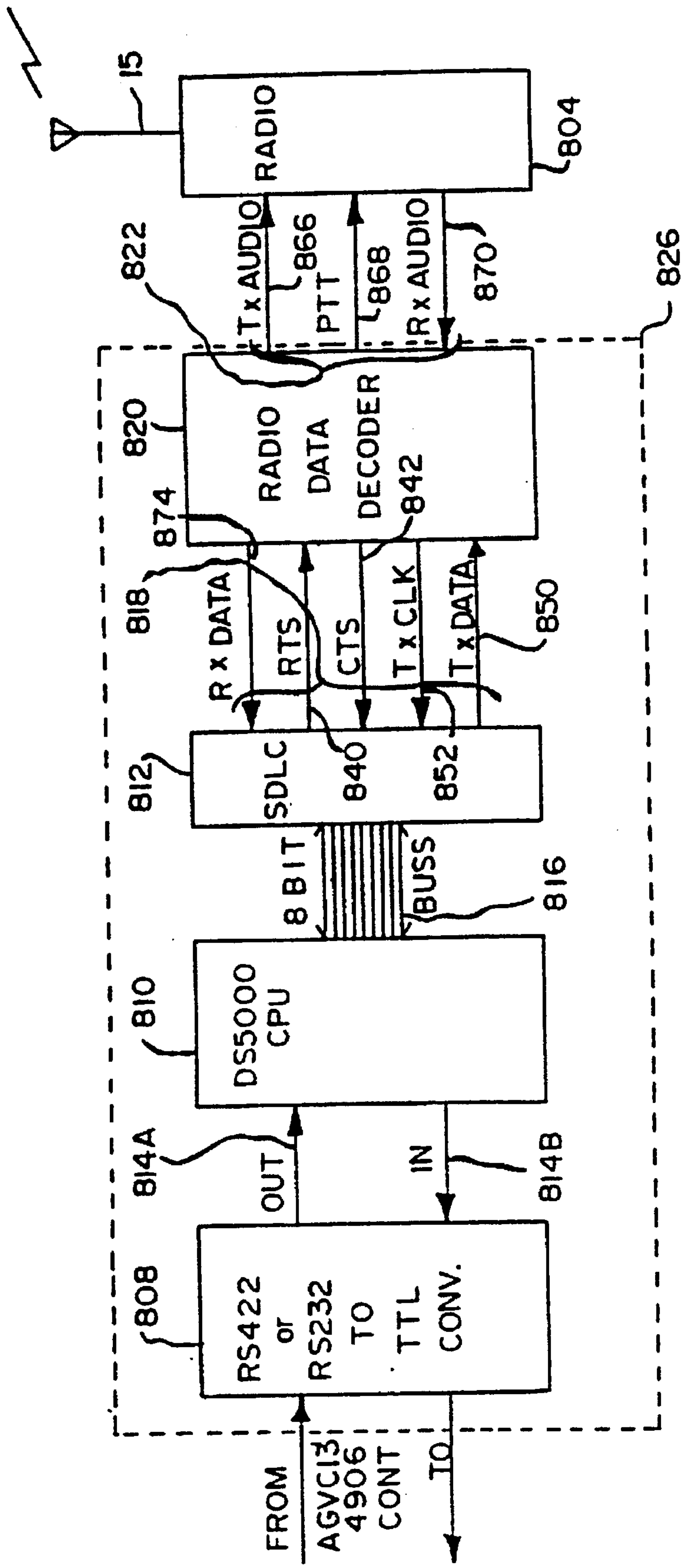
FIG. 72 is a block diagram of base station communication electronics and a related radio.

A block diagram of base station 826 is seen in FIG. 72. Base station 826 comprises circuits 808 which selectively convert RS422 and RS232 signals to levels processable by base station 826 logic circuits. Circuits 808 communicate with a central processing unit 810 via output line 814A and input line 814B. Although other central processing units can be used within the scope of the invention, central processing unit 810 is a DS5000 (from Dallas Semiconductor) in the currently preferred embodiment. Central processing unit 810 communicates with an SDLC chip 812 which operates in the same manner as SDLC chips in guidewire communications. Output from SDLC chip comprises request to sent (RTS 840), and transmitted data (TxDATA 850) to a radio data decoder 820. Inputs to the SDLC chip from the radio data decoder 820 comprise a transmit clock (TxCLK 852), a clear to send (CTS 842) signal, and received data (RxDATA 874).

Circuits and operation of radio data decoder 820 is discussed in detail hereafter. Radio data decoder 820 is connected to radio 804 by an audio transmit line (TxAUDIO 866), a permit to transmit (PTT 868), and an audio data receive line (RxAUDIO 870). Thus data is received from AGVC 13 in RS232 or RS422 format, transferred to, buffered in memory, and resent from central processing unit 810 to the SDLC chip 812. From SDLC 812, data is sent to decoding circuits, wherein the data is translated for efficient transmission, and therefrom sent to radio 804 for transmission through antenna 15.

Base station 802 received data is detected at antenna 15 and relayed to radio 804 wherefrom, the data in audio format, is sent to radio data decoder 820 wherein the audio RxAUDIO 870 signals are transformed to RxDATA 874 signals which can be processed by SDLC chip 812. Once processed by SDLC chip 812, data is sent through bus 816 for storage in memory and further transmission to AGVC computer 13A after conversion to the selected RS422 or RS232 format.

The message format sent via wireless transmission is the same as the format described in the earlier referenced U.S. Pat. Nos. '570 and '948. The message format being:

<BOM><AGV 2A address><message><CRC><EOM>

The message within the message format is either a command or status and may be of any length. BOM and EOM are the same beginning and end of message codes used in guidewire communications. The CRC chick code is also calculated in the same manner as the CRC in guidewire communications.

Figure 73:
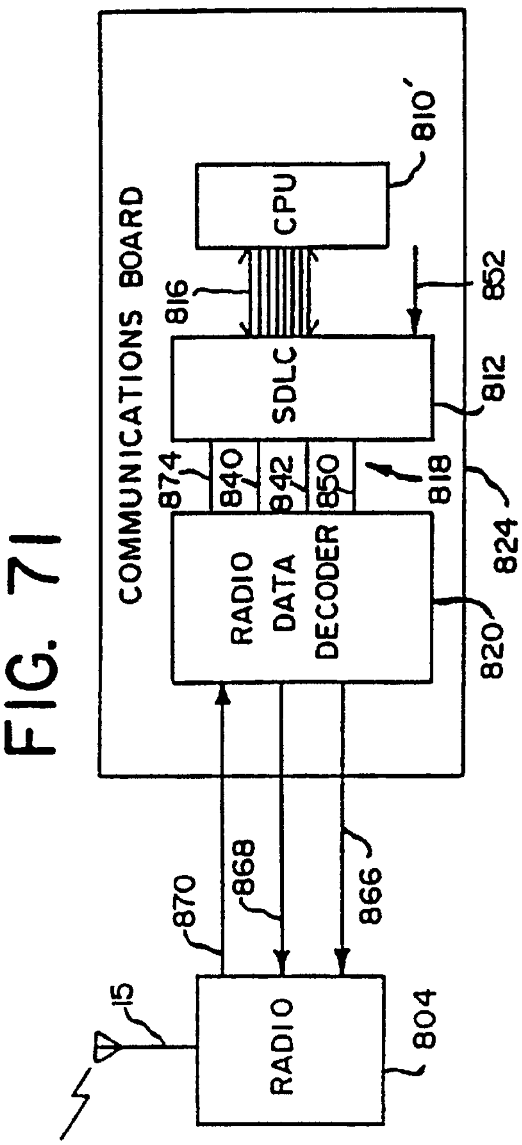
FIG. 73 is a block diagram of vehicle communications electronics showing connecting relationships among a communications processor, an SDLC chip, a radio data decoder, and a two-way radio.

The vehicle 2A portion 806 of wireless communications system 1110 is seen in FIG. 73. Intra-vehicle connections are not shown but are identical to those described in previously referenced U.S. Pat. Nos. '570 and '948. Interconnections and operation of central processing unit 810', SDLC chip 812, and radio data decoder 820 are the same as the same central processing unit 810', SDLC chip 812, and radio data decoder 820 used in the non-vehicle portion 1100 of communication system 1110. Though not necessary within the scope of the invention, the same radio 804 is also used.

Figure 74:
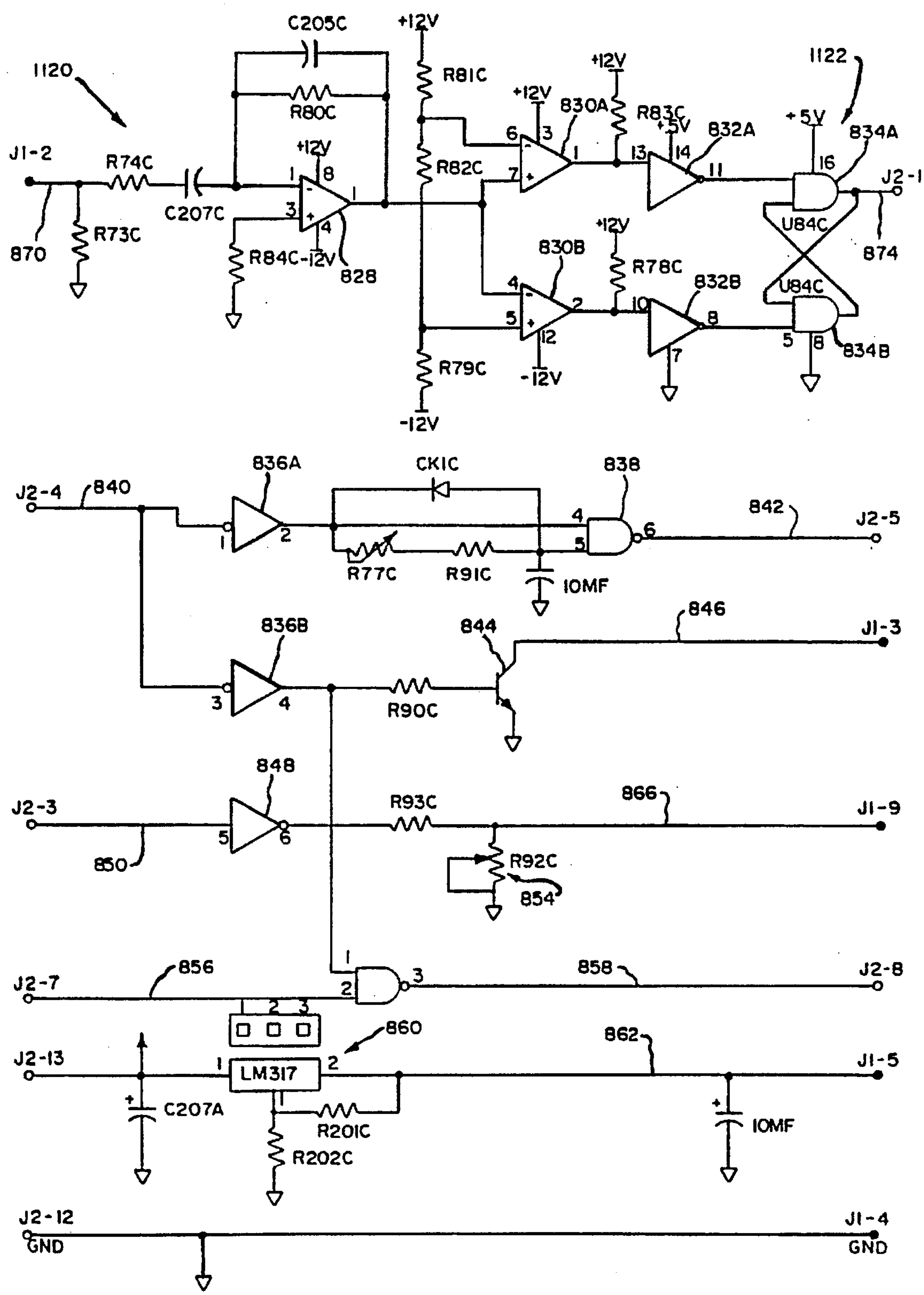
FIG. 74 is a schematic of the circuits for the radio data decoder, and communications control and data lines comprising request to sent, clear to send and permission to transmit, transmit data to audio conversion, transmit clock control, and power regulation circuits.

A digital decoding circuit 1120 portion of radio data decoder 820 is seen in the circuit schematic in FIG. 74. A 9600 baud digital data stream is sent to radio 804 wherefrom the signal is modulated and sent over a carrier wave to another receiving radio 804. Using digital decoding circuit 1120, the 9600 baud data stream requires a base band of only one-half the 9600 baud digital data stream frequency to send a signal which, as received and provided by a receiving radio 804, produces a discriminator waveform seen as discriminator output 1136 in FIG. 76. Digital decoding circuit 1120 receives and reconstructs the 9600 baud signal which is transmitted effectively at 4800 cycles per second. Even at 4800 cycles per second, received signal amplitude is substantially lower than other radio signals which are transmitted at frequencies lower than the 3000 cycle per second base band cutoff of radio 804. Digital decoding circuit 1120 is of primary importance in the digital data reconstruction because a frequency of 9600 cycles per second is too far beyond the 3000 cycle per second base band cutoff of radio 804 to be reliably detected. Even so, the amplitude of the 4800 cycle per second frequency signal requires special processing to reliably reconstruct the original digital data stream.

Digital decoding circuit 1120 is similar to the circuit disclosed in U.S. Pat. No. 4,613,973 which is the property of the assignee of this invention. Input to circuit 1120 is RxAUDIO 870 which is received from radio 804. The digital decoding circuit 820 produces a digital signal which is communicated to SDLC chip 812.

Digital decoding circuit 1120 as presently preferred, comprises seriatim a differential amplifier 828, a comparator circuit comprising a positive comparator 830A and a negative comparator 830A, one digital level translator 832A, 832B for each comparator 830A, 830B, and a latch circuit comprising a flip-flop 1122 formed of two inverting AND gates 834A and 834B. Differential amplifier 828 produces distinct voltage spikes corresponding to voltage transitions of the waveform received from radio 804 across a zero voltage. A positive voltage spike is produced whenever the waveform passes from negative to positive, and a negative voltage spike is produced whenever the waveform passes from positive to negative.

The comparator circuit produces a voltage at each comparator 830A and 830B, a first voltage which is interrupted whenever the output of differential amplifier 828 exceeds a certain predetermined value and a second voltage which is interrupted whenever the output of the differential amplifier 828 is less than a certain pre-determined value.

Digital level translators 832A, 832B are MC1489 chips (from Motorola Semiconductor) which are more generally used in RS232 positive/negative voltage levels to digital voltage levels conversion. In this case, the input levels to digital level translators 832A, 832B are ±12 volts; output is compatible with standard TTL voltages.

The latch circuit receives the outputs of digital level translators 832A and 832B as set and reset inputs, respectively, to the flip-flop 1122 thereby producing as an output a digital data stream.

Referring to FIG. 74, the output of radio 804 is provided with a load resistor R73C, chosen to balance the capacitively coupled output of discriminator circuitry contained in radio 804. A representative output 1136, seen in FIG. 76, from radio 804 comprises a digital data stream 1134 which has been distorted by modulation and demodulation of a carrier wave. The output 1136 is passed to differential amplifier 828 which comprises a differentiating input through capacitor C207C. The differential amplifier used in the currently preferred embodiment is TL072 from Texas Instrument. A list of components used in the currently preferred embodiment is found in a table below. It should be understood that the components used in the list are for the currently preferred embodiment and other components can be used within the scope of the invention. The other resistors R74C and R80C and capacitor C205C function in a known fashion. The differential amplifier 828 operates as a differentiation device by resistor R74C and capacitor C207C. The feedback resistor R80C and capacitor C205C are provided for the purposed of limiting input bandwidth to suppress high frequency noise.

Given the data stream 1134, the output of differential amplifier 828 comprises a waveform 1138. See FIG. 76. The maximum amplitude of waveform 1138 is adjusted to a suitable value for example, in excess of 6.5 volts positive and negative, by either adjusting the amplitude of waveform 1136 at the output of radio 804, or by choosing appropriate values for the resistors and capacitors used with amplifier 828.

The output 1138 of the differential amplifier 828 is communicated to the comparator circuit comprising positive voltage comparator 830A and negative voltage comparator 830B. Comparators 830A and 830B are provided with suitable comparison voltages through voltage dividing resistors R81C, R82C, and R79C and pull-up resistors R83C and R78C. A satisfactory integrated circuit is an LM339 available from National Semiconductor. In the preferred embodiment, the comparison voltages are provided by a source of positive potential and a source of negative potential connected by a voltage divider formed by R81C, R82C, and R79C. For the ±12 voltage level used in the preferred embodiment, resistor values are those listed the table below.

Digital level translators 832A and 832B are inserted between comparators 830A and 830B, respectively, and produce logic level outputs for the inputs to flip-flop 1122.

Figure 76:
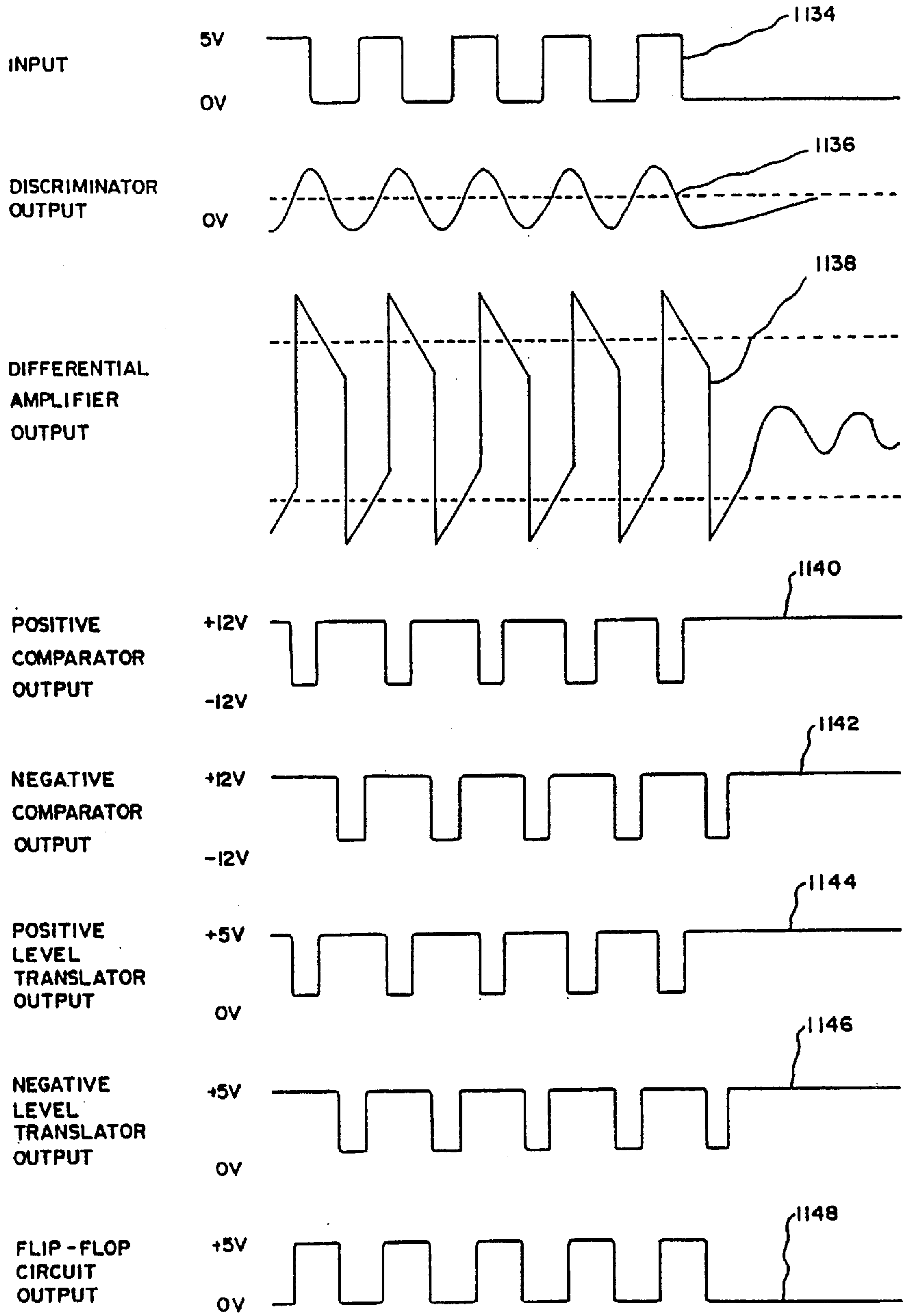
FIG. 76 is a timing diagram showing representative waveforms involved in practicing the radio data decoder.

The function of positive comparator 830A is to interrupt a current at the output of positive comparator 830A whenever and as long as the amplitude of waveform 1138 exceeds the positive comparison level voltage. A representative output 1140 from positive comparator 830A is seen in FIG. 76.

The function of negative comparator 830B is to interrupt a current at the output of negative comparator 830B whenever and as long as the amplitude of waveform 1138 is less than the negative comparison voltage. A representative output 1142 from negative comparator 830B is seen in FIG. 76.

The two outputs of comparator circuits 830A, 830B are respectively applied to the inputs of flip-flop 1122 through digital level translators 832A and 832B, respectively. In the currently preferred embodiment, a set-reset flip-flop 1122 comprises two negative logic AND gates (NAND gates 834A and 834B) connected as shown in FIG. 74. A suitable negative logic AND gate is SN74279 available from Texas Instruments. A low logic level at the input of NAND gate 834A will set flip-flop 1122 output to a logic level "high". Flip-flop 1122 output is reset to "low" by a "low" logic level at the input of NAND gate 334B. Flip-flop 1122 output 1148 voltage level (FIG. 76) represents a stream of digital data corresponding to the digital input 1134.

The values of circuit components are not critical to the operation of receiving circuit 1120. Of course, the combinations of resistors and capacitors are chosen such that the response time (or "time constant") of the differentiating circuit is compatible with the input frequency from the radio 804. Variations and modifications may be made without departing from the present invention. In operation, receiving circuit 1120 provides a rapid "off" to "on" time of less than five milliseconds.

Figure 75A:
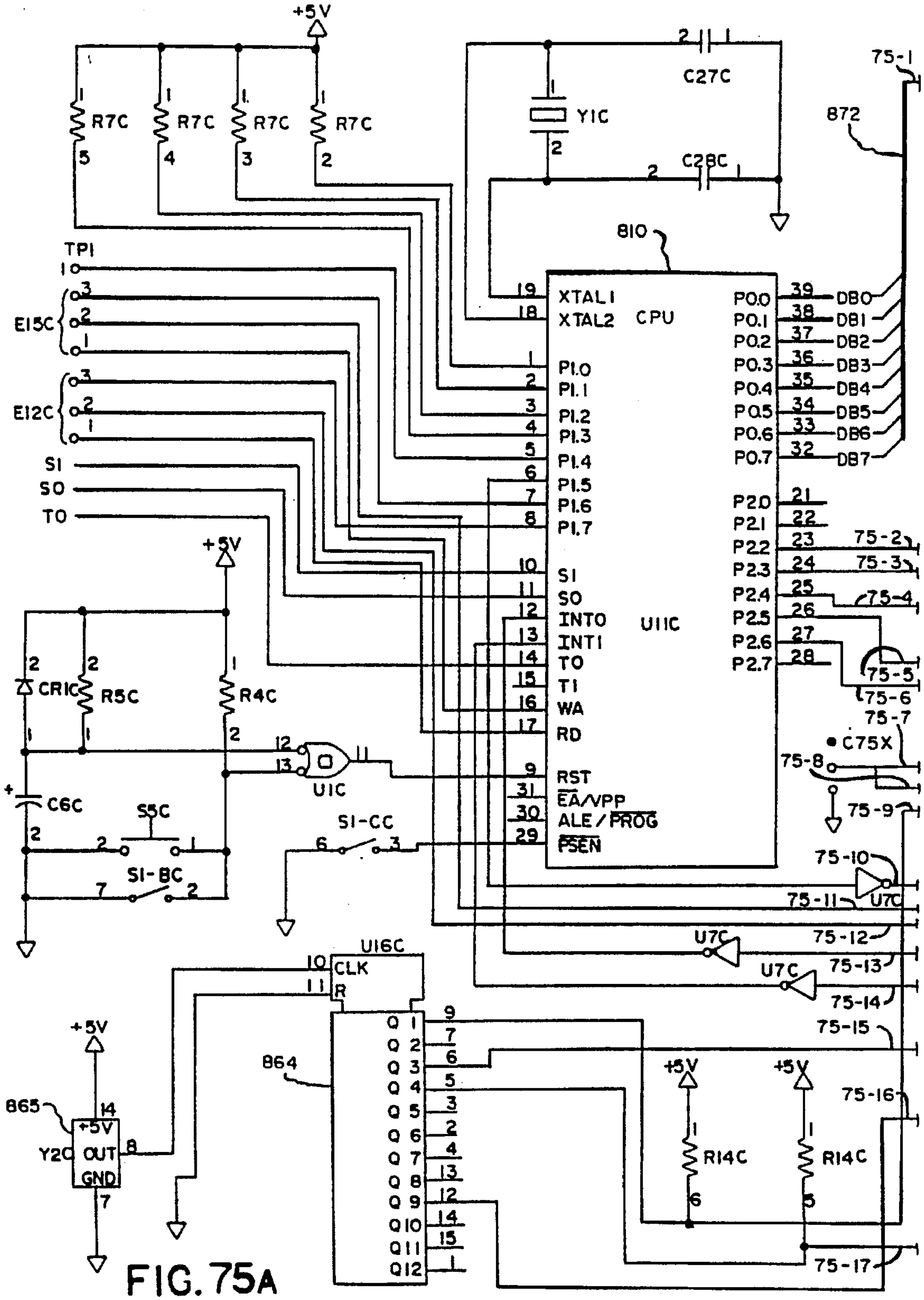
FIG. 75 is a detailed schematic of the automated guided vehicle controller communications electronics which receive input from the radio data decoder, said electronics comprising an SDLC chip, a central processing unit, a clock generator, and floor controller interfacing circuits.
Figure 75B:
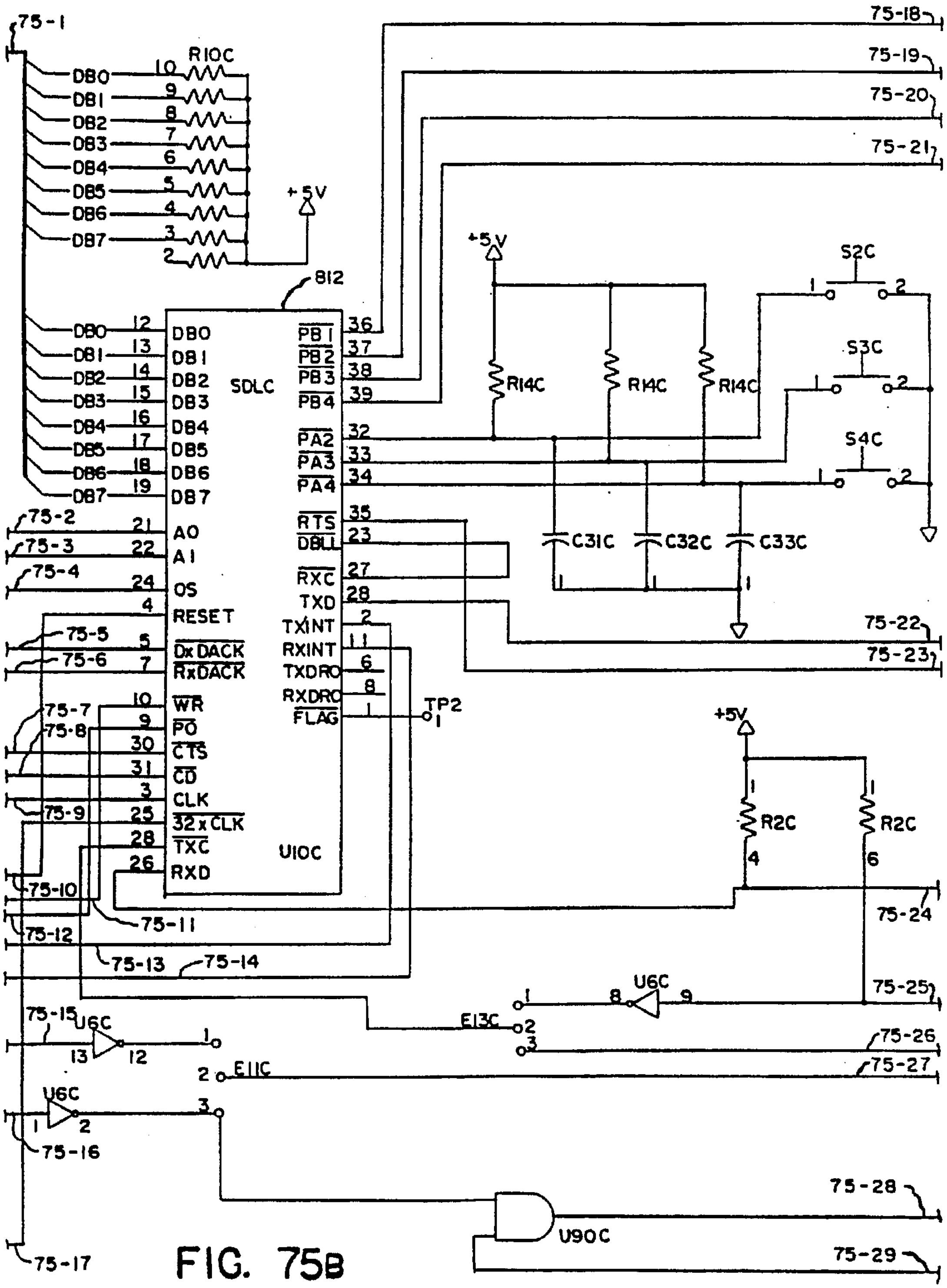
Figure 75C:
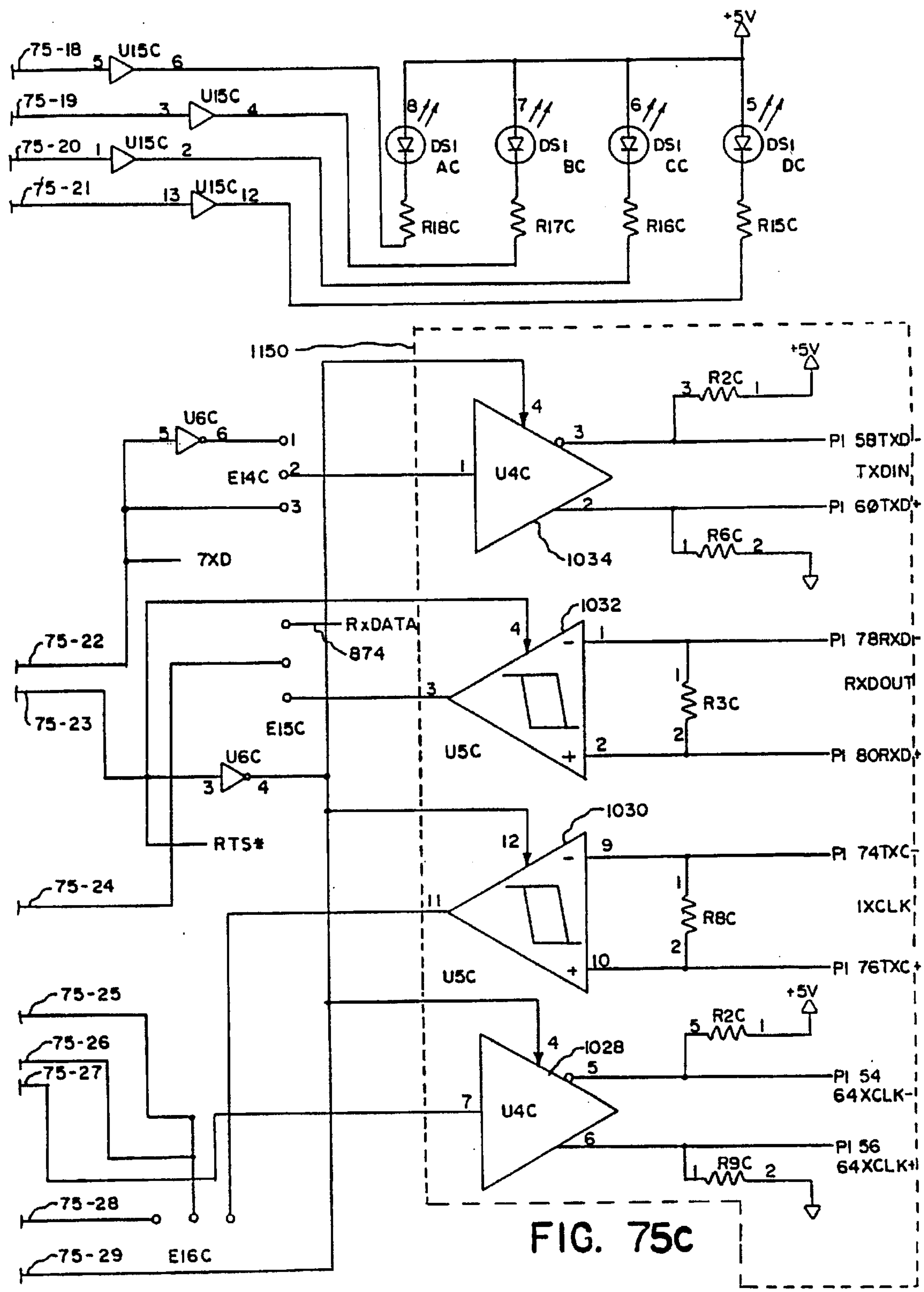

A detailed schematic of the circuits comprising interconnections between central processing unit 810 and SDLC chip 812 is found in FIG. 75. Connections between each of the components are standard and known in the art. Therein, RxDATA 874 is received through switch E15 to the RxD input of SDLC chip 812. Clock generation is provided by oscillator 865 and clock divider chip 864. Light emitting diodes DS1AC provide visual status of operation of SDLC chip 864. All "E" references specify computer controlled switches or jumpers.

Of particular interest in the interface to a guidewire floor controller which comprises the interfacing circuits 1150 enclosed by dashed lines in FIG. 75. Interfacing circuits 1150 comprising guidewire floor controller drivers of transmit driver 1034, receive amplifier 1032, transmit clock 1030, and an output amplifier for a sixty-four times clock 1028. Components used in currently preferred embodiment of the wireless communication system as seen in FIGS. 74 and 75 are found in the following list:

| Number | Name | Value or Type |
|---|---|---|
| R2C | Resistor | 2.2K Ohms |
| R3C | Resistor | 100 Ohms |
| R4C | Resistor | 2.2K Ohms |
| R5C | Resistor | 2.2K Ohms |
| R6C | Resistor | 2.2K Ohms |
| R8C | Resistor | 100 Ohms |
| R9C | Resistor | 2.2K Ohms |
| R10C | Resistor | 4.7K Ohms |
| R14C | Resistor | 2.2K Ohms |
| R15C | Resistor | 180 Ohms |
| R16C | Resistor | 180 Ohms |
| R17C | Resistor | 180 Ohms |
| R18C | Resistor | 180 Ohms |
| R73C | Resistor | 30K Ohms |
| R74C | Resistor | 10K Ohms |
| R77C | Resistor | 10K Ohms |
| R78C | Resistor | 10K Ohms |
| R79C | Resistor | 3.3K Ohms |
| R80C | Resistor | 1000K Ohms |
| R81C | Resistor | 3.3K Ohms |
| R82C | Resistor | 5.1K Ohms |
| R84C | Resistor | 10K Ohms |
| R83C | Resistor | 100 Ohms |
| R90C | Resistor | 4.3K Ohms |
| R91C | Resistor | 10K Ohms |
| R92C | Resistor | 100 Ohms |

-continued

| Number | Name | Value or Type |
|---|---|---|
| R93C | Resistor | 2.4K Ohms |
| R201C | Resistor | 200 Ohms |
| R202C | Resistor | 1.33K Ohms |
| C205C | Capacitor | 10 pf |
| C207C | Capacitor | .01 μf |
| C207AC | Capacitor | 10 μf |
| C27C | Capacitor | 33 pf |
| C28C | Capacitor | 33 pf |
| C6C | Capacitor | 100 μf |
| C31C | Capacitor | 0.47 μf |
| C32C | Capacitor | 0.47 μf |
| C33C | Capacitor | 0.47 μf |
| 810C | CPU | DS500032-12 |
| 812C | SDLC | 8273 |
| 834AC | Nand | 74LS279 |
| 834BC | Nand | 74LS279 |
| 836AC | Inv.Amp. | Std |
| 836BC | Inv.Amp. | Std |
| 838C | Nand | 74LS132 |
| 838AC | Nand | 74LS00 |
| 848C | Inv.Amp. | Std |
| 860C | Pow.Reg. | LM317 |
| 864C | Clock Gen. | 74HC4040 |
| 1034C | Out.Amp. | 3487 |
| 1028C | Out.Amp. | 3487 |
| 1030C | Input Amp. | 3486 |
| 1032C | Input Amp. | 3486 |
| CR1C | Diode | 1N914 |
| U1C | Nor | 74LS132 |
| U6C | Inv.Amp. | 74LS04 |
| U7C | Inv.Amp. | 74LS04 |
| U14C | Nor | 74LS02 |
| U15C | Amplifier | 7407 |
| U33C | Inv.Amp. | 1489 |
| U82C | Diff.Amp. | TL072 |
| U83C | Diff.Amp. | LM339 |
| U90C | And Gate | Std |

Guide Path Marking

AGVC 13 controls automatic guide vehicles over a plurality of guide paths. As seen in FIG. 1, the guide paths may be a substantially continuous guidewire or series of guidewires activated by a central source such as AGVC 13, a sequence of intermittently placed update markers requiring an AGV 2A to traverse therebetween by self contained guidance, or a passive guidewire not connected to a power source but receiving emitted power induced from the AGV 2A, itself. These paths are depicted by guidewires 3 and update markers 6 in FIG. 1. Passive wire loops in a mat 51 as seen schematically in FIG. 3. The passive wire loop in a mat 51 provides opportunity for guidewire guidance where there is no power connection to AGVC 13. Such opportunities are found in terminal positioning and providing temporary paths between otherwise marked guide paths.

The Automatic Guided Vehicle (AGV 2A)

Figure 2:
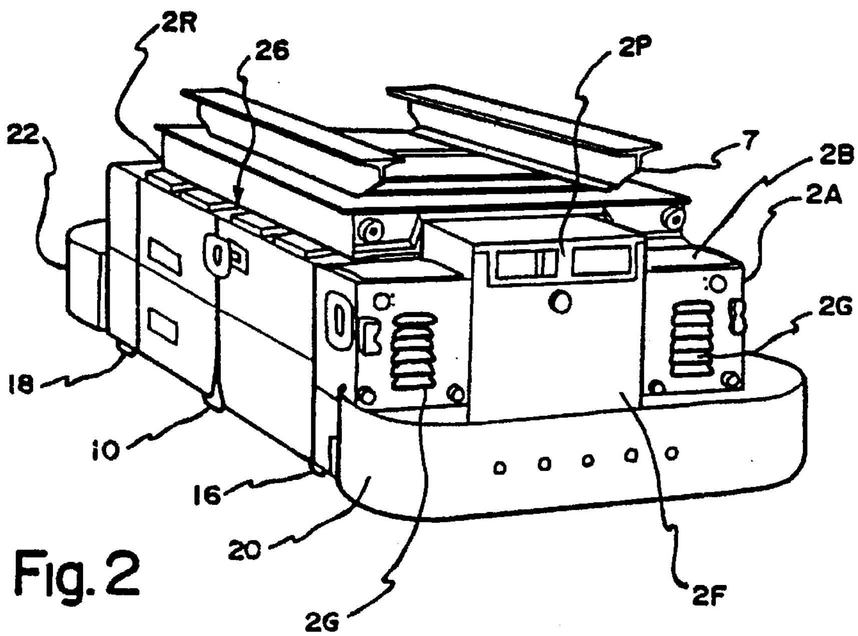
FIG. 2 perspective view of an automatic guided vehicle.
Figure 3:
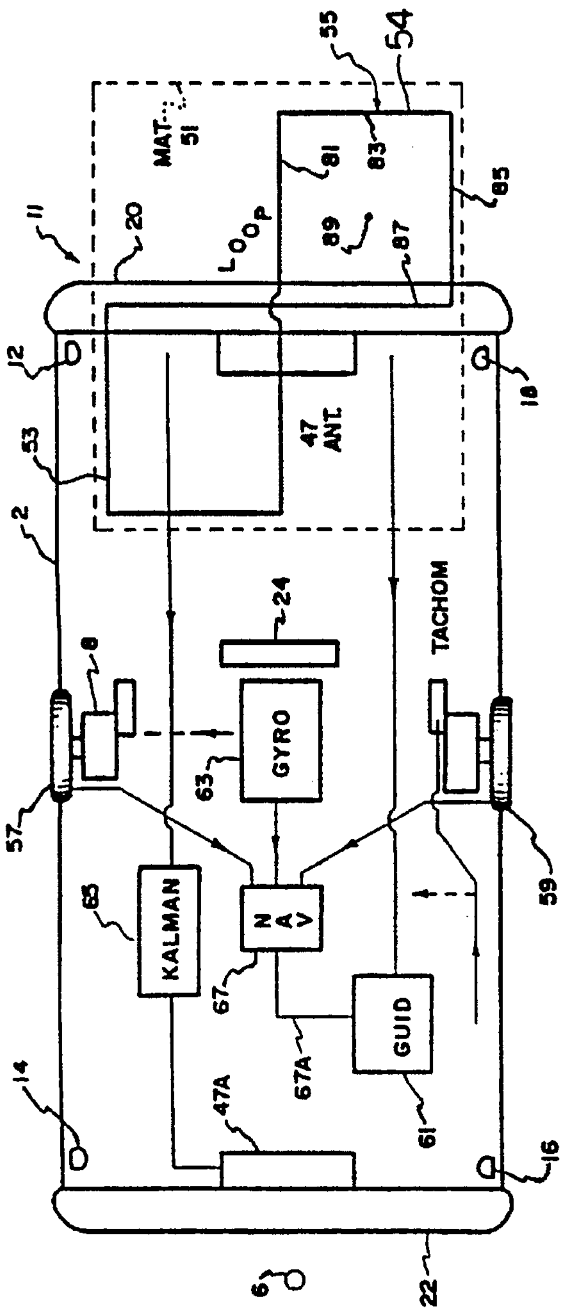
FIG. 3 simplified top view of the vehicle and of a passive loop of conductor in a floor mat at a terminal.

On automatic guided vehicle, AGV 2A, is depicted isometrically in FIG. 2 and schematically, showing placement of wheels and castors in FIG. 3. It has drive wheels 8, 10 on its port and starboard sides respectively, which are powered individually by motors. Casters 12, 14, 18 and 16 support the vehicle at its port front, port rear, starboard front and starboard rear corners respectively. As earlier described, the terms port, starboard, front and rear refer to physical absolutes of the vehicle. The terms left and right are relative to the direction of travel; the vehicle operates symmetrically in either direction. The front 2F of vehicle 2A as seen in FIG. 2 comprises and is identified by two laterally disposed grills 2G and a control panel 2P. The rear 2R of vehicle 2A is the other end. Port and starboard are referenced to the front 2F of vehicle 2A. These terms are generally used herein.

Touch-sensitive bumpers 20, 22 are located at the front and rear of the vehicle, respectively, to detect obstacles in the path and to activate switches to stop the vehicle.

In addition to the mechanical parts mentioned above, each AGV 2A further comprises sensors, a two-way communication system, a navigation and guidance system, and a vehicle traffic control system, each of which resides below the top surface 28 of AGV 2A wherein vehicle 2A comprises a well 26 used for navigation and guidance apparatus, leaving the top surface free for loads or other uses, as seen in FIG. 2.

The AGV 2A Communications Systems

The AGV 2A communications system comprises both guidewire and wireless communications capability. Guidewire communications are the same as disclosed in U.S. Pat. Nos. 4,491,570 and 4,902,948 which are the property of the assignee of this invention and which are made part hereof by reference. A block diagram of the wireless communications system is seen in FIG. 73. As seen therein communications board 824 comprises wireless communications components and circuits which are similar to the wireless communications components and circuits seen in the block diagram of base station 826 in FIG. 72. However, a central processing unit 8742 is used in communications board 824 while a DS5000 central processing unit is used in base station 826. Even so, wireless communications functions of communications board 824 and base station 826 are the same. The major difference is the higher volume message handling and buffering required of base station 826.

As seen in FIG. 73, a radio 804 is located in each wireless communicating vehicle 2A and receives signals via an antenna 15. Communication lines RxAUDIO 870, PTT 868, and TxAUDIO 866 transmit received audio digital data streams, permission to transmit, and digital data streams to be transmitted, respectively, in the directions shown, between radio 804 and radio data decoder 820.

Radio data decoder 820 operates as earlier described. Also as earlier described, lines RxDATA 874, RTS 840, CTS 842, and TxDATA communicate received data, request to send, clear to send, and data to be transmitted, respectively, between radio data decoder 820 and SDLC 812, over lines 818 in the directions shown. SDLC operates as is well known in the art. A bus 816 provides communication between SDLC 812 and CPU 810'. A circuit diagram which includes the circuits related to the vehicle 2A is provided in FIGS. 87–95 and hereafter described as part of the vehicle 2A microprocessor system.

The AGV 2A Sensors

Each AGV 2A comprises a plurality of sensors and sensors types providing measurement capacity for a plurality of guide path marking systems and redundancy of measurement whereby the effects of systematic sensor errors are dynamically removed from the estimates of AGV 2A position and direction of travel. A navigation and guidance system provides a plurality of operating modes for guiding the AGV 2A over a number of different guide paths. As seen in FIG. 3, sensors of the currently preferred embodiment comprise antennae 47 for measuring a magnetic field emitted by guidewire 3 or a mat 51, Hall sensors 24 for measuring each traversed update marker 6, which, in the currently preferred embodiment, comprises a magnet, as described in detail hereafter, an angular rate sensor system 500 for dynamically measuring vehicle direction, and an encoder 58 for each fifth wheel 57 and sixth wheel 59 for measuring travel at the port and starboard sites of AGV 2A, respectively.

A simplified top view of AGV 2A is shown conceptually in FIG. 3. An update marker 6 is shown on the floor on the left side of the figure. This is a guidance system of the type represented by the routes 5 of FIG. 1. In FIG. 3, on the ground at the terminal 11 is a mat 51, which has a loop of wire 55 in the shape of a skewed figure eight embedded in it. A left-hand portion or lobe of the loop is designated 53 and a right-hand portion or lobe is designated 54. An antenna system 47 is near the front of the vehicle; it is centered on a longitudinal centerline of the vehicle and extends transversely. A similar antenna system 47A is at the rear.

FIG. 3 also shows an array of Hall sensors 24 that are employed in the navigation and guidance system of the vehicle, as well as other navigation and guidance subsystems and components including a gyroscope 63, a navigation computer 67, a motion control processor (computer) 61 and fifth and sixth wheels 57, 59 for measuring the travel of the port and starboard sides respectively of the vehicle. In combination, these sensors provide redundancy of measurement whereby errors due to causes comprising drift, miscalibration, wear, temperature change, and variations in vehicle response to load and use are dynamically corrected. A Kalman filter 65 is used to evaluate such errors in each sensor and provide adjusting corrections to the navigation and guidance system as described hereafter.

The position-sensing portion of the vehicle includes a magnetic-field transmitter on the vehicle, the passive loop of wire 55 on the floor, and signal-receiving equipment on the vehicle. During operation of the system as a whole the vehicles 2A drive about on the various segments of the routes 3, 5 as shown in FIG. 1 to pick up and deliver loads. The vehicles are propelled forward and steered by rotation of the drive wheels 8 and 10. The direction and speed of each wheel 8, 10 is controlled by its respective portion of a control system as described below.

The AGV 2A Navigation and Guidance System Update Marker Guidance System

Figure 32:
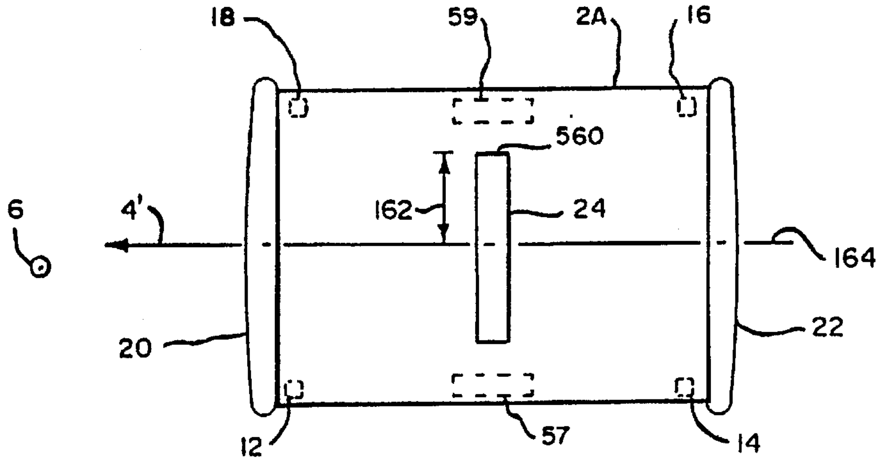
FIG. 32 depicts a guided vehicle system that utilizes an update marker guidance navigation system.

FIG. 32 is a stylized top view of the guided vehicle 2A driving in the direction of the arrow 4' toward a magnet 6 that is mounted in the floor. As related earlier, vehicle 2A has drive wheels 57, 59 on the left and right sides respectively, which are powered individually by motors that are not shown in FIG. 32. Casters 12, 14, 18 and 16 support the vehicle at its left-front, left-rear, right-front and right-rear corners respectively. The terms front and back are used here for convenience of description; the vehicle operates symmetrically in either direction.

Touch-sensitive feelers or bumpers 20, 22 are located at the front and back of the vehicle respectively to detect obstacles in the path and to activate switches to stop the vehicle. A transversely arranged linear array of magnetic sensors 24 is mounted on the vehicle as shown in FIG. 32.

Update Marker System—The floor magnet

Figure 33:
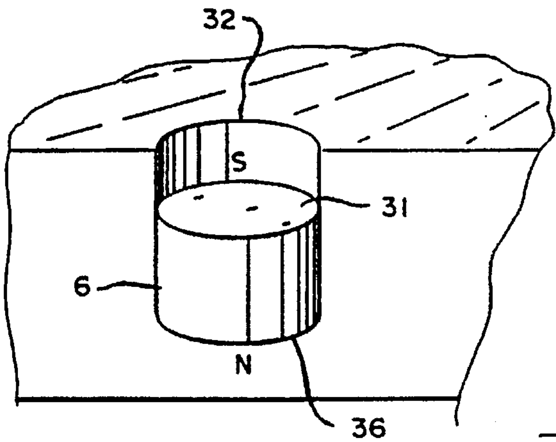
FIG. 33 shows an update marker magnet in the floor.

In FIG. 33 a floor marker 6 is shown in place in a hole 32 in the floor. In this embodiment, floor marker 6 comprises a cylindrical magnet, placed with its axis vertical, and has its south-polarized face 31 facing upward and its north-polarized face 36 at the bottom of the hole. Since only magnets are used in the currently preferred embodiment, the term marker 6 and magnet 6 will be used interchangeably. However, this interchangeable use is only for the purpose of simplicity and clarity of presentation. In the general case, it should be understood that more than one kind of floor marker can be used in the invention. The diameter of the magnet 6 in this embodiment is ⅞ inch and its axial height is 1 inch.

Magnetic-Field Sensors

Figure 34:
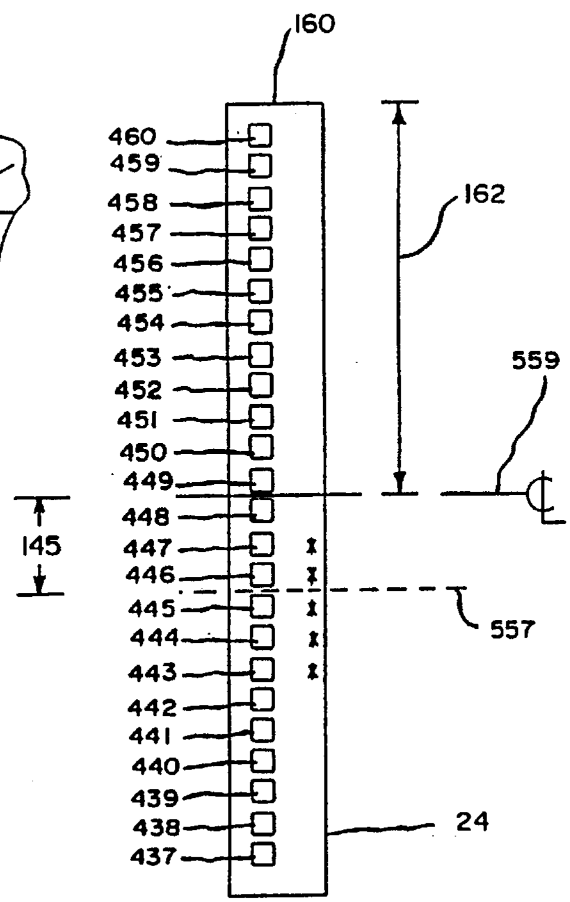
FIG. 34 shows an array of Hall magnetic sensors on the vehicle.

The array 24 of magnetic-field sensors is shown in plan view in FIG. 34. In this embodiment it comprises twenty-four Hall-effect sensors spaced for example 0.8 inch apart in a straight line perpendicular to the longitudinal centerline 559 of vehicle 2A and laterally centered on the centerline 559 of vehicle 2A. The first sensor is labeled 437; the twelfth sensor is 448; the thirteenth sensor is 449 and the twenty-fourth sensor is 460.

The sensors 24 are commercially available devices whose analog output voltage varies as a function of the magnetic field it detects. Each sensor has a null voltage, which is its output when no magnetic field is present. When a magnetic field is present the voltage consistently increases or decreases relative to the center of flux of a magnet and to the null voltage, depending upon whether the magnet crosses a south or north pole. In the described embodiment of the invention the sensor always detect a south pole field 31, so their output voltage always increases as a result of being near a magnet.

Figure 35:
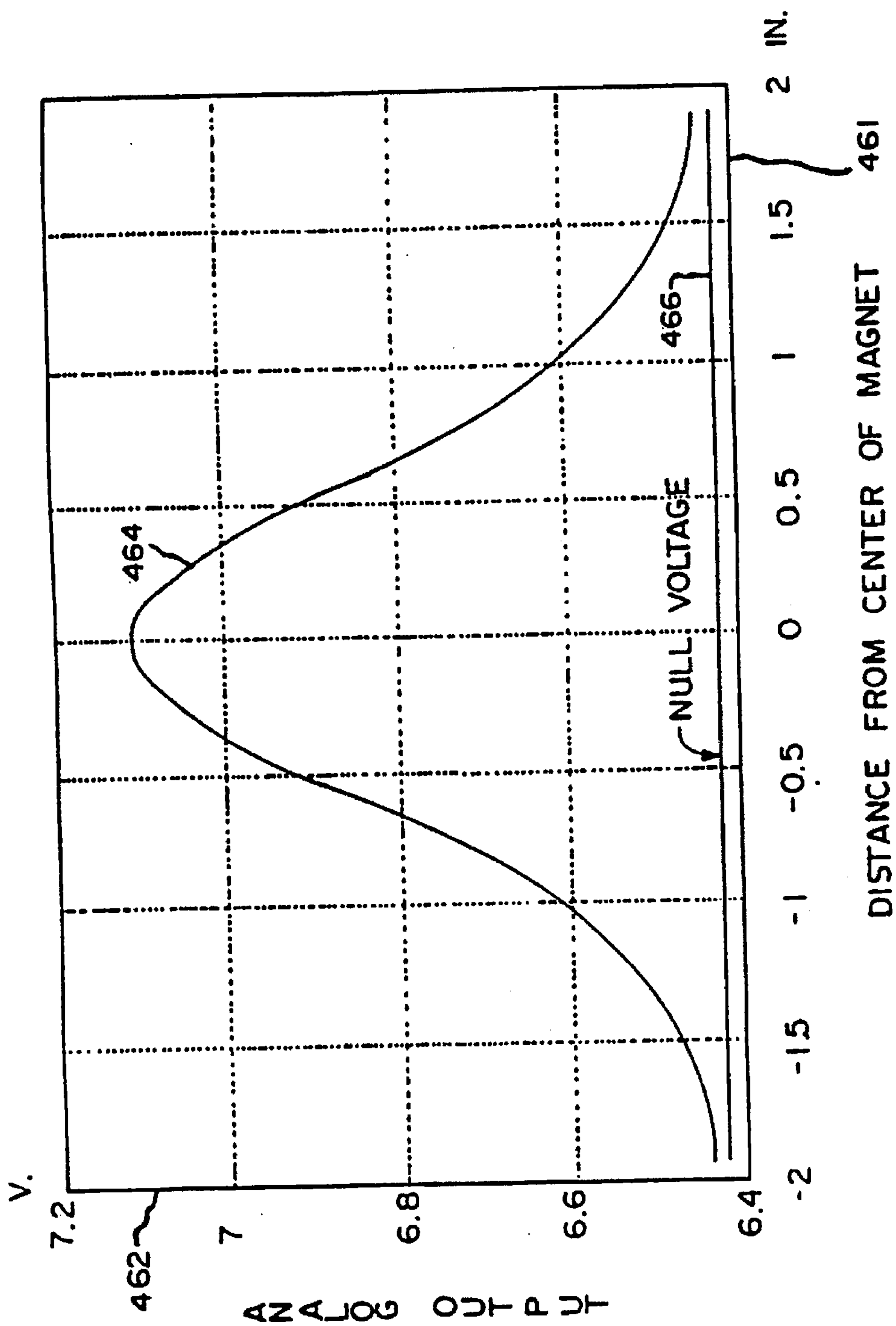
FIG. 35 is a curve of analog voltage output from one of the Hall sensors as a function of distance of the sensor from a floor magnet.

A representative graph 464 of the analog output voltage versus distance of a sensor from the center of a magnet 6 is shown in FIG. 35. Voltage output from the Hall sensor (such as sensor 445, for example) is shown on the ordinate 462, in volts. The distance 145 from the center 557 of the magnet to the sensor is shown on the abscissa 461 in inches. For the measurement shown, the graph has a depressed zero and the output voltage in the absence of any magnetic field is the null voltage 466 of about 6.44 volts.

In this measurement, when the sensor 445 is directly over the center 557 of the magnet the analog output voltage is approximately 7.1 volts. When the sensor 445 is approximately one inch away from the center 557 of the magnet 6 the analog output voltage 464 produced by the sensor is approximately 6.65 Volts. Thus, two magnets which are more than four inches apart, but sufficiently close to be simultaneously sensed, produce detectable signals which are essentially independent.

Circuits for Processing Sensor Signals

Figure 36:
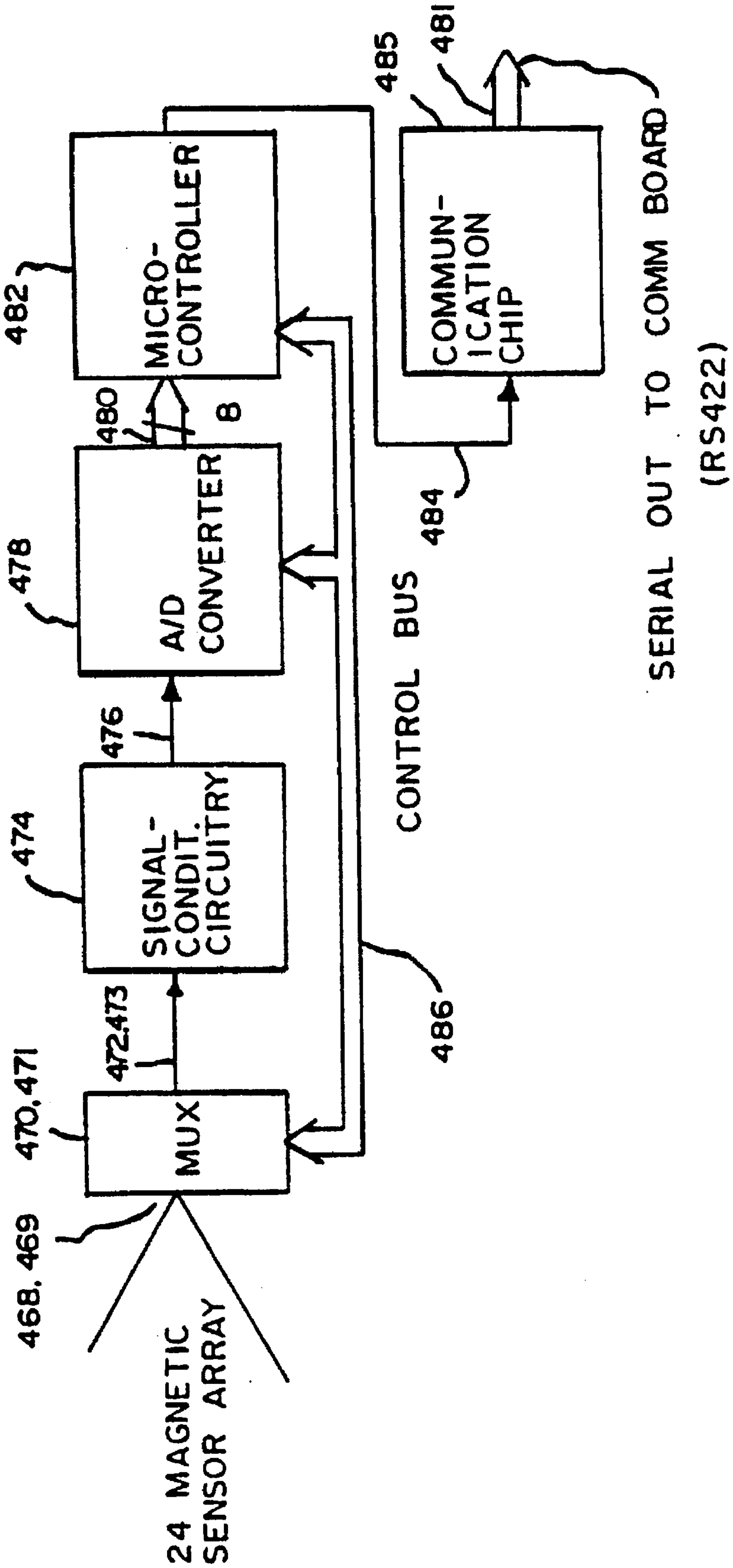
FIG. 36 is a block diagram of some electronic equipment on the vehicle for processing magnet sensor signals.

Signals from the twenty-four Hall sensor of array 24 are input at terminals 468, 469 to a pair of ganged multiplexers 470, 471, as shown in FIG. 36. The multiplexers 470, 471 receive analog signals continuously from the twenty-four sensors 437–460, and select one at a time sequentially for output at line 472. The two output signals from the multiplexers are connected to a signal-conditioning circuit 474 whose functions are explained in more detail below. Its output at line 476 is connected to an analog-to-digital converter (A/D) 478 whose output comprises eight digital lines 480 that conduct digital signals to a microcontroller 482.

Output data from the microcontroller 482 are in serial form differential output at a line 484, which conducts the data through a communication chip 485 and differential output lines 481, therefrom, to a communication board, not shown. A control bus 486 enables the microcontroller 482 to control multiplexers 470, 471 and the A/D converter 478 as described more fully below.

Circuit Details

Figure 37:
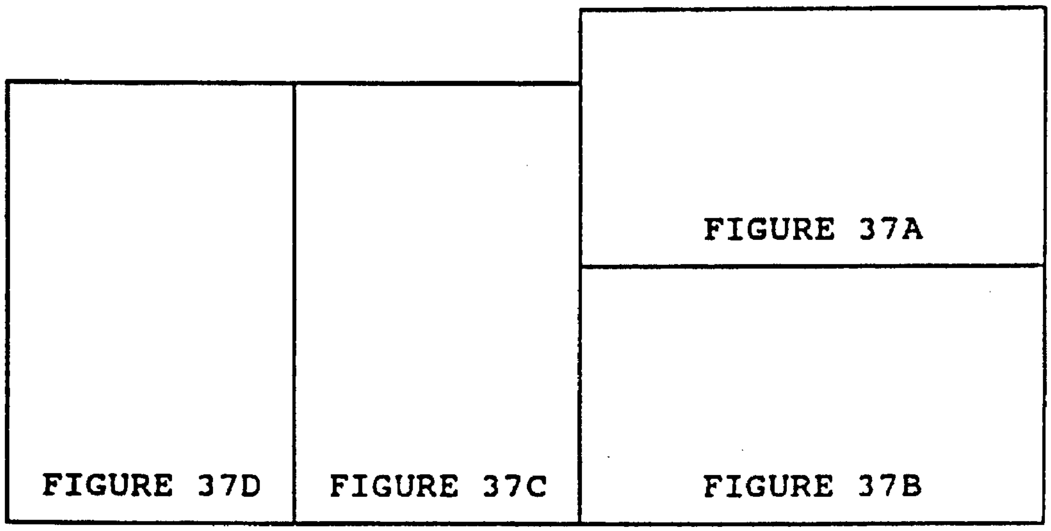
FIGS. 37, 37A, 37B, 37C, and 37D are, in combination, a schematic diagram of the same electronic equipment.

More details of the electronic circuits on the vehicle are shown in FIGS. 37 and 37A–D. In combination, FIGS. 37A–D comprise a single circuit layout, numbered in clockwise rotation and divided as seen in FIG. 37. Interconnections among FIGS, 37A–D comprise twenty-four lines between FIGS. 37A and 37B, six lines between FIGS. 37B and 37C, and four lines between 37C and 37D. The lines between 37A and 37B comprise twenty four sensor inputs 468, 469. Interconnections between 37B and 37C comprise five lines, generally designated 514, and line 416. Lines 484, 484', 514' and 631' connect components of FIGS. 37C and 37D.

The twenty-four sensor inputs 468, 469 are connected to two sequentially addressed multiplexers which may be Model AD7506 multiplexers. Outputs 472, 473 are each connected through a series resistor 491 to a summing inverting input 483 of amplifier 495. Output of amplifier 495 is conducted through a series resistor 490 to an inverting input 92 of a difference amplifier 494. A non-inverting input 96 of the difference amplifier 494 is provided with a fixed reference voltage from a regulated DC voltage source 498 and an inverting amplifier 501, which are conventional circuits.

The output 504 of the difference amplifier 494 is connected to the analog input terminal of an analog-to-digital converter 478. The circuits involving subcircuits 494, 495, 498, and 501 are represented by the signal-conditioning circuit block 474 of FIG. 36.

A/D converter 478 is a commercially available semiconductor device and may be model No. AD670 marketed by Analog Devices company of Norwood, Mass. It converts the analog signals that it receives on line 476 to 8-bit digital data at its eight output lines 480. Those lines 480 conduct the digital signal to input terminals of the microcontroller 482.

The microcontroller 482 may be of the type Intel 8051, 8751, etc. The one used in this embodiment is a Model DS5000, which is available from Dallas Semiconductor Company of Dallas, Tex., and which is the same as Intel 8751 except with more internal RAM. A crystal 510 and two capacitors 512 are connected to a terminal of microprocessor 482 to determine the clock frequency of the microprocessor. Five lines generally indicated as 514 are connected from outputs of the microcontroller 482 to inputs of multiplexers 470, 471 to enable the microcontroller to step multiplexers 470, 471, through the twenty-four sensor inputs sequentially by addressing them one at a time. Output lines 484 from the microprocessor lead to a communications chip 485 and therefrom to a communication board related to a main microcontroller. Communications chip 485 may be a Motorola-manufactured and marketed MC3487.

The following table is a list of component types and value, as used in the circuit of FIGS. 37A–D.

| Number | Name | Value or Type |
|---|---|---|
| MC1 | Capacitor | 1.0 μf |
| MC2 | Capacitor | 1.0 μf |
| MC3 | Capacitor | 1.0 μf |
| MC8 | Capacitor | 0.1 μf |
| MC9 | Capacitor | 33 pf |
| MC10 | Capacitor | 33 pf |
| MC11 | Capacitor | 0.1 μf |
| MC12 | Capacitor | 100 μf |
| MC13 | Capacitor | 0.1 μf |

-continued

| Number | Name | Value or Type |
|---|---|---|
| MC14 | Capacitor | 0.1 μf |
| MCR1 | Diode | 1N914 |
| MCR2 | Diode | HLMP6500 |
| MQ1 | Transistor | 2N2222 |
| MR1,R2 | Resistor | 100K Ohms |
| MR3 | Resistor | 150K Ohms |
| MR4 | Resistor | 100K Ohms |
| MR5 | Resistor | 1.69K Ohms |
| MR6 | Resistor | 2.21K Ohms |
| MR8,9 | Resistor | 2.2K Ohms |
| MR11,12 | Resistor | 10K Ohms |
| MR13,14 | Resistor | 2.2K Ohms |
| MR15,16,17 | Resistor | 100K Ohms |
| MR19 | Resistor | 43K Ohms |
| MR20 | Resistor | 75 Ohms |
| R7 | Resistor | 4.7K Ohms |
| R10 | Resistor | 100K Ohms |
| R18 | Resistor | 150K Ohms |
| E1-24 | Hall Sensor | 91SS12-2 |
| U1,U9 | Multiplexer | AD7506 |
| MU2 | Diff.Amp. | LF347 |
| MU3 | Comm.Chip | MC3486 |
| MU4 | Microcontr. | DS500032 |
| MU5 | A/D Converter | AD670KN |
| MU6 | Logic Circuit | 74LS132 |
| MU7 | Comm.Chip | MC3487 |
| MU8 | DC Regulator | LM317LZ |
| MY1 | Crystal | 12MHZ |

Data Processing

Figure 40:
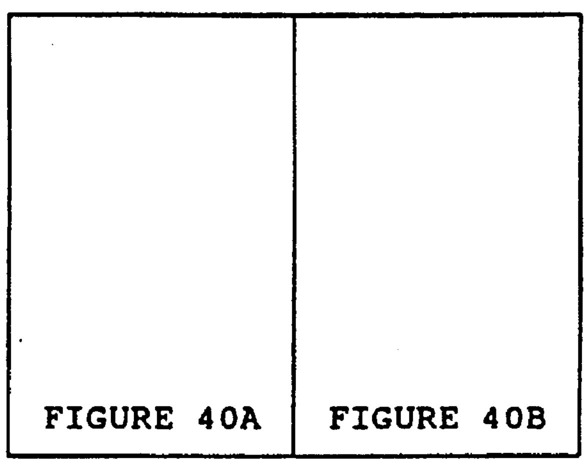
FIGS. 40, 40A, and 40B comprise a simplified flow chart of an algorithm for processing sensor data to concurrently measure the lateral position of the vehicle relative to two magnets and to detect when the row of Hall sensors crosses each magnet.
Figure 37A:
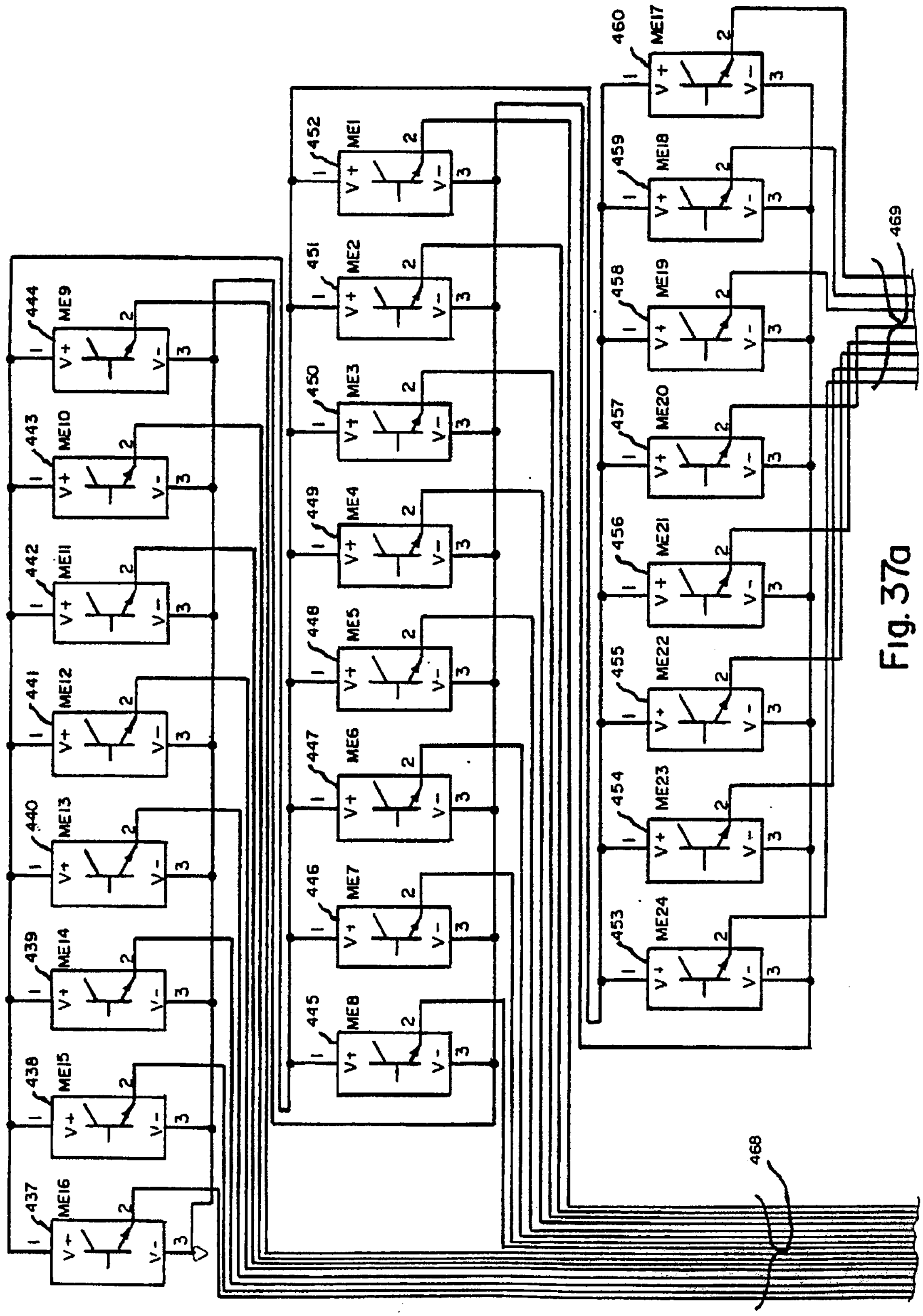
Figure 37B:
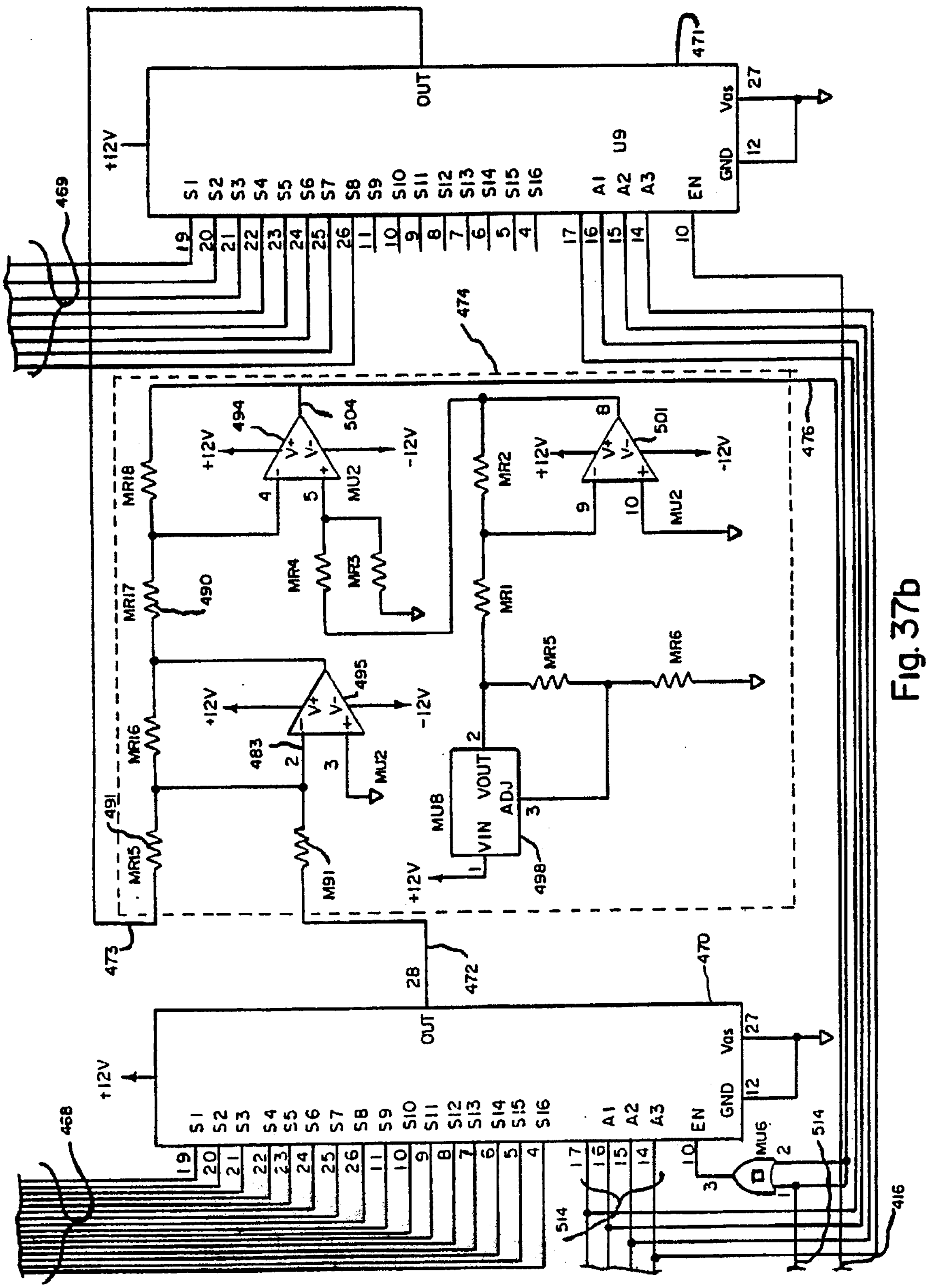
Figure 37C:
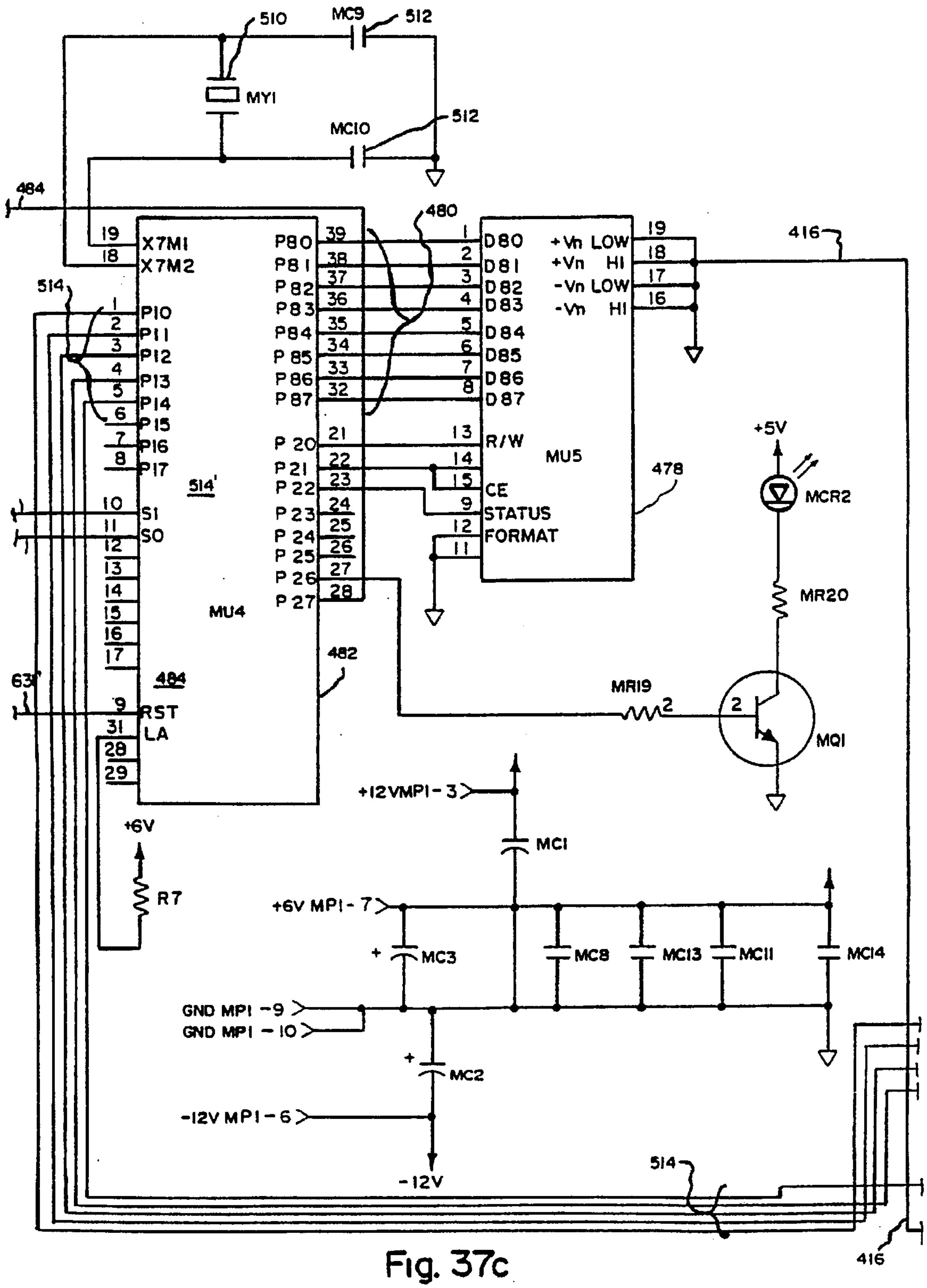
Figure 37D:
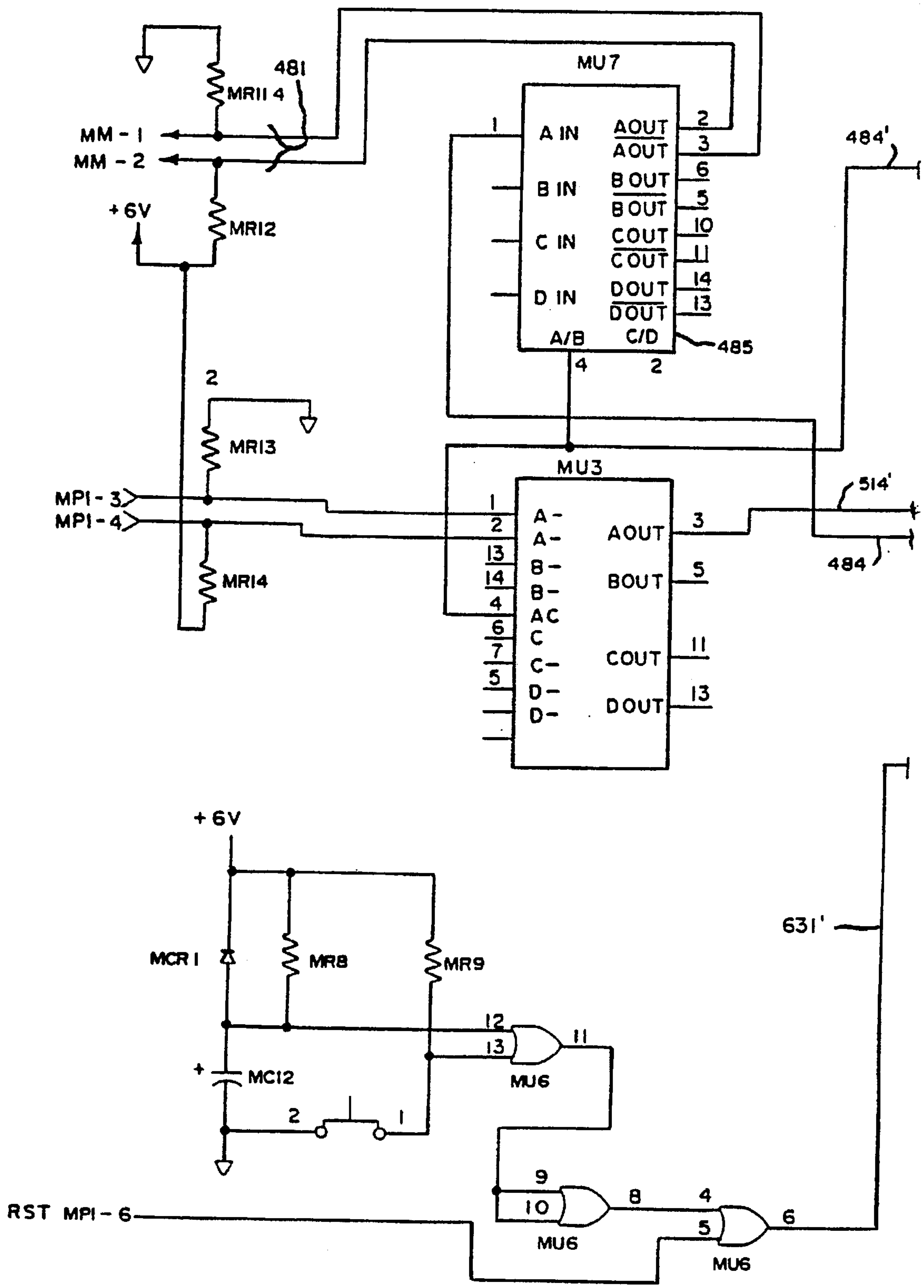
Figure 38:
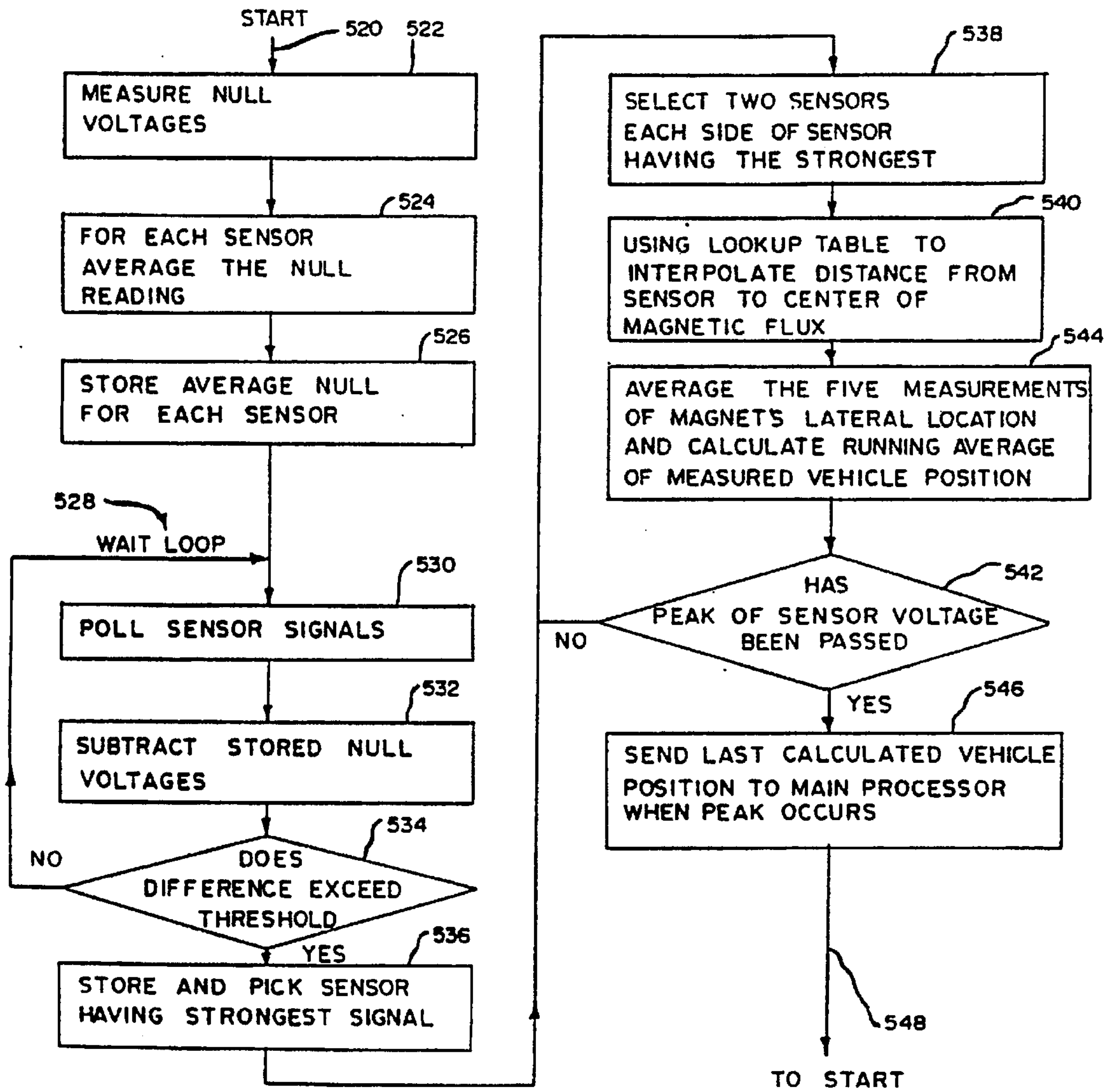
FIG. 38 is a simplified flow chart of an algorithm for processing sensor data to measure the lateral position of the vehicle relative to a magnet and to detect when a row of Hall sensors crosses the magnet.
Figure 39:
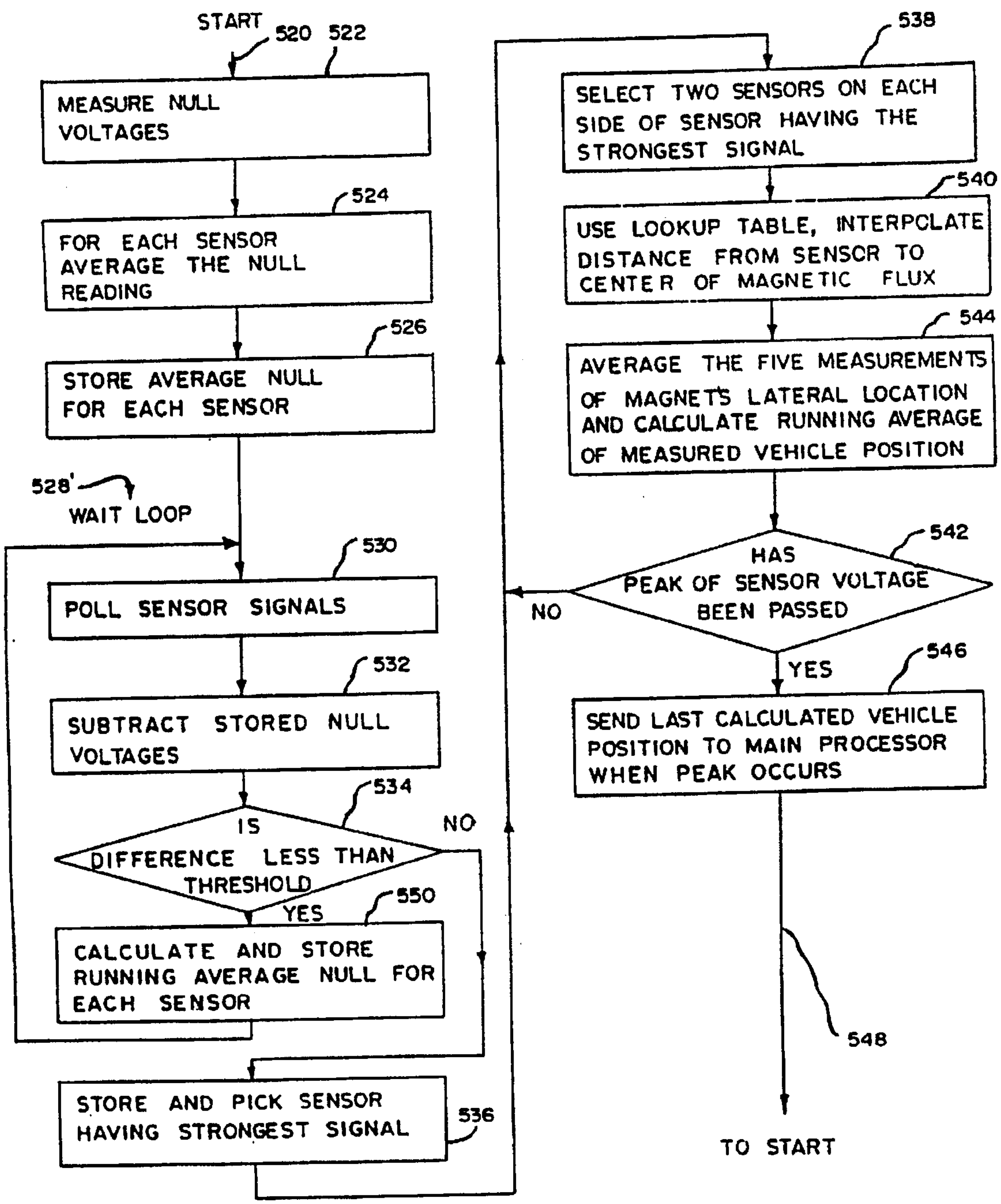
FIG. 39 is a simplified flow chart similar to FIG. 38 including sensor null measurement and related calibration during the WAIT LOOP.

A simplified algorithm is shown in the flow chart of FIG. 38 to explain how the microprocessor 482 determines the lateral and longitudinal positions of floor-mounted magnet 6 as the array of Hall sensors 24 passes generally over the magnet 6. Programming techniques for accomplishing the specified steps, seen in FIG. 38 and also in FIGS. 39 and 40, are known in the computer art.

Initializing and Updating of the Null Voltages

When the update marker system is activated the null voltage of each sensor 437–460 is measured by multiplexing the outputs of the sensors one at a time. The respective null signals of each of the sensors are measured several times, added together and divided to obtain an average value. Averaging is necessary to reduce the effects of errors in measurements of the null voltages. Each sensor has a different average null voltage; an average is computed for each sensor along.

Because the sensor outputs vary with temperature the null voltage is remeasured (updated) for all of the sensors after each time that a magnet is traversed. This reduces errors that otherwise might result from differences in temperature along a vehicle's path.

A simplified description of the program of FIG. 38 starts at a flow line 520. In block 522 the null voltages of the sensors 437–460 are measured. To do this the microprocessor 482 of FIGS. 37A–D address the first sensor by way of multiplexers 470, 471. The signal from the first sensor passes across line 472 to the difference amplifier 494 and the A/D converter 478, thence to the microprocessor 482, FIGS. 37A–D, where it is temporarily stored.

Returning to FIG. 38, in block 522 the multiplexers 470, 471 are strobed to multiplex in the null voltage of the second sensor, etc. until all sensors have been measured. The entire sequence is then repeated several times in block 522, starting again with the first sensor. In block 524 all of the null readings of the first sensor are averaged and in block 526 the average value of null readings of the first sensor is stored. This averaging and storing process is performed for all twenty-four of the sensors.

Detection of a Magnet

After the null voltages have been stored the program goes into a wait loop 528. In the wait loop the microprocessor 482 continuously polls each sensor 437–460 to determine whether or not a signal level in excess of a predetermined threshold level exists, which would indicate the presence of a magnet nearby.

Details of the wait-loop are as follows. Block 530 shows the polling of sensor signals. In Block 532 the previously stored null voltage corresponding to each sensor is subtracted from the signal output of that sensor to obtain a difference signal, representing the strength of a magnetic field. In the block 534 the difference signal is tested to ascertain whether or not it exceeds a predetermined threshold level, which is set so as to differentiate between noise and true magnetic marker signals. If the difference signal is below the threshold level the wait-loop routine is repeated.

In another preferred embodiment, the program flow of which is seen in FIG. 39, the averaging and storing process is continued through a wait loop 528'. In this embodiment, a running average of each null voltage is calculated in block 550 by the following equation;

$$N_j(t)=(K_1 * N_j(t-1)+r_j(t))/(K_1+1)$$

where:

j represents the figure number of a selected sensor (i.e. j=437 thru 460).

t is the time of the current sample.

t−1 is the time of the previous sample.

$N_j(t)$ is the average measurement of each null voltage at time t for sensor j.

$K_1$ is an integer multiplier which determines the time or sample by sample weighting of past and present measurements on the current running average voltage calculation. ($K_1$ may be on the order of 100.)

$N_j(t-1)$ is the average measurement of each null voltage at the previous sample or time t−1 for sensor j.

$r_j(t)$ is the raw voltage measurement of the voltage at time t for sensor j.

When a difference signal is found to exceed the predetermined threshold level, the null voltage calculation is terminated. All other program functions in wait-loop 528' are the same as those of wait-loop 528.

Selection of a Group of Sensors

If the difference signal is large enough, block 536 stores the difference signal. It then finds the sensor having the greatest such difference signal and the sensor having the second greatest. The program of microprocessor 482 identifies the two closest sensors on the left side of the sensor that has the greatest difference signal, and the two closest sensors on the right side of the sensor that have the greatest difference signal, in block 538. Thus a group of five sensors is defined. The program then refers in block 540 to a lookup table that is stored in its memory to determine the distance to the magnet from each sensor, based on the magnitude of the signal received from the sensor.

Two tables, as shown by example below, relate the voltage measured by each sensor (437–460) to be absolute distance to the center 557 of magnet 6. Table 1 is a lookup table comprising voltages measured at incremental distances by a sensor (437–460) from a magnet 6. Table 2 is a table providing the actual distances from the sensor to the center 557 of the magnetic field as derived from currently used sensors (437–460) and magnet field strength.

| Relative Memory Location | Table 1 (Measured Voltage) | Table 2 (Radial Distance) |
|---|---|---|
| 0 | 142 raw ADC units | 0.0 inches |
| 1 | 139 | 0.0941 |
| 2 | 133 | 0.1882 |
| 3 | 124 | 0.2823 |
| 4 | 112 | 0.3764 |
| 5 | 99 | 0.4705 |
| 6 | 85 | 0.5646 |
| 7 | 71 | 0.6587 |
| 8 | 58 | 0.7528 |
| 9 | 46 | 0.8469 |
| 10 | 37 | 0.9410 |
| 11 | 29 | 1.0351 |
| 12 | 23 | 1.1292 |
| 13 | 17 | 1.2233 |
| 14 | 13 | 1.3174 |
| 15 | 9 | 1.4115 |
| 18 | 7 | 1.5056 |
| 17 | 4 | 1.5997 |
| 18 | 3 | 1.6938 |
| 19 | 2 | 1.7879 |

The step of looking up the distance from the sensor to the magnet is performed by the microprocessor 482, and is represented by the block 540 of FIGS. 38 and 39. The five selected sensors are denoted by $S_i$ (where i=–2 to 2) and the center sensor or sensor having the greatest measured voltage is $S_0$. Before a search is made to correlate each measured voltage with the related distance to the center of magnetic flux, the stored null voltage, $N_j$, is subtracted from the currently derived raw signal from each sensor (437–460) to provide a search variable, $E_i$, devoid of the null offset error as shown in the following equation:

$$E_i=S_0-N_j$$

A sequential search through Table 1 is performed for each search variable $E_i$ each time the group of five sensors is sampled. To determine the distance from each selected sensor ($S_{-2,\,-1,\,0,\,1,\,2}$) to the center of magnetic flux, the table is searched until the difference between the value in Table 1 and the search variable changes sign. When the sign change occurs, the search variable is determined to be between the last and next-to-last Table 1 value used. An interpolation variable, I, is next calculated as follows:

$$I=(E_i-T_k)/(T_{k-1}-T_k)$$

where the previously undefined variables are:

k is the relative memory position of the last Table 1 value used.

$T_k$ represents the Table 1 value at relative memory position k.

$T_{k-1}$ represents the Table 1 value at relative memory position k–1.

also:

R represents a radial distance measurement of Table 2.

$R_k$ represents the Table 2 value at relative memory position k.

$R_{k-1}$ represents the Table 2 value at relative memory position at k–1.

The radial distance, $D_i$, from each sensor to the center of flux of magnet 6 is then calculated as:

$$D_i=I*(R_{k-1}-R_k)+R_{k-1}$$

To calculate the position of the center of flux of magnet 6 from a common fixed point, such as array end 560, on the array 24, each $D_i$ is treated as a lateral vector, the sign of which is determined by its position relative to sensors having the greatest and second greatest difference signals as herebefore related. The position of the center of flux of magnet 6 from the common fixed point 560 is then calculated by adding or subtracting each $D_i$ depending upon the sign of the vector to or from linear distance $L_i$ of each sensor from array end 560 as shown in the following equation:

$$P_i=L_i+/-D_i$$

A further correction may be made to relate the center of flux of magnet 6 to the centerline 164 of vehicle 2A by adding a constant which represents the distance from fixed point 560 on array 24 to centerline 164 of vehicle 2A. See FIG. 34.

Average Lateral Position

In block 544 an average is taken of the five estimates of the location 145 of the magnet with respect to the centerline 559 of the vehicle. One estimate is available from each of the five sensors of the group (having asterisks in FIG. 34) whose middle one is the sensor of strongest signal.

In this example, sensor 445 is $S_0$, sensor 443 is $S_{-2}$, sensor 44 is $S_{-1}$, sensor 446 is $S_1$, and sensor 447 is $S_2$.

After each of the five sensors have been sampled, an average estimate of the position, $X_t$, of the center of flux of magnet 6 is calculated as shown below:

$$X_t=(P_{-2}+P_{-1}+P_0+P_1+P_2)/5+C$$

where

C is the distance 182 from the distance from fixed point 560 on array 24 to the centerline 164 of vehicle 2A.

The accuracy of measurement is further ameliorated by a running average of the successively measured values of $K_t$. Though other equations may be used to calculate the running average, the following equation is employed in the currently preferred embodiment:

$$X(t)=(K_2*X(t-1)+X(t))/(K_2+1)$$

where

X(t) is the running average of the measurement of the center of flux of magnet 6 for the series of five sensors measured at time t and related to the centerline 164 of vehicle 2A.

X(t–1) is the previous running average of the measurement of the center of flux of magnet 6 for the series of five sensors measured at time t–1 and related to the centerline 164 of vehicle 2A.

$K_2$ is the filter or decay constant for the running average. $K_2$ is on the order of three in the currently preferred embodiment.

As one familiar with computer addressing would know, the values of measured voltages for Table 1 need not be derived from incremental distances, but only from measurements taken at known, regularly increasing or decreasing distances which are then stored in the related memory location in Table 2. New and useful Tables 1 and 2 may be generated for combinations of sensors and magnets which yield different voltage versus distance values by measuring the voltage as a function of distance for the new combination. As seen in Table 2, in the above example, the radial distances stored in incremental memory locations are even multiples of 0.0941 inches.

Time of Peak Sensor Signals

The next program function, performed in block 542, is to determine whether or not the peak of sensor voltage has been passed. The peak values of output voltage from the Hall sensors of array 24 occur when the array 24 is directly over the floor-mounted magnet 6. When the reading of the sensors start to decline the array of sensors has passed over the center of flux of magnet 6. This condition is detected by block 542 by conventional programming.

Improved Accuracy of the Measurement

The combination of precalibrating each sensor prior to measurement to take out the offsetting null voltage and averaging and calculating a running average until the peak voltage is reached provides a measurement of significantly improved accuracy. The accuracy of the lateral position measurement 145 is 0.02 inch.

Output

The process of selecting a group of sensors, looking up distances and averaging them is a form of cross-correlation of received signals with a stored field pattern. This result is transmitted, block 546, from the microprocessor 482 to a main microprocessor, not shown. It is transmitted promptly when the peak readings are detected, so the time of transmission of the data serves as an indication of the time at which the sensor array 24 crosses marker magnet 6. In this way both lateral and longitudinal position information are obtained from one passage of the array 24 over magnet 6.

Data from block 546 is transmitted to the main microprocessor board. Data flow among the microprocessors in AGV 2A are described in detail later. The program, at point 548, then returns to the starting program flow line 520 of FIGS. 38 and 39.

Another embodiment having two arrays of sensor such as array 24 is also feasible.

Figure 42:
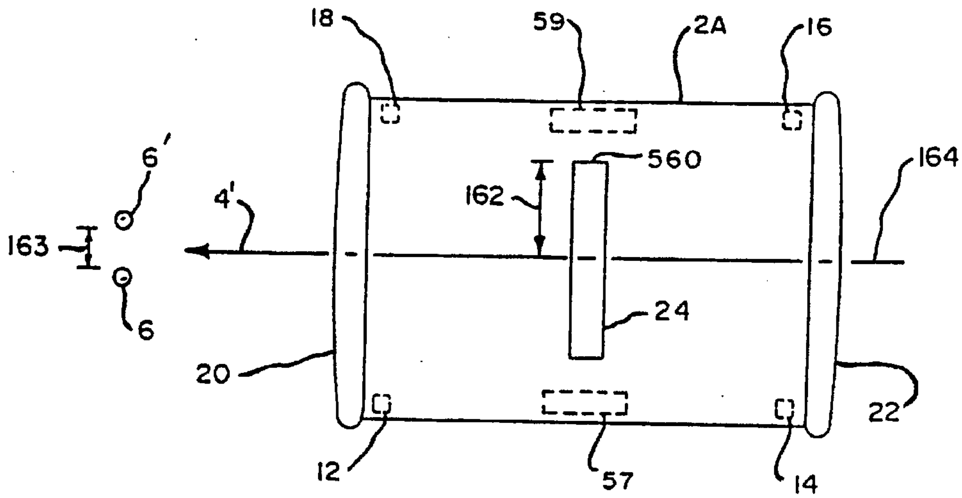
FIG. 42 is similar to FIG. 32, depicting a guided vehicle system that utilizes the update marker guidance system and showing the presence of two magnets on the path ahead of the vehicle.
Figure 41:
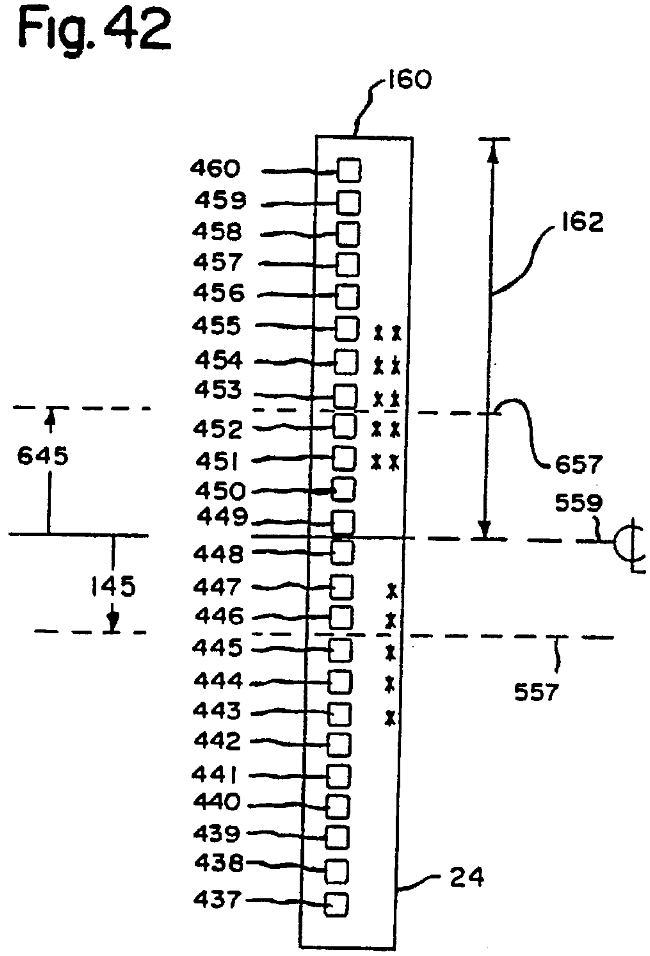
FIG. 41 is similar to FIG. 34, showing an array of Hall magnetic sensors on the vehicle, and including indicia exemplary of the presence of two magnets.

Reference is now made to FIGS. 40–42, wherein a second preferred embodiment is seen. In the second embodiment, two magnets 6, 6' are placed in sufficiently close proximity that magnetic flux from each of magnets 6, 6' is sensed by a plurality of sensors 437–460 concurrently, yet separation 163 of magnets 6, 6' is sufficient to permit independent processing of signals derived from each magnet 6 or 6'.

As seen in FIG. 41, exemplary path 557 of the center of flux 557 of one magnet 6 is the same as the path described in FIG. 34. A second path 657 is seen for second magnet 6'. The table below summarizes the results of signals derived from two concurrently measured magnetic paths 557, 657, showing the assumed greatest signal level sensed for each magnet, next highest level and sensors active for the measurement of position of each magnet (indicated by a single asterisk (*) for magnet 6 and a double asterisk () for magnet 6'**):

| Relative sensor Position | First magnet (6) Number | Second Magnet (6') Number |
|---|---|---|
| S-2 | 443 | 451 |
| S-1 | 444 | 452* |
| S0 | 445 | 453 |
| S1 | 446* | 454 |
| S2 | 447 | 455 |

*indicates the sensor adjacent to the sensor having the greatest signal magnitude and having the second greatest signal magnitude thereby providing an indication the center of magnetic flux (145, 645) lies therebetween.

Figure 40A:
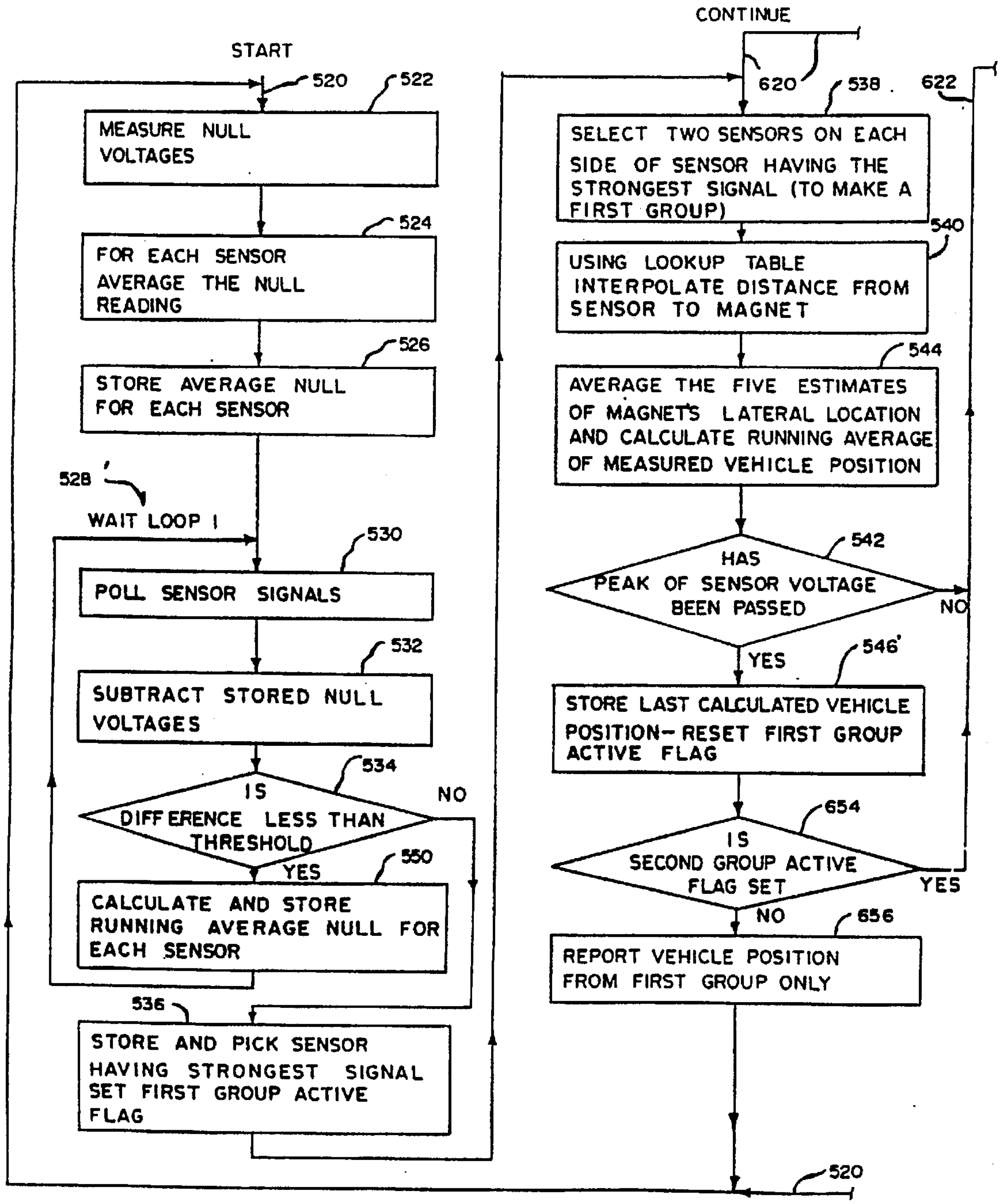
Figure 40B:
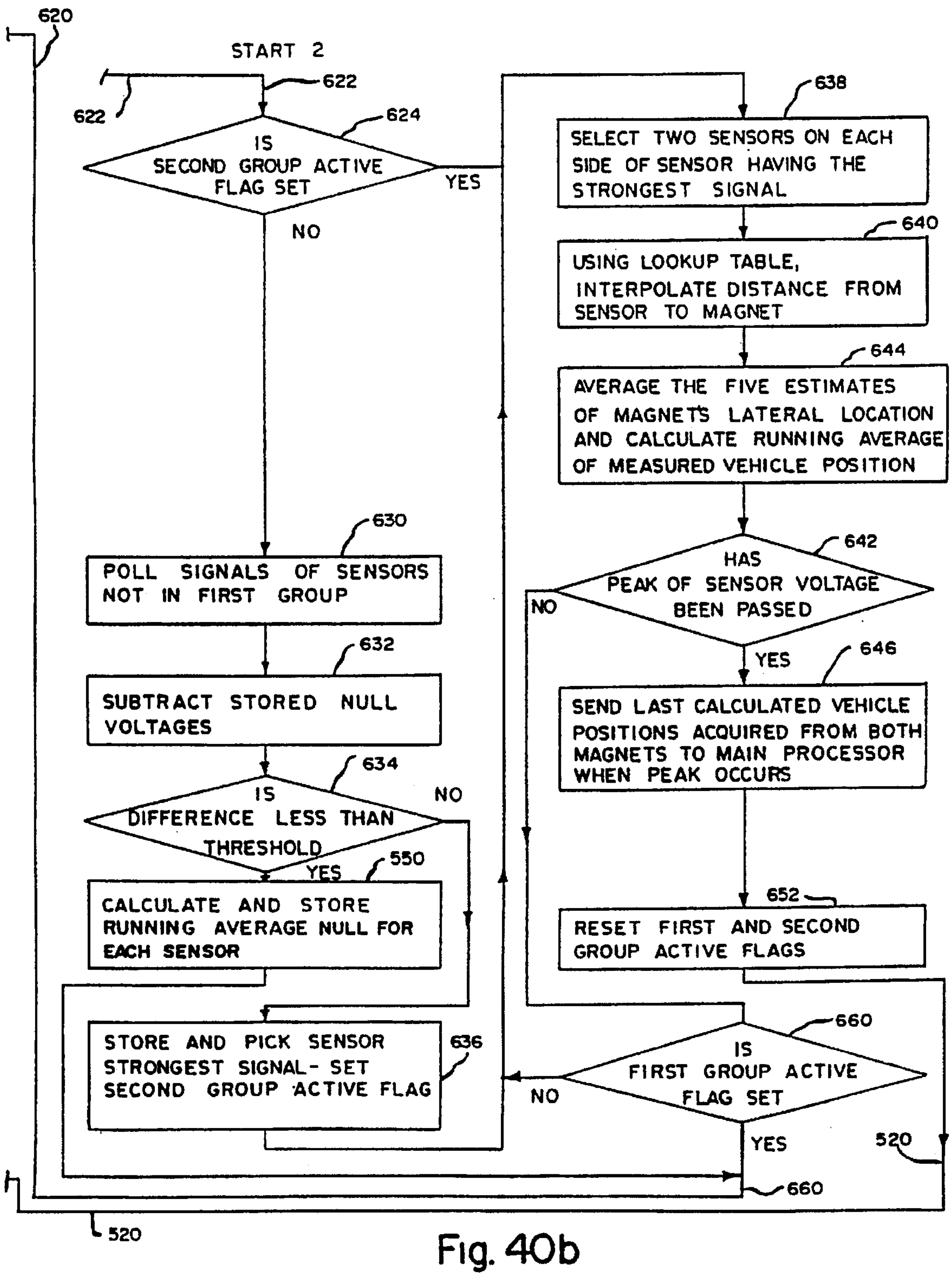

FIGS. 40 and 40A–B show a simplified flow chart of the logical and calculational steps for determining the position of the vehicle relative to each magnet 6, 6'. FIGS. 40 shows the orientation of FIG. 40A relative to FIG. 40B. Program flow line 520 connects the output of block 652 in FIG. 40B to START in FIG. 40A. Program flow line 620 connects the "yes" output of block 660 in FIG. 40B to CONTINUE in FIG. 40A. Program flow line 622 connects the "yes" output of block 654 and the "no" output of block 542 of FIG. 40A to START 2 in FIG. 40B.

As before described, the null offsets are calculated during a known null period as specified in blocks 522, 524, and 526. As earlier described, in FIG. 39, a WAIT LOOP 528' provides an updating of the null calibration for each of the sensors until an over threshold measurement indicates detection of magnetic flux of a first magnet 6 or 6'. Upon such detection as part of block 536 activity, the sensor values are stored and the sensor having the strongest signal is selected as earlier described for block 536 in FIG. 38. In addition in block 536, a first sensor group active flag is set to signal a first magnet position measurement is active.

As earlier described, the activities of blocks 538, 540, and 544 select the group of sensors used in the calculation of what is now the first sensor group, interpolate the distance from each sensor of the first group to the center of magnetic flux of the first detected magnet and average, then calculate a running average of the position of the vehicle relative to the magnet. Decision block 542 branches to a block 546' when the peak value of the first sensed signal is detected or to a second path headed by START 2 before the peak is discovered.

At START 2, input program flow line 622 leads to decision block 624 wherein a decision is made whether or not a second group active flag is set indicating a signal has previously been detected from a second magnet. If the second group flag is not set, a single pass through blocks 630, 632, and 634 is made. Blocks 630, 632, and 634 comprise programming functions which are similar to those described for blocks 530, 532, and 534, except blocks 630, 632, and 634 only process information related to sensors of array 24 not involved with the first group. If no threshold is detected in block 634, an updated null calibration is calculated for each sensor which is not part of the first group and a branch is made TO CONTINUE to merge with program flow line 620. If a signal above threshold is detected, a branch is made to block 636 wherein the appropriate signal values are stored and processed as in block 536 for a second group of sensors and the second group active flag is set.

The program proceeds directly from block 536 to block 638. If the second group active flag is set upon entry at program flow line 622, a branch is made directly to block 638 therefrom.

Sequentially, blocks 638, 640, and 644 perform the same functions upon data received from sensors of the second group as blocks 538, 540, and 544 perform upon data received from sensors of the first group. Decision block 642 determines whether or not a signal peak, as before described, has been reached. If not, the process continues to decision block 660. If so, measured position values, as derived from both magnets 6 and 6', are transmitted to the main processor for use in navigation and guidance updating, the first and second group active flags are reset as shown in blocks 646 and 652. From block 652, the logic path proceeds to START at program flow line 520 to repeat the function preliminary to the search for one or more additional magnets along the vehicle's path.

From decision block 660, a branch is made to block 638 if the first group active flag is reset indicating a peak has been detected for the first measured magnetic field. If the first group active flag is set, the program proceeds to program flow line 620 whereat block 538 is entered to subsequently process the output of the first group of sensors dedicated to making a measurement of the position of the first detected magnetic field.

If within block 542 a peak voltage is detected, the programs proceeds to block 546' wherein the measured position determined by first group measurements are stored for later recovery and transmission to the main processor and the first group active flag is reset. From block 18', decision block 654 is entered, wherein a branch is made to proceed TO START 2 through program flow line 622 if the second group active flag is set or to proceed to block 656 if the second group active flag is reset. At block 656, only the first group measured position is reported based upon only one magnetic field having been detected and no concurrent measurement having been made.

Guidewire Guidance Systems

Figure 4A:
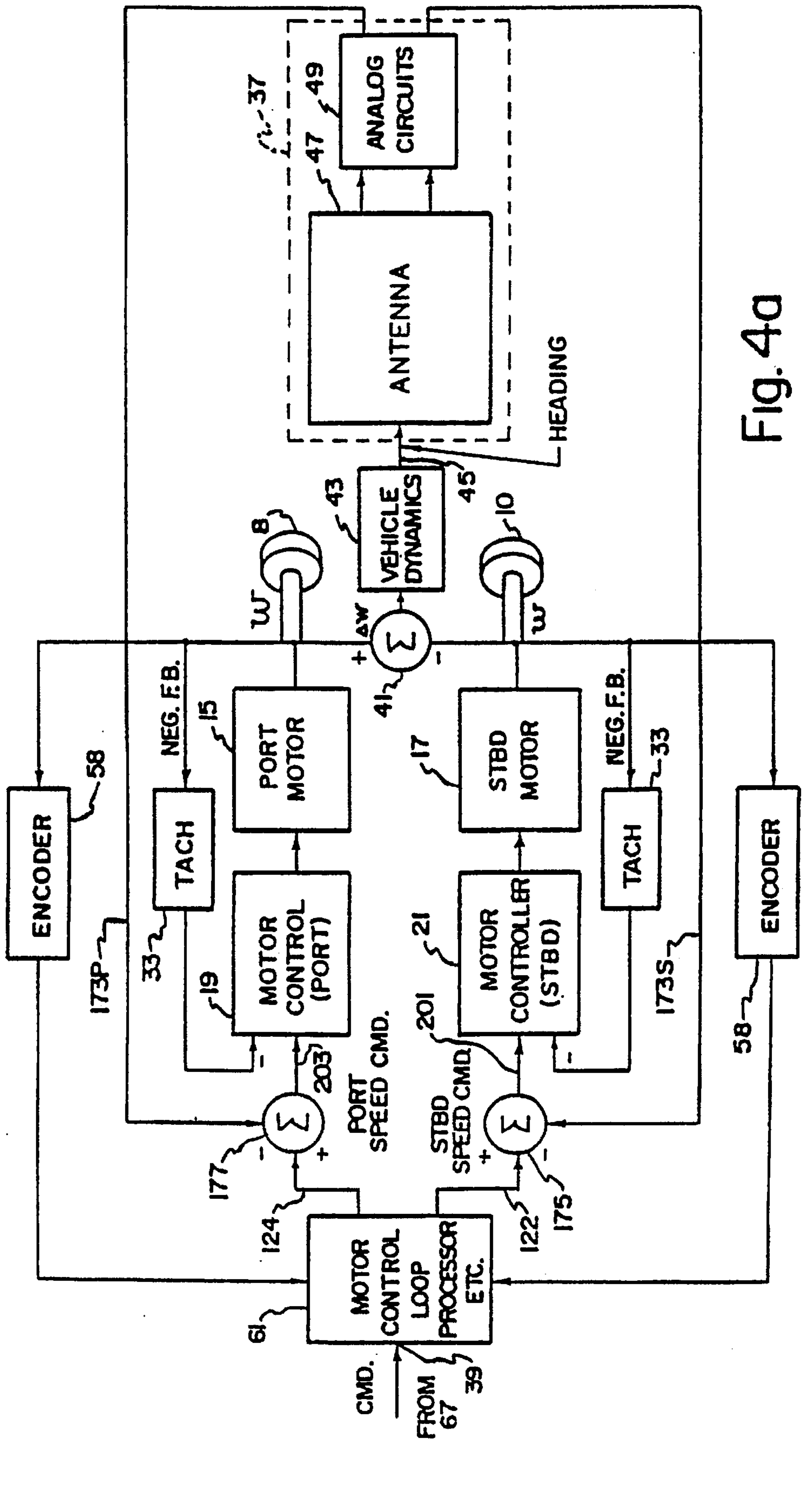
FIG. 4A simplified electronic block diagram of a guidance system for a vehicle which operates in both a general purpose and a terminal-positioning mode.

The various types of guidance systems are used at different times for controlling the AGV 2A, each type being used under control and direction of AGVC 13 and AGV 2A motion control processor 61. FIG. 4A shows a motion control processor 61 of a preferred control system for a vehicle. The port drive wheel 8 is driven by a port motor 15. The port motor 15 is controlled by a port motor controller 19, which receives control signals from a summing junction 177.

Inputs to the summing junction 177 and port motor controller 19 include:

1. control signals at an input 124 that come from the inner guidance loop motion control data processor 61;
2. an input from a tachometer 33 that measures the speed of the port motor 15; and
3. an input 173P from a terminal-positioning-mode module 37 of vehicle navigation and guidance system, which will be described in detail below.

In a similar arrangement, a starboard wheel 10 is driven by a starboard motor 17, a starboard motor 17 is controlled by a motor controller 21 that is driven by the output of a summing junction 175, which receives speed commands from the motion control processor 61. The summing junction 175 also receives signals from the terminal-positioning-mode module 37.

The motion control processor 61 receives commands at an input 39 from a self-contained navigation and guidance system. The vehicle is driven in forward and reverse directions, relative to the front of the vehicle, and is steered in accordance with the speeds of the wheels 8, 10. The actions of the drive wheels 8, 10 affect the vehicle in a manner that is represented symbolically by a summing junction 41 and by a block 43 labeled "vehicle dynamics" on FIG. 4A.

The spacing between the wheels and other factors are represented by the block 43. Outputs of the block 43 are represented symbolically at a point 45. The outputs are the speed and heading of the vehicle as well as, when integrated, the position of the vehicle. The position of the vehicle controls the error signals as the vehicle moves about, for example, when it enters a terminal 9, 11. As shown in block 37 of FIG. 4A the terminal-positioning-mode of the vehicle navigation and guidance system includes the antenna assembly 47 and an analog circuit block 49, both of which will be described in detail.

Commands for control of the vehicle are at terminal 39 on the left side of FIG. 4A. Commands and feedback signals such as 173P and 173A are conducted through the summing junctions 177, 175 to the port motor controller 19 and the starboard motor controller 21 respectively. They drive the port motor 15 and the starboard motor 17 respectively, which drive the port and starboard wheels 8, 10 respectively.

When the vehicle 2A enters a terminal having a passive loop floor mat 51, it comes principally under the control of the terminal-positioning mode of the vehicle navigation and guidance system, etc. This system produces signals at lines 118, 120 that are input to the motion control processor 61 as seen in FIG. 4C.

When a vehicle with an incorrect lateral position (e.g., with an offset from the centerline of the terminal), enters a terminal an error signal is generated by the terminal-positioning mode of the vehicle navigation and guidance system. The signals at lines 118, 120, in combination, produce an error signal which has such polarity (see also FIG. 12B) as to operate the motors 15, 17 to steer the vehicle in a direction to correct the error of position. Antenna output signal conditioning circuits similar to those seen in FIG. 12B for front-end antenna signal conditioning, not shown, are located at the rear-end of the vehicle but are of opposite hand.

Figure 4B:
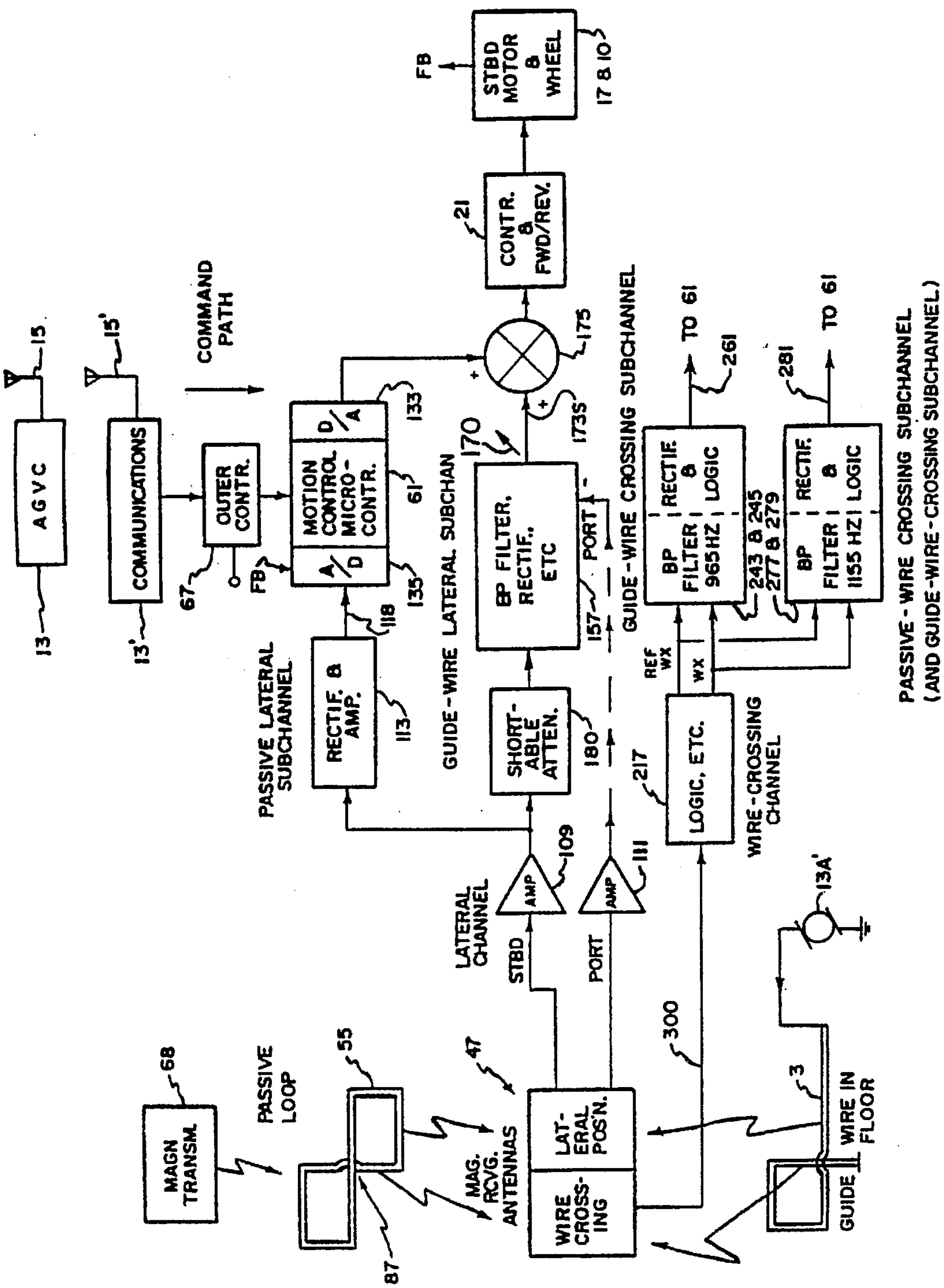
FIG. 4B simplified block diagram providing an overview of interconnections of major subsystems which operate in a terminal-positioning mode.
Figure 4C:
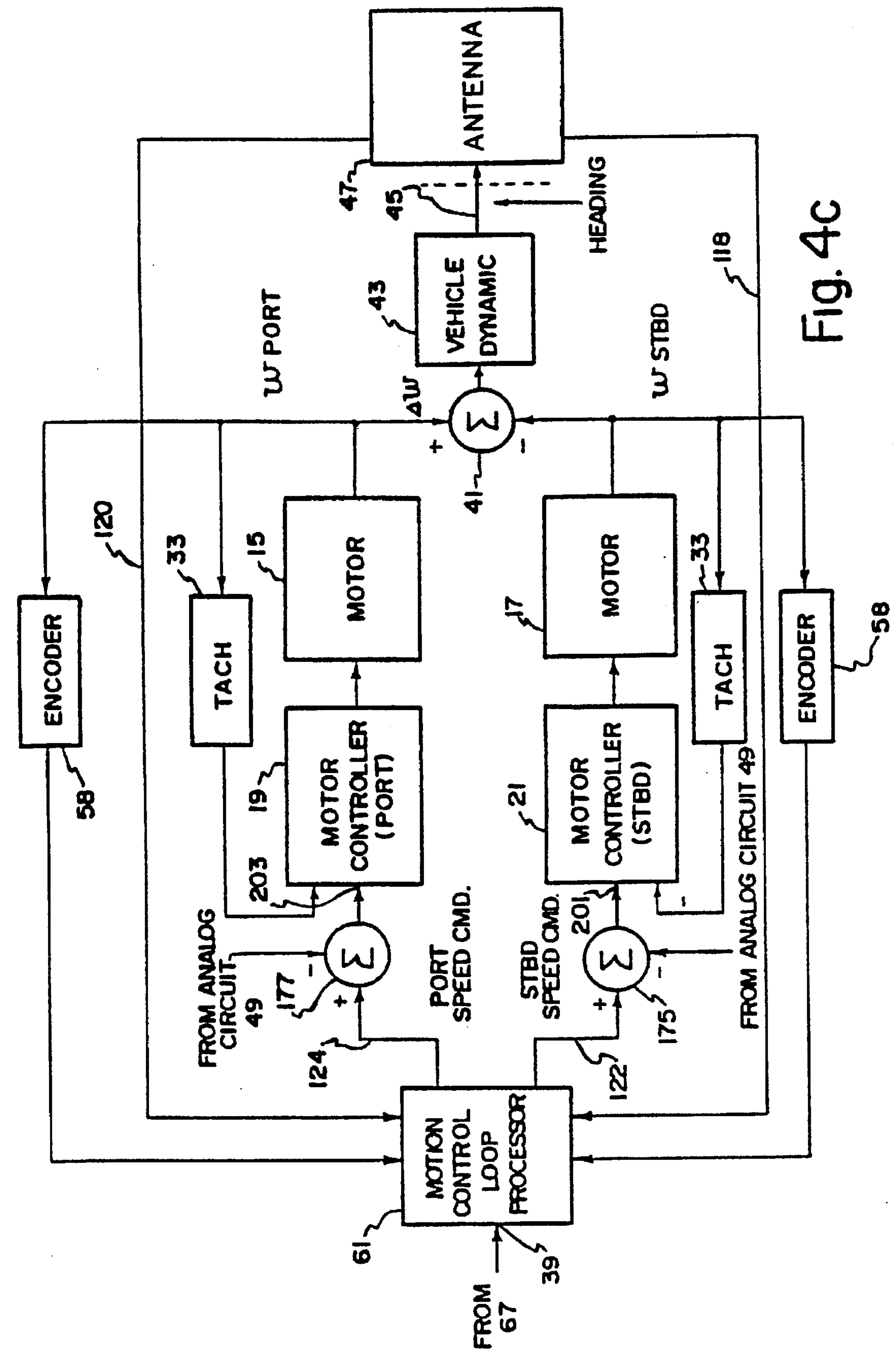
FIG. 4C simplified electronic block diagram similar to FIG. 4A, but showing only elements that are used when the apparatus is in the terminal positioning mode of operation and omitting other elements.

When the vehicle has proceeded longitudinally to where a wire-cross exists, another signal, on line 300 of FIG. 4B, notifies the outer loop processor 67, which takes appropriate action of altering speed commands. The antenna assembly 47 of FIG. 4B includes antennas that are receptive to the transverse wire-crossing portion 87 of the loop 55, as will be described in more detail below in sections relating to wire-crossing positioning of the vehicle. The longitudinal position of the vehicle is controlled by the motor controllers 19 and 21, which operate the motors 15, 17 so as to move the vehicle forward and back as necessary to position it over the wire-crossing portion 87 of the passive loop 55, etc.

Overview of Interconnections of Major Guidewire Subsystems

FIG. 4B is a simplified diagram showing the relationships between major subsystems of the terminal-positioning mode of the vehicle navigation and guidance system.

Commands from the AGVC 13, which stores map-like route and vehicle-location information, by wireless transmission to communications block 13' go to an outer loop microcontroller 67 whose outputs go to a motion control microcontroller 61. They then pass through a D/A converter 133 to a summing junction 175. The output of summing junction 175 goes to a controller 21 and forward/reverse block, which drives the starboard motor 17 and wheel 10. Only the starboard circuits are being described.

As the vehicle moves about to carry out the commands that it receives, feedback signals responsive to its position are generated. They are processed and entered into the control system through several channels. As shown on FIG.

4B, these channels include a Passive Lateral Subchannel at terminal 118, a Guidewire Lateral Subchannel at terminal 173S, a Guidewire-Crossing Subchannel 261 and a Passive-Wire-Crossing Subchannel 281. The channels are described briefly here to show their relationships, and in much greater detail in subsequent sections.

A magnetic transmitter 68 couples magnetic energy to a passive loop 55 on the floor in a terminal. Induced current in the passive loop 55 produces magnetic fields that are sensed by a receiving antenna system 47. The receiving antenna system 47 comprises separate magnetic receiving antennas for lateral positioning of the vehicle and for wire-crossing positioning of the vehicle.

Instead of being energized by the magnetic transmitter 68, the magnetic receiving antennas 47 can, alternatively, be energized by magnetic fields produced by a wire 3 in the floor, as shown on FIG. 4B. The wire 3 in the floor is energized by the AGVC 13, which is represented on FIG. 4B for drafting convenience by an AC generator 13A'.

Out put from the lateral-positioning system's antennas are connected to a right Lateral Channel, which will be described in more detail, and to a left Lateral Channel which will not be described because it is the same as the right Lateral Channel.

From preamplifier 109, the right Lateral Channel 109 divides into a Passive Lateral Subchannel, including rectifier 113 and an amplifier. The Passive Lateral Subchannel connects through an A/D converter 135 to the motion control processor 61, where it joins the command signals. Signals then pass through the D/A converter 133 and are input to the summing junction 175.

FIG. 4C is a simplified version of FIG. 4A. It is a functional block diagram showing elements that are in use when the equipment is in the terminal-positioning mode of operation. The Passive Lateral Subchannel components, which are used in the Terminal-positioning mode of operation are shown. The analog circuits 49 are not shown in FIG. 4C because they are effectively by-passed when the terminal-positioning mode is operating.

The right Lateral Channel also goes to a Guidewire Lateral Subchannel, which starts at a shortable attenuator 180. FIG. 4B. (Most of a corresponding left portion of the channel, starting at 111, is omitted from FIG. 4B.) The right Lateral Channel 109 then goes to a bandpass filter 157 and other signal-processing elements. It is switchable by a switch 170 (controlled by outer controller 67) before terminal 173S to allow input to the summing junction 175 when guiding over a guidewire 3 in the floor, and to prevent interference from signal at 173S when guiding over a passive wire 55 in the floor.

The wire-crossing receiving antennas are connected to a Wire-Crossing Channel at logic circuits 217, etc. These circuits produce a wire-crossing signal WX and a wire-crossing reference signal REFWX, both of which are connected to two subchannels.

The first of the two wire-crossing subchannels is a Passive-Wire-Crossing Subchannel that starts with 1155-Hz bandpass filters 277 and 279. Its signal proceeds through rectifier and logic circuits to an output terminal 281. Terminal 281 is connected to the outer loop microcontroller 67, completing a positioning-feedback loop.

The other subchannel to which the Wire-Crossing-Channel is connected is the Guidewire Crossing Subchannel of FIG. 4B. It starts with 965-Hz bandpass filters 243 and 245. The signals proceed through rectifiers and logic circuitry to terminal 261. From there the feedback signals are connected to the outer loop microcontroller 67, where they join the command signals from the AGVC 13, to complete a positioning-feedback loop.

When a vehicle is in a terminal that has a passive loop 55 on the floor, lateral positioning is accomplished by means of the Lateral Channel and the Passive Lateral Subchannel. Longitudinal positioning is accomplished through the Wire-Crossing Channel and the Passive-Wire-Crossing Subchannel.

When a vehicle is in a terminal having an active guidewire in the floor, lateral positioning of the vehicle is accomplished through the Lateral Channel and the Guidewire Lateral Subchannel. Longitudinal positioning is accomplished by means of the Wire-Crossing Channel and the Guidewire-Crossing Subchannel.

When a vehicle is not in a terminal and is on a route, such as route 5, that has only update magnets, guidance is accomplished by self-contained navigation and guidance.

When a vehicle is not in a terminal and is on a route, such as route 3, in which there are actively energized guidewires in the floor, lateral positioning is accomplished by means of the Lateral Channel and the Guidewire Lateral Subchannel. Longitudinal positioning can be accomplished between terminals where there is a wire crossing by means of the Wire-Crossing Channel and the Guidewire-Crossing Subchannel.

Magnetic Fields Transmitter

Figure 5:
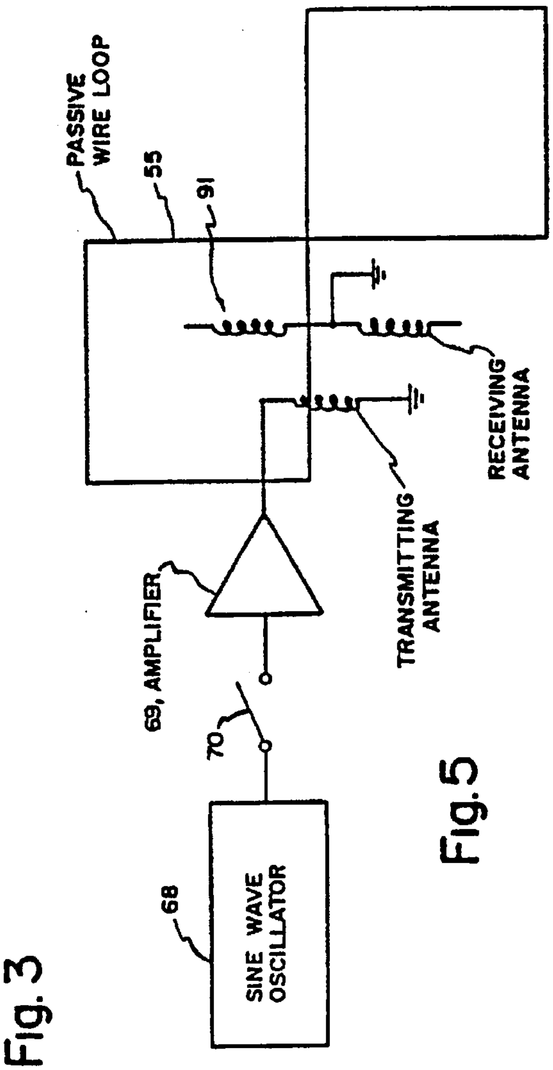
FIG. 5 simplified block diagram of certain components of a vehicle navigation and guidance system on a vehicle for transmitting a magnetic field when operating in the terminal-positioning mode.

The subsystem 37 of FIG. 4A includes a magnetic field transmitter that is shown in simplified form in FIG. 5. A sinusoidal waveform oscillator 68' on the vehicle is connected through a switch 70 and an amplifier 69 to a transmitting antenna 71 to provide a magnetic field signal of frequency 1,155 Hz. The transmitting antenna 71 is part of the antenna assembly 47 shown on FIGS. 3 and 4A.

Figure 6:
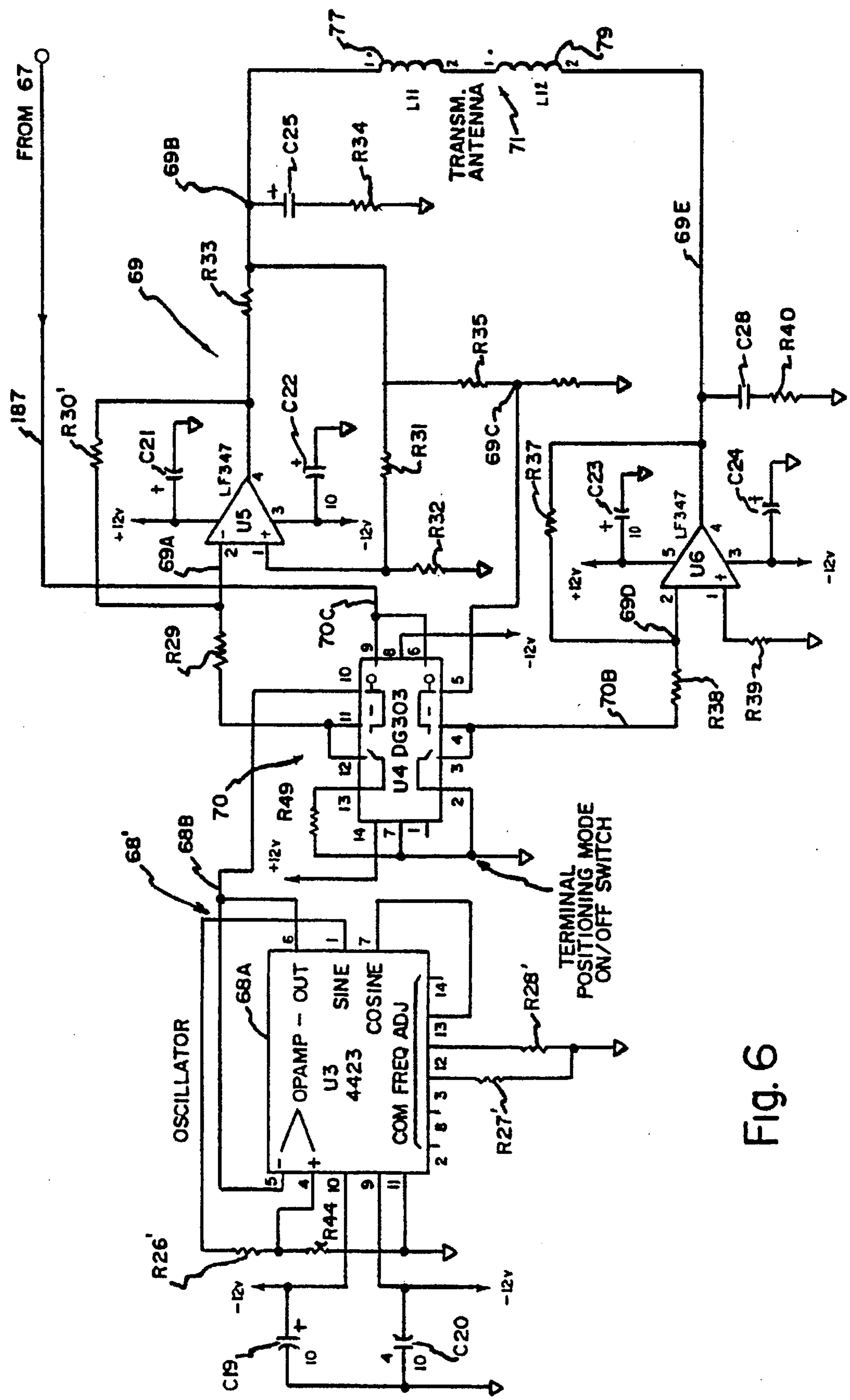
FIG. 6 circuit diagram of an oscillator, switch, driver, and transmitting antenna of FIG. 5, which are transmitter portions of the preferred vehicle navigation system when operating in the terminal-positioning mode.

The transmitter is shown in more detail in FIG. 6. The main component of its oscillator 68' is a conventional commercially available chip 68A. Its output at terminal 68B is connected to the analog on-off switch 70. When the switch is in a conductive condition the oscillator's signal is connected to input 69A of one side of a push-pull current driver amplifier 69.

The output at 69B of one amplifier 69 is connected through a resistor to a point 69C, which is connected to another pole of the analog switch 70. The output of that pole at 70B is connected to an inverting input 69D of another side of the push-pull driver amplifier 69. The output of that other side is at a terminal 69E.

The output terminals 69B, 69E of the push-pull drivers 69 are connected to two series-connected coils 77, 79 of the transmitting antenna 71, as shown in FIG. 6.

The analog on-off switch 70 is operated by a signal at a terminal 70C, which comes from the outer loop microprocessor 67. The transmitter system comprising elements 68, 69, 70 and 71 is turned off by operation of the switch 70 when the vehicle is being operated in a mode in which it follows an actively energized guidewire. The outer loop processor receives information from the AGVC 13, which keeps track of whether or not the vehicle is approaching or in a terminal.

Figure 7:
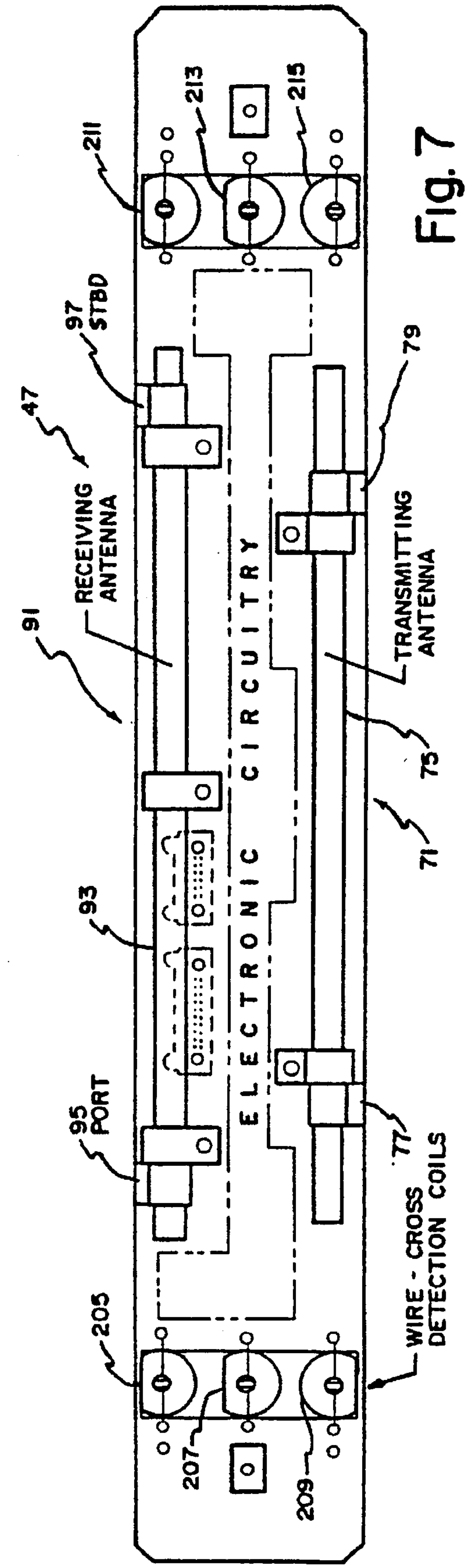
FIG. 7 a circuit board layout showing antennas for lateral and wire-cross positioning operations.

As shown in FIG. 7, the transmitting antenna 71 includes a ferrite rod 75 that serves as a core for the antenna. The relative magnetic permeability of the ferrite rod is about 2000. Mounted on the core 75 near its ends are a left-side coil of wire 77 and a right-side coil 79. The push-pull drivers 69 are connected to the coils 77, 79 with such polarity that the coils produce reinforcing magnetomotive force (of the same phase) in the ferrite rod 75.

The lateral position of the transmitting antenna 71 relative to the center 81 of the floor loop assembly 55 has very little effect on the amount of current induced in the passive loop 55 within a wide lateral range between the transmitting coils 77, 79 because the amount of magnetic flux linking the loop 55 does not change appreciably within that range. The electric current induced in the loop 55 is, however, inversely dependent upon the vertical and longitudinal distance between the transmitting antenna 71 and the central wire portion 81 of the loop 55.

The operation of the transmitter is as follows: The oscillator 68' produces a signal which can be connected through the analog on-off switch 70 to the push-pull drivers 69. The output signal from the push-pull drivers 69 energizes the transmitting antenna 71.

The transmitting antenna produces a magnetic field that extends downward to encircle the wire element 81 of the loop 55 (or any wire that is within the range of the transmitting antenna, e.g., a guidewire in the floor). In the case of a loop such as loop 55, the AC magnetic field produced by the antenna 71 induces a current in the wire segment 81, and that current produces a magnetic field surrounding the wire segments 81, 87, etc. of the loop 55.

Receiving Antennas and Coupling with Wires on Floor

FIG. 7 also shows a receiving antenna assembly 91. It detects magnetic fields produced by currents in wires on the floor. In this preferred embodiment, a single ferrite rod core 93 is used, with one receiving coil 95 mounted near the left end of the rod and another receiving coil 97 mounted near the right end of the rod 93. Alternatively, two shorter ferrite rods can be employed with a fixed lateral space between them, each encircled by only one of the two receiving coils 95, 97.

In this embodiment the receiving antenna assembly 91 is mounted parallel to and close to the transmitting antenna 71. The signal that the receiving antenna assembly 91 receives has two components: (a) a signal from either the passive loop of wire 55 or a guidewire in the floor and (b) a direct signal from the transmitting antenna 71 if it is on. Because the position of the transmitting antenna 71 is fixed in relation to the receiving antenna 91 the undesired direct signal component is relatively constant, so it can be deducted.

Referring now to the component of signal received from the wires in the floor such as the wire 81 of the loop 55, the current in each coil 95, 97 of the receiving antenna assembly 91 depends upon the nearness of the receiving antenna 91 as a whole to the plastic floor mat 61 and upon the lateral displacement of the receiving antenna 91 from the center wire segment 81 of the passive loop 55.

Figure 8:
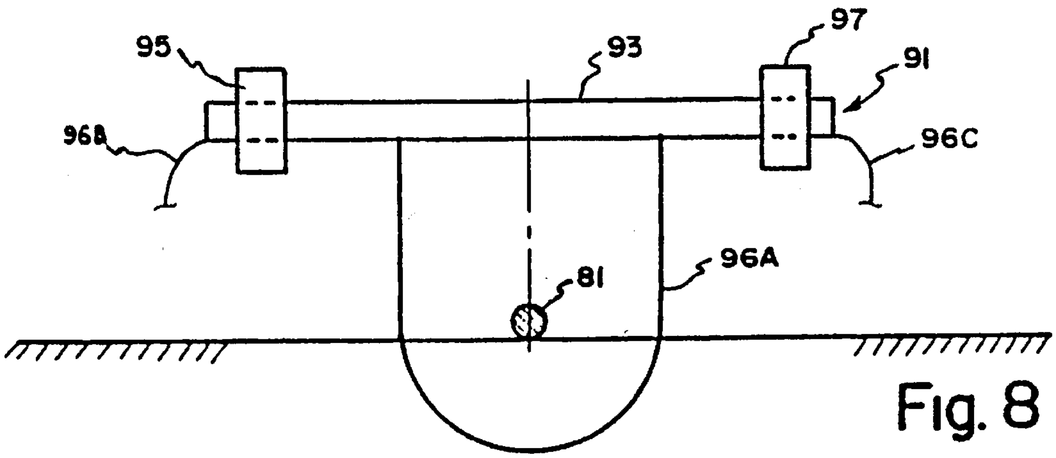
FIG. 8 vertical sectional view of a conductor on the floor and a receiving antenna assembly on a vehicle that is centered above it.
Figure 9:
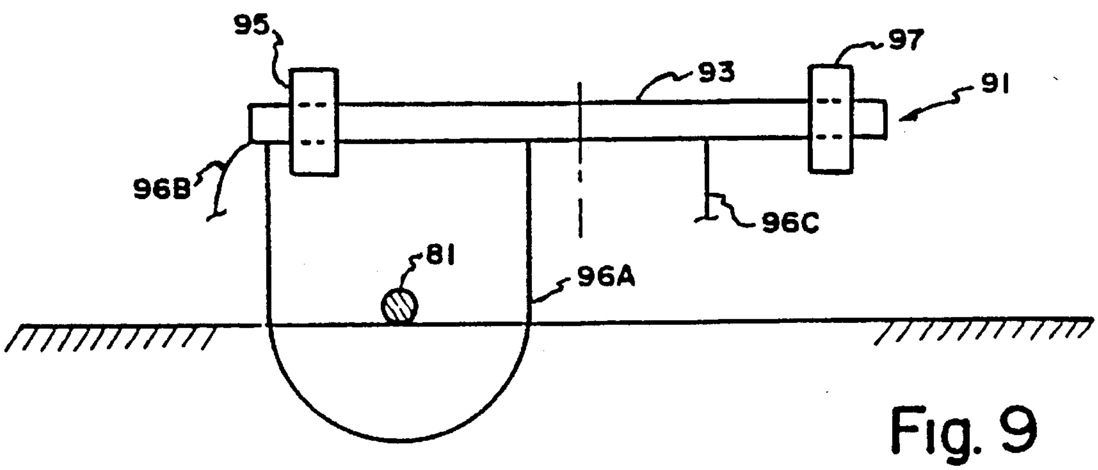
FIG. 9 another vertical sectional view of a conductor on the floor and a receiving antenna assembly that is offset laterally above it.

The relationship between received signals and lateral displacement is relatively linear for the central 90% of the lateral distance between the two receiving coils 95, 97, FIG. 7. The ferrite rod 97 helps to provide this linearity. FIGS. 8 and 9 illustrate the manner in which magnetic flux produced by electric current in the wire 81 (FIG. 3) enters the ferrite receiving rod 93 and links the coils 95, 97. In order to facilitate the explanation, FIGS. 8 and 9 are not drawn to scale.

In FIG. 8 the receiving antenna 91 is centered laterally over the current-carrying conductor 81, while in FIG. 9 the antenna 91 is offset laterally from the conductor 81. The direction of lines of magnetic flux is shown by a stylized line sketch 96A in FIG. 8. Other lines of flux 96B, 96C of course enter the ferrite rod at its left- and right-hand ends, and hence encircle the turns of the coils 95, 97. The current-carrying conductor 81 can represent several turns of wire in some embodiments.

In FIG. 9 the flux line 96A encircles the coil 95, because of the offset position of the antenna 91. The flux line 96B still enters the left end of the rod 93 and encircles the coil 95. When the vehicle is offset, the partially shown flux line 96C no longer encircles the right coil 97. This arrangement, in which a single ferrite rod is used for both receiving coils, has been found to improve the linearity of the induced signal in the receiving system as a function of the offset of the vehicle from the current-carrying conductor 81.

Figure 10A:
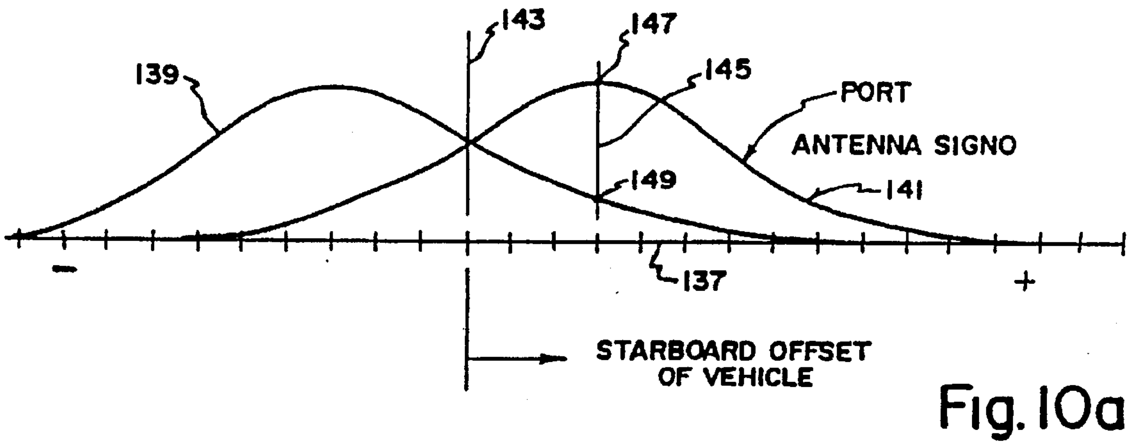
FIG. 10A graph of amplitudes of signals received at magnetic receiving antennas on the vehicle as a function of the vehicle's lateral location relative to a current carrying wire (such as a part of a conductive loop) on the floor.

A graph of the amplitudes of signals induced in the receiving antenna coils 95, 97 is shown in FIG. 10A. The abscissa 137 represents the lateral offset of the vehicle from the longitudinal centerline of the terminal 11. The ordinate 143 of the graph of FIG. 10A represents signal strength at the coils 95, 97.

In particular the starboard receiving antenna coil 97 produces a signal shown by a curve 139, and the left antenna receiving coil produces a signal shown by a curve 141. When the vehicle is exactly in the position defined by the programmed lateral offset and represented by the vertical line 143 of FIG. 10A, the signals 139 and 141 cause the wheels 8, 10 to rotate at equal speeds.

For example, when the lateral offset is zero and when the vehicle comprises an offset such as at the vertical line 145, the left antenna 95 receives a much stronger signal, as indicated by a point 147 on the curve 141, than does the right antenna coil 97, as indicated by the weaker signal at a point 149 of the curve 139. The result is that the left wheel 8 is then driven slower than the right wheel 10 and the vehicle's position is corrected to center the vehicle over the guidewire as it moves forward into the terminal 11 or, alternatively, along a guidewire in the floor in the terminal 9.

Figure 10B:
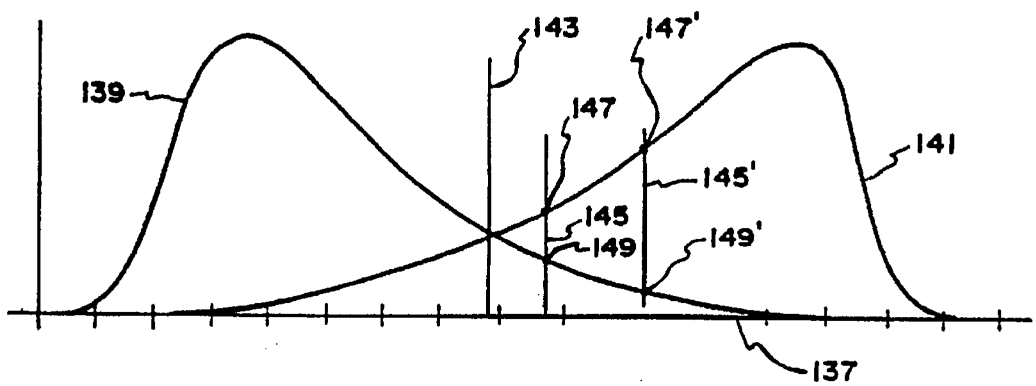
FIG. 10B graph of amplitudes of signals seen in FIG. 10A showing a lateral offset used to control the vehicle's lateral position relative to the current carrying wire.

From time to time, it may be desirable to drive the vehicle with an offset lateral to a guidewire. This is accomplished under program control by the motion control processor 61 wherein a lateral offset bias is digitally added to one of the signals over terminals 118, 120, after digitization. As seen in FIG. 10B, which comprises the same axes and curves seen in FIG. 10A, a desired offset 145' away from center line 143 establishes two curve 139 and 141 intersections, 149' and 147', respectively. The lateral offset bias is calculated as the difference between the values at intersections 149' and 147' and comprising a sign opposite the sign of an offset error which occurs on the same side of center line 143.

Figure 13:
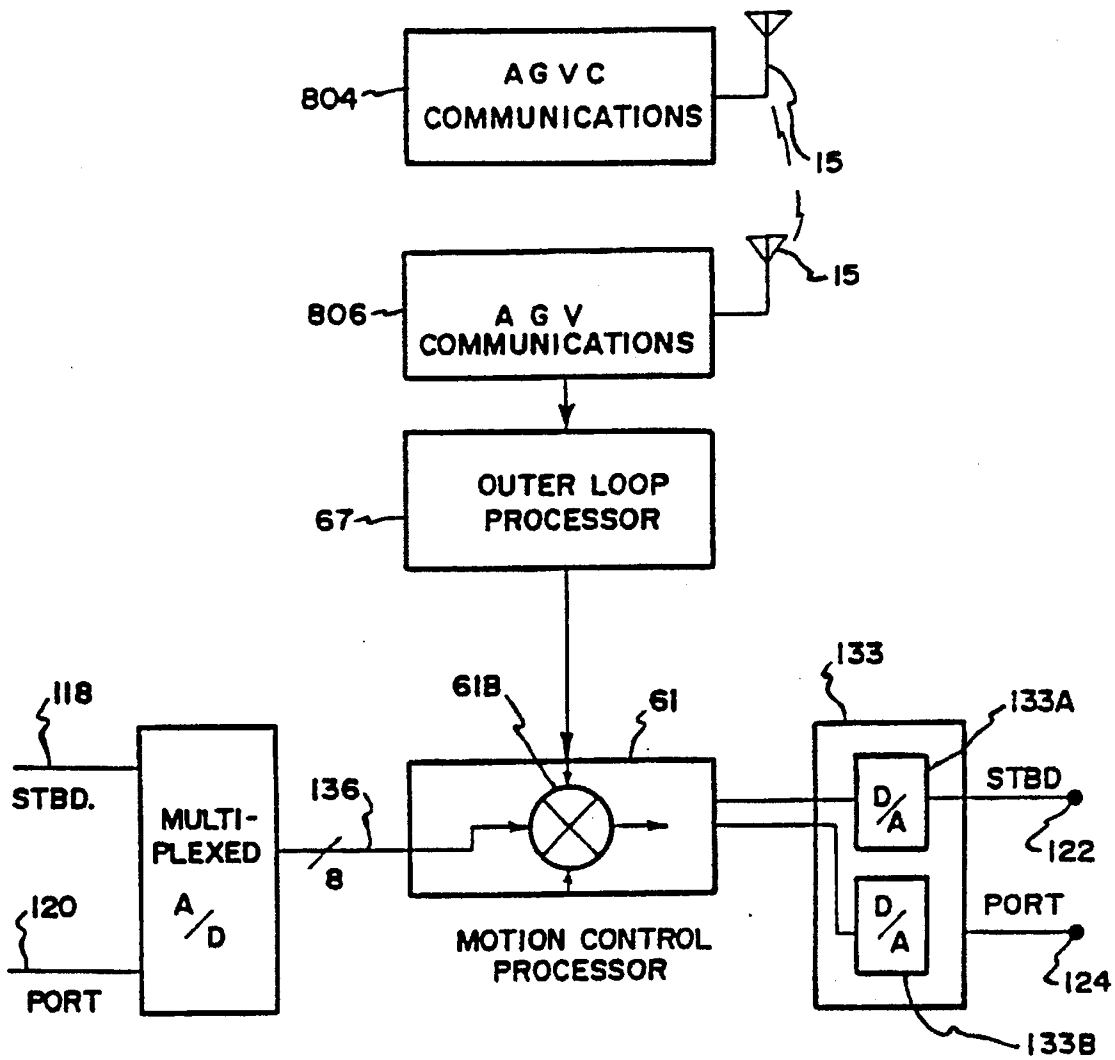
FIG. 13 block diagram showing an automatic guided vehicle controller (AGVC), microprocessors, and some equipment for operation in a passive wire loop mode.

Hybridity of Self-Contained Navigation-and-Guidance and Porportional-Positioning System Figures relating to hybridity including FIGS. 4 and 13. The vehicle navigation and guidance system, in the self-contained mode, operates by starting with a known position and heading and measuring the distances traveled by both the left and right sides of the vehicle. It integrates those distances to keep track of the location of the vehicle. The position is updated periodically by detecting a magnet of known position such as magnet 6 in the floor over which the vehicle travels.

The AGVC 13 keeps track of the status and position of each vehicle. The AGVC 13 has terminal information and a map of the path layout stored in memory. When a vehicle is directed to a terminal, such as terminal 11, that has a passive floor loop 55 and not an active guidewire, the AGVC 13 tells the outer loop processor 67 to guide in the terminal-positioning mode of the vehicle navigation and guidance system. Commands and other signals pass between computer 67 and computer 61 on the line 67A of FIG. 3. The outer loop guidance microcontroller 67 then sends a control signal on a line 187 (FIGS. 6 and 15) to switch 70 that energizes the transmitting antenna 71. It also sends a control signal to another switch 185 that causes attenuation of the guidewire-signal channel (terminals 153 and 155) of FIG. 15 and FIGS. 14, 16A).

Figure 16A:
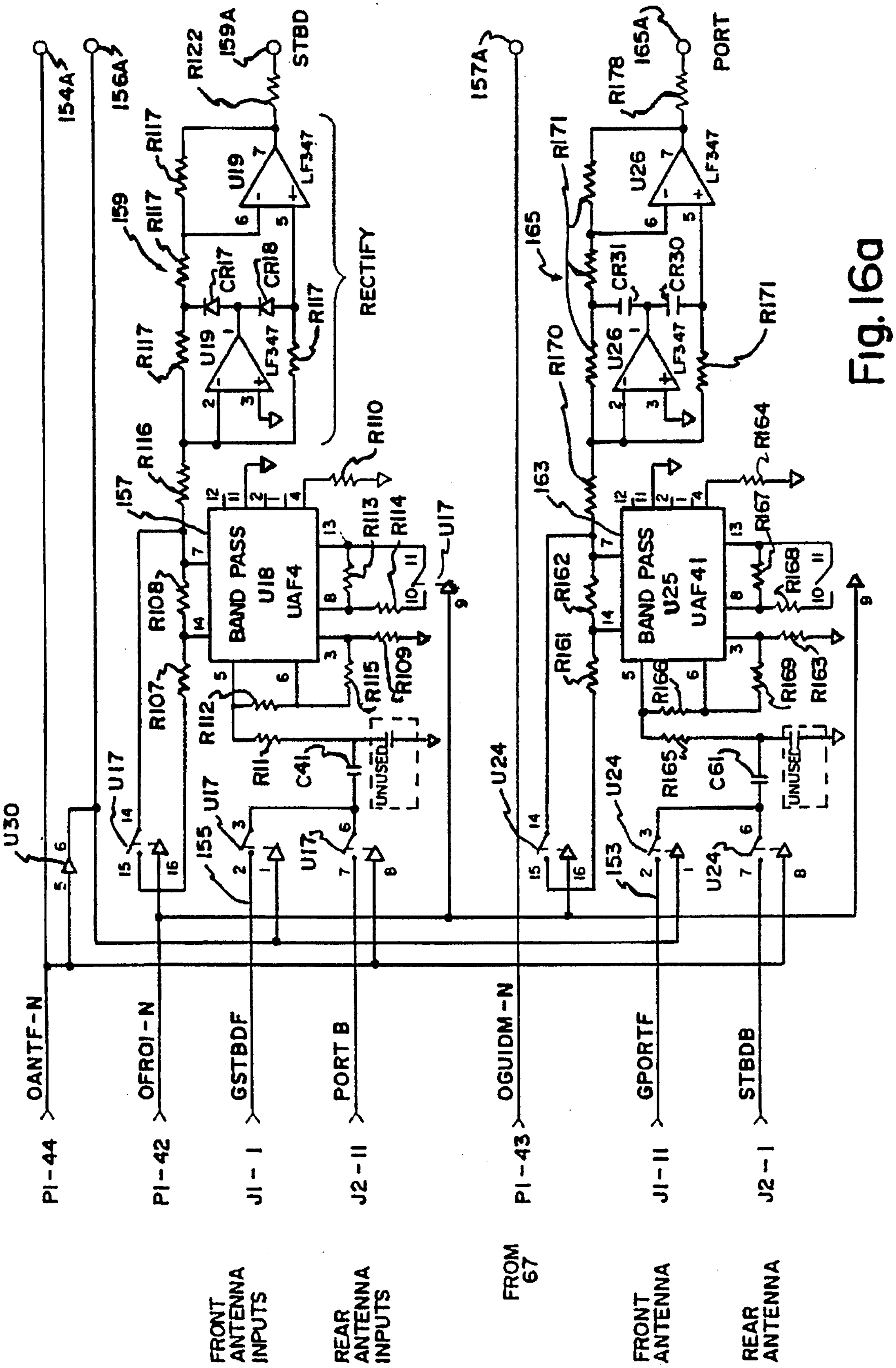
FIG. 16A circuit diagram of a bandpass-filtering and signal-rectifying portion of the equipment for a guidewire-tracking mode of operation (middle portion of circuit).
Figure 16B:
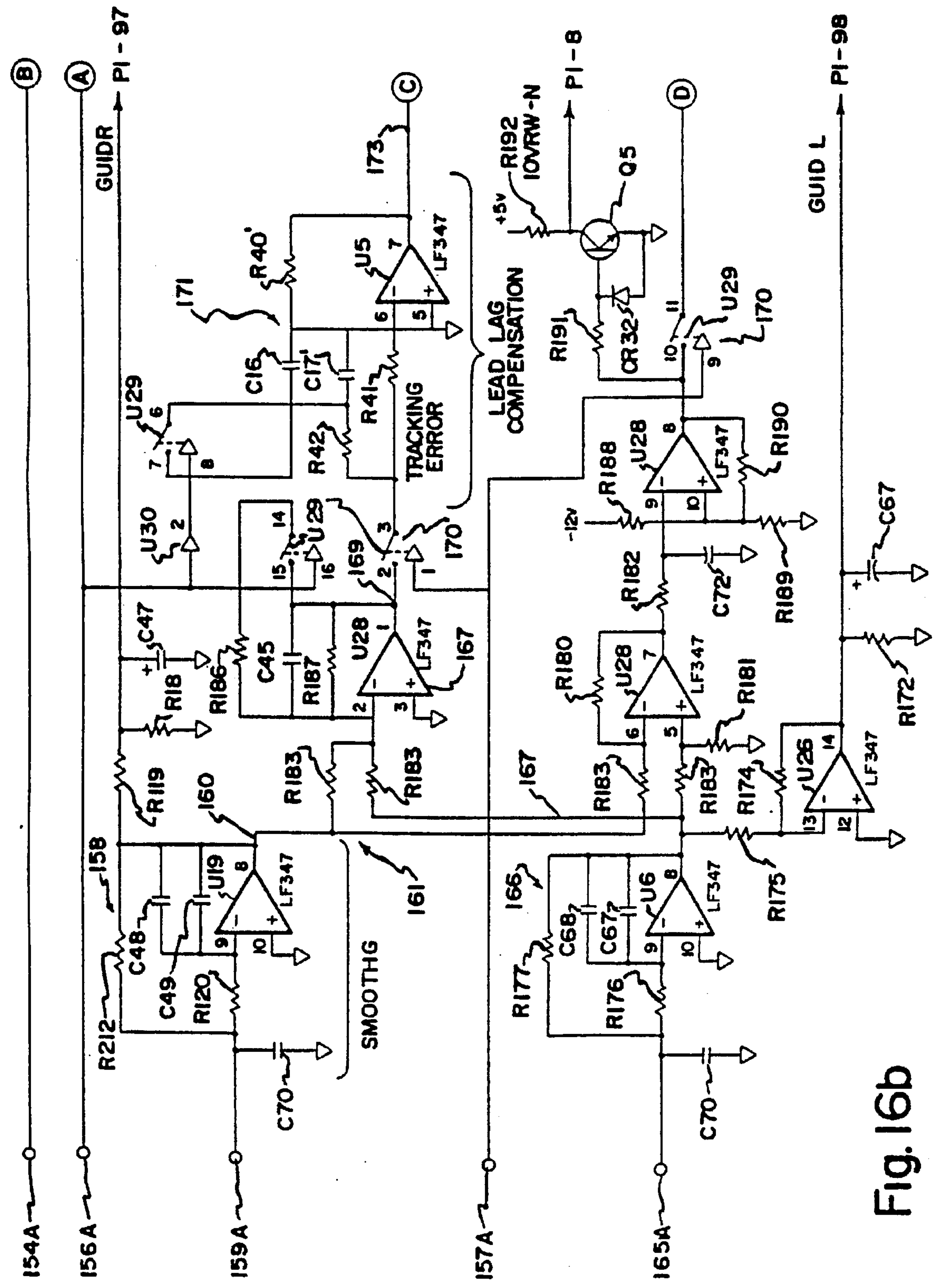
FIG. 16B circuit diagram, a continuation of FIG. 16A, of a smoothing and compensator portion of the equipment for a guidewire-tracking mode of operation.

The active guidewire-signal channel's error signal at terminal 169 of FIG. 16B is switched off so that it does not interfere with the passive wire loop's signal at terminals 122 and 124. This insures that the passive wire loop's signal (FIGS. 12 and 13) completely control the vehicle. More detailed descriptions of the circuits involved are presented below.

Lateral Positioning of a Vehicle at a Terminal Having a Passive Floor Loop

Figure 11:
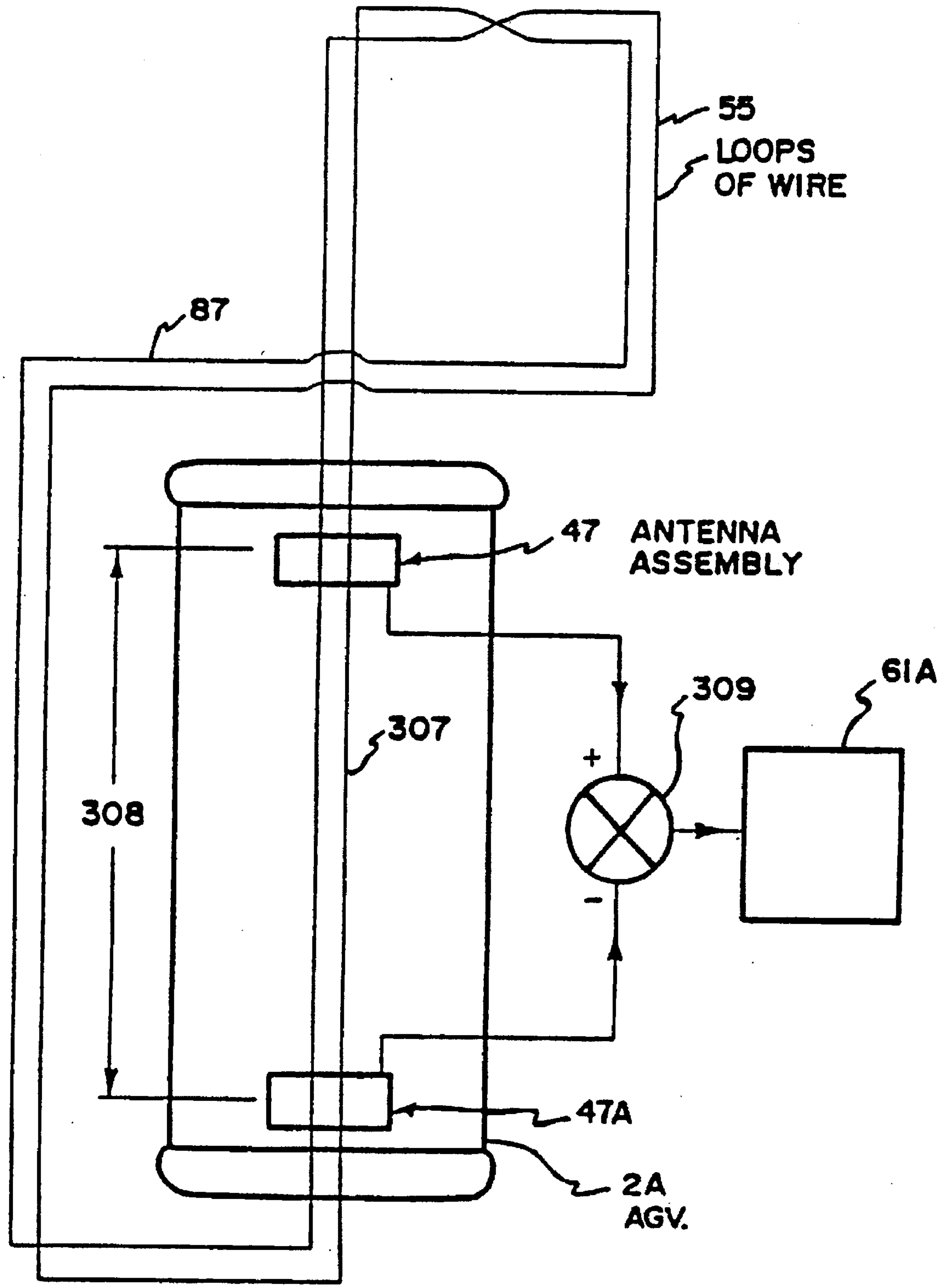
FIG. 11 plan view of an alternative configuration of antennas and a passive loop arrangement having two turns.

FIG. 11 shows a conductive loop that is short-circuited to itself and doubled over so that it has two turns. One, two or any other convenient number of turns can be used. If preferred, separate superimposed shorted loops could of course be used instead. They are folded to form the skewed figure eight of FIG. 11 in order to produce a wire cross at any desired position. Loops can of course be used for precise positioning of vehicles at places other than terminals if desired.

The location of an automatic guided vehicle 2A is shown and its antenna assembly 47 is indicated on the vehicle. The longitudinal conductors are designated by the reference number 81 and the transverse or cross wires are designated 87.

Figure 12A:
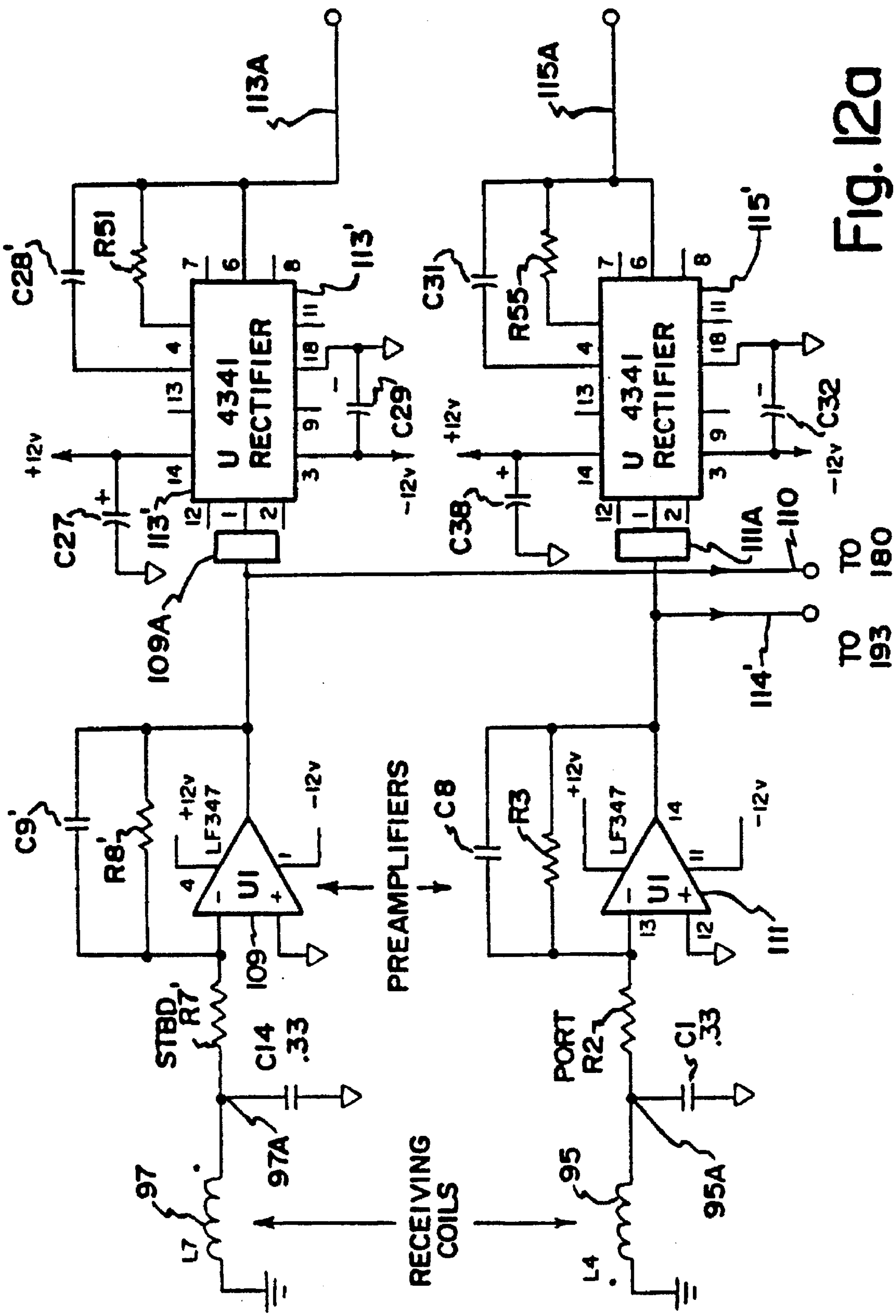
FIG. 12A circuit diagram of receiving antennas, preamplifiers used in common by several circuits. Also shown are rectifiers for terminal-positioning operation in which only a passive loop of wire is on the floor.
Figure 12B:
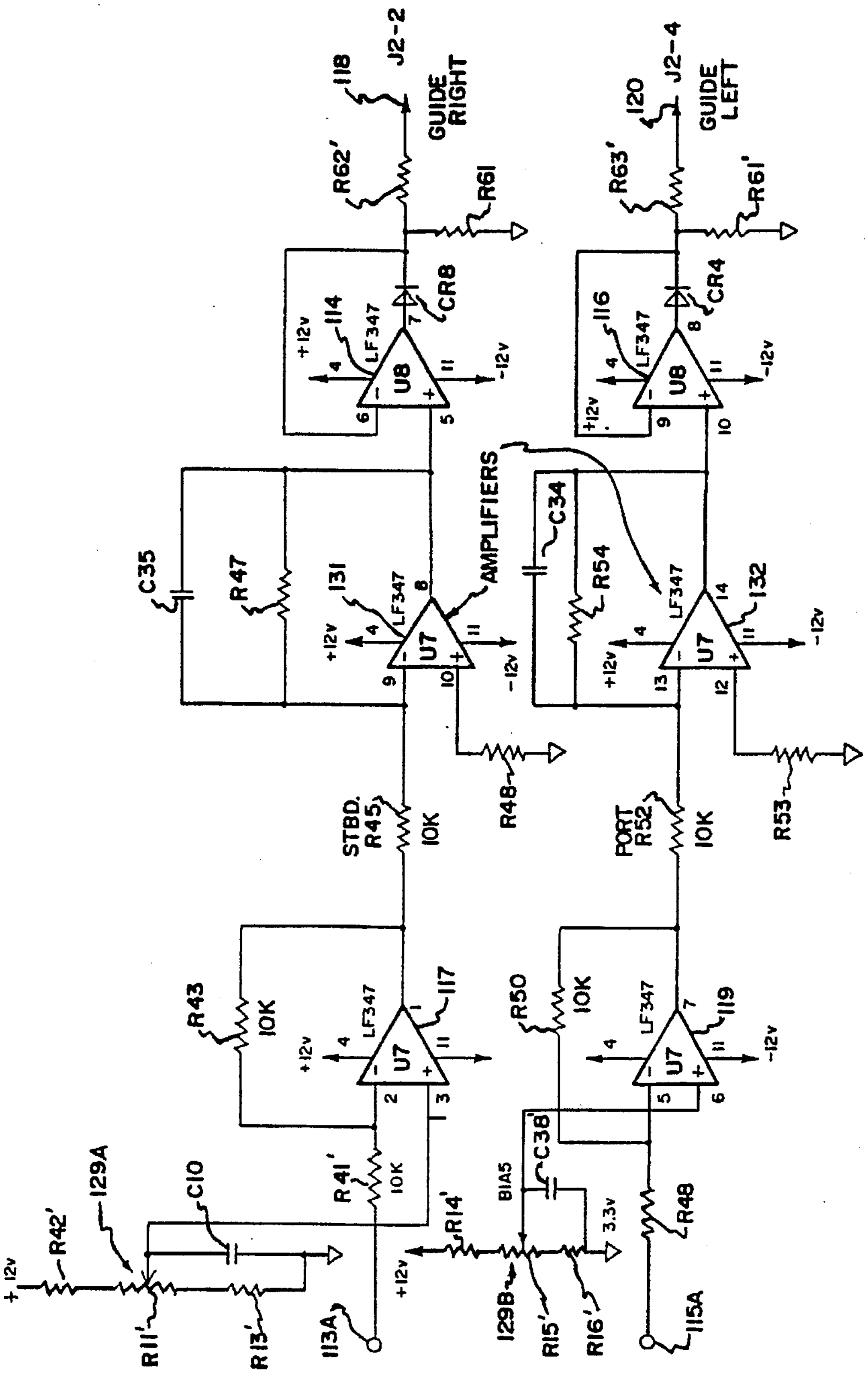
FIG. 12B circuit diagram, continued from FIG. 12A, of antenna output signal conditioning circuits for vehicle front-end terminal-positioning operation in which only a passive loop of wire is on the floor.

FIGS. 12A and 12B show a circuit diagram of a portion of the receiving equipment for receiving magnetic field information. The equipment of FIGS. 12A and 12B is part of block 151 of FIG. 14. In FIGS. 12A the receiving antenna's coils 95 and 97 are shown at the left side of the figure with one terminal of each coil connected to ground. The instantaneous polarity of one coil relative to the other is indicated by the dots.

The circuits of FIGS. 12A and 12B are symmetrical for left and right signals so only the right channel will be described in detail. Coil 97 is connected to a preamplifier 109, which serves also as a lowpass filter to suppress high-frequency noise. The output of the preamplifier 109 is connected to a bandpass filter 109A with center frequency equal to the frequency of the transmitting oscillator 68'. The output of the bandpass filter is rectified by rectifier 113 to convert the signal to a DC value.

The DC output of rectifier 113 is connected via terminal 113A to a shifting amplifier 117. The non-inverting input of that same amplifier receives a bias from an adjustable voltage-dividing biasing circuit 129A, which, at the output of amplifier 117, offsets the signal that was received from rectifier 113.

The bias of amplifier 117 is a DC bias for offsetting the direct magnetic coupling received from the transmit antenna. The purpose of the bias is to remove as much of the direct coupling component of the signal as possible so that only the signal from the guidewire is amplified, thus enabling a subsequent analog-to-digital converter 135 to be a high-resolution type.

It would not be necessary for the bias 129A to be adjustable because it is sufficient to offset the signal only slightly, but it is adjustable in the preferred embodiment. The left signal is later subtracted from the right signal in the motion control processor 61 anyway, so the portion of the direct signal that is not properly biased at amplifier 117 would be canceled by the subtraction if the antennas are centered with respect to each other. However, an adjustable bias on both right (129A) and left (129B) sides eliminates the need to adjust the antenna assembly, and allows bias adjustments to be made manually any time after the antennas are fixed in position. An automatic bias adjustment embodiment is described below in a section called Automatic Bias-Setting Embodiment.

The motion control processor 61 can also observe what the offset is when the vehicle is far removed from any floor wire, store that offset value, and use it to compensate the signals received while processing.

An inverting amplifier 131 receives the DC output signal from the amplifier 117, and a half-wave rectifying, unity gain amplifier 114, which follows amplifier 131, outputs values greater than or equal to zero as required by the A/D converter.

In a similar manner the left-coil signal from coil 95 is processed by circuit elements 111, 115, 119, 132, and 116, to provide another output signal, at a terminal 120.

Figure 14:
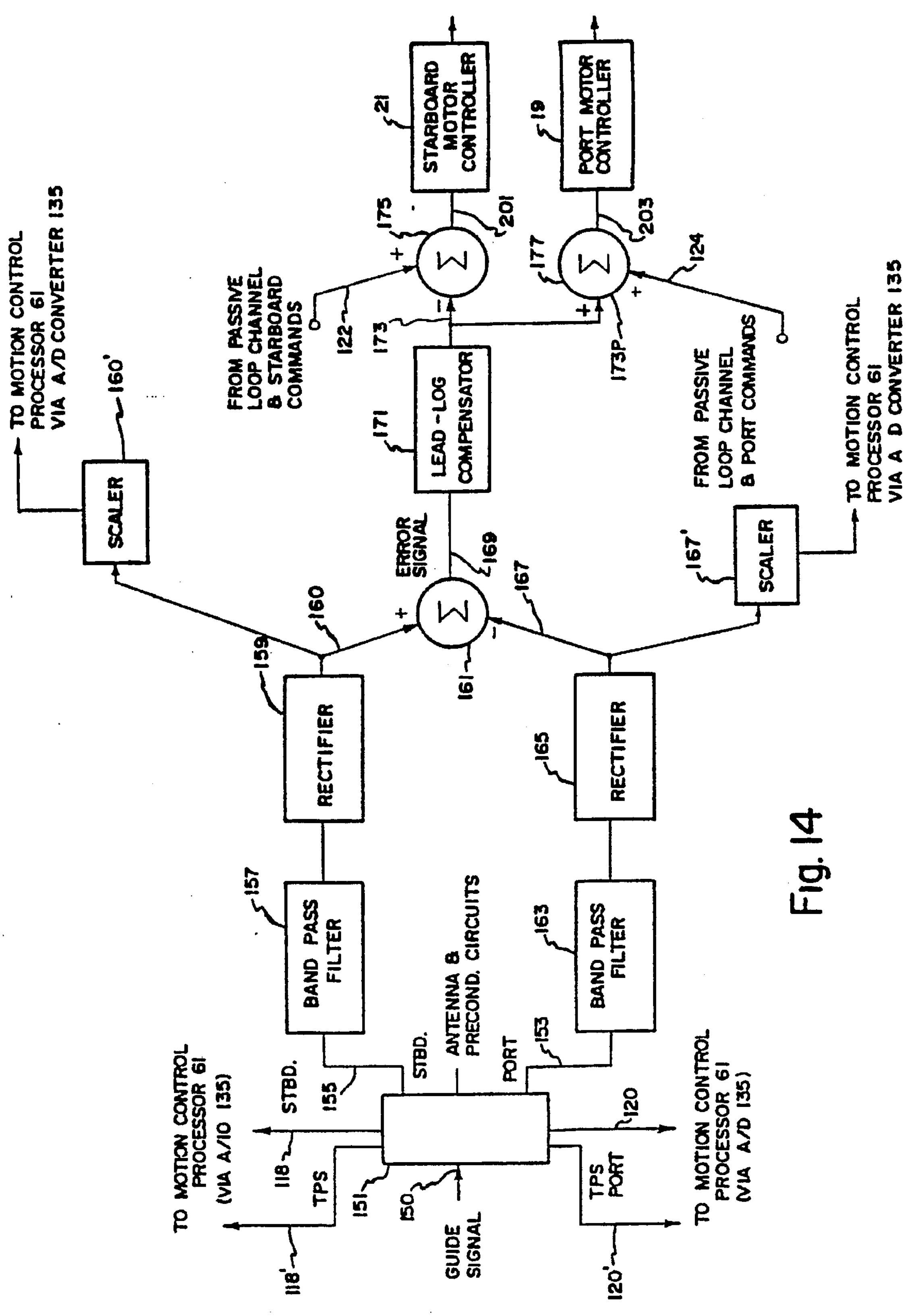
FIG. 14 block diagram of equipment for guidewire-tracking mode of operation of the vehicle. (See FIGS. 15–17 for details.)

The terminals 118, 120, which have DC signals received from the right-side and the left-side coils 97, 95 respectively of the front-end receiving antenna 91, are shown also on FIG. 13. Also seen in FIG. 14 are terminals 118', 120', which comprise DC signals received from the starboard and port side, respectively, from coils similar to coils 97, 85, but located at the rear of the vehicle. Two additional left and right sensing antenna 91 signals are routed through bandpass filters 163, 157, respectively, and therefrom to rectifiers 165, 159. Terminals 167, 160 from rectifiers 165, 159, respectively, connect to summing amplifier 161, as earlier described. In addition, signals through terminals 167, 160 are transmitted to A/D converter 135 through scaling resistors 167', 160' for A/D conversion and transmitted therefrom to motion control processor 61. In the currently preferred embodiment, antenna 91 signals are processed directly by motion control processor 61, thereby bypassing lead-lag compensator 171. All six such inputs are connected to a multiplexed analog-to-digital (A/D) converter 135, which alternatively converts signals on all input lines to eight-bit digital signals at an output bus 136.

Those digital signals are conducted to the vehicle's motion control processor 61. It is a Model DS5000 microprocessor manufactured by the Dallas Semiconductor Corporation.

Another input to the motion control processor 61 is received from an outer loop microprocessor 67, which is an Intel Corporation Model 80186 device. The AGVC 13 communicates with the outer loop processor 67. Data is transmitted between the AGVC 13 and the outer loop processor 67 by guidewires in the floor or by a radio link using an antenna 15.

Commands sent from the outer loop processor 67 to the motion control processor 61 include the desired vehicle speed and the ratio of the left and right wheel speeds, which controls the radius of curvature of travel.

However, when the terminal-positioning mode of the vehicle navigation and guidance system is being used the ratio of the left and right wheel speeds is 1.0. The speed command is the same to the left wheel as to the right wheel; corrective signals are generated from the receive antenna and are combined with the speed commands to force the vehicle to track the wire. Therefore, the vehicle follows the path of the guidewire regardless of the path's layout (e.g., a non-straight path). Microcomputer programs for speed control of wheels of automatic guided vehicles are well known in the prior art. In the currently preferred embodiment, calculations have been simplified by assuming the error offset represents the current guidewire position relative to vehicle 2A. The program which performs the calculations is provided in detail in software listings.

In one travel direction, the port and starboard wheels delineate left and right direction, as is true when the vehicle is traveling in the forward direction. However, when the vehicle is traveling in the rearward direction, the port and starboard wheels delineate opposite hand directions, right and left, respectively. For this reason, inputs 118 and 120 as seen in FIG. 13 are received from the starboard and port side of the vehicle and are processed as right and left direction signals, respectively.

Digital data from the motion control processor 61 is conducted to a digital-to-analog (D/A) converter block 133. The block 133 contains two D/A converters 133A and 133B for starboard and port signals respectively. The analog signal at each of their output terminals 122, 124 is connected through a summing junction 175, 177 to a motor controller 21, 19, to motors 17, 15, and the drive wheels 10, 8. See FIG. 14.

During operation of the vehicle at places away from a terminal the AGVC 13 and the outer loop processor 67 provide commands to the motion control processor 61, which supplies signals through the D/As 133A, 133B to control the motion of the vehicle via its controllers, motors, and drive wheels.

During operation in a terminal the antennas 97, 95 receive induced signals from a loop of wire 55 on the floor, and provide signals through the circuits of FIGS. 12A and 12B and the A/D converter 135 of FIG. 13, then through the motion control processor 61, terminals 122, 124, junctions 175, 177, controllers 21, 19 (FIG. 14) and motors 17, 15. These error signals alter the speed commands of their respective wheels to position the vehicle laterally as desired in the terminal.

Summary of Passive Loop Positioning Operation

To summarize, the terminal-positioning mode of the vehicle navigation and guidance apparatus guides the vehicle over a passive wire as follows:

First, microprocessors 61 and 67 receive a signal from the AGVC 13 notifying them that the vehicle 2 is entering a terminal such as terminal 11. The transmitting antenna 71 is turned on by means of the analog switch 70, FIG. 6, which is controlled by the microprocessor 61.

Signals from the receiving antennas 91 are preamplified. The right-coil and left-coil signals are conditioned with identical electronic circuits, so the following description covers only the right-coil signal. The right-coil signal is routed through two different paths, namely the circuits of terminals 118 and 155, FIG. 14.

Within block 151 of FIG. 14, the right-coil signal is routed to a bandpass filter, rectified, inverted and added to (i.e., offset by) a bias, and amplified to obtain the signal at terminal 118. It is also routed to an attenuator to obtain the signal at terminal 155.

The signal at 118 goes through a path including the motion control processor 61, (and necessary A/D and D/A converters), FIG. 13. The signal at terminal 155 is amplified in a bandpass filter 157 and then rectified (159), and no bias is removed, leaving the difference at terminal 160 very small. Consequently the error signal is very small. The signal at 169 is switched off by the outer loop processor 67 while the vehicle is traveling in over a passive guidewire, to eliminate any possible undesirable effects. (See switch 170, FIGS. 4B and 16B).

Lateral Positioning of Vehicle over Active Guidewires at Terminals and Elsewhere In the case of terminals such as terminal 9 of FIG. 1 that are approached on routes such as routes 3 of FIG. 1 (which have guidewires embedded in the floor), guidewires are used in the floor of the terminals also, to position the vehicle within the terminal. FIG. 14 shows receiving equipment on the vehicle for guidewire operation both inside and outside a terminal, so far as lateral positioning of the vehicle is concerned.

As shown in FIG. 14, guide signals from a wire in the floor enter (at terminal 150) a block labeled "Antenna and Preconditioning Circuits" 151. Portions of this block 151 were already described in connection with FIGS. 12A and 12B, where terminals 118 and 120 are shown. Other portions of the block 151 will be described subsequently in connection with FIG. 15, but for purposes of explaining the general concept it is helpful to finish describing the block diagram of FIG. 14 first.

The Antenna and Preconditioning Circuits block 151 outputs an AC signal at a terminal 155, which goes to a bandpass filter 157. This filter is tunable to either guidewire frequency, specifically 965 Hz or 1155 Hz. Two guidewire frequencies are available to enable commanding the vehicle to select either one of two guidewire paths at a fork.

The outer loop processor 67 alternates the center frequency of this bandpass filter 157 by means of an analog switch, which switches appropriate resistor values into the circuit to select the desired frequency, until a significant amplitude is detected, signifying acquisition of the guidewire. The filtered signal is fullwave rectified in a block 159. The result at terminal 160, which is from starboard signal channel, is sent to a non-inverting input of a summing junction 161.

A port channel output from the block 151 is at terminal 153. It is passed through a bandpass filter 163, then through a fullwave rectifier 165. At a terminal 167 it is entered into an inverting input of the summing junction 161. The output of the summing junction 161, at terminal 169, is an error signal. That error signal is passed through a lead-lag compensator 171, which is tailored to the dynamics of the system as a whole to provide stability, fast response, and high accuracy.

The output of the lead-lag compensator 171 is inverted and added to the starboard speed command 122 from the D/A 133A of FIG. 13 at summing junction 175. See also FIG. 4A for a broader view. The summing junction 175 outputs a signal at a terminal 201, which is connected to the starboard motor controller 21. That motor controller controls the motor 17 which drives the wheel 10, as described earlier.

The output from the lead-lag compensator 171 connected also to another summing junction 177 without being inverted first. Summing junction 177 adds the compensated error signal 171 to the port speed command 124. The summing junction 177 outputs a signal to the port motor controller 19, which drives the port motor 15, hence the wheel 8. The elements 157 through 177 are on an analog circuit board.

Figure 15:
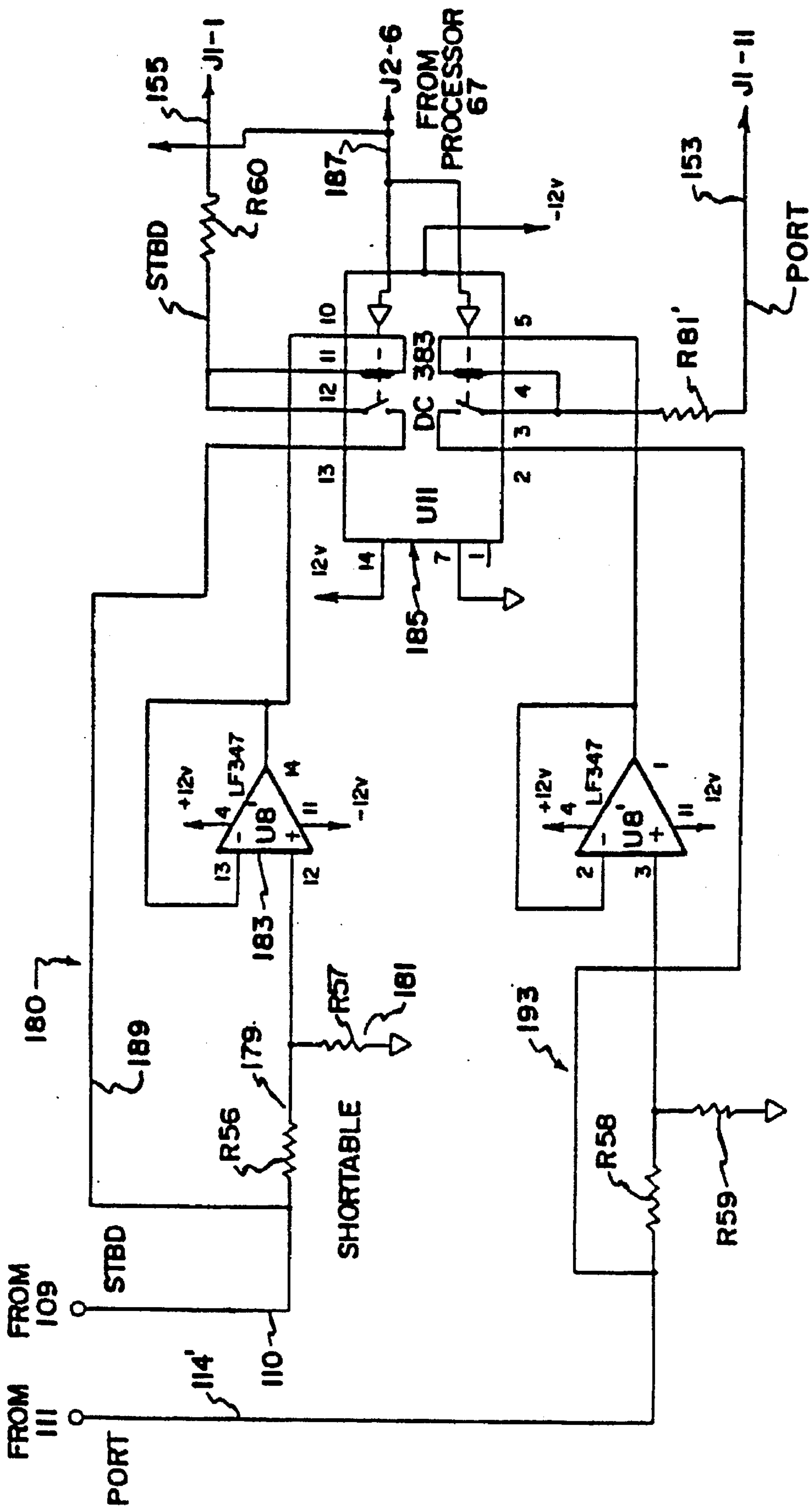
FIG. 15 diagram of circuits including the receiving antennas, their preamplifiers, and short-circuitable attenuators (input portion of circuit) as used when the vehicle is relying on an active guidewire for position information.

Details of the lateral-control circuits on the vehicle for a guidewire mode of operation are shown in FIGS. 15, 16 and 17, which will now be described. FIG. 15 shows connections 110, 114' from the preamplifiers 109, 111 that were shown on FIGS. 12A. The signal from preamplifier 109 goes to an attenuator 180 consisting of resistors 179, 181, and an amplifier 183.

That attenuator is arranged so that it can be short-circuited by an analog switch 185 upon receipt of a control signal (at a switch terminal 187) from the outer loop microprocessor 67. A short-circuiting conductor 189 is connected around the attenuator 180. One output of the analog switch 185, which comprises a pair of ganged single-pole single-throw switches interconnected to form a single double-pole double-throw selector switch, is at a terminal 155, for the starboard side signal.

In an identical way, the output of preamplifier 111 goes to a switchable attenuator 193 and through the analog switch 185 to an output terminal 153 for the port side.

In FIGS. 6 and 15 the analog switches 70 and 185 are arranged such that when the oscillator 68 is disconnected from the transmit antenna 71, the attenuators 180, 193 are short-circuited and do not attenuate. This situation occurs when the vehicle is relying on active guidewires for guidance.

At other times, the oscillator 68' feeds the transmitting antenna 71 (via switch 70) and the attenuators 180 and 193 are permitted (by switch 185) to attenuate the signals received from antenna coils 97 and 95. This situation occurs when the vehicle is relying on passive guidewires for guidance.

Terminals 153 and 155 are at the left of FIG. 16A, which shows a middle portion of analog circuits for receiving and processing signals when operating in the guidewire mode. The starboard signal at terminal 155 of FIG. 16A is conducted through a switch to a bandpass amplifier filter 157, which is tuned to one of the guidewire frequencies, i.e., 965 Hz or 1155 Hz. The output of bandpass filter 157 is rectified in rectifier 159, smoothed in filter 158 and sent to a summing junction 161.

At the same time the signal 153 of FIG. 16A passes through a bandpass filter 163, through a rectifier 165 and an amplifier 166, and is connected to another input terminal 167 of the summing junction 161. The output of summing junction 161, at terminal 169, passes through the lead-lag compensator 171 to the terminal 173.

Figure 17A:
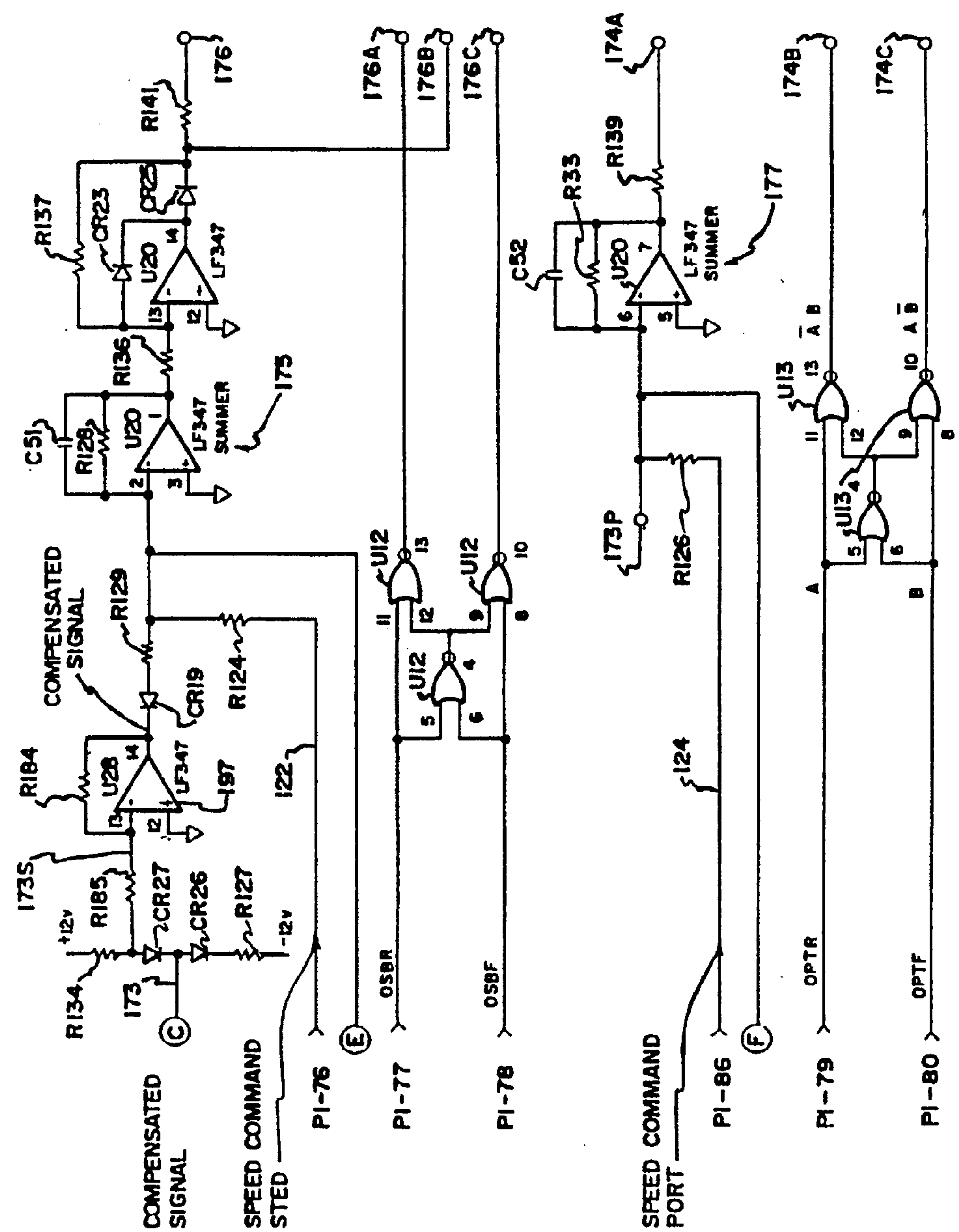
FIG. 17A circuit diagram, a continuation of FIG. 16B, of a portion of an analog board that sums a command from the motion control microprocessor with a compensated error signal, and drives a motor controller.
Figure 17B:
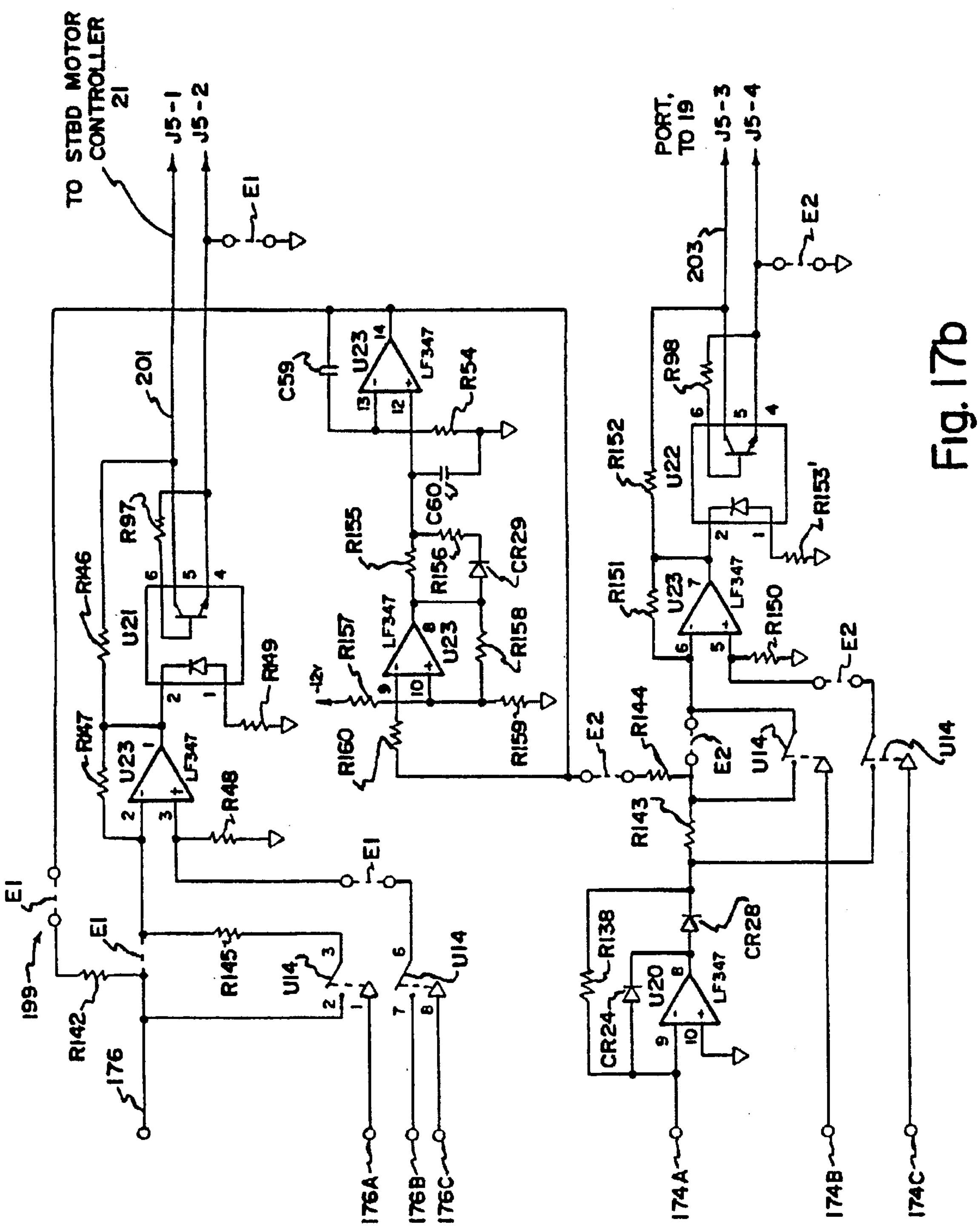
FIG. 17B circuit diagram, a continuation of FIG. 17A, of a portion of an analog board that controls direction of the vehicle (forward or reverse), and drives a motor controller.

In FIGS. 17A and 17B circuits are shown that follow FIG. 16B and are output portions of an analog board. These output portions sum the commands at terminals 122 and 124 from the microprocessor 61, with the compensated error signal at terminal 173 that drives the motor controllers. A signal of FIG. 17A at terminal 173 splits into terminals 173S and 173P. The starboard signal at 173S is inverted in device 197 and summed with the starboard speed command 122 at summing junction 175, then passes through some circuits 199 merely to select a forward or reverse direction of motion. It flows to an output terminal 201 that goes to the starboard motor controller 21. The circuits of this figure are of a conventional nature so their details are omitted from this description, although they are shown in detail in the included drawings.

The signal at terminal 173P of FIG. 17A is not inverted but is connected directly to a summer, 177, and passes through circuits similar to those just described to send a signal, at a terminal 203, to the port motor controller 19, as shown on FIGS. 14, 17A and 17B. Junctions between FIGS. 17A and 17B are designated 174A, 174B, 174C, 176A, 176B, and 176C.

Operation of the Motion Control Processor

The following equations describe the operation of the microprocessor 61. The speed commands $C_s(n)$ and $C_p(n)$ are signals that originate from the AGVC 13 and that are sent from the outer loop microprocessor 67 to the motion control processor 61. These signals are added in microprocessor 61 to the compensated error signal $e_c(n)$ to yield the resultant signals $R_s(n)$ and $R_p(n)$, which serve as inputs to the summing junctions 175 and 177, at terminals 122 and 124 of FIG. 14.

The quantity e(n) is a measure of how far the vehicle is off-center from the floor wire; a zero value of e(n) means that the vehicle is centered over the wire. The e(n) signal could be programmed to call for an offset. If the floor wire were at an incorrect position laterally, the fault could be compensated by having the program cause the vehicle to operate off to one side of the wire. For example, the vehicle could be offset by two inches by simply adding a term to the error signal e(n).

The term $e_c(n)$, which is the compensated error signal, is the output of a digital filter in microprocessor 61 that provides dynamic loop compensation of the closed control loop. It involves the current value and recent values of the error signal e(n), as well as recent values of the compensated error signal $e_c(n)$.

Summary of Guidewire Tracking

To summarize, the terminal-positioning mode of the vehicle navigation and guidance system apparatus guides the vehicle on a guidewire portion 3 of an installation in the following manner. The transmitter assembly 68', 69, 71 is turned off by means of the switch 70 of FIGS. 5 and 6. Signals from guidewires, received at the receiving antenna 91, are preamplified (FIG. 15) and routed directly to an analog circuit board (FIG. 14). The starboard and port signals $C_s(n)$ and $C_p(n)$ above replicate, with opposite signs, the commands being received at terminals 122 and 124 from the microprocessor 61. The summing junction 175 and 177 output speed commands, varied slightly by error signals, to control the motors 15 and 17 to drive the vehicle.

Use of the Vehicle Navigation and Guidance Apparatus in Two Guidance Modes—Namely Active Guidewire and Self-Contained Navigation and Guidance Certain components are used in common, at terminals and elsewhere, by both the terminal-positioning mode of the vehicle navigation and guidance system for passive floor loops and the guidewire guidance mode. The guidance system as a whole may have a portion of its routes (routes 3) in which vehicle guidance is provided by guidewires in the floor. The terminal-positioning mode of the vehicle navigation and guidance system can be used to track those floor guidewires.

The components that are used in common include the receiving antennas 47, the FIG. 17 portion of the analog board 49, the preamplifiers shown in FIG. 12A, the controllers 19, 21 of FIGS. 4 and 14, the motors 15 and 17 of FIG. 4A, and of course the wheels 8, 10.

Wire-Crossing Detection for Longitudinal Positioning of Vehicles

Longitudinal positioning of the vehicle 2A at terminal 9 or 11 is accomplished by sensing the location of the vehicle with respect to a wire that extends transversely across the floor in the terminal area. Current in the transversely-disposed conductor produces an alternating magnetic field surround it. The current can be due to active conductive energization of the wire or can be induced by transformer action from a transmitting antenna on the vehicle that generates a magnetic field. The magnetic field encircles the wire so that, at a particular instant, its direction is upward at one side of the wire, is horizontal directly over the wire, and is downward on the other side of the wire.

Magnetic coils for sensing the presence and location of the wire crossing are shown on FIG. 7. The three coils on the left side are a front coil 205, a middle coil 207, and a rear coil 209. The coils on the starboard side are: front 211, middle 213, and rear 215.

When these coils are in place on the vehicle their axes are vertical so that their turns are horizontal. Consequently when the middle coil 207 is directly over a current-carrying wire at the floor, magnetic flux passes through the front coil 205 in one direction, say upward, at the same time that magnetic flux passes through the rear coil 209 in the opposite direction, i.e., downward. At that same time flux in the coil 207 does not link any turns because the flux there is horizontal and the coil's turns are horizontal.

When the coil 207 is directly over the current-carrying floor wire, an alternating magnetic flux would therefore produce one phase of signal in the coil 205, an opposite shapes of signal in the coil 209, and zero signal in the coil 207. The principle of operation of the apparatus in detecting the longitudinal location of the vehicle by means of wire-crossing detection is based on these three signals.

Figure 18:
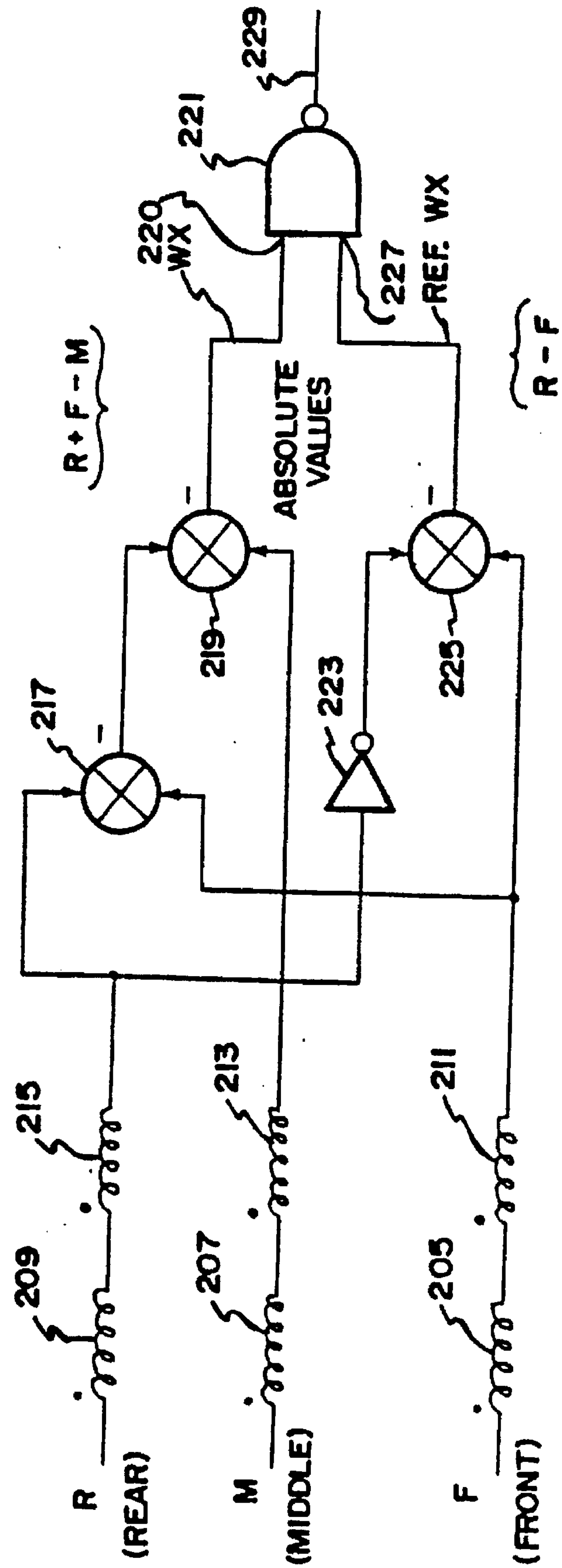
FIG. 18 simplified diagram of wire-crossing detection circuits. (See FIG. 19 for details.)

The method of combining the three signals is shown in FIG. 18, which is simplified in order to illustrate the concepts. Signals can occur in either coil 209 alone, or 215 alone, or both simultaneously. A signal from coils 205 and 211 is added to a signal from coils 209 and 215 at a summing junction 217. The same is inverted and added to a signal from the middle coils 207 and 213 at a summing junction 219. The output of summing junction 219 is inverted and applied as an input 220 to a NAND gate 221.

The signal from coils 209 and 215 is also inverted in an inverter 223 and is input to a summing inverting amplifier 225. This signal is added to a signal from the coils 205 and 211 by summing inverting amplifier 225. The output of the summing inverting amplifier 225 is inverted and applied to a second input 227 of the NAND gate 221.

The signal at the first input 220 is a "wire-crossing signal" WX while the signal at terminal 227 is a "wire-crossing reference signal" REFWX. Absolute values of the signal WX and the signal REFWX are used at the terminals 220 and 227. The output of NAND gate 221 is terminal 229.

When a vehicle drives into a terminal it approaches a transversely lying wire 87 on the floor across the path of the vehicle. Only the left-hand coils will be discussed. Before the vehicle arrives at the wire, all three of the coils 205, 207 and 209 are linked by some alternating magnetic flux from the wire and all three of their signals are in phase. For simplicity of discussion, this phase is referred to as "downward" flux.

When the vehicle has advanced to where only the front coil 205 has crossed the wire on the floor, the coil 205 has "upward" flux and the coils 207 and 209 still have downward flux. That is, the instantaneous polarity of the output signal from the front coil 205 is opposite the polarity of the middle and rear coils 207, 209. When the vehicle has advanced to where the middle coil 207 is directly over the floor wire, coil 205 has upward flux, coil 207 has zero linking flux (because the flux is parallel to the plane of its coils), and the rear coil 209 has downward flux.

The signal at point 220 of FIG. 18 is the rear coil's signal plus the front coil's signal minus the middle coil's signal. When the middle coil 207 is directly over the floor wire 87 the signal from the front coil 205 is equal and opposite to the signal from the rear coil 209 so those terms cancel. At the same time the signal from the middle coil 207 is a minimum, so the signal at point 220 is zero. This represents a wire-crossing position.

At that time the reference signal at a point 227 is a maximum because that signal is the rear coil's signal minus the front coil's signal. Since the signals from these two coils 205 and 209 are of opposite polarity at that time, their algebraic difference becomes the sum of the magnitudes of the two, so it is a maximum.

The logic circuit involving NAND gate 221 and circuits leading up to it are arranged so that when the signal at 220 is crossing zero and the signal at 227 is relatively great (although not necessarily a maximum) the NAND gate 221 outputs a logic signal at the point 229 that is suitable for indicating that the vehicle is directly over the wire crossing. That output at 229 is low when a wire crossing is detected.

Figure 19:
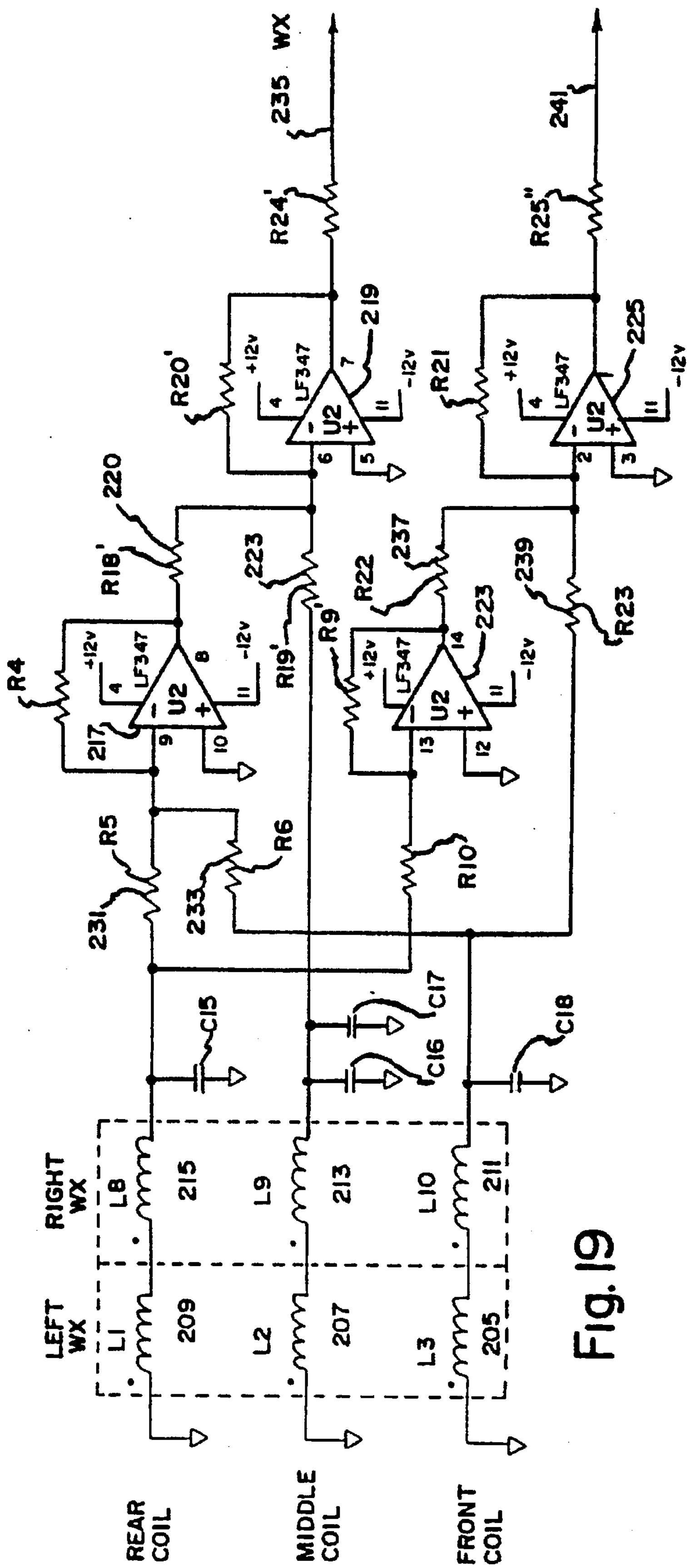
FIG. 19 circuit diagram of wire-crossing detection circuits including antennas (i.e., coils) and signal-combining circuits.
Figure 20:
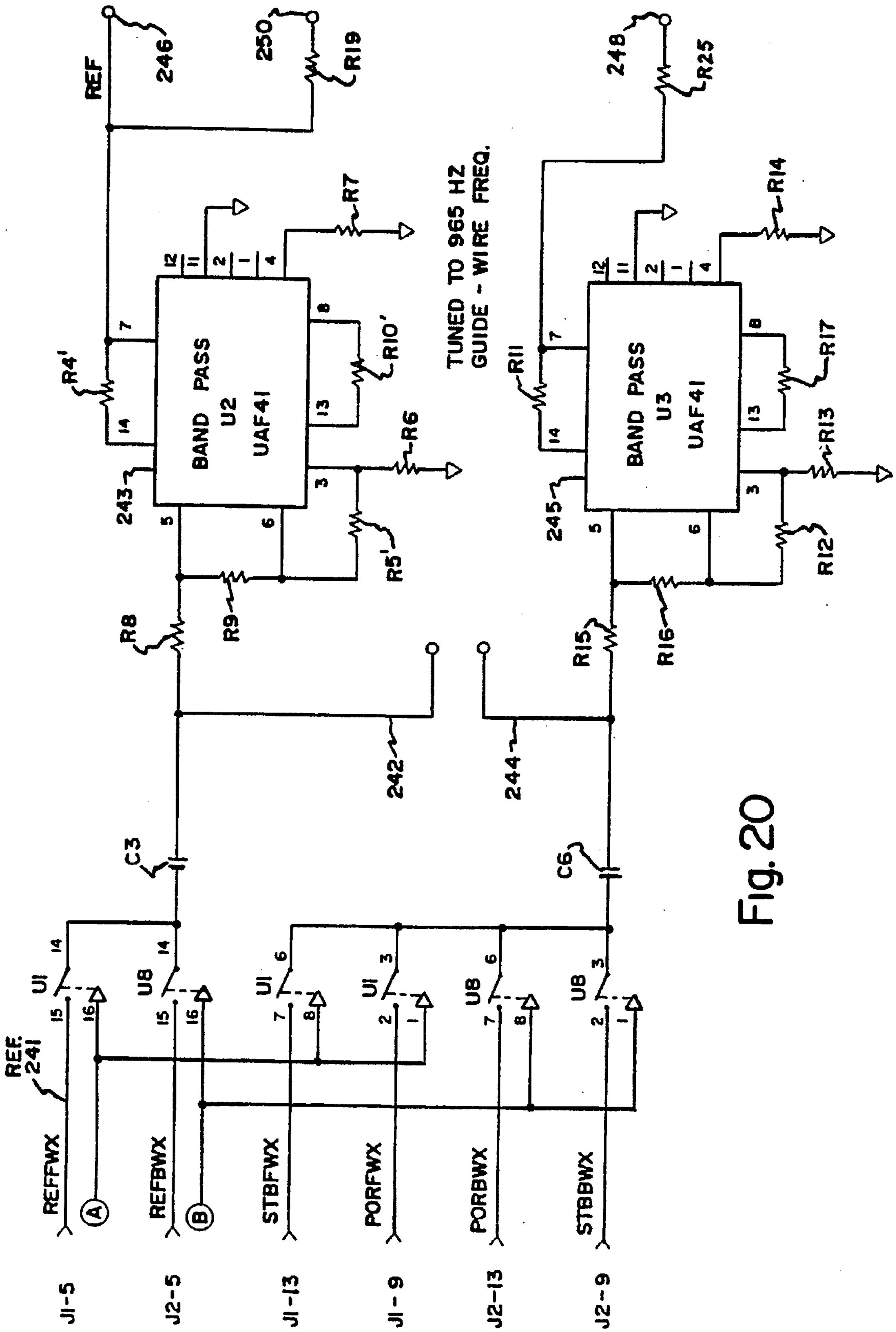
FIG. 20 circuit diagram of a portion of wire-crossing detection apparatus tuned to a frequency assigned for active guidewire operation of the vehicle.

Details of the wire-crossing circuits are shown in FIGS. 19 and 20, and some waveforms at selected points in the circuit are shown in FIGS. 23 through 27.

In FIG. 19 the coils 209 and 215 are in series and are connected through a resistor 231 to one input of an inverting summing junction 217. Coils 205 and 211 are connected in series, and are connected through resistor 233 to a second input of the summing junction 217. The output of the summing junction 217 is connected through a resistor 220 to one input of another summing junction 219. A second input to the summing junction 219 comes from a series connection of the middle coils 207 and 213, through a resistor 222. The inverted output of summing junction 219 is at a terminal 235, which is shown in both FIG. 19 and FIG. 20.

The output of coils 209 and 215 of FIG. 19 is connected also with an inverter 223, whose output is connected through a resistor 237 to an input of the summing inverting amplifier 225. Another input of the summing inverting amplifier 225 comes from the series-connected coils 205 and 211, through a summing resistor 239. The summing inverting amplifier 225 is connected so as to invert the summed signal.

The output of summing inverting amplifier 225 is at terminal 241, which is shown on both FIG. 19 and FIG. 20. The signal at terminal 235 is the wire-crossing signal itself and that at 241 is the reference wire-crossing signal. The circuits of FIG. 19 are used in common to detect wire crossings that are (a) directly energized as in terminal 9 of guidewire routes 3, and (b) passive induction loops as at terminal 11.

On FIG. 20 the signals at terminals 235 and 241 are connected through switching to bandpass filters 243 and 245. They are tuned to receive 965 Hz, which is the active guidewire frequency. A similar other subcircuit, of FIG. 22, to be described later, is tuned to 1155 Hz, which is the frequency of the transmitter on the vehicle that is used for exciting passive loops in the floor mat at a terminal. The 1155 Hz circuit is connected at terminals 242 and 244.

Figure 22:
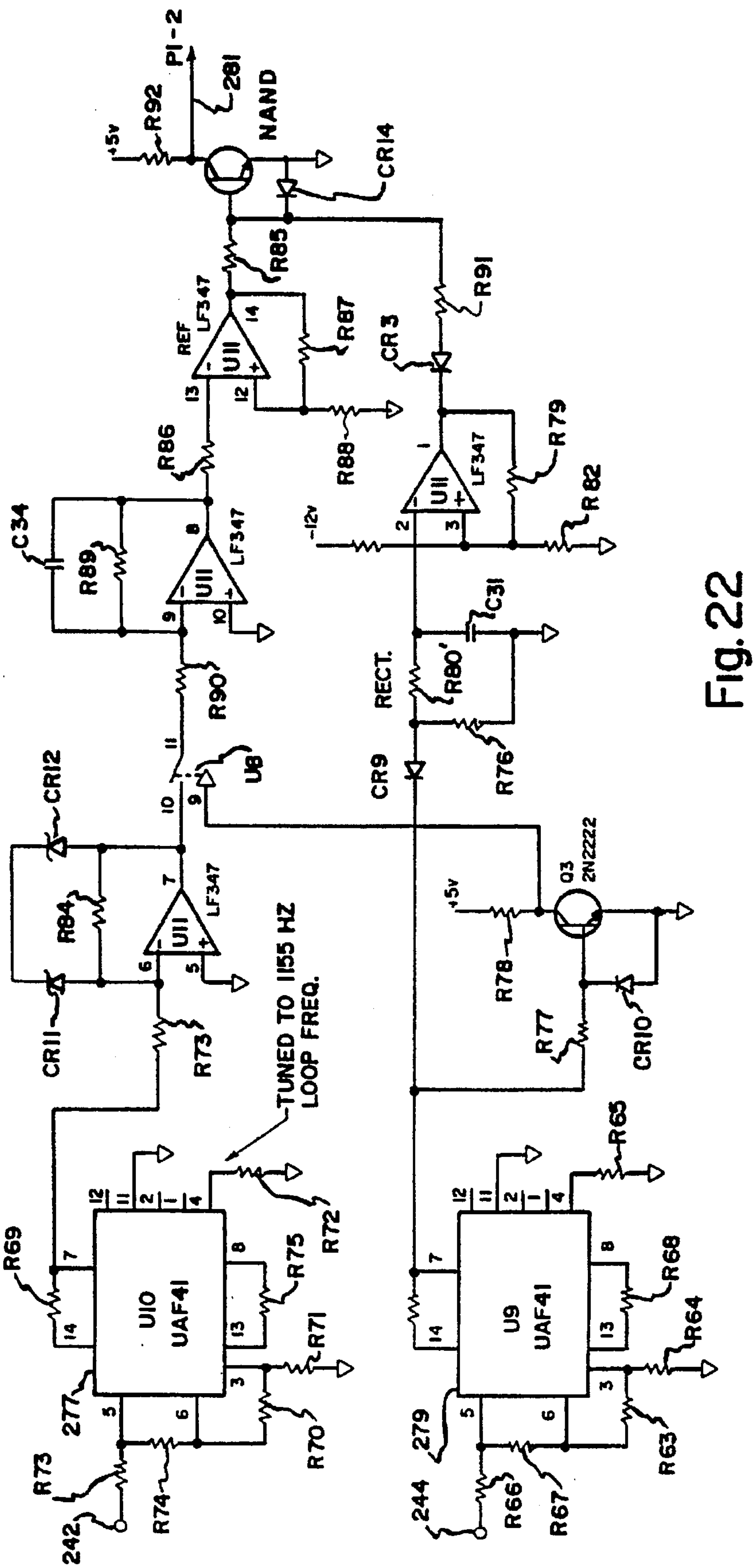
FIG. 22 circuit diagram of a portion of wire-crossing detection apparatus tuned to a frequency assigned for passive wire loop operation in a terminal.

The two frequencies 965 Hz of FIG. 20 and 1155 Hz of FIG. 22 are used in a guidewire system for causing the vehicle to branch to a first or second route at a junction such as a "T", by applying an appropriate frequency to the guidewire when the vehicle approaches the junction.

However, in a terminal having a passive loop, the receiver subchannel of 1155 Hz frequency is used for detecting a passive loop signal, whose energy originated with the onboard transmitter 68, and the receiver subchannel of 965 Hz frequency is used for detecting a conductively energized active guidewire crosswire at the terminal.

Thus the 1155 Hz passive-wire-crossing subchannel 277 (see FIG. 4), is used for detecting a passive loop when the vehicle is in a terminal, and is used for detecting a junction guidewire when the vehicle is not in a terminal. The 965 Hz guidewire-crossing subchannel 243 of FIG. 4 is dedicated to only guidewire sensing, both in and out of terminals.

Figure 21:
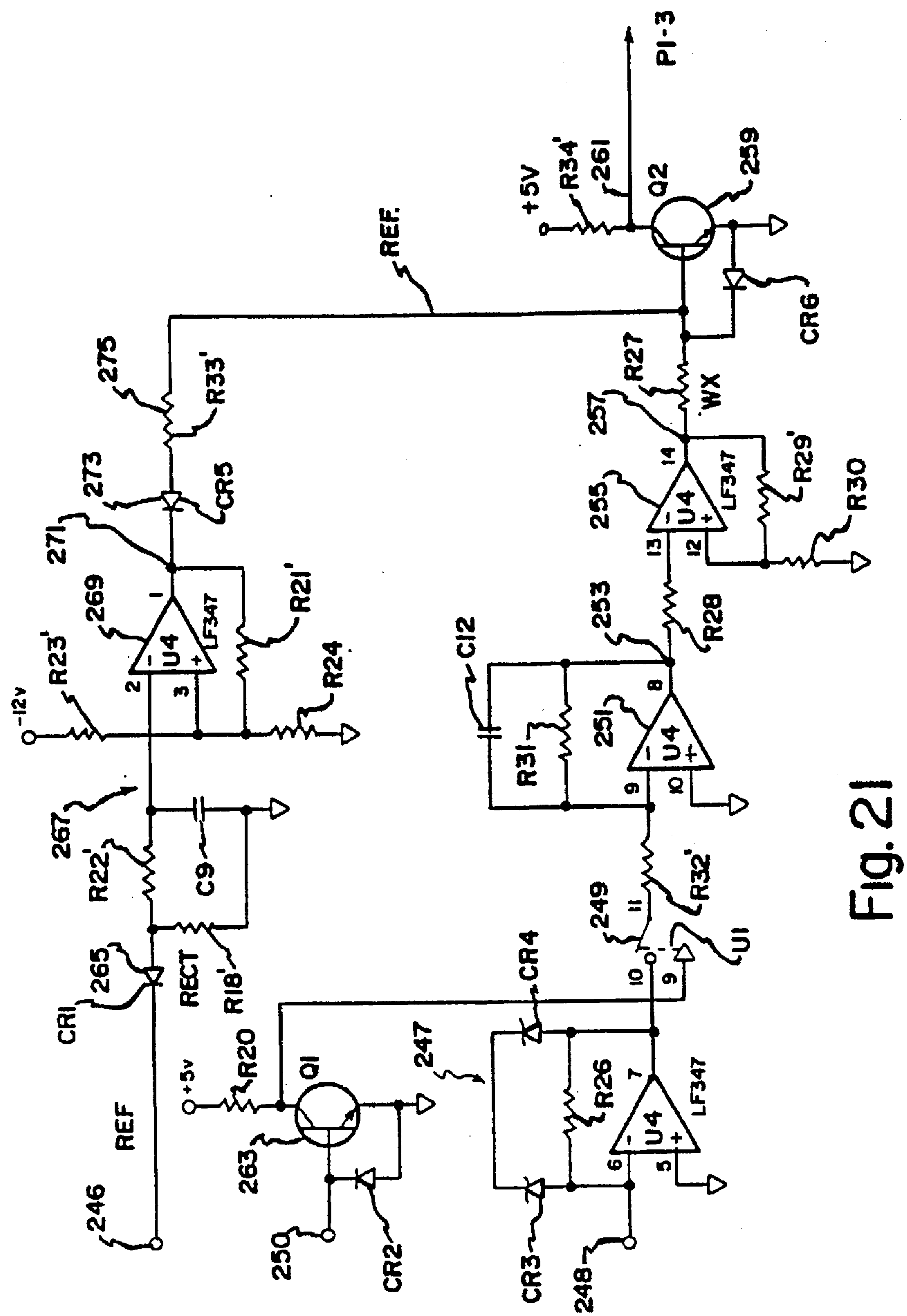
FIG. 21 circuit diagram, a continuation of FIG. 20, of a portion of wire-crossing detection apparatus tuned to a frequency for active guidewire operation.
Figure 23:
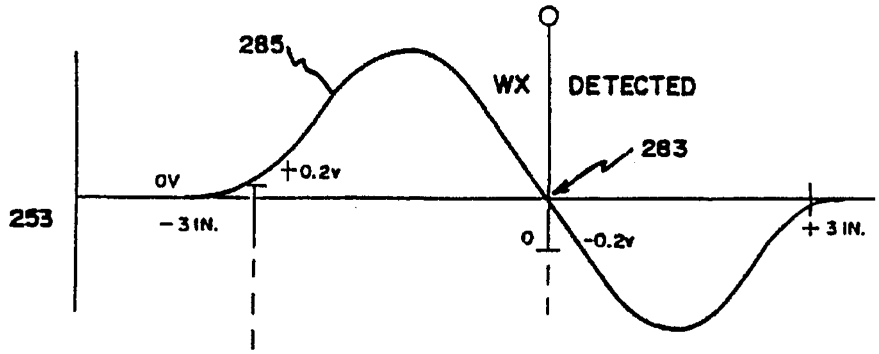
FIGS. 23–27 signal waveforms at various points in the wire-crossing detection circuit of FIG. 21, namely at terminals 253, 257, 267, 271, and 261, respectively.

On FIG. 20, the signal of terminal 235 passes through switching to a bandpass filter 245. FIG. 21 is a continuation, at terminals 246 and 248, of FIG. 20. The output of filter 245 passes through an amplifier circuit 247, a switch 249, and an inverting amplifier 251. The output of inverter 251 is shown in the graph of FIG. 23. That graph is the detected wire-crossing signal at a terminal 253.

Figure 24:
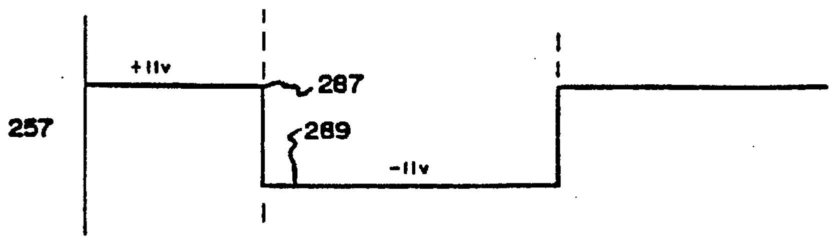

That signal passes through an amplifier 255 that eliminates the negative-going portion of signal and squares off the positive-going portion of the signal and inverts it, to produce the signal shown in the graph of FIG. 24. That signal appears at a point 257 of FIG. 21. It corresponds to the WX signal at terminal 220 of the simplified diagram of FIG. 18. Terminal 257 is connected to a transistor 259 in such a way as to perform a logical NAND function. The output signal, at terminal 261, is shown on the graph of FIG. 27.

On FIG. 20, the reference channel of terminal 241 goes to a bandpass filter 243. One output of the filter 243 goes via a terminal 250 to an amplifier 263 as shown on FIG. 21. The SPST switch 249 is controlled by the transistor amplifier circuit 263 and hence by the reference signal at 253. That reference signal turns on the cross-wire signal channel 251 when a strong reference signal is present and positive. (See FIG. 24).

The reference-channel bandpass filter 243 also outputs a signal through a diode 265 to an inverting input terminal 267 of an amplifier 269, FIG. 21. The waveform at input terminal 267 is shown on the graph of FIG. 25. It is a negative-going signal whose magnitude increases as the vehicle approaches the center of the cross wire and whose magnitude diminishes as the vehicle continues past the center. It is the algebraic sum of the outputs of the front and rear coils.

Figure 25:
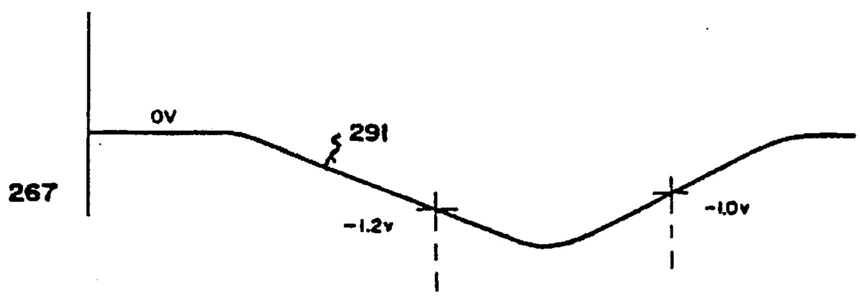
Figure 26:
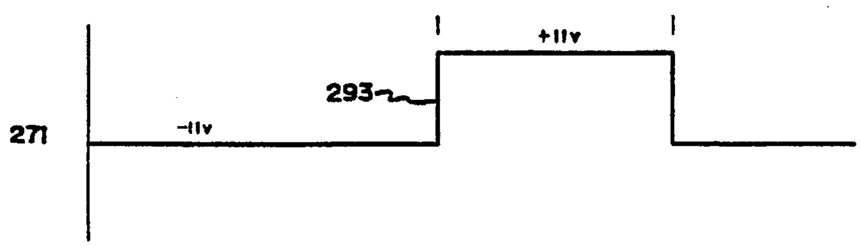
Figure 27:
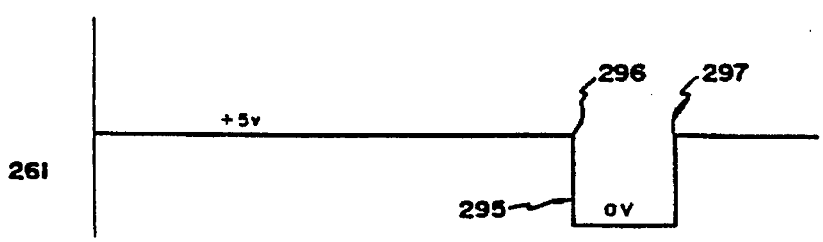

At a threshold of minus 1.2 volts the reference signal at 267 is tripped. Amplifier 269 is configured as a Schmitt trigger with about 0.2 volts of hysteresis. The threshold for decreasing magnitude is 1.0 volt, as shown in FIG. 25. This threshold is passed as the vehicle continues forward past the wire cross. The output of the amplifier 269, at a terminal 271, is shown as a large square graph 293 in FIG. 26.

The square graph 293, which has a range from negative 11 volts to positive 11 volts, is applied through a diode 273 and a resistor 275 to the base of transistor 259. That signal serves as the reference-channel input to the NAND gate whose principle component is transistor 259. Transistor 259 is part of the NAND gate 221 of the simplified diagram of FIG. 18.

The circuit of FIG. 22 has bandpass filters 277 and 279, both of which are tuned to 1155 Hz for passive loops. Otherwise, the circuit of FIG. 22 is identical to that of FIG. 21. The output of the circuit of FIG. 22 is at a point 281. This is the cross-wire signal output when a passive loop is used instead of an active guidewire.

The curves of FIGS. 23 through 27 are aligned vertically over each other to provide the same vehicle-position scale on the abscissa for all of them. Collectively they portray what happens in the circuit when a guided vehicle having antennas 205–215 as in FIG. 7 enters a terminal and drives over a wire-crossing that it must detect for purposes of longitudinally positioning the vehicle. The abscissa of all of the graphs of FIGS. 23 through 27 is distance expressed in inches, as measured positively and negatively from a zero point 283 on FIG. 23. Point 283 is the vehicle's position when the middle coil 207 is directly over the wire-crossing on the floor.

As shown in FIG. 23, at a distance of −3 inches, a curve 285, which is the wire-crossing signal at terminal 253 of FIG. 21, has increased to a +0.2-volt level. A Schmitt trigger 255 trips its output from positive saturation level to negative saturation level 289 at a point 287 in FIG. 24. The graph at FIG. 24 is the signal at terminal 257 of FIG. 21, as a function of the vehicle's longitudinal position.

On FIG. 23, when the curve 285 decreases (at a short distance to the right of the zero-point 283) to a level more negative than −0.2 volts, which is the negative threshold level os Schmitt trigger 255, the output signal at terminal 257 returns to a positive saturation level. The signal 289 essentially serves as one input of the NAND gate 259.

Turning now to the reference signal channel of FIG. 21, a signal at terminal 267 diminishes gradually from zero to a minimum at the wire-crossing center represented above by point 283. The waveform at terminal 267 of FIG. 21 is the V-shaped waveform 291 of FIG. 25. As the signal 291 decreases past −1.2 volts, amplifier 269 is triggered to saturate to the positive rail. Alternatively, as signal 291 increase past −1.0 volt, amplifier 269 is triggered to saturate to the negative rail. The output signal at terminal 271 is shown as waveform 293 in FIG. 26.

At the output terminal 261, a negative-transition pulse 295 is produced at a wire cross. As shown on FIG. 27, its leading edge 296 occurs at a place very slightly more positive than the zero center point 283 of the wire 87 on the floor. Its positive-going edge, if the vehicle were to continue in a forward motion, would occur at a position 297 on FIG. 27. The output signal at terminal 261 is a positioning signal whose edge 296 indicates that the middle coil 207 is almost directly over the wire-crossing. This signal goes to the motion control processor 61 to stop the vehicle and/or control its repositioning, by means of well-known computer control programming techniques.

Measurement of Heading of Vehicle, in One Embodiment of the Invention

In one preferred embodiment, one sensing antenna 47 is mounted at the front of the vehicle and another sensing antenna 47A is mounted at the back of the vehicle, as shown in FIG. 11. A measurement of the lateral offsets of the center of each of the antennas 47 and 47A from a central longitudinal wire segment 307 on the floor indicates the vehicle's heading. The net difference in offsets divided by the longitudinal spacing 308 between the antenna assemblies 47, 47A is the tangent of the heading angle of the vehicle relative to the wire 307.

The signals from antennas 47 and 47A are processed in the manner described in detail above and subtracted in a comparator 309 and entered into a portion 61A of the microcomputer 61. See FIG. 11. Stored in the microcomputer 61 is information as to the longitudinal spacing 308 between the two antennas, which enables the computer to compute the vehicle's heading.

Alternative Receiving System Embodiment Having Phase-Locked Loops

Figure 28:
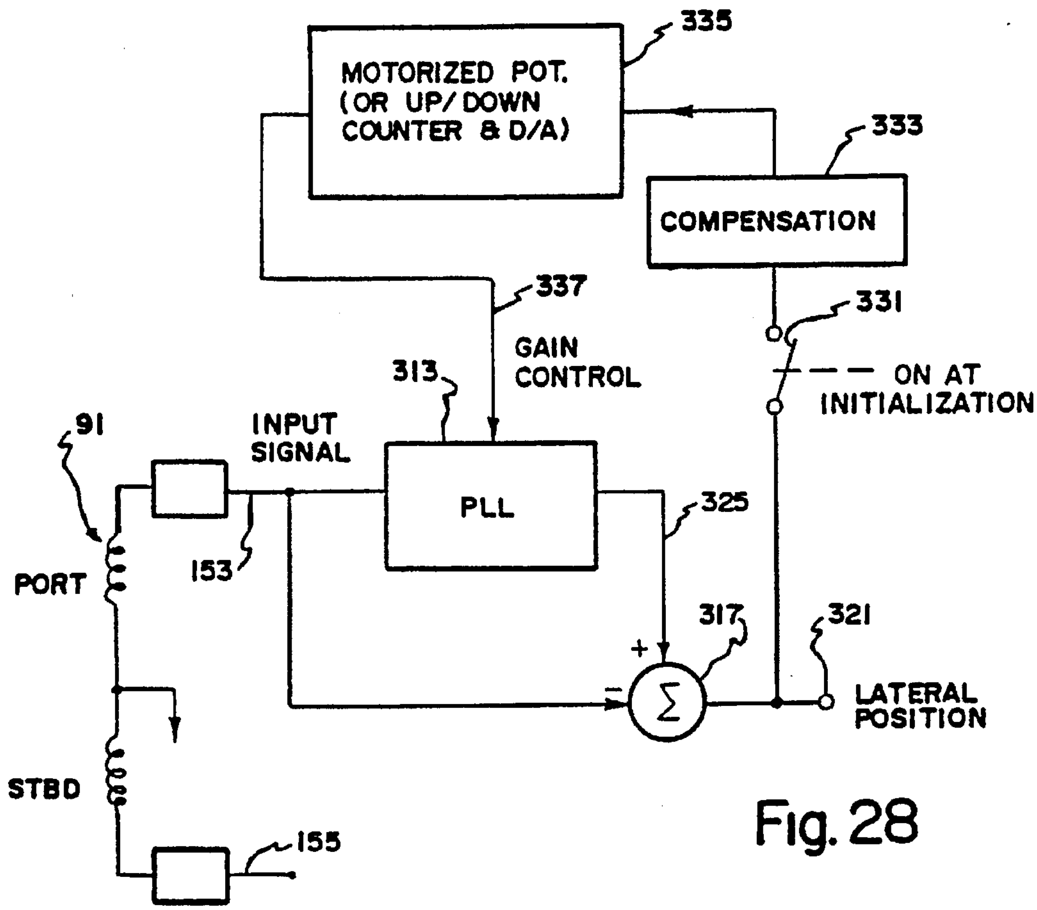
FIG. 28 block diagram of an alternative embodiment of the invention that uses phase-locked oscillators in a portion of the system for processing signals from lateral-position-detecting antennas.
Figure 29:
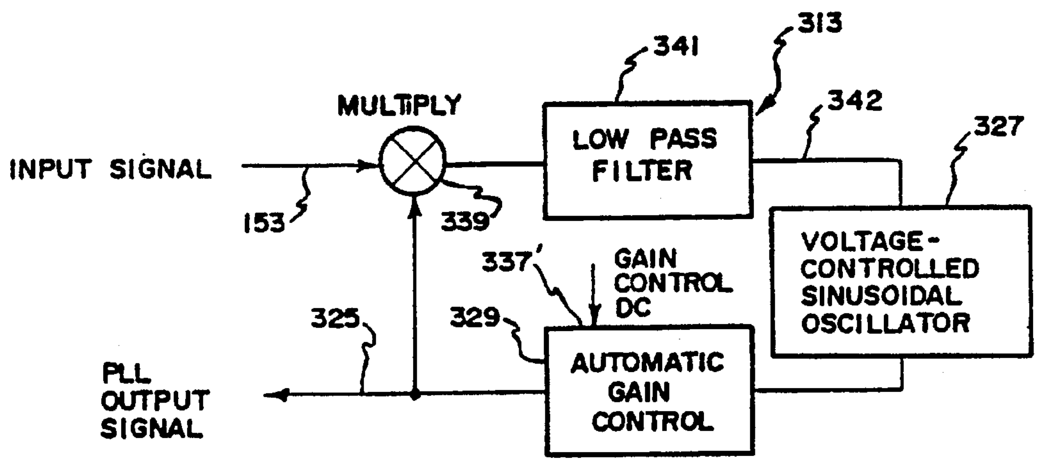
FIG. 29 block diagram of a phase-locked oscillator having automatic gain control, used in FIG. 28.

An alternative embodiment of the apparatus for determining lateral position of a vehicle incorporates a phase-locked loop (PLL). FIGS. 28 and 29 show this embodiment, which is an AC biasing system for compensating for (i.e., subtracting) the component of signal that is received at antenna 91 directly from the transmitting antenna 71.

The filtered and amplified signals from the lateral receiving antenna 91 are at terminals 153, 155 of FIGS. 15 and 28. The left-side signal at 153 is input to PLL 313 and subtracted in a summing amplifier 317 from the output (at 325) of the PLL 313, as shown in FIG. 28. The difference is a voltage at terminal 321, whose amplitude is approximately proportional to the vehicle's lateral position. The PLL 313 is shown in more detail in FIG. 29. The output 325 of the PLL 313 is the output of a sinusoidal voltage-controlled oscillator (VCO) 327, which is part of the PLL 313, as made clear by FIG. 29. The right-side signal at terminal 155 is processed by similar circuits.

The VCO 327 produces a signal whose phase is locked to the phase of the input signal 153. This is accomplished by multiplying the output of oscillator 327 (as modified by a gain-control circuit 329, under control of DC voltage at a terminal 337) in a multiplier 339. The output of 339 is a DC signal representative of the phase difference, or phase error, between the output of the VCO 327 and the input signal 153, and is attempted to be driven to zero by the PLL.

This DC signal enters a lowpass filter 341, whose output at 342 is used to control the phase of the VCO 327, (the oscillator's frequency being the time rate of change of its phase). This arrangement provides a final output signal at terminal 325, which is a robust AC signal having the same phase as that of the input signal 153. The circuit of FIG. 29 is block 313 of FIG. 28.

To make this alternative embodiment more refined, the automatic gain control 329 is employed during initialization to set up the amplitude of the output of the VCO 327 to be equal to the signal voltage at the terminal 153 under conditions described below.

The operation of the embodiment shown in FIGS. 28 and 29 is as follows. The phase of the left signal is tracked by the PLL 313 of FIG. 28 (as the phase of the right signal is tracked by a corresponding PLL). The PLL 313 provides at its output 325 a signal of pre-adjusted amplitude (which is set upon initialization), and of phase that tracks the phase of the received signal at terminal 155.

Initialization is performed far away from floor wires. The only input signal at that time is that which is induced directly in antenna 91 by a magnetic field produced by the transmitting antenna 71. To initialize the system a switch 331 is closed and a motorized potentiometer 335 (or alternatively an up/down counter and a D/A converter) are adjusted to achieve a DC level at terminal 337 such that the output signal of the PLL 313 is at a certain amplitude. That certain amplitude is the value at which the PLL's output signal 325 is exactly equal to the input signal 155 as determined by the summing amplifier 317.

The switch 331 is then opened. The motorized pot 335 remains in the position in which it was set during initialization. It continues to control the gain of block 329 via terminal 337 so that the amplitude of the output signal at 325 from the PLL 313 remains the same as it was at initialization. If the signal 155 changes in amplitude, the lateral position signal at output 321 changes.

The signal at terminal 321 can be bandpass filtered, fullwave rectified, subtracted from the signal of the right-side receiving antenna, and used for control in the same manner as is shown starting with terminal 155 in the embodiment of FIG. 14.

Alternative Transmitting Antenna Placement

Figure 30:
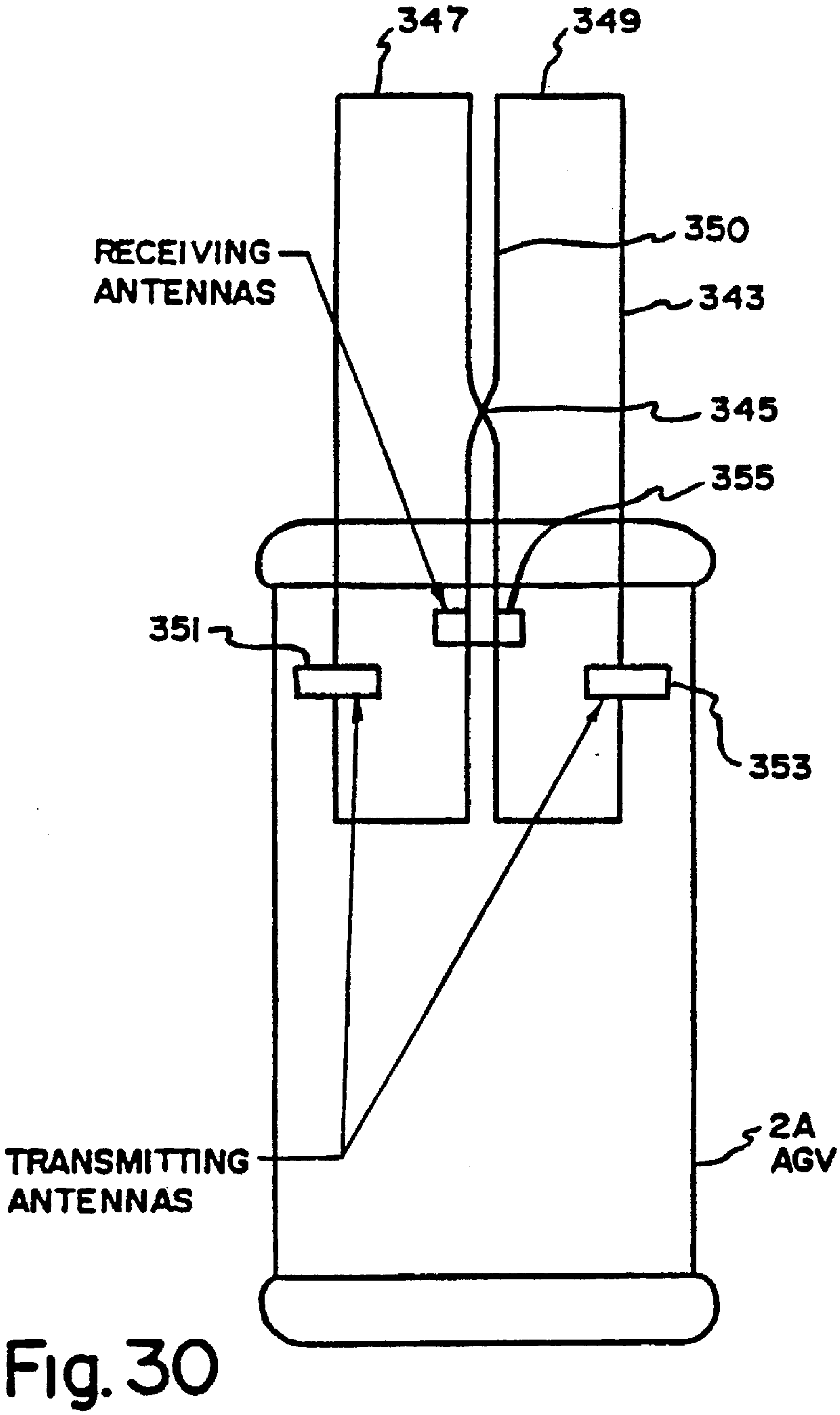
FIG. 30 plan view showing an alternative embodiment having different transmitting antenna locations on a vehicle and a passive wire loop on the ground at a terminal, in which the two lobes of the passive wire loop are in a side-by-side configuration.

FIG. 30 illustrates an alternative technique for passive loop positioning of a vehicle in a terminal that is equipped with a passive loop. The passive loop 343 in this embodiment is a coil of wire with its ends connected together so as to form a closed loop, and which is flopped over at a point such as point 345 so that it forms a left-hand loop 347 and a right-hand loop 349.

Magnetic fields produced by current in the loop reinforce, i.e., they are additive, in the center leg 350 where two wire segments lie close to each other. The transmitting antenna system comprises two antennas (coils) 351 and 353, on separate cores, which are spaced apart by an amount that places them over the outside legs of the folded loop 343. The coils 351 and 353 are phased so as to reinforce each other in inducing current in the loop 343. The receiving antenna assembly 355 is the same as was described earlier.

Another Embodiment

An alternative embodiment of the terminal-positioning mode of the vehicle navigation and guidance apparatus processes the received signals differently than described above. This alternative embodiment is adequately describable without a separate figure. It has equipment that subtracts the two rectified signals that come from the rectifiers 113, 115 of FIG. 12A. Their difference is a voltage approximately proportional to the lateral position of the vehicle. In this embodiment it is best for the two direct signals from the transmitting antenna assembly 71, which are received by the two receiving coils 95, 97, to be of equal strength. Equality of direct signals is achieved by adjusting the position of the receiving antenna assembly 91 with respect to the transmitting antenna assembly 71.

Automatic Bias-Setting Embodiment

An alternative embodiment provides automatic setting of the biases 129A and 129B of FIG. 12B; such automatic setting is a calibration step for the Proportional Positioning System. Bias setting compensates for an undesired offset of the receiving antenna's signal (see FIG. 7), caused by energy that is directly magnetically coupled from the transmitting antenna 71 to the receiving antenna 91 (i.e., energy not received via the passive loop 55).

The Proportional Positioning System is a portion of the AGV described elsewhere herein. It includes, as shown on FIG. 4B, the on-board magnetic transmitter 68, the passive loop 55, the lateral-position antenna of block 47, the lateral-channel preamplifier 109, the Passive Lateral Subchannel including terminals 113A and 118, and the A/D converter 135.

The preamplifier 109 is shown again in the more detailed schematic diagram of FIG. 12A, whose circuit is continued on FIG. 12B. FIGS. 12A and 12B, whose output is at terminal 118, depict only a manual bias-setting circuit, 129A and 129B.

In the alternative currently preferred automatic embodiment now to be described (see FIG. 31.), the signal at a bias terminal 361 is an automatically controlled zero-to-five-volt bias for offsetting the direct magnetic coupling component from the transmitting antenna 71. The automatic bias-setting circuit as a whole is a closed loop that, during calibration, provides whatever voltage is necessary at terminal 361 to make the voltage at terminal 362 equal zero.

The automatic bias-setting circuit makes precise adjustment of the location of the transmitting antenna unnecessary and enables easy compensation for aging of components, etc. Circuitry of this type is preferably provided for both of the receiving coils 95, 97.

Figure 31:
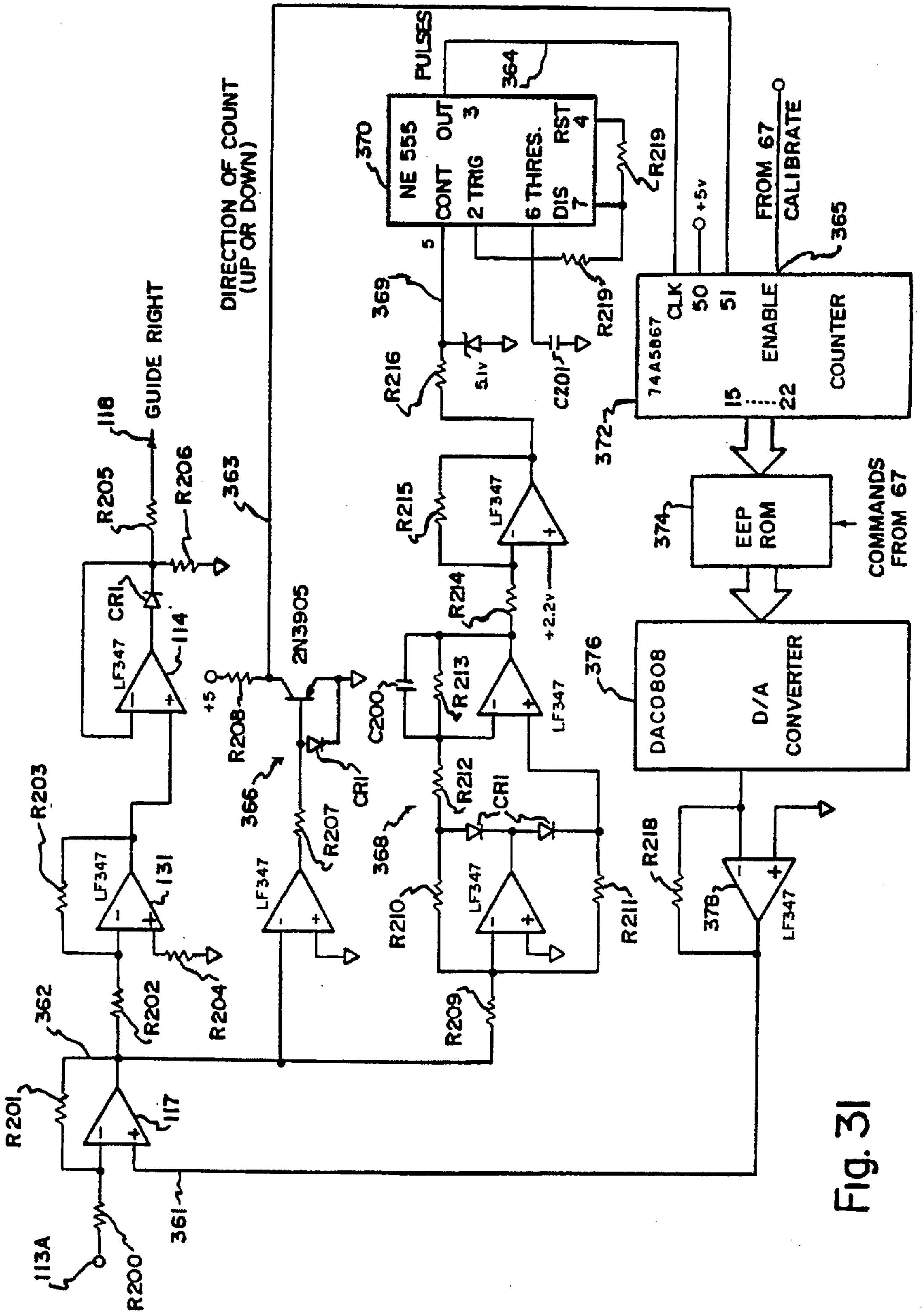
FIG. 31 a circuit diagram reproducing circuits from the top line of FIG. 12B and showing thereto connected circuits for calibration of an automatic offset adjust which compensates for offsets in antenna null measurements.

The components of the automatic circuit and their interconnections are shown in the circuit diagram of FIG. 31. To show how the circuit interfaces with the other AGV circuits, the top line of FIG. 12B is reproduced as the top line of FIG. 31, except with the automatic bias circuit replacing the manual bias circuit 129A.

As seen in FIG. 31, an analog signal at output terminal 362 of amplifier 117 is conducted to a digitizing circuit 366, which consists of an inverting amplifier and a transistor clipping circuit. Circuit 366 produces a logic 1 level at its output terminal 363 if the signal at terminal 362 is positive, and a logic 0 level at terminal 363 if terminal 362 is negative.

Terminal 363 is connected to a counter 372, which also has a clock input terminal 364 for receiving pulses that are to be counted. The direction of counting is determined by the logic level of terminal 363. The count is incremented upon occurrence of a clock pulse of terminal 363 currently has a logic 1, and decremented if terminal 363 has a logic 0. Counter 372 is a model 74AS867, manufactured commercially by the Company of Texas Instruments Inc., Dallas, Tex. 75265.

Another subcircuit 368 performs the function of generating clock pulse signals at a controllable frequency. The absolute-value circuit 368, whose input is at terminal 362, provides an analog voltage at an output terminal 369. The analog voltage at 369 is the magnitude of the signal of terminal 362, so terminal 369 is never negative, irrespective of the polarity of the bipolar signal at terminal 362.

Terminal 369 is connected to a voltage-controlled digital oscillator 370; it produces output pulses at a frequency that depends upon the control voltage at terminal 369. The oscillator 370 provides output pulses at a terminal 364, which are conducted to the clock input terminal of the counter 372. The oscillator 370 is a model NE555, manufactured commercially by Texas Instrument, Inc., Dallas, Tex. 75265.

The count contents of the counter 372 are connected to an EEPROM (Electronically Erasable Programmable Read-Only Memory) 374, which is optional in this circuit. The EEPROM is capable of storing the count when it is commanded to do so by the outer loop microprocessor 67. The output of the EEPROM is connected to a (digital-to-analog) converter 376, which is a model DAC0808, manufactured commercially by National Semiconductor Company of Santa Clara, Calif., 58090.

The analog output of the D/A converter 376 is inverted in an amplifier 378, whose output is connected to the bias terminal 361 of the amplifier 117.

Operation of the circuit is as follows. The calibration process is performed at a time when the vehicle is not over a wire. At such a time antenna 91 is not receiving any component of signal via wires on the ground. To start a calibration (bias setting) the outer loop microprocessor 67 sends a calibration-command bit to an "enable" terminal 365 of the counter 372.

If the voltage at terminal 362 is negative, the binary signal at terminal 363 is low, which causes the direction of counting of the counter 372 to be downward. The decreasing count passes through the EEPROM 374 and causes the D/A converter 376 to receive less input current, causing the voltage at the bias terminal 361 to increase. That makes the voltage at terminal 362 less negative, so the 362 voltage moves toward a null.

Conversely, if terminal 362 is positive, the signal at terminal 363 goes high, which causes the counter 372 to count upward, and causes the D/A converter 376 to receive more input current, causing the voltage of terminal 361 to decrease. Thereupon, the voltage at terminal 362 decreases toward zero.

The frequency of pulses at the clock input terminal of the counter 372 depends inversely upon the magnitude of the voltage at terminal 362; a greater magnitude results in a greater frequency of the pulses that are counted by the counter 372. Consequently the offset calibration signal at terminal 361 approaches a final value faster when it has farther to go. It reaches a final value when the voltage at terminal 362 is zero, which reduces the counting rate at terminal 364 to zero. The counter 372 retains its count contents, so the proper bias voltage remains on the bias terminal 361.

If the optional EEPROM 374 is provided, the vehicle need not be calibrated anew every time it is started. After a calibration the EEPROM is commanded by the outer loop microprocessor 67 to read the output of the counter 372 and store the value in its memory. The EEPROM therefore can reproduce the count that was in the counter 372 just before the power was turned off, and if it is still an appropriate value the calibration need not be repeated.

The following table comprises a list of components and component types or values for circuits seen in FIGS. 6, 12A, 12B, 15, 16A, 16B, 17A, 17B, 18, 19, 20, 21, 22, and 31:

| Number | Name | Value or Type |
|---|---|---|
| C3 | Capacitor | .22 μf |
| C6 | Capacitor | .22 μf |
| C9 | Capacitor | .1 μf |
| C9' | Capacitor | .01 μf |
| C10 | Capacitor | 2.2 μf |
| C12 | Capacitor | 1 μf |
| C15 | Capacitor | .27 μf |
| C16 | Capacitor | .22 μf |
| C17' | Capacitor | 1 μf |
| C19 | Capacitor | 10 μf |
| C20 | Capacitor | 10 μf |
| C21 | Capacitor | 10 μf |
| C22 | Capacitor | 10 μf |
| C23 | Capacitor | 10 μf |
| C24 | Capacitor | 10 μf |
| C25 | Capacitor | .847 μf |
| C27 | Capacitor | 10 μf |
| C28 | Capacitor | .047 μf |
| C28' | Capacitor | 8.8 μf |
| C29 | Capacitor | 10 μf |
| C31 | Capacitor | .1 μf |
| C31' | Capacitor | 8.8 μf |
| C32 | Capacitor | 10 μf |
| C34 | Capacitor | .1 μf |
| C35 | Capacitor | .1 μf |
| C38 | Capacitor | 10 μf |
| C38' | Capacitor | 2.2 μf |
| C41 | Capacitor | .22 μf |
| C47 | Capacitor | 2.2 μf |
| C48 | Capacitor | 4700 μf |
| C49 | Capacitor | .022 μf |
| C50 | Capacitor | .1 μf |
| C51 | Capacitor | .0047 μf |
| C52 | Capacitor | .0047 μf |
| C59 | Capacitor | .847 μf |
| C60 | Capacitor | .047 μf |
| C61 | Capacitor | .22 μf |
| C67 | Capacitor | 2.2 μf |
| C68 | Capacitor | 4700 μf |
| C69 | Capacitor | .022 μf |
| C70 | Capacitor | .1 μf |
| C72 | Capacitor | 10 μf |

-continued

| Number | Name | Value or Type |
|---|---|---|
| CR1 | Diode | 1N4148 |
| CR2 | Diode | 1N4848 |
| CR3 | Diode | 1N5234 |
| CR4 | Diode | 1N5234 |
| CR5 | Diode | 1N4148 |
| CR6 | Diode | 1N4l48 |
| CR8 | Diode | 1N4148 |
| CR10 | Diode | 1N4148 |
| CR11 | Diode | 1N5234 |
| CR12 | Diode | 1N5234 |
| CR13 | Diode | 1N4148 |
| CR14 | Diode | 1N4148 |
| CR17 | Diode | 1N4148 |
| CR18 | Diode | 1N4148 |
| CR19 | Diode | 1N4148 |
| CR23 | Diode | 1N4148 |
| CR24 | Diode | 1N4148 |
| CR25 | Diode | 1N4148 |
| CR26 | Diode | 1N4148 |
| CR27 | Diode | 1N4148 |
| CR28 | Diode | 1N4148 |
| CR29 | Diode | 1N4148 |
| CR30 | Diode | 1N4148 |
| CR31 | Diode | 1N4148 |
| CR32 | Diode | 1N4148 |
| U1 | Switches/Gates | LF11202D |
| U11 | | DC383 |
| U12 | Switches/Gates | 7402 |
| U13 | Switches/Gates | 7402 |
| U14 | Switches/Gates | LF11202D |
| U17 | Switches/Gates | LF1202D |
| U24 | Switches/Gates | LF11202D |
| U29 | Switches/Gates | LF11202D |
| U30 | Switches/Gates | 7404 |
| L1 | Inductors | 50 mH |
| L2 | Inductors | 50 mH |
| L3 | Inductors | 50 mH |
| L4 | Inductors | 72.4 mH |
| L7 | Inductors | 72.4 mH |
| L8 | Inductors | 50 mH |
| L9 | Inductors | 50 mH |
| L10 | Inductors | 50 mH |
| L11 | Inductors | 72.4 mH |
| L12 | Inductors | 72.4 mH |
| E1 | Jumpers | |
| E2 | Jumpers | |
| U2 | Oper.Amp. | LF347 |
| U4 | Oper.Amp. | LF347 |
| U5 | Oper.Amp. | LF347 |
| U5' | Oper.Amp. | LM675T |
| U6 | Oper.Amp. | LM675T |
| U8,U8' | Oper.Amp. | LF347 |
| U19 | Oper.Amp. | LF347 |
| U20 | Oper.Amp. | LF347 |
| U23 | Oper.Amp. | LF347 |
| U25 | Oper.Amp. | LF347 |
| U26 | Oper.Amp. | LF347 |
| U28 | Oper.Amp. | LF347 |
| R2 | Resistor | 301 Ohms |
| R3 | Resistor | 3.57K Ohms |
| R4 | Resistor | 63.4K Ohms |
| R4' | Resistor | 165K Ohms |
| R5 | Resistor | 1K Ohms |
| R5' | Resistor | 15K Ohms |
| R6 | Resistor | 1.4K Ohms |
| R6' | Resistor | 1K Ohms |
| R7 | Resistor | 1K Ohms |
| R7' | Resistor | 301 Ohms |
| R8 | Resistor | 1K Ohms |
| R8' | Resistor | 3.57K Ohms |
| R9 | Resistor | 12.1K Ohms |
| R9' | Resistor | 80.6K Ohms |
| R10 | Resistor | 1K Ohms |
| R10' | Resistor | 165K Ohms |
| R11 | Resistor | 165K Ohms |
| R11' | Resistor | 100K Ohms |
| R12 | Resistor | 10K Ohms |
| R13 | Resistor | 1.4K Ohms |

-continued

| Number | Name | Value or Type |
|---|---|---|
| R13' | Resistor | 10K Ohms |
| R14 | Resistor | 1K Ohms |
| R14' | Resistor | 10K Ohms |
| R15 | Resistor | 1K Ohms |
| R15' | Resistor | 100K Ohms |
| R16 | Resistor | 27.4K Ohms |
| R16' | Resistor | 10K Ohms |
| R17 | Resistor | 165K Ohms |
| R18 | Resistor | 1K Ohms |
| R18' | Resistor | 69.8K Ohms |
| R18" | Resistor | 10K Ohms |
| R19 | Resistor | 10K Ohms |
| R19' | Resistor | 499 Ohms |
| R20 | Resistor | 1K Ohms |
| R20' | Resistor | 33.2K Ohms |
| R21 | Resistor | 38.3K Ohms |
| R21' | Resistor | 1M Ohms |
| R22 | Resistor | 80.6K Ohms |
| R22' | Resistor | 165K Ohms |
| R23 | Resistor | 1K Ohms |
| R23' | Resistor | 100K Ohms |
| R24 | Resistor | 10K Ohms |
| R24' | Resistor | 100 Ohms |
| R25 | Resistor | 10K Ohms |
| R25" | Resistor | 100 Ohms |
| R26 | Resistor | 10K Ohms |
| R26' | Resistor | 22.1K Ohms |
| R27 | Resistor | 10K Ohms |
| R27' | Resistor | 121 Ohms |
| R28 | Resistor | 10K Ohms |
| R28' | Resistor | 100 Ohms |
| R29 | Resistor | 10K Ohms |
| R29' | Resistor | 200K Ohms |
| R30 | Resistor | 10K Ohms |
| R30' | Resistor | 110K Ohms |
| R31 | Resistor | 20K Ohms |
| R31' | Resistor | 51.1K Ohms |
| R32 | Resistor | 2.74K Ohms |
| R32' | Resistor | 4.99K Ohms |
| R33 | Resistor | 1 1/2 watt Ohms |
| R33' | Resistor | 8.06K Ohms |
| R34 | Resistor | 1 Ohms |
| R34' | Resistor | 1K Ohms |
| R35 | Resistor | 9.1K Ohms |
| R36 | Resistor | 1.1K Ohms |
| R37 | Resistor | 110K Ohms |
| R38 | Resistor | 10K Ohms |
| R39 | Resistor | 10K Ohms |
| R40 | Resistor | 1 Ohms |
| R40' | Resistor | 221K Ohms |
| R41 | Resistor | 127K Ohms |
| R41' | Resistor | 10K Ohms |
| R42 | Resistor | 15.4K Ohms |
| R42' | Resistor | 10K Ohms |
| R43 | Resistor | 10K Ohms |
| R44 | Resistor | 1K Ohms |
| R45 | Resistor | 10K Ohms |
| R47 | Resistor | 604K Ohms |
| R49 | Resistor | 1K Ohms |
| R50 | Resistor | 10K Ohms |
| R51 | Resistor | 49.9K Ohms |
| R52 | Resistor | 10K Ohms |
| R53 | Resistor | 10K Ohms |
| R54 | Resistor | 604K Ohms |
| R55 | Resistor | 49.9K Ohms |
| R56 | Resistor | 20K Ohms |
| R57 | Resistor | 1K Ohms |
| R58 | Resistor | 20K Ohms |
| R59 | Resistor | 1K Ohms |
| R60 | Resistor | 100 Ohms |
| R61 | Resistor | 1K Ohms |
| R61' | Resistor | 1K Ohms |
| R62 | Resistor | 137K Ohms |
| R62' | Resistor | 100 Ohms |
| R63 | Resistor | 15K Ohms |
| R63' | Resistor | 100 Ohms |
| R64 | Resistor | 1.4K Ohms |
| R65 | Resistor | 1K Ohms |

-continued

| Number | Name | Value or Type |
|---|---|---|
| R66 | Resistor | 1K Ohms |
| R67 | Resistor | 12.1K Ohms |
| R68 | Resistor | 137K Ohms |
| R69 | Resistor | 137K Ohms |
| R70 | Resistor | 10K Ohms |
| R71 | Resistor | 1.4K Ohms |
| R72 | Resistor | 1K Ohms |
| R73 | Resistor | 1K Ohms |
| R74 | Resistor | 27.4K Ohms |
| R75 | Resistor | 137K Ohms |
| R76 | Resistor | 10K Ohms |
| R77 | Resistor | 10K Ohms |
| R78 | Resistor | 1K Ohms |
| R79 | Resistor | 1M Ohms |
| R80' | Resistor | 165K Ohms |
| R81 | Resistor | 100K Ohms |
| R81' | Resistor | 100 Ohms |
| R82 | Resistor | 10K Ohms |
| R83 | Resistor | 10K Ohms |
| R84 | Resistor | 10K Ohms |
| R85 | Resistor | 10K Ohms |
| R86 | Resistor | 10K Ohms |
| R87 | Resistor | 200K Ohms |
| R88 | Resistor | 10K Ohms |
| R89 | Resistor | 20K Ohms |
| R90 | Resistor | 4.99K Ohms |
| R91 | Resistor | 8.06K Ohms |
| R92 | Resistor | 1K Ohms |
| R97 | Resistor | 100K Ohms |
| R98 | Resistor | 100K Ohms |
| R107 | Resistor | 845K Ohms |
| R108 | Resistor | 165K Ohms |
| R109 | Resistor | 1.4K Ohms |
| R110 | Resistor | 15K Ohms |
| R111 | Resistor | 13.3K Ohms |
| R112 | Resistor | 9.9K Ohms |
| R113 | Resistor | 165K Ohms |
| R114 | Resistor | 845K Ohms |
| R115 | Resistor | 4.99K Ohms |
| R116 | Resistor | 10K Ohms |
| R117 | Resistor | 10K Ohms |
| R118 | Resistor | 9.09K Ohms |
| R119 | Resistor | 4.53K Ohms |
| R120 | Resistor | 27.4K Ohms |
| R121 | Resistor | 56.2K Ohms |
| R122 | Resistor | 22.1K Ohms |
| R124 | Resistor | 28.7K Ohms |
| R126 | Resistor | 28.7K Ohms |
| R127 | Resistor | 8.06K Ohms |
| R128 | Resistor | 25.5K Ohms |
| R129 | Resistor | 23.2K Ohms |
| R133 | Resistor | 25.5K Ohms |
| R134 | Resistor | 8.06K Ohms |
| R136 | Resistor | 100K Ohms |
| R137 | Resistor | 49.9K Ohms |
| R138 | Resistor | 49.9K Ohms |
| R139 | Resistor | 100K Ohms |
| R141 | Resistor | 10K Ohms |
| R142 | Resistor | 10K Ohms |
| R143 | Resistor | 10K Ohms |
| R144 | Resistor | 10K Ohms |
| R145 | Resistor | 100 Ohms |
| R146 | Resistor | 100 Ohms |
| R147 | Resistor | 10K Ohms |
| R148 | Resistor | 10K Ohms |
| R149 | Resistor | 1K Ohms |
| R150 | Resistor | 10K Ohms |
| R151 | Resistor | 10K Ohms |
| R152 | Resistor | 100 Ohms |
| R153' | Resistor | 1K Ohms |
| R154 | Resistor | 35.7K Ohms |
| R155 | Resistor | 35.7K Ohms |
| R156 | Resistor | 1.21K Ohms |
| R157 | Resistor | 15K Ohms |
| R158 | Resistor | 15K Ohms |
| R159 | Resistor | 47.5K Ohms |
| R160 | Resistor | 82.5K Ohms |
| R161 | Resistor | 845K Ohms |

-continued

| Number | Name | Value or Type |
|---|---|---|
| R162 | Resistor | 165K Ohms |
| R163 | Resistor | 1.4K Ohms |
| R167 | Resistor | 165K Ohms |
| R168 | Resistor | 845K Ohms |
| R164 | Resistor | 15K Ohms |
| R165 | Resistor | 13.3K Ohms |
| R166 | Resistor | 49.9K Ohms |
| R169 | Resistor | 4.99K Ohms |
| R170 | Resistor | 10K Ohms |
| R171 | Resistor | 10K Ohms |
| R172 | Resistor | 9.09K Ohms |
| R173 | Resistor | 4.53K Ohms |
| R174 | Resistor | 10K Ohms |
| R175 | Resistor | 10K Ohms |
| R176 | Resistor | 27.4K Ohms |
| R177 | Resistor | 56.2K Ohms |
| R178 | Resistor | 22.1K Ohms |
| R180 | Resistor | 47.5K Ohms |
| R181 | Resistor | 47.5K Ohms |
| R182 | Resistor | 3.32K Ohms |
| R183 | Resistor | 10K Ohms |
| R183' | Resistor | 27.4K Ohms |
| R184 | Resistor | 100K Ohms |
| R185 | Resistor | 100K Ohms |
| R187 | Resistor | 10K Ohms |
| R189 | Resistor | 10K Ohms |
| R190 | Resistor | 150K Ohms |
| R191 | Resistor | 10K Ohms |
| R192 | Resistor | 1K Ohms |
| R200 | Resistor | 10K Ohms |
| R201 | Resistor | 10K Ohms |
| R202 | Resistor | 1K Ohms |
| R203 | Resistor | 20K Ohms |
| R204 | Resistor | 1K Ohms |
| R205 | Resistor | 100 Ohms |
| R206 | Resistor | 2K Ohms |
| R207 | Resistor | 2K Ohms |
| R208 | Resistor | 2K Ohms |
| R209 | Resistor | 10K Ohms |
| R210 | Resistor | 10K Ohms |
| R211 | Resistor | 10K Ohms |
| R212 | Resistor | 10K Ohms |
| R213 | Resistor | 100K Ohms |
| R214 | Resistor | 10K Ohms |
| R215 | Resistor | 10K Ohms |
| R216 | Resistor | 1K Ohms |
| R217 | Resistor | 3.3K Ohms |
| R218 | Resistor | 10K Ohms |
| R219 | Resistor | 3.3KR Ohms |
| Q1 | Transistor | 2N2222 |
| Q2 | Transistor | 2N2222 |
| Q3 | Transistor | 2N2222 |
| Q4 | Transistor | 2N2222 |
| Q5 | Transistor | 2N2222 |

Vehicle Navigation and Guidance

As earlier disclosed, vehicle 2A comprises a plurality of navigation and guidance systems. Under control of AGVC 13, vehicle 2A selectively guides over guidewire routes 3, in terminals 11, and along a ground marked route 5, performing autonomous or self-contained guidance between ground markers 6. Guidance along a guide wire is known in the art and will not be further covered herein.

Autonomous of Self-Contained Guidance

In the currently preferred embodiment, each vehicle 2A uses feedback from a linear encoder 58 from each wheel for autonomous or self-contained guidance. Aperiodic measurement of position and direction from update markers 6 and the angular rate sensor system (commonly called gyro 500) provide sufficient redundancy of measurement to correct positional and directional errors and allow the allocation and application of real time calibrations to correct for angular rate sensor drift, temperature changes, aging and wear of linear measurement components, and the like. In the currently preferred embodiment, the inertial guidance system provides a vehicle guidance accuracy of an error having a standard deviation of 2 inches over travel of fifty feet between ground markers 6. While such accuracy is not sufficiently accurate for travel within a terminal, it is adequate for travel on the floor of a facility. As described earlier, terminal positioning guidance of the currently preferred embodiment provides a maximum error of ±¼ inch.

Figure 56:
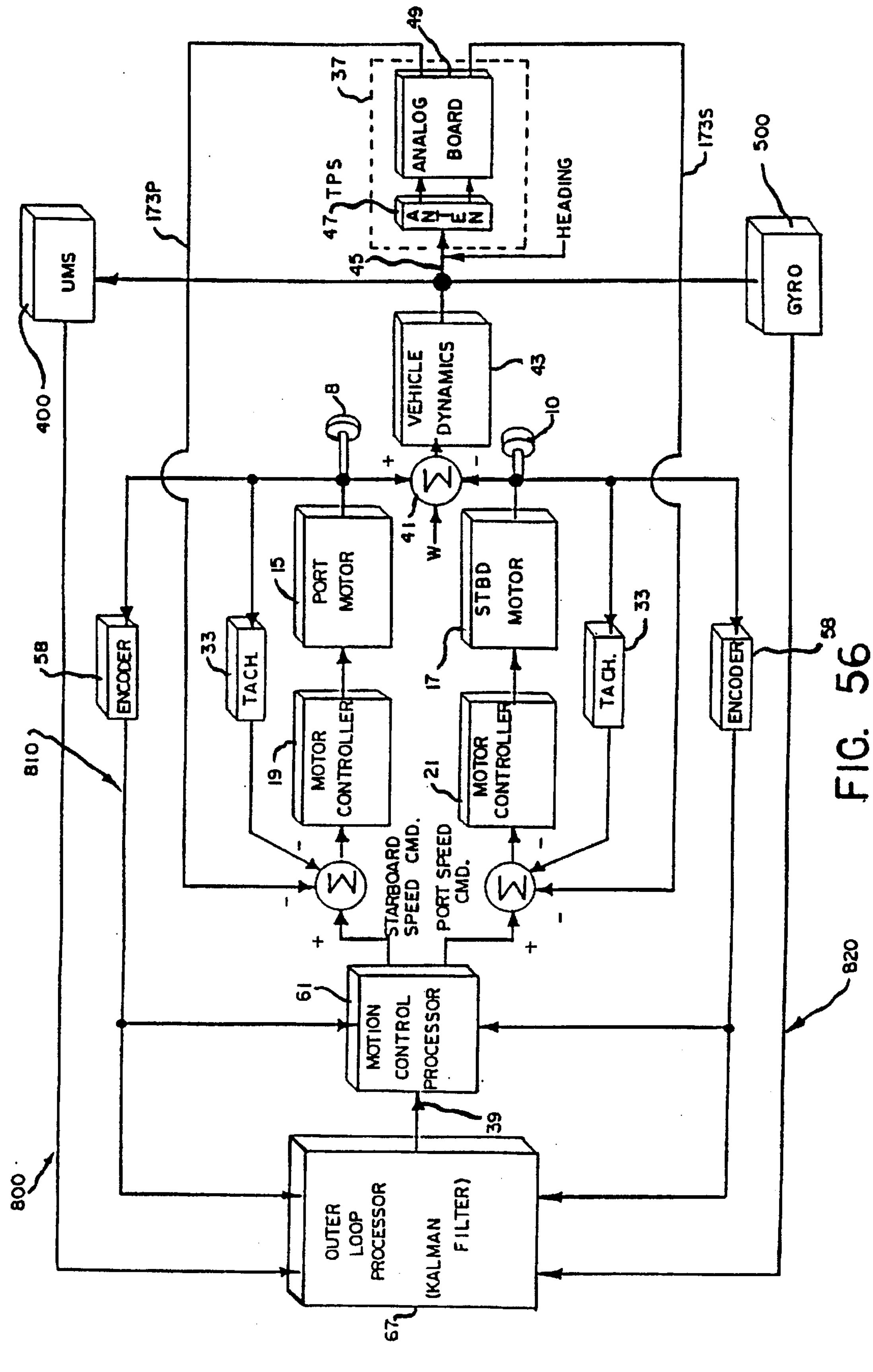
FIG. 56 is a block diagram of a vehicle navigation and guidance system showing relationships between outer and innerloop (motion control processor) control elements.

A block diagram of navigation and guidance system 800 is seen in FIG. 56. Note that the contents of FIG. 56 comprise all of the elements of FIG. 4A plus an outer loop comprising an update marker system (UMS) block 400, an angular rate sensor block (gyro block 500), and an outer loop processor block 67. The outer loop may be considered to comprise the navigational system while the inner loop (that which resides inside the outer loop) may be considered to comprise the guidance system.

Thus, the components of the outer loop are used to aperiodically provide measurement of position and direction as vehicle 2A travels across a marker 6 and reads direction from gyro 500 to provide updates from time to time. After readings are taken from blocks 400 and 500, a Kalman filter calculation is made whereby the navigation and guidance position and direction are updated and real time calibrations are made. Kalman calculations and calibrations are described in detail hereafter.

The Inertial Platform

Figure 57:
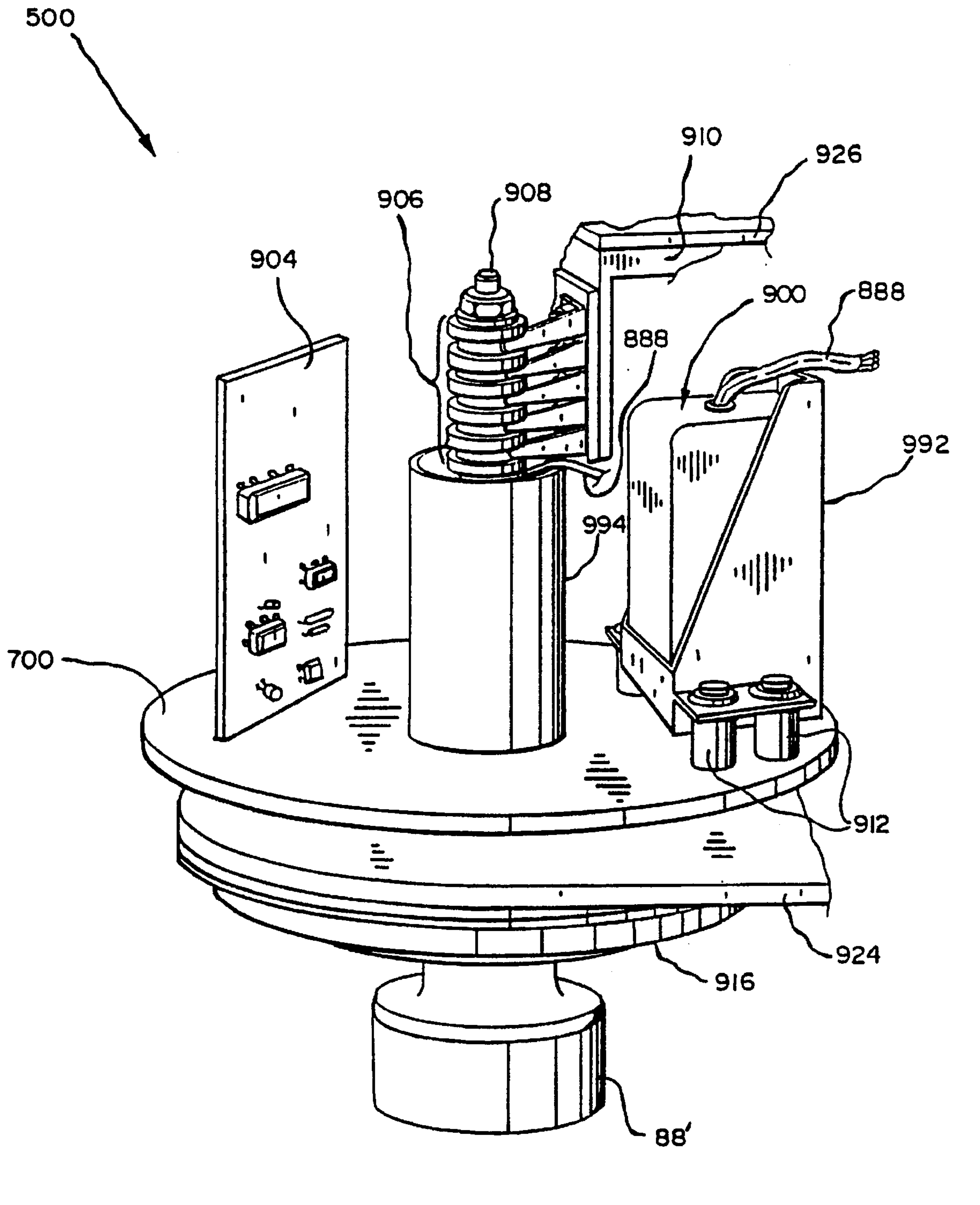
FIG. 57 is a simplified perspective of an inertial platform for the vehicle.

The inertial platform provides a source of angular measurements which are used in combination with estimates of vehicle 2A position from a ground marker 6 to update to AGV 2A control system. In combination, the ground marker and angular measurements need to provide sufficient precision and accuracy to maintain an acceptable guidepath error between each update. In the currently preferred embodiment, the acceptable guidepath error has a standard deviation of 2 inches in fifty feet of travel between ground markers 6. It is of primary importance that the combination of angular updates, inputs from the wheel encoders 58, and ground marker 6 position determinations, made successively, provide sufficient redundancy of vehicle 2A position and heading information that the errors due to deficiencies of the measuring devices comprising changes due to aging, wear, drift, and temperature, are correctable by real time calibration using Kalman filtering. Reference is made to FIG. 57 wherein the major elements of an inertial platform (commonly referred to as gyro 500) are seen. The major elements of gyro 500 comprise a printed circuit board 904 which contains gyro 500 control loop circuits, the angular rate sensor 900, the inertial table 700 comprising a motor 916 which continuously drives the angular displacement of angular rate sensor 900 to a null position, an angular rate to electrical signal encoder 58, and a slip ring assembly 906 and are centrally mounted in well 26 of vehicle 2A.

A package 901 (see FIG. 61) comprising heaters and insulators completely encompass angular rate sensor 900 and is affixed to support 992 which is shock mounted to inertial table 700 with stand-offs 912. On the opposite side of inertial table 700, printed circuit board 904 is firmly affixed in vertical orientation. A shaft is centrally disposed through and connected to moving parts of the gyro 500 comprising slip ring assembly 906, a hub 994 which firmly supports inertial table 700, a motor rotor 922 (seen in FIG. 60), and the moving parts of encoder 88'. Wires and other parts, such as circuit component details and power supply parts are not shown for clarity of presentation.

Electrical signals are transferred from the moving parts of inertial table 700 to non-moving parts through slip ring assembly 906. Of the five slip ring connections seen in slip ring assembly 906, four are used in the currently preferred embodiment. Non-moving parts of slip ring assembly 906 are supported by a nylon bracket 910 attached to an upper housing member 926, only partially seen in FIG. 57. Support for the inertial table is provided by mounting bracket 924, better seen in FIG. 60.

Figure 63:
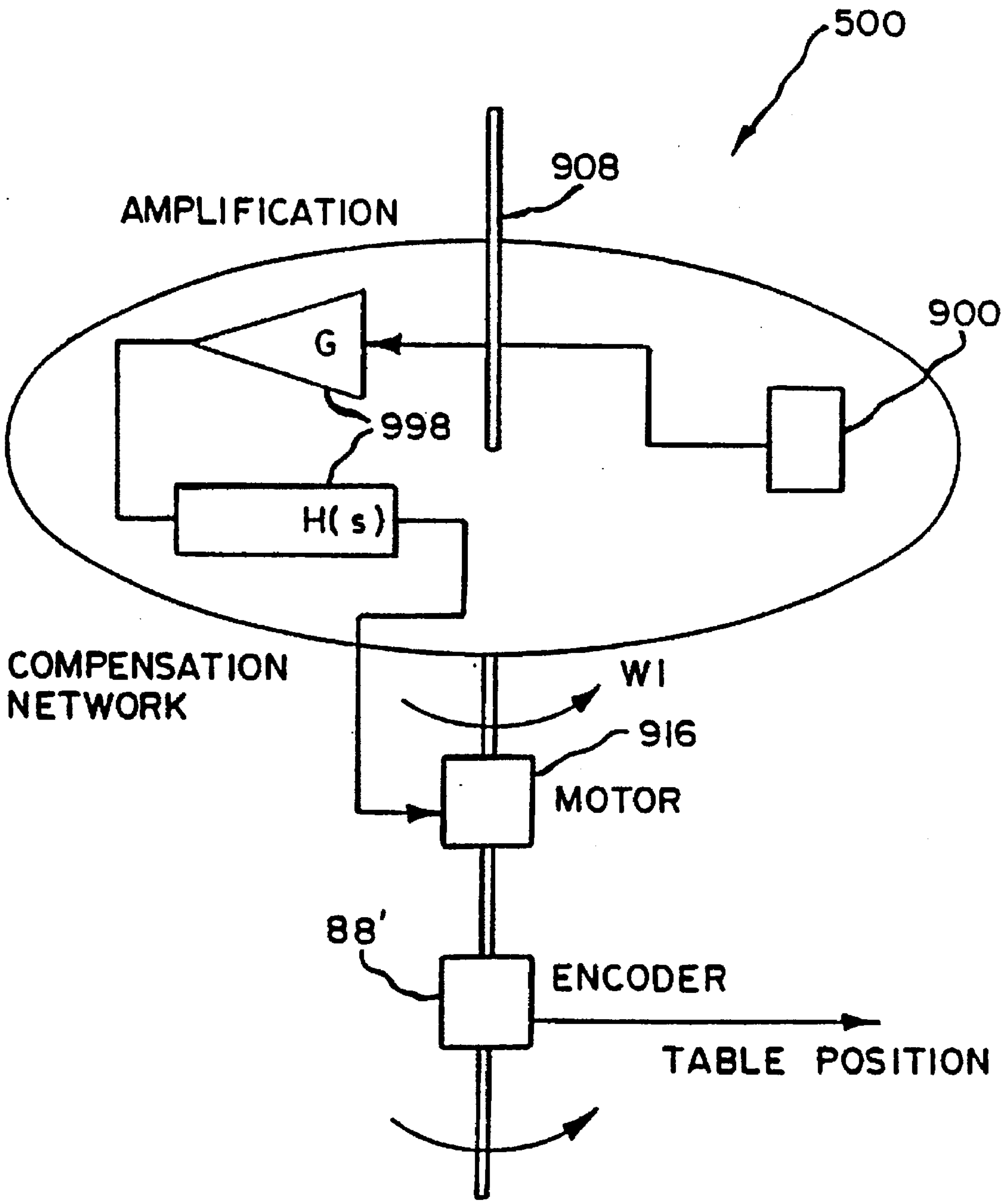
FIG. 63 is a block diagram of the inertial platform which is part of the stabilization and control loop.

A block diagram of the gyro 500 is seen in FIG. 63. A signal comprising the rate of angular change is sent to a network of amplification and compensation circuits 998 wherefrom feedback current to drive motor 916 is provided. Motor 916 is driven to maintain angular rate sensor 900 in a null direction. The angular travel of motor 916 is sensed by encoder 88' wherefrom a signal is provided to outerloop processor 67 for Kalman filtering and other processing.

Selection and processing the output of an angular rate sensor for an AGV vehicle is not trivial. All angular rate sensors drift or diverge as a function of time. As an example, navigation angular sensor drift rates are commonly in the range of 0.01 degrees/hour, submarine angular sensor drift rates are commonly more restrictive, in the range of 0.001 degrees/hour, while angular sensors may have as high a drift rate as 100 to 1,000 degrees/hour. The cost of an angular rate sensor normally increases significantly with decreases in rate of drift. The cost for very low drift rate angular rate sensors can be as much as the cost of an entire AGV 2A.

In addition, the angular rate sensor for an AGV 2A must have a rapid warm-up or response time. Some angular rate sensors, such as gas gyros, require up to one-half hour for warm-up. Maintenance of conventional angular sensors is also a concern. The common mean-time-between-servicing is commonly under 5000 hours for conventional angular sensors.

From a cost and maintenance perspective, the angular rate sensor selected for the currently preferred embodiment is suitable to the requirements of the invention. While other angular rate sensors can be used in the invention, the selected sensor is from a family of rate sensors (ARS-C121, ARS-C131, and ARS-C141) provided by Watson Industries, Inc., 3041 Melby Road, Eau Claire, Wis., 54701. Each of the family of rate sensors mentioned above provide full scale outputs at 30, 100, and 300 degrees/second, respectively. Model ARS-C121 is the selected product for the currently preferred embodiment of angular rate sensor 900 because it provides the greatest sensitivity over the range required. Use of the selected rate sensor requires the concurrent implementation of the inertial table 700 to eliminate the possibility of saturating measuring components.

The selected angular rate sensor 900 is an entirely solid state, "tuning fork", single axis sensor and utilizes piezoelectric vibrating beam technology to produce an inertial sensor with no moving parts. It provides an analog output voltage which is proportional to the angular rate about its sensing axis. At zero angular rate, the output is zero volts. Full scale angular rates produce an output of +10 or −10 volts, dependent upon direction of rotation. A dual power supply, providing regulated +15 and −15 volts, is required.

The selected angular rate sensor 900 has a drift rate which, if left uncorrected, would make sensor 900 unusable in the AGV 2A application. Surprisingly, however, use of redundant measurement and processing using a Kalman filter to periodically correct for and recalibrate the drift rate of selected angular rate sensor 900 provides a low cost, effective angular rate sensor for the AGV 2A application.

Figure 58:
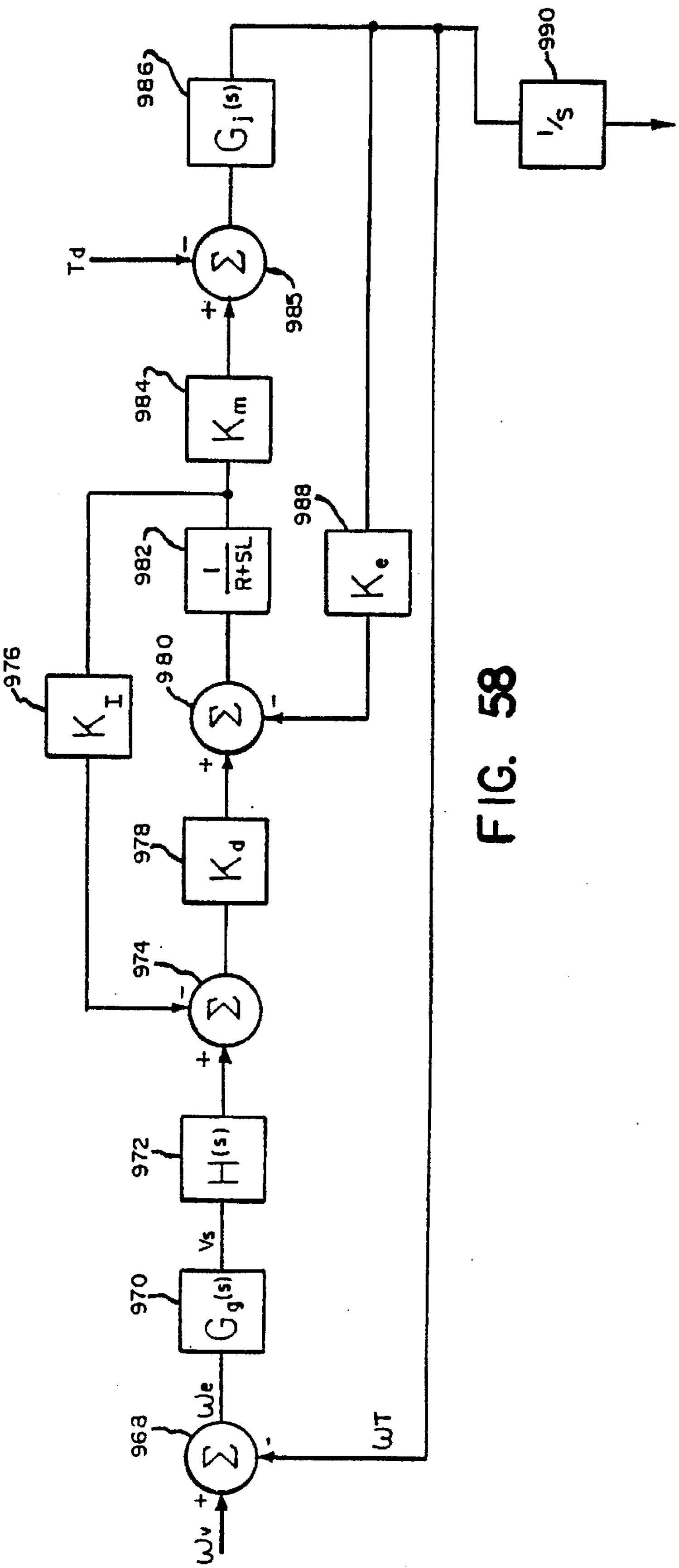
FIG. 58 is a block diagram of a model of the stabilization and control loop of the inertial platform.

A feedback control loop modeling operation of gyro 500 is seen in FIG. 58. Physical angular movement of AGV 2A provides positive input $\omega_v$ to summing block 968. Output from summing block 968 is error signal $\omega_e$ which provides input to function 970. Function 970, $G_g(s)$, provides a transfer function approximated by $K_g/(1+s\tau_g)$, wherein $K_g$ is equal to a gain of approximately 19 volts/radian/second in the currently preferred embodiment. The term $(1+s\tau_g)$ provides a low pass filter with a break frequency of $1/\tau_g$ equal to 300 radians/second.

Output of function 970 is a voltage signal, $V_S$ providing input to function 972. Function 972, H(s), converts $V_S$ to a current for input to summer 974. Output from summer 974 is function 978, $K_d$, which models driving amplifiers for pancake motor 916. The output of function 978 is provided to summer 980 wherein the physical properties of motor 916 are summed with the driving output of function 978. The drive properties of motor 916 are modeled by function 982 as 1/R+sL (R and L being the resistive and inductive properties of motor 916). The output of function 982, representing motor current, is fedback to function 976 which provides a gain control based upon sensed motor current to summer 974, whereby a better model for control of inertial guidance loop poles and zeroes is provided. The output of function 982 is further provided as input to function 984, which represents motor torque. Output of function 984 is directed to summing junction 985 which also receives a negative input $T_d$ representing torque disturbances comprising stiction. Output of summer 985 is connected to function 986 wherein the inertial responses of motor 916 and inertial table 700 are modeled providing an output representing angular velocity of motor 916. In the motor 916 selected for use in the currently preferred embodiment, motor inertia is negligible.

The output of function 986 is fedback through gain $K_e$ to summer 980. In addition, output of function 986 ($\omega\tau$) feeds back to summer 968, providing angular table error rate $\omega_e$. Further, output of function 986 is detected by an encoder 88' (see FIG. 63) and fed to a direction and integration circuit 90 which provides input to outerloop processor 67, as seen in FIG. 56.

Figures 59, 59A:
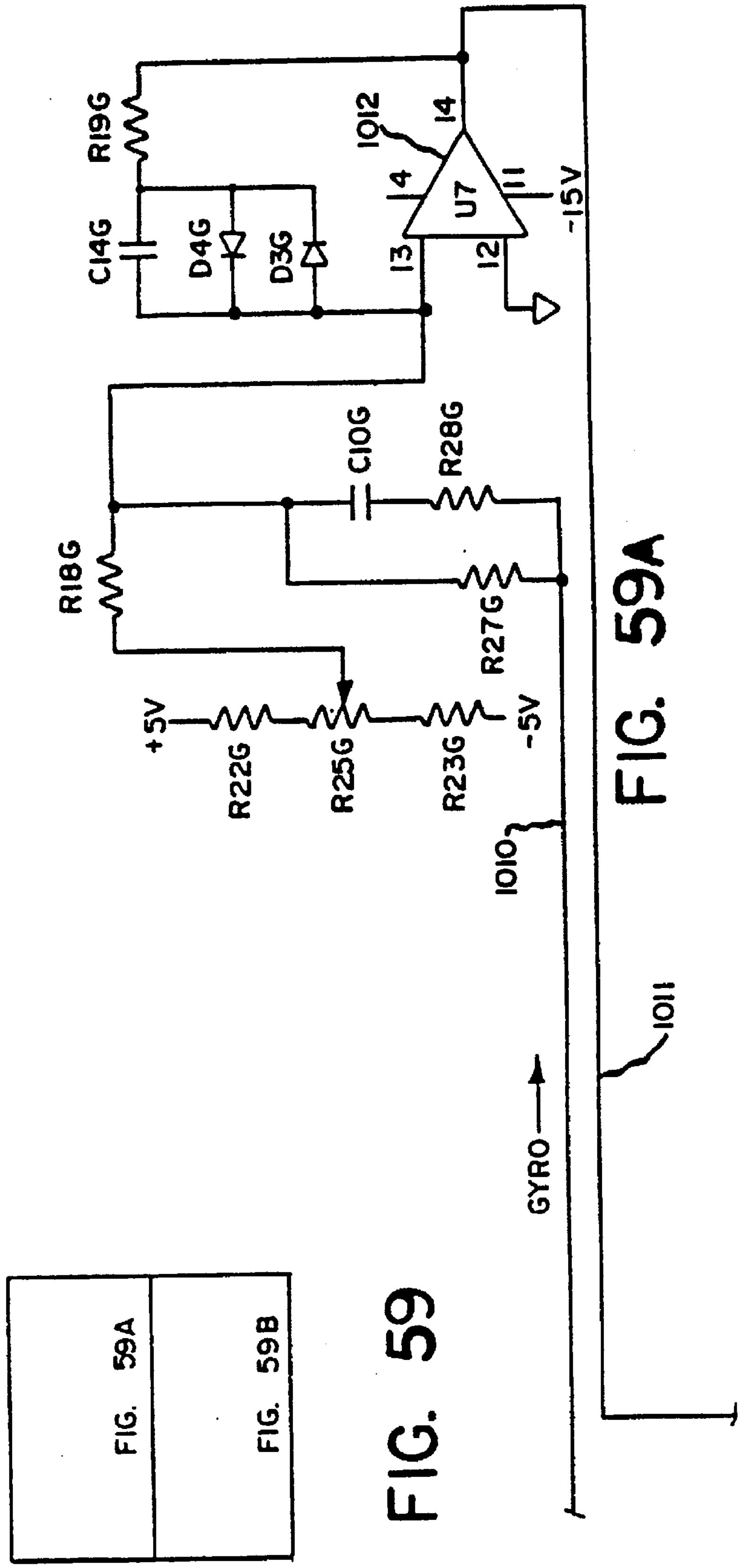
FIG. 59 is a circuit diagram for the stabilization and control loop of the inertial platform.
Figure 59B:
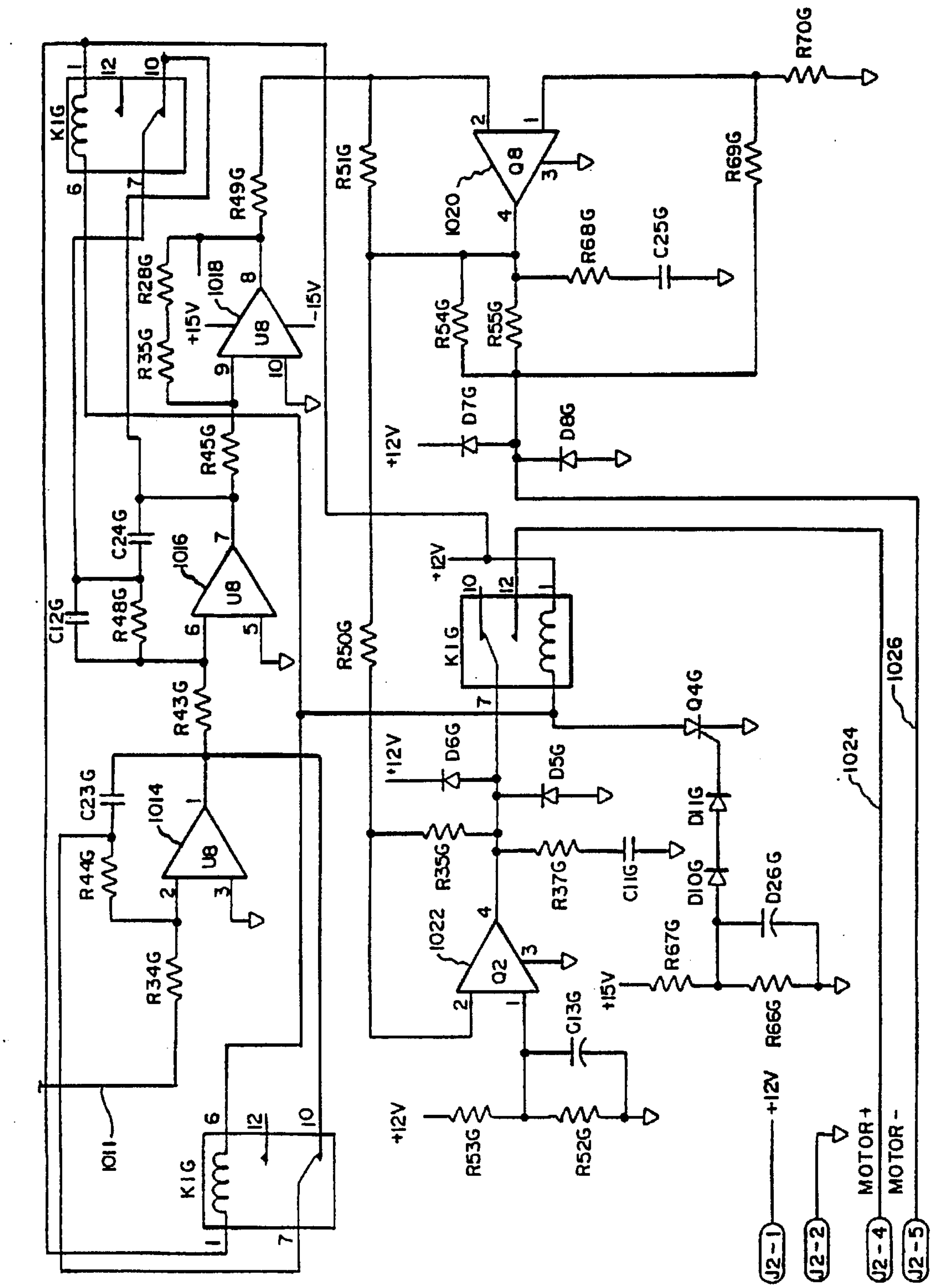

The circuits providing angular sensing and feedback control for inertial stabilization loop 996 are seen in FIG. 59. The output of angular rate sensor 900 is provided to amplifier filter 1012. From amplifier filter 1012, the compensated signal is resistively coupled to two serially connected differential amplifiers 1014 and 1016 which provide serially integrated filtering of the signal from amplifier filter 1012. The output of amplifier 1016, is resistively coupled to an inverting amplifier 1018 which comprises variable resistor R28G in the currently preferred embodiment by which a control of voltage gain is provided. The output of inverting amplifier 1018 is resistively coupled to the inverting input of differential amplifier 1020 and therefrom resistively coupled to the inverting input of differential amplifier 1022 whereby differential drive is provided for motor 916 on lines 1024 and 1026. Three switches K1G prevent output from amplifier 1022, and short integrating capacitors C23G and C24G only when the circuit supply voltage is not available thereby providing an additional degree of control and a delay after the analog fifteen volt supply is available, thereby providing delay which prevents instabilities which would occur when the motor is driven before the control circuits are operating in a normal fashion.

Types and values of components seen in FIG. 59 are provided in the following table:

| Number | Name | Value or Type |
|---|---|---|
| R18K | Resistor | 2M |
| R19G | Resistor | 3.18K |
| R22G | Resistor | 10K |
| R23G | Resistor | 10K |
| R25G | Resistor | 200K |
| R26G | Resistor | 1000K |
| R27G | Resistor | 227K |
| R28G | Resistor | 6.81K |
| R34G | Resistor | 227K |
| R35G | Resistor | 100K |
| R36G | Resistor | 150K |
| R37G | Resistor | 1 |
| R43G | Resistor | 227K |
| R44G | Resistor | 100K |
| R45G | Resistor | 51K |
| R48G | Resistor | 100K |
| R49G | Resistor | 150K |
| R50G | Resistor | 150K |
| R51G | Resistor | 51K |
| R52G | Resistor | 150K |
| R53G | Resistor | 150K |
| R54G | Resistor | 1 1/2W |
| R55G | Resistor | 1 1/2W |
| R67G | Resistor | 47K |
| R66G | Resistor | 16K |
| R68G | Resistor | 1 |
| R69G | Resistor | 51K |
| R70G | Resistor | 150K |
| C10G | Capacitor | .47 µF |
| C11G | Capacitor | .22 µF |
| C12G | Capacitor | .01 µF |
| C13G | Capacitor | 15 µF |
| C14G | Capacitor | 10 µF |
| C23G | Capacitor | 1 µF |
| C24G | Capacitor | 10 µF |
| C25G | Capacitor | .22 µF |
| C26G | Capacitor | 100 µF |
| 1012 | Diff.Amp. | LF347 |
| 1014 | Diff.Amp. | LF347 |
| 1016 | Diff.Amp. | LF347 |
| 1018 | Diff.Amp. | LF347 |
| 1020 | Diff.Amp. | ULN-3751ZV |
| 1022 | Diff.Amp. | ULN-3751ZV |
| D3G | Diode | 1N4148 |
| D4G | Diode | 1N4148 |
| D7G | Diode | 1N4004 |
| D8G | Diode | 1N4004 |
| D10G | Diode | 1N5243B |
| D11G | Diode | 1N414B |
| Q4G | Diode | MCR100-6 |
| K1G | Relay Switch | DS1E-S-DC12V |

Figure 60:
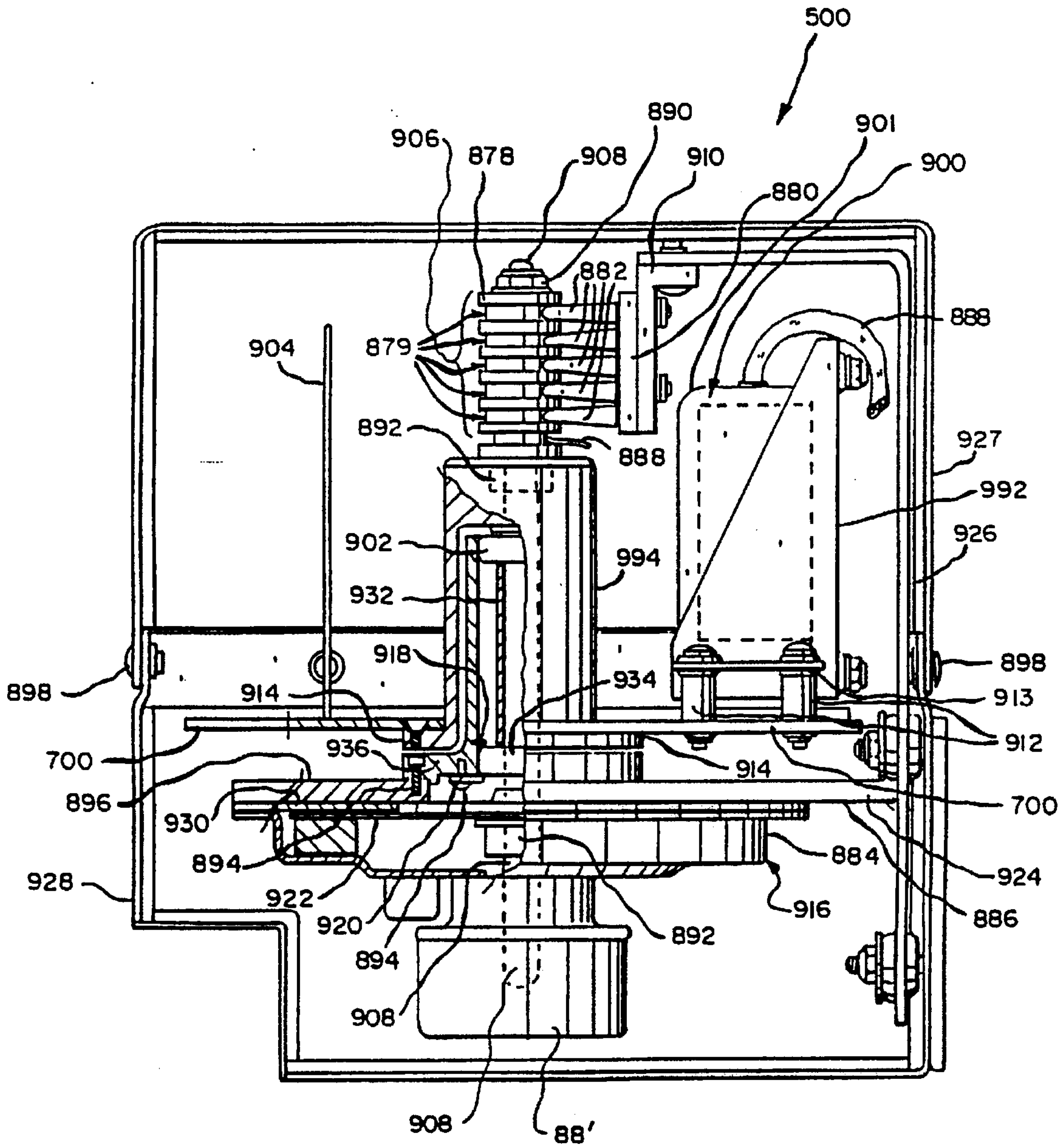
FIG. 60 is an assembly drawing of the inertial platform with parts cut away for clarity of presentation.

A more detailed view of gyro 500 is seen in FIG. 60. As seen therein, gyro 500 comprises a housing comprising an upper part 926 and a lower part 928. When finally assembled the upper part 926 and lower part 928 are releasably attached together by nut and bolt assemblies 898. Mounting bracket 924 is firmly attached to lower housing part 928. To the upper side 896 of mounting plate 924 a bearing housing 936 is firmly affixed by screws 894, or the like. Attached to the inner bottom side of bearing housing 936 a washer-shaped bearing retainer ring 920 is firmly attached by other screws 894. A bearing 934 tightly constrained between bearing retainer 920 and a snap ring 918 is placed at the bottom of the inverted well provided by bearing housing 936. At the top of the inverted well of bearing housing 936 a second bearing 902 is held in vertical position by a spacer 932. Shaft 908 is held in strict vertical alignment by bearings 934 and 902. Spacer 932 separates bearings 934 and 902 by sufficient distance that any shaft 908 wobble due to any freedom of movement in the bearing is negligible.

Shaft 908 centrally connects the inner portion of slip ring assembly 906 to the moving parts of gyro 500 and therewith affixed by a capping nut and washer 890. Immediately below slip ring assembly 906, shaft 908 is affixed to hub 994 which comprises an outwardly projecting hub platform support 914, upon which inertial table 700 is securely affixed. As well, shaft 908 is connected to a motor rotor 922 by a locknut 892. Finally, the bottom of shaft 908 is connected to an angular rate decoding transducer 88'.

As mentioned earlier, printed circuit board 904 is mounted vertically on inertial table 700. Angular rate sensor 900 support 992 is affixed to inertial table 700 by standoff assemblies 912 which interface with support 992 through shock-absorbing gromets 913. Rate sensor 900 is firmly affixed to support 992. Interconnecting wires 888 are only seen in part extending from angular rate sensor 900 and slip ring assembly 906. A large mass of wires has been removed from FIG. 60 for clarity of presentation. Motor 916 is a pancake motor firmly mounted on the bottom side 886 of mounting bracket 924. The housing for motor 916 comprises an arcuately shaped concave bottom section 884 and an open centered, washer shaped top section 930. The top section 930 is a flux return plate which resides above motor 916 rotor 922. Motor 916 is a 12 FP kit motor, part number 00-01281-001, acquired from PMI Motors, Division of Kollmorgan Corporation, 5 Aerial Way, Syoset, N.Y. 11791.

The central portion of bottom section 884 is modified such that an end bell on motor 916 provides an encoder 88' housing mounting connection.

Each spring loaded finger 882 of slip ring assembly 906 is affixed to a mounting plate 880 such that the end of each finger 882 comprises a spring bias causing each finger to ride connectively and continuously in a contact containing groove 879 of the moving portion of slip ring assembly 906. The other end of each finger is firmly affixed to mounting plate 880 which is releasibly affixed to the upper housing member 926 by mounting plate 910.

Figure 61:
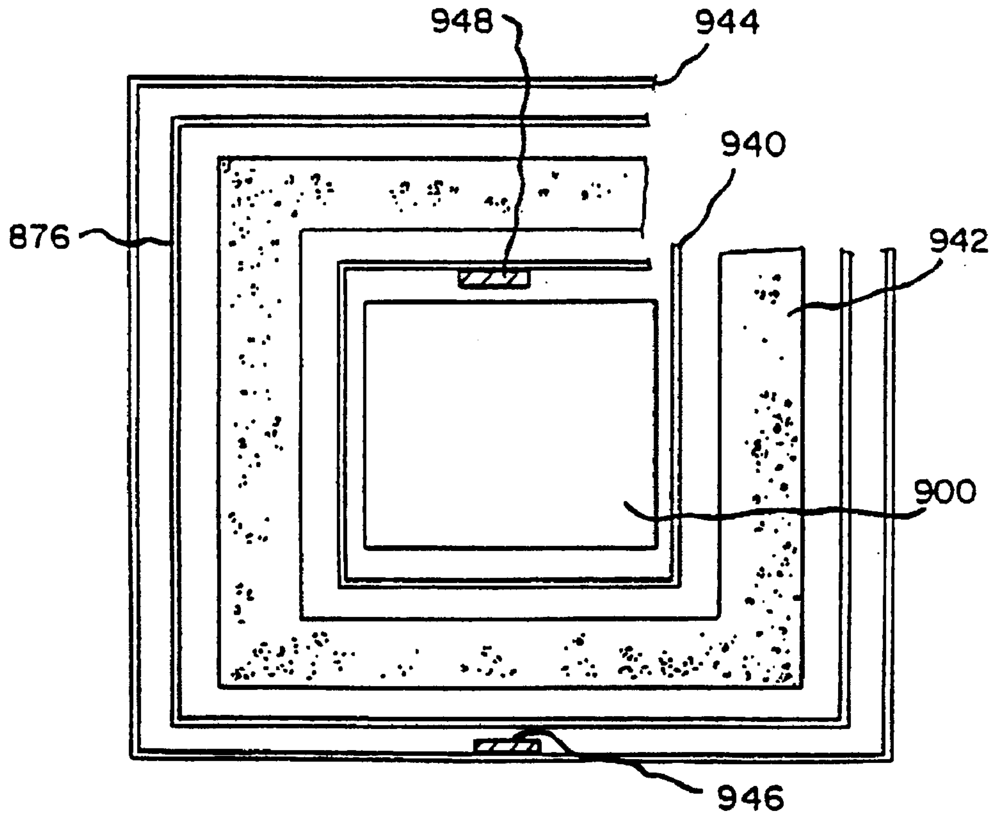
FIG. 61 is a simplified model of the heating system of the angular rate sensing element of the inertial platform.

For accurate operation of angular rate sensor 900, controlled temperature must be provided. The controlled temperature range for selected sensor 900 is between 55° and 65° Centigrade. As mentioned earlier, it is also important that warm-up time be short. To accomplish a short warm-up time, a novel two heater combination is used. As seen in FIG. 61, a multilayer heating/insulating blanket (not shown in prior figures) surrounds angular rate sensor 900. The multilayer cover comprises, from inside out, a first heater unit 940, a vinyl foam insulating layer 942, a metal foil insulating layer 876, and a second heating layer 944. The insulating layer 942 is adhesively applied to the first heater unit 940 with insulating tape. A Kapton tape, by Dupont is used in the currently preferred embodiment. Metal foil comprising a PSA face, placed inward, available from IEPD, Saint Paul, Minn. is used in the currently preferred embodiment for metal foil insulating layer 876.

First heating unit 940 is controlled by a temperature control circuit which is well known in the art by feedback from a temperature sensor 948, located internal to heating unit 940 as seen in FIG. 61. Heating unit 944 is controlled by a similar temperature control circuit by feedback from a temperature sensor 946 located internal to heating unit 944. The internal heating unit 940 is designed to have a fast heating response time to bring angular rate sensor 900 to temperature quickly. The second heating element 944 comprises a greater thermal inertia and is provided to maintain angular rate sensor 900 at temperature over the entire operating period after initial heating by first heating unit 940.

Figure 62:
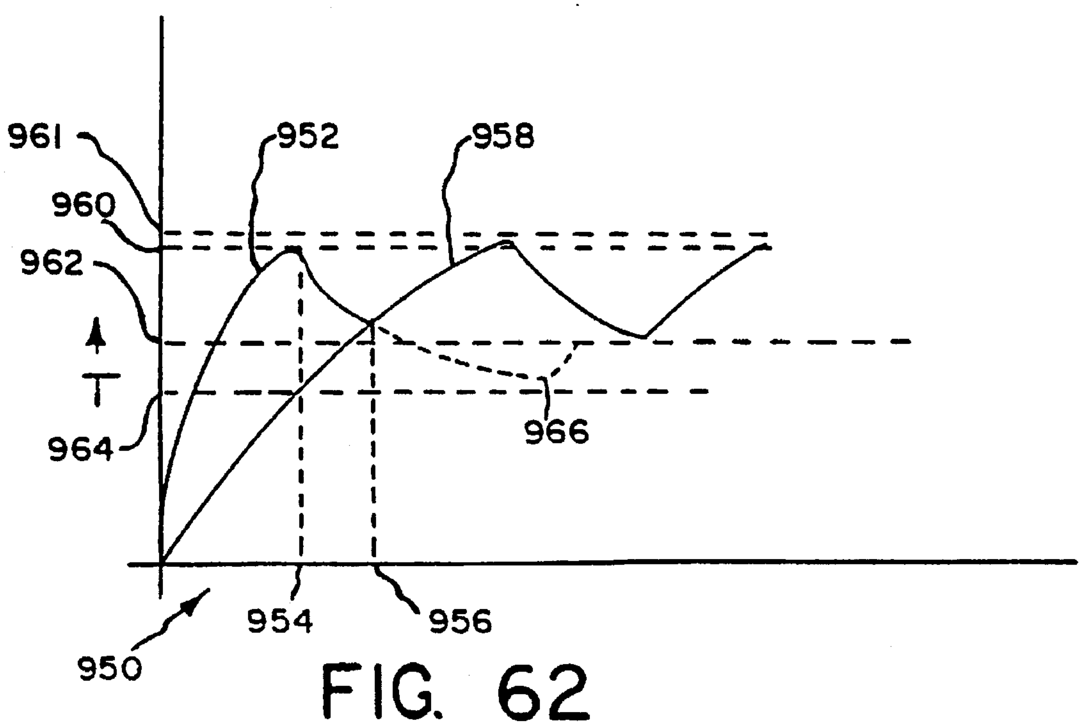
FIG. 62 is a plot showing curves from sensors used in the feedback loop in the angular rate sensing element of the inertial platform.

Reference is now made to FIG. 62 wherein the temperature control curves for the circuits of sensor 946 and 948 are seen. A first curve 952 shows a temperature response upon turn-on of sensor 948, showing a rapid rise to cut-off threshold 960 at time 954 at which temperature heater unit 940 is turned off and temperature curve 952 decays toward a cooler temperature threshold 964 at which heater unit 940 would be turned back on. However, as seen by following temperature curve 958, before the temperature measured by sensor 948 falls to threshold 964, second heater unit 944 drives the temperature of sensor 948 upward above threshold 964 whereupon curve begins to follow the temperature path of curve 958 at crossover time 956. Second heater 944 control circuits are set to control turn-on and turn-off of second heater at thresholds 961 and 962, respectively. Because the temperature at sensor 948 is not allowed to fall below threshold 962 or to threshold 964, first heater remains in a non-operative state after time 954.

The Fifth and Sixth Wheels (57, 59) and Encoder 58

As seen in FIG. 43, AGV 2A comprises a port fifth wheel 57 and starboard sixth wheel 59. An encoder 58 for each wheel 57, 59 is attached to vehicle 2A in a position to measure individual travel of wheels. However, in the currently preferred embodiment, encoder 58 distances are different than fifth and sixth wheel distances from the center 86 of the AGV 2A and any given center of a turn 82 and must be considered in vehicle control calculations by motion control processor 61. The following discloses such considerations and equations necessary to provide corrections for such differences.

The following defines terms used in equations which calculate ratios necessary to control a turn of AGV 2A:

C=a constant $R_v$=radius 84 of turn of the vehicle as the distance between turn center 82 and vehicle center 86

$A_v$=center 86 to encoder 58 distance $B_v$=center 86 to wheel (57 or 59) distance $r_e$=ratio calculated using encoder 58 dimensions $r_w$=ratio calculated using drive wheel dimensions $W_r$=error due to differences in encoder 58 and wheel 57, 59 dimensions through a move (± sign of $w_r$ signifies direction of turn)

The ratio of the turn in encoder dimensions is $$r_e = \frac{C - \mathrm{abs}(W_r)}{C + \mathrm{abs}(W_r)} = \frac{(R_v - A_v)}{(R_v + A_v)}$$

Solving for $R_v$ yields, $$R_v = A_v\left[\frac{1 + r_e}{1 - r_e}\right]$$

Thus, $$r_w = \frac{R_v - B_v}{R_v + B_v}$$

which is the actual control ratio used to power wheel drives 8, 10.

As seen in FIG. 44, encoder 58 comprises wheel 98 attached to a spring loaded AGV 2A axle 72 which retains firm but constant wheel 98 contact with the ground independent of AGV 2A load. Encoder 58 also comprises an encoding transducer 88 which provides an electrical measurement of travel and at least one semiconductor encoder chip 90 which receives encoder 58 output, accumulates a count related to travel distance and direction, and provides output bus communicating lines to a computer processor. The output of encoding transducer 88 comprises two waveforms, a phase a signal 102 and a phase b signal 104, as seen in FIGS. 45A and 45B, respectively. Signals 102 and 104 are square waves whose phase relationship changes based upon direction of travel. An encoder chip 90, receiving signals 102 and 104, increments (or decrements) a counter dependent upon rate and direction of travel.

Figure 46:
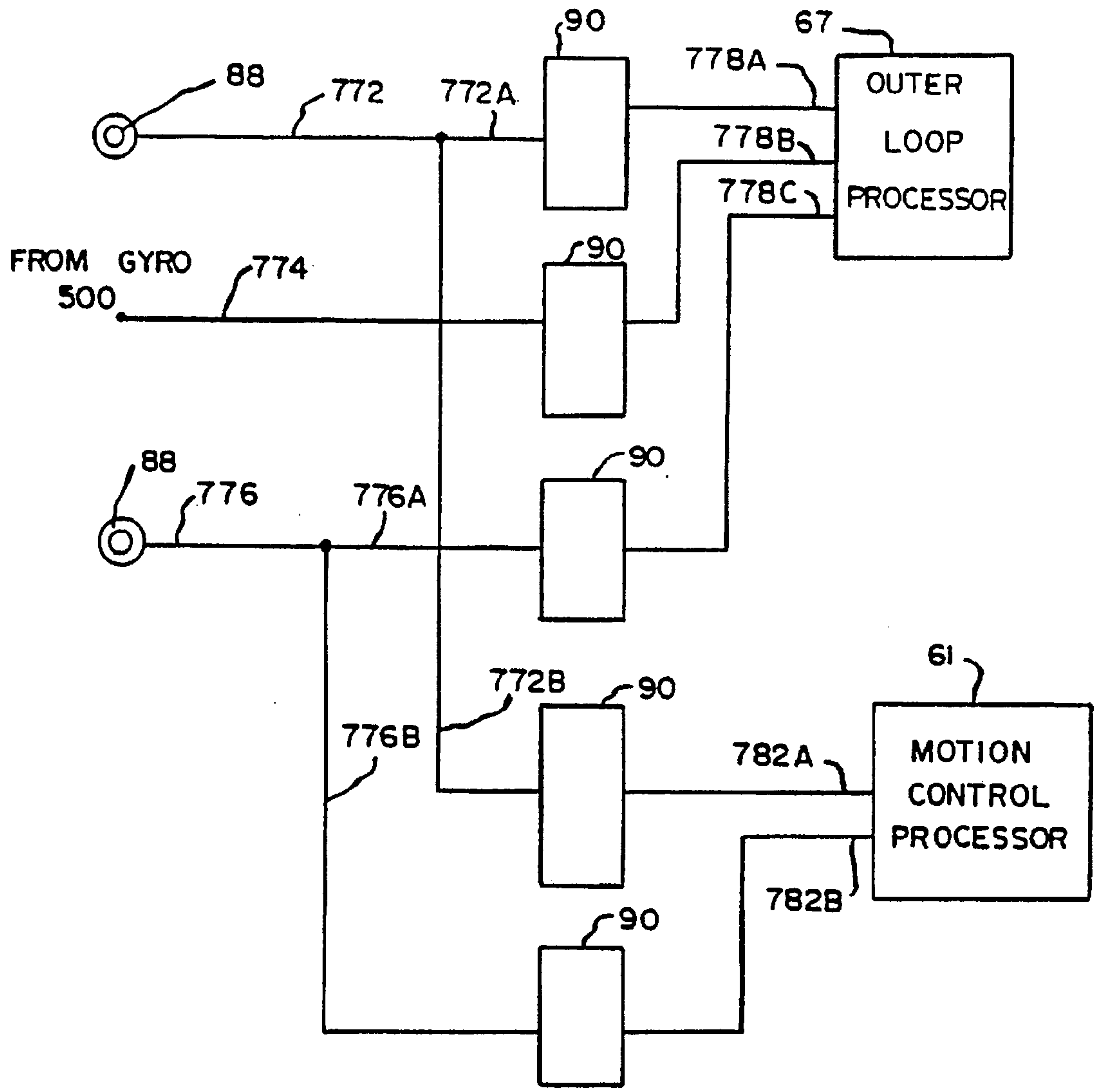
FIG. 46 is a simplified block diagram showing interconnections between wheel travel encoders and outerloop motion control processors.
Figure 47:
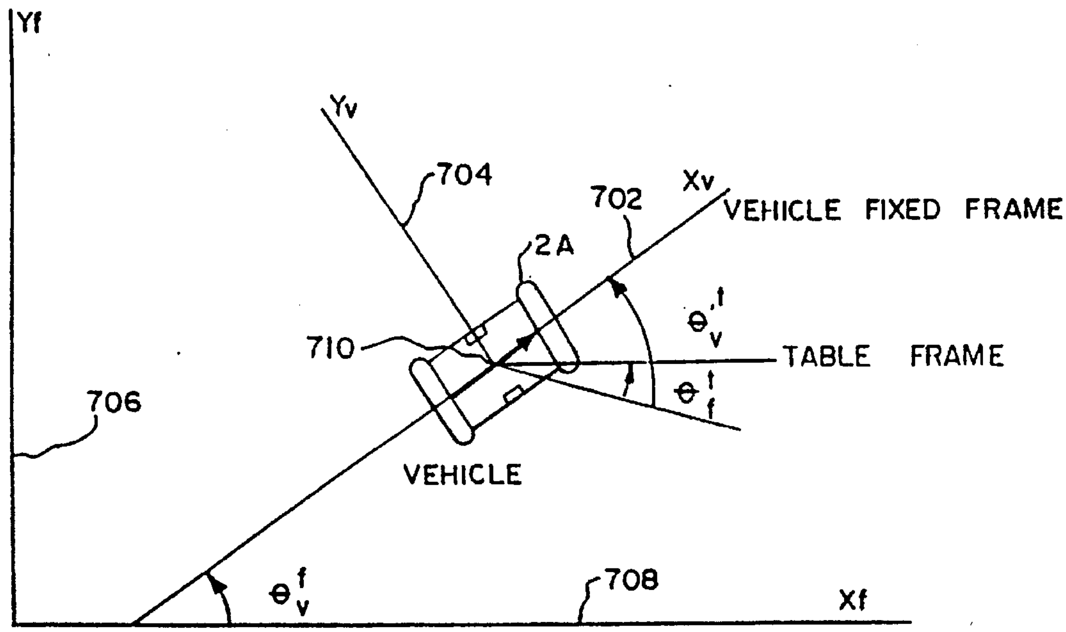
FIG. 47 is a top view of the vehicle in a factory frame showing factory frame to vehicle fixed frame and inertial table relationships.
Figure 48:
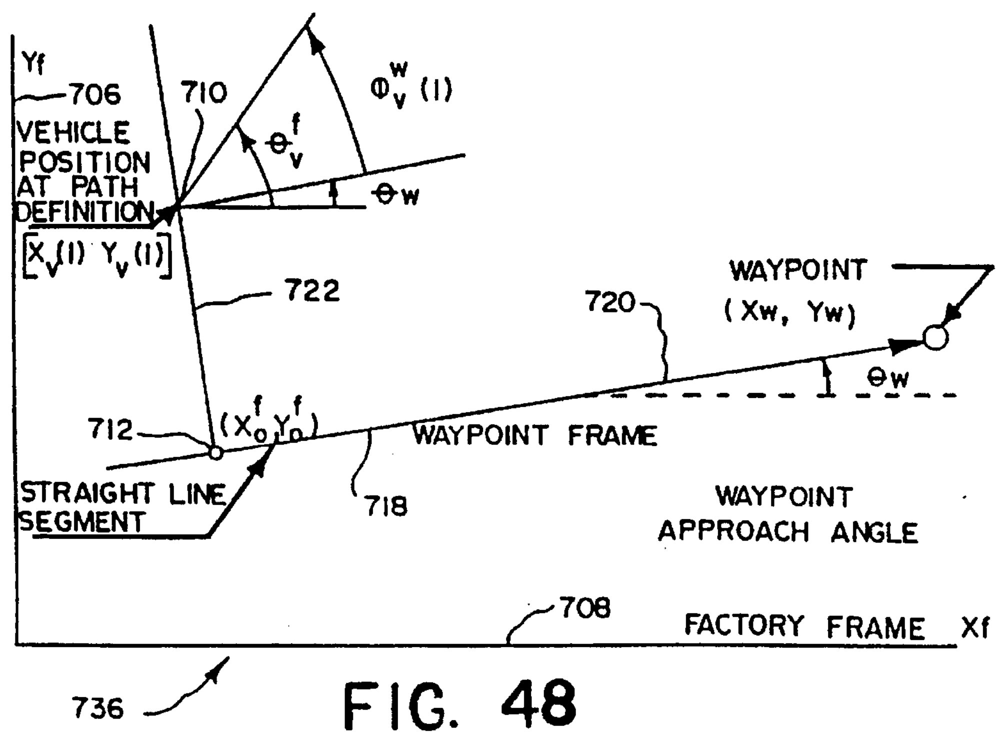
FIG. 48 is a graph showing relative geometry between the factory frame and a waypoint frame.
Figure 49:
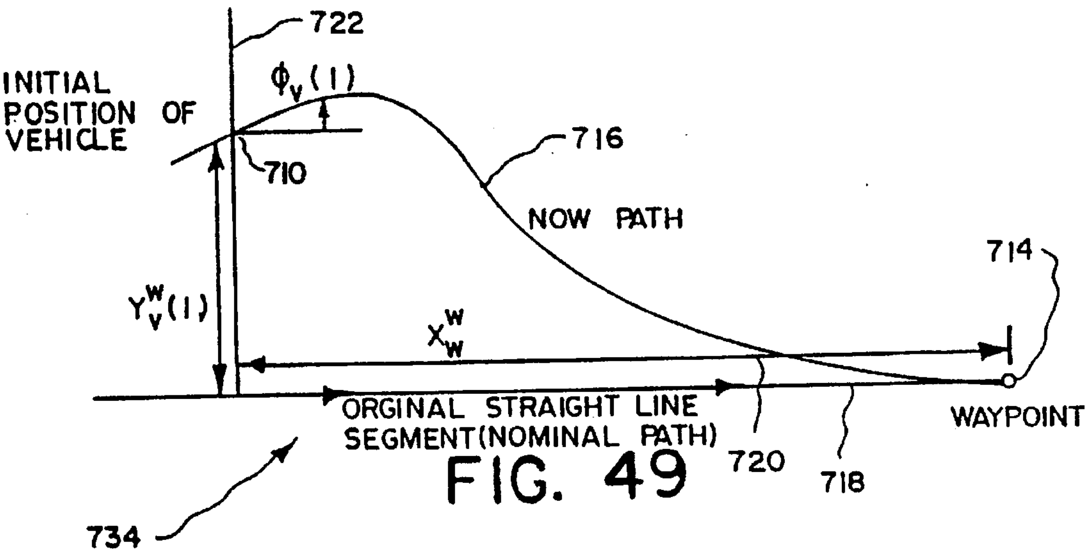
FIG. 49 is a graph showing geometry of a calculated path from a current vehicle position (and direction) to a next waypoint and direction of travel along the abscissa of the graph.
Figure 50:
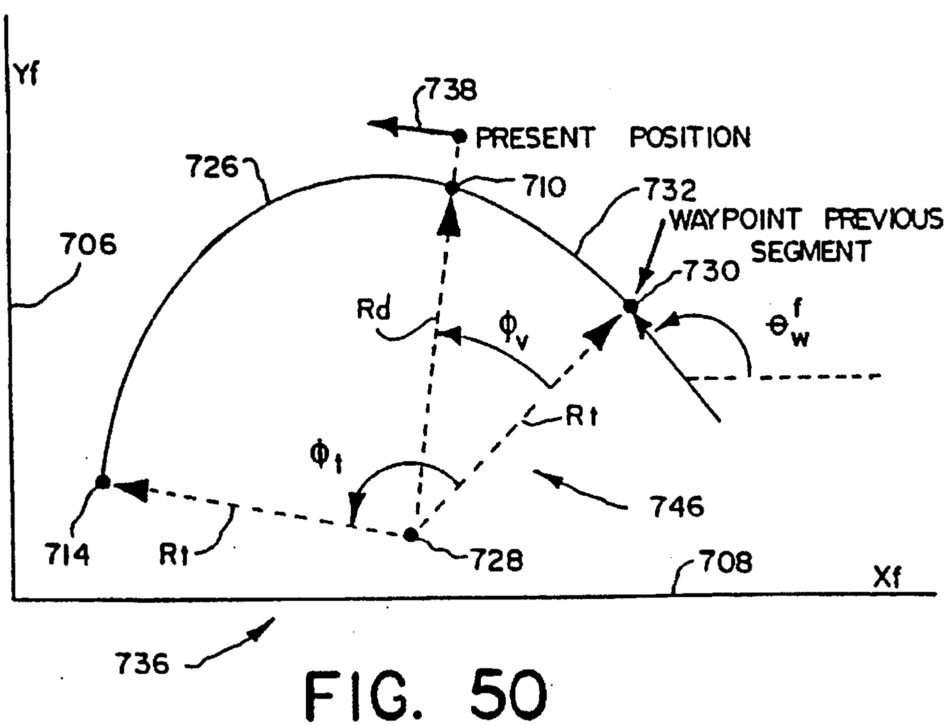
FIG. 50 is a graph showing geometry of a travel segment from a present vehicle position to a waypoint involving circular travel.
Figure 51:
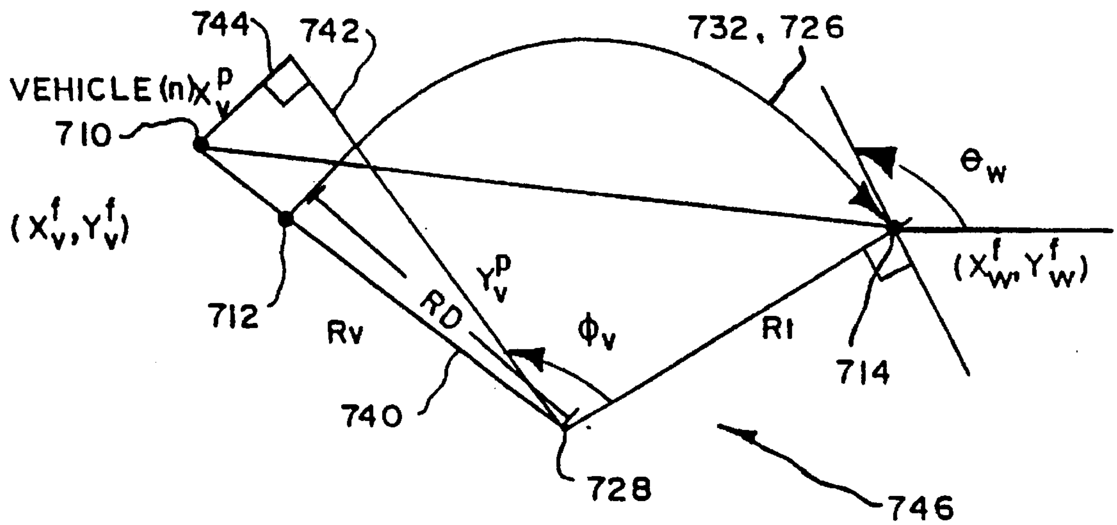
FIG. 51 is a graph showing geometry of circular travel of a vehicle in a vehicle frame to a waypoint in a waypoint frame.
Figure 52:
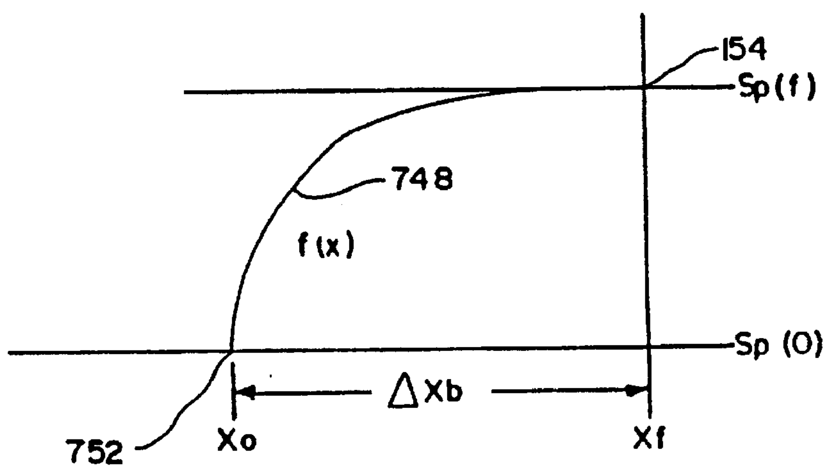
FIG. 52 is a graph showing a relationship between length of travel and a speed setpoint, from which a calculation is made to change the speed of a vehicle as a function of a length of travel.

A simplified block diagram of the connection between wheel 57, 59 encoders 58 and the outerloop processor 67 and the innerloop processor (motion control processor 61) is seen in FIG. 46. As seen therein, the encoding transducer 88 is connected to two encoder chips 90. Encoding transducer 88 is thereby connected through lines 772 and lines 772A to a chip 90 which connects through lines 778A to outerloop processor 67. Similarly, bottom encoding transducer 88 is also connected through lines 776 and lines 776A to a chip 90 which connects through lines 778C to outerloop processor 67. In addition, the angular output of gyro 500, as described herein, is connected through lines 774 to a chip 90 and therefrom through lines 778B to outerloop processor 67. Thereby, all of the measurements from wheels 57 and 59 and gyro 500 are made available to outerloop processor 67.

Further, a connection is made from lines 772 through path 772B to a chip 90 and therefrom through lines 782A to motion control processor 61. As well, a connection is made from lines 776 through path 776B to a chip 90 and therefrom through lines 782B to motion control processor 61. These provide the inputs required for innerloop processing.

As seen in FIG. 44, encoder 58 comprises a wheel 98 attached to a spring loaded AGV 2A axle 72 which retains firm but constant wheel 98 contact with the ground independent of AGV 2A load. Encoder 58 also comprises an encoding transducer 88 which provides an electrical measurement of travel and at least one semiconductor encoder chip 90 which receives encoder 58 output, accumulates a count related to travel distance and direction, and provides output bus communicating lines to a computer processor. The output of encoding transducer 88 comprises two waveforms, a phase a signal 102 and a phase b signal 104, as seen in FIGS. 45A and 45B, respectively. Signals 102 and 104 are square waves whose phase relationship changes based upon direction of travel. An encoder chip 90, receiving signals 102 and 104, increments (or decrements) a counter dependent upon rate and direction of travel.

A simplified block diagram of the connection between wheel 57, 59 encoders 58 and the outerloop processor 67 and the innerloop processor (motion control processor 61) is seen in FIG. 46. As seen therein, the encoding transducer 88 is connected to two encoder chips 90. Top encoding transducer 88 is thereby connected through lines 772 and lines 772A to a chip 90 which connects through lines 778A to outerloop processor 67. Similarly, bottom encoding transducer 88 is also connected through lines 776 and lines 776A to a chip 90 which connects through lines 778C to outerloop processor 67. In addition, the angular output of gyro 500, as described herein, is connected through lines 774 to a chip 90 and therefrom through lines 778B to outerloop processor 67. Thereby, all of the measurements from wheels 57 and 59 and gyro 500 are made available to outerloop processor 67.

Further, a connection is made from lines 772 through path 772B to a chip 90 and therefrom through lines 782A to motion control processor 61. As well, a connection is made from lines 776 through path 776B to a chip 90 and therefrom through lines 782B to motion control processor 61. These provide the inputs required for innerloop processing.

Calculations for the Update Marker System

When traveling under self-contained guidance between floor marker 6 updates, AGV 2A continuously searches for an update marker 6. As update markers in the currently preferred embodiment are magnets, the following description will substitute descriptions of magnet 6 sensing in place of the more general update marker 6, although the invention is sufficiently broad to use update markers which are different from magnets.

Figure 69:
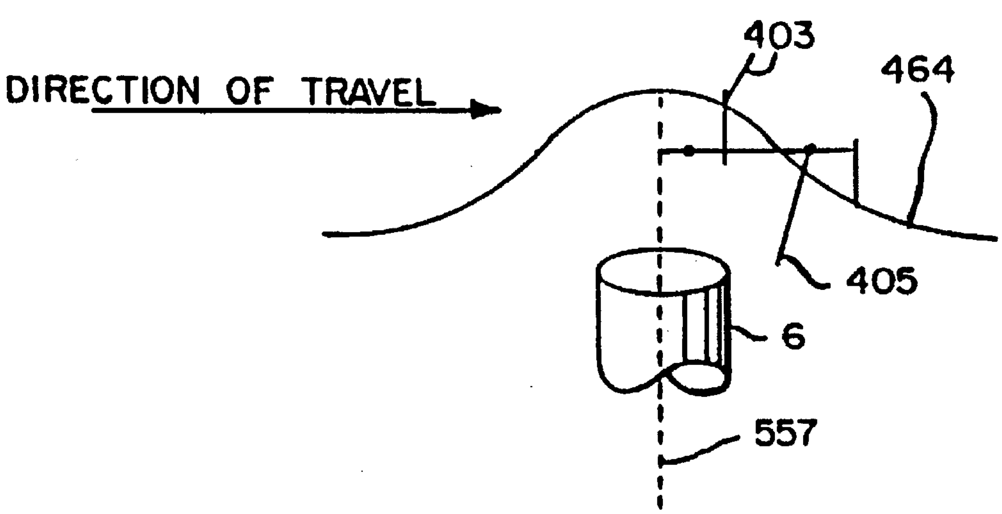
FIG. 69 is a schematic showing a magnet and the relative position of a sensed field that surrounds the magnet and points comprising time delays whereat the vehicle controls recognize the sensing of the magnetic field.
Figure 70:
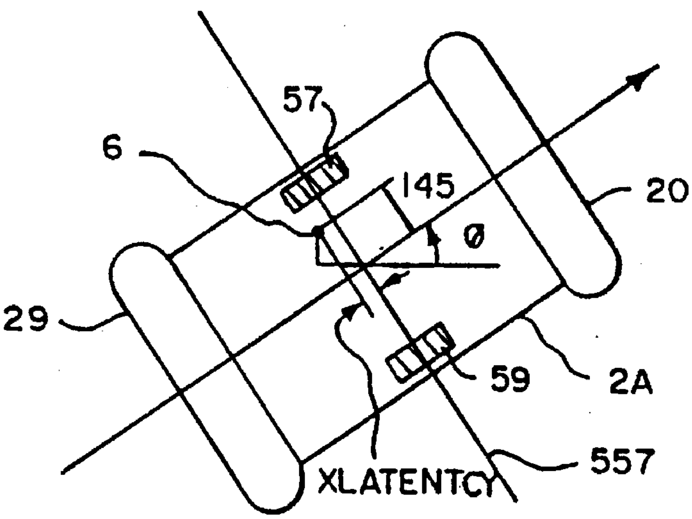
FIG. 70 is a top view of a vehicle having traversed a ground marker from which a position measurement has been made showing some sources of errors comprising the offset of the ground markers from the centerline of the vehicle and delays due to motion of the vehicle after the marker is sensed.

As the moving vehicle 2A traverses a magnet 6, the position of the magnet 6 is sensed in the vehicle 2A frame of reference. As seen in FIG. 69, the signal 403 sensed from a traversed magnet 6 results in a delayed recognition of the peak of the signal at a point 403 which is offset from magnet 6 centerline 557. As well, resulting control action based upon vehicle 2A outerloop 820 adds further delays from point 403 to 464 which are dependent upon vehicle 2A velocity relative to outerloop 820 computational speed.

The measured parameter is the offset from the direction of travel or the "Y" offset from the vehicle center line 559 (see FIG. 34) of magnet 6. Delays in the time of actually acquiring the position after vehicle 2A traverses the point of measurement generates an "offset" in addition to the actual measurement. The "offset" is referred to herein as latency. As an example, the movement of vehicle 2A between sensing of data and position determination by vehicle electronics correlates to an error in the direction of travel, referred to as $X_{latency}$. Other errors comprise errors in mounting which generate errors in both the $X^v$ and $Y^v$ directions, where the superscript v denotes vehicle frame.

The $X_{latency}$ is described and estimated as follows:

$$X_{latency}=A+B\cdot(\text{vehicle 2A speed})$$

Where:

A is a function of magnet 6 vertical alignment and other field abnormalities and magnet sensor and Hall sensor array 24 vehicle 2A mounting.

B is a function of vehicle speed.

After calculating $X_{latency}$, vehicle 2A position is converted to factory frame 736 coordinates. $X_{latency}$ is subtracted from the estimated position of the vehicle and added to the coordinates of traversed magnet 6 and the expected vehicle 2A to magnet 6 position is calculated by $$\begin{bmatrix}X\\Y\end{bmatrix}^F_{V/M}=\begin{bmatrix}\cos\phi & -\sin\phi\\ \sin\phi & \cos\phi\end{bmatrix}\cdot\begin{bmatrix}-X_{latency}\\ 0\end{bmatrix}+\begin{bmatrix}X\\Y\end{bmatrix}^F_V$$

where

V/M is the vehicle position when magnet sensed

M/V is magnet position as calculated by vehicle

M/F is magnet position defined in factory coordinates.

Convert "$-Y_{ums}$" offset to factory orientation $$\begin{bmatrix}X\\Y\end{bmatrix}^f_{ums}=\begin{bmatrix}\mathrm{COS}\,\phi & -\mathrm{SIN}\,\phi\\ \mathrm{SIN}\,\phi & \mathrm{COS}\,\phi\end{bmatrix}\begin{bmatrix}0\\ Y_{ums}\end{bmatrix}\quad \text{Translation of } Y_{ums} \text{ values}$$

Compute the position where the vehicle has determined the magnet is located. Y position is equal to the current vehicle position in factory distance moved since passing magnet.

$$\begin{bmatrix} X \\ Y \end{bmatrix}_v^f = \begin{bmatrix} X \\ Y \end{bmatrix}_{v/m}^f - \begin{bmatrix} X \\ Y \end{bmatrix}_{Y_{ums}}^f$$

Compute error difference $X_{M/F}^F$ $Y_{M/F}^F$ and $X_{M/V}^F$, $Y_{M/V}^F$ $$\begin{bmatrix} X \\ Y \end{bmatrix}_{error} = \begin{bmatrix} X \\ Y \end{bmatrix}_{M/F}^F - \begin{bmatrix} X \\ Y \end{bmatrix}_{Y_{M/V}}^F$$

where $$\begin{bmatrix} X \\ Y \end{bmatrix}_{M/F}^F$$

is defined in the AGVC tables and is transmitted to vehicle

At beginning of next move segment use $X_{error}$, $Y_{error}$, $$\begin{bmatrix} X \\ Y \end{bmatrix}_V^F$$

to correct the vehicle position $$\begin{bmatrix} X \\ Y \end{bmatrix}_V^F$$

$$\begin{bmatrix} X \\ Y \end{bmatrix}_V^F = \begin{bmatrix} X \\ Y \end{bmatrix}_V^F + \begin{bmatrix} X \\ Y \end{bmatrix}_{error}$$

Vehicle 2A Insertion into Factory Frame 736

Figure 54:
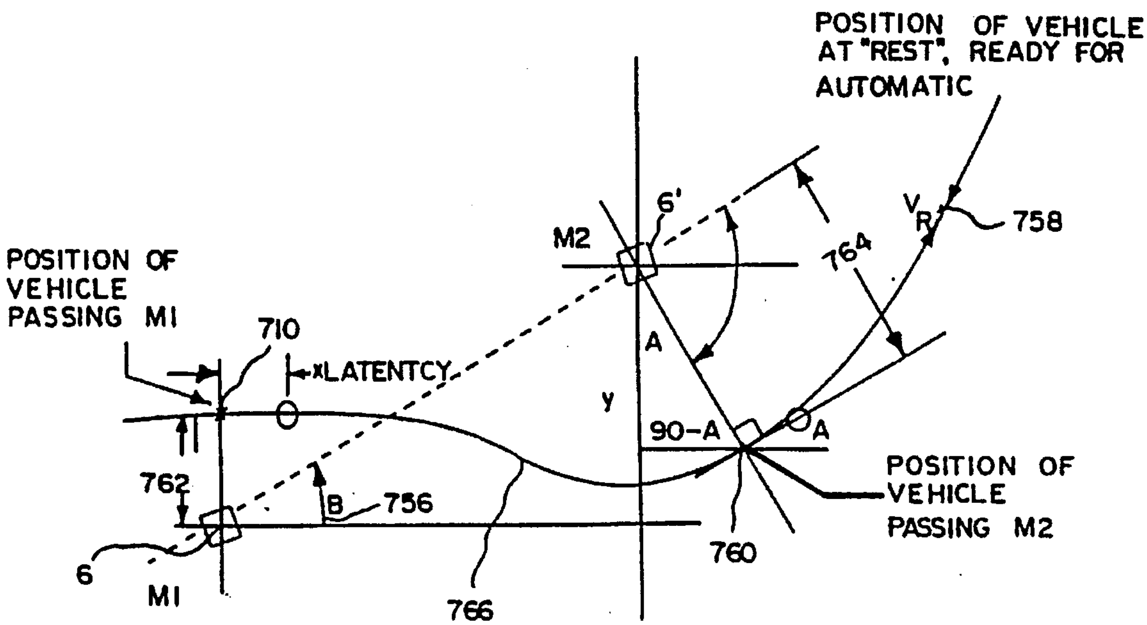
FIG. 54 is a graph showing the path geometry for a manually guided path from which measurements are made relative to vehicle insertion into a factory frame.

A process which uses vehicle 2A contained update marker 6 sensing to establish an insertion procedure of vehicle 2A in factory frame 736 is as follows. Two update markers 6 seen as 6 and 6' in FIG. 54 are traversed by a manually driven vehicle 2A. The path defined by the straight line between markers 6 and 6' makes an angle 756 with the factory frame. Each marker 6, 6' ($M_1$ and $M_2$) has a predetermined position $$\begin{bmatrix} x \\ y \end{bmatrix}_{M_1}^F \text{ and } \begin{bmatrix} x \\ y \end{bmatrix}_{M_2}^F,$$

respectively, in factory frame 736.

The following table lists terms used in this insertion description:

F=Factory Frame 736

$M_1$=1st magnet 6 in insertion sequence $M_2$=2nd magnet 6' in insertion sequence V=Vehicle 2A

VR=Vehicle Resting place after insertion drive 758

I=Insertion frame 768

$A_N$=Vehicle 2A heading relative to initial heading Δ HEADING

B=Angle between $M_1$ & $M_2$ in insert frame 768

$X_N$,$Y_N$=Vehicle 2A coordinates as calculated relative to $M_1$

C=Angle between $M_1$, $M_2$ in Factory Frame 736 a "" indicates a measured value.

V/$M_1$=V to $M_1$ or vehicle to magnet 1

As vehicle 2A traverses marker 6, a measurement is made. At the time such measurement is available for navigational use, an offset has resulted along the line of vehicle 2A travel 766 moving vehicle 2A to a position $X_{latency}$. In addition, manually driving vehicle 2A over update marker 6 generally results in a Y offset 762 as seen in FIG. 54. Thus, the initialized navigational values are $$\begin{bmatrix} X \\ Y \end{bmatrix}_{V/M1}^I = \begin{bmatrix} X_{latency} \\ Y_{762} \end{bmatrix}$$

The transformation to insertion coordinates is provided by $$\begin{bmatrix} X \\ Y \end{bmatrix}_{V/M2}^I = \begin{bmatrix} \text{COS}\,A & -\text{SIN}\,A \\ \text{SIN}\,A & \text{COS}\,A \end{bmatrix} \cdot \begin{bmatrix} X_{latency} \\ Y_{ums2} \end{bmatrix}$$

Where, for example,

Initial vehicle 2A position is defined as point $X_{latency}$ past the sensed point of $M_1$ and $Y_{762}$ is the distance to $M_1$ from magnet sensor in the center of the vehicle.

The angle 756(B) is angular measure predetermined by the locations of markers $M_1$, $M_2$ (6, 6'). Thus, for angle 756 in FIG. 54:

$$B = \tan^{-1}\left[\frac{Y_{M1/M2}}{X_{M1/M2}}\right]$$

Similarly, with reference to factory frame 736:

$$C = \tan^{-1}\left[\frac{Y_{M2}^F - Y_{M1}^F}{X_{M2}^F - X_{M1}^F}\right]$$

and, therefore, $$\begin{bmatrix} X \\ Y \end{bmatrix}_V^F = \begin{bmatrix} \cos(B-C) & \sin(B-C) \\ -\sin(B-C) & \cos(B-C) \end{bmatrix} \cdot \begin{bmatrix} X_{VR}^I - X_{V/M2}^I \\ Y_{VR}^I - Y_{V/M2}^I \end{bmatrix} + \begin{bmatrix} X_{M2}^F \\ Y_{M2}^F \end{bmatrix}$$

The vehicle 2A insertion process is as follows:

1. Drive vehicle 2A across marker 6. Measure Y distance 762.

2. Assume initial heading angle is "0" and position of $M_1$ (marker 6) in insertion frame 768 is 0, 0(x, y). Therefore, the initial conditions are $$\begin{bmatrix} X \\ Y \end{bmatrix}_{V/M1}^I = \begin{bmatrix} X_{latency} \\ Y_{762} \end{bmatrix}$$

after $M_1$ measurement

3. Drive (manually) across second marker 6' ($M_2$). Measure Y distance 764. Then, $$\begin{bmatrix} X \\ Y \end{bmatrix}_{V/M2}^I = \begin{bmatrix} X_{latency} \\ Y_{764} \end{bmatrix}$$

The derived measurements now allow x, y to be computed by the navigation and guidance computer.

$A_{M2}^I$=heading from which a calculation is made from the path to the next waypoint.

4. The position of $M_2$ in insertion frame 768 (relative to $M_1$) is computed by $$\begin{bmatrix} X \\ Y \end{bmatrix}^{I}_{M1/M2} = \begin{bmatrix} \text{COS}\,A & -\text{SIN}\,A \\ \text{SIN}\,A & \text{COS}\,A \end{bmatrix} \cdot \begin{bmatrix} X_{latency} \\ Y_{764} \end{bmatrix}$$

The angle is computed by $$B = \text{TAN}^{-1}\left[\frac{Y^{I}_{M1/M2}}{X^{I}_{M1/M2}}\right]$$

5. Drive vehicle 2A to a rest stop 758, STOP, REQUEST INSERT FROM AGVC 13.

Figure 53:
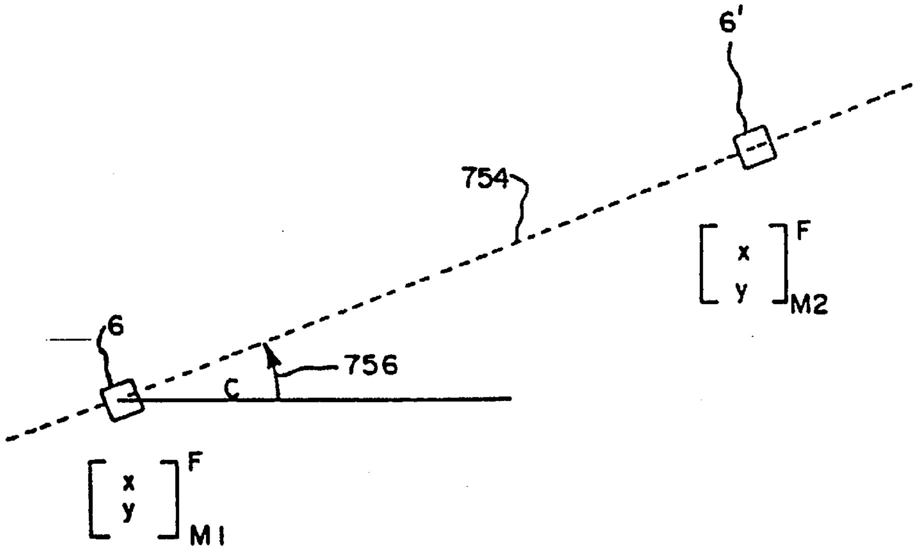
FIG. 53 is a simplified graph showing the geometrical relationships between the path between two markers and the factory frame.

6. On receipt on Insert from AGVC 13 (Actual $M_1$, $M_2$ coordinates)

$$C = \text{TAN}^{-1}\left[\frac{Y^{F}_{M2} - Y^{F}_{M1}}{X^{F}_{M2} - X^{F}_{M1}}\right]$$ (See FIG. 53 for definition of C.)

Compute position in factory coordinates $$\begin{bmatrix} X \\ Y \end{bmatrix}^{F}_{V} = \begin{bmatrix} \text{COS}\,(B-C) & \text{SIN}\,(B-C) \\ -\text{SIN}\,(B-C) & \text{COS}\,(B-C) \end{bmatrix} \cdot \begin{bmatrix} X^{I}_{VR} - X^{I}_{V/M2} \\ Y^{I}_{VR} - Y^{I}_{V/M2} \end{bmatrix} + \begin{bmatrix} X \\ Y \end{bmatrix}^{F}_{M2}.$$

7. The heading of the vehicle in the factory frame is calculated by $$[\text{HEADING}]_V^F = [\text{HEADING}]_{at\ rest}^I - (B-C)$$

Details of Vehicle 2A Calculations Including Kalman Equations

Some earlier described material is repeated in this section for clarity. The equations for navigation and guidance of the vehicle 2A and for the Kalman filter update of system parameters are based on aperiodic observation of surveyed floor position ground markers 6, aperiodic comparisons of vehicle 2A to factory frame 736 azimuth determined by the inertial table 700 with that based on fifth and sixth wheel (57, 59) data, and initial azimuth initialization estimates inserted manually into the system as herebefore described. Derivation of the equations are not provided. In this section, the equation sets are considered to provide for three separate computation cycle times. The first and fastest cycle is called the steering command loop. This loop provides a steering command to the vehicle steering computer and pre-processes wheel encoder data for a navigation loop. At this time it is not certain that these computations will have to be performed at a faster time than the navigation equations. If they do not, the equations given are easily modified for inclusion in a navigation loop. The time for the steering loop is designated $T_s$. The navigation loop contains the basic vehicle navigation equations, calculation of the steering command angle needed by the steering loop, and certain integrations needed in the Kalman filter loop. The navigation loop time is $T_n$.

The Kalman filter loop time is variable and is designated $T_k$. In the currently preferred embodiment, a Kalman filter cycle occurs immediately after the detection of a marker 6, at which time an observation is made of vehicle azimuth angle differences (table 700 vs. wheel 57, 59 data) and upon initial insertion of manual azimuth angle into the system. Each observation is assumed to be independent of the others (down-range vs. cross-range in the vehicle frame because of their orthogonality). Thus, the Kalman filter will process marker observations (sequentially) and angle comparisons concurrently.

References of distance and angle to frames of reference are as follows:

$X_v^f$ where X is the Cartesian measurement of x referenced from the factory to the vehicle frame.

Frames used herein consist of:

- Vehicle (v)
- Factory (f)
- Waypoint (w)
- Inertial Table (t)
- Others are as specified.

$\theta_v^f$ where θ is an angle measured from factory frame to vehicle frame.

Frame references are as specified above. In some cases, angles are measured relative to two intersecting lines (e.g. s and ss). Then the angle from s to ss is $\theta_s^{22}$.

The first step in Kalman calculations initializes the system error covariance matrix P as seen below, where all $p_{ii}$ values are taken at time (0)

$$P_{(0)} = \begin{bmatrix} p_{11} & 0 & 0 & 0 & 0 & 0 & 0 & 0 & 0 \\ 0 & p_{22} & 0 & 0 & 0 & 0 & 0 & 0 & 0 \\ 0 & 0 & p_{33} & 0 & 0 & 0 & 0 & 0 & 0 \\ 0 & 0 & 0 & p_{44} & 0 & 0 & 0 & 0 & 0 \\ 0 & 0 & 0 & 0 & p_{55} & 0 & 0 & 0 & 0 \\ 0 & 0 & 0 & 0 & 0 & p_{66} & 0 & 0 & 0 \\ 0 & 0 & 0 & 0 & 0 & 0 & p_{77} & 0 & 0 \\ 0 & 0 & 0 & 0 & 0 & 0 & 0 & p_{88} & 0 \\ 0 & 0 & 0 & 0 & 0 & 0 & 0 & 0 & p_{99} \end{bmatrix}$$

where $$P_{11} = E[(\delta x_v^f)^2]$$

$$P_{22} = E[(\delta y_v^f)^2]$$

$$P_{33} = E[(\delta\theta_v^f)^2]$$

$$P_{44} = E[(\delta K_r)^2]$$

$$P_{55} = E[(\delta k_l)^2]$$

$$P_{66} = E[(\delta r_a)^2]$$

$$P_{77} = E[(\delta\gamma_t^f)^2]$$

$$P_{88} = E[(\delta\omega_{MKV})^2]$$

$$P_{99} = E[(\delta\omega_{RW})^2]$$

Where the error state variables "δ" are defined as $\delta x_v^f$=x error in the factory frame $\delta y_v^f$=y error in the factory frame $\delta\theta_v^f$=heading error of the vehicle in the factory frame $\delta k_r$=error in right wheel calibration $\delta k_l$=error in left wheel calibration $\delta r_a$=error in axle ($r_a$) calibration $\delta\gamma_t^f$=error in gyro drift of the inertial table relative to the factory frame $\delta\omega_{MKV}$=error in the drift rate estimate due to Markov noise $\delta\omega_{RW}$=error in the drift rate estimate due to random walk noise The error state vector, $\delta X$, is defined as:

$$\delta X = \begin{bmatrix} \delta x_v f \\ \delta y_v f \\ \delta\theta_v f \\ \delta K_r \\ \delta K_l \\ \delta r_a \\ \delta\gamma_l f \\ \delta\omega_{MKV} \\ \delta\omega_{RW} \end{bmatrix}$$

The initial P matrix can be generated by performing the following calculation:

$$P(k)=\Phi_p(k)(0.5Q(k))\Phi_p^T(k)-0.5Q(k)$$

where k=0

To initialize using measurements, which include typical system noise, vehicle 2A is moved between two markers 6, 6' having predetermined factory frame 736 locations. As vehicle 2A is moved, "noise" is propagated down this "typical path," designated by $\Phi_p$. Definition for Q is provided hereafter. As disclosed earlier, $P_{88}(0)$ is set equal to zero as Markov gyro drift error is negligible in the currently preferred embodiment.

Calculations Done in the Steering Loop

The steering loop is the fastest loop. The steering loop time is designated as $T_s$. Navigation and guidance loop time ($T_n$) is currently 30 milliseconds. Steering loop time can be as slow as navigation and guidance loop time $T_n$, but is cyclicly dependent upon vehicle 2A guidance stability requirements. In the currently preferred embodiment, $T_n$ is an incremental multiple of $T_s$ as related below. In the following discussion, vehicle 2A is assumed to be going forward such that starboard=right and port=left.

Input to steering loop equations:

$\Delta\theta_{rw'}$, incremental angle (ticks) from the fifth (starboard) wheel 57 encoder.

$\Delta\theta_{lw'}$, incremental angle (ticks) from the sixth (port) wheel 59 encoder.

$\theta_c(n)$, steering command angle from navigation and guidance loop calculations.

Output of equations and selective constants:

$K_{RW}$ Kalman correction of $C_D$ $\theta_v^f(n)$ vehicle azimuth derived from fifth and sixth wheel (57, 59) encoder 58 data. Sent to navigation and guidance loop at the end of "M" steering loop cycles. ($T_n$=M*$T_s$)

$\Delta X_{rw}(n)$ scaled starboard wheel 57 ticks accumulated over "M" steering loop cycles and sent to the navigation and guidance loop.

$\Delta X_{lw}(n)$ scaled port wheel 59 ticks accumulated over "M" steering loop cycles and sent to the navigation and guidance loop.

$\alpha$=break frequency of gyro Markov noise $C_D$=initial estimate of the gyro drift rate $\omega_c(s)$ steering command sent to vehicle steering computer every steering loop cycle.

$S_{rw,lw}$=nominal scaling factors to convert right, left wheel encoders 58

$S_a=1/r_a$ $K_{rw,lw}$=Kalman correction of $S_{rw,lw}$

Equations:

$$\Delta X_{rw}(s)=S_w*\Delta\theta_{rw}(s)*(1+K_{rw});\ \Delta X_{rw}(0)=0$$

$$\Delta X_{rw}(n)=\Sigma\Delta X_{rw}(s)$$

over "M" cycles (one navigation and guidance cycle).

$$\Delta X_{lw}(s)=S_w*\Delta\theta_{lw}(s)*(1+K_{lw});\ \Delta X_{lw}(0)=0$$

$$\Delta X_{lw}(n)=\Sigma\Delta X_{lw}(s) \text{ over "M" cycles}$$

$$\Delta\theta_v^f(s)=S_a*[\Delta X_{rw}(s)-\Delta X_{lw}(s)]$$

$$\theta_v^f(s)=\theta_v^f(s-1)+\Delta\theta_v^f(s)$$

$$\theta_v^f(n)=\theta_v^f(s);$$

$\theta_v^f$ is read out once each navigation and guidance cycle.

$$\theta_e(s)=\theta_c(n)-\theta_v^f(s)$$

$$\omega_c(s)=S_{s1}*\omega_c(s-1)+S_{s2}*\omega_c(s-2)+S_{s3}*\theta_e(s)+S_{s4}*\theta_e(s-1)+S_{s5}*\theta_e(s-2)$$

Calculations Done in the Navigation and Guidance Loop

The following calculations are performed in the navigation and guidance loop.

$T_n$ navigation and guidance loop time (30 ms) is the currently preferred embodiment.

$$\Delta X^v(n)=[\Delta X_{rw}(n)+\Delta X_{lw}(n)]/2$$

$$\Delta y^v\Delta 0$$

$$COS(n)=[\cos\theta_v^f(n)+\cos\theta_v^f(n-1)]/2$$

$$SIN(n)=[\sin\theta_v^f(n)+\sin\theta_v^f(n-1)]/2$$

$$\Delta X_v^f(n)=COS(n)*\Delta_X^v(n)$$

$$\Delta y_v^f(n)=SIN(n)*\Delta X^v(n)$$

$$x_v^f(n)=x_v^f(n-1)+\Delta x_v^f(n)$$

$$y_v^f(n)=y_v^f(n-1)+\Delta y_v^f(n)$$

$$\omega_{MKV}(n)=\omega_{MKV}(n-1)*(1-\alpha)=0$$

(in the currently preferred embodiment using gyro 500)

$$\omega_l^f(n)=\omega_{MKV}(n)+C_D+K_{RW} \text{ (gyro 500 drift rate)}$$

$$\gamma_l^f(n)=\gamma_l^f(n-1)+T_n*\omega_l^f(n)$$

$$\Sigma_{13}(n)=\Sigma_{13}(n-1)+\Delta y^f(n)$$

$$\Sigma_{14}(n)=\Sigma_{14}(n-1)+COS(n)*\Delta X_{rw}$$

$$\Sigma_{15}(n)=\Sigma_{15}(n-1)+COS(n)*\Delta X_{lw}$$

$$\Sigma_{23}(n)=\Sigma_{23}(n-1)+\Delta X^f(n)$$

$$\Sigma_{24}(n)=\Sigma_{24}(n-1)+SIN(n)*\Delta X_{rw}(n)$$

$$\Sigma_{25}(n)=\Sigma_{25}(n-1)+\mathrm{SIN}(n)*\Delta X_{lw}(n)$$

$$\Sigma_{34}(n)=\Sigma_{34}(n-1)+\Delta X_{rw}(n)$$

$$\Sigma_{35}(n)=\Sigma_{35}(n-1)+\Delta X_{lw}(n)$$

$$\Sigma_{36}(n)=\Sigma_{36}(n-1)+\Delta\theta_v^f(n)$$

The following equations are calculated at the initialization of a straight line maneuver at time I.

$\theta_w$ = the path angle to a waypoint 714 in factory frame 736 coordinates.

$$X_v^f(I) = X_v^f(n)$$
$$Y_v^f(I) = Y_v^f(n)$$
$$x_v^w(I) = [x_w^f - x_v^f(I)]\cos_w^\theta + [y_w^f - y_v^f(I)]\sin_w^\theta$$
$$y_v^w(I) = [x_w^f - x_v^f(I)]\sin_w^\theta - [y_w^f - y_v^f(I)]\cos_w^\theta$$
$$x_0 = x_v^w(I)$$
$$y_0 = y_v^w(I)$$
$$d = X_0$$
$$a_0 = y_0$$
$$\beta(I) = \theta_v^f(I) - \theta_w$$
$$a_1 = \tan\beta(I)$$

$$a_3 = -\frac{10*y_0}{d^3} - \frac{6*\tan\beta(I)}{d^2}$$

$$a_4 = \frac{15*y_0}{d^4} + \frac{8*\tan\beta(I)}{d^3}$$

$$a_5 = -\frac{6*y_0}{d^5} - \frac{3*\tan\beta(I)}{d^4}$$

$$X_0^f(I) = X_w^f(I) - X_v^w(I)\cos\theta_w$$
$$Y_0^f(I) = Y_w^f(I) - Y_v^w(I)\cos\theta_w$$

The following equations are then calculated at navigation and guidance loop rate (i.e., at $T_n$)

$$x_v^w(n)=[x_v^f(n)-x_0^f(I)]\cos\theta_w+[y_v^f(n)-y_0^f(I)]\sin\theta_w$$

$$y_v^w(n)=-[x_v^f(n)-x_0^f(I)]\sin\theta_w+[y_v^f(n)-y_0^f(I)]\cos\theta_w$$

$$y_D^w(n)=a_0+a_1*x_v^w(n)+a_3*(x_v^w(n))^3+a_4*(x_v^w(n))^4+a_5*(x_v^w(n))^5$$

$$\delta_p(n)=y_d^w(n)-y_v^w(n)$$

The $b_i$ equations are calculated at the initialization of a polar turn. The other equations are calculated at navigation and guidance loop rate. $R_T$ is the radius of the turn. $X_w^f$, $Y_w^f$ are defined here as $X_v^f(I)$, $Y_v^f(I)$, the initial starting point of the vehicle in the factory frame.

$$X_v^P = R_T + [x_v^f(n) - x_w^f]\sin_w^\theta - [y_v^f(n) - y_w^f]\cos_w^\theta$$
$$y_v^P = [x_v^f(n) - x_w^f]\cos_w^\theta + [y_v^f(n) - y_w^f]sin_w^\theta$$

$$\phi_v = \tan^{-1}\left[\frac{y_v^p(n)}{x_v^p(n)}\right]$$

$$R_v^p(n) = \sqrt{(x_v^p(n)^2 + (y_v^p(n)^2}$$

$\phi_T$ = Total angle of the turn $$b_0 = R_T$$

$$b_2 = \frac{R_T}{2}$$

$$b_3 = -\frac{R_T}{\phi_T}$$

$$b_4 = \frac{R_T}{2*\phi_z^2}$$

-continued $$R_D^p(n) = b_0 + b_2*(\phi_v(n))^2 + b_3*(\phi_v(n))^3 + b_4*(\phi_v(n))^4$$
$$\delta_p(n) = R_v^p(n) - R_D^p(n)$$

Using either the above calculated value of $\delta_p(n)$ or that derived in the straight line turn, the vehicle is steered to stay on the calculated trajectory using, $$\theta_c(n)=S_{\theta_1}*\theta_c(n-1)+S_{\theta_2}*\theta_c(n-2)+S_{\theta_3}*\delta_p(n)+S_{\theta_4}*\delta_p(n-1)+S_{\theta_5}*\delta_p(n-2)$$

$\theta_c(n)$ is used in the steering loop calculations.

The Kalman Filter Loop Calculations $$\phi_{13}(k)=-\Sigma_{13}(n)$$

$$\phi_{14}(k)=\Sigma_{14}(n)/2$$

$$\phi_{15}(k)=\Sigma_{15}(n)/2$$

$$\phi_{23}(k)=\Sigma_{23}(n)$$

$$\phi_{24}(k)=\Sigma_{24}(n)/2$$

$$\phi_{25}(k)=\Sigma_{25}(n)/2$$

$$\phi_{34}(k)=S_a*\Sigma_{34}(n)$$

$$\phi_{35}(k)=-S_a*\Sigma_{35}(n)$$

$$\phi_{36}(k)=-S_a*\Sigma_{36}(n)$$

$$\phi_{78}(k)=[1-\exp(-\alpha*T_k)]/\alpha$$

$$\phi_{79}(k)=T_k$$

$$\phi_{88}(k)=\exp(-\alpha*T_k)$$

$\Sigma_{ij}=0$ (set all sums to zero)

Now construct the $\Phi$ matrix.

$$\Phi(k) = \begin{bmatrix} 1 & 0 & \phi_{13}(k) & \phi_{14}(k) & \phi_{15}(k) & 0 & 0 & 0 & 0 \\ 0 & 1 & \phi_{23}(k) & \phi_{24}(k) & \phi_{25}(k) & 0 & 0 & 0 & 0 \\ 0 & 0 & 1 & \phi_{34}(k) & \phi_{35}(k) & \phi_{36}(k) & 0 & 0 & 0 \\ 0 & 0 & 0 & 1 & 0 & 0 & 0 & 0 & 0 \\ 0 & 0 & 0 & 0 & 1 & 0 & 0 & 0 & 0 \\ 0 & 0 & 0 & 0 & 0 & 1 & 0 & 0 & 0 \\ 0 & 0 & 0 & 0 & 0 & 0 & 1 & \phi_{78}(k) & \phi_{79}(k) \\ 0 & 0 & 0 & 0 & 0 & 0 & 0 & \phi_{88}(k) & 0 \\ 0 & 0 & 0 & 0 & 0 & 0 & 0 & 0 & 1 \end{bmatrix}$$

In the currently preferred embodiment, gyro 500 drift rate is characterized by a random walk error state variable, $\delta\omega_{rw}$. Thus, $V_{77}=0$, $V_{88}=0$, and $\alpha=0$, so $\phi_{78}=\phi_{79}=T_k$, and $\phi_{88}=0$. $T_k$ is the Kalman cycle time.

Construction of the Q Matrix

The Q matrix is constructed from $Q=GVG^T$ where G is the matrix relating process noise to the error states, and V is the process noise covariance matrix. Elements of the G matrix are contained in the equations below:

$$q_{11}(k)=v_{11}*(\phi_{14}(k))^2+v_{22}*(\phi_{15}(k))^2+v_{33}*(\phi_{13}(k))^2$$

$$q_{12}(k)=v_{11}*\phi_{14}(k)*\phi_{24}(k)+v_{22}*\phi_{15}(k)*\phi_{25}(k)+v_{33}*\phi_{13}(k)*\phi_{23}(k)$$

$$q_{13}(k)=v_{11}*\phi_{14}(k)*\phi_{34}(k)+v_{22}*\phi_{15}(k)*\phi_{35}(k)$$

$$q_{21}(k)=v_{11}*\phi_{14}(k)*\phi_{24}(k)+v_{22}*\phi_{15}(k)*\phi_{25}(k)+v_{33}*\phi_{13}(k)*\phi_{23}(k)$$

$$q_{22}(k)=v_{11}*(\phi_{24}(k))^2+v_{22}*(\phi_{25}(k))^2+v_{33}*(\phi_{23}(k))^2$$

$$q_{23}(k)=v_{11}*\phi_{24}(k)*\phi_{34}(k)+v_{22}*\phi_{25}(k)*\phi_{35}(k)$$

$$q_{31}(k)=v_{11}*\phi_{14}(k)*\phi_{34}(k)+v_{22}*\phi_{15}(k)*\phi_{35}(k)$$

$$q_{32}(k)=v_{11}*\phi_{24}(k)*\phi_{34}(k)+v_{22}*\phi_{25}(k)*\phi_{35}(k)$$

$$q_{33}(k)=v_{11}*(\phi_{34}(k))^2+v_{22}*(\phi_{35}(k))^2$$

$$q_{77}(k)=v_{77}$$

$$q_{88}(k)=v_{88}$$

$$q_{99}(k)=v_{99}*T_k^2$$

The uncorrelated process noises are represented by the covariance matrix:

$$V=\begin{bmatrix} V_{11} & 0 & 0 & 0 & 0 & 0 \\ 0 & V_{22} & 0 & 0 & 0 & 0 \\ 0 & 0 & V_{33} & 0 & 0 & 0 \\ 0 & 0 & 0 & V_{77} & 0 & 0 \\ 0 & 0 & 0 & 0 & V_{88} & 0 \\ 0 & 0 & 0 & 0 & 0 & V_{99} \end{bmatrix}$$

The values $V_{ii}$ in the above matrix provide the V process noise covariance matrix.

$$v_{11}=E[\epsilon_{\theta_{rw}}\epsilon_{\theta_{rw}}]=E[\epsilon^2_{\theta_{rw}}]$$
$$v_{22}=E[\epsilon^2_{\theta_{lw}}]$$
$$v_{33}=E[\epsilon_s^{\,2}]+E[\epsilon^2_{vw/v}]$$
$$v_{77}=E[\epsilon^2_{WNg}]$$

$$v_{88}=E\left[(\sqrt{\ 2a\,\rho^{-1}_{MKV}\,\epsilon_{MKV})^2}\ \right]=2a\sigma^2_{MKV}$$

$$v_{99}=E[\epsilon^2_{RW}]$$

Where noise variances are due to:

floor anomalies (right wheel) ($V_{11}$)

floor anomalies (left wheel) ($V_{22}$)

wheels side slip ($V_{33}$)

white noise in angular rate sensor ($V_{77}$)

Markov noise in angular rate sensor (MKV)

where $\sigma_{MKV}$ is the standard deviation of the Markov noise ($V_{88}$)

random walk noise is angular rate sensor ($v_{99}$)

$$Q(k)=\begin{bmatrix} q_{11}(k) & q_{12}(k) & q_{13}(k) & 0 & 0 & 0 & 0 & 0 & 0 \\ q_{21}(k) & q_{22}(k) & q_{33}(k) & 0 & 0 & 0 & 0 & 0 & 0 \\ q_{31}(k) & q_{32}(k) & q_{33}(k) & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & q_{77}(k) & 0 & 0 \\ 0 & 0 & 0 & 0 & 0 & 0 & 0 & q_{88}(k) & 0 \\ 0 & 0 & 0 & 0 & 0 & 0 & 0 & 0 & q_{99}(k) \end{bmatrix}$$

Next, propagate the error covariance matrix P to time k using $T_k$, the time since the last Kalman cycle.

$$P(k)=\phi(k)[P(k-1)+\tfrac{1}{2}*Q(k)]\phi(k)^T+\tfrac{1}{2}*Q(k)$$

Now, construct the h vector(s) appropriate to the observation being processed.

$$h_1=[\cos\theta_v^f\sin\theta_v^f\ 0\ 0\ 0\ 0\ 0\ 0\ 0]$$

$$h_2=[-\sin\theta_v^f\cos\theta_v^f\ 0\ 0\ 0\ 0\ 0\ 0\ 0]$$

$$h_3=[0\ 0\ 1\ 0\ 0\ 0\ {-1}\ 0\ 0\ ]$$

In the above equations, all measurements are assumed to be independent, providing redundancy whereby systematic errors of measurement are evaluated and removed by real time calibration using Kalman filtering. Marker 6 measurements (x, y) are used in observations 1,2 and vehicle 2A gyro 500 measurement is used in observation 3 of the h vector(s), above. The down-range and cross-range observations are orthogonal in vehicle 2A coordinates and could be measured at different times. Of course x and y should be measured concurrently. However, in the currently preferred embodiment, a sample directional measurement is taken from gyro 500 each time a marker 6 is located. In another preferred embodiment, a sample directional measurement is also taken from gyro 500 each time a new turn or straight line path is calculated. Thus, the h matrix comprises $h_{1,2,3}$ in the currently preferred embodiment.

Note: While all measurement are dependent, the down-range and cross-range observations are orthogonal in vehicle coordinates, and can be taken separately, but x and y should be taken simultaneously.

Notation: $K_i$, $h_i$, $r_i$, $z_i$, . . . ; i=the measurement number i.e., i=1 down-range observation i=2 cross-range observation i=3 azimuth angle comparison The Kalman gain $K_i$ for the i'th observation where $r_i$ is defined as the i'th observation noise variance is computed.

$$K_i=\frac{P(k)h_i^T}{(h_iP(k)h_i^T+r_i)}$$

The filter covariance matrix is updated by the following equations:

$$P^+(k)=(I-K_ih_i)=P(k)-K_i(P(k)h_i^T)^T$$

where $P^+(k)$ is updated P(k)

$$\delta z_i=h_i\delta X$$

$$\delta\hat{X}^+=\delta\hat{X}+K_i(\delta z_i-\delta\hat{z}_i)$$

Where "^" over a variable denotes the estimates value of that variable. The initial estimate for $\delta\hat{X}$ is zero at the beginning of each Kalman cycle.

For simultaneous observations, such as observations 1, 2, an iteration process is performed as follows:

$$K_1=\frac{P(k)h_1^T}{h_1P(k)h_1^T+r_1}$$

$$\delta\hat{z}_1=h_1\delta\hat{x}=0$$

$$\delta\hat{x}^+=k_1\delta_{z_1}$$

$$\delta\hat{x}=\delta\hat{x}^+$$

$$P^+(k)=P(k)-K_1(P(k)h_i^T)^T$$
$$P(k)=P^+(k)$$

-continued $$K_2 = \frac{P(k)h_2^T}{h_2P(k)h_2^T + r_2}$$

$$\delta\hat{z}_{z_2} = h_2\delta\hat{x}$$

$$\delta\hat{x}^{+} = \delta\hat{x} + k_2(\delta_{z_2} - \delta\hat{z}_2)$$

$$P^{+}(k) = P(k) - k_2(P(k)h_2^T)^T$$
$$P(k) = P^{+}(k)$$

The final values in $\delta\hat{X}^{+}$ provide the state variable corrections, as error correcting estimates.

Review of the Kalman Filter as Used in the Currently Preferred Embodiment

Process errors are based on specifications, drawings and calculations. Once the process noises (6 maximum) and measurement noises (3 maximum) are selected, then the propogation of process and measurement noises is defined by the path(s).

Process Noises $$V = \begin{bmatrix} V_{11} & & & & & \\ & V_{22} & & & & \\ & & V_{33} & & & \\ & & & 0 & & \\ & & & & 0 & \\ & & & & & V_{66} \end{bmatrix} \begin{matrix} \leftarrow \text{Floor, wheel irregularities} \\ \leftarrow \text{Floor, wheel irregularities} \\ \leftarrow \text{Sideslip} \\ \\ \\ \leftarrow \text{Gyro Random Walk} \end{matrix}$$

Measurement Noise $$R = \begin{bmatrix} r_{11} & 0 & 0 \\ 0 & r_{22} & 0 \\ 0 & 0 & r_{33} \end{bmatrix} \begin{matrix} \leftarrow \text{Magnet position \& heading calculation from encoder 58} \\ \leftarrow \text{Magnet position \& heading calculation from encoder 58} \\ \leftarrow \text{Gyro 500 encoder resolution \& Heading calculation from encoder 58} \end{matrix}$$

To estimate the first initial P matrix, once can use $$P_{(k)} = \phi(k)(.5Q(k))\phi(k)^T + .5Q(k) + \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & E(\delta_{kr})^2 & 0 & 0 \\ 0 & 0 & 0 & 0 & E(\delta_{kl})^2 & 0 \\ 0 & 0 & 0 & 0 & 0 & 0 \end{bmatrix}$$

where $k=0$ in which $E(\delta k_r)^2$=expected value of the squared error in wheel diameter $(\delta k_r^2 = \delta k_l^2)$ NOTE: $\phi$ and Q are based on a "typical" path/pathlength.

It was previously shown that a marker (magnet) observation required to measurement inputs related to two of the error state variables ($\delta x_v^f$, $\delta y_v^f$). With error states $\delta r_a$, $\delta\gamma_t^f$, $\delta\omega_{MKV}$ removed from the error state vector, the definition of the measurement can be shown to be $\delta z = h\delta X$ (2×1 2×6 6×1 matrix orders)

$\delta$Meas.=$h\delta$state where $\delta z$=detected−calculated measurements $\delta X$=actual−estimates (calculated) states h is selection vector.

The "preferred embodiment" involves also taking an azimuth measurement at the time the magnet is detected to provide overlapping, redundant information.

The azimuth measurement by itself is actually given by:

$$\delta_{z_3} = \delta\text{ heading error} - \delta\text{ gyro drift error}$$
$$= \delta\theta_v^f - T_k \cdot \delta\omega^f$$

| $\delta\theta_v^f$ | $T_k$ | $\delta\omega^f$ |
|---|---|---|
| encoder 58 wheels 57, 59 error | Kalman time | Drift rate error |

Careful expansion shows that $$\delta_{z_3} = T_k\tilde{\omega}^f + \tilde{\Delta\gamma}_v^t - \tilde{\theta}_v^f$$

| $T_k\tilde{\omega}^f$ | $+\tilde{\Delta\gamma}_v^t$ | $-\tilde{\theta}_v^f$ |
|---|---|---|
| Predicted Drift based on <u>last</u> ($\tilde{\omega}^f$) updated drift rate | Change in Gyro 500 Encoder | Encoder 58 for wheels 57, 59 |

is equivalent to $\delta z_3 = (0\ 0\ 1\ 0\ 0\ {-T_k})\delta\hat{X}$ where $\Delta\gamma_v^t$ is the change in gyro 500 angle over the last Kalman cycle "$\tilde{\theta}$" is the current estimates of the underlying variable (e.g., $\tilde{\ }_v^f$ is the current estimate of $\theta$ measured from factory to vehicle coordinates.)

Using a simultaneous update actually reduces process time from a sequential method, besides offering the advantages of redundancy, "best information," stability, etc. so that the vehicle can operate at up to 200 ft/minute with no need to slow down for Kalman calculations.

To maintain speed, Kalman updates are only performed before a new trajectory calculations at a waypoint or after sensing a marker 6. An azimuth measurement can be performed prior to any waypoint. To combine azimuth and marker measurements, the measurement matrix h is expanded to be used as follows:

$$\begin{bmatrix} -\Delta_m\sin\tilde{\theta}_v^f - \tilde{\Delta}_{mx} \\ \Delta_m\cos\tilde{\theta}_v^f - \tilde{\Delta}_{my} \\ T_k\tilde{\omega}^f(0) + \Delta\gamma_v^t - \tilde{\theta}_v^f \end{bmatrix} = \begin{bmatrix} 1 & 0 & \Delta_m\cos\tilde{\theta}_v^f & 0 & 0 & 0 \\ 0 & 1 & \Delta_m\sin\tilde{\theta}_v^f & 0 & 0 & 0 \\ 0 & 0 & 1 & 0 & 0 & -T_k \end{bmatrix} \begin{bmatrix} \delta_{x_v^f} \\ \delta_{y_v^f} \\ \delta\theta_v^f \\ \delta_{k_r} \\ \delta_{k_l} \\ \delta\omega^f \end{bmatrix}$$

$(\delta\tilde{z} = h\delta\tilde{x})$ where $\omega(0)$ is the value of $\omega$ at time t(0)

where $\Delta_m$ is $y^v$ position acquired from a marker 6 measurement and $\tilde{\Delta}_{mx} = X_v^f - X_m^f$ where "m" is the measured marker position $$\Delta_{my}=Y_v^f-Y_m^f$$

During that Kalman time [$T_k$=t(1)−t(0)] the transition matrix, Φ, is propagated as shown earlier. At time t(1), the P matrix is propogated at follows:

$$P(k)=\phi(k)\cdot(P(k-1)+0.5\cdot Q(k))\Phi(k)^T+0.5\cdot Q(k)$$

then $$K=P(k)h^T(hP(k)h^T+R)^{-1} \text{ Kalman gain}$$

$$\delta_{\hat{X}+}=K\cdot\delta_{\hat{z}} \text{ Updated errors [actual − calculated estimated]}$$

then when the waypoint is reached $$\hat{X}(n)=[\hat{X}(n-1)+\delta_{\hat{X}+}] \quad \text{where } \hat{X}(n) \text{ is the current estimate of the state of the vehicle parameters (i.e., } \hat{X}=[\hat{X}_v f \hat{y}_v f \hat{\theta}_v f \hat{K}_{rw} \hat{K}_{1w} \hat{\omega}_r f]^T)$$

$$P^+(k)=(I-K\cdot h)P(k)$$
$$P(k)=P^+(k)$$

Vehicle 2A Path Selection Criteria

As described earlier, each calculated path between waypoints 714 is based upon the calculation of coefficients for a fifth order cartesian coordinate or polar coordinate polynomial. Each polynomial being used for calculating in seriatim the guide points of a path along which vehicle 2A steers, the coefficients of the cartesian coordinate polynomial being used for "straight line" moves and the polar coordinate polynomial being used to calculate moves involving arcs, such as paths around corners. In some cases, both straight line and arc moves are used in sequential combination in those circumstances where a single move will not place the vehicle at the target waypoint 714 proceeding in the desired direction.

Figure 64:
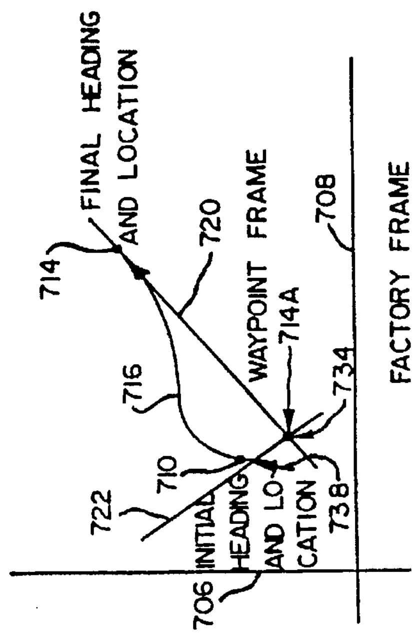
FIG. 64 is a diagram of a "straight line" guidepath showing relationship of a waypoint frame to the factory frame.

Polynomial generation constraints for the linear or "straight line" coefficient calculations comprise restricting the initial angle of the path to the then current direction of AGV 2A, defining a path which is continuous, and terminating the path at the target waypoint 714 tangent to the heading specified by AGVC 13. FIG. 64 provides a graph of a desired path between the vehicle and a next waypoint 714. The vehicle position 710 and direction 738 are usually not as originally planned and stored for the path between waypoints 714. Instead, in realistic terms, AGV 2A must be considered to reside at position 710 when the 710, 714 path calculations are made. Constraints placed upon calculation of the coefficients of the fifth order polynomial which describes path 716 in FIG. 64 are the following:

1. Initial heading of the path 710, 714 is equal to vehicle 2A heading 738.
2. The path described by the polynomial is continuous.
3. Final heading of vehicle 2A at 714 is the heading angle provided by AGVC 13 in the message directing vehicle 2A travel and is always zero in waypoint frame 734.

Exemplary path 716 shows expected curvature in the "straight line" guidepath.

Figure 66:
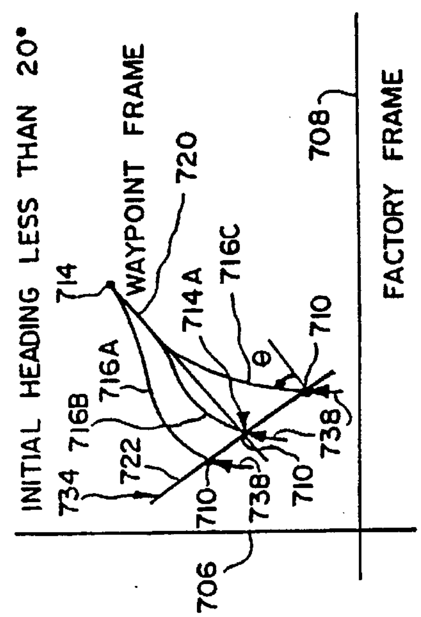
FIG. 66 is a diagram showing a family of three guidepaths each of which results from a different position of the vehicle with regard to a waypoint frame.

Dependent upon vehicle position relative to a target waypoint 714, one set of polynomial coefficients is generated. A new set of polynomial coefficients is generated for each different position of vehicle 2A relative to waypoint 714, thereby providing a family of curves, three of which are seen in FIG. 66. As seen in FIG. 66, guidepaths 716A, 716B, and 716C provide three such exemplary guidepaths for a vehicle placed at an initial position 710 and heading 738 near a first waypoint 714A.

Figure 65:
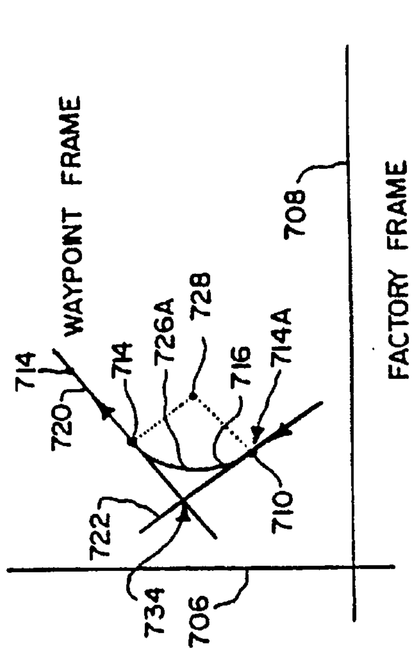
FIG. 65 is a diagram of an "arc" guidepath showing a plot of a turn in a waypoint frame.

Polynomial generation constraints for the polar or curve guidepath are similar to those of the "straight line" case, resulting in an arcing path as seen in FIG. 65. The constraints placed upon the coefficients of the fifth order polynomial in polar coordinates are as follows:

1. Initial heading of path 726A is tangent to the initial heading of AGV 2A at the beginning of the path.
2. The fifth order polynomial describes a continuous path.
3. Final heading of vehicle 2A at 714 is the heading angle provided by AGVC 13 is the message directing vehicle 2A travel and is always zero in waypoint frame 734.

Exemplary path 726A, seen in FIG. 65, shows the expected guidepath arc along path 710, 716.

Dependent upon vehicle position relative to an initial waypoint 714A, one set of polar polynomial coefficients is generated. A new set of polynomial coefficients is generated for each different position of vehicle 2A relative to waypoint 714, thereby providing a family of curves.

Figure 96:
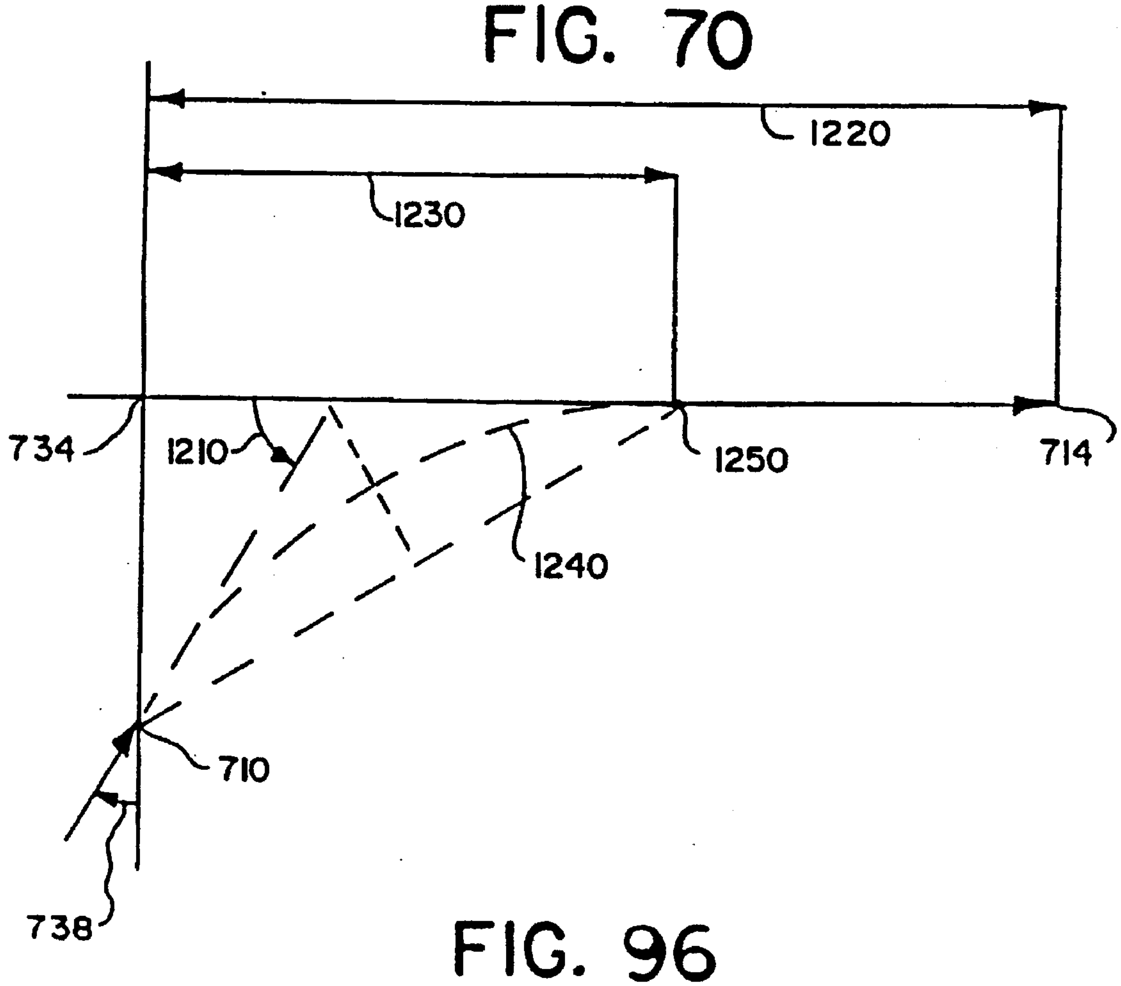
FIG. 96 is a graph showing a proposed path for a vehicle in a waypoint frame wherein measurements are made to determine path selection.

It has been found in the current embodiment, that selection of the type and number of polynomial calculations to define a guidepath is dependent upon initial heading 738 of AGV 2A in waypoint frame 734. If the initial heading 738 in waypoint frame 734 produces an angle with the abscissa of waypoint frame 734 which is an absolute angle less than 20°, a "straight line" calculation is made in Cartesian coordinates. If the heading angle produces an angle with the abscissa of waypoint frame 734 which is greater than or equal to 20°, a decision process, best described by referencing FIG. 96, is followed. As seen in FIG. 96, initial heading 738 results in angle 1210 with the abscissa of waypoint frame 734.

The next step in the decision process calculates a polar or curved path 1240 which tangentially intersects the abscissa of waypoint frame 734 at a point 1250. The intersection 1250 is a distance 1230 from the origin of waypoint frame 734. The distance along the abscissa of waypoint frame 734 to waypoint 714 is seen as line 1220. If the length of line 1230 is less than line 1220, a polar or arc move followed by a straight line move is performed. If line 1230 is equal to line 1220, a single polar move is performed. If line 1230 is greater than line 1220, and if angle 1210 is greater than 65° a compound move, as described hereafter, is performed.

Figure 67:
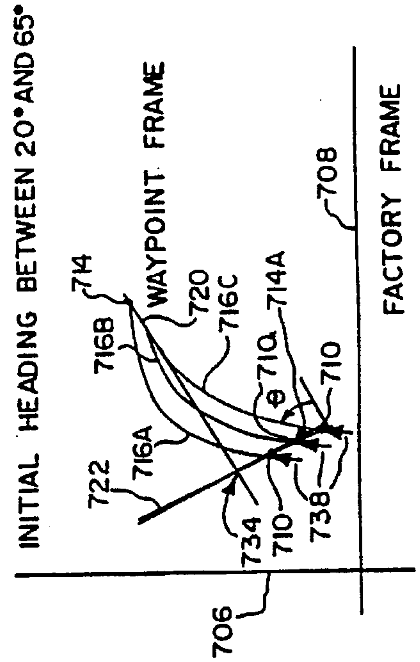
FIG. 67 is a diagram showing a family of three guidepaths where a turn of the vehicle is executed from different relative positions in a waypoint frame.

Another selecting criteria, is the use of X,Y and the heading angle 1210 in waypoint frame 734 coordinates. The ratio of X/Y and tangent of heading angle 1210 is calculated. If heading angle 1210 is between 20° and 65°, and the ratio is less than 0.35 a "straight line" move is made. A family of three arch curves are seen in FIG. 67. The ratio provides an estimate of the overshoot of the vehicle and the abscissa of waypoint frame 734. If the ratio is greater than 0.35 and the heading angle is between 20° and 65°, a "straight line" path followed by a polar move is performed.

Figure 68:
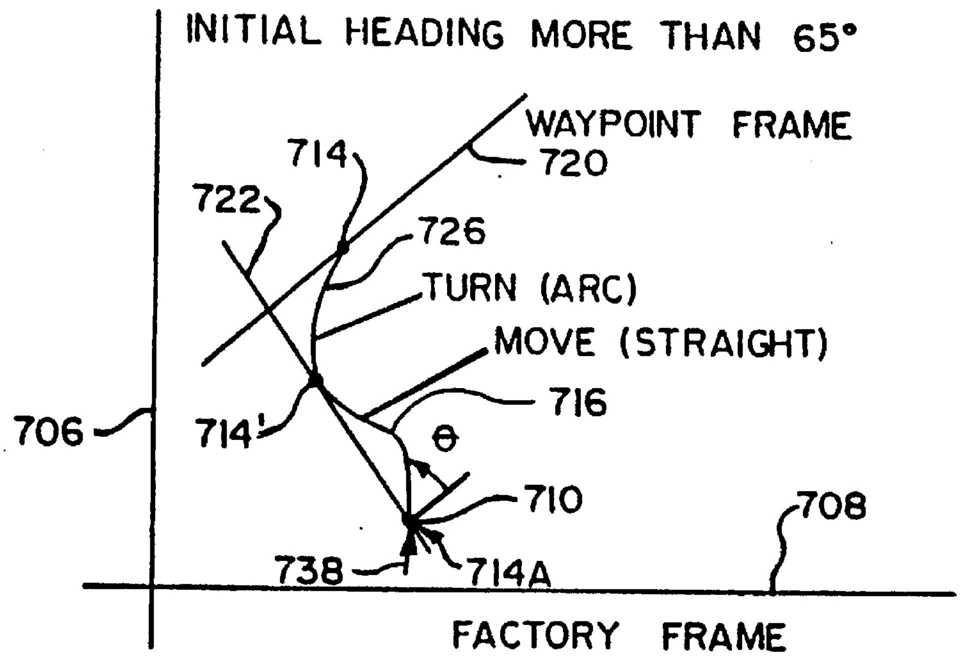
FIG. 68 is a diagram of a complex guidepath formed by successively calculated guidepaths comprising in seriatim a "straight line" and then an arcing or curved guidepath.

For those cases where the absolute value of angle 1210 is greater than 65° and line 1230 is greater than line 1220, as seen in FIG. 96, the guidepath is defined as a combination of "straight line" and curve moves. A guidepath is seen in FIG. 68 wherein the required waypoint 714 target position and direction are not achievable using a single fifth order polynomial calculated guidepath. In the case of the path requirements seen in FIG. 68, the path is divided into two segments, 716 and 726, the calculated path defining coefficients being calculated in Cartesian coordinates for first path 716 and in polar coordinates for second path 726, thereby achieving the necessary waypoint 714 position and exit heading.

The calculation of distances in waypoint frame 734 coordinates from factory frame 736 coordinates is:

$$\begin{bmatrix} X \\ Y \end{bmatrix}_V^W = \begin{bmatrix} \cos\theta & \sin\theta \\ -\sin\theta & \cos\theta \end{bmatrix} \begin{bmatrix} X_D - X_I \\ Y_D - Y_I \end{bmatrix}$$

Where:

X,Y are distances in waypoint frame 734 coordinates.

θ is the angle between the vehicle 2A and waypoint frame 734.

$X_D$,$Y_D$ are destination or waypoint 714 coordinates in the factory frame 736.

$X_I$,$Y_I$ are coordinates of initial vehicle 2A position in factory frame 736 coordinates.

For precision in calculation of positions in the currently preferred embodiment of a marker 6 in the factory frame 736, a three byte field is used in all position coordinate determinations yielding a range of 8,368,607 in units of 1/20 of an inch. Thus, the position measurement range is 34,952 feet or 10,653.5 meters. A two byte field is used for heading determinations, whereby a precision of 0–359.99 is achieved for calculational purposes.

AGV 2A Central Processing Units

Figure 77:
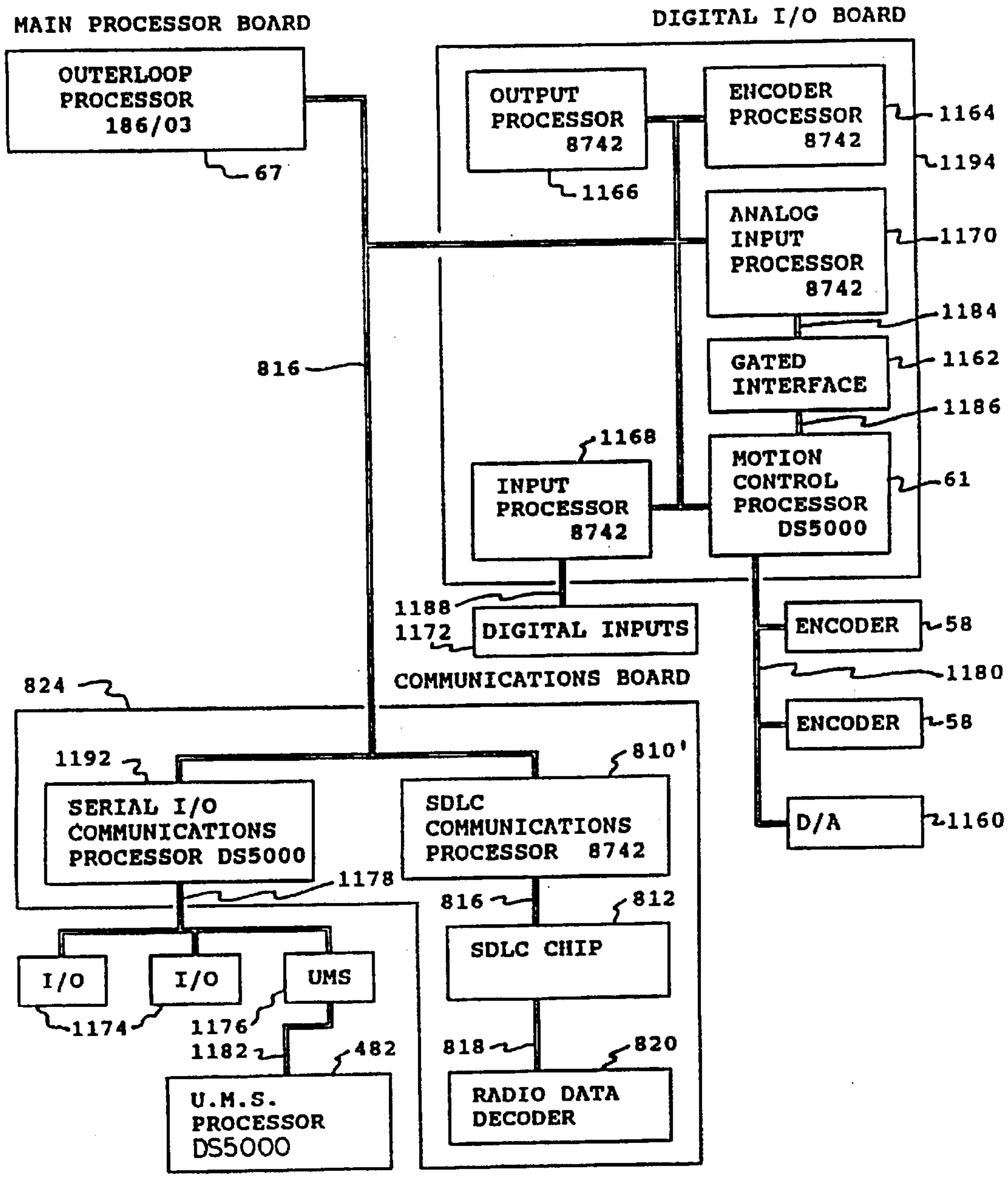
FIG. 77 is a simplified block diagram showing the plurality of microprocessors used in guidance and control of the vehicle, interconnecting bus lines between the processors, and some of the input devices which connect to the processors.
Figure 78:
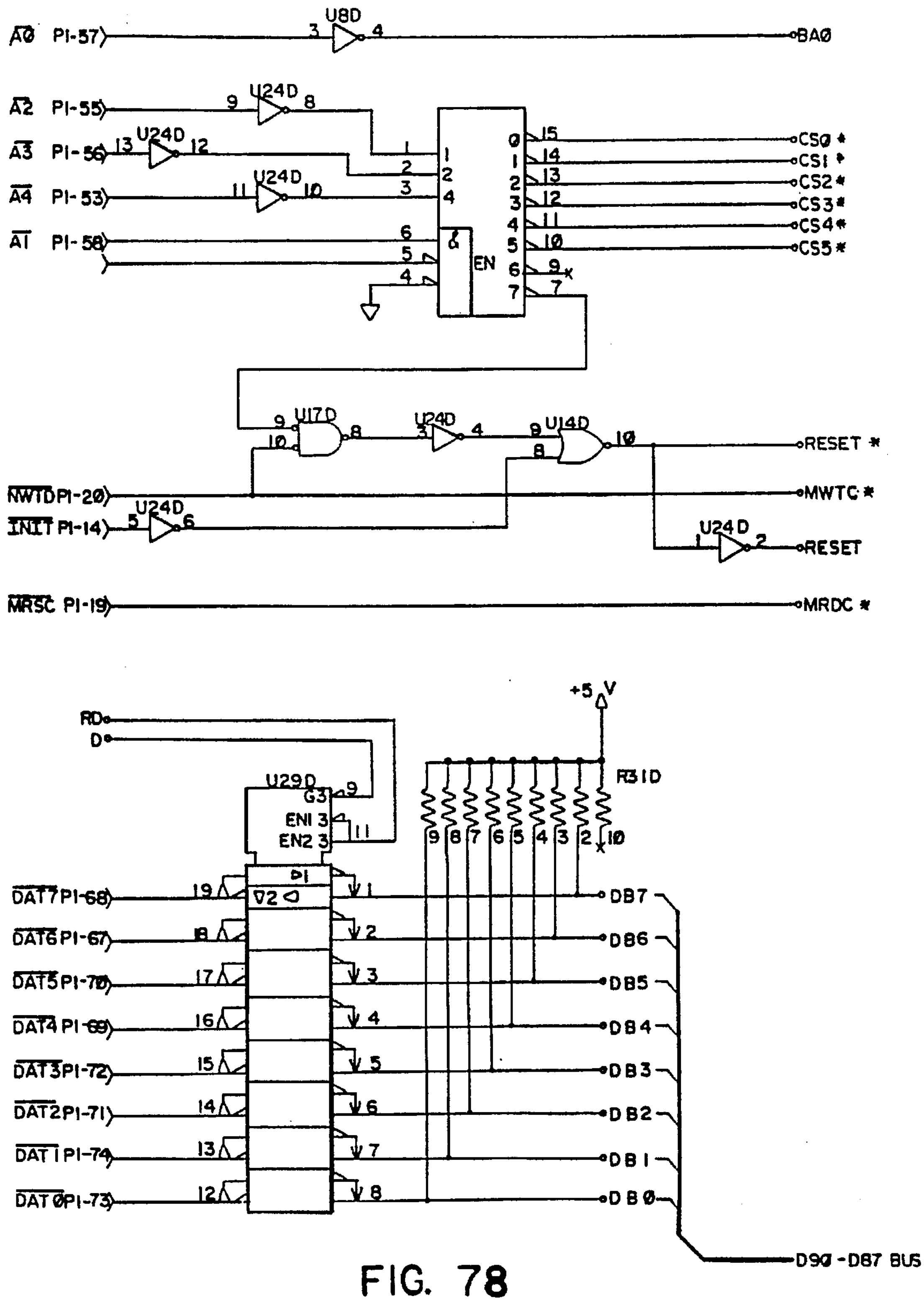
FIGS. 78, 79, 80A–B, 81A–B, 82A–B, 83, 84A–D and 85 provide a schematic of the components and circuits of a communications board, comprising two central processing units, contained in each vehicle.
Figure 79:
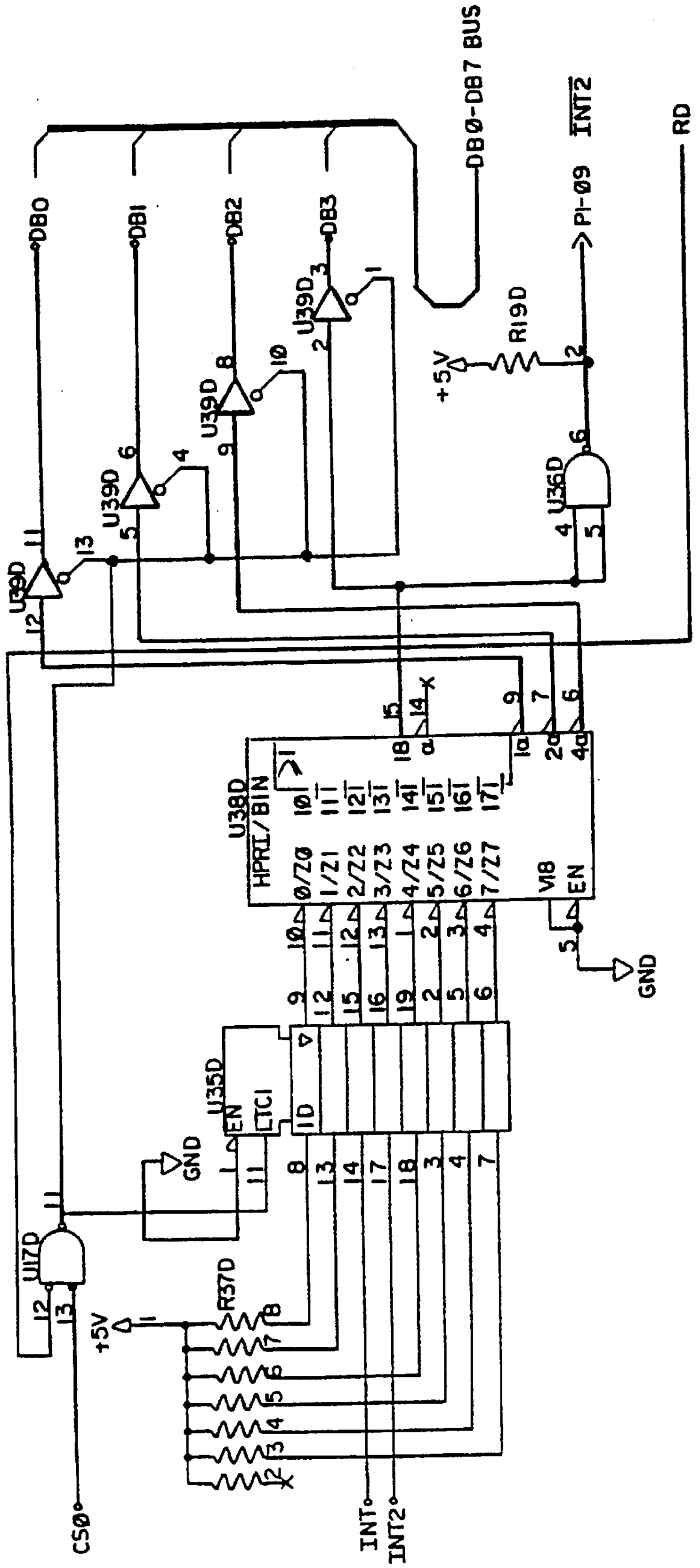
Figure 82:
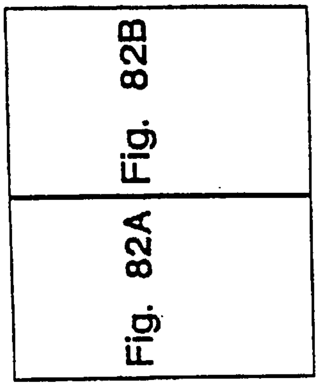
FIGS. 80, 81, 82, and 84 provide a map showing relative orientation of the schematic circuits seen in FIGS. 80A–B, 81A–B, 82A–B, and 84A–D, respectively.
Figure 81:
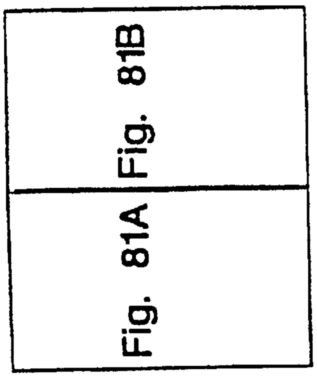
Figure 80:
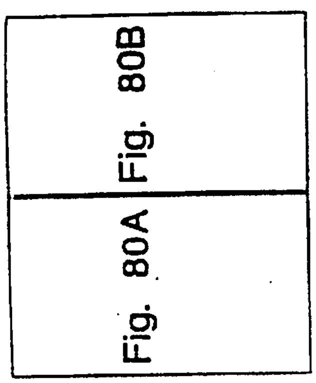

AGV 2A is controlled by a plurality of micro-processors as seen in FIG. 77. Outerloop processor 67 is the master controller, directly communicating across bus 816 to an output processor 1166, an encoder processor 1164, an analog input processor 1170, the motion control processor 61, a serial I/O communications processor 1192 and the central processing unit 810' for SDLC communications chip 812. Bus 816 is referenced by other numerical identifiers within this disclosure; however, it may be considered that all direct bus communications among the processors listed above traverse bus 816. Each of the processors fill an important mission for each AGV 2A. As an example, outerloop processor 67 performs the Kalman calculations in addition to other outerloop calculations and general control of AGV 2A. Outerloop processor is a 186/03 board, commercially available from Intel Corporation.

Output processor 1166 comprises programs which turn on and off AGV 2A lights, change speaker tone and duration, and actuate and AGV 2A beeper. In the current embodiment, output processor 1166 is preferably an 8742 central processing unit, now available from Intel Corporation.

Input processor 1168 provides general processing of input lines such as inputs from vehicle sensors, other than antennas and update markers. As an example, limit switches and emergency stop apparatus provide input signals processed by input processor 1168. In addition, digital discrete inputs which are directed to the main processor, such as signals from discrete digital devices are buffered (temporarily stored in memory), then processed by input processor 1168. In the current embodiment, input processor 1168 is preferably an 8742 central processing unit, now available from Intel Corporation.

Encoder processor 1164 processes encoder signals which provide measurement information for outerloop processor 67, such as signals from gyro 500, fifth wheel 57, and sixth wheel 59 travel information as used in Kalman filter calculations. In the currently preferred embodiment, encoder processor comprises four input channels, three of which are used for the angular and linear travel measurements. The fourth channel is a spare. Encoder processor 1164 is preferably an 8742 central processing unit, available from Intel Corporation.

Analog input processor 1170 provides analog to digital input processing, wherein analog voltage inputs from each tachometer 33, see FIG. 4A, are received, digitized, and monitored, thereby providing a safety backup to operation of motion control processor 61. In addition, analog input processor 1170 receives and processes inputs from a joy stick on a manual vehicle control box whereby each vehicle 2A is manually controllable. Further, analog input processor 1170 receives and processes inputs from obstacle detectors and AGV 2A battery voltage. Analog input processor 1170 is an 8742, available from Intel Corporation.

Motion control processor 61 function and responsibility are described in detail earlier. As seen in FIG. 77, motion control processor 61 receives inputs from encoders 58 as earlier described and provides digital to analog outputs which control operation of drive wheels 8, 10. Motion control processor 61 also provides a controlled "E" stop to bring AGV 2A to rest in a rapid, but not hard-braking stop in a detected emergency. Motion control processor 61 is preferably a DS5000 central processing unit, available from Dallas Semiconductor. A second, more direct, but gated signal path 1184, 1162, 1186 provides direct feedback from analog input processor 1170 to motion control processor 61.

Figure 86:
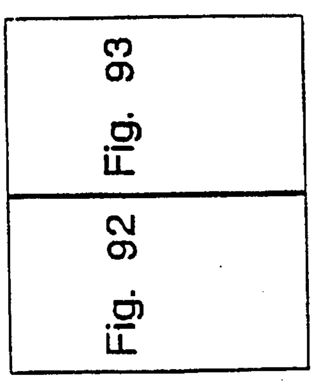
FIG. 86 is a map showing relative orientation of the schematic of circuits seen in FIG. 92 to the schematic of circuits seen in FIG. 93.
Figure 84:
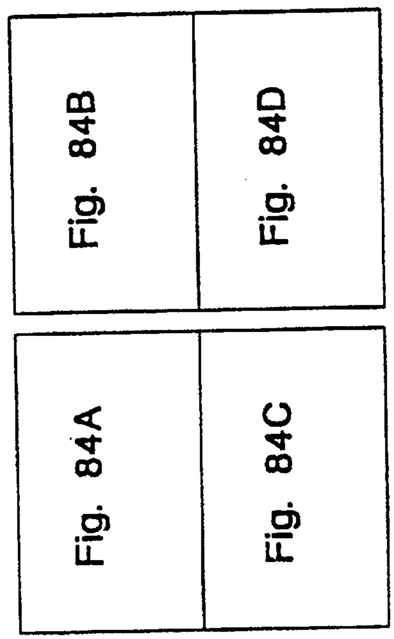
Figure 80A:
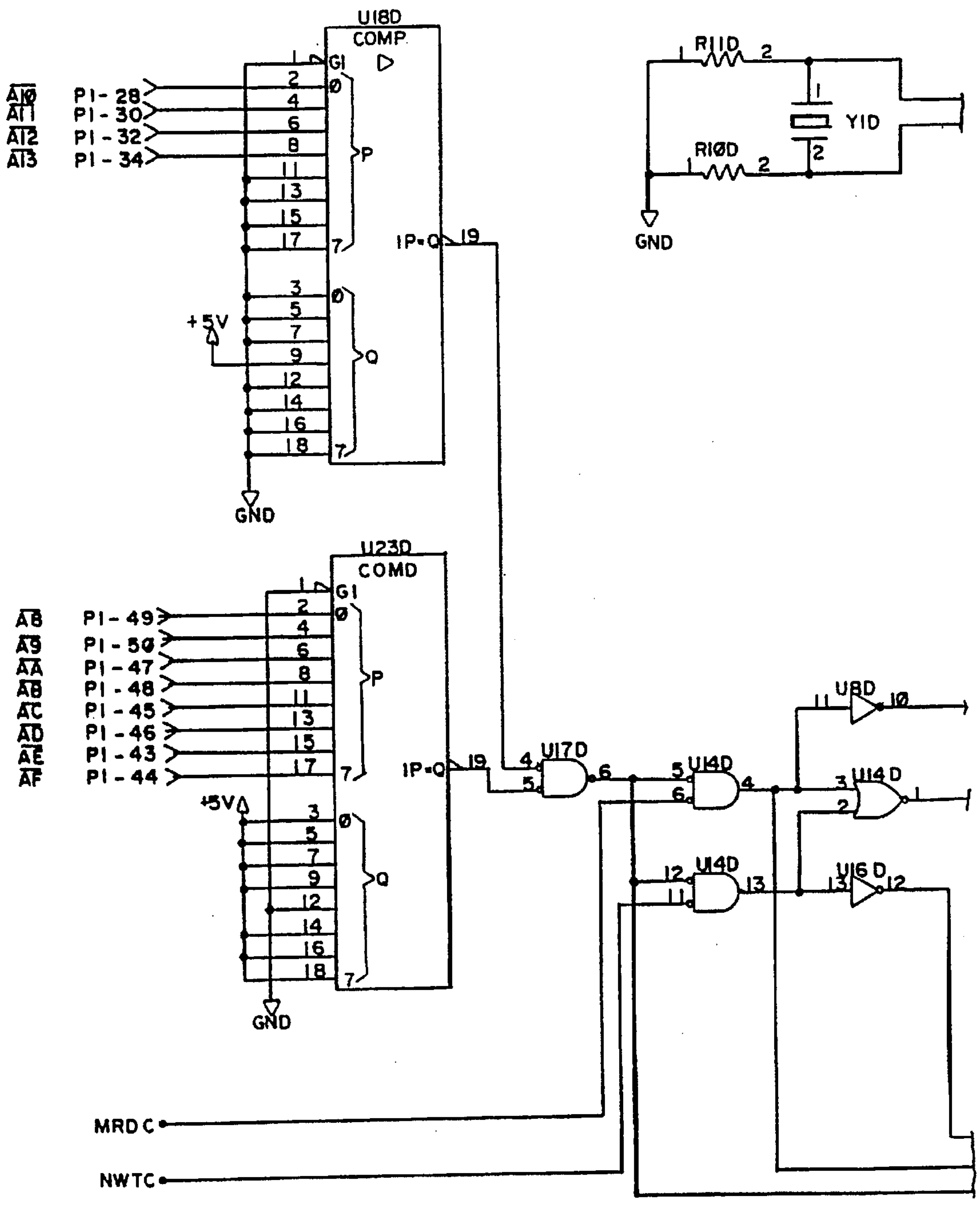
Figure 80B:
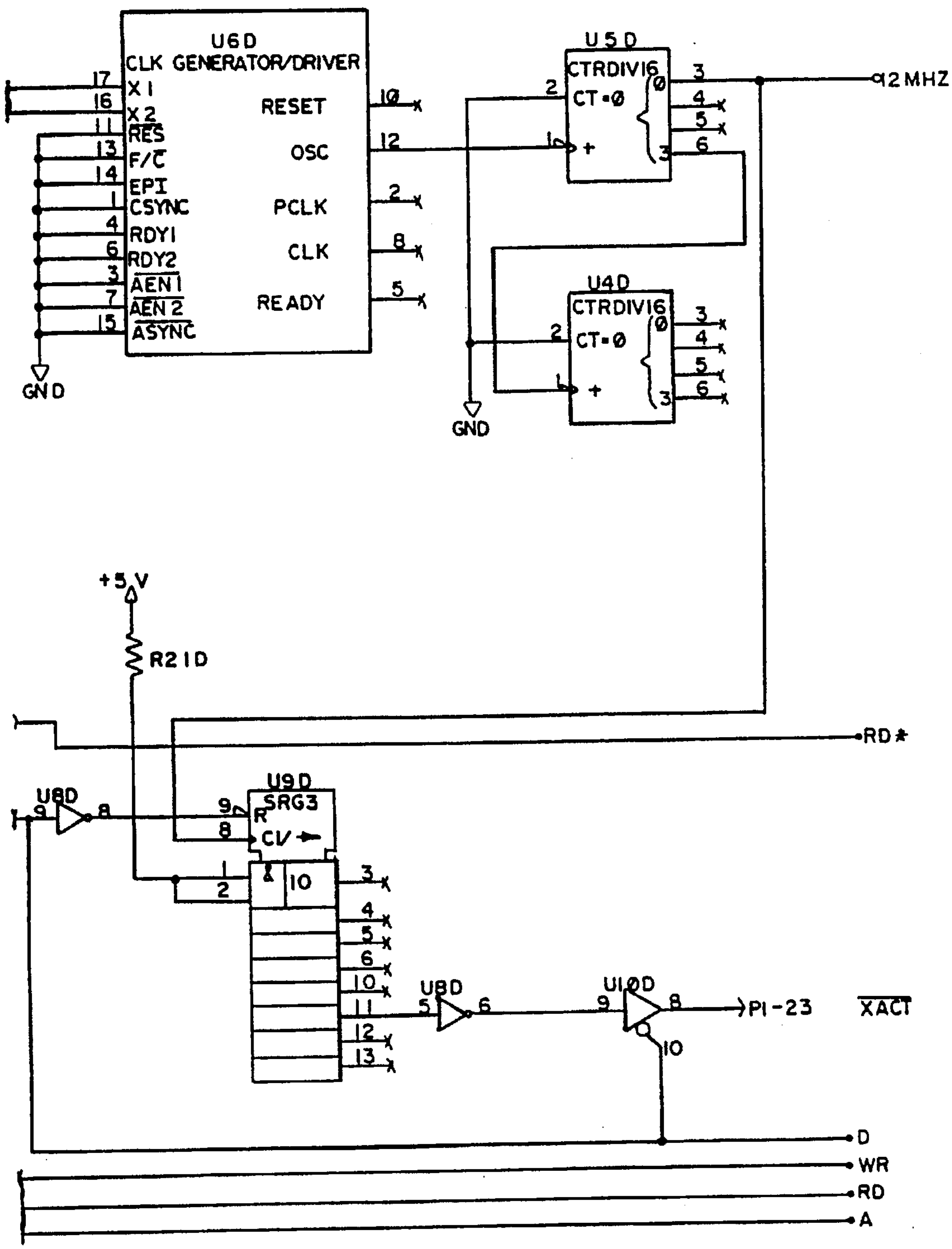
Figure 81A:
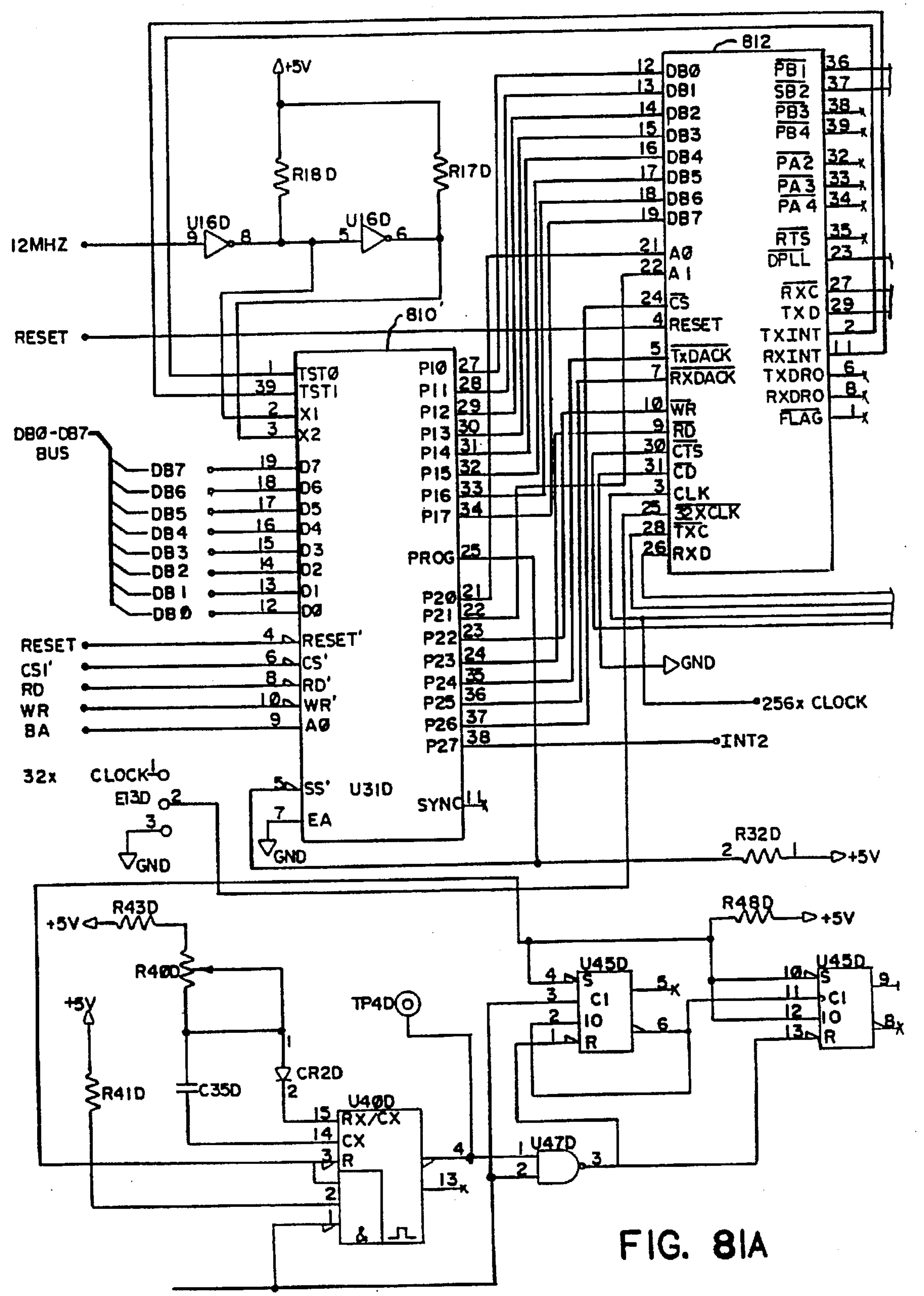
Figure 81B:
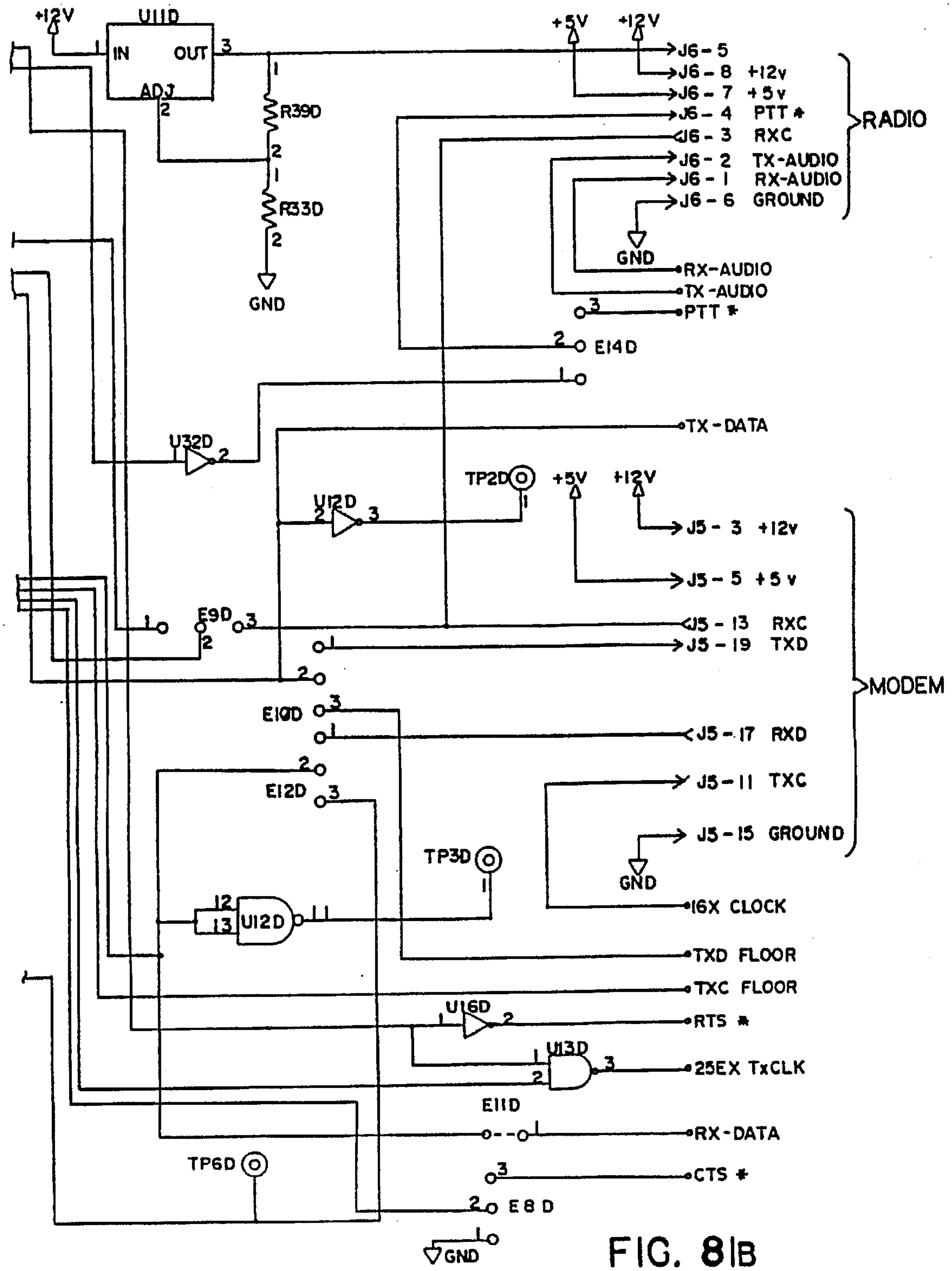
Figure 82A:
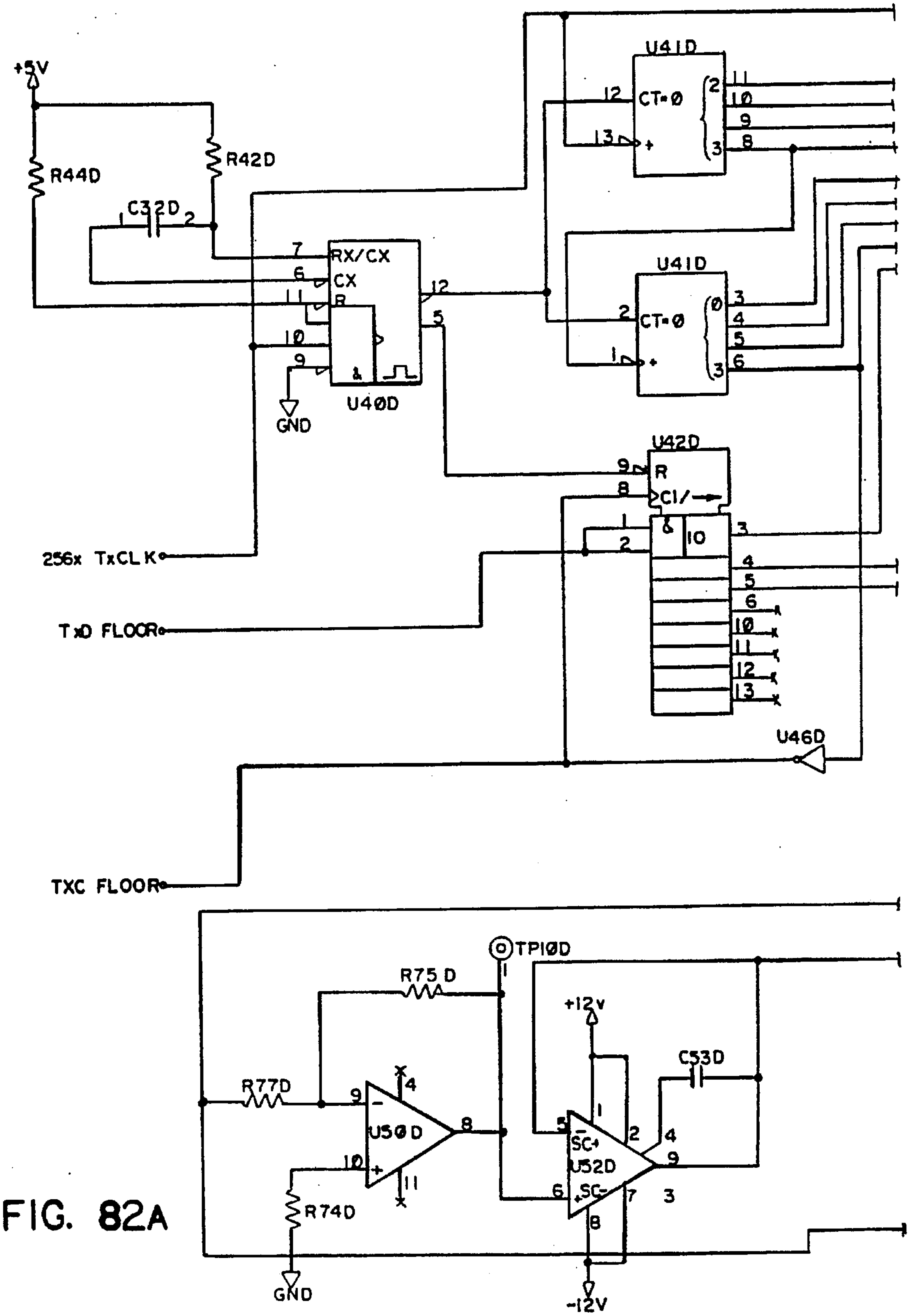
Figure 82B:
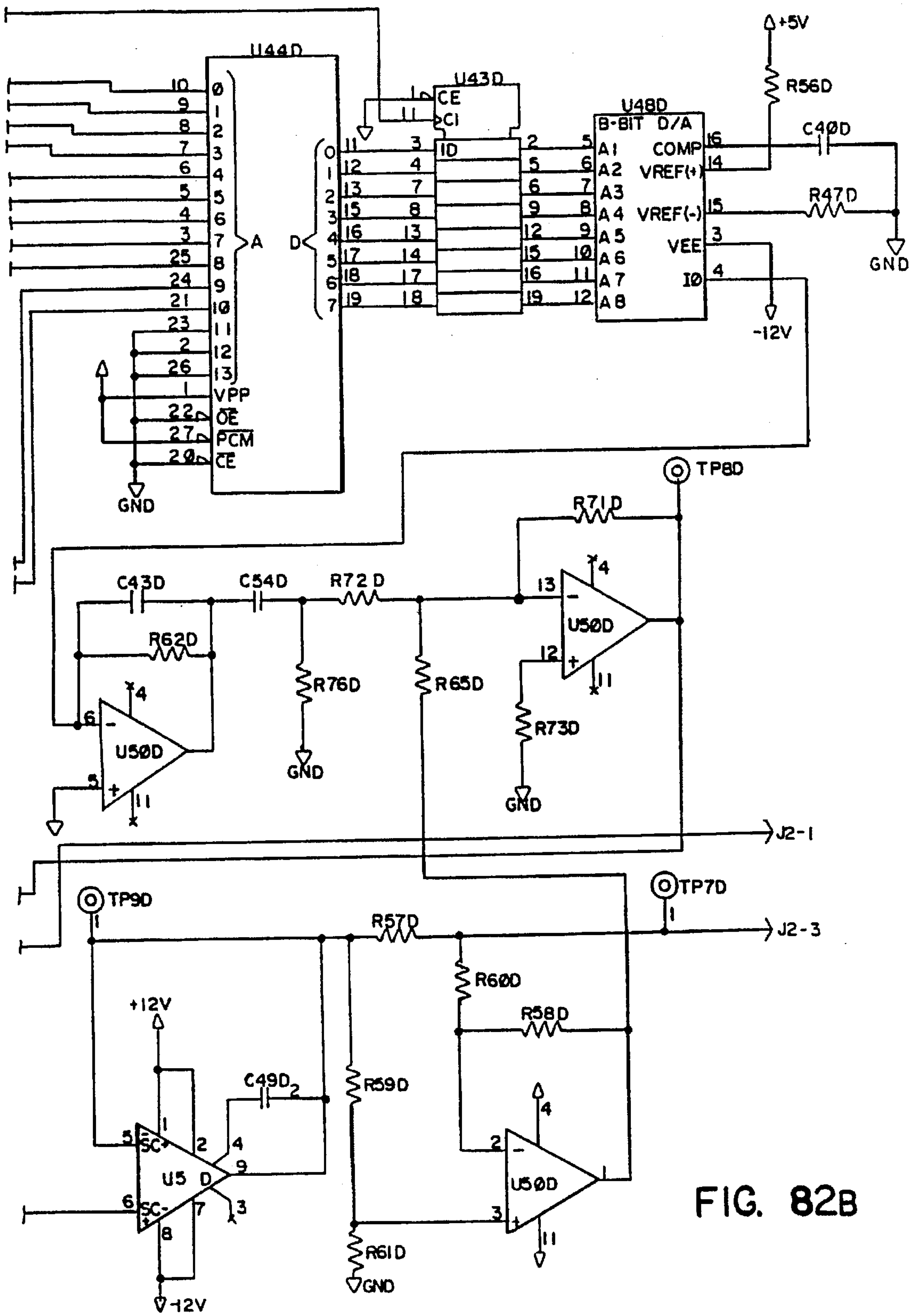
Figure 83:
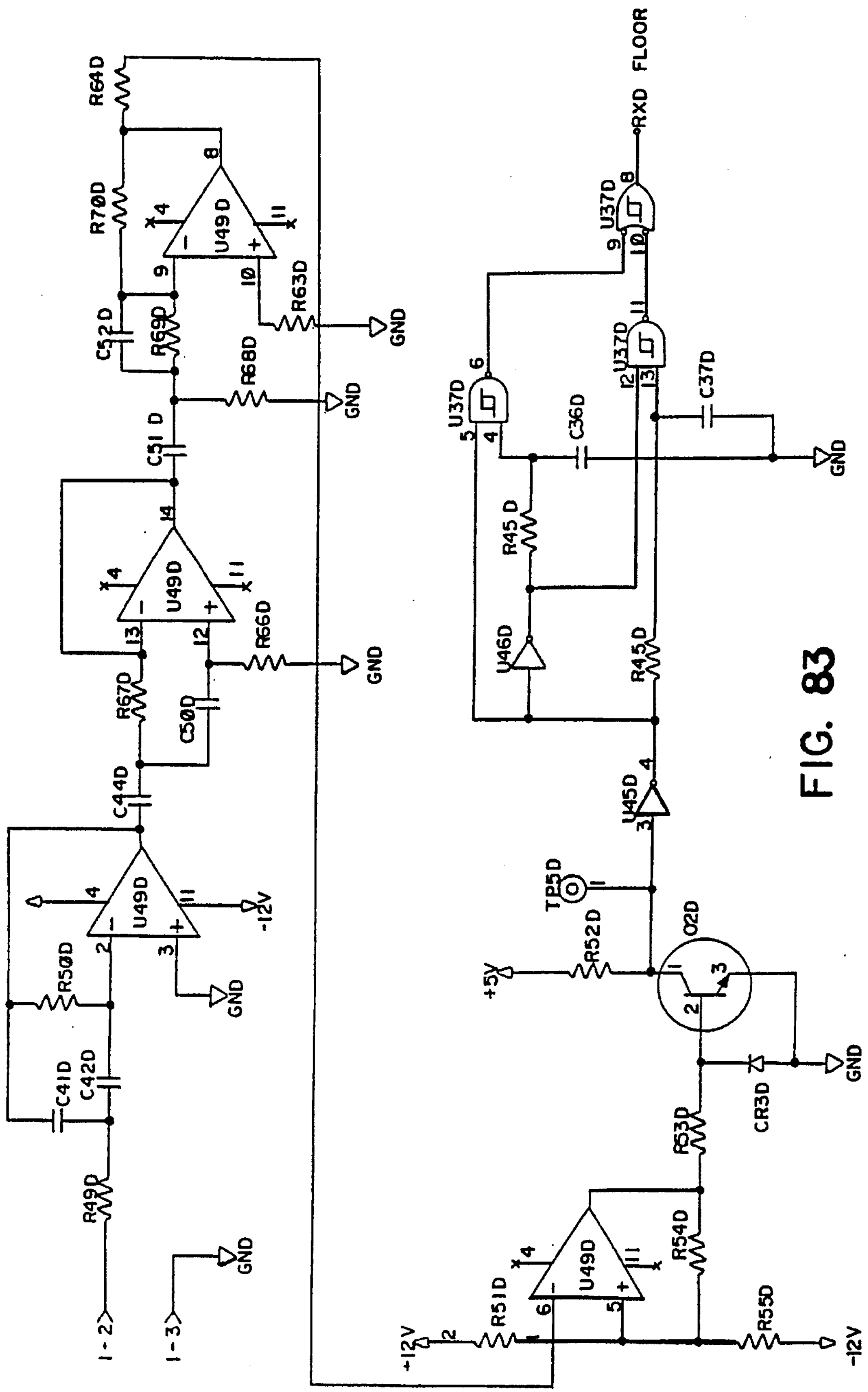
Figure 84A:
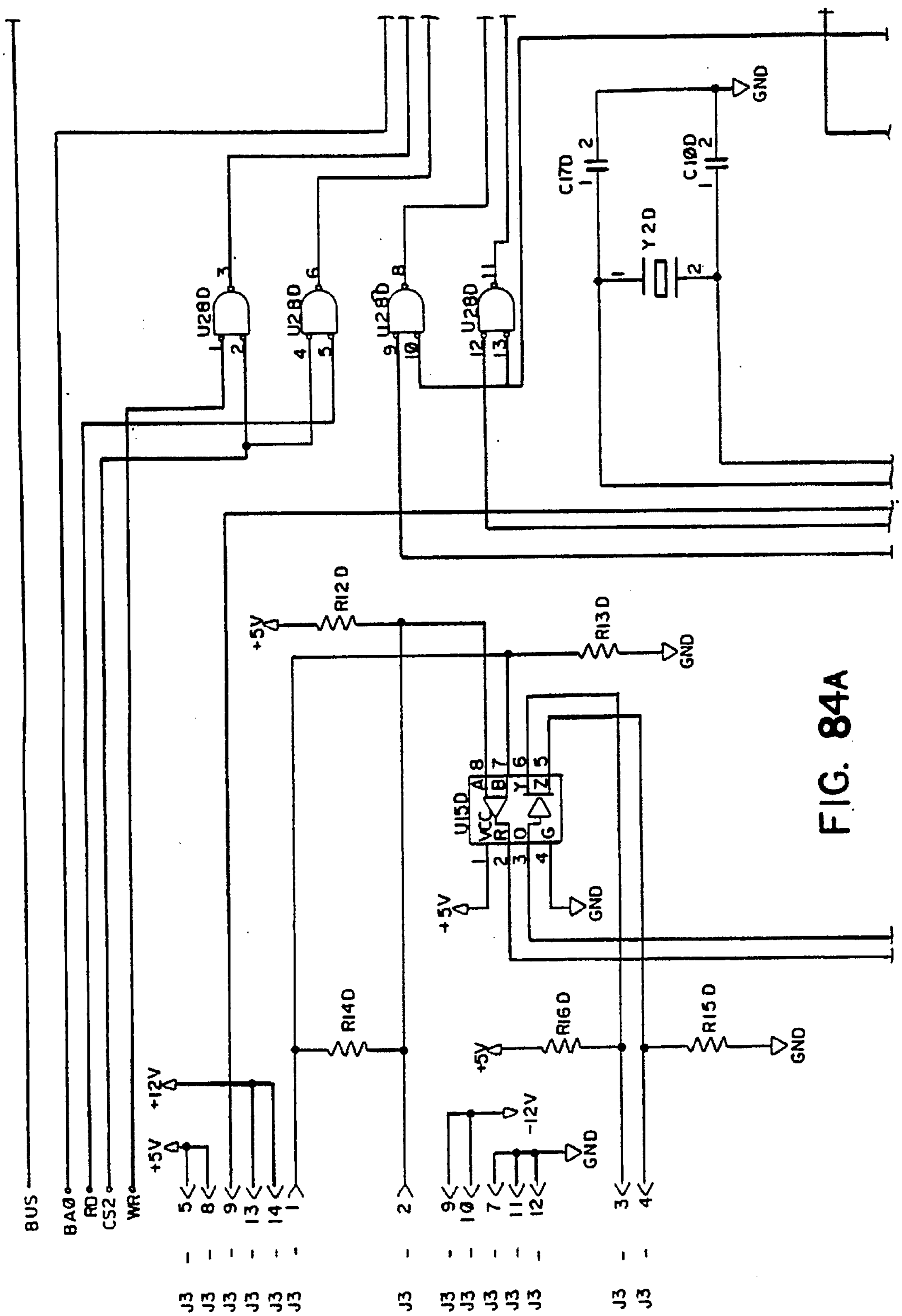
Figure 84B:
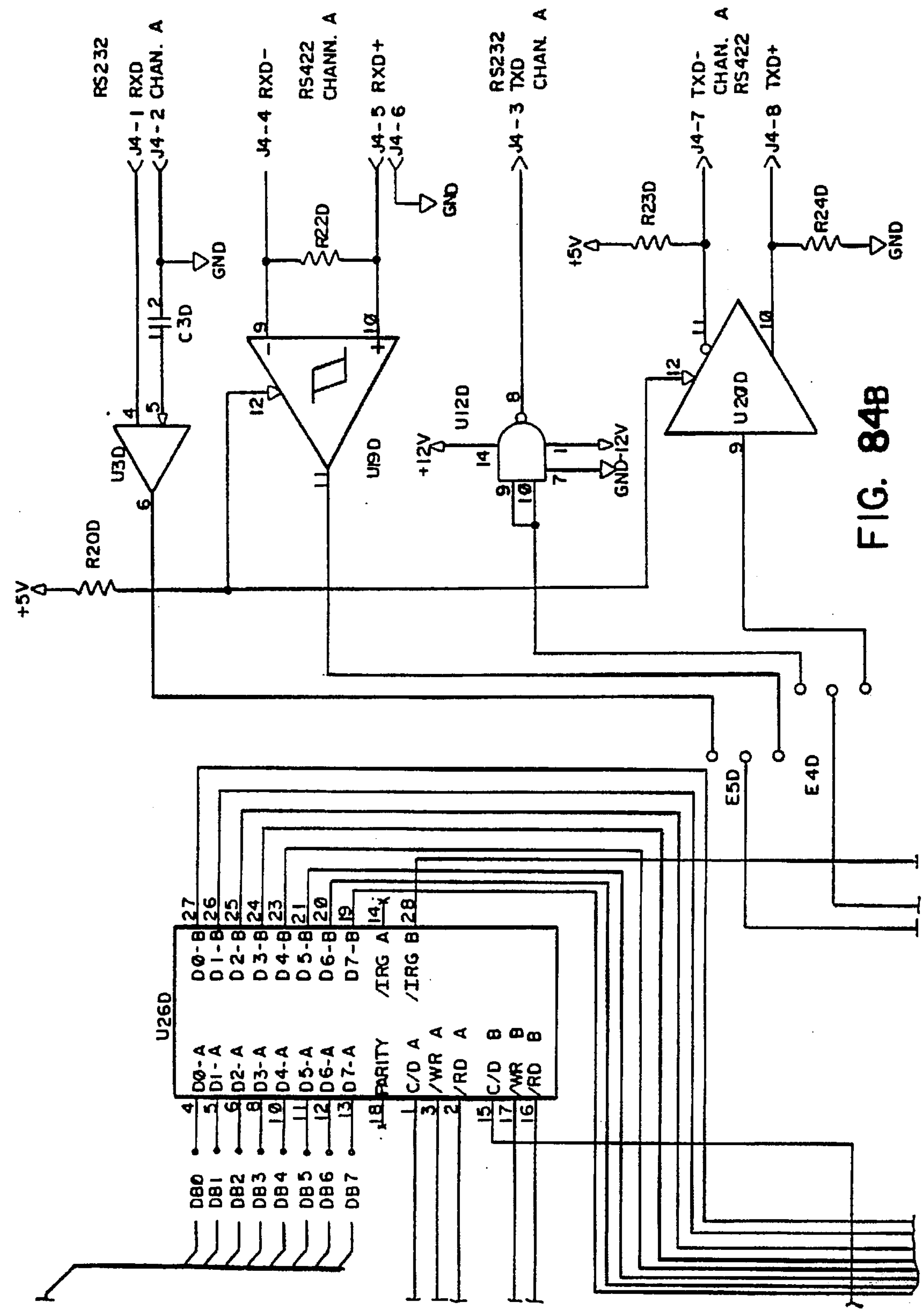
Figure 84C:
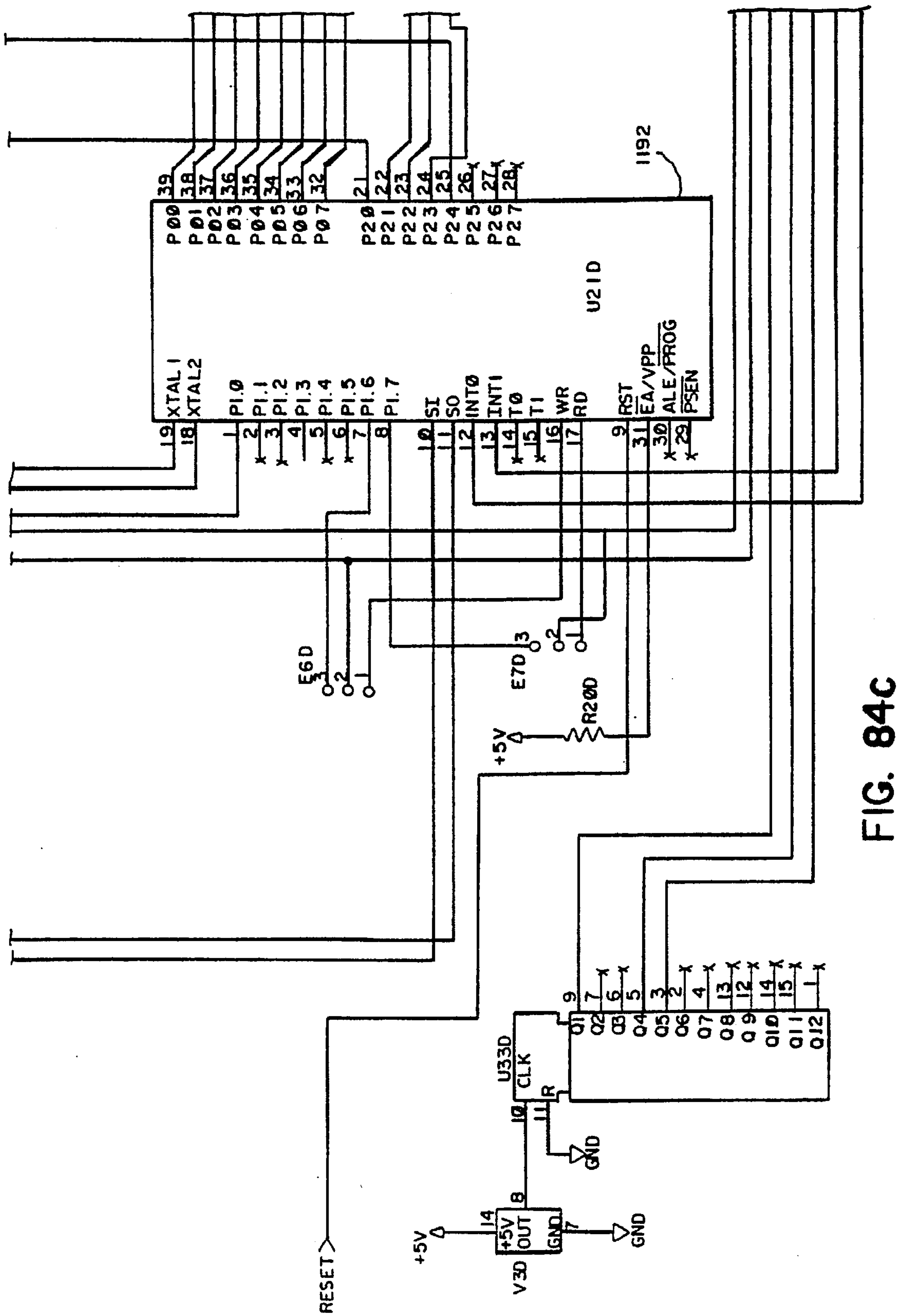
Figure 84D:
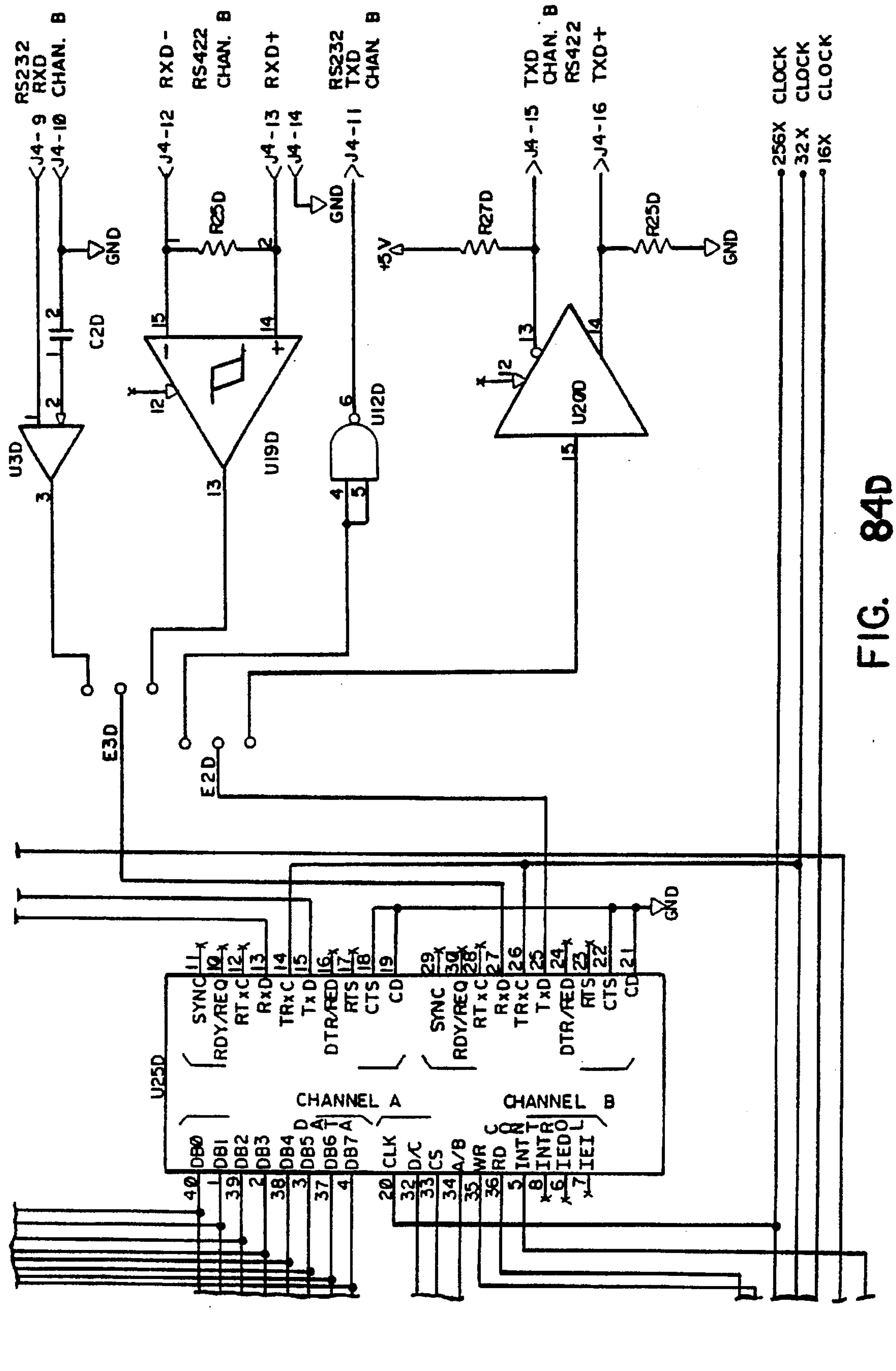
Figure 85A:
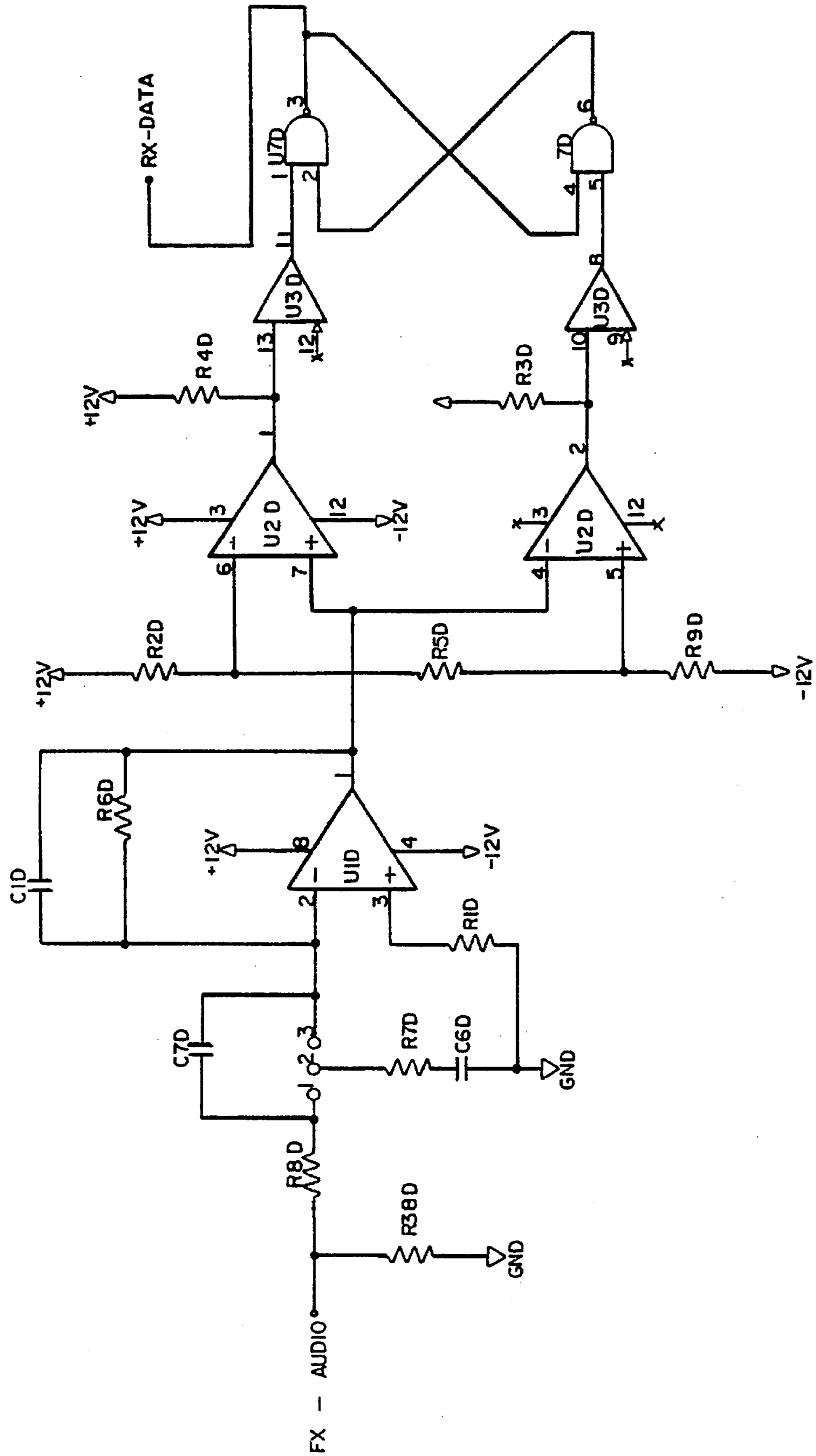
Figure 85B:
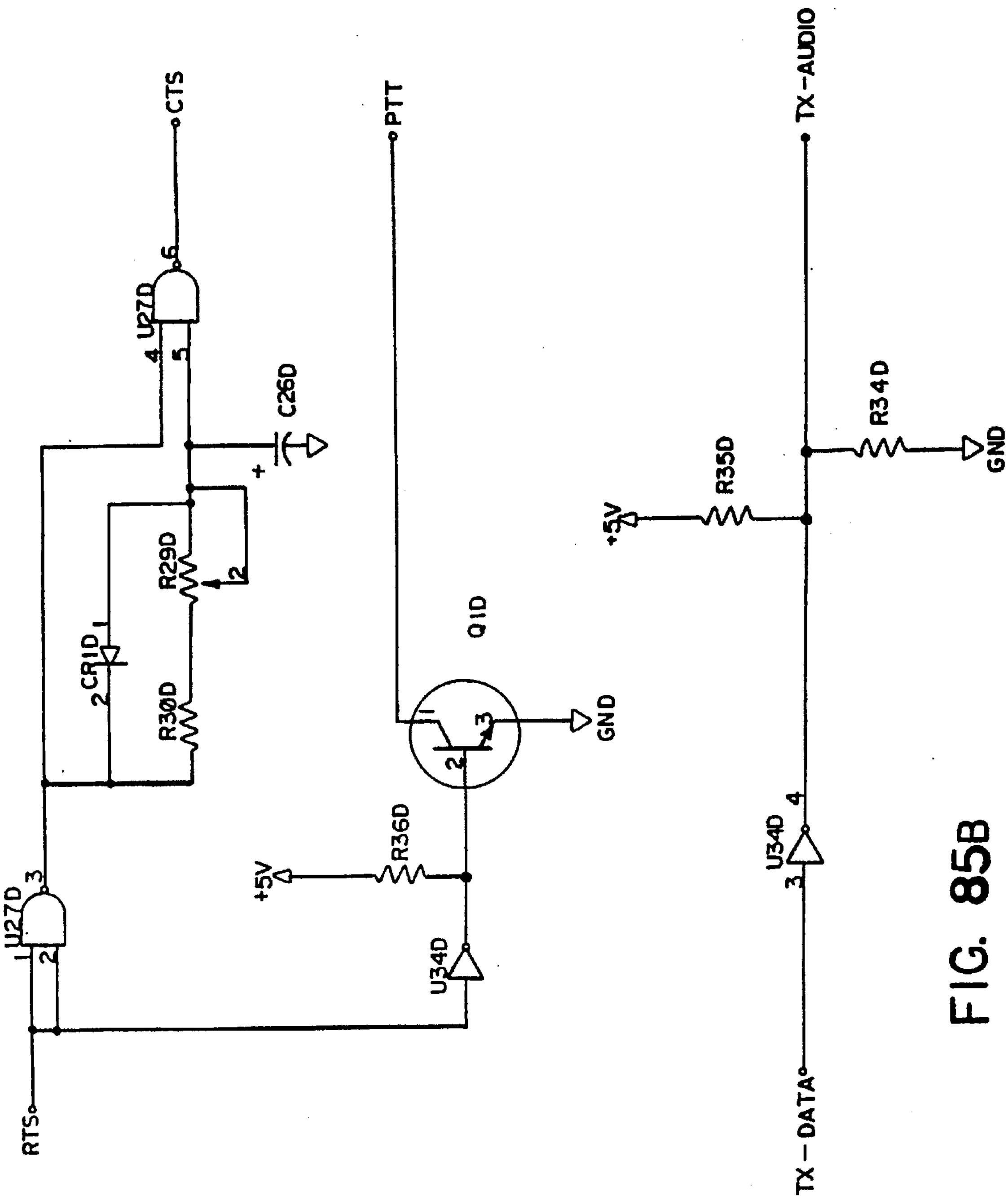
Figure 87:
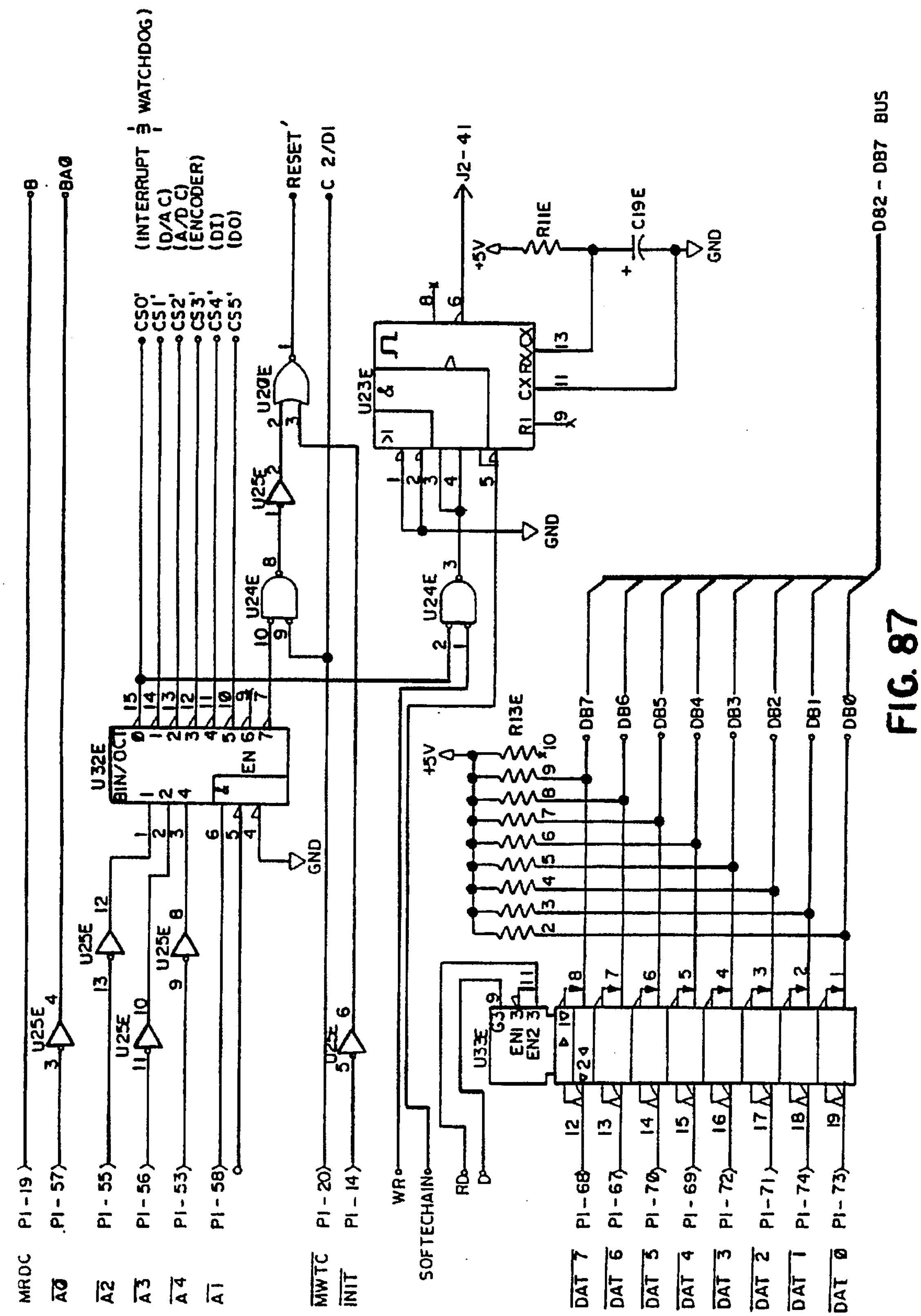
FIGS. 87, 88, 89, 90A–B, 91A–B, 92A–B, 93A–B, 94A–B and 95 provide a schematic of a digital I/O board, comprising five central processing units, contained in each vehicle.
Figure 88:
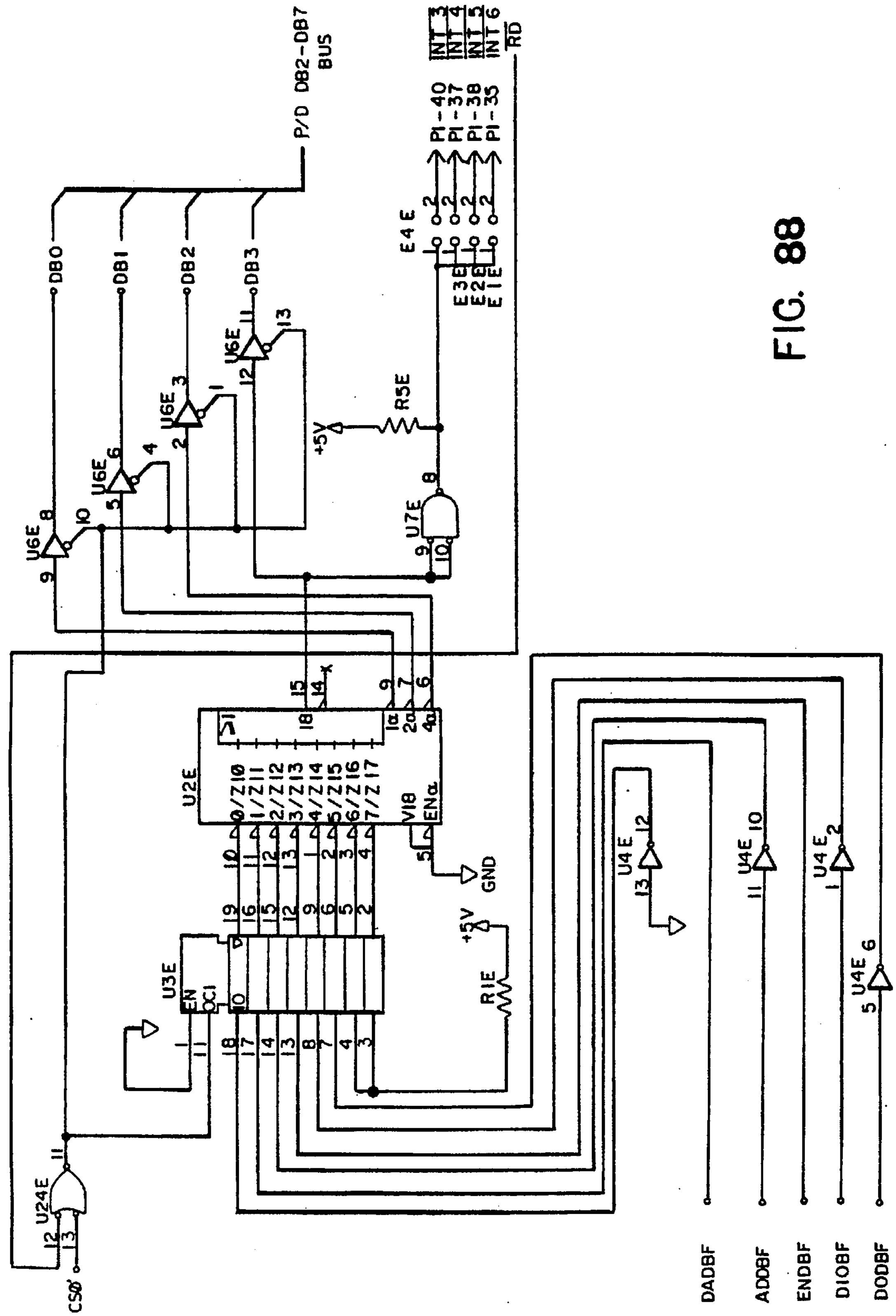
Figure 89:
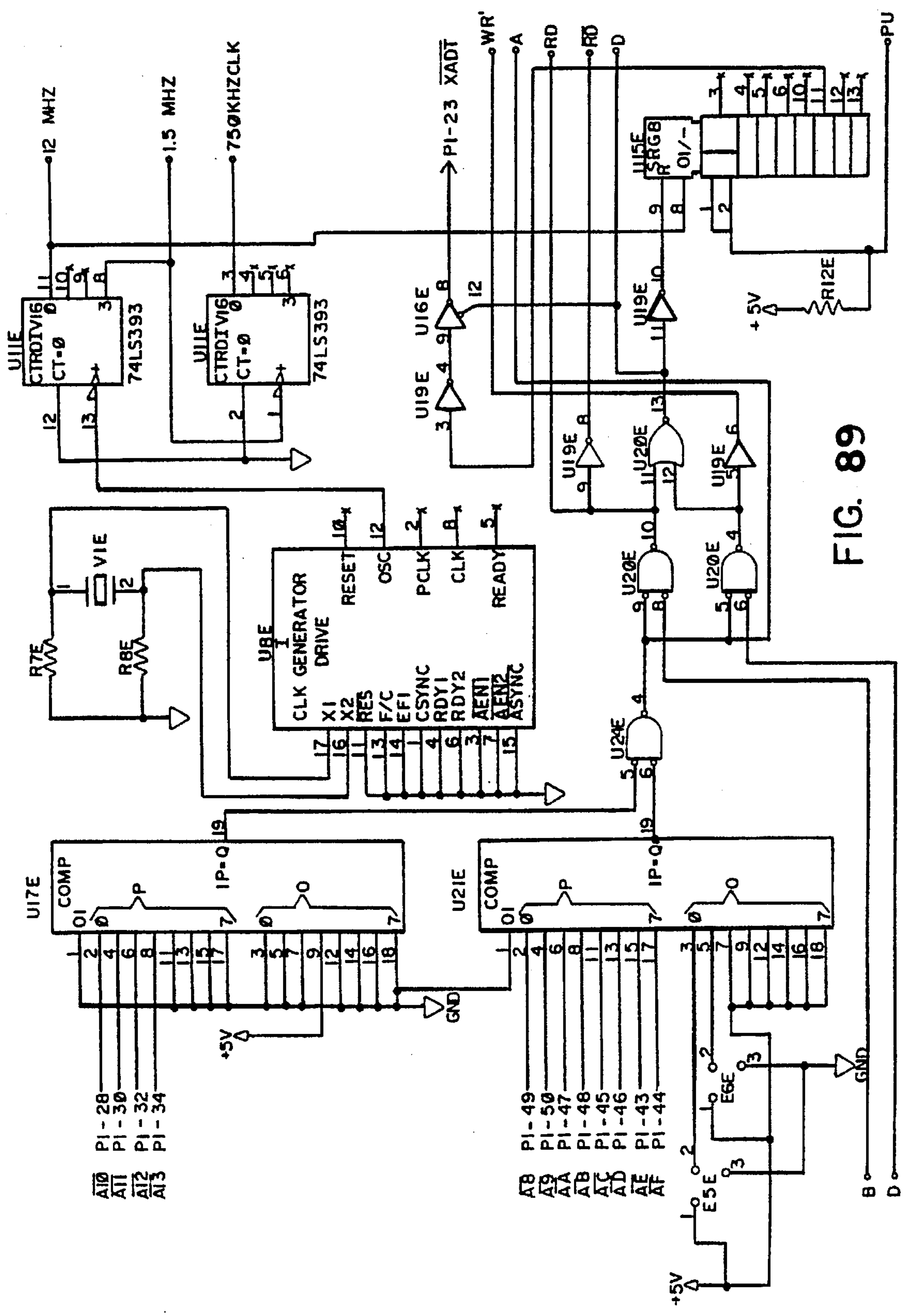
Figure 90:
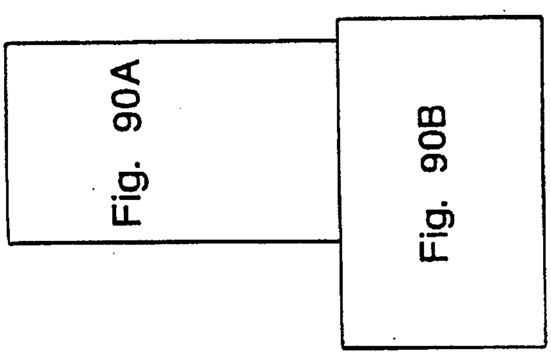
FIGS. 90, 91, 92, 93, and 94 provide a map showing relative orientation of the schematic circuits seen in FIGS. 90A–B, 91A–B, 92A–B, 93A–B, and 94A–B, respectively.
Figure 91:
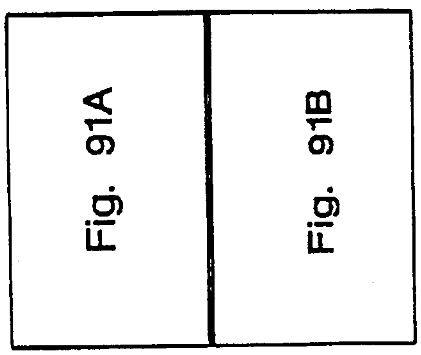
Figure 92:
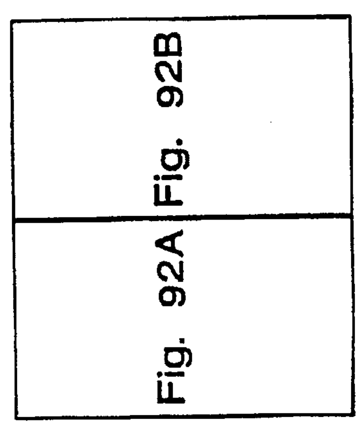
Figure 93:
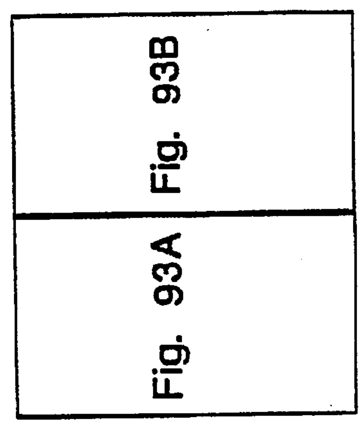
Figure 94:
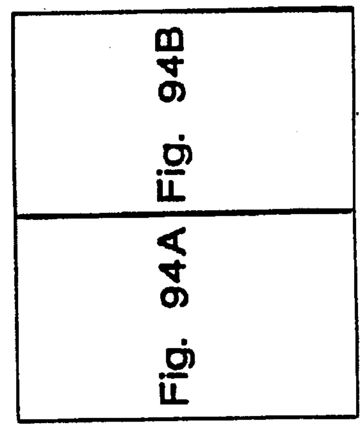
Figure 90A:
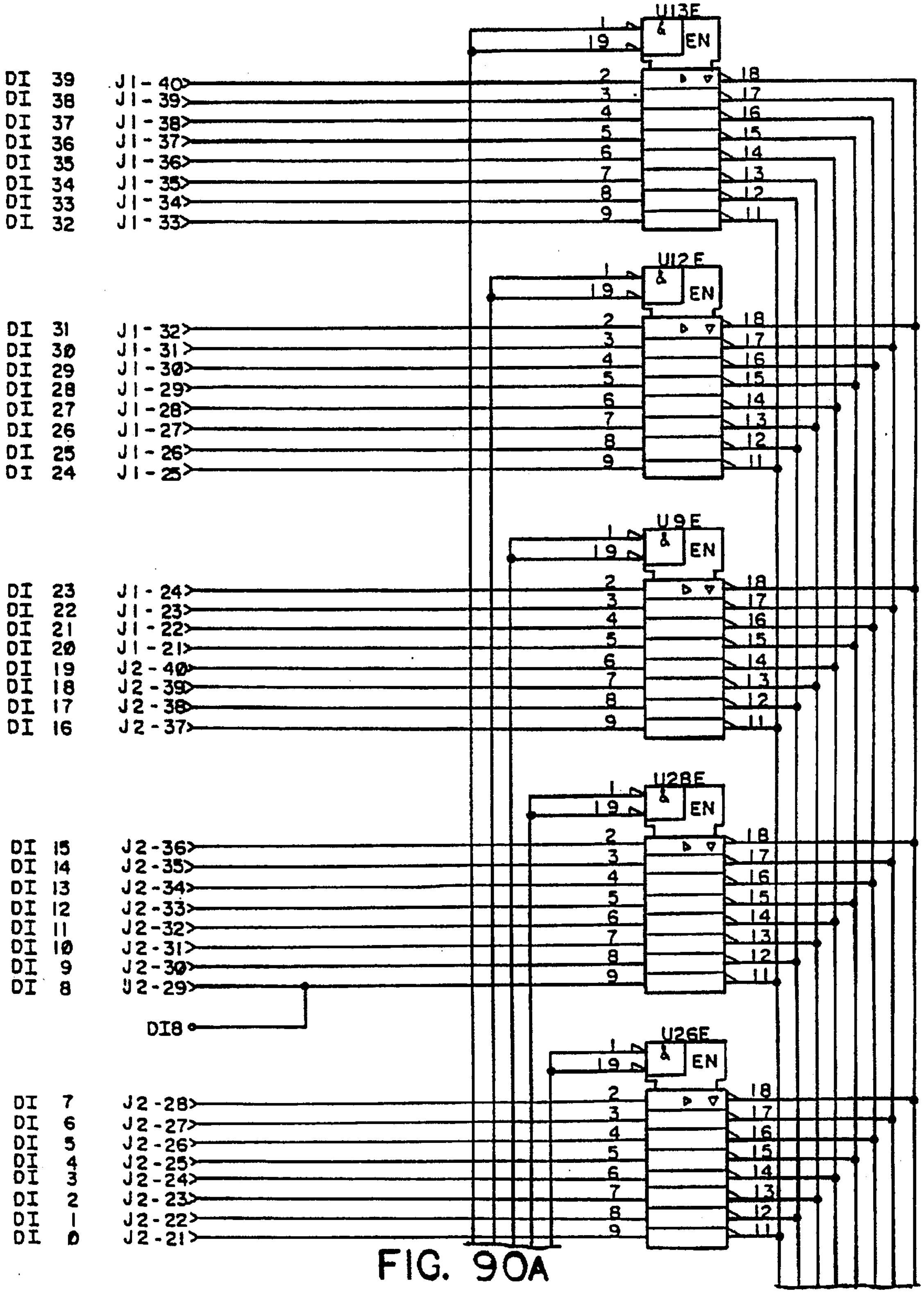
Figure 90B:
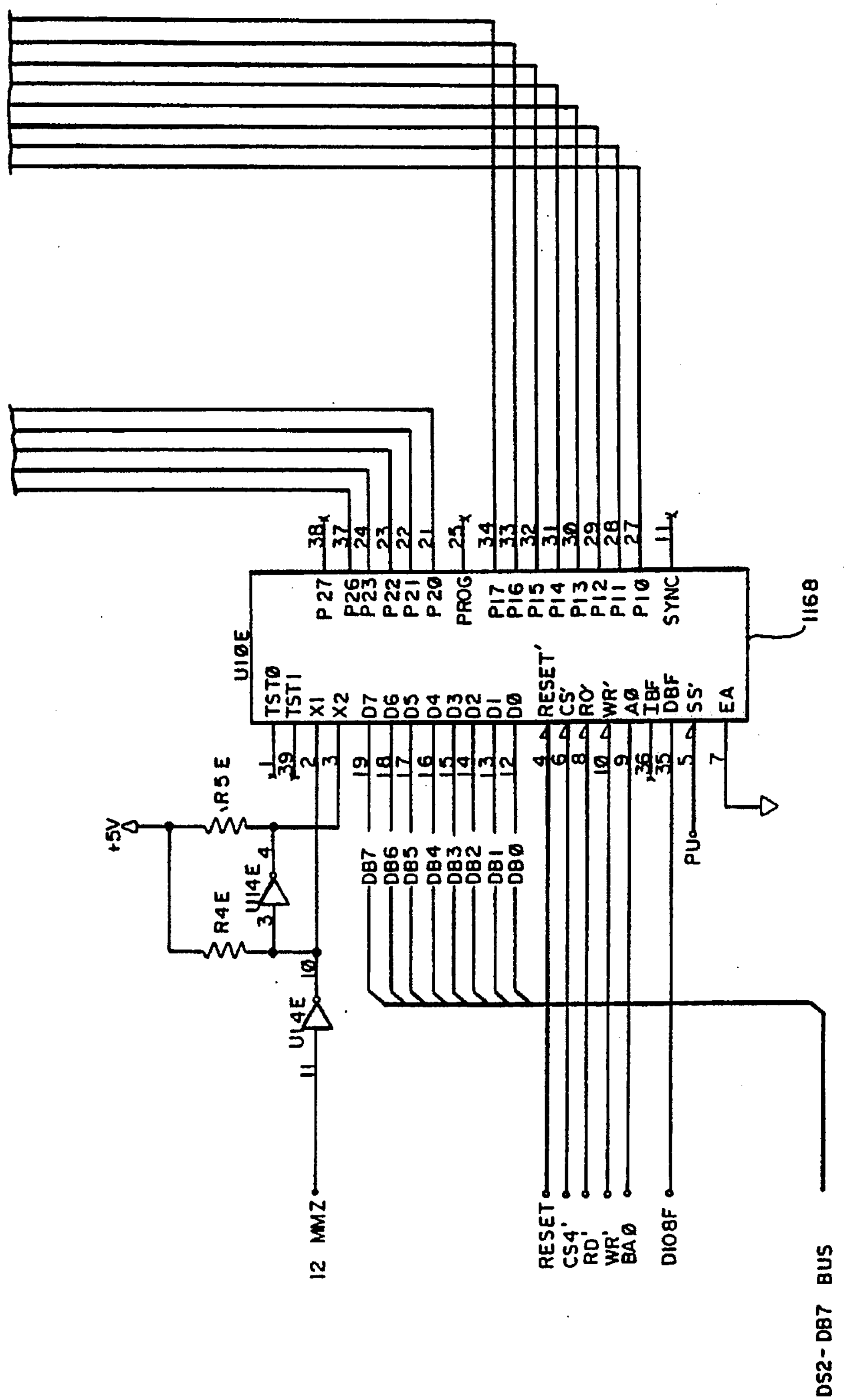
Figure 91A:
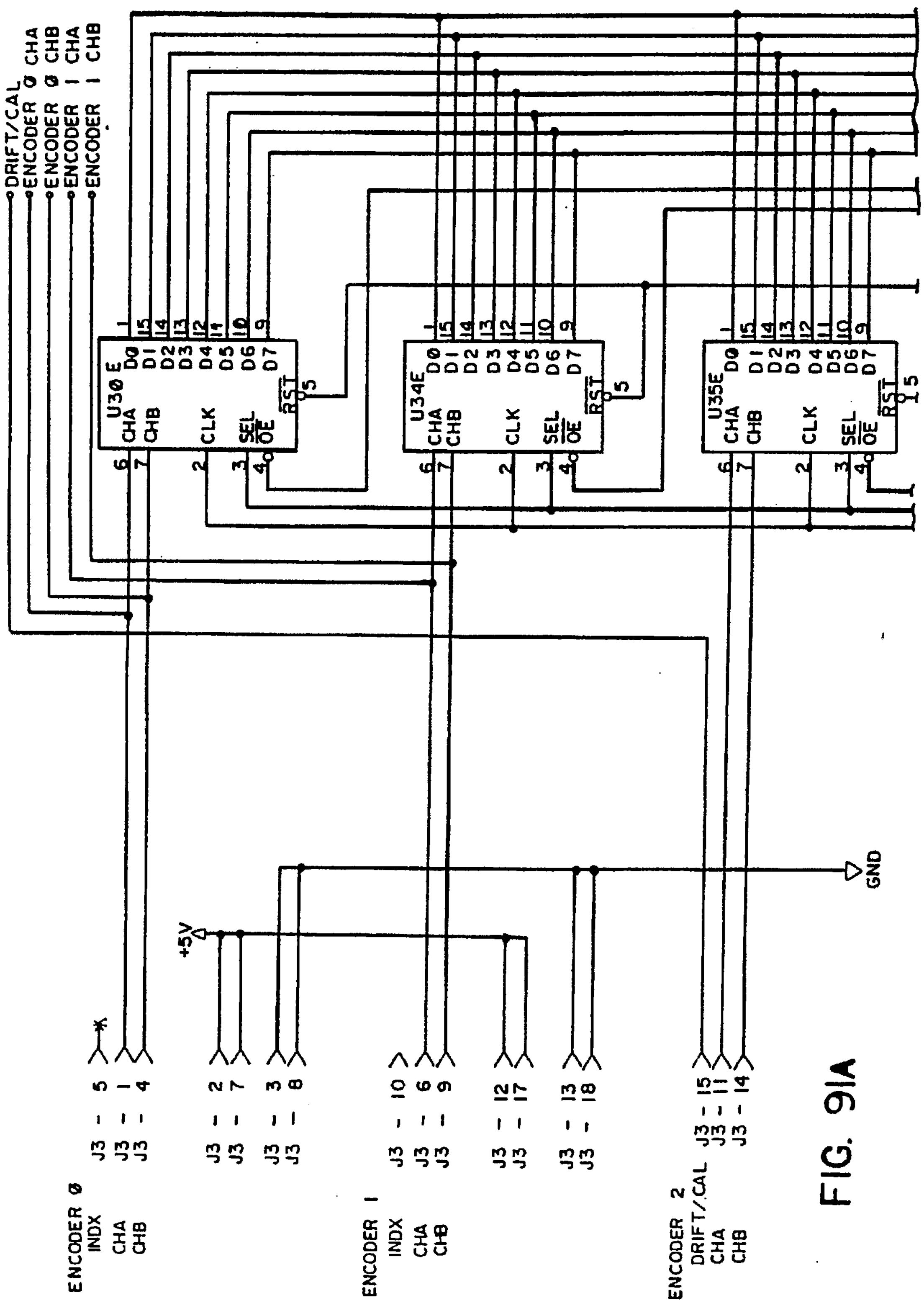
Figure 91B:
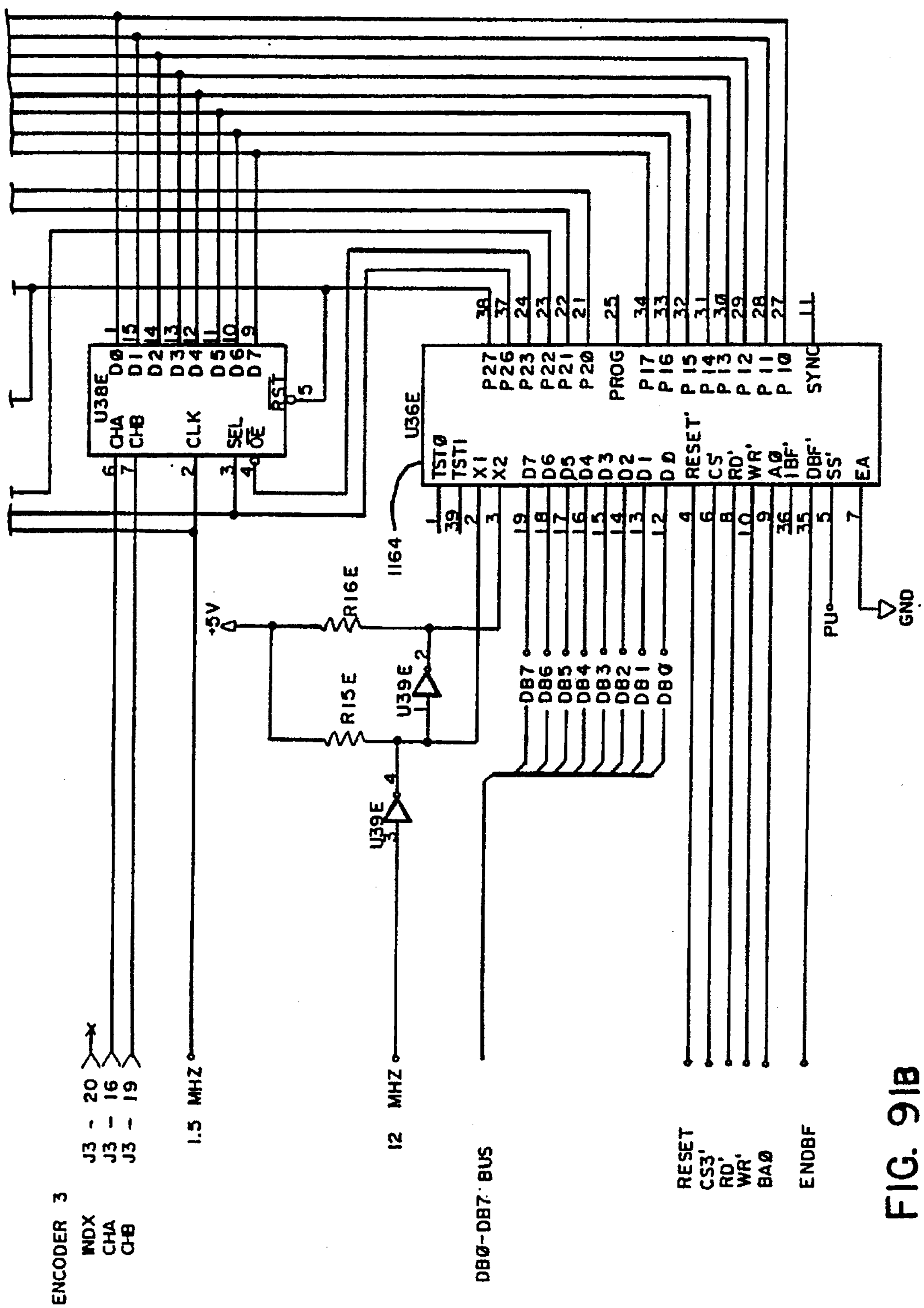
Figure 92A:
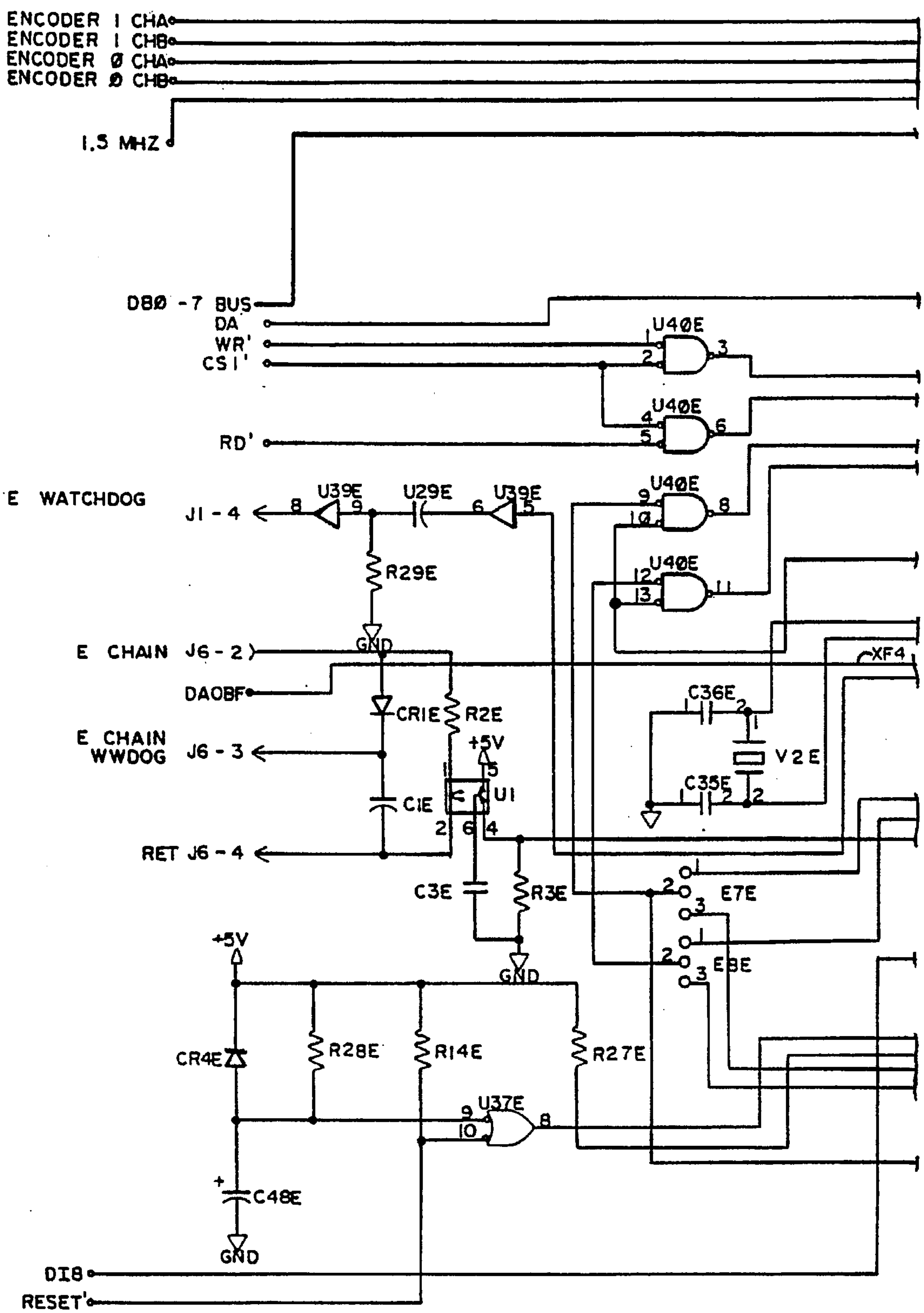
Figure 92B:
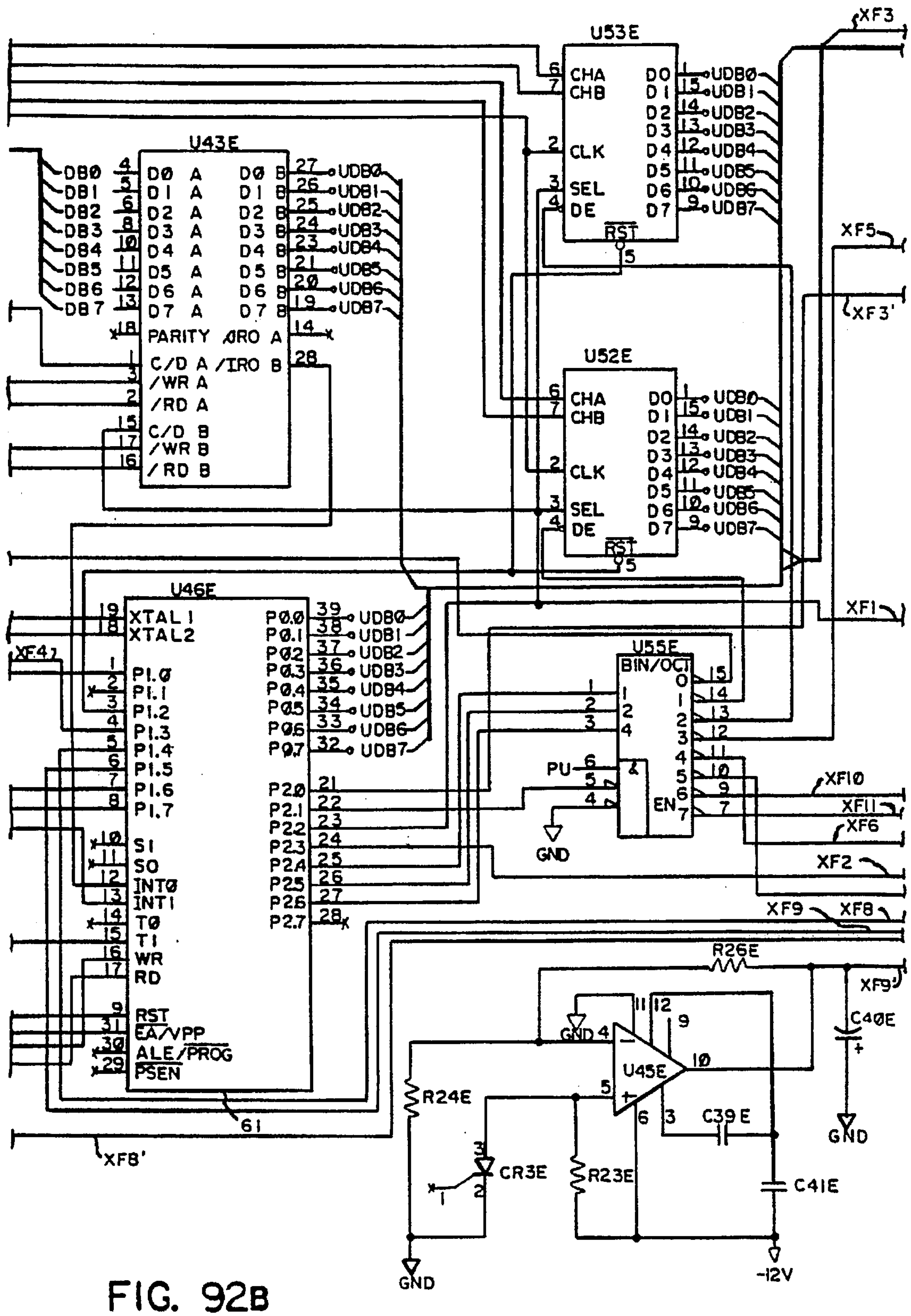
Figure 93A:
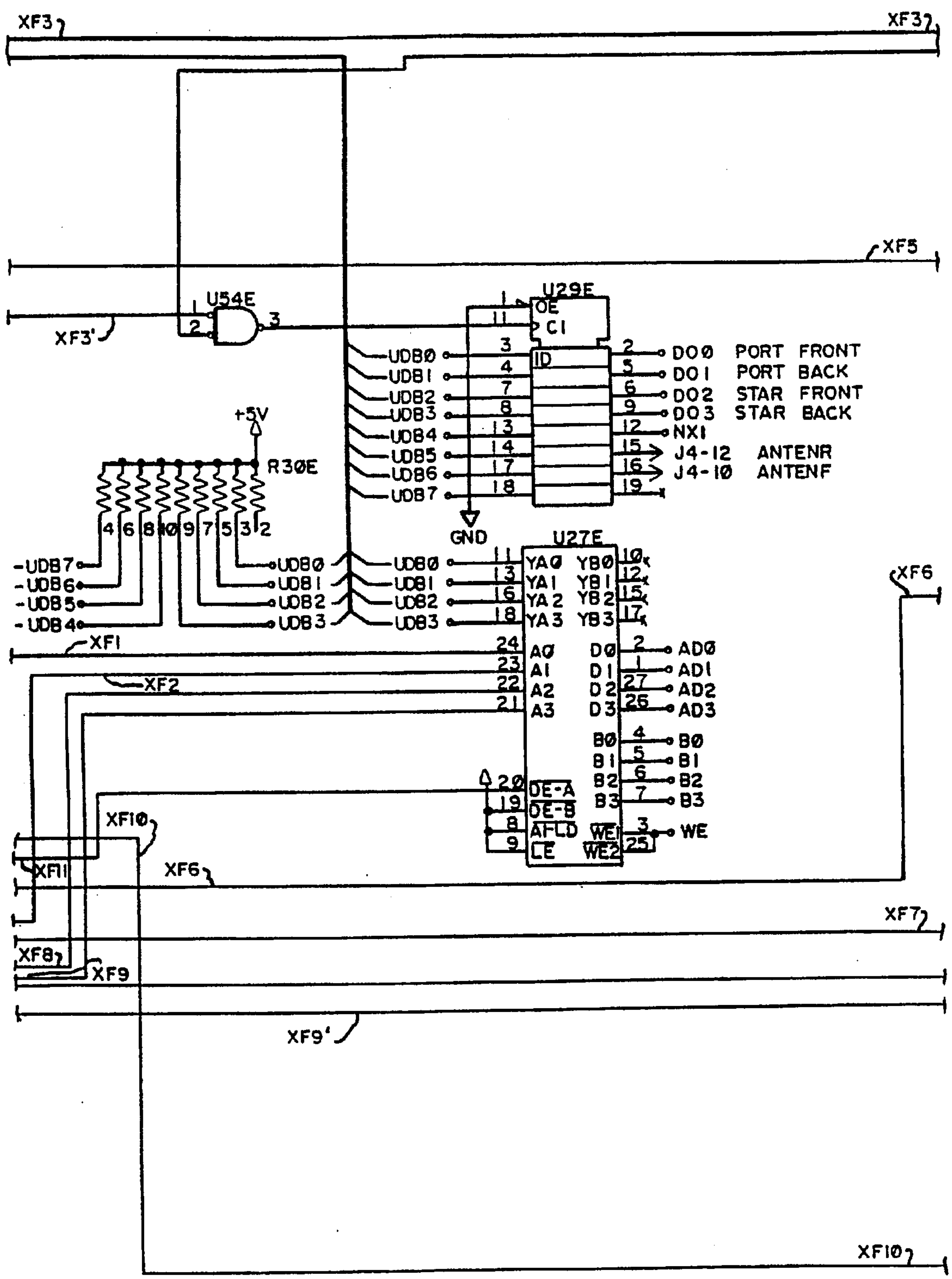
Figure 93B:
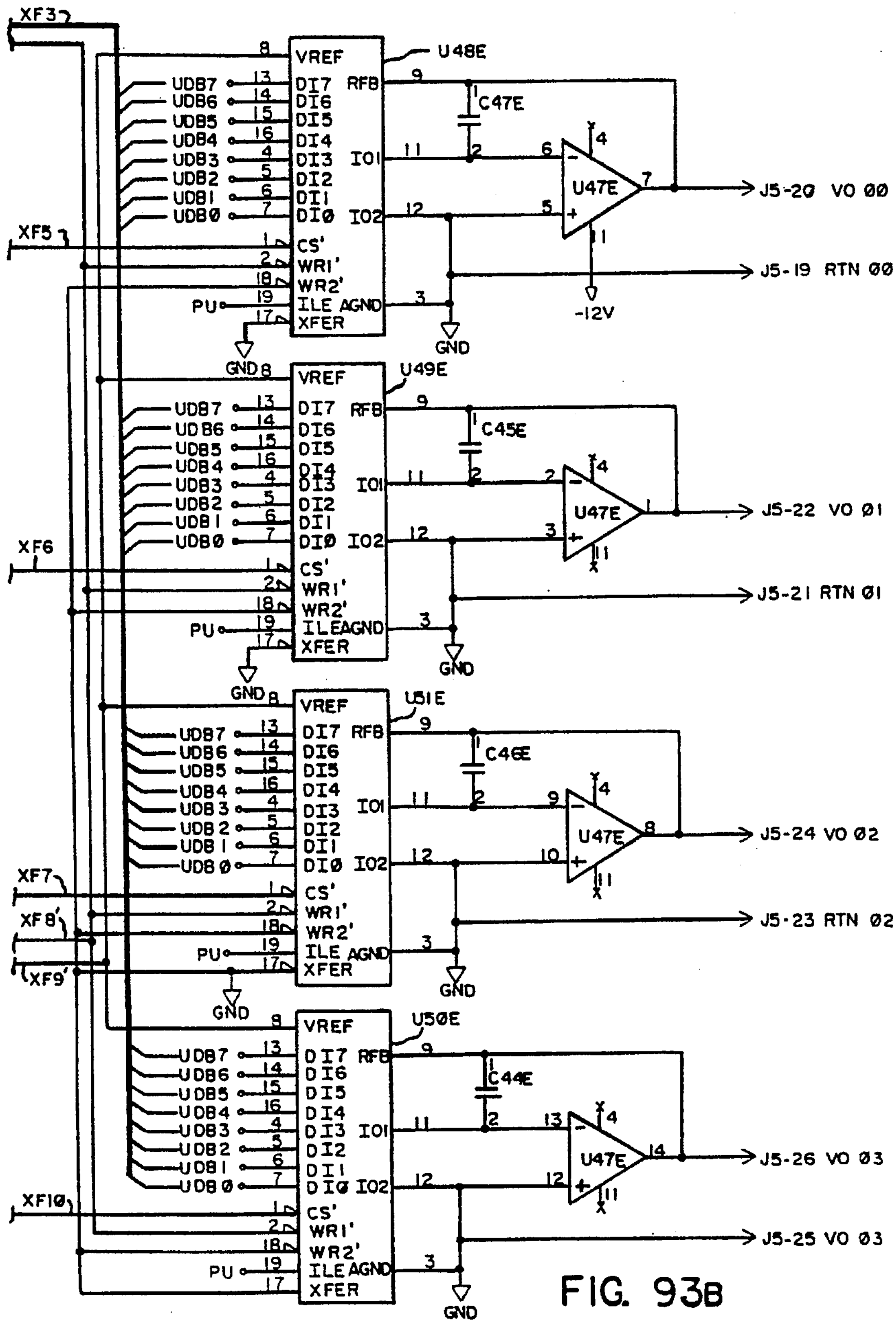
Figure 94A:
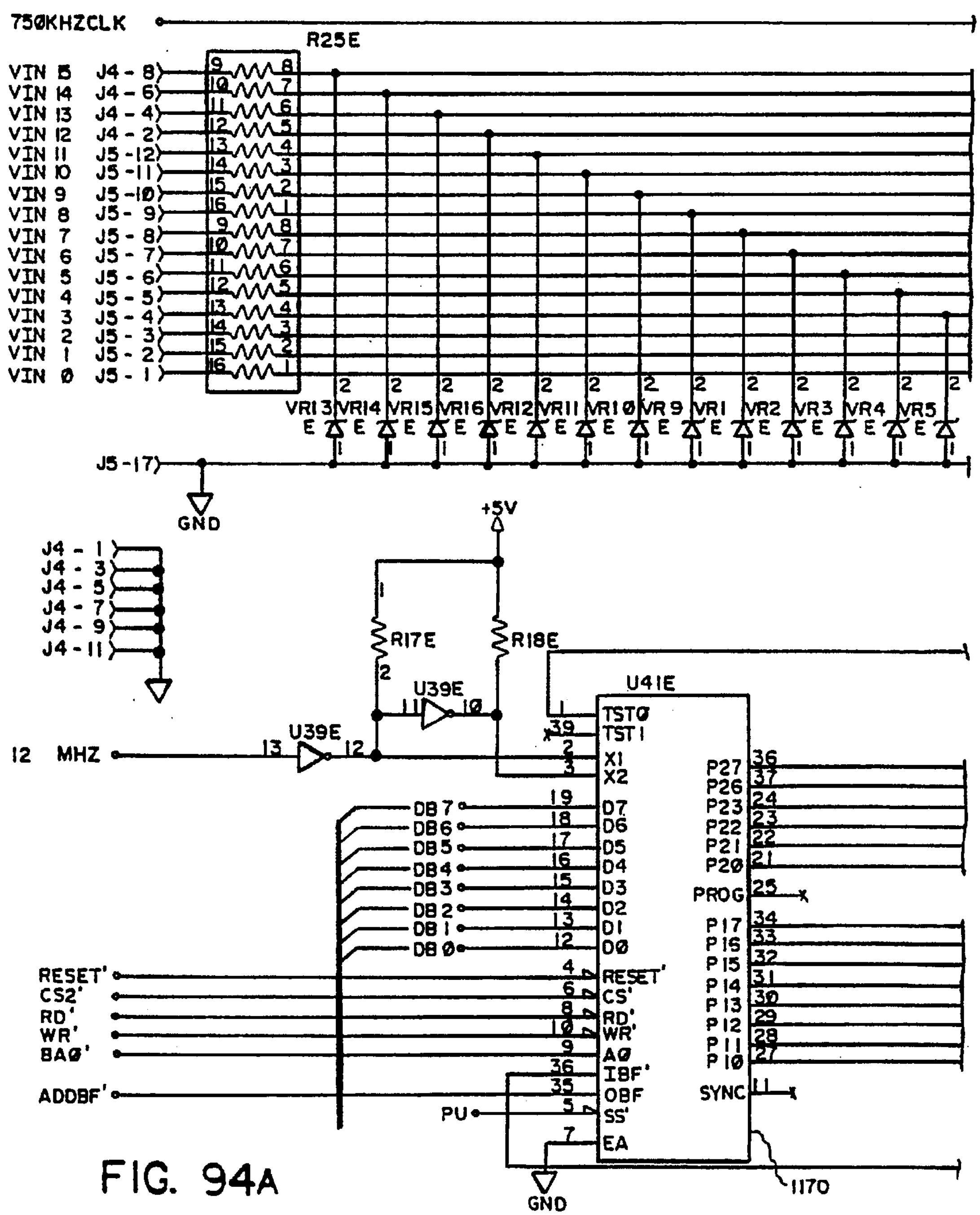
Figure 94B:
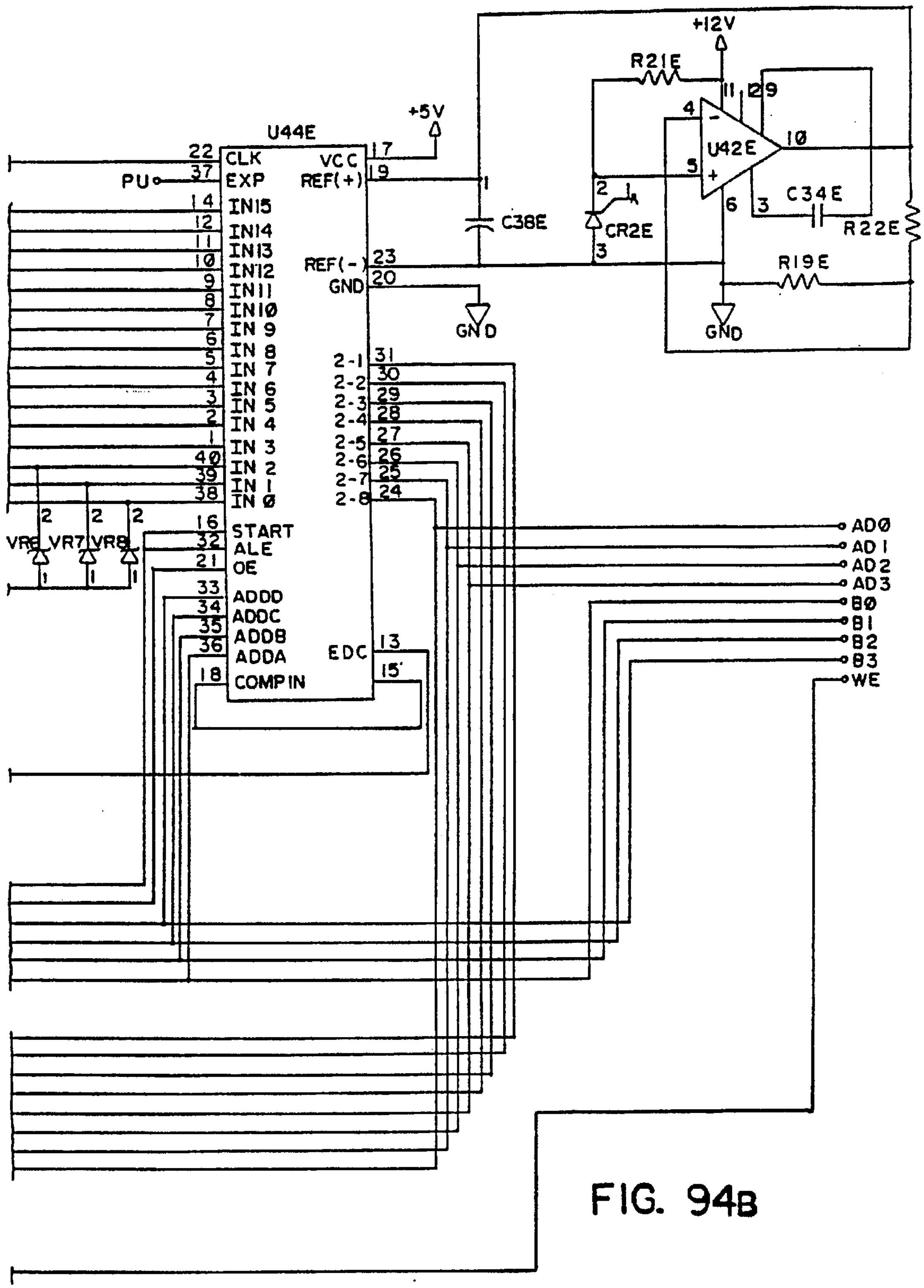

In the currently preferred embodiment, output processor 1166, encoder processor 1164, analog input processor 1170, gated interface 1162 between analog input processor and motion control processor 61, motion control processor 61, and input processor 61 are installed on a single digital I/O board 1194. Detailed circuit schematics and layout orientation of digital I/O board 1194 are provided for completeness of disclosure in FIGS. 86–95. FIG. 86 provides a map showing relative orientation of FIGS. 92 and 93. All components seen in the above referenced figures are commercially available and are used in a manner which is known in the art. Power supply interconnections are removed for clarity of presentation. A list of component types and values, where applicable, for digital I/O board 1194 is found in the following table.

| Number | Name | Value or Type |
|---|---|---|
| U1E | Optical Sw. | |
| U2E | HPRI/Bin | 74LS148 |
| U3E | Latch | 74LS373 |
| U4E | Inv.Amp. | 74LS04 |
| U5E | Expander | P8243 |
| U6E | Amplifier | 74LS125 |
| U7E | Nand | 74LS03 |
| U8E | Clk Gen/Dr | 8284 |
| U9E | Octal Buffer | 74LS540 |
| U10E | CPU | D8742 |
| U11E | CtrDiv16 | 74LS393 |
| U12E | Octal Buffer | 74LS540 |
| U13E | Octal Buffer | 74LS540 |
| U14E | Inv.Amp. | 74LS04 |
| U15E | SRG8 | 74LS1 |
| U16E | Amplifier | 74LS125 |
| U17E | Comp. | 74ALS521 |
| U18E | CPU | D8742 |
| U19E | Inv.Amp. | 74LS04 |
| U20E | Nand | 74LS02 |
| U21E | Comp. | 74ALS521 |
| U22E | Expander | P8243 |
| U23E | MultiVibtrs | 74LS122 |
| U24E | OR Gate | 74LS32 |
| U25E | Inv.Amp. | 74LS04 |
| U26E | Octal Buffer | 74LS540 |

-continued

| Number | Name | Value or Type |
|---|---|---|
| U27E | 16 × 4 Duel ported ram | AM29705A |
| U28E | Octal Buffer | 74LS540 |
| U29E | Latch | 74LS374 |
| U30E | Phase Decoder | HCTL2000 |
| U31E | Nand | 74LS37 |
| U32E | Bin/Oct | 74LS138 |
| U33E | Oct Bus Trscvr | P8287 |
| U34E | Phase Decoder | HCTL2000 |
| U35E | Phase Decoder | HCTL2000 |
| U36E | CPU | D8742 |
| U37E | Nor | LS132 |
| U38E | Phase Decoder | HCTL2000 |
| U39E | Inv.Amp. | 74LS04 |
| U40E | OR Gate | 74LS32 |
| U41E | CPU | D8741 |
| U42E | Diff.Amp. | LM101AJ |
| U43E | BIFIFO | 67C4701 |
| U44E | A/D Converter | ADC0816 |
| U45E | Diff.Amp. | LM101AJ |
| U46E | CPU | DS500032 |
| U47E | Diff.Amp. | LM124 |
| U48E | D/A Converter | DAC0830 |
| U49E | D/A Converter | DAC0830 |
| U50E | D/A Converter | DAC0830 |
| U51E | D/A Converter | DAC0830 |
| U53E | Phase Decoder | HCTL2000 |
| U54E | OR Gate | 74LS32 |
| U55E | Bin/Oct | 74LS138 |
| U57E | Phase Decoder | HCTL2000 |
| Y1E | Oscillator | 24 MHertz |
| R1E | Resistor | 2.2K Ohms |
| R2E | Resistor | 10K Ohms |
| R3E | Resistor | 1K Ohms |
| R4E | Resistor | 620 Ohms |
| R5E | Resistor | 620 Ohms |
| R7E | Resistor | 510 Ohms |
| R8E | Resistor | 510 Ohms |
| R9E | Resistor | 620 Ohms |
| R10E | Resistor | 620 Ohms |
| R11E | Resistor | 30K Ohms |
| R12E | Resistor | 1K Ohms |
| R13E | Resistor | 10K Ohms |
| R14E | Resistor | 2.2K Ohms |
| R15E | Resistor | 620 Ohms |
| R16E | Resistor | 620 Ohms |
| R17E | Resistor | 620 Ohms |
| R18E | Resistor | 620 Ohms |
| R19E | Resistor | 20K 1% Ohms |
| R21E | Resistor | 7.5K Ohms |
| R22E | Resistor | 20K 1% Ohms |
| R23E | Resistor | 7.5K Ohms |
| R24E | Resistor | 20K 1% Ohms |
| R25E | Resistor | 1K Ohms |
| R26E | Resistor | 9.09K1 Ohms |
| R27E | Resistor | 2.2K Ohms |
| R28E | Resistor | 2.2K Ohms |
| R29E | Resistor | 10K Ohms |
| R30E | Resistor | 10K Ohms |
| C1E | Capacitor | 1 μF |
| C3E | Capacitor | .01 μF |
| C19E | Capacitor | 100 μF |
| C29E | Capacitor | 10 μF |
| C34E | Capacitor | 100 pF |
| C35E | Capacitor | 33 pF |
| C36E | Capacitor | 33 pF |
| C38E | Capacitor | 10 μF |
| C39E | Capacitor | 100 pF |
| C40E | Capacitor | 10 μF |
| C41E | Capacitor | 100 pF |
| C44E | Capacitor | 20 pF |
| C45E | Capacitor | 20 pF |
| C46E | Capacitor | 20 pF |
| C47E | Capacitor | 20 pF |
| C48E | Capacitor | 100 μF |
| E1E | Jumper | |
| E2E | Jumper | |
| E3E | Jumper | |

-continued

| Number | Name | Value or Type |
|---|---|---|
| E5E | Jumper | |
| E6E | Jumper | |
| E7E | Jumper | |
| E8E | Jumper | |
| CR1E | Diode | 1N914 |
| CR2E | Diode | LM336BZ |
| CR3E | Diode | LM329BZ |
| CR4E | Diode | 1N914 |
| VR1E | Diode | 1N4733 |
| VR2E | Diode | 1N4733 |
| VR3E | Diode | 1N4733 |
| VR4E | Diode | 1N4733 |
| VR5E | Diode | 1N4733 |
| VR6E | Diode | 1N4733 |
| VR7E | Diode | 1N4733 |
| VR8E | Diode | 1N4733 |
| VR9E | Diode | 1N4733 |
| VR10E | Diode | 1N4733 |
| VR11E | Diode | 1N4733 |
| VR12E | Diode | 1N4733 |
| VR13E | Diode | 1N4733 |
| VR14E | Diode | 1N4733 |
| VR15E | Diode | 1N4733 |
| VR16E | Diode | 1N4733 |

Two central processing units are installed on the vehicle 2A communications board 824. As seen FIG. 77, communications board 824 comprises serial I/O communications processor 1192, SDLC communications processor 810', SDLC chip 812, and radio data recorder 820, and all related interfacing logic and other components.

Serial I/O communication processor 1192 provides a communications interface for all AGV 2A communications except for intercommunications between AGVC 13 and AGV 2A. Serial I/O communications processor 1192 also comprises an interface 1176 to update marker system processor 482, wherefrom update marker data, processed as earlier described, is received or transferred to outerloop processor 67. In the currently preferred embodiment, serial I/O communications processor is a DS5000, available from Dallas Semiconductor. Update marker system 482 is a DS5000 central processing unit available from Dallas Semiconductor.

The components and function of SDLC central processing unit (CPU 810') is described in detail earlier. CPU 810' is preferably an 8742 central processing unit, available from Intel Corporation.

Detailed schematics and layout orientation of communications board 824 are seen in FIGS. 78–85B. All components are commercially available and are used in a manner which is known and in the art. Note that some earlier disclosed circuits are repeated therein. For example, FIG. 85 comprises components and circuits found in radio data recorder 820, earlier seen in FIG. 74. Power supply interconnections are removed for clarity of presentation. A list of component types and values, where appropriate, for communications board 824 is found in the following table.

| Number | Name | Value or Type |
|---|---|---|
| U1D | Diff.Amp. | TL072 |
| U2D | Diff.Amp. | LM339 |
| U3D | Amplifier | DS1489 |
| U4D | CtrDiv16 | 74LS393 |
| U5D | CtrDiv16 | 74LS393 |
| U6D | Clk Gen./Dr. | 8284 |
| U7D | Nand | 74LS00 |
| U8D | Inv.Amp. | 74LS04 |

-continued

| Number | Name | Value or Type |
|---|---|---|
| U9D | SRG8 | 74LS164 |
| U10D | Amplifier | 74LS125 |
| U11D | Power Reg. | LM312T |
| U12D | Inv.Amp. | DS1488 |
| U13D | Nand | 74LS00 |
| U14D | Nand | 74LS02 |
| U15D | Drvr/Rcvr | 75179B |
| U16D | Inv.Amp. | 74LS04 |
| U17D | Nor | 74LS32 |
| U18D | Comp. | 74ALS521 |
| U19D | Amplifier | 3486 |
| U20D | Amplifier | 3487 |
| U21D | CPU | DS500032 |
| U22D | Bin/Oct | 74LS138 |
| U23D | Comp. | 74ALS521 |
| U24D | Inv.Amp. | 74LS04 |
| U25D | SDLC chip | 82530 |
| U26D | BIFIFO | 67C4701 |
| U27D | Nand | 74LS132 |
| U28D | OR Gate | 74LS32 |
| U29D | Oct Bus Trscvr | P8287 |
| U30D | SDLC Comm. | 8273 |
| U31D | CPU | D8742 |
| U32D | Inv.Amp. | 7406 |
| U33D | Counter | 74HC4040 |
| U34D | Inv.Amp. | 7406 |
| U35D | Buffer | 74LS373 |
| U36D | Nand | 74LS03 |
| U37D | Nand | LS132 |
| U38D | HPRT/Bin | 74LS148 |
| U39D | Amplifier | 74LS125 |
| U40D | Bin/Oct | LS123 |
| U41D | CtrDiv16 | 74LS393 |
| U42D | SRG8 | 74LS164 |
| U43D | Latch | 74LS374 |
| U44D | Eprom | 27128 |
| U45D | D Flip Flop | 74LS74 |
| U46D | Inv.Amp. | 74LS04 |
| U47D | Nand | 74LS00 |
| U48D | B-Bit D/A | DAC0808 |
| U49D | Diff.Amp. | LE347 |
| U50D | Diff.Amp. | LE347 |
| U51D | Diff.Amp. | LH0D21CK |
| U52D | Diff.Amp. | LH0021CK |
| Q1 | Transistor | 2N3904 |
| Q2 | Transistor | 2N2222 |
| Y1D | Oscillator | 24 MHertz |
| Y2D | Oscillator | 12 MHertz |
| Y3D | Oscillator | 4.9152 MHZ |
| E1D | Switch | SPDT |
| E2D | Switch | SPDT |
| E3D | Switch | SPDT |
| E4D | Switch | SPDT |
| E5D | Switch | SPDT |
| E6D | Switch | SPDT |
| E7D | Switch | SPDT |
| E13D | Switch | SPDT |
| TP1D | Status Ind. | LED |
| TP2D | Status Ind. | LED |
| TP3D | Status Ind. | LED |
| TP4D | Status Ind. | LED |
| TP5D | Status Ind. | LED |
| TP6D | Status Ind. | LED |
| TP7D | Status Ind. | LED |
| TP8D | Status Ind. | LED |
| TP10D | Status Ind. | LED |
| TP12D | Status Ind. | LED |
| TP13D | Status Ind. | LED |
| C1D | Capacitor | 100 pF |
| C2D | Capacitor | .001 µF |
| C3D | Capacitor | .001 µF |
| C6D | Capacitor | .1 Uf |
| C7D | Capacitor | .01 µF |
| C17D | Capacitor | 33 pF |
| C18D | Capacitor | 33 pF |
| C26D | Capacitor | 15 µF |
| C32D | Capacitor | .01 µF |
| C35D | Capacitor | .01 µF |

-continued

| Number | Name | Value or Type |
|---|---|---|
| C36D | Capacitor | .01 µF |
| C37D | Capacitor | .01 µF |
| C40D | Capacitor | .1 µF |
| C41D | Capacitor | .01 µF |
| C42D | Capacitor | .01 µF |
| C43D | Capacitor | 47 pF |
| C44D | Capacitor | .01 µF |
| C49D | Capacitor | 3000 pF |
| C51D | Capacitor | .1 µF |
| C52D | Capacitor | 4700 pF |
| C53D | Capacitor | 3000 pF |
| C54D | Capacitor | .1 µF |
| CR1D | Diode | 1N914 |
| CR3D | Diode | IN914 |
| R1D | Resistor | 10K Ohms |
| R2D | Resistor | 3.3K Ohms |
| R3D | Resistor | 10K Ohms |
| R4D | Resistor | 10K Ohms |
| R5D | Resistor | 5.1K Ohms |
| R6D | Resistor | 560K Ohms |
| R7D | Resistor | 30K Ohms |
| R8D | Resistor | 10K Ohms |
| R9D | Resistor | 3.3K Ohms |
| R10D | Resistor | 510 Ohms |
| R11D | Resistor | 510 Ohms |
| R12D | Resistor | 2.2K Ohms |
| R13D | Resistor | 2.2K Ohms |
| R14D | Resistor | 100 Ohms |
| R15D | Resistor | 2.2K Ohms |
| R16D | Resistor | 2.2K Ohms |
| R17D | Resistor | 620 Ohms |
| R18D | Resistor | 620 Ohms |
| R19D | Resistor | 2.2K Ohms |
| R20D | Resistor | 2.2K Ohms |
| R21D | Resistor | 1K Ohms |
| R22D | Resistor | 100 Ohms |
| R23D | Resistor | 2.2K Ohms |
| R24D | Resistor | 2.2K Ohms |
| R25D | Resistor | 100 Ohms |
| R26D | Resistor | 2.2K Ohms |
| R27D | Resistor | 2.2K Ohms |
| R28D | Resistor | 2.2K Ohms |
| R29D | Var. Resistor | 10K Ohms |
| R30D | Resistor | 100 Ohms |
| R31D | Resistor | 10K Ohms |
| R32D | Resistor | 510 Ohms |
| R33D | Resistor | 1.3K 1% Ohms |
| R34D | Resistor | 100 Ohms |
| R35D | Resistor | 4.3K Ohms |
| R36D | Resistor | 5.1K Ohms |
| R37D | Resistor | 3.3K Ohms |
| R38D | Resistor | 30K Ohms |
| R39D | Resistor | 200 1% Ohms |
| R40D | Resistor | 5K Ohms |
| R41D | Resistor | 3.3K Ohms |
| R42D | Resistor | 10K Ohms |
| R43D | Resistor | 12K Ohms |
| R44D | Resistor | 3.3K Ohms |
| R45D | Resistor | 270 Ohms |
| R46D | Resistor | 270 Ohms |
| R47D | Resistor | 5.6K Ohms |
| R48D | Resistor | 1.5K Ohms |
| R49D | Resistor | 2K Ohms |
| R50D | Resistor | 2.7K Ohms |
| R51D | Resistor | 10K Ohms |
| R52D | Resistor | 2K Ohms |
| R53D | Resistor | 10K Ohms |
| R54D | Resistor | 5.1K Ohms |
| R55D | Resistor | 10K Ohms |
| R56D | Resistor | 5.6K Ohms |
| R57D | Resistor | 1 Ohms |
| R58D | Resistor | 10K Ohms |
| R59D | Resistor | 1K Ohms |
| R60D | Resistor | 1K Ohms |
| R61D | Resistor | 10K Ohms |
| R62D | Resistor | 5.6K Ohms |
| R63D | Resistor | 1K Ohms |
| R64D | Resistor | 10K Ohms |

-continued

| Number | Name | Value or Type |
|---|---|---|
| R65D | Resistor | 7.5K Ohms |
| R66D | Resistor | 1K Ohms |
| R67D | Resistor | 680 Ohms |
| R68D | Resistor | 470 Ohms |
| R69D | Resistor | 1K Ohms |
| R70D | Resistor | 75K Ohms |
| R71D | Resistor | 10K Ohms |
| R72D | Resistor | 2.7K Ohms |
| R73D | Resistor | 1K Ohms |
| R74D | Resistor | 1K Ohms |
| R75D | Resistor | 2K Ohms |
| R77D | Resistor | 2K Ohms |
| R76D | Resistor | 10K Ohms |

A listing of programs used in each of the above described AGV 2A central processing units is provided in a table, entitled summary of AGV 2A Software, found below. Computer languages used comprise Intel C-86 and Intel Assembler in the outerloop processor, other languages used are seen in the AGV 2A Software table. The operating system for outerloop processor 67 is the AMX86, revision 1.0 from Kadak Products, Ltd., Vancouver, B.C., Canada (copyright 1983, 1984). The AMX operating system has been modified by the inventors to support the 8087 co-processor in the multi-tasking environment and to provide easier interfacing between the "C" language compiler and AMX86. Source of the AMX86 compiler, as adapted by the inventors, is not included because prior agreements between Eaton Kenway and Kadak Products, Inc. prohibit Eaton Kenway from publishing any AMX86 source code. Eaton Kenway can, only upon notification from Kadak that the requester is licensed and thereby qualified by Kadak to have access to the AMX86 system, provide a copy of the modified AMX86 code.

Following the AGV 2A Software table, a listing of each software module used in the currently preferred embodiment is provided. The listings are paginated as indicated in the AGV 2A Software table. Also found in the AGV 2A Software table are file names, file types, assemblers or compilers used (if applicable), and the basic function of the software.

AGV 2A Software

| File Name | First Page | File Type | Assembler or Compiler | Function |
|---|---|---|---|---|
| ANIN.ASM | -1-1 | P | 8742 | ANALOG INPUT PROCESSOR 1170 |
| CNT.ASM | -2-1 | P | 8742 | ENCODER PROCESSOR 1164 |
| COM.ASM | -3-1 | P | 8742 | SDLC PROCESSOR 810' |
| DSCOMM.C | -4-1 | P | C | SERIAL I/O COMMUNICATIONS 1192 |
| DIN.ASM | -5-1 | P | 8742 | INPUT PROCESSOR 1168 |
| DOUT.ASM | -6-1 | P | 8742 | OUTPUT PROCESSOR 1166 |
| MCP.C | -7-1 | P | C | MOTION CONTROL PROCESSOR 61 |
| MCP_CONK | -8-1 | F | — | MOTION CONTROL PROCESSOR 61 |
| UMSLNG_4.C | -9-1 | P | C | U.M.S. PROCESSOR 482 |
| CIA_PS5.A | -10-1 | P | 8742 | GUIDEWIRE PROCESSOR (NOT SHOWN) |
| DS5_DEF.A | -11-1 | P | C | DS5000(S) IN CIRCUIT EMULATOR |

The following programs and files are used in OUTERLOOP PROCESSOR 67:

| File Name | First Page | File Type | Assembler or Compiler | Function |
|---|---|---|---|---|
| V2START.ASM | -12-1 | P | 8086 | OPERATING SYSTEM START-UP |
| V3_186.ASM | -13-1 | P | 8086 | SPECIAL START-UP CODE |
| V4COMT.ASM | -14-1 | P | 8086 | SDLC COMMUNICATION |
| V41AMX.ASM | -15-1 | P | 8086 | INIT. FOR AMX86 CODE |
| V4_INIT.ASM | -16-1 | P | 8086 | INTERFACE DRIVERS |
| V4_8274.ASM | -17-1 | P | 8086 | SERIAL PORT DRIVER(186BD) |
| EK2 | -18-1 | P | C | INTEL INTERFACING |
| EK_DUMMY.C | -19-1 | P | C | MORE INTEL INTERFACING |
| KALMAN.C | -20-1 | P | C | KALMAN FILTER |
| MOVE2WAY.C | -21-1 | P | C | VEHICLE DRIVER |
| V4ACTPRO.C | -22-1 | P | C | VEHICLE SYSTEM SUBR. |
| V4CMDT.C | -23-1 | P | C | AGVC COMMAND PROCESSOR |
| V4DSPMEM.C | -24-1 | P | C | HAND CONTRLLR DIAGNOSTICS |
| V4HCOMMN.K | -25-1 | F | — | HAND CONTROLLER CONSTANTS |
| V4INIT_D.K | -26-1 | F | — | INTERFACE DEFINITION FILE |
| V4LIFT.C | -27-1 | P | C | LIFT SUPPORT SUBROUTINES |
| V4LIFTT.C | -28-1 | P | C | LIFT TASK CONTROL |
| V4MCSGS.K | -29-1 | F | — | AGVC MESS. DEF. CONSTANTS |
| V4MOTION.K | -30-1 | F | — | MOTION CONTROL CONSTANTS |
| V4MV_WIR.K | -31-1 | P | C | WIRE DRIVER SUBROUTINES |
| V4VARS.K | -32-1 | F | — | MAJOR VEHICLE VARIABLES |
| V4HCU_AA.C | -33-1 | P | C | HAND CONTROLLER PROGRAM |
| V4HCU_CC.C | -34-1 | P | C | HAND CONTROLLER PROGRAM |
| V4MCPEMU.C | -35-1 | P | C | INNERLOOP PROCESSOR CONTROL |
| V4MOUT.C | -36-1 | P | C | MOVE TASK CONTROL |
| V4TMHD.C | -37-1 | P | C | HAND CONTR. SERIAL I/0 |
| V4TRNT.C | -38-1 | P | C | MOTION TRANSLATION COMMAND INTERPRETER |
| V4VERS.C | -39-1 | P | C | VEHICLE PROGRAM STATUS INTERPRETER |

where: P represents a program file.
F represents a constant or variable file.
C represents "C" compiler used, otherwise xxxx indicates assembler used.

The software listings, which follow, are representative of the program and constant files used in the currently preferred embodiment. Other programs and constants can be used within the scope of this invention and the software is a part of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

```
NAME  NEW_ANALOG_IN_PROCESSOR
P8041A             ;ASSEMBLER DIRECTIVE TO SHOW WHICH PROCESSOR WE ARE USING
;Definition of buffers
CHAN1 EQU   70H         ;ACTUAL CHANNEL BUFFERS
INTHI1        EQU   60H         ;HI INTERRUPT VALUES
INTLO1        EQU   50H         ;LO INTERRUPT VALUES
CHREG EQU   4EH         ;16 BIT REGISTER CORRESPONDING TO EACH CHAN
INTHI EQU   4CH         ;16 BIT REGISTER TO SHO HI INT'S
INTLO EQU   4AH         ;16 BIT REGISTER TO SHO LO INT'S
DIR   EQU   48H         ;16 BIT REGISTER TO STORE THE DIRECTION OF TRAVEL
INTREC        EQU   46H         ;INTERRUPT RECORD (2 BYTES)
TPS_ANTENNA_INDEX  EQU  45H   ;VALUE OF 0-3 FOR THE OFFSET TO THE ANTENNA DATA
ANALOG_ANT_INDEX EQU    44H
SAVE_R0       EQU   43H
;Definition of constants
BITCNT        EQU   08H
BYTCNT        EQU   02H
OENB  EQU   40H
DOWN  EQU   40H         ;DIRECTION IS DOWN (SET BIT 6)
OFFSET        EQU   -06H        ;OFFSET USED TO CALCULATE THE DIRECTION QUEUE ADDRESS
RESTOR        EQU   06H         ;USED TO RESTORE THE ADDRESS OF CHREG
;NEW CONSTANTS - ADDRESS OF LOCATION OF DATA IN THE NEW RAM CHIP
FRONT_ANT1_LOW    EQU  0     ;0000 FRONT ANTENNA SIGNAL 1 LOW NIBBLE
FRONT_ANT1_HIGH EQU    1     ;0001 FRONT ANTENNA SIGNAL 1 HIGH NIBBLE
FRONT_ANT2_LOW    EQU  2     ;0010 FRONT ANTENNA SIGNAL 2 LOW NIBBLE
FRONT_ANT2_HIGH EQU    3     ;0011 FRONT ANTENNA SIGNAL 2 HIGH NIBBLE
REAR_ANT1_LOW     EQU  4     ;0100 REAR ANTENNA SIGNAL 1 LOW NIBBLE
REAR_ANT1_HIGH    EQU  5     ;0101 REAR ANTENNA SIGNAL 1 HIGH NIBBLE
REAR_ANT2_LOW     EQU  6     ;0110 REAR ANTENNA SIGNAL 2 LOW NIBBLE
REAR_ANT2_HIGH    EQU  7     ;0111 REAR ANTENNA SIGNAL 2 HIGH NIBBLE
PORT_ANT_LOW      EQU  8     ;1000 ANALOG ANTENNA PORTSIDE LOW NIBBLE
PORT_ANT_HIGH     EQU  9     ;1001 ANALOG ANTENNA PORTSIDE HIGH NIBBLE
STAR_ANT_LOW      EQU  0AH   ;1010 ANALOG ANTENNA STARBOARD LOW NIBBLE
STAR_ANT_HIGH     EQU  0BH   ;1011 ANALOG ANTENNA STARBOARD HIGH NIBBLE
ODS1_LOW    EQU   0CH  ;1100 OBSTICAL DETECT 1 LOW NIBBLE LOCATION IN RAM CHIP
ODS1_HIGH   EQU   0DH  ;1101 OBSTICAL DETECT 1 HIGH NIBBLE LOCATION IN RAM CHIP
ODS2_LOW    EQU   0EH  ;1110 OBSTICAL DETECT 2 LOW NIBBLE LOCATION IN RAM CHIP
ODS2_HIGH   EQU   0FH  ;1111 OBSTICAL DETECT 2 HIGH NIBBLE LOCATION IN RAM CHIP

START_RAM_WRITE EQU    0DFH  ;PULL IBF LOW TO DO A WRITE ON THE NEW RAM CHIP
STOP_RAM_WRITE    EQU  20H   ;END THE WRITE TO RAM CHIP
```

```
CLEAR_ADDR  EQU   30H   ;CLEAR THE ADDRESS BUS
;Start of executable code
      ORG   000H
      JMP   INIT
      NOP
      JMP   CMND

INIT: SEL   RB0
      ANL   P2,#0EFH          ;RESET THE INTERRUPT LINE
      MOV   A,PSW
      ANL   A,#0F8H
      MOV   PSW,A
      CLR   A
      MOV   R0,#02H
      MOV   R1,#7EH
LOOP: MOV   @R0,A
      INC   R0
      DJNZ  R1,LOOP
      MOV   R0,#INTLO
      MOV   R1,#04H
      CPL   A
LOOPI:      MOV   @R0,A            ;DISABLE ALL INTERRUPTS AT THIS POINT
      INC   R0
      DJNZ  R1,LOOPI
      EN    I
PAGE
;**************************************************************************
;                                                       *
;     START:                                                  *
;                                                       *
;THE MAIN ROUTINE IS CALLED "START" AND "SCAN". THIS ROUTINE WILL SCAN  *
;EVERY CHANNEL THAT IS ENTERED INTO THE CHANNEL REGISTER (CHREG). IF THE*
;BIT IS SET IN CHREG THAT CORRESPONDS TO A CHANNEL, THEN THAT CHANNEL IS*
;SKIPPED. WHILE CHANNELS ARE BEING CONVERTED, ALL INTERRUPTS ARE  *
;DISABLED TO ENSURE THAT WE DON'T MISS ANY VITAL DATA. THE NEW AND OLD  *
;CHANNEL VALUE ARE THEN COMPARED TO DETERMINE THE DIRECTION OF THE CHANGE*
;IF THERE WAS A CHANGE. A BIT IS THEN SET IN THE DIRECTION REGISTER TO  *
;IDENTIFY THE DIRECTION. IT IS THEN DETERMIND WHETHER OR NOT INTERRUPTS *
;HAVE BEEN ENABLED ON THAT PARTICULAR CHANNEL. IF THEY HAVE, THEN THE   *
;OLD AND NEW VALUE ARE COMPARED TO THE INTERRUPT LEVEL TO DETERMINE IF  *
;IT HAS CROSSED THE LEVEL YET. IF IT HAS, THEN THE DIRECTION BIT IS     *
;SET AND THE LEVEL BIT IS SET AND THE INTERRUPT IS GENERATED.           *
```

```
;***************************************************************************
START:      MOV   R0,#CHAN1        ;POINTER TO CHANNEL 1
      MOV   R1,#CHREG              ;POINTER TO CHANNEL QUEUE
      MOV   R2,#BITCNT             ;BIT COUNTER
      MOV   R3,#01H                ;GENERAL PURPOSE MASK TO ROTATE
      MOV   R4,#00H                ;START WITH CHANNEL 1 SELECTED
      MOV   R5,#BYTCNT             ;BYTE COUNTER TO TELL WHEN TO RESET
SCAN: MOV   A,@R1                  ;GET THE SCAN REGISTER TO TEST FOR THIS CHANNEL
      ANL   A,R3                   ;AND THE CHREG WITH THE BIT PATTERN IN R3
      JNZ   NEXT                   ;A NON-ZERO RESULT MEANS THE CHANNEL DISALLOWED
      DIS   I                      ;DISABLE INTERRRUPTS UNTIL WE HAVE CONVERTED IT
RESCAN:     MOV   A,R4             ;GET THE CHANNEL NUMBER FROM R4
      CALL  INTSET                 ;SET THE PORT VALUE ACCORDING TO THE INTERUPT
      OUTL  P2,A                   ;SELECT THE CHANNEL
      ORL   P2,#80H                ;TOGGLE P27 HIGH
      ANL   P2,#7FH                ;THEN P27 LOW
      MOV   R6,#0FFH               ;COUNT UNTIL WE GET THE CHANNEL
SCAN2:      JT0   SCAN1            ;WAIT FOR TST 0 TO GO LOW
      JMP   SCAN3
SCAN1:      DJNZ  R6,SCAN2
      JMP   RESCAN
SCAN3:      JNT0  SCAN4            ;WAIT FOR TST 0 TO GO HIGH-CONVERSION COMPLETE
      JMP   SCAN5
SCAN4:      DJNZ  R6,SCAN3
      JMP   RESCAN
SCAN5:      ORL   P2,#OENB         ;ENABLE OUTPUT FROM A/D CONVERTER
      IN    A,P1                   ;READ THE CONVERTER CHANNEL
      ANL   P2,#30H                ;LEAVE P2 LOW EXCEPT IBF IS NORMALLY HIGH AND LEAVE
ALONE OBF
      EN    I                      ;ENABLE INTERRUPTS AFTER CONVERSION COMPLETE
      MOV   R6,A                   ;SAVE THE NEW VALUE IN R6 FOR TEST
      CALL  DIRECT                 ;GET THE DIRECTION OF TRAVEL (0 IS UP)
      MOV   A,R1                   ;GET R1 AND CALCULATE THE INTLO REGISTER ADDRESS
      ADD   A,#-04H
      MOV   R1,A                   ;REMEMBER TO RESTORE R1 LATER
      MOV   A,@R0
      MOV   R7,A                   ;READ THE OLD VALUE AND SAVE IN R7
      MOV   A,R0                   ;CALCULATE THE ADDRESS OF INTLO VALUE FROM R0
      ADD   A,#-20H
      MOV   R0,A
      MOV   A,@R1                  ;READ THE INT REGISTER
      ANL   A,R3                   ;AND IT WITH THE PATTERN IN R3 TO SEE IF ALLOWED
```

```
      JNZ   LO1                 ;CALCULATE THE ADDRESSES FOR INTHI
INLO: MOV   A,@RO               ;READ THE LOW INTERRUPT VALUE
      CALL  TEST                ;TEST IF THE NEW VALUE HAS CROSSED THE INT VAL
      JNZ   LO1                 ;CALCULATE THE INTHI ADDRESSES IF NOT YET READY
LOINT:      CALL  DIRGEN                  ;SET THE DIRECTION IN THE CHANNEL NUMBER, RET
IN A
LOINT1:     CALL  INTTST
      JB4   LOINT1                    ;WAITE TILL IT IS CLEAR TO GENERATE AN INTERRUPT
      CALL  GENINT
      MOV   A,@R1               ;GET THE INTREG
      ORL   A,R3                ;DISABLE THE INTERRUPT
      MOV   @R1,A
LO1:  MOV   A,RO                ;CALCULATE THE INTHI VALUE ADDRESS
      ADD   A,#10H
      MOV   RO,A
      MOV   A,R1                ;CALCULATE THE INTHI REGISTER
      ADD   A,#02H
      MOV   R1,A
INHI: MOV   A,@R1               ;READ THE INTHI REGISTER
      ANL   A,R3                ;TEST IF IT IS ENABLED
      JNZ   HI1                 ;RESTORE RO & R1 IF NOT ENABLED
      MOV   A,@RO               ;READ THE HI VALUE
      CALL  TEST                ;TEST IF THE NEW VALUE HAS CROSSED THE INT VALUE
      JNZ   HI1
HIINT:      CALL  DIRGEN                  ;SET THE DIRECTION IN THE CHANNEL NUMBER, RET
IN A
      ORL   A,#80H                    ;SET MSB FOR HI INT CODE
HIINT1:     CALL  INTTST
      JB4   HIINT1
      CALL  GENINT
      MOV   A,@R1               ;GET THE INT REG
      ORL   A,R3                ;DISABLE THE INTERRUPT
      MOV   @R1,A
HI1:  MOV   A,RO
      ADD   A,#10H                    ;RESTORE RO TO CHAN REGISTER POINTER
      MOV   RO,A
      MOV   A,R1
      ADD   A,#02H                    ;RESTORE R1 TO CHANNEL SACEN REGISTER POINTER
      MOV   R1,A
      MOV   A,R6                ;GET THE NEW CHANNEL VALUE
      MOV   @RO,A               ;WRITE IT OUT
NEXT: DJNZ  R2,INC2
```

```
      DJNZ  R5,INC4
      CALL  WRITE_ODS_TO_RAM
      JMP   START
INC4: MOV   R2,#BITCNT          ;LOAD UP 8 BIT COUNT AGAIN
      INC   R1                  ;LOOK AT THE SECOND SCAN REGISTER
INC2: INC   R0                  ;LOOK AT THE NEXT CHANNEL
      INC   R4                  ;GET THE NEXT CHANNEL NUMBER
      MOV   A,R3
      RL    A                   ;GET THE BIT PATTERN FOR THE NEXT CHANNEL
      MOV   R3,A
      CALL  READ_WRITE_ANTENNAS
      JMP   SCAN                ;SCAN THE NEXT CHANNEL

;*************************************************************************
;ADDED 5-7-90 LBC.
;READ_WRITE_ANTENNAS:
;  USED TO UPDATE THE ANTENNA DATA MORE OFTEN THAN ONCE EVERY 16 TIMES
;   THROUGH THE LOOP.  THIS ROUTINE ROTATES THOUGH THE 4 ANTENNA INPUTS
;   BY DOING ONE ANTENNA INPUT EACH TIME THROUGH THE MAIN LOOP.
;*************************************************************************
READ_WRITE_ANTENNAS:
      MOV   A, R0               ;SAVE R0 SO IT CAN BE USED FOR ADDRESSING
      MOV   R0, #SAVE_R0
      MOV   @R0, A
      MOV   R0, #TPS_ANTENNA_INDEX  ;GET ADDRESS OF POINTER
      MOV   A, @R0                  ;GET THE DATA FROM THE POINTER
      INC   A                   ;
      ANL   A, #3               ;MAKE SURE IT DOES NOT EXCEED 3
      MOV   @R0, A                  ;SAVE IT FOR NEXT TIME THROUGH THE LOOP
      ADD   A, #0CH                 ;ADD THE OFFSET INTO THE ARRAY
      MOV   R7, A               ;SAVE THE NEW OFFSET INTO THE ARRAY
      DIS   I                   ;DISABLE INTERRRUPTS UNTIL WE HAVE CONVERTED IT
RESCANB: MOV      A, R7             ;GET THE OFFSET INTO THE ARRAY
      CALL  INTSET                  ;SET THE PORT VALUE ACCORDING TO THE INTERUPT
      OUTL  P2,A                ;SELECT THE CHANNEL
      ORL   P2,#80H                 ;TOGGLE P27 HIGH
      ANL   P2,#7FH                 ;THEN P27 LOW
      MOV   R6,#0FFH            ;COUNT UNTIL WE GET THE CHANNEL
SCANB2:     JT0   SCANB1                  ;WAIT FOR TST 0 TO GO LOW
      JMP   SCANB3
SCANB1:     DJNZ  R6,SCANB2
      JMP   RESCANB
```

```
SCANB3:     JNTO   SCANB4              ;WAIT  FOR  TST  0  TO  GO  HIGH-CONVERSION
COMPLETE
      JMP    SCANB5
SCANB4:     DJNZ   R6,SCANB3
      JMP    RESCANB
SCANB5:     ORL    P2,#OENB            ;ENABLE OUTPUT FROM A/D CONVERTER
      IN     A,P1                ;READ THE CONVERTER CHANNEL
      ANL    P2,#30H             ;LEAVE P2 LOW EXCEPT IBF IS NORMALLY HIGH AND LEAVE
ALONE OBF
      EN     I                   ;ENABLE INTERRUPTS AFTER CONVERSION COMPLETE

      MOV    R6, A               ;SAVE ARGUMENT
      MOV    A, #CHAN1           ;GET ADDRESS OF THE CHANNEL ARRAY
      ADD    A,R7                ;ADD THE OFFSET INTO THE ARRAY (CHAN1)
      MOV    R0, A               ;PLACE THE POINTER INTO R0
      MOV    A, R6               ;RECALL THE SAVED DATA FROM R6
      MOV    @R0, A              ;PLACE THE DATA IN THE ARRAY (CHAN1)
;LBC ADDED 10/2/90 ADDED THE OTHER 2 ANTENNA INPUTS LINES 4 & 5 TO THE RAM CHIP
; THIS NEXT SECTION CYCLES THROUGH THE 2 ANTENNA INPUTS EACH TIME THROUGH HERE.
;
      MOV    R0, #ANALOG_ANT_INDEX   ;GET ADDRESS OF POINTER
      MOV    A, @R0              ;GET THE DATA FROM THE POINTER
      INC    A                   ;
      ANL    A, #1               ;MAKE SURE IT DOES NOT EXCEED 1 BECAUSE THERE ARE ONLY
2 LOCATION TO USE
      MOV    @R0, A              ;SAVE IT FOR NEXT TIME THROUGH THE LOOP
      ADD    A, #04H             ;ADD THE OFFSET INTO THE ARRAY
      MOV    R7, A               ;SAVE THE NEW OFFSET INTO THE ARRAY
      DIS    I                   ;DISABLE INTERRRUPTS UNTIL WE HAVE CONVERTED IT
RESCANC:
      MOV    A, R7               ;GET THE OFFSET INTO THE ARRAY
      CALL   INTSET              ;SET THE PORT VALUE ACCORDING TO THE INTERUPT
      OUTL   P2,A                ;SELECT THE CHANNEL
      ORL    P2,#80H             ;TOGGLE P27 HIGH
      ANL    P2,#7FH             ;THEN P27 LOW
      MOV    R6,#0FFH            ;COUNT UNTIL WE GET THE CHANNEL
SCANC2:     JTO    SCANC1              ;WAIT FOR TST 0 TO GO LOW
      JMP    SCANC3
SCANC1:     DJNZ   R6,SCANC2
      JMP    RESCANC
SCANC3:     JNTO   SCANC4              ;WAIT  FOR  TST  0  TO  GO  HIGH-CONVERSION
COMPLETE
```

```
      JMP    SCANC5
SCANC4:      DJNZ  R6,SCANC3
      JMP    RESCANC
SCANC5:      ORL    P2,#OENB         ;ENABLE OUTPUT FROM A/D CONVERTER
      IN     A,P1               ;READ THE CONVERTER CHANNEL
      ANL    P2,#30H                  ;LEAVE P2 LOW EXCEPT IBF IS NORMALLY HIGH AND LEAVE
ALONE OBF
      EN     I                  ;ENABLE INTERRUPTS AFTER CONVERSION COMPLETE

      MOV    R6, A              ;SAVE ARGUMENT
      MOV    A, #CHAN1          ;GET ADDRESS OF THE CHANNEL ARRAY
      ADD    A,R7               ;ADD THE OFFSET INTO THE ARRAY (CHAN1)
      MOV    R0, A              ;PLACE THE POINTER INTO R0
      MOV    A, R6              ;RECALL THE SAVED DATA FROM R6
      MOV    @R0, A                   ;PLACE THE DATA IN THE ARRAY (CHAN1)

;************************************************************************
;5-2-90 LBC NEW CODE ADDED TO WRITE SOME OF THE DATA OUT TO THE NEW
;      RAM CHIP.  6 BYTES WILL BE WRITTEN EACH TIME THROUGH THE LOOP TO
;      THE NEW RAM CHIP THAT WILL BE A GO BETWEEN THIS PROCESSOR AND THE
;      MCP DS5000 PROCESSOR.
; THIS RAM CHIP IS ONLY 4 BITS WIDE. SO TO STORE AN ENTIRE BYTE I NEED TO DO
;  2 WRITES OF THE LOW NIBBLE AND THEN THE HIGH NIBBLE AT THE NEXT LOCTAION.
; HERE IS A DESCRIPTION OF THE LOCATIONS IN THE RAM CHIP THAT I WILL PLACE
;  THE DATA:
;     LOCATION IN           DESCRIPTION              ANALOG INPUT
;    THE RAM CHIP                                    ARRAY LOCATION
;    --------
;  0 | 0000 | LOW NIBBLE
;    --------            TPS FRONT ANTENNA BYTE 1       12 (Ch)
;  1 | 0001 | HIGH NIBBLE
;    --------
;  2 | 0010 | LOW NIBBLE
;    --------            TPS FRONT ANTENNA BYTE 2        13 (Dh)
;  3 | 0011 | HIGH NIBBLE
;    --------
;  4 | 0100 | LOW NIBBLE
;    --------            TPS REAR ANTENNA BYTE 1         14 (Eh)
;  5 | 0101 | HIGH NIBBLE
;    --------
;  6 | 0110 | LOW NIBBLE
;    --------            TPS REAR ANTENNA BYTE 2         15 (Fh)
```

```
;  7 ¦ 0111 ¦ HIGH NIBBLE
;    --------
;  8 ¦ 1000 ¦ NOT USED
;    --------                 ANALOG BOARD ANTENNA PORTSIDE       4
;  9 ¦ 1001 ¦ NOT USED
;    --------
;  A ¦ 1010 ¦ NOT USED
;    --------                 ANALOG BOARD ANTENNA STARBOARD      5
;  B ¦ 1011 ¦ NOT USED
;    --------
;  C ¦ 1100 ¦ LOW NIBBLE
;    --------                 1ST ODS BOARD (OBSTICAL DETECTOR)   9
;  D ¦ 1101 ¦ HIGH NIBBLE
;    --------
;  E ¦ 1110 ¦ LOW NIBBLE
;    --------                 2ND ODS BOARD             8
;  F ¦ 1111 ¦ HIGH NIBBLE
;    --------
;**************************************************************************
WRITE_TO_RAM:
;WRITE FRONT ANTENNA BYTE 1 TO RAM CHIP
      MOV    R0, #CHAN1+12          ;STARTING OF THE TPS ANTENNA DATA
      MOV    A, @R0
      DIS    I
      ORL    P2, #FRONT_ANT1_LOW
      OUTL   P1, A
      ANL    P2, #START_RAM_WRITE
      ORL    P2, #STOP_RAM_WRITE
      ANL    P2, #CLEAR_ADDR
      SWAP   A
      ORL    P2, #FRONT_ANT1_HIGH
      OUTL   P1, A
      ANL    P2, #START_RAM_WRITE
      ORL    P2, #STOP_RAM_WRITE
      ANL    P2, #CLEAR_ADDR
      MOV    A, #0FFH
      OUTL   P1, A
      EN     I

;WRITE FRONT ANTENNA BYTE 2 TO RAM CHIP
      INC    R0
      MOV    A, @R0
```

```
        DIS   I
        ORL   P2, #FRONT_ANT2_LOW
        OUTL  P1, A
        ANL   P2, #START_RAM_WRITE
        ORL   P2, #STOP_RAM_WRITE
        ANL   P2, #CLEAR_ADDR
        SWAP  A
        ORL   P2, #FRONT_ANT2_HIGH
        OUTL  P1, A
        ANL   P2, #START_RAM_WRITE
        ORL   P2, #STOP_RAM_WRITE
        ANL   P2, #CLEAR_ADDR
        MOV   A, #0FFH
        OUTL  P1, A
        EN    I

;WRITE REAR ANTENNA BYTE 1 TO RAM CHIP
        INC   R0
        MOV   A, @R0
        DIS   I
        ORL   P2, #REAR_ANT1_LOW
        OUTL  P1, A
        ANL   P2, #START_RAM_WRITE
        ORL   P2, #STOP_RAM_WRITE
        ANL   P2, #CLEAR_ADDR
        SWAP  A
        ORL   P2, #REAR_ANT1_HIGH
        OUTL  P1, A
        ANL   P2, #START_RAM_WRITE
        ORL   P2, #STOP_RAM_WRITE
        ANL   P2, #CLEAR_ADDR
        MOV   A, #0FFH
        OUTL  P1, A
        EN    I

;WRITE REAR ANTENNA BYTE 2 TO RAM CHIP
        INC   R0
        MOV   A, @R0
        DIS   I
        ORL   P2, #REAR_ANT2_LOW
        OUTL  P1, A
        ANL   P2, #START_RAM_WRITE
```

```
        ORL    P2, #STOP_RAM_WRITE
        ANL    P2, #CLEAR_ADDR
        SWAP   A
        ORL    P2, #REAR_ANT2_HIGH
        OUTL   P1, A
        ANL    P2, #START_RAM_WRITE
        ORL    P2, #STOP_RAM_WRITE
        ANL    P2, #CLEAR_ADDR
        MOV    A, #0FFH
        OUTL   P1, A
        EN     I
;STARTING OF THE ANALOG ANTENNA DATA PORTSIDE
        MOV    R0, #CHAN1+4
        MOV    A, @R0
        DIS    I
        ORL    P2, #PORT_ANT_LOW
        OUTL   P1, A
        ANL    P2, #START_RAM_WRITE
        ORL    P2, #STOP_RAM_WRITE
        ANL    P2, #CLEAR_ADDR
        SWAP   A
        ORL    P2, #PORT_ANT_HIGH
        OUTL   P1, A
        ANL    P2, #START_RAM_WRITE
        ORL    P2, #STOP_RAM_WRITE
        ANL    P2, #CLEAR_ADDR
        MOV    A, #0FFH
        OUTL   P1, A
        EN     I
;STARTING OF THE ANALOG ANTENNA DATA STARBOARD
        MOV    R0, #CHAN1+5
        MOV    A, @R0
        DIS    I
        ORL    P2, #STAR_ANT_LOW
        OUTL   P1, A
        ANL    P2, #START_RAM_WRITE
        ORL    P2, #STOP_RAM_WRITE
        ANL    P2, #CLEAR_ADDR
        SWAP   A
        ORL    P2, #STAR_ANT_HIGH
        OUTL   P1, A
        ANL    P2, #START_RAM_WRITE
```

```
        ORL     P2, #STOP_RAM_WRITE
        ANL     P2, #CLEAR_ADDR
        MOV     A, #0FFH
        OUTL    P1, A
        EN      I
        MOV     R0, #SAVE_R0            ;RESTORE R0 BEFORE RETURING TO MAIN LOOP
        MOV     A, @R0
        MOV     R0, A
        RET
WRITE_ODS_TO_RAM:
;WRITE 2ND ODS CHANNEL TO RAM CHIP
        MOV     R0, #CHAN1+8
        MOV     A, @R0
        DIS     I
        ORL     P2, #ODS2_LOW
        OUTL    P1, A
        ANL     P2, #START_RAM_WRITE
        ORL     P2, #STOP_RAM_WRITE
        ANL     P2, #CLEAR_ADDR
        SWAP    A
        ORL     P2, #ODS2_HIGH
        OUTL    P1, A
        ANL     P2, #START_RAM_WRITE
        ORL     P2, #STOP_RAM_WRITE
        ANL     P2, #CLEAR_ADDR
        MOV     A, #0FFH        ;CLEAR THE BUS
        OUTL    P1, A
        EN      I
;WRITE 1ST ODS CHANNEL TO RAM CHIP
        INC     R0              ;POINT TO THE 1ST ODS CHANNEL
        MOV     A, @R0
        DIS     I
        ORL     P2, #ODS1_LOW
        OUTL    P1, A
        ANL     P2, #START_RAM_WRITE
        ORL     P2, #STOP_RAM_WRITE
        ANL     P2, #CLEAR_ADDR
        SWAP    A
        ORL     P2, #ODS1_HIGH
        OUTL    P1, A
        ANL     P2, #START_RAM_WRITE
        ORL     P2, #STOP_RAM_WRITE
```

```
     ANL    P2, #CLEAR_ADDR
     MOV    A, #OFFH
     OUTL   P1, A
     EN     I

     RET
PAGE
;*************************************************************************
;                                                        *
;    CMND:                                               *
;                                                        *
;ERROR: IS A SIMPLE WAY TO ELIMINATE THE FALSE INTERRUPTS THAT ALWAYS   *
;AFTER ANY COMMAND HAS BEEN WRITTEN TO THE 8742 WITH PARAMETERS. IT     *
;SIMPLY RESETS THE INTERRUPTS. THE COMMAND PROCESSOR FOLLOWS. IT  *
;INTERPRETS ALL COMMANDS SENT TO IT AND EXECUTES THEM.                  *
;*************************************************************************
     ORG    200H
ERROR:      RETR
CMND: JNIBF ERROR
     SEL    RB1
     MOV    R7,A        ;SAVE A IN R7 SO WE DON'T DESTROY TS CONTENTS
     JF1    WRITE
     IN     A,DBB       ;READ THE COMMAND THAT CAUSED THE INTERRUPT
     MOV    R6,A        ;SAVE THE COMMAND IN R6 FOR FUTURE REFERENCE
     JMP    READ        ;OTHERWISE JUMP TO THE READ.
WRITE:      IN    A,DBB
     MOV    R6,A
     XRL    A,#OFFH           ;TEST FOR MASTER RESET
     JNZ    CO
     JMP    INIT        ;DO THE MASTER RESET
CO:  MOV    A,R6        ;RESTORE A
     XRL    A,#OFEH           ;TEST FOR READ INTERRUPT COMMAND
     JNZ    CO1
     MOV    RO,#INTREC
     MOV    A,@RO
     ANL    P2,#OEFH    ;CLEAR THE INTERRUPT LINE
     OUT    DBB,A
     INC    RO
     CLR    A
     MOV    @RO,A
     MOV    A,R7
     RETR
```

```
C01:  MOV   A,R6
      JB7   CLRSET
      JB6   CHSET        ;DO A CHANNEL SET
CHCLR:      CLR   F0
      JMP   C1
CHSET:      CLR   F0
      CPL   F0           ;THE CARRY BIT IS A FLAG FOR HI OR LOW
C1:   SWAP  A            ;SWAP THE NIBBLES TO USE THE HIGH BITS TO COUNT
      ANL   A,#03H              ;KEEP THE LOWER THREE BITS
      JZ    AA
      DEC   A
      JZ    BB
      DEC   A
      JZ    CJUMP
;5-2-90 LBC CHANGED THE LABEL 'DD' TO 'DDD' BECAUSE THE NEW ASSEMBLER FOR
; SOME REASON DID NOT LIKE THE LABEL 'DD'.
      JMP   DDD
CJUMP:      JMP   CC
AA:   MOV   A,R6         ;RESTORE ARG 0
      ANL   A,#0FH
      MOV   R1,A         ;CHANNEL SELECT
      MOV   R0,#CHAN1
      ADD   A,R0
      MOV   R0,A         ;SAVE THE CHANNEL POINTER
      MOV   A,R1         ;GET THE CHANNEL SELECT FOR P2
      CALL  INTTS1
      OUTL  P2,A
      ORL   P2,#80H
      ANL   P2,#7FH
      MOV   R5,#0FFH
AA2:  JT0   AA1                 ;WAIT FOR TST 0 TO GO LOW
      JMP   AA3
AA1:  DJNZ  R5,AA2
      JMP   AA
AA3:  JNT0  AA4                 ;WAIT FOR TST 0 TO GO HIGH-CONVERSION COMPLETE
      JMP   AA5
AA4:  DJNZ  R5,AA3
      JMP   AA
AA5:  ORL   P2,#OENB            ;ENABLE OUTPUT FROM A/D CONVERTER
      ORL   P2,#OENB
      IN    A,P1         ;READ THE CONVERTED CHANNEL
      ANL   P2,#30H             ;SET THE P2 LINES LOW
```

```
        MOV     @RO,A
        OUT     DBB,A
        MOV     A,R7
        RETR
BB:     MOV     A,R6            ;RESTORE ARG 0
        ANL     A,#07H                  ;GET A COUNTER
        MOV     R1,#0FEH
LOOPB:          JZ      BDONE
        DEC     A
        XCH     A,R1
        RL      A
        XCH     A,R1
        JMP     LOOPB
BDONE:          JFO     CONTB           ;JUMP TO CONTINUE B IF CARRY IS SET
        MOV     A,R6            ;RESTORE ARG 0
        JB3     B0
        MOV     RO,#INTLO       ;LOAD BYTE ONE OF THE INTLO REG
        JMP     B1
B0:     MOV     RO,#INTLO+1 ;LOAD BYTE TWO
        JMP     B1
CONTB:          MOV     A,R6            ;RESTORE ARG 0
        JB3     B2
        MOV     RO,#INTHI
        JMP     B1
B2:     MOV     RO,#INTHI+1
B1:     MOV     A,R1            ;LOAD THE BIT PATTERN
        ANL     A,@RO
        MOV     @RO,A           ;SET THE INTERRUPT ON
        MOV     A,R7
        RETR

CC:     MOV     A,R6            ;RESTORE ARG 0
        ANL     A,#07H                  ;GET A COUNTER
        MOV     R1,#01H
LOOPC:          JZ      CDONE
        DEC     A
        XCH     A,R1
        RL      A
        XCH     A,R1
        JMP     LOOPC
CDONE:          JFO     CONTC           ;JUMP TO CONTINUE B IF CARRY IS SET
        MOV     A,R6            ;RESTORE ARG 0
```

```
      JB3   CC0
      MOV   R0,#INTLO    ;LOAD BYTE ONE OF THE INTLO REG
      JMP   CC1
CC0:  MOV   R0,#INTLO+1 ;LOAD BYTE TWO
      JMP   CC1
CONTC:      MOV   A,R6        ;RESTORE ARG 0
      JB3   CC2
      MOV   R0,#INTHI
      JMP   CC1
CC2:  MOV   R0,#INTHI+1
CC1:  MOV   A,R1         ;LOAD THE BIT PATTERN
      ORL   A,@R0
      MOV   @R0,A        ;SET THE INTERRUPT OFF
      MOV   A,R7
      RETR

DDD:  JNIBF $-0
      IN    A,DBB        ;READ A ONE BYTE ARGUMENT
      CPL   A            ;CONVERT TO TWO'S COMPLIMENT
      INC   A
      MOV   R5,A         ;SAVE IT IN R5 TILL WE KNOW WHERE TO PUT IT
      MOV   A,R6         ;GET ARG 0
      ANL   A,#07H
      JF0   D0
      MOV   R0,#INTLO1   ;ADDRESS OF TOP OF INTERRUPT LO LEVEL BUFFER
      JMP   LOOPD
D0:   MOV   R0,#INTHI1
LOOPD:      JZ    DONED
      INC   R0
      DEC   A
      JMP   LOOPD
DONED:      MOV   A,R5
      MOV   @R0,A        ;SET THE INTERRUPT LEVEL
      MOV   A,R7
      RETR

CLRSET:     JB6   CSET
CCLR: CLR   F0
      JMP   CLR0
CSET: CLR   F0
      CPL   F0
CLR0: JB5   EE
```

```
      ANL    A,#07H           ;KEEP THE LOWER 4 BITS AS A COUNTER
      MOV    R1,#01H          ;A BIT TO ROTATE LEFT
LOOPCS:      JZ    CSDONE
      DEC    A
      XCH    A,R1
      RL     A
      XCH    A,R1
      JMP    LOOPCS
CSDONE:      MOV   A,R6
      JB3    CLR2
CLR1: MOV    R0,#CHREG   ;LOAD BYTE ONE OF CHANNEL REGISTER
      JMP    CLR3
CLR2: MOV    R0,#CHREG+1 ;LOAD BYTE TWO
CLR3: JF0    CARRY
      MOV    A,R1        ;LOAD THE BIT PATTERN
      ORL    A,@R0
      MOV    @R0,A
      MOV    A,R7
      RETR
CARRY:       MOV   A,R1
      CPL    A           ;NEED TO UNSET A BIT
      ANL    A,@R0
      MOV    @R0,A
      MOV    A,R7
      RETR
EE:   JB4    $+4
      JMP    $+4
      JMP    FF
      ORL    A,#0F8H          ;TESTING FOR A 111 PATERN IN BITS 0,1,2
      CPL    A
      JZ     HH
      JMP    GG
      NOP
      NOP
      NOP
HH:   MOV    R0,#CHREG
      JNIBF $-0
      IN     A,DBB       ;READING A TWO BYTE ARGUMENT
      JF0    $+4
      JMP    $+7
      CPL    A
      ANL    A,@R0
```

```
        MOV   @RO,A
        JMP   $+4
        ORL   A,@RO
        MOV   @RO,A
        INC   RO
        JNIBF $-0
        IN    A,DBB
        JFO   $+4
        JMP   $+7
        CPL   A
        ANL   A,@RO
        MOV   @RO,A
        JMP   $+4
        ORL   A,@RO
        MOV   @RO,A
        MOV   A,R7
        RETR
GG:     JNIBF $-0
        IN    A,DBB         ;READ A ONE BYTE ARGUMENT
        MOV   R5,A          ;SAVE IT IN R5
        MOV   A,R6
        JBO   GO
        MOV   RO,#CHREG
        JMP   G1
GO:     MOV   RO,#CHREG+1
G1:     JFO   G2
        MOV   A,R5
        ORL   A,@RO
        MOV   @RO,A
        MOV   A,R7
        RETR
G2:     MOV   A,R5
        CPL   A             ;NEED TO CLEAR A BIT
        ANL   A,@RO
        MOV   @RO,A
        MOV   A,R7
        RETR
FF:     ORL   A,#OF8H             ;111 PATTERN TEST
        CPL   A             ;WILL BE ZERO IF TRUE
        JNZ   $+4
        JMP   FF2
        JNIBF $-0
```

```
       IN    A,DBB        ;ONE BYTE ARGUMENT
       MOV   R5,A         ;SAVE IN R5 TILL WE NEED IT
       MOV   A,R6
       JB0   FF0
       MOV   R0,#CHREG
       JMP   FF1
FF0:   MOV   R0,#CHREG+1
FF1:   MOV   A,R5
       MOV   @R0,A
       MOV   A,R7
       RETR
FF2:   MOV   R0,#CHREG
       JNIBF $-0
       IN    A,DBB
       MOV   @R0,A
       INC   R0
       JNIBF $-0
       IN    A,DBB
       MOV   @R0,A
       MOV   A,R7
       RETR
;
;
READ:  ANL   A,#0E0H            ;TESTING FOR A 000 IN 7,6,5
       JZ    ZZ
       MOV   A,R6         ;RESTORE ARG 0
       JB7   YYY
       JB6   XX
       JMP   ZZ
YYY:   JMP   YY
ZZ:    MOV   R0,#CHAN1    ;LOAD POINTER TO CHANEL ONE
       MOV   A,R6         ;RESTORE ARG 0
       JB5   Z1
       ANL   A,#0FH             ;GET A COUNTER
ZLOOP:       JZ    Z2
       DEC   A
       INC   R0
       JMP   ZLOOP
Z2:    MOV   A,@R0
       OUT   DBB,A
       MOV   A,R7
       RETR
```

```
Z1:    MOV   A,#10H              ;16 DECIMAL
ZLOOP1:      JZ     Z3
       MOV   R1,A
       MOV   A,@R0
       INC   R0
       JOBF  $-0
       OUT   DBB,A
       MOV   A,R1
       DEC   A
       JMP   ZLOOP1
Z3:    MOV   A,R7
       RETR
XX:    JB5   XX1
       JB4   X2
       MOV   R0,#CHREG
       JMP   X3
XX1:   JMP   X1
X2:    MOV   R0,#CHREG+1
X3:    ANL   A,#07H              ;GET A COUNTER
       MOV   R1,#00H             ;COUNT UP SO WE CAN COUNT BACK DOWN
       MOV   R2,#01              ;A BIT MASK TO ROTATE
XLOOP1:      JZ     X4
       INC   R1
       DEC   A
       XCH   A,R2
       RL    A
       XCH   A,R2
       JMP   XLOOP1
X4:    MOV   A,R2
       ANL   A,@R0         ;FILTER OUT THE BIT WE WANT
       XCH   A,R1          ;SWITCH PLACES WITH THE DOWN COUNT
XLOOP2:      JZ     X5
       DEC   A
       XCH   A,R1
       RR    A
       XCH   A,R1
       JMP   XLOOP2
X5:    MOV   A,R1
       OUT   DBB,A
       MOV   A,R7
       RETR
X1:    MOV   R0,#CHREG
```

```
        MOV    A,@R0
        OUT    DBB,A
        INC    R0
        MOV    A,@R0
        JOBF   $-0
        OUT    DBB,A
        MOV    A,R7
        RETR
YY:     JB5    Y1
        MOV    R0,#INTLO1
        JMP    Y2
Y1:     MOV    R0,#INTHI1
Y2:     ANL    A,#0FH             ;GET A COUNT
        SWAP   A
        MOV    STS,A
        SWAP   A
YLOOP:         JZ     Y3
        INC    R0
        DEC    A
        JMP    YLOOP
Y3:     MOV    A,@R0
        DEC    A
        CPL    A
        OUT    DBB,A
        MOV    A,R7
        RETR
;***************************************************************************
;                                                    *
;       TEST:                                        *
;                                                    *
;This routine tests the following equation for true:          *
;                                                    *
;          R6 <= A <= R7 || R7 <= A <= R6                     *
;                                                    *
;If this is true then we have a legitimate interrupt to generate. *
;***************************************************************************
        ORG    400H
TEST:   CLR    C
        DEC    A
        CPL    A          ;CONVERT TO ORIGINAL VERSION
        XRL    A,R6
        JZ     SUCESS            ;WE HAVE SUCCESS SINCE A = R6
```

```
       MOV    A,@RO          ;GET THE INT LEVEL BACK
       JB7    T1             ;TEST FOR NEGATIVE RESULT
       JMP    T2             ;OTHERWISE JUMP TO T2
T1:    XCH    A,R6           ;
       JB7    T3
       XCH    A,R6
T2:    ADDC   A,R6           ;ADD -A,R6
       JB7    TEST3
       JNC    TEST3
       JMP    TEST4
T3:    XCH    A,R6
       ADDC   A,R6           ;ADD -A,R6
       JB7    TEST4
       JC     TEST4
TEST3:        CLR    C
       MOV    A,@RO
       DEC    A
       CPL    A
       XRL    A,R7
       JZ     SUCESS
       MOV    A,@RO
       JB7    T4
       JMP    T5
T4:    XCH    A,R7
       JB7    T6
T5:    ADDC   A,R7
       JB7    FAILUR
       JNC    FAILUR
       JMP    SUCESS
T6:    ADDC   A,R7
       JB7    SUCESS
       JC     SUCESS
       JMP    FAILUR
TEST4:        CLR    C
       MOV    A,@RO
       DEC    A
       CPL    A
       XRL    A,R7
       JZ     SUCESS
       MOV    A,@RO
       JB7    T7
       JMP    T8
```

```
T7:    XCH   A,R7
       JB7   T9
T8:    ADDC  A,R7
       JB7   SUCESS
       JNC   SUCESS
       JMP   FAILUR
T9:    ADDC  A,R7
       JB7   FAILUR
       JC    FAILUR
SUCESS:      CLR   A
       RET
FAILUR:      MOV   A,#0FFH
       RET
;************************************************************************
;                                                              *
;      DIRECT:                                                       *
;                                                              *
;This routine is intended for one thing only, to determine if the new   *
;channel value is higher or lower than the old value. If it is found to *
;be higher, then the bit pattern in R3 will be ORLed into the DIR       *
;register else the compliment will ANDed to the register to clear that  *
;coresponding bit.                                                   *
;************************************************************************
DIRECT:      CLR   C           ;START WITH THE CARRY RESET TO BE SURE
       MOV   A,@R0       ;GET THE OLD CHANNEL VALUE
       XRL   A,R6        ;TEST THE NEW FOR EQUAL TO THE OLD
       JZ    DIRUP       ;SET DIRECTION TO UP WHEN EQUAL
       MOV   A,@R0       ;GET THE OLD VALUE AGAIN
       CPL   A
       INC   A
       ADDC  A,R6        ;SUBTRACT THE OLD VALUE FROM THE NEW VALUE
       JNC   DIRDWN            ;NO CARRY INDICATES THE DIRECTION IS DOWN
DIRUP:       MOV   A,R1        ;GET THE ADDRESS OF THE CHAN REG TO GET THE DIR REG
       ADD   A,#OFFSET   ;ADD THE OFFSET (-6)
       MOV   R1,A        ;STORE IN R1 TO READ @
       MOV   A,@R1       ;READ THE DIRECTION REGISTER
       CPL   A           ;COMPLIMENT TO CLEAR A BIT WITH ORL
       ORL   A,R3        ;R3 HAS IN IT A ONE BIT PATTERN CORRESPONDING TO
                         ;THE BIT POSITION SOUGHT AFTER
       CPL   A           ;COMPLIMENT BACK TO ORIGINAL STATE
       MOV   @R1,A
       JMP   DIRRES            ;RESTORE R1
```

```
DIRDWN:     MOV   A,R1
      ADD   A,#OFFSET
      MOV   R1,A
      MOV   A,@R1
      ORL   A,R3
      MOV   @R1,A
DIRRES:     MOV   A,R1
      ADD   A,#RESTOR
      MOV   R1,A
      RET
DIRGEN:     MOV   A,R1          ;GET THE ADDRESS OF THE DIRECTION REGISTER
      ADD   A,#OFFSET
      MOV   R1,A
      MOV   A,@R1
      ANL   A,R3        ;ISOLATE THE RIGHT BIT
      JNZ   GENDWN
GENUP:      MOV   A,R1
      ADD   A,#RESTOR   ;RESTORE THE FIRST R1
      MOV   R1,A
      MOV   A,R4        ;NO  CHANGE TO THE CHANNEL NUMBER
      RET
GENDWN:     MOV   A,R1
      ADD   A,#RESTOR
      MOV   R1,A
      MOV   A,R4
      ORL   A,#DOWN           ;SET THE 6TH BIT FOR DOWN DIRECTION
      RET
PAGE
INTTST:     DIS   I             ;CANNOT BE INTERRUPTED WHEN WE SELECT RB1
      SEL   RB1
      MOV   R7,A
      MOV   R0,#INTREC+1
      MOV   A,@R0
      JNZ   INT1
      MOV   A,R7
      ANL   A,#0EFH           ;BE SUREB TO CLEAR THE INTERRUPT BIT
      SEL   RB0
      EN    I
      RET
INT1: MOV   A,R7
      ORL   A,#30H            ;SET THE INTERRUPT BIT
      SEL   RB0
```

```
        EN      I
        RET
INTTS1:         MOV    R7,A
        MOV     R0,#INTREC+1
        MOV     A,@R0
        JNZ     INT11
        MOV     A,R7
        ANL     A,#0EFH           ;BE SUREB TO CLEAR THE INTERRUPT BIT
        ORL     A, #20H           ;KEEP P25 HIGH TO NOT ENABLE WRITE TO RAM CHIP
        RET
INT11:          MOV    A,R7
        ORL     A,#30H            ;SET THE INTERRUPT BIT
        RET
GENINT:         DIS    I
        SEL     RB1
        MOV     R0,#INTREC
        MOV     A,R7        ;RETRIEVE THE INTERRUPT VALUE
        ANL     A,#0EFH           ;CLEAR THE INTERRUPT BIT
        MOV     @R0,A
        INC     R0
        MOV     @R0,#01H
;5-2-90 LBC
;LOOKES LIKE A BUG TO ME.  THE NEXT INSTRUCTION SHOULD BE "ORL  P2, 10H"
        ANL     P2,#0EFH    ;GENERATE THE INTERRUPT
        SEL     RB0
        EN      I
        RET
INTSET:         SEL    RB1
        MOV     R1,A
        MOV     R0,#INTREC+1
        MOV     A,@R0
        JNZ     TSET1
        MOV     A,R1
        ANL     A,#0EFH           ;KEEP THE LINE LOW
        ORL     A, #20H           ;KEEP P25 HIGH TO NOT ENABLE WRITE TO RAM CHIP
        SEL     RB0
        RET
TSET1:          MOV    A,R1
        ORL     A,#30H            ;KEEP THE LINE HIGH UNTIL IT IS RESET BY 80186
        SEL     RB0
        RET
        END
```

```
NAME NEW_COUNTER_ENCODER
;************************************************************************
;
;************************************************************************
;
;************************************************************************
;MACRO DEFINITIONS TO BE USED FOR THE SIMULATOR
;************************************************************************
SIMULATOR EQU 0         ;CHANGE THIS VALUE 0=REAL CHIP 1=RUN WITH SIMULATOR
IF SIMULATOR = 1
   MACRO  %JNIBF  ;NOTHING DEFINED
   ENDMAC
   MACRO  %INDBB
      IN    A,P1
   ENDMAC
ELSE
   MACRO  %JNIBF
      JNIBF \0
   ENDMAC

   MACRO  %INDBB
      IN    A,DBB
   ENDMAC
ENDIF
;************************************************************************
;                                                              *
;                         Definition of constants                     *
;                                                              *
;************************************************************************
      P8041A            ;WHICH PROCESSER WE ARE USING, USED FOR THE ASSEMBLER
CUP0  EQU   80H   ;CROSSOVER POS
CUP1  EQU   81H
CUP2  EQU   82H
CUP3  EQU   83H   ;4TH COUNTER
CUP4  EQU   84H   ;SUM COUNTER
CUP5  EQU   85H   ;SUM2 COUNTER

CDN0  EQU   20H   ;MUST BE ANY NUMBRER OTHER THAN 0. 20H IS TEMPORARY.
                  ;THE ACTUAL CODE WILL BE CONVERTED TO A ZERO BEFORE
                  ;IT IS TRANSMITTED OUT TO THE HOST. CROSSOVER NEG
CDN1  EQU   01H
CDN2  EQU   02H
```

```
CDN3  EQU    03H    ;4TH COUNTER
CDN4  EQU    04H    ;SUM COUNTER
CDN5  EQU    05H    ;SUM2 COUNTER
ADDR_CNT0    EQU  0FEH    ;COUNTER 0
ADDR_CNT1    EQU  0FDH    ;COUNTER 1
ADDR_CNT2    EQU  0FBH    ;COUNTER 2
ADDR_CNT3    EQU  0F7H    ;COUNTER 3
CLR_ADDR     EQU   0EFH    ;LEAVE ALONE THE OBF LINE TO THE 186 PROCESSOR
CLR_COUNTERS EQU 07FH    ;ADDRESS TO RESET ALL 4 COUNTERS AND LEAVE OBF LINE ALONE
PAGE
;************************************************************************
;                                                       *
;                Definition of buffers                        *
;                                                       *
;************************************************************************

INT0  EQU    20H    ;INTERRUPT 0 BUFFER
CNT0  EQU    21H    ;START OF COUNTER 0 (3 BYTES)
INT1  EQU    24H    ;INTERRUPT 1 BUFFER
CNT1  EQU    25H    ;START OF COUNTER 1 (3 BYTES)
INT2  EQU    28H    ;INTERRUPT 2 BUFFER
CNT2  EQU    29H    ;START OF COUNTER 2 (3 BYTES)
INT3  EQU    2CH    ;INTERRUPT 3 BUFFER
CNT3  EQU    2DH    ;3 BYTE COUNTER # 3
INT4  EQU    30H    ;SPECIAL PURPOSE REGISTER TO CONTAIN INTERRUPT FOR THE SUM
CNT4  EQU    31H    ;3 BYTE REGISTER TO CONTAIN THE SUM OF CNT 0 + CNT 1
INT5  EQU    34H    ;ADDRESS OF THE INTERRUPT REGISTER FOR THE DIFF COUNTER
CNT5  EQU    35H    ;ADDRESS OF THE DIFFERENCE COUNTER (3 BYTES)
PREV_CNT0 EQU     38H    ;LOCATION TO SAVE THE PREVIOUS VALUE READ FROM THE COUNTERS
PREV_CNT1 EQU     39H    ; SO THAT I CAN SUBTRACT THE PREV FROM THE NEW TO FIND
PREV_CNT2 EQU     3AH    ; THE DIFFERENCE OF HOW FAR THE ENCODER HAS TRAVELED.
PREV_CNT3 EQU     3BH
PREV_CNT5 EQU     3CH
INTREG       EQU  3DH    ;INTERRUPT REGISTER (ON/OFF = 0/1)
;**************************************************************************
;"INTREG" IS A COMBINATION OF BITS ENABLEING AND DISABLEING INTURRUPTS
;  BIT 0 --> COUNTER 0     MASK TO SET "FE"(AND)     MASK TO CLEAR "01"(OR)
;  BIT 2 --> COUNTER 1     MASK TO SET "FB"(AND)     MASK TO CLEAR "04"(OR)
;  BIT 4 --> COUNTER 2     MASK TO SET "EF"(AND)     MASK TO CLEAR "10"(OR)
;  BIT 5 --> COUNTER 3     MASK TO SET "DF"(AND)     MASK TO CLEAR "20"(OR)
;  BIT 6 --> SUM COUNTER   MASK TO SET "BF"(AND)     MASK TO CLEAR "40"(OR)
;  BIT 7 --> SUM2 COUNTER  MASK TO SET "7F"(AND)     MASK TO CLEAR "80"(OR)
```

```
;  WHEN THE BIT IS CLEARED IT MEANS THAT THE INTURRUPT IS ACTIVE.  THE BIT
;   IS CLEARED (WHICH ENABLES THE INTURRUPT) BY THE MAIN PROCESSOR (186).
;   IT SAYS THAT WAY UNTIL THE 80186 SETS IT OR UNTIL THE INTERRUPT OCCURES.
;*****************************************************************************
;"INTREC+1" IS THE BYTE WHICH SAYS AN INTURRUPT IS PENDIND.  NO OTHER INTURRUPT
;  IS ALLOWED TO BE SET WHEN THIS VALUE IS SET TO 1.  WHEN "GENINT" IS CALLED IT
;  CLEARS THIS VALUE WHICH SAYS ANOTHER INTURRUPT IS NOW LEGAL TO BE SET.
;*****************************************************************************
INTREC      EQU   3EH   ;INTERRUPT RECORD (2 BYTE)
ARG   EQU   4DH   ;BEGINNING OF THE ARGUMENT BUFFER (COULD BE 3 OR MORE BYTRS)

PAGE
;*************************************************************************
;                                                       *
;                        Initialization                     *
;                                                       *
;The main function of the initialization process is to select register  *
;bank zero, clear the RAM and enable the interrupts. This is done in    *
;order to reset the processor by a command from the 80186.        *
;*************************************************************************
;----------------------------
; set up vectors
;----------------------------
      ORG   000H
      JMP   INIT         ;VECTOR JUMP TO START PROCESSOR
      NOP
      JMP   CMND         ;VECTOR JUMP FOR IBF INTERUPT

      NOP
      NOP
      DIS   TCNTI        ;IN CASE A INTURRUPT OCCURES -- DISABLE IT
      RETR               ;JUST IN CASE A TIMER INTURRUPT OCCURES FOR SOME REASON

;------------------------------
; start of executable code
;------------------------------
INIT: SEL   RB0          ;SELECT REGISTER BANK ZERO
      ORL   P2,#0FFH     ;CLEAR THE PORT - MAKE SURE THE INTERRUPT LINE
                         ;  TO THE 186 IS HIGH. (DISABLEING IT)
      MOV   A,PSW
      ANL   A,#0F8H           ;CLEAR THE STACK POINTER
      MOV   PSW,A
```

```
;------------------------------
; clear ram memory
;------------------------------
      CLR   A            ;ZERO REGISTER
      MOV   RO,#7FH            ;HIGHEST ADDRESS OF RAM TO CLEAR
CLR_MEM:
      MOV   @RO,A        ;ZERO (CLEAR) THE RAM AT THAT ADDRESS .
      DJNZ  RO,CLR_MEM   ;LOOP UNTIL DONE
;------------------------------
; clear HCTL counters
;------------------------------
      ANL   P2, #CLR_COUNTERS      ;RESET THE HCTL2000 CHIPS AT STARTUP
      ORL   P2, #CLR_ADDR          ;CLEAR THE ADDRESS OF RESETING THE COUNTERS
;------------------------------
; reset interrupts to off
;------------------------------
      MOV   RO,#INTREG   ;GET THE ADDRESS OF THE INTERRUPT REGISTER
      MOV   @RO,#OFFH    ;DISABLE COUNTER INTERRUPTS
      CALL  RESET        ;CLEAR ANY PENDING INTERRUPT
      EN    I            ;ENABLE IBF INTERRUPT
PAGE
;**************************************************************************
;                                                        *
;     MAIN:                                              *
;                                                        *
;This routine does all of the initial processing, ie. determining      *
;whether any changes took place worth noting or not.             *
;This next section first tests to determine if there is an interrupt    *
;pending from the previous count 2. If there is, it first sets up the   *
;appropriate pointers and calls GENINT which sends out the interrupt and*
;returns. This is dependant on the fact that the interrupt can be        *
;generated. If the OBF flag is set, then it just ignores the interrupt  *
;until next time through. It then proceeds and tests for the need to     *
;process its own counter and whether or not an interrupt needs to be     *
;generated. If an interrupt needs to be generated, it decides what type *
;and then places the interrupt into the INT  buffer for count0, after    *
;which it jumps to the next routine. That routine is the same as this    *
;one except it looks at the pending interrupt for the previous count0.  *
;The same is true of count2 for count 1.                   *
;**************************************************************************
MAIN:
      MOV   RO,#INTREC+1       ;DONT DO ANY MORE CHECKING IF AN INTURRUPT IS PENDING
```

```
        MOV    A,@R0          ;IS AN INTURRUPT PENDING ?
        JNZ    READ_CNTRS     ;IF INTREC+1 IS ACTIVE THEN AN INTURRUPT IS PENDING
        MOV    R0,#INT4       ;SUM ENCODER INTURRUPT TEST
        MOV    A,@R0
        JZ     CHKINT0               ;TEST IF INT IS OK TO GENERATE
        CALL   GENINT                ;GENERATE THE INTERRUPT AND CLEAR IT.
        MOV    R3,#40H               ;MASK TO DISABLE INTURRUPT 3 (SUM ENCODER)
        JMP    CLRINT
CHKINT0:
        MOV    R0,#INT0       ;LOAD THE ADDRESS OF THE INTERRUPT BUFFER
        MOV    A,@R0          ;LOAD THE INTERRUPT BUFFER
        JZ     CHKINT1               ;TEST IF INT IS OK TO GENERATE
        CALL   GENINT                ;GENERATE THE INTERRUPT
        MOV    R3,#01H               ;MASK TO DISABLE INTURRUPT 0
        JMP    CLRINT
CHKINT1:
        MOV    R0,#INT1       ;LOAD THE ADDRESS OF THE INTERRUPT BUFFER
        MOV    A,@R0          ;LOAD THE INTERRUPT BUFFER
        JZ     CHKINT5        ;TEST IF INT IS OK TO GENERATE
        CALL   GENINT                ;GENERATE THE INTERRUPT
        MOV    R3,#04H               ;MASK TO DISABLE INTURRUPT 1
        JMP    CLRINT
CHKINT5:
        MOV    R0,#INT5       ;DIFFERENCE COUNTER
        MOV    A,@R0
        JZ     CHKINT2               ;TEST IF INT IS OK TO GENERATE
        CALL   GENINT
        MOV    R3,#80H               ;MASK TO DISABLE INTURRUPT 4 (DIFFERENCE)
        JMP    CLRINT
CHKINT2:
        MOV    R0,#INT2       ;LOAD THE ADDRESS OF THE INTERRUPT BUFFER
        MOV    A,@R0          ;LOAD THE INTERRUPT BUFFER
        JZ     CHKINT3        ;TEST IF INT IS OK TO GENERATE
        CALL   GENINT                ;GENERATE THE INTERRUPT
        MOV    R3,#10H               ;MASK TO DISABLE INTURRUPT 2
        JMP    CLRINT

        NOP                   ;HELP PREVENT ADDRESSING PROBLEMS
        NOP
        NOP
        NOP
CHKINT3:
```

```
        MOV    R0,#INT3     ;LOAD THE ADDRESS OF THE INTERRUPT BUFFER
        MOV    A,@R0        ;LOAD THE INTERRUPT BUFFER
        JZ     READ_CNTRS   ;TEST IF INT IS OK TO GENERATE
        CALL   GENINT               ;GENERATE THE INTERRUPT
        MOV    R3,#20H              ;MASK TO DISABLE INTURRUPT 2

; THIS ROUTINE CLEARES THE INTURRUPT AFTER IT HAS BEEN SET.  EACH INTURRUPT
;  HAS ITS OWN MASK WHICH IS PASSED IN TO THIS PROCEDURE IN R3.
CLRINT:
        MOV    R0,#INTREG
        MOV    A,R3         ;TURN OFF THE INTERRUPT
        ORL    A,@R0
        MOV    @R0,A        ;DISABLE THE INTERRUPT

;-------------------------------
; READ ENCODERS FROM PORT P1
;-------------------------------
READ_CNTRS:
        ANL    P2, #ADDR_CNT0     ;POINT TO ENCODER 1
        IN     A, P1        ;GET DATA FROM ENCODER 1
        ORL    P2, #CLR_ADDR      ;CLEAR THE ADDRESS
        MOV    R4, A        ;SAVE THE VALUE FOR LATER USE IN R4
        ANL    P2, #ADDR_CNT1     ;POINT TO ENCODER 2
        IN     A, P1        ;GET DATA FROM ENCODER 2
        CPL    A            ;INVERT BECAUSE OF THE WIREING ON THE BOARD
        INC    A
        ORL    P2, #CLR_ADDR      ;CLEAR THE ADDRESS
        MOV    R5, A        ;SAVE THE VALUE FOR LATER USE IN R5
        ANL    P2, #ADDR_CNT2     ;POINT TO ENCODER 3
        IN     A, P1        ;GET DATA FROM ENCODER 3
        ORL    P2, #CLR_ADDR      ;CLEAR THE ADDRESS
        MOV    R6, A        ;SAVE THE VALUE FOR LATER USE IN R6
        ANL    P2, #ADDR_CNT3     ;POINT TO ENCODER 4
        IN     A, P1        ;GET DATA FROM ENCODER 4
        ORL    P2, #CLR_ADDR      ;CLEAR THE ADDRESS
        MOV    R7, A        ;SAVE THE VALUE FOR LATER USE IN R7
PAGE
;**************************************************************************
; After reading the encoders/counters now I need to find how far the
;  encoder has counted since the last time I read the encoder/counter.
;  The previous read is saved in the veriable PREV_CNT, which is different
;  for each counter.  By taking the new value and subtracting the previous
```

```
;  value I come up with the difference.  This is the actual distance the
;  encoder has traveled since the last read.  The new value is saved in the
;  registers R4-R7.  One for each encoder.  This is to speed up the code from
;  saving it in RAM.
;     EX:  new - prev = difference
;  Since this processor does not have a SUB instruction we do a 2's complement
;  addition.  By taking the 2's complement of PREV_CNT and adding it to the new
;  value we accomplish the same thing as subtracting it.
;After finding the difference I can check the Most Sig. Bit of "A" to see if
;  the encoder is going forward or backward.  If forward we pass 00 to the
;  CHANGCNT routine else we pass FFh to it.  This causes a sign extended
;  value to be calculated and when it returns I can check the Most Sig.
;  Bit again to see if we crossed 0.  If 0 was crossed then generate the
;  interrupt to the 186 processor.
;*********************************************************************
;---------------------------------------------------------------------------
; CODE FOR CHECKING COUNTER NUMBER 0
;---------------------------------------------------------------------------
CONTO:
      MOV   RO, #PREV_CNTO     ;PREV VALUE THAT WAS READ FROM THE COUNTERS
      MOV   A, @RO             ;SET UP FOR A TWO'S COMPLEMENT ADDITION (SUBTRACTION)
      CPL   A           ;DOING A TWO'S COMPLEMENT ADDITION
      INC   A           ;ADD 1 FOR TWO'S COMPLEMENT ADDITION
      ADD   A, R4       ;A NOW HAS THE TOTAL DISTANCE GONE SINCE THE LAST READ
      XCH   A, R4       ;PUT THE NEW BYTE READ IN "A" AND SAVE THE DIFFERENCE OF THE
2 BYTES
      MOV   @RO, A             ;PLACE THE NEW BYTE READ IN THE "PREV_CNTO" LOCATION
      MOV   A, R4       ;RESTORE "A" WITH DIFFERENCE READ FROM THE COUNTERS
      MOV   RO, #CNTO   ;POINT TO BYTE 1 OF COUNTER O
      JB7   DOWNO       ;TEST "A" FOR POSITIVE OF NEGATIVE - SEE IF THE COUNT WENT UP
OR DOWN
      MOV   R2, #00            ;VALUE FOR THE FUNCTION CALL TO BE USED IN THE FUNCTION
      CALL  CHANGECNT   ;RETURNS IN "A" THE MOST SIG. BYTE (MSBYTE) OF THE COUNT
"XRL"'D
                        ;  WITH THE PREVIOUS MSBYTE.  THIS LETS US KNOW IF THE
                        ;  VALUE CROSSED 0 OR NOT.  IF THE MSBIT IS 0 THEN WE CROSSED
0.
      JB7   UPOEND             ;BIT 7 OF "A" IS 0 IF WE CROSSED 0
            ;THE COUNTER MUST HAVE CROSSED 0 - START THE GENERATION OF THE INTERRUPT
PROCESS
SETUPOINT:
      DIS   I
```

```
        MOV    R1,#INTREG
        MOV    A,@R1        ;LOAD THE INT REGISTER
        JB0    UPOEND            ;IF THE BIT IS SET THEN DO NOT ENABLE THE
                            ; INTURRUPT AGAIN.
        MOV    R0,#INT0
        MOV    @R0,#CUP0    ;COUNTER 0, CROSSOVER UP, LOAD INT
        EN     I
UPOEND:
        MOV    A, R4        ;RESTORE THE DIFFERENCE OF (PREV-NEW). THIS IS
                            ; HOW MUCH THE COUNTER WILL COUNT UP.
        CALL   SUMUP
        JMP    CONT1
DOWN0:
        MOV    R2, #0FFH    ;AT THIS POINT "A" HAS THE # OF COUNTS TO ADD TO THE COUNTER
                            ;AND "R0" HAS THE POINTER TO THE COUNTER
        CALL   CHANGECNT    ;RETURNS IN "A" IF THE COUNTER CROSSED 0
        JB7    DOWNOEND     ;BIT 7 OF "A" IS 0 IF THE COUNTER CROSSED 0
SETDOWNOINT:
        DIS    I
        MOV    R1,#INTREG
        MOV    A,@R1        ;LOAD THE INT REGISTER
        JB0    DOWNOEND
        MOV    R0,#INT0     ;REGISTER IS ZERO AT THIS POINT
        MOV    @R0,#CDN0    ;COUNTER 0, CROSSOVER DOWN, LOAD REGISTER
        EN     I            ;ENABLE INTERRUPTS
DOWNOEND:
        MOV    A, R4        ;RESTORE THE DIFFERENCE OF (PREV-NEW). THIS IS
                            ; HOW MUCH THE COUNTER WILL COUNT DOWN
        CALL   SUMDN
;---------------------------------------------------------------------------
; CODE FOR CHECKING COUNTER NUMBER 1
;---------------------------------------------------------------------------
CONT1:
        MOV    R0, #PREV_CNT1    ;PREV VALUE THAT WAS READ FROM THE COUNTERS
        MOV    A, @R0            ;SET UP FOR A TWO'S COMPLEMENT ADDITION (SUBTRACTION)
        CPL    A            ;DOING A TWO'S COMPLEMENT ADDITION
        INC    A            ;ADD 1 FOR TWO'S COMPLEMENT ADDITION
        ADD    A, R5        ;"A" NOW HAS THE TOTAL DISTANCE GONE SINCE THE LAST READ
        XCH    A, R5        ;PUT THE NEW BYTE READ IN "A"
        MOV    @R0, A            ;PLACE THE NEW BYTE READ IN THE "PREV_CNT1" LOCATION
        MOV    A, R5        ;RESTORE "A" WITH DIFFERENCE READ FROM THE COUNTERS
        MOV    R0, #CNT1    ;POINT TO BYTE 1 OF COUNTER 0
```

```
     JB7    DOWN1         ;TEST "A" FOR POSITIVE OF NEGATIVE - SEE IF THE COUNT WENT UP
OR DOWN
     MOV    R2, #00              ;PASS ARGUMENT TO CHANGCNT ROUTINE
     CALL   CHANGECNT     ;RETURNS IN "A" THE MOST SIG. BYTE (MSBYTE) OF THE COUNT
"XRL"'D
                          ;  WITH THE PREVIOUS MSBYTE.  THIS LETS US KNOW IF THE
                          ;  VALUE CROSSED 0 OR NOT.  IF THE MSBIT IS 0 THEN WE CROSSED
0.
     JB7    UP1END               ;BIT 7 OF "A" IS 0 IF WE CROSSED 0
            ;THE COUNTER MUST HAVE CROSSED 0 - START THE GENERATION OF THE INTERRUPT
PROCESS
SETUP1INT:
     DIS    I
     MOV    R1,#INTREG
     MOV    A,@R1         ;LOAD THE INT REGISTER
     JB2    UP1END               ;IF THE BIT IS SET THEN DO NOT ENABLE THE
                          ; INTURRUPT AGAIN.
     MOV    R0,#INT1
     MOV    @R0,#CUP1     ;COUNTER 1, CROSSOVER UP, LOAD INT
     EN     I
UP1END:
     MOV    A, R5         ;RESTORE THE DIFFERENCE OF (PREV-NEW). THIS IS
                          ; HOW MUCH THE COUNTER WILL COUNT UP.
     CALL   SUMUP
     JMP    CONT2
DOWN1:
     MOV    R2, #0FFH     ;NUMBER TO SUBTRACT FROM THE COUNTERS
                          ;AT THIS POINT "A" HAS THE # OF COUNTS TO ADD TO THE COUNTER
                          ;AND "R0" HAS THE POINTER TO THE COUNTER
     CALL   CHANGECNT     ;RETURNS IN "A" IF THE COUNTER CROSSED 0
     JB7    DOWN1END      ;BIT 7 OF "A" IS 0 IF THE COUNTER CROSSED 0
SETDOWN1INT:
     DIS    I
     MOV    R1,#INTREG
     MOV    A,@R1         ;LOAD THE INT REGISTER
     JB2    DOWN1END
     MOV    R0,#INT1      ;REGISTER IS ZERO AT THIS POINT
     MOV    @R0,#CDN1     ;COUNTER 0, CROSSOVER DOWN, LOAD REGISTER
     EN     I             ;ENABLE INTERRUPTS
DOWN1END:
     MOV    A, R5         ;RESTORE THE DIFFERENCE OF (PREV-NEW). THIS IS
                          ; HOW MUCH THE COUNTER WILL COUNT DOWN.
```

```
      CALL  SUMDN
;-----------------------------------------------------------------------
; CODE FOR CHECKING COUNTER NUMBER 2
;-----------------------------------------------------------------------
CONT2:
      MOV   R0, #PREV_CNT2     ;PREV VALUE THAT WAS READ FROM THE COUNTERS
      MOV   A, @R0             ;SET UP FOR A TWO'S COMPLEMENT ADDITION (SUBTRACTION)
      CPL   A             ;DOING A TWO'S COMPLEMENT ADDITION
      INC   A             ;ADD 1 FOR TWO'S COMPLEMENT ADDITION
      ADD   A, R6         ;A NOW HAS THE TOTAL DISTANCE GONE SINCE THE LAST READ
      XCH   A, R6         ;PUT THE NEW BYTE READ IN "A"
      MOV   @R0, A             ;PLACE THE NEW BYTE READ IN THE "PREV_CNT2" LOCATION
      XCH   A, R6         ;RESTORE "A" WITH DIFFERENCE READ FROM THE COUNTERS
      MOV   R0, #CNT2     ;POINT TO BYTE 1 OF COUNTER 0
      JB7   DOWN2         ;TEST "A" FOR POSITIVE OF NEGATIVE - SEE IF THE COUNT WENT UP
OR DOWN
      MOV   R2, #00            ;VALUE FOR THE FUNCTION CALL TO BE USED IN THE FUNCTION
      CALL  CHANGECNT     ;RETURNS IN "A" THE MOST SIG. BYTE (MSBYTE) OF THE COUNT
"XRL"'D
                          ;  WITH THE PREVIOUS MSBYTE.  THIS LETS US KNOW IF THE
                          ;  VALUE CROSSED 0 OR NOT.  IF THE MSBIT IS 0 THEN WE CROSSED
0.
      JB7   CONT3         ;BIT 7 OF "A" IS 0 IF WE CROSSED 0
            ;THE COUNTER MUST HAVE CROSSED 0 - START THE GENERATION OF THE INTERRUPT
PROCESS
SETUP2INT:
      DIS   I
      MOV   R1,#INTREG
      MOV   A,@R1         ;LOAD THE INT REGISTER
      JB4   CONT3         ;IF THE BIT IS SET THEN DO NOT ENABLE THE
                          ; INTURRUPT AGAIN.
      MOV   R0,#INT2
      MOV   @R0,#CUP2     ;COUNTER 0, CROSSOVER UP, LOAD INT
      EN    I
DOWN2:
      MOV   R2, #0FFH     ;AT THIS POINT "A" HAS THE # OF COUNTS TO ADD TO THE COUNTER
                          ;AND "R0" HAS THE POINTER TO THE COUNTER
      CALL  CHANGECNT     ;RETURNS IN "A" IF THE COUNTER CROSSED 0
      JB7   CONT3         ;BIT 7 OF "A" IS 0 IF THE COUNTER CROSSED 0
SETDOWN2INT:
      DIS   I
      MOV   R1,#INTREG
```

```
     MOV   A,@R1          ;LOAD THE INT REGISTER
     JB4   CONT3
     MOV   R0,#INT2       ;REGISTER IS ZERO AT THIS POINT
     MOV   @R0,#CDN2      ;COUNTER 0, CROSSOVER DOWN, LOAD REGISTER
     EN    I              ;ENABLE INTERRUPTS
;-----------------------------------------------------------------------------
; CODE FOR CHECKING COUNTER NUMBER 3
;-----------------------------------------------------------------------------
CONT3:
     MOV   R0, #PREV_CNT3     ;PREV VALUE THAT WAS READ FROM THE COUNTERS
     MOV   A, @R0             ;SET UP FOR A TWO'S COMPLEMENT ADDITION (SUBTRACTION)
     CPL   A              ;DOING A TWO'S COMPLEMENT ADDITION
     INC   A              ;ADD 1 FOR TWO'S COMPLEMENT ADDITION
     ADD   A, R7          ;A NOW HAS THE TOTAL DISTANCE GONE SINCE THE LAST READ
     XCH   A, R7          ;PUT THE NEW BYTE READ IN "A"
     MOV   @R0, A             ;PLACE THE NEW BYTE READ IN THE "PREV_CNT3" LOCATION
     XCH   A, R7          ;RESTORE "A" WITH DIFFERENCE READ FROM THE COUNTERS
     MOV   R0, #CNT3      ;POINT TO BYTE 1 OF COUNTER 0
     JB7   DOWN3          ;TEST "A" FOR POSITIVE OF NEGATIVE - SEE IF THE COUNT WENT UP
OR DOWN
     MOV   R2, #00            ;VALUE FOR THE FUNCTION CALL TO BE USED IN THE FUNCTION
     CALL  CHANGECNT      ;RETURNS IN "A" THE MOST SIG. BYTE (MSBYTE) OF THE COUNT
"XRL"'D
                          ; WITH THE PREVIOUS MSBYTE.  THIS LETS US KNOW IF THE
                          ; VALUE CROSSED 0 OR NOT.  IF THE MSBIT IS 0 THEN WE CROSSED
0.
     JB7   ENDMAIN            ;BIT 7 OF "A" IS 0 IF WE CROSSED 0
           ;THE COUNTER MUST HAVE CROSSED 0 - START THE GENERATION OF THE INTERRUPT
PROCESS
SETUP3INT:
     DIS   I
     MOV   R1,#INTREG
     MOV   A,@R1          ;LOAD THE INT REGISTER
     JB5   ENDMAIN            ;IF THE BIT IS SET THEN DO NOT ENABLE THE
                          ; INTURRUPT AGAIN.
     MOV   R0,#INT3
     MOV   @R0,#CUP3      ;COUNTER 5, CROSSOVER UP, LOAD INT
     EN    I
DOWN3:
     MOV   R2, #0FFH      ;AT THIS POINT "A" HAS THE # OF COUNTS TO ADD TO THE COUNTER
                          ;AND "R0" HAS THE POINTER TO THE COUNTER
     CALL  CHANGECNT      ;RETURNS IN "A" IF THE COUNTER CROSSED 0
```

```
     JB7    ENDMAIN     ;BIT 7 OF "A" IS 0 IF THE COUNTER CROSSED 0
SETDOWN3INT:
     DIS    I
     MOV    R1,#INTREG
     MOV    A,@R1       ;LOAD THE INT REGISTER
     JB5    ENDMAIN
     MOV    R0,#INT3    ;REGISTER IS ZERO AT THIS POINT
     MOV    @R0,#CDN3   ;COUNTER 0, CROSSOVER DOWN, LOAD REGISTER
     EN     I           ;ENABLE INTERRUPTS

ENDMAIN:
     JMP    MAIN
RESET:
     RETR               ;THIS ROUTINE IS EXCLUSIVELY USED TO RESET THE
                        ;PROCESSOR. IT WILL CLEAR ANY INTERRUPT REQUEST
PAGE
;*************************************************************************
;                                                        *
;    GENINT:                                                     *
;                                                        *
;This is a routine that will send out an interrupt to the 80186. This   *
;routine is called several times, whenever there is an interrupt  *
;pending                                                 *
;*************************************************************************
GENINT:
     CLR    A
     XCH    A,@R0       ;CLEAR OUT THE CURRENT INTERRUPT AT THE SAME TIME
     ANL    A,#0DFH           ;CONVERT A POSSIBLE 20 HEX TO A ZERO (SPECIAL CASE)
     MOV    R0,#INTREC
     MOV    @R0,A
     INC    R0
     MOV    @R0,#01H    ;SET THE INTERRUPT STATUS
     ANL    P2,#0EFH    ;PULL THE INTERUPT LINE TO THE 186 LOW (OBF LINE)
     RET

PAGE
;*************************************************************************
; Sum counter for both summing counters. Counting up              *
;*************************************************************************
;    ORG    200H
SUMUP:
       MOV      R2, #00        ;SIGN EXTENDED VALUE FOR THE CALL TO CHANGECNT
```

```
     MOV    R3, A        ;SAVE THE # WHICH WILL BE ADDED TO THE COUNTER
     MOV    R0, #CNT4    ;POINT TO THE SUM COUNTER 1
     CALL     CHANGECNT
     JB7      SUMEND
SETSUMINT:
     DIS    I            ;DISABLE INTERRUPTS
     MOV    R1,#INTREG   ;GET THE ADDRESS OF THE INTERRUPT REGISTER
     MOV    A,@R1        ;READ THE REG
     JB6    SUMEND              ;TEST TO SEE IF INTERRUPTS ARE ALLOWED
                         ;"JB6" IS THE BIT FOR THE SUM COUNTER
     MOV    R1,#INT4     ;ADDRESS OF THE INTERRUPT BUFFER
     MOV    @R1,#CUP4    ;SAVE THE INTURRUPT CODE FOR LATER

SUMEND:
     EN     I            ;ENABLE INTERRUPTS JUST IN CASE AN INTURRUPT IS PENDING

; CONTINUTE ON TO THE SUMUP2 COUNTER
SUMUP2:
       MOV      R2, #00         ;SIGN EXTENDED VALUE FOR THE CALL TO CHANGECNT
     MOV    A, R3        ;RESTORE THE # WHICH WILL BE ADDED TO THE COUNTER
     MOV    R0, #CNT5    ;POINT TO THE SUM COUNTER 2
     CALL     CHANGECNT
     JB7      SUMEND2
SETSUMINT2:
     DIS    I            ;DISABLE INTERRUPTS
     MOV    R1,#INTREG   ;GET THE ADDRESS OF THE INTERRUPT REGISTER
     MOV    A,@R1        ;READ THE REG
     JB7    SUMEND2             ;TEST TO SEE IF INTERRUPTS ARE ALLOWED.
                         ;"JB7" IS THE BIT FOR THE SUMCOUNTER 2
     MOV    R1,#INT5     ;ADDRESS OF THE INTERRUPT BUFFER
     MOV    @R1,#CUP5
SUMEND2:
     EN     I            ;ENABLE INTERRUPTS
     RET
PAGE
;**************************************************************************
; Sum counter for both summing counters. Counting down.                  *
;**************************************************************************
SUMDN:
       MOV      R2, #0FFH     ;SIGN EXTENDED VALUE FOR THE CALL TO CHANGECNT
     MOV    R3, A        ;SAVE THE # WHICH WILL BE ADDED TO THE COUNTER
     MOV    R0, #CNT4    ;POINT TO THE SUM COUNTER 1
```

```
     CALL    CHANGECNT
     JB7     DECEND
SETDNINT:
     DIS   I            ;DISABLE INTERRUPTS
     MOV   R1,#INTREG   ;GET THE INTERRUPT REGISTER
     MOV   A,@R1
     JB6   DECEND             ;TEST IF INT ALLOWED
     MOV   R1,#INT4     ;INTERRUPT BUFFER
     MOV   @R1,#CDN4
DECEND:
     EN    I            ;ENABLE INTERRUPTS - IN CASE THERE IS ONE PENDING
SUMDN2:
       MOV     R2, #0FFH     ;SIGN EXTENDED VALUE FOR THE CALL TO CHANGECNT
     MOV   A, R3        ;SAVE THE # WHICH WILL BE ADDED TO THE COUNTER
     MOV   R0, #CNT5    ;POINT TO THE SUM COUNTER 2
     CALL    CHANGECNT
     JB7     DECEND2
SETDNINT2:
     DIS   I            ;DISABLE INTERRUPTS
     MOV   R1,#INTREG   ;GET THE INTERRUPT REGISTER
     MOV   A,@R1
     JB7   DECEND2            ;TEST IF INT ALLOWED
     MOV   R1,#INT5     ;INTERRUPT BUFFER
     MOV   @R1,#CDN5
DECEND2:
     EN    I            ;ENABLE INTERRUPTS
     RET
PAGE
;****************************************************************************
;                                                            *
;     CHANGECNT:                                                          *
;                                                            *
;This is the routine that will increment or decrement the count by the    *
; number passed in to it in "A".  "A" has the number of counts the        *
; counters have counted since the last check.  This will be added to the  *
; total counters (3 bytes). Just before the last byte (byte 3) is added to*
; the number it is saved in R1. Then the addition takes place and R1 and  *
; "A" are XRL together to check the MSByte.  If bit 7 in "A" is set then  *
; there was a crossover.  I CPL (complement) "A" before it is sent back to*
; help the calling function have cleaner code since there is not a JNB    *
; instruction.                                               *
;                                                            *
```

```
;     Parameters to this function:                                 *
;           "A":        Has the number of counts to add to the counters   *
;            R0:  Has the address of the counter to be added to.     *
;            R2:  Has the sign extended value                       *
;                      "00" for addition.                           *
;                      "FFh" for subtraction.                       *
;                  By adding 00 or FF to "A" in the following       *
;                    equation it sign extendes the value making it *
;                    a positive or negative number.  This is how we*
;                    will tell if the counter has crossed over 0.  *
;                                                            *
;     Paramters returned from this function                         *
;           "A":  Has the complemented value of the XRL instruction *
;                 for checking bit 7 for crossover.                 *
;***************************************************************************
CHANGECNT:
      DIS   I           ;DISABLE INTERRUPTS DURING COUNTING
      ADD   A, @RO            ;ADD THE NEW VALUE (IN "A") TO THE FIRST BYTE @RO
      MOV   @RO, A            ;SAVE THE NEW VALUE TO THE FIRST BYTE
      INC   RO          ;POINT TO THE NEXT BYTE
      MOV   A, R2       ;USED FOR SIGN EXTENDED ADDITION OR SUBTRACTION
      ADDC  A, @RO            ;ADD THE CARRY BIT TO THE SECOND BYTE
      MOV   @RO, A            ;SAVE THE SECOND BYTE
      INC   RO          ;POINT TO THE THIRD BYTE
      MOV   A, @RO            ;GET THE THIRD BYTE
      MOV   R1, A       ;SAVE THE PREVIOUS VALUE OF THE THIRD BYTE IN R1
      ADDC  A, R2       ;ADD THE CARRY AND THE SIGNED EXTENDED VALUE
      MOV   @RO, A            ;SAVE THE NEW THIRD BYTE

      XRL   A, R1       ;EXCLUSIVE OR THE NEW THIRD BYTE WITH THE OLD THIRD BYTE
                        ; THIS WILL TELL IF WE CROSSED 0 IF BIT 7 IS SET IN "A".
      CPL   A           ;SINCE THERE IS NOT A "JNB" INSTRUCTION COMPLEMENT "A"
                        ; TO HELP THE CALLING FUNCTION.
      EN    I           ;ENABLE INTERRUPTS
      RET               ;RETURN

PAGE
;***************************************************************************
;                                                            *
;     CMND:                                                  *
;                                                            *
;The following code is responsible for processing all of the commands     *
```

```
;from the 80186. All commands sent to the counter must have A0 set.     *
;For a complete summary of the commands, see chapter twelve of the      *
;design document.                                            *
;************************************************************************
      ORG   300H
ERROR:
      RETR
CMND:
      %JNIBF      ERROR
      SEL   RB1         ;OPERATE ENTIRELY IN REGISTER BANK ONE.
      MOV   R7,A        ;SAVE THE ACCUMULATOR TO RESTORE ON RETR
      JF1   CMND0       ;TEST THE A0 LINE.
      JMP   SPECAL            ;JUMP TO SPECIAL FUNCTIONS ROUTINES
;************************************************************************
;CMND0:
; Test for a read interrupt command (FE).
;************************************************************************
CMND0:
      %INDBB                  ;GET COMMAND (ARG 0)
      MOV   R6,A        ;SAVE IT IN R6 FOR FUTURE REFERENCE
      XRL   A,#0FEH           ;TEST FOR READ INTERRUPT COMMAND
      JNZ   C0
      MOV   R0,#INTREC
      MOV   A,@R0
      ORL   P2,#010H    ;DISABLE THE EXTERNAL INTERRUPT TO THE 186
      OUT   DBB,A       ;SEND WHICH COUNTER CAUSED THE INTERRUPT
      INC   R0
      CLR   A
      MOV   @R0,A       ;CLEAR "INTREC+1" TO ENABLE ANOTHER INTRRUPT TO OCCURE
      MOV   A,R7
      RETR
;************************************************************************
;C0:
; Tests for a master reset (FF) command.
;************************************************************************
C0:
      MOV   A,R6        ;RESTORE ARG 0
      XRL   A,#0FFH           ;TEST FOR RESET COMMAND
      JNZ   C1
      JMP   INIT
;************************************************************************
;C1:
```

```
; Test bit 7.  It is set for a Load & Set interrupt command and a
;    Read (CLEAR) counter command. If it is set jump to LOAD_AND_SET_INT
;    routine to process the Load & Set or Read commands.
; If not bit 7 check bit 6 for interrupts with clear or without clear.
;  If bit 6 is set don't clear the interrupt. Just enable or disable the
;  approporate interrupt.  If bit 6 is not set clear the counter and enable
;  or disable the approporate counter.
;*************************************************************************
C1:
      MOV   A,R6          ;RESTORE ARG 0
      JB7   LOAD_AND_SET_INT  ;TEST BIT 7 FOR LOAD OR READ COMMANDS
      JB6   INT_W_O_CLR ;TEST BIT 6 INTS W/O CLEAR
      CLR   FO            ;CLEAR FO FOR INTS W CLEAR
      JMP   INT_W_CLR
;*************************************************************************
; INT_W_O_CLR:/INT_W_CLR:
;  The only difference between these to sections of code is bit 6 says to
;   clear the counter value of not.  The message is discribed below.
;   Counter 5 is not supported in this configuration.  Counter 5 will not
;   have the ability to enable/disable interrupts through this message.
;
;   INT_W_CLR command
;     0 0 X X X X X X (bin)
;     | | | | | | | |
;      -  | | | | | | Represents counter 0
;      |  | | | | | Represents counter 1
;      |  | | | | Represents counter 2
;      |  | | | Represents counter 3
;      |  | | Represents counter 4
;      |  | Represents Enable(1)/Disable(0)
;      | Interrupts with clear command
;
;   INT_W_O_CLR command
;     0 1 X X X X X X (bin)
;     | | | | | | | |
;      -  | | | | | | Represents counter 0
;      |  | | | | | Represents counter 1
;      |  | | | | Represents counter 2
;      |  | | | Represents counter 3
;      |  | | Represents counter 4
;      |  | Represents Enable(1)/Disable(0)
;      | Interrupts with clear command
```

```
;***********************************************************************
INT_W_O_CLR:
      CLR   F0
      CPL   F0          ;SET F0 FOR INTS W/O CLEAR
INT_W_CLR:
      CPL   A           ;CPL A TO JUMP ON UNSET BITS
      MOV   R6,A        ;SAVE IT IN R6 TOO
      MOV   R0,#INTREG  ;GET THE ADDRESS OF THE INT REGISTER
      MOV   R1,#CNT0    ;GET THE ADDRESS OF THE LOW ORDER BYTE OF CNT 0
      JB0   C4          ;IF BIT 0 WAS A ZERO BEFORE CPL THEN GO ON TO
                        ;NEXT COUNTER
      JB5   DISAB0            ;OTHERWISE, TEST BIT 5 FOR ENABL/DISABL OF COUNTER
ENAB0:
      MOV   A,#0FEH           ;MASK TO ENABLE INTERRUPT
      ANL   A,@R0       ;HERE A CLEARED BIT = INTERRUPT ON
      MOV   @R0,A       ;WRITE OUT THE NEW INTERRUPT REGISTER
      JF0   C4          ;DON'T CLEAR THE COUNT IF F0 SET
CLR0:
      CLR   A
      MOV   @R1,A       ;CLEAR THE LOW ORDER BYTE OF COUNT 0
      INC   R1          ;LOOK AT THE HIGH ORDER BYTE
      MOV   @R1,A       ;CLEAR THE NEXT BYTE OF COUNT ZERO
      INC   R1          ;POINT TO NEXT BYTE
      MOV   @R1, A            ;CLEAR HIGHEST BYTE (BYTE 3)
      JMP   C4          ;GO ON TO TEST THE NEXT COUNT
DISAB0:
      MOV   A,#01H            ;MASK TO DISABLE INTERRUPTS
      ORL   A,@R0       ;DISABLE INT 0
      MOV   @R0,A       ;WRITE OUT THE NEW INTERRUPT REGISTER
      JF0   C4          ;DON'T CLEAR THE COUNT IF F0 SET
      JMP   CLR0        ;CLEAR THE COUNT
C4:
      MOV   A,R6        ;RESTORE COMPLIMENTED ARG0
      JB1   C5          ;TEST BIT 3 FOR ANY PROCESSING OF CNT1
      JB5   DISAB1            ;DISABLE INT 1 IF BIT 5 SET
ENAB1:
      MOV   A,#0FBH           ;OTHERWISE, ENABLE/ LOAD THE MASK TO ENABLE
      ANL   A,@R0       ;ENABLE BY CLEARING
      MOV   @R0,A       ;WRITE OUT THE NEW VALUE
      JF0   C5          ;DON'T CLEAR THE COUNT IF F0 SET
CLR1:
      MOV   R1,#CNT1    ;GET THE ADDRESS OF COUNT 1
```

```
        CLR   A             ;CLEAR A TO CLEAR CNT 1
        MOV   @R1,A         ;CLEAR THE LOW ORDER BYTE OF CNT 1
        INC   R1            ;LOOK AT THE HIGH ORDER BYTE OF CNT 1
        MOV   @R1,A         ;CLEAR THE SECOND BYTE OF COUNT 1
        INC   R1            ;POINT TO LAST BYTE
        MOV   @R1, A              ;CLEAR THE HIGH BYTE (BYTE 3) OF COUNT 1
        JMP   C5            ;GO ON TO LOOK AT CNT 2
DISAB1:
        MOV   A,#04H              ;LOAD THE MASK TO DISABL INT 1
        ORL   A,@R0         ;DISABLE INT 1
        MOV   @R0,A
        JF0   C5            ;DON'T CLEAR CNT 1 IF F0 SET
        JMP   CLR1
C5:
        MOV   A,R6          ;RESTORE COMPLIMENTED ARG 0
        JB2   C6            ;TEST BIT 2 FOR ANY PROCESSING ON CNT 2
        JB5   DISAB2              ;TEST BIT 5 FOR DISABLE
ENAB2:
        MOV   A,#0EFH             ;LOAD MASK TO ENABLE
        ANL   A,@R0         ;ENABLE INT 2
        MOV   @R0,A
        JF0   C6            ;DON'T CLEAR CNT 2 IF F0 SET
CLR2:
        MOV   R1,#CNT2      ;GET THE ADDRESS OF CNT 2
        CLR   A
        MOV   @R1,A         ;CLEAR THE LOW ORDER BYTE
        INC   R1            ;POINT TO THE SECOND BYTE
        MOV   @R1,A         ;CLEAR THE SECOND BYTE
        INC   R1            ;POINT TO THE NEXT BYTE
        MOV   @R1, A              ;CLEAR THE HIGH BYTE (BYTE 3) OF COUNTER 2
        JMP   C6            ;CHECK CNT 3 NOW
DISAB2:
        MOV   A,#10H              ;LOAD MASK TO DISABLE INT 2
        ORL   A,@R0         ;DISABLE INT 2
        MOV   @R0,A
        JF0   C6            ;DON'T CLEAR COUNT IF F0 SET
        JMP   CLR2
C6:
        MOV   A,R6          ;RESTORE COMPLIMENTED ARG0
        JB3   C7            ;TEST BIT 3 FOR ANY PROCESSING OF CNT3
        JB5   DISAB3              ;DISABLE INT 3 IF BIT 5 SET
ENAB3:
```

```
        MOV     A,#0DFH          ;OTHERWISE, ENABLE/ LOAD THE MASK TO ENABLE
        ANL     A,@R0          ;ENABLE BY CLEARING
        MOV     @R0,A          ;WRITE OUT THE NEW VALUE
        JF0     C7             ;DON'T CLEAR THE COUNT IF F0 SET
CLR3:
        MOV     R1,#CNT3       ;GET THE ADDRESS OF COUNT 3
        CLR     A              ;CLEAR A TO CLEAR CNT 3
        MOV     @R1,A          ;CLEAR THE LOW ORDER BYTE OF CNT 3
        INC     R1             ;LOOK AT THE HIGH ORDER BYTE OF CNT 3
        MOV     @R1,A          ;CLEAR THE SECOND BYTE OF COUNT 3
        INC     R1             ;POINT TO LAST BYTE
        MOV     @R1, A           ;CLEAR THE HIGH BYTE (BYTE 3) OF COUNT 3
        JMP     C7             ;RETURN AND RESTORE
DISAB3:
        MOV     A,#20H           ;LOAD THE MASK TO DISABL INT 3
        ORL     A,@R0          ;DISABLE INT 3
        MOV     @R0,A
        JF0     C7             ;DON'T CLEAR CNT 3 IF F0 SET
        JMP     CLR3

C7:
        MOV     A,R6           ;RESTORE COMPLIMENTED ARG0
        JB4     C8             ;TEST BIT 4 FOR ANY PROCESSING OF CNT4
        JB5     DISAB4           ;DISABLE INT 4 IF BIT 5 SET
ENAB4:
        MOV     A,#0BFH          ;OTHERWISE, ENABLE/ LOAD THE MASK TO ENABLE
        ANL     A,@R0          ;ENABLE BY CLEARING
        MOV     @R0,A          ;WRITE OUT THE NEW VALUE
        JF0     C8             ;DON'T CLEAR THE COUNT IF F0 SET
CLR4:
        MOV     R1,#CNT4       ;GET THE ADDRESS OF COUNT 4
        CLR     A              ;CLEAR A TO CLEAR CNT 4
        MOV     @R1,A          ;CLEAR THE LOW ORDER BYTE OF CNT 4
        INC     R1             ;LOOK AT THE HIGH ORDER BYTE OF CNT 4
        MOV     @R1,A          ;CLEAR THE SECOND BYTE OF COUNT 4
        INC     R1             ;POINT TO LAST BYTE
        MOV     @R1, A           ;CLEAR THE HIGH BYTE (BYTE 3) OF COUNT 4
        JMP     C8             ;RETURN AND RESTORE
DISAB4:
        MOV     A,#40H           ;LOAD THE MASK TO DISABL INT 4
        ORL     A,@R0          ;DISABLE INT 4
        MOV     @R0,A
```

```
     JF0    C8           ;DON'T CLEAR CNT 4 IF F0 SET
     JMP    CLR4
C8:
     MOV    A,R7         ;RESTORE A
     RETR
PAGE
;************************************************************************
;                                                    *
;     LOAD_AND_SET_INT:                              *
;                                                    *
;This routine begins by testing for a load & set command or a read      *
;command. If it is a read command, control is passed on to READ_COUNTERS.*
;Otherwise, the program continues in LOAD_AND_SET_INT. The load and set *
;command requires that bit three be tested to determine if interrupt are*
;to be enabled or disabled. Bits 0,1,2 tell the counter id.             *
;               000 = CNT0                                 *
;           001 = CNT1                               *
;           010 = CNT2                               *
;           011 = CNT3                               *
;           100 = CNT4                               *
;           101 = CNT5                               *
;Followed by a 3 byte argument of data to be placed in the counter.     *
;                                                                       *
;   LOAN_AND_SET_INT command                                            *
;     1 0 X X X X X X (bin)                                             *
;     ¦ ¦ ¦ ¦ ¦ ¦ ¦ ¦                                                   *
;      -  ¦ ¦ ¦ -----                                                   *
;      ¦  ¦ ¦ ¦    ¦ Represents cntr 0-5 shown in table above           *
;      ¦  ¦ ¦ ¦ No meaning at this time                                 *
;      ¦  ¦ ¦ Means to add the count to the counter no just place it in the counter
;      ¦  ¦ Represents Enable(1)/Disable(0)                             *
;      ¦ Load and set int command                                       *
;************************************************************************
LOAD_AND_SET_INT: ;PLACED BEFORE THE 400H TO PREVENT ADDRESSING PROBLEMS
     JB6    $+4          ;TEST BIT 6 FOR A READ COMMAND
     JMP    $+4
     JMP    READ_COUNTERS      ;READ_COUNTERS WILL PERFORM THE READS
     MOV    R0,#ARG            ;ADDRESS OF ARGUMENT BUFFER
READ3:
     %JNIBF      $-0           ;WAITE UNTIL THERE IS DATA TO READ
     %INDBB                    ;READ ARG 1
     MOV    @R0,A        ;WRITE IT TO THE ARGUMENT BUFFER
```

```
      INC    R0            ;POINT TO THE NEXT LOCATION
      %JNIBF       $-0           ;WAIT FOR MORE DATA TO READ
      %INDBB                     ;GET ARG 2 AND STORE IN ARGUMENT REGISTER
      MOV    @R0,A
      INC    R0            ;POINT TO THE NEXT LOCATION
      %JNIBF       $-0           ;WAIT FOR MORE DATA TO READ
      %INDBB                     ;GET ARG 3 AND STORE IN ARGUMENT REGISTER
      MOV    @R0,A

;PROCESS THE COMMAND NOW
      MOV    R0,#ARG             ;GET THE ADDRESS OF THE ARGUMENT REGISTER
      MOV    A,R6          ;RESTORE ARG 0
      JB5    CSET          ;TEST BIT 7 FOR ENABLE/DISABLE INTERRUPTS
CCLR:
      CLR    F0            ;CLEAR F0 TO DISABLE INTS
      JMP    CAA1
CSET:
      CLR    F0            ;SET F0 TO ENABLE INTERRUPTS
      CPL    F0
CAA1:
      JB4    NEWCNT_TMP  ;NO RETURN FROM NEWCNT - ADD THE NEW COUNT TO THE CURRENT
VALUES
      JMP.   STORE_CNT
NEWCNT_TMP:
      JMP    NEWCNT              ;JUMP TO CODE THAT WILL ADD CURRENT COUNT
      ORG    400H
STORE_CNT:
      ANL    A,#07H              ;SAVE THE LAST TWO BITS TO GET THE COUNTER ID
      JNZ    DO1           ;TEST FORM COUNT 1 IF NON ZERO

DO0:
      MOV    R1,#CNT0      ;GET ADDRESS OF COUNTER 0
      MOV    A,@R0         ;GET ARGUMENT 1
      MOV    @R1,A         ;PUT IT IN THE COUNT ( LOW ORDER BYTE)
      INC    R0            ;INCREMENT THE POINTERS
      INC    R1
      MOV    A,@R0         ;GET THE NEXT ARGUMENT AND WRITE IT OUT
      MOV    @R1,A
      INC    R0            ;INCREMENT THE POINTERS
      INC    R1
      MOV    A,@R0         ;GET THE NEXT ARGUMENT AND WRITE IT OUT
      MOV    @R1,A
```

```
        MOV   R1,#INTREG ;GET THE ADDRESS OF THE INT REGISTER
        JFO   ENBLO      ;ENABLE INTERRUPTS IF FO SET
DSBLO:
        MOV   A,#01H           ;MASK TO DISABLE INTERRUPTS
        ORL   A,@R1      ;DISABLE INT 0
        MOV   @R1,A
        MOV   A,R7       ;RESTORE A AND RETR
        RETR
ENBLO:
        MOV   A,#0FEH          ;LOAD AMASK TO ENABLE
        ANL   A,@R1      ;ENABLE INT 0
        MOV   @R1,A
        MOV   A,R7       ;RESTORE A AND RETR
        RETR
DO1:
        DEC   A          ;DEC THE COUNT TO TEST FOR CNT 1
        JNZ   DO2        ;TEST FOR CNT 2 IF NON ZERO
DOCNT1:
        MOV   R1,#CNT1   ;GET ADDRESS OF CNT 1
        MOV   A,@RO      ;GET ARG 1 AND WRITE IT OUT
        MOV   @R1,A
        INC   RO         ;INCREMENT THE POINTERS
        INC   R1
        MOV   A,@RO      ;GET ARG 2 AND WRITE IT OUT
        MOV   @R1,A
        INC   RO         ;INCREMENT THE POINTERS
        INC   R1
        MOV   A,@RO      ;GET ARG 3 AND WRITE IT OUT
        MOV   @R1,A
        MOV   R1,#INTREG ;GET ADDRESS OF INT REGISTER
        JFO   ENBL1      ;ENABL IF FO SET
        JMP   DSBL1

ENBL1:
        MOV   A,#0FBH          ;MASK TO ENABLE
        ANL   A,@R1      ;ENABLE INT 1
        MOV   @R1,A
        MOV   A,R7       ;RESTORE A AND RETR
        RETR
DSBL1:
        MOV   A,#04H           ;MASK TO DISABLE
        ORL   A,@R1      ;DISABLE INT 1
```

```
        MOV   @R1,A
        MOV   A,R7          ;RESTORE A AND RETR
        RETR

DO2:
        DEC   A             ;DEC CNT TO TEST FOR CNT 2
        JNZ   DO3           ;DO CNTR THREE IF NON ZERO
        MOV   R1,#CNT2      ;ADDRESS OF CNT 2
        MOV   A,@R0         ;GET ARG 1 AND WRITE IT OUT
        MOV   @R1,A
        INC   R0
        INC   R1            ;INCREMENT THE POINTERS
        MOV   A,@R0
        MOV   @R1,A         ;WRITE OUT ARG 2
        INC   R0            ;INCREMENT THE POINTERS
        INC   R1
        MOV   A,@R0         ;GET ARG 3 AND WRITE IT OUT
        MOV   @R1,A
        MOV   R1,#INTREG    ;GET INT REG 2
        JF0   ENBL2         ;ENABLE IF F0 SET
DSBL2:
        MOV   A,#10H              ;MASK TO DISABLE
        ORL   A,@R1         ;DISABLE INT 2
        MOV   @R1,A
        MOV   A,R7
        RETR
ENBL2:
        MOV   A,#0EFH             ;MASK TO ENABLE
        ANL   A,@R1         ;ENABLE INT 2
        MOV   @R1,A
        MOV   A,R7          ;RESTORE A AND RETR
        RETR
DO3:
        DEC   A             ;DEC CNT TO TEST FOR CNT 3
        JNZ   DO4           ;DO CNTR THREE IF NON ZERO
        MOV   R1,#CNT3      ;LOAD COUNTER 3
        MOV   A,@R0         ;LOAD ARG AND WRITE THEM OUT
        MOV   @R1,A
        INC   R0            ;INC ARG BUFFER POINTER
        INC   R1            ;INC COUNTER3 BUFFER POINTER
        MOV   A,@R0         ;RECALL ARGUMENT
        MOV   @R1,A         ;SAVE THE ARG TO CNT3 BUFFER
```

```
        INC     R0              ;
        INC     R1
        MOV     A,@R0
        MOV     @R1,A
        MOV     R1,#INTREG      ;GET THE ADDRESS OF INT REG
        JF0     ENBL3           ;ENABLE ALL THREE IF F0 SET
DSBL3:
        MOV     A,#20H                  ;MASK TO DISABLE CNT3 INT
        ORL     A,@R1           ;DISABLE INT
        MOV     @R1,A
        MOV     A,R7            ;RESTORE A AND RETR
        RETR
ENBL3:
        MOV     A,#0DFH                 ;MASK TO ENABLE CNT3 INT
        ANL     A,@R1           ;ENABLE INT
        MOV     @R1,A
        MOV     A,R7            ;RESTORE A AND RETR
        RETR
DO4:
        DEC     A               ;DEC CNT TO TEST FOR CNT 4
        JNZ     DO5             ;DO CNTR THREE IF NON ZERO
        MOV     R1,#CNT4        ;LOAD COUNTER 4
        MOV     A,@R0           ;LOAD ARG AND WRITE THEM OUT
        MOV     @R1,A
        INC     R0              ;INC ARG BUFFER POINTER
        INC     R1              ;INC COUNTER4 BUFFER POINTER
        MOV     A,@R0           ;RECALL ARGUMENT
        MOV     @R1,A           ;SAVE THE ARG TO CNT4 BUFFER
        INC     R0              ;
        INC     R1
        MOV     A,@R0
        MOV     @R1,A
        MOV     R1,#INTREG      ;GET THE ADDRESS OF INT REG
        JF0     ENBL4           ;ENABLE ALL THREE IF F0 SET
DSBL4:
        MOV     A,#40H                  ;MASK TO DISABLE CNT4 INT
        ORL     A,@R1           ;DISABLE INT
        MOV     @R1,A
        MOV     A,R7            ;RESTORE A AND RETR
        RETR
ENBL4:
        MOV     A,#0BFH                 ;MASK TO ENABLE CNT4 INT
```

```
      ANL   A,@R1        ;ENABLE INT
      MOV   @R1,A
      MOV   A,R7         ;RESTORE A AND RETR
      RETR
DO5:
      MOV   R1,#CNT5     ;LOAD COUNTER 5
      MOV   A,@R0        ;LOAD ARG AND WRITE THEM OUT
      MOV   @R1,A
      INC   R0           ;INC ARG BUFFER POINTER
      INC   R1           ;INC COUNTER5 BUFFER POINTER
      MOV   A,@R0        ;RECALL ARGUMENT
      MOV   @R1,A        ;SAVE THE ARG TO CNT5 BUFFER
      INC   R0           ;
      INC   R1
      MOV   A,@R0
      MOV   @R1,A
      MOV   R1,#INTREG   ;GET THE ADDRESS OF INT REG
      JF0   ENBL5        ;ENABLE ALL THREE IF F0 SET
DSBL5:
      MOV   A,#80H             ;MASK TO DISABLE CNT5 INT
      ORL   A,@R1        ;DISABLE INT
      MOV   @R1,A
      MOV   A,R7         ;RESTORE A AND RETR
      RETR
ENBL5:
      MOV   A,#07FH            ;MASK TO ENABLE CNT5 INT
      ANL   A,@R1        ;ENABLE INT
      MOV   @R1,A
      MOV   A,R7         ;RESTORE A AND RETR
      RETR

PAGE
;***************************************************************************
;                                                              *
;     READ_COUNTERS:                                                   *
;                                                              *
;This routine will process the READ [CLEAR] command. First any unwanted *
;bits are striped off with the 07h.  Then a pointer to the counter is   *
;is calculated by taking the number in "A" shifting left twice then     *
;the base value of the first counter to it.  Since each counter resides *
;on a 4 byte boundery (as defined in the start of the program) I can    *
;multipuly the value by 4 and add the base offset to it.                *
```

```
;  EX:                                                                     *
;    If the number in "A" is 3 for counter 3. and CNTO address is 21h.   *
;   Then:                                                           *
;      3*2*2 = 12d;                                                        *
;      12d + 21h = 2Dh;                                                    *
;       2Dh would be the starting memory loaction for counter 3.           *
;                                                                   *
;Bit 3 is then tested. If it is set, the counter is to be cleared.        *
;                                                                   *
;   READ_COUNTERS command                                                  *
;     1 1 X X X X X X (bin)                                                *
;     | | | | | | | |                                                      *
;      -   -  | -----                                                      *
;      |   |  |   | Represents counters 0-5                                *
;      |   |  | 0=read only 1=read then clear counter                      *
;      |   | no meaning at this time                               *
;      | Load and set int command                                          *
;*********************************************************************
READ_COUNTERS:
     ANL   A,#07H          ;MASK OUT ALL BUT 0 & 1 & 2 FOR A COUNTER

     RL    A          ;MULTIPULY BY 2
     RL    A          ;MULTIPULY BY 2
     ADD   A, #CNTO   ;ADD THE OFFSET OF COUNTER 0 (THE START OF THE MEMORY)
     MOV   R0, A      ;POINT TO THE COUNTER
     MOV   A,@R0      ;GET THE LOW ORDER BYTE OF THE COUNT
     JOBF  $-0        ;WAIT TILL CLEAR TO SEND OUT
     OUT   DBB,A      ;SEND IT OUT
     INC   R0         ;INCREMENT THE POINTER
     MOV   A,@R0      ;GET THE SECOND BYTE
     JOBF  $-0        ;WAIT FOR THE 80186 TO READ THE LAST VALUE
     OUT   DBB,A      ;WRITE OUT THE NEXT BYTE.
     INC   R0         ;INCREMENT THE POINTER
     MOV   A,@R0      ;GET THE HIGH ORDER BYTE
     JOBF  $-0        ;WAIT FOR THE 80186 TO READ THE LAST VALUE
     OUT   DBB,A      ;WRITE OUT THE NEXT BYTE.
;DEBUG CODE
;    JOBF  $-0        ;WAIT TILL CLEAR TO SEND OUT
;    MOV   A, #0FFH   ;CLEAR THE BUS HIGH
;    OUT   DBB, A          ; TO AVOID ANY ADDRESSING CONFLICT
;END DEBUG CODE
     MOV   A, R6      ;RESTORE THE COMMAND
```

```
        CPL   A            ;FOR TESTING THE NOT BIT
        JB3   DONE         ;IF BIT3 IS 0 IT MEANS DON'T CLEAR THE COUNTER
        CLR   A            ;CLEAR THE HIGH ORDER BYTE
        MOV   @RO,A
        DEC   RO           ;DEC THE POINTER
        MOV   @RO,A        ;CLEAR THE SECOND BYTE
        DEC   RO           ;DEC THE POINTER
        MOV   @RO,A        ;CLEAR THE LOW ORDER BYTE
DONE:
        MOV   A,R7         ;RESTORE A
        RETR

PAGE
;****************************************************************************
;NEWCNT:
;  This section of code checks the command byte in "A" and determins which
;    counter to work on. The least sig. 3 bits are discribed as follows
;                 000 = CNTO,
;                 001 = CNT1,
;                 010 = CNT2,
;                 011 = CNT3,
;                 100 = CNT4,
;                 101 = CNT5.
;  This routine takes the values from the ARG buffer and places them in the
;   correct counter according to the bits set above.  "F0" is set or not set
;   if the command message said to enable the interrupt or disable the int.
;   "F0" is just a flag used for testing.
;  The command byte is checked to see which counter is to be effected and then
;   the values are pulled from the ARG buffer and added to the values in the
;   counters.
;****************************************************************************
        ORG   500H
NEWCNT:
        ANL   A,#07H             ;SAVE THE LAST TWO BITS TO GET THE COUNTER ID
        JZ    NDOO
        JMP   ND01         ;TEST FOR COUNT 1 IF NON ZERO
NDOO:
        MOV   R1,#CNTO     ;GET ADDRESS OF COUNTER 0
        CALL  ADDCNT             ;SPECIAL TYPE OF ADD
        MOV   R1,#INTREG   ;GET THE ADDRESS OF THE INT REGISTER
        JFO   NENBLO             ;ENABLE INTERRUPTS IF FO SET
NDSBLO:
```

```
        MOV   A,#01H         ;MASK TO DISABLE INTERRUPTS
        ORL   A,@R1     ;DISABLE INT 0
        MOV   @R1,A
        MOV   A,R7      ;RESTORE A AND RETR
        RETR
NENBL0:
        MOV   A,#0FEH        ;LOAD AMASK TO ENABLE
        ANL   A,@R1     ;ENABLE INT 0
        MOV   @R1,A
        MOV   A,R7      ;RESTORE A AND RETR
        RETR
ND01:
        DEC   A         ;DEC THE COUNT TO TEST FOR CNT 1
        JNZ   ND02      ;TEST FOR CNT 2 IF NON ZERO
        MOV   R1,#CNT1  ;GET ADDRESS OF CNT 1
        CALL  ADDCNT         ;SPECIAL TYPE OF ADD
        MOV   R1,#INTREG ;GET ADDRESS OF INT REGISTER
        JF0   NENBL1         ;ENABL IF F0 SET
NDSBL1:
        MOV   A,#04H         ;MASK TO DISABLE
        ORL   A,@R1     ;DISABLE INT 1
        MOV   @R1,A
        MOV   A,R7      ;RESTORE A AND RETR
        RETR
NENBL1:
        MOV   A,#0FBH        ;MASK TO ENABLE
        ANL   A,@R1     ;ENABLE INT 1
        MOV   @R1,A
        MOV   A,R7      ;RESTORE A AND RETR
        RETR
ND02:
        DEC   A         ;DEC THE COUNT TO TEST FOR CNT 2
        JNZ   ND03      ;TEST FOR CNT 3 IF NON ZERO
        MOV   R1,#CNT2  ;ADDRESS OF CNT 2
        CALL  ADDCNT         ;SPECIAL TYPE OF ADD
        MOV   R1,#INTREG ;GET INT REG 2
        JF0   NENBL2         ;ENABLE IF F0 SET
NDSBL2:
        MOV   A,#30H         ;MASK TO DISABLE
        ORL   A,@R1     ;DISABLE INT 2
        MOV   @R1,A
        MOV   A,R7
```

```
        RETR
NENBL2:
        MOV     A,#0CFH         ;MASK TO ENABLE
        ANL     A,@R1           ;ENABLE INT 2
        MOV     @R1,A
        MOV     A,R7            ;RESTORE A AND RETR
        RETR
NDO3:
        DEC     A               ;DEC THE COUNT TO TEST FOR CNT 3
        JNZ     NDO4            ;TEST FOR CNT 3 IF NON ZERO
        MOV     R1,#CNT3        ;ADDRESS OF CNT 3
        CALL    ADDCNT          ;SPECIAL TYPE OF ADD
        MOV     R1,#INTREG      ;GET INT REG 2
        JFO     NENBL3          ;ENABLE IF FO SET
NDSBL3:
        MOV     A,#20H          ;MASK TO DISABLE
        ORL     A,@R1           ;DISABLE INT 2
        MOV     @R1,A
        MOV     A,R7
        RETR
NENBL3:
        MOV     A,#0DFH         ;MASK TO ENABLE
        ANL     A,@R1           ;ENABLE INT 2
        MOV     @R1,A
        MOV     A,R7            ;RESTORE A AND RETR
        RETR
NDO4:
        DEC     A               ;DEC THE COUNT TO TEST FOR CNT 4
        JNZ     NDO5            ;TEST FOR CNT 4 IF NON ZERO
        MOV     R1,#CNT4        ;ADDRESS OF CNT 4
        CALL    ADDCNT          ;SPECIAL TYPE OF ADD
        MOV     R1,#INTREG      ;GET INT REG 4
        JFO     NENBL4          ;ENABLE IF FO SET
NDSBL4:
        MOV     A,#40H          ;MASK TO DISABLE
        ORL     A,@R1           ;DISABLE INT 4
        MOV     @R1,A
        MOV     A,R7
        RETR
NENBL4:
        MOV     A,#0BFH         ;MASK TO ENABLE
        ANL     A,@R1           ;ENABLE INT 4
```

```
        MOV   @R1,A
        MOV   A,R7          ;RESTORE A AND RETR
        RETR
NDO5:
        MOV   R1,#CNT5      ;ADDRESS OF CNT 5
        CALL  ADDCNT              ;SPECIAL TYPE OF ADD
        MOV   R1,#INTREG    ;GET INT REG 5
        JFO   NENBL5                ;ENABLE IF FO SET
NDSBL5:
        MOV   A,#80H              ;MASK TO DISABLE
        ORL   A,@R1         ;DISABLE INT 5
        MOV   @R1,A
        MOV   A,R7
        RETR
NENBL5:
        MOV   A,#07FH             ;MASK TO ENABLE
        ANL   A,@R1         ;ENABLE INT 5
        MOV   @R1,A
        MOV   A,R7          ;RESTORE A AND RETR
        RETR
PAGE
;*******************************************************************************
;ADDCNT:
;   This routine takes the ARG buffer pointed to by R0 and adds the count
;    in the counter pointed to by R1.  If rollover occured from the first
;    byte to the second byte the ADDC will take care if it.  It adds the
;    3 bytes of the ARG buffer to the 3 bytes of the counter.
;*******************************************************************************
ADDCNT:
        MOV   A,@R0         ;GET THE NEW COUNT FROM THE "ARG" BUFFER
        ADD   A,@R1         ;ADD NEW AND OLD COUNTS
        MOV   @R1,A         ;WRITE OUT THE NEW LOW BYTE
        INC   R0
        INC   R1
        MOV   A,@R0         ;GET THE NEXT BYTE
        ADDC  A,@R1         ;ADD THE TWO BYTES WITH CARRY IF IT IS SET
        MOV   @R1,A         ;WRITE OUT THE NEW VALUE
        INC   R0
        INC   R1
        MOV   A,@R0         ;GET THE NEXT BYTE
        ADDC  A,@R1         ;ADD THE TWO BYTES WITH CARRY IF IT IS SET
        MOV   @R1,A         ;WRITE OUT THE NEW VALUE
```

```
      RET                 ;RETURN
PAGE
;*****************************************************************************
;SPECAL:
; This is the part of the code which takes care of the commands send to
;  the 8742 when the A0 line is not high.  The 80186 sends a message (command)
;  to the 8742 and sometimes sets the A0 line.  The special messages below
;  are the commands sent when the A0 line is it not used.  These mainly
;  deal with the SUM1 (CNT4) and SUM2 (CNT5) counters.
;*****************************************************************************
SPECAL:
;     %INDBB                    ;READ THE COMMAND
      MOV   A, R7
      RETR
      END
```

```
;*************************************************************************
;- March 4, 1985
;  Previous to this date, this program was modified to allow the hand
;  controller to turn on the transmitter for debug purposes. Any SDLC
;  modules with a date prior to this date is obselete.    D.I.
;
;- March 5, 1985
;  Problem reported regarding turning on/off the transmitter from the
;  Hand Controller. Located and fixed problem           D.I.
;*************************************************************************
$eject
;*************************************************************************
;                              BUFFERS
;*************************************************************************
STATUS      EQU   20H   ;ONE BYTE MODE/STATUS
MODE  EQU   21H   ;MAINTAIN COMMAND PROCESSING MODE
RIC   EQU   22H   ;RECEIVE INTERRUPT CODE
R00   EQU   23H   ;LECEIVE MESSAGE LENGTH - LOW BYTE
R01   EQU   24H   ;RECEIVE MESSAGE LENGTH - HIGH BYTE
RA    EQU   25H   ;RECEIVE ADDRESS
RC    EQU   26H   ;RECEIVE CONTROL BYTE
L0    EQU   27H   ;TRANSMIT MESSAGE LENGTH
RVPAR EQU   28H   ;RECEIVE PARAMETERS
B0    EQU   28H   ;   "         "
A1    EQU   29H   ;   "         "
A2    EQU   2AH   ;   "         "
PCOUNT      EQU   2BH   ;PARAMETER COUNT - COMMAND PHASE
XCOUNT      EQU   2CH   ;TRANSMIT BYTE COUNT
ECHECK      EQU   2DH   ;FLAG FOR ERROR CHECKING OPTION
BSIZIN      EQU   2EH   ;INPUT (RECEIVE)  BUFFER SIZE
RXIN  EQU   2FH   ;INPUT BUFFER POINTER (IN)
RXOT  EQU   30H   ;INPUT BUFFER POINTER (OUT)
TIC   EQU   31H   ;TRANSMIT INTERRUPT CODE
BSIZOT      EQU   32H   ;OUTPUT (TRANSMIT) BUFFER SIZE
TXIN  EQU   33H   ;OUTPUT BUFFER POINTER (IN)
TXOT  EQU   34H   ;OUTPUT BUFFER POINTER (OUT)
TOUT1 EQU   35H   ;TIMEOUT PARAMETER 1
TOUT2 EQU   36H   ;TIMEOUT PARAMETER 2
RXBUF EQU   40H   ;RECEIVE BUFFER - 32 BYTES
TXBUF EQU   60H   ;TRANSMIT BUFFER - 32 BYTES
STSBUF      EQU   37H   ;2 BYTES FOR EXTERNAL BUFFER STATUS
INTRPT      EQU   39H   ;CURRENT INTERRUPT STATUS (ON/OFF)
```

```
TXCNT EQU   3AH   ;COUNT TRANSMIT COMPLETES
TXSET EQU   3BH   ;COUNT THE ≠ SETUPX'S
$EJECT
;*****************************************************************************
;                 CONSTANT DEFINITIONS
;*****************************************************************************
;*** DEFINITION OF STS VALUES ***
NULL  EQU   00H   ;STS 00 = NOTHING HAPPENING
RCVFUL      EQU   10H   ;RECEIVE BUFFER FULL
TXCMPT      EQU   20H   ;TRANSMIT OPERATION COMPLETE
TXEMPT      EQU   30H   ;TRANSMIT BUFFER EMPTY
TIMOUT      EQU   40H   ;TIMEOUT
RCEMPT      EQU   50H   ;RECEIVE BUFFER EMPTY
RCCMPT      EQU   60H   ;RECEIVE OPERATION COMPLETE
TXFULL      EQU   70H   ;TRANSMIT BBUFFER FULL
IRA   EQU   80H   ;IMMEDIATE RESULT AVAILABLE
ERR   EQU   0F0H  ;SDLC CHIP MOD. IS IN AN ERROR MODE/ RESET 8742
;*** DEFINITION OF BUFFER OPERATING MODES ***
IDLE  EQU   00H   ;IDLE MODE
RCVMOD      EQU   01H   ;RECEIVE MODE
TXMODE      EQU   02H   ;TRANSMIT MODE
ERROR EQU   03H   ;ERROR MODE
;*** DEFINITION OF GENERAL PURPOSE & CONTROL CONSTANTS FOR 8273 ***
PB1OFF      EQU   02H   ;TURN OFF TRANSMITTER
PB1ON EQU   0DH   ;TURN ON TRANSMITTER
WR    EQU   0FBH  ;WRITE LOW
WR1   EQU   04H   ;WRITE HIGH
RD    EQU   0F7H  ;READ LOW
RD1   EQU   08H   ;READ HIGH
SETB  EQU   0A3H  ;TURN OFF TRANSMITTER
RESETB      EQU   63H   ;TURN ON TRANSMITTER
ON    EQU   01H   ;TRUE/ON
OFF   EQU   00H   ;FALSE/OFF
NOOP  EQU   00H   ;NO-OP
F75   EQU   24    ;75%FULL
FULL  EQU   32    ;FULL BUFFER SIZE
E75   EQU   08H   ;75%EMPTY
SETR  EQU   0C1H  ;TEMPORARY VALUE
PAGE  EQU   300H  ;PAGE 3 OFFSET
RXMASK      EQU   5FH   ;RECEIVE POINTER WRAP AROUND MASK
TXMASK      EQU   7FH   ;TRANSMIT POINTER WRAP AROUND MASK
TCONST      EQU   0F5H  ;TIME CONSTANT FOR TIME OUT OPTION
```

```
$EJECT
;*** 8273 ADDRESSING CONSTANTS ***
CMD   EQU   0BCH  ;COMMAND PORT 8273
RESET EQU   0BEH  ;RESET 8273
RSTAT EQU   0BCH  ;READ STAT 8273
RXRSLT      EQU   0BFH  ;READ RECEIVE RESULTS
RESULT      EQU   0BDH  ;READ 8273 IMMEDIATE RESULT
RDATA EQU   0DFH  ;READ 8273 DATA
TDATA EQU   0EFH  ;TRANSMIT DATA 8273
TXRSLT      EQU   0BEH  ;READ TRANSMIT RESULT
WPARAM      EQU   0BDH  ;COMMAND TO LOAD PARAMETERS
STOPP EQU   7FH   ;STOP ALL 8273 LINE CHANGES
;*** DEFINITION OF COMMAND & PARAMETER PROCESSING MODES ***
PMODE EQU   10H   ;PARAMETER MODE (CMND)
RCMODE      EQU   20H   ;READ RECEIVE PARAMETER MODE (CMND)
REPMOD      EQU   30H   ;REPEAT MODE W NEW ADDRESS (CMND)
XMTMOD      EQU   40H   ;TRANSMIT PARAMETER MODE (CMND)
BUFMOD      EQU   50H   ;LOAD DATA INTO TRANSMIT BUFFER (CMND)
TOTMOD      EQU   60H   ;TIMEOUT PARAMETER MODE (CMND)
$EJECT
;*********************************************************************
;           INTERRUPT VECTORS                    .        *
;*********************************************************************
      ORG   000H
      JMP   INIT  ;BEGINNING ADDRESS
      NOP
      JMP   CMDATA      ;COMMAND PROCESSOR
      NOP
      NOP
      JMP   TIMER ;TEST FOR POSSIBLE TIME OUT ERROR
;***************************************************************************
;                 INITIALIZATION ROUTINES
;***************************************************************************
INIT: SEL   RB0         ;BE SURE WE ARE USING REGISTER BANK ZERO
      DIS   I           ;NO INTERRUPTS YET
      STOP  TCNT        ;STOP THE CLOCK TOO
      DIS   TCNTI       ;NO TIMER INTERRUPTS
      MOV   A,PSW       ;READ THE PROCESS STATUS WORD
      ANL   A,#38H            ;CLEAR THE STACK POINTER
      MOV   PSW,A       ;RESTOR NEW PSW
      MOV   R0,#02H           ;START ADDRESS TO CLEAR RAM
      MOV   R1,#7EH           ;COUNT TO CLEAR
```

```
      CLR   A
LOOP: MOV   @R0,A        ;WRITE OUT ZERO
      INC   R0           ;BUMP THE POINTER
      DJNZ  R1,LOOP            ;LOOP TILL DONE
      MOV   A,#RXBUF     ;LOAD ADDRESS OF RECEIVE BUFFER
      MOV   R0,#RXIN     ;ADDRESS OF POINTERS
      MOV   @R0,A
      INC   R0
      MOV   @R0,A
      MOV   A,#TXBUF     ;GET ADDRESS OF TRANSMIT BUFFER
      MOV   R0,#TXIN     ;ADDRESS OF TRANSMIT POINTERS
      MOV   @R0,A        ;LOAD UP THE BUFFER POINTERS
      INC   R0
      MOV   @R0,A
      CLR   A
      MOV   STS,A        ;RESET STS TO NULL
      CALL  RES          ;RESET 8273 CHIP
      CALL  CLRINT             ;CLEAR PENDING INTERRUPT
      EN    I            ;RE-ENABLE THE INTERRUPTS
      JMP   MAIN         ;BEGIN MAIN OPERATIONS
$EJECT
CLRINT:     ORL   P2,#0FFH    ;TURN OFF ANY INTERRUPT FROM 8742 TO HOST.
      RETR               ;THIS COMMAND MUST BE EXECUTED!
RES:  MOV   A,#01H             ;WRITE OUT A 1 FIRST
      OUTL  P1,A
      ANL   P2,#RESET    ;SELECT THE RESET PORT ON THE 8273
      ANL   P2,#WR             ;TOGGLE THE WRITE LINE LOW
      ORL   P2,#WR1            ;TOGGLE THE WRITE LINE HIGH
      ORL   P2,#STOPP    ;UNSELECT THE PORT ALL TOGETHER
      CLR   A            ;PREPARE TO WRITE OUT A ZERO
      OUTL  P1,A
      CALL  DELAY        ;WAITE FOR 8273 TO PROCESS FIRST RESET
      ANL   P2,#RESET    ;REPEAT PREVIOUS OPERATION WITH ZERO
      ANL   P2,#WR
      ORL   P2,#WR1
      ORL   P2,#STOPP
      CALL  B1OFF        ;TURN OF THE TRANSMITTER
      RET
DELAY:      MOV   R3,#0FFH    ;WAITE LOOP LENGTH
      DJNZ  R3,$-0
      RET
B1OFF:      DIS   I           ;DO NOT ALLOW INTERRUPTS AT THIS POINT
```

```
     MOV   R3,#SETB    ;LOAD COMMAND TO SET PORT B BIT 1 (DISABLE TRANS)
     CALL  OUTCMD             ;SEND OUT THE COMMAND TO THE COMMAND PORT
     MOV   A,#PB1OFF   ;SEND OUT THE PORT B VALUE
     CALL  OUTPAR             ;SEND OUT THE PARAMETER
     EN    I
     RET
$EJECT
;************************************************************************
;                 MAIN PROCESSING ROUTINES                        *
;                                                            *
;THE MAIN FUNCTION HERE IS TO DETERMINE THE MODE OF OPERATION, WHETHER  *
;IT BE IDLE, RECEIVE, TRANSMIT, OR ERROR. IF THE MODE IS IDLE, THE      *
;PROCESSOR WILL CONTINUE TO CYCLE UNTILL THE MODE IS CHANGED BY THE     *
;COMMAND PROCESSOR WITH A COMMAND FROM THE HOST. WHEN THE MODE IS       *
;RECEIVE, THE CONTRTOL WILL TRANSFER TO THE RECEVE ROUTINE UNTIL THE    *
;MODE IS NO LONGER RECEIVE. THE SAME IS TRUE FOR THE TRANSMIT MODE.     *
;IF THE PROCESSOR DETECTS THAT THE MODE IS ERROR, IT WILL LOOP AND CEASE*
;TO TEST THE 8273 STATUS UNTIL A RESET COMMAND COMES FROM THE HOST.     *
;************************************************************************
MAIN: MOV   R0,#STATUS  ;GET ADDRESS OF STATUS/MODE BUFFER
      MOV   A,@R0
      ANL   A,#03H             ;LOOK ONLY AT THE MODE FOR NOW
      JNZ   MAIN1       ;TEST FOR IDLE
      JMP   MAIN        ;OTHERWISE JUMP TO TOP AGAIN TILL !IDLE
MAIN1:      DEC   A            ;TEST FOR RECEIVE MODE
      JNZ   MAIN2
      CALL  RECEVE             ;PROCESS IN RECEIVE MODE UNTIL NOT RECEIVE MODE
      JMP   MAIN        ;START OVER AGAIN
MAIN2:      DEC   A            ;TESTING FOR TRANSMIT MODE
      JNZ   MAIN3
      CALL  TRNSMT             ;PROCESS IN TRANSMIT MODE UNTIL NOT TRANSMIT MODE
      JMP   MAIN        ;START OVER AGAIN
MAIN3:      CALL  B1OFF        ;TURN OFF THE TRANSMITTER
      MOV   A,#ERR
      MOV   STS,A
      ANL   P2,#7FH            ;CONTINUE TO GENERATE AN INTERRUPT
      JMP   MAIN3       ;LOOP FOREVER TILL RESET OCCURS
$EJECT
;************************************************************************
;                        RECEIVE MODE                             *
;                                                            *
;WHILE IN RECEIVE MODE, THE 8742 WILL CONTINUE TO READ THE STATUS OF THE*
```

```
;8273 AND TEST FOR ANY RECEIVE INTERRUPTS FROM THE 8273. THERE ARE TWO  *
;TYPES OF RECEIVE INTERRUPTS THAT CAN COME FROM THE 8273. THEY ARE       *
;RECEIVE DATA AVAILABLE & RECEIVE RESULTS AVAILABLE. IF THERE IS ONLY   *
;DATA AVAILABLE TO BE READ THEN THE VALUE OF THE INTERRUPT WILL BE 08H  *
;AFTER ANDING THE 8273 STATUS WITH A OAH. IF THE INTERRUPT IS FOR       *
;RECEIVE RESULTS, THE VALUE WILL BE OAH. AFTER TESTING FOR AND          *
;PROCESSING ANY INTERRUPTS, THE 8742 WILL TEST THE BUFFER STATUS TO     *
;DTERMINE IF IT NEEDS TO SEND DATA TO THE HOST. IF THERE IS DATA TO SEND*
;THEN IT WILL CONTINUE TO SEND OUT THE DATA UNTIL THERE IS AN 8273      *
;INTERRUPT OR THE BUFFER IS EMPTY. IF THE BUFFER IS ERMPTY, THE 8742    *
;WILL DETERMINE WHETHER THE RECEIVE OPERATION WAS COMPLETE OR NOT AND   *
;SET THE STS STATUS ACCORDINGLY. THE WHOLE OPERATION WILL CONTINUE TO   *
;REPEAT UNTIL THE STATUS MODE IS NO LONGER RECEIVE.
;************************************************************************
RECEVE:     CALL  B1OFF       ;TRANSMITTER MUST BE OFF IN ORDER TO RECEIVE
      DIS   I           ;MUST NEVER BE INTERRUPTED DURING A STATUS READ
      CALL  STAT        ;GET 8273 STATUS
      EN    I
      ANL   A,#0AH            ;LOOK ONLY AT RECEIVE BITS
      JZ    REC1
      XRL   A,#0AH            ;TEST FOR RECEIVE COMPLETE
      JZ    REC2
      CALL  READ        ;READ ONE BYTE FROM 8273
      MOV   R0,#STATUS  ;TESTING FOR TIMEOUT OPTION
      MOV   A,@R0
      ANL   A,#10H            ;ISOLATE THE TIME OUT BIT
      JZ    REC1        ;DO NOTHING IF NOT ENABLED
      CALL  TRESET            ;RESET THE TIMER IF ENABLED
      JMP   REC1
REC2: CALL  CONTRV            ;READ THE RESULTS ON RECEIVE COMPLETE
      CALL  TSTOP       ;ALWAYS ENSURE THAT THE TIMER IS OFF HERE
REC1: MOV   R0,#STATUS
      MOV   A,@R0       ;GET THE STATUS AGAIN
      ANL   A,#04H            ;TEST FOR SEND TO HOST BIT SET
      JZ    REC3
      CALL  ERBUF       ;CALL EMPTY READ BUFFER TILL EMPTY OR RXINT
      MOV   R0,#BSIZIN  ;BUFFER COUNT
      MOV   A,@R0
      JNZ   REC3        ;TESTING FOR AN EMPTY BUFFER
      MOV   R0,#STATUS
      MOV   A,@R0
      ANL   A,#0FBH           ;CLEAR THE SEND TO HOST BIT IF BUFFER IS EMPTY
```

```
        MOV   @R0,A
        JB3   REC4          ;TEST FOR RECEIVE COMPLETE BIT SET
        MOV   A,#RCEMPT     ;SET STS TO RECEIVE BUFFER EMPTY
        CALL  STS1          ;SET STATUS WITH NO INTERRUPT
        JMP   REC3
REC4:   MOV   A,#RCCMPT     ;SET STS TO RECEIVE COMPLETE
        CALL  STS1
REC3:   MOV   R0,#STATUS
        MOV   A,@R0
        ANL   A,#03H             ;TEST FOR RECEIVE MODE STILL
        XRL   A,#RCVMOD
        JZ    RECEVE
        RET                 ;RETURN TO START OVER IF NOT RECEIVE MODE
$EJECT
;***********************************************************************
;                        TRANSMIT MODE                            *
;                                                           *
;THE TRANSMIT OPERATION IS VERY SIMILAR TO THE RECEIVE OPERATION. THE   *
;MAIN DIFFERENCE IS THE VALU OF THE INTERRUPT THAT IT IS SCANNING FOR . *
;AND THE FACT THAT IT NEVER HAS TO WORRY ABORT SENDING  A BUFFER OF DATA*
;TO THE HOST. IF A TRANSMIT COMPLETES, IT WILL READ THE RESULT AND TELL *
;THE HOST WITH AN INTERRUPT. IF THE 8273 SAYS IT NEEDS A BYTE OF DATA   *
;TO TRANSMIT, THEN THE 8742 WILL SEND THE DATA BYE TO IT IF IT HAS ONE  *
;TO SEND. IF THE DATA TRANSMIT BUFFER GETS LOWER THAN 8 BYTES AND IT IS *
;EXPECTING MORE, IT WILL INTERRUPT THE HOST AFTER EVERY DATA TRANSFER   *
;UNTIL IT GETS MORE DATA BYTES. THIS PROCESS WILL CONTINUE TO LOOP      *
;UNTIL THE STATUS MODE IS NO LONGER TRANSMIT.                       *
;***********************************************************************
TRNSMT:     DIS   I          ;NEVER ALLOW INTERRUPT DURING A STATUS READ
       CALL  STAT          ;GET 8273 STATUS
       EN    I
       ANL   A,#05H             ;LOOK ONLY AT TRANSMIT BITS
       JZ    TRAN1
       XRL   A,#05H             ;TEST FOR FRAME COMPLETE
       JZ    TRAN2
       JNTO  TRAN1         ;BREAK OUT IF NO INTERRUPT
       MOV   R0,#STATUS
       MOV   A,@R0
       ANL   A,#60H             ;TEST FOR CTS && DATA IN BUFFER
       XRL   A,#60H
       JNZ   TRAN1
       CALL  XMIT          ;TRANSMIT DATA BYTE TO 8273
```

```
      MOV   R0,#STATUS  ;TESTING FOR TIMEOUT OPTION
      MOV   A,@R0
      ANL   A,#10H           ;ISOLATE THE TIME OUT BIT
      JZ    TRAN1       ;DO NOTHING IF NOT ENABLED
      CALL  TRESET           ;RESET THE TIMER IF ENABLED
      JMP   TRAN1
TRAN2:      CALL  CONTXT          ;READ OFF THE RESULT
      CALL  TSTOP       ;ALWAYS ENSURE THAT THE TIMER IS OFF HERE
TRAN1:      MOV   R0,#STATUS
      MOV   A,@R0
      ANL   A,#03H           ;TESTING FOR NOT TRANSMIT MODE
      XRL   A,#TXMODE
      JZ    TRNSMT
      RET               ;RETURN TO START OVER IF NOT XMIT MODE
$EJECT
;*****************************************************************************
;                       GENERAL SUPPORT ROUTINES
;*****************************************************************************
;*** READ THE STATUS OF THE 8273. THIS WILL TELL WHEN THERE ARE INTERRUPTS ETC ***
STAT: ORL   P1,#0FFH    ;SET P1 LINES HIGH SO NOT TO DRIVE THEM
      ANL   P2,#RSTAT   ;SELECT THE STATUS PORT
      ANL   P2,#RD           ;TOGGLE THE READ LINE LOW
      IN    A,P1        ;READ THE STATUS
      ORL   P2,#RD1          ;RELEASE THE READ LINE
      ORL   P2,#STOPP   ;TURN OFF ALL CONTROL LINES TO 8273
      RET
;*** SET THE STS REGISTER IMMEDIATELY WITH NO REGARD FOR WHAT IS CURRENTLY THERE
STS1: JOBF  $-0
      MOV   STS,A       ;FORCE A NEW STATUS TO COME OUT
      MOV   R0,#STSBUF+1
      MOV   @R0,A
      RET
$EJECT
;*** READ A DATA BYTE FROM THE 8273 ***
IN73: ORL   P1,#0FFH    ;DONT DRIVE THE P1 LINES
      ANL   P2,#RDATA   ;SELECT THE READ DATA PORT
      ANL   P2,#RD           ;TOGGLE THE READ LINE
      IN    A,P1        ;READ THE DATA
      ORL   P2,#RD1          ;RESET THE READ LINE
      ORL   P2,#STOPP   ;REST ALL LINES
      RET
;*** SEND DATA BYTE TO 8273 FOR TRANSMIT ***
```

```
OUT73:      MOV   A,@R0         ;READ THE DATA BYTE TO BE SENT
      OUTL  P1,A          ;WRITE IT TO P1 FIRST
      ANL   P2,#TDATA     ;SELECT THE TRANSMIT DATA PORT
      ANL   P2,#WR              ;TOGGLE THE WRITE LINE
      ORL   P2,#WR1             ;TOGGLE THE WRITE LINE THE OTHER WAY
      ORL   P2,#STOPP     ;RESET ALL LINES
      RET
;*** SEND A COMMAND TO THE 8273 COMMAND PORT ***
OUTCMD:     MOV   R4,#0FFH      ;ERROR COUNT
OUTCM2:     CALL  STAT          ;GET THE CURRENT STATUS
      JB7   OUTCM1              ;DETERMINE IF THE COMMAND BUFFER IS BUSY
      MOV   A,R3          ;GET THE COMMAND FROM R3
      OUTL  P1,A          ;WRITE IT OUT TO P1
      ANL   P2,#CMD             ;SELECT THE COMMAND PORT
      ANL   P2,#WR              ;START WRITE
      ORL   P2,#WR1             ;STOP THE WRITE
      ORL   P2,#7FH             ;STOP EVERYTHING
      RET
OUTCM1:     DJNZ  R4,OUTCM2     ;COUNT TO ERROR OUT
      CALL  GENERR              ;ERROR IF WE GET HERE
      RET
;*** SEND A PARAMETER TO THE 8273 PARAMETER PORT ***
OUTPAR:     MOV   R4,#0FFH      ;ERROR COUNT
      MOV   R3,A          ;SAVE THE PARAMETER
OUTP: CALL  STAT          ;GET THE CURRENT STATUS
      JB5   OUTP1         ;CHECK FOR PARAMETER PORT BUSY
      MOV   A,R3          ;RESTORE THE PARAMETER
      OUTL  P1,A          ;WRITE IT OUT TO P1
      ANL   P2,#WPARAM    ;SELECT THE WRITE PARAMETER PORT
      ANL   P2,#WR              ;START WRITE
      ORL   P2,#WR1             ;STOP THE WRITE
      ORL   P2,#7FH             ;STOP EVERYTHING
      RET
OUTP1:      DJNZ  R4,OUTP             ;COUNT TO EROR OUT
      CALL  GENERR              ;ERROR IF WE GET HERE
      RET
;*** SET UP THE 8273 TO DO A SELECTIVE RECEIVE WITH SPECIFIC ADDRESS
SETUPR:     MOV   R3,#SETR      ;PASS COMMAND IN R3
      CALL  OUTCMD              ;SEND OUT THE COMMAND
      MOV   R0,#RVPAR
      MOV   A,@R0         ;GET THE FIRST PARAMETER
      CALL  OUTPAR              ;WRITE OUT THE PARAMETER
```

```
        CLR    A              ;PAR 2 IS ALWAYS ZERO BY DEFINITION
        CALL   OUTPAR                ;WRITE OUT THE NEXT PARAMETER
        INC    RO             ;LOOK AT THE NEXT PARAMETER
        MOV    A,@RO
        CALL   OUTPAR
        INC    RO
        MOV    A,@RO
        CALL   OUTPAR
        MOV    RO,#STATUS     ;TESTING FOR TIMEOUT OPTION
        MOV    A,@RO
        ANL    A,#10H                ;ISOLATE THE TIME OUT BIT
        JZ     SETR1          ;DO NOTHING IF NOT ENABLED
        CALL   TSTART                ;START THE TIMER IF ENABLED
SETR1:         RET
;*********************************************************
EMTST:         MOV    A,@R1          ;GET THE BUFFER COUNT
        CPL    A              ;CONVERT THE BUFFER COUNT TO 2'S COMPLIMENT
        INC    A
        ADD    A,#E75                ;SUBTRACT IT FROM THE 75%EMPTY LIMIT
        JB7    EMT1           ;RETURN A 1 BECAUSE WE ARE NOT YET TOO LOW
        MOV    RO,#XCOUNT     ;GET THE ADDRESS OF THE NUMBER OF TRANSMITTIONS
        MOV    A,@R1          ;GET THE BUFFER COUNT
        ADD    A,@RO          ;GET THE TOTAL TO SEND
        MOV    RO,#LO                ;GET THE TOTAL THAT THE 8273 WILL SEND
        XRL    A,@RO          ;COMPARE THE TOTAL SENT+TOTAL LEFT TO LO
        JNZ    EMT2           ;RETURN A 0 SINCE THERE IS MORE TO COME
EMT1:   MOV    A,#01
        RET
EMT2:   CLR    A
        RET
$EJECT
READ:   MOV    RO,#RXIN
        MOV    A,@RO          ;GET THE POINTER
        MOV    RO,A
        MOV    R1,#BSIZIN     ;BUFFER COUNT ADDRESS
        CALL   IN73           ;READ THE DATA BYTE
        MOV    @RO,A          ;STORE IT IN THE BUFFER
        INC    RO
        MOV    A,RO
        ANL    A,#RXMASK      ;TAKE CARE OF WRAP AROUND IF NECESSARY
        MOV    RO,#RXIN
        MOV    @RO,A          ;SAVE THE NEW POINTER
```

```
        INC    @R1          ;INCREMENT THE BUFFER COUNT
        MOV    A,@R1
        XRL    A,#F75              ;TEST FOR 75% FULL
        JZ     READ1
        MOV    A,@R1
        XRL    A,#FULL+1    ;TEST FOR TOO FULL
        JZ     OVFLW
        JMP    READ2
READ1:         MOV   A,#RCVFUL
        CALL   GENINT              ;SET NEW STATUS WITH INTERUPT
READ2:         RET
OVFLW:         MOV   A,@R1
        DEC    A            ;SET THE COUNT BACK BY ONE
        MOV    @R1,A
        MOV    R0,#RXIN
        MOV    A,@R0        ;GET THE POINTER
        DEC    A            ;SET IT BACK BY ONE
        ORL    A,#40H              ;BE SURE TO WRAP BACK THE OTHER WAY
        ANL    A,#RXMASK
        MOV    @R0,A
        RET
$EJECT
CONTRV:        CALL  RCVDBL               ;RECEIVE DISABLE  ***
        MOV    R0,#RIC             ;ADDRESS OF THE RECEIVE RESULTS BUFFER
        MOV    R4,#0FFH     ;FAIL SAFE COUNTER
RV1:    DIS    I
        CALL   STAT
        EN     I
        JB3    RV4          ;TEST FOR INTERRUPT
        JMP    RV3          ;BREAK IF NONE
RV4:    DJNZ   R4,RV2
        JMP    RV3          ;BREAK IF WE TAKE TOO LONG
RV2:    JB1    RV6          ;TEST FOR RESULT AVAILABLE
        JMP    RV1
RV6:    ORL    P1,#0FFH
        ANL    P2,#RXRSLT
        ANL    P2,#RD
        IN     A,P1
        ORL    P2,#RD1
        ORL    P2,#STOPP
        MOV    @R0,A
        INC    R0           ;INCREEMNT THE POINTER
```

```
        JMP    RV1
RV7A:   JMP    RV7          ;JUMP AROUND PAGE OFFSET
RV3:    MOV    R0,#ECHECK   ;ERROR CHECKING FLAG
        MOV    A,@R0
        JZ     RV7A         ;NO ERROR CHECKING IF ZERO
        MOV    R0,#RIC
        MOV    A,@R0
        ANL    A,#1FH
        JZ     RV7A
        DEC    A
        JZ     RV7A         ;NO ERRORS IF ZERO
        MOV    R0,#BSIZIN
        CLR    A
        MOV    @R0,A        ;CLEAR THE BUFFER COUNT
        MOV    R0,#RXIN
        MOV    A,#RXBUF
        MOV    @R0,A
        INC    R0
        MOV    @R0,A        ;RESET THE POIINTERS
        CALL   SETUPR              ;RESET UP TO RECEIVE WITH CURRENT PARAMETERS
        MOV    R0,#STATUS
        MOV    A,@R0
        ANL    A,#0F3H
        MOV    @R0,A        ;CLEAR ALL RECEIVE BITS
        MOV    R0,#STSBUF+1
        MOV    A,@R0
        XRL    A,#RCVFUL    ;TEST TO SEE IF STS WAS AFFECTED
        JNZ    RV8
        MOV    @R0,A        ;RECALL A IS ZERO NOW
        MOV    STS,A
RV8:    RET
RV7:    MOV    R0,#STATUS
        MOV    A,@R0
        ORL    A,#08H              ;SET RECEIVE COMPLETE
        MOV    @R0,A        ;WRITE IT OUT
        MOV    R0,#INTRPT   ;TEST FOR INTERRUPT
        MOV    A,@R0
        JZ     $+4
        JMP    RV9
        MOV    A,#RCVFUL
        CALL   GENINT
        JMP    RV8
```

```
RV9:  MOV   A,#RCVFUL
      CALL  SETSTS
EROUT:      RET
$EJECT
ERBUF:      MOV   R0,#BSIZIN
      MOV   A,@R0
      JZ    EROUT           ;BE SURE WE HAVE DATA TO SEND
      JT1   EROUT           ;TEST FOR INTERRUPT FROM 8273 ALSO TO BREAK
      MOV   R0,#RXOT
      MOV   A,@R0
      MOV   R0,A
      MOV   R2,#RXMASK
ER1:  JOBF  $-0             ;BE SURE FIRST BYTE HAS BEEN READ
      JNT1  ER3
      JMP   ER2
ER3:  MOV   A,@R0           ;GET THE DATA BYTE
      OUT   DBB,A           ;SEND IT TO HOST
      INC   R0
      MOV   A,R0
      ANL   A,R2            ;TAKE CARE OF POSSIBLE WRAP AROUND
      MOV   R0,A
      MOV   R1,#BSIZIN
      MOV   A,@R1
      DEC   A               ;DECREMENT THE COUNT
      MOV   @R1,A
      JZ    ER2
      JMP   ER1             ;LOOP BACK FOR NEXT ONE
ER2:  MOV   A,R0
      MOV   R0,#RXOT
      MOV   @R0,A           ;SAVE THE POINTER
      RET
$EJECT
XMIT: DIS   I               ;GAURD AGAINST GETTING AHEAD OF HOST
      JNT0  XMIT3
      MOV   R0,#TXOT
      MOV   A,@R0
      MOV   R0,A            ;GET THE BUFFER POINTER
      MOV   R1,#XCOUNT
      INC   @R1             ;INCREMENT THE TRANSMIT BYTE COUNTER
      CALL  OUT73
      INC   R0              ;INCREMENT THE POINTER
      MOV   A,R0
```

```
        ANL   A,#TXMASK
        JNZ   XMIT1
        MOV   A,#TXBUF     ;TAKE CARE OF WRAP AROUND
XMIT1:        MOV   R0,#TXOT
        MOV   @R0,A
        MOV   R1,#BSIZOT
        MOV   A,@R1
        DEC   A            ;DECREMENT THE BUFFER SIZE
        MOV   @R1,A
        JNZ   XMIT2        ;TEST FOR EMPTY BUFFER
        MOV   R0,#STATUS
        MOV   A,@R0
        ANL   A,#0DFH           ;RESET "DATA IN BUFFER" BIT
        MOV   @R0,A
XMIT2:        CALL  EMTST
        JNZ   XMIT3
XEMPTY:       MOV   A,#TXEMPT
      . CALL  GENINT
XMIT3:        EN    I           ;GAURD AGAINST GETTING AHEAD OF HOST
        RET
$EJECT
CONTXT:       MOV   R0,#TXCNT   ;***
        INC   @R0         ;*** INCREMENT THE NUMBER OF COMPLETES
        CALL  B1OFF       ;TURN OFF THE TRANSMITTER AT THE END OF XMIT
TX1:    DIS   I           ;IT IS CRITICAL THAT WE ARE NEVER INTERRUPTED HERE
        CALL  STAT
        EN    I
        JB0   TX2         ;TEST FOR RESULT AVAILABLE
        JMP   TX1         ;LOOP TILL IT COMES
TX2:    MOV   R0,#TIC          ;ADDRESS OF TRANSMIT INTERRUPT CODE
        ORL   P1,#0FFH
        ANL   P2,#TXRSLT
        ANL   P2,#RD
        IN    A,P1        ;READ THE RESULT FROM THE TRANSMIT
        ORL   P2,#RD1
        ORL   P2,#STOPP
        MOV   @R0,A       ;STORE THE RESULT
        MOV   R0,#STATUS
        MOV   A,@R0       ;GET THE STATUS
        ANL   A,#9FH           ;RESET DATA IN BUFF && CTS
        ORL   A,#80H           ;SET XMIT COMPLETE
        MOV   @R0,A
```

```
        MOV     A,#TXCMPT
        CALL    GENINT              ;SET NEW STS AND GENERATE AN INTERRUPT
        MOV     R0,#XCOUNT
        CLR     A
        MOV     @R0,A       ;CLEAR THE BYTE COUNT
        MOV     R0,#BSIZOT
        MOV     @R0,A       ;INSURE THE BUFFER SIZE IS ZERO
        MOV     R0,#L0
        MOV     @R0,A       ;CLEAR THE BUFFER LENGTH
        MOV     A,#TXBUF
        MOV     R0,#TXIN
        MOV     @R0,A
        INC     R0
        MOV     @R0,A
        RET
DEBUG:          JMP     DEBUG
SEJECT
;GENERATE AN INTERRUPT TO THE HOST AND SET THE STS REGISTER. IF THE STS REGISTER
;IS ALREADY SET WITH A DIFFERENT VALUE, THE NEW VALUE WILL BE PUT IN THE NEXT;LOCATION.
THIS IS JUST A PRECAUTION AND SHOULD NEVER HAPPEN. IF THERE IS ALREADY AN
;INTERRUPT IN PROGRESS, THEN THE PROCESSOR WILL ERROR OUT.
GENINT:         MOV     R0,#STSBUF+1
        MOV     R1,A        ;SAVE NEW STS FOR NOW
        MOV     A,@R0
        JNZ     GEN1
GEN2:   MOV     R0,#INTRPT
        MOV     A,@R0
        JNZ     GENERR              ;TRYING TO GENERATE AN INTERRUPT OVER ANOTHER
        MOV     @R0,#01H
        MOV     A,R1        ;RESTORE STS
        MOV     R0,#STSBUF+1
        MOV     @R0,A
        MOV     STS,A
        ANL     P2,#STOPP   ;GENERATE THE INTERRUPT
        RET
GEN1:   MOV     A,R1
        XRL     A,@R0
        JNZ     GENERR
        JMP     GEN2
GENERR:         MOV     A,#ERR
        MOV     STS,A       ;SET THE STATUS TO ERROR
        MOV     R0,#STATUS
```

```
      MOV   A,@R0
      ORL   A,#ERROR
      MOV   @R0,A
      RET
$EJECT
;PROCESS ALL COMMANDS SENT TO THE 8742 AND THE 8273.  THE COMMANDS TO THE 8273
;ARE LOCATED IN ROM AND ARE ADDRESSED BY AN OFFSET INTO THE TABLE. ALL COMMANDS
;LESS THAN 30 HEX IN VALUES ARE MEANT FOR THE 8273. ALL OTHERS ARE FOR THE 8742
;AND WILL BE PROCESSED ACCORDING TO THE INDIVIDUAL COMMAND. SEVERAL OF THE COMMANDS
;THAT ARE SENT TO THE 8742 REQUIRE SEVERAL PARAMETERS. THE 8742 WILL BE PLACED
;IN A PARTICULAR COMMAND OPERATING MODE TO HANDLE THE DATA (PARAMETERS) THAT
;WILL COME IN AS INDIVIDUAL INTERRUPTS.
CMDERR:     RETR              ;RETURN ON FALSE INTERRUPTS
CMDATA:     JNIBF CMDERR
      SEL   RB1         ;SELECT A NEW SET OF REGISTERS
      MOV   R7,A        ;SAVE THE ACCUMULATOR
      JF1   CMND        ;TEST FOR COMMAND/DATA
      CALL  CDATA       ;PROCESS DATA ACCORDING TO THE CMODE
      MOV   A,R7
      RETR
CMND: ORL   P2,#80H           ;***
      IN    A,DBB       ;READ THE COMMAND
      MOV   R6,A        ;STORE IT IN R6 FOR QUICK RETREIVAL
      ADD   A,#-30H           ;SUBTRACT 30H FROM COMMAND
      JB7   CMND1       ;TESTING FOR TRANSPARENT OR GENERAL
      CALL  GENERL
      MOV   A,R7
      RETR
CMND1:      CALL  ROM         ;TRANSPARENT COMMANDS ARE IN ROM TABLE
      MOV   A,R7
      RETR
$EJECT
;THIS TABLE IS A CASE STATEMENT TO DETERMINE THE TYPE OF ROM COMMAND
;BEING ISSUED.
$EJECT
      NOP
GENERL:     MOV   A,R6        ;RESTORE THE COMMAND
      ADD   A,#-30H           ;SUBTRACT 30H
      RR    A           ;DIVIDE BY 2
      JNZ   G1
      CALL  CODE0
      RET
```

```
G1:   DEC    A
      JNZ    G2
      CALL   CODE1
      RET
      NOP
G2:   DEC    A
      JNZ    G3
      CALL   CODE2
      RET
G3:   DEC    A
      JNZ    G4
      CALL   CODE3
      RET
G4:   DEC    A
      JNZ    G5
      CALL   CODE4
      RET
G5:   DEC    A
      JNZ    G6
      CALL   CODE5
      RET
G6:   DEC    A
      JNZ    G7
      CALL   CODE6
      RET
G7:   DEC    A
      JNZ    G8
      CALL   CODE7
      RET
G8:   DEC    A
      JNZ    G9
      CALL   CODE8
      RET
G9:   DEC    A
      JNZ    G10
      CALL   CODE9
      RET
G10:  DEC    A
      JNZ    G11
      CALL   CODE10
      RET
G11:  DEC    A
```

```
        JNZ    G12
        CALL   CODE11
        RET
G12:    DEC    A
        JNZ    G13
        CALL   CODE12
        RET
G13:    JMP    G13CNT
$EJECT
CASE:   DB     00,01,01,02,02
        DB     01,01,03,01,01
        DB     05,04,01,05,01
        DB     05,05,05,05,05
        DB     05,05,05
ROM:    MOV    A,R6
        RR     A
        ADD    A,#CASE-300H       ;OFFSET INTO CORRECT PAGE
        MOVP   A,@A         ;LOAD THE ACCUMULATOR FROM CURRENT PAGE
        JNZ    ROM1
        JMP    INIT         ;A ZERO IS MASTER RESET
        NOP
        NOP
ROM1:   DEC    A
        JNZ    ROM2
        CALL   DECODE             ;DECODE THE COMMAND NORMALLY
        RET
ROM2:   DEC    A
        JNZ    ROM3
        CALL   DECODE             ;DECODE NORMALLY
ROM2A:         CALL   STAT        ;GET 8273 STATUS
        JB4    ROM2B
        JMP    ROM2A
ROM2B:         ORL    P1,#0FFH    ;READ THE RESULT
        ANL    P2,#RESULT
        ANL    P2,#RD
        IN     A,P1
        ORL    P2,#RD1
        ORL    P2,#STOPP
        MOV    R2,A         ;SAVE RESULT FOR A BIT
        MOV    A,#IRA
        CALL   SETSTS             ;SET STATUS TO IRA
        MOV    A,R2
```

```
        OUT     DBB,A          ;SEND OUT THE RESULT TO BE READ
        RET
ROM3:   DEC     A
        JZ      $+4
        JMP     ROM4
        MOV     R0,#STATUS
        MOV     A,@R0
        ANL     A,#03H
        XRL     A,#TXMODE      ;TEST FOR TRANSMIT MODE
        JNZ     ROM3A
        MOV     A,@R0
        ANL     A,#0FCH             ;SET MODE TO IDLE
        MOV     @R0,A
        CALL    DECODE
        RET
ROM3A:          MOV   A,@R0         ;SET THE MODE TO ERROR AS WE ARE IN THE WRONG
        ORL     A,#ERROR       ;OPERATING STATUS
        MOV     @R0,A
        MOV     A,#ERR
        CALL    GENINT
        RET
ROM4:   DEC     A
        JNZ     ROM5
        MOV     R0,#STATUS
        MOV     A,@R0
        ANL     A,#03H
        XRL     A,#RCVMOD      ;TEST FOR RECEIVE MODE
        JNZ     ROM4A          ;SET MOIDE TO ERROR IF NOT RECEIVE
        MOV     A,@R0
        ANL     A,#0FCH
        MOV     @R0,A          ;SET NEW MODE TO IDLE
        CALL    DECODE
        RET
ROM4A:          MOV   A,@R0         ;SET THE MODE TO ERROR AS WE ARE IN THE WRONG
        ORL     A,#ERROR       ;OPERATING STATUS
        MOV     @R0,A
        MOV     A,#ERR
        CALL    GENINT
        RET
ROM5:   MOV     R0,#STATUS
        MOV     A,@R0
        ANL     A,#03H
```

```
        JNZ    ROM4A        ;SET MODE TO ERROR IF NOT IDLE
        CALL   DECODE
        RET
$EJECT
$EJECT
        ORG    3D2H
TABLE:         DB     00,01,63H,01,0A3H,01,23H,00
        DB     22H,00,0CDH,00,0CEH,00,0CCH,00
        DB     0C9H,02,0CAH,04,0C8H,04,0C5H,00
        DB     0C2H,04,0C1H,04,0C0H,02,60H,01
        DB     0A0H,01,51H,01,91H,01,57H,01
        DB     97H,01,64H,01,0A4H,01
$EJECT
DECODE:        MOV    A,R6
        XRL    A,#14H           ;TEST FOR A TRANSMIT FRAME
        JNZ    DEC1
        MOV    R0,#TXSET    ;***
        INC    @R0          ;*** COUNT THE SETUPS TO XMIT
        MOV    R0,#STATUS
        MOV    A,#42H           ;SET CTS
        ORL    A,@R0
        MOV    @R0,A
        ANL    A,#10H           ;ISOLATE THE TIMOUT BIT
        JZ     DEC1A        ;DO NOTHING IF NOT ENABLED
        CALL   TSTART
DEC1A:         CALL   B1ON      ;TURN ON THE TRANSMITTER WHEN SETTING UP TO TRANSMIT
DEC1:   MOV    A,R6
        XRL    A,#1AH
        JNZ    DEC3
        MOV    R0,#STATUS
        MOV    A,@R0
        ANL    A,#0FCH
        ORL    A,#RCVMOD
        MOV    @R0,A
        ANL    A,#10H           ;ISOLATE THE TIMOUT BIT
        JZ     DEC3         ;DO NOTHING IF NOT ENABLED
        CALL   TSTART
DEC3:   MOV    A,R6
        ADD    A,#TABLE-PAGE
        MOV    R6,A         ;SAVE CORRECT OFFSET IN R6
        MOVP3  A,@A         ;READ THE CORRECT 8273 COMMAND FROM THE TABLE
        MOV    R3,A         ;SAVE IN R3 FOR OUTCMD
```

```
        CALL  OUTCMD
        MOV   A,R6          ;GET THE OFFSET AGAIN
        INC   A
        MOVP3 A,@A          ;GET THE PARAMETER COUNT
        JZ    DEC2
        MOV   R0,#PCOUNT
        MOV   @R0,A
        MOV   R0,#MODE
        MOV   @R0,#PMODE
DEC2:   RET
$EJECT
CODE0:        MOV   R0,#STATUS
        MOV   A,@R0
        OUT   DBB,A
        RET
CODE1:        MOV   R0,#STATUS
        MOV   A,@R0
        ANL   A,#03H
        XRL   A,#RCVMOD     ;TEST FOR RECEIVE MODE
        JNZ   COD1ER
        MOV   A,@R0
        ORL   A,#04H              ;SET SEND DATA TO HOST BIT
        MOV   @R0,A
        RET
COD1ER:       MOV   A,#ERR
        CALL  GENINT
        MOV   A,@R0
        ORL   A,#03H
        MOV   @R0,A
        RET
CODE2:        MOV   R0,#STATUS
        MOV   A,@R0
        ANL   A,#03H
        XRL   A,#RCVMOD
        JNZ   COD1ER              ;GENERATE AN ERROR IF WRONG MODE
        MOV   A,@R0
        ANL   A,#0F0H             ;SET TO IDLE MODE/CLEAR RECEIVE BITS
        MOV   @R0,A
        MOV   R2,#05H             ;SEND OUT 5 BYTES
        MOV   R0,#RIC
COD2:   MOV   A,@R0
        JOBF  $-0
```

```
        OUT   DBB,A
        CLR   A
        MOV   @RO,A        ;ALWAYS CLEAR THE RESULT AFTER SENDING IT OUT
        INC   RO
        DJNZ  R2,COD2
        RET
CODE3:        MOV   RO,#ECHECK  ;ENABLE ERROR CHECKING
        MOV   @RO,#ON
        RET
CODE4:        MOV   RO,#STATUS
        MOV   A,@RO
        ANL   A,#03H
        JNZ   COD1ER             ;ERROR IF NOT IDLE
        MOV   RO,#MODE
        MOV   @RO,#RCMODE+3
        RET
CODE5:        MOV   RO,#STATUS
        MOV   A,@RO
        ANL   A,#03H
        JNZ   COD1ER             ;ERROR IF NOT IDLE
        MOV   RO,#MODE
        MOV   @RO,#REPMOD ;SET TO REPEAT LAST RECEIVE MODE
        RET
CODE6:        MOV   RO,#STATUS
        MOV   A,@RO
        ANL   A,#03H
        JNZ   COD1ER             ;ERROR IF NOT IDLE
        MOV   RO,#MODE
        MOV   @RO,#XMTMOD ;SET TO LOAD XMIT BUFFER LENGTH
        RET
CODE7:        MOV   RO,#STATUS
        MOV   RO,#MODE     ;IT WILL BE LEGAL TO LOAD BUFFER ANY TIME
        MOV   @RO,#BUFMOD ;SET TO LOAD XMIT BUFFER
        RET

CODE8:        MOV   RO,#STATUS
        MOV   A,@RO
        ANL   A,#03H
        XRL   A,#TXMODE
        JNZ   COD1ER
        MOV   A,@RO
        ANL   A,#1CH             ;CLEAR XMIT BITS AND SET MODE TO IDLE
```

```
        MOV     @R0,A
        MOV     R0,#TIC
        MOV     A,@R0
        OUT     DBB,A
        CLR     A
        MOV     @R0,A
        RET
CODE9:          MOV     R0,#MODE
        MOV     @R0,#TOTMOD
        RET
CODE10:         MOV     R0,#STATUS
        MOV     A,@R0
        ANL     A,#0EFH
        MOV     @R0,A
        RET
CODE11:         MOV     R0,#STSBUF
        CLR     A
        XCH     A,@R0           ;LOAD SECOND BYTE WITH ZERO,GET SECOND BYTE
        INC     R0
        MOV     @R0,A           ;PUT 2ND BYTE IN NEXT BYTE, PUT 1ST BYTE IN STS
        MOV     STS,A
        RET
CODE12:         MOV     R0,#STATUS
        MOV     A,@R0
        ANL     A,#03H                  ;TEST FOR ERROR STATUS
        XRL     A,#03H                  ;COMPARE TO ERROR
        JZ      COD12           ;RETURN DOING NOTHING IF ERROR MODE
        ORL     P2,#80H                 ;RELEASE THE INTERRUPT
        MOV     R0,#INTRPT
        CLR     A
        MOV     @R0,A
COD12:          RET
$EJECT
CDATA:          MOV     R0,#MODE
        MOV     A,@R0
        JNZ     DATA1
        IN      A,DBB           ;READ THE DATA BUT THROW IT AWAY
        RET
DATA1:          XRL     A,#BUFMOD
        JNZ     DATA2
        CALL    BUFFER
        RET
```

```
DATA2:     MOV    A,@RO
      XRL    A,#PMODE
      JNZ    DATA3
      CALL   PARAMS
      RET
DATA3:     MOV    A,@RO
      XRL    A,#XMTMOD      ;LOAD TRANSMIT BUFFER LENGTH
      JNZ    DATA4
      MOV    R1,#LO
      IN     A,DBB
      MOV    @R1,A
      CLR    A
      MOV    @RO,A          ;SET MODE TO ZERO
      RET
DATA4:     MOV    A,@RO
      XRL    A,#REPMOD
      JZ     $+4
      JMP    DATA5
      MOV    R1,#A1
      IN     A,DBB
      MOV    @R1,A
      INC    R1
      MOV    @R1,A
      MOV    @RO,#OOH
      CALL   SETUPR
      MOV    RO,#STATUS
      MOV    A,@RO
      ANL    A,#03          ;TEST TO SEE IF WE NEED TO SET THE STATUS
      JNZ    DATA4A
      MOV    A,@RO          ;NO NEED TO CLEAR THE STATUS HERE
      ORL    A,#RCVMOD
      MOV    @RO,A
DATA4A:    RET
DATA5:     MOV    A,@RO
      ANL    A,#OFOH
      XRL    A,#RCMODE      ;TEST FOR LOAD RECEIVE PARAMETERS
      JNZ    DATA6
      CALL   RCV
      RET
DATA6:     MOV    A,@RO
      XRL    A,#TOTMOD
      JNZ    DATAER              ;ERROR IF NOT TIME OUT MODE.
```

```
        MOV    R1,#TOUT1
        IN     A,DBB
        MOV    @R1,A
        INC    R1
        MOV    @R1,A
        MOV    @RO,#OOH    ;SET TO NOMODE
        MOV    RO,#STATUS
        MOV    A,@RO
        ORL    A,#10H            ;SET THE TIMEOUT OPTION BIT.
        MOV    @RO,A
        RET
DATAER:        IN     A,DBB
        MOV    @RO,#OOH    ;SET THE MODE TO ZERO
        RET
$EJECT
BUFFER:        MOV    RO,#XCOUNT  ;GET THE COUNT OF CURRENT DATA BYTES TRANSMITTED
        MOV    A,@RO
        MOV    RO,#BSIZOT  ;GET THE QUEUE SIZE COUNTER
        INC    @RO         ;INCREMENT THE COUNTER
        ADD    A,@RO       ;ADD IT TO THE CURRENT TRANSMIT COUNTER
        MOV    RO,#LO            ;GET THE ADDRESS OF THE TOTAL NUMBER OF BYTES TO SEND
        XRL    A,@RO       ;TEST TO SEE IF WE HAVE AS MANY AS WILL BE SENT
        JZ     TNP1A       ;A ZERO RESULT INDICATES WE ARE DONE
TNP1: MOV    RO,#BSIZOT  ;RESTOR THE ADDRESS OF THE QUEUE SIZE  COUNTER
        MOV    A,@RO       ;OTHERWISE LOAD THE BUFFER COUNT AGAIN
        XRL    A,#32       ;TEST FOR A FULL BUFFER
        JNZ    TNP2
TNP1A:         CALL   SETFUL
TNP2: MOV    RO,#BSIZOT
        MOV    A,@RO       ;GET THE BUFFER COUNTER AGAIN
        CLR    C
        ADDC   A,#-33            ;SUBTRACT 33 FROM THE SIZE
        JC     TNP1B
        MOV    A,@RO       ;GET THE BUFFER COUNT
        MOV    RO,#XCOUNT
        ADD    A,@RO       ;ADD THE TRANSMITTED NUMDER AND THE NUMBER LEFT
        CLR    C
        CPL    A
        INC    A           ;GET THE TWO'S COMPLIMENT
        MOV    RO,#LO
        ADDC   A,@RO       ;SUBTRACT THE TOTAL SENT + LEFT TO SEND FROM LO
        JNC    TNP1B
```

```
TNP1C:      MOV   R0,#TXIN     ;GET THE QUEUE POINTER
      MOV   A,@R0
      MOV   R1,A         ;PUT THE POINTER IN R1
      IN    A,DBB        ;READ THE DATA FROM THE HOST
      MOV   @R1,A        ;WRITE OUT THE DATA
      INC   R1
      MOV   A,R1
      ANL   A,#7FH             ;TAKE CARE OF ANY WRAP AROUND
      JNZ   TNS3
      MOV   A,#TXBUF     ;RESET THE POINTER TO BASE OF QUEUE
TNS3: MOV   @R0,A        ;SAVE NEW POINTER
      MOV   R0,#STATUS
      MOV   A,@R0
      ORL   A,#20H             ;SET DATA IN BUFFER BIT
      MOV   @R0,A
      CALL  STAT
      ANL   A,#05H             ;ISOLATE THE TRSNAMIT BITS
      XRL   A,#04H             ;TEST FOR A POSSIBLE TRANSMIT INTERRUPT
      JZ    BUFF2        ;SERVICE THE TRANSMITTER IF THERE IS AN INTERRUPT
      RET
TNP1B:      CALL  SETFUL
      JMP   TNP1C        ;READ THE DATA
;*** SERVICE THE TRANSMITTER BY TRANSMITTING A BYTE OF DATA SO WE DONT GET
;*** LOCKED OUT BY THE HOST. THIS SHOULD NOT HAPPEN TOO OFTEN.
BUFF2:      MOV   R0,#TXOT
      MOV   A,@R0
      MOV   R0,A         ;GET THE BUFFER POINTER
      MOV   R1,#XCOUNT
      INC   @R1          ;INCREMENT THE TRANSMIT BYTE COUNTER
      CALL  OUT73
      INC   R0           ;INCREMENT THE POINTER
      MOV   A,R0
      ANL   A,#TXMASK
      JNZ   BUFF3
      MOV   A,#TXBUF     ;TAKE CARE OF WRAP AROUND
BUFF3:      MOV   R0,#TXOT
      MOV   @R0,A
      MOV   R1,#BSIZOT
      MOV   A,@R1
      DEC   A            ;DECREMENT THE BUFFER SIZE
      MOV   @R1,A
      JNZ   BUFF4        ;TEST FOR EMPTY BUFFER
```

```
      MOV   R0,#STATUS
      MOV   A,@R0
      ANL   A,#0DFH           ;RESET "DATA IN BUFFER" BIT
      MOV   @R0,A
BUFF4:      CALL  EMTST
      JNZ   BUFF5
      MOV   A,#TXEMPT
      CALL  STS1
BUFF5:      RET               ;RETURN WHEN COMPLETE
$EJECT
SETFUL:     MOV   A,#TXFULL
      CALL  STS1        ;IMMEDIATE STS CHANGE
      MOV   R0,#MODE
      MOV   @R0,#00H    ;SET MODE TO NO-OP WHEN DONE RECEIVING
      RET
PARAMS:     IN    A,DBB       ;READ THE PARAMETER
      CALL  OUTPAR
      MOV   R0,#PCOUNT
      MOV   A,@R0
      DEC   A
      MOV   @R0,A
      JNZ   PAR1
      MOV   R0,#MODE
      MOV   @R0,A
PAR1: RET
RCV:  MOV   R0,#MODE
      MOV   A,@R0
      ANL   A,#0FH
      DEC   A
      JNZ   RCV1
      MOV   R1,#A2
      IN    A,DBB
      MOV   @R1,A
      MOV   @R0,#00H    ;SET FINAL MODE TO NULL
      RET
RCV1: DEC   A
      JNZ   RCV2
      MOV   R1,#A1
      IN    A,DBB
      MOV   @R1,A
      MOV   @R0,#RCMODE+1
      RET
```

```
RCV2: MOV   R1,#B0
      IN    A,DBB
      MOV   @R1,A
      MOV   @R0,#RCMODE+2
      RET


B1ON: MOV   R3,#RESETB  ;TURN ON THE TRANSMITTER FOR TRANSMIT
      CALL  OUTCMD            ;SEND OUT THE COMMAND
      MOV   A,#PB1ON    ;SEND OUT THE CORRECT PARAMETER (PORT B)
      CALL  OUTPAR
      RET
RCVDBL:     MOV   R3,#0C5H    ;***LOAD COMMAND TO DISABLE RECEIVE
      CALL  OUTCMD
      RET

TIMER:      SEL   RB1         ;SAVE REGISTER BANK 0
      MOV   R7,A        ;SAVE LAST ACCUMULATOR
      MOV   A,#TCONST   ;RESET THE TIMER
      MOV   T,A
      MOV   R0,#TOUT1
      MOV   A,@R0       ;READ THE TIMOUT REGISTER
      DEC   A           ;DECREMENT IT
      MOV   @R0,A       ;SAVE IT OUT AGAIN
      JZ    TIM1        ;TEST FOR TIMEOUT
      MOV   A,R7        ;RESTORE ACCUMULATOR
      RETR
TIM1: MOV   R0,#STATUS
      MOV   A,@R0
      ANL   A,#10H            ;SET THE STATUS BACK TO IDLE AFTER A TIME OUT
      MOV   @R0,A
      MOV   A,#TIMOUT   ;LOAD THE TIME OUT STATUS
      STOP  TCNT        ;STOP THE TIMER
      DIS   TCNTI       ;DISABLE THE TIMER INTERRUPT ANY MORE
      CALL  GENINT            ;INTERRUPT THE HOST
      MOV   A,R7
      RETR
$EJECT
TSTART:     MOV   A,#TCONST   ;LOAD THE TIMER
      MOV   T,A
      EN    TCNTI
      STRT  T
```

```
      RET
TSTOP:      DIS   TCNTI
      STOP  TCNT
      RET
TRESET:     MOV   R0,#TOUT2   ;RELOAD THE TIME COUNT
      MOV   A,@R0
      DEC   R0          ;LOOK AT THE ACTUAL TIME COUNT
      MOV   @R0,A       ;LOAD TOUT1
      RET
;*** SET THE STS REGISTER WITH OUT AN INTERRUPT. IF THERE IS ALREAY A STATUS
;*** THERE, PUT THE NEW ONE IN A QUE.
SETSTS:     MOV   R0,#STSBUF+1      ;GET THE ADDRESS OF THE STS BUFFER QUE CURRENT
      MOV   R1,A        ;SAVE THE NEW STATUS TILL LATER
      MOV   A,@R0       ;READ THE CURRENT STATUS
      JZ    $+4         ;TEST FOR NULL STATUS
      JMP   SET1
      MOV   A,R1        ;RESTORE THE NEW STATUS
      MOV   @R0,A       ;WRITE IT OUT
      MOV   STS,A       ;WRITE IT OUT TO THE STS REGISTER
      DEC   R0          ;LOOK AT THE PENDING STATUS BUFFER
      MOV   @R0,#00           ;BESURE IT IS CLEARED.
SET2: RET
SET1: XRL   A,R1        ;TEST FOR THE CURRENT AND NEW STATUS EQUAL
      JZ    SET2        ;OKAY IF THEY ARE EQUAL
      DEC   R0          ;OTHERWISE LOOK AT THE PENDING STS BUFFER
      MOV   A,R1        ;RESTORE THE NEW STATUS
      MOV   @R0,A       ;SAVE IT IN PENDING BUFFER
      RET
G13CNT:     DEC   A
      JNZ   G14
      CALL  B1ON        ;SPECIAL COMMAND TO TURN ON XMIT CLCK
      RET
G14:  DEC   A
      JNZ   G15
      CALL  B1OFF       ;SPECIAL COMMAND TO TURN OFF XMIT CLCK
      RET
G15:  JMP   ROM3A       ;SET  TO ERROR IF COMMAND IS ILLEGAL
      END
```

```
$TITLE('Digital Input Processor')
;*************************************************************************
;                                                                        *
;                   DEFINITION OF REGISTERS                              *
;                                                                        *
;*************************************************************************
PORT1 EQU   7BH         ;LOCATION OF PORT 1 BUFFER
PORT2 EQU   7CH         ;LOCATION OF PORT 2 BUFFER
PORT3 EQU   7DH         ;LOCATION OF PORT 3 BUFFER
PORT4 EQU   7EH         ;LOCATION OF PORT 4 BUFFER
PORT5 EQU   7FH         ;LOCATION OF PORT 5 BUFFER
LOHI1 EQU   76H         ;LOW TO HIGH TRANSITION QUEUE/PORT 1
LOHI2 EQU   77H         ; "   "  "        "        " /PORT 2
LOHI3 EQU   78H         ; "   "  "        "        " /PORT 3
LOHI4 EQU   79H         ; "   "  "        "        " /PORT 4
LOHI5 EQU   7AH         ; "   "  "        "        " /PORT 5
HILO1 EQU   71H         ;HIGH TO LOW TRANSITION QUEUE/PORT 1
HILO2 EQU   72H         ;  "   "  "       "        " /PORT 2
HILO3 EQU   73H         ;  "   "  "       "        " /PORT 3
HILO4 EQU   74H         ;  "   "  "       "        " /PORT 4
HILO5 EQU   75H         ;  "   "  "       "        " /PORT 5
MSKHI EQU   6CH
MSKLO EQU   67H
FIL1A EQU   58H         ;ADDRESS OF FILTER BUFFER 1
FIL2A EQU   59H         ;    "    "    "      "   2
FIL3A EQU   5AH         ;    "    "    "      "   3
FIL4A EQU   5BH         ;    "    "    "      "   4
FIL5A EQU   5CH         ;    "    "    "      "   5
FILMSK      EQU   53H         ;ADDRESS OF THE FILTER MASK ( 5 BYTES )
INTREC      EQU   51H         ;ADDRESS OF THE INTERRUPT RECORD ( 2 BYTES )
$eject
;*************************************************************************
;                                                                        *
;                   DEFINITION OF CONSTANTS                              *
;                                                                        *
;*************************************************************************
HI0   EQU   80H         ;CODE FOR BIT 0 GOING HIGH
HI1   EQU   81H         ;  "   "   "  1  "     "
HI2   EQU   82H         ;  "   "   "  2  "     "
HI3   EQU   83H         ;  "   "   "  3  "     "
HI4   EQU   84H         ;  "   "   "  4  "     "
HI5   EQU   85H         ;  "   "   "  5  "     "
```

```
HI6    EQU    86H          ;  "    "    "  6   "      "
HI7    EQU    87H          ;  "    "    "  7   "      "
LOBIT0        EQU    00H          ;CODE FOR BIT 0 GOING LOW
LOBIT1        EQU    01H          ;  "    "    "  1   "      "
LOBIT2        EQU    02H          ;  "    "    "  2   "      "
LOBIT3        EQU    03H          ;  "    "    "  3   "      "
LOBIT4        EQU    04H          ;  "    "    "  4   "      "
LOBIT5        EQU    05H          ;  "    "    "  5   "      "
LOBIT6        EQU    06H          ;  "    "    "  6   "      "
LOBIT7        EQU    07H          ;  "    "    "  7   "      "
BIT0   EQU    0FEH         ;MASK TO CLEAR BIT 0
BIT1   EQU    0FDH         ;  "    "    "     "  1
BIT2   EQU    0FBH         ;  "    "    "     "  2
BIT3   EQU    0F7H         ;  "    "    "     "  3
BIT4   EQU    0EFH         ;  "    "    "     "  4
BIT5   EQU    0DFH         ;  "    "    "     "  5
BIT6   EQU    0BFH         ;  "    "    "     "  6
BIT7   EQU    07FH         ;  "    "    "     "  7
ACC    EQU    50H          ;TEMPORARY STORAGE FOR ACCUMULATOR
$eject
;************************************************************************
;                                                               *
;      INTERRUPT VECTORS                                        *
;                                                               *
;The vectors here are for a master reset (loacation 0000), an interrupt *
;generated by the master processor (location 0003), and an interrupt    *
;from the internal timer (location 0007). The first vector causes a jump*
;to the INIT routine which clears all of RAM, resets the stack pointer, *
;and selects register bank zero. The second interrupt vector causes a   *
;jump to the command (CMND) processing routine. The last vector causes  *
;a jump to the INPUT routine that reads the input points from the       *
;discretes.                                                     *
;************************************************************************
       ORG    000H
       JMP    INIT  ;Reset function expecting five (5) bytes of filter mask
       NOP
       JMP    CMND  ;Command Processor
       NOP
       NOP
       JMP    INPUT ;Input discretes from ports
INIT:  SEL    RB0
       ANL    P2,#0EFH     ;SET THE INTERRUPT LINE LOW
```

```
        MOV    A,PSW
        ANL    A,#0F8H
        MOV    PSW,A        ;Effectively clear the stack pointer.
        MOV    R1,#60H              ;Load a counter into 'R1' = 96 decimal.
        MOV    R0,#20H              ;32 decimal is the start address for
        CLR    A            ;clearing RAM memory.
        DIS    I
L2:     MOV    @R0,A        ;Clear RAM memory at R0
        INC    R0
        DJNZ   R1,L2
L1:     MOV    R0,#FILMSK  ;R0 contains the address for the filter mask
        MOV    R2,#05H              ;R2 is the counter = 5 decimal
        CALL   INIT1
        MOV    R2,#INTREC  ;ADDRESS OF THE LAST INTERRUPT TO KEEP ALWAYS
        MOV    A,#0DFH              ;SET THE TIMER TO SAMPLE QUICKER (3f)
        MOV    T,A
        STRT   T            ;START THE TIMER
        EN     I            ;ENABLE INTERRUPTS FROM THE HOST
        CLR    F0           ;F0 will be toggled in main.
        MOV    R0,#20H              ;ADDRESS OF CONSTANT TO BE ADDED TO BIT
$EJECT
;***********************************************************************
;                                                         *
;       MAIN:                                             *
;                                                         *
;This routine is responsible for keeping a close watch on all input     *
;points. It is an infinite loop which is interrupted from time to time  *
;by either the host or the timer. The timer will interrupt on a regular *
;basis to cause the 8742 to go out and read the input points. The host  *
;interrupts any time it writes to the 8742. The specific function of    *
;main is to send out all the interrupts that are logged by the timed    *
;input routine. If the output buffer happens to be full at the time an  *
;interrupt is scheduled to be written out, it simply skips that   *
;interrupt and goes on to the next one. It will eventually get to that  *
;one again on its next time around. This way the processor will never   *
;get hung up waiting for the host to read an interrupt. It will be able *
;continue to scan for interrupts to send.                      *
;***********************************************************************
MAIN:   MOV    R2,#INTREC  ;RESTORE THE INTERRUPT RECORD REGISTER
        MOV    R1,#LOHI1   ;Load R1 with address of LO_HI trans
        MOV    A,@R1       ;buffer. Load 'A' with contents.
        CPL    F0          ;Set F0 flag to signal lo->hi trans.
```

```
        MOV   @R0,#00H     ;constant to be added to interrupts in this byte
        CALL  BITTST             ;Test the transition bits for byte 1
        INC   R1           ;Continue for bytes 2 thru 5.
        MOV   A,@R1
        MOV   @R0,#08H
        CALL  BITTST                   ;
        INC   R1
        MOV   A,@R1
        MOV   @R0,#10H
        CALL  BITTST                   ;
        INC   R1
        MOV   A,@R1
        MOV   @R0,#18H
        CALL  BITTST                   ;
        INC   R1
        MOV   A,@R1
        MOV   @R0,#20H
        CALL  BITTST                   ;
        CPL   F0           ;clear f0 to signal hi->low transitions
        MOV   R1,#HILO1    ;Checking HI_LO transitions now.
        MOV   A,@R1
        MOV   @R0,#00H
        CALL  BITTST             ;
        INC   R1
        MOV   A,@R1
        MOV   @R0,#08H
        CALL  BITTST             ;
        INC   R1
        MOV   A,@R1
        MOV   @R0,#10H
        CALL  BITTST             ;
        INC   R1
        MOV   A,@R1
        MOV   @R0,#18H
        CALL  BITTST             ;
        INC   R1
        MOV   A,@R1
        MOV   @R0,#20H
        CALL  BITTST
        JTF   MAIN1
        JMP   MAIN         ;Endless loop. Stop only on interrupts.
MAIN1:        CALL   INPUT       ;TIME TO SCAN THE INPUTS
```

```
      MOV   R0,#20H          ;ADDRESS OF CONSTANT TO ADDED
      JMP   MAIN        ;START OVER AGAIN
$eject
;*************************************************************************
;                                                          *
;     INIT1:                                                     *
;                                                          *
;This is a simple routine that is designed mainly to reset interrupts   *
;that may be pending when a reset command is given. In order to return  *
;from any  interrupt, a RETR instruction must be executed. To do this,  *
;a jump to INIT is effected which in turn calls INIT1 which executes a  *
;RETR instruction after doing a little processing.               *
;*************************************************************************
INIT1:       MOV   A,R2
      JZ    L4          ;Test the counter (R2) to get out.
      JF1   L4          ;any command given with A0 set should abort
      JNIBF INIT1       ;the mask process
      JF1   L4          ;check A0 once again just to be sure it is not set
      IN    A,DBB
      JF1   L4
      DEC   R2          ;Decrement the counter
      MOV   @R0,A       ;out to the filter mask.
      INC   R0          ;Increment pointer to filter mask
      JMP   INIT1
L4:   RETR
;*************************************************************************
;                                                          *
;     BITTST:                                                    *
;                                                          *
;This simple routine tests the interrupt queue for pending interrupts.  *
;If a bit is set, it means there is an interrupt there that has not     *
;been sent out yet. It consists simply of a test and jump to a specific *
;routine designed to handle that particluar bit in any port.            *
;*************************************************************************
BITTST:      JNZ   B1          ;ONLY PROCESS IF THERE IS SOMETHING THERE
      RET
B1:   MOV   A,R1
      MOV   R2,A        ;SAVE R1
      MOV   R1,#INTREC+1      ;GET ADDRESS OF INTERRUPT STATUS
      MOV   A,@R1
      XCH   A,R2
      MOV   R1,A
```

```
        MOV   A,R2          ;RESTORE R1 AND KEEP A
        JNZ   B2
        MOV   A,@R1
        JMP   B3
B2:     RET
B3:     JB0   PROC0         ;PROCESS BIT POSITION 0
        JB1   PROC1         ;   "     "     "     1
        JB2   PROC2         ;   "     "     "     2
        JB3   PROC3         ;   "     "     "     3
        JB4   PROC4         ;   "     "     "     4
        JB5   PROC5         ;   "     "     "     5
        JB6   $+4           ;   "     "     "     6
        JMP   $+4
        JMP   PROC6
        JB7   $+3           ;   "     "     "     7
        RET
        JMP   PROC7
$eject
;**************************************************************************
;                                                                *
;       PROC0,1,2,3,4,5,6,7                                           *
;                                                                *
;These are eight routines that are designed to send out an interrupt for*
;a specific bit in any port(byte). There is a constant stored at  *
;location 20H which will convert the bit number to the actual input     *
;point number before sending out the interrupt. Each routine then jumps *
;back to the BITTST routine to see if any more interrupts are waiting   *
;to be sent out.                                                  *
;**************************************************************************
PROC0:        ANL   A,#BIT0           ;FIRST CLEAR OUT THE INTERRUPT BIT
        MOV   @R1,A
        JF0   LP0          ;TEST THE F0 LINE TO DETERMINE IF LOW->HI
        MOV   A,#LOBIT0    ;ITS A HI->LOW IF F0 IS NOT SET
        JMP   PR0
LP0:    MOV   A,#HI0              ;OTHERWISE IT IS A LO->HI
PR0:    ADD   A,@R0        ;ADD THE OFFSET IN R0 (20H)
        JMP   GENINT              ;GENERATE THE INTERRUPT & JUMP TO BITTST
PROC1:        ANL   A,#BIT1           ;FIRST CLEAR THE INTERRUPT BIT
        MOV   @R1,A
        JF0   LP1          ;TEST F0 FOR LOW->HI TRANSITION
        MOV   A,#LOBIT1    ;IT IS HI->LOW IF NOT SET
        JMP   PR1
```

```
LP1:  MOV   A,#HI1            ;OTHERWISE IT IS LOW->HI.
PR1:  ADD   A,@RO       ;ADD THE CORRECT OFFEST IN RO. (20H LOC)
      JMP   GENINT            ;GENERATE THE INTERRUPT, JUMP BACK TO BITTST
PROC2:      ANL   A,#BIT2
      MOV   @R1,A       ;WRITE OUT THE BYTE WITH THE CLEARED BIT
      JFO   LP2         ;TEST FO FOR DIRECTION OF TRANSITION
      MOV   A,#LOBIT2
      JMP   PR2
LP2:  MOV   A,#HI2
PR2:  ADD   A,@RO
      JMP   GENINT
PROC3:      ANL   A,#BIT3
      MOV   @R1,A
      JFO   LP3
      MOV   A,#LOBIT3
      JMP   PR3
LP3:  MOV   A,#HI3
PR3:  ADD   A,@RO
      JMP   GENINT
PROC4:      ANL   A,#BIT4
      MOV   @R1,A
      JFO   LP4
      MOV   A,#LOBIT4
      JMP   PR4
LP4:  MOV   A,#HI4
PR4:  ADD   A,@RO
      JMP   GENINT
PROC5:      ANL   A,#BIT5
      MOV   @R1,A
      JFO   LP5
      MOV   A,#LOBIT5
      JMP   PR5
LP5:  MOV   A,#HI5
PR5:  ADD   A,@RO
      JMP   GENINT
PROC6:      ANL   A,#BIT6
      MOV   @R1,A
      JFO   LP6
      MOV   A,#LOBIT6
      JMP   PR6
LP6:  MOV   A,#HI6
PR6:  ADD   A,@RO
```

```
      JMP   GENINT
PROC7:      ANL   A,#BIT7
      MOV   @R1,A
      JFO   $+4
      JMP   $+4
      JMP   LP7
      MOV   A,#LOBIT7
      JMP   PR7
LP7:  MOV   A,#HI7
PR7:  ADD   A,@RO
      JMP   GENINT
$EJECT
;***************************************************************************
;                                                                          *
;     GENINT:                                                              *
;                                                                          *
;Generate the interrupt and jump  back to BITTST to see if there are any*
;more interrupts left to generate.                                         *
;***************************************************************************
GENINT:     MOV   R2,#INTREC
      XCH   A,R2         ;EXCHANGE R1/R2 TO GET THE ADDRESS OF THE LAST
      XCH   A,R1         ;INTERRUPT SHOULD WE BE ASKED FOR IT LATER.
      XCH   A,R2
      MOV   @R1,A        ;STORE THE LAST INTERRUPT
      INC   R1
      MOV   @R1,#01H
      ORL   P2,#10H           ;GENERATE THE INTERRUPT
      MOV   A,R2
      MOV   R1,A
      MOV   A,@R1        ;RESTORE
      JMP   BITTST            ;JUMP ACK TO TEST FOR MORE INTERRUPTS
$eject
;***************************************************************************
;                                                                          *
;     INPUT:                                                               *
;                                                                          *
;This routine reads all of the forty input points and determines if       *
;there have been any changes in them. It also determines if they are set*
;to interrupt and if they are to be filtered or non-filtered.             *
;***************************************************************************
INPUT:      MOV   A,#0DFH
      MOV   T,A
```

```
        MOV   R0,#2FH         ;Loc 2FH is where the filter pointer is stored
        MOV   A,@R0
        MOV   R6,A            ;Save it also in R6 for now
        DEC   R0              ;point to the next location with a counter in it
        MOV   A,@R0           ;Counter, must be zero (0) first time through.
        MOV   R1,#FILMSK      ;start with the address of the beginning of filmsk
        JNZ   I1              ;testing to see if we need to reset the pointers
        MOV   @R0,#03H        ;Setting up counters and pointers(every 3 times)
        INC   R0
        MOV   @R0,#FIL1A
        MOV   R6,#FIL1A
        DEC   R0
I1:     MOV   A,@R0
        DEC   A               ;decrementing the counter to trace the
        MOV   @R0,A           ;pointer through a loop
        ANL   P2,#30H
        ORL   P2,#0CEH        ;select port 1
        IN    A,P1            ;Read first port (eight points)
        MOV   R7,A
        MOV   A,R6
        MOV   R0,A            ;some necessary swaping of regs since r0,1 can be
        MOV   A,R7            ;addressed indirect and no others can.
        MOV   @R0,A
        MOV   R0,#PORT1       ;Actual last valid port data address
        XRL   A,@R0           ;Test for any change first
        ANL   A,@R1           ;Test for a valid immediate change
        JZ    IN1             ;no immediate changes noted
        MOV   R2,#FIL1A       ;start at fiterla with immediates
        CALL  BITSET                ;set all bits to indicate a change of state
IN1:    MOV   R2,#FIL1A       ;restore the fiterla pointer
        CALL  FILTER                ;test the filter for any valid changes
        INC   R6              ;Increment the filter & mask pointers
        INC   R1
        ANL   P2,#30H
        ORL   P2,#0CDH        ;select port 2
        IN    A,P1            ;Read in from logical port 2
        XCH   A,R6
        MOV   R0,A
        XCH   A,R6
        MOV   @R0,A           ;save new port value in the filter
        MOV   R7,A            ;and in r7
        MOV   R0,#PORT2       ;get last actual valid state of port2 address
```

```
      XRL   A,@R0        ;test for any change
      ANL   A,@R1        ;test for any immediate change
      JZ    IN2          ;no immediate changes noted if zero result
      MOV   R2,#FIL2A    ;start at filter2a
      CALL  BITSET             ;set all bits in the filter for immediate
IN2:  MOV   R2,#FIL2A    ;restore the filter pointer
      CALL  FILTER             ;test for all valid changes
      INC   R6           ;Increment the filter and buffer pointers
      INC   R1
      ANL   P2,#30H
      ORL   P2,#0CBH     ;select port 3
      IN    A,P1         ;read in from port 3
      XCH   A,R6
      MOV   R0,A
      XCH   A,R6
      MOV   @R0,A
      MOV   R7,A
      MOV   R0,#PORT3    ;Address of port3 buffer
      XRL   A,@R0
      ANL   A,@R1
      JZ    IN3
      MOV   R2,#FIL3A
      CALL  BITSET
IN3:  MOV   R2,#FIL3A
      CALL  FILTER
      INC   R6           ;Increment the pointers
      INC   R1
      ANL   P2,#30H
      ORL   P2,#0C7H     ;Select port number 4
      IN    A,P1         ;Read in from logical port 4
      XCH   A,R6
      MOV   R0,A
      XCH   A,R6
      MOV   @R0,A
      MOV   R7,A
      MOV   R0,#PORT4
      XRL   A,@R0
      ANL   A,@R1
      JZ    IN4
      MOV   R2,#FIL4A
      CALL  BITSET
IN4:  MOV   R2,#FIL4A
```

```
        CALL  FILTER
        INC   R6          ;Increment pointers
        INC   R1
        ANL   P2,#30H
        ORL   P2,#8FH           ;select port 5
        IN    A,P1        ;read from port 5
        XCH   A,R6
        MOV   R0,A
        XCH   A,R6
        MOV   @R0,A
        MOV   R7,A
        MOV   R0,#PORT5
        XRL   A,@R0
        ANL   A,@R1
        JZ    IN5
        MOV   R2,#FIL5A
        CALL  BITSET
IN5:    MOV   R2,#FIL5A
        CALL  FILTER
        MOV   R0,#2FH
        MOV   A,R6
        INC   A
        MOV   @R0,A
        RETR              ;Return and restore status after interrupt
$eject
;***********************************************************************
;                                                           *
;     BITSET:                                                     *
;                                                           *
;This is a routine that will be called when a non-filtered bit has     *
;changed state. It will set that bit(s) in all three of the appropriate *
;filter buffers so that they will be picked up later by the scanning   *
;routine that looks for  changes in the filter buffers.                *
;***********************************************************************
BITSET:      XCH   A,R1        ;GET THE CURRENT FILTER ADDRESS (R2)
        XCH   A,R2
        XCH   A,R1
        MOV   R5,A        ;SAVE THE CURRENT CHANGES IN R5
        ANL   A,R7        ;TEST FOR HI OR LO TRANS WITH MASK IN R7
        JZ    BI1         ;ONLY ALL LO TRANSITIONS WILL RESULT IN ZERO
        MOV   R3,A        ;SAVE THE HIS IN R3 TO RESTORE, KEEP R5 FOR LOS
        ORL   A,@R1       ;SET HI BITS I N THE FIRST FILTER
```

```
        MOV    @R1,A          ;WRITE THEM OUT
        XCH    A,R1
        ADD    A,#05H               ;LOOK AT THE NEXT FILTER
        XCH    A,R1
        MOV    A,R3           ;RESTORE THE BIT VALUE AGAIN
        ORL    A,@R1          ;SET THE BITS AGAIN IN THE NEXT FILTER
        MOV    @R1,A
        XCH    A,R1
        ADD    A,#05H               ;LOOK AT THE LAST FILTER
        XCH    A,R1
        MOV    A,R3           ;RESTORE THE BIT VALUE
        ORL    A,@R1          ;SET THE BITS HI
        MOV    @R1,A
        MOV    A,R5           ;GET THE LOW TRANSITIONS
        XRL    A,R7           ;TEST NOW FOR LOWS IF THERE WERE ANY
        JNZ    BITLOW
        MOV    A,R2
        MOV    R1,A
        RET
BITLOW:        MOV   R5,A
        MOV    R1,#FIL1A      ;BE SURE TO GET THE POINTER READJUSTED
BI1:    MOV    A,R5           ;Select lo..restore bit value
        CPL    A
        MOV    R5,A
        ANL    A,@R1          ;And out the bit
        MOV    @R1,A          ;and put back the new value
        XCH    A,R1
        ADD    A,#05H
        XCH    A,R1
        MOV    A,R5
        ANL    A,@R1          ;And out from the next byte of the filter
        MOV    @R1,A          ;and put back the new value
        XCH    A,R1
        ADD    A,#05H
        XCH    A,R1
        MOV    A,R5
        ANL    A,@R1          ;AND out from the last byte of the filter
        MOV    @R1,A          ;and put back the new value
        MOV    A,R2
        MOV    R1,A           ;Restore R1
        RET
$EJECT
```

```
;*************************************************************************
;                                                              *
;     FILTER:                                                          *
;Filter is a routine that will examine the filter to determine all valid*
;hi and low transitions. This is done by ORing and ANDing various values*
;*************************************************************************
FILTER:     XCH   A,R1
      XCH   A,R2
      XCH   A,R1
      MOV   A,@R1        ;READ IN THE FIRST FILTER BYTE
      MOV   R3,A         ;SAVE A COPY IN R3 FOR FUTURE USE
      XCH   A,R1
      ADD   A,#05H             ;GET ADDRESS OF THE NEXT FILTER BYTE
      XCH   A,R1
      ANL   A,@R1        ;AND THE FIRST BYTE WITH THE SECOND BYTE
      XCH   A,R3         ;SAVE RESULT IN R3, GET OLD R3
      ORL   A,@R1        ;OR THE FIRST BYTE WITH THE SECOND BYTE
      XCH   A,R1
      ADD   A,#05H             ;GET ADDRESS OF THE NEXT FILTER BYTE
      XCH   A,R1
      ORL   A,@R1        ;OR THE RESULT OF THE LAST "OR" WITH THE LAST BYTE
      XCH   A,R3         ;SAVE THE FINAL RESULT IN R3, AND GET THE AND RESULT
      ANL   A,@R1        ;AND IT WITH THE FINAL BYTE
      XRL   A,@R0        ;EXCLUSIVE OR THE RESULT WITH THE PORT
      XCH   A,R3         ;SAVE THE RESULT IN R3, GET THE OR RESULTS
      XRL   A,@R0        ;EXCLUSIVE OR THEM ALSO WITH THE PORT
      ANL   A,R3         ;FILTER OUT THE UNWANTED CHANGES BY ANDING THE TWO
      JNZ   $+4          ;RESULTS TOGETHER. TEST FOR NO CHANGES
      JMP   ENDF
      MOV   R0,A         ;PASS THE CHANGES IN R0 TO QUEUE
      MOV   A,R2
      MOV   R1,A         ;RESTORE ORIGINAL R1
      CALL  QUEUE        ;QUEUE THE CHANGES IF THEY ARE ENABLED
      RET
ENDF: MOV   A,R2
      MOV   R1,A         ;RESTORE R1
      RET
$EJECT
;*************************************************************************
;                                                              *
;     QUEUE:                                                           *
;                                                              *
```

```
;Queue is a routine that will enter all valid changes discovered by     *
;filter into the proper queue. This routine will handle multiple changes*
;hi to lo and lo to hi.                                                  *
;************************************************************************
QUEUE:     MOV   A,R0          ;GET THE VALID CHANGES
      ANL   A,R7         ;REMEMBER R7 HAS THE VAL READ AT P1
      JZ    LOW2         ;JUMP IF THE CHANGES WERE LOW.
      MOV   R2,A         ;SAVE THE HIS IN R2
      MOV   A,R1
      MOV   R3,A         ;SAVE ADDRESS OF FILMSK IN R3
      ADD   A,#19H             ;ADD 25 DEC TO GET MSKHI
      MOV   R1,A
      MOV   A,R2
      ANL   A,@R1        ;DETERMINE IF THIS INT IS ALLOWED
      JZ    ENDQ1
      XCH   A,R1
      ADD   A,#0AH             ;ADD 10 DEC TO GET THE LOHI BUF
      XCH   A,R1
      ORL   A,@R1        ;SET THE BITS IN THE LOHI QUEUE BUFFER
      MOV   @R1,A
QSET0:     MOV   A,R2
      XCH   A,R1
      ADD   A,#05H             ;ADD 5 TO GET PORT N
      XCH   A,R1
      ORL   A,@R1
      MOV   @R1,A        ;SET THE BIT(S) IN PORT N
      MOV   A,R3         ;RESTORE R1
      MOV   R1,A
      MOV   A,R2
      XRL   A,R0         ;TEST FOR LOWS AS WELL.
      JNZ   LOW1
      RET
ENDQ1:     MOV   A,R1
      ADD   A,#0AH
      MOV   R1,A
      JMP   QSET0
LOW1: MOV   R0,A         ;SAVE THE LOW BITS IN R0
LOW2: MOV   A,R0
      MOV   R2,A         ;SAVE THE LOWS IN R2
      MOV   A,R1
      MOV   R3,A         ;SAVE R1 IN R3 (FILMSK)
      ADD   A,#14H             ;ADD 20 DEC TO GET MSKLO
```

```
      MOV   R1,A
      MOV   A,R2
      ANL   A,@R1       ;TEST IF INT ALLOWED
      JZ    ENDQ2
      XCH   A,R1
      ADD   A,#0AH            ;ADD 10 DEC TO GET THE HILO BUFFER
      XCH   A,R1
      ORL   A,@R1
      MOV   @R1,A       ;SET THE BITS IN THE LO QUEUE BUFFER
QSET2:      MOV   A,R2
      CPL   A
      XCH   A,R1
      ADD   A,#0AH            ;ADD 10 TO GET PORT N
      XCH   A,R1
      ANL   A,@R1
      MOV   @R1,A       ;CLEAR THE BIT(S) IN THE PORT
      MOV   A,R3
      MOV   R1,A
      RET
ENDQ2:      MOV   A,R1
      ADD   A,#0AH
      MOV   R1,A
      JMP   QSET2
$EJECT
;************************************************************************
;     ENABLE:                                                  *
;                                                        *
;ENABLE is a routine used exclusively by the command processor. It      *
;enables a bit or bits in the interrupt mask for the 40 discrete points.*
;************************************************************************
ENABLE:     MOV   R4,A        ;Save A
      MOV   A,@R0
      XCH   A,R1
      XCH   A,R2
      XCH   A,R1
      ORL   A,@R1       ;enable by setting the bit(s)
      MOV   @R1,A       ;write them out to the correct loc.
      XCH   A,R1
      XCH   A,R2
      XCH   A,R1
      MOV   A,R4
      RET
```

```
;***********************************************************************
;                                                           *
;     REPLAC:                                                    *
;                                                           *
;REPLAC is another routine used only by the command processor. It does a*
;direct replacement rather than an enable.                          *
;***********************************************************************
REPLAC:     MOV    R4,A
      MOV    A,@R0
      MOV    @R1,A
      MOV    A,R4
      RET
;***********************************************************************
;                                                           *
;     DISABL:                                                    *
;                                                           *
;DISABL is called to disable the points in the interrupt mask.          *
;***********************************************************************
DISABL:     MOV    R4,A
      XCH    A,R1
      XCH    A,R2
      XCH    A,R1
      MOV    A,@R0
      CPL    A
      ANL    A,@R1
      MOV    @R1,A
      XCH    A,R1
      XCH    A,R2
      XCH    A,R1
      MOV    A,R4
      RET
$EJECT
;***********************************************************************
;                                                           *
;     SETUP:                                                     *
;                                                           *
;SETUP uses the above definitions as memory locations for the interrupt *
;mask. These are only used here since the addresses are calculated in   *
;the other routines that need them. Setup is a routine that prepares    *
;the correct registers for calling different routines to enable, disable*
;or replace the interrupt mask bits.                                *
;***********************************************************************
```

```
SETUP:        ANL    A,#07H              ;Setup a counter at loc 4D Hex.
       MOV    R1,#4DH
       MOV    @R1,A
       MOV    A,@R0         ;Restore arg 1
       ANL    A,#38H
       MOV    R2,#MSKHI
       MOV    R3,#MSKLO
       MOV    R5,#PORT1
       JNZ    $+3
       RET
       JB3    SET1
       JB4    SET2
       MOV    A,R2
       ADD    A,#04H
       MOV    R2,A
       MOV    A,R3
       ADD    A,#04H
       MOV    R3,A
       MOV    A,R5
       ADD    A,#04H
       MOV    R5,A
       RET
SET2:  MOV    A,R2
       ADD    A,#02H
       MOV    R2,A
       MOV    A,R3
       ADD    A,#02H
       MOV    R3,A
       MOV    A,R5
       ADD    A,#02H
       MOV    R5,A
       RET
SET1:  JB4    SET3
       INC    R2
       INC    R3
       INC    R5
       RET
SET3:  MOV    A,R2
       ADD    A,#03H
       MOV    R2,A
       MOV    A,R3
       ADD    A,#03H
```

```
      MOV    R3,A
      MOV    A,R5
      ADD    A,#03H
      MOV    R5,A
      RET
;
;
;CMND is the main command processor that decodes the instructions given to it
;from the 88/25. Although this segment of code is quite large, the actual
;path that is followed in most cases is not very long. The worst cases are
;the longest and are not expected to occur very often.
;
;
ERROR:      RETR
CMND: JNIBF ERROR
      SEL    RB1
      MOV    R0,#ACC          ;Save A at location 50H
      MOV    @R0,A
      MOV    R0,#22H          ;Make a copy at 22H
      JF1    CMN1
      IN     A,DBB      ;Read command from 88/25
      MOV    @R0,A
      MOV    R1,#4FH
      MOV    @R1,#00H   ;Clear the A0 flag
      JMP    C0
CMN1: IN     A,DBB
      MOV    @R0,A
      MOV    R1,#4FH
      MOV    @R1,#01H
      XRL    A,#0FFH
      JNZ    $+4
      JMP    INIT       ;Command to restart the processor
      MOV    A,@R0
      XRL    A,#0FEH
      JZ     $+4
      JMP    CMN1B+1
      MOV    R0,#INTREC
      MOV    A,@R0
      ANL    P2,#0EFH         ;RELEASE THE INTERRUPT LINE
      OUT    DBB,A
      CLR    A
      INC    R0
```

```
        MOV    @R0,A        ;CLEAR THE INTERRUPT STATUS
        MOV    R0,#ACC
        MOV    A,@R0
CMN1B:         RETR                ;Resynchronize command
        MOV    A,@R0
        XRL    A,#0FDH
        JNZ    CMN1A
        ORL    P2,#10H             ;Enable interrupting the 88/25
        MOV    R0,#ACC
        MOV    A,@R0
        RETR
CMN1A:         MOV   A,@R0
        XRL    A,#0FCH
        JNZ    C0
        ANL    P2,#0EFH
        MOV    R0,#ACC
        MOV    A,@R0
        RETR
C0:     MOV    A,@R0
        MOV    R2,A         ;Command in R2
        MOV    A,@R1
        JZ     $+4
        JMP    $+4
        JMP    CMN2
        MOV    A,R2         ;Restore command
        CPL    A
        JB5    CMN
        JB4    CMN
        JMP    $+4
CMN:    JMP    CMN2
        CPL    A
        ANL    A,#3FH
        MOV    R2,A
        XRL    A,#3FH              ;Strip off bits 6 & 7
        JZ     $+4
        JMP    $+4
        JMP    C1           ;Ten byte argument to be read
        MOV    A,R2         ;Restor arg
        ORL    A,#0C7H             ;Two byte argument to be read
        CPL    A
        JZ     $+4
        JMP    $+4
```

```
        JMP     C2
        MOV     A,R2
        XRL     A,#37H              ;Five byte argument to be read
        JMP     $+2
        JZ      C3
        INC     R0
        MOV     R1,#01H
        JMP     CMN3
C1:     INC     R0
        MOV     R1,#0AH
        JMP     CMN3
C2:     INC     R0
        MOV     R1,#02H
        JMP     CMN3
C3:     INC     R0
        MOV     R1,#05H
CMN3:   JNIBF   $-0
        IN      A,DBB
        MOV     @R0,A
        INC     R0
        DJNZ    R1,CMN3
CMN2:   MOV     R1,#4FH
        MOV     A,@R1
        JZ      CMN4
WRITE:          MOV     R0,#22H
        MOV     A,@R0
        ANL     A,#0C0H             ;Use bits 6 & 7 to branch to correct spot
        SWAP    A
        RR      A
        RR      A
        JZ      W100
        DEC     A
        JNZ     $+4
        JMP     W101
        DEC     A
        JNZ     $+4
        JMP     W110
        JMP     W111
CMN4:   MOV     A,@R0
        ANL     A,#0C0H
        SWAP    A
        RR      A
```

```
        RR     A
        JNZ    $+4
        JMP    R000
        DEC    A
        JNZ    $+4
        JMP    R001
        DEC    A
        JNZ    $+4
        JMP    R010
        JMP    R011
;
;
W100:   MOV    A,@R0
        JB4    $+4
        JMP    W3
        JB5    W2
W3:     CALL   SETUP
        MOV    R0,#01H
        MOV    A,@R1
        JZ     W4
        DEC    A
        XCH    A,R0
        RL     A
        XCH    A,R0
        JMP    $-6
W4:     MOV    A,R0
        MOV    R0,#23H
        MOV    @R0,A
        CALL   ENABLE
        XCH    A,R3
        XCH    A,R2
        XCH    A,R3
        CALL   ENABLE
        MOV    R0,#ACC
        MOV    A,@R0
        RETR
W4B:    JMP    W4A
W2:     JB3    W4B              ;JUMP BACK TO JUMP OVER PAGE
        JB0    $+4
        JMP    W5
        JB1    $+4
        JMP    W5
```

```
        JB2   $+4
        JMP   W5
        MOV   R7,#05H
        MOV   R2,#MSKHI
        MOV   R3,#MSKLO
        INC   R0
        XCH   A,R7
LOOP:   JNZ   W6
        MOV   R0,#ACC
        MOV   A,@R0
        RETR
W6:     CALL  ENABLE
        XCH   A,R3
        XCH   A,R2
        XCH   A,R3
        INC   R0
        CALL  ENABLE
        XCH   A,R3
        INC   A
        XCH   A,R2
        INC   A
        XCH   A,R3
        DEC   A
        MOV   R7,A
        INC   R0
        JMP   LOOP
W5:     MOV   A,@R0
        ANL   A,#07H              ;BE SURE TO ALLOW 3 BITS THROUGH.
        MOV   R7,A
        MOV   R2,#MSKHI
        MOV   R3,#MSKLO
LOOP1:        JZ     W6A
        DEC   A
        INC   R2
        INC   R3
        JMP   LOOP1
W6A:    INC   R0
        CALL  ENABLE
        XCH   A,R2
        XCH   A,R3
        XCH   A,R2
        CALL  ENABLE
```

```
        MOV   R0,#ACC
        MOV   A,@R0
        RETR
W4A:    JB0   $+4
        JMP   W7
        JB1   $+4
        JMP   W7
        JB2   $+4
        JMP   W7
        INC   R0          ;LOOK AT THE NEXT ARGUMENT LOCATION
        MOV   R2,#02H           ;REPEAT TWICE
        MOV   R1,#MSKHI   ;START WITH THE MASK FOR LO-> HI
LOOP2:        MOV   R3,#05H           ;WRITE OUT THE FIVE BYTE MASK
W8:     CALL  REPLAC
        INC   R0
        INC   R1
        DJNZ  R3,W8
        MOV   R1,#MSKLO   ;NOW LOAD THE HI->LO MASKS
        DJNZ  R2,LOOP2    ;LOAD THEM UP 5 TIMES
        MOV   R0,#ACC
        MOV   A,@R0
        RETR
W7:     MOV   A,@R0
        ANL   A,#07H
        MOV   R1,#MSKHI
LOOP3:        JZ    W9
        DEC   A
        INC   R1
        JMP   LOOP3
W9:     INC   R0
        CALL  REPLAC
        XCH   A,R1
        ADD   A,#-05H
        XCH   A,R1
        INC   R0
        CALL  REPLAC
        MOV   R0,#ACC
        MOV   A,@R0
        RETR
;
;
;W101 command to enable lo-hi and disable hi-lo interrupts.
```

```
;
;
      NOP
W101: MOV   A,@R0        ;Restore arg 1
      JB4   $+4
      JMP   W101A
      JB5   WCON
W101A:      CALL  SETUP
      MOV   R0,#01H            ;BIT PATTERN TO ROTATE
      MOV   R1,#4DH
      MOV   A,@R1
      JZ    $+8
      DEC   A
      XCH   A,R0
      RL    A
      XCH   A,R0
      JMP   $-6
      MOV   A,R0
      MOV   R0,#23H            ;TREAT BIT PATTERN AS ARGUMENT
      MOV   @R0,A
      CALL  ENABLE
      MOV   A,R3
      MOV   R2,A
      CALL  DISABL
      MOV   A,R5
      MOV   R2,A
      CALL  DISABL             ;SET THE PORT VALUT TO THE OPPPOSITE STATE
WDONE:      MOV   R0,#ACC            ;MUST RESTORE THE ACCUMULATOR TO RETURN
      MOV   A,@R0
      RETR
WCON: ORL   A,#0F8H
      CPL   A
      JZ    WC2
WC1:  MOV   A,@R0
      ANL   A,#07H             ;Setting up a counter.
      MOV   R2,#MSKHI
      MOV   R3,#MSKLO
      MOV   R5,#PORT1
      JZ    WC3
      DEC   A
      INC   R2           ;Moving the pointers to the correct byte.
      INC   R3
```

```
        INC     R5
        JMP     $-6
WC3:    XCH     A,R0
        INC     A
        XCH     A,R0
        CALL    ENABLE
        MOV     A,R3
        MOV     R2,A
        CALL    DISABL
        MOV     A,R5
        MOV     R2,A
        CALL    DISABL
        JMP     WDONE           ;RETURN WHEN DONE (RESTORE A)
WC2:    MOV     R7,#05H                 ;Do complete 5 byte mask.
        MOV     R2,#MSKHI
        MOV     R3,#MSKLO
        MOV     R5,#PORT1
        INC     R0
        XCH     A,R7
WC4:    JNZ     $+6
        MOV     R0,#ACC
        MOV     A,@R0
        RETR
        CALL    ENABLE
        XCH     A,R3
        XCH     A,R2
        XCH     A,R3
        CALL    DISABL
        XCH     A,R5
        XCH     A,R2
        XCH     A,R5
        CALL    DISABL
        CALL    RESTOR
        INC     R0
        JMP     WC4
;
;
;W110 is a routine that performe the exact opposite of the former function W101
;
;
W110:   MOV     A,@R0
        JB4     $+4
```

```
        JMP   WN1
        JB5   WNEC
WN1:    CALL  SETUP
        MOV   R0,#01H
        MOV   R1,#4DH              ;Loc for counter from setup
        MOV   A,@R1
        JZ    $+8
        DEC   A
        XCH   A,R0
        RL    A
        XCH   A,R0
        JMP   $-6
        MOV   A,R0
        MOV   R0,#23H
        MOV   @R0,A
        CALL  DISABL
        MOV   A,R3
        MOV   R2,A
        CALL  ENABLE
        MOV   A,R5
        MOV   R2,A
        CALL  ENABLE
        MOV   R0,#ACC
        MOV   A,@R0
        RETR
WNEC:   JB0   $+4
        JMP   WN2
        JB1   $+4
        JMP   WN2
        JB2   $+4
        JMP   WN2
        JMP   WN3
WN2:    MOV   A,@R0
        ANL   A,#07H
        MOV   R7,A         ;Set up a counter
        MOV   R2,#MSKHI
        MOV   R3,#MSKLO
        MOV   R5,#PORT1
        JZ    $+8
        DEC   A
        INC   R2
        INC   R3
```

```
        INC   R5
        JMP   $-6
        INC   R0
        CALL  DISABL
        MOV   A,R3
        MOV   R2,A
        CALL  ENABLE
        MOV   A,R5
        MOV   R2,A
        CALL  ENABLE
        MOV   R0,#ACC
        MOV   A,@R0
        RETR
WN3:    MOV   R7,#05H
        MOV   R2,#MSKHI
        MOV   R3,#MSKLO
        MOV   R5,#PORT1
        INC   R0
        XCH   A,R7
WN4:    JNZ   $+6
        MOV   R0,#ACC
        MOV   A,@R0
        RETR
        CALL  DISABL
        XCH   A,R3
        XCH   A,R2
        XCH   A,R3
        CALL  ENABLE
        XCH   A,R5
        XCH   A,R2
        XCH   A,R5
        CALL  ENABLE
        CALL  RESTOR
        INC   R0
        JMP   WN4
;
;
;W111 is the last write routine, ie. the last routine where the 88/25 can
;write to the 8742 microcomputer. It does disables to both masks.
;
;
W111:   MOV   A,@R0
```

```
        JB4     $+4
        JMP     WL1
        JB5     $+4
        JMP     $+4
        JMP     WLST
WL1:    CALL    SETUP
        MOV     R0,#01H
        MOV     R1,#4DH
        MOV     A,@R1           ;Counter
        JZ      $+4
        JMP     $+4
        JMP     $+8
        DEC     A
        XCH     A,R0
        RL      A
        XCH     A,R0
        JMP     $-10
        XCH     A,R0
        MOV     R0,#22H
        MOV     @R0,A
        CALL    DISABL
        XCH     A,R3
        XCH     A,R2
        XCH     A,R3
        CALL    DISABL
        MOV     R0,#ACC
        MOV     A,@R0
        RETR
WLST:   JB0     $+4
        JMP     WL2
        JB1     $+4
        JMP     WL2
        JB2     $+4
        JMP     $+4
        JMP     WL3
WL2:    MOV     A,@R0
        ANL     A,#03H                  ;Set up a counter
        MOV     R7,A
        MOV     R2,#MSKHI
        MOV     R3,#MSKLO
        JZ      $+7
        DEC     A
```

```
        INC    R2
        INC    R3
        JMP    $-5
        INC    R0
        CALL   DISABL
        XCH    A,R2
        XCH    A,R3
        XCH    A,R2
        CALL   DISABL
        MOV    R0,#ACC
        MOV    A,@R0
        RETR
WL3:    MOV    R2,#MSKHI
        MOV    R3,#MSKLO
        INC    R0
        MOV    A,#05
WL4:    JNZ    $+6
        MOV    R0,#ACC
        MOV    A,@R0
        RETR
        CALL   DISABL
        XCH    A,R3
        XCH    A,R2
        XCH    A,R3
        CALL   DISABL
        XCH    A,R3
        INC    A
        XCH    A,R2
        INC    A
        XCH    A,R3
        DEC    A
        INC    R0
        JMP    WL4
;
;
;The following routines are READ commands where the 88/25 wants to read a point
;or a mask filter. SETR is used only by read commands. It is similar to
;SETUP but is shorter and is taylored to some of the reads.
;
;
SETR:   ANL    A,#07H
        MOV    R1,#4DH            ;Counter loc.
```

```
       MOV   @R1,A
       MOV   A,@R0
       ANL   A,#38H
       MOV   R2,#PORT1
       JNZ   $+3
       RET
       JB3   SR1
       JB4   SR2
       XCH   A,R2
       ADD   A,#04H
       XCH   A,R2
       RET
SR2:   XCH   A,R2
       ADD   A,#02H
       XCH   A,R2
       RET
SR1:   JB4   SR3
       INC   R2
       RET
SR3:   XCH   A,R2
       ADD   A,#03H
       XCH   A,R2
       RET
;
;
;R000 is a routine that returns a point or byte(s) from the actual portX
;
;
R000:  MOV   A,@R0        ;Restore arg 1
       JB4   $+4
       JMP   R200
       JB5   R100
R200:  CALL  SETR
       MOV   R0,#4BH
       MOV   A,@R1
       CPL   A
       INC   A
       ADD   A,#07H            ;Setting up a secondary counter
       MOV   @R0,A
       MOV   A,@R1
       MOV   R0,#01H
       JZ    $+8
```

```
        DEC   A
        XCH   A,R0
        RL    A
        XCH   A,R0
        JMP   $-6
        MOV   A,R2
        MOV   R1,A
        MOV   A,R0
        ANL   A,@R1
        XCH   A,R0
        MOV   R1,#4BH
        MOV   A,@R1
        JZ    $+8
        DEC   A
        XCH   A,R0
        RL    A
        XCH   A,R0
        JMP   $-6
        MOV   A,R0
        OUT   DBB,A
        MOV   R0,#ACC
        MOV   A,@R0
        RETR
        NOP
        NOP
R100:   JB3   $+4
        JMP   $+10
        MOV   R0,#INTREC          ;Address of last interrupt
        MOV   A,@R0
        OUT   DBB,A
        MOV   R0,#ACC
        MOV   A,@R0
        RETR
        JB0   $+4
        JMP   R300
        JB1   $+4
        JMP   R300
        JB2   $+4
        JMP   $+4
        JMP   R400
R300:   MOV   A,@R0
        ANL   A,#07H              ;Set up a counter
```

```
       MOV    R1,#PORT1
       JZ     $+6
       DEC    A
       INC    R1
       JMP    $-4
       MOV    A,@R1
       OUT    DBB,A
       MOV    R0,#ACC
       MOV    A,@R0
       RETR
R400:  MOV    R1,#PORT1
       MOV    R7,#05H
R500:  MOV    A,R7
       JNZ    $+6
       MOV    R0,#ACC
       MOV    A,@R0
       RETR
       MOV    A,@R1
       JOBF   $-0
       OUT    DBB,A
       INC    R1
       DEC    R7
       JMP    R500
;
;
;R001 is another READ function. Basically the same as the first except it reads
;from the mask rather than the actual port.
;
;
R001:  MOV    A,@R0
       JB4    $+4
       JMP    R201
       JB5    $+4
       JMP    $+4
       JMP    R101
R201:  CALL   SETUP
       MOV    R1,#4DH              ;Counter
       MOV    R0,#4BH              ;Secondary counter
       MOV    A,@R1
       CPL    A
       INC    A
       ADD    A,#07H
```

```
        MOV   @R0,A        ;Store secondary counter
        MOV   A,@R1
        MOV   R0,#01
        JZ    $+8
        DEC   A
        XCH   A,R0
        RL    A
        XCH   A,R0
        JMP   $-6
        MOV   A,R2
        MOV   R1,A
        MOV   A,R0
        ANL   A,@R1
        XCH   A,R0
        MOV   R1,#4BH
        MOV   A,@R1        ;Get second counter
        JNZ   $+4
        JMP   $+8
        DEC   A
        XCH   A,R0
        RL    A
        XCH   A,R0
        JMP   $-8
        XCH   A,R0
        OUT   DBB,A
        MOV   R0,#ACC
        MOV   A,@R0
        RETR
R101:   JB0   $+4
        JMP   R301
        JB1   $+4
        JMP   R301
        JB2   R401
R301:   MOV   A,@R0
        ANL   A,#07H
        MOV   R1,#MSKHI
        JZ    $+6
        DEC   A
        INC   R1
        JMP   $-4
        MOV   A,@R1
        OUT   DBB,A
```

```
       MOV   R0,#ACC
       MOV   A,@R0
       RETR
R401:  MOV   R1,#MSKHI
       MOV   A,#05H
       MOV   R7,A
       JNZ   $+6
       MOV   R0,#ACC
       MOV   A,@R0
       RETR
       MOV   A,@R1
       JOBF  $-0
       OUT   DBB,A
       INC   R1
       MOV   A,R7
       DEC   A
       JMP   $-14
;
;
;R010 is the next READ command. It is identical to the previous function
;except that it opperates on the MSKLO buffer.
;
;
R010:  MOV   A,@R0
       JB4   $+4
       JMP   R210
       JB5   R110
R210:  CALL  SETUP
       MOV   R1,#4DH             ;Counter 1
       MOV   R0,#4BH             ;Counter 2
       MOV   A,@R1
       CPL   A
       INC   A
       ADD   A,#07H
       MOV   @R0,A
       MOV   A,@R1
       MOV   R0,#01H
       JZ    $+8
       DEC   A
       XCH   A,R0
       RL    A
       XCH   A,R0
```

```
       JMP   $-6
       MOV   A,R3
       MOV   R1,A
       MOV   A,R0
       ANL   A,@R1
       MOV   R0,A
       MOV   R1,#4BH
       MOV   A,@R1
       JZ    $+8
       DEC   A
       XCH   A,R0
       RL    A
       XCH   A,R0
       JMP   $-6
       XCH   A,R0
       OUT   DBB,A
       MOV   R0,#ACC
       MOV   A,@R0
       RETR
R110:  JB0   $+4
       JMP   R310
       JB1   $+4
       JMP   R310
       JB2   R410
R310:  MOV   A,@R0
       ANL   A,#07H
       MOV   R1,#MSKLO
       JZ    $+6
       DEC   A
       INC   R1
       JMP   $-4
       MOV   A,@R1
       OUT   DBB,A
       MOV   R0,#ACC
       MOV   A,@R0
       RETR
R410:  MOV   R1,#MSKLO
       MOV   A,#05H
       MOV   R7,A
       JNZ   $+6
       MOV   R0,#ACC
       MOV   A,@R0
```

```
      RETR
      MOV   A,@R1
      JOBF  $-0
      OUT   DBB,A
      INC   R1
      MOV   A,R7
      DEC   A
      JMP   $-14
;
;
;R011 is the last routine for the read commands. It does the same as the
;others except to both the hi and lo masks.
;
;
      NOP
R011: MOV   A,@R0
      JB4   $+4
      JMP   R211
      JB5   $+4
      JMP   R211
      JMP   R111
R211: CALL  SETUP
      MOV   R1,#4DH
      MOV   R0,#4BH
      MOV   A,@R1
      CPL   A
      INC   A
      ADD   A,#07H
      MOV   @R0,A
      MOV   A,@R1
      MOV   R0,#01H
      JNZ   $+4
      JMP   $+8
      DEC   A
      XCH   A,R0
      RL    A
      XCH   A,R0
      JMP   $-8
      MOV   A,R2
      MOV   R1,A
      MOV   A,R0
      ANL   A,@R1
```

```
        MOV   R4,A        ;Temp save of R0 calculated.
        MOV   A,R3
        MOV   R1,A
        MOV   A,R0
        ANL   A,@R1
        XCH   A,R1
        MOV   R0,#4BH
        MOV   A,@R0       ;Get the counter first
        XCH   A,R4
        MOV   R0,A
        MOV   A,R4        ;Recall counter
        JZ    $+11
        DEC   A
        XCH   A,R0
        RL    A
        XCH   A,R0
        XCH   A,R1
        RL    A
        XCH   A,R1
        JMP   $-9
        MOV   A,R0
        JOBF  $-0
        OUT   DBB,A
        MOV   A,R1
        JOBF  $-0
        OUT   DBB,A
        MOV   R0,#ACC
        MOV   A,@R0
        RETR
        NOP
R111:   JB0   $+4
        JMP   R311
        JB1   $+4
        JMP   R311
        JB2   $+4
        JMP   $+4
        JMP   R411
R311:   MOV   A,@R0
        ANL   A,#07H
        MOV   R0,#MSKHI
        MOV   R1,#MSKLO
        JNZ   $+4
```

```
        JMP   $+7
        DEC   A
        INC   R0
        INC   R1
        JMP   $-7
        MOV   A,@R0
        JOBF  $-0
        OUT   DBB,A
        MOV   A,@R1
        JOBF  $-0
        OUT   DBB,A
        MOV   R0,#ACC
        MOV   A,@R0
        RETR
R411:   MOV   R0,#MSKHI
        MOV   R1,#02H            ;REPEAT TWICE
RINS:   MOV   R7,#05H            ;5 TIMES AROUND
RINS1:        MOV   A,@R0
        JOBF  $-0
        OUT   DBB,A
        INC   R0
        DJNZ  R7,RINS1
        MOV   R0,#MSKLO
        DJNZ  R1,RINS
        MOV   R0,#50
        MOV   A,@R0
        RETR
RESTOR:       DEC   A
        XCH   A,R2
        INC   A
        XCH   A,R5
        INC   A
        XCH   A,R3
        INC   A
        XCH   A,R2
        RET
        END
```

```
$TITLE('Discrete Output Processor')
;************************************************************************
;                                                          *
;                   Functional Description                      *
;                                                          *
;The Discrete output processor is designed to control the 40 output     *
;points on the Digital I/O board. It also maintains 4 internal points   *
;which are not connected to any external discretes.               *
;                                                          *
;With this processor, it is possible to set any output bit, clear any   *
;bit, pulse any bit or oscillate any bit. Frequencies for pulsing and   *
;oscillating bits are determined by a one byte argument. Further  *
;information regarding the details of pulse and oscillate frquencies    *
;are given later in this document. See also chapter 12 of the functional*
;specifications.                                            *
;                                                          *
;The 88/25 can also read the status of any point. The status is either  *
;SET, CLEAR, PULSE, or OSCILLATE. If the main processor reads the status*
;of a full byte or the complete register, no status code is returned.   *
;The 88/25 can specify that it be interrupted upon completion of a      *
;function, ie. pulse, oscillate.                                 *
;************************************************************************
$eject
;************************************************************************
;                                                          *
;                   Definition of Registers                     *
;                                                          *
;************************************************************************
OPTN  EQU    12H         ;Option register (SET/CLEAR or PULSE/OSC)
OPTN1 EQU    12H         ;Option register for port 1
OPTN2 EQU    13H         ;  "        "      "    "  2
OPTN3 EQU    14H         ;  "        "      "    "  3
OPTN4 EQU    15H         ;  "        "      "    "  4
OPTN5 EQU    16H         ;  "        "      "    "  5
OPTN6 EQU    17H         ;  "        "      "    "  6
INT   EQU    0CH         ;Interrupt register
INT1  EQU    0CH         ;    "          "     for port 1
INT2  EQU    0DH         ;    "          "      "    "   2
INT3  EQU    0EH         ;    "          "      "    "   3
INT4  EQU    0FH         ;    "          "      "    "   4
INT5  EQU    10H         ;    "          "      "    "   5
INT6  EQU    11H         ;    "          "      "    "   6
```

```
CNTA   EQU   54H        ;Pulse/Oscillate frequency register
CNTB   EQU   28H        ;Oscillate frequency register
PORT1 EQU    27H
PORT2 EQU    26H
PORT3 EQU    25H
PORT4 EQU    24H
PORT5 EQU    23H
PORT6 EQU    22H
INTREC       EQU   20H        ;INTERRUPT RECORD (2 BYTES)
;************************************************************************
;                                                       *
;                  Definition of Constants                    *
;                                                       *
;************************************************************************

PT2    EQU   0A0H
PT3    EQU   0A0H
PT4    EQU   60H
PT5    EQU   60H
COUNT EQU    06H
TIMER EQU    0F4H  ;TIME CONSTANT TO LOAD INTO THE TIMER
CNTC   EQU   2CH
DIFF   EQU   -2CH
PLIMIT       EQU   21H   ;Limit for wrap around of all pointers
$eject
;************************************************************************
;                                                       *
;                  Interrupt Vectors                    *
;                                                       *
;On power up, the PC is set to 0000 where it encounters a vector jump   *
;to INIT. When the 88/25 writes to the 8742, it will generate an IBF    *
;interrupt if enabled. This causes the current PSW to be stored on the  *
;stack and the PC is reset to 0003. At that point it encounters a jump  *
;to CMND where IBF interrupts are processed. The PSW is restored when a *
;RETR instruction is executed. When the timer overflows, it generates   *
;a timer interrupt if enabled. This also saves the PSW on the stack and *
;sets the PC to 0007 where a jump to START is executed. Again the PSW is*
;restored after a RETR instruction.                          *
;************************************************************************

      ORG   000H
      JMP   INIT
```

```
      NOP
      JMP    CMND
$eject
;*************************************************************************
;                                                        *
;      INIT:                                             *
;                                                        *
;The initialization routine for the Discrete Output Processor is very    *
;important in that it must set up all of the registers with the correct *
;pointers to the various buffers(registers) which contain the counts,    *
;frequencies, port values etc. The reason for this initialization is     *
;that there are 44 bytes of CNTA buffers, 44 bytes of CNTB buffers, one *
;counter, a pointer to the OPTN buffers, etc. that must be incremented  *
;or decremented either every time a port is read or every time a  *
;point/bit is processed. Setting up the pointers and counter before they*
;are needed saves valuable time. The main processing is done only on a  *
;timed interrupt basis. This way correct frequencies can be maintained  *
;for pulsed or oscillated points/bits.                          *
;*************************************************************************
INIT: DIS    I            ;Disable interrupts for reset
      DIS    TCNTI
      SEL    RB0          ;Ensure we are using register bank 0
      ANL    P2,#0EFH     ;Set the interrupt line low
      MOV    A,PSW
      ANL    A,#0F8H
      MOV    PSW,A
      MOV    R1,#75H             ;Begin by clearing ram from R6 (RB0)
      MOV    R0,#0AH             ;Register 6 (RB0) - start address
      CLR    A
LOOP: MOV    @R0,A        ;Clear that location
      INC    R0
      DJNZ   R1,LOOP             ;Continue till done
      MOV    R1,#6        ;Clear all output ports
      MOV    R3,#PORT1    ;Begin at port 1
      MOV    R4,#0
PLOOP:       CALL   OUTPRT              ;Clear that port
      DEC    R3
      DJNZ   R1,PLOOP
      CALL   INIT1
      MOV    R7,#80H             ;Set the long times to 128 times
      EN     I            ;Enable interrupts from the 88/25
      JMP    START        ;Goto the start of the main processing
```

```
$eject
;*************************************************************************
;                                                             *
;     START:                                                  *
;This portion of code is the main processing routine in the discrete    *
;output processor. The code is an infinite loop that will wait for the  *
;timer to roll over setting the timer flag. This will cause the   *
;processor to begin processing the output points that are oscillating   *
;or pulsing. If a single port of points is not in need of any type of   *
;processing, nothing will be done. Only when a bit has changed will that*
;port be written out. By cutting corners in this fashion, it is possible*
;to acheive oscillating frquencies of 1.04 KHz. To slow down that *
;frequency, modify the constant "TIMER".                      *
;*************************************************************************

START:     JTF   START2
      JMP   START
START2:    MOV   A,#TIMER
      MOV   T,A
      MOV   R0,#OPTN     ;Get the first option buffer
      MOV   R3,#PORT1    ;Get the first port to look at
      MOV   R2,#CNTA     ;Get the beginning of the counter buffers
      MOV   R1,#INT
      DJNZ  R7,MAIN1     ;Process the continuous counter
      MOV   R7,#80H            ;Reinitialize the long timer
      CLR   F0
      CPL   F0           ;Set F0 to signal rollover
      JMP   MAIN
MAIN1:     CLR   F0            ;Clear F0 to signal no rollover
MAIN: DIS   I            ;No ints during this critical part of code
      CALL  PTIN         ;Read the port
      MOV   A,@R0        ;Load the option buffer for port
      JZ    NEXT         ;Go to the next port if nothing here
      MOV   A,@R0        ;Restore the option buffer
      CPL   A            ;Compliment to jump on unset bits
      JB0   LB0          ;Nothing to process if bit set
      CALL  PROC0        ;Process bit 0 of any byte
LB0:  INC   R2
      JB1   LB1          ;Test bit 1
      CALL  PROC1        ;Process bit 1 of any byte
LB1:  INC   R2
      JB2   LB2          ;Test bit 2
```

```
      CALL  PROC2        ;Process bit 2 of any byte
LB2:  INC   R2
      JB3   LB3          ;Test bit 3
      CALL  PROC3        ;Process bit 3 of any byte
LB3:  INC   R2
      JB4   LB4          ;Test bit 4
      CALL  PROC4        ;Process bit 4 of any byte
LB4:  INC   R2
      JB5   LB5          ;Test bit 5
      CALL  PROC5        ;Process bit 5 of any byte
LB5:  INC   R2
      JB6   LB6          ;Test bit 6
      CALL  PROC6        ;Process bit 6 of any byte
LB6:  INC   R2
      JB7   LB7          ;Test bit 7
      CALL  PROC7        ;Process bit 7 of any byte
LB7:  CPL   A            ;Restore the option buffer to original status
      MOV   @R0,A        ;Write out the buffer
      CALL  OUTPRT             ;Write out the port only when there is a change
      JMP   NEXT1
NEXT: MOV   A,R2         ;Get the address of the CNTA buffer pointer
      ADD   A,#07H             ;Increment the pointer by 7 since it wasnt used
      MOV   R2,A         ;Restore the pointer
NEXT1:      EN    I            ;Permit interrupts again
      INC   R1           ;Point to the next interrupt buffer
      INC   R0           ;Point to the next option buffer
      INC   R2           ;Point to the next counter buffer
      DEC   R3           ;Point to the next port buffer
      MOV   A,#PLIMIT    ;Load the port addressing limit for the pointers
      XRL   A,R3         ;Test the port pointer to determine if we need
                         ;to rollover
      JZ    START
      JMP   MAIN
$eject
;****************************************************************************
;                                                               *
;     PROC(0/1/2/3/4/5/6/7)                                             *
;                                                               *
;These routines that do the work for one bit (0 - 7) each. They test the*
;count for that bit to determine if it has gone to zero. If it has not, *
;it just returns, otherwise it checks the msb. If it is set and the F0  *
;flag, it goes ahead and toggles that bit in the port. If F0 is not set *
```

```
;it returns. If msb in cntA is not set then it toggles without regard    *
;for F0. It then looks at cntB. If it is zero, it clears the bit in      *
;OPTN, otherwise it reloads cntA from cntB.                              *
;*************************************************************************
PROC0:       MOV   R5,A        ;Save the option value in R5 till return
      MOV    A,R0        ;Save option buffer pointer
      XCH    A,R2        ;Retreive CNTA buffer pointer at the same time
      MOV    R0,A        ;Prepare to get the count for that bit
      MOV    A,@R0       ;Get the count value in Accumulator
      JB7    $+4         ;Check msb for fast or slow
      JMP    PR01        ;Not set
      JF0    PR01        ;Test F0 flag
PR0:  MOV    A,R0        ;Get the CNTA pointer
      XCH    A,R2        ;Restore CNTA, retreive OPTN pointer
      MOV    R0,A        ;Restore option pointer
      MOV    A,R5        ;Restore the option value
      RET                ;Return
PR01: DEC    A           ;Work on a copy of cnta
      JZ     PR02        ;DID IT GO TO ZERO?
      MOV    @R0,A       ;NO IT DIDN'T, DEC ACTUAL CNTA
      JMP    PR0         ;Restore pointers and return
PR02:
      MOV    A,@R1       ;Load A with INTerrupt buffer
      JB0    PR03        ;Test for interrupt on this bit
      JMP    PR04        ;Otherwise skip this section
PR03: CALL   INTST       ;Test to determine if an interrupt is pending
PR07: JNZ    PR0         ;Return if interrupt pending
PR05: MOV    A,R3        ;Get the port address
      CPL    A           ;Convert it to a negative
      INC    A
      ADD    A,#PORT1    ;Sub a from 27H to get port num-1
      RL     A
      RL     A
      RL     A           ;Multiply by eight
      CALL   GENINT            ;Generate an interrupt
PR04: MOV    A,@R0       ;Get the actual CNTA buffer
      DEC    A           ;Decrement the count
      MOV    @R0,A       ;Make permanent change to cnta
      MOV    A,R4        ;Get port val
      XRL    A,#01H            ;Toggle the bit in the port
      MOV    R4,A        ;Reload it to R4
      MOV    A,R0        ;Calculate address of cntb
```

```
      ADD   A,#DIFF            ;Subtract 30H
      MOV   R0,A
      MOV   A,@R0         ;Get CNTB value
      CALL  CONTST             ;TEST TO DETERMINE IF WE NEED TO CHANGE A BIT
      XCH   A,R0          ;Oscillate, need to reload cnta from CNTB
      ADD   A,#CNTC            ;Get address of CNTA
      XCH   A,R0
      JZ    PR06          ;Test for PULSE/OSCILLATE
      CALL  CONFIG             ;CONFIGURE THE COUNT IF NEEDED
      MOV   @R0,A         ;Loading CNTA from CNTB
      JMP   PR0           ;Restore pointers and return
PR06: MOV   A,#01H             ;MASK TO CLEAR BIT 0
      ORL   A,R5          ;CLEAR IT FROM OPTN
      MOV   R5,A          ;Save the option value till return
      JMP   PR0
$eject
;************************************************************************
PROC1:      MOV   R5,A         ;Save the option value in R5 till return
      MOV   A,R0          ;Save option buffer pointer
      XCH   A,R2          ;Retreive CNTA buffer pointer at the same time
      MOV   R0,A          ;Prepare to get the count for that bit
      MOV   A,@R0         ;Get the count value in Accumulator
      JB7   $+4           ;Check msb for fast or slow
      JMP   PR11          ;Not set
      JF0   PR11          ;Test F0 flag
PR1:  MOV   A,R0          ;Get the CNTA pointer
      XCH   A,R2          ;Restore CNTA, retreive OPTN pointer
      MOV   R0,A          ;Restore option pointer
      MOV   A,R5          ;Restore the option value
      RET                 ;Return
PR11: DEC   A             ;Work on a copy of cnta
      JZ    PR12          ;DID IT GO TO ZERO?
      MOV   @R0,A         ;NO IT DIDN'T, DEC ACTUAL CNTA
      JMP   PR1           ;Restore pointers and return
PR12:
      MOV   A,@R1         ;Load A with INTerrupt buffer
      JB1   PR13          ;Test for interrupt on this bit
      JMP   PR14          ;Otherwise skip this section
PR13: CALL  INTST         ;Test to determine if an interrupt is pending
PR17: JNZ   PR1           ;Return if interrupt pending
PR15: MOV   A,R3          ;Get the port address
      CPL   A             ;Convert it to a negative
```

```
       INC   A
       ADD   A,#PORT1      ;Sub a from 27H to get port num-1
       RL    A
       RL    A
       RL    A             ;Multiply by eight
       ADD   A,#01
       CALL  GENINT              ;Generate an interrupt
PR14:  MOV   A,@R0         ;Get the actual CNTA buffer
       DEC   A             ;Decrement the count
       MOV   @R0,A         ;Make permanent change to cnta
       MOV   A,R4          ;Get port val
       XRL   A,#02H              ;Toggle the bit in the port
       MOV   R4,A          ;Reload it to R4
       MOV   A,R0          ;Calculate address of cntb
       ADD   A,#DIFF             ;Subtract 30H
       MOV   R0,A
       MOV   A,@R0         ;Get CNTB value
       CALL  CONTST
       XCH   A,R0          ;Oscillate, need to reload cnta from CNTB
       ADD   A,#CNTC             ;Get address of CNTA
       XCH   A,R0
       JZ    PR16          ;Test for PULSE/OSCILLATE
       CALL  CONFIG
       MOV   @R0,A         ;Loading CNTA from CNTB
       JMP   PR1           ;Restore pointers and return
PR16:  MOV   A,#02H              ;MASK TO CLEAR BIT 1
       ORL   A,R5          ;CLEAR IT FROM OPTN
       MOV   R5,A          ;Save the option value till return
       JMP   PR1
$eject
;***********************************************************************
PROC2:       MOV   R5,A          ;Save the option value in R5 till return
       MOV   A,R0          ;Save option buffer pointer
       XCH   A,R2          ;Retreive CNTA buffer pointer at the same time
       MOV   R0,A          ;Prepare to get the count for that bit
       MOV   A,@R0         ;Get the count value in Accumulator
       JB7   $+4           ;Check msb for fast or slow
       JMP   PR21          ;Not set
       JF0   PR21          ;Test F0 flag
PR2:   MOV   A,R0          ;Get the CNTA pointer
       XCH   A,R2          ;Restore CNTA, retreive OPTN pointer
       MOV   R0,A          ;Restore option pointer
```

```
      MOV   A,R5         ;Restore the option value
      RET                ;Return
PR21: DEC   A            ;Work on a copy of cnta
      JZ    PR22         ;DID IT GO TO ZERO?
      MOV   @RO,A        ;NO IT DIDN'T, DEC ACTUAL CNTA
      JMP   PR2          ;Restore pointers and return
PR22:
      MOV   A,@R1        ;Load A with INTerrupt buffer
      JB2   PR23         ;Test for interrupt on this bit
      JMP   PR24         ;Otherwise skip this section
PR23: CALL  INTST        ;Test to determine if an interrupt is pending
PR27: JNZ   PR2          ;Return if interrupt pending
PR25: MOV   A,R3         ;Get the port address
      CPL   A            ;Convert it to a negative
      INC   A
      ADD   A,#PORT1     ;Sub a from 27H to get port num-1
      RL    A
      RL    A
      RL    A            ;Multiply by eight
      ADD   A,#02
      CALL  GENINT             ;Generate an interrupt
PR24: MOV   A,@RO        ;Get the actual CNTA buffer
      DEC   A            ;Decrement the count
      MOV   @RO,A        ;Make permanent change to cnta
      MOV   A,R4         ;Get port val
      XRL   A,#04H             ;Toggle the bit in the port
      MOV   R4,A         ;Reload it to R4
      MOV   A,RO         ;Calculate address of cntb
      ADD   A,#DIFF            ;Subtract 30H
      MOV   RO,A
      MOV   A,@RO        ;Get CNTB value
      CALL  CONTST
      XCH   A,RO         ;Oscillate, need to reload cnta from CNTB
      ADD   A,#CNTC            ;Get address of CNTA
      XCH   A,RO
      JZ    PR26         ;Test for PULSE/OSCILLATE
      CALL  CONFIG
      MOV   @RO,A        ;Loading CNTA from CNTB
      JMP   PR2          ;Restore pointers and return
PR26: MOV   A,#04H             ;MASK TO CLEAR BIT 2
      ORL   A,R5         ;CLEAR IT FROM OPTN
      MOV   R5,A         ;Save the option value till return
```

```
        JMP   PR2

PROC3:        MOV   R5,A        ;Save the option value in R5 till return
        MOV   A,R0        ;Save option buffer pointer
        XCH   A,R2        ;Retreive CNTA buffer pointer at the same time
        MOV   R0,A        ;Prepare to get the count for that bit
        MOV   A,@R0       ;Get the count value in Accumulator
        JB7   $+4         ;Check msb for fast or slow
        JMP   PR31        ;Not set
        JF0   PR31        ;Test F0 flag
PR3:    MOV   A,R0        ;Get the CNTA pointer
        XCH   A,R2        ;Restore CNTA, retreive OPTN pointer
        MOV   R0,A        ;Restore option pointer
        MOV   A,R5        ;Restore the option value
        RET               ;Return
PR31:   DEC   A           ;Work on a copy of cnta
        JZ    PR32        ;DID IT GO TO ZERO?
        MOV   @R0,A       ;NO IT DIDN'T, DEC ACTUAL CNTA
        JMP   PR3         ;Restore pointers and return
PR32:
        MOV   A,@R1       ;Load A with INTerrupt buffer
        JB3   PR33        ;Test for interrupt on this bit
        JMP   PR34        ;Otherwise skip this section
PR33:   CALL  INTST       ;Test to determine if an interrupt is pending
PR37:   JNZ   PR3         ;Return if interrupt pending
PR35:   MOV   A,R3        ;Get the port address
        CPL   A           ;Convert it to a negative
        INC   A
        ADD   A,#PORT1    ;Sub a from 27H to get port num-1
        RL    A
        RL    A
        RL    A           ;Multiply by eight
        ADD   A,#03H            ;ADD 3
        CALL  GENINT            ;Generate an interrupt
PR34:   MOV   A,@R0       ;Get the actual CNTA buffer
        DEC   A           ;Decrement the count
        MOV   @R0,A       ;Make permanent change to cnta
        MOV   A,R4        ;Get port val
        XRL   A,#08H            ;Toggle the bit in the port
        MOV   R4,A        ;Reload it to R4
        MOV   A,R0        ;Calculate address of cntb
        ADD   A,#DIFF           ;Subtract 30H
```

```
        MOV     R0,A
        MOV     A,@R0           ;Get CNTB value
        CALL    CONTST
        XCH     A,R0            ;Oscillate, need to reload cnta from CNTB
        ADD     A,#CNTC                 ;Get address of CNTA
        XCH     A,R0
        JZ      PR36            ;Test for PULSE/OSCILLATE
        CALL    CONFIG
        MOV     @R0,A           ;Loading CNTA from CNTB
        JMP     PR3             ;Restore pointers and return
PR36:   MOV     A,#08H                  ;MASK TO CLEAR BIT 3
        ORL     A,R5            ;CLEAR IT FROM OPTN
        MOV     R5,A            ;Save the option value till return
        JMP     PR3
$eject
;**************************************************************************
PROC4:          MOV     R5,A            ;Save the option value in R5 till return
        MOV     A,R0            ;Save option buffer pointer
        XCH     A,R2            ;Retreive CNTA buffer pointer at the same time
        MOV     R0,A            ;Prepare to get the count for that bit
        MOV     A,@R0           ;Get the count value in Accumulator
        JB7     $+4             ;Check msb for fast or slow
        JMP     PR41            ;Not set
        JF0     PR41            ;Test F0 flag
PR4:    MOV     A,R0            ;Get the CNTA pointer
        XCH     A,R2            ;Restore CNTA, retreive OPTN pointer
        MOV     R0,A            ;Restore option pointer
        MOV     A,R5            ;Restore the option value
        RET                     ;Return
PR41:   DEC     A               ;Work on a copy of cnta
        JZ      PR42            ;DID IT GO TO ZERO?
        MOV     @R0,A           ;NO IT DIDN'T, DEC ACTUAL CNTA
        JMP     PR4             ;Restore pointers and return
PR42:
        MOV     A,@R1           ;Load A with INTerrupt buffer
        JB4     PR43            ;Test for interrupt on this bit
        JMP     PR44            ;Otherwise skip this section
PR43:   CALL    INTST           ;Test to determine if an interrupt is pending
PR47:   JNZ     PR4             ;Return if interrupt pending
PR45:   MOV     A,R3            ;Get the port address
        CPL     A               ;Convert it to a negative
        INC     A
```

```
        ADD   A,#PORT1     ;Sub a from 27H to get port num-1
        RL    A
        RL    A
        RL    A            ;Multiply by eight
        ADD   A,#04
        CALL  GENINT             ;Generate an interrupt
PR44:   MOV   A,@R0        ;Get the actual CNTA buffer
        DEC   A            ;Decrement the count
        MOV   @R0,A        ;Make permanent change to cnta
        MOV   A,R4         ;Get port val
        XRL   A,#10H             ;Toggle the bit in the port
        MOV   R4,A         ;Reload it to R4
        MOV   A,R0         ;Calculate address of cntb
        ADD   A,#DIFF            ;Subtract 30H
        MOV   R0,A
        MOV   A,@R0        ;Get CNTB value
        CALL  CONTST
        XCH   A,R0         ;Oscillate, need to reload cnta from CNTB
        ADD   A,#CNTC            ;Get address of CNTA
        XCH   A,R0
        JZ    PR46         ;Test for PULSE/OSCILLATE
        CALL  CONFIG
        MOV   @R0,A        ;Loading CNTA from CNTB
        JMP   PR4          ;Restore pointers and return
PR46:   MOV   A,#10H             ;MASK TO CLEAR BIT 4
        ORL   A,R5         ;CLEAR IT FROM OPTN
        MOV   R5,A         ;Save the option value till return
        JMP   PR4
$eject
;*****************************************************************************
PROC5:        MOV   R5,A         ;Save the option value in R5 till return
        MOV   A,R0         ;Save option buffer pointer
        XCH   A,R2         ;Retreive CNTA buffer pointer at the same time
        MOV   R0,A         ;Prepare to get the count for that bit
        MOV   A,@R0        ;Get the count value in Accumulator
        JB7   $+4          ;Check msb for fast or slow
        JMP   PR51         ;Not set
        JF0   $+4
        JMP   PR5
        JMP   PR51         ;Test F0 flag
PR5:    MOV   A,R0         ;Get the CNTA pointer
        XCH   A,R2         ;Restore CNTA, retreive OPTN pointer
```

```
        MOV   R0,A          ;Restore option pointer
        MOV   A,R5          ;Restore the option value
        RET                 ;Return
PR51:   DEC   A             ;Work on a copy of cnta
        JZ    PR52          ;DID IT GO TO ZERO?
        MOV   @R0,A         ;NO IT DIDN'T, DEC ACTUAL CNTA
        JMP   PR5           ;Restore pointers and return
PR52:
        MOV   A,@R1         ;Load A with INTerrupt buffer
        JB5   PR53          ;Test for interrupt on this bit
        JMP   PR54          ;Otherwise skip this section
PR53:   CALL  INTST         ;Test to determine if an interrupt is pending
PR57:   JNZ   PR5           ;Return if interrupt pending
PR55:   MOV   A,R3          ;Get the port address
        CPL   A             ;Convert it to a negative
        INC   A
        ADD   A,#PORT1      ;Sub a from 27H to get port num-1
        RL    A
        RL    A
        RL    A             ;Multiply by eight
        ADD   A,#05H
        CALL  GENINT              ;Generate an interrupt
PR54:   MOV   A,@R0         ;Get the actual CNTA buffer
        DEC   A             ;Decrement the count
        MOV   @R0,A         ;Make permanent change to cnta
        MOV   A,R4          ;Get port val
        XRL   A,#20H              ;Toggle the bit in the port
        MOV   R4,A          ;Reload it to R4
        MOV   A,R0          ;Calculate address of cntb
        ADD   A,#DIFF             ;Subtract 30H
        MOV   R0,A
        MOV   A,@R0         ;Get CNTB value
        CALL  CONTST
        XCH   A,R0          ;Oscillate, need to reload cnta from CNTB
        ADD   A,#CNTC             ;Get address of CNTA
        XCH   A,R0
        JZ    PR56          ;Test for PULSE/OSCILLATE
        CALL  CONFIG
        MOV   @R0,A         ;Loading CNTA from CNTB
        JMP   PR5           ;Restore pointers and return
PR56:   MOV   A,#20H              ;MASK TO CLEAR BIT 5
        ORL   A,R5          ;CLEAR IT FROM OPTN
```

```
        MOV   R5,A          ;Save the option value till return
        JMP   PR5
$eject
;*****************************************************************************
PROC6:        MOV    R5,A         ;Save the option value in R5 till return
        MOV   A,R0          ;Save option buffer pointer
        XCH   A,R2          ;Retreive CNTA buffer pointer at the same time
        MOV   R0,A          ;Prepare to get the count for that bit
        MOV   A,@R0         ;Get the count value in Accumulator
        JB7   $+4           ;Check msb for fast or slow
        JMP   PR61          ;Not set
        JF0   PR61          ;Test F0 flag
PR6:    MOV   A,R0          ;Get the CNTA pointer
        XCH   A,R2          ;Restore CNTA, retreive OPTN pointer
        MOV   R0,A          ;Restore option pointer
        MOV   A,R5          ;Restore the option value
        RET                 ;Return
PR61:   DEC   A             ;Work on a copy of cnta
        JZ    PR62          ;DID IT GO TO ZERO?
        MOV   @R0,A         ;NO IT DIDN'T, DEC ACTUAL CNTA
        JMP   PR6           ;Restore pointers and return
PR62:
        MOV   A,@R1         ;Load A with INTerrupt buffer
        JB6   PR63          ;Test for interrupt on this bit
        JMP   PR64          ;Otherwise skip this section
PR63:   CALL  INTST         ;Test to determine if an interrupt is pending
PR67:   JNZ   PR6           ;Return if interrupt pending
PR65:   MOV   A,R3          ;Get the port address
        CPL   A             ;Convert it to a negative
        INC   A
        ADD   A,#PORT1      ;Sub a from 27H to get port num-1
        RL    A
        RL    A
        RL    A             ;Multiply by eight
        ADD   A,#06H
        CALL  GENINT               ;Generate an interrupt
PR64:   MOV   A,@R0         ;Get the actual CNTA buffer
        DEC   A             ;Decrement the count
        MOV   @R0,A         ;Make permanent change to cnta
        MOV   A,R4          ;Get port val
        XRL   A,#40H               ;Toggle the bit in the port
        MOV   R4,A          ;Reload it to R4
```

```
        MOV     A,R0            ;Calculate address of cntb
        ADD     A,#DIFF                 ;Subtract 30H
        MOV     R0,A
        MOV     A,@R0           ;Get CNTB value
        CALL    CONTST
        XCH     A,R0            ;Oscillate, need to reload cnta from CNTB
        ADD     A,#CNTC                 ;Get address of CNTA
        XCH     A,R0
        JZ      PR66            ;Test for PULSE/OSCILLATE
        CALL    CONFIG
        MOV     @R0,A           ;Loading CNTA from CNTB
        JMP     PR6             ;Restore pointers and return
PR66:   MOV     A,#40H                  ;MASK TO CLEAR BIT 6
        ORL     A,R5            ;CLEAR IT FROM OPTN
        MOV     R5,A            ;Save the option value till return
        JMP     PR6
$eject
;***********************************************************************
PROC7:          MOV     R5,A            ;Save the option value in R5 till return
        MOV     A,R0            ;Save option buffer pointer
        XCH     A,R2            ;Retreive CNTA buffer pointer at the same time
        MOV     R0,A            ;Prepare to get the count for that bit
        MOV     A,@R0           ;Get the count value in Accumulator
        JB7     $+4             ;Check msb for fast or slow
        JMP     PR71            ;Not set
        JF0     PR71            ;Test F0 flag
PR7:    MOV     A,R0            ;Get the CNTA pointer
        XCH     A,R2            ;Restore CNTA, retreive OPTN pointer
        MOV     R0,A            ;Restore option pointer
        MOV     A,R5            ;Restore the option value
        RET                     ;Return
PR71:   DEC     A               ;Work on a copy of cnta
        JZ      PR72            ;DID IT GO TO ZERO?
        MOV     @R0,A           ;NO IT DIDN'T, DEC ACTUAL CNTA
        JMP     PR7             ;Restore pointers and return
PR72:
        MOV     A,@R1           ;Load A with INTerrupt buffer
        JB7     PR73            ;Test for interrupt on this bit
        JMP     PR74            ;Otherwise skip this section
PR73:   CALL    INTST           ;Test to determine if an interrupt is pending
PR77:   JNZ     PR7             ;Return if interrupt pending
PR75:   MOV     A,R3            ;Get the port address
```

```
      CPL   A             ;Convert it to a negative
      INC   A
      ADD   A,#PORT1      ;Sub a from 27H to get port num-1
      RL    A
      RL    A
      RL    A             ;Multiply by eight
      ADD   A,#07H              ;Add 7 offset
      CALL  GENINT              ;Generate an interrupt
PR74: MOV   A,@R0         ;Get the actual CNTA buffer
      DEC   A             ;Decrement the count
      MOV   @R0,A         ;Make permanent change to cnta
      MOV   A,R4          ;Get port val
      XRL   A,#80H              ;Toggle the bit in the port
      MOV   R4,A          ;Reload it to R4
      MOV   A,R0          ;Calculate address of cntb
      ADD   A,#DIFF             ;Subtract 30H
      MOV   R0,A
      MOV   A,@R0         ;Get CNTB value
      CALL  CONTST
      XCH   A,R0          ;Oscillate, need to reload cnta from CNTB
      ADD   A,#CNTC             ;Get address of CNTA
      XCH   A,R0
      JZ    PR76          ;Test for PULSE/OSCILLATE
      CALL  CONFIG
      MOV   @R0,A         ;Loading CNTA from CNTB
      JMP   PR7           ;Restore pointers and return
PR76: MOV   A,#80H              ;MASK TO CLEAR BIT 7
      ORL   A,R5          ;CLEAR IT FROM OPTN
      MOV   R5,A          ;Save the option value till return
      JMP   PR7
$eject
;************************************************************************
;                                                              *
;     PTIN:                                                    *
;This routine will read in a port value and save the result in R4 *
;************************************************************************
PTIN: MOV   A,R3          ;Get the address of the port buffer
      XCH   A,R0          ;Put it in R0, save prev R0 in A
      MOV   R3,A          ;Save R0 in R3
      MOV   A,@R0         ;Read the port
      MOV   R4,A          ;Save the port value in R4
      MOV   A,R3          ;Retrieve R0 from R3
```

```
      XCH   A,R0          ;Restore R0 in R0
      MOV   R3,A          ;Put port pointer in R3
      RET
;*********************************************************************
;                                                      *
;     OUTPRT:                                                *
;This routine will write out to the correct port, the most recent change*
;The address of the port buffer pointer will be used to select the port *
;*********************************************************************
      NOP
      NOP
      NOP
OUTPRT:     MOV   A,R3          ;Get the pointer to port
      XCH   A,R0          ;Put port pointer in R0, Save OPTN pointer too
      MOV   R3,A          ;Keep option buffer pointer in R3
      MOV   A,R0          ;Get the actual port address
      XRL   A,#PORT6      ;Test for writing out port 6
      JNZ   $+4
      JMP   PRT6          ;Write it out if A=0
      MOV   A,R0          ;Get the actual port address
      XRL   A,#PORT5      ;Test for writing out port 5
      JNZ   $+4
      JMP   PRT5          ;Write it out if A=0
      MOV   A,R0          ;Get the actual port address
      XRL   A,#PORT4      ;Test for writing out port 4
      JNZ   $+4
      JMP   PRT4          ;Write it out if A=0
      MOV   A,R0          ;Get the actual port address
      XRL   A,#PORT3      ;Test for writing out port 3
      JZ    PRT3          ;Write it out if A=0
      MOV   A,R0          ;Get the actual port address
      XRL   A,#PORT2      ;Test for writing out port 2
      JNZ   $+4
      JMP   PRT2          ;Write it out if A=0
      JMP   PT1           ;Write out port 1 by default
PRT6: MOV   A,R4          ;Get tha actual port value
      MOV   @R0,A         ;Write it out (non-visible port)
      JMP   PRTEND              ;Restore pointers and return
PRT5: ANL   P2,#30H             ;Address the expander port
      ORL   P2,#PT5             ;  "      "     "     "
PRT3A:      MOV   A,R4          ;Get the actual port value
      MOV   @R0,A         ;Write out the port to the buffer
```

```
        CPL   A            ;Invert the bits
        MOVD  P6,A         ;Write out the lower nibble
        SWAP  A
        MOVD  P7,A         ;Write out the high nibble
        SWAP  A
        JMP   PRTEND             ;Restore the pointers and return
PRT4:   ANL   P2,#30H            ;Address the expander port
        ORL   P2,#PT4            ;  "       "       "       "
PRT2A:        MOV   A,R4         ;Get the port value
        MOV   @RO,A        ;Write out the port to the buffer
        CPL   A            ;Invert the bits
        MOVD  P4,A         ;Write out the lower nibble
        SWAP  A            ;Reverse the nibbles
        MOVD  P5,A         ;Write out the high nibble
        SWAP  A            ;Retore the nibbles
        JMP   PRTEND             ;Restore the pointers and return
PRT3:   ANL   P2,#30H            ;Address the port expander
        ORL   P2,#PT3            ;  "       "    "       "
        JMP   PRT3A
PRT2:   ANL   P2,#30H            ;Address the port expander
        ORL   P2,#PT2            ;  "       "    "       "
        JMP   PRT2A
PT1:    MOV   A,R4         ;Get the actual port value
        MOV   @RO,A        ;Write out the port value to the port buffer
        CPL   A            ;Invert the bits
        OUTL  P1,A         ;Write out the byte to port1
PRTEND:       MOV   A,R3         ;Get the option buffer pointer in Accumulator
        XCH   A,RO         ;Put OPTN in RO, port pointer in Accumulator
        MOV   R3,A         ;Port pointer in R3
        RET
INIT1:        MOV   A,#TIMER     ;Iinitialize the clock
        MOV   T,A
        STRT  T
        RETR               ;Reset any pending or current interrupts.
$eject
;***************************************************************************
;                                                              *
;       CMND:                                                  *
;                                                              *
;This routine is executed every time there is an interrupt from the      *
;88/25. This routine sets up the points to pulse/oscillate or it sets    *
;or clears points. Performing any new function on any point will  *
```

```
;redefine that point. There are several types of commands that the 88/25*
;can send to to this processor. They are described in detail in the     *
;design document chapter 12. As the various routines are encountered    *
;in this section that perform the commands, there specifics will be     *
;discussed. This main processing routine simply reads the command and   *
;jumps to the routine that will process it after setting a few special  *
;flags.                                                                  *
;*************************************************************************

      ORG   350H
CMND: JNIBF ERROR
      SEL   RB1
      MOV   R6,A
      JF1   CMND0        ;JUMP TO CMND0 IF A0 SET
      IN    A,DBB        ;READ THE ARGUMENT
      MOV   R7,A         ;SAVE IT IN R7
      JMP   CM1
CMND0:      IN    A,DBB        ;GET COMMAND
      MOV   R7,A         ;SAVE ARG 0 IN R7 FOR WHEN IT IS NEEDED
      XRL   A,#0FFH            ;CHECK FOR SPECIAL CASE #1
      JNZ   $+4
      JMP   INIT
      MOV   A,R7         ;GET ARG 0
      XRL   A,#0FEH            ;TEST FOR READ INTERRUPT COMMAND
      JNZ   CMND1
      MOV   R0,#INTREC
      MOV   A,@R0
      ANL   P2,#0EFH
      OUT   DBB,A
      INC   R0
      CLR   A
      MOV   @R0,A
      MOV   A,R6         ;RESTORE THE ACCUMMULATOR
      RETR
CMND1:      MOV   A,R7
      XRL   A,#0FDH            ;CHECK FOR SPECIAL CASE #2
      JNZ   $+7
      ORL   P2,#30H
      EN    FLAGS
      MOV   A,R6
ERROR:      RETR
      MOV   A,R7
```

```
        XRL     A,#0FCH          ;CHECK FOR SPECIAL CASE #3
        JNZ     $+6
        ANL     P2,#0EFH
        MOV     A,R6
        RETR
        MOV     A,R7
        ANL     A,#0C0H          ;MASK OUT ALL BUT BITS 6 & 7 TO USE FOR A JUMP
        SWAP    A                ;THE ACC HAS A COUNT IN IT THAT MUST BE SWAPPED
        RR      A                ;AND ROTATED TO GET IN THE LOWER TWO BITS
        RR      A                ;THE COUNT WILL BE USED TO SELECT THE CORRECT
        JZ      W100             ;PROCESSING ROUTINE.
        DEC     A
        JZ      W101             ;W=WRITE/THE NUMBERS REFER TO A0,BIT7,BIT6 OF
        DEC     A                ;THE COMMAND
        JZ      $+4
        JMP     W111
        JMP     W110
CM1:    ANL     A,#0C0H          ;MASK OUT ALL BUT BITS 6,7 AS DESCRIBED ABOVE
        SWAP    A
        RR      A
        RR      A
        JZ      $+4
        JMP     $+4
        JMP     R000             ;R=READ/ THE NUMBERS ARE DESCRIBED ABOVE
        DEC     A
        JZ      $+4
        JMP     R010
        JMP     R001
$eject
;**************************************************************************
;                                                             *
;       W100/W101:                                            *
;                                                             *
;W100 is a routine that clears a bit/byte/reg in a port, or does a      *
;direct replace.                                              *
;W101 is a routine that sets a bit/byte/reg in a port. These two  *
;routines are resident with each other since their code is essentially  *
;identical. The F0 flag is set for "SET" and clear for "CLEAR". The     *
;"CARRY" flag is set for direct replace.                           *
;**************************************************************************

W101: CLR   F0           ;SET THE F0 FLAG FOR -SET-
```

```
      CPL   F0
      JMP   W100+1
W100: CLR   F0          ;CLEAR THE F0 FLAG FOR -CLEAR-
      MOV   A,R7        ;RESTORE ARG 0
      ANL   A,#30H             ;Prepare to test for byte commands
      JZ    WL2
      XRL   A,#30H             ;Test for byte commands
      JNZ   WL2
      JMP   W200
WL2:  MOV   A,R7        ;Restore the command
      ANL   A,#07H             ;SET UP A COUNTER WITH BITS 0,1,2
      JF0   WL1         ;DETERMINE WHICH CONSTANT TO LOAD
      MOV   R2,#0FEH    ;LOAD A 0 IN POSITION 0 FOR CLEAR
      JMP   LOOP1
WL1:  MOV   R2,#01H            ;LOAD A 1 IN POSITION 0 FOR SET
LOOP1:      JZ    W200A
      DEC   A           ;DECREMENT THE COUNTER
      XCH   A,R2
      RL    A           ;MOV THE BIT TO THE NEXT POSITION LEFT
      XCH   A,R2
      JMP   LOOP1       ;CONTINUE TO ROTATE THE BIT TILL COUNT = 0
W200A:      JF0   $+4          ;JUMP TO PORT SELECT AND SET ROUTINE
      JMP   PCLR        ;JUMP TO THE PORT SELECT AND CLEAR ROUTINE
      JMP   PSET        ;NO RETURN FROM THESE ROUTINES
W200: MOV   A,R7        ;Restore command
      JB3   $+4         ;TEST BIT 3 FOR MODIFY OR REPLACE REGISTER
      JMP   W201        ;MODIFY ACCORDING TO ARG
      CLR   C           ;SET THE CARRY TO REPLACE REGISTER
      CPL   C
      JMP   W201+1
W201: CLR   C           ;CLEAR THE CARRY TO MODIFY
      ORL   A,#0F8H            ;TEST FOR A 111 PATTERN IN BITS 0,1,2
      CPL   A           ;COMPLIMENT TO TEST IF ZERO
      JZ    $+4         ;A 0 MEANS A 6 BYTE ARGUMENT IS WAITING TO
      JMP   $+4         ;BE READ
      JMP   W400
      JNIBF $-0         ;WAIT TILL DATA IS PRESENTED
      IN    A,DBB       ;GET THE ARGUMENT FROM THE 88/25
      JF0   $+5         ;ARG MUST BE COMPLIMENTED FOR CLEAR OPERATION
      JC    $+3         ;ARG MUST NOT BE COMPLIMENTED FOR REPLACE
      CPL   A           ;COMPLIMENT THE ARGUMENT IF WE ARE TO CLEAR
      MOV   R2,A        ;SAVE IT IN R2 FOR FUTURE USE
```

```
      MOV   R0,#PORT1
      MOV   R1,#OPTN1
      MOV   A,R7          ;RESTORE ARG 0
      ANL   A,#07H              ;USE BITS 0,1,2 AS A WAY TO SELECT WHAT PORT
WL4:  JZ    WL3
      DEC   R0
      INC   R1
      DEC   A             ;DECREMENT THE COUNTER TO TEST FOR PORT 2
      JMP   WL4
WL3:  CALL  PRT1          ;Load the port
      CALL  OUTPRT              ;Write out the new port value
      MOV   A,R6
      RETR
W400: MOV   R5,#06
      MOV   R0,#PORT1
      MOV   R1,#OPTN1
WL5:  JNIBF $-0           ;READ THE FIRST OF SIX ARGUMENTS
      IN    A,DBB         ;READ FIRST ARG
      JC    WL6           ;JUMP PAST THIS SECTION IF REPLACING
      JFO   WL6           ;DO NOT COMPLIMENT ARGUMENTS IF SETTING
      CPL   A             ;COMPLIMENT FOR CLEAR
WL6:  MOV   R2,A          ;PASS ARGUMENT IN R2
      CALL  PRT1          ;PRT1/24/35/6 WILL PROCESS ACCORDING TO F0/C
      CALL  OUTPRT
      DEC   R0
      INC   R1            ;OPTN2 PTR FOR PORT 2
      DJNZ  R5,WL5              ;Loop back for next argument
      MOV   A,R6
      RETR
$eject
;***************************************************************************
;                                                         *
;     PRT1/24/35/6:                                               *
;                                                         *
;The following routines are designed to off load some of the port        *
;addressing. They are set up to do either a set, clear, or replace.      *
;Setting up to read from the port expander is done prior to the call.    *
;The argument is passed in R2. The F0 flag is used to determine if the   *
;operation is a "SET" or a "CLEAR" and the carry flag is used to  *
;detemine if it is a direct replace.                             *
;Replacing the output port automatically resets the optn buffer to zero.*
;***************************************************************************
```

```
PRT1: JC    REPLC1          ;CHECK THE CARRY FIRST FOR REPLACES
      MOV   A,@R0       ;READ IN FROM PORT 1 BUFFER
      JF0   SET1        ;NEXT CHECK F0 FOR A SET OPERATION
      ANL   A,R2        ;CLEAR THE POINT(S) IN THE PORT
      MOV   @R0,A
      MOV   R4,A
      MOV   A,R2        ;RESTORE THE ARGUMENT
END1: ANL   A,@R1       ;ALWAYS CLEAR THE OPTION BUFFER POINTS
      MOV   @R1,A
      MOV   A,R0        ;Get the port pointer
      MOV   R3,A        ;Pass the port pointer in R3
      RET
SET1: ORL   A,R2        ;SET THE POINT(S) IN PORT 1
      MOV   @R0,A
      MOV   R4,A
      MOV   A,R2        ;RESTORE THE ARGUMENT
      CPL   A           ;COMPLIMENT IT TO CLEAR THE POINT(S) IN OPTN
      JMP   END1
REPLC1:     MOV   A,R2
      MOV   @R0,A
      MOV   R4,A
      CLR   A           ;CLEAR A SO WE CLEAR ALL OF THE OPTN BUFFER
      JMP   END1
$EJECT
;***********************************************************************
;                                                          *
;     OSCPUL:                                                    *
;This is the routine called by W111 & W110 to load the count for pulse  *
;and oscillate. The count is stored in R5. The CNTA buffer pointer is in*
;R1. CNTB buffer is calculated from CNTA.                        *
;                                                          *
;In this routine it is necessary to clear the CNTB buffer if the point  *
;is only to be pulsed. Another thing to remember is that  a pulsed bit  *
;needs to be toggled right now so that the count down routine in main   *
;will eventually restore it to its original value.               *
;                                                          *
;Another item to be noted is that the F0 flag and carry are being used  *
;differently in this segment of code since the two are mutually     *
;exclusive. F0 here is set for pulse and clear for oscillate.           *
;***********************************************************************

OSCPUL:     MOV   A,R2        ;LOAD THE BIT PATTERN FROM R2
```

```
      ORL    A,@RO         ;SET THE BIT IN THE OPTION BUFFER
      MOV    @RO,A
      MOV    A,#0FH              ;MASK TO KEEP THE RIGHT NIBBLE
      ANL    A,RO          ;OF RO TO GET THE PORT COUNTER
      CPL    A
      INC    A             ;GET THE TWO'S COMPLIMENT
      ADD    A,#08H              ;SUBTRACT FROM 8 TO GET THE COUNT BETWEEN 1-6
      DEC    A
      MOV    R0,#PORT6
      ADD    A,R0
      MOV    R0,A          ;SET UP THE PORT ADDRESS
      MOV    A,R5          ;GET THE ARGUMENT TO TEST FOR BIT 6
      JB6    OSC1          ;TEST BIT 6
      MOV    A,R2          ;GET THE BIT PATTERN
      CPL    A             ;COMPLIMENT TO CLEAR
      ANL    A,@R0         ;CLEAR THE PORT VALUE (FORCE)
      MOV    @R0,A         ;WRITE OUT THE  CHANGE
      JMP    PEND
OSC1: MOV    A,R2          ;GET THE BIT PATTERN
      ORL    A,@R0         ;SET THE BIT IN THE PORT
      MOV    @R0,A         ;WRITE OUT THE NEW VALUE
PEND: MOV    A,R5          ;LOAD ARG 1
      CPL    A             ;BEGIN TO TEST IF WE NEED TO MODIFY THE COUNT
      JB7    PEND1
      CPL    A             ;RESTORE ORIGINAL VALUE
      ANL    A,#0FH
      JMP    PEND1+1             ;BY PASS THE CPL COMMAND
PEND1:       CPL   A
      MOV    @R1,A         ;LOAD THE COUNT INTO CNTA^
      XCH    A,R1
      ADD    A,#DIFF             ;CALCULTATE ADDRESS OF CNTB^
      XCH    A,R1
      JF0    PEND2
      MOV    A,R5          ;RELOAD THE CORRECT COUNT
      MOV    @R1,A         ;LOAD THAT COUNT ALSO FOR OSCILLATE
      MOV    A,R6
      RETR
PEND2:       MOV    @R1,#00H    ;MUST ENSURE THAT CNTB IS CLEAR FOR PULSED
      MOV    A,R6
      RETR
$eject
;**************************************************************************
```

```
;                                                          *
;     W110/W111:                                           *
;                                                          *
;W110 is the routine that will set the bit for pulse. W111 is the      *
;routine that will set bits to oscillate. These two routines are  *
;resident with each other. The F0 flag is set for pulse, not set for    *
;oscillate                                                 *
;**************************************************************************

W110: CLR   F0
      CPL   F0          ;SET F0 FOR PULSE ONLY
      JMP   W111+1
W111: CLR   F0          ;CLEAR F0 TO OSCILLATE
      JNIBF $-0
      IN    A,DBB       ;GET NEXT ARGUMENT
      MOV   R5,A        ;STORE IT IN R5 FOR FUTURE REFERENCE IN OSCPUL
      MOV   R1,#CNTA    ;LOAD CNTA BUFFER POINTER
      MOV   A,R7        ;RESTORE ARG 0
      ANL   A,#3FH            ;DELETE BITS 6 & 7
LOOP2:      JZ    W20         ;CALCULATE THE ADDRESS FOR THE CNTA BUFFER
      DEC   A           ;DECREMENT THE COUNT
      INC   R1          ;INCREMENT THE POINTER
      JMP   LOOP2
W20:  MOV   A,R7        ;RESTORE ARG 0
      ANL   A,#07H            ;SET UP A BIT COUNTER
      MOV   R2,#01H           ;LOAD A BIT TO ROTATE
LOOP3:      JZ    W21
      DEC   A
      XCH   A,R2
      RL    A
      XCH   A,R2
      JMP   LOOP3
W21:  MOV   A,R7        ;RESTORE ARG 0 AGAIN
      ANL   A,#38H            ;SET UP A PORT COUNTER
      RR    A           ;ROTATE A RIGHT 3 TIMES TO GET A COUNT FROM 0
      RR    A           ;TO 5
      RR    A
      MOV   R0,#OPTN1   ;LOAD ADDRESS FOR OPTION BUFFER 1
W22:  JNZ   W23
      JMP   OSCPUL            ;Set the bit to oscillate or pulse/ no return
W23:  DEC   A           ;Next port to point to
      INC   R0          ;Next option buffer pointer
```

```
     JMP   W22
$eject
;************************************************************************
;                                                          *
;     STATUS:                                                   *
;                                                          *
;This routine is responsible for determining the status of a bit whether*
;it be a set, clear, pulse, or oscillating bit. It will also prepare the*
;output message to be sent to the 88/25 when requesting information on  *
;the status of a bit.                                           *
;************************************************************************

STATUS:      MOV   A,@RO ;LOAD THE OPTN FROM ADDRESS IN RO
      XCH   A,R2        ;EXCHANGE OPTN VAL WITH COUNT
      JZ    $+11        ;BREAK IF DONE
      DEC   A           ;DECREMENT , ROTATE BIT TO POSITION 7
      XCH   A,R2        ;GET THE OPTN VAL IN A
      RL    A           ;ROTATE IT LEFT
      XCH   A,R2        ;XCH COUNT W OPTN VAL AGAIN
      XCH   A,R4        ;GET THE PORT VAL
      RL    A           ;ROTATE LEFT ALSO THE PORT VALUE
      XCH   A,R4        ;RESTORE PORT AND COUNT
      JMP   $-9         ;LOOP TILL BIT IS IN MSB POSITION
      MOV   A,R2        ;GET OPTN VAL IN A
      JB7   PULOSC            ;TEST BIT 7 FOR SET/CLEAR OR PULSE/OSCILLATE
      MOV   A,#80H            ;LOAD MASK FOR THE PORT
      ANL   A,R4        ;SAVE THE BIT FROM THE PORT
SETB: OUT   DBB,A       ;NO NEED TO MODIFY CODE FOR SET
      MOV   A,R6
      RETR
PULOSC:      MOV   A,@R1      ;LOAD THE COUNT BUFFER B TO BE TESTED
      JNZ   OSC         ;TEST FOR OSCILLATING
      MOV   A,#80H            ;LOAD A MASK FOR THE PORT
      ANL   A,R4        ;SAVE THE MSB OF PORT
      ORL   A,#60H            ;CODE FOR PULSE
      JMP   SETB
OSC:  MOV   A,#80H            ;MASK FOR PORT
      ANL   A,R4
      ORL   A,#40H            ;CODE FOR OSCILLATE
      JMP   SETB
$eject
;************************************************************************
```

```
;                                                              *
;     READ1/24/35/6:                                                *
;                                                              *
;The following group of routines simply read a port write out its value *
;All setting up to read is done before the call. Notice that two of the *
;routine can read either of two ports 2&4 or 3&5. This is due to the    *
;nature of the 8342 port expanders.                                 *
;**********************************************************************

READ1:       JOBF  $-0          ;WAIT TILL IT IS CLEAR TO SEND THE DATA
      MOV    A,@R0
      OUT    DBB,A
      RET

;**********************************************************************
;                                                              *
;     R000:                                                    *
;                                                              *
;R000  is the first of three routines that are generally referred to as *
;read operations. Although this is the only operation where the 88/25   *
;reads from the 8742, they have been grouped together in this format due*
;to a lack of choices. This function reads a point/byte/register and    *
;returns it to the 88/25.                                           *
;**********************************************************************

R000: MOV    A,R7          ;GET ARG 0
      ANL    A,#30H               ;Keep only the byte defining bits
      XRL    A,#30H               ;Test to determine the command type
      JNZ    $+4
      JMP    R100
      MOV    R1,#CNTB      ;GET ADDRESS OF BEGINNING OF CNTB BUFFER
      MOV    A,R7          ;Restore the command/argument
R21:  JZ     R20           ;REMEMBER THAT ARG 0 IS STILL IN A
      DEC    A
      INC    R1            ;INC POINTER TO CNTB BUFFER IN CASE WE NEED IT
      JMP    R21
R20:  MOV    A,R7          ;GET ARG 0 BACK
      ANL    A,#07H               ;USE BITS 0,1,2 AS A COUNTER
      CPL    A
      INC    A             ;GET THE TWO'S COMPLIMENT
      ADD    A,#07H               ;SUBTRACT COUNT FROM 7 TO GET POSITION IN BYTE
      MOV    R2,A          ;SAVE IN R2
```

```
        MOV   A,R7          ;GET ARG 0 BACK AGAIN
        ANL   A,#38H               ;PREPARE TO TEST FOR PORTS
        JNZ   R200
        MOV   R0,#PORT1
        MOV   A,@R0
        MOV   R4,A          ;SAVE IT A
        MOV   R0,#OPTN1
        JMP   STATUS
R300A:        JMP   R300
R200:  JB3    R300A
        JB4   R400
        MOV   R0,#PORT5
        MOV   A,@R0
        MOV   R4,A          ;STORE IN R4 FOR THE STATUS ROUTINE
        MOV   R0,#OPTN5
        JMP   STATUS
R400:  MOV    R0,#PORT3
        MOV   A,@R0
        MOV   R4,A
        MOV   R0,#OPTN3
        JMP   STATUS
R300:  JB4    $+4
        JMP   $+4
        JMP   R500
        JB5   $+4
        JMP   $+4
        JMP   R600
        MOV   R0,#PORT2
        MOV   A,@R0
        MOV   R4,A
        MOV   R0,#OPTN2
        JMP   STATUS
R500:  MOV    R0,#PORT4
        MOV   A,@R0
        MOV   R4,A          ;SAVE IT IN R4
        MOV   R0,#OPTN4
        JMP   STATUS
R600:  MOV    R0,#PORT6
        MOV   A,@R0
        MOV   R4,A
        MOV   R0,#OPTN6
        JMP   STATUS
```

```
R100: ORL   A,#0F8H
      CPL   A
      JNZ   $+4
      JMP   R700
      MOV   A,R7        ;RESTORE ARG 0
      ANL   A,#07H
      MOV   R0,#PORT1
RLOOP:      JZ    REND
      DEC   A
      DEC   R0
      JMP   RLOOP
REND: CALL  READ1
      MOV   A,R6
      RETR
R700: MOV   R0,#PORT1
      CALL  READ1
      DEC   R0
      CALL  READ1
      DEC   R0
      CALL  READ1
      DEC   R0
      CALL  READ1
      DEC   R0
      CALL  READ1
      DEC   R0
      CALL  READ1
      MOV   A,R6
      RETR
$eject
;*************************************************************************
;                                                          *
;     SCINT:                                                     *
;                                                          *
;This routine is responsible for setting or clearing interrupts for      *
;the points.                                                     *
;*************************************************************************

SCINT:      MOV   A,R1  ;LOAD THE BIT PATTERN
      JMP   SC3
SC2:  ORL   A,@R0 ;SET THE INTERRUPT
SCEND:      MOV   @R0,A
      RET
```

```
SC1:  ANL   A,@RO        ;CLEAR THE INTERRUPT
      JMP   SCEND
SC3:  JFO   SC1          ;USING FO AS A FLAG TO CLEAR INTERRUPTS
      JMP   SC2          ;SET THE INTERRUPT
$eject
;************************************************************************
;                                                         *
;     R001/010:                                           *
;                                                         *
;R001 is the routine that will set interrupt capability  for any port.  *
;R010 is the routine that will reset (clear) the interrupts for any     *
;port. These two routines are resident with each other. If the F0 flag  *
;is set, then it will reset the interrupts, otherwise it will set them. *
;************************************************************************
R010: CLR   F0
      CPL   F0           ;SET THE F0 FLAG FOR RESET INTERRUPTS
      JMP   R001+1
R001: CLR   F0           ;CLEAR F0 FLAG FOR SET INTERRUPTS
      MOV   A,R7         ;RESTORE ARG 0
      ANL   A,#30H
      XRL   A,#30H
      JZ    R101
      MOV   A,R7         ;Restore the command
      ANL   A,#07H              ;STRIP OFF BITS 0,1,2 AS A COUNTER
      JF0   R01
      MOV   R1,#01H             ;Rotate a one (1)
      JMP   R04
R01:  MOV   R1,#0FEH     ;Rotate a zero (0)
R04:  JNZ   R02
      JMP   R03
R02:  DEC   A
      XCH   A,R1
      RL    A
      XCH   A,R1
      JMP   R04
R03:  MOV   A,R7         ;RESTORE ARG 0
      ANL   A,#38H              ;PREPARE TO SELECT THE INT BUFFER
      RR    A
      RR    A
      RR    A
      MOV   R0,#INT             ;Gte the address of the first interrupt buffer
R301: JZ    R10
```

```
      INC   R0
      DEC   A
      JMP   R301        ;Jump back to test the next pointer
R10:  CALL  SCINT
      MOV   A,R6
      RETR
R101: MOV   A,R7        ;Restore arg 0
      ANL   A,#07
      XRL   A,#07       ;Test for a full register operation
      JZ    R201
      JNIBF $-0
      IN    A,DBB       ;READ ARG 1
      JF0   R11
      JMP   R12
R11:  CPL   A
R12:  MOV   R1,A
      JMP   R03
R201: MOV   R5,#06            ;Count for six bytes
      MOV   R0,#INT1    ;Get te starting interrupt buffer
R14:  JNIBF $-0
      IN    A,DBB
      JF0   R15
      JMP   R16
R15:  CPL   A
R16:  MOV   R1,A
      CALL  SCINT
      DJNZ  R5,R14            ;Loop till done all six registers
      MOV   A,R6
      RETR
$eject
;*************************************************************************
;                                                        *
;     PCLR:                                              *
;                                                        *
;PCLR is a routine that will clear a bit or bits in the port selected as*
;well as in the OPTN buffer that corresponds to the port.        *
;*************************************************************************

PCLR: MOV   R1,#PORT1
      MOV   R0,#OPTN1
      MOV   A,R7        ;Get the command again
      ANL   A,#38H            ;Use the command to get a counter
```

```
       RR     A
       RR     A
       RR     A
       JNZ    PCL1
PCEND:        MOV    A,@R1
       ANL    A,R2
       MOV    @R1,A
       MOV    R4,A          ;Save the port value in R4 for OUTPRT
       MOV    A,R2
       ANL    A,@R0
       MOV    @R0,A
       MOV    A,R1          ;Get the port pointer
       MOV    R3,A          ;Pass the pointer in R3
       CALL   OUTPRT              ;This is legal because no calls are made before int
       MOV    A,R6
       RETR
PCL1:  INC    R0
       DEC    R1
       DEC    A
       JNZ    PCL2
       JMP    PCEND
PCL2:  INC    R0
       DEC    R1
       DEC    A
       JNZ    PCL3
       JMP    PCEND
PCL3:  INC    R0
       DEC    R1
       DEC    A
       JNZ    PCL4
       JMP    PCEND
PCL4:  INC    R0
       DEC    R1
       DEC    A
       JNZ    PCL5
       JMP    PCEND
PCL5:  INC    R0
       DEC    R1
       JMP    PCEND

;**********************************************************************
```

```
PSET: MOV   R1,#PORT1
      MOV   R0,#OPTN1
      MOV   A,R7  ;GET ARG 0
      ANL   A,#38H
      RR    A
      RR    A
      RR    A
      JZ    PSEN
      JMP   PSL1
PSEN: MOV   A,R2
      ORL   A,@R1
      MOV   @R1,A
      MOV   R4,A         ;Save the new value in R4 for OUTPRT
      MOV   A,@R0
      XCH   A,R2
      CPL   A
      ANL   A,R2
      MOV   @R0,A
      MOV   A,R1         ;Get the port pointer
      MOV   R3,A         ;Passs the pointer in R3
      CALL  OUTPRT             ;This is legal here, no calls in progress
      MOV   A,R6
      RETR
PSL1: INC   R0
      DEC   R1
      DEC   A
      JNZ   PSL2
      JMP   PSEN
      NOP
PSL2: INC   R0
      DEC   R1
      DEC   A
      JNZ   PSL3
      JMP   PSEN
PSL3: INC   R0
      DEC   R1
      DEC   A
      JNZ   PSL4
      JMP   PSEN
PSL4: INC   R0
      DEC   R1
      DEC   A
```

```
       JNZ    PSL5
       JMP    PSEN
PSL5:  INC    R0
       DEC    R1
       JMP    PSEN
$EJECT
INTST:        MOV    A,R1         ;SAVE R1 IN R6
       MOV    R6,A
       MOV    R1,#INTREC+1
       MOV    A,@R1
       XCH    A,R6
       MOV    R1,A         ;RESTORE R1
       MOV    A,R6         ;RESTORE ACC
       RET
GENINT:       XCH    A,R1
       XCH    A,R6
       MOV    A,R1
       MOV    R1,#INTREC
       MOV    @R1,A
       INC    R1
       MOV    @R1,#01H
       MOV    A,R6
       MOV    R1,A
       ORL    P2,#10H
       RET
$EJECT
CONTST:       JB7    CN1
       RET
CN1:   XRL    A,#40H             ;toggle the status bit
       MOV    @R0,A
       RET

CONFIG:       JB7    C7
       RET
C7:    JB6    C1           ;TEST TO SEE IF WE LOOK AT BIT 4 OR BIT 5
       JB4    C2           ;LOOK AT BIT 4 IF 6 NOT SET
       ANL    A,#8FH             ;CLEAR THE CONTROL BITS BEFORE RETURNING
       RET
C2:    ANL    A,#0FH             ;CLEAR THE TOP NIBBLE FIRST
       RL     A
       RL     A            ;MULTIPLY BY EIGHT
       RL     A
```

```
        ORL   A,#80H          ;SET THE TOP BIT
        RET
C1:     JB5   C2        ;TEST BIT FIVE WHEN 6 IS HIGH
        ANL   A,#8FH          ;CLEAR THE CONTROL BITS BEFORE RETURNING
        RET
        END
```

```
/*  DSCOMM  DSCOMM  DSCOMM  DSCOMM  DSCOMM  DSCOMM  DSCOMM  DSCOMM  DSCOMM
DSCOMM  DSCOMM
*************************************************************************************
*********************
**
                **
**        EEEEEEEEEEEEEE     TTTTTTTTTTTT          NNNNNNN     NNNNN
                **
**        EEEEEEEEEEEEE      TTTTTTTTTT            NNNNNNNN    NNNNN
                **
**        EEEEE            A      TTTT     OOO     NNNNNNNNN   NNNNN
                **
**        EEEEEEEEEEE     AAA     TTT    OOOOOOOO  NNNNN NNNN  NNNNN
                **
**        EEEEEEEEEE     AAAAA    TTT    OOOOOOOO  NNNNN  NNNN NNNNN
                **
**        EEEEE                   TTTT     OOO     NNNNN   NNNNNNNNN
                **
**        EEEEEEEEE    AAAAAAA    TTTTT            NNNNN    NNNNNNNN
                **
**        EEEEEEEE    AAAAAAAAA   TTTTTTT          NNNNN     NNNNNNN
                **
**
                **
**        This software (firmware) developed by EATON-KENWAY is proprietary.  Source
code on listings**
**           or any other media is not for sale or loan and may not be copied or
transferred to any      **
**         vendor, buyer, or consultant.  Executable code is available in ROM and is
sold with the      **
**            original product or as a product upgrade.  Buyer shall not copy or
distribute ROM's with    **
**           E-K firmware to any third party without the prior written approval of
EATON-KENWAY.         **
**           Title to and ownership of the software shall at all times remain with
EATON-KENWAY.  The    **
**         information in this is subject to change without notice and should not be
construed as a    **
**         commitment by EATON-KENWAY.
                **
**
                **
```

```
**          EATON-KENWAY   assumes  no  responsibility  for  the  use or reliability
of  its  software**
**           on  equipment which is  not supplied EATON-KENWAY or has been modified
without EATON-KENWAY**
**          approval.
                **
**          Copyright 1990                                                 KENWAY,
INCORPORATED      **
*******************************************************************************
*********************
    DSCOMM   DSCOMM   DSCOMM   DSCOMM   DSCOMM   DSCOMM   DSCOMM   DSCOMM   DSCOMM
DSCOMM   DSCOMM
   DATE CREATED:  April 1990
   AUTHOR:        L. Bruce Christensen
   DESCRIPTION:
      This firmware goes into the DSCOMM communications board DS5000 (possibly
    an 8751 )processor.  It receives a messages from the UMS (Update Marker System)
    and passes it on to the 80186 processor.  It determines if there are any
    errors in the communication between the UMS and the DSCOMM and will
    report those to the 80186 if there are any.
   DETAILS:
      There is a 5 byte "buffer" in which the serial interface (interrupt) puts
    the data.  I have tried to disable and enable the serial interrupts around
    critical areas so that the interface and the main routine are not writing
    data to the same locations at the same time.
       It is a very simple program but it plays an important part in updating
    the vehicle when the UMS sees a magnet.
   COMMUNICATION BETWEEN UMS AND DSCOMM:
    The procedure goes as follows:
       1) At startup the DSCOMM calls a procedure called "poll_the_ums".  This
           procedure talks to the UMS and waits for a response.  If for any reason
           it does not receive a message from the UMS it sends a message
           to tell the 80186 that the UMS was not communicating.
       2) During normal operation the DSCOMM will poll the UMS every 2 seconds
           just to see if he is still alive.  When the UMS sees a magnet it interrupts
           the DSCOMM with a message stating it has seen a magnet.  When it gets
           the message it checks it to see if it is a good message according
           to the protocall discribed below.  If it is a good message it sends
           the data from the UMS to the 80186.
       3) The 80186 can send down a command to the DSCOMM at any time requesting
           that it poll the UMS again.  This sets a bit and the main task will
           then call the routine "poll_the_ums" again.
```

```
The message sent by the UMS to the DSCOMM is as follows:

     1st byte    2nd byte      3rd byte       4th byte     5th byte
       sent        sent          sent           sent         sent
    |--------|-------------|--------------|------------|--------------|
    |command |UMS Magnet   |UMS Magnet    | notted data| notted data  |
    |        |data low byte|data high byte| low byte   | high byte    |
    |--------|-------------|--------------|------------|--------------|
    command       data          data          ~data         ~data
     (byte)    (low byte)    (high byte)    (low byte)   (high byte)

  The UMS will send 5 bytes of data.  The first is the command signaling the
   message that follows is a found magnet message.  On a poll to the UMS
   it will only send back a ACK and no data.  This just signals that the UMS
   is still active and working.
  The "notted" bytes are for error checking.  This is just a simpleminded way
  to error check the message.
  The DSCOMM will responde with 1 byte of data (ascii ACK) value of 6.  The
   UMS will continue to transmit its 5 bytes until it receives a ACK from
   the DSCOMM.
PROGRAM HISTORY:
Date         Initials/No.   Description
---------    ------------   ------------------------------------------------
July 7,90    L.B.C.         Version 1.0 initial release
                            Changed the program to talk to only one UMS in
                             the center of the vehicle instead of 2 one on
                             each end of the vehicle.
OCT 25,90    L.B.C.         Version 1.1
                            Cleaned up some communication and polling to the
                             UMS.  There was some possibilities of messing
                             a magnet while waiting for a poll response.  Disabled
                             interrupts around some crusal points.
NOV 5,90     L.B.C.         Version 1.2
                            Changed the program to support 24 sensors on the
                             UMS board.  This intels 2 more bytes sent from the
                             UMS and 1 more bytes sent to the 80186.

* * * * * * * * * * * * * * * * * * * * * * * * * * * * * * * * * * * * * * * * */
#define VERSION_NO "VERS 1.2"
#pragma eject
/**/
```

```
/************************* Franklin compiler directives *********************/
#pragma listinclude symbols code debug large
#pragma registerbank(0) pagelength(58) pagewidth(132) optimize(3)
/****************************************************************************/
/**************************** Franklin include files ************************/
#include <absacc.h>
#include <reg51.h>
/****************************************************************************/
/******************************** In line Macros *****************************/
/* This is a Macro for inline code.  The ICE uses a different way to access
   external memory than the real chip.  These need to be compiled different
   to utilize the compiled options. */
#ifdef NOHAU_ICE
   /* called out side of an interrupt */
   sfr P0_e = 0xe8; /* used because the ICE places the P0 address on P4 of the ICE */
   sfr P2_e = 0xf8; /* used because the ICE places the P2 address on P5 of the ICE */
   sfr IP_e = 0xa9; /* The ICE has a different address for IP than the real chip */
   #define READ_PORT(address,data) EA=0; P2_e=address>>8; P1_7 = 0; data = P0_e; \
        P1_7 = 1; P2_e = 0xff; EA = 1
   #define WRITE_PORT(address,data) EA=0; P0_e = data; P2_e=address>>8; P1_6 = 0; \
        P1_6 = 1; P2_e = 0xff; P0_e = 0xff; EA = 1
   /*called inside of an interrupt so interrupts are not enabled by a read */
   #define READ_PORT_IN_INT(address,data) P2_e=address>>8; P1_7 = 0; data = P0_e; \
        P1_7 = 1; P2_e = 0xff
   #define WRITE_PORT_IN_INT(address,data) P0_e = data; P2_e=address>>8; P1_6 = 0; \
        P1_6 = 1; P2_e = 0xff; P0_e = 0xff
#else
   #define IP_e IP /* normal IP address */
                /* Used because the NOHAU ICE has a different address for the  */
                /*  IP register.  So when the ICE is not used it must be defined to
*/
                /*  its origional address of IP. */
   /* called out side of an interrupt */
   #define READ_PORT(address,data) data = XBYTE[address]
   #define WRITE_PORT(address,data) XBYTE[address] = data
   /*called inside of an interrupt just to be compatable with the read and write
     when the ICE is connected.  It does not matter for when the ICE is not connected
     because I dont need to enable and disable interrupts on a read. */
   #define READ_PORT_IN_INT(address,data) data = XBYTE[address]
   #define WRITE_PORT_IN_INT(address,data) XBYTE[address] = data
#endif
/* Easy way to enable and disable the interrupts.  This is done in cases where
```

```
    I am using veriables outside the interrupt that are also used inside the
    interrupt. */
#define _DISABLE_ES ES=0
#define _ENABLE_ES ES=1
/***************** Register Definitions of the FIFO ***************************/
/* Pointer Register */
#define  POINTER_REG_CMD 0x01 /* Address to access the Command register */
#define  POINTER_REG_MSK 0x02 /* Address to access the Mask register */
#define  POINTER_REG_MAIL_BOX_OUT 0x04 /* Address to access the outgoing Mail Box
register */
#define  POINTER_REG_MAIL_BOX_IN  0x06 /* Address to access the incoming Mail Box
register */
/* Mask Register */
#define  MASK_REG_MAIL_BOX 0x04 /* Enable the Mail Box interrupt to occure in
                                    the Mask register */
#define  FIFO_BUFFER   0xEE00  /* Accessing the buffer in the FIFO for read or write
  (U49) (11101110) */
#define  FIFO_REGS    0xEF00  /* Accessing the Registers in the FIFO for read or write
(U49) (11101111) */
/* Command Register */
#define COMMAND_REG_MR_BIT 0x80

/*  Defines between UMS and DSCOMM */
#define POLL_UMS            0xA0  /* This includes the complement in the upper byte of
the address of 0 */
#define UMS_FOUND_MAG       0xB4
#define ACK                 0x06      /* ascii ACK, */
/* !!!!!!! CHANGE COMMAND WHEN DECIDED UPON */
/* Sent to the 80186 */
/* #define MAG_FOUND_COMMAND    0xA1     */
#define MAG_FOUND_COMMAND       0x00 /* Tells the 186 we found magnet */
#define ERROR_ON_UMS_COMMAND    0xB2 /* Tells the 186 we have communications problems
*/
/* Received from the 80186 */
#define POLL_UMS_COMMAND        0x10
#define CLEAR_INT_STAT_COMMAND  0xFE
#define TIMER_VALUE    2000     /* 1 count is 1ms so 2000 counts is 2 seconds */
sbit P1_3 = P1^3;
sbit P1_6 = P1^6;
sbit P1_7 = P1^7;
data bit error_bit;       /* Set if error occured during bad communication to UMS */
data bit good_message;    /* Set if good message received from UMS */
```

```
data bit serial_transmit_busy;   /* Set just before transmiting out of SBUF and */
                                 /*  Cleared by the serial tranmsit routine to say */
                                 /*  the transmit has occured.                    */
data bit first_pass_flag;
data int timer_counter;
data unsigned char buffer[5];      /* The serial interrupt places data in the buffer
and the */
                                   /*  main routine takes it out of the buffer. */
data unsigned char dummy_byte;
data unsigned char error_counter;     /* Counts 10 errors in communication before it
lets the 186 */
                                      /*  know there was a problem in communication.
*/
/* used in the assember interface but declared here */
data unsigned char receive_delay;
/*******************************************************************************/
/*************************** Prototypes in this module ***********************/
void initialize();
void Int0_interrupt();
void poll_the_ums();
void Int1_interrupt();
void Serial_interrupt();
void Timer0_interrupt();
/*******************************************************************************/
#pragma eject
/**/
main()
{
  initialize();
  timer_counter = 0; /* Force a poll_the_ums at startup */

  for(;;)
  {
     if ( timer_counter <= 0 )
     {
        poll_the_ums();
        timer_counter = TIMER_VALUE;  /* should occure approx every 2 second. */
     } /* if */
     _DISABLE_ES;
     if ( good_message )
     {
        good_message = 0;
```

```
        if ( ( buffer[ 0 ] == UMS_FOUND_MAG ) &&
             ( buffer[ 1 ] == ~buffer[ 3 ] ) &&
             ( buffer[ 2 ] == ~buffer[ 4 ] ) )
        {
                 /* message good - send buffer[ 1 ] and buffer[ 2 ] to 80186 */
                 WRITE_PORT( FIFO_BUFFER, buffer[ 1 ] ); /* Magnet position (low
byte)*/
                 WRITE_PORT( FIFO_BUFFER, buffer[ 2 ] ); /* Magnet position (high byte)
*/
                 WRITE_PORT( FIFO_REGS, POINTER_REG_MAIL_BOX_OUT  ); /* mailbox
register out bound */
                 WRITE_PORT( FIFO_REGS, MAG_FOUND_COMMAND); /* command stating we found
a magnet */
                 P1_3 = 0; /* Cause the interrupt to the 186 processor */
                 error_counter = 0;
                 serial_transmit_busy = 1;
                 _ENABLE_ES; /* enable the interrupt so that the transmit will occure
*/
                 SBUF = ACK;  /* ack the UMS in responce to the mag found */
                 while( serial_transmit_busy );
        }
        else error_bit = 1;
     } /* if */
     _ENABLE_ES;
     if ( error_bit )
     {
        error_bit = 0;
        /* 10 trys beforing letting the 186 know there is a problem */
        if( ++error_counter == 10)
        {
           /* Send message to 186 that one of the UMS's died */
/**** will be added when the 80186 is changed to support this.
           WRITE_PORT( FIFO_REGS, POINTER_REG_MAIL_BOX_OUT  );
           WRITE_PORT( FIFO_REGS, ERROR_ON_UMS_COMMAND );
****/
        } /* if */
     } /* if */
  } /* for */
} /* main */
#pragma eject
/**/
/*********************************************************************************/
```

```
/* Initialization of all the veriables used should be done here.              */
/******************************************************************************/
void initialize()
{
/* The first thing I should do is to reset the FIFO hopefully before the 186 */
/*  has a chance to write something to it. */
  /* I use a write_port_in_int because I don't want the interrupts to be
     turned on and off here when working with the ICE/EMULATOR.  The
     interrupts have not been set up yet */
  WRITE_PORT_IN_INT( FIFO_REGS,POINTER_REG_CMD );  /* point to command reg */
  WRITE_PORT_IN_INT( FIFO_REGS,COMMAND_REG_MR_BIT );   /* set Master Reset bit first
time */
  WRITE_PORT_IN_INT( FIFO_REGS,POINTER_REG_CMD ); /* point to the command reg again */
  WRITE_PORT_IN_INT( FIFO_REGS,COMMAND_REG_MR_BIT ); /* Set the Master Reset bit again
second time */
  READ_PORT_IN_INT( FIFO_REGS,dummy_byte ); /* Read the status to clear the IRQ line
as a result of the Master Reset. */
/* Enable only the Mail Box interrupt to occure. */
  WRITE_PORT_IN_INT( FIFO_REGS,POINTER_REG_MSK ); /* point to the mask reg */
  WRITE_PORT_IN_INT( FIFO_REGS,MASK_REG_MAIL_BOX ); /* set the Mail box bit to on */

/* Set up the timer0 (timer 1 not used ) */
  TMOD=0x31; /* 00110001b  Timer 1 disabled
                           Timer 0 Gate = TR0
                                   C/T = Timer
                                   Mode = 16 bit timer/counter */
  TH0 = 0xfc; /* Approx. 1.1ms per timer 0 interrupt */
  TL0 = 0;    /* Not really needed.  But gives it a place to start */
  TCON=0x10;   /* 00010000b  Timer 1 disabled
                           Timer 0 turned on
                           External Interrupt 1 on low level triggered
                           External Interrupt 0 on low level triggered */
  SCON = 0x90; /* Mode 2 for serial communication to the UMS boards. */
  PCON = 0x80; /* Set the baud rate at 1/32 the clock speed (375k baud). */
/* set up the interrupt priority */
  IP_e=0x17; /* high priority for Serial Int, External Interrupt 0 and 1,
                                   and timer 0 interrupt. */
/* turn on interrupts */
  IE=0x97; /* Enable interrupts (serial, external 0,1, and timer 0)  */
} /* initialize */
#pragma eject
/**/
```

```
/*****************************************************************************/
/* Int0_interrupt is used for future use of the serial communication on the  */
/*   Communication Board through the 82530 chip.  When (82530) talks to      */
/*   the DS5000 this interrupt will occure.  There is not any application for*/
/*   this part of the board yet.                                              */
/*****************************************************************************/
void Int0_interrupt() interrupt 0 using 1 /* must be the same reg. bank as the read and
write routines. */
{
} /* Int0_interrupt() */

/*****************************************************************************/
/* Int1_interuupt it used when the 80186 talks to the DS5000.  The 80186      */
/*  writes a message to the FIFO mailbox which causes an interuupt into the  */
/*  DS5000.  This is the routine the processor jumps to when that interrupt  */
/*  occures.                                                                  */
/*****************************************************************************/
void Int1_interrupt() interrupt 2 using 1 /* must be the same reg. bank as the read and
write routines. */
{
  data unsigned char byte_rd_from_fifo;
  /* The spec sheet on the FIFO said I had to read the status register before reading
*/
  /*  the mailbox or the interrupt would not go away.  This did not work this
 */
  /*  way when I ran this program with the ICE/EMULATOR.  I only needed to read
 */
  /*  the mailbox register and the interrupt would go away.  So to speed up the
 */
  /*  code I took out the reading of the status register.  If for any reason they
 */
  /*  come out with a new chip which corrects this problem in their documentation
 */
  /*  I would need to put another call to read the status register befor reading the
 */
  /*  mailbox. */
     WRITE_PORT_IN_INT( FIFO_REGS, POINTER_REG_MAIL_BOX_IN ); /* point to the in MAIL
BOX */
     READ_PORT_IN_INT( FIFO_REGS, byte_rd_from_fifo); /* Read the mail box */
     if ( byte_rd_from_fifo == CLEAR_INT_STAT_COMMAND )
     {
        P1_3 = 1;  /* stop the interrupt to the 80186 */
```

```
    }
    else if ( byte_rd_from_fifo == POLL_UMS_COMMAND )
    {
       timer_counter  = 0; /* force a poll_the_ums call to occure */
    } /* if */
} /* Intl_interrupt() */
#pragma eject
/**/
/*****************************************************************************/
/* Used for polling the UMS system.                                         */
/*  It sends out a message to the UMS and expects back 3 bytes of data.  Then*/
/*  the message back is verified and if found to be good it sends back an ACK*/
/*  to the UMS.  This routine is called every 1 second to verify the UMS has */
/*  not died.                                                                */
/*****************************************************************************/
void poll_the_ums()
{
  error_bit = 1; /* Default set -- Cleared if we get a good message */
  timer_counter = 2; /* This will verify looping for at least 1ms. */
  first_pass_flag = 1;
  do
  {
     if ( first_pass_flag )
     {
           /* Make sure I have not received a found mag commmand before */
           /*  sending the poll command. */
           first_pass_flag = 0;
           serial_transmit_busy = 1;
           /* The UMS should throw this poll away if it is expecting a */
           /*  responce from a found magnet */
           SBUF = POLL_UMS; /* */
           while( serial_transmit_busy );
     } /* if */
     /* Disable the interrupt so the UMS will not override the message I */
     /*  will look at with another message, like a found magnet message. */
     _DISABLE_ES;
     if ( good_message )
     {
        if ( buffer[ 0 ] == ACK )
        {
           good_message = 0;
           error_bit = 0;
```

```
            _ENABLE_ES;
            return;
         }
         else if ( buffer[ 0 ] == UMS_FOUND_MAG )
         {
            /* if during a poll response the UMS sees a magnet, we need to let the 80186
know about it. */
            /*  So by setting good_message to 1 and returning the calling procedure will
then take the message */
            /*  in the buffer and send it to the 80816. */
            _ENABLE_ES;
            return;
         } /* if */
         /* first pass set again incase the message does not match so I will */
         /*  send another poll */
         first_pass_flag = 1;
      } /* if */
      _ENABLE_ES;
   } while( timer_counter >= 0 );
   if ( error_bit == 1 )
   {
      /* Errors occured in communication. Let the 80186 know there is a problem. */
/***** will be added when the 80186 is changed to support it.
      WRITE_PORT( FIFO_REGS, POINTER_REG_MAIL_BOX_OUT  );
      WRITE_PORT( FIFO_REGS, ERROR_ON_UMS_COMMAND );
*****/
   } /* if */
} /* poll_the_ums() */
#pragma eject
/**/
/*****************************************************************************/
/* Serial_interrupt                                                          */
/*  The interface between the UMS and DSCOMM comes in on the serial interface*/
/*  In this interface the first byte sent is checked to see if it is an ACK  */
/*   to a poll or to see if it is a found magnet response.  If it is a found */
/*   magnet response it reads 4 more bytes which contain the magnet data.    */
/*   Otherwise it only reads one byte and returns.                           */
/*****************************************************************************/
void Serial_interrupt() interrupt 4 using 1
{
  /* if we received a receive interrupt */
  if ( RI )
```

```
{
   RI = 0;
   buffer[0] = SBUF;
   if ( buffer[0] == ACK )
   {
      good_message = 1;
      error_bit = 0;
      return;
   } /* if */
      /* if we found a magnet read the data from the UMS */
   if ( buffer[0] == UMS_FOUND_MAG )
   {
      receive_delay = 60;  /* delay an arbitory number of 60 micro seconds */
      /* wait for the first byte to appear */
      while ( !RI )
      {
         if ( --receive_delay == 0 )
         {
            /* timeout if we did not read the byte */
            error_bit = 1;
            good_message = 0;
            return;
         }
      }
      RI=0;
      buffer[ 1 ] = SBUF;
      receive_delay = 60;
      /* wait for the second byte to appear */
      while ( !RI )
      {
         if ( --receive_delay == 0 )
         {
            /* timeout if we did not read the byte */
            error_bit = 1;
            good_message = 0;
            return;
         }
      }
      RI=0;
      buffer[ 2 ] = SBUF;
      receive_delay = 60;
      /* wait for the third byte to appear */
```

```
        while ( !RI )
        {
           if ( --receive_delay == 0 )
           {
              /* timeout if we did not read the byte */
              error_bit = 1;
              good_message = 0;
              return;
           }
        }
        RI=0;
        buffer[ 3 ] = SBUF;
        receive_delay = 60;
        /* wait for the forth byte to appear */
        while ( !RI )
        {
           if ( --receive_delay == 0 )
           {
              /* timeout if we did not read the byte */
              error_bit = 1;
              good_message = 0;
              return;
           }
        }
        RI=0;
        buffer[ 4 ] = SBUF;
        good_message = 1;
        error_bit = 0;

     } /* if */
  } /* if (RI) */

  /* if we received a transmit interrupt */
  if ( TI )
  {
     TI = 0; /* clear the transmit interrupt */
     serial_transmit_busy = 0; /* saying the transmit has completed */
  } /* if (TI) */

} /* Serial_interrupt() */

#pragma eject
```

```
/**************************** Franklin include files ***************************/
#include <absacc.h>
#include <reg51.h>
#include <math.h>
/*******************************************************************************/
/******************************** My include files ******************************/
#include "mcp_con.k"
/*******************************************************************************/
/*************************** Prototypes in this module *************************/
void Do_Controlled_Estop();
void initialize();
void initialize_variables();
void Int0_interrupt();
void Int1_interrupt();
void MCP_Ratio_Control();
void MCP_TPS_Control();
void mcpvsysbug();
void setup();
void stop__apply_brakes();
void Timer0_interrupt();
/*******************************************************************************/
main()
{

  initialize();
  for(;;)
  {
     if ( do_controlled_estop_bit )
     {
        ESTOP_INTERRUPT = 0; /* disable the estop interrupt because I am doing
the estop now */
        Do_Controlled_Estop();
        do_controlled_estop_bit = 0;
        ESTOP_INTERRUPT = 1;
     } /* if */
     /* Command Queue indexs, (head an tail) are different if the interface
interrupt has */
     /*  added something to the queue. */
     if (q_head != q_tail)
     {
        setup();
     } /* if */
```

```
      if ( mcp_ratio_control_bit )
      {
         if ( timer_counter <= 0 )
         {
            timer_counter = 4; /* 4=4ms */
            /* Toggle the bit to see how often I am running through the main loop.
*/
            P3_4 = ~P3_4;  /* Pin 14 of the 8051 (DS5000) */
            MCP_Ratio_Control(); /* Main routine call */
         } /* if */
      } /* if */
      if ( tps_control_bit )
      {
         MCP_TPS_Control();
      } /* if tps_control_bit */
   } /* for */
} /* main */
/******************************************************************************/
/* Contolled E-stop                                                           */
/*  Using register bank 2 because both the external interrupts will call this */
/*   routine and they need to all have the same register bank.                */
/******************************************************************************/
void Do_Controlled_Estop()
{
xdata int tot_enc_i_tmp;
xdata unsigned char estop_setpt;
xdata unsigned char outside_wheel_speed;
xdata unsigned int tot_enc_i;
xdata unsigned char decel_indx;
xdata unsigned int scaled_indx;
xdata unsigned char decel_index_prev;
xdata int save_encoder_i;
xdata unsigned char encoder_backup_check;
data bit port_is_outside_wheel_bit;
  RESET_COUNTERS = 0; /* dont't reset real soon because it takes a few micro
seconds */
                       /* for the chip to see the reset line go low.  That is why
I set */
                       /* it back to 1 ferther down in this function call */
/* setup values */
  tot_enc_i = 0;
  tot_enc_i_tmp = 0;
```

```
save_encoder_i = 0;
loop_counter = 0;
decel_index_prev = 0;
encoder_backup_check = 0;
estop_setpt = setpt_n>>8;
/* check for which wheel is the outside by seeing which one is going faster */
if ( current_AO_speed[ 0 ] > current_AO_speed[ 1 ] )
{
   port_is_outside_wheel_bit = 1;
   outside_wheel_speed = current_AO_speed[ 0 ];
}
else
{
   port_is_outside_wheel_bit = 0;
   outside_wheel_speed = current_AO_speed[ 1 ];
} /* if */

scaled_indx = indexs_per_tick_scaled_tbl[ estop_setpt ];
/* reset the counters (HCTL2000) */
RESET_COUNTERS = 1;
/* the 20 for the encoder_backup_check should be between 15 to 20ms */
/*  before stoping the vehicle.  This depends on how fast this loop */
/*  executes. */
while ( ( outside_wheel_speed > 5 ) && ( encoder_backup_check < 20 ) )
{
   /* Toggle the echain watchdog so that the echain will not get set */
    ECHAIN_WATCHDOG = ~ECHAIN_WATCHDOG;
    if ( port_is_outside_wheel_bit )
    {
            /* Read encoder 1  (Portside Side) */
       READ_PORT(COUNT_ENC_PORT,temp_byte);
    }
    else
    {
            /* Read encoder 0 (Starboard Side) */
       READ_PORT(COUNT_ENC_STAR, temp_byte);
    } /* if */
    save_encoder_i = temp_byte - save_encoder_i;

    tot_enc_i_tmp = (save_encoder_i < -128) ? 256 + save_encoder_i :
                    (save_encoder_i >= 128) ? -256 + save_encoder_i :
                    save_encoder_i;
```

```
        save_encoder_i = temp_byte;
        /* in case the encoder gets hung up but the wheel is still moving */
        /*  there may be a hardware problem so stop the vehicle anyway. */
        if ( tot_enc_i_tmp == 0 ) /* means the encoder is not counting */
        {
          encoder_backup_check++;
        }
        else
        {
          encoder_backup_check = 0;
        } /* if */
/*        tot_enc_i_tmp = tot_enc_i_tmp >>1; */ /* average the two encoders by
deviding by 2 */
/*       tot_enc_i += abs(tot_enc_i_tmp); */
          /* take the absolute value of the counts and add them to the total counts
*/
      if( tot_enc_i_tmp < 0 )
      {
         tot_enc_i += -tot_enc_i_tmp;
      }
      else
      {
         tot_enc_i += tot_enc_i_tmp;
      } /* if */

      temp_long.normal.a = (long)tot_enc_i * (long)scaled_indx;
      decel_indx = temp_long.x256.b;
      if ( port_is_outside_wheel_bit )
      {
         /* decel_table and setpt are not scaled by 256 but by multipuling */
         /*  them together it moves the decimol point left one byte so by */
         /*  taking the temp_long.x256.b I get the correct byte I want */
         temp_long.normal.a = (unsigned)decel_table[ decel_indx ] *
                              (unsigned)estop_setpt;
         current_AO_speed[ 0 ] = temp_long.x256.b; /* port wheel */
         outside_wheel_speed = temp_long.x256.b;
         /* If the inside wheel is less than the outside wheel leave it small */
         /*  until the outside wheel slows down to that speed. */
         current_AO_speed[ 1 ] = MIN( current_AO_speed[ 1 ], current_AO_speed[ 0
] );
      }
      else
```

```
{
   temp_long.normal.a = (unsigned) decel_table[ decel_indx ] *
                        (unsigned) estop_setpt;
   current_AO_speed[ 1 ] = temp_long.x256.b;
   outside_wheel_speed = temp_long.x256.b;
   current_AO_speed[ 0 ] = MIN( current_AO_speed[ 0 ], current_AO_speed[ 1
] );
} /* if */
WRITE_PORT_IN_INT(A_D_OUTPUT_0, current_AO_speed[ 0 ]);
WRITE_PORT_IN_INT(A_D_OUTPUT_1, current_AO_speed[ 1 ]);
#ifdef TEST
if(!first_time_flag_bit)
{
if (!BRAKE_BIT)  /* if the brakes are set - break from the loop */
{
   save_counts[0] = decel_indx;
   save_counts[1] = current_AO_speed[0];
   current_AO_speed[2] = decel_indx;
   current_AO_speed[3] = current_AO_speed[0];
   break;
}
else
{
   save_counts[0] = 0xff;
   save_counts[1] = 0xff;
   current_AO_speed[2] = 0xff;
   current_AO_speed[3] = 0xff;
} /* IF brake_bit */
} /* IF */
   temp_long.normal.a = tot_enc_i;
   save_counts[0] = temp_long.x256.b;
   save_counts[1] = temp_long.normal.a;
   current_AO_speed[2] = temp_long.x256.b;
   current_AO_speed[3] = temp_long.normal.a;
/*
   temp_long.normal.a = tot_enc_i;
   save_counts[0] = temp_long.x256.b;
   save_counts[1] = temp_long.normal.a;
*/
#endif
if( decel_indx != decel_index_prev )
{
```

```
        decel_index_prev = decel_indx;
        large_array[loop_counter] = current_AO_speed[0];
        loop_counter++;
        large_array[loop_counter] = current_AO_speed[1];
        loop_counter++;
        temp_long.normal.a = loop_counter;
        if (loop_counter > LARGE_ARRAY_SIZE - 10 )
        {
           loop_counter = 0;
        } /* if */
        save_counts[0] = temp_long.x256.b;
        save_counts[1] = temp_long.normal.a;
        current_AO_speed[2] = temp_long.x256.b;
        current_AO_speed[3] = temp_long.normal.a;
     } /* if */
  }  /* while */
     ECHAIN_WATCHDOG = 1;   /* stop pulsing so the rest of the vehicle */
                            /*  knows there has been an E-STOP */

  /* After the controlled ESTOP set the brakes, release the contactors */
  /*  and turn off the TPS. */
     first_time_flag_bit = 1;

  discrete_status = 0x00;
  WRITE_PORT_IN_INT(MCP_DISCRETES, ~discrete_status);
  current_AO_speed[ 0 ] = 0;
  current_AO_speed[ 1 ] = 0;
  WRITE_PORT_IN_INT(A_D_OUTPUT_0, current_AO_speed[ 0 ]);
  WRITE_PORT_IN_INT(A_D_OUTPUT_1, current_AO_speed[ 1 ]);
  mcp_ratio_control_bit = OFF; /* turn TPS and RATIO control off */
  tps_control_bit = OFF;
  setpt_n = 0; /* try to keep the ratio from running by setting the speed to 0
*/
  q_head = 0;
  q_tail = 0;
} /* Do_Controlled_Estop */
/*******************************************************************************/
/* Initialization of all the veriables used should be done here.              */
/*******************************************************************************/
void initialize()
{
unsigned char dummy_byte;
```

```
unsigned i;
/* The first thing I should do is to reset the FIFO hopefully before the 186 */
/*  has a chance to write something to it. */
  /* I use a write_port_in_int because I don't want the interrupts to be
     turned on and off here.  The interrupts have not been set up yet */
  WRITE_PORT_IN_INT(FIFO_REGS,POINTER_REG_CMD);  /* point to command reg */
  WRITE_PORT_IN_INT(FIFO_REGS,COMMAND_REG_MR_BIT);    /* set Master Reset bit
first time */
  WRITE_PORT_IN_INT(FIFO_REGS,POINTER_REG_CMD); /* point to the command reg again
*/
  WRITE_PORT_IN_INT(FIFO_REGS,COMMAND_REG_MR_BIT); /* Set the Master Reset bit
again second time */
  READ_PORT_IN_INT(FIFO_REGS,dummy_byte); /* Read the status to clear the IRQ
line as a result of the Master Reset. */
/* Enable only the Mail Box interrupt to occure. */
  WRITE_PORT_IN_INT(FIFO_REGS,POINTER_REG_MSK); /* point to the mask reg */
  WRITE_PORT_IN_INT(FIFO_REGS,MASK_REG_MAIL_BOX); /* set the Mail box bit to on
*/
/* Set up the timer0 (timer 1 not used ) */
  TMOD=0x31; /* 00110001b  Timer 1 disabled
                           Timer 0 Gate = TR0
                                   C/T = Timer
                                   Mode = 16 bit timer/counter */
  TH0 = 0xfc; /* Approx. 1ms per timer 0 interrupt at 12Mhz */
  TL0 = 0;     /* Not really needed.  But gives it a place to start */
  TCON=0x10;   /* 00010000b  Timer 1 disabled
                           Timer 0 turned on
                           External Interrupt 1 on low level triggered
                           External Interrupt 0 on low level triggered */
/*****
  TCON=0x15;    00010101b  Timer 1 disabled
                           Timer 0 turned on
                           External Interrupt 1 on falling edge
                           External Interrupt 0 on falling edge
******/
/* set up the interrupt priority */
  IP_e=0x07; /* high priority for External Interrupt 0 and 1, and interrupt timer
0 */
 /* placed in a subroutine so that the SETUP procedure can also call it. */
  initialize_variables();
/* Intinalize the Que pointers */
  q_head = 0;
```

```
    q_tail = 0;
    do_controlled_estop_bit = 0;
    first_time_flag_bit = 0;
  #ifdef DEBUG
    current_AO_speed[2] = 0;
    current_AO_speed[3] = 0;
    WRITE_PORT_IN_INT(A_D_OUTPUT_0, current_AO_speed[ 2 ]);
    WRITE_PORT_IN_INT(A_D_OUTPUT_1, current_AO_speed[ 3 ]);
  #endif
  /* turn on interrupts when ready */
    IE=0x87; /* Enable interrupts (external 0,1, and timer 0)  */
             /*  Serial interrupt is never enabled */
  /***** FOR DEBUGING I HAVE DISABLED THE TIMER INTERRUPT ******/
  /*  IE=0x83; */ /* Enable interrupts (external 0, and timer 0)  */
  /*  IE=0x85; */ /* Enable interrupts (external 0,1)  */
  for (i=0;i<LARGE_ARRAY_SIZE;i++)
  {
    large_array[i] = 0;
  }
  } /* initialize */
  /*****************************************************************************/
  /* initialize_variables();                                                   */
  /*****************************************************************************/
  void initialize_variables()
  {
  /* Set the breaks, disable the Contactors, and turn off Antennas at statup */
  /*  The actual outputs are reverse logic. The byte will be normal Logic. So I */
  /*  will invert the byte just before it is sent.                             */
    discrete_status = 0x00;
    WRITE_PORT_IN_INT(MCP_DISCRETES, ~discrete_status);
  /* reset the counters (HCTL2000) */
    RESET_COUNTERS = 0;
  /* Initialize other veriables */
    creep_counter = 0;
    ratio_c = 0;
    creep_offset_port.word = 0;
    creep_offset_star.word = 0;
    obst_enbld = OBSTC_DSABLD;
    indx_veh_bas = 0;
    indx_veh = 0;
    ratio_gain = 2 * 256;
    current_AO_speed[0] = 0;
```

```
   current_AO_speed[1] = 0;
   WRITE_PORT(A_D_OUTPUT_0, current_AO_speed[ 0 ]);
   WRITE_PORT(A_D_OUTPUT_1, current_AO_speed[ 1 ]);
   /* start the counters again after a short delay from the reset above */
   RESET_COUNTERS = 1;
} /* initialize_variables */
/*****************************************************************************/
/* Interrupt 0 routine.  The interrupt occures when the pin (P3.2 INTO) is    */
/*   pulled low.  This is the interface to the 80186.  When the FIFO has mail */
/*   in the Mail Box it will interrupt the DS5000 to let it know it is time to*/
/*   read the FIFO. This routine must read the FIFO mail box to see what the  */
/*   command it that he is suppose to process. The data sheet on the FIFO says*/
/*   I must first read the status of the FIFO and that will clear the INT.    */
/*   This is not true.  The only way I could get the interrupt to clear was to*/
/*   to read the mail box.  So I took out the unnecessary reading of the      */
/*   status to save time. To allow the interrupt to occure the mask register  */
/*   of the FIFO must be set up to allow an interupt to occure thuough the    */
/*   mail boxs.  I have done this in the "initialize" routine.  The only      */
/*   I will get is one caused by a mailbox interrupt.  The Master Reset should*/
/*   not cause an interrupt because I read the status of the FIFO just        */
/*   following the reset.  This clears the reset bit in the status register   */
/*   clears the INT line to the DS5000. This is all done before the interupts */
/*   are turned on (enabled).                                                 */
/* This routine uses REGISTER BANK 2. Any function called from this routine   */
/*   must also use the same register bank.                                    */
/* I tried this as a SWITCH statement but it was much too slow.  It ranges now*/
/*  from 36-68us but with the SWITCH statement in here it was from 86-245us.  */
/*  This is much too slow.                                                    */
/*****************************************************************************/
void Int0_interrupt() interrupt 0 using 2 /* must be the same reg. bank as the
read and write routines. */
{
data unsigned char byte_rd_from_fifo;      /* A byte read from the FIFO. May be
registers or data */
data unsigned char byte_rd_from_fifo_temp;/* A saved byte read from the fifo */
  /* The spec sheet on the FIFO said I had to read the status register before
reading  */
  /*  the mailbox or the interrupt would not go away.  This did not work this
      */
  /*  way when I ran this program with the ICE/EMULATOR.  I only needed to read
      */
  /*  the mailbox register and the interrupt would go away.  So to speed up the
```

```
     */
  /*  code I took out the reading of the status register.  If for any reason they
    */
  /*  come out with a new chip which corrects this problem in their documentation
    */
  /*  I would need to put another call to read the status register before reading
the  */
  /*  mailbox. */
     WRITE_PORT_IN_INT( FIFO_REGS, POINTER_REG_MAIL_BOX_IN ); /* point to the in
MAIL BOX */
     READ_PORT_IN_INT( FIFO_REGS, byte_rd_from_fifo ); /* Read the mail box */
     P1_1 = 0; /* Toggle the bit to see how often the 186 talks to me in auto
mode. */
     byte_rd_from_fifo_temp = byte_rd_from_fifo & 0xf0; /* the temp is used to
check for what type of message it is */
     /* checking for > 128 to eliminate half of the checking */
     if (byte_rd_from_fifo <= 0x7f)
     {
        /* 00 means Direct Write to output */
        if (byte_rd_from_fifo_temp == M_C_P__RATIO_CONTROL)
        {
           command_que[ q_head ] = byte_rd_from_fifo;
           q_head++;
           q_head &= Q_MASK_VALUE;  /* make sure the index stayes under the array
size */
           READ_PORT_IN_INT(FIFO_BUFFER, setpt.temp_setpt_byte[1]); /* least sig.
byte */
label:     /* label used so that the optomizer will not optomize the second read.
*/
           READ_PORT_IN_INT(FIFO_BUFFER, setpt.temp_setpt_byte[0]); /* most sig.
byte */
label1:
           READ_PORT_IN_INT(FIFO_BUFFER, ratio.temp_ratio_byte[1]); /* least sig.
byte */
label2:
           READ_PORT_IN_INT(FIFO_BUFFER, ratio.temp_ratio_byte[0]); /* most sig.
byte */
label3:
           READ_PORT_IN_INT(FIFO_BUFFER, command_que[ q_head ]);    /* read the
indx_veh_bas */
           q_head++;
           q_head &= Q_MASK_VALUE;  /* make sure the index stayes under the array
```

```
size */
        P1_1 = ~P1_1; /* Toggle the bit to see how often the 186 talks to me
in auto mode. */
                        /*  Pin 2 of the 8051 (DS5000) */
     }
     else if ( byte_rd_from_fifo_temp == M_C_P__DIRECT_WRITE )
     {
        /* The bytes are sent left to right according to which bits are set.
*/
        command_que[ q_head ] = byte_rd_from_fifo;
        q_head++;
        q_head &= Q_MASK_VALUE;  /* make sure the index stayes under the array
size */
        if(byte_rd_from_fifo & 0x08)
        {
           READ_PORT_IN_INT( FIFO_BUFFER, byte_rd_from_fifo_temp );
           WRITE_PORT_IN_INT( A_D_OUTPUT_3, byte_rd_from_fifo_temp );
           current_AO_speed[ 3 ] = byte_rd_from_fifo_temp;
        } /* if */
        if(byte_rd_from_fifo & 0x04)
        {
           READ_PORT_IN_INT( FIFO_BUFFER, byte_rd_from_fifo_temp );
           WRITE_PORT_IN_INT( A_D_OUTPUT_2, byte_rd_from_fifo_temp );
           current_AO_speed[ 2 ] = byte_rd_from_fifo_temp;
        } /* if */
        if(byte_rd_from_fifo & 0x02)
        {
           READ_PORT_IN_INT( FIFO_BUFFER, command_que[ q_head ] );
           q_head++;
           q_head &= Q_MASK_VALUE;
        } /* if */
        if(byte_rd_from_fifo & 0x01)
        {
           READ_PORT_IN_INT( FIFO_BUFFER, command_que[ q_head ] );
           q_head++;
           q_head &= Q_MASK_VALUE;
        } /* if */
     }
     else if ( byte_rd_from_fifo_temp ==  M_C_P__DISCRETES )
     {
        command_que[ q_head ] = byte_rd_from_fifo;
        q_head++;
```

```
            q_head &= Q_MASK_VALUE;  /* make sure the index stayes under the array
size */
            /* save the MASK for the discretes */
            READ_PORT_IN_INT( FIFO_BUFFER, command_que[ q_head ] );
            q_head++;
            q_head &= Q_MASK_VALUE;  /* make sure the index stayes under the array
size */
            /* save the STATUS for the discretes */
            READ_PORT_IN_INT( FIFO_BUFFER, command_que[ q_head ] );
            q_head++;
            q_head &= Q_MASK_VALUE;  /* make sure the index stayes under the array
size */
         }
         else if (byte_rd_from_fifo_temp ==  M_C_P__OBST )
         {
            command_que[ q_head ] = byte_rd_from_fifo;
            q_head++;
            q_head &= Q_MASK_VALUE;  /* make sure the index stayes under the array
size */
            /* Read the A scaling factor for ODS */
            READ_PORT_IN_INT(FIFO_BUFFER, command_que[ q_head ]);
            q_head++;
            q_head &= Q_MASK_VALUE;
            /* Read the B scaling factor for ODS */
            READ_PORT_IN_INT(FIFO_BUFFER, command_que[ q_head ]);
            q_head++;
            q_head &= Q_MASK_VALUE;
         }
         else if (byte_rd_from_fifo_temp ==  M_C_P__STATE)
         {
            command_que[ q_head ] = byte_rd_from_fifo;
            q_head++;
            q_head &= Q_MASK_VALUE;  /* make sure the index stayes under the array
size */
            READ_PORT_IN_INT(FIFO_BUFFER, command_que[ q_head ]);
            q_head++;
            q_head &= Q_MASK_VALUE;
         }
      }
      else if (byte_rd_from_fifo_temp == M_C_P__TURN_TPS_TRANS_ON )
      {
         command_que[ q_head ] = byte_rd_from_fifo;
```

```
        q_head++;
        q_head &= Q_MASK_VALUE;  /* make sure the index stayes under the array
size */
        /* I will throw this next byte away because It will always be 0.  This
is */
        /*  so that the 80186 can call the same routine as the M_C_P_TPS_CONTROL,
*/
        /*  but in this case the second byte means nothing so it is discarded */
        READ_PORT_IN_INT(FIFO_BUFFER, byte_rd_from_fifo ); /* least sig. byte */
     }
     else if (byte_rd_from_fifo_temp == M_C_P__INITIALIZE)
     {
        command_que[ q_head ] = byte_rd_from_fifo;
        q_head++;
        q_head &= Q_MASK_VALUE;  /* make sure the index stayes under the array
size */
     }
     else if (byte_rd_from_fifo_temp == M_C_P__TPS_CONTROL)
     {
        command_que[ q_head ] = byte_rd_from_fifo;
        q_head++;
        q_head &= Q_MASK_VALUE;  /* make sure the index stayes under the array
size */
        /* Read the offset_from_center value or the vehicle speed */
        /*  from the fifo buffer. */
        READ_PORT_IN_INT(FIFO_BUFFER, command_que[ q_head ]);
        q_head++;
        q_head &= Q_MASK_VALUE;
     }
     /* if "d0" then read current analog values (speed level). It only sends  */
     /*   one bite.  It looks from the right to the left to see the first bit */
     /*    set. */
     else if(byte_rd_from_fifo_temp == READ_CURRENT_ANALOG_COMMAND)
     {
        if(byte_rd_from_fifo & 0x01)
        {
           WRITE_PORT_IN_INT( FIFO_BUFFER, current_AO_speed[ 0 ] );
        }
        else if(byte_rd_from_fifo & 0x02)
        {
           WRITE_PORT_IN_INT( FIFO_BUFFER, current_AO_speed[ 1 ] );
        }
```

```
        else if(byte_rd_from_fifo & 0x04)
        {
           WRITE_PORT_IN_INT( FIFO_BUFFER, current_AO_speed[ 2 ] );
        }
        else if(byte_rd_from_fifo & 0x08)
        {
           WRITE_PORT_IN_INT( FIFO_BUFFER, current_AO_speed[ 3 ] );
        } /* if */
     }
     /* if "c0" then send back the status of the discretes */
     else if(byte_rd_from_fifo_temp == READ_MCP_DISCRETES)
     {
        WRITE_PORT_IN_INT(FIFO_BUFFER,discrete_status);
     }
     /* if "b0" then set the level at which we will interrupt the 80186 */
     else if(byte_rd_from_fifo_temp == M_C_P__INTERRUPT_LEVEL_CMD)
     {
        interrupt_mask |= (byte_rd_from_fifo & 0x0f); /* clear out the upper byte
which is not used */
        if(byte_rd_from_fifo & 0x08)
        {
           READ_PORT_IN_INT( FIFO_BUFFER, interrupt_level[ 3 ] );
        }
        if(byte_rd_from_fifo & 0x04)
        {
           READ_PORT_IN_INT( FIFO_BUFFER, interrupt_level[ 2 ] );
        }
        if(byte_rd_from_fifo & 0x02)
        {
           READ_PORT_IN_INT( FIFO_BUFFER, interrupt_level[ 1 ] );
        }
        if(byte_rd_from_fifo & 0x01)
        {
           READ_PORT_IN_INT( FIFO_BUFFER, interrupt_level[ 0 ] );
        } /* if */
     }
     /* if "e0" means to clear the interrupts */
     else if(byte_rd_from_fifo_temp == CLEAR_INTERRUPT_COMMAND)
     {
        /* clear the interrupts according to the bits set in byte_rd_from_fifo
*/
        interrupt_mask &= ~(byte_rd_from_fifo & 0x0f); /* clear out the upper
```

```
byte which is not used */
     }
     /* if "f0" means to Read the interrupt value that just interrupted the 80186
*/
     else if(byte_rd_from_fifo_temp == M_C_P__READ_INTERRUPT_COMMAND)
     {
        /* write out the interrupt value in 1 byte to the fifo */
        interrupt_mask &= 0x0f; /* To be compatable with the chapter 12 document
                                   (which I wrote) I must set the upper byte to
                                   '0'.  There is no real reason to do this. */
        WRITE_PORT_IN_INT(FIFO_BUFFER,interrupt_mask);
     } /* if */
     P1_1 = 1; /* Toggle the bit to see how often the 186 talks to me in auto
mode. */
} /* Int0_interrupt */
/*******************************************************************************/
/* Interrupt 2 occures when pin (P3.3 INT1) is pulled low.  This interrupt is */
/*  connected to the ESTOP of the vehicle.  When the ESTOP occures  this      */
/*  routine is called to stop the vehicle.  It must pulse the watchdog timer  */
/*  (P1.0) in order for the mechanical ESTOP not to occure.  If for some      */
/*  reason the processor dies, the mechanical ESTOP will take over and stop   */
/*  the vehicle.                                                              */
/*******************************************************************************/
void Int1_interrupt() interrupt 2 using 2
{
/* Will be used to run the ESTOP of the vehicle. */
/* Calling a procedure because I could not get the SETB IE1 to work. */
   do_controlled_estop_bit = 1;
} /* Int1_interrupt */
/*******************************************************************************/
/* Main control of the MCP processor.  It was placed in a subroutine so that */
/*    it can be called from the E-STOP subroutine.  It will do the same
controlling */
/*   as the normal wheel control but is will have different decel parameters */
/*   which will stop the vehicle in 10" or less.                             */
/*******************************************************************************/
void MCP_Ratio_Control()
{
        /* Read encoder 1  (Portside Side) */
  READ_PORT(COUNT_ENC_PORT,temp_byte);
  /* Because the encoder actually runs backwards (opposite) */
  /*  of the starboard wheel. I need to negate the byte. */
```

```
  temp_byte = -temp_byte;
  old_encoder_0_i = temp_byte - old_encoder_0_i;
  tot_enc_preset_l[ 0 ] += (old_encoder_0_i < -128) ? 256 + old_encoder_0_i :
                           (old_encoder_0_i >= 128) ? -256 + old_encoder_0_i :
                            old_encoder_0_i;
  old_encoder_0_i = temp_byte;
       /* Read encoder 0 (Starboard Side) */
  READ_PORT(COUNT_ENC_STAR, temp_byte);
  old_encoder_1_i = temp_byte - old_encoder_1_i;

  tot_enc_preset_l[ 1 ] += (old_encoder_1_i < -128) ? 256 + old_encoder_1_i :
                           (old_encoder_1_i >= 128) ? -256 + old_encoder_1_i :
                            old_encoder_1_i;
  old_encoder_1_i = temp_byte;
  /* if the brakes have been set or someone lifted their hand off of the  */
  /*  enable button - cause the speed to ramp up instead of jumping up */
  if (!BRAKE_BIT) /* Set when brakes are released - Cleared otherwise */
  {                /* Pin 15 on the 8051 (DS5000) */
     setpt_x = 0;
     creep_offset_port.word = 0;
     creep_offset_star.word = 0;
  } /* if */
  /* Used to ramp up the speed if the setpt_n is too big.  */
  /*  The speed will ramp up to the setpt_n instead of just jumping to it. */
  if ( setpt_n > setpt_x )
  {
     setpt_x = MIN( setpt_n, setpt_x + MIN( 0xFFFF - setpt_x, SETPT_OFFSET_ACCEL
) );
  }
  else if ( setpt_n < setpt_x )
  {
     setpt_x = MAX( setpt_n, setpt_x - MIN( setpt_x, SETPT_OFFSET_DECEL ) );
  } /* if */
  if ( obst_enbld == OBSTC_ENABLD )
  {
/*  The following line of code is placed here for future use.  If there is */
/*  ever another (second) obstical detection board placed in the vehicle */
/*  the signal will already be placed in the RAM chip and can be read by */
/*  this line of commented out code. */
      /* Read analog_in (input 8) from the RAM chip. */
/*****
      READ_RAM( HIGH, HIGH, RAM_LOC_2, RAM_LOC_3, dummy_n );
```

```
******/
      /* Read the obstical analog_in (input 9) value from the RAM chip. */
      READ_RAM( HIGH, HIGH, RAM_LOC_0, RAM_LOC_1, dummy_n );
     /* temp_long is just used here as a dummy integer veriable to save DATA
space */
     temp_long.x65536.c[0] = (7*8*(int)obstc_setpt) +
                ((int) (dummy_n - obstc_a_scale) * (int) obstc_b_scale);
     obstc_setpt = (temp_long.x65536.c[0] < 0) ? 0 : (temp_long.x65536.c[0] <<2)
>>8;
     setpt_x = MIN( setpt_x, obstc_setpt );
  } /* if */
  whl_setpt.ints.outsd = setpt_x;

/* comment only to see how to do it with out the union of "temp_long"
        whl_setpt.ints.insd = (long) setpt_x * (ratio_c -
                          ( (ratio_gain * ( ( (*encd.insd <<8) / *encd.outsd)
- ratio_c) ) >>8) );
*/
  /* make calculation for the Ratio of the wheels */
  if (whl_setpt.ints.outsd > 0)
  {
    /* calculate the inside wheel ratio with a bunch of cluges */
    temp_long.x256.b = *encd.insd;
    temp_long.x256.extra3 = 0;
    temp_long.x256.extra2 = 0;
    temp_long.normal.a   =   setpt_x   *   (ratio_c   -   (   (ratio_gain   *   (
(temp_long.normal.a / *encd.outsd) - ratio_c) ) >>8 ) );
     /* temp_long.x65536.c[1] is the same location as the 2 most sig bytes of
*/
     /*  temp_long.normal.a, except that it will do a INTEGER compair instead
*/
     /*  of a LONG compair.  This is just to save time. */
    if (temp_long.x65536.c[1] < 0)
    {  /* sign extend the bytes if the value is negative */
       temp_long.x65536.c[0] = 0xFFFF; /* 2 most sig bytes of the temp_long */
    }
    else
    {
       temp_long.x65536.c[0] = 0; /*else the 2 most sig bytes of the temp_long
should be 0 */
    } /* if */
    whl_setpt.ints.insd = labs( temp_long.x256.b ); /* left with it still *256
```

```
so it can be rounded below. */
    indx_veh  =  indx_veh_bas  |  ((  temp_long.x256.b  >=  0)  <<  1)  |  1  /*
(whl_setpt.ints.outsd >= 0) */ ;
    if (indx_veh != indx_veh_prv )
    {
       if (brakes_relesed >= BRAKES_ENABLD)
       {
          /* Clear the old contactor and brake values to (off) */
          discrete_status &= 0xE0;
          /* Set the approporate contactors */
          discrete_status |= io_control_table[ indx_veh ].contctrl;
          discrete_status |= 0x10; /* release the brakes */
          WRITE_PORT(MCP_DISCRETES, ~discrete_status);
          if (brakes_relesed == BRAKES_RELEASED);
          else if (brakes_relesed <= BRAKES_SET) /* wait for break released
message */
          {
             creep_offset_port.word = 0;
             creep_offset_star.word = 0;
             brakes_delay_cnt = 0;
             brakes_relesed = BRAKES_RELEASING;
             return;
          }
          else if (brakes_relesed == BRAKES_RELEASING)
          {
             if (!BRAKE_BIT) /* T1 is set if the brakes have not been released
yet. Pin 15 */
             {
                if ( ++brakes_delay_cnt < BRAKE_TIMEOUT) return;
                else mcpvsysbug( );
             }
             else brakes_relesed = BRAKES_RELEASED;
          } /* if */
          indx_veh_prv = indx_veh;
       } /* if */
       else return;
    } /* if */
    /* Round the value up by 1 if the lower byte is more than 128 */
/*
    whl_setpt.ints.outsd = ((unsigned char ) whl_setpt.ints.outsd > 128 ) ?
                              ( whl_setpt.ints.outsd >>8 ) +1 :
                              ( whl_setpt.ints.outsd >>8 );
```

```
*/
    /* if the whl_setpt is > 0xff00 then we don't want to round up by 1 because
*/
    /*  it will cause a rollover which would cause problems */
    if (( whl_setpt.ints.outsd < 0xFF00 ) &&
        ((unsigned char) whl_setpt.ints.outsd > 128 ))
    {
       whl_setpt.ints.outsd += 256; /* add 1 to the high byte to round up */
    } /* if */
    whl_setpt.ints.outsd = whl_setpt.ints.outsd >>8;
    if (( whl_setpt.ints.insd < 0xFF00 ) &&
        ((unsigned char) whl_setpt.ints.insd > 128 ))
    {
       whl_setpt.ints.insd += 256; /* add 1 to the high byte to round up */
    } /* if */
    whl_setpt.ints.insd = whl_setpt.ints.insd >>8;
     /* Make sure the inside wheel is less than or equal to the outside wheel */
     /*  We only need to look at the lower byte at this point */
    if    (    (unsigned    char)    whl_setpt.ints.outsd    <    (unsigned    char)
whl_setpt.ints.insd )
    {
       whl_setpt.ints.insd = (unsigned char) whl_setpt.ints.outsd;
    } /* if */
    current_AO_speed[ 1 ] = (unsigned char) ( whl_setpt.ndx[ io_control_table[
indx_veh ].analout_portside] );
    current_AO_speed[ 0 ] = (unsigned char) ( whl_setpt.ndx[ io_control_table[
indx_veh ].analout_starb ] );
    creep_counter++;
    if ( creep_counter >= LOOP_CREEP_OFFSET )
    {
       creep_counter = 0;
       /* temp_long is used here as a dummy veriable to save RAM space */
       /*  It is used as the running difference of the present and previous */
       /*   encoder counts */
       temp_long.normal.a = tot_enc_preset_l[ 0 ] - encd_port_prv; /* portside
encoder [0] */
/*
       running_diff = tot_enc_preset_l[ 0 ] - encd_port_prv;
*/
        /* Is the port wheel moving ? */
       if ( current_AO_speed[ 0 ] >= 1 )
       {
```

```
          /* test for the port side headed forward */
          if ( discrete_status & 1 )
          {
             if ( temp_long.normal.a < MIN_CREEP_OFFSET )
             {
                /* The 32 allows the loop to go through 8 time before actually
*/
                /* changing the speed by 1. */
                /*  12800 = 256*12800 because we are checking the most sig byte
for more than 12800 */
                creep_offset_port.word = MIN( 12800, creep_offset_port.word +
32 );
             }
             else if ( temp_long.normal.a > MAX_CREEP_OFFSET )
             {
                creep_offset_port.word = MAX( 0, creep_offset_port.word - 32 );
             } /* if */
          }
          /* is portside wheel is in reverse ? */
          else if ( discrete_status & 2 )
          {
              if( temp_long.normal.a > -MIN_CREEP_OFFSET )
             {
                creep_offset_port.word = MIN( 12800, creep_offset_port.word +
32 );
             }
             else if ( temp_long.normal.a < -MAX_CREEP_OFFSET )
             {
                creep_offset_port.word = MAX( 0, creep_offset_port.word - 32 );
             } /* if */
          } /* if */
       }
       else
       {
          creep_offset_port.word = 0;
       } /* if */

       temp_long.normal.a = tot_enc_preset_l[ 1 ] - encd_star_prv; /* starboard
encoder [1] */
        /* is this wheel moving ? */
       if ( current_AO_speed[ 1 ] >= 1 )
       {
```

```
          /* Bit 3 is set if starboard is headed in reverse */
          if ( discrete_status & 4 )
          {
             if ( temp_long.normal.a < MIN_CREEP_OFFSET )
             {
                creep_offset_star.word = MIN( 12800, creep_offset_star.word +
32);
             }
             else if ( temp_long.normal.a > MAX_CREEP_OFFSET )
             {
                creep_offset_star.word = MAX( 0, creep_offset_star.word - 32);
             } /* if */
          }
          /* vehicle is in reverse */
          else if ( discrete_status & 8 )
          {
             if ( temp_long.normal.a > -MIN_CREEP_OFFSET )
             {
                creep_offset_star.word = MIN( 12800, creep_offset_star.word +
32);
             }
             else if ( temp_long.normal.a < -MAX_CREEP_OFFSET )
             {
                creep_offset_star.word = MAX( 0, creep_offset_star.word - 32);
             } /* if */
          } /* if */
       }
       else
       {
          creep_offset_star.word = 0;
       } /* if */
       encd_port_prv = tot_enc_preset_l[ 0 ];
       encd_star_prv = tot_enc_preset_l[ 1 ];
    } /* if */
    current_AO_speed[ 0 ] = current_AO_speed[ 0 ] + creep_offset_port.bytes[0];
    current_AO_speed[ 1 ] = current_AO_speed[ 1 ] + creep_offset_star.bytes[0];
    WRITE_PORT( A_D_OUTPUT_0, current_AO_speed[ 0 ] );
    WRITE_PORT( A_D_OUTPUT_1, current_AO_speed[ 1 ] );
  }
  else /* stop vehicle */
  {
     stop__apply_brakes();
```

```
  } /* if */
} /* MCP_Ratio_Control() */
/*****************************************************************************/
/* MCP_TPS_Control is the MCP control of the analog outputs done when the TPS*/
/*  (Terminal Positioning System) is guiding on a wire instead of ratio      */
/*   control.  It receies its inputs from the ANALOG_IN chip on the DIO board*/
/*   through the RAM chip.  By reading the RAM chip is can update the control*/
/*   and guide on the wire.                                                  */
/*  The message from the 80186 will need to contain:                         */
/*  1) desired speed                                                         */
/*  2) direction of the vehicle (forward or reverse)                         */
/*  3) if we are guiding on a passive or active wire ( the signals will be   */
/*        read from different places depending on what type of wire we are  */
/*        on.)                                                               */
/*  4) if the obstical detection system is on                                */
/*****************************************************************************/
void MCP_TPS_Control()
{
  P3_4 = 0;  /* Pin 14 of the 8051 (DS5000) */
  if ( setpt_n > 0 )
  {
     if ( obst_enbld == OBSTC_ENABLD )
     {
   /*  The following line of code is placed here for future use.  If there is */
   /*  ever another (second) obstical detection board placed in the vehicle */
   /*  the signal will already be placed in the RAM chip and can be read by */
   /*  this line of commented out code. */
         /* Read analog_in (input 8) from the RAM chip. */
   /*****
         READ_RAM( HIGH, HIGH, RAM_LOC_2, RAM_LOC_3, dummy_n );
   ******/

         /* Read the obstical analog_in (input 9) value from the RAM chip. */
         READ_RAM( HIGH, HIGH, RAM_LOC_0, RAM_LOC_1, dummy_n );
        /* temp_long is just used here as a dummy integer veriable to save DATA
space */
        temp_long.x65536.c[0] = (7*8*(int)obstc_setpt) +
                    ((int) (dummy_n - obstc_a_scale) * (int) obstc_b_scale);

        obstc_setpt = (temp_long.x65536.c[0] < 0) ? 0 : (temp_long.x65536.c[0]
<<2) >>8;
        setpt_x = MIN( setpt_x, obstc_setpt );
```

```
    } /* if */

        /* If we are over a passive wire (no current) the TPS will induce current
*/
        /*  into the wire and the guidence signals will come in though the TPS
*/
        /*  board to the analog_in chip on the DIO board lines 12-15.  This
signal*/
        /*  will then be used below to guide the eagle vehicle on the wire.*/
        if ( using_tps_or_analog_inputs )
        {
           if ( vehicle_forward_bit )
           {
              READ_RAM( LOW, LOW, RAM_LOC_0, RAM_LOC_1, port_byte );
              READ_RAM( LOW, LOW, RAM_LOC_2, RAM_LOC_3, starboard_byte );
              current_AO_speed[ 2 ] = port_byte;
              current_AO_speed[ 3 ] = starboard_byte;
           }
           else
           {
              READ_RAM( LOW, HIGH, RAM_LOC_0, RAM_LOC_1, starboard_byte );
              READ_RAM( LOW, HIGH, RAM_LOC_2, RAM_LOC_3, port_byte );
              current_AO_speed[ 2 ] = port_byte;
              current_AO_speed[ 3 ] = starboard_byte;
           } /* if */
        }
           /* If the vehicle is over a live wire (active) we will read the analog
*/
           /*  inputs from the analog board through the analog_in chip input 4
and 5. */
           /*  The MCP will control the wheels from the signal recieved through
*/
           /*  the analog board instead of the TPS board. */
        else
        {
              READ_RAM( HIGH, LOW, RAM_LOC_0, RAM_LOC_1, port_byte );
              READ_RAM( HIGH, LOW, RAM_LOC_2, RAM_LOC_3, starboard_byte );
              current_AO_speed[ 2 ] = port_byte;
              current_AO_speed[ 3 ] = starboard_byte;
        } /* if using_tps_or_analog_inputs */
#if 0
    /* take the average of the prev and new reading to smooth the transition */
```

```
     temp_long.normal.a = ( ((unsigned long)port_byte <<8) + ((unsigned
long)prev_port_byte <<8) ) >> 1;
     temp_long.normal.a = (unsigned)temp_long.normal.a+128; /* round up if it is
<128 */
     prev_port_byte = port_byte;
     port_byte = temp_long.x256.b;
     temp_long.normal.a = ( ((unsigned long)starboard_byte <<8) + ((unsigned
long)prev_starboard_byte <<8) ) >> 1;
     temp_long.normal.a = (unsigned)temp_long.normal.a+128; /* round up if it is
<128 */
     prev_starboard_byte = starboard_byte;
     starboard_byte = temp_long.x256.b;
#endif

     if ( initial_port_diff > 0 )
     {
        initial_port_diff = MAX( 0, initial_port_diff - TPS_SCALING_FACTOR );
     }
     else if ( initial_port_diff < 0 )
     {
        initial_port_diff = MIN( 0, initial_port_diff + TPS_SCALING_FACTOR );
     }
     else
     {
        /* temp_long is the diff of starboard_byte and port_byte */
        /* If the difference if bigger than the error_backup then we are */
        /*  probably off the wire so I am going to shut down the vehicle. */
        temp_long.x256.extra3 = 0;
        temp_long.x256.b = (int)starboard_byte - (int)port_byte;
        temp_long.x65536.c[0] = 0;
        temp_long.normal.a = labs(temp_long.normal.a - tps_offset_from_center);
        if( temp_long.x256.b > tps_error_backup )
        {
           Do_Controlled_Estop();
           return;
        } /* if */
     } /* if */

     temp_long.x256.extra3 = 0;
     temp_long.x256.b = (int)starboard_byte - (int)port_byte;
        /* ">>1" is same as devide by 2 "/2" */
     e = (( temp_long.normal.a - tps_offset_from_center - initial_port_diff ) +
```

```
e) >>1;
/*              e   =   ((((long)starboard_byte<<8)   -   ((long)port_byte<<8)   -
tps_offset_from_center - initial_port_diff ) + e) /2; */
/*      setpt_c = setpt_c + e; */
/*      setpt_c = e; */

/*      if ( setpt_c >=0 ) */
     if ( e >= 0 )
     {
/*          temp_long.normal.a = setpt_n - setpt_c; */
        temp_long.normal.a = setpt_n - e;
        temp_long.x65536.c[0] = (temp_long.x65536.c[1] < 0) ? 0xFFFF : 0;
        current_AO_speed[ 1 ] = (MAX( 0, temp_long.x256.b ));
        current_AO_speed[ 0 ] = setpt_n>>8;
     }
     else
     {
        temp_long.normal.a = setpt_n + e;
        temp_long.x65536.c[0] = (temp_long.x65536.c[1] < 0) ? 0xFFFF : 0;
        current_AO_speed[ 0 ] = (MAX( 0, temp_long.x256.b ));
        current_AO_speed[ 1 ] = setpt_n>>8;
     }
     WRITE_PORT(A_D_OUTPUT_0, current_AO_speed[ 0 ]);
     WRITE_PORT(A_D_OUTPUT_1, current_AO_speed[ 1 ]);
  }
  else
  {
     /* Stop the vehicle if the speed is setpt_n = 0. */
     /* But don't turn off the TPS transmitter because we still might be */
     /*  running on the wire. */
     WRITE_PORT(A_D_OUTPUT_0,0); /* set wheel speed to 0 */
     WRITE_PORT(A_D_OUTPUT_1,0); /* set wheel speed to 0 */
     current_AO_speed[ 0 ] = 0;
     current_AO_speed[ 1 ] = 0;
     /* Turn Contactors off and set the Brakes */
     /*  dont turn TPS off it is disabled by a command in the setup procedure */
     discrete_status &= 0xE0;
     WRITE_PORT_IN_INT( MCP_DISCRETES, ~discrete_status );
  } /* if setept_x */
  P3_4 = 1;  /* Pin 14 of the 8051 (DS5000) */
} /* MCP_TPS_Control() */
/********************************************************************************/
```

```
/* void mcpvsysbug()                                                           */
/******************************************************************************/
void mcpvsysbug()
{
 /* code to notify the 80186 there has been a problem. */
 /*  Currently the only message is the -brakes will not release. */
} /* mcpvsysbug */
/******************************************************************************/
/* Setup is a function called when the command que has data in it.  The data  */
/*  is placed in the que by the interface routine.  When there is data in the */
/*  que it means that the output need to be changed.  The setup is just called*/
/*  when data is changed in the database.  This function does not return     */
/*  anything.                                                                 */
/******************************************************************************/
void setup()
{
 int prev_timer_counter;
  /* Stay in here until I have serviced all the commands from the interface */
  do
  {
     switch ( command_que[ q_tail ] & 0xF0 )  /* the command it in the upper 4
bits */
     {
        case M_C_P__RATIO_CONTROL:
        {
#ifdef DEBUG
           mcp_ratio_control_bit = ON;  /* turn TPS off and turn RATIO control
on */
           tps_control_bit = OFF;
           discrete_status &= 0x9F; /* make sure both TPS transmitters are off
*/
#endif
           q_tail++;
           q_tail &= Q_MASK_VALUE;
#ifdef DEUBG
           setpt_n = setpt.temp_setpt_int;
           /* Make sure the speed is at least 1.0 (265) and no less. */
           if (( setpt_n < 256 ) && ( setpt_n != 0))
           {
              setpt_n = 256;
           }
#endif
```

```
            ratio_c = ratio.temp_ratio_int;
            indx_veh_bas = command_que[ q_tail ];
            q_tail++;
            q_tail &= Q_MASK_VALUE;
            /* Determine inside and outside wheels from the io_control_table. */
            encd.outsd  =  &tot_enc_preset_l[  io_control_table[  indx_veh_bas
].encin_outwhl ];
            encd.insd  =  &tot_enc_preset_l[  io_control_table[  indx_veh_bas
].encin_inwhl ];
            *encd.outsd = ARBITARY_DIST;
            /* Storing in temp_long.a and using temp_long.b is the same as
deviding */
            /*  by 256. Below is the equation with out the use of temp_long: */
            /*         *encd.insd = (*encd.outsd * ratio_c)/ 256; */
            /*  But the Long devide by 256 takes 1.4ms where the shifing is much
faster. */

            temp_long.normal.a = *encd.outsd * ratio_c;
            if ( temp_long.x65536.c[1] < 0 )
            {  /* sign extend the bytes if the value is negative */
               temp_long.x65536.c[0] = 0xFFFF; /* 2 most sig bytes of the
temp_long */
            }
            else
            {
               temp_long.x65536.c[0] = 0; /* other wise they should be 0 */
            } /* if */
            *encd.insd = temp_long.x256.b;
            encd_port_prv = tot_enc_preset_l[ 0 ]; /* preset the previos as well
*/
            encd_star_prv = tot_enc_preset_l[ 1 ];
            timer_counter = 0; /* force the ratio to run when the setup is
complete */
           break;
        } /* M_C_P_CONTROL */
        case M_C_P__OBST:
        {
            q_tail++;
            q_tail &= Q_MASK_VALUE;

            obstc_a_scale = command_que[ q_tail ];
            q_tail++;
```

```
    q_tail &= Q_MASK_VALUE;
    obstc_b_scale = command_que[ q_tail ];
    q_tail++;
    q_tail &= Q_MASK_VALUE;

    break;
 } /* M_C_P__OBST  */
 case M_C_P__STATE:
 {
    q_tail++;
    q_tail &= Q_MASK_VALUE;

    temp_byte = command_que[ q_tail ];
    q_tail++;
    q_tail &= Q_MASK_VALUE;

    switch (temp_byte)
    {
        case BRAKES_DSABLD:
               /* The 186 will send this command it he wants to do */
               /*  a controlled estop.  So in stop__apply_brakes I have */
               /*  the call to do_controlled_estop */
               stop__apply_brakes();
               brakes_relesed = BRAKES_DSABLD;
               break;
        case BRAKES_ENABLD:
               brakes_relesed = MAX( brakes_relesed, BRAKES_ENABLD);
               break;
        case OBSTC_ENABLD:
               obstc_setpt = 255;
        case OBSTC_DSABLD:   /* fall thru */
               obst_enbld = temp_byte;
               break;
    } /* switch */
    break;
 } /*  M_C_P__STATE */
 case M_C_P__INITIALIZE:
 {
    q_tail++;
    q_tail &= Q_MASK_VALUE;

    initialize_variables();
```

```
            break;
         } /* M_C_P__INITIALIZE */
         case M_C_P__TURN_TPS_TRANS_ON:
         {
            temp_byte = command_que[ q_tail ];

            vehicle_forward_bit = ( temp_byte & TPS_VEHICLE_DIRECTION ) ? 1 : 0;

            q_tail++;
            q_tail &= Q_MASK_VALUE;

            if( ( temp_byte & CHECK_BOTTOM_TWO_BITS ) == 3 )
            {
               if ( vehicle_forward_bit )
               {
                  discrete_status &= 0x9F; /* Disable both transmitters since I
dont know */
                                           /*  which one was on previously. */
                  discrete_status |= 0x40; /* (0x40) turn on front TPS transmitter
*/
               }
               else
               {
                  discrete_status &= 0x9F; /* Disable both transmitters since I
dont know */
                                           /*  which one was on previously. */
                  discrete_status |= 0x20; /* (0x20) turn on rear TPS transmitter
*/
               } /* if */
            }
            else
            {
               tps_control_bit = OFF; /* disable tps_control */
               discrete_status &= 0x9F; /* Disable both TPS transmitters */
            } /* if */

            WRITE_PORT(MCP_DISCRETES, ~discrete_status);
         } /* M_C_P__TURN_TPS_TRANS_ON */
         case M_C_P__TPS_CONTROL:
         {
            mcp_ratio_control_bit = OFF;
```

```
            temp_byte = command_que[ q_tail ];

            vehicle_forward_bit = ( temp_byte & TPS_VEHICLE_DIRECTION ) ? 1 : 0;

            q_tail++;
            q_tail &= Q_MASK_VALUE;

            /* if bit 3 is set then the next byte in the command_que is the speed
*/
            /*  setpt instead of the offset_from_center value.  If bit 3 is not
*/
            /*  set then byte sent is the offset_from_center value. */
            if ( temp_byte & M_C_P__TPS_SET_SPEED )
            {
               tps_control_bit = ON;
               setpt_n = command_que[ q_tail ];
               setpt_n = setpt_n<<8; /* timesd by 265 for better resolution */

               /* This is so the vehicle can come to a stop and startup again */
               /*  just by sending a new speed command instead of sending the */
               /*  setup command again. */
               if ( vehicle_forward_bit )
               {
                  discrete_status &= 0xE0; /* I dont know what is was previously
so */
                                           /*   clear it to set up for new
direction */
                  /* this leaves the TPS transmitter on if it is already on */
                  discrete_status |= 0x15; /* (0x10 | 0x05)*/
                                           /* release breaks (10h)*/
                                           /* set front contactors (05h) */

               }
               else
               {
                  discrete_status &= 0xE0; /* I dont know what is was previously
so */
                                           /*   clear it to set up for new
direction */
                  /* this leaves the TPS transmitter on if it is already on */
                  discrete_status |= 0x1A; /* (0x10 | 0x0A) */
                                           /* release breaks (10h) */
                                           /* set rear contactors (0Ah) */
```

```
            } /* if */
            WRITE_PORT(MCP_DISCRETES, ~discrete_status);

         }
         else
         {
            tps_control_bit = ON;
            tps_offset_from_center = (char) ( command_que[ q_tail ] );
            /* Take the maximum of 10 or 50% of the tps_offset_from_center
value */
            /*  this will be the check to see if the vehicle is over a wire or
not. */
            tps_error_backup = tps_offset_from_center;
/*              tps_error_backup = MAX( 10, cabs(tps_error_backup>>1) ); */
            /* Move it to the upper byte for better resolution an the muliply
by 2 for */
            /*  scaling. */
            tps_offset_from_center = tps_offset_from_center <<9; /* for more
resolution */

            setpt_c = 0;

            switch ( temp_byte & CHECK_BOTTOM_TWO_BITS )
            {
               case 3:
                       using_tps_or_analog_inputs = 1; /* read from the TPS
inputs */
                       if ( vehicle_forward_bit )
                       {
                          discrete_status = 0x55; /* (0x40 | 0x10 | 0x05)*/
                                        /* turn on front TPS transmitter (40h)
*/
                                        /* release breaks (10h)*/
                                        /* set front contactors (05h) */
                          WRITE_PORT(MCP_DISCRETES, ~discrete_status);

                          /* Delay long enough for the ANALOG IN chip */
                          /*   to read the TPS */
#if 0
                          timer_counter=3000;
                          while(timer_counter > 0);
                          timer_counter=2000;
```

```
        for(;;)
        {
           if (timer_counter < 1000)
           {
              if ( timer_counter != prev_timer_counter )
              {
                 prev_timer_counter  = timer_counter;
                 READ_RAM( LOW, LOW, RAM_LOC_0, RAM_LOC_1,
port_byte );

                 loop_counter++;
                 large_array[loop_counter] = port_byte;
              }
           }
           if (timer_counter < 0)
           {
              for(;;);
           }
        } /* for */
#endif
        READ_RAM( LOW, LOW, RAM_LOC_0, RAM_LOC_1, port_byte
);
        READ_RAM(   LOW,   LOW,   RAM_LOC_2,   RAM_LOC_3,
starboard_byte );
        /* debug code so the inputs can be displayed on the
HCU */
        current_AO_speed[ 2 ] = port_byte;
        current_AO_speed[ 3 ] = starboard_byte;
        /* end debug code */
     }
     else
     {
        discrete_status = 0x3A; /* (0x20 | 0x10 | 0x0A) */
                     /* turn on rear TPS transmitter (20h)
*/
                     /* release breaks (10h) */
                     /* set rear contactors (0Ah) */
        WRITE_PORT(MCP_DISCRETES, ~discrete_status);
        /* Delay long enough for the ANALOG IN chip */
        /*   to read the TPS */
#if 0
        timer_counter=20;
        while(timer_counter > 0);
```

```
#endif
                        READ_RAM(   LOW,   HIGH,   RAM_LOC_0,   RAM_LOC_1,
starboard_byte );
                        READ_RAM( LOW, HIGH, RAM_LOC_2, RAM_LOC_3, port_byte
);
                        /* debug code so the inputs can be displayed on the
HCU */
                        current_AO_speed[ 2 ] = port_byte;
                        current_AO_speed[ 3 ] = starboard_byte;
                        /* end debug code */
                     } /* if */
                     break;

                case 2: /* else use the analog input for antenna data */
                case 1:
                     using_tps_or_analog_inputs = 0; /* read from the analog
inputs instead of the TPS inputs */
                     if ( vehicle_forward_bit )
                     {
                        discrete_status = 0x15; /* (0x10 | 0x05)*/
                                        /* release breaks (10h)*/
                                        /* set front contactors (05h) */
                     }
                     else
                     {
                        discrete_status = 0x1A; /* (0x10 | 0x0A) */
                                       /* release breaks (10h) */
                                       /* set rear contactors (0Ah) */
                     } /* if */
                     WRITE_PORT(MCP_DISCRETES, ~discrete_status);
                     READ_RAM( HIGH, LOW, RAM_LOC_0, RAM_LOC_1, port_byte );
                     READ_RAM( HIGH, LOW, RAM_LOC_2, RAM_LOC_3, starboard_byte
);

                     /* debug code so the inputs can be displayed on the HCU
*/
                     current_AO_speed[ 2 ] = port_byte;
                     current_AO_speed[ 3 ] = starboard_byte;
                    /* end debug code */
                    break;
                case 0: /* else check to see if we are to turn off the tps */
                default:
```

```
                    tps_control_bit = OFF; /* disable tps_control */
                    discrete_status &= 0x9F; /* make sure both TPS
transmitters are off */
                    WRITE_PORT(MCP_DISCRETES, ~discrete_status);
                    break;
            } /* switch */


   /*                      initial_port_diff = (((long)starboard_byte<<8) -
((long)port_byte<<8) - tps_offset_from_center ); */
            prev_port_byte = port_byte;
            prev_starboard_byte = starboard_byte;
            temp_long.x256.extra3 = 0;
            temp_long.x256.b = (int)starboard_byte - (int)port_byte;
            initial_port_diff = temp_long.normal.a - tps_offset_from_center ;
         } /* if */
         q_tail++;
         q_tail &= Q_MASK_VALUE;
         break;
      } /* M_C_P__TPS */
      case M_C_P__DIRECT_WRITE:
      {
         mcp_ratio_control_bit = OFF;     /* disable Ratio mode */
         tps_control_bit = OFF;           /* disable TPS mode */
         temp_byte = command_que[ q_tail ];
         /* point to the next command */
         q_tail++;
         q_tail &= Q_MASK_VALUE; /* make sure the que never goes higher than
the max_que */
         /* is bit 2 set */
         if (temp_byte & 2)
         {
            current_AO_speed[ 1 ] = command_que[ q_tail ];
            WRITE_PORT(A_D_OUTPUT_1, current_AO_speed[ 1 ]);
            q_tail++;
            q_tail &= Q_MASK_VALUE; /* make sure the que never goes higher than
the max_que */
         } /* if */
         /* is bit 1 set */
         if (temp_byte & 1)
         {
            current_AO_speed[ 0 ] = command_que[ q_tail ];
```

```
            q_tail++;
            q_tail &= Q_MASK_VALUE; /* make sure the que never goes higher than
the max_que */
            WRITE_PORT(A_D_OUTPUT_0, current_AO_speed[ 0 ]);
         } /* if */

         /* only needed if there is a controlled estop in manual mode */
         ESTOP_INTERRUPT = 0; /* Disable E-stop interrupt to make sure we get
the correct setpt value */
         if ( current_AO_speed[ 0 ] > current_AO_speed[ 1 ] )
         {
            setpt_n = ( (unsigned)current_AO_speed[ 0 ] )<<8;
         }
         else
         {
            setpt_n = ( (unsigned)current_AO_speed[ 1 ] )<<8;
         }
         ESTOP_INTERRUPT = 1; /* Enable the E-Stop interrupt */

         break;
      } /* M_C_P__DIRECT_WRITE  */
      case M_C_P__DISCRETES:
      {
   /* debug code to see how many counts on an e-stop */
     current_AO_speed[2] = save_counts[0];
     current_AO_speed[3] = save_counts[1];
   /* end debug code */
         mcp_ratio_control_bit = OFF;     /* disable ratio mode */
         tps_control_bit = OFF;           /* disable TPS mode */
   /*      discrete_status &= 0x9F; */ /* make sure both TPS transmitters are
off */

         /* point to the next command */
         q_tail++;
         q_tail &= Q_MASK_VALUE; /* make sure the que never goes higher than
the max_que */

         /* status = the status of what I want the bit to be. */
         /* mask = the bit that I want to work on. */
         mask = command_que[ q_tail ];
            /* point to the next command */
         q_tail++;
```

```
          q_tail &= Q_MASK_VALUE; /* make sure the que never goes higher than
the max_que */
          status = command_que[ q_tail ];
            /* point to the next command */
          q_tail++;
          q_tail &= Q_MASK_VALUE; /* make sure the que never goes higher than
the max_que */

           /* The 186 Sends the bits 1 means to enable. */
           /* The actual status out on the board is 0 to enable. */
           /* The problem comes in when the Antennas in this discrete_status are
*/
           /*  also 1 to enable.  So when I get a message from the 186 I must
set*/
           /*  and clear the correct bits.  But they must be LOW to enable  */
           /*  and HIGH to disable the outputs. */
           /* Enable any discretes sent by the 186 */
          discrete_status |= status & mask;

          /* Disable any discretes sent by the 186 */
          discrete_status &= ~((~status) & mask);
           /* write the discrete status to the chip. */
          WRITE_PORT(MCP_DISCRETES, ~discrete_status);
          break;
        } /* M_C_P__DISCRETES */
        default:
        /* Incase there is junk in the que.  I don't want to stay in the loop
           forever.  This will bump the que to the next place and bypass the
           junk. */
        {
           q_tail++;
           q_tail &= Q_MASK_VALUE;
           break;
        } /* if */
     } /* switch */
  } while (q_head != q_tail);
} /* setup */
/*****************************************************************************/
/* Stop__apply_brakes()                                                      */
/*  Used to stop the vehicle by disabeling the contactors and setting the    */
/*   brake.                                                                  */
/*****************************************************************************/
```

```
void stop__apply_brakes()
{
     Do_Controlled_Estop(); /* controlled stop */
     WRITE_PORT(A_D_OUTPUT_0,0); /* set wheel speed to 0 */
     WRITE_PORT(A_D_OUTPUT_1,0); /* set wheel speed to 0 */
     current_AO_speed[ 0 ] = 0;
     current_AO_speed[ 1 ] = 0;
     /* Turn Contactors off and set the Brakes and disable the transmitter */
     /*  on the 2 TPS boards */
     discrete_status &= 0x80;
     WRITE_PORT_IN_INT( MCP_DISCRETES, ~discrete_status );
     whl_setpt.ints.insd = 0;
     whl_setpt.ints.outsd = 0;
     creep_offset_port.word = 0;
     creep_offset_star.word = 0;
     setpt_x = 0;
     setpt_n = 0;
     setpt_c = 0;
     brakes_relesed = MIN(brakes_relesed, BRAKES_SET);
     indx_veh_prv = 0xFF;  /* guarantee a change next time used */
} /* stop__apply_brakes */
/****************************************************************************/
/* The timer interrupt occures every 1ms.  It lets the Main loop know it is   */
/*  time to execute the outputs again.  This is so I can control how often the*/
/*  main loop updates the Analog out values to the Analog_to_digital          */
/*  converters.                                                               */
/****************************************************************************/
void Timer0_interrupt() interrupt 1 using 1
{
data unsigned char tmp_byte;
  TH0 += 0xfc; /* Set up the timer to occure again after 1ms. */
  timer_counter--;
/* debug code for Jim to see the encoder ticks */
/*
  READ_PORT(COUNT_ENC_STAR,tmp_byte);
  WRITE_PORT(A_D_OUTPUT_2,tmp_byte);
  READ_PORT(COUNT_ENC_PORT,tmp_byte);
  WRITE_PORT(A_D_OUTPUT_3,tmp_byte);
*/
/* End debug code */
} /* Timer0_interrupt */
```

```
/******************************* In line Macros ******************************/
/* This is a Macro for inline code.  The ICE uses a different way to access
   external memory than the real  chip.  These need to be compiled different
   to utilize the compiled options. */
#ifdef NOHAU_ICE
   /* called out side of an interrupt */
   sfr P0_e = 0xe8; /* used because the ICE places the P0 address on P4 of the ICE */
   sfr P2_e = 0xf8; /* used because the ICE places the P2 address on P5 of the ICE */
   sfr IP_e = 0xa9; /* The ICE has a different address for IP than the real chip */
   #define READ_PORT(address,data) EA=0; P2_e=address>>8; P1_7 = 0; data = P0_e; \
        P1_7 = 1; P2_e = 0xff; EA = 1
   #define WRITE_PORT(address,data) EA=0; P0_e = data; P2_e=address>>8; P1_6 = 0; \
        P1_6 = 1; P2_e = 0xff; P0_e = 0xff; EA = 1
   /*called inside of an interrupt so interrupts are not enabled by a read */
   #define READ_PORT_IN_INT(address,data) P2_e=address>>8; P1_7 = 0; data = P0_e; \
        P1_7 = 1; P2_e = 0xff
   #define WRITE_PORT_IN_INT(address,data) P0_e = data; P2_e=address>>8; P1_6 = 0; \
        P1_6 = 1; P2_e = 0xff; P0_e = 0xff
#else
   #define IP_e IP /* normal IP address */
                  /* Used because the NOHAU ICE has a different address for the  */
                  /*  IP register.  So when the ICE is not used it must be defined to
*/
                  /*  the origional place IP. */
  #define P2_e P2
  #define P0_e P0
   /* called out side of an interrupt */
   #define READ_PORT(address,data) data = XBYTE[address]
   #define WRITE_PORT(address,data) XBYTE[address] = data
   /*called inside of an interrupt just to be compatable with the read and write
     when the ICE is connected.  It does not matter for when the ICE is not connected
     because I dont need to enable and disable interrupts on a read. */
   #define READ_PORT_IN_INT(address,data) data = XBYTE[address]
   #define WRITE_PORT_IN_INT(address,data) XBYTE[address] = data
#endif
/* Definition of the call to READ_RAM: */
/****************************************************************************/
/* Below is a description of the nibbles that have data placed in them by the*/
/*  the Analog_in processor on the DIO board.                               */
/* This ram chip is only 4 bits wide. So to store an entire byte I need     */
/*  to do 2 reads. Once to the low nibble and then the high nibble at the   */
/*   next loctaion.                                                         */
```

```
/* Here is a description of the locations in the ram chip that the data will */
/*   be placed by the Analog in chip on the DIO board:                         */
/*      LOCATION IN            DESCRIPTION                  DIO BOARD        */
/*     THE RAM CHIP                                        CHANNEL NUMBER    */
/*     --------                                                              */
/*   0 | 0000 | LOW NIBBLE                                                   */
/*     --------           TPS FRONT ANTENNA PORTSIDE            12           */
/*   1 | 0001 | HIGH NIBBLE                                                  */
/*     --------                                                              */
/*   2 | 0010 | LOW NIBBLE                                                   */
/*     --------           TPS FRONT ANTENNA STARBOARD           13           */
/*   3 | 0011 | HIGH NIBBLE                                                  */
/*     --------                                                              */
/*   4 | 0100 | LOW NIBBLE                                                   */
/*     --------           TPS REAR ANTENNA STARBOARD            14           */
/*   5 | 0101 | HIGH NIBBLE                                                  */
/*     --------                                                              */
/*   6 | 0110 | LOW NIBBLE                                                   */
/*     --------           TPS REAR ANTENNA PORTSIDE             15           */
/*   7 | 0111 | HIGH NIBBLE                                                  */
/*     --------                                                              */
/*   8 | 1000 | LOW NIBBLE                                                   */
/*     --------           ANALOG BOARD ANTENNA PORTSIDE          4           */
/*   9 | 1001 | HIGH NIBBLE                                                  */
/*     --------                                                              */
/*   A | 1010 | LOW NIBBLE                                                   */
/*     --------           ANALOG BOARD ANTENNA STARBOARD         5           */
/*   B | 1011 | HIGH NIBBLE                                                  */
/*     --------                                                              */
/*   C | 1100 | LOW NIBBLE                                                   */
/*     --------           1ST ODS BOARD (OBSTICAL DETECTOR)      9           */
/*   D | 1101 | HIGH NIBBLE                                                  */
/*     --------                                                              */
/*   E | 1110 | LOW NIBBLE                                                   */
/*     --------           2ND ODS BOARD (OBSTICAL DETECTOR)      8           */
/*   F | 1111 | HIGH NIBBLE                                                  */
/*        ^^^^                                                               */
/*        ||||>-LSB located on P2 bit 2 (Pin 23 of DS5000)                   */
/*        |||>------located on P2 bit 3 (Pin 24 of DS5000)                   */
/*        ||>-------located on P1 bit 4 (Pin 5 of DS5000)                    */
/*        |>----MSB located on P1 bit 5 (Pin 6 of DS5000)                    */
/* The output enable pin to the RAM chip is located on the 74138 (U50) pin 7.*/
```

```
/*  This will be included in the address placed on the P2 port when          */
/*  addressing the RAM chip.  Along with the 2 LSB control lines on P2.      */
/***************************************************************************/
/* TERMS USED:                          */
/*  p14 = Port 1 bit 4 (DS5000 pin 5)   */
/*  p15 = Port 1 bit 5 (DS5000 pin 6)   */
/*  msn = Most Significant Nibble       */
/*  lsn = Least Significant Nibble      */
/*  byte = the byte that will be returned */
/* Example of the call:  READ_RAM( HIGH, LOW, RAM_LOC_0, RAM_LOC_1, temp_byte ); */
/****
 #define READ_RAM(p15,p14,lsn,msn,byte) P1_4 = p14; P1_5 = p15; byte = (XBYTE[msn]<<4);
\
                                 byte |= (XBYTE[lsn] & 0X0F); P1_4 = 1; P1_5 = 1
****/
#define READ_RAM( p15,p14,lsn,msn,byte ) P1_5 = p15; P1_4 = p14; EA=0; P2_e=msn; \
                                         byte = P0_e<<4; P2_e = 0xff; P2_e=lsn; \
                                         byte |= P0_e & 0x0f; P2_e = 0xff; EA=1;\
                                         P1_5 = 1; P1_4 = 1

#define HIGH 1
#define LOW 0
#define ON  1
#define OFF 0
#define MIN(a,b)  ( ((a) < (b)) ? (a) : (b) )
#define MAX(a,b)  ( ((a) > (b)) ? (a) : (b) )
/************ Address definitions to access data to the chips ****************/
  /* in these definitions the first byte goes out P2 and the '00' goes out port P0
 (chip)  (binary)  */  /* WAS */
#define  A_D_OUTPUT_0   0xbd00  /* address of A/D Converter to output 0
   (U44) (10111101) */ /* bf00 */
#define  A_D_OUTPUT_1   0xcd00  /* address of A/D Converter to output 1
   (U45) (11001101) */ /* cf00 */
#define  A_D_OUTPUT_2   0xdd00  /* address of A/D Converter to output 2
   (U47) (11011101) */ /* df00 */
#define  A_D_OUTPUT_3   0xed00  /* address of A/D Converter to output 3
   (U46) (11101101) */ /* ef00 */
#define  COUNT_ENC_STAR 0x9d00  /* HCTL2000 Counter connected to Encoder 0
   (U48) (10011101) */ /* 9f00 */
#define  COUNT_ENC_PORT 0xad00  /* HCTL2000 Counter connected to Encoder 1
   (U49) (10101101) */ /* af00 */
#define  FIFO_BUFFER    0x8900  /* Accessing the buffer in the FIFO for read or write
  (U39) (10001001) */ /* 8b00 */
```

```
#define  FIFO_REGS       0x8d00  /* Accessing the Registers in the FIFO for read or
write (U39) (10001101) */ /* 8f00 */
#define   MCP_DISCRETES   0xfe00   /* Writing to the 74374 latch contolling the
contactores (U52) (11111110) */
#define  RAM_LOC_0      0xf1    /* Read location 0 of the Analog in chip 4 bits
   (U51) (11110001) */
#define  RAM_LOC_1      0xf5    /* Read location 1 of the Analog in chip
   (U51) (11110101) */
#define  RAM_LOC_2      0xf9    /* Read location 2 of the Analog in chip
   (U51) (11111001) */
#define  RAM_LOC_3      0xfd    /* Read location 3 of the Analog in chip
   (U51) (11111101) */
/****************** Register Definitions of the FIFO ****************************/
/* Status Register */
#define  STAT_FD        0x01   /* Bit is set if the Frame Detect occured */
#define  STAT_MAIL_BOX 0x04   /* Bit is set if there is a message in the Mail Box */
#define  STAT_EMPTY     0x20   /* Set if the buffer is empty (I test to see when data
has been put in the buffer */
#define  STAT_MR        0x80   /* Set if a Master Reset just occured */
 /* Pointer Register */
#define  POINTER_REG_CMD 0x01 /* Address to access the Command register */
#define  POINTER_REG_MSK 0x02 /* Address to access the Mask register */
#define   POINTER_REG_MAIL_BOX_OUT 0x04 /* Address to access the outgoinh Mail Box
register */
#define   POINTER_REG_MAIL_BOX_IN  0x06 /* Address to access the incoming Mail Box
register */
/* Mask Register */
#define  MASK_REG_MAIL_BOX 0x04 /* Enable the Mail Box interrupt to occure in
                                  the Mask register */
/* Command Register */
#define COMMAND_REG_MR_BIT 0x80
/******** Interrupts to the 80186 enabled or disabled in this byte *************/
 /* Says if the DS5000 is allowed to interrupt the 80186.  Four (4) bits in the
    mask are accociated with an analog output. The other four (4) bits are not
    used. When the interrupt level is reached the code checks this bit to see
    if it is allowd to interrupt the 80186 to tell it the level has been reached.
Bits are Discribed Below:
       bit          Discreption
        7             not used
        6             not used
        5             not used
        4             not used
```

```
        3           Analog Output 3
        2           Analog Output 2
        1           Analog Output 1
        0           Analog Output 0 */
xdata unsigned char interrupt_mask;
#define ANLG_OUT_3_MASK 0x08
#define ANLG_OUT_2_MASK 0x04
#define ANLG_OUT_1_MASK 0x02
#define ANLG_OUT_0_MASK 0x01
/* Brake and Obstical Detect definitions */
#define BRAKE_TIMEOUT     50
#define BRAKES_DSABLD     0
#define BRAKES_ENABLD     1
#define BRAKES_SET        2
#define BRAKES_RELEASING  3
#define BRAKES_RELEASED   4
#define OBSTC_DSABLD      8
#define OBSTC_ENABLD      9

/* Messages defined from the 80186 to the DS5000 */
#define M_C_P__DIRECT_WRITE           0x00  /* Set the outputs directly */
#define M_C_P__SPEED                  0x10  /* Speed command direct to each output
*/
#define M_C_P__RAT                    0x20  /* Send only the ratio of the wheels */
#define M_C_P__WHLS                   0x30  /* Send the individual wheel speeds */
#define M_C_P__DISCRETES              0x40  /* Set the discretes through the MCP */
#define M_C_P__OBST                   0x50  /* Obstical detect scaling fators */
#define M_C_P__STATE                  0x60  /* Status of MCP brakes and ODS */
#define M_C_P__RATIO_CONTROL          0X70  /* Send the speed and ratio in the same
command */
#define M_C_P__INITIALIZE             0X80  /* Restart the program from 0 */
#define M_C_P__TPS_CONTROL            0X90  /* Turn on the TPS control */
                                            /*  Low 4 bits are discribed below: */
                                            /*  Bits 1&2:  */
                                            /*   00    Disable TPS mode and enable
RATIO mode */
                                            /*   01,10 Analog antenna values should
be used */
                                            /*    11     TPS antenna values should
be used */
                                            /*  Bit 3:  Vehicle direction 1=forward
0=reverse */
```

```
#define M_C_P__TURN_TPS_TRANS_ON          0XA0  /* Lets me know to turn on the TPS
transmitter ahead of when I plan to use it */
#define M_C_P__INTERRUPT_LEVEL_CMD       0xb0  /* Interrupt level to reach to before
telling 80186 */
#define READ_MCP_DISCRETES              0xc0  /* 186 Wants status of MCP discretes */
#define READ_CURRENT_ANALOG_COMMAND      0xd0  /* 186 wants status of current outputs
*/
#define CLEAR_INTERRUPT_COMMAND          0xe0  /* Clear the interrupt level */
#define M_C_P__READ_INTERRUPT_COMMAND    0xf0  /* Read the interrupt level command */
/******** Array structure to keep track of the data sent from the 80186 *******/
/* Veriables that the INTO places the values send by the 186 */
  unsigned char interrupt_level[4];
#define SETPT_OFFSET_ACCEL  ((256*3)/4) /* (256 * 3) Is the number that is added to */
#define SETPT_OFFSET_DECEL  ((256*6)/4) /* (256 * 6) Is the number that is added to */
                                  /*  the value each time through the loop. */
                                  /* The devide by 4 is how often I run through my loop
before     */
                                  /*  the 186 comes back to talk to me.
           */
data unsigned setpt_n; /* Current (now) vehicle speed, then one wheel is scaled down
from here */
data unsigned setpt_x;
xdata long setpt_c;
/* These next 2 unions are used in the interface to save the data in a temp
     location.  This done to pervent any conflicts between the interface and the
     main routine writing and reading from the same location. */
/* Here is an example of how Franklin Compiler stores the data into intagers
  CODE:
    setpt.temp_setpt_int = 0xffaa;
  GENERATES:
     MOV    setpt,#0FFH
     MOV    setpt+1,#0AAH
  SO:
     The most sig. byte is stored first followed by the Least Sig byte. */

data union /* total of 2 bytes */
{
  unsigned int temp_setpt_int;
  unsigned char temp_setpt_byte[2];
} setpt;
data union /* total of 2 bytes */
{
```

```
  unsigned int temp_ratio_int;
  unsigned char temp_ratio_byte[2];
} ratio;
/*******************************************************************/
/* Status of the discretes EX: contactors, brakes, and antennas    */
/*  The contactors are LOW to enable (reverse logic)               */
/*  The brake is LOW to release and HIGH to set it                 */
/*  The Antennas are HIGH to Enable and LOW to Disable             */
/* and if I can keep all of these straight in the same veriable name*/
/*    I will be doing very good.                                   */
/* The bits in this BYTE are discribed below:                      */
/*  BIT 0 = Portside Frontwards Contactor  (LOW to enable)         */
/*  BIT 1 = Portside Backwards Contactor  (LOW to enable)          */
/*  BIT 2 = Starboard Frontwards Contactor (LOW to enable)         */
/*  BIT 3 = Starboard Backwards Contactor (LOW to enable)          */
/*  BIT 4 = Front Antenna enable (HIGH to enable LOW to disable)   */
/*  BIT 5 = Rear Antenna enable (HIGH to enable LOW to disable)    */
/*  BIT 6 = Brake Release Bit (LOW to release HIGH to set)         */
/*  BIT 7 = currently not used                                     */
/* The Contactor Table (io_control_table.contctrl) was developed for*/
/*  a HIGH to enable. So inorder to use this table it must be      */
/*  inverted before using to enable the correct Contactors.        */
/*******************************************************************/
data unsigned char discrete_status;
/********** Queue Used to keep track of the Commands sent from the 80186 ******/
#define Q_SIZE     8                              /* Must be a multipule of 2
(ex:2,4,8,16,32,62...) */
#define Q_MASK_VALUE (Q_SIZE - 1)       /* Mask value is 3 when the queue is of size
4 */
                                        /*  The Queue size must be in multipules of 2
in order */
                                        /*  for the Q_MASK_VALUE to work properly.  So
if the queue */
                                        /*    must  be  increased  change  it  to
8,16,32,64... */
data unsigned char command_que[Q_SIZE]; /* A Queue to keep track of the commands sent
from the 80186 */
                                        /*  incase there is more than 1 befor I can
process the  */
                                        /*  previous one. */
data unsigned char q_head;            /* Index pointing to the beginning of the Queue
*/
```

```
data unsigned char q_tail;             /* Index pointing to the end of the Queue */
/**************** ODS (Obstical Detect Subsystem) **********************/
#define OBST_DECT_HIGH 0 /* find out what it is */
#define OBST_DECT_LOW  0
#define OBST_AVER      8
unsigned char dummy_n;             /* Temp byte for ods */
unsigned char obstc_setpt;
unsigned char obst_enbld;
unsigned char obstc_a_scale;
unsigned char obstc_b_scale;
/************************ Creep ************************************/
#define LOOP_CREEP_OFFSET  8 /* Only go through this part of the code every so often
*/
#define MIN_CREEP_OFFSET   LOOP_CREEP_OFFSET * 2 /* Min distance traveled in encoder
ticks before adding on the offset */
#define MAX_CREEP_OFFSET   LOOP_CREEP_OFFSET * 3  /* Max distance traveled in encoder
ticks before taking off some offset */
data unsigned char creep_counter;
#define DEV_SGN_FLD        8 /* [True]Dev >= 0 Outs=Lft, Insd=Rht; [False]Dev < 0
Outs=Rht, Insd=lft */
data union
{
  int word;
  char bytes[2];
}creep_offset_port;
data union
{
  int word ;
  char bytes[2];
}creep_offset_star;
/******************** Table of values for the speed ramp down  *********/
/*
xdata unsigned char accel_decel_table[] = {
 0,  1,  3,  4,  6,  7,  9, 10, 12, 14, 15, 17, 18, 20, 21, 23,
25, 26, 28, 29, 31, 32, 34, 36, 37, 39, 40, 42, 43, 45, 46, 48,
49, 51, 53, 54, 56, 57, 59, 60, 62, 63, 65, 66, 68, 69, 71, 72,
74, 75, 77, 78, 80, 81, 83, 84, 86, 87, 89, 90, 92, 93, 95, 96,
97, 99, 100,102,103,105,106,108,109,110,112,113,115,116,117,119,
120,122,123,124,126,127,128,130,131,132,134,135,136,138,139,140,
142,143,144,146,147,148,149,151,152,153,155,156,157,158,159,161,
162,163,164,166,167,168,169,170,171,173,174,175,176,177,178,179,
181,182,183,184,185,186,187,188,189,190,191,192,193,194,195,196,
```

```
197,198,199,200,201,202,203,204,205,206,207,208,209,210,211,211,
212,213,214,215,216,217,217,218,219,220,221,221,222,223,224,225,
225,226,227,227,228,229,230,230,231,232,232,233,234,234,235,235,
236,237,237,238,238,239,239,240,241,241,242,242,243,243,244,244,
244,245,245,246,246,247,247,247,248,248,249,249,249,250,250,250,
251,251,251,251,252,252,252,252,253,253,253,253,254,254,254,254,
254,254,255,255,255,255,255,255,255,255,255,255,255,255,255,255 };
*/
code /*xdata */unsigned char decel_table[] = {
254,254,254,253,253,252,252,251,251,250,250,249,249,248,247,247,
246,246,245,244,244,243,243,242,241,241,240,239,239,238,238,237,
236,236,235,234,234,233,232,231,231,230,229,229,228,227,226,226,
225,224,224,223,222,221,221,220,219,218,217,217,216,215,214,213,
213,212,211,210,209,209,208,207,206,205,204,203,203,202,201,200,
199,198,197,196,196,195,194,193,192,191,190,189,188,187,186,185,
185,184,183,182,181,180,179,178,177,176,175,174,173,172,171,170,
169,168,167,166,165,164,163,162,161,160,159,158,157,156,155,153,
152,151,150,149,148,147,146,145,144,143,142,141,139,138,137,136,
135,134,133,132,131,129,128,127,126,125,124,123,121,120,119,118,
117,116,114,113,112,111,110,109,107,106,105,104,103,102,100,99,
98, 97, 96, 94, 93, 92, 91, 90, 88, 87, 86, 85, 83, 82, 81, 80,
79, 77, 76, 75, 74, 72, 71, 70, 69, 67, 66, 65, 64, 62, 61, 60,
59, 57, 56, 55, 54, 52, 51, 50, 49, 47, 46, 45, 44, 42, 41, 40,
38, 37, 36, 35, 33, 32, 31, 30, 28, 27, 26, 24, 23, 22, 21, 19,
18, 17, 15, 14, 13, 12, 10,  9,  8,  6,  5,  4,  3,  1,  0, 0 };
#ifdef FIRST_TRY /* this table stays up at 255 to long */
code /*xdata */unsigned char decel_table[] = {
255,255,255,255,255,255,255,255,255,255,255,255,255,255,254,254,
254,254,254,254,253,253,253,253,252,252,252,252,251,251,251,251,
250,250,250,249,249,249,248,248,247,247,247,246,246,245,245,244,
244,244,243,243,242,242,241,241,240,239,239,238,238,237,237,236,
235,235,234,234,233,232,232,231,230,230,229,228,227,227,226,225,
225,224,223,222,221,221,220,219,218,217,217,216,215,214,213,212,
211,211,210,209,208,207,206,205,204,203,202,201,200,199,198,197,
196,195,194,193,192,191,190,189,188,187,186,185,184,183,182,181,
179,178,177,176,175,174,173,171,170,169,168,167,166,164,163,162,
161,159,158,157,156,155,153,152,151,149,148,147,146,144,143,142,
140,139,138,136,135,134,132,131,130,128,127,126,124,123,122,120,
119,117,116,115,113,112,110,109,108,106,105,103,102,100,99, 97,
96, 95, 93, 92, 90, 89, 87, 86, 84, 83, 81, 80, 78, 77, 75, 74,
72, 71, 69, 68, 66, 65, 63, 62, 60, 59, 57, 56, 54, 53, 51, 49,
48, 46, 45, 43, 42, 40, 39, 37, 36, 34, 32, 31, 29, 28, 26, 25,
```

```
23, 21, 20, 18, 17, 15, 14, 12, 10,  9,  7,  6,  4,  3,  1, 0 };
#endif
/*
each element in this curve went through this equation to get to the
next curve: x = an element in this table
  ( 25.5/x) * 256 = the next table below
xdata unsigned char indexs_per_tick_tbl[] = {
 0,  1,  1,  2,  3,  3,  4,  5,  5,  6,  7,  7,  8,  8,  9, 10,
10, 11, 12, 12, 13, 14, 14, 15, 15, 16, 17, 17, 18, 19, 19, 20,
21, 21, 22, 22, 23, 24, 24, 25, 26, 26, 27, 28, 28, 29, 30, 30,
31, 32, 32, 33, 33, 34, 35, 35, 36, 37, 37, 38, 39, 39, 40, 41,
41, 42, 43, 43, 44, 45, 45, 46, 47, 47, 48, 49, 49, 50, 51, 51,
52, 53, 53, 54, 55, 55, 56, 57, 58, 58, 59, 59, 60, 61, 61, 62,
63, 64, 64, 65, 66, 66, 67, 68, 68, 69, 70, 70, 71, 72, 72, 73,
74, 75, 75, 76, 77, 78, 78, 79, 80, 80, 81, 82, 83, 83, 84, 85,
86, 86, 87, 88, 89, 89, 90, 91, 92, 92, 93, 94, 95, 95, 96, 97,
98, 98, 99, 100,101,102,102,103,104,105,105,106,107,108,109,110,
110,111,112,113,114,114,115,116,117,118,119,120,120,121,122,123,
124,125,126,127,127,128,129,130,131,132,133,134,135,136,137,138,
139,140,141,142,143,144,145,146,147,148,149,150,151,152,153,154,
155,156,157,159,160,161,162,163,164,165,167,168,169,171,172,173,
174,176,177,179,180,181,183,184,186,187,189,191,192,194,196,198,
199,201,203,205,208,210,212,215,217,220,223,227,231,235,241,255 };
*/
#ifdef THIS_WAS_THE_FIRST_TEST
/* 10 inch stop from linear curve */
code /* xdata */ unsigned int indexs_per_tick_scaled_tbl[] = {
6403,3201,2134,1601,1281,1067,915,800,711,640,582,534,493,457,427,
400,377,356,337,320,305,291,278,267,256,246,237,229,221,213,207,
200,194,188,183,178,173,168,164,160,156,152,149,146,142,139,136,
133,131,128,126,123,121,119,116,114,112,110,109,107,105,103,102,
100, 99, 97, 96, 94, 93, 91, 90, 89, 88, 87, 85, 84, 83, 82, 81,
80, 79, 78, 77, 76, 75, 74, 74, 73, 72, 71, 70, 70, 69, 68, 67,
67, 66, 65, 65, 64, 63, 63, 62, 62, 61, 60, 60, 59, 59, 58, 58,
57, 57, 56, 56, 55, 55, 54, 54, 53, 53, 52, 52, 52, 51, 51, 50,
50, 50, 49, 49, 49, 48, 48, 47, 47, 47, 46, 46, 46, 45, 45, 45,
44, 44, 44, 44, 43, 43, 43, 42, 42, 42, 42, 41, 41, 41, 41, 40,
40, 40, 40, 39, 39, 39, 39, 38, 38, 38, 38, 37, 37, 37, 37, 37,
36, 36, 36, 36, 36, 35, 35, 35, 35, 35, 34, 34, 34, 34, 34, 34,
33, 33, 33, 33, 33, 33, 32, 32, 32, 32, 32, 32, 31, 31, 31, 31,
31, 31, 30, 30, 30, 30, 30, 30, 30, 30, 29, 29, 29, 29, 29, 29,
29, 28, 28, 28, 28, 28, 28, 28, 28, 27, 27, 27, 27, 27, 27, 27,
```

```
27, 27, 26, 26, 26, 26, 26, 26, 26, 26, 26, 26, 25, 25, 25, 25 };
#endif
/* 12 inch stop */
code unsigned int indexs_per_tick_scaled_tbl[] = {
5440,2720,1813,1360,1088,907,777,680,604,544,495,453,418,389,363,340,
320,302,286,272,259,247,237,227,218,209,201,194,188,181,175,170,
165,160,155,151,147,143,139,136,133,130,127,124,121,118,116,113,
111,109,107,105,103,101,99,97,95,94,92,91,89,88,86,85,
84, 82, 81, 80, 79, 78, 77, 76, 75, 74, 73, 72, 71, 70, 69, 68,
67, 66, 66, 65, 64, 63, 63, 62, 61, 60, 60, 59, 58, 58, 57, 57,
56, 56, 55, 54, 54, 53, 53, 52, 52, 51, 51, 50, 50, 49, 49, 49,
48, 48, 47, 47, 46, 46, 46, 45, 45, 45, 44, 44, 44, 43, 43, 43,
42, 42, 42, 41, 41, 41, 40, 40, 40, 39, 39, 39, 39, 38, 38, 38,
38, 37, 37, 37, 37, 36, 36, 36, 36, 35, 35, 35, 35, 34, 34, 34,
34, 34, 33, 33, 33, 33, 33, 32, 32, 32, 32, 32, 31, 31, 31, 31,
31, 31, 30, 30, 30, 30, 30, 30, 29, 29, 29, 29, 29, 29, 28, 28,
28, 28, 28, 28, 28, 27, 27, 27, 27, 27, 27, 27, 27, 26, 26, 26,
26, 26, 26, 26, 26, 25, 25, 25, 25, 25, 25, 25, 25, 25, 24, 24,
24, 24, 24, 24, 24, 24, 24, 23, 23, 23, 23, 23, 23, 23, 23, 23,
23, 22, 22, 22, 22, 22, 22, 22, 22, 22, 22, 22, 22, 21, 21, 21};
#ifdef SECOND_TRY
/* 10 inch from nonlinear cureve */
code unsigned int indexs_per_tick_scaled_tbl[] = {
6528,6528,6528,3264,2176,2176,1632,1305,1305,1088,933,933,816,816,725,653,
653,593,544,544,502,466,466,435,435,408,384,384,363,344,344,326,
311,311,296,297,284,272,272,261,251,251,242,233,233,225,218,218,
211,204,204,198,198,192,187,187,181,176,176,172,167,167,163,159,
159,155,152,152,148,145,145,142,139,139,136,133,133,131,128,128,
126,123,123,121,119,119,117,115,113,113,111,111,109,107,107,105,
104,102,102,100, 99, 99, 97, 96, 96, 95, 93, 93, 92, 91, 91, 89,
88, 87, 87, 86, 85, 84, 84, 83, 82, 82, 81, 80, 79, 79, 78, 77,
76, 76, 75, 74, 73, 73, 73, 72, 71, 71, 70, 69, 69, 69, 68, 67,
67, 67, 66, 65, 65, 64, 64, 63, 63, 62, 62, 62, 61, 60, 60, 59,
59, 59, 58, 58, 57, 57, 57, 56, 56, 55, 55, 54, 54, 54, 54, 53,
53, 52, 52, 51, 51, 51, 51, 50, 50, 49, 49, 49, 48, 48, 48, 47,
47, 47, 46, 46, 46, 45, 45, 45, 44, 44, 44, 44, 43, 43, 43, 42,
42, 42, 42, 41, 41, 41, 40, 40, 40, 40, 39, 39, 39, 38, 38, 38,
38, 37, 37, 36, 36, 36, 36, 35, 35, 35, 35, 34, 34, 34, 33, 33,
33, 32, 32, 32, 31, 31, 31, 30, 30, 30, 29, 29, 28, 28, 27, 26 };
#endif

/****************************** Variables used in the program ****************/
```

```
sbit ECHAIN_WATCHDOG = P1 ^ 0;     /* Watchdog output bit to keep the E-CHAIN from
droping out */
sbit P1_1 = P1 ^ 1;    /* Toggle Bit to see when the 186 it talking to me in auto mode.
*/
sbit RESET_COUNTERS = P1 ^ 2;        /* active low (must be pulled low to reset the
chip) */
sbit P1_4 = P1 ^ 4;
sbit P1_5 = P1 ^ 5;
sbit P1_6 = P1 ^ 6;
sbit P1_7 = P1 ^ 7;
sbit P3_4 = P3 ^ 4;    /* Toggle the Bit to see how often I run through my main loop.
Pin 14 */
sbit BRAKE_BIT = P3 ^ 5;     /* Brake bit (Set if the brakes are released Cleared
otherwise) Pin 15 */
data bit mcp_ratio_control_bit;  /* SET if running in real mode Cleared if running in
manual mode */
data bit first_time_flag_bit;
data int old_encoder_0_i;      /* Previous value read from the Encoder 1 */
data int old_encoder_1_i;      /* Previous value read from the Encoder 2 */
data long tot_enc_preset_l[2];      /* Total distance of encoder #1 and #2 at most 24
bit counter */
xdata unsigned char current_AO_speed[4]; /* Current motor speed (of 1-4 motors) */
xdata unsigned char save_counts[2];
data unsigned char temp_byte;           /* Temp holder for the command in the setup
routine */
xdata unsigned char status;        /* The status is the status of what I want the bit
to be. */
xdata unsigned char mask;           /* The Mask is the bit I want to work on. */
/* New veriables added from garys code */
/
**************************************************************************************
*********
    The following tables are built with these definitions:
    FF=FrontForw(1), RF=RearForw(0) from vehicle_direction,
    OutsideWheel=VehicleWheel set to specfd speed, InsideWheel=wheel ratioed to
OutsideWheel
        InsideWheelSpeed <= OutsideWheelSpeed (always)
    Lao=LeftAnalogOut, Rao=RightAnalogOut, IW=InsideWheel, Ow=OutsideWheel
    Left-Right side:  When "FF" Leftside=Portside, Rightside=Starboard,
                      When "RF": Leftside=Starboard, Rightside=Portside,
    Contactors: RS=RearStarboard, RP=RearPortside, FS=FrontStarboard, FP=FrontPortside
              FP=( FF & LOA[+spd] ) | ( RF & RAO[-spd] )
              FS=( RF & LOA[-spd] ) | ( FF & RAO[+spd] )
```

```
            RP=( FF & LOA[-spd] ) | ( RF & RAO[+spd] )
            RS=( RF & LOA[+spd] ) | ( FF & RAO[-spd] )
   DEV=value specified to control wheels.  When DEV >= 0: Ow=Left, Iw=Right
                                                DEV <  0: Ow=Right, Iw=Left
   Encoders, When "FF" LeftWhlEncDist = PortEncDist, RightWhlEncDist = StarbEncDist
             When  "RF"  LeftWhlEncDist  =  (-)StarbEncDist,  RightWhlEncDist  =
(-)PortEncDist
   Address              Contactors          Analog Out        Encd In
  |Dev|FF |Iw |Ow |    |RS |FS |RP |FP |   |Prts|Strb|     | Iw | Ow |
  | 0 | 0 | 0 | 0 |    | 0 | 1 | 0 | 1 |   |o=0 |i=1 |     |S=0 |P=1 | Insd/Outsd Indx
references structure
  | 0 | 0 | 0 | 1 |    | 1 | 0 | 0 | 1 |   |  0 |  1 |     |  0 |  1 | "encd" where
0(Owhl) and 1(Iwhl) are
  | 0 | 0 | 1 | 0 |    | 0 | 1 | 1 | 0 |   |  0 |  1 |     |  0 |  1 | the structure
elements.
  | 0 | 0 | 1 | 1 |    | 1 | 0 | 1 | 0 |   |  0 |  1 |     |  0 |  1 |
  -----------------    -----------------   -----------     -----------
  | 0 | 1 | 0 | 0 |    | 1 | 0 | 1 | 0 |   |i=1 |o=0 |     |P-1 |S-0 | "Encoder In"
references the port/starb
  | 0 | 1 | 0 | 1 |    | 1 | 0 | 0 | 1 |   |  1 |  0 |     |  1 |  0 | encoders and
assigns them to Iwhl or
  | 0 | 1 | 1 | 0 |    | 0 | 1 | 1 | 0 |   |  1 |  0 |     |  1 |  0 | Owhl.
  | 0 | 1 | 1 | 1 |    | 0 | 1 | 0 | 1 |   |  1 |  0 |     |  1 |  0 |
  -----------------    -----------------   -----------     -----------
  | 1 | 0 | 0 | 0 |    | 0 | 1 | 0 | 1 |   |i=1 |o=0 |     |P=1 |S=0 |
  | 1 | 0 | 0 | 1 |    | 0 | 1 | 1 | 0 |   |  1 |  0 |     |  1 |  0 |
  | 1 | 0 | 1 | 0 |    | 1 | 0 | 0 | 1 |   |  1 |  0 |     |  1 |  0 |
  | 1 | 0 | 1 | 1 |    | 1 | 0 | 1 | 0 |   |  1 |  0 |     |  1 |  0 |
  -----------------    -----------------   -----------     -----------
  | 1 | 1 | 0 | 0 |    | 1 | 0 | 1 | 0 |   |o=0 |i=1 |     |S=0 |P=1 |
  | 1 | 1 | 0 | 1 |    | 0 | 1 | 1 | 0 |   |  0 |  1 |     |  0 |  1 |
  | 1 | 1 | 1 | 0 |    | 1 | 0 | 0 | 1 |   |  0 |  1 |     |  0 |  1 |
  | 1 | 1 | 1 | 1 |    | 0 | 1 | 0 | 1 |   |  0 |  1 |     |  0 |  1 |
*************************************************************************************
***********/
data int ratio_gain;
data int ratio_c;
data unsigned char indx_veh_bas;  /* Bit 0 is Outside wheel */
                                   /* Bit 1 is Inside wheel */
                                   /* Bit 2 is the vehicle direction */
                                   /* Bit 3 in deviation direction */
data unsigned char indx_veh_prv;
```

```
typedef struct
{   unsigned char contctrl;           /* contactor settings */
    unsigned char analout_portside;   /* analog_out portside */
    unsigned char analout_starb;      /* analog_out starboard */
    unsigned char encin_inwhl;        /* encoder_in inside wheel */
    unsigned char encin_outwhl;       /* encoder_in outside wheel */
} io_ctrl_type;
    /* define contactors, analog out I/O channel[ports(0)/starb(1) = outs(0)/insd(1)],
        for DEV/front-back combinations, and Enc-In(outside/inside) = Channel[ports(1),
starb(0)] */
xdata io_ctrl_type io_control_table[] =
{ 0x05, 0, 1, 0, 1,  0x09, 0, 1, 0, 1,  0x06, 0, 1, 0, 1,  0x0A, 0, 1, 0, 1, /* rear
forw(1)   -  'Dev' Negative(0) */
  0x0A, 1, 0, 1, 0,  0x09, 1, 0, 1, 0,  0x06, 1, 0, 1, 0,  0x05, 1, 0, 1, 0, /* front
forw(0)  -  'Dev' Negative(0) */
  0x05, 1, 0, 1, 0,  0x06, 1, 0, 1, 0,  0x09, 1, 0, 1, 0,  0x0A, 1, 0, 1, 0, /* rear
forw(1)   -  'Dev' Positive(1) */
  0x0A, 0, 1, 0, 1,  0x06, 0, 1, 0, 1,  0x09, 0, 1, 0, 1,  0x05, 0, 1, 0, 1  /* front
forw(0)  -  'Dev' Positive(1) */
};
data union
{
  unsigned int ndx[2];
  struct
  {  unsigned int outsd;
     unsigned int insd;
  } ints;
} whl_setpt;
data struct
{   long *outsd;
    long *insd;
} encd;
data long encd_port_prv;
data long encd_star_prv;
/* This structure is 6 chars long.  structure "normal" will point to the
   right 4 most bytes.  Structure x256 points to the 4 middle bytes and
   structure x65536 points to the 4 left most bytes.  This help to multiply
   and devide by 256 just by referencing the different pointers.  This helps in
   doing the integer arithmatic. */

data union
{
```

```
  struct
  {
     unsigned char extra;
     unsigned char extral;
     long a;
  } normal;
  struct
  {
     unsigned char extra2;
     long b;
     unsigned char extra3;
  } x256;
  struct
  {
     int c[2];
     unsigned char extra4;
     unsigned char extra5;
  } x65536;
} temp_long;
#define ARBITARY_DIST 10000
data unsigned char indx_veh;
xdata unsigned char brakes_relesed;
xdata unsigned char brakes_delay_cnt;
data int /*char*/ timer_counter;  /* Counter so that the mcp_control will not run */
                           /*  faster than every 6ms. */
/**************************** E-STOP veriables and stuff  ***************/
#define ESTOP_INTERRUPT   EX1
data bit do_controlled_estop_bit;
/**************************** TPS Terminal Posisition Subsystem ***************/
/* 4 lower Bits used in the message from the 186 */
#define M_C_P__TPS_SET_SPEED           0X08  /* Command for the vehicle speed when
controlled under TPS */
#define TPS_VEHICLE_DIRECTION         0X04
#define USE_TPS_INPUTS_FOR_TPS        0X03
#define CHECK_BOTTOM_TWO_BITS         0X03
#define K  1
#define A1 658
#define A2 -421
#define A3 51
#define A4 -1023
#define A5 992
#ifdef DEBUGFLOAT
```

```
#define A1 2.5703
#define A2 -1.6445
#define A3 .19922
#define A4 -3.9961
#define A5 3.875
#endif
data bit using_tps_or_analog_inputs;  /* 1 = Use the inputs from th TPS board */
                                      /* 0 = Use the inputs from the analog board */
                                      /*  both inputs actually come from the analog_in
chip */
                                      /*  through the RAM chip. But are originated from
*/
                                      /*   different boards */
data bit vehicle_forward_bit;
data bit tps_control_bit;
xdata long tps_offset_from_center;
xdata unsigned char starboard_byte;
xdata unsigned char prev_starboard_byte;
xdata unsigned char port_byte;
xdata unsigned char prev_port_byte;
xdata char tps_error_backup;
xdata long initial_port_diff;
#define TPS_SCALING_FACTOR   16
xdata long e;
/*
xdata long e_last;
xdata long e_last_last;
xdata long e_c;
xdata long e_c_last;
xdata long e_c_last_last;
*/
#ifdef DEBUG
xdata float e;
xdata float e_last;
xdata float e_last_last;
xdata float e_c;
xdata float e_c_last;
xdata float e_c_last_last;
#endif
xdata unsigned loop_counter;
#define LARGE_ARRAY_SIZE 1024
xdata unsigned char large_array[ LARGE_ARRAY_SIZE ];
```

```
/******************************** Prototype Function Deceleration **************/
extern void restart_mcp(); /* assembler routine to restart the program */
```

```
/******************************************************************************/
/*     UMS_SOFTWARE       UMS_SOFTWARE       UMS_SOFTWARE       UMS_SOFTWARE   */
/******************************************************************************/
/*                                                                            */
/*     EEEEEEEEEEEEEEE      TTTTTTTTTTTT              NNNNNNN      NNNNN      */
/*     EEEEEEEEEEEEEE       TTTTTTTTTTT               NNNNNNNN     NNNNN      */
/*     EEEEE           A         TTTT       OOO       NNNNNNNNN    NNNNN      */
/*     EEEEEEEEEEEE   AAA        TTT     OOOOOOOO     NNNNN NNNN   NNNNN      */
/*     EEEEEEEEEEE   AAAAA       TTT     OOOOOOOO     NNNNN  NNNN NNNNN       */
/*     EEEEE                     TTTT       OOO       NNNNN   NNNNNNNNN       */
/*     EEEEEEEEE    AAAAAAA      TTTTT                NNNNN    NNNNNNNN       */
/*     EEEEEEEE    AAAAAAAAA     TTTTTTT              NNNNN     NNNNNNN       */
/*                                                                            */
/******************************************************************************/
/******************************************************************************/
/*                                                                            */
/*      UMSCOMM.C --> The controlling software of the UMS board.  This       */
/*      program controls the hardware on the board to read and store the     */
/*      voltages of the sensors.  Then from these values it determines       */
/*      the position of the vehicle over the magnet.  This program is        */
/*      dynamic in that it calculates the position each time the sensor      */
/*      array is read.  Since the peak sensor is detected in the func-       */
/*      tion wait_for_mag() then only the sensors on either side of peak     */
/*      sensor is read.                                                      */
/*                                                                            */
/*   DEVELOPMENTAL STEPS:                                                    */
/*                                                                            */
/*   1)   Turns on an LED when transmitting which is P2_6.  LED is set      */
/*         when a position is transmitted and cleared when ack'ed.         */
/*   2)   Takes running average of position instead of averaging at the    */
/*             end of accumulating the positions of each reading.            */
/*   3)   Same versions as umscom_4.c except that the two thresholds        */
/*         were made the same reducing problems on the end of the board. */
/*   4)   Modified for the 24 sensor array.  This means changing            */
/*         COUNT_MAX to 24 and subtracting 195 from position to            */
/*         reference to the center of the board.                           */
/*   5)   Same as UMSLNG_1.C except the sign on position is switched        */
/*         because the board is reversed when fit up against the IP box. */
/*   6)   The way that the null voltages are calculated give more weight   */
/*         to the higher calculated null values than the lower calculated*/
/*         values.  This is because the real problem is when the sensor  */
/*         passes over a GWC bi-polar magnet the firmware calibrates the */
```

```
/*          null values to a lower value.                                  */
/*****************************************************************************/
/****************************/
/*    include files        */
/****************************/
#include    <reg51.h>
/* nohau macros */
#ifdef NOHAU_ICE
   sfr P0_e = 0xe8; /* used because the ICE places the P0 address on P4 of the ICE */
   sfr P2_e = 0xf8; /* used because the ICE places the P2 address on P5 of the ICE */
   sfr IP_e = 0xa9; /* The ICE has a different address for IP than the real chip */
#else
   #define P0_e P0
   #define P2_e P2
   #define IP_e IP /* normal IP address */
#endif
/****************************/
/*   define statements     */
/****************************/
#define          SENSOR_NUMBER      24     /*the # of sensors in the array */
#define          CENTER_OFFSET      195    /*offset subtracted from raw position to make
center of board "zero" */
#define          TABLE_MAX   19     /*number of elements in the look up table*/
#define          THRESHOLD_1 35     /*threshold that determines if a magnet is being
passed*/
#define          THRESHOLD_2 35     /*threshold that starts the calculations of
position*/
#define          VOLT_MAX    voltage[0] /*maximum voltage that is in the lookup
tables*/
#define          VOLT_MIN    6
#define          TEST_MIN    15
#define          AVER_NUM    100    /*determines how many readings are averaged for the
null values of the sensors*/
#define          ACK         6      /*acknowledge signal sent to UMS to verify the
reception of magnet position*/
#define          WAIT_COUNTER      12     /*sets the wait time for sensors 1 and 17 for
the voltages to settle*/
/****************************/
/* prototypes declarations */
/****************************/
void  average_null(void);
void        wait_for_mag(void);
```

```
void  store_calc(void);
void  wait_past_mag(void);
void    transmit(void);
/***************************/
/*      globals           */
/***************************/
/***** lookup table *****/
c o d e    u n s i g n e d    c h a r    v o l t a g e [ ]    =
{142,139,133,124,112,99,85,71,58,46,37,29,23,17,13,9,7,4,3,2};
/***** variables whose values are used in more than one function *****/
/*data unsigned char      null[ SENSOR_NUMBER ];*/
xdata unsigned char      null[SENSOR_NUMBER ];
data unsigned char      message_type,
                  peak,
                  second,
                  low_limit,
                  high_limit,
                  first_time_through;
data union  {
            unsigned char     bytesize[ 2 ];
            int         twobytes;
            }position;
/***** variables used in different roles in different functions *****/
data unsigned char      volt_in,
                  count,
                  difference,
                  jack_of_all,
                  serial_act_bit,         /*set when the buffer is clear*/
                  poll_bit,         /*set if polled*/
                  ack_bit,          /*set if it is acknowledged*/
                  poll_must_be_answered,
                  conversion_wait;
xdata unsigned char      store_volt[ SENSOR_NUMBER ];
xdata unsigned int      temp_stor[ SENSOR_NUMBER ];
sbit    P2_6 = P2_e ^ 6;       /*used to turn on LED while transmitting*/
sbit  P2_7 = P2_e ^ 7;  /*used to enable the RS422 reciever and transmitter*/
sbit  P2_2 = P2_e ^ 2;  /*status line from the A/D converter*/
sbit  P2_1 = P2_e ^ 1;  /*starts a conversion on the A/D converter*/
sbit  P2_0 = P2_e ^ 0;  /*starts a conversion on the A/D converter*/
/****************************************************************************/
/*  main--> calls the other functions that control hardware and store      */
/*          voltages from the sensors for later calculations.               */
```

```
/****************************************************************************/
main()
{
      poll_bit = 0;           /*the program won't start until the COMM board has polled
the UMS board*/
      first_time_through = 1;
      P2_6 = 0;         /*turn LED off*/
      position.twobytes = 0;  /*where the calculated position is stored as two bytes*/
      poll_must_be_answered = 0;    /*flag set when a poll is recieved signalling that
it must be ack'ed*/
      SCON = 0x90;            /*set up for mode 2 at 375kHz communications*/
      PCON = 0x80;
      IP_e = 0x10;
      IE = 0x90;
      P2_7 = 1;         /*enable the RS422 rcv and trans*/
      for( ;; )
      {
            if( poll_bit )
            {
                  if( ack_bit )
                  {
                        average_null();         /*determines the null voltages of the
analog sensors*/
                        wait_for_mag();         /*waits until magnet sensed and finds
the peak and second sensor*/
                        store_calc();           /*calculates the position of the
magnet*/
                        wait_past_mag();  /*waits till the magnet has been passed*/
                  }
                  else
                  {
                        transmit();
                  }
            }
      }
}
/****************************************************************************/
/*    average_null--> reads the null voltages a number of times and        */
/*                averages them together.                                 */
/****************************************************************************/
void average_null()
{
```

```
      for( count=0 ; count<SENSOR_NUMBER ; count++ )
            temp_stor[count] = 0;    /*initialize the array used*/

      for( jack_of_all=1 ; jack_of_all<=AVER_NUM ; jack_of_all++ )
      {
            for( count=0 ; count<SENSOR_NUMBER ; count++ )
            {
                  P1 = count; /*strobe to the MUX a new address*/
                  if( count==0 || count==16 )    /*on the first and seventeenth address
the respective*/
                  {                        /*MUXs turn on and a wait state is necessary
for*/
                        conversion_wait = WAIT_COUNTER;    /*the signals to settle*/
                        while( --conversion_wait != 0 );
                  }         /*analog to digital conversion process*/
                  P2_1 = 0;   /*data valid when low*/
                  P2_0 = 0;   /*initiates a conversion if P2_1 is low*/
                  while( !P2_2 );   /*waits  until  status  goes  high  signalling  a
conversion in progress*/
                  P2_0 = 1;   /*brought high to indicate the end of a read cycle*/
                  while( P2_2 );    /*waits until status goes low signalling that the
conversion is complete*/
                  volt_in = P0_e;   /*read data into port 0*/
                  P2_1 = 1;   /*disable A/D converter by bringing high*/
                  temp_stor[ count ] += volt_in;
            }
      }
      if(!first_time_through)
      {
            for(count=0 ; count<SENSOR_NUMBER ; count++)
            {
                  if(temp_stor[ count ]/AVER_NUM > null[ count ])
                  {                 /*adjusts up quicker*/
                        null[ count ] = temp_stor[ count ]/ AVER_NUM;
                  }
                  else
                  {                 /*adjusts lower very slowly because of case when
GWC magnet is crossed*/
                        null[ count ] = ((null[ count ] * 31) + (temp_stor[ count
]/AVER_NUM))>>5;
                  }
            }
```

```
    }
    else
    {
          for(count=0 ; count<SENSOR_NUMBER ; count++)
          {
                null[ count ] = temp_stor[ count ]/AVER_NUM;
                first_time_through = 0;
          }
    }
}
/****************************************************************************/
/*    wait_for_mag() --> this function polls the sensors until              */
/*      a voltage is present on one of the sensors, signalling that a       */
/*    magnet is present.                                                  */
/****************************************************************************/
void  wait_for_mag()
{
jack_of_all = 1;

    do                       /* till a magnet is sensed */
    {
          if( !ack_bit )
          {
                transmit();
          }
          for( count=0 ; count<SENSOR_NUMBER ; count++ )        /* test each sensor
*/
          {
                P1 = count;             /*strobe to the MUX a new address*/
                if( count==0 || count==16 )   /*on the first and seventeenth address
the respective*/
                {                         /*MUXs turn on and a wait state is necessary
for*/
                      conversion_wait = WAIT_COUNTER;     /*the signals to settle*/
                      while( --conversion_wait!=0 );
                }                 /*analog to digital conversion process*/
                P2_1 = 0;               /*data valid when low*/
                P2_0 = 0;               /*initiates a conversion if P2_1 is low*/
                while( !P2_2 );         /*waits until status goes igh signalling a
conversion in progress*/
                P2_0 = 1;         /*brought high to indicate the end of a read
cycle*/
```

```
                while( P2_2 );          /*waits until status goes low signalling that
the conversion is complete*/
                volt_in = P0_e;         /*read data into port 0*/
                P2_1 = 1;       /*disable A/D converter by bringing high*/
                difference = volt_in > (null[ count ]) ? volt_in - (null[ count ]):0;

                if( difference>THRESHOLD_1 )  /* test to see if a magnet is present
*/
                {
                      jack_of_all=0;
                      break;
                }
          }
     }
     while( jack_of_all );
     for( count=0 ; count<SENSOR_NUMBER ; count++ )
     {
          P1=count;   /*strobe to the MUX a new address*/
          if( count==0 || count==16 )   /*on the first and seventeenth address the
respective*/
          {                     /*MUXs turn on and a wait state is necessary for*/
                conversion_wait = WAIT_COUNTER;     /*the signals to settle*/
                while( --conversion_wait!=0 );
          }           /*analog to digital conversion process*/
          P2_1=0;           /*data valid when low*/
          P2_0=0;           /*initiates a conversion if P2_1 is low*/
          while( !P2_2 );   /*waits until status goes high signalling a conversion
in progress*/
          P2_0=1;           /*brought high to indicate the end of a read cycle*/
          while( P2_2 );    /*waits until status goes low signalling that the
conversion is complete*/
          volt_in=P0_e;     /*read data into port 0*/
          P2_1=1;           /*disables A/D converter by bringing high*/
          temp_stor[ count ] = volt_in > null[count] ? volt_in - null[count]:0;
     }
     count = SENSOR_NUMBER - 1;
do
{
     if( temp_stor[ count ]<TEST_MIN )
          count--;
     else
     {
```

```
            if( temp_stor[ count ]<temp_stor[count-1] )
            {
                  if( count>1 )
                        count--;
                  else
                  {
                        peak = count - 1;
                        second = peak + 1;
                        count = 0;
                  }
            }
            else
            {
                  peak = count;
                  if( count!=SENSOR_NUMBER - 1 )
                  {
                        if( temp_stor[ count+1 ]>=temp_stor[ count-1 ] )
                              second = peak + 1;
                        else
                              second = peak - 1;
                  }
                  else
                        second = peak - 1;
            count = 0;
            }
      }
}
while( count );
if( peak>=2 && peak<SENSOR_NUMBER-2 )
{
      low_limit = peak - 2;
      high_limit = peak + 2;
}
else
{
      if( peak<2 )
      {
            low_limit = 0;
            high_limit = peak + 2;
      }
      else
      {
```

```
            low_limit = peak - 2;
            high_limit = SENSOR_NUMBER - 1;
      }
}
return;
} /* wait_for_mag */
/*****************************************************************************/
/*          store_calc() --> This function takes the readings from the      */
/*          two sensors on either side of the peak sensor and then makes    */
/*          the position calculation for that particular set of readings    */
/*          after which it takes another set of readings and does the       */
/*          calculation again.  After which it takes the average.           */
/*****************************************************************************/
void store_calc()
{
data unsigned char      compare,
                  rel_dis,
                  n,
                  temporary_peak;
/*temp_stor[1] --> the calculated distance of the magnet from the edge of the board for
a single sensor value*/
/*temp_stor[2] --> the sum of the calculated distances which is later averaged to give
the averaged position */
position.twobytes = compare = temporary_peak = 0;
n = 1;
do
{
      for( count=0 ; count<SENSOR_NUMBER ; count++ )
      {
            P1 = count;             /*strobe to the MUX a new address*/
            if( count==0 || count==16 )   /*on the first and seventeenth address the
respective*/
            {                       /*MUXs turn on and a wait state is necessary for*/
                  conversion_wait = WAIT_COUNTER;     /*the signals to settle*/
                  while( --conversion_wait!=0 );
            }                 /*analog to digital conversion process*/
            P2_1 = 0;               /*data valid when low*/
            P2_0 = 0;               /*initiates a conversion if P2_1 is low*/
            while( !P2_2 );         /*waits until status goes high signalling a
conversion in progress*/
            P2_0 = 1;         /*brought high to indicate the end of a read cycle*/
            while( P2_2 );          /*waits until status goes low signalling that the
```

```
conversion is complete*/
            volt_in = P0_e;          /*read data into port 0*/
            P2_1 = 1;          /*disable A/D converter by bringing high*/
            difference = volt_in > null[count] ? volt_in - null[ count ] : 0;

            if( difference>THRESHOLD_2 )  /* test to see if a magnet is present */
            {
                  n = 0;
                  break;
            }
      }
}
while( n );
do
{
      for( count=low_limit ; count<=high_limit ; count++ )  /*read in the first set of
data*/
      {
            P1 = count; /*strobe to the MUX a new address*/
            if( count==0 || count==16 )   /*on the first and seventeenth address the
respective*/
            {                        /*MUXs turn on and a wait state is necessary for*/
                  conversion_wait = WAIT_COUNTER;     /*the signals to settle*/
                  while( --conversion_wait!=0 );
            }         /*analog to digital conversion process*/
            P2_1 = 0;   /*data valid when low*/
            P2_0 = 0;   /*initiates a conversion if P2_1 is low*/
            while( !P2_2 );   /*waits until status goes high signalling a conversion
in progress*/
            P2_0 = 1;   /*brought high to indicate the end of a read cycle*/
            while( P2_2 );    /*waits until status goes low signalling that the
conversion is complete*/
            volt_in = P0_e;   /*read data into port 0*/
            P2_1 = 1;   /*disable A/D converter by bringing high*/

            store_volt[ count ] = volt_in > null[ count ] ? volt_in - null[ count ] :
0;
      }

      if( compare )
            compare = (store_volt[ peak ] + (compare*3)) >> 2;
      else
```

```
            compare = store_volt[ peak ];

      count = high_limit+1;
      temp_stor[ 2 ] = n = 0;

      do
      {
            count--;
            if( store_volt[ count ] > VOLT_MIN )
            {
                  n++;
                  if( store_volt[ count ] >= VOLT_MAX )
                        temp_stor[ 1 ] = 17*count;
                  else
                  {
                        jack_of_all = TABLE_MAX;
                        do
                        {
                              if((store_volt[ count ] < voltage[ jack_of_all-1 ]) &&
\
                              (store_volt[ count ] >= voltage[ jack_of_all ]))
                              {
                                    rel_dis = (jack_of_all*2 + (jack_of_all-1)*2)>>1;
                                    jack_of_all = 0;
                              }
                              else
                                    jack_of_all--;
                        }
                        while( jack_of_all );
                        if( ( peak < second && count >= second ) || ( second < peak &&
count >= peak ) )
                              temp_stor[ 1 ]=(17*count)-rel_dis;
                        else
                              temp_stor[ 1 ]=(17*count)+rel_dis;
                  }
            temp_stor[ 2 ] += temp_stor[ 1 ];
            } /* if */
      }
      while( count - low_limit );
      if( position.twobytes )
            position.twobytes = ((position.twobytes*3) +temp_stor[ 2 ]/n)>>2;
      else
```

```
            position.twobytes = temp_stor[ 2 ]/n;
      if( temporary_peak < compare )
            temporary_peak = compare;
      if( store_volt[ peak ] < (THRESHOLD_1-3) )      /* needed when the magnet is on
board end */
            break;
}
while( temporary_peak <= compare+3 );
position.twobytes = -(position.twobytes - CENTER_OFFSET);   /* offset relative to the
center of the board */
                                                  /* and sign reversed because board is
backwards */
P2_6 = 1;               /* turn LED on while transmitting */
message_type = 0xB4;
transmit();
return;
}/*store_calc*/
/****************************************************************************/
/*    wait_past_mag--> the program stays in this function until the          */
/*                  array is past the magnet.                     */
/****************************************************************************/
void  wait_past_mag()
{
position.twobytes = 0;        /* reinitialize position to zero */
count = peak;
      do
      {
            jack_of_all = 0;
            P1 = count; /*strobe to the MUX a new address*/
            if( count==0 || count==16 )   /*on the first and seventeenth address the
respective*/
            {                       /*MUXs turn on and a wait state is necessary for*/
                  conversion_wait = WAIT_COUNTER;     /*the signals to settle*/
                  while( --conversion_wait != 0 );
            }           /*analog to digital conversion process*/
            P2_1 = 0;   /*data valid when low*/
            P2_0 = 0;   /*initiates a conversion if P2_1 is low*/
            while( !P2_2 );   /*waits until status goes high signalling a conversion
in progress*/
            P2_0 = 1;   /*brought high to indicate the end of a read cycle*/
            while( P2_2 );    /*waits until status goes low signalling that the
conversion is complete*/
```

```
		volt_in = P0_e;   /*read data into port 0*/
		P2_1 = 1;   /*disable A/D converter by bringing high*/
		difference = volt_in > null[ count ] ? volt_in - null[ count ] : 0;

		if( difference >= (VOLT_MIN + 1) )
			jack_of_all = 1;
	}
	while( jack_of_all );
	conversion_wait = 500;  /*wait and give the sensors a split second more to get
away from the magnet*/
	while(--conversion_wait != 0);
}/* wait_past_mag */
/***************************************************************************/
void serial() interrupt 4 using 1
{
data unsigned char	received;
	if (TI)
	{
		TI = 0;
		serial_act_bit = 0;
	}
	if (RI)
	{
		RI=0;
		received = SBUF;

		if( received==0xA0 )
		{
			poll_must_be_answered = 1;
			ack_bit = 0;
			poll_bit = 1;
			message_type = 0xA5;
		}
		else
		{
			if( received==ACK )
				ack_bit = 1;
		}
	}
}/* serial interrupt */
/******************************************************/
void transmit()
```

```
{
      ack_bit = 0;

      for(;;)
      {
            if( poll_must_be_answered )
            {
                  serial_act_bit = 1;
                  SBUF = ACK;
                  while( serial_act_bit );

                  ack_bit = 1;
                  poll_must_be_answered = 0;
            }
            else
            {
                  serial_act_bit = 1;
                  SBUF = message_type;
                  while( serial_act_bit );
                        serial_act_bit = 1;           /* say that the serial port is
busy */
                        SBUF = position.bytesize[ 1 ];      /* send out the LSB char
first through the serial port */
                        while( serial_act_bit );      /* stay here until transmit has
finished */

                  serial_act_bit = 1;
                  SBUF = position.bytesize[ 0 ];      /* send out the MSB second*/
                  while( serial_act_bit );
                  serial_act_bit = 1;
                  SBUF = ~position.bytesize[ 1 ];
                  while( serial_act_bit );
                  serial_act_bit = 1;
                  SBUF = ~position.bytesize[ 0 ];
                  while( serial_act_bit );

                  /***** delay *****/

                  count = 45;
                  while( --count != 0 );

                  if( ack_bit )
```

```
                {
                        P2_6 = 0;                    /* turn LED off after transmitting */
                        return;
                }
            }
        }
} /* serial_transmit */
```

```
;***********************************************************************************
*************************************
;This file contains the assembler code for the CIA.  Moduals include, Initialization
of the 8273, interrupt handlers
;     for the 8273 xmt, 8273 recv, Asynchronous xmt, Asnychronous receive, watchdog
activities, primitives used for
;     handlers and etc.
;
;The file is assembled on the Archemedies "C"/Assembler, and linked to higher lever "C"
procedures to control
;     diagnostic functions such as 1's/0's test, and Comtest.
;
;Define general constants
;
***********************************************************************************
*************************************
;
; LBC 2-JUNE-1989 Added a 8273 reset at startup to fix the baudrate incrementing on a
power bump.
;
;    **********************    Include    the    port    definitions    ICE/PROM
**********************************************************************************
$port_def.a
;    **********************    Include    the    port    definitions    ICE/PROM
**********************************************************************************
      ADDR_CLR     EQU   OFFH          ; Used to clear P2
      CMND_POS     EQU   3             ; -1=Header, 0=leng, 1=adr, 2=cntrl, '3'=command,
etc
      AS_HEADER    EQU   OFFH          ; Header char for asynchonous xmits/recvs
      CIA_ADDR     EQU   OFEH          ; Device address for the CIA
      STAT_SHT_LEN       EQU   08          ; short status length = 4 +(2 chksm +adr
+cntrl)
      STAT_LNG_LEN       EQU   1AH         ; long status length = 16H +(2 chksm +adr
+cntrl)
      STAT_SHRT    EQU   OFH           ; Short status command ID (15)
      STAT_LONG    EQU   OEH           ; Long status command ID (14)
      PTR_TO_MS_LEN      EQU   OH          ;  Buffer  index(SDLC_ASYNC)  of  message
length(count)
      VCT_AS_ERR   EQU   15H           ; offset in vector jump table to process error
      B_RST73            EQU   P1.5        ; 8051 output bit connected to 8273 reset pin
      NACK         EQU   1FH           ; nack command ID
      NACK_LENG    EQU   8             ; 4(same length as short status) +2(checksum) +addr
+cntrl
```

```
+cntrl
     A1_MAT_CD    EQU    00H          ; SDLC result code: match address 1 'A1'
     A2_MAT_CD    EQU    01H          ; SDLC result code: match address 2 'A2'
     CLR_PORT     EQU    0FFH         ; part of addressing kludge to use ICE
     ASYNC_TIMEOUT       EQU    20          ; ASNYC timeout value (1.1ms per count)
     SDLC_TIMEOUT        EQU    20          ; SDLC timeout value (1.1ms per count)
     PCON         EQU    087H         ; Address of power control reg, not recogn by Assbl
     REGBNK1             EQU    00001000B   ; Setup for register bank 1
     REGBNK2             EQU    00010000B   ; Setup for register bank 2
     REGBNK3             EQU    00011000B   ; Setup for register bank 3

;
*************************************************************************************
**************************************
;Define error code constants
;
*************************************************************************************
**************************************
     ASYNC_I_ID   EQU    1            ; Async input task ID number
     ASYNC_O_ID   EQU    2            ; Async output task ID number
     SDLC_I_ID    EQU    3            ; SDLC(8273) input task ID number
     SDLC_O_ID    EQU    4            ; SDLC(8272) output task ID number
     TMR_AS_IN    EQU    5            ; Timer Async In taskID number
     TMR_SDLC     EQU    6            ; Timer SdLC In taskID
     MAIN_ID             EQU    0FH         ; background main 'C' task ID number
     AS_CRC_ERR   EQU    11H          ; an error on checksum was detected
     TIMEOUT_ERR  EQU    12H          ; Task timed out(Async In / SDLC In)
     CIA_BUSY_ERR        EQU    13H         ; CIA status can be returned while it is
being updated
     AS_LEN_ERR   EQU    14H          ; Length of In string in error
     HS_8273_ERR  EQU    15H          ; ds5000/8273 handshaking error
     TXCOMP              EQU    0DH         ; See documentation below
;
*************************************************************************************
**************************************
;     See 8273 manual for receive status/errors 00H - 0BH
;           00H(Addr 1 match[normal expected status])
;           01H(Add 2 match),
;           03H(SDLC CRC),
;           04H(Abort detected)
;           05H(idle detected)
;           06H(eop detected[not appl])
;           07H(frame < 32bits),
;           08H(DMA overrun)
;           09H(mem buf overflow)
```

-10-2

```
;           0AH(carrier det failure)
;           0BH(recv intr overrun)
;      and transmit status/errors 0CH - 10H
;           0CH(early Tx intrp)
;           0DH(frame complete(normal expected status)
;           0EH(DMA underrun),
;           0FH(clr to send err)
;           10H(abort complete)
;
*************************************************************************************
*************************************

;
*************************************************************************************
*************************************
;     Define Byte Register Locations
;           Register 0 used/defined by C51
;
*************************************************************************************
*************************************
      PUBLIC      SD_I_CKLSB
      PUBLIC      SD_I_CKMSB
      PUBLIC      SD_I_INX
      PUBLIC      SD_O_INX
      PUBLIC      AS_I_SD_O_STRT
      PUBLIC      AS_I_LEN
      PUBLIC      AS_I_VCT
      PUBLIC      AS_I_CKLSB
      PUBLIC      AS_I_CKMSB
      PUBLIC      AS_O_INX
      PUBLIC      AS_I_INX
      PUBLIC      C_TMR_0
      PUBLIC      C_TMR_1
      PUBLIC      C_TMR_2
      PUBLIC      C_TMR_3
            RSEG  IDATA
BANK0:            DS    8H
            ORG   BANK0 +8H   ; (R0-R7 Bank1)
BANK1:            DS    4H          ; (R0-R3) Registers available
SD_I_CKLSB: DS    1           ; (R4:Bank1)      Address LSByte of chksum
SD_I_CKMSB: DS    1           ; (R5:Bank1)      Address MSByte of chksum
BANK1_R6:   DS    1           ; Register available
SD_I_INX:   DS    1           ; (R7:bank1) SDLC input buffer index      (SD_AS_BUF)
            ORG   BANK0 +10H  ; (R0-R7 Bank2)
BANK2:            DS    2H          ; (R0-R1 Bank2) Registers available
```

```
C_TMR_0:      DS    1           ; (R2)Cia timer 0 used by Async In
C_TMR_1:      DS    1           ; (R3)Cia timer 1 used by SDLC In
C_TMR_2:      DS    1           ; (R4)Cia timer 2 available
C_TMR_3:      DS    1           ; (R5)Cia timer 3 available
BANK2_R6      DS    1           ; Reserved as a TEMPORARY
SD_O_INX:     DS    1           ; (R7:bank2) SDLC output buffer index     (AS_SD_BUF)
              ORG   BANK0 +18H  ; (R0-R7 Bank3)
BANK3:              DS    1         ; (R0:Bank3)      Register available
AS_I_SD_O_STRT:     DS    1         ; (R1:Bank3)      AsyncIN byte(time to start the
SDLC out)
AS_I_LEN:     DS    1           ; (R2:Bank3)      AsyncIN message length
AS_I_VCT:     DS    1           ; (R3:Bank3)      AsyncIN task control vector
AS_I_CKLSB:   DS    1           ; (R4:Bank3)      Address LSByte of chksum
AS_I_CKMSB:   DS    1           ; (R5:Bank3)      Address MSByte of chksum
AS_O_INX:     DS    1           ; (R6:bank3) ASYNC output buffer index    (SD_AS_BUF)
AS_I_INX:     DS    1           ; (R7:bank3) ASYNC input buffer index     (AS_SD_BUF)
;
*********************************************************************************
*************************************
;Define Bit addressable Data Locations (restricted to locations 20H - 27H for this
application)
;
*********************************************************************************
*************************************
                    ORG   BANK0 +20H
      PUBLIC        B_ADDR_20
B_ADDR_20:  DS      1
      B_AS_XMT      EQU   20H.0       ; Bit flag Asynchronous xmit enabled
      B_AS_ACT      EQU   20H.1       ; Bit flag Asynchronous xmit sending (not waiting
for buffer)
      B_AS_O_STRT EQU     20H.2       ; Bit argument to start ASYNC OUT
      B_AS_O_ER     EQU   20H.3       ; ASYNC output error flag (alert task to abort and
NACK)
      B_SD_O_STRT EQU     20H.4       ; Bit flag: start SDLC xmit
      B_SD_I_STRT EQU     20H.5       ; Bit argument to start ASYNC OUT
      ;B_available        EQU   20H.6       ; available
      B_AS_O_WT_STR       EQU   20H.7       ;  switch:  complete  SDLC  IN  mssg  before
starting Async out(configurable<future>)
      PUBLIC        B_ADDR_21
B_ADDR_21:  DS      1
      ;B_available        EQU   21H.0       ; available
      ;B_available        EQU   21H.1       ; available
      B_8273_CMD_ER       EQU   21H.2       ; Flag set with handshaking error to 8273
      B_LOOP_TEST EQU     21H.3       ; Full Duplex SDLC when TRUE(External Loopback
```

```
jumpers required)
      B_NACKING   EQU    21H.4       ; Flag to inhibit Async out re-starts while NACKing
      B_SD_O_RTRY EQU    21H.5       ; Retry argurment/count/flag for SDLC OUT
      B_CIA_MSG   EQU    21H.6       ; Message addressed to CIA(do not re-transmit)
      B_CIA_RDY   EQU    21H.7       ;  1= output buffer ready/available, 0= buffer
locked(busy)
;
*************************************************************************************
*************************************
;     Define Directly Addressable Byte Data Locations
;           reserve 20H-27H for Bit addressable data locations
;
*************************************************************************************
*************************************
      PUBLIC      AS_O_BF_PTR
      PUBLIC      AS_STR_FACT
      PUBLIC      NACK_TASK_ID
      PUBLIC      NACK_ERR_CD
      PUBLIC      O_MSG_ADR
      PUBLIC      O_MSG_LEN
AS_O_BF_PTR:      DS    1          ; temporary High address of Async output buffer
(SD_AS_BUF or CIA_O_BUF)
AS_STR_FACT:      DS    1          ; Computation factor to determine async in byte to
start SDLC out
NACK_TASK_ID:     DS    1          ; pass CIA process operating to NACK when needed
NACK_ERR_CD:      DS    1          ; pass error code to NACK when needed
O_MSG_ADR:  DS    1          ; temporary dev address used to build 8273 output command
O_MSG_LEN:  DS    1          ; temporary length used to build 8273 output command
BYTE_DELY:  DS    1          ; Loop count for a byte delay
;
*************************************************************************************
*************************************
; Command strings to initialize and control the 8273 SDLC, string formats are
transfered to a temporary memory buffer
;    modified(if necessary) and then xfered to the SDLC
; A maximum of 4 parameters is required with the 8273 commands
;     command string format:
;                   .-------------.
;     COMMAND STRING:   | count (1-5) | located in CODE
;                   +-------------+
;                +1 |  COMMAND    |
;                   +-------------+
;                +2 | PARAMETER 1 |
;                   +-------------+
;                +3 | PARAMETER 2 |
```

```
;                  +-------------+
;               +4 ¦ PARAMETER 3 ¦
;                  +-------------+
;               +5 ¦ PARAMETER 4 ¦ maximum number of parameters for SDLC command
;                  `-------------'
;
**************************************************************************************
*************************************
      PUBLIC       CMDBUF
      PUBLIC       CMDBUF_LEN
      PUBLIC       CMDBUF_CMD
      PUBLIC       CMDBUF_PR1
      PUBLIC       CMDBUF_B0
      PUBLIC       CMDBUF_L0
      PUBLIC       CMDBUF_B1
      PUBLIC       CMDBUF_L1
      PUBLIC       CMDBUF_A1
      PUBLIC       CMDBUF_A
      PUBLIC       CMDBUF_A2
      PUBLIC       CMDBUF_CTR
CMDBUF:                              ; (DS 6) Temporary buffer to build command strings
for transmital to 8273
CMDBUF_LEN: DS    1            ; Length: remainder of string
CMDBUF_CMD: DS    1            ; Command Code
CMDBUF_PR1:                    ;  Parameter 1 (8273 control register value, other
definitions <see below>)
CMDBUF_B0:                     ;     Receive Buffer length LSB
CMDBUF_L0:  DS    1            ;     Transmit Buffer length LSB
CMDBUF_B1:                     ; Parameter 2:    Receive Buffer length MSB
CMDBUF_L1:  DS    1            ;     Transmit Buffer length MSB
CMDBUF_A1:                     ; Parameter 3:    Receive Address(dev) #1;
CMDBUF_A:   DS    1            ;     Transmit Address(dev) only
CMDBUF_A2:                     ; Parameter 4:    Receive Address(dev) #2
CMDBUF_CTR: DS    1            ;     Transmit Control byte( not used, always 0)
CMDBUF_TMR: DS    1            ; Timeout when loading 8273

;
**************************************************************************************
*************************************
; Result strings contain the results of a particular command to the 8273, Some commands
return as many as 5 paramters
;     with the results, some return 1 parameter, and a few do not return results
;     RESULT string format:
;                  .-------------.
```

```
;                +1 ¦ TIC,RIC,VAL ¦ TIC xmit results after xmit, RIC rvc results after
rcv, VAL immediate command with result
;                 +-------------+
;                +2 ¦ Rcv: R0     ¦ Receive only: LSB received frame length
;                 +-------------+
;                +3 ¦ Rvc: R1     ¦ Receive only: MSB received frame length (should
always be 0 in this system)
;                 +-------------+
;                +4 ¦ Rvc: A        ¦ Receive only: Address(dev) frame received
from(match required)
;                 +-------------+
;                +5 ¦ Rcv: C      ¦ Receive only: Control byte(not used, should be 0)
;                 `-------------'
;
**********************************************************************************
************************************
      PUBLIC       RSLTBUF
      PUBLIC       RSLTBUF_R0
      PUBLIC       STACK_BEGIN
      PUBLIC       SD_AS_BUF
      PUBLIC       AS_SD_BUF
      PUBLIC       CIA_O_BUF
RSLTBUF:     DS     1           ; Buffer to save 8273 receive results (max of 5 in
buffered mode)
RSLTBUF_R0: DS      4           ;     Received length(LSB) + 3 dummy spaces
            ;RSEG ISTACK
STACK_BEGIN:        DS    45          ; Stack location
; ***************************************************************************
;     EXTERNAL Data Memory definitions
;           including references to 8273 memory addressed I/O
;     In medium model external data memory starts at 6800H
; ***************************************************************************
            RSEG  XDATA(8)     ; DS5000 embedded RAM  - on 256(100H) boundary
EXTN_DATA:  DS     0           ; Dummy to define external data
            ORG EXTN_DATA +6800H
SD_AS_BUF:  DS     100H        ; SDLC to ASYNC buffer(starts on even 256(100H) boundary
)
AS_SD_BUF:  DS     100H        ; ASYNC to SDLC buffer(starts on even 256(100H) boundary
)
CIA_O_BUF:  DS     100H        ; CIA output buffer( starts on even 256(100H) boundary
)
BAUD_MEMORY:        DS    1           ; baud rate configuration memory
            ;PUBLIC      TXDACK73
```

```
        ;PUBLIC     RXDACK73
        ;PUBLIC     RXIR73
        ;PUBLIC     TXIR73
        ;PUBLIC     PARM73
        ;PUBLIC     RSLT73
        ;PUBLIC     CMND73
        ;PUBLIC     STAT73
    RXDACK73    EQU   OBFH        ; 8273 receive data reg. address (input)
    TXDACK73    EQU   ODFH        ; 8273 transmit data reg. address (output)
    CMND73            EQU   0E3H      ; 8273 command register address (output)
    STAT73:           EQU   CMND73        ; 8273 status reg. address (input)
    PARM73            EQU   0E7H      ; 8273 parameter reg. address (output)
    RSLT73            EQU   PARM73        ; 8273 result reg. address (input)
    TXIR73            EQU   0EBH      ; 8273 transmit result reg. address (input)
    RXIR73            EQU   0EFH      ; 8273 receive result reg. address (input)
;
*******************************************************************************************
*************************************
;
;     Program start
;     Interrupt vectors
;
;
*******************************************************************************************
*************************************
          RSEG  CSTART
     PUBLIC      STARTUP
STARTUP:                                   ; Start up jump vector
     LJMP  INIT_C
     PUBLIC      VECT_SD_OUT
VECT_SD_OUT:     ORG STARTUP +0003H                 ; INTO(IEO): Tx_INT Interrupt
     PUSH  PSW                             ; Processor status(including register bank)
     PUSH  ACC                             ; Accumulator
     LJMP  RTxIR73
     PUBLIC      VECT_TO
VECT_TO:    ORG STARTUP +000BH                   ; Timer 0 Interrupt
     PUSH  PSW                             ; Save Reg Bank
     MOV   PSW,  #REGBNK2                  ; Share Bnk 2 with SDLC OUT
     SJMP  TFO_SERV                        ; Service Timers
     PUBLIC      VECT_SD_IN
VECT_SD_IN: ORG STARTUP +0013H                  ; INT1(IE1): Rx_INT Interrupt
     PUSH  PSW                             ; Processor status(including register bank)
     PUSH  ACC                             ; Accumulator
     LJMP  RRxIR73
```

```
     PUBLIC      VECT_T1
VECT_T1:    ;    ORG STARTUP 001BH        Interrupt from Timer 1 not used (timer
defined as baud rate gen)
     PUBLIC      VECT_ASYNC
VECT_ASYNC: ORG STARTUP +0023H                   ; Serial RI/TI Interrupt
     PUSH  PSW                          ; Processor status(including register bank)
     PUSH  ACC                          ; Accumulator
     LJMP  AS_INTERRUPTS
;
***********************************************************************************
*************************************
; Timer 0 Interrupt task
;    This task controls 4 timers with approx. 1.112 ms period/resolution
;          TMR #0 used by ASYCN_IN, TMR #1 used by SDLC_IN
;          SPECIAL ACTIONS taken by timers are limited to notification of user task
;                Code for Actions is limited to direct byte and bit assignments,
;                and must not use the R? REGISTERS.
;    This task shares Reg Bank 2 with the SDLC OUT, Reg's 2,3,4,5 are reserved as
timers 0,1,2,3
;          Timers 0-3 are loaded with the number of periods for the desired period
;
***********************************************************************************
*************************************
     PUBLIC      TF0_SERV
TF0_SERV:                               ; timeout timer setup by ASYNC IN
     PUSH  ACC
     MOV   A,    TH0                    ; get timer high byte with any rollover
latency
     ADD   A,    #0FCH                  ; add timer base
     MOV   TH0, A                             ; restore to timer: Period apprx 1.112
ms
SERV_TM0:                               ; Service Timer 0
     CJNE  R2, #0,          C_TM0             ; Timer active
     SJMP  SERV_TM1                     ; inactive
C_TM0:
     DJNZ  R2,   SERV_TM1               ; Not timed out
     ; ******************* Special Actions for Timer 0 ********************
     MOV   NACK_ERR_CD,     #TIMEOUT_ERR            ; Action for Tmr 0 on timeout
     MOV   NACK_TASK_ID,    #TMR_AS_IN        ; Task where error was generated
     LCALL ABORT_TRANS                  ; Kill total transaction
     SJMP  TMR_EXIT
SERV_TM1:                               ; Service Timer 1
     CJNE  R3, #0,          C_TM1             ; Timer active
     SJMP  SERV_TM2                     ; inactive
```

```
C_TM1:
     DJNZ  R3,   SERV_TM2                    ; Not timed out
     ; ******************* Special Actions for Timer 1 *******************
     MOV   NACK_ERR_CD,      #TIMEOUT_ERR            ; Action for Tmr 1 on timeout
     MOV   NACK_TASK_ID,     #TMR_SDLC         ; Task where error was generated
     LCALL ABORT_TRANS                       ; Abort SDLC in, Async Out
     SJMP  TMR_EXIT
SERV_TM2:                                    ; Service Timer 2
     CJNE  R4, #0,          C_TM2                ; Timer active
     SJMP  SERV_TM3                          ; inactive
C_TM2:
     DJNZ  R4,   SERV_TM3                    ; Not timed out
     ; ******************* Special Actions for Timer 2 *******************
SERV_TM3:                                    ; Service Timer 3
     CJNE  R5, #0,          C_TM3                ; Timer active
     SJMP  TMR_EXIT                          ; inactive
C_TM3:
     DJNZ  R5,   TMR_EXIT                    ; Not timed out
     ; ******************* Special Actions for Timer 3 *******************
TMR_EXIT:
     POP   ACC                               ; Restore status
     POP   PSW                               ; Restore Reg Bank
     RETI
;
*************************************************************************************
*************************************
; ASYCHRONOUS in/out interrupt handlers -- entry point for both Xmt and Rcv( 8051
hardware design)
; These handlers use the buffers defined for the SDLC interrupt handlers
;
*************************************************************************************
*************************************
     PUBLIC      AS_INTERRUPTS
AS_INTERRUPTS:                                ; Entry point for Serial Xmt/Recv
     PUSH  DPL                        ; Low byte DPTR
     PUSH  DPH                        ; High byte DPTR
     MOV   PSW,         #REGBNK3      ; Switch to register bank 3
AS_INTR_TEST:
     JBC   RI,    AS_IN_INTR          ; On Recv intrpt, clear flag
     JBC   TI,    AS_OT_INTR          ; On Xmit clear intrpt flag and jmp to Rcv handler
;
*************************************************************************************
*************************************
; All ASYNC interrupts exit through here,  DPTR, ACC, PSW, and all R(registers) are
restored
```

```
;
*****************************************************************************
*************************************
     POP   DPH                    ; High byte DPTR
     POP   DPL                    ; Low byte DPTR
     POP   ACC                    ; Accumulator
     POP   PSW                    ; Processor status(including register bank)
     RETI
; ***************************************************************************
; Receive vector jump table: See AS_I_---- for documentation
; ***************************************************************************
AS_IN_INTR:
     MOV   A,     R3              ; R3 is AS_I_vector
     MOV   DPTR, #VCTABL               ; vector table location
     JMP   @A +DPTR               ; branch thru table
     PUBLIC      VCTABL
VCTABL:
     LJMP  AS_IN_HDR              ; vector offset   [00H] look for header
     LJMP  AS_IN_LEN              ;           [03H] save length
     LJMP  AS_IN_DEV_ADR               ;           [06H] remote dev addr
     LJMP  AS_IN_DAT0             ;           [09H] general data before SDLC start
     LJMP  AS_IN_DATA             ;           [0CH] gen data after SDLC start
     LJMP  AS_IN_CKLSB            ;           [0FH] checksum save lsb
     LJMP  AS_IN_CKSUM            ;           [12H] process checksum
     LJMP  AS_IN_ERR              ;           [15H]  error detected(usually timeout)
     LJMP  AS_IN_LOC              ;           [18H]  Future implimentation for LOCal
ASCII terminal

;
*****************************************************************************
*************************************
; ASYNC output interrupt handler
;   This task transmitts data to the Host, data orginates from the SDLC or an internal
message from the CIA
;    When received from the SDLC it has stripped its own transparent checksum from the
message
;
;    Data format
;    .------------+-----------+------------  -  -  -  -  -  -  -  -  -  -  -
-----------------+----------+---------.
;    | Header(FF) | Length  | Message ----    length bytes                      | 2
Byte Checksum   |
;    '------------+-----------+------------  -  -  -  -  -  -  -  -  -  -  -
-----------------+----------+---------'
```

```
;                       |<------ checksum is generated for this data ------>|
;                       |<----------    length    includes    this    data
-------------------------------->|
;
;
************************************************************************************
*************************************
      PUBLIC      AS_OT_INTR
AS_OT_INTR:
      JBC   B_AS_O_ER,  AS_O_ERR    ; Has an error been detected by another task(clear
and jump)
      JBC   B_AS_O_STRT,      AS_OT_STRT  ; start ASYNC xmit (clear and jump)
AS_OT_CONT:
      MOV   A,    R6                ; AS_O_INX  Async output buffer index
      CJNE A,     SD_I_INX,   AS_OT_DATA  ; AS_O_INX <> SD_I_INX(R7) when more data
available?
      CLR   B_AS_ACT                ; data in buffer sent, clear xmit active
      CLR   B_NACKING               ; if NACKing: data sent, clear flag
      LJMP  AS_INTR_TEST                  ; exit
      PUBLIC      AS_OT_STRT
AS_OT_STRT: ;    *****************************    start    Async    output
*************************************************
      JB    B_NACKING,  AS_INTR_TEST      ; Ignor starts while NACKing
      JBC   B_CIA_MSG,  AS_OT_CIA   ; CIA message ?
      MOV   AS_O_BF_PTR,      #HIGH SD_AS_BUF   ; No, Setup output from SDLC to ASYNC
buffer
      SJMP  AS_OT_XXX

      PUBLIC      AS_OT_CIA
AS_OT_CIA:                          ; CIA message!
      JNB   B_CIA_RDY,  AS_O_CIA_BZ ; CIA buf not ready (Bit=1 ready, Bit=0 locked/busy
for status update)
      MOV   AS_O_BF_PTR,      #HIGH CIA_O_BUF   ; Setup output from CIA buffer
      PUBLIC      AS_OT_XXX
AS_OT_XXX:                          ; start xmit process
      MOV   SBUF,       #AS_HEADER  ; (FFH) start xmt with the header
      SETB  B_AS_XMT                ; enable re-transmit: data as it is received
      SETB  B_AS_ACT                ; activate transmit
      MOV   R6, #0FFH               ; reset indx/lowbyt ptr of AsyncOut buf(-1)
      LJMP  AS_INTR_TEST                  ; exit anyway
      PUBLIC      AS_OT_DATA
AS_OT_DATA: ;    *****************************       transmit    data    byte
**********************************************
```

```
     INC    R6                      ; AS_O_INX: next data location
     MOV    DPL,  R6                ; buffer pointer(count) -> DPTR low
     MOV    DPH,  AS_O_BF_PTR       ; DPTR high byte (SD_AS_BUF or CIA_O_BUF) ( buffer
size is 256)
     MOVX   A,    @DPTR             ; fetch data byte
     MOV    SBUF, A                 ; Async xmit
     LJMP   AS_INTR_TEST                  ; exit
     PUBLIC       AS_O_CIA_BZ
AS_O_CIA_BZ:                              ; CIA busy, NACK
     MOV    NACK_ERR_CD,      #CIA_BUSY_ERR     ; NACK error
     MOV    NACK_TASK_ID,     #ASYNC_O_ID ; identify the task with error
     SJMP   AS_O_ERR2               ; NACK only (do not cause framing error)
     PUBLIC       AS_O_ERR
AS_O_ERR:                           ; Async output error handler
     JB     B_NACKING,  AS_INTR_TEST      ; Ignor additional errors while NACKing
     JNB    B_AS_XMT,   AS_O_ERR2   ; Async xmt not active
     ; ******* When return message previously started complete but abort
     ;      with a 0/0 chksum: remainder of message is undefined
     MOV    DPH,  AS_O_BF_PTR       ; Set up output buffer pointer
     MOV    DPL,  #0;               ; point to length
     MOVX   A,    @DPTR             ; get message length
     MOV    SD_I_INX,   A           ; leng to input indx
     DEC    A                       ; calc to chksum LSB ptr
     MOV    DPL,  A                 ; set buff ptr to chksum loc
     MOV    A,    #0
     MOVX   @DPTR,      A                 ; chksum LSB=0
     INC    DPL                     ; buff chksum MSB pointer
     MOVX   @DPTR,      A                 ; chksum MSB=0
     LCALL  BYT_DELAY               ; delay until prev byte clears sbuf
     SJMP   AS_OT_CONT              ; Continue sending message
;
*************************************************************************************
**************************************
; ASYNC OUTPUT   N A C K
;      Data format
;
.------------+-----------+------------+------------+------------+------------+-------
--+----------.
;      | Header     |  Length  | Command ID | Dev Addr   | CIA process| Err Code   |
  Checksum       |
;      |   'FF'     |   '6'    |    '1F'    |  01-FE Hx  |    0-5     |  00-FF Hx  |
LSB    |    MSB    |
;
```

```
`------------+-----------+------------+------------+------------+------------+-------
--+---------'
;                       |<------ checksum is generated for this data ------>|
;                       |<----------    length   includes   this   data
-------------------------------->|
;
;          Dev Addr:         Address of the device addressed
;          CIA Task:         AsyncIN           1
;                            AsyncOT           2
;                            SDLC_OT           3
;                            SDLC_OT           4
;                            Main        5
;          Err Code:         Such as SDLC status's, etc
;
****************************************************************************************
**************************************
      PUBLIC      AS_O_ERR2
AS_O_ERR2:
      SETB  B_NACKING                ; Turn off additional errors
      CLR   B_AS_O_STRT              ; Kill any pending Async Start
      CLR   B_AS_ACT                 ; not active any more
      MOV   AS_O_BF_PTR,      #HIGH SD_AS_BUF   ; No, Setup output from SDLC to ASYNC
buffer
      MOV   SBUF, #AS_HEADER         ; start  N_A_C_K  early, Async
      MOV   DPTR, #SD_AS_BUF         ; Address of buffer
      MOV   A,    #NACK_LENG         ; put length
      MOVX  @DPTR,      A                  ;     into xmit buffer
      MOV   A,    O_MSG_ADR          ; put address in NACK
      INC   DPL                      ; next buffer location
      MOVX  @DPTR,      A                  ;     into xmit buffer
      MOV   R4,   A                  ; LSB checksum          ******** START CHECKSUM
*********
      MOV   R5,   #0                 ; MSB checksum
      MOV   A,    #0                 ; control byte
      INC   DPL                      ; next buffer location
      MOVX  @DPTR,      A                  ;     into xmit buffer (chksum not necessary
with 0)
      MOV   A,    #NACK              ; put    N A C K
      INC   DPL                      ; next buffer location
      MOVX  @DPTR,      A                  ;     into xmit buffer
      ADD   A,          R4           ; R4=LSB chksum (add to 16 bit chksum)
******** compute checksum ******
      MOV   R4,         A            ; but it back
```

```
        JNC   $+3                        ; no carry
        INC   R5                         ; F5=MSB chksum
        MOV   A,    NACK_TASK_ID               ; buffer cia process where error occured
        INC   DPL                        ; next buffer location
        MOVX  @DPTR,      A                    ;     into xmit buffer LSB checksum
        ADD   A,          R4             ; R4=LSB chksum (add to 16 bit chksum)
******** compute checksum ******
        MOV   R4,         A              ; but it back
        JNC   $+3                        ; no carry
        INC   R5                         ; F5=MSB chksum
        MOV   A,    NACK_ERR_CD          ; buffer error code
        INC   DPL                        ; next buffer location
        MOVX  @DPTR,      A                    ;     into xmit buffer LSB checksum
        ADD   A,          R4             ; R4=LSB chksum (add to 16 bit chksum)
******** compute checksum ******
        MOV   R4,         A              ; but it back
        JNC   $+3                        ; no carry
        INC   R5                         ; F5=MSB chksum
        INC   DPL                        ; next buffer location
        MOV   A,    #0                   ; always 0
        MOVX  @DPTR,      A                    ;     into xmit buffer (chksum not necessary
with 0)
        MOV   A,    R4                   ; LSB checksum to buffer
        INC   DPL                        ; next buffer location
        MOVX  @DPTR,      A                    ;     into xmit buffer LSB checksum
        MOV   A,    R5                   ; MSB checksum to buffer
        INC   DPL                        ; next buffer location
        MOVX  @DPTR,      A                    ;     into xmit buffer LSB checksum
        MOV   R6,   #0FFH                ; Reset (AS_O_INX)output buff index (-1)
        MOV   SD_I_INX,   DPL            ; SD_I_INX(R7B1) input index to last byte in buffer
        LJMP  AS_VCT_RST                 ; half duplex requires: ASYNC IN Re-initialization

;
******************************************************************************************
*************************************
;   Async RCV interrupt handler
;     This task moniters and buffers Asynchronous data from the Host, initiates
retransmission via SDLC
;
;     Data format
;     .------------+-----------+----------+------------ - - - - - - - - - -
------------------+-------------------.
;     | Header(FF) |   Length   | DevAddr |  Message ----    length-1 bytes
```

```
     | 2 Byte Checksum    |
;    `-----------+----------+---------+------------  - - - - - - - - - - -
-----------------+---------+----------'
;                      |<----------- checksum is generated for this data ----------->|
;                      |<----------------   length   includes   this   data
------------------------------------->|
;
;    Header, Length, DevAddr are stripped off and used as control parameters for the
SDLC or CIA
;    Message is re-transmitted, SDLC generates its own checksum(externally transparent
to the protocal)
;
;
************************************************************************************
*************************************
     PUBLIC      AS_IN_LOC
AS_IN_LOC:
     LJMP  AS_INTR_TEST                 ; Future implementation, ignor for now
     PUBLIC      AS_IN_HDR
AS_IN_HDR:  ;    *****************************       message    header(FFH)    check
***********************
     MOV   A,     SBUF              ; read data from async
     CJNE  A, #AS_HEADER,    AS_IN_EXIT  ; not header, exit and wait for next char
     MOV   R7,          #0          ; (R7 is AS_I_INX) start index at dev address
     MOV   SD_O_INX,    #0FFH       ; start indexes at -1
     SJMP  AS_NXT_VCT               ; exit with new vector
     PUBLIC      AS_IN_LEN
AS_IN_LEN:  ;    ******************************       message   length
***********************************
     MOV   A,     SBUF              ; read data(length)
     CLR   C                        ; NO barrows ever
     SUBB  A,     #2                ; subract 2 bytes for checksum
     JC    AS_IN_LEN_ER                   ; length too short
     JZ    AS_IN_LEN_ER                   ; length too short
     MOV   O_MSG_LEN,  A            ; save for SD_OUT task
     MOV   R2,    A                 ; remaining characters IN counter(decrement)
           ; ***************************** compute time(byte) to start the SDLC
output **************
           ;      start_byte = length * factor   +1
           ;
************************************************************************************
*****
     MOV   B,     AS_STR_FACT       ; configurable computation factor
```

```
     MUL    AB                       ; ratio is in MSB  reg 'B'
     MOV    R1,   B                  ; get start_byte: save in count down register
(AS_I_SD_O_STRT)
     INC    R1                       ; start byte  +1
     SJMP   AS_NXT_VCT               ; exit with new vector
AS_IN_LEN_ER:      ;******************  Length too Short **********************
     MOV    NACK_ERR_CD,       #AS_LEN_ERR ; Set error for NACK
     LJMP   AS_IN_ERR                ; Continue
     PUBLIC        AS_IN_DEV_ADR
AS_IN_DEV_ADR:     ;    ******************************    save   SDLC   dev   address
*****************************
     MOV    A,     SBUF              ; read data(dev addr)
     MOV    O_MSG_ADR,  A            ; save it
     MOV    DPL,   R7                ; setup low byte DPTR
     MOV    DPH,   #HIGH AS_SD_BUF          ; DPTR high byte never changes( buffer size
is 256)
     MOVX   @DPTR,      A                   ; stuff data
     MOV    R4,    A                 ; chksum(LSB) = [address]
     MOV    R5,    #0                ; initialize chksum(MSB) = 0
     CJNE   A, #CIA_ADDR,     AS_I_STRTX  ; Not CIA message? Start SDLC
     SETB   B_CIA_MSG                ; Flag message for CIA
     SJMP   AS_NO_SDLC               ; Don't start SDLC on CIA message
     PUBLIC        AS_I_STRTX
AS_I_STRTX:                          ; start sequence for SDLC
     CLR    B_CIA_MSG                ; SDLC(not CIA) parameter
     DJNZ   R1, AS_DC_NX_VT                 ; test, start SDLC at byte '1'
     LCALL  SDLC_O_STRT              ; Start the SDLC output task
     PUBLIC        AS_NO_SDLC
AS_NO_SDLC:                          ;  Skip  Start/  1:already  started,  2:prestart
switched off
     INC    R3                       ; push vector past start check to AS_IN_DATA
     INC    R3
     INC    R3
;
*************************************************************************************
*************************************
; Exit Procedures for ASYNC interrupts
;
*************************************************************************************
*************************************
     PUBLIC        AS_NXT_VCT
     PUBLIC        AS_DC_NX_VT
AS_DC_NX_VT:                                ; Decrement input counter
     DEC    R2                       ; Decrement input counter
```

```
AS_NXT_VCT:                         ; define next vector for interrupt service
     INC   R3                       ; LJMP is 2 bytes, add to offset for table jmp
     INC   R3
     INC   R3
;
*****************************************************************************************
************************************
; Timer start/re-start, interrupts exit through here,
;
*****************************************************************************************
************************************
     PUBLIC      TIMR0_EXIT
TIMR0_EXIT:                         ; start timer 0
     MOV   C_TMR_0,    #ASYNC_TIMEOUT    ; 10 cycles (11 ms)
AS_IN_EXIT:
     LJMP  AS_INTR_TEST                  ; Test for additional serial interrupts
     PUBLIC      AS_IN_DAT0
AS_IN_DAT0: ;    ******************************    general    byte    processor
********************************
     DJNZ  R1, AS_IN_DATA                ; start SDLC at byte 'n' test
     LCALL SDLC_O_STRT              ; Start the SDLC output task
     INC   R3                       ; push vector so next jmp to AS_IN_DATA
     INC   R3
     INC   R3                       ; fall through
     PUBLIC      AS_IN_DATA
AS_IN_DATA: ;    ******************************    general    byte    processor
********************************
     MOV   A,    SBUF               ; read data(byte)
     INC   R7                       ; AS_I_INX:  input index
     MOV   DPL,  R7                 ; setup low byte DPTR
     MOV   DPH,  #HIGH AS_SD_BUF         ; DPTR high byte never changes( buffer size
is 256)
     MOVX  @DPTR,      A                 ; stuff data
     ;     *****************************************    COMPUTE    CHECKSUM
****************************************
     ADD   A,          R4           ; R4=LSB chksum (add to 16 bit chksum)
     MOV   R4,         A            ; but it back
     JNC   $+3                      ; no carry
     INC   R5                       ; F5=MSB chksum
     DJNZ  R2,   TIMR0_EXIT         ; (R2 = remaining chars) more data ?  then bump
timer
     SJMP  AS_NXT_VCT               ; decrement count, define next vect, exit
     PUBLIC      AS_IN_CKLSB
AS_IN_CKLSB:        ;   ******************************  process   1st   checksum   byte
```

```
**********************************
     MOV  R2,   SBUF              ; Read chksum LSB: R2=tempoary location for
checksum LSB
     SJMP  AS_NXT_VCT             ; def next vector, exit
     PUBLIC     AS_IN_CKSUM
AS_IN_CKSUM:     ;  *****************************    process  2nd  checksum  byte
*********************************
     MOV   A,    SBUF             ; read chksum MSB
     CJNE  A, AS_I_CKMSB,    AS_IN_ERCK  ; error in MSB checksum
     MOV   A,    R2               ; LSB checksum byte from temporary location R2
     CJNE  A, AS_I_CKLSB,    AS_IN_ERCK  ; error in LSB checksum byte
     JNB   B_CIA_MSG,  AS_STRT_CHK ; CIA not addressed? Start SDLC
     LCALL STRT_AS_O              ; Start Async Out
     SJMP  AS_VCT_RST             ; re-initialize for new message
     PUBLIC     AS_STRT_CHK
AS_STRT_CHK:
     MOV   A,    R1               ; SDLC out started? (R1=0 when started)
     JZ    AS_VCT_RST             ;     yes, just exit
     LCALL SDLC_O_STRT            ; Start the SDLC output task
     SJMP  AS_VCT_RST             ; exit
     PUBLIC     AS_IN_ERCK
AS_IN_ERCK:                       ; Async input checksum Error
     MOV   NACK_ERR_CD,     #AS_CRC_ERR ; NACK error
     PUBLIC     AS_IN_ERR
AS_IN_ERR:                        ; Async input Error handler
     MOV   NACK_TASK_ID,    #ASYNC_I_ID ; NACK task id
     LCALL ABORT_TRANS
     PUBLIC     AS_VCT_RST
AS_VCT_RST:                       ; reset vector to header
     MOV   C_TMR_0,    #0         ; Reset/clear Timer
     MOV   AS_I_VCT,   #0         ; vector = header
     LJMP  AS_INTR_TEST                 ; exit

;
***********************************************************************************
*************************************
;8273 Transmit Interrupt Handler
; this procedure handles all transmit interrupts from the 8273, and processes either
data, or a result(single parameter);
; it is called directly by the DS5000/8751 vectoring on interrupt.  The 8273 is
configured to operate in buffered mode.
; data is buffered in AS_SD_BUF(Asynchronous to SDLC buffer) 256 byte buffer.  This
buffer is located in embedded
```

```
; ram(DS5000) and must be specified at a 256 byte boundary(6900H).  The buffer pointers
are AS_I_INX, SD_O_INX(also
; maintained as the Least Significant Byte of the AS_SD_BUF address (DPL) ).  It is set
to FFh (-1) when initializing a transmit.
; The Most Significant byte is fetched from a read immediate (loc 70H for AS_SD_BUF)
to  DPH;
;      Transmit data Buffer format:
;                  .-------------.
;      SD_AS_BUF:     0   |  data      |        must be located in embedded ram on 256
byte boundary (ex: xx00H)
;                  +-------------+
;                 +1 |   data       |
;                  |- - - - - - -|
;                  |- - - - - - -|
;                 +n |   data       |        n max = 25
;                  '-------------'
;
**************************************************************************************
*************************************
      PUBLIC      RTxIR73
RTxIR73:                          ; interrupt vector branches to this point
      PUSH  DPL                   ; Low byte DPTR
      PUSH  DPH                   ; High byte DPTR
      MOV   PSW,        #REGBNK2  ; Switch to register bank 2
      JBC   B_SD_O_STRT,      SD_O_STRT    ; start when bit set
      MOV   P2_e, #STAT73                ; 8273 status reg. address
      CLR   RD_e                  ; Strobe data
      MOV   A,    P0_e            ;     into ACC
      SETB  RD_e                  ; Reset strobe
      MOV   P2_e, #ADDR_CLR       ; Reset Addressing
      JNB   ACC.0,          TDATA73           ;  test  TxIRA(result=0)  then  data
request
      ;    *************************************    read    and    process    results
*********************************
      MOV   P2_e,       #TXIR73          ; 8273 address of XMIT result reg.
      CLR   RD_e                  ; Strobe data
      MOV   A,    P0_e            ;     into ACC
      SETB  RD_e                  ; Reset strobe
      MOV   P2_e, #ADDR_CLR       ; Reset Addressing
      CJNE A,      #TXCOMP,    SD_O_ERR     ; 8273 SDLC xmit error?
      MOV   CMDBUF,      #2               ; 64X clock Off: length
      MOV   CMDBUF_CMD, #63H       ;     Code
      MOV   CMDBUF_PR1, #11111110B  ;     Parameter(port mask for RTS)
```

```
     LCALL LD_8273_CMD              ; 64X clock Off
     JB    B_8273_CMD_ER,    SD_O_ERX    ; Handshaking error
     JB    B_LOOP_TEST,      SD_O_I_BYPS ; Previously started in loopback test
     SETB  B_SD_I_STRT              ; start the SDLC IN
     SETB  IE1                      ; wake up through an interrupt
SD_O_I_BYPS:
     LJMP  SD_INTR_EXIT                  ; restore and return
     PUBLIC      SD_O_STRT
SD_O_STRT:  ;    ******************************        start    xmit    command
****************************************
     MOV   CMDBUF,      #2               ; 64X clock ON: length
     MOV   CMDBUF_CMD, #0A3H       ;     Code
     MOV   CMDBUF_PR1, #00000001B  ;     Parameter(port mask for RTS)
     LCALL LD_8273_CMD              ; 64X clock ON
     JB    B_8273_CMD_ER,    SD_O_ERX    ; Handshaking error
     MOV   CMDBUF,      #3               ; Start 8273 transmit: length
     MOV   CMDBUF_CMD, #0C8H       ;     Code
     MOV   CMDBUF_L0,  O_MSG_LEN   ;     LSB of length into command string
     MOV   CMDBUF_L1,  #0          ;     MSB of length into command string
     LCALL LD_8273_CMD              ; Start 8273 TRANSMIT
     JB    B_8273_CMD_ER,    SD_O_ERX    ; Handshaking error
     LJMP  SD_INTR_EXIT                  ; return

     PUBLIC      SD_O_ERR
SD_O_ERX:
     MOV   A,    #HS_8273_ERR            ; 8273 Handshaking error
SD_O_ERR:   ; ****************************       S D L C   O U T P U T   e r r o r
************************************************
     MOV   NACK_ERR_CD,       A          ; NACK error, status/error still in Acc
     MOV   NACK_TASK_ID,      #SDLC_O_ID ; NACK task id
     LCALL ABORT_TRANS              ; Abort transaction
     LJMP  SD_INTR_EXIT                  ; return
     PUBLIC      TDATA73
TDATA73:    ;    ******************************        transmit    data    byte
************************************
     MOV   A,    R7                 ; SD_O_INX  check, data available in buffer
     CJNE A,     AS_I_INX,   TXMT73          ; AS_I_INX <> SD_O_INX  when    data
available
     LJMP  SD_INTR_EXIT                  ; stop: This is an error, however SDLC will
return with underflow error
     PUBLIC      TXMT73
TXMT73:                                  ; xmit next byte in buffer
```

```
      INC   R7                      ; SD_O_INX            ; next byte in buffer
      MOV   DPL,       R7           ; DPTR low byte    of buffer address
      MOV   DPH,       #HIGH AS_SD_BUF   ; DPTR high byte never changes( buffer size
is 256)
      MOVX  A,         @DPTR        ; fetch byte
      MOV   P2_e, #TXDACK73         ; 8273 xmt reg. address and ACK
      MOV   P0_e, A                 ;     from ACC
      CLR   WR_e                    ; Strobe data
      SETB  WR_e                    ; Reset strobe
      MOV   P0_e, #CLR_PORT         ; clear p0 required by addressing cludge
      MOV   P2_e, #ADDR_CLR         ; Reset Addressing
      LJMP  SD_INTR_EXIT                 ; Exit handler
;
*************************************************************************************
*************************************
; 8273 Receive Interrupt Handler
; this procedure handles all receive interrupts from the 8273, and processes either
data, or a result(with multiple parameters);
; it is called directly by the DS5000/8751 vectoring on interrupt.
; the 8273 is configured to operate in buffered mode, results are saved in  the buffer
RSLTBUF
;     Receive result buffer format:       See PUBLICS for documentation
;
; Data is buffered in SD_AS_BUF (SDLC to Asynchronous buffer) 256 byte buffer.  This
buffer is located in embedded
; ram(DS5000) and must be specified at a 256 byte boundary.  The buffer pointers are
SD_AS_OTX,  SD_I_INX(also maintained as the
; Least Significant Byte of the SD_AS_BUF address (DPL) ).  It is initialized to '0'
when initializing a receive and incremented
;     before each action(save/store).
; header flag 'FFH' initializes data stream,  loc 0 reservered for 'LENGTH'
; The Most Significant byte is fetched from a read immediate (loc 68H for SD_AS_BUF)
to  DPH;
;
;     Receive Data Buffer format:
;
;     SD_AS_BUF:                             must be located in embedded ram on 256
byte boundary (ex: xx00H)
;                  .-------------.
;                0 |   LENGTH    |
;                  +-------------+
;               +1 | CmndId Data |       1st datum put here
;                  |- - - - - - -|
```

```
;                    :              :
;                    |- - - - - - - |
;                 +n |   Data       |        n max = 255
;                    '--------------'
;
; When processing data a process jump index addresses the approriate routine for each
data byte
;     this index is located in bit address B_SD_RIN".
;     LENGTH = 1         process command, determine data length (if Short/Long status
insert length and start
;      (after 1st save) asynchronous xmt process, otherwise wait until complete message
received determine
;                            length(by count), then start.
;     LENGTH > 1         move data into buffer for retransmission, if length known and
asych xmt stopped, restart
;                        xmit(19.2kb asynch xmit may empty buffer before 9.6kb SDLC recv
completes message).
;     timeout            On receive the SDLC times out it it receives an idle character
;
*****************************************************************************************
*************************************
      PUBLIC      SD_IN_STRT
SD_IN_STRT: ;   ******************************  start  the  SDLC  input  process
*****************************
      MOV   CMDBUF,      #5               ; Start 8273 RECEIVE: length
      MOV   CMDBUF_CMD, #0C1H       ;     Code
      MOV   CMDBUF_B0,  #255        ;     LSB of length into command string(set up 255
(max possible))
      MOV   CMDBUF_B1,  #0          ;     MSB of length into command string(set up max
possible)
      MOV   CMDBUF_A1,  O_MSG_ADR   ;     source device address into command string
      MOV   CMDBUF_A2,  O_MSG_ADR   ;     source  device address into command string
      LCALL LD_8273_CMD             ; Start 8273 RECEIVE
      JB    B_8273_CMD_ER,    SD_IN_ERX  ; Handshaking error
      MOV   R4,         #0          ; R4=LSB chksum (initialize 16 bit chksum)
      MOV   R5,         #0          ; F5=MSB chksum
      MOV   R7,         #00H        ; (SD_I_INX) init to 0(not -1: save -1 for Out
Length)
      MOV   AS_O_INX,   #0FFH       ; initialize AsyncOut Indx to -1(inc before use)
      CLR   B_AS_XMT                ; Asycn Not sending
      CLR   B_AS_ACT                ; Async not active

      LJMP  SD_TMR_EXIT
```

```
; **************************** ERROR ROUTINES *********************************
     PUBLIC     SD_IN_ER
SD_IN_ERX:                        ; Handshaking error
     MOV   A,    #HS_8273_ERR           ; 8273 Handshaking error
SD_IN_ER:                         ; SDLC receive error
     MOV   NACK_ERR_CD,      A          ; 8273 error still in Acc
     MOV   NACK_TASK_ID,     #SDLC_I_ID  ; identify task with error
     LCALL ABORT_TRANS            ; Abort transaction
     LJMP  SD_INTR_EXIT
; ************************** HANDLER ENTRY POINT ****************************
     PUBLIC     RRxIR73;
RRxIR73:                    ; ENTRY POINT  - - interrupt vector branches to this
point
     PUSH  DPL                    ; Low byte DPTR
     PUSH  DPH                    ; High byte DPTR
     MOV   PSW,      #REGBNK1     ; Switch to register bank 1
     JBC   B_SD_I_STRT,      SD_IN_STRT  ; start command
     MOV   P2_e,     #STAT73            ; 8273 status reg. address
     CLR   RD_e                   ; Strobe data
     MOV   A,    P0_e             ;     into ACC
     SETB  RD_e                   ; Reset strobe
     ;MOV  P2_e, #ADDR_CLR        ; Next action will: Reset Addressing
     JNB   ACC.1,         RDATA73         ; test RxIRA(data=0) Results available
     ;     *********************************   read   and   handle   results
***************************
     MOV   R0,       #RSLTBUF-1   ; address before RCV result buf -> Index Reg.
     PUBLIC     MRSLTLP
MRSLTLP:                          ; read results, until 5 bytes max
     CLR   RD_e                   ; Strobe data
     MOV   A,    P0_e             ;     into ACC
     SETB  RD_e                   ; Reset strobe
     ;MOV  P2_e, #ADDR_CLR        ; Next action will: Reset Addressing
     JNB   ACC.3,         SD_I_RSLTX  ; When read complete, process receive results
     JNB   ACC.1,         MRSLTLP         ; While waiting for result to be
available
     MOV   P2_e,     #RXIR73            ; 8273 recv result reg. address
     CLR   RD_e                   ; Strobe data
     MOV   A,    P0_e             ;     into ACC
     SETB  RD_e                   ; Reset strobe
     ;MOV  P2_e, #ADDR_CLR        ; Next action will: Reset Addressing
     INC   R0                     ; next buffer location
     MOV   @R0,      A            ; and save in RCV result buf
```

```
     MOV   P2_e,       #STAT73            ; restore 8273 status reg. address
     SJMP  MRSLTLP                        ; get next parameter
     PUBLIC      SD_I_RSLTX
SD_I_RSLTX: ;   ******************************   process   results
******************************************
     MOV   P2_e, #ADDR_CLR         ; Prev Action:  Reset Addressing
     MOV   CMDBUF_LEN, #1          ; Disable 8273 Receive: length
     MOV   CMDBUF_CMD, #0C5H       ;      Command Code
     LCALL LD_8273_CMD             ; Disable 8273 Receive
     JB    B_8273_CMD_ER,    SD_IN_ERX   ; Handshaking error
     MOV   A,          RSLTBUF            ; get RIC result status
     ANL   A,    #1EH              ; Mask and Save only result codes,mask lsb for
address check
     JNZ   SD_IN_ER                ; Not an address result
     MOV   DPTR,       #SD_AS_BUF  ; buffer address (length 1st byte(0))
     JB    B_AS_XMT,   SD_I_PUT_CHKS     ; xmit previously enabled & started
     MOV   A,          RSLTBUF_R0  ; message length(low byte) in RESULTS, high byte
should be 0
     ADD   A,          #2          ; add 2 bytes for chksum
     MOVX  @DPTR,            A           ; put in output string
     LCALL STRT_AS_O               ; Start Async Out
     PUBLIC      SD_I_PUT_CHKS
SD_I_PUT_CHKS:    ;  **********************  append  chksums  to  output  buffer
*************************
     MOV   A,          R4          ; LSB of checksum
     INC   R7                      ; Next buffer index
     MOV   DPL,        R7          ; get DPTR(low byte), High byte already in DPH
     MOVX  @DPTR,            A           ; buffer it
     MOV   A,          R5          ; MSB of checksum
     INC   R7                      ; Next buffer index
     MOV   DPL,        R7          ; get DPTR(low byte)
     MOVX  @DPTR,            A           ; buffer it
     JB    B_AS_ACT,   SD_TMR_RSET ; AS_OT currently active sending a chars, interrupt
controls buffer
     SETB  B_AS_ACT                ; set sending data flag
     SETB  TI                      ; re-start async output by causing an interrupt
SD_TMR_RSET:
     MOV   C_TMR_1,    #0          ; Reset/clear timer
     SJMP  SD_INTR_EXIT
     PUBLIC      RDATA73
RDATA73:    ;   *****************************      read    and    process    data
********************************8
```

```
     MOV   P2_e,       #RXDACK73   ; 8273 read data and ack address
     CLR   RD_e                    ; Strobe data
     MOV   A,    P0_e              ;      into ACC
     SETB  RD_e                    ; Reset strobe
     MOV   P2_e, #ADDR_CLR         ;      and Addressing
     INC   R7                      ; (SD_I_INX) index to next buffer loc     (initial
value = 0)
     MOV   DPL,        R7          ; DPTR low byte    of buffer address
     MOV   DPH,        #HIGH SD_AS_BUF   ; DPTR high byte never changes( buffer size
is 256)
     MOVX  @DPTR,            A           ; buffer it
     ;     ****************************************    COMPUTE    CHECKSUM
****************************************
     MOV   R6,   A                 ; R6 as a temp save for acc
     ADD   A,          R4          ; R4=LSB chksum (add to 16 bit chksum)
     MOV   R4,         A           ; but it back
     JNC   $+3                     ; no carry
     INC   R5                      ; F5=MSB chksum
     MOV   A,    R6                ; Restore A from temp
     CJNE  R7, #CMND_POS,    RBUFDT            ; process data straight(index > 1)
     JB    B_AS_O_WT_STR,    SD_TMR_EXIT ; wait for complete message before starting
(configurable switch)
     CJNE A,     #STAT_SHRT, RCKLONG           ; command <> short status
     MOV   A,          #STAT_SHT_LEN     ; get SHORT status length +2(include chksum
bytes)
     SJMP  SET_XMIT                ; start retransmit

     PUBLIC      RCKLONG
RCKLONG:                           ; check for long status command
     CJNE A,     #STAT_LONG, SD_TMR_EXIT ; command <> long status; undefined message,
buffer and xmit after mesg complete.
     MOV   A,          #STAT_LNG_LEN     ; get LONG status length +2(include chksum
bytes)
     PUBLIC      SET_XMIT
SET_XMIT:
     MOV   DPL,        #PTR_TO_MS_LEN    ; Get pointer to message length position
     MOVX  @DPTR,            A           ; buffer length
     LCALL STRT_AS_O               ; Start Async Out
     SJMP  SD_TMR_EXIT             ; pop and exit
     PUBLIC      RBUFDT
RBUFDT:                                  ; process data (straight)
     JNB   B_AS_XMT,   SD_TMR_EXIT ; Async-xmit: not enabled, exit( complete message
```

```
must be received before retransmitting)
      JB    B_AS_ACT,   SD_TMR_EXIT ; Async-xmit: active?  (yes, interrupt will send
character)
      SETB  B_AS_ACT                ; set async-xmit active flag(disable re-starts)
      SETB  TI                      ; set the async-xmt interrupt to re-start xmit(
processor will interrupt xmit task)
SD_TMR_EXIT:
      MOV   C_TMR_1,   #SDLC_TIMEOUT     ; 1.1ms per count
      PUBLIC       SD_INTR_EXIT
SD_INTR_EXIT:                            ; interrupt restore all and return
      POP   DPH                     ; High byte DPTR
      POP   DPL                     ; Low byte DPTR
      POP   ACC                     ; Accumulator
      POP   PSW                     ; Processor status(including register bank)
      RETI
;
*************************************************************************************
*************************************
; Procedure to cause a delay of about 1 byte
;     Arguements NONE
;     This is a hard coded loop delay
;
*************************************************************************************
*************************************
      PUBLIC       BYT_DELAY
BYT_DELAY:
      MOV   R0,    BYTE_DELY              ; preset timing value(loop count)
;
*************************************************************************************
*************************************
; Standard delay routine, Hard coded loop delay all tasks tied up during delay
;     Arguements  R0 contains delay count
;           delay time = 36.89us per iteration. 255 iterations= 9.4ms
;     Destroyed ACC, B
;
*************************************************************************************
*************************************
      PUBLIC       DELAY
DELAY:                                    ; normal entry point with delay in ACC
      MUL   AB                      ; Timing
      MUL   AB                      ; Timing
      MUL   AB                      ; Timing
      MUL   AB                      ; Timing
                                      -10-27
      MUL   AB                      ; Timing
      MUL   AB                      ; Timing
      MUL   AB                      ; Timing
```

```
      MUL    AB                        ; Timing
      DJNZ   R0,    DELAY              ; Timing loop until result in A increments and
overflows to 0
      RET
; ****************************************************************************
;  Start the Async Output task, if a NACK is not pending
; ****************************************************************************
STRT_AS_O:                        ; Start Async Out
      JB     B_NACKING, STRT_AS_RETN ; Do not start while nacking
      SETB   B_AS_O_STRT          ; Start argument to ASYNC_OUT task
      SETB   TI                   ;     wake up task with interrupt
STRT_AS_RETN:
      RET
;
*************************************************************************************
************************************
; Procedure  read 1 parameter responce to an immediate command type; Called after xfer
command for an immediate command
;      contents returned in 'A'
;      calling sequence LCALL(LCALL) RDRSLT73
;
*************************************************************************************
************************************
      PUBLIC       RDRSLT73
RDRSLT73:
      MOV    CMDBUF_TMR, #0FFH ; Relatively Long time
      MOV    P2_e, #STAT73            ;8273 status reg. address
RSTBSLP:                          ; WAIT until status available
      CLR    RD_e                     ; Strobe data
      MOV    A,     P0_e              ;     into ACC
      SETB   RD_e                     ; Reset strobe
      ;MOV   P2_e, #ADDR_CLR          ; Next action will: Reset Addressing
      JB     ACC.4,      RSTBSXX           ; Ready
      DJNZ   CMDBUF_TMR, RSTBSLP      ; wait  WHILE  result  reg.  not  set(entry  not
available yet)
      SETB   B_8273_CMD_ER            ; timeout during comand
      RET
RSTBSXX:
      MOV    P2_e, #RSLT73            ; 8273 result reg. address
      CLR    RD_e                     ; Strobe data
      MOV    A,     P0_e              ;     into ACC
      SETB   RD_e                     ; Reset strobe
      MOV    P2_e, #ADDR_CLR          ; Reset Addressing
      RET
```

```
; ***************************************************************************
; PROCEDURE SDLC_O_STRT
;     Start SDLC out and setup retries if function is enabled
; ***************************************************************************
      PUBLIC SDLC_O_STRT
SDLC_O_STRT:
      JNB   B_LOOP_TEST, XX_BYPS         ; SDLC INPUT: No Early Start without loopback
test
      SETB  B_SD_I_STRT              ; Early start SDLC IN with loop_test
      SETB  IE1                      ; wake up through an interrupt
  XX_BYPS:
      SETB  B_SD_O_STRT       ; Pass start parameter to SDLC out task
      SETB  IE0               ; Wake up SDLC out task
      RET
; ***************************************************************************
;  ABORT procedures, called to reset any or all of SDLC in, SDLC out, Async Out
;     Caller must have set up NACK's before call
; ***************************************************************************
ABORT_TRANS:                         ; Abort SDLC in/out, Async Out
      MOV   AS_I_VCT,   #0    ; Set Async Rec to header
      MOV   C_TMR_0,    #0    ; Clear Async timer
      MOV   C_TMR_1,    #0    ; Clear SDLC timer
      LCALL RESET73;          ; Complete 8273 restart
      SETB  B_AS_O_ER         ; Err to AS_OUT task to abort(whether the SD started or
not)
      SETB  TI                ;     wake up task with interrupt
      CLR   B_SD_O_STRT       ; Clear Pending Starts on SDLC out
      CLR   IE0               ; Clear pending SDLC out interrupts
      CLR   B_SD_I_STRT       ; Clear Pending starts on SDLC in
      CLR   IE1               ; Clear pending SDLC in interrupts
      RET

;
*********************************************************************************
**************************************
;Procedure Command Load 8273
;     Registers destroyed A, R0, R1
;     (1) load command directly from the command buffer
;           arguements
;                 CMD_BUF(command buffer) loaded before call
;           Calling sequence  LCALL LD_8273_CMD
;
;     command buffer format:
```

```
;                 .-------------.
;     COMMAND BUFFER:  | count (1-5) |   must be located in directly addressable
memory (bytes 28-7F)
;                 +--------------+
;               +1 |  COMMAND     |
;                 +--------------+
;               +2 | PARAMETER 1 |
;                 +--------------+
;               +3 | PARAMETER 2 |
;                 +--------------+
;               +4 | PARAMETER 3 |
;                 +--------------+
;               +5 | PARAMETER 4 | maximum number of parameters
;                 `-------------'
;
*************************************************************************************
************************************
      PUBLIC      LD_8273_CMD
LD_8273_CMD:                        ; Load Command 8273
      MOV   CMDBUF_TMR, #0FFH ; Long time for timeout
      MOV   R0,    #CMDBUF          ; Address of fixed command buffer
      MOV   A,     @R0        ; 1st byte in buffer is byte count
      MOV   R1,    A          ;     xfer to(setup) counter reg.
      MOV   P2_e, #STAT73           ; Address of 8273 status register
CDBSLP:                             ; Wait loop
      CLR   RD_e                    ; Strobe data
      MOV   A,     P0_e             ;      into ACC
      SETB  RD_e                    ; Reset strobe
      ;MOV  P2_e, #ADDR_CLR         ; Next action will: Reset Addressing
      JNB   ACC.7,      CDNXPR            ; test bit, continue when 8273 command not
busy
      DJNZ  CMDBUF_TMR, CDBSLP      ; Wait for non busy til timeout
      SETB  B_8273_CMD_ER
      RET                     ; timeout during command
CDNXPR:                             ;  xfer  command(since  STAT73=CMND73  DPTR  has
address) /next parameter(after loop)
      INC   R0                ; pointer, next byte(command/parameter)
      ;MOV  P2_e, #CMND73           ; Same addr as Status, Prevly Addressed
      MOV   P0_e, @R0               ;      from Command buff
      CLR   WR_e                    ; Strobe data out
      SETB  WR_e                    ; Reset strobe
      MOV   P0_e, #CLR_PORT         ; required by this address kludge
      ;MOV  P2_e, #ADDR_CLR         ; Next Action will: Reset Addressing
```

```
      DJNZ  R1,    CHKPAR              ; decrement count, WHILE parameters still left to
xfer, get next parameter
      MOV   P2_e, #ADDR_CLR            ; Reset Addressing
      RET                        ; xfer complete!!
      PUBLIC      CHKPAR
CHKPAR:
      MOV   P2_e, #STAT73              ; restore 8273 status reg addr
PRBYLP:                                ; until status available
      CLR   RD_e                       ; Strobe data
      MOV   A,     P0_e                ;     into ACC
      SETB  RD_e                       ; Reset strobe
      ;MOV  P2_e, #ADDR_CLR            ; Next Action will: Reset Addressing
      JNB   ACC.5,        PRBYBZ              ; When parameter reg free next param
      DJNZ  CMDBUF_TMR, PRBYLP         ; WHILE paramter reg busy wait til timeout
      SETB  B_8273_CMD_ER
      RET                        ; timeout during command
PRBYBZ:
      MOV   P2_e, #PARM73              ; 8273 parameter reg. address
      SJMP  CDNXPR                     ; xfer the next parameter
;
*************************************************************************************
*************************************
; Procedure reset 8273
;     no arguements/parameters
;     registers destoyed: A, R0, R1
;     Bit 1.5 controls 8273 reset, normally 1(high), held 0(low) for extended period
;     Must be called with interrupts OFF!!
;
*************************************************************************************
*************************************
      PUBLIC      RESET73
RESET73:
      CLR   B_RST73          ; 8051 output bit connected to 8273 reset pin
      MOV   R0,   #30H  ; timer period constant
RSTLP:
      DJNZ  R0,   RSTLP ; time until 0
      SETB  B_RST73                        ; 8051 output bit connected to 8273 reset pin
      CLR   B_8273_CMD_ER                  ; Clear flag set during 8273 command
sequecnce error
      MOV   CMDBUF,      #2                ; SET transfer mode register: length
      MOV   CMDBUF_CMD, #97H          ;     Code
      MOV   CMDBUF_PR1, #00000001B   ;     Parameter(use interrupts, not DMA)
      LCALL LD_8273_CMD              ; SET transfer mode register
      MOV   CMDBUF,      #2                ; RESET bit delay mode register: length
```

```
       MOV    CMDBUF_CMD, #064H         ;      Code
       MOV    CMDBUF_PR1, #01111111B    ;      Parameter(no delay)
       LCALL LD_8273_CMD                ; RESET bit delay mode register
       MOV    CMDBUF,      #2                  ; SET operations mode register: length
       MOV    CMDBUF_CMD, #91H          ;      Code
       MOV    CMDBUF_PR1, #00000010B    ;      Parameter(non-buffer<addr,cntrl>, pre-sync
 bytes, idle(not flag) chars
       LCALL LD_8273_CMD                ; SET operations mode register
       MOV    CMDBUF,      #2                  ; SET serial mode register: length
       MOV    CMDBUF_CMD, #0A0H         ;      Code
       MOV    CMDBUF_PR1, #00000001B    ;      Parameter(NRZI, no loopbacks)
       LCALL LD_8273_CMD                ; SET serial mode register
       MOV    DPTR, #BAUD_MEMORY               ; pointer to external(embedded) configuration
       MOVX  A,      @DPTR              ; Get baud configuration
       RL     A                         ; put into bits 1,2
       MOV    CMDBUF,      #2                  ; Setup to display baud on LEDs
       MOV    CMDBUF_CMD, #0A3H         ; Output port B command
       MOV    CMDBUF_PR1, A             ; mask in Acc
       LCALL LD_8273_CMD                ;
       RET
;
***************************************************************************************
*************************************
; system startup  and   NULL loop
;      basic DS5000(8751) setup includes, baud rate generator, serial i/o, stack,
interrupts, etc
;      basic 8273(SDLC) setup initializes the 8273
;
***************************************************************************************
*************************************
       PUBLIC       INIT_C
INIT_C:                                        ; System initialization
       MOV    R0,    #07FH              ; greatest direct address
CLR_MEM_LP:
       MOV    @R0,   #0                 ; clear memory byte
       DJNZ  R0,     CLR_MEM_LP         ; continue until all direct memory cleared
;************** Reset the 8273 at startup *************************************
;****** Added to fix the problem of baud rate incrementing up on a power bump ********
;****** LBC JUNE 6, 1989
       CLR    B_RST73           ; 8051 output bit connected to 8273 reset pin
       MOV    R0,    #030H ; timer period constant
RST73:
       DJNZ  R0,     RST73 ; time until 0
       SETB  B_RST73                           ; 8051 output bit connected to 8273 reset pin
```

```
      CLR    B_8273_CMD_ER                  ; Clear flag set during 8273 command
 sequecnce error

      MOV    SP,    #STACK_BEGIN -1          ; set up stack pointer
      MOV    IP_e, #00111111B            ; Interrupt priorities
 ;    ***************   Temporary   initialization   of   configurable   parameters
 ************************
      CLR    C                         ; (do not wait) in future get this value from
 configurable ram
 ;     SETB  C                         ; (debug wait) in future get this value from
 configurable ram
      MOV    B_AS_O_WT_STR,    C           ; Flag: wait for complete message before
 starting (configurable switch)
      CLR    B_LOOP_TEST               ; 'CLRS' start SDI when SDO completes, 'SETB' to
 Start SDI with SDO
 ;    ***************   Temporary   initialization   of   configurable   parameters
 ************************
 ; **************** compute time(byte) to start the SDLC output **************
 ;     start_byte = ( length  -length /(baud rate factor) ) +1 = length * (1.0
 -1.0/(baud_rate_factor) +1
 ;          baud rate factors:
      S_BY_19200  EQU   1
      S_BY_9600   EQU   160
      S_BY_2400   EQU   235
      S_BY_1200   EQU   247
 ;          start_byte = length * factor   +1
 ; *********************** Baud rate definitions ******************************
      B19200           EQU        0     ;Default
      B9600       EQU        1
      B2400       EQU        2
      B1200       EQU        3
 ;
 *************************************************************************************
 *****
      MOV    R1,    #3                ; 100 * 9.4ms = 940 ms
 STRT_DELY:                           ; Start up delay before sensing switches
      MOV    R0,    #255              ; 10ms
      LCALL DELAY                     ; loop
      DJNZ  R1,    STRT_DELY          ; timer extention to 500ms
 ;************* Reset the 8273 at startup ***********************************
 ;***** Added to fix the problem of baud rate incrementing up on a power bump ********
 ;***** LBC JUNE 6, 1989
      CLR    B_RST73              ; 8051 output bit connected to 8273 reset pin
```

```
      MOV   R0,   #030H ; timer period constant
 REST73:
      DJNZ  R0,   REST73      ; time until 0
      SETB  B_RST73                     ; 8051 output bit connected to 8273 reset pin
      MOV   CMDBUF,     #1
      MOV   CMDBUF_CMD, #22H         ; read port A
      LCALL LD_8273_CMD
      LCALL RDRSLT73                 ; get immediate result
      MOV   DPTR, #BAUD_MEMORY              ; pointer to external(embedded) configuration
      ANL   A,    #00000100B         ; Switch 3 on Bit 2 of port A
      JZ    BAUD_SETUP               ; Set Up checks
      MOVX  A,    @DPTR              ; Get baud configuration
      INC   A                        ; count up
      ANL   A,    #3                 ; 2 bits only
      MOVX  @DPTR,      A                   ; Save new baud configuration
BAUD_SETUP:
      MOVX  A,    @DPTR              ; Get baud configuration
S_1200:     CJNE  A, #B1200,  S_2400            ; Not 1200b try 2400b
      MOV   AS_STR_FACT,      #S_BY_1200  ; Computation factor to determine ASYNC IN
byte to start SDLC out(future config)
      MOV   TH1,  #0E8H              ; 1200 baud T1 overflow value
      MOV   BYTE_DELY,  #255         ; 10ms
      SJMP  SET_UP_END
S_2400:     CJNE  A, #B2400,  S_9600            ; Not 2400b try 9600b
      MOV   AS_STR_FACT,      #S_BY_2400  ; Computation factor to determine ASYNC IN
byte to start SDLC out(future config)
      MOV   TH1,  #0F4H              ; 2400 baud T1 overflow value
      MOV   BYTE_DELY,  #128         ; 5ms
      SJMP  SET_UP_END
S_9600:     CJNE  A, #B9600,  S_19200           ; Not 9600b default 19200b
      MOV   AS_STR_FACT,      #S_BY_9600  ; Computation factor to determine ASYNC IN
byte to start SDLC out(future config)
      MOV   TH1,  #0FDH              ; 9600 baud T1 overflow value
      MOV   BYTE_DELY,  #32          ; 1ms
      SJMP  SET_UP_END
S_19200:                             ; 19.2kb default
      MOV   AS_STR_FACT,      #S_BY_19200 ; Computation factor to determine ASYNC IN
byte to start SDLC out(future config)
      MOV   PCON, #10000000B         ; SMOD=1(timer/baud), no power down, etc
      MOV   BYTE_DELY,  #16          ; .5ms
      MOV   TH1,  #0FDH              ; 19.2k baud T1 overflow value
SET_UP_END:
```

```
      MOV   TL1,  TH1                    ; low byte of baud rate timer
      MOV   TMOD, #00100001B             ;    T1(Gate=TX1,    Timer,    8bit/AutoReload),
T0(Gate=TX0, Timer, 16bit)
      MOV   TCON, #01000101B             ; T1(BaudRateGen)=On, T0=Off, INT1=EdgeTrigger,
INT0=EdgeTrigger, Intr flags OFF
      MOV   SCON, #01010000B             ; Serial (Mode 1) clear TI & RI
      MOV   TH0,  #0FCH                  ; high byte of timer (1.1ms)
      MOV   TL0,  #00                    ; low byte of timer
      SETB  TR0                          ; restart timer, fall through to interrup exit
      LCALL RESET73                          ; Reset and initialize the SDLC
      MOV   IE,   #10010111B             ; Interrupt Enables
;*************************************************************************************
*********************
; All tasks defined except the NULL task are Interrupt Handlers
;     and are called by either hardware or software interrupts
;     This NULL task runs at the lowest priority
;*************************************************************************************
*********************
;           RSEG  CODE
      PUBLIC      NULL_TASK
NULL_TASK:
      ;LCALL      MAIN                        ;
      SETB  P1.4                         ; Debug setup
      MUL   AB
      CLR   P1.4
      MUL   AB
      SJMP  NULL_TASK                    ; 'C51' interfaces here
      END
^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z
^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z
^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z
```

```
;    *********************   PROM   8751/DS5000   compatability
*****************************************************************************************
****************
     IP_e          EQU   IP          ; 8751/DS5000 standard definition
     P0_e          EQU   P0          ; 8751/DS5000 standard definition
     P2_e          EQU   P2          ; 8751/DS5000 standard definition
;    *********************   PROM   8751/DS5000   compatability
*****************************************************************************************
****************
; No MOVX with DPTR to access true EXTERNAL mem or memoary mapped i/o is not permitted
;    on the pod51, therefore it will not be used on the prom version either.
; Nohau uses an 80535 in the pod-51 ice and remaps P0,P2 to P4,P5, and IP has
;    a unique address on the 80535.  Standard Definitions apply for PROMs
;    *********************   ICE   (nohau   -   pod51)   compatability
*****************************************************************************************
****************
; The RD, WR strobes do not function with the Nohau   POD51
     WR_e          EQU   P1.6        ; Nohau ICE adjustment
     RD_e          EQU   P1.7        ; Nohau ICE adjustment
; Cut and jumper the RD, WR lines to appropriate lines on P1
;    *********************   ICE   (nohau   -   pod51)   compatability
*****************************************************************************************
****************
^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z
^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z^Z
^Z^Z^Z^Z^Z^Z^Z^Z^Z^Z
```

```
; v2start  v2start  v2start  v2start  v2start  v2start  v2start  v2start  v2start
v2start  v2start  v2start  v2start  v2start
;**********************************************************************************
*********************************************
;**
                                                  **
;**                                    EEEEEEEEEEEEEE          TTTTTTTTTTTT
NNNNNNN       NNNNN                          **
;**                                    EEEEEEEEEEEEE           TTTTTTTTTT
NNNNNNNN      NNNNN                          **
;**                                    EEEEE          A        TTTT      OOO
NNNNNNNNN     NNNNN                          **
;**                                    EEEEEEEEEEE    AAA      TTT       OOOOOOOO
NNNNN NNNN    NNNNN                          **
;**                                    EEEEEEEEEE     AAAAA    TTT       OOOOOOOO
NNNNN   NNNN NNNNN                           **
;**                                    EEEEE                   TTTT      OOO
NNNNN    NNNNNNNNN                           **
;**                                    EEEEEEEEE      AAAAAAA  TTTTT
NNNNN      NNNNNNNN                          **
;**                                    EEEEEEEE       AAAAAAAAA TTTTTTT
NNNNN        NNNNNNN                         **
;**
                                                  **
;**          This software (firmware) developed by EATON-KENWAY is proprietary.  Source
code on listings or any other media        **
;**            is not for sale or loan and may not be copied or transferred to any
vendor, buyer, or consultant.  Executable        **
;**           code is available in ROM and is sold with the original product or as a
product upgrade.  Buyer shall not          **
;**          copy or distribute ROM's with E-K firmware to any third party without the
prior written approval of EATON-KENWAY.    **
;**           Title to and ownership of the software shall at all times remain with
EATON-KENWAY.    The information  in this      **
;**           is subject to change without notice  and should not be construed as a
commitment by EATON-KENWAY.              **
;**
                                                  **
;**          EATON-KENWAY  assumes no responsibility for the use or reliability
of  its  software on  equipment which      **
;**          is  not supplied EATON-KENWAY or has been modified without EATON-KENWAY
approval.                                  **
```

```
;**
                                                          **
;**           Copyright 1989
                   KENWAY, INCORPORATED       **
;*****************************************************************************************
***********************************************
;  v2start  v2start  v2start  v2start  v2start  v2start  v2start  v2start  v2start
v2start  v2start  v2start  v2start  v2start
;
;         DATE CREATED:  Feb 89
;         AUTHOR:          Vehicle Group
;
;         DESCRIPTION:
;             xxx......              ....
;
;         PROGRAM HISTORY:
;         Date          Initials/No.        Description
;         *********     ************        ***************************************
;* * * * * * * * * * * * * * * * * * * * * * * * * * * * * * * * * * * * * * * * * *
* * * * * * * * * * * * * * * * * * * * * * *
$EJ   ;
      NAME  V2START
;***************************************************************************
; V2START MODULE
;      V2START VERIFIES RAM AND ROM
;      AT ROM BURN TIME THE ROM CHECKSUM TABLES NEED TO BE FILLED IN.
;******************************************************************************
PUBLIC  RAMROMTEST                    ; CALLED FROM V28274
PUBLIC  ERROR_COUNT                   ; USED BY HCU AT STARTUP
;*******************************************************************
; GENERAL EQUATES
;*******************************************************************
CR      EQU    0DH          ; ASCII CONTROL CHARS DEFINITION
ESC_P EQU   1BH
FF      EQU    0CH
STX     EQU    02H
DATA_PORT_CHA           EQU          00D8H    ; 8274 PORT DEFINITIONS
DATA_PORT_CHB           EQU          00DAH
STATUS_PORT_CHA         EQU          00DCH
STATUS_PORT_CHB         EQU          00DEH
COMMAND_PORT_CHA      EQU      00DCH
COMMAND_PORT_CHB      EQU      00DEH
```

```
DATA  SEGMENT PUBLIC     'DATA'
ERROR_COUNT DW     0          ;NUMBER OF RAM/ROM FAILURES
HI_SAVE            DW    0          ;CHECKSUM FOR CONTINUED ROMS-HIGH
LO_SAVE            DW    0          ;CHECKSUM FOR CONTINUED ROMS-LOW
DATA    ENDS
$EJ   ;
V2START_CODE        SEGMENT 'CODE'
      ASSUME CS:V2START_CODE,DS:DATA
;**********************************************************************
;      DEFINE TEST DEFINITION TABLE STRUCTURE
;**********************************************************************
TDP   STRUC                         ;SET UP TEMPLET
    TYP      DB    0                      ;XXXXXXX0 = RAM TEST
                                    ;XXXXXXX1 = ROM TEST
                                    ;XXXXXX0X = LOAD CHECKSUM
                                    ;XXXXXX1X = CONTINUE CHECKSUM
                                    ;1XXXXXXX = LAST ENTRY IN TABLE
                                    ;0XXXXXXX = MORE TESTING
    CSO      DW    0                      ;CHECK SUM OFFSET - ROM TESTS ONLY
    SGT      DW    0                      ;SEGMENT REGISTER FOR TEST
    OFS      DW    0                      ;OFFSET OF HIGH WORD TO TEST
    NM0      DB    'LO  -'                      ;ERROR MESSAGE FOR LO BYTE FAILURE
    NM1      DB    'HI  -'                      ;ERROR MESSAGE FOR HI BYTE FAILURE
TDP   ENDS
RAM_E EQU    000H             ;TYP FOR RAM TEST - END TEST
ROM_S EQU    001H             ;TYP FOR ROM TEST - START TEST
ROM_E EQU    003H             ;TYP FOR ROM TEST - END TEST
ROM_T EQU    083H             ;TYP FOR ROM TEST - TERMINANTE AFTER
NUL   EQU    000H             ;NULL FOR EMPTY DATA
OF1   EQU    006H             ;OFFSET FOR FIRST CHECKSUMS (LO-HI)
OF2   EQU    00AH             ;OFFSET FOR SECOND CHECKSUMS (LO-HI)
$EJ   ;
;**********************************************************************
;     TEST DEFINITION TABLE
;**********************************************************************
TEST_T       TDP   <RAM_E,NUL,00000H,03FFEH,'U75 ','U42 '>
      TDP   <RAM_E,NUL,00400H,03FFEH,'U76 ','U43 '>
      TDP   <ROM_S,OF1,0E000H,0FFFEH>
      TDP   <ROM_T,NUL,0F000H,0FFF4H,'U74 ','U41 '>
;************** THIS WOULD BE USED FOR 4 PROM SETS ***********************
;TEST TDP   <RAM_E,NUL,00000H,03FFEH,'U76 ','U43 '>
;     TDP   <RAM_E,NUL,00400H,03FFEH,'U75 ','U42 '>
```

```
;      TDP   <ROM_S,OF1,0E000H,0FFFEH>
;      TDP   <ROM_E,NUL,0F000H,0FFF4H,'U74 ','U41 '>
;      TDP   <ROM_S,NUL,0C000H,0FFFEH>
;      TDP   <ROM_T,OF2,0D000H,0FFFEH,'U73 ','U40 '>
SEJ   ;
;*************************************************************************
; V2START
;     INITIALIZE HCU, WRITE FIRMWARE VERSION NUMBER AND COPYRIGHT
;     TEST ROM AGAINST CHECKSUMS, OUTPUT RESULTS ON HCU
;     TEST RAM FOR WRITE AND READ, OUTPUT RESULTS ON HCU, NO CHANGE TO RAM
; NOTES:
;      0) THIS PROGRAM WILL NOT LEAVE ANY MEMORY MODIFIED.
;         ( IT WILL ONLY READ A MEMORY ADDRESS INTO A REGISTER,
;           FIDDLE WITH THE ADDRESS, AND RESTORE THE ADDRESS.
;             THIS IS NOT AN EXTENSIVE RAM TEST.  IT WILL NOT TEST FOR
;           ANY ADJACENT CELL ERRORS, IT WILL NOT TEST ADDRESS LINES, ETC. )
;      1) THE ROM CHECKSUMS MUST BE ENTERED INTO THE ROMS AT BURN TIME
;        2) THIS PROGRAM WILL ASSUME THAT THE STACK THAT THIS PROGRAM USES
;           IS GOOD RAM. (WHAT ELSE CAN ANYONE DO?)
;         THE STACK THAT THIS PROGRAM USES IS ABOUT 30 (DECIMAL) WORDS.
;*************************************************************************
MSG_FAIL     DB     'RAM/ROM TEST FAILURE'
MSG_CR              DB     CR
CPYRGHT            DB       'GWC FIRMWARE '
CPYRGHT_LENGTH     EQU    $-CPYRGHT
$EJ   ;
;*************************************************************************
; OUTPUT FORMAT
;        EATON-KENWAY COPYRIGHT AND FIRMWARE VERSION NUMBER WILL BE DISPLAYED
;        AT THE TOP OF THE SCREEN AND THEN THE RAM AND ROM TEST WILL BE RUN
;*************************************************************************
RAMROMTEST  PROC  FAR
       MOV AX,DATA                    ;SET UP DS
     MOV   DS,AX
     CLI                         ;DISABLE INTERRUPTS
     CALL    INITIALIZE               ;SET UP HCU
     MOV   DI,OFFSET TEST_T.TYP     ;GET ADDRESS OF FIRST TEST IN DI
     MOV   ERROR_COUNT,0            ;ZERO OUT ERROR COUNT
;*************** SET UP COMMON REGISTERS FOR TESTING ******************
RR10:
     PUSH  DI                    ;SAVE CURRENT TEST BLOCK ADDRESS
     MOV   AX,CS:[DI].SGT            ;GET SEGMENT TO TEST
```

```
        MOV   ES,AX               ;PUT INTO ES
        MOV   CX,CS:[DI].OFS              ;GET OFFSET TO TEST INTO CX
        MOV   AL,CS:[DI].TYP              ;GET THE TYPE OF TEST INTO AX
        TEST  AL,1                ;SEE IF RAM OR ROM TEST
        JNZ   RR20                ;JUMP IF ROM TEST
;******************** RAM TEST ********************************
        MOV   BX,DI               ;GET THE ERROR ADDRESS
        ADD   BX, OFFSET NMO              ;ADD OFFSET
        CALL  RAM_TEST            ;TEST THE RAM
        JMP SHORT   RR60                  ;CLEAN UP
$EJ   ;

;******************** ROM TEST **********************************
RR20:
        TEST  AL,2                ;FIND WHICH CHECKSUM TO USE
        JNZ   RR40                ;JUMP IF CONTINUED CHECKSUM
;******************** NEW CHECKSUM ******************************
        PUSH  ES                  ;SAVE
        MOV   AX,0FFFFH           ;LOAD SEGMENT OF CHECKSUMS
        MOV   ES,AX               ;INTO SEGMENT REGISTER
        MOV   SI,CS:[DI].CSO              ;GET OFFSET OF NEXT CHECKSUM
        MOV   AH,ES:[SI]          ;GET MSB OF LO CHECKSUM
        MOV   BH,ES:[SI]+1                ;GET MSB OF HI CHECKSUM
        MOV   AL,ES:[SI]+2                ;GET LSB OF LO CHECKSUM
        MOV   BL,ES:[SI]+3                ;GET LSB OF HI CHECKSUM
        POP   ES                  ;RESTORE
        XOR   DX,DX               ;ZERO THE MESSAGE ADDRESS FOR CONTINUE
        JMP SHORT   RR50                  ;GO RUN TEST
;************************ OLD CHECKSUM ******************************
RR40:
        MOV   AX,LO_SAVE          ;GET OLD LO CHECKSUM
        MOV   BX,HI_SAVE          ;GET OLD HI CHECKSUM
        MOV   DX,DI               ;SET UP MESSAGE ADDRESS
        ADD   DX, OFFSET NMO              ;ADD OFFSET
;********************** RUN ROM TEST ***************************
RR50:
        CALL  ROM_TEST            ;TEST ROM
;********************** CLEAN UP AND CHECK FOR NEXT TEST *************
RR60:
        POP   DI                  ;GET ADDRESS OF TEST BLOCK BACK
        TEST  CS:[DI].TYP,080H    ;GET TYPE OF TEST BACK
        JNZ   RR70                ;JUMP IF LAST TEST
```

```
      ADD   DI,TYPE TEST_T          ;INCREMENT TO NEXT TEST
      JMP   RR10              ;RUN NEXT TEST
RR70:
      RET                     ;BACK TO V28274 FOR INTERRUPT SET UP
RAMROMTEST  ENDP
$EJ   ;
;*******************************************************************
INITIALIZE  PROC
;     THE INITIALIZE ROUTINE WILL INITIALIZE THE HAND CONTROLLER.
;     INITIALIZATION INCLUDES:
;     SEND <ESC_P> <STX>, WAIT 100 MS
;     SEND <ESC_P> <FF>, WAIT 100 MS
;
;     NO REGISTERS NEED BE PRESERVED.
;********************************************************************
      MOV   AL,ESC_P
      CALL  SEND_CHAR
      MOV   AL,STX                  ;ENTER HANDCONTROLLER TRANSPARENT MODE
      CALL  SEND_CHAR
      CALL  DELAY_100_MS

      MOV   AL,ESC_P
      CALL  SEND_CHAR
      MOV   AL,FF             ;CLEAR SCREEN, HOME CURSOR
      CALL  SEND_CHAR
      CALL  DELAY_100_MS
      RET
INITIALIZE  ENDP
$EJ   ;
;************************************************************************
;     SEND CHAR IN AL OUT TO THE USART.
;************************************************************************
SEND_CHAR   PROC
      PUSH  AX

TX_NOT_READY:
      IN    AL,STATUS_PORT_CHB
      AND   AL,4               ;CHECK FOR TX BUFFER EMPTY
      JZ    TX_NOT_READY
      POP   AX
      OUT   DATA_PORT_CHB,AL  ;SEND CHAR
      RET
```

```
SEND_CHAR   ENDP
;************************************************************************
;     SEND CS:[BX] MESSAGE, CX LONG TO USART
;************************************************************************
SEND_MESSAGE       PROC
      PUSH    AX                ;SAVE REGISTER
S_M_LOOP:
      MOV   AL,CS:[BX]          ;GET CHAR TO SEND
      CALL  SEND_CHAR           ;SEND CHAR
      INC   BX                  ;INCREMENT POINTER
      LOOP  S_M_LOOP            ;LOOP FOR MORE
      POP    AX                 ;RESTORE REGISTER
      RET                       ;RETURN
SEND_MESSAGE       ENDP
$EJ   ;
;******************************************************************************
;     NOTE: THIS ROUTINE HAS A SOFTWARE LOOP TO DELAY AT LEAST 100 MS.
;           IF THE HARDWARE IS CHANGED, THIS ROUTINE WILL HAVE TO BE ADJUSTED.
;******************************************************************************
DELAY_100_MS       PROC
      PUSH  AX
      PUSH  CX
;************ ASSUMING 10 MEG HERTZ CLOCK, 20 CLOCKS*6000= .120 SECONDS ******
      MOV   CX,6000             ; 6 THOUSAND
DELAY_LOOP:
      XOR   AX,0                ; FOUR CLOCK DELAY
      XOR   AX,0                ; FOUR CLOCK DELAY
      XOR   AX,0                ; FOUR CLOCK DELAY
      XOR   AX,0                ; FOUR CLOCK DELAY
      XOR   AX,0                ; FOUR CLOCK DELAY
      XOR   AX,0                ; FOUR CLOCK DELAY
      LOOP  DELAY_LOOP
      POP   CX
      POP   AX
      RET
DELAY_100_MS       ENDP
$EJ   ;
;************************************************************************
;     THIS PROCEDURE IS USED TO TEST 64K BYTES OR LESS OF ROM
;
;     CALLING SETUP:
;
```

```
;     AX = HI CHECKSUM REQUIRED - IN TWO'S COMPLEMENT
;     BX = LO CHECKSUM REQUIRED - IN TWO'S COMPLEMENT
;     CX = OFFSET OF MEMORY TO BE TESTED (THIS GETS DECREMENTED TO ZERO)
;     DX = OFFSET OF MESSAGES TO BE PRINTED ON ERROR
;     ES = SEGMENT TO BE TESTED (SEE CX)
;
;     THIS ROUTINE WILL TEST BOTH THE HIGH AND LOW BYTE OF MEMORY
;     STARTING AT ADDRESS ES:CX DOWN TO ES:0 DECREMENTING BY 2.  THE
;     TEST IS INTEL'S 16 BIT CHECKSUM AND THERE IS ONE FOR EACH
;     PROM.  (THAT'S WHY THERE IS A HIGH AND LO CHECKSUM)  IT MATCHES
;     THE CHECKSUM GENERATED BY THE PROM PROGRAMMER.
;*********************************************************************
ROM_TEST    PROC  NEAR
      PUSH  DX                  ;SAVE THE MESSAGE OFFSET
      XOR   DX,DX               ;ZERO REGISTER
      AND   CX,0FFFEH           ;INSURE A WORD OFFSET
ROM10:
      MOV   DI,CX               ;OFFSET INTO DI
      MOV   CX,ES:[DI]          ;FETCH ONE WORD FROM PROMS
      ADD   AL,CL               ;INCLUDE HI BYTE IN CHECKSUM
      ADC   AH,DL               ;ACCOUNT FOR CARRY
      ADD   BL,CH               ;INCLUDE LO BYTE IN CHECKSUM
      ADC   BH,DL               ;ACCOUNT FOR CARRY
      MOV   CX,DI               ;MAKE ADDRESS A COUNTER FOR LOOP
      DEC   CX                  ;WORDS NEED TO DECREMENTED TWICE
      LOOP  ROM10               ;LOOP UNTIL COUNTER IS ZERO
;********************** TEST LAST BYTE (OFFSET 0) **********************
      MOV   DI,CX               ;OFFSET INTO DI
      MOV   CX,ES:[DI]          ;FETCH ONE WORD FROM PROMS
      ADD   AL,CL               ;INCLUDE HI BYTE IN CHECKSUM
      ADC   AH,DL               ;ACCOUNT FOR CARRY
      ADD   BL,CH               ;INCLUDE LO BYTE IN CHECKSUM
      ADC   BH,DL               ;ACCOUNT FOR CARRY
      POP   DX                  ;GET ADDRESS OF MESSAGE
      CMP   DX,0                ;LOOK FOR CONTINUE
      JE    ROM40               ;SKIP IF NO MESSAGE
      XOR   SI,SI               ;ZERO REGISTER
      CMP   AX,SI               ;SEE IF HI CHECKSUM IS CORRECT
      JNZ   ROM20               ;JUMP ON HI CHECKSUM ERROR
      CMP   BX,SI               ;SEE IF LO CHECKSUM IS CORRECT
      JNZ   ROM30               ;JUMP ON LO CHECKSUM ERROR
ROM15:
```

```
     RET                          ;RETURN TO CALLING ROUTINE
ROM20:
     ADD   DX,5                   ;SET TO HI MESSAGE OFFSET
ROM30:
     MOV   BX,DX                  ;SET UP MESSAGE ADDRESS
     CALL  PRINT_ERROR            ;PRINT ERROR MESSAGE
     RET                          ;RETURN
ROM40:
     MOV   HI_SAVE,BX             ;SAVE HIGH CHECKSUM
     MOV   LO_SAVE,AX             ;SAVE LOW CHECHSUM
     RET                          ;RETURN
ROM_TEST    ENDP
SEJ   ;
;*************************************************************************
;   THIS PROCEDURE IS USED TO TEST 64K BYTES OR LESS OF RAM
;   CALLING SETUP:
;      CX = OFFSET OF MEMORY TO BE TESTED (THIS GETS DECREMENTED TO ZERO)
;      BX = OFFSET OF MESSAGES TO BE PRINTED ON ERROR
;      ES = SEGMENT TO BE TESTED (SEE CX)
;           THIS ROUTINE WILL TEST BOTH THE HIGH AND LOW BYTE OF MEMORY
;           STARTING AT ADDRESS ES:EX DOWN TO ES:0 DECREMENTING BY 2.  THE
;           TEST IS:
;             (A)    SAVE THE ORIGINAL RAM CONTENTS
;             (B)    WRITE OAAAAH AND TEST
;             (C)    WRITE 05555H AND TEST
;             (D)    RESTORE ORIGINAL CONTENTS AND TEST
;*************************************************************************
RAM_TEST    PROC  NEAR
     MOV   DX,0AAAAH              ;GET 1010 PATTERN
     MOV   SI,05555H              ;GET 0101 PATTERN
     AND   CX,0FFFEH              ;INSURE A WORD OFFSET
RAM10:
     MOV   DI,CX                  ;OFFSET INTO DI
     MOV   AX,ES:[DI]             ;GET ORIGINAL CONTENTS
     MOV   ES:[DI],DX             ;SAVE 1010 PATTERN
     CMP   ES:[DI],DX             ;TEST
     JNE   RAM20                  ;JUMP IF WRITE FAILED
     MOV   ES:[DI],SI             ;SAVE 0101 PATTERN
     CMP   ES:[DI],SI             ;TEST
     JNE   RAM30                  ;JUMP IF WRITE FAILED
     MOV   ES:[DI],AX             ;RESTORE ORIGINAL CONTENTS
     CMP   ES:[DI],AX             ;TEST
```

```
      JNE   RAM40               ;JUMP IF WRITE FAILED
      DEC   CX                  ;WORDS NEED TO BE DECREMENTED TWICE
      LOOP  RAM10               ;LOOP UNTIL COUNTER ZERO
;******************** INCLUDE FIRST BYTE (ADDRESS = 0) ******************
      MOV   DI,CX               ;OFFSET INTO DI
      MOV   AX,ES:[DI]          ;GET ORIGINAL CONTENTS
      MOV   ES:[DI],DX          ;SAVE 1010 PATTERN
      CMP   ES:[DI],DX          ;TEST
      JNE   RAM20               ;JUMP IF WRITE FAILED
      MOV   ES:[DI],SI          ;SAVE 0101 PATTERN
      CMP   ES:[DI],SI          ;TEST
      JNE   RAM30               ;JUMP IF WRITE FAILED
      MOV   ES:[DI],AX          ;RESTORE ORIGINAL CONTENTS
      CMP   ES:[DI],AX          ;TEST
      JNE   RAM40               ;JUMP IF WRITE FAILED
      RET                       ;RETURN - NO ERRORS
RAM20:
      MOV   AX,DX               ;PUT PATTERN IN AX
      JMP SHORT   RAM40               ;JUMP TO TEST
RAM30:
      MOV   AX,SI               ;PUT PATTERN IN AX
RAM40:
      CMP   ES:[DI],AL          ;TEST LOW BYTE
      JNE   RAM50               ;PRINT LOW FAILURE IF NE
      ADD   BX,5                ;ADD 5 TO GET HI FAILURE MESSAGE
RAM50:
      CALL  PRINT_ERROR         ;PRINT MESSAGE ON HCU
      RET                       ;RETURN TO CALLER
RAM_TEST    ENDP
$EJ   ;
;****************************************************************************
;     THIS PROCEDURE IS USED BY THE RAM/ROM TESTS TO PRINT ERROR MESSAGES
;     IT INSURES THAT A HEADER MESSAGE IS PRINTED AND THAT THERE WILL
;     BE 4 SOCKETS MAXIMUM LISTED ON EACH LINE
;        CALLING SETUP:
;           BX = OFFSET OF THE MESSAGE TO BE PRINTED
;****************************************************************************
PRINT_ERROR PROC  NEAR
      PUSH  BX                  ;SAVE MESSAGE OFFSET
      MOV   AX,ERROR_COUNT            ;GET THE CURRENT ERROR COUNT
      INC   ERROR_COUNT         ;INCREMENT COUNT FOR NEXT TIME
      CMP   AX,0                ;LOOK FOR FIRST MESSAGE
```

```
        JNE    PE10                 ;JUMP IF NOT FIRST MESSAGE
        MOV    CX,CPYRGHT_LENGTH          ;GET LENGTH OF COPYRIGHT LINE
        MOV    BX,OFFSET CPYRGHT ;GET ADDRESS OF COPYRIGHT LINE INTO BX
        CALL     SEND_MESSAGE             ;BX=POINTER, CX= BYTE COUNT.
        MOV    CX,20                ;MESSAGE LENGTH
        LEA    BX,MSG_FAIL          ;OFFSET OF FAILURE MESSAGE
        CALL   SEND_MESSAGE               ;OUTPUT TO HCU
        JMP SHORT   PE20                  ;SKIP CR ON FIRST MESSAGE
PE10:
        AND    AX,03H                     ;WIPE OUT ALL BUT LAST 2 BITS
        CMP    AX,0                 ;TEST FOR FIRST OF FOUR MESSAGES
        JNE    PE20                 ;JUMP IF MESSAGE WILL FIT ON LINE
        MOV    CX,1                 ;MESSAGE LENGTH
        LEA    BX,MSG_CR            ;OFFSET OF CARRIAGE RETURN MESSAGE
        CALL   SEND_MESSAGE               ;OUTPUT TO HCU
PE20:
        POP    BX                   ;GET MESSAGE OFFSET FROM STACK
        MOV    CX,5                 ;MESSAGE LENGTH - (BX=MESSAGE ADDRESS)
        CALL   SEND_MESSAGE               ;OUTPUT TO HCU
        CALL   DELAY_100_MS               ;WAIT AND ALLOW MESSAGE TO BE SEEN
        CALL   DELAY_100_MS               ;WAIT AND ALLOW MESSAGE TO BE SEEN
        RET                         ;RETURN
PRINT_ERROR ENDP
V2START_CODE       ENDS
END
```

```
; V3_186  V3_186  V3_186  V3_186  V3_186  V3_186  V3_186  V3_186  V3_186
V3_186  V3_186  V3_186  V3_186  V3_186
;**********************************************************************************
**********************************************
;**
                                          **
;**                                    EEEEEEEEEEEEEE      TTTTTTTTTTTT
NNNNNNN     NNNNN                          **
;**                                    EEEEEEEEEEEEE       TTTTTTTTTT
NNNNNNNN    NNNNN                          **
;**                                    EEEEE            A        TTTT       OOO
NNNNNNNNN   NNNNN                          **
;**                                    EEEEEEEEEEEE      AAA      TTT       OOOOOOOO
NNNNN NNNN  NNNNN                          **
;**                                    EEEEEEEEEEE      AAAAA     TTT       OOOOOOOO
NNNNN  NNNN NNNNN                          **
;**                                    EEEEE                      TTTT       OOO
NNNNN   NNNNNNNNN                          **
;**                                    EEEEEEEEE      AAAAAAA    TTTTT
NNNNN    NNNNNNNN                          **
;**                                    EEEEEEEE     AAAAAAAAA    TTTTTTT
NNNNN      NNNNNNN                         **
;**
                                          **
;**        This software (firmware) developed by EATON-KENWAY is proprietary.  Source
code on listings or any other media      **
;**            is not for sale or loan and may not be copied or transferred to any
vendor, buyer, or consultant.  Executable       **
;**          code is available in ROM and is sold with the original product or as a
product upgrade.  Buyer shall not           **
;**        copy or distribute ROM's with E-K firmware to any third party without the
prior written approval of EATON-KENWAY.   **
;**            Title to and ownership of the software shall at all times remain with
EATON-KENWAY.    The information  in this      **
;**            is subject to change without notice  and should not be construed as a
commitment by EATON-KENWAY.                **
;**
                                          **
;**          EATON-KENWAY   assumes  no  responsibility  for  the  use or reliability
of  its  software on  equipment which      **
;**          is  not supplied EATON-KENWAY or has been modified without EATON-KENWAY
approval.                                 **
```

```
;**
                                              **
;**         Copyright 1989
                KENWAY, INCORPORATED        **
;*************************************************************************************
***********************************************
; V3_186   V3_186   V3_186   V3_186   V3_186   V3_186   V3_186   V3_186   V3_186
V3_186   V3_186   V3_186   V3_186   V3_186
;
;       DATE CREATED:  Feb 89
;       AUTHOR:        Vehicle Group
;
;       DESCRIPTION:
;           xxx......            ....
;
;       PROGRAM HISTORY:
;       Date        Initials/No.        Description
;       =======     ============        ==============================
;    Dave Madsen       June 16, 1986
;    Gary Whatcott              July 1989   adapted for 'C'
;    Bruce Christensen May 1990    Changed call from v2_8274_start to v3_8274_start
;                                   And changed the name of this program to V3_186
;****************************************************************************
$EJ   ;
     EXTRN V3_8274_START:FAR ;ENTRY POINT FOR NEXT JUMP
     EXTRN VSYSBUG:FAR        ;SYSTEM BUGS
     PUBLIC      V186TC                   ;START ADDRESS FROM COLDSTART or VSYSBUG
     PUBLIC  COLDSTART        ; JMP START AT FFFF:FFF0
NAME  V3_186
;*******************************************************************************
;*******************************************************************************
;COLDSTART
;     THIS WILL STAMP THE VSTART ADDRESS INTO THE COLD START VECTOR OF
;     THE CPU
;*******************************************************************************
;*******************************************************************************
V3_186_COLDSTART  SEGMENT AT 0FFFFH
     ASSUME      CS:V3_186_COLDSTART
COLDSTART:
     JMP   FAR PTR V186TC
;**********************************************************************
; TABLE OF BLANK WORDS TO BE FILLED WITH PROM CHECKSUMS
```

```
; AT BURN TIME - SET UP STRANGE HERE TO MAKE IT EASY TO
; BURN THE CHECKSUMS INTO THE PROMS
;*******************************************************************
      DB    0           ;NOT USED
      DB    0           ;MSB OF U74
      DB    0           ;MSB OF U41
      DB    0           ;LSB OF U74
      DB    0           ;LSB OF U41
      DB    0           ;MSB OF U73 - WHEN USED
      DB    0           ;MSB OF U40 - WHEN USED
      DB    0           ;LSB OF U73 - WHEN USED
      DB    0           ;LSB OF U40 - WHEN USED
      DB    0           ;NOT USED
      DB    0           ;NOT USED
V3_186_COLDSTART  ENDS
$EJ   ;
;***************************************************************************
;     OUTWORD          M A C R O
;                This is an attempt to make the assembler look like
;                the PL/M illustrations in appendix F of the 186/03
;                Hardware reference manual.
;     first parm  Port address to be used as output
;     second parm The WORD to be written
;***************************************************************************
%*define( OUTWORD( out_port, out_data ) )
(     MOV   DX, %out_port                 ; Load DX with port address
      MOV   AX, %out_data                 ; Load AX with port data
      OUT   DX,AX                   ; OUTPUT out_data to out_port
)
;***************************************************************************
;     OUTPUT        M A C R O  - (FOR BYTE OUT)
;                This is an attempt to make the assembler look like
;                the PL/M illustrations in appendix F of the 186/03
;                Hardware reference manual.
;     first parm  Port address to be used as output
;     second parm The BYTE to be written
;***************************************************************************
%*define( OUTPUT( out_port, out_data ) )
(     MOV   DX, %out_port                 ; Load DX with port address
      MOV   AL, %out_data                 ; Load AX with port data
      OUT   DX,AL                   ; OUTPUT out_data to out_port
)
```

```
$EJ   ;
V3_186_CODE SEGMENT     'CODE'
      ASSUME      CS:V3_186_CODE
;*****************************************************************
;*****************************************************************
;   REAL START LOCATION - ENTRY POINT (COLDSTART / AFTER VSYSBUG)
;           INITIALIZE THE 186 PROCESSOR
;*****************************************************************
;*****************************************************************
V186TC:
      CLI                       ; DISABLE INTERRUPTS
;******  SET UP RELOCATION REGISTER  *********
      %OUTWORD( OFFFEH, 040FFH )    ;RELOCATION REGISTER AT FFFE IN I/O SPACE
                           ; AT 80186 RESET
                           ;DATA WORD:
                           ; B15     NO ESC TRAP
                           ; B14     RMX MODE
                           ; B12     PERIPHERAL CONTROL BLOCK
                           ;         MAPPED TO I/O SPACE
                           ; B11-B0  PERIPHERAL CONTROL BLOCK
                           ;         REMAINS AT FF00H
;******* SET UP THE INTERNAL CHIP SELECT *********
      %OUTWORD( OFFA8H, 081B8H )    ;PORT OF MPCS REGISTER
                           ;DATA WORD:
                           ; B15     PREDEFINED
                           ; B6      PERIPHERALS MAPPED TO I/O
                           ; B8      MMCS AT 2K (70000H TO 78000H)
                           ; B2-B0   0 WAIT STATES
      %OUTWORD( OFFA6H, 071FBH )    ;PORT OF MMCS REGISTER
                           ;DATA WORD:
                           ; B15-B9  DIO_ADDRESS AT 70000H
                           ; B8-B3   PREDEFINED
                           ; B2-B0   3 WAIT STATES
      %OUTWORD( OFFA4H, 00038H )    ;PORT OF PACS REGISTER
                           ;DATA WORD:
                           ; B15-B6  CHIP SELECT BASE AT 00000H
                           ; B5-B3   PREDEFINED
                           ; B2-B0   0 WAIT STATES
      %OUTWORD( OFFA2H, 007F8H )    ;PORT OF LMCS REGISTER
                           ;DATA WORD:
                           ; B15-B6  RAM ENDS AT 7FFFH
                           ; B5-B3   PREDEFINED
```

```
                         ; B2-B0   0 WAIT STATES
    %OUTWORD( 0FFA0H, 0C038H )    ;PORT OF UMCS REGISTER
                         ;DATA WORD:
                         ; B15-B6  ROM STARTS AT C0000H
                         ; B5-B3   PREDEFINED
                         ; B2-B0   0 WAIT STATES
$EJ  ;
;*****************************************
;    80130 pic initialization
;*****************************************
    %OUTPUT( 000E0H, 035H )       ;PORT OF ICW1
                          ;BYTE OUTPUT
                          ;     ICW6 NEEDED
                          ;     ICW5 NEEDED
    %OUTPUT( 000E2H, 08H )        ;PORT OF ICW2
                          ;BYTE OUTPUT
                          ;     VECTOR BASE IR0=LEVEL 8
    %OUTPUT( 000E2H, 008H )       ;PORT OF ICW3
                          ;BYTE OUTPUT
                          ;     8247 SLAVE
    %OUTPUT( 000E2H, 00DH )       ;PORT OF ICW4
                          ;BYTE OUTPUT
                          ;     FULLY NESTED MODE
    %OUTPUT( 000E2H, 001H )       ;PORT OF ICW5
                          ;BYTE OUTPUT
                          ;     LEVEL TRIGGER IR0-DIO BOARD
    %OUTPUT( 000E2H, 0FFH )       ;PORT OF ICW6
                          ;BYTE OUTPUT
                          ;     LIR=0 FOR 8274 INSTR.
    %OUTPUT( 000E2H, 0FFH )       ;PORT OF OCW1
                          ;BYTE OUTPUT
                          ;     MASK ALL
$EJ  ;
;*****************************************
;    186 pic initialization
;*****************************************
    %OUTWORD( 0FF20H, 00040H )    ;PORT FOR VCS REGISTER
                          ;WORD OUTPUT
                          ;     SLAVE LEVEL
                          ;     IRS0=LEVEL 64
;   %OUTWORD( 0FF34H, 0000AH )    ;PORT ADDRESS FOR DMA
                          ;WORD OUTPUT
```

```
                              ;      DMA0=LEVEL 2 MASKED
      %OUTWORD( OFF2AH, 00002H )    ;PORT FOR PRIORITY REGISTER
                              ;WORD OUTPUT
                              ;      MASK ALL LEVELS BELOW 2
      %OUTWORD( OFF28H, 0003DH )    ;PORT FOR MASK REGISTER
                              ;WORD OUTPUT
                              ;      MASK ALL INTERRUPTS
$EJ   ;
;*****************************************************************
;     186 TIMER INITIALIZATION FOR
;           SERIAL PORTS AT 9600 BAUD
;       TIMER0, PORT A
;       TIMER1, PORT B
;*****************************************************************
      %OUTWORD( OFF50H, 0000H )      ;TIMER0 COUNT REG
                              ;DATA WORD: CLEAR
      %OUTWORD( OFF52H, 000DH )      ;TIMER0 MAX_COUNT_A
                              ;DATA WORD:
                              ; VALUE FOR 9600 BAUD

      %OUTWORD( OFF54H, 000DH )      ;TIMER0 MAX_COUNT_B, NOT USED
      %OUTWORD( OFF56H, 0C001H )     ;TIMER0 MODE CONTROL REG
                              ;DATA WORD: RATE GENERATOR
      %OUTWORD( OFF58H, 000CH )      ;TIMER1 COUNT REG
                              ;DATA WORD: CLEAR
      %OUTWORD( OFF5AH, 000DH )      ;TIMER1 MAX_COUNT_A
                              ;DATA WORD: VALUE FOR 9600 BAUD

      %OUTWORD( OFF5CH, 000DH )      ;TIMER1 MAX_COUNT_B, NOT USED
      %OUTWORD( OFF5EH, 0C001H )     ;TIMER1 MODE CONTROL REG
                              ;DATA WORD: RATE GENERATOR
;**************************************************************************
;     SET 80130 TIMER FOR 10 MILLISEC TIMER FOR AMX TICK
;**************************************************************************
      %OUTPUT( 00EEH, 0034H )        ;80130 TIMER 0
                              ;MODE 2, RATE GENERATOR
      %OUTPUT( 00E8H, 0040H )        ;TIMER0, COUNT REG
                              ; LSBYTE
      %OUTPUT( 00E8H, 009CH )        ;TIMER0, COUNT REG
                              ; MSBYTE
$EJ   ;
;**************************************************************************
```

```
;     SETS ALL INTERRUPT VECTORS TO POINT TO A DUMMY INTERRUPT HANDLER
;****************************************************************************
      XOR   AX,AX         ;SET TO ZERO
      MOV   ES,AX         ;EXTRA SEGMENT AT ZERO
      MOV   BX,0          ;POINT TO FIRST VECTOR
      MOV   CX,255              ;GET COUNT OF INTERRUPT VECTORS
      LEA   AX, WORD PTR DUMMY_START      ;GET THE ADDRESS OF THE DUMMY ROUTINE
DI001:
      MOV   ES:[BX],AX    ;SAVE THE OFFSET
      INC   BX            ;BUMP BX
      INC   BX            ;BUMP BX
      MOV   ES:[BX],CS    ;SAVE THE SEGMENT ADDRESS
      INC   BX            ;BUMP BX
      INC   BX            ;BUMP BX
      LOOP  DI001         ;LOOP TILL ALL VECTORS DONE
      JMP   V3_8274_START      ;JUMP TO NEXT MODULE
;****************************************************************************
;     DUMMY_START INTERRUPT ROUTINE FOR UNWANTED INTERRUPTS
;                 THIS IS AN INTERRUPT HANDLER FOR ALL INTERRUPTS
;                 DEFAULT IN THE INTERRUPT TABLE ADDRESS SPACE
;****************************************************************************
DUMMY_START       PROC
      POP   CX                  ;GET OFFSET
      POP   BX                  ;GET SEGMENT
      PUSH  0F300H                    ;ERROR NUMBER F300
      PUSH  0F300H                    ;DUMMY, make both args the same
      PUSH  BX                  ;REPLACE SEGMENT
      PUSH  CX                  ;REPLACE OFFSET
      JMP   VSYSBUG                   ;PSEUDO CALL TO VSYSBUG
DUMMY_START       ENDP
$EJ   ;
V3_186_CODE ENDS
END
```

```
; V3COMT   V3COMT   V3COMT   V3COMT   V3COMT   V3COMT   V3COMT   V3COMT   V3COMT
V3COMT   V3COMT   V3COMT   V3COMT   V3COMT
;*******************************************************************************
***********************************************
;**
                                                   **
;**                                           EEEEEEEEEEEEEEE      TTTTTTTTTTTTT
NNNNNNN      NNNNN                                   **
;**                                           EEEEEEEEEEEEEE       TTTTTTTTTTT
NNNNNNNN     NNNNN                                   **
;**                                           EEEEE         A       TTTT       OOO
NNNNNNNNN    NNNNN                                   **
;**                                           EEEEEEEEEEEE   AAA     TTT     OOOOOOOO
NNNNN NNNN   NNNNN                                   **
;**                                           EEEEEEEEEEE   AAAAA    TTT     OOOOOOOO
NNNNN   NNNN NNNNN                                   **
;**                                           EEEEE                  TTTT       OOO
NNNNN    NNNNNNNNN                                   **
;**                                           EEEEEEEEE    AAAAAAA   TTTTT
NNNNN     NNNNNNNN                                   **
;**                                           EEEEEEEE   AAAAAAAAA   TTTTTTT
NNNNN       NNNNNNN                                  **
;**
                                                   **
;**        This software (firmware) developed by EATON-KENWAY is proprietary.  Source
code on listings or any other media      **
;**            is not for sale or loan and may not be copied or transferred to any
vendor, buyer, or consultant.  Executable       **
;**           code is available in ROM and is sold with the original product or as a
product upgrade.  Buyer shall not         **
;**          copy or distribute ROM's with E-K firmware to any third party without the
prior written approval of EATON-KENWAY.    **
;**            Title to and ownership of the software shall at all times remain with
EATON-KENWAY.    The information  in this      **
;**            is subject to change without notice  and should not be construed as a
commitment by EATON-KENWAY.              **
;**
                                                   **
;**         EATON-KENWAY   assumes  no  responsibility  for  the  use or reliability
of  its  software on  equipment which      **
;**          is  not supplied EATON-KENWAY or has been modified without EATON-KENWAY
approval.                                  **
```

```
;**
                                                  **
;**          Copyright 1989
                  KENWAY, INCORPORATED      **
;*************************************************************************************
***********************************************
;   V3COMT   V3COMT   V3COMT   V3COMT   V3COMT   V3COMT   V3COMT   V3COMT   V3COMT
V3COMT   V3COMT   V3COMT   V3COMT   V3COMT
      NAME  VCOMT
$EJ   ;
;*****************************************************************-
; VCOMT - GWC VEHICLE COMMUNICATIONS TASK AND SDLC INTERRUPT HANDLERS
;*****************************************************************-
; VCOMT PROVIDES THE VEHICLE COMMUNICATIONS AND SDLC DEVICE INTERRUPT
; HANDLER.  THE DESCRIPTIONS AND CALLING SEQUENCES OF THESE PROCEDURES
; ARE DESCRIBED BELOW.
;
;*******************************************************************
;
; UPDATES:
;
; JBM- 17 OCT 84  MAJOR MODIFICATION WHICH MAKES THE CODE MORE EFFICIENT AND
;              ALLOWS BETTER USE OF THE E-K MULTIMODULE RATHER THAN THE
;              DESIGN THAT USES THE 8273.
; JHD  15-Feb 85  Fix path names, include VINIRAMSW. Fix VSYSBUG call errors.
;
; JBM  22 MAR 85  UPDATE TO SAVE DATA RECEIVED FROM THE VTC IN THE COMTEST
;              MESSAGE IN THE VEHICLE DATA BASE TO BE DISPLADED BY THE
;              HAND CONTROLLER.
;
; JBM  03 SEP 85  READ THE MULTI-MODULE TWICE TO DETERMINE IF THERE WAS AN
;              ERROR IN THE STATUS BECAUSE THE STATUS WAS BEING UPDATED
;              BY THE MULTI-MODULE
;
; DCM  21 JUL 86  FIX TASK TO SEND STATUS WITH ERRORS ONLY ONCE
;              AND INSURE THAT THE ERROR IS NOT LOST
;
; LTW  8  AUG 86  AVOID MAIL TO VCMDT ON ZERO LENGTH MESSAGES
;
; LBC   4 JUN 90  (L. BRUCE CHRISTENSEN)
;              CHANGING ALL REFERENCES OF VTC TO AGVC
;                  MAJOR MODIFICATIONS TO THE PROGRAM BECAUSE WE WILL NO
```

```
;               LONGER BE USING THE SBX BUS FOR COMMUNICATION. IT WILL NOW
;               COME IN THROUGH THE MULTI BUS FOR THE 186 PROCESSOR.
;               THE PREVIOUS USES OF THIS PROGRAM USED "IN" AND "OUT" AND NOW
;               I WILL BE USING "ES:[BX]" ADDRESSING TO TALK TO THE
;               NEW COMMUNICAITONS BOARD.
;              I CHANGED ALL REFERENCES OF "BX" TO "SI" OR "CX" WHERE
;               APPLICABLE.
;*******************************************************************
;
;
; THE 8254 INTERVAL TIMERS (E-K SDLC SBX) WILL BE USED FOR THE FOLLOWING
; FUNCTIONS:
;    CTR 0 - TRANSMIT BAUD RATE GENERATOR FOR 8273 SDLC CONTROLLER
;           BAUD RATE SELECTABLE BY CLOCK RATE (64 TIMES 9600 BAUD)
;           INPUT FREQUENCY = 8 MHZ
;    CTR 1 - RECEIVER CLOCK FOR 8273 SDLC CONTROLLER
;           USED BY DPLL TO RECOVER INPUT CLOCK (32 TIMES 9600 BAUD)
;           INPUT FREQUENCY = 8 MHZ
;    CRT 2 - NOT USED
;
;
; THE E-K SDLC PROTOCOL CONTOLLER (E-K SDLC SBX) IS USED FOR SDLC
; COMMUNICATIONS AND HAS THE FOLLOWING SETUP:
;    DATA TRANSFER MODE - RESET
;    ONE-BIT DELAY - RESET
;    HDLC MODE - RESET
;    EOP INTERRUPT MODE - RESET
;    TX EARLY INTERRUPT MODE - RESET
;    BUFFERED MODE - SET
;    PREFRAME SYNC MODE - SET
;    FLAG STREAM MODE - SET
;    LOOPBACK DATA - RESET
;    LOOPBACK CLOCK - RESET
;    NRZI MODE - SET
;
;
; VCOMT ASSEMBLY:  (ON THE VAX)
;
;     FSASM VCOMT.SRC
;
;
; VCOMT LINK:
```

```
;
;   LINK86 VCOMT.OBJ ....... ETC.
;
;***************************************************************-
$EJ   ;
;*************************************************************************-
; AMX INTERFACE
;*************************************************************************-
      EXTRN AAINT:FAR
      EXTRN AAINX:FAR
      EXTRN AAIPTR:FAR
      EXTRN SEND__MAIL:FAR
;*************************************************************************-
; V3INIT INTERFACE
;*************************************************************************-
      EXTRN VSYSBUG:FAR          ;SYSTEM BUG ENTRY POINT
      EXTRN COMM_ADDRESS:DWORD       ;SEGMENT FOR COMM BOARD
      EXTRN SDLC_COMM_DEVICE:DWORD  ;DEVICE #1
;*************************************************************************-
; GENERAL EQUATES
;*************************************************************************-
      PUBLIC       VCOMTC                    ; VCOMT TASK BEGINNING CODE AREA
      PUBLIC       AUTOCOM                   ; VCOMT TASK AUTOMATIC MODE ON TASK
      PUBLIC       ONCOM              ; VCOMT TASK TURN ON COMMUNICATION FLAG
      PUBLIC       OFFCOM                    ; VCOMT TASK TURN OFF COMM FLAG
      PUBLIC       TRANSON                   ; VCOMT TASK TURN ON TRANSMIT CLOCK
      PUBLIC       TRANSOFF           ; VCOMT TASK TURN OFF TRANSMIT CLOCK

; CONTROL AND DATA REGISTERS FOR 8254 (INTERVAL TIMERS - E-K SDLC SBX)
RLA8254     EQU   090H               ; READ/LOAD COUNTER 0
RLB8254     EQU   092H               ; READ/LOAD COUNTER 1
RLC8254     EQU   094H               ; READ/LOAD COUNTER 2
CMD8254     EQU   096H               ; WRITE CONTROL MODE
MDA8254     EQU   036H               ; COUNTER 0 MODE 3 BINARY
MDB8254     EQU   076H               ; COUNTER 1 MODE 3 BINARY
MDC8254     EQU   000H               ; COUNTER 2 NOT USED
;
; PORT ADDRESSES FOR THE E - K SDLC SBX
CMDSDLC     EQU   082H               ; COMMAND PORT ADDRESS
STASDLC     EQU   082H               ; STATUS PORT ADDRESS
DATSDLC     EQU   080H               ; DATA PORT ADDRESS
PRMSDLC     EQU   080H               ; PRAMETER PORT ADDRESS
```

```
;
; INTERRUPT STATUS VALUES FOR THE E-K SDLC SBX
BUFBSY      EQU   002H          ; COMMAND/DATA BUFFER BUSY
BUFRDY      EQU   001H          ; STATUS/DATA BUFFER READY
INTMSK      EQU   0F0H          ; MASK FOR INTERRUPT STATUS BITS
NULINT      EQU   000H          ; NULL - NO PENDING ACTION
RBFINT      EQU   010H          ; RECEIVE BUFFER FULL
TCINT EQU   020H          ; TRANSMIT COMPLETED
TBEINT      EQU   030H          ; TRANSMIT BUFFER EMPTY
TOUTINT     EQU   040H          ; TIME OUT
RBEINT      EQU   050H          ; RECEIVE BUFFER EMPTY
RCINT EQU   060H          ; RECEIVE COMPLETED
TBFINT      EQU   070H          ; TRANSMIT BUFFER FULL
ISAINT      EQU   080H          ; IMMEDIATE RESULTS AVAILABLE
STERROR     EQU   0F0H          ; STATUS ERROR
;
; MISC SDLC EQUATES
TXGOOD      EQU   00DH          ; NO ERROR TRANSMIT INTERRUPT
LVLSDLC     EQU   018H          ; SDLC INTERRUPT LEVEL
RQSTAT      EQU   0             ; REQUEST STATUS CONTROL BYTE
POLLCMD     EQU   00DH          ; POLL COMMAND
                          ;**************************************
                          ;  HARD CODED OFFSET - WATCH OUT IF THE
                          ;  LONG_STATUS EVER CHANGES!!!
ERRPTR  EQU     0009H           ; position of error record in long stat
                          ; **************************************
NILMODE     EQU   0             ; NULL MODE
RECMODE     EQU   1             ; RECEIVE MODE
TRAMODE     EQU   2             ; TRANSMIT MODE
;
; COMMUNICATION VALUES (FOR COM_STATUS)
INTENTR     EQU   000H          ; INTERRUPT RECEIVED BY COMMUNICATIONS
INTREC      EQU   001H          ; RECEIVE INTERRUPT
INTRCOM     EQU   002H          ; RECEIVE COMPLETED
RECBAD      EQU   004H          ; RECEIVE COMPLETED IN ERROR
RECGOOD     EQU   008H          ; RECEIVE COMPLETED WITHOUT ERROR
SIGREC      EQU   010H          ; RECEIVED DATA FOR PROCESSING
INTTRAN     EQU   020H          ; TRANSMIT INTERRUPT
INTXCOM     EQU   040H          ; TRANSMIT COMPLETED
WAINIT      EQU   8000H              ; WAITING FOR NEXT RECEIVE
;
; E-K MULTIMODULE COMMANDS
```

```
RESET EQU     00H               ; RESET 8273
RESETB        EQU     02H             ; RESET PORT B BIT
SETB  EQU     04H               ; SET PORT B BIT
READB EQU     06H               ; READ PORT B
READA EQU     08H               ; READ PORT A
ABORTT        EQU     0AH             ; ABORT TRANSMIT TRANSPARENT
ABORTL        EQU     0CH             ; ABORT LOOP TRANSPARENT
ABORTF        EQU     0EH             ; ABORT TRANSMIT FRAME
XMITT EQU     010H              ; TRANSMIT TRANSPARENT
XMITF EQU     014H              ; TRANSMIT FRAME
RECDIS        EQU     016H            ; RECEIVE DISABLE
SLREC EQU     018H              ; SELECTIVE LOOP RECEIVE
SREC  EQU     01AH              ; SELECTIVE RECEIVE
GREC  EQU     01CH              ; GENERAL RECEIVE
RESETS        EQU     01EH            ; RESET SERIAL I/O MODE
SETS  EQU     020H              ; SET SERIAL I/O MODE
RESETOP       EQU     022H            ; RESET OPERATION MODE
SETOP EQU     024H              ; SET OPERATION MODE
RESETD        EQU     026H            ; RESET DATA TRANSFER MODE
SETD  EQU     028H              ; SET DATA TRANSFER MODE
RESET1        EQU     02AH            ; RESET ONE BIT DELAY
SET1  EQU     02CH              ; SET ONE BIT DELAY
VACANT        EQU     02EH            ; VACANT COMMAND - UNUSED
R8742ST       EQU     030H            ; READ 8742 STATUS
STARTRD       EQU     032H            ; START READ INPUT BUFFER
RRECRES       EQU     034H            ; READ RECEIVE INTERRUPT RESULTS
ERRCK EQU     036H              ; ENABLE RECEIVE ERROR CHECKING
LDSRECP       EQU     038H            ; LOAD SELECT RECEIVE PRAMETERS
REPREC        EQU     03AH            ; REPEAT LAST RECEIVE
LDTXLN        EQU     03CH            ; LOAD TRANSMIT BUFFER LENGTH
LDTXBUF       EQU     03EH            ; LOAD TRANSMIT BUFFER
RTXCODE       EQU     040H            ; READ TRANSMIT INTERRUPT CODE
TIMEOUT       EQU     042H            ; ENABLE TIMEOUT
DISTOUT       EQU     044H            ; DISABLE TIMEOUT
ACKSTAT       EQU     046H            ; ACKNOWLEDGE STATUS READ
ACKINT        EQU     048H            ; ACKNOWLEDGE INTERRUPT
TXCLON        EQU     04AH            ; TURN ON TRANSMIT CLOCK
TXCLOFF       EQU     04CH            ; TURN OFF TRANSMIT CLOCK
;
; DEFINITIONS FOR RMX CALLS
CMDOBJ        EQU     0C200H                ; NON-TOKEN OBJECT FROM VCMDT TASK
COMOBJ        EQU     0C600H                ; NON-TOKEN OBJECT FROM VCOMT TASK
```

```
$EJ   ;
;*************************************************************************
; DEVICE DRIVER DATA STRUCTURES
;*************************************************************************
DATA  SEGMENT     PUBLIC      'DATA'
      EXTRN VCOMMT:WORD         ; VCOMT TASK MAILBOX TOKEN
      EXTRN VCMDMT:WORD         ; VCMDT TASK MAILBOX TOKEN
      EXTRN COMMAND_BUFFER:BYTE      ; SDLC COMMAND BUFFER FROM VCMDT
      EXTRN VEHICLE_NUMBER:WORD      ; VEHICLE NUMBER FOR THIS VEHICLE
      EXTRN SHORT_STATUS_LENGTH:WORD; SHORT LENGTH OF STATUS BUFFER
      EXTRN LONG_STATUS_LENGTH:WORD ; LONG LENGTH OF STATUS BUFFER
      EXTRN VEH_STATUS:BYTE    ; The status buffer
      EXTRN DO_LONG_STATUS_FLAG:BYTE; Flag to do STATUS responce
      EXTRN VCMD_SHORT_STATUS :WORD ; SHORT STATUS ESET
      EXTRN VCMD_LONG_STATUS :WORD  ; STATUS ESET
      EXTRN MSG_ATTEMPTS      :WORD ; COMM TEST MSG ATTEMPTS
      EXTRN MSG_COMPLETE      :WORD ; COMM TEST MSG COMPLETED
      EXTRN MSG_ERRORS  :WORD ; COMM TEST MSG ERRORS
      RMXSND        DB    0          ; MESSAGES SENT TO RMX
      RMXRCV        DB    0          ; MESSAGES RECEIVED FROM RMX
      XMTLEN        DB    0          ; XMIT LENGTH
      COUNTER       DW    0          ; LOOP COUNTER (DEBUG HARDWARE FAILURE)
      CASE1 DW     0           ; POINTER FOR RECEIVE BUFFER FULL
      CASE2 DW     0           ; POINTER FOR TRANSMIT COMPLETE
      CASE3 DW     0           ; POINTER FOR TRANSMIT BUFFER EMPTY
      CASE4 DW     0           ; POINTER FOR TIME OUT
OLD_SEQ_ERR DB     0           ; SEQUENCE ERROR FROM LAST STATUS
OLD_ERR            DW    0          ; ERROR FROM LAST STATUS
;
; SDLC CONTROLLER VARIABLES
;VCOMTD      LABEL WORD
      EXTRN COMENA:BYTE        ; SDLC ENABLE COMMUNICATIONS
      EXTRN COMSTAT:WORD             ; COMMUNICATIONS STATUS
      EXTRN COMMODE:BYTE             ; COMMUNICATIONS MODE (T-R-N)
      EXTRN MMSTAT:BYTE        ; MULTI MODULE STATUS
      EXTRN MODERR:WORD        ; COMMUNICATION MODE ERROR COUNT
      EXTRN RCVADDR:byte             ; SDLC RECEIVE ADDRESS
      EXTRN RCVCONT:byte             ; SDLC RECEIVE CONTROL BYTE
      EXTRN RCVPTR:word        ; SDLC RECEIVE BUFFER POINTER
      EXTRN RCVLEN:word        ; SDLC RECEIVE MESSAGE LENGTH
      EXTRN RCVMCNT:word             ; SDLC RECEIVE MESSAGE COUNTER
      EXTRN RCVECNT:word             ; SDLC RECEIVE ERROR COUNTER
```

```
      EXTRN RCVECOD:byte               ; SDLC RECEIVE ERROR CODE
      EXTRN pcbyte:byte          ; Previous Control byte
      EXTRN XMTADDR:byte               ; SDLC TRANSMIT ADDRESS
      EXTRN XMTCNT:WORD          ; SDLC TRANSMIT COUNT
      EXTRN XMTCONT:byte               ; SDLC TRANSMIT CONTROL BYTE
      EXTRN XMTPTR:word          ; SDLC TRANSMIT BUFFER POINTER
      EXTRN XMTECNT:word               ; SDLC TRANSMIT ERROR COUNTER
      EXTRN XMTECOD:byte               ; SDLC TRANSMIT ERROR CODE
; VARIOUS OTHERS- Internal Use
    RESULT_VCOMT  DW    0              ; RMX CALLS RESULT STATUS
    DUMMY         DW    0              ; DUMMY TOKEN FOR NO RESPONSE MBX
    OBJECT        DW    0              ; OBJECT RECEIVED FROM VCMDT TASK
      EXTRN FLAGS_SAVE:word            ; Place to save the flags
      EXTRN OLD_LONG_STATUS_FLAG:byte; save long_status_flag after xmit
DATA  ENDS
$EJ   ;
;**************************************************************************-
; CONSTANTS AND TABLES
;**************************************************************************-
V3COMT_CODE SEGMENT     'CODE'
      ASSUME       CS:V3COMT_CODE, DS:DATA, SS:DATA
;
; CONSTANTS
;
      PUBLIC       SDLCINT
COMMADDRESS DD     COMM_ADDRESS         ;ADDRESS OF COMMUNICATIONS BOARD SEGMENT
SDLCCOMM_DEVICE DD      SDLC_COMM_DEVICE  ;ADDRESS OF COMM BOARD OFFSET TO SDLC CHIP
$EJ   ;
VCOMTPROC   PROC  FAR
;**************************************************************************-
; TASK TO LINK SDLC DRIVER TO  EXECUTIVE
;**************************************************************************-
      ASSUME       DS:DATA
VCOMTC:
      MOV    AX,DATA                   ; SDLC INT HANDLER DS VALUE
      MOV    DS,AX               ; SET UP DATA SEGMENT
      MOV    OLD_SEQ_ERR,0             ; ZERO THE LAST SEQ ERROR
      MOV    OLD_ERR,0           ; ZERO LAST ERROR

      MOV    RCVMCNT,0           ; CLEAR MESSAGE RECEIVE COUNT
      MOV    RCVECNT,0           ; CLEAR RECEIVE ERROR COUNT
             MOV   RMXSND,0            ; CLEAR SEND COUNT
```

```
        MOV     RMXRCV,0            ; CLEAR RECEIVE COUNT
        MOV     XMTCNT,0            ; CLEAR TRANSMIT COUNT
        MOV     XMTECNT,0           ; CLEAR TRANSMIT ERROR COUNT
        MOV     MODERR,0            ; CLEAR MODE ERROR COUNT
        MOV     DO_LONG_STATUS_FLAG,1    ; START XMT LENGTH AT STATUS
        MOV     AX,VEHICLE_NUMBER ; GET VEHICLE NUMBER FOR THIS VEHICLE
        MOV     XMTADDR,AL          ; SAVE AS SDLC TRANSMIT ADDRESS
;       MOV     PCBYTE,0            ; INITIALIZE PREVIOUS CONTROL BYTE
        MOV     CASE1,OFFSET RECBUF      ; BUILD CASE STATEMENT JUMP TABLE
        MOV     CASE2,OFFSET TRACOMP
        MOV     CASE3,OFFSET TRAEMP
        MOV     CASE4,OFFSET TOUT
        RET                         ;GO BACK TO AMX
VCOMTPROC       ENDP
$EJ     ;
;****************************************************************************-
; SDLC DEVICE DRIVER INTERRUPT SERVICE ROUTINE
;****************************************************************************-
        ASSUME      DS:DATA
;********************
; SDLCINT - SDLC PROTOCOL I/O INTERRUPT SERVICE
;********************
SDLCINT         PROC  FAR           ;FAR CALL SO V3INIT CAN CALL AND RETURN FROM HERE
        LES     BX, COMMADDRESS     ;GET SEGMENT AND OFFSET OF COMM_ADDRESS
        MOV     AX, ES:[BX]         ;GET VALUE OF COMM_ADDRESS
        LES     BX, SDLCCOMM_DEVICE      ;GET SEGMENT AND OFFSET OF SDLC_COMM_DEVICE
        MOV     BX, ES:[BX]         ;LET 'BX' BE THE OFFSET TO THE COMM BOARD
        MOV     ES, AX                   ;LET 'ES' BE THE SEGMENT TO THE COMM BOARD

;       CHECK FOR INTERRUPT TYPE
        MOV     COMSTAT,INTENTR          ; INDICATE ENTER INTERRUPT
        MOV     AL,ES:[BX+1]             ; GET COMMUNICATION STATUS
        MOV     MMSTAT,AL           ; SAVE THE STATUS FOR DEBUG
        AND     AX,INTMSK           ; CHECK FOR VALID INTERRUPT
        JZ      SDLCIN1                  ; NOT A VALID INTERRUPT
        CMP     AX,TOUTINT          ; CHECK AGAIN FOR VALID INTERRUPT
        JG      SDLCIN1                  ; NOT A VALID INTERRUPT
        SAR     AX,1                ; MAKE INTERRUPT TYPE AN INDEX
        SAR     AX,1
        SAR     AX,1
        MOV     SI,AX               ; SET UP AN INDEX
        JMP     CASE1[SI-2]         ; CASE FOR INTERRUPT TYPE
```

```
RECBUF:
      MOV   AL,COMMODE          ; CHECK COMMUNICATION MODE
      CMP   AL,RECMODE          ; ARE WE IN RECEIVE MODE ?
      JNE   SDLCIN1                   ; NO - RESET TIME
      CALL  SDLCRC                    ; YES - HANDLE RECEIVE INTERRUPT
      JMP SHORT   INTEXIT2            ; RECEIVE INTERRUPT EXIT
TRACOMP:
      MOV   AL,COMMODE          ; GET COMMUNICATION MODE
      CMP   AL,TRAMODE          ; ARE WE IN TRANSMIT MODE ?
      JNE   SDLCIN1                   ; NO - WE GOT PROBLEMS
      CALL  SDLCTRC                   ; YES - HANDLE TRANSMIT INTERRUPT
      JMP SHORT   INTEXIT1            ; TRANSMIT INTERRUPT EXIT
TRAEMP:
      MOV   AL,COMMODE          ; GET COMMUNICATION MODE
      CMP   AL,TRAMODE          ; ARE WE IN TRANSMIT MODE ?
      JNE   SDLCIN1                   ; NO - WE GOT PROBLEMS
      CALL  SDLCTEP                   ; YES - HANDLE TRANSMIT INTERRUPT
      JMP SHORT   INTEXIT1            ; TRANSMIT INTERRUPT EXIT
TOUT:
SDLCIN1:
      INC   MODERR                    ; COUNT MODE ERRORS
      MOV   COMMODE,NILMODE           ; CLEAR COMMUNICATION MODE
      CALL  SETSDLC                   ; RESET SDLC MODULE
      CALL  SETRCV                    ; SET UP TO RECEIVE
INTEXIT1:
      MOV   AL,ACKSTAT
      CALL  OUTCMD                    ; ACKNOWLEDGE SDLC STATUS
      MOV   AL,ACKINT
      CALL  OUTCMD                    ; ACKNOWLEDGE SDLC INTERRUPT
INTEXIT2:
      RET                       ;RETURN TO THE COMM INT HANDLER
                                ; LOCATED IN THE VINIT CODE.
SDLCINT     ENDP
$EJ   ;
;********************
; DATRCV - GET DATA BYTES FROM RECEIVER AND PUT IN RECEIVE BUFFER
;;********************
DATRCV      PROC
      MOV   AL,STARTRD          ; EMPTR READ BUFFER COMMAND
      CALL  OUTCMD                    ; REQUEST READ RECEIVE DATA BYTES
DATRCV1:
      MOV   AL,ES:[BX+1]              ; GET COMMAND STATUS
```

```
        MOV    AH,AL              ; SAVE STATUS
        AND    AL,INTMSK          ; MASK RECEIVE INTERRUPT STATUS
        CMP    AL,RBFINT          ; IF RECEIVE BUFFER NOT FULL THEN
        JNE    DATRCV2                  ; EXIT - NO MORE DATA BYTES
        MOV    AL,AH              ; RESTORE STATUS
        AND    AL,BUFRDY          ; IF DATA BYTE NOT READY THEN
        JZ     DATRCV1                  ; WAIT UNTIL IT IS
        MOV    SI,RCVPTR          ; GET RECEIVE BUFFER POINTER
        AND    SI,00FFH           ; INSURE THAT MEMORY IS NOT CLOBBERED
        MOV    AL,ES:[BX]         ; GET INCOMING DATA BYTE
        CMP    COMENA,0           ; COMMUNICATIONS ENABLED ?
        JE     DATRCV1                  ; NO - DON'T PUT DATA IN BUFFER
        MOV    COMMAND_BUFFER[SI],AL    ; PUT BYTE IN COMMAND MESSAGE BUFFER
        INC    RCVPTR                   ; BUMP RECEIVE BUFFER POINTER
        JMP    DATRCV1                  ; SERVICE MORE DATA BYTES UNTIL DONE
DATRCV2:       ; NOTE REG AL WILL HAVE THE RECEIVE STATUS BITS *********
        RET
DATRCV         ENDP
$EJ    ;
;********************
; DATXMT - GET DATA BYTES FROM TRANSMIT BUFFER AND SEND TO TRANSMITTER
;********************
DATXMT         PROC
        MOV    AL,LDTXBUF         ; LOAD TRANSMIT BUFFER COMMAND
        CALL   OUTCMD                   ; REQUEST LOAD TRANSMIT DATA BYTES
DATXMT1:
        MOV    AL,ES:[BX+1]             ; GET COMMAND STATUS
        MOV    AH,AL              ; SAVE STATUS
        AND    AL,INTMSK          ; MASK TRANSMIT INTERRUPT STATUS
        CMP    AL,TBFINT          ; IF TRANSMIT BUFFER FULL THEN
        JE     DATXMT2                  ; EXIT - NO MORE DATA BYTES
        MOV    AL,AH              ; RESTORE STATUS
        AND    AL,BUFBSY          ; IF DATA BUFFER BUSY THEN
        JNZ    DATXMT1                  ; WAIT UNTIL IT IS FREE
        MOV    SI,XMTPTR          ; GET TRANSMIT BUFFER POINTER
        MOV    AL,VEH_STATUS[SI] ; GET BYTE FROM STATUS MESSAGE BUFFER
        MOV    ES:[BX],AL         ; OUTPUT DATA BYTE
        INC    XMTPTR                   ; BUMP TRANSMIT BUFFER POINTER
        JMP    DATXMT1                  ; SERVICE MORE DATA BYTES UNTIL DONE
DATXMT2:
        RET
DATXMT         ENDP
```

```
$EJ   ;
;********************
; OUTCMD - OUTPUT COMMAND TO E-K SDLC PROTOCOL CONTROLLER
;********************
OUTCMD      PROC
      MOV   AH,AL              ; SAVE COMMAND BYTE TO OUTPUT
      MOV   CX,0FFFFH          ; MAX COUNT
      MOV   COUNTER,0          ; RESET COUNTER
OUTCMD1:
      INC   COUNTER                  ; COUNT TIMES THROUGH LOOP
      CMP   CX,COUNTER         ; CHECK MAXIMUM COUNT
      JNE   OUTCMD2                  ; EVERYTHING IS OKAY
      PUSH  0A000H                   ; SET UP ERROR CODE FOR TX FAILURE
      PUSH  AX                 ; First arg. not used
      CALL  VSYSBUG                  ; EXIT WITH BUG MESSAGE
OUTCMD2:
      MOV   AL,ES:[BX+1]             ; CHECK COMMAND STATUS
      AND   AL,BUFBSY          ; IF COMMAND REGISTER BUSY THEN
      JNZ   OUTCMD1                  ; WAIT UNTIL IT IS FREE
      MOV   AL,AH              ; RESTORE COMMAND BYTE
      MOV   ES:[BX+1],AL             ; SEND COMMAND BYTE
      RET
OUTCMD      ENDP
$EJ   ;
;********************
; OUTPAR - OUTPUT COMMAND PARAMETER TO E-K SDLC PROTOCOL CONTROLLER
;********************
OUTPAR      PROC
      MOV   AH,AL              ; SAVE PARAMETER BYTE TO OUTPUT
      MOV   COUNTER,0          ; CLEAR LOOP COUNTER
      MOV   CX,0FFFFH          ; MAX COUNT
      MOV   COUNTER,0          ; RESET COUNTER
OUTPAR1:
      INC   COUNTER                  ; COUNT TIMES THROUGH LOOP
      CMP   CX,COUNTER         ; CHECK MAXIMUM COUNT
      JNE   OUTPAR2                  ; EVERYTHING IS OKAY
      PUSH  0A001H                   ; GET ERROR CODE
      PUSH  AX                 ; First arg. not used
      CALL  VSYSBUG                  ; EXIT WITH BUG MESSAGE
OUTPAR2:
      MOV   AL,ES:[BX+1]             ; CHECK PARAMETER STATUS
      AND   AL,BUFBSY          ; IF PARAMETER REGISTER BUSY THEN
```

```
        JNZ     OUTPAR1                 ; WAIT UNTIL IT IS FREE
        MOV     AL,AH           ; RESTORE PARAMETER BYTE
        MOV     ES:[BX],AL      ; SEND PARAMETER BYTE
        RET
OUTPAR          ENDP
$EJ     ;

;********************
; SDLCRC - SDLC RECEIVE BUFFER FULL INTERRUPT SERVICE ROUTINE
;********************
SDLCRC          PROC
        OR      COMSTAT,INTREC          ; INDICATE RECEIVE INTERRUPT
        CALL    DATRCV                  ; GET DATA BYTES FROM RECEIVER
        MOV     AL,ES:[BX+1]            ; CHECK STATUS
        MOV     AH,AL           ; SAVE THIS STATUS READ
        MOV     AL,ES:[BX+1]            ; READ STATUS TWICE
        CMP     AH,AL           ; WAS THERE A STATUS READ ERROR ?
        JE      SDLCRC01        ; NO - CONTINUE PROCESSING
        MOV     AL,ES:[BX+1]            ; WHEN STATUS READ ERROR READ AGAIN
SDLCRC01:
        AND     AL,INTMSK       ; CHECK STATUS BITS
        CMP     AL,STERROR      ; WAS THERE A MULTI MODULE ERROR ?
        JE      SDLCRC05        ; YES - GO CORRECT IT
        CMP     AL,RCINT        ; DID RECEIVE COMPELET ?
        JE      RECVCOMP        ; jmp when complete
        JMP     SDLCRC5                 ; NO - wait for more
RECVCOMP:
        OR      COMSTAT,INTRCOM         ; INDICATE RECEIVE COMPLETED
        ; CHECK RECEIVE RESULTS - 5 PARMETERS
        MOV     AL,RRECRES      ; READ RECEIVE RESULTS COMMAND
        CALL    OUTCMD                  ; REQUEST RECEIVER INTERRUPT STATUS
        ; CHECK RECEIVE CODE - 1ST PARMETER
        CALL    RESULTS                 ; GET RECEIVE INTERRUPT CODE
        MOV     RCVECOD,AL      ; SAVE ERROR CODE
        ; GET LSB OF MESSAGE LENGTH - 2ND PARMETER
        CALL    RESULTS                 ; GET LSB OF FRAME LENGTH
        MOV     CL,AL           ; AND SAVE IT
        ; GET MSB OF MESSAGE LENGTH - 3RD PARMETER
        CALL    RESULTS                 ; GET MSB OF FRAME LENGTH
        MOV     AH,AL           ; MOVE TO MSB OF AX
        MOV     AL,CL           ; COMBINE WITH LSB OF AX
        MOV     RCVLEN,AX       ; SAVE AS RECEIVE FRAME LENGTH
```

```
       ; GET RECEIVE ADDRESS - 4TH PARMETER
       CALL  RESULTS                  ; GET RECEIVE ADDRESS FIELD
       MOV   RCVADDR,AL         ; SAVE RECEIVE ADDRESS FIELD
       ; GET RECEIVE CONTROL BYTE - 5TH PARMETER
       CALL  RESULTS                  ; GET RECEIVE CONTROL FIELD
       MOV   RCVCONT,AL         ; SAVE CURRENT CONTROL BYTE
       MOV   XMTCONT,AL         ; SET UP TRASNMIT CONTROL BYTE
       MOV   AL,ACKSTAT         ; ACKNOWLEDGE RECEIVE COMPLETE
       CALL  OUTCMD
       MOV   AL,RCVECOD         ; CHECK RECEIVE CODE
       AND   AL,1FH                   ; ISOLATE COMPLETION CODE
       CMP   AL,3               ; IS ADDRESS MATCH (GOOD MSG) ?
       JL    SDLCRC1                  ; YES
       CMP   AL,5               ; IGNORE IDLE DETECT
       JE    SDLCRC1
SDLCRC05:    ; ERROR - RESTART
       INC   RCVECNT                  ; ALL OTHERS ARE ERRORS (INC ERR CNT)
       OR    COMSTAT,RECBAD           ; INDICATE RECEIVE WAS BAD
       CALL  SETSDLC                  ; ************ RESET SDLC
       JMP   SDLCRC46           ; ERROR EXIT
SDLCRC1:
       OR    COMSTAT,RECGOOD          ; INDICATE RECEIVE WAS GOOD
       INC   RCVMCNT                  ; COUNT THE MESSAGE
;      CHECK TO SEE IF THE AGVC REQUESTED A STATUS
         MOV AH,COMMAND_BUFFER+1      ; get current command
         CMP AH,RQSTAT          ; Zero is AGVC request for STATUS
         JNE SDLCRC2                  ; JUMP IF STATUS is not REQUESTED
;      SET THE FLAG TO GET STATUS
       MOV   DO_LONG_STATUS_FLAG,1    ; set to return STATUS
       MOV   AH,POLLCMD         ; make into POLL(don't xfer buffer )
;      ARE WE RUNNING COMTEST?
       CMP   RCVLEN,2           ; CHECK LENGTH OF RECEIVE BUFFER
       JE    SDLCRC2                  ; JUMP PAST IF NOT RUNNING COMTEST
;      SAVE THE COMTEST DATA FOR DISPLAY
       MOV   AX,WORD PTR COMMAND_BUFFER+3  ; GET NUMBER OF COMM ATTEMPTS
       MOV   MSG_ATTEMPTS,AX               ; SAVE IN DISPLAY VARIABLE
       MOV   AX,WORD PTR COMMAND_BUFFER+5  ; GET NUMBER OF COMM COMPLETIONS
       MOV   MSG_COMPLETE,AX               ; SAVE IN DISPLAY VARIALBE
       MOV   AX,WORD PTR COMMAND_BUFFER+7  ; GET NUMBER OF COMM ERRORS
       MOV   MSG_ERRORS,AX                 ; SAVE IN DISPLAY VARIABLE
       JMP   SDLCRC45                ; SET UP STATUS RESPONSE
SDLCRC2:
```

```
;     TEST TO SEE IF HANDCONTROLLER IS PLUGGED IN
      CMP   COMENA,0            ; IS COMMUNICATIONS ENABLED
      JNE   COM_ENAB            ; JUMP IF communications enabled
      JMP   SDLCRC46            ; comm disabled (vcmdt still processing previous string
or in manual(HCU) )
;     SEE IF THE AGVC GOT THE LAST MESSAGE
;           REMEMBER EACH BLOCK TRANSMITTED BY THE AGVC HAS A NUMBER-
;           THIS NUMBER SHOULD BE INCREMENTED FROM 1 TO 255 (0=RESTART)
;           IF THE AGVC DOES NOT SEE THE CORRECT NUMBER IN THE RESPONSE
;                 FROM THE VEHICLE THE AGVC REPEATS THE NUMBER
COM_ENAB:
      MOV   AL,RCVCONT          ; CHECK OUT CONTROL BYTE
;     DID THE AGVC RE-INITALIZE COMMUNICATIONS?
      CMP   AL,0                ; IS THE CONTROL BYTE 0 ?
      JE    SDLCRC4                   ; JUMP OUT TO SET UP FOR STATUS
;     WAS THE LAST EXCHANGE SUCESSFUL?
        CMP AL,PCBYTE           ; LOOK AT PREVIOUS CONTROL BYTE
      JNE   SDLCRC3                   ; JUMP IF LAST TRANSMISSION WAS OK
;     LAST XMIT FAILED - RESTORE AND TRANSMITT OLD STATUS INFORMATION
        MOV AH,OLD_LONG_STATUS_FLAG ; IF OLD STATUS WAS LONG, SET LONG NOW
        OR        DO_LONG_STATUS_FLAG,AH
; RESTORE THE ERRORS (SAVED FROM LAST TRANSMISSION) INTO STATUS MESSAGE
      MOV   AL,OLD_SEQ_ERR                  ;GET SAVED SEQUENCE ERROR
      MOV   VEH_STATUS+ERRPTR,AL      ;SET IN STATUS MESSAGE
      MOV   AX,OLD_ERR                ;GET SAVED ERROR FIELD
      MOV   WORD PTR VEH_STATUS+ERRPTR+1,AX     ;SET IN STATUS MESSAGE
      JMP SHORT   SDLCRC45
SDLCRC3:
;     SAVE THE NUMBER OF THE TRANSMISSION TO CHECK NEXT TIME
      MOV   PCBYTE,AL           ; SAVE THE CONTROL BYTE FOR NEXT TIME
;     LOOK FOR A POLL FROM THE AGVC
      CMP   AH,POLLCMD          ; IS THIS A POLL COMMAND
      JE    SDLCRC45            ; POLL; DON'T xfer DATA to vcmdt,RESTART LINK
      CALL  SETXMT                    ; SETUP AND START SDLC TRANSMITTER
;     TRANSFER DATA TO COMMAND PROCESSOR
      MOV   AL,ACKSTAT
      CALL  OUTCMD                    ; ACKNOWLEDGE SDLC STATUS
      MOV   AL,ACKINT
      CALL  OUTCMD                    ; ACKNOWLEDGE SDLC INTERRUPT
      OR    COMSTAT,SIGREC            ; INDICATE SIGNAL INTERRUPT
      MOV   COMENA,0            ; TURN OFF COMMUNICATIONS
      MOV   AX,RCVLEN           ; GET RECEIVE FRAME LENGTH
```

```
      MOV   COMMAND_BUFFER,AL ; SET FIRST BYTE TO MESSAGE LENGTH
;****************************************************************************
;  STRIP OFF ZERO LENGTH MESSAGES
;****************************************************************************
      OR    COMSTAT,WAINIT          ;INDICATE WAITING
      MOV   AX,RCVLEN          ;GET MESSAGE LENGTH
      CMP   AX,0               ;ZERO MEANS NO DATA
      JE    COMLOOP                 ;WAIT FOR BETTER MESSAGE
;****************************************************************************
;  NOTIFY COMMAND PROCESSOR OF MESSAGE
;****************************************************************************
      PUSH  COMOBJ                  ;GET NON TOKEN
      PUSH  VCMDMT                  ;GET ADDRESS OF CMD TASK
      CALL  SEND__MAIL         ;SEND TO VCOMT
      ADD   SP,4H              ;CLEAN UP THE STACK
COMLOOP:
      INC   RMXSND                  ;COUNT BUFFERS SENT TO RMX (DEBUG)
      MOV   AL,ES:[BX+1]            ; CHECK STATUS
      AND   AL,INTMSK          ; CHECK STATUS BITS
      CMP   AL,STERROR         ; WAS THERE A MULTI MODULE ERROR ?
      JNE   COM_RETN           ; NO, RETURN
      JMP   SDLCRC05           ; Yes - make correction
COM_RETN:
      RET                      ; EXIT
$EJ   ;
SDLCRC4:
      MOV   PCBYTE,AL          ; SAVE THE CONTROL BYTE FOR NEXT TIME
      MOV   DO_LONG_STATUS_FLAG,1   ; SET UP FOR STATUS
SDLCRC45:
      CALL  SETXMT                  ; SETUP AND START SDLC TRANSMITTER
      MOV   AL,ES:[BX+1]            ; CHECK STATUS
      AND   AL,INTMSK          ; CHECK STATUS BITS
      CMP   AL,STERROR         ; WAS THERE A MULTI MODULE ERROR ?
      JNE   SDLCRC5                 ; NO - SET UP TO RECEIVE AFTER TRANSMIT
      JMP   SDLCRC05           ; YES - GO CORRECT IT
SDLCRC46:
      CALL  SETRCV                  ; SETUP SDLC RECEIVER
SDLCRC5:

      MOV   AL,ACKSTAT
      CALL  OUTCMD                  ; ACKNOWLEDGE SDLC STATUS
      MOV   AL,ACKINT
```

```
     CALL  OUTCMD                  ; ACKNOWLEDGE SDLC INTERRUPT
     RET
SDLCRC     ENDP
$EJ   ;
;********************
; RESULTS - GET RECEIVE COMPLETION RESULTS
;********************
RESULTS    PROC
     MOV   AL,ES:[BX+1]            ; CHECK COMMAND STATUS
     AND   AL,BUFRDY         ; IF RECEIVE RESULT NOT READY THEN
     JZ    RESULTS                 ; WAIT UNTIL IT IS
     MOV   AL,ES:[BX]        ; GET RECEIVE INTERRUPT RESULT
     RET
RESULTS    ENDP
$EJ   ;
;********************
; SETRCV - SETUP E-K SDLC SBX FOR SDLC SELECTIVE RECEIVE MODE
;********************
SETRCV     PROC
     MOV   RCVPTR,1          ; START RCV BUFF PTR = 1 (BYTE 0 = LEN)
     MOV   COMMODE,RECMODE         ; SET UP RECEIVE MODE
     MOV   AL,REPREC         ; REPEAT LAST RECEIVE
     CALL  OUTCMD
     MOV   AX,VEHICLE_NUMBER ; USE THIS ADDRESS
     CALL  OUTPAR
     RET
SETRCV     ENDP
$EJ   ;
;********************
; SETSDLC - SETUP E-K SDLC PROTOCOL CONTROLLER DEVICE
;********************
SETSDLC    PROC
; SETUP 8273 SDLC PROTOCOL CONTROLLER (E-K SDLC SBX)
     MOV   AL,RESET
     CALL  OUTCMD                  ; RESET THE MULTI MODULE
     MOV   AL,ES:[BX]        ; CLEAR THE DATA PORT
     MOV   AL,SETD
     CALL  OUTCMD                  ; DATA TRANSFER MODE - SET
     MOV   AL,01H
     CALL  OUTPAR
     MOV   AL,RESET1
     CALL  OUTCMD                  ; ONE-BIT DELAY - RESET
```

```
        MOV   AL,7FH
        CALL  OUTPAR
        MOV   AL,SETOP
        CALL  OUTCMD                  ; SET OPERATING MODE
        MOV   AL,07H                  ; (HDLC-RES, EOP-RES, TX EARLY-RES)
        CALL  OUTPAR                  ; (BUFFERED-SET, SYNC-SET, FLAG-SET)
        MOV   AL,SETS
        CALL  OUTCMD                  ; SET SERIAL I/O MODE
        MOV   AL,01H                  ; (LOOPBACK DATA-RES)
        CALL  OUTPAR                  ; (LOOPBACK CLOCK-RES, NRZI-SET)
        MOV   AL,LDSRECP        ; SELECTIVE RECEIVE PRAMETERS
        CALL  OUTCMD                  ; SETUP SELECTIVE RECEIVE MODE
        MOV   AL,255                  ; max chars we can recieve
        CALL  OUTPAR                  ; SETUP LSB OF BUFFER LENGTH
        MOV   AX,VEHICLE_NUMBER
        CALL  OUTPAR                  ; SETUP RECEIVE ADDRESS 1 (VEHICLE #)
        MOV   AX,VEHICLE_NUMBER
        CALL  OUTPAR                  ; SETUP RECEIVE ADDRESS 2 (VEHICLE #)
        RET
SETSDLC       ENDP
SEJ   ;
;********************
; SETXMT - SETUP E-K SDLC SBX FOR SDLC TRANSMIT FRAME MODE
;********************
SETXMT        PROC
        MOV   XMTPTR,0          ; START TRANSMIT BUFFER PTR = 0
        MOV   COMMODE,TRAMODE         ; SET UP TRANSMIT MODE
        MOV   AL,LDTXLN         ; LOAD TRANSMIT BUFFER LENGTH
        CALL  OUTCMD                  ; LOAD TRANSMIT ARGUMENTS
          MOV AX,SHORT_STATUS_LENGTH  ; prepare to set up xmit length
        CMP   DO_LONG_STATUS_FLAG,0   ; zero means short status, 1 means long
          JE  SETXMT1                 ; if short status, jump
          MOV AX,LONG_STATUS_LENGTH   ;
        MOV   CX,VCMD_LONG_STATUS     ; GET STATUS ESET VALUE
        JMP SHORT   SETXMT2
SETXMT1:
        MOV   CX,VCMD_SHORT_STATUS    ; GET SHORT STATUS ESET VALUE
SETXMT2:
        MOV   XMTLEN,AL         ; SAVE TRANSMIT LENGTH
        MOV   VEH_STATUS,CL     ; SET UP STATUS ESET VALUE
        ; AL now has the length for outpar
        CALL  OUTPAR                  ; SETUP LSB OF BUFFER LENGTH
```

```
      CALL  DATXMT                  ; PRE-LOAD TRANSMIT BUFFER
      MOV   AL,XMITF          ; TRANSMIT FRAME COMMAND
      CALL  OUTCMD
      MOV   AL,XMTLEN         ; TRANSMIT LENGTH LSB
      CALL  OUTPAR
      MOV   AL,0              ; TRANSMIT LENGTH MSB
      CALL  OUTPAR
      MOV   AL,XMTADDR
      CALL  OUTPAR                  ; SETUP TRANSMIT ADDRESS
      MOV   AL,XMTCONT
      CALL  OUTPAR                  ; SETUP TRANSMIT CONTROL
      MOV   COMMODE,TRAMODE         ; SET TO TRANSMIT MODE
      INC   XMTCNT                  ; COUNT THIS TRANSMIT
        MOV AL,DO_LONG_STATUS_FLAG  ; get current mgs len status
        MOV OLD_LONG_STATUS_FLAG,AL ; save away in case of retransmit
        MOV DO_LONG_STATUS_FLAG,0   ; clear to do short xmit
; SAVE THE ERRORS (TO BE RESTORED ON TRANSMISSION FAILURE)
      MOV   AL,VEH_STATUS+ERRPTR    ;SET IN STATUS MESSAGE
      MOV   OLD_SEQ_ERR,AL                ;GET SAVED SEQUENCE ERROR
      MOV   AX,WORD PTR VEH_STATUS+ERRPTR+1     ;SET IN STATUS MESSAGE
      MOV   OLD_ERR,AX              ;GET SAVED ERROR FIELD
; CLEAR THE ERROR THAT HAS JUST BEEN SENT (AND SEQUENCE ERROR ALSO)
      XOR   AX,AX                   ;SET REGISTER TO ZERO
      MOV   VEH_STATUS+ERRPTR,AL    ;SET IN STATUS MESSAGE
      MOV   WORD PTR VEH_STATUS+ERRPTR+1,AX     ;SET IN STATUS MESSAGE
      RET
SETXMT      ENDP
$EJ   ;
;********************
; SDLCTRC - SDLC TRANSMITTER COMPLETE INTERRUPT SERVICE ROUTINE
;********************
SDLCTRC     PROC
      OR    COMSTAT,INTXCOM         ; INDICATE TRANSMIT COMPLETE
      MOV   AL,RTXCODE        ; READ TRANSMIT RESULTS COMMAND
      CALL  OUTCMD                  ; REQUEST TRANSMITTER INTERRUPT STATUS
      CALL  RESULTS                 ; GET TRANSMIT INTERRUPT CODE
      MOV   XMTECOD,AL        ; SAVE TRANSMIT ERROR CODE
      CMP   AL,TXGOOD         ; IF TRANSMIT COMPLETE OK THEN
      JE    TRACP1                  ; SKIP ERROR SET
      INC   XMTECNT                 ; ELSE, INCREMENT ERROR COUNT
      CALL  SETSDLC                 ; RESET THE MULTI MODULE
TRACP1:
```

```
     CALL  SETRCV                    ; YES - READY ANOTHER RECEIVE
     RET
SDLCTRC    ENDP
$EJ   ;
;********************
; SDLCTEP - SDLC TRANSMITTER INTERRUPT SERVICE ROUTINE
;********************
SDLCTEP    PROC
     OR    COMSTAT,INTTRAN           ; INDICATE TRANSMIT INTERRUPT
     CALL  DATXMT                    ; SEND DATA BYTES TO TRANSMITTER
     RET
SDLCTEP    ENDP
$EJ   ;
;********************
; AUTOCOM - SETS UP COMMUNICATIONS WHENEVER VEHICLE IS IN AUTO MODE
;********************
AUTOCOM    PROC  FAR
     PUSH  DS                  ; SAVE CALLING DS
     PUSH  ES
     PUSH  BX
     MOV   AX,DATA                   ; SET UP NEEDED DS
     MOV   DS,AX
     LES   BX, COMMADDRESS     ;GET SEGMENT AND OFFSET OF COMM_ADDRESS
     MOV   AX, ES:[BX]         ;GET VALUE OF COMM_ADDRESS
     LES   BX, SDLCCOMM_DEVICE      ;GET SEGMENT AND OFFSET OF SDLC_COMM_DEVICE
     MOV   BX, ES:[BX]         ;LET 'BX' BE THE OFFSET TO THE COMM BOARD
     MOV   ES, AX                   ;LET 'ES' BE THE SEGMENT TO THE COMM BOARD
     MOV   AX,VEHICLE_NUMBER ; GET VEHICLE ADDRESS
     MOV   XMTADDR,AL          ; SET UP TRANSMIT ADDRESS
     MOV   COMENA,1            ; ENABLE COMMUNICATIONS
     CLI                       ; DISABLE INTERRUPTS
     CALL  SETSDLC                   ; RESET THE MULIT MODULE
     CALL  SETRCV                    ; SET UP FOR RECEIVE
     STI                       ; ENABLE INTERRUPTS
     POP   BX
     POP   ES
     POP   DS                  ; RESTORE CALLING DS
     RET
AUTOCOM    ENDP
$EJ   ;
;********************
; ONCOM - ENABLES COMMUNICATIONS
```

```
;********************
ONCOM PROC  FAR
      PUSH  DS                 ; SAVE CALLING DS
      MOV   AX,DATA                  ; SET UP NEEDED DS
      MOV   DS,AX
      MOV   COMENA,1           ; ENABLE COMMUNICATIONS
      INC   RMXRCV                   ; COUNT BUFFERS RECEIVED (DEBUG)
      POP   DS                 ; RESTORE CALLING DS
      RET
ONCOM ENDP
$EJ   ;
;********************
; OFFCOM - TURNS OFF COMMUNICATION
;********************
OFFCOM      PROC  FAR
      PUSH  DS                 ; SAVE CALLING DS
      PUSH  ES
      PUSH  BX
      MOV   AX,DATA                  ; SET UP NEEDED DS
      MOV   DS,AX
      LES   BX, COMMADDRESS          ;GET SEGMENT AND OFFSET OF COMM_ADDRESS
      MOV   AX, ES:[BX]              ;GET VALUE OF COMM_ADDRESS
      LES   BX, SDLCCOMM_DEVICE            ;GET SEGMENT AND OFFSET OF SDLC_COMM_DEVICE
      MOV   BX, ES:[BX]              ;LET 'BX' BE THE OFFSET TO THE COMM BOARD
      MOV   ES, AX                         ;LET 'ES' BE THE SEGMENT TO THE COMM BOARD
      MOV   AL,RESET           ; TURN OFF MULTI MODULE
      CLI                      ; DISABLE INTERRUPTS
      CALL  OUTCMD
      STI                      ; ENABLE INTERRUPTS
      MOV   AL,ES:[BX]         ; CLEAR PENDING STUFF
      MOV   COMENA,0           ; TURN OFF COMMUNICATION FLAG
      MOV   COMMODE,NILMODE          ; COMMUNICATIONS IN NULL MODE
      POP   BX
      POP   ES
      POP   DS                 ; RESTORE CALLING DS
      RET
OFFCOM      ENDP
$EJ   ;
;********************
; TRANSON - TURNS ON THE TRANSMIT CLOCK AT THE MULTI MODULE SO THAT THE VEHICLE
;         TRANSMITTER CAN TRANSMIT ALTERNATE 1'S AND 0'S FOR TESTING.
;********************
```

```
TRANSON     PROC  FAR
      PUSH  DS                 ; SAVE CALLING DS
      PUSH  ES
      PUSH  BX
      MOV   AX,DATA                  ; SET UP NEEDED DS
      MOV   DS,AX
      LES   BX, COMMADDRESS    ;GET SEGMENT AND OFFSET OF COMM_ADDRESS
      MOV   AX, ES:[BX]        ;GET VALUE OF COMM_ADDRESS
      LES   BX, SDLCCOMM_DEVICE     ;GET SEGMENT AND OFFSET OF SDLC_COMM_DEVICE
      MOV   BX, ES:[BX]        ;LET 'BX' BE THE OFFSET TO THE COMM BOARD
      MOV   ES, AX                   ;LET 'ES' BE THE SEGMENT TO THE COMM BOARD
      MOV   COMENA,0           ; DISABLE COMMUNICATIONS
      CLI                      ; DISABLE INTERRUPTS
      CALL  SETSDLC                  ; RESET THE MULIT MODULE
      MOV   AL,TXCLON          ; TURN ON TRANSMIT CLOCK COMMAND
      CALL  OUTCMD                   ; TURN ON TXMIT CLOCK
      STI                      ; ENABLE INTERRUPTS
      POP   BX
      POP   ES
      POP   DS                 ; RESTORE CALLING DS
      RET
TRANSON     ENDP
$EJ   ;
;********************
; TRANSOFF - TURNS OF THE TRANNSMITTER CLOCK
;********************
TRANSOFF PROC     FAR
      PUSH  DS                 ; SAVE CALLING DS
      PUSH  ES
      PUSH  BX
      MOV   AX,DATA                  ; SET UP NEEDED DS
      MOV   DS,AX
      LES   BX, COMMADDRESS    ;GET SEGMENT AND OFFSET OF COMM_ADDRESS
      MOV   AX, ES:[BX]        ;GET VALUE OF COMM_ADDRESS
      LES   BX, SDLCCOMM_DEVICE     ;GET SEGMENT AND OFFSET OF SDLC_COMM_DEVICE
      MOV   BX, ES:[BX]        ;LET 'BX' BE THE OFFSET TO THE COMM BOARD
      MOV   ES, AX                   ;LET 'ES' BE THE SEGMENT TO THE COMM BOARD
      MOV   AL,TXCLOFF         ; TRUN OFF TRANSMITTER CLOCK COMMAND
      CLI                      ; DISABLE INTERRUPTS
      CALL  OUTCMD                   ; TURN OFF TXMITTER CLOCK
      CALL  SETSDLC                  ; RESET THE MULIT MODULE
      STI                      ; ENABLE INTERRUPTS
```

```
      POP   BX
      POP   ES
      POP   DS                      ; RESTORE CALLING DS
      RET
TRANSOFF ENDP
V3COMT_CODE ENDS
      END
```

```
; V2IAMX   V2IAMX   V2IAMX   V2IAMX   V2IAMX   V2IAMX   V2IAMX   V2IAMX   V2IAMX
V2IAMX   V2IAMX   V2IAMX   V2IAMX   V2IAMX
;*******************************************************************************************
***********************************************
;**
                                         **
;**                                  EEEEEEEEEEEEEE       TTTTTTTTTTTTT
NNNNNNN     NNNNN                          **
;**                                  EEEEEEEEEEEEE        TTTTTTTTTTT
NNNNNNNN    NNNNN                          **
;**                                  EEEEE             A        TTTT       OOO
NNNNNNNNN   NNNNN                          **
;**                                  EEEEEEEEEEE      AAA       TTT       OOOOOOOO
NNNNN NNNN  NNNNN                          **
;**                                  EEEEEEEEEE      AAAAA      TTT       OOOOOOOO
NNNNN  NNNN NNNNN                          **
;**                                  EEEEE                      TTTT       OOO
NNNNN   NNNNNNNNN                          **
;**                                  EEEEEEEEE     AAAAAAA     TTTTT
NNNNN    NNNNNNNN                          **
;**                                  EEEEEEEE     AAAAAAAAA    TTTTTTT
NNNNN      NNNNNNN                         **
;**
                                         **
;**        This software (firmware) developed by EATON-KENWAY is proprietary.  Source
code on listings or any other media       **
;**           is not for sale or loan and may not be copied or transferred to any
vendor, buyer, or consultant.  Executable        **
;**          code is available in ROM and is sold with the original product or as a
product upgrade.  Buyer shall not            **
;**         copy or distribute ROM's with E-K firmware to any third party without the
prior written approval of EATON-KENWAY.   **
;**           Title to and ownership of the software shall at all times remain with
EATON-KENWAY.   The information  in this      **
;**           is subject to change without notice  and should not be construed as a
commitment by EATON-KENWAY.               **
;**
                                         **
;**        EATON-KENWAY   assumes  no  responsibility  for  the  use or reliability
of  its  software on  equipment which      **
;**         is  not supplied EATON-KENWAY or has been modified without EATON-KENWAY
approval.                                **
```

```
;**
                                              **
;**         Copyright 1989
                 KENWAY, INCORPORATED      **
;*******************************************************************************************
***********************************************
; V2IAMX   V2IAMX   V2IAMX   V2IAMX   V2IAMX   V2IAMX   V2IAMX   V2IAMX   V2IAMX
V2IAMX   V2IAMX   V2IAMX   V2IAMX   V2IAMX
;
;       DATE CREATED:  Feb 89
;       AUTHOR:        Vehicle Group
;
;       DESCRIPTION:
;           xxx......           ....
;
;       PROGRAM HISTORY:
;       Date        Initials/No.       Description
;       =========   ============       ============================
;* * * * * * * * * * * * * * * * * * * * * * * * * * * * * * * * * * * * * * * * * *
* * * * * * * * * * * * * * * * * * * * * * */
NAME V2IAMX
$EJ   ;
;****************************************************************************-
;     This code sets up all the tables required by AMX.
;     7-28-86           Dave Madsen Write the code
;     7-21-89           Gary Whatcott     Adapt to 'C' interface
;****************************************************************************-

;****************************************************************************-
;     THE FOLLOWING EXTERNAL DECLARATIONS MUST BE LOCATED OUTSIDE ALL
;     SEGMENTS IN THE USER SYSTEM CONFIGURATION MODULE
;****************************************************************************-
    EXTRN   AMTMRT:FAR  ;START ADDRESS FOR AMX86 TIMER TASK
    EXTRN   VHCUTC_MAIN:FAR    ;START ADDRESS FOR HCU
    EXTRN   VCMDT_MAIN:FAR     ;START ADDRESS FOR CMD
    EXTRN   MAIN_ACT:FAR       ;START ADDRESS FOR ACT
    EXTRN   MAIN_TRN:FAR       ;START ADDRESS FOR TRN
    EXTRN   LIFT_MAIN:FAR      ;START ADDRESS FOR SUB
    EXTRN   VCOMTC:FAR  ;START ADDRESS FOR COM
    EXTRN   VINIPROC:FAR       ;START ADDRESS FOR VINIT
$EJ   ;
;*****************************************************************************
```

```
;     PUBLIC DEFINITIONS
;******************************************************************************

    PUBLIC  VINIMT                  ;PSEUDO TASK NUMBER FOR INI
    PUBLIC  VHCUMT                  ;TASK NUMBER FOR HCU
    PUBLIC  VCMDMT                  ;TASK NUMBER FOR CMD
    PUBLIC  VACTMT                  ;TASK NUMBER FOR ACT
    PUBLIC  VTRNMT                  ;TASK NUMBER FOR TRN
    PUBLIC  VSUBMT                  ;TASK NUMBER FOR SUB
    PUBLIC  VCOMMT                  ;TASK NUMBER FOR COM
    PUBLIC  SOINI             ;OFFSET OF STACK FOR VINIT
    PUBLIC  AMESTK
    PUBLIC  MQERSTACK         ;Dummy stack to eliminate link error
    PUBLIC  STBOT             ;STACK TEST - BOTTOM OF STACK
    PUBLIC  STEXE             ;STACK TEST - EXE
    PUBLIC  STINI             ;STACK TEST - INI
    PUBLIC  STHCU             ;STACK TEST - HCU
    PUBLIC  STCMD             ;STACK TEST - CMD
    PUBLIC  STACT             ;STACK TEST - ACT
    PUBLIC  STTRN             ;STACK TEST - TRN
    PUBLIC  STSUB             ;STACK TEST - SUB
    PUBLIC  STCOM             ;STACK TEST - COM
    PUBLIC  STTMR             ;STACK TEST - TMR
    PUBLIC  STINT             ;STACK TEST - INT
SEJ   ;
;******************************************************************************
;     U S E R   S Y S T E M   C O N F I G U R A T I O N   M O D U L E
;******************************************************************************
;*************************************
;     START OF CODE SEGMENT
;*************************************
V2IAMX_CODE SEGMENT 'CODE'
ASSUME DS:DATA
;***********************************************
;     AMX86 PARAMETER SEGMENT ENTRY POINTS
;***********************************************
    PUBLIC  AMTDT ;TASK DEFINITION TABLE
    PUBLIC  AMRPL ;RESTART PROCEDURE LIST
    PUBLIC  AMNUMQ      ;NUMBER OF Q BLOCKS
    PUBLIC  AMCLKP      ;CLOCK PERIOD = # OF CLOCK INTERRUPTS
    PUBLIC  AMTMRR      ;TIMER PROCEDURE LIST
    PUBLIC  AMISTP      ;AMX86 INTERRUPT STACK POINTER
```

```
$EJ  ;
;****************************************************************************
;    THIS PROCEDURE WILL INITIALIZE THE MAILBOX TOKENS TO SIMULATE THE
;    RMX CREATE MAILBOX CALL.  IT IS OF INTEREST TO NOTE THAT THE AMX
;    MAILBOX CONTENTS THE TASK NUMBER
;****************************************************************************
RESET_TOKENS            PROC  FAR
      MOV   AX,DATA           ;SET UP DS
      MOV   DS,AX
      MOV   VHCUMT,HCU_T            ;SET TASK NUMBER FOR HCU
      MOV   VCMDMT,CMD_T            ;SET TASK NUMBER FOR CMD
      MOV   VACTMT,ACT_T            ;SET TASK NUMBER FOR ACT
      MOV   VTRNMT,TRN_T            ;SET TASK NUMBER FOR TRN
      MOV   VSUBMT,SUB_T            ;SET TASK NUMBER FOR SUB
      MOV   VCOMMT,COM_T            ;SET TASK NUMBER FOR COM
      RET
RESET_TOKENS            ENDP
$EJ  ;
;****************************************************************************
;    AMX86 TASK DEFINITION TABLE
    ;----------------------- E-K ATTRIBUTES See V2AMX.ASM --------
    AMMA_CP EQU   1000H       ;Co-processor specfd for task
    ;-------------------------------------------------------------
;****************************************************************************
AMTDT LABEL DWORD
;***********************************************************
;    AMX86 TASK DEFINITION TABLE
;    TASK 0      AMX86 TIMER TASK
;***********************************************************
      DD    AMTMRT                  ;START ADDRESS OF TASK
      DD    SOTMR             ;STACK ADDRESS
      DW    0                 ;TASK ATTRIBUTES
      DW    0                 ;NO LEVEL 0 QUEUES REQUIRED
      DW    0                 ;NO LEVEL 1 QUEUES REQUIRED
      DW    0                 ;NO LEVEL 2 QUEUES REQUIRED
      DW    0                 ;NO LEVEL 3 QUEUES REQUIRED
$EJ  ;
;**********************************************************************
;    AMX86 TASK DEFINITION TABLE
;    TASK 1  - ACTION - ACT
;**********************************************************************
ACT_T EQU   1                 ;SAVE TASK NUMBER
```

```
T1SS  EQU   400H            ;STACK SIZE IN WORDS
   DD      MAIN_ACT               ;START ADDRESS OF TASK
     DD    SOACT            ;STACK ADDRESS
     DW    AMMA_CP +0       ;TASK ATTRIBUTES
       DW  0                ;LEVEL 0 QUEUE
     DW    0                ;LEVEL 1 QUEUE
     DW    0                ;LEVEL 2 QUEUE
     DW    0                ;LEVEL 3 QUEUE
$EJ   ;
;*********************************************************************
;     AMX86 TASK DEFINITION TABLE
;     TASK 2 - SUBSYSTEMS - SUB
;*********************************************************************
SUB_T EQU   2               ;SAVE TASK NUMBER
T2SS  EQU   400H            ;STACK SIZE IN WORDS
   DD      LIFT_MAIN        ;START ADDRESS OF TASK
     DD    SOSUB            ;STACK ADDRESS
     DW    AMMA_CP +0       ;TASK ATTRIBUTES
       DW  0                ;LEVEL 0 QUEUE
     DW    0                ;LEVEL 1 QUEUE
     DW    0                ;LEVEL 2 QUEUE
     DW    0                ;LEVEL 3 QUEUE
;*********************************************************************
;     AMX86 TASK DEFINITION TABLE
;     TASK 3 - HANDCONTROLLER - HCU
;*********************************************************************
HCU_T EQU   3               ;SAVE TASK NUMBER
T3SS  EQU   480H            ;STACK SIZE IN WORDS
   DD      VHCUTC_MAIN      ;START ADDRESS OF TASK
   DD      SOHCU            ;STACK ADDRESS
   DW      AMMA_CP +0       ;TASK ATTRIBUTES
       DW  0                ;LEVEL 0 QUEUE
     DW    0                ;LEVEL 1 QUEUE
     DW    0                ;LEVEL 2 QUEUE
     DW    0                ;LEVEL 3 QUEUE
;*********************************************************************
;     AMX86 TASK DEFINITION TABLE
;     TASK 4 - COMMUNICATIONS - COM
;*********************************************************************
COM_T EQU   4               ;SAVE TASK NUMBER
T4SS  EQU   20H             ;STACK SIZE IN WORDS
   DD      VCOMTC                 ;START ADDRESS OF TASK
```

```
    DD      SOCOM              ;STACK ADDRESS
    DW      0                  ;TASK ATTRIBUTES
        DW  0                  ;LEVEL 0 QUEUE
      DW    0                  ;LEVEL 1 QUEUE
      DW    0                  ;LEVEL 2 QUEUE
      DW    0                  ;LEVEL 3 QUEUE
;**********************************************************************
;     AMX86 TASK DEFINITION TABLE
;     TASK 5 - COMMAND PROCESSOR - CMD
;**********************************************************************
CMD_T EQU   5                  ;SAVE TASK NUMBER
T5SS  EQU   400H               ;STACK SIZE IN WORDS
    DD      VCMDT_MAIN         ;START ADDRESS OF TASK
    DD      SOCMD              ;STACK ADDRESS
    DW      0                  ;TASK ATTRIBUTES
        DW  0                  ;LEVEL 0 QUEUE
      DW    0                  ;LEVEL 1 QUEUE
      DW    0                  ;LEVEL 2 QUEUE
      DW    0                  ;LEVEL 3 QUEUE
;**********************************************************************
;     AMX86 TASK DEFINITION TABLE
;     TASK 6 - TRANSLATION (MOTION) - TRN
;**********************************************************************
TRN_T EQU   6                  ;SAVE TASK NUMBER
T6SS  EQU   400H               ;STACK SIZE IN WORDS
    DD      MAIN_TRN           ;START ADDRESS OF TASK
    DD      SOTRN              ;STACK ADDRESS
    DW      AMMA_CP +0         ;TASK ATTRIBUTES
        DW  0                  ;LEVEL 0 QUEUE
      DW    0                  ;LEVEL 1 QUEUE
      DW    0                  ;LEVEL 2 QUEUE
      DW    0                  ;LEVEL 3 QUEUE
;***************************************************************************
;     * * *  G R A N D   T O T A L S   * * *
;***************************************************************************
QB    EQU   1                  ;TOTAL QUEUES
TQS   EQU   0                  ;TASK QUEUE SIZE
SQS   EQU   (QB*9)+4           ;SYSTEM QUEUE SIZE
TTQS  EQU   TQS+SQS                  ;TOTAL QUEUE SIZE
;***********************************************************
;     * * * * * TASK DEFINITION TABLE END * * * * *
;***********************************************************
```

```
   DW      2 DUP(OFFFFH)      ;MARKS THE END OF TASK DEF TABLE
$EJ   ;
;******************************************************************************
;     AMX86 RESTART PROCEDURE LIST
;******************************************************************************
AMRPL LABEL DWORD
      DD     RESET_TOKENS       ;INITIALIZE PSEUDO MAILBOX TOKENS
      DD     VINIPROC    ;VEHICLE INITIALIZATION
      DW     2 DUP(OFFFFH)      ;MARKS THE END OF THE RESTART PROCEDURE LIST
$EJ   ;
;******************************************************************************
;     AMX86 TIMER PROCEDURE LIST
;******************************************************************************
      AMTMRR       LABEL DWORD
      DW     2 DUP (OFFFFH)     ;MARK END OF LIST
$EJ   ;
;******************************************************************************
;     AMX PARAMETERS
;******************************************************************************
AMCLKP       DW     1                  ;CLOCK PERIOD = # OF CLOCK INTERRUPTS
AMISTP       DD     SOINT              ;INTERRUPT STACK POINTER
AMNUMQ       DW     1                  ;NUMBER OF Q BLOCKS
V2IAMX_CODE ENDS
;*********************************************
;     END OF CODE SEGMENT
;*********************************************
$EJ   ;
;***********************************
;     START OF DATA SEGMENT
;***********************************
DATA  SEGMENT      PUBLIC 'DATA'
      PUBLIC       AMDATA              ;ENTRY POINT FOR AMX86 USE
      AMDATA       LABEL WORD
;**************************************
;     AMX PRIVATE STORAGE
;**************************************
      DW     20H DUP(?)
;**************************************
;     TASK CONTROL BLOCKS
;**************************************
      DW     20H DUP(?)         ;TASK 0 TIMER     40H bytes
      DW     20H DUP(?)         ;TASK 1 ACT 40H bytes
```

```
     DW    20H DUP(?)         ;TASK 2 SUB     "
     DW    20H DUP(?)         ;TASK 3 HCU     "
     DW    20H DUP(?)         ;TASK 4 COM     "
     DW    20H DUP(?)         ;TASK 5 CMD     "
     DW    20H DUP(?)         ;TASK 6 TRN     "
     DW    2  DUP(?)          ;TASK CONTROL BLOCK OVERHEAD TASK
$EJ   ;
;*************************************
;    SYSTEM QUEUE
;    EACH QUEUE IS 9 WORDS
;*************************************
     DW    TTQS DUP(?)        ;SYSTEM OVERHEAD
$EJ   ;
;****************************************************************************
;    TASK NUMBERS DEFINED
;
;    THESE CONSTANTS ARE USED TO DEFINE THE MAILBOX TOKENS.  THIS IS A
;    CARRY-OVER FROM THE RMX USAGE.  THIS IS NO LONGER THE MAILBOX TOKEN
;    BUT IS NOW THE TASK NUMBER AS USED IN AMX.  THE MAILBOX TOKEN FROM
;    RMX AND THE TASK NUMBER IN AMX PERFORM ROUGHLY THE SAME FUNCTION.
;    THAT IS - THEY BOTH IDENTIFY WHO THE MESSAGE IS TO BE SENT TO.  IN
;    ORDER TO LOOK LIKE RMX WE WILL USE THE RMX NAMES AND USED THEM NOW
;    IN THE AMX WORLD.
;****************************************************************************

VINIMT     DW    0                 ;PSEUDO TASK NUMBER
VHCUMT     DW    0                 ;TASK NUMBER FOR HCU
VCMDMT     DW    0                 ;TASK NUMBER FOR CMD
VACTMT     DW    0                 ;TASK NUMBER FOR ACT
VTRNMT     DW    0                 ;TASK NUMBER FOR TRN
VSUBMT     DW    0                 ;TASK NUMBER FOR SUB
VCOMMT     DW    0                 ;TASK NUMBER FOR COM
$EJ   ;
;******************************************************************************-
;    S T A C K   D E F I N I T I O N
;******************************************************************************-
SSINI EQU   40          ;STACK SIZE FOR INI
SSTMR EQU   40          ;STACK SIZE FOR TMR - TIMER
SSINT EQU   40          ;STACK SIZE FOR INT - INTERRUPTS
;**************************************************-
;    EXE - AMX  EXECUTIVE STACK
;**************************************************-
```

```
STEXE DW     0              ;STACK TEST PATTERN
      DW     20 DUP(?)      ;STACK
AMESTK       LABEL WORD          ;STACK ADDRESS
;**************************************************-
;     INI - USER TASK STACK
;**************************************************-
STINI DW     0              ;STACK TEST PATTERN
      DW     SSINI DUP (?)       ;STACK
SOINI LABEL WORD            ;STACK ADDRESS
;**************************************************-
;     HCU - USER TASK STACK
;**************************************************-
STHCU DW     0              ;STACK TEST PATTERN
      DW     T3SS DUP (?)        ;STACK
SOHCU LABEL WORD            ;STACK ADDRESS
;**************************************************-
;     CMD - USER TASK STACK
;**************************************************-
STCMD DW     0              ;STACK TEST PATTERN
      DW     T5SS DUP (?)        ;STACK
SOCMD LABEL WORD            ;STACK ADDRESS
;**************************************************-
;     ACT - USER TASK STACK
;**************************************************-
STACT DW     0              ;STACK TEST PATTERN
      DW     T1SS DUP (?)        ;STACK
SOACT LABEL WORD            ;STACK ADDRESS
;**************************************************-
;     TRN - USER TASK STACK
;**************************************************-
STTRN DW     0              ;STACK TEST PATTERN
      DW     T6SS DUP (?)        ;STACK
SOTRN LABEL WORD            ;STACK ADDRESS
;**************************************************-
;     SUB - USER TASK STACK
;**************************************************-
STSUB DW     0              ;STACK TEST PATTERN
      DW     T2SS DUP (?)        ;STACK
SOSUB LABEL WORD            ;STACK ADDRESS
;**************************************************-
;     COM - USER TASK STACK
;**************************************************-
```

```
STCOM DW    0             ;STACK TEST PATTERN
      DW    T4SS DUP (?)        ;STACK
SOCOM LABEL WORD          ;STACK ADDRESS
;***********************************************-
;     TMR -  AMX TIMER STACK
;***********************************************-
STTMR DW    0             ;STACK TEST PATTERN
      DW    SSTMR DUP (?)       ;STACK
SOTMR LABEL WORD          ;STACK ADDRESS
;***********************************************-
;     INT - AMX INTERRUPT STACK
;***********************************************-
STINT DW    0             ;STACK TEST PATTERN
      DW    SSINT DUP (?)       ;STACK
SOINT LABEL WORD          ;STACK ADDRESS
STBOT DW    0             ;STACK TEST PATTERN
;***********************************************-
;     MQERSTACK - AMX FLOATING PT STACK
;     Used to resolve link errors, Stack unnecessary
;     in ROM system.
;***********************************************-
MQERSTACK DW      0           ;Dummy stack to resolve floating points
      DW    20 DUP (?)  ;Dummy stack to eliminate link error
;************************************
;     END OF DATA SEGMENT
;************************************
DATA  ENDS
END
```

```
; V4INIT   V4INIT   V4INIT   V4INIT   V4INIT   V4INIT   V4INIT   V4INIT   V4INIT
V4INIT   V4INIT   V4INIT   V4INIT   V4INIT
;*************************************************************************************
***********************************************
;**
                                                   **
;**                                        EEEEEEEEEEEEEE      TTTTTTTTTTTT
NNNNNNN      NNNNN                              **
;**                                        EEEEEEEEEEEEE       TTTTTTTTTT
NNNNNNNN     NNNNN                              **
;**                                        EEEEE           A        TTTT       OOO
NNNNNNNNN    NNNNN                              **
;**                                        EEEEEEEEEEE     AAA      TTT      OOOOOOOO
NNNNN NNNN   NNNNN                              **
;**                                        EEEEEEEEEE     AAAAA     TTT      OOOOOOOO
NNNNN  NNNN NNNNN                               **
;**                                        EEEEE                    TTTT       OOO
NNNNN   NNNNNNNNN                               **
;**                                        EEEEEEEEE     AAAAAAA    TTTTT
NNNNN    NNNNNNNN                               **
;**                                        EEEEEEEE     AAAAAAAAA   TTTTTTT
NNNNN     NNNNNNN                               **
;**
                                                   **
;**        This software (firmware) developed by EATON-KENWAY is proprietary.  Source
code on listings or any other media      **
;**          is not for sale or loan and may not be copied or transferred to any
vendor, buyer, or consultant.  Executable       **
;**         code is available in ROM and is sold with the original product or as a
product upgrade.  Buyer shall not          **
;**        copy or distribute ROM's with E-K firmware to any third party without the
prior written approval of EATON-KENWAY.   **
;**         Title to and ownership of the software shall at all times remain with
EATON-KENWAY.    The information  in this      **
;**          is subject to change without notice  and should not be construed as a
commitment by EATON-KENWAY.                  **
;**
                                                   **
;**         EATON-KENWAY  assumes no responsibility for the use or reliability
of its software on equipment which     **
;**         is not supplied EATON-KENWAY or has been modified without EATON-KENWAY
approval.                                  **
```

```
;**
                                            **
;**          Copyright 1989
                  KENWAY, INCORPORATED      **
;*********************************************************************************
**********************************************
; V4INIT   V4INIT   V4INIT   V4INIT   V4INIT   V4INIT   V4INIT   V4INIT   V4INIT
V4INIT   V4INIT   V4INIT   V4INIT   V4INIT
$EJ   ;
;
;     VINIT VEHICLE INITIALITATION TASK
;
;           This task was rewritten in August 1986 to allow the
;           vehicle to interface with the new AMX operating
;           system.  At that time many of the previous functions
;           were either deleted or modified to fit the new
;           operating system concepts.
;
;           REVISIONS:
;
;           DCM   8/5/86      The interface to AMX was started
;
;+---------------------------------------------------------------------------+
$EJ   ;
      NAME  V4INIT
;***************************************************************************
;     PATH DEFINITION FOR BUILDS
;***************************************************************************
;**************************************************************************
;     E X T E R N A L   D E F I N I T I O N S
;**************************************************************************
    EXTRN   AAATL:FAR
    EXTRN   AAGETN:FAR
    EXTRN   AAINT:FAR
    EXTRN   AAINX:FAR
    EXTRN   AARBL:FAR
    EXTRN   AARSTL:FAR
    EXTRN   AATASK:FAR
    EXTRN   AAWAIT:FAR
    EXTRN   AAWATM:FAR
    EXTRN   AAWAKE:FAR
    EXTRN   VSYSBUG_ALARMS:FAR
```

```
EXTRN   VINIMT:WORD
EXTRN   V186TC:FAR
EXTRN   SDLCINT:FAR
EXTRN   SOINI:WORD

$EJ   ;
;**************************************************************************
;     P U B L I C   D E F I N I T I O N S
;**************************************************************************
      PUBLIC      BREAK_ECHAIN
      PUBLIC      COMMODE
        PUBLIC  DEBUG_CONFIG_DEF
        PUBLIC  DEBUG_CONFIG_DEF_SIZE
      PUBLIC      DECREMENT_STATUS_CLOCK        ; PROC
      PUBLIC      DELAY                   ; PROC
      PUBLIC      DIOIHC                        ; PROC
      PUBLIC      DIOSEG                        ; EQU
        PUBLIC    DISABLE_COMMUNICATIONS        ; PROC
      PUBLIC      DISABLE_INTERRUPTS            ; PROC
      PUBLIC      COMMIHC                       ;PROC
      PUBLIC      COMMSEG                       ;EQU
      PUBLIC      ENABLE_COMMUNICATIONS         ; PROC
      PUBLIC      ENABLE_INTERRUPTS       ; PROC
      PUBLIC      ERROR_CODE
      PUBLIC      ERROR_VRBL
      PUBLIC      ERROR_DEVICE
      PUBLIC      ERROR_OFFSET
      PUBLIC      ERROR_SEGMENT
      PUBLIC      ERROR_STATUS
      PUBLIC  ERROR_8274
      PUBLIC      FLAGS_SAVE
      PUBLIC      GET_ANALOG_IN                 ; PROC
      PUBLIC      GET_ANALOG_OUT                ; PROC
      PUBLIC      GET_BIT_DISCRETE_IN           ; PROC
      PUBLIC      GET_BIT_DISCRETE_OUT          ; PROC
      PUBLIC      GET_BYTE_DISCRETE_IN          ; PROC
      PUBLIC      GET_BYTE_DISCRETE_OUT         ; PROC
      PUBLIC      GET_ENCODER             ; PROC
      PUBLIC      WAIT__MAIL              ; PROC
      PUBLIC      INVALID_INTERRUPT
      PUBLIC  LOAD_ID_NUMBER
      PUBLIC      MMSTAT
```

```
PUBLIC      MODERR
PUBLIC      NON_TOKEN_POINTER
PUBLIC      NON_TOKEN_BUFFER
PUBLIC      OLD_LONG_STATUS_FLAG

PUBLIC      PCBYTE
PUBLIC      PUT_ANALOG_OUT                ; PROC
PUBLIC      M_C_P__CONTROL                ; PROC
PUBLIC      M_C_P__OBST             ; PROC
PUBLIC      M_C_P__STATE                  ; PROC
PUBLIC      M_C_P__TPS              ; PROC
PUBLIC      M_C_P__INITIALIZE       ; PROC
PUBLIC      M_C_P__DISCRETES        ; PROC
PUBLIC      PUT_BIT_DISCRETE_OUT          ; PROC
PUBLIC      PUT_BYTE_DISCRETE_OUT         ; PROC
PUBLIC      SEND__MAIL              ; PROC
PUBLIC      RCVADDR
PUBLIC      RCVCONT
PUBLIC      RCVECOD
PUBLIC      RCVECNT
PUBLIC      RCVLEN
PUBLIC      RCVMCNT
PUBLIC      RCVPTR
PUBLIC      RESUME                        ; PROC
PUBLIC      SET_ANALOG_IN                 ; PROC
PUBLIC      SET_BIT_DISCRETE_IN           ; PROC
PUBLIC      SET_BIT_DISCRETE_OUT          ; PROC
PUBLIC      SET_BYTE_DISCRETE_IN          ; PROC
PUBLIC      SET_ENCODER             ; PROC
PUBLIC      SET_MASK                ; PROC
PUBLIC  STATUS_ERROR_8274
PUBLIC      SUSPEND                       ; PROC
PUBLIC      TASK_Q
PUBLIC  TEST_PATTERN
PUBLIC      VEH_STATUS
PUBLIC      VINIPROC                ; PROC
PUBLIC      VINITC                        ; PROC
PUBLIC      VOLATILE_RAM_END
PUBLIC      VSYSBUG                       ; PROC
PUBLIC      XMTADDR
PUBLIC      XMTCONT
PUBLIC      XMTCNT
```

```
     PUBLIC      XMTECNT
     PUBLIC      XMTECOD
     PUBLIC      XMTPTR
$EJ   ;
;*************************************************************************
;     E Q U ' S
;*************************************************************************
CLOCK_OFFSET              EQU   2     ; OFFSET INTO STATUS_BUFFER TO WAIT_TIME
DIOSEG                    EQU   07000H      ;SEGMENT FOR DIO ADDRESS
COMMSEG                   EQU   07100H      ;SEGMENT FOR COMM BOARD ADDRESS
DEBUG_CONFIG_DEF_SIZE     EQU   7
ERROR_CODE_F000           EQU   0F000H      ;DIO BOARD WOULD NOT INITIALIZE
ERROR_CODE_F001   EQU    0F001H     ;DIO SEND TEST FAILURE
ERROR_CODE_F002           EQU   0F002H      ;DIO RECEIVE TEST FAILURE
ERROR_CODE_F003           EQU   0F003H ;DIO/FIFO/DS5000 COMMUNICATION PROBLEM
ERROR_CODE_F004           EQU   0F004H   ;DIO/FIFO  MAILBOX  NOT  EMPTY  IN  MCP_STATE
PROCEDURE
ERROR_CODE_F005           EQU   0F005H ;DIO/FIFO MAILBOX NOT EMPTY IN MCP_OBST PROCEDURE
ERROR_CODE_F006           EQU   0F006H  ;DIO/FIFO MAILBOX NOT EMPTY IN MCP_INITIALIZE
PROCEDURE
ERROR_CODE_F007           EQU   0F007H      ;DIO/FIFO MAILBOX NOT EMPTY IN MCP_DISCRETES
PROCEDURE
ERROR_CODE_F008           EQU   0F008H      ;DIO/FIFO MAILBOX NOT EMPTY IN PUT_ANALOG_OUT
PROCEDURE
ERROR_CODE_F009           EQU   0F009H      ;DIO/FIFO MAILBOX NOT EMPTY IN MCP_CONTROL
PROCEDURE
ERROR_CODE_F010           EQU   0F010H      ;DIO/FIFO MAILBOX NOT EMPTY IN GET_ANALOG_OUT
PROCEDURE
ERROR_CODE_F00A           EQU   0F00AH      ;DIO/FIFO  MAILBOX  NOT  EMPTY  IN  MCP_TPS
PROCEDURE
ERROR_CODE_F100   EQU    0F100H     ;DIO ILLEGAL INTERRUPT 0
ERROR_CODE_F106   EQU    0F106H     ;DIO ILLEGAL INTERRUPT 6
ERROR_CODE_F107   EQU    0F107H     ;DIO ILLEGAL INTERRUPT 7
ERROR_CODE_F201           EQU   0F201H      ;PUT MESSAGE FAILURE ON AAATL
ERROR_CODE_F202           EQU   0F202H      ;START TASK FAILURE IN AATASK
ERROR_CODE_F203           EQU   0F203H      ;UNABLE TO WAKE SUSPENDED TASK
ERROR_CODE_FFFD           EQU   0FFFDH      ;INTERRUPT CHECK FAILURE COMM BOARD
ERROR_CODE_FFFE           EQU   0FFFEH      ;INTERRUPT CHECK FAILURE DIO BOARD
ERROR_CODE_FFFF           EQU   0FFFFH      ;UNDEFINED INTERRUPT MASK FAILURE
UMS_TABLE_LINE_6  EQU   6
INTERNAL_SIZE_ENABLE_TABLE EQU  8
TASK_Q_SIZE       EQU   50    ;NUMBER OF WORDS IN TASK QUEUES
```

```
TEST_PATTERN            EQU   05AA5H      ;STACK TEST PATTERN
$EJ   ;
;***************************************************************************
;     M A C R O S
;*************************************************************************--
;     PROLOGUE
;     THE PROLOGUE IS CALLED AT THE BEGINING OF EACH DIO INTERFACE
;     ROUTINE.  IT REPRESENTS THE COMMON CODE WHICH IS NEEDED FOR
;     ANY OF THE INTERFACES.  IT PERFORMS THE FOLLOWING:
;           (0)   SAVE THE BP REGISTER
;           (1)   MOVE SP TO BP FOR BP ADDRESSING
;           (2)   LOAD DEVICE ADDRESS INTO ES
;           (3)   LOAD BX REGISTER WITH THE DEVICE OFFSET
;           (4)   DISABLE THE INTERRUPTS
;           (5)   TEST SELECTED 8742 FOR COMMAND READY
;*************************************************************************--
%*DEFINE( PROLOGUE( DEVICE_ADDRESS ) )
(     PUSH  BP                 ;SAVE CURRENT BASE POINTER
      MOV   BP, SP                   ;SET BP To current SP for BP addressing
      MOV   ES, DIO_ADDRESS          ;LOAD THE DEVICE ADDRESS TO ES
      MOV   BX, %DEVICE_ADDRESS      ;ZERO BX FOR ADDRESSING
      CLI                      ;DISABLE INTERRUPTS
      CALL  SEND_TEST          ;CHECK DEVICE READY
)
;*************************************************************************--
;     EPILOGUE
;     THE EPILOUGE IS CALLED AT THE END OF EACH DIO INTERFACE
;     ROUTINE.  IT REPRESENTS THE COMMON CODE WHICH IS NEEDED FOR
;     ANY OF THE INTERFACES.  IT PERFORMS THE FOLLOWING:
;           (1)   ENABLE INTERRUPTS
;           (2)   RESTORE BP FROM THE STACK
;           (3)   RETURN TO THE CALLER
;*************************************************************************--
%*DEFINE( EPILOGUE )
(     STI                      ;DISABLE INTERRUPTS
      POP   BP                 ;RESTORE BASE POINTER
      RET                      ;RETURN TO CALLER
)
$EJ   ;
;**************************************************************************
;     D A T A   S E G M E N T   -  DATA
;     TABLES LOCATED IN REGULAR RAM - INITALIZED AT RUN TIME
```

```
;*************************************************************************
DATA  SEGMENT      PUBLIC 'DATA'
    EXTRN   VHCUMT:WORD
    EXTRN   STBOT:WORD
    EXTRN   STEXE:WORD
    EXTRN   STINI:WORD
    EXTRN   STHCU:WORD
    EXTRN   STCMD:WORD
    EXTRN   STACT:WORD
    EXTRN   STTRN:WORD
    EXTRN   STSUB:WORD
    EXTRN   STCOM:WORD
    EXTRN   STTMR:WORD
    EXTRN   STINT:WORD
    EXTRN   Y_UMS:WORD        ;Y UMS data arguement
;*************************************************************************
;      TABLE USED BY INTERRUPT ROUTINES TO ESTABLISH WHICH TASKS SHOULD
;      BE NOTIFIED OF THE INTERRUPT
;
;      EACH WORD CONSISTS OF 2 BYTES AS FOLLOWS:
;            LOW TO HIGH INTERRUPT    HIGH TO LOW INTERRUPT
;            0000-0000           0000-0000 NOTHING SET
;            0000-0001           0000-0001 FOR HAND CONTROL UNIT
;            0000-0010           0000-0010 FOR COMMAND PROCESSOR
;            0000-0100           0000-0100 FOR ACTION PROCESSOR
;            0000-1000           0000-1000 FOR TRANSLATION PROCESSOR
;            0001-0000           0001-0000 FOR SUBSYSTEM PROCESSOR
;            0010-0000           0010-0000 FOR COMMUNICATION PROCESSOR
;*************************************************************************
TABLE_START LABEL WORD  ;THIS IS THE ADDRESS OF THIS TABLE
LINE_0_START      EQU   $     ; DEVICE 0 ** NOT USED
LINE_0_END  EQU    $
LINE_1_START      EQU   $     ; DEVICE 1 ** ANALOG OUTPUT
      DW    0           ; LINE 00 - SPDP   PORT DRIVE  SPEED
      DW    0           ; LINE 01 - DPDS   STARBORD DRIVE SPEED
      DW    0           ; LINE 02
      DW    0           ; LINE 03
LINE_1_END  EQU    $
LINE_2_START      EQU   $     ; DEVICE 2 ** ANALOG INPUT
      DW    0           ; LINE 00 - AMPS   VEHICLE CURRENT DRAW
      DW    0           ; LINE 01 - VOLTS  BATTERY VOLTAGE
      DW    0           ; LINE 02 - SPDHC  HAND CONTROL SPEED
```

```
        DW      0             ; LINE 03 - DIRHC  HAND CONTROL DIRECTION
        DW      0             ; LINE 04 - GUIDP  GUIDANCE SIGNAL PORT ANTENNA
        DW      0             ; LINE 05 - GUIDS  GUIDANCE SIGNAL STARBORD ANTENNA
        DW      0             ; LINE 06 - TACHS  TACH STARBORD DRIVE MOTOR
        DW      0             ; LINE 07 - TACHP  TACH PORT DRIVE MOTOR
LINE_2_END  EQU   $
LINE_3_START      EQU   $     ; DEVICE 3 ** COUNTERS
        DW      0             ; LINE 00 - ENCDST  STARBORD ENCODER
        DW      0             ; LINE 01 - ENCDPO  PORT ENCODER
        DW      0             ; LINE 02 - ENCDMST AVALIABLE
        DW      0             ; LINE 03 - ENCNOTUSED AVAILABLE
        DW      0             ; LINE 04 - ENCDSM  SUM COUNTER
        DW      0             ; LINE 05 - ENCDDF  DIFFERANCE COUNTER
LINE_3_END  EQU   $
LINE_4_START      EQU   $     ; DEVICE 4 ** DIGITAL INPUT
        DW      0             ; LINE 00 - IE-TOPE  STOP VEHICLE TOP
        DW      0             ; LINE 01 - IE-SPAR1 E STOP SPARE
        DW      0             ; LINE 02 - IE-SPAR2 E STOP SPARE
        DW      0             ; LINE 03 - IE-O/LP  E STOP PORT MOTOR OVERLOAD
        DW      0             ; LINE 04 - IE-O/LS  E STOP STARBOARD MOTOR OVERLOAD
        DW      0             ; LINE 05 - IE-PB    E STOP P.B.
        DW      0             ; LINE 06 - IE-BMPF  E STOP BUMPER FRONT
        DW      0             ; LINE 07 - IE-BMPB  E STOP BUMPER REAR
        DW      0             ; LINE 08 - IBRKS    BRAKES RELEASED
        DW      0             ; LINE 09 - IENBL    CONTROL HARDWARE ENABLED
        DW      0             ; LINE 10 - IFHAND   HAND CONTROLLER ENGAGED FRONT
        DW      0             ; LINE 11 - IRHAND   HAND CONTROLLER ENGAGED REAR
        DW      0             ; LINE 12
        DW      0             ; LINE 13
        DW      0             ; LINE 14
        DW      0             ; LINE 15
        DW      0             ; LINE 16
        DW      0             ; LINE 17
        DW      0             ; LINE 18
        DW      0             ; LINE 19
        DW      0             ; LINE 20
        DW      0             ; LINE 21
        DW      0             ; LINE 22
        DW      0             ; LINE 23
        DW      0             ; LINE 24
        DW      0             ; LINE 25
        DW      0             ; LINE 26
```

```
        DW     0          ; LINE 27
        DW     0          ; LINE 28
        DW     0          ; LINE 29
        DW     0          ; LINE 30
        DW     0          ; LINE 31
        DW     0          ; LINE 32 - IOVRW  ANTENNA IS OVER THE WIRE
        DW     0          ; LINE 33 - IMAGSF MAGNET SENSED STBD-FRONT
        DW     0          ; LINE 34 - IMAGPF MAGNET SENSED PORT-FRONT
        DW     0          ; LINE 35 - IMAGPB MAGNET SENSED PORT-BACK
        DW     0          ; LINE 36 - IMAGSB MAGNET SENSED STBD-REAR
        DW     0          ; LINE 37 - IWRXF1 WIRE CROSS F1
        DW     0          ; LINE 38 - IWRXF2 WIRE CROSS  F2
        DW     0          ; LINE 39 - IBKRC  DRIVE MOTOR BKR NOT TRIPPED
LINE_4_END  EQU    $
LINE_5_START      EQU    $      ; DEVICE 5 ** DIGITAL OUTPUT
        DW     0          ; LINE 00 - OPTF-n    FRONT-PORT CONTACTOR ENABLE
        DW     0          ; LINE 01 - OPTB-n    BACK-PORT CONTACTOR ENABLE
        DW     0          ; LINE 02 - OSBF-n    FRONT-STBD CONTACTOR ENABLE
        DW     0          ; LINE 03 - OSBB-n    BACK-STBD CONTACTOR ENABLE
        DW     0          ; LINE 04 - OTOPSS-n SELECT (OPTF/OPTB) FOR TOP
        DW     0          ; LINE 05
        DW     0          ; LINE 06 - OORIDE-n HANDCONTROL OVERRIDE
        DW     0          ; LINE 07 - OENBL-n  ENABLE HARDWARE
        DW     0          ; LINE 08 - OSPKR    SPEAKER DRIVE
        DW     0          ; LINE 09 - OPLE-n   PORTSIDE LIGHTS
        DW     0          ; LINE 10 - OSLT-n   STARBOARD LIGHTS ON
        DW     0          ; LINE 11 - OELT-n   E-STOP LIGHTS ON
        DW     0          ; LINE 12
        DW     0          ; LINE 13
        DW     0          ; LINE 14
        DW     0          ; LINE 15
        DW     0          ; LINE 16
        DW     0          ; LINE 17
        DW     0          ; LINE 18
        DW     0          ; LINE 19
        DW     0          ; LINE 20
        DW     0          ; LINE 21
        DW     0          ; LINE 22
        DW     0          ; LINE 23
        DW     0          ; LINE 24
        DW     0          ; LINE 25
        DW     0          ; LINE 26
```

```
      DW    0          ; LINE 27
      DW    0          ; LINE 28
      DW    0          ; LINE 29
      DW    0          ; LINE 30
      DW    0          ; LINE 31
      DW    0          ; LINE 32
      DW    0          ; LINE 33 - OSPKRF   SPEAKER FREQUENCY
      DW    0          ; LINE 34 - OWRXPD-n DISABLE PORTSIDE WIRE-X
      DW    0          ; LINE 35 - OWRXSD-n DISABLE STARBOARD WIRE-X
      DW    0          ; LINE 36 - OANTF-n  SELECT FRONT ANTENNA
      DW    0          ; LINE 37 - OGUIDM-n SELECT COMPUTER GUIDANCE
      DW    0          ; LINE 38 - OFREQ1-n SELECT F1
      DW    0          ; LINE 39 - ODACT-N  SELECT DRIVE TAC
      DW    0          ; LINE 40 - TIMMER FOR MOTION
      DW    0          ; LINE 41 - TIMMER FOR HCU
      DW    0          ; LINE 42 - TIMMER FOR SUB-SYSTEMS
      DW    0          ; LINE 43 - TIMMER FOR WATCH DOG
LINE_5_END  EQU   $
LINE_6_START      EQU   $     ; DEVICE 6  COMMUNICATIONS BOARD INTERRUPT
                       ; LINE 00 - SDLC-COMM NOT USED IN THE TABLES
      DW    0          ; LINE 01 - UMS - MAGNET SENSOR
LINE_6_END  EQU   $
LINE_7_START      EQU   $     ; DEVICE 7 ** NOT USED
LINE_7_END  EQU   $
TABLE_END   LABEL WORD  ;MARKS THE END OF THE TABLE
;**************************************************************
TQ1               DW    TASK_Q_SIZE + 4 DUP (?)       ;
TQ2               DW    TASK_Q_SIZE + 4 DUP (?)       ;
TQ3               DW    TASK_Q_SIZE + 4 DUP (?)       ; THIS STUFF
TQ4               DW    TASK_Q_SIZE + 4 DUP (?)       ; MUST STAY
TQ5               DW    TASK_Q_SIZE + 4 DUP (?)       ; TOGETHER
TQ6               DW    TASK_Q_SIZE + 4 DUP (?)       ;
;**************************************************************
VOLATILE_RAM_END  LABEL WORD  ;MARKS THE END OF USER RAM
$EJ   ;
;**********************************************************************
;    P E R M A N E N T   R A M   S T A R T
;**********************************************************************
COMMODE                 DB    0     ; COM
                  DB    0     ; PAD
DEBUG_CONFIG_DEF  DB          DEBUG_CONFIG_DEF_SIZE*5 DUP (0)
ERROR_VRBL        DW    0     ;VARIABLE, MAY BE USED FOR DEBUG
```

```
ERROR_CODE          DW      0       ;ERROR CODE FOR VSYSBUG
ERROR_DEVICE                DW      0       ;LAST ERROR DEVICE FROM DIO
ERROR_OFFSET                DW      0       ;FOR VSYSBUG
ERROR_SEGMENT               DW      0       ;FOR VSYSBUG
ERROR_STATUS                DW      0       ;LAST ERROR STATUS FROM DIO
FLAGS_SAVE          DW      0
MMSTAT                      DB      0       ; COM
                    DB      0       ; PAD
MODERR                      DW      0       ; COM
$EJ   ;
;**************************************************************************-
;     SPECIAL CASE       -      THIS MUST REMAIN TOGETHER              |
NON_TOKEN   LABEL WORD          ;THIS IS THE DEVICE + STATUS    |
STATUS              DB      0           ;DEVICE STATU                  |
DEVICE              DB      0           ;DEVICE NUMBER                 |
;**************************************************************************-
NON_TOKEN_BUFFER  DW 64 DUP (?)     ;RING BUFFER FOR NON_TOKENS FOUND
NON_TOKEN_POINTER DW    0       ;ADDRESS OF TOKEN BUFFER
OLD_LONG_STATUS_FLAG        DB      0       ; save long_status_flag after xmit
PCBYTE                      DW      0       ; PREVIOUS CONTROL BYTE
RCVADDR                     DB      0       ; SDLC RECEIVE ADDRESS
                    DB      0       ; PAD TO FULL WORD FOR HCU
RCVCONT                     DB      0       ; SDLC RECEIVE CONTROL BYTE
                    DB      0       ; PAD TO FULL WORD FOR HCU
RCVECNT                     DW      0       ; SDLC RECEIVE ERROR COUNTER
RCVECOD                     DB      0       ; SDLC RECEIVE ERROR CODE
RCVLEN                      DW      0       ; SDLC RECEIVE MESSAGE LENGTH
RCVMCNT                     DW      0       ; SDLC RECEIVE MESSAGE COUNTER
RCVPTR                      DW      0       ; SDLC RECEIVE BUFFER POINTER
                    DB      0       ; PAD TO FULL WORD FOR HCU
RETSEG                      DW      0       ; SAVE AREA FOR DIO CALLS
;STATUS                                     ; SEE NON_TOKEN
SUSPENDF            DB 10 DUP(?)            ; TASK SUSPENSION TABLE
;VCMD_LONG_STATUS DW     0       ; ORDINAL VALUE OF LONG STATUS GOES HERE
;VCMD_SHORT_STATUS          DW      0       ; ORDINAL VALUE OF SHORT STATUS GOES HERE
XMTADDR                     DB      0       ; SDLC TRANSMIT ADDRESS
                    DB      0       ; PAD TO FULL WORD FOR HCU
XMTCNT                      DW      0       ; COM
XMTCONT                     DB      0       ; SDLC TRANSMIT CONTROL BYTE
                    DB      0       ; PAD TO FULL WORD FOR HCU
XMTECNT                     DW      0       ; SDLC TRANSMIT ERROR COUNTER
XMTECOD                     DB      0       ; SDLC TRANSMIT ERROR CODE
```

```
                    DB      0       ; PAD TO FULL WORD FOR HCU
XMTPTR                      DW      0       ; SDLC TRANSMIT BUFFER POINTER
$EJ   ;
ERROR_8274                          DB      0
INTERRUPT_COUNT                   DB    0
STATUS_ERROR_8274                   DB      0
;***************************************************************************
;     SPECIAL CASE       -     THIS MUST STAY TOGETHER                       |
VEH_SHORT_STATUS        LABEL WORD  ;                    |
VEH_STATUS                          DW 40 DUP(?)    ; veh_short_status is first 4 bytes of
VEH_STATUS
LOAD_ID_NUMBER                    DW 20 DUP(?)      ;                        |
;***************************************************************************
;****************** THIS MARKS THE END OF THE DATA SEGMENT ***************
DATA  ENDS
$EJ   ;
;*************************************************************************
;     THIS MARKS THE START OF THE CODE SEGMENT
;*************************************************************************
V4INIT_CODE SEGMENT 'CODE'
      ASSUME CS:V4INIT_CODE, DS:DATA
;*************************************************************************
;     CONSTANTS HERE  ARE EMBEDED IN THE CODE SEGMENT
;*************************************************************************
;***************************************************************************
;     PROGRAM CONSTANTS
;***************************************************************************
;***************************************************************************
;     COMMUNICATIONS BOARD DEVICE ADDRESSES
;***************************************************************************
;THESE ARE DECLARED PUBLIC SO THAT THE V3COMT WILL KNOW WHERE THEY ARE DECLARED.
PUBLIC      COMM_INTERRUPT_STATUS
PUBLIC      SDLC_COMM_DEVICE
PUBLIC      COMM_MASTER_RESET
PUBLIC      COMM_ADDRESS
COMM_INTERRUPT_STATUS          DW     00000H      ;OUTPUT  TO  WATCHDOG  -  INPUT  FROM
INTERRUPTS
SDLC_COMM_DEVICE        DW     00004H      ;DEVICE #1
UMS_COMM_DEVICE                DW     00008H      ;DEVICE #2
NOT_USED1               DW     0000CH      ;DEVICE #3
NOT_USED2               DW     00010H      ;DEVICE #4
NOT_USED3               DW     00014H      ;DEVICE #5
```

```
NOT_USED4               DW     00018H      ;DEVICE #6
COMM_MASTER_RESET       DW     0001CH

COMM_ADDRESS                   DW     COMMSEG
;*****************************************************************************
;      DIO DEVICE ADDRESSES
;*****************************************************************************
WATCH_DOG_STATUS_DEVICE        DW     00000H
ANALOG_OUT_DEVICE       DW     00004H
ANALOG_IN_DEVICE        DW     00008H
ENCODER_IN_DEVICE       DW     0000CH
DISCRETE_IN_DEVICE             DW     00010H
DISCRETE_OUT_DEVICE            DW     00014H
NOT_USED                DW     00018H
DIO_MASTER_RESET        DW     0001CH
DIO_ADDRESS             DW     DIOSEG
RATIO_CONVRSN                  DQ     256.0
TASK_Q      LABEL WORD
      DW    OFFFFH             ;POSITION FOR A 'ZERO' TASK
      DW    TQ1         ;TASK QUEUE FOR TASK 1
      DW    TQ2         ;TASK QUEUE FOR TASK 2
      DW    TQ3         ;TASK QUEUE FOR TASK 3
      DW    TQ4         ;TASK QUEUE FOR TASK 4
      DW    TQ5         ;TASK QUEUE FOR TASK 5
      DW    TQ6         ;TASK QUEUE FOR TASK 6
$EJ   ;
;*************************************************************************
;     DEVICE OFFSETS ALLOWABLE TABLE
;*************************************************************************
VALID_LINE  LABEL WORD            ;START OF TABLE
      DB    (LINE_0_END-LINE_0_START)/2   ;NUMBER OF LINES ON DEVICE 0
      DB    (LINE_1_END-LINE_1_START)/2   ;NUMBER OF LINES ON DEVICE 1
      DB    (LINE_2_END-LINE_2_START)/2   ;NUMBER OF LINES ON DEVICE 2
      DB    (LINE_3_END-LINE_3_START)/2   ;NUMBER OF LINES ON DEVICE 3
      DB    (LINE_4_END-LINE_4_START)/2   ;NUMBER OF LINES ON DEVICE 4
      DB    (LINE_5_END-LINE_5_START)/2   ;NUMBER OF LINES ON DEVICE 5
      DB    (LINE_6_END-LINE_6_START)/2   ;NUMBER OF LINES ON DEVICE 6
      DB    (LINE_7_END-LINE_7_START)/2   ;NUMBER OF LINES ON DEVICE 7
LINE_TABLE  LABEL WORD            ;START OF TABLE
      DW    LINE_0_START - TABLE_START    ;OFFSET OF LINE 0 START
      DW    LINE_1_START - TABLE_START    ;OFFSET OF LINE 1 START
      DW    LINE_2_START - TABLE_START    ;OFFSET OF LINE 2 START
```

```
     DW    LINE_3_START - TABLE_START    ;OFFSET OF LINE 3 START
     DW    LINE_4_START - TABLE_START    ;OFFSET OF LINE 4 START
     DW    LINE_5_START - TABLE_START    ;OFFSET OF LINE 5 START
     DW    LINE_6_START - TABLE_START    ;OFFSET OF LINE 6 START
     DW    LINE_7_START - TABLE_START    ;OFFSET OF LINE 7 START
;************************************************************************
;     END OF CONSTANTS
;************************************************************************
$EJ   ;
;***************************************************************************
;     VSYSBUG           PROC  FAR
;
;     THIS PRUCEDURE IS USED TO RESOVE ALL SYSTEM BUGS ON THE VEHICLE WHICH
;     CANNOT BE RESOLVED IN ANY OTHER WAY.IT ALSO RESOLVES ANY UNRESOLVED
;     EXTERNAL REFERENCES CREATED BY THE PASCAL RUN TIME REQUIREMENTS.
;
;     IT ATTEMPTS TO STOP THE VEHICLE, SAVE THE ERRORS, AND RESTART AMX
;***************************************************************************
VSYSBUG          PROC  FAR
INVALID_INTERRUPT:
     CLI                         ;DISABLE INTERRUPTS
     MOV   ES, DIO_ADDRESS          ;LOAD THE DEVICE ADDRESS TO ES
     MOV   BX, DISCRETE_OUT_DEVICE ;ZERO BX FOR ADDRESSING
     MOV   CX, 500                  ;LOAD LOOP COUNTER
BUG10:
     MOV   DI, ES:[BX+1]            ;GET THE DEVICE STATUS
     AND   DI, 082H                 ;CHECK SEND BIT
     LOOPNZ      BUG10              ;LOOP IF COUNT NOT SATISIFIED
     MOV   BYTE PTR ES:[BX+1], 071H ;SET BIT 31 TO 1 - BREAK E CHAIN
       MOV     BP, SP               ;BP addressing
     MOV   AX, [BP+6]         ;GET new error code
     CMP   AX, 0              ;LOOK FOR WARM RESTART CODE(0)
     JNE   VSYSX              ;Normal error continue
     MOV   ERROR_CODE, AX           ;WARM RESTART: error Code to "0"
     JMP   SHORT BUG20        ;Restart exit
VSYSX:
     CMP   ERROR_CODE, 0            ;Already have error, do not overwrite
     JNE   BUG20              ;Restart exit IF ALREADY HAVE ERROR
     MOV   ERROR_CODE, AX           ;SAVE ERROR
     MOV   BX, [BP+0]         ;SAVE OFFSET
     MOV   ERROR_OFFSET, BX
     MOV   BX, [BP+2]         ;SAVE SEGMENT
```

```
     MOV   ERROR_SEGMENT, BX
     MOV   BX, [BP+4]         ;SAVE VARIABLE
     MOV   ERROR_VRBL, BX
     CMP   AX, ERROR_CODE_F001     ;LOOK FOR SEND TEST ERROR
     JE    BUG20              ;SKIP IF YES
     CMP   AX, ERROR_CODE_F002     ;LOOK FOR SEND TEST ERROR
     JE    BUG20              ;SKIP IF YES
     STI                      ;ENABLE INTERRUPTS
     CALL  VSYSBUG_ALARMS          ;CALL ALARM SETTING ROUTINES
     CLI                      ;DISABLE INTERRUPTS
BUG20:
     JMP   V186TC                  ;RESTART - INITIALIZE
VSYSBUG        ENDP
$EJ   ;
;***************************************************************************
;***************************************************************************
;     THIS IS THE REAL START OF THE VINIT CODE
;***************************************************************************
;***************************************************************************
VINIPROC    PROC           FAR
VINITC:
;************************************************************
;     ESTABLISH THE SEGMENT REGISTERS
;************************************************************
     MOV   AX, DATA
     MOV   DS, AX                        ;SET UP SEGMENT REG
     CLI                           ;DISABLE INTERRUPTS
;******************************************
;     CLEAR INTERRUPT MASK TABLE
;******************************************
     LEA   BX, TABLE_START               ;GET START ADDRESS OF TABLE
     LEA   DX, TABLE_END                 ;GET END ADDRESS OF TABLE
     MOV   AX, 0                   ;GET ZERO
ZLOOP:
     MOV   [BX], AX                ;ZERO WORD IN TABLE
     INC   BX                      ;BUMP TABLE POINTER
     INC   BX                      ;BUMP AGAIN FOR WORDS
     CMP   BX, DX                        ;SEE IF WE ARE DONE
     JL    ZLOOP                   ;GO BACK FOR MORE
$EJ   ;
;*******************************************
; RESET THE COMMUNICATIONS BOARD
```

```
;*******************************************
     MOV   SI, COMM_MASTER_RESET         ;OFFSET FOR RESET
     MOV   ES, COMM_ADDRESS        ;GET COMM ADDRESS
     MOV   CX, 500                       ;SET COUNTER
VIN51:
     MOV   ES:[SI], AL             ;SEND RESET
     LOOP  VIN51                   ;LOOP FOR A WHILE
;*******************************************
; RESET THE DIGITAL BOARD
;*******************************************
     MOV   SI, DIO_MASTER_RESET          ;OFFSET FOR RESET
     MOV   ES, DIO_ADDRESS               ;GET DIO ADDRESS
     MOV   CX, 500                       ;SET COUNTER
VIN50:
     MOV   ES:[SI], AL             ;SEND RESET
     LOOP  VIN50                   ;LOOP FOR A WHILE
;*******************************************
; SEE IF STATUS IS READY
;*******************************************
     MOV   BX, WATCH_DOG_STATUS_DEVICE   ;SET BX TO POINT AT STATUS
     MOV   CX, 0FFFFH              ;SET UP LOOP COUNTER
VIN60:
     MOV   AL, ES:[BX]             ;GET MASTER STATUS
     AND   AL, 8                   ;CHECK FOR DONE (OR FALSE)
     CMP   AL, 0
     LOOPNZ      VIN60                   ;LOOP IF NOT READY OR DONE
     JZ    VIN70                   ;SKIP IF READY
;**********************************
; DIGITAL BOARD WILL NOT INITIALIZE
;**********************************
     MOV   ERROR_DEVICE, BX        ;SAVE ERROR DEVICE ADDRESS
     XOR   AH, AH                        ;CLEAR TOP OF WORD
     MOV   ERROR_STATUS, AX        ;SAVE ERROR STATUS FROM 8742
     PUSH  ERROR_CODE_F000               ;SET UP ERROR CODE
     PUSH  0                       ;VARIABLE CODE
     CALL  VSYSBUG                       ;EXIT WITH BUG
VIN70:
;****************************************
; DIGITAL BOARD INITILIZED NOW
;  SET FILTER MASK ON DISCRETE INPUT
;****************************************
     MOV   BX, DISCRETE_IN_DEVICE        ;GET ADDRESS FOR INPUT DEVICE
```

```
     CALL  SEND_TEST
     MOV   BYTE PTR ES:[BX], 0          ;FIRST BYTE OF FILTER MASK
     CALL  SEND_TEST
     MOV   BYTE PTR ES:[BX], 0          ;SECOND BYTE OF FILTER MASK
     CALL  SEND_TEST
     MOV   BYTE PTR ES:[BX], 0          ;THIRD BYTE OF FILTER MASK
     CALL  SEND_TEST
     MOV   BYTE PTR ES:[BX], 0          ;FORTH BYTE OF FILTER MASK
     CALL  SEND_TEST
     MOV   BYTE PTR ES:[BX], 07FH       ;FIFTH BYTE OF FILTER MASK
;*****************************************************************************-
;    PRIME THE DYNAMIC RAM TEST LOCATIONS
;*****************************************************************************-
     MOV   AX, TEST_PATTERN        ;GET TEST PATTERN
     MOV   STEXE, AX          ;SAVE  ON EXECUTIVE STACK
     MOV   STINI, AX          ;SAVE ON INI STACK
     MOV   STHCU, AX          ;SAVE ON HCU STACK
     MOV   STCMD, AX          ;SAVE ON CMD STACK
     MOV   STACT, AX          ;SAVE ON ACT STACK
     MOV   STTRN, AX          ;SAVE ON TRN STACK
     MOV   STSUB, AX          ;SAVE ON SUB STACK
     MOV   STCOM, AX          ;SAVE ON COM STACK
     MOV   STTMR, AX          ;SAVE ON TIMER STACK
     MOV   STINT, AX          ;SAVE ON INTERRUPT STACK
     MOV   STBOT, AX          ;SAVE ON BOTTOM OF STACKS
;*****************************************************************************-
;    RESET THE SUSPEND TABLE SO THAT ALL TASKS ARE UNSPENDED
;*****************************************************************************-
     MOV   CX, 10                  ;SET UP TABLE COUNT
     XOR   AX, AX                  ;CLEAR AX
CT01:
     MOV   BX, CX
     MOV   SUSPENDF[BX-1], AL      ;CLEAR ENTRY
     LOOP  CT01
$EJ  ;
;*********************************************************************-
;    START UP ALL OF THE TASKS AND THEIR QUEUES
;*********************************************************************-
     MOV   DI, TASK_Q_SIZE         ;GET QUEUE SIZE
     MOV   AX, DS                  ;GET DS
     MOV   ES, AX                  ; INTO ES
     MOV   CX, 6              ;GET TASK COUNT
```

```
VIN100:
      MOV   DX, CX                    ;PUT THE TASK NUMBER IN DL
      MOV   AL, 2              ;SET QUEUE SIZE FOR 'WORD'
      MOV   CX, DI                    ;SET QUEUE LENGTH
      MOV   BX, DX                    ;GET TASK NUMBER
      SAL   BX, 1              ;CHANGE FOR WORD OFFSET IN TABLE
      MOV   BX, TASK_Q[BX]            ;GET START OFFSET OF TASK QUEUE
      CALL  AARSTL                    ;RESET LIST USED FOR QUEUE
      MOV   CX, DX                    ;GET TASK NUMBER
      LOOP  VIN100                    ;PROCESS NEXT TASK
      MOV   CX, 6              ;TASK COUNTER
      MOV   DX, 0              ;DX WILL CONTAIN TASK#
VIN105:
      INC   DX                 ;INCREMENT TASK NUMBER
      CALL  AATASK                    ;START UP THE TASK
      JNZ   VIN110                    ;JUMP IF CALL FAILED
      LOOP  VIN105                    ;MORE TASKS - LOOP
;********* ENABLE 80130 TO INTERRUPT FOR IR2 (80130 TIMER), IR3 (8274), *****
;********** AND IR1 (COMMUNICATION BOARD), IR0 (DI/O BOARD) ****************
      MOV   AL, 0F0H
      OUT   00E2H, AL          ;PORT: 80130 OPERATIONAL CONTROL WORD 1
                               ;DATA: UNMASK IR3, IR2, IR1, IR0
      RET                      ;RETURN FROM INITIALIZATION
VIN110:
      PUSH  ERROR_CODE_F203           ;AMX FAILURE TO INITILIZE TASK
      PUSH  0                  ;VARIABLE CODE
      CALL  VSYSBUG                   ;ERROR OUT
VINIPROC    ENDP
$EJ   ;;***************************************************************************
;     COMM  I N T E R U P T   H A N D L E R
;
;     THIS CODE IS ENTERED AS A RESULT OF AN INTERRUPT GENERATED BY THE
;     COMMUNICATIONS BOARD.  THE 8259 WILL EXECUTE A LONG CALL THROUGH THE VECTOR
;     LOCATED AT ADDRESS 0:EC.  THIS VECTOR IS GENERATED BY THE AMX
;     AAIPTR CALL MADE EARLER IN VINIT
;
;     THE THEORY IS AS FOLLOWS:
;
;     ALL INTERRUPTS COME TO THE INTERRUPT HANDLER
;
;     THE INTERRUPT HANDLER WILL EVALUATE THE INTERRUPT AND SEE IF THE
;     A TASK NEEDS TO BE CALLED - IF NOT IT WILL THROW THAT INTERRUPT AWAY.
```

```
;     IT WILL CONTINUE TO THROW AWAY INTERRUPTS (IF NO TASK IS INTERESTED)
;     UNTIL IT FINDS AN INTERRUPT WHICH HAS AN INTERESTED TASK.  THEN IT
;     WILL INVOKE THE INTERRUPT TASK.
;****************************************************************************
COMMIHC     PROC
      CALL  AAINT              ;SAVE REGS AND NOTIFY AMX
      MOV   AX, DATA           ;GET SEGMENT ADDRESS
      MOV   DS, AX                  ;MOVE INTO DS

;******************************************************
; WHAT CHIP ON THE COMMUNICATIONS BOARD JUST INTERRUPTED
;******************************************************
      MOV   ES, COMM_ADDRESS        ;GET COMM BOARD ADDRESS
      MOV   BX, COMM_INTERRUPT_STATUS     ;SET BX TO POINT TO STATUS
      MOV   BL, ES:[BX]             ;GET MASTER STATUS
      NOT   BL                      ;REVERSE BITS
      AND   BX, 0FH                       ;GET RID OF EXTRA BITS
      MOV   INTERRUPT_COUNT, 0
CIH02:
      INC   INTERRUPT_COUNT               ;INCREMENT INTERRUPT COUNT
      CMP   INTERRUPT_COUNT, 10           ;SEE IF TOO MANY INTERRUPTS
      JL    CIHX3                   ;JUMP IF OK TO CONTINUE
      PUSH  ERROR_CODE_FFFD               ;SET UP ERROR CODE
      PUSH  BX                      ;VARIABLE CODE
      CALL  VSYSBUG                       ;ERROR OUT
CIHX3:
      CMP   BL, 2
      JE    UMS_INT_PROC                  ;UMS INTERRUPT ON LINE 2
      CMP   BL, 3
      JE    SDLC_INT_PROC                 ;SDLC INT ON LINE 3
      JMP   CIHEXIT                       ;INCORRECT INT OR 0 MEANING END INTERRUPT
;JUMP HERE IF THE INTERRUPT WAS FROM THE SDLC COMMUNICATIONS
SDLC_INT_PROC:
;     THE INTERRUPT IS NOT CLEARED HERE IS IS CLEARED IN THE ACTUAL INTERRUPT
;      HANDLER.
      CALL  SDLCINT
      JMP   CIHEXIT

UMS_INT_PROC:
      SAL   BL, 2                   ;CONVERT TO AN ADDRESS
      MOV   BYTE PTR ES:[BX+1], 4         ;POINT TO THE FIFO OUTBOUND MAILBOX
      MOV   BYTE PTR ES:[BX+1], 0FEH      ;SEND   COMMAND   TO   CANCEL   INT   FORM
```

```
UMS-PROCESSOR
READ_MAILBOX:
      MOV   BYTE PTR ES:[BX+1], 6          ;POINT TO THE INBOUND MAILBOX REGISTER
      MOV   AL, ES:[BX+1]                  ;READ THE FIFO MAILBOX (COMMNAD ADDRESS)
      MOV   AL, ES:[BX]                    ;GET LSB DATA FROM FIFO BUFFER (DATA ADDRESS)
      MOV   AH, ES:[BX]                    ;GET MSB DATA FROM FIFO BUFFER (DATA ADDRESS)
      MOV   Y_UMS, AX               ;Pass data in arguement
      XOR   AX, AX                         ;OFFSET INTO THE TABLE IS 0
      MOV   STATUS, AL              ;Mail code in right byte of mail message
      MOV   DEVICE, UMS_TABLE_LINE_6       ;TABLE LOOKUP POSITION 6
      MOV   BL, UMS_TABLE_LINE_6*2         ;SET ON WORD BOUNDERIES NOT BYTE
;*********************************************
; GET BYTE FROM TABLE WHICH TELLS WHICH TASKS
; ARE INTERESTED IN THIS INTERRUPT
;*********************************************
      OR    DEVICE, 080H                   ;TURN ON NON-TOKEN BIT
      LEA   DI, LINE_TABLE                 ;GET FIRST LEVEL TABLE
      MOV   BX, CS:[BX][DI]                ;GET ADDRESS OF MAILBOX BYTE
;*********************************************
; GET LIST OF MAILBOXES WHICH ARE IN THE SAME
; ORDER AS THE BITS IN THE TABLE
;*********************************************
      LEA   DI, TABLE_START                ;GET TABLE START ADDRESS
      MOV   AL, [BX][DI]                   ;GET MAILBOX BYTE
      LEA   BX, DS:VINIMT                  ;LOAD TOKEN TABLE START
;*********************************************
; IF REMAINING BITS ARE ZERO THERE IS NO MORE
; TASKS TO NOTIFY
;*********************************************
CIH30:
      CMP   AL, 0                   ;SEE IF DONE
      JNE   CIH40
;*********************************************
; QUIT PROCESSING THIS INTERRUPT IF NO TASK IS
; INTERESTED
;*********************************************
      JMP SHORT   CIHEXIT                  ;LOOK FOR ANOTHER INTERRUPT

CIH40:
      INC   BX                      ;BUMP TOKEN TABLE POINTER
      INC   BX                      ;BUMP TOKEN TABLE POINTER
      CLC                           ;CLEAR CARY
```

```
     RCR   AL, 1                    ;ROTATE RIGHT THROUGH CARRY
     JNC   CIH30                    ;LOOP IF CARY BIT NOT SET
;***********************************************
; WE HAVE FOUND A BIT SET IN THE TABLE AND KNOW
; NOW WHICH TASK IS TO BE NOTIFIED OF THIS
; INTERRUPT
;***********************************************
     PUSH  AX                       ;SAVE
     PUSH  BX                       ;SAVE
;********************** 'C' compatable call *********************
     PUSH  NON_TOKEN                ;GET NON-TOKEN
     MOV   AX, [BX ]                ;GET TASK#
     PUSH  AX                       ; on stack
     CALL  FAR PTR SEND__MAIL             ;CALL TO SEND MESSAGE
     ADD   SP, 4H                         ;Restore SP
     POP   BX                       ;RESTORE
     POP   AX                       ;RESTORE
     JMP   CIH40                    ;TRY NEXT INTERRUPT
;***************************************
; WHAT DOES THE DIGITAL BOARD HAVE?
;***************************************
CIHEXIT:
     MOV   ES, COMM_ADDRESS         ;GET DIGITAL BOARD ADDRESS
     MOV   BX, COMM_INTERRUPT_STATUS      ;SET BX TO POINT TO STATUS
     MOV   BL, ES:[BX]              ;GET MASTER STATUS
     NOT   BL                       ;REVERSE BITS
     AND   BX, OFH                        ;GET RID OF EXTRA BITS
     CMP   BL, 07                         ;SEE IF INTERRUPT PENDING
     JNG   CIH200                         ;JUMP IF INTERRUPT PENDING
;************************************************************
;     BEFORE EXITING THE COMM HANDLER WE NEED   TO CLEAR 80130
;************************************************************
     MOV   AL, 061H                 ;RESET 80130
                                    ;      6 = EOI
                                    ;      0 = COMM BOARD INTERRUPT
     OUT   OEOH, AL                 ;OCW2 OF 80130
;***************************************
; NOW WHAT DOES THE DIGITAL BOARD HAVE?
;***************************************
     MOV   BX, COMM_INTERRUPT_STATUS      ;SET BX TO POINT TO STATUS
     MOV   BL, ES:[BX]              ;GET MASTER STATUS
     NOT   BL                       ;REVERSE BITS
```

```
     AND   BX, 0FH                          ;GET RID OF EXTRA BITS
     CMP   BL, 07                           ;SEE IF INTERRUPT PENDING
     JNG   CIH200                           ;JUMP IF INTERRUPTS PENDING
     CALL  AAINX                      ;RESTORE REGS AND INFORM AMX
     IRET                             ;RETURN TO INTERRUPTED TASK
CIH200:
     JMP   CIH02                      ;SKIP VECTOR - RANGE PROBLEM
COMMIHC    ENDP
SEJ ;
;*****************************************************************************
;    DIO I N T E R U P T   H A N D L E R
;
;    THIS CODE IS ENTERED AS A RESULT OF AN INTERRUPT GENERATED BY THE
;    DIGITAL BOARD.  THE 8259 WILL EXECUTE A LONG CALL THROUGH THE VECTOR
;    LOCATED AT ADDRESS 0:EC.  THIS VECTOR IS GENERATED BY THE AMX
;    AAIPTR CALL MADE EARLER IN VINIT
;
;    THE INTERRUPT HANDLER MUST DEAL WITH INTERRUPTS ON THE DIGITAL
;    BOARD.
;
;    THE THEORY IS AS FOLLOWS:
;
;    ALL INTERRUPTS COME TO THE INTERRUPT HANDLER
;
;    THE INTERRUPT HANDLER WILL EVALUATE THE INTERRUPT AND SEE IF THE
;    A TASK NEEDS TO BE CALLED - IF NOT IT WILL THROW THAT INTERRUPT AWAY.
;    IT WILL CONTINUE TO THROW AWAY INTERRUPTS (IF NO TASK IS INTERESTED)
;    UNTIL IT FINDS AN INTERRUPT WHICH HAS AN INTERESTED TASK.  THEN IT
;    WILL INVOKE THE INTERRUPT TASK.
;*****************************************************************************
DIOIHC     PROC
     CALL  AAINT             ;SAVE REGS AND NOTIFY AMX
     MOV   AX, DATA          ;GET SEGMENT ADDRESS
     MOV   DS, AX                  ;MOVE INTO DS
     XOR   AL, AL                  ;INITIALIZE COUNT TO ZERO
     MOV   INTERRUPT_COUNT, AL
;***************************************
; WHAT DOES THE DIGITAL BOARD HAVE?
;***************************************
     MOV   ES, DIO_ADDRESS               ;GET DIGITAL BOARD ADDRESS
     MOV   BX, WATCH_DOG_STATUS_DEVICE   ;SET BX TO POINT TO STATUS
     MOV   BL, ES:[BX]             ;GET MASTER STATUS
```

```
      NOT   BL                        ;REVERSE BITS
      AND   BX, 0FH                         ;GET RID OF EXTRA BITS
      CMP   BL, 07                          ;SEE IF INTERRUPT PENDING
      JLE   IH02                      ;INTERRUPT PENDING
      JMP   IHEXIT                          ;NO INTERRUPT - EXIT
IH02:
      INC   INTERRUPT_COUNT                 ;INCREMENT INTERRUPT COUNT
      CMP   INTERRUPT_COUNT, 10             ;SEE IF TOO MANY INTERRUPTS
      JL    IHX3                      ;JUMP IF OK TO CONTINUE
      PUSH  ERROR_CODE_FFFE                 ;SET UP ERROR CODE
      PUSH  0                         ;VARIABLE CODE
      CALL  VSYSBUG                         ;ERROR OUT
;**********************************************************************
;     LOOK FOR INVALID INTERRUPTS
;**********************************************************************
IHX3:
      CMP   BL, 0                     ;TEST FOR INTERRUPT 0
      JNE   IHT2                      ;SKIP IF NOT 0
;****************************************
; INTERRUPT 0 IS INVALID - ERROR OUT
;****************************************
      MOV   AX, ERROR_CODE_F100             ;SET UP INVALID INTERRUPT ERROR
IHT1:
      MOV   ERROR_CODE, AX                  ;SAVE ERROR CODE
      JMP   IHEXIT                          ;LOOK FOR ANOTHER INTERRUPT
IHT2:
;****************************************
; INTERRUPT 6 IS INVALID - ERROR OUT
;****************************************
      CMP   BL, 6                     ;TEST FOR INTERRUPT 6
      JNE   IHT3                      ;SKIP IF NOT 6
      MOV   AX, ERROR_CODE_F106             ;SET UP INVALID INTERRUPT ERROR
      JMP   IHT1                      ;EXIT
IHT3:
;****************************************
; INTERRUPT 7 IS INVALID - ERROR OUT
;****************************************
      CMP   BL, 7                     ;TEST FOR INTERRUPT 7
      JNE   IHT4                      ;EXIT
      MOV   AX, ERROR_CODE_F107             ;SET UP INVALID INTERRUPT ERROR
      JMP   IHT1                      ;EXIT
;*******************************************************
```

```
; THE BX REGISTER HAS THE DEVICE NUMBER WHICH INTERRUPTED
;      DEVICE #     DEVICE NAME
;      1      ANALOG OUT
;      2      ANALOG IN
;      3      ENCODER
;      4      DISCRETE IN
;      5      DISCRETE OUT
;*****************************************************
IHT4:
       MOV   DEVICE, BL              ;SAVE DEVICE NUMBER
       SAL   BL, 2                   ;CONVERT TO AN ADDRESS
;*****************************************************
; THE BX REGISTER HAS THE DEVICE ADDRESS WHICH INTERRUPTED
;      DEVICE #     DEVICE NAME
;
;       4h   ANALOG OUT  4d
;       8h   ANALOG IN   8d
;       Ch   ENCODER          12d
;      10h   DISCRETE IN 16d
;      14h   DISCRETE OUT     20d
;*****************************************************
;*****************************************************
;      SEND COMMAND TO THE DEVICE TO GIVE INTERRUPT
;      STATUS BACK
;*****************************************************
;      CLI                           ;DISABLE INTERRUPTS
       CALL  SEND_TEST
       MOV   BYTE PTR ES:[BX+1], 0FEH      ;SENT COMMAND FOR INT-DATA
IH03:
       MOV   AL, ES:[BX+1]                 ;READ DEVICE STATUS
       AND   AL, 1                   ;CHECK BUFFER READY
       CMP   AL, 0
       JE    IH03                    ;WAIT IF IT IS NOT READY
       MOV   AL, ES:[BX]             ;GET THE DATA
       STI                           ;RESTORE INTERRUPTS
;*****************************************************
; THE 8742 HAS NOW GIVEN THE INTERRUPT STATUS BYTE
;      THAT IS STORED IN THE AL REGISTER
;      THE BIT LAYOUT IS AS FOLLOWS
;           NNMMMMMM
;             NN     = GOING HIGH OR LOW
;             MMMMMM = DEVICE NUMBER
```

```
;*******************************************************
     MOV   AH, DEVICE              ;GET DEVICE BACK
     MOV   STATUS, AL              ;SAVE DEVICE DATA
;*******************************************************
;    THE STATUS IS SAVED FOR FUTURE USE
;          NOW LOOK UP THE DEVICE/LINE IN THE TABLE
;          TO FIND OUT WHICH TASKS (IF ANY) NEED TO
;          BE NOTIFIED OF THE INTERRUPT
;
;*******************************************************
     AND   AL, 03FH                ;MASK TOP 2 BITS AWAY
;********************************************
; LOG ALL DIGITAL BOARD INTERRUPTS WHICH
; MAKE IT TO HERE - SOME WILL NOT GET LOGED
;********************************************
     CALL  I_LOG                   ;LOG THE NON_TOKEN
;********************************************
; VALIDATE WHICH LINE INTERRUPTED
;********************************************
     SAR   BL, 2                   ;CONVERT TO DEVICE NUMBER
     LEA   DI, VALID_LINE                ;TABLE START ADDRESS
     CMP   CS:[BX][DI], AL               ;VALID LINE COUNT
     JNLE  IH20
;************************************************
; THIS INTERRUPT WILL BE IGNORED BECAUSE IT
; WAS NOT IN THE TABLE
;************************************************
     JMP SHORT   IHEXIT                  ;THIS INTERRUPT IS NOT IN TABLE
;************************************************
; GET BYTE FROM TABLE WHICH TELLS WHICH TASKS
; ARE INTERESTED IN THIS INTERRUPT
;************************************************
IH20:
     OR    DEVICE, 080H                  ;TURN ON NON-TOKEN BIT
     SAL   BL, 1                   ;CONVERT TO DEVICE ADDRESS
     LEA   DI, LINE_TABLE                ;GET FIRST LEVEL TABLE
     MOV   BX, CS:[BX][DI]               ;GET ADDRESS OF MAILBOX BYTE
     SAL   AL, 1                   ;SET DEVICE FOR WORD BOUNDRY
     ADD   BL, AL                        ;ADD LINE NUMBER TO ADDRESS
     MOV   AL, STATUS              ;GET DEVICE STATUS
     AND   AX, 080H                ;LOOK AT HIGH BIT
     CMP   AX, 0                   ;SEE IF IT IS HIGH TO LOW
```

```
     JNE   IH25                    ;SKIP IF IT IS NOT
     INC   BX                      ;SET FOR LOW TO HIGH BYTE
;***********************************************
; GET LIST OF MAILBOXES WHICH ARE IN THE SAME
; ORDER AS THE BITS IN THE TABLE
;***********************************************
IH25:
     LEA   DI, TABLE_START              ;GET TABLE START ADDRESS
     MOV   AL, [BX][DI]                 ;GET MAILBOX BYTE
     LEA   BX, DS:VINIMT                ;LOAD TOKEN TABLE START
;***********************************************
; IF REMAINING BITS ARE ZERO THERE IS NO MORE
; TASKS TO NOTIFY
;***********************************************
IH30:
     CMP   AL, 0                   ;SEE IF DONE
     JNE   IH40
;***********************************************
; QUIT PROCESSING THIS INTERRUPT IF NO TASK IS
; INTERESTED
;***********************************************
     JMP SHORT   IHEXIT                 ;LOOK FOR ANOTHER INTERRUPT

IH40:
     INC   BX                      ;BUMP TOKEN TABLE POINTER
     INC   BX                      ;BUMP TOKEN TABLE POINTER
     CLC                           ;CLEAR CARY
     RCR   AL, 1                   ;ROTATE RIGHT THROUGH CARRY
     JNC   IH30                    ;LOOP IF CARY BIT NOT SET
;***********************************************
; WE HAVE FOUND A BIT SET IN THE TABLE AND KNOW
; NOW WHICH TASK IS TO BE NOTIFIED OF THIS
; INTERRUPT
;***********************************************
     PUSH  AX                      ;SAVE
     PUSH  BX                      ;SAVE
;********************** 'C' compatable call *********************
     PUSH  NON_TOKEN               ;GET NON-TOKEN
     MOV   AX, [BX ]               ;GET TASK#
     PUSH  AX                      ; on stack
     CALL  FAR PTR SEND__MAIL           ;CALL TO SEND MESSAGE
     ADD   SP, 4H                       ;Restore SP
```

```
     POP   BX                       ;RESTORE
     POP   AX                       ;RESTORE
     JMP   IH40                     ;TRY NEXT INTERRUPT
;****************************************
; WHAT DOES THE DIGITAL BOARD HAVE?
;****************************************
IHEXIT:
     MOV   ES, DIO_ADDRESS                   ;GET DIGITAL BOARD ADDRESS
     MOV   BX, WATCH_DOG_STATUS_DEVICE   ;SET BX TO POINT TO STATUS
     MOV   BL, ES:[BX]              ;GET MASTER STATUS
     NOT   BL                       ;REVERSE BITS
     AND   BX, 0FH                           ;GET RID OF EXTRA BITS
     CMP   BL, 07                            ;SEE IF INTERRUPT PENDING
     JNG   IH200                    ;JUMP IF INTERRUPT PENDING
;************************************************
;    BEFORE EXITING THE DIO HANDLER WE NEED
;    TO CLEAR 80130 AND ALSO THE DIO BOARD
;************************************************
     MOV   AL, 060H                 ;RESET 80130
                                    ;      6 = EOI
                                    ;      0 = DIO INTERRUPT
     OUT   0E0H, AL                 ;OCW2 OF 80130
;****************************************
; NOW WHAT DOES THE DIGITAL BOARD HAVE?
;****************************************
     MOV   BX, WATCH_DOG_STATUS_DEVICE   ;SET BX TO POINT TO STATUS
     MOV   BL, ES:[BX]              ;GET MASTER STATUS
     NOT   BL                       ;REVERSE BITS
     AND   BX, 0FH                           ;GET RID OF EXTRA BITS
     CMP   BL, 07                            ;SEE IF INTERRUPT PENDING
     JNG   IH200                    ;JUMP IF INTERRUPTS PENDING
     CALL  AAINX                    ;RESTORE REGS AND INFORM AMX
     IRET                           ;RETURN TO INTERRUPTED TASK
IH200:
     JMP   IH02                     ;SKIP VECTOR - RANGE PROBLEM
DIOIHC     ENDP
$EJ   ;
;*********************************************************************---
;    R M X   I N T E R F A C E   R O U T I N E S
;    THIS CODE WAS WRITTEN FOR THE GWC PROJECT TO ALLOW THE PASCAL
;    APPLICATION CODE TO INTERFACE WITH RMX WITHOUT REGARD TO SOME
;    OF THE ESOTERICAL SYSTEM REQUIREMENTS.  IT SHIELDS THE APPLICATION
```

```
;     TASKS FROM ANY DOUBLE WORD POINTERS.  HOWEVER, EACH CALL IS
;     REQUIRED TO PASS A WORD TO BE USED AS THE RESULT.  THE INTERFACE
;     ROUTINES WILL CHECK THE RESULT AND THE APPLICATION TASK NEED
;     MAKE NO TESTS ON THE RESULT.
;     IT WAS LATER MODIFIED TO USE AMX RATHER THAN RMX
;     THE INTERFACE ROUTINE CALLS ARE AS FOLLOWS:
;
;        OBJECT_TOKEN = WAIT__MAIL (FROM_MAILBOX, WAIT_TIME, RESULT)
;                   SEND__MAIL (TO_MAILBOX, OBJECT_TOKEN, RESULT)
;
;     WAIT__MAIL
;           THIS FUNCTION WILL WAIT AT THE FROM_MAILBOX FOR THE
;           SPECIFIED WAIT TIME.  CONTROL IS PASSED TO THE TASK
;           WHEN AN OBJECT IS PLACED IN THE MAILBOX.  THE OBJECT
;           PLACED IN THE MAILBOX IS RETURNED AS THE OBJECT_TOKEN.
;
;     SEND__MAIL
;           THIS FUNCTION WILL PUT THE OBJECT_TOKEN INTO THE TO_MAILBOX.
;           IT IS USED TO SEND A MESSAGE TO ANOTHER TASK.
;
;     D A T A   D E F I N I T I O N S
;
;     OBJECT_TOKEN       WORD  THIS IS TYPICALLY A 'NON-TOKEN' USED TO
;                        EXCHANGE DATA AND CONTROL BETWEEN TASKS.
;                        IF THE OBJECT_TOKEN = 1 THEN A TIME-OUT
;                        OCCURED.  IF THE OBJECT TOKEN = 2 THEN
;                        A READ_COMPLETE OCCURED FROM THE TERMINAL
;                        HANDLER.
;
;     RESULT             WORD  THE OFFSET OF A WORD WHICH WILL BE USED BY
;                        THE INTERFACE ROUTINES AND RMX FOR THE RESULT
;                        OF THE RMX CALL.  THE CHECKING OF THIS BIT
;                        WILL (OR WILL NOT) BE CONTROLLED IN THE
;                        INTERFACE ROUTINES.
;
;     FROM_MAILBOX       WORD  THIS IS THE TOKEN OF 'YOUR' TASK'S MAILBOX.
;                        THIS TOKEN WOULD BE RETURNED FROM A LOOKUP.
;
;     WAIT_TIME    WORD  THIS IS A WORD WHICH WILL BE PASSED DIRECTIL
;                        TO RMX ON A GET MAILBOX.  NO WAIT IS ZERO.
;                        WAIT FOREVER IS OFFFFH.
;
```

```
;     TO_MAILBOX  WORD  THIS IS THE TOKEN OF SOMEONE ELSES MAILBOX.
;                       THIS TOKEN WOULD BE RETURNED FROM A LOOKUP.
;*********************************************************************---
$EJ   ;
;*********************************************************************---
;     WAIT__MAIL
;                                   BP+6
;     OBJECT_TOKEN = WAIT__MAIL ( WAIT_TIME)
;
;*********************************************************************---
WAIT__MAIL                      PROC  FAR
      PUSH  BP                  ;SAVE BP ON STACK
      MOV   BP, SP                    ;SET UP NEW BP
GM10:
      CALL  AAGETN                    ;GET RUNNING TASK'S NUMBER IN AX
      MOV   BX, AX                    ;SET IN INDEX REGISTER
      CMP   BYTE PTR SUSPENDF[BX], 0        ;SEE IF TASK IS SUSPENDED
      JNE   GM40                ;GO WAIT FOREVER IF SUSPENDED
      SAL   BX, 1               ;CHANGE TASK# TO A WORD OFFSET
      MOV   BX, TASK_Q[BX]            ;USE AS INDEX TO GET QUEUE ADDRESS
      MOV   AX, DS                    ;GET THE DATA SEGMENT OF QUEUE
      MOV   ES, AX                    ;SET POINTER TO QUEUE
      CLI                       ;DISABLE INTERRUPTS
      CALL  AARBL               ;REMOVE MAIL FROM TOP OF LIST
      JS    GM30                ;GO ATTEMPT TO WAIT IF NOTHING QUEUED
      MOV   AX, CX                    ;PUT MAIL IN AX FOR FUNCTION RETURN
GM20:
      STI                       ;ENABLE INTERRUPTS
      POP   BP                  ;RESTORE BP
      RET                       ;EXIT FROM PROCEDURE WITH MAIL IN AX
GM30:
      MOV   AX, 1               ;SET RETURN OF TIME-EXPIRED STATUS
      MOV   CX, [BP+6]          ;GET WAIT TIME
      CMP   CX, 0               ;LOOK FOR ZERO WAIT TIME
      JE    GM20                ;RETURN IF NO WAIT REQUESTED
      CMP   CX, 0FFFFH          ;LOOK FOR WAIT FOREVER
      JE    GM40                ;JUMP IF WAIT FOREVER
      CALL  AAWATM                    ;TIMED WAIT (CX=TIME)
      MOV   WORD PTR [BP+6], 0        ;SET NEXT WAIT TIME=0 TO FORCE RETURN
      JMP   GM10                ;GO CK SUSPENDF AND LOOK FOR MAIL AGAIN
GM40:
      CALL  AAWAIT                    ;WAIT FOREVER FOR WAKEUP
```

```
     JMP   GM10              ;GO CK SUSPENDF AND LOOK FOR MAIL AGAIN
WAIT__MAIL  ENDP
$EJ   ;
;*********************************************************************---
;     SEND__MAIL
;               BP+6       BP+8
;     SEND__MAIL (TO_MAILBOX, OBJECT_TOKEN)
;
;*********************************************************************---
SEND__MAIL                   PROC  FAR
     PUSH  BP                ;SAVE OLD BP
     MOV   BP, SP                  ;GET NEW BP
     MOV   CX, [BP+8]        ;GET THE OBJECT TOKEN
     MOV   BX, [BP+6]        ;GET THE TO-MAILBOX (TASK#)
     SAL   BX, 1             ;CONVERT TASK# TO WORD OFFSET
     MOV   BX, TASK_Q[BX]          ;GET TASK'S QUEUE OFFSET ADDRESS
     MOV   AX, DS                  ;GET SEGMENT OF TASK QUEUE
     MOV   ES, AX                  ;SET IN TO EXTRA SEGMENT
     CALL  AAATL             ;ADD TO TOP OF LIST
     JS    PM20              ;JUMP ON STACK OVERFLOW
     MOV   BX, [BP+6]        ;GET THE TASK# AGAIN
     CMP   BYTE PTR SUSPENDF[BX], 0 ;SEE IF RECIEVER IS SUSPENDED
     JNE   PM10              ;JUMP IF TASK IS SUSPENDED
     MOV   DX, BX                  ;GET TASK NUMBER IN DL
     CALL  AAWAKE                  ;WAKE UP OTHER TASK
PM10:
     POP   BP                ;RESTORE BP
     RET                     ;RETURN TO CALLER
PM20:
     PUSH  ERROR_CODE_F201         ;SET UP AAATL ERROR CODE
     PUSH  0                 ;VARIABLE CODE
     CALL  VSYSBUG                 ;EXIT WITH BUG MESSAGE
SEND__MAIL                   ENDP
$EJ   ;
;*********************************************************************---
;     PROCEDURE   SUSPEND
;
;                 THIS PROCEDURE IS AN EXTENSION OF THE AMX OPERATING
;                 SYSTEM.  IT ALLOWS A TASK TO BE SUSPENDED WHICH
;                 WILL HALT ALL EXECUTION OF THAT TASK UNTIL IT IS
;                 "RESUMED" (SEE RESUME)
;
```

```
;     CALL  SUSPEND (LEVEL, TASK_#, TIME)
;
; BP+6            LEVEL THIS IS A BYTE OF BITS.  EACH BIT POSITION REPRESENTS
;                 A DIFFERENT LEVEL.  YOU ARE ALLOWED TO USE THIS BYTE
;                 AS YOU SEE FIT.  NO TEST ARE MADE WITH THE BITS.
;                 THEY ARE SIMPLY OR-ed INTO THE STATUS FOR THAT TASK.
;                 THE TASK CANNOT RESUME UNTIL ALL THE BITS ARE ZERO.
;
; BP+8            TASK_#      THE TASK NUMBER TO BE SUSPENDED.  THIS INFORMATION
;                 IS EVOLVED FROM THE RMX MAILBOX TOKEN CONCEPT WHICH
;                 WAS USED EARLER.  THE VARIABLE NAMES ARE VxxxMT
;                 WHERE xxx IS THE MNEMONIC FOR THE TASK.  IF THE
;                 TASK WHICH CALLS SUSPEND IS THE SAME TASK WHICH
;                 IS TO BE SUSPENDED--IT WILL BE SUSPENDED AND HANG
;                 WITHOUT RETURNING.  IF YOU SUSPEND ANOTHER TASK
;                 THE FLAGS WILL BE SET AND CONTROL WILL RETURN
;                 WITHOUT WAITING.
;
; BP+10           TIME  IS THE NUMBER OF SYSTEM CLOCK TICKS TO KEEP THE
;                 THE TASK SUSPENDED.  IF TIME=0FFFFH THEN THE SUSPEND
;                 WILL SLEEP FOREVER-OR UNTIL SOME OTHER TASK CALLS
;                 THE RESUME.
;**********************************************************************--
SUSPEND           PROC            FAR
      PUSH  BP                  ;SAVE CALLER'S BP
      MOV   BP, SP                    ;SET BP TO STACK FRAME
      MOV   BX, [BP+8]          ;GET TASK_# FROM STACK
      MOV   AX, [BP+6]          ;GET LEVEL FROM STACK
      OR    SUSPENDF[BX], AL    ;TURN ON ANY NEW BITS
      CALL  AAGETN                    ;GET CALLING TASK'S NUMBER
      CMP   AX, BX                    ;SEE IF CALLER IS TO BE SUSPENDED
      JNE   SUS20               ;SKIP WAITING IF IT IS
      MOV   CX, [BP+10]         ;GET WAIT TIME
      CMP   CX, 0FFFFH          ;SEE IF WAIT TIME IS 0FFFFH
      JE    SUS10               ;SKIP IF WAIT=FFFF
      CALL  AAWATM                    ;WAIT FOR SYSTEM CLOCK TO EXPIRE
      JMP SHORT   SUS20         ;GO TO EXIT
SUS10:
      CALL  AAWAIT                    ;SLEEP FOREVER IF TIME=FFFF
SUS20:
      POP   BP                  ;RESTORE OLD BP
      RET                       ;RETURN C WILL CLEAN UP THE STACK
```

```
SUSPEND         ENDP
$EJ   ;
;*******************************************************************--
;     PROCEDURE   RESUME
;
;                 THIS PROCEDURE WILL UNDO THE EFFECT OF SUSPEND.
;                 THE PURPOSE IS TO START UP A TASK WHICH WAS
;                 PREVIOUSLY SUSPENDED
;
;     CALL  RESUME      (LEVEL, TASK_#)
;
; BP+6            LEVEL THIS IS A BYTE OF BITS.  EACH BIT POSITION REPRESENTS
;                 A DIFFERENT LEVEL.  YOU ARE ALLOWED TO USE THIS BYTE
;                 AS YOU SEE FIT.  NO TEST ARE MADE WITH THE BITS.
;                 THEY ARE SIMPLY AND-ed INTO THE STATUS FOR THAT TASK.
;                 THE TASK CANNOT RESUME UNTIL ALL THE BITS ARE ZERO.
;
; BP+8            TASK_#      THE TASK NUMBER TO BE RESUMED.  THIS INFORMATION
;                 IS EVOLVED FROM THE RMX MAILBOX TOKEN CONCEPT WHICH
;                 WAS USED EARLER.  THE VARIABLE NAMES ARE VxxxMT
;                 WHERE xxx IS THE MNEMONIC FOR THE TASK.
;
;           ERRORS  FFFF(-1) AMX invalid task#
;                 FFFA(-6) AMX task not waiting
;                 0 Call completed without error
;*******************************************************************--
RESUME          PROC                FAR
      PUSH  BP                  ;SAVE CALLER'S BP
      MOV   BP, SP                    ;POINT BP TO STACK FRAME
      MOV   BX, [BP+8]          ;GET TASK_# FROM STACK
      MOV   AX, [BP+6]          ;GET LEVEL FROM STACK
      NOT   AX                  ;REVERSE THE BITS
      AND   SUSPENDF[BX], AL  ;TURN OFF LEVEL(MASK) BITS
      CMP   BYTE PTR SUSPENDF[BX], 0 ;IS TASK RESUME COMPLETE?
      JNE   RES10               ;JUMP IF NOT COMPLETE RESUME STATUS
      MOV   DL, BL                    ;SET UP TASK NUMBER
      CALL  AAWAKE                    ;WAKE UP SLEEPING TASK
RES10:
      POP   BP                  ;RESTORE BP
      RET                       ;RETURN C WILL CLEAN UP THE STACK
RESUME          ENDP
$EJ   ;
```

```
;+**********************************************************************-+
;    D I G I T A L   I / O   I N T E R F A C E   R O U T I N E S
;
;    THIS CODE WAS WRITTEN FOR THE GWC PROJECT TO CREATE A COMMON
;    INTERFACE TO THE DIGITAL I/O BOARD.  NOT ALL THE FUNCTIONS OF
;    THAT BOARD ARE SUPPORTED HERE.  THIS IS INTENDEDED TO BE ONLY
;    THE SUBSET REQUIRED TO IMPLEMENT THE VEHICLE CONTROL.
;
;    THE NAMING CONVENTION IS AS FOLLOWS:
;        (1)     ACTION VERB
;              (A) GET
;              (B) PUT
;              (C) SET
;        (2) EFFECTIVE WIDTH (IF INCLUDED)
;              (A) BIT
;              (B) BYTE
;              (C) [OMITED]
;        (3) REFERENCED DEVICE
;              (A) ENCODER_INPUT
;              (B) DISCRETE_INPUT
;              (C) ANALOG_INPUT
;              (D) DISCRETE_OUTPUT
;              (E) ANALOG_OUTPUT
;
;    THERE ARE THREE TYPES OF COMMANDS WHICH ARE SUPPORTED HERE.
;    THEY CAN BE RECOGNIZED BY THE ACTION VERB AT THE BEGINING OF
;    THE PROCEDURE NAME.  THE VERBS AND THEIR MEANING ARE AS FOLLOWS:
;        (1) GET
;          THE GET FUNCTIONS ARE USED TO READ THE VALUE OF THE REFERENCED
;          DEVICE.  THE DEVICES FROM WHICH DATA CAN BE GOTTEN INCLUDE:
;
;              (A) ENCODER INPUT
;              (B) DISCRETE INPUT (BIT AND BYTE WIDE)
;              (C) ANALOG INPUT
;
;        (2) PUT
;          THE PUT FUNCTIONS ARE USED TO PUT VALUES TO THE REFERENCED
;          DEVICES.  THE DEVICES TO WHICH DATA CAN BE PUT INCLUDE:
;
;              (A) DISCRETE OUTPUT (BIT AND BYTE WIDE)
;              (B) ANALOG OUTPUT
;
```

```
;        (3) SET
;          THE SET FUNCTIONS ALLOW THE DEVICES TO BE SETUP FOR INTERRUPTS.
;          THE DEVICES WHICH INTERRUPT INCLUDE:
;
;              (A) ENCODER INPUT
;              (B) DISCRETE INPUT (BIT AND BYTE WIDE)
;              (C) DISCRETE OUTPUT (BIT WIDE ONLY)
;              (D) ANALOG INPUT
;              (E) ANALOG OUTPUT
;
;    E X C E P T I O N S * * * * * * * * * * * * * * * * * * * * * * *
;
;    THE ENCODER HAS SOME SPECIAL CONSIDERATIONS.  THE FOLLOWING TWO
;    INTERFACES ARE USED TO OPERATE THE SPECIAL TIMMER FUNCTIONS WITH
;    THE ENCODER.
;        (1)     PUT_SPECIAL_TIMMER
;        (2) GET_SPECIAL_TIMMER
;
;    REGISTER CONVENTIONS - PROGRAMMER INFORMATION
;
;    BX    SET TO 0 FOR OFFSET REGISTER TO ADDRESS DIO BOARDD
;    DI    USED TO TEST DEVICE READY (COMMAND_READY AND DATA_READY)
;    ES    HOLDS THE DEVICE ADDRESS - LOADED BY PROLOGUE
;
;          REVISIONS:
;
;          DAVE MADSEN - 17 APRIL 1984
;+***************************************************************************---+
SEJ  ;
;*************************************************************************
;    FUNCTION NAME:    GET_ENCODER
;
;    DESCRIPTION:      GET DATA FROM THE ENCODER
;
;    INPUT PARAMETERS
;[CL]      0 [BP+6]    ADDRESS    [0-2] ADDRESS OF SPECIFIED COUNTER
;
;    OUTPUT PARAMETERS - THIS IS A FUNCTION
;          3 BYTES [24 BITS]
;*************************************************************************
GET_ENCODER                PROC  FAR
```

```
     %PROLOGUE( ENCODER_IN_DEVICE )
     MOV   AX, [BP+6]
     AND   AL, 00Fh           ;CLEAR THE UPPER NIBBLE
     OR    AL, 0C0h           ;OR IN THE READ COMMAND TO THE 8742
     MOV   ES:[BX+1], AX            ;SEND THE COMMAND TO THE ENCODER 8742
     CALL  RECEIVE_TEST
     MOV   AL, ES:[BX]              ;DATA_ADDRESS - SEND BYTE 1 PARAMETER
     CALL  RECEIVE_TEST
     MOV   AH, ES:[BX]              ;DATA_ADDRESS - SEND BYTE 2 PARAMETER
     MOV   [BP-6], AX         ;SAVE THE FIRST 2 BYTES ON THE UNUSED PART OF THE STACK
     CALL  RECEIVE_TEST
     MOV   AL, ES:[BX]              ;DATA_ADDRESS - SEND BYTE 3 PARAMETER
     CBW
     MOV   [BP-4], AX         ;SAVE THE THIRD AND THE SIGN EXTENDED BYTES ON THE STACK
     FILD  DWORD PTR [BP-6]   ;LOAD THE INTEGER (4 BYTES) INTO THE FLOATING POINT
PROCESSOR
     WAIT
     %EPILOGUE
GET_ENCODER                   ENDP
SEJ   ;
;***************************************************************************
;     FUNCTION NAME:     GET_BIT_DISCRETE_IN
;
;     DESCRIPTION:       GET ONE BIT OF DATA FROM THE DISCRETE INPUT
;                  PROCESSOR
;     INPUT PARAMETERS
;          [AL]       0 [BP+6]     ADDRESS     [0-39]      ADDRESS OF SPECIFIED BIT
;     OUTPUT PARAMETERS - THIS IS A FUNCTION
;          BYTE [0, 1]
;***************************************************************************
GET_BIT_DISCRETE_IN                 PROC  FAR
     %PROLOGUE( DISCRETE_IN_DEVICE )
     MOV   AX, [BP+6]         ;GET FIRST PARAMETER
     AND   AL, 03FH           ;MASK OFF EXTRA BITS-SETUP COMMAND
     MOV   ES:[BX], AL        ;SEND COMMAND  DATA_ADDRESS
     CALL  RECEIVE_TEST
     MOV   AL, ES:[BX]              ;DATA_ADDRESS - SET UP RETURN BYTE
     XOR   AH, AH
     %EPILOGUE
GET_BIT_DISCRETE_IN                 ENDP
;***************************************************************************
;     FUNCTION NAME:     GET_BYTE_DISCRETE_IN
```

```
;
;     DESCRIPTION:       GET ONE BYTE FROM THE DISCRETE INPUT PROCESSOR
;
;     INPUT PARAMETERS
;[AL]      0 [BP+6]     ADDRESS     [0-4] ADDRESS OF SPECIFIED BYTE
;
;     OUTPUT PARAMETERS - THIS IS A FUNCTION
;           BYTE FROM 8742
;
;**********************************************************************
GET_BYTE_DISCRETE_IN                PROC  FAR
      %PROLOGUE( DISCRETE_IN_DEVICE )
      MOV   AX, [BP+6]        ;GET FIRST PARAMETER
      AND   AL, 7             ;MASK OF EXTRA BITS
      OR    AL, 030H                ;SETUP COMMAND
      MOV   ES:[BX], AL       ;SEND COMMAND - DATA_ADDRESS
      CALL  RECEIVE_TEST
      MOV   AL, ES:[BX]             ;DATA_ADDRESS - SETUP RETURN BYTE
      XOR   AH, AH
      %EPILOGUE
GET_BYTE_DISCRETE_IN                ENDP
$EJ   ;
;**********************************************************************
;     FUNCTION NAME:    GET_BIT_DISCRETE_OUT
;
;     DESCRIPTION:      GET ONE BIT OF DATA FROM THE DISCRETE OUTPUT
;                 PROCESSOR
;
;     INPUT PARAMETERS
;[AL]      0 [BP+6]     ADDRESS     [0-44]     ADDRESS OF SPECIFIED BIT
;
;     OUTPUT PARAMETERS - THIS IS A FUNCTION
;           BYTE [0, 1]
;
;**********************************************************************
GET_BIT_DISCRETE_OUT                PROC  FAR
      %PROLOGUE( DISCRETE_OUT_DEVICE )
      MOV   AX, [BP+6]        ;GET FIRST PARAMETER
      AND   AL, 03FH                ;MASK OFF EXTRA BITS-SETUP COMMAND
      MOV   ES:[BX], AL       ;SEND COMMAND - DATA_ADDRESS
      CALL  RECEIVE_TEST
      MOV   AL, ES:[BX]             ;DATA_ADDRESS - SET UP RETURN BYTE
```

```
     XOR   AH, AH
     %EPILOGUE
GET_BIT_DISCRETE_OUT              ENDP
;*************************************************************************
;    FUNCTION NAME:    GET_BYTE_DISCRETE_OUT
;
;    DESCRIPTION:      GET ONE BYTE FROM THE DISCRETE OUTPUT PROCESSOR
;
;    INPUT PARAMETERS
;[AL]      0 [BP+6]     ADDRESS     [0-5] ADDRESS OF SPECIFIED BYTE
;
;    OUTPUT PARAMETERS - THIS IS A FUNCTION
;          BYTE FROM 8742
;
;*************************************************************************
GET_BYTE_DISCRETE_OUT             PROC  FAR
     %PROLOGUE( DISCRETE_OUT_DEVICE )
     MOV   AX, [BP+6]        ;GET FIRST PARAMETER
     AND   AL, 7             ;MASK OF EXTRA BITS
     OR    AL, 030H                ;SETUP COMMAND
     MOV   ES:[BX], AL       ;SEND COMMAND - DATA_ADDRESS
     CALL  RECEIVE_TEST
     MOV   AL, ES:[BX]             ;DATA_ADDRESS - SETUP RETURN BYTE
     XOR   AH, AH
     %EPILOGUE
GET_BYTE_DISCRETE_OUT             ENDP
$EJ  ;
;*************************************************************************
;    FUNCTION NAME:    GET_ANALOG_IN
;
;    DESCRIPTION:      GET BYTE OF DATA FROM THE ANALOG INPUT DEVICE
;
;    INPUT PARAMETERS
;[AL]      0 [PB+6]     ADDRESS     [0-15]     ADDRESS OF SPECIFIED CHANNEL
;
;    OUTPUT PARAMETERS - THIS IS A FUNCTION
;          BYTE OF DATA FROM 8742
;
;*************************************************************************
GET_ANALOG_IN                     PROC  FAR
     %PROLOGUE( ANALOG_IN_DEVICE )
     MOV   AX, [BP+6]        ;GET FIRST PARAMETER
```

```
     AND   AL, 0FH                 ;MASK OFF EXTRA BITS-SETUP COMMAND
     MOV   ES:[BX], AL       ;SEND COMMAND - DATA_ADDRESS
     CALL  RECEIVE_TEST
     MOV   AL, ES:[BX]             ;DATA_ADDRESS - SETUP RETURN BYTE
     XOR   AH, AH
     %EPILOGUE
GET_ANALOG_IN                      ENDP

;*************************************************************************
;     FUNCTION NAME:    GET_ANALOG_OUT
;
;     DESCRIPTION:      GET BYTE OF DATA FROM THE ANALOG OUTPUT DEVICE
;
;     INPUT PARAMETERS
;[AL]      0 [BP+6]     ADDRESS     [0-3] ADDRESS OF SPECIFIED CHANNEL
;
;     OUTPUT PARAMETERS - THIS IS A FUNCTION
;          BYTE OF DATA FROM 8742
;
;       CHANGED ON JAN 10 BY LBC TO ALLOW TALKING TO THE NEW DIO/DS5000
;        BOARD.
;*************************************************************************
GET_ANALOG_OUT                     PROC  FAR
     PUSH  BP                ;SAVE THE CURRENT BASE POINTER
     MOV   BP, SP                  ;SET BP TO CURRENT SP FOR BP ADDRESSING
     MOV   ES, DIO_ADDRESS         ;LOAD THE DEVICE ADDRESS TO ES
     MOV   BX, ANALOG_OUT_DEVICE   ;LOAD THE DEVICE (BOARD) OFFSET
     MOV   CX, 500                 ;Set I/O error timeout count
     CLI                     ;DISABLE INTERRUPTS
BZ_CHK_GAO:
     MOV   BYTE PTR ES:[BX+1], 4   ;POINT TO THE MAIL BOX REGISTER
     CMP   BYTE PTR ES:[BX+1], 0   ;WAIT TIL FIFO SEND MAILBOX AVAILABLE
     JZ    RDY_GAO                 ;Mailbox available?
     LOOP  BZ_CHK_GAO        ;IF real TIMEOUT, send will error to vsysbug
     ;SAVE THE MAILBOX STATUS FOR DEBUGGING
     MOV   BYTE PTR ES:[BX+1], 4   ;POINT TO THE MAIL BOX REGISTER
     MOV   AH, ES:[BX+1]
     PUSH  ERROR_CODE_F010
     PUSH  AX
     CALL  VSYSBUG           ;DEVICE NOT READY
RDY_GAO:
     MOV   AX, [BP+6]        ;GET THE FIRST PARAMETER (COMMAND BYTE) FROM THE STACK
```

```
     MOV   BYTE PTR ES:[BX+1], 4    ;POINT TO THE MAIL BOX REGISTER
     MOV   ES:[BX+1], AL            ;SEND THE COMMAND BYTE TO THE FIFO MAIL BOX

     MOV   CX, 500
CHECK_EMPTY:
     MOV   AL, ES:[BX+1]            ;READ FIFO STATUS REGISTER
     AND   AL, 020H          ;CHECK EMPTY BIT IN THE STATUS REGISTER
     JZ    READ_BYTE         ;IF EMPTY BIT IS SET CONTINUE TO LOOP TILL DATA IN THE
BUFFER
     LOOP  CHECK_EMPTY       ;LOOP 500 TIMES OR UNTIL THE EMPTY BIT IS NOT SET.
                 ;THE DEVICE MUST HAVE DIED OR SOMETHING, CALL VSYSBUG
                 ; TO LET IT KNOW SOMETHING IS NOT RIGHT.
     MOV    AH, ES:[BX+1]           ;READ THE STATUS REGISTER
     MOV   ERROR_DEVICE, BX  ;SAVE THE DEVICE ADDRESS
     MOV   ERROR_STATUS, AX  ;SAVE THE STATUS REGISTER FROM THE FIFO
     PUSH  ERROR_CODE_F003          ;PUSH ERROR CODE
     PUSH  AX                ;PUSH ANY DATA READ FROM THE FIFO
     CALL  VSYSBUG                  ;EXIT WITH ERROR NO RETURN
READ_BYTE:
     MOV   AL, ES:[BX]       ;DATA IS IN BUFFER - READ DATA IN
     XOR   AH,AH             ;CLEAR THE HIGH BYTE THE DS5000 WILL SEND BACK AN 'FF'
                             ; IN 'AH' TO SIGNAL AN ERROR ON HIS SIDE.
     MOV   DH, ES:[BX+1]            ;READ THE FIFO STATUS REGISTER
     AND   DH, 020H          ;CHECK EMPTY BIT IN THE STATUS REGISTER
     JNZ   END_GET_ANALOG_OUT       ;IF EMPTY IS SET - RETURN
;    MOV   AH, ES:[BX]       ;IF DATA IS IN THE BUFFER THERE WAS SOMETHING WRONG
                             ;

END_GET_ANALOG_OUT:
     STI                     ;ENABLE INTERRUPTS
     POP   BP                ;RESTORE BP
     RET

GET_ANALOG_OUT                      ENDP
$EJ   ;
;***************************************************************************
;    PROCEDURE NAME:   PUT_BIT_DISCRETE_OUT
;
;    DESCRIPTION:      PUT ONE BIT OUT TO THE DISCRETE OUTPUT PROCESSOR
;
;    INPUT PARAMETERS
;[CL]       0 [BP+6]     ADDRESS     [0-39]      ADDRESS OF SPECIFIED BIT
```

```
;[AL]       1 [PB+8]      ACTION       [0, 1]      BYTE OF ZERO OR NOT ZERO
;*************************************************************************
PUT_BIT_DISCRETE_OUT                  PROC  FAR
      %PROLOGUE( DISCRETE_OUT_DEVICE )
      MOV   AX, [BP+8]        ;GET SECOND PARAMETER
      MOV   CX, [BP+6]        ;GET ADDRESS PARAMETER
      AND   CL, 03FH          ;MASK AWAY EXTRA BITS
      CMP   AL, 0             ;TEST COMMAND
      JZ    PBDO20                  ;SKIP IF ZERO
      OR    CL, 040H          ;SET BIT COMMAND
PBDO20:
      MOV   ES:[bx+1], CL           ;SEND COMMAND - COMMAND_ADDRESS
      %EPILOGUE
PUT_BIT_DISCRETE_OUT                  ENDP
;*************************************************************************
;     PROCEDURE NAME:   PUT_BYTE_DISCRETE_OUT
;
;     DESCRIPTION:      PUT ONE BYTE TO THE DISCRETE OUTPUT PROCESSOR
;
;     INPUT PARAMETERS
;[CL]       0 [BP+6]      ADDRESS      [0-4] ADDRESS OF SPECIFIED BYTE
;[DL]       1 [BP+8]      MASK-1             BYTE WITH A ONE IN EACH BIT POSITION
;                         WHICH WILL BE EFFECTED
;[AL]       2 [BP+10]     MASK-2             BYTE WITH BITS SET TO ONE OR ZERO IN
;                         THE POSITION INDICATED IN MASK-1.
;*************************************************************************
PUT_BYTE_DISCRETE_OUT                 PROC  FAR
      %PROLOGUE( DISCRETE_OUT_DEVICE )
      MOV   AX, [BP+10]       ;GET THIRD PARAMETER
      MOV   AH, AL                  ;COPY STATUS TO ANOTHER PLACE
      NOT   AH                ;CREATE COMPLMENT [BITS TO CLEAR]
      MOV   DX, [BP+8]        ;GET MASK-1
      MOV   CX, [BP+6]        ;GET ADDRESS
      AND   CL, 7             ;MASK AWAY EXTRA BITS
      MOV   CH, CL                  ;SAVE ADDRESS
      AND   AH, DL                  ;GET BITS TO CLEAR
      JZ    PBYTDO5                 ;SKIP IF NO BITS TO CLEAR
      OR    CH, 030H                ;SET UP COMMAND
      MOV   ES:[bx+1], CH           ;SEND THE COMMAND - COMMAND_ADDRESS
      CALL  SEND_TEST
      MOV   ES:[BX], AH       ;SEND PARAMETER - CLEAR DATA_ADDRESS
PBYTDO5:
```

```
     AND   AL, DL                    ;GET BITS TO SET
     JZ    PBYTD08                   ;SKIP IF NO BITS TO SET
     CALL  SEND_TEST
     OR    CL, 070H           ;SET SET BIT COMMAND
     MOV   ES:[bx+1], CL             ;SEND COMMAND - COMMAND_ADDRESS
     CALL  SEND_TEST
     MOV   ES:[BX], AL               ;SEND PARAMETER TO SET DATA_ADDRESS
PBYTD08:
     %EPILOGUE
PUT_BYTE_DISCRETE_OUT               ENDP
SEJ   ;
;************************************************************************
;     PROCEDURE NAME:   PUT_ANALOG_OUT
;
;     DESCRIPTION:      PUT ONE BYTE OF DATA TO THE ANALOG OUTPUT
;                 DEVICE
;
;     INPUT PARAMETERS
;[CL]       0 [BP+6]     ADDRESS     [0-3] ADDRESS OF SPECIFIED CHANNEL
;[AL]       1 [BP+8]     VALUE [BYTE]       THIS VALUE WILL BE WRITTEN TO THE
;                             DEVICE
;************************************************************************
PUT_ANALOG_OUT                      PROC  FAR
          ;NO NEED FOR EPILOGUE OR PROLOGUE IN THIS ROUTINE
     PUSH  BP                 ;SAVE CURRENT BASE POINTER
     MOV   BP, SP                    ;SET BP TO CURRENT SP FOR BP ADDRESSING
     MOV   ES, DIO_ADDRESS           ;LOAD THE DEVICE ADDRESS TO ES
     MOV   BX, ANALOG_OUT_DEVICE     ;LOAD THE DEVICE BOARD OFFSET
     CLI                      ;DISABLE INTERRUPTS
     MOV   CX, [BP+6]         ;GET THE COMMAND FROM THE STACK
     MOV   SI, 08                    ;OFFSET FOR BP ADDRESSING
       SHL CL, 4              ;MOVE THE LEAST SIG. TO THE MOST SIG. NIBBLE
     ;THE BITS CORRESPONDING TO HOW MANY BYTES ARE TO BE SENT OUT ARE NOW IN
     ;  THE UPPER HALF OF "CL".  BY SHIFTING LEFT 1 BIT AT A TIME I CAN SEE
     ;  HOW MANY BYTES TO SEND OUT TO THE DS5000. (MAX OF 4 BYTES).
TESTBIT1:
     SHL   CL, 1              ;SHIFT INTO CARRY TEST IF BIT 4 IS SET
     JNC   TESTBIT2

     MOV   AX, [BP+SI]        ;IF BIT 4 IS SET, SEND OUT THE DATA BYTE
     MOV   ES:[BX], AL               ;SEND OUT THE BYTE TO THE FIFO
     ADD   SI, 2              ;INCREMENT THE BP OFFSET BY 2 BYTES
```

```
TESTBIT2:
      SHL   CL, 1             ;TEST FOR THE 3RD BIT IS SET
      JNC   TESTBIT3
                              ;IF 3RD BIT IS SET SEND OUT 1 BYTE OF DATA
      MOV   AX, [BP+SI]       ;GET BYTE FROM THE STACK
      MOV   ES:[BX], AL       ;SEND OUT THE BYTE TO THE FIFO
      ADD   SI, 2             ;INCREMENT THE BP OFFSET
TESTBIT3:
      SHL   CL, 1             ;TEST FOR BIT 2 SET
      JNC   TESTBIT4
                              ;IF BIT 2 IS SET SEND OUT 1 BYTE OF DATA
      MOV   AX, [BP+SI]       ;GET DATA FROM THE STACK
      MOV   ES:[BX], AL       ;WRITE OUT THE DATA TO THE FIFO
      ADD   SI, 2             ;INCREMENT THE BP OFFSET
TESTBIT4:
      SHL   CL, 1             ;TEST FOR BIT 1 SET
      JNC   END_ANALOG_OUT
                              ;IF BIT 1 IS SET SEND OUT 1 BYTE OF DATA
      MOV   AX, [BP+SI]       ;GET DATA FROM THE STACK
      MOV   ES:[BX], AL       ;WRITE OUT THE DATA TO THE FIFO
END_ANALOG_OUT:
            ;SEND OUT THE COMMAND LAST SO THAT THE DS5000 DOES
            ; NOT NEED TO WAIT FOR DATA TO BE PLACED IN THE
            ; FIFO.  ONCE IT GETS THE COMMAND IT CAN READ
            ; FROM THE FIFO AT WILL BECAUSE THE FIFO HAS DATA IN IT.
      MOV   CX, 1000          ;Set I/O error timeout count
BZ_CHK_MCPPAO:
      MOV   BYTE PTR ES:[BX+1], 4    ;POINT TO THE MAIL BOX REGISTER
      CMP   BYTE PTR ES:[BX+1], 0    ;WAIT TIL FIFO SEND MAILBOX AVAILABLE
      JZ    RDY_MCPPAO        ;Mailbox available?
      LOOP  BZ_CHK_MCPPAO            ;IF real TIMEOUT, send will error to vsysbug
      MOV   BYTE PTR ES:[BX+1], 4    ;POINT TO THE MAIL BOX REGISTER
      MOV   AH, ES:[BX+1]
      PUSH  ERROR_CODE_F008
      PUSH  AX
      CALL  VSYSBUG           ;DEVICE NOT READY - MAIL BOX NOT EMPTY
RDY_MCPPAO:
      MOV   DX, [BP+6]        ;GET THE COMMAND FROM THE STACK AGAIN
      MOV   BYTE PTR ES:[BX+1], 4    ;POINT TO THE FIFO MAIL BOX REGISTER
      MOV   ES:[BX+1], DL            ;SEND THE COMMAND TO THE FIFO MAIL BOX
      STI                     ;ENABLE INTERRUPTS
```

```
     POP   BP
     RET
PUT_ANALOG_OUT                    ENDP
$EJ   ;
;*************************************************************************
;    PROCEDURE NAME:   M_C_P__CONTROL(UNSIGNED SETPT, INT RATIO, UCHAR INDX_VEH_BAS)
;
;    DESCRIPTION:      Set(change) VEHICLE WHEEL SPD
;                   and RATIO inside wheel against outside wheel.
;                   and the Index into the Array indx_veh_bas.
;
;    INPUT PARAMETERS
;       0 [BP+6] DATA  1 word data vehicle_speed (0.0-255.0 spd units)
;       1 [BP+8] DATA  1 word data wheel_ratio
;       2 [BP+10] DATA 1 unsigned char indx_veh_bas
;*************************************************************************
M_C_P__CONTROL          PROC  FAR
     PUSH  BP                  ;SAVE CURRENT BASE POINTER
     MOV   BP, SP                    ;SET BP TO CURRENT SP FOR BP ADDRESSING
     MOV   ES, DIO_ADDRESS           ;LOAD THE DEVICE ADDRESS TO ES
     MOV   BX, ANALOG_OUT_DEVICE     ;LOAD THE DEVICE BOARD OFFSET
     MOV   CX, 500                   ;Set I/O error timeout count
     CLI                       ;DISABLE INTERRUPTS
BZ_CHK_MCPSR:
     MOV   BYTE PTR ES:[BX+1], 4   ;POINT TO THE MAIL BOX REGISTER
     CMP   BYTE PTR ES:[BX+1], 0   ;WAIT TIL FIFO SEND MAILBOX AVAILABLE
     JZ    RDY_MCPSR           ;Mailbox available?
     LOOP  BZ_CHK_MCPSR              ;IF real TIMEOUT, send will error to vsysbug
     ;SAVE THE MAILBOX STATUS FOR DEBUGGING
     MOV   BYTE PTR ES:[BX+1], 4   ;POINT TO THE MAIL BOX REGISTER
     MOV   AH,ES:[BX+1]
     PUSH  ERROR_CODE_F009
     PUSH  AX
     CALL  VSYSBUG             ;DEVICE NOT READY
RDY_MCPSR:
     MOV   AX, [BP+6]          ;SETPT(1.0 = 256 (fixed point scaled integer)
     MOV   ES:[BX], AL         ; SEND THE SPEED
     MOV   ES:[BX], AH
     MOV   DX, [BP+8]          ;RATIO(1.0 = 256 (fixed point scaled integer)
     MOV   ES:[BX], DL         ; SEND THE RATIO
     MOV   ES:[BX], DH
     MOV   DX, [BP+10]         ; GET THE INDX_VEH_BAS OF THE STACK
```

```
     MOV   ES:[BX], DL       ; SEND THE INDX_VEH_BAS
     MOV   BYTE PTR ES:[BX+1], 04H ;POINT TO THE FIFO MAIL BOX REGISTER
     MOV   BYTE PTR ES:[BX+1], 70H ;  and SEND M_C_P__CONTROL COMMAND
     STI                     ;ENABLE INTERRUPTS
     POP   BP
     RET
M_C_P__CONTROL          ENDP
$EJ   ;;*************************************************************************
;     PROCEDURE NAME:   M_C_P__STATE (UNSIGNED CHAR STATE)
;
;     DESCRIPTION:      Set(change) vehicle state
;
;     INPUT PARAMETERS
;        0 [BP+6] ADDRESS     1 unsigned char
;
;*************************************************************************
M_C_P__STATE      PROC  FAR
     PUSH  BP                ;SAVE CURRENT BASE POINTER
     MOV   BP, SP                  ;SET BP TO CURRENT SP FOR BP ADDRESSING
     MOV   ES, DIO_ADDRESS         ;LOAD THE DEVICE ADDRESS TO ES
     MOV   BX, ANALOG_OUT_DEVICE   ;LOAD THE DEVICE BOARD OFFSET
     MOV   CX, 500                 ;Set I/O error timeout count
; GET THE INDX_VEH_BAS TO BE SENT TO THE MCP
     MOV   DX, [BP+6]        ; GET THE LOCATION FROM THE 0EH LOCATION OF THE STACK
     CLI                     ;DISABLE INTERRUPTS
BZ_CHK_MCPSTATE:
     MOV   BYTE PTR ES:[BX+1], 4   ;POINT TO THE MAIL BOX REGISTER
     CMP   BYTE PTR ES:[BX+1], 0   ;WAIT TIL FIFO SEND MAILBOX AVAILABLE
     JZ    RDY_MCPSTATE            ;Mailbox available?
     LOOP  BZ_CHK_MCPSTATE         ;IF real TIMEOUT, send will error to vsysbug
     ;SAVE THE MAILBOX STATUS FOR DEBUGGING
     MOV   BYTE PTR ES:[BX+1], 4   ;POINT TO THE MAIL BOX REGISTER
     MOV   AH, ES:[BX+1]           ;READ THE MAILBOX
     PUSH  ERROR_CODE_F004
     PUSH  AX                ;VARIABLE CODE
     CALL  VSYSBUG                 ;FALL OUT WITH ERROR
RDY_MCPSTATE:
     MOV   ES:[BX], DL       ; SEND THE SPEED TO THE FIFO BUFFER
     MOV   BYTE PTR ES:[BX+1], 04H ;POINT TO THE FIFO MAIL BOX REGISTER
     MOV   BYTE PTR ES:[BX+1], 60H ;  and SEND M_C_P__STATE COMMAND
     STI                     ;ENABLE INTERRUPTS
     POP   BP
```

```
     RET
M_C_P__STATE      ENDP
$EJ  ;;**************************************************************************
;    PROCEDURE NAME:   M_C_P__TPS(unsigned COMMAND, unsigned DATA )
;
;    DESCRIPTION:      Turn on or off the TPS and set the speed
;
;    INPUT PARAMETERS
;       0 [BP+6] DATA  1 char data
;       0 [BP+14] DATA       1 char data
;**************************************************************************
M_C_P__TPS  PROC  FAR
     PUSH  BP                ;SAVE CURRENT BASE POINTER
     MOV   BP, SP                  ;SET BP TO CURRENT SP FOR BP ADDRESSING
     MOV   ES, DIO_ADDRESS         ;LOAD THE DEVICE ADDRESS TO ES
     MOV   BX, ANALOG_OUT_DEVICE   ;LOAD THE DEVICE BOARD OFFSET
     MOV   CX, 500                 ;Set I/O error timeout count
     CLI                     ;DISABLE INTERRUPTS
BZ_CHK_MCPTPS:
     MOV   BYTE PTR ES:[BX+1], 4   ;POINT TO THE MAIL BOX REGISTER
     CMP   BYTE PTR ES:[BX+1], 0   ;WAIT TIL FIFO SEND MAILBOX AVAILABLE
     JZ    RDY_MCPTPS        ;Mailbox available?
     LOOP  BZ_CHK_MCPTPS           ;IF real TIMEOUT, send will error to vsysbug
     ;SAVE THE MAILBOX STATUS FOR DEBUGGING
     MOV   BYTE PTR ES:[BX+1], 4   ;POINT TO THE MAIL BOX REGISTER
     MOV   AH, ES:[BX+1]           ;READ THE MAILBOX
     PUSH  ERROR_CODE_F00A
     PUSH  AX
     CALL  VSYSBUG
RDY_MCPTPS:
     MOV   AX, [BP+6]        ;GET THE TPS COMMAND
     MOV   DX, [BP+8]        ;GET THE DATA
     MOV   ES:[BX], DL       ; SEND THE DATA

     MOV   BYTE PTR ES:[BX+1], 04H ;POINT TO THE FIFO MAIL BOX REGISTER
     MOV   BYTE PTR ES:[BX+1], AL  ;  and SEND M_C_P__TPS COMMAND
     STI                     ;ENABLE INTERRUPTS
     POP   BP
     RET
M_C_P__TPS  ENDP
$EJ  ;;**************************************************************************
;    PROCEDURE NAME:   M_C_P__OBST(unsigned a_scale, unsigned b_scale )
```

```
;
;     DESCRIPTION:      Set(change) Obstical detect scaling factors
;
;     INPUT PARAMETERS
;        0 [BP+6] DATA  1 word data
;        0 [BP+14] DATA      1 word data
;*************************************************************************
M_C_P__OBST       PROC  FAR
      PUSH  BP                 ;SAVE CURRENT BASE POINTER
      MOV   BP, SP                   ;SET BP TO CURRENT SP FOR BP ADDRESSING
      MOV   ES, DIO_ADDRESS          ;LOAD THE DEVICE ADDRESS TO ES
      MOV   BX, ANALOG_OUT_DEVICE    ;LOAD THE DEVICE BOARD OFFSET
      MOV   AX, [BP+6]         ;GET THE OBST_A_SCALING FACTOR
      MOV   DX, [BP+8]         ;GET THE OBST_B_SCALING FACTOR
      MOV   CX, 500                  ;Set I/O error timeout count
      CLI                      ;DISABLE INTERRUPTS
BZ_CHK_MCPOBST:
      MOV   BYTE PTR ES:[BX+1], 4    ;POINT TO THE MAIL BOX REGISTER
      CMP   BYTE PTR ES:[BX+1], 0    ;WAIT TIL FIFO SEND MAILBOX AVAILABLE
      JZ    RDY_MCPOBST        ;Mailbox available?
      LOOP  BZ_CHK_MCPOBST           ;IF real TIMEOUT, send will error to vsysbug
      ;SAVE THE MAILBOX STATUS FOR DEBUGGING
      MOV   BYTE PTR ES:[BX+1], 4    ;POINT TO THE MAIL BOX REGISTER
      MOV   AH, ES:[BX+1]            ;READ THE MAILBOX
      PUSH  ERROR_CODE_F002
      PUSH  AX
      CALL  VSYSBUG
RDY_MCPOBST:
      MOV   ES:[BX], AL        ; SEND THE SPEED
      MOV   ES:[BX], AH
      MOV   ES:[BX], DL        ; SEND THE RATIO
      MOV   ES:[BX], DH
      MOV   BYTE PTR ES:[BX+1], 04H ;POINT TO THE FIFO MAIL BOX REGISTER
      MOV   BYTE PTR ES:[BX+1], 50H ;  and SEND M_C_P__OBST COMMAND
      STI                      ;ENABLE INTERRUPTS
      POP   BP
      RET
M_C_P__OBST       ENDP
$EJ   ;;***************************************************************************
;     PROCEDURE NAME:  M_C_P__INITIALIZE(DOUBLE   *SETPT,   DOUBLE   *RATIO,   UCHAR
*INDX_VEH_BAS    )
;
```

```
;     DESCRIPTION:      RESTART the MCP processor
;
;     INPUT PARAMETERS
;*************************************************************************
M_C_P__INITIALIZE PROC  FAR
      PUSH  BP                 ;SAVE CURRENT BASE POINTER
      MOV   BP, SP                   ;SET BP TO CURRENT SP FOR BP ADDRESSING
      MOV   ES, DIO_ADDRESS          ;LOAD THE DEVICE ADDRESS TO ES
      MOV   BX, ANALOG_OUT_DEVICE    ;LOAD THE DEVICE BOARD OFFSET
      MOV   CX, 500
      CLI                      ;DISABLE INTERRUPTS
BZ_CHK_MCPINIT:
      MOV   BYTE PTR ES:[BX+1], 4    ;POINT TO THE MAIL BOX REGISTER
      CMP   BYTE PTR ES:[BX+1], 0    ;WAIT TIL FIFO SEND MAILBOX AVAILABLE
      JZ    RDY_MCPINIT              ;Mailbox available?
      LOOP  BZ_CHK_MCPINIT           ;IF real TIMEOUT, send will error to vsysbug
      ;SAVE THE MAILBOX STATUS FOR DEBUGGING
      MOV   BYTE PTR ES:[BX+1], 4    ;POINT TO THE MAIL BOX REGISTER
      MOV   AH, ES:[BX+1]
      PUSH  ERROR_CODE_F006
      PUSH  AX
      CALL  VSYSBUG
RDY_MCPINIT:
      MOV   BYTE PTR ES:[BX+1], 04H ;POINT TO THE FIFO MAIL BOX REGISTER
      MOV   BYTE PTR ES:[BX+1], 80H ;  and SEND M_C_P__INITIALIZE COMMAND
      STI                      ;ENABLE INTERRUPTS
      POP   BP
      RET
M_C_P__INITIALIZE       ENDP
SEJ   ;;*************************************************************************
;     PROCEDURE NAME:   M_C_P__DISCRETES (UNSIGNED CHAR DISCRETE)
;
;     DESCRIPTION:      Set(change) VEHICLE WHEEL CONTACTORS AND BRAKE
;
;     INPUT PARAMETERS
;        0 [BP+6] ADDRESS     2 unsigned char STATUS AND MASK
;
;*************************************************************************
M_C_P__DISCRETES  PROC  FAR
      PUSH  BP                 ;SAVE CURRENT BASE POINTER
      MOV   BP, SP                   ;SET BP TO CURRENT SP FOR BP ADDRESSING
      MOV   ES, DIO_ADDRESS          ;LOAD THE DEVICE ADDRESS TO ES
```

```
      MOV   BX, ANALOG_OUT_DEVICE   ;LOAD THE DEVICE BOARD OFFSET
      MOV   CX, 1000          ;Set I/O error timeout count
      CLI                     ;DISABLE INTERRUPTS
BZ_CHK_MCPDISC:
      MOV   BYTE PTR ES:[BX+1], 4   ;POINT TO THE MAIL BOX REGISTER
      CMP   BYTE PTR ES:[BX+1], 0   ;WAIT TIL FIFO SEND MAILBOX AVAILABLE
      JZ    RDY_MCPDISC       ;Mailbox available?
      LOOP  BZ_CHK_MCPDISC          ;IF real TIMEOUT, send will error to vsysbug
      ;SAVE THE MAILBOX STATUS FOR DEGUGGING
      MOV   BYTE PTR ES:[BX+1], 4   ;POINT TO THE MAIL BOX REGISTER
      MOV   AH, ES:[BX+1]
      PUSH  ERROR_CODE_F007
      PUSH  AX                ;VARIABLE CODE
      CALL  VSYSBUG                 ;FALL OUT WITH ERROR
RDY_MCPDISC:
      MOV   AX, [BP+6]        ; GET THE MASK
      MOV   ES:[BX], AL       ; SEND THE MASK TO THE FIFO BUFFER
      MOV   DX, [BP+8]        ; GET THE STATUS
      MOV   ES:[BX], DL       ; SEND THE STATUS TO THE FIFO BUFFER
      MOV   BYTE PTR ES:[BX+1], 04H ;POINT TO THE FIFO MAIL BOX REGISTER
      MOV   BYTE PTR ES:[BX+1], 40H ;  and SEND M_C_P__DISCRETES COMMAND
      STI                     ;ENABLE INTERRUPTS
      POP   BP
      RET
M_C_P__DISCRETES  ENDP
$EJ   ;
;*************************************************************************
;     PROCEDURE NAME:   SET_ENCODER
;
;     DESCRIPTION:      SET INTERRUPTS ON ENCODER INPUT PROCESSOR
;
;     INPUT PARAMETERS
;[AL]      0 [BP+6]     COMMAND     [****]      ADDRESS OF SPECIFIED COUNTER
;                             WITH THE COMMAND FOR THAT COUNTER.
;                             IF THE COMMAND IS A LOAD_AND_SET
;                             THEN 3 BYTE OF DATA ARE SENT TO
;                             THE COUNTER.
;
;[AX]      1 [BP+8]     PARM  [WORD]      WORD DATA TO THE COUNTER
;[AL]        2 [BP+10]  PARM    [BYTE]  ANOTHER BYTE OF DATA TO THE COUNTER
;*************************************************************************
SET_ENCODER                   PROC  FAR
```

```
      %PROLOGUE( ENCODER_IN_DEVICE )
      MOV   AX, [BP+6]          ;THIRD PARAMETER
      MOV   ES:[BX+1], AL             ;SEND COMMAND - COMMAND_ADDRESS
      TEST  AL, 080H            ;CHECK FOR A LOAD_AND_SET COMMAND
      JZ    SEIEXIT
LOAD_AND_SET:
;     FLD   QWORD PTR [BP+8]  ;POINT TO THE DATA TO GET FROM THE FPP
;     FISTP DWORD PTR [BP+8]  ;GET THE DATA FROM THE FPP
;     WAIT                    ;WAIT FOR THE FPP TO FINISH
      MOV   AX, [BP+8]
      CALL  SEND_TEST
      MOV   ES:[BX], AL       ;SEND LOW BYTE PARAMETER - DATA_ADDRESS
      CALL  SEND_TEST
      MOV   ES:[BX], AH       ;SEND SECOND BYTE - DATA_ADDRESS
      MOV   AX, [BP+10]
      CALL  SEND_TEST
      MOV   ES:[BX], AL       ;SEND THIRD BYTE - DATA_ADDRESS
SEIEXIT:
      %EPILOGUE
SET_ENCODER                   ENDP
SEJ   ;
;*************************************************************************
;     PROCEDURE NAME:   SET_BIT_DISCRETE_IN
;
;     DESCRIPTION:      SET INTERRUPT FOR DISCRETE INPUT BIT
;
;     INPUT PARAMETERS
;[CL]      0 [BP+6]     ADDRESS     [0-39]      ADDRESS OF SPECIFIED BIT
;[AL]      1 [BP+8]     ACTION      [0]   ENABLE BOTH INTERRUPTS
;                       [1]   ENABLE LOW TO HIGH INTERRUPT
;                       [2]   ENABLE HIGH TO LOW INTERRUPT
;                       [3]   DISABLE BOTH INTERRUPTS
;*************************************************************************
SET_BIT_DISCRETE_IN           PROC  FAR
      %PROLOGUE( DISCRETE_IN_DEVICE )
      MOV   AX, [BP+8]        ;SECOND PARAMETER
      AND   AL, 3             ;MASK OFF EXTRA BITS
      MOV   CL, 6             ;SET UP ROTATE COUNT
      SAL   AL, CL                  ;SET UP COMMAND
      MOV   CX, [BP+6]        ;GET ADDRESS PARAMETER
      AND   CL, 03FH                ;MASK OFF EXTRA BITS
      OR    AL, CL                  ;COMBINE ADDRESS AND COMMAND
```

```
     MOV   ES:[bx+1], AL            ;SEND COMMAND - COMMAND_ADDRESS
     %EPILOGUE
SET_BIT_DISCRETE_IN                 ENDP

;************************************************************************
;     PROCEDURE NAME:   SET_BYTE_DISCRETE_IN
;
;     DESCRIPTION:      SET INTERRUPT FOR DISCRETE INPUT BYTE
;
;     INPUT PARAMETERS
;[DL]      0 [BP+6]     ADDRESS     [0-4] ADDRESS OF SPECIFIED BYTE
;[CL]      1 [BP+8]     MASK  [BYTE]      A ONE BIT IN THE MASK INDICATES
;                             THAT THE ACTION SPECIFIED IN
;                             THE THIRD PARAMETER SHOULB BE
;                             SET FOR THAT BIT
;[AL]      2 [BP+10]    ACTION      [0]   ENABLE BOTH INTERRUPTS
;                       [1]   ENABLE LOW TO HIGH INTERRUPT
;                       [2]   ENABLE HIGH TO LOW INTERRUPT
;                       [3]   DISABLE BOTH INTERRUPTS
;************************************************************************
SET_BYTE_DISCRETE_IN                PROC  FAR
     %PROLOGUE( DISCRETE_IN_DEVICE )
     MOV   AX, [BP+10]        ;THIRD PARAMETER
     AND   AL, 3              ;GET RID OF EXTRA BITS
     MOV   CL, 6              ;SET UP COUNTER
     SAL   AL, CL                   ;SET UP COMMAND
     MOV   CX, [BP+8]         ;GET ADDRESS PARAMETER
     MOV   DX, [BP+6]         ;GET ADDRESS
     AND   DL, 07H                  ;MASK OFF EXTRA BITS
     OR    AL, DL                   ;SET COMMAND AND ADDRESS
     OR    AL, 030H           ;SET FOR BYTE COMMAND
     MOV   ES:[bx+1], AL            ;SEND COMMAND - COMMAND_ADDRESS
     CALL  SEND_TEST
     MOV   ES:[BX], CL        ;SEND PARAMETER - DATA_ADDRESS
     %EPILOGUE
SET_BYTE_DISCRETE_IN                ENDP
$EJ   ;
;************************************************************************
;     PROCEDURE NAME:   SET_BIT_DISCRETE_OUT
;
;     DESCRIPTION:      SET INTERRUPT FOR THE SPECIFIED DISCRETE OUTPUT BIT
;
```

```
;     INPUT PARAMETERS
;[DL]      0 [BP+6]     ADDRESS     [0-43]      ADDRESS OF SPECIFIED BIT
;[CL]      1 [BP+8]     ACTION      [0]   PULSE WITH INTERRUPT
;                       [1]  PULSE WITHOUT INTERRUPT
;                       [2]  OSCILLATE WITH INTERRUPT
;                       [3]  OSCILLATE WITHOUT INTERRUPT
;[AL]      2 [BP+10]    LENGTH      [BYTE]      PULSE OR OSCILLATION WIDTH
;*************************************************************************
SET_BIT_DISCRETE_OUT              PROC  FAR
      %PROLOGUE( DISCRETE_OUT_DEVICE )
      MOV   AX, [BP+10]       ;GET THIRD PARAMETER
      MOV   CX, [BP+8]        ;GET ACTION
      MOV   CH, CL                  ;SAVE COPY OF ACTION
      MOV   DX, [BP+6]        ;GET ADDRESS
      AND   DL, 03FH          ;MASK OFF EXTRA BITS
      MOV   DH, DL                  ;SAVE COPY OF ADDRESS
      AND   CL, 2             ;CHECK FOR PULSE
      JZ    SBDO3             ;SKIP IF PULSE
      OR    DL, 0C0H          ;SET UP TO OSCILLATE
      JMP SHORT   SBDO5       ;SKIP
SBDO3:
      OR    DL, 080H          ;SET UP FOR PUSLE
SBDO5:
      MOV   ES:[bx+1], DL           ;SEND 1st COMMAND - COMMAND_ADDRESS
      CALL  SEND_TEST
      MOV   ES:[BX], AL       ;SEND PARAMETER - DATA_ADDRESS
      AND   CH, 1             ;CHECK FOR INTERRUPT
      JNZ   SBDO7             ;SKIP TO CLEAR
      OR    DH, 040H          ;ENABLE INTERRUPT COMMAND
      JMP SHORT   SBDO9       ;SKIP TO SEND COMMAND
SBDO7:
      OR    DH, 80H                 ;DISABLE INTERRUPT COMMAND
SBDO9:
      CALL  SEND_TEST
      MOV   ES:[BX], DH       ;SEND COMMAND - DATA_ADDRESS
      %EPILOGUE
SET_BIT_DISCRETE_OUT              ENDP
$EJ   ;
;*************************************************************************
;     PROCEDURE NAME:   SET_ANALOG_IN
;
;     DESCRIPTION:      SET INTERRUPTS ON THE ANALOG INPUT PROCESSOR TO
```

```
;               INTERRUPT ON THE ACTION SPECIFIED
;
;    INPUT PARAMETERS
;[DL]      0 [BP+6]     ADDRESS    [0-15]     ADDRESS OF SPECIFIED CHANNEL
;[CL]      1 [BP+8]     ACTION     [0]  DISABLE INTERRUPT
;                       [1]  ENABLE INTERRUPT ON LOW VALUE [TO PARM]
;                       [2]  DISABLE INTERRUPT ON LOW VALUE
;                       [3]  ENABLE INTERRUPT ON HIGH VALUE [TO PARM]
;                       [4]  DISABLE INTERRUPT ON HIGH VALUE
;                       [5]  CLEAR SCAN REGISTER [TO PARM]
;                       [6]  SET SCAN REGISTER [TO PARM]
;[AL]      2 [BP+10]    PARM  [BYTE]     THIS IS THE PARAMETER USED ON ACTIONS
;                             [1], [3], [5], AND [6] ABOVE
;*************************************************************************
SET_ANALOG_IN                      PROC  FAR
      %PROLOGUE( ANALOG_IN_DEVICE )
      MOV   CX, [BP+8]        ;GET ACTION
      MOV   DX, [BP+6]        ;GET ADDRESS
      AND   DL, 0FH                 ;MASK OFF EXTRA BITS
      AND   CL, 07H                 ;MASK OFF EXTRA BITS
      CMP   CL, 0             ;TEST ACTION
      JNE   SAI1              ;SKIP IF NOT '0'
      OR    DL, 020H                ;SET UP COMMAND TO CLEAR LOW
      MOV   ES:[bx+1], DL           ;SEND CLEAR LOW COMMAND - COMMAND_ADDRESS
      CALL  SEND_TEST
      OR    DL, 060H                ;MORE CLEAR HIGH SETUP
      MOV   ES:[bx+1], DL           ;SEND CLEAR HIGH COMMAND - COMMAND_ADDRESS
      JMP SHORT   SAIEXIT                 ;EXIT
SAI1:
      CMP   CL, 1             ;TEST ACTION
      JNE   SAI2              ;SKIP IF NOT '1'
      OR    DL, 030H          ;SET UP COMMAND TO SET LOW VALUE
      MOV   DH, DL                  ;SET UP SECOND COMMAND
      AND   DH, 01FH          ;SECOND COMMAND ENABLE LOW
SAISE:
      MOV   ES:[bx+1], DL           ;SEND COMMAND - COMMAND_ADDRESS
      CALL  SEND_TEST
      MOV   ES:[BX], AL       ;SEND THE PARAMETER - DATA_ADDRESS
      CALL  SEND_TEST
      MOV   ES:[bx+1], DH           ;SEND SECOND COMMAND - COMMAND_ADDRESS
      JMP SHORT   SAIEXIT           ;EXIT
SAI2:
```

```
     CMP   CL, 2              ;TEST ACTION
     JNE   SAI3               ;SKIP IF NOT '2'
     OR    DL, 020H           ;SET COMMAND TO CLEAR LOW INTERRUPT
     MOV   ES:[bx+1], DL            ;SEND   COMMAND   TO   CLEAR   LOW   INTERRUPT  -
COMMAND_ADDRESS
     JMP SHORT   SAIEXIT            ;EXIT
SAI3:
     CMP   CL, 3              ;TEST ACTION
     JNE   SAI4               ;SKIP IF NOT '3'
     OR    DL, 070H           ;SET UP FIRST COMMAND-SET HIGH
     MOV   DH, DL                   ;SET UP SECOND COMMAND
     AND   DH, 05FH           ;SET COMMAND ENABLE HIGH
     JMP   SAISE              ;SEND COMMANDS
SAI4:
     CMP   CL, 4              ;TEST ACTION
     JNE   SAI5               ;SKIP IF NOT '4'
     OR    DL, 060H           ;SET UP DISABLE HIGH COMMAND
     MOV   ES:[bx+1], DL            ;SEND DISABLE HIGH COMMAND - COMMAND_ADDRESS
     JMP SHORT   SAIEXIT            ;EXIT
SAI5:
     CMP   CL, 5              ;TEST ACTION
     JNE   SAI6               ;SKIP IF NOT '5'
     AND   DL, 1              ;CLEAR AWAY EXTRA BITS
     OR    DL, 0A0H           ;SET CLEAR SCAN REGISTER
     JMP SHORT   SAISEND2     ;SEND COMMAND WITH PARAMETER
SAI6:
     AND   DL, 1              ;CLEAR AWAY EXTRA BITS
     OR    DL, 0E8H           ;SET SCAN REGISTER TO PARAMETER
SAISEND2:
     MOV   ES:[bx+1], DL            ;SEND COMMAND - COMMAND_ADDRESS
     CALL  SEND_TEST
     MOV   AX, [BP+10]        ;GET THIRD PARAMETER
     MOV   ES:[BX], AL        ;SEND FIRST PARAMETER LOW BYTE - DATA_ADDRESS
SAIEXIT:
     %EPILOGUE
SET_ANALOG_IN                   ENDP
$EJ   ;
;**************************************************************************-
;    SET_MASK(DEVICE, LINE, MASK1, MASK2)
;
;    THIS PROCEDURE SETS BITS IN THE INTERRUPT HANDLER TABLE ASSOCIATED
;    WITH THE DIGITAL BOARD.  WHEN AN INTERRUPT OCCURS THIS TABLE IS USED
```

```
;     TO DETERMINE WHICH TASKS SHOULD RECIEVE A NON-TOKEN IN THEIR MAILBOX.
;
;*************************************************************************-
SET_MASK                      PROC  FAR
      PUSH  BP                ;SAVE OLD BP
      MOV   BP, SP                  ;GET NEW BP
      MOV   BX, [BP+6]        ;GET DEVICE NUMBER
      AND   BX, 7             ;GET RID OF EXTRA BITS
      LEA   DI, VALID_LINE          ;GET START OF VALID LINE TABLE
      MOV   AX, [BP+8]        ;GET LINE NUMBER
      CMP   CS:[BX][DI], AL         ;COMPARE WITH NUMBER IN TABLE
      JLE   SMERROR                 ;GO TO ERROR PROCESSING
      SAL   BL, 1             ;CONVERT DEVICE NUMBER TO ADDRESS
      LEA   DI, LINE_TABLE          ;GET START OF LINE TABLE
      MOV   BX, CS:[BX][DI]         ;GET ADDRESS OF MAILBOX WORD
      LEA   DI, TABLE_START         ;GET TABLE_START ADDRESS
      SAL   AX, 1             ;SET UP FOR WORD OFFSETS
      ADD   BX, AX                  ;ADD DEVICE OFFSET TO ADDRESS
      MOV   CX, [BP+12]       ;GET MASK-2
      MOV   DX, CX                  ;MOVE COPY OF MASK-2
      NOT   DX                ;SAVE REVERSED COPY OF MASK-2
      AND   CX, [BP+10]       ;AND MASK-2 WITH MASK-1
      OR    CX, [BX][DI]            ;OR RESULT WITH CURRENT BYTE
      AND   DX, [BP+10]       ;MASK OFF BITS FROM REVERSED MASK
      NOT   DX                ;REVERSE RESULT
      AND   CX, DX                  ;TURN OFF SELECTED BITS
      MOV   [BX][DI], CX            ;REWRITE BYTE MASK
SMOUT:
      POP   BP                ;RESTORE BP
      RET                     ;RETURN
SMERROR:
      PUSH  ERROR_CODE_FFFF
      PUSH  O                 ;VARIABLE CODE
      CALL  VSYSBUG                 ;FALL OUT WITH ERROR
SET_MASK                      ENDP
$EJ   ;
;*************************************************************************
; DECREMENT_STATUS_CLOCK
; THIS ROUTINE WILL DECREMENT THE WAIT TIME IN THE STATUS BUFFER IF
; IT IS GREATER THAN 1.  THERE ARE NO PARAMETERS.
;*************************************************************************
DECREMENT_STATUS_CLOCK        PROC              FAR
```

```
     PUSH  BX
     MOV   BX, CLOCK_OFFSET          ; GET THE OFFSET TO THE CLOCK IN THE BUFFER
     CMP   VEH_STATUS[BX], 0         ; CHECK FOR NEGATIVE CLOCK
     JL    DC2                       ; JUMP IF IT IS
     CMP   VEH_STATUS[BX], 1
     JLE   DECREMENT_EXIT                  ; DONT DECREMENT IF <=1

     DEC   VEH_STATUS[BX]                  ; DECREMENT CLOCK
     JMP SHORT   DECREMENT_EXIT
DC2:                                 ; VEHICLE IS STOPPED
     INC   VEH_STATUS[BX]                  ; INCREMENT CLOCK
DECREMENT_EXIT:
     POP   BX
     RET
DECREMENT_STATUS_CLOCK        ENDP

;************************************************************************---
;     I_LOG
;           THIS PROCEDURE IS USED TO LOG ALL INTERRUPTS (EXCEPT THE
;           WATCH-DOG) WHICH PASS THROUGH THE INTERRUPT ROUTINES.  EVEN
;           INTERRUPTS WHICH ARE FILTERED OUT FROM THE APPLICATION TASKS
;           WILL BE LOGGED.  THE LOGGING IS DONE TO A CIRCULAR RING
;           BUFFER CALLED THE "NON_TOKEN_BUFFER".  THE NEXT LOCATION
;           INTO WHICH THE LOGGER WILL PLACE A NON_TOKEN IS REFERENCED
;           BY "NON_TOKEN_POINTER".  THE BUFFER IS 64 WORDS LONG.
;************************************************************************---
I_LOG            PROC  NEAR
     PUSH  AX                   ;SAVE
     PUSH  BX                   ;SAVE
     PUSH  DI
     LEA   BX, NON_TOKEN_BUFFER      ;GET ADDRESS OF BUFFER
     MOV   DI, NON_TOKEN_POINTER     ;GET OFFSET IN BUFFER
     MOV   AX, NON_TOKEN             ;GET NON_TOKEN
     MOV   [BX+DI], AX          ;STORE NON_TOKEN IN BUFFER
     INC   DI                   ;BUMP DI TO WORD OFFSET
     INC   DI
     AND   DI, 07FH                  ;MASK AWAY OVERFLOW BITS (CAUSE WRAP)
     MOV   NON_TOKEN_POINTER, DI     ;RESTORE NEW BUFFER OFFSET
     POP   DI
     POP   BX                   ;RESTORE
     POP   AX                   ;RESTORE
     RET
```

```
I_LOG                           ENDP
$EJ   ;
;***************************************************************************--
;      SEND_TEST
;
;      THIS PROCEDURE TESTS THE SELECTED 8742 ON THE DIGITAL BOARD AND
;      WILL INSURE THAT IT IS READY TO SEND DATA.  IT WILL LOOP 100 TIMES
;      IN THIS TEST BEFORE GIVING UP AND ABORTING THE SYSTEM BY CALLING
;      VSYSBUG
;***************************************************************************--
SEND_TEST                       PROC  NEAR
      PUSH  CX                  ;SAVE
      MOV   CX, 500                   ;LOAD LOOP COUNTER
ST001:
      MOV   DI, ES:[bx+1]             ;DEVICE STATUS from COMMAND_ADDRESS
      AND   DI, 082H                  ;CHECK SEND BIT
      LOOPNZ      ST001               ;LOOP IF COUNT NOT SATISIFIED AND
                                ;DEVICE NOT READY
      JZ    ST002               ;SKIP WHEN DEVICE READY
      MOV   ERROR_DEVICE, BX    ;SAVE ERROR_DEVICE
      MOV   ERROR_STATUS, DI    ;SAVE ERROR_STATUS
      PUSH  ERROR_CODE_F001           ;SAVE THE ERROR CODE
      PUSH  0                         ;VARIABLE CODE
      CALL  VSYSBUG                   ;EXIT WITH ERROR
ST002:
      POP   CX                  ;RESTORE
      RET                       ;RETURN TO CALLER
SEND_TEST                       ENDP

;***************************************************************************--
;      RECEIVE_TEST
;
;      THIS PROCEDURE TESTS THE SELECTED 8742 ON THE DIGITAL BOARD AND
;      WILL INSURE THAT IT IS READY TO RECEIVE DATA.  IT WILL LOOP 100 TIMES
;      IN THIS TEST BEFORE GIVING UP AND ABORTING THE SYSTEM BY CALLING
;      VSYSBUG
;***************************************************************************--
RECEIVE_TEST               PROC  NEAR
      PUSH  CX                  ;SAVE
      MOV   CX, 500                   ;LOAD LOOP COUNTER
RT001:
      MOV   DI, ES:[bx+1]             ;DEVICE STATUS from COMMAND_ADDRESS
```

```
     AND  DI, 1              ;CHECK RECEIVE BIT
     LOOPZ RT001             ;LOOP IF COUNT NOT SATISIFIED AND
                             ;DEVICE NOT READY
     JNZ  RT002              ;SKIP WHEN DEVICE READY
     MOV  ERROR_DEVICE, BX   ;SAVE ERROR_DEVICE
     MOV  ERROR_STATUS, DI   ;SAVE ERROR_STATUS
     PUSH ERROR_CODE_F002          ;SAVE THE ERROR CODE
     PUSH 0                        ;VARIABLE CODE
     CALL VSYSBUG                  ;EXIT WITH ERROR
RT002:
     POP  CX                 ;RESTORE
     RET                     ;RETURN TO SENDER
RECEIVE_TEST                       ENDP
$EJ  ;
;************************************************************************
;    PROCEDURE NAME    BREAK_ECHAIN
;
;    DESCRIPTION BREAK THE E-CHAIN BY CLEARING THE WATCH-DOG
;
;    PARAMETERS  NONE
;************************************************************************
BREAK_ECHAIN                       PROC  FAR
;    CALL  PUT_BIT_DISCRETE_OUT (31, 1)
     PUSH  31                ;DEVICE NUMBER = 31
     PUSH  1                 ;ADDRESS TURN ON DEVICE = 1
     CALL  PUT_BIT_DISCRETE_OUT    ;BREAK E-CHAIN
     ADD   SP, 4H                  ;Restore stack pointer('C' compatability)
     PUSH  100               ;SET UP 100 CLOCK TICKS, 1 SECOND
     CALL  FAR PTR DELAY           ; CALL DELAY
     INC   SP                ;Restore stack pointer
     INC   SP
     PUSH  31                ;DEVICE NUMBER = 31
     PUSH  0                 ;ADDRESS TURN ON DEVICE = 0
     CALL  PUT_BIT_DISCRETE_OUT    ;BREAK E-CHAIN
     ADD   SP, 4H                  ;Restore stack pointer('C' compatability)
     RET                     ;RETURN
BREAK_ECHAIN                       ENDP
$EJ  ;
;*******************************************************************-
; DISABLE_COMMUNICATIONS - Save old flags, Clear interupts.
;
; This procedure is called before changing the status buffer.
```

```
; ENABLE_COMMUNICATIONS must be called as soon as posible!
; There are no parameters.
;*****************************************************************-
DISABLE_COMMUNICATIONS                  PROC  FAR
      PUSHF                ; Save flags on the stack
      POP   FLAGS_SAVE     ; Save away
      CLI                  ; Clear interupts
      RET                  ; Thats all folks
DISABLE_COMMUNICATIONS            ENDP
;*****************************************************************-
; ENABLE_COMMUNICATIONS - Restore flags that were prior to DISABLE
;
; This procedure is called after changing the status buffer.
; ENABLE_COMMUNICATIONS must be called as soon as possible!
; There are no parameters.
;*****************************************************************-
ENABLE_COMMUNICATIONS                   PROC  FAR
      PUSH  FLAGS_SAVE     ; Get old flags
      POPF                 ; Restore the flags.
      RET                  ; Thats all folks
ENABLE_COMMUNICATIONS             ENDP
;*****************************************************************-
DISABLE_INTERRUPTS                      PROC  FAR
      CLI
      RET
DISABLE_INTERRUPTS                ENDP
;*****************************************************************-
ENABLE_INTERRUPTS                 PROC  FAR
      STI
      RET
ENABLE_INTERRUPTS           ENDP
$EJ   ;
;*********************************************************************-
;     DELAY                 PROCEDURE - IF YOU DON'T CARE ABOUT
;                                       THE RESULT
;                           FUNCTION - IF YOU WANT TO KNOW IF THE
;                                      TIME EXPIRED.  THE VALUE
;                                      RETURNED WILL BE 0 IF TIME
;                                      EXPIRED (-5 OTHERWISE)
;     CALLING SEQUENCE  CALL  DELAY(TIME)
;                           WHERE TIME = SYSTEM CLOCK TICKS
;*********************************************************************-
```

```
DELAY                   PROC  FAR
      PUSH  BP          ;SAVE OLD BP
      MOV   BP, SP            ;SET UP NEW BP
      CALL  AAGETN                        ;GET CURRENT TASK NUMBER
      MOV   BX, AX                        ;MOVE TO ADDRESSING REGISTER
      OR    BYTE PTR SUSPENDF[BX], 080H   ;SUSPEND CALLING TASK
      MOV   CX, [BP+6]              ;GET THE DELAY TIME
      CALL  AAWATM                        ;CALL AMX
      AND   BYTE PTR SUSPENDF[BX], 07FH   ;RESUME CALLING TASK
      POP   BP          ;RESTORE BP
      RET               ;RETURN
DELAY                   ENDP
V4INIT_CODE ENDS
      END
```

```
; V4_8274  V4_8274  V4_8274  V4_8274  V4_8274  V4_8274  V4_8274  V4_8274  V4_8274
V4_8274  V4_8274  V4_8274  V4_8274  V4_8274
;*****************************************************************************************
************************************************
;**
                                          **
;**                                    EEEEEEEEEEEEEEE      TTTTTTTTTTTTT
NNNNNNN      NNNNN                          **
;**                                    EEEEEEEEEEEEEE       TTTTTTTTTTT
NNNNNNNN     NNNNN                          **
;**                                    EEEEE           A        TTTT        OOO
NNNNNNNNN    NNNNN                          **
;**                                    EEEEEEEEEEEE     AAA      TTT      OOOOOOOO
NNNNN NNNN   NNNNN                          **
;**                                    EEEEEEEEEEE     AAAAA     TTT      OOOOOOOO
NNNNN  NNNN NNNNN                           **
;**                                    EEEEE                    TTTT        OOO
NNNNN   NNNNNNNNN                           **
;**                                    EEEEEEEEE      AAAAAAA    TTTTT
NNNNN    NNNNNNNN                           **
;**                                    EEEEEEEE      AAAAAAAAA   TTTTTTT
NNNNN      NNNNNNN                          **
;**
                                          **
;**       This software (firmware) developed by EATON-KENWAY is proprietary.  Source
code on listings or any other media       **
;**           is not for sale or loan and may not be copied or transferred to any
vendor, buyer, or consultant.  Executable       **
;**          code is available in ROM and is sold with the original product or as a
product upgrade.  Buyer shall not          **
;**         copy or distribute ROM's with E-K firmware to any third party without the
prior written approval of EATON-KENWAY.   **
;**          Title to and ownership of the software shall at all times remain with
EATON-KENWAY.   The information  in this     **
;**          is subject to change without notice  and should not be construed as a
commitment by EATON-KENWAY.                  **
;**
                                          **
;**        EATON-KENWAY  assumes  no  responsibility  for  the  use or reliability
of  its  software on  equipment which     **
;**          is  not supplied EATON-KENWAY or has been modified without EATON-KENWAY
approval.                                    **
```

```
;**
                                                  **
;**         Copyright 1989
                 KENWAY, INCORPORATED           **
;**********************************************************************************
**********************************************
;  V4_8274  V4_8274  V4_8274  V4_8274  V4_8274  V4_8274  V4_8274  V4_8274  V4_8274
V4_8274  V4_8274  V4_8274  V4_8274  V4_8274
;
;       DATE CREATED:  Feb 89
;       AUTHOR:        Vehicle Group
;
;       DESCRIPTION:
;           xxx......           ....
;
;       PROGRAM HISTORY:
;       Date        Initials/No.        Description
;       ---------   ------------        ---------------------------------------
;    MAY 90          L.BRUCE CH.   CHANGED TO USE THE NEW COMM BOARD INSTEAD
;                              OF THE OLD SDLC MODELE ON THE SBX BUS.
;* * * * * * * * * * * * * * * * * * * * * * * * * * * * * * * * * * * * * * * * *
* * * * * * * * * * * * * * * * * * * * * * */
$EJ   ;
NAME    V4_8274
    EXTRN   AMXGO:FAR                   ;NEXT CODE TO JUMP TO
    EXTRN   RAMROMTEST:FAR              ;MODULE V2START
    EXTRN   DECREMENT_STATUS_CLOCK:FAR     ;LONG STATUS ROUTINE
    EXTRN   DIOIHC:FAR                  ;INT HANDLER FOR THE DIO_BOARD
    EXTRN   COMMIHC:FAR                 ;INT HANDLER FOR THE COMM_BOARD
    EXTRN   VSYSBUG:FAR                 ;NON-RECOVERABLE ERROR PROC
    EXTRN   ch_b__read_serv:FAR         ;CHAR HANDLING PROC
    EXTRN   AAIPTR:FAR                  ;AMX INSTALL INT VECTOR
    EXTRN   AAINT:FAR                   ;AMX INIT INT SERVICE
    EXTRN   AAINX:FAR                   ;AMX EXIT INT
    EXTRN   AACLK:FAR                   ;AMX SYSTICK SERVICE
    EXTRN   OUTPUT_MASTER:FAR           ;RESUME V2TMHD
    EXTRN   INITIALIZE_TERM_HANDLER:FAR    ;INITIALIZES TERMINAL HANDLER
    EXTRN   INIT87:FAR                  ;PROCEDURE TO INITIALIZE THE 8087 CO-PROCESSOR

    PUBLIC  V3_8274_START               ;CODE START, JUMPED TO FROM V3_186
    PUBLIC  ch_b__start_output                ;TRANSMIT BUFFER ROUTINE
$EJ   ;
```

```
;*************************************************************--
; GENERAL EQUATES
;*************************************************************--
;     8274 PORT DEFINITIONS
DATA_PORT_chA          EQU        00D8H
DATA_PORT_chB          EQU        00DAH
STATUS_PORT_chA        EQU        00DCH
STATUS_PORT_chB        EQU        00DEH
COMMAND_PORT_chA    EQU     00DCH
COMMAND_PORT_chB    EQU     00DEH
;     MISC EQUATES
TERM_INT_BASE            EQU   50H   ;THIS IS THE INTERRUPT NUMBER FOR THE
                                     ; FIRST OF THE TERMINAL HANDLER INTS
                                     ; MEMORY LOCATION 00140H
MASTER_PIC_OCW2          EQU   00E0H ;80130 OPERATION CONTROL WORD 2
$EJ   ;
;************************************************************-
;     ERROR CODE EQUATES
;************************************************************-
ERROR_CODE_E800          EQU    0E800H    ;STATUS ERROR FROM 8274
ERROR_CODE_E801          EQU    0E801H    ;ERROR FROM THE 8274
ERROR_CODE_FC00          EQU   0FC00H     ;OVERFLOW INTO STACKS OR
                               ;INT STACK UNDERFLOW
ERROR_CODE_FC01          EQU   0FC00H     ;INT STACK OVERFLOW OR
                               ;TMR STACK UNDERFLOW
ERROR_CODE_FC02          EQU   0FC01H     ;TMR STACK OVERFLOW OR
                               ;COM STACK UNDERFLOW
ERROR_CODE_FC03          EQU   0FC02H     ;COM STACK OVERFLOW OR
                               ;SUB STACK UNDERFLOW
ERROR_CODE_FC04          EQU   0FC03H     ;SUB STACK OVERFLOW OR
                               ;TRN STACK UNDERFLOW
ERROR_CODE_FC05          EQU   0FC04H     ;TRN STACK OVERFLOW OR
                               ;ACT STACK UNDERFLOW
ERROR_CODE_FC06          EQU   0FC05H     ;ACT STACK OVERFLOW OR
                               ;CMD STACK UNDERFLOW
ERROR_CODE_FC07          EQU   0FC06H     ;CMD STACK OVERFLOW OR
                               ;HCU STACK UNDERFLOW
ERROR_CODE_FC08          EQU   0FC07H     ;HCU STACK OVERFLOW OR
                               ;INI STACK UNDERFLOW
ERROR_CODE_FC09          EQU   0FC08H     ;INI STACK OVERFLOW OR
                               ;EXE STACK UNDERFLOW
ERROR_CODE_FC0A          EQU   0FC09H     ;EXE STACK OVERFLOW OR
```

```
                                   ;UNDERFLOW INTO STACKS
$EJ   ;
DATA  SEGMENT     PUBLIC      'DATA'
    EXTRN   ch_b__wr_buff :BYTE
    EXTRN   ch_b__wr__end_indx :WORD
    EXTRN   ch_b__wr__next_indx :WORD
    EXTRN   ch_b__wr__stat:WORD
    EXTRN   ch_b__rd_char :BYTE
    EXTRN   ch_b__rd_buff :BYTE
    EXTRN   CLOCK_COUNT:WORD
    EXTRN   user_time :WORD    ;LSW of LONG 'c'

    EXTRN   STATUS_ERROR_8274 :BYTE
    EXTRN   ERROR_8274 :BYTE
    EXTRN   SOINI :WORD
    EXTRN   TEST_PATTERN:ABS
    EXTRN   CLOCK_ROLLOVER:WORD
    EXTRN   DIOSEG:ABS              ;ADDRESS OF DIO BOARD
    EXTRN   STBOT:WORD              ;TEST WORD BOTTOM OF STACK
    EXTRN   STEXE:WORD              ;TEST WORD IN EXE
    EXTRN   STINI:WORD              ;TEST WORD IN INI
    EXTRN   STHCU:WORD              ;TEST WORD IN HCU
    EXTRN   STCMD:WORD              ;TEST WORD IN CMD
    EXTRN   STACT:WORD              ;TEST WORD IN ACT
    EXTRN   STTRN:WORD              ;TEST WORD IN TRN
    EXTRN   STSUB:WORD              ;TEST WORD IN SUB
    EXTRN   STCOM:WORD              ;TEST WORD IN COM
    EXTRN   STTMR:WORD              ;TEST WORD IN TMR
    EXTRN   STINT:WORD              ;TEST WORD IN INT
DATA  ENDS
$EJ   ;
V3_8274_CODE      SEGMENT 'CODE'
      ASSUME CS:V3_8274_CODE, DS:DATA
DIO_ADDRESS DW    DIOSEG            ;SEGMENT OF DIGITAL BOARD
DIO_INT_HANDLER    DD     DIOIHC          ;ADDRESS OF DIO INTERRUPT HANDLER
COMM_INT_HANDLER DD     COMMIHC         ;ADDRESS OF COMM_BOARD INTERRUPT HANDLER
;*************************************************************
;  CODE SEGMENT TABLES FOR 8274 INIT
;*************************************************************
;********************************* CHANNEL B **********************
;************ PARAMETERS FOR CHANNEL INITIALIZATION, POLLED MODE ************
POLL_TABLE_B:
```

```
    DB    00H, 18H            ;WR0: CHANNEL RESET
    DB    14H, 4CH            ;RESET EXT/STATUS INTS
                              ;WR4: X16 CLOCK, 2 STOP BITS, NO PARITY
    DB    11H, 04H            ;RESET EXT/STATUS INTS
                              ;WR1: NO INTS
    DB    13H, 0C0H           ;RESET EXT/STATUS INTS
                              ;WR3: REC 8 BITS/CHAR, REC DISABLE
    DB    35H, 0EAH           ;ERROR RESET
                              ;WR5: DTR ACTIVE, XMT 8 BITS/CHAR,
                              ; XMT ENABLE, RTS ACTIVE
    DB    0FFH, 0FFH          ;END
;****************** PARAMETERS FOR CHANNEL INITIALIZATION, INTERRUPT DRIVEN
******************
INT_TABLE_B:
    DB    04H, 44H            ;WR4: X16 CLOCK, 1 STOP BIT, NO PARITY
    DB    11H, 1EH            ;RESET EXT/STATUS INTS
                              ;WR1: INT ON ALL REC CHAR
                              ; OR SPECIAL CONDITION, VARIABLE VECTOR
                              ; XMT INT ENABLE, EXT INT DISABLED
    DB    12H, (TERM_INT_BASE)     ;RESET EXT/STATUS INTS
                              ;WR2: INTERRUPT VECTOR LOCATION
    DB    13H, 0C1H           ;RESET EXT/STATUS INTS
                              ;WR3: REC 8 BITS/CHAR, REC ENSABLE
    DB    35H, 0EAH           ;ERROR RESET
                              ;WR5: DTR ACTIVE, XMT 8 BITS/CHR,
                              ;  XMT ENABLE, RTS ACTIVE
    DB    0FFH, 0FFH          ;END
;********************************* CHANNEL A ********************************
;************ PARAMETERS FOR CHANNEL INITIALIZATION, POLLED MODE ************
INT_TABLE_A:
    DB    00H, 18H            ;WR0: CHANNEL RESET
    DB    14H, 44H            ;RESET EXT/STATUS INTS
                              ;WR4: 16X CLOCK, 1 STOP BIT,
                              ;  NO PARITY
    DB    11H, 00H            ;RESET EXT/STATUS INTS
                              ;WR1: INTERRUPT DISABLE
    DB    12H, 30H            ;RESET EXT/STATUS INTS
                              ;WR2: VECTORED INT,
                              ;  PRIORITY RECA, RECB, XMTA, XMTB
                              ;  B INTERRUPTS
    DB    13H, 0C0H           ;WR3: RX 8 BITS/CHR, RX DISABLE
    DB    35H, 00H            ;ERROR RESET
```

```
                              ;WR5: XMT DISABLE
    DB    OFFH, OFFH          ;END
  TEMP_STACK    DD    SOINI        ;WE WILL NEED A STACK DURING
                              ;INITIALIZATION, WE WILL USE V2INIT'S
$EJ  ;
;*************** VTERM, CODE BEGINS *******************
;    SET UP STACK FOR PROCEDURE CALLS
;    INITIALIZE 8274 FOR POLL MODE
;    INITIALIZE HCU, WRITE FIRMWARE VERSION NUMBER AND COPYRIGHT
;    TEST ROM/RAM, OUTPUT RESULTS ON HCU
;    RE-INITIALIZE 8274 FOR INTERRUPT MODE
;    SET UP INTERRUPT TABLES
;    JUMP TO VEHICLE INITIALIZATION
; ******************************************************
V3_8274_START:                ; SET UP DATA SEGMENT
    MOV    AX, DATA           ; DATA SEGMENT VALUE
    MOV    DS, AX       ; SET UP DS
;********************* GET TASK STACK POINTER *********************
    MOV    AX, WORD PTR CS:(TEMP_STACK + 2)
    MOV    SS, AX       ; SET UP SEGMENT
    MOV        AX, WORD PTR CS:TEMP_STACK
    MOV        SP, AX         ; SET UP OFFSET
;*********************  INITIALIZE 8274 IN POLLED MODE ***************
    MOV    DI, OFFSET POLL_TABLE_B  ;INIT CHANNEL B, POLL MODE PARAMETERS
    MOV    DX, COMMAND_PORT_chB          ;PORT ADDRESS
    CALL   SETUP              ;SEND INIT PARAMETERS
    MOV        DI, OFFSET INT_TABLE_A    ;INIT CHANNEL A, INT MODE PARAMETERS
    MOV     DX, COMMAND_PORT_chA    ;PORT ADDRESS
    CALL    SETUP             ;SEND INITIALIZATION PARAMETERS

    CALL    RAMROMTEST                  ;CALL TO MODULE V2START
                              ; SET UP HCU, WRITE TO TERMINAL,
                              ; TEST ROM AND RAM
$EJ  ;
;*********************************************************
;   INSTALL VECTORS FOR 8274 INTERRUPTS
;     SETUP FOR AAIPTR:
;            DL := INTERRUPT NUMBER
;            ES:BX := INTERRUPT ROUTINE VECTOR
;*********************************************************
    XOR        DX, DX              ;CLEAR DX
    MOV     AX, CS                 ;GET CODE SEGMENT
```

```
   MOV    ES, AX                   ;SET UP AS PARAMETER FOR AAIPTR
   MOV    DL, (TERM_INT_BASE)           ;SET INT FOR XMT BUFF EMPTY, CHB
   MOV    BX, OFFSET XMT_INT_CHB  ;LOAD VECTOR OFFSET
   CALL   AAIPTR                   ;INSTALL VECTOR
   MOV    DL, (TERM_INT_BASE + 1) ;SET INT FOR STATUS INT, CHB
   MOV    BX, OFFSET STATUS_INT_CHB    ;LOAD VECTOR
   CALL   AAIPTR                   ;INSTALL VECTOR
   MOV    DL, (TERM_INT_BASE + 2) ;SET INT FOR REC CHAR AVAILABLE, CHB
   MOV    BX, OFFSET REC_INT_CHB  ;LOAD VECTOR
   CALL   AAIPTR                   ;INSTALL VECTOR
   MOV    DL, (TERM_INT_BASE + 3) ;SET INT FOR REC ERROR, CHB
   MOV    BX, OFFSET ERROR_INT_CHB     ;LOAD VECTOR
   CALL   AAIPTR                   ;INSTALL VECTOR
;***************** SET UP AMX 10 MILLISEC TIMER INT VECTOR ******************
   MOV    DL, 0AH                  ;SET INT LEVEL FOR 80130 TIMER0, IR2
                             ; 8 (80130 BASE LEVEL) + 2 (IR2) = A
   MOV    BX, OFFSET TIMER0_80130 ;LOAD VECTOR
   CALL   AAIPTR                   ;INSTALL VECTOR
;***************** SET UP INT VECTOR FOR DI/O BOARD ***********************
   MOV    DL, 08H                  ;SET INT LEVEL FOR 80130, IR0
                             ; BASE LEVEL
   LES    BX, DIO_INT_HANDLER           ;ES:BX <- VECTOR
   CALL   AAIPTR                   ;INSTALL VECTOR

;LBC 5-17-90 MOVED THE FOLLOWING 3 LINES OF CODE FROM VCOMTC: ROUTINE. IT SHOULD
; REALLY BE DONE HERE.
;*****************  SET UP INT VECTOR FOR COMM BOARD ***********************
     MOV   DL,9             ;VECTOR NUMBER FOR SDLC INTERRUPTS
     LES   BX,COMM_INT_HANDLER     ;GET ADDRESS OF INTERRUPT HANDLER
     CALL  AAIPTR                  ;SET VECTOR IN TABLE

;****************** SET UP 8274 FOR INTERRUPT MODE ON CHANNEL B *************
   MOV    DI, OFFSET INT_TABLE_B   ;RE-INIT CHANNEL B,
                             ; INTERRUPT MODE PARAMETERS
   MOV    DX, COMMAND_PORT_chB           ;PORT ADDRESS
   CALL   SETUP             ;SEND INIT PARAMETERS
;******************  SPURIOUS XMT BUFF EMPTY INT ALWAYS COMES UP ************
   MOV    AL, 38H                  ;SEND EOI TO 8274
   OUT        COMMAND_PORT_chA, AL
   MOV    AL, 28H                  ;SEND END OF XMT
   OUT    COMMAND_PORT_chB, AL
   MOV    ch_b__wr__end_indx, 0          ;ZERO OUTPUT BUFF INDESES
```

```
   MOV    ch_b__wr__next_indx, 0   ;IN CASE OF UNWANTED INT
$EJ  ;
;***************** INITIALIZE THE TERMINAL HANDLER ******************
   CALL   INIT87        ; Set up 8087 Co-processor
   CALL   INITIALIZE_TERM_HANDLER
   JMP         AMXGO          ;JUMP TO INITILIZE VEHICLE
                        ;END OF 80186 BOARD INITIALIZATION
$EJ  ;
;************************************************************
;     PROCEDURE   SETUP
;     ROUTINE FOR COPYING PARAMETER TABLES TO DEVICE
;         DI      CONTAINS    OFFSET OF COMMAND STRING
;         DX      CONTAINS    PORT ADDRESS
;************************************************************
SETUP                    PROC  NEAR
SETUP1:
      MOV   AL, CS:[DI]        ;GET OUTPUT BYTE
      CMP   AL, OFFH           ;TEST FOR DONE
      JE    SETUPX                    ;DONE
      OUT   DX, AL                    ;OUTPUT PARAMETER
      INC   DI                 ;INC POINTER
      JMP   SETUP1                    ;LOAD IT
SETUPX:
      RET
SETUP       ENDP
$EJ  ;
;***************************************************************
;     PROCEDURE CALLED TO TRANSMIT A BUFFER.  CALLER MUST SET
;     OUTPUT__end_BYTE_INDEX TO POINT TO LAST CHAR IN MESSAGE.
;***************************************************************
ch_b__start_output            PROC  FAR
   PUSHF                      ;SAVE FLAGS
   CLI                               ;DISABLE INTERRUPTS
;***************** TEST OUTPUT STATUS ***************************
   MOV          AX, ch_b__wr__stat         ;GET STATUS BYTE
   AND          AX, 03H             ;ONLY LOOK AT BIT 0 AND 1
                              ; BIT 0 (1=WRITE IN PROGRESS)
                              ; BIT 1 (1= X-OFF)
   CMP          AX, 0
   JNE          SO10                ;JUMP IF X-OFF OR WRITE IN PROGRESS
   OR           ch_b__wr__stat, 01         ;SET WRITE IN PROGRESS BIT
   MOV      BX, ch_b__wr__next_indx ;GET INDEX FOR LAST BYTE SENT
```

```
   MOV     AL, ch_b__wr_buff[BX]   ;GET BYTE
   OUT     DATA_PORT_chB, AL       ;SEND BYTE
SO10:
   POPF                         ;ENABLE INTERRUPTS
   RET
ch_b__start_output      ENDP
$EJ   ;
;*******************************************************
;  XMT_INT_CHB
;     RESPONDS TO XMT BUFFER EMPTY INTERRUPTS
;*******************************************************
XMT_INT_CHB:
   CALL    AAINT                ;SAVE SOMEONE ELSE'S STATE
   MOV          AX, DATA                  ;GET SEGMENT ADDRESS
   MOV          DS, AX              ;PUT INTO DS
; ********************** RESET 8274 FOR INT ************
   MOV     AL, 038H                ;CONTROL WORD; RESET INTERRUPT
   OUT     COMMAND_PORT_chA, AL    ;ALWAYS FOR CHANNEL A
;************************ RESET 80130 ********************
   MOV     AL, 063H                ;CONTROL WORD TO RESET 80130
                            ; 6 = LEVEL OF INTERRUPT
                            ; 3 = 8274 CONNECTED TO IR3
   OUT     MASTER_PIC_OCW2, AL     ;80130 OPERATION CONTROL WORD 2
;***************************** SETUP AND CHECK BUFFER ***************
   INC     ch_b__wr__next_indx           ;POINT TO NEXT BYTE IN BUFFER
   MOV     BX, ch_b__wr__next_indx ;INDEX TO END BYTE SENT
   CMP          BX, ch_b__wr__end_indx    ;COMPARE TO LAST BYTE IN MESSAGE
   JGE       X_I_1                 ;GT/EQ MEANS WE ARE DONE WITH THIS BUFF
;**************************** TEST OUTPUT STATUS ********************
   MOV          AX, ch_b__wr__stat        ;GET STATUS BYTE
   AND          AX, 03H             ;ONLY LOOK AT BIT 0 AND 1
                            ; BIT 0 (1=WRITE IN PROGRESS)
                            ; BIT 1 (1= X-OFF)

   CMP          AX, 1
   JNE          X_I_2               ;JUMP IF X-OFF OR NO WRITE IN PROGRESS
;*************************** OUTPUT THE NEXT CHAR ********************
   MOV     AL, ch_b__wr_buff[BX]   ;GET IT
   OUT     DATA_PORT_chB, AL       ;SEND IT OUT
   JMP SHORT    X_I_3              ;QUIT THE ROUTINE
;**************************** NOTIFY OF XMIT COMPLETE *******************
X_I_1:
   MOV     AX, 0028H
```

```
   OUT     COMMAND_PORT_chB, AL     ;RESET XMT INT PENDING
   CALL    OUTPUT_MASTER            ;NOTIFY V2TMHD CURRENT XMT FINISHED
                                ; (RESUME)
   JMP SHORT     X_I_3              ;QUIT THE ROUTINE
;**************************** Xoff (DON'T XMIT) **************************
X_I_2:
   AND          ch_b__wr__stat, OFFFEH    ;TURN OFF WRITE IN PROCESS
;************************ EXIT THE HANDLER **************************
X_I_3:
   CALL    AAINX               ;RESTORE STATE
   IRET
$EJ   ;
;***********************************************
;  REC_INT_CHB
;     RESPONDS TO REC CHAR AVAILABLE INTERRUPTS
;***********************************************
REC_INT_CHB:
   CALL    AAINT              ;SAVE SOMEONE ELSE'S STATE
   MOV          AX, DATA                 ;GET SEGMENT ADDRESS
   MOV          DS, AX               ;PUT INTO DS
;************************ RESET 8274 FOR INT ***********************
   MOV     AL, 038H               ;CONTROL WORD; RESET INTERRUPT
   OUT     COMMAND_PORT_chA, AL    ;ALWAYS FOR CHANNEL A
;************************ RESET 80130 ***********************
   MOV     AL, 063H               ;CONTROL WORD TO RESET 80130
                              ; 6 = LEVEL OF INTERRUPT
                              ; 3 = 8274 CONNECTED TO IR3
   OUT     MASTER_PIC_OCW2, AL          ;80130 OPERATION CONTROL WORD 2
   IN      AL, DATA_PORT_chB       ;GET INPUT CHAR
   MOV          ch_b__rd_char, AL        ;STORE CHAR
   CALL    ch_b__read_serv        ;CALL CHAR HANDLER
   CALL    AAINX              ;RESTORE STATE
   IRET
$EJ   ;
;***************************************************************
;    STATUS_INT_CHB
;     STATUS INTERRUPTS ARE TURNED OFF; THIS PROCEDURE SHOULD NOT
;     BE ENTERED.
;***************************************************************
STATUS_INT_CHB:
   CALL    AAINT              ;SAVE SOMEONE ELSE'S STATE
   MOV          AX, DATA                 ;GET SEGMENT ADDRESS
```

```
    MOV         DS, AX              ;PUT INTO DS
;************************ RESET 8274 FOR INT *********************
    MOV     AL, 038H                ;CONTROL WORD; RESET INTERRUPT
    OUT     COMMAND_PORT_chA, AL    ;ALWAYS FOR CHANNEL A
;************************ RESET 80130 ****************************
    MOV     AL, 063H                ;CONTROL WORD TO RESET 80130
                            ; 6 = LEVEL OF INTERRUPT
                            ; 3 = 8274 CONNECTED TO IR3
    OUT     MASTER_PIC_OCW2, AL           ;80130 OPERATION CONTROL WORD 2
    IN      AL, STATUS_PORT_chB           ;GET STATUS ERROR
    MOV     STATUS_ERROR_8274, AL   ;KEEP IT
    MOV     AL, 10H
    OUT     COMMAND_PORT_chB, AL    ;RESET STATUS INT

    PUSH    ERROR_CODE_E800         ;SEND ERROR CODE TO VSYSBUG
    PUSH    0                       ; First arg. not used
    CALL    VSYSBUG                 ;THERE IS NO RETURN FROM VSYSBUG
$EJ   ;
;*********************************************
;   ERROR_INT_CHB
;     ERROR LATCHES, PARITY, OVERRUN ERRORS
;     CALL VSYSBUG
;*********************************************
ERROR_INT_CHB:
    CALL    AAINT               ;SAVE SOMEONE ELSE'S STATE
    MOV         AX, DATA                ;GET SEGMENT ADDRESS
    MOV         DS, AX              ;PUT INTO DS
;****************** RESET 8274 FOR INT *********************
    MOV     AL, 038H                ;CONTROL WORD; RESET INTERRUPT
    OUT     COMMAND_PORT_chA, AL    ;ALWAYS FOR CHANNEL A
;****************** RESET 80130 ***************************
    MOV     AL, 063H                ;CONTROL WORD TO RESET 80130
                            ; 6 = END OF INTERRUPT
                            ; 3 = 8274 CONNECTED TO IR3
    OUT     MASTER_PIC_OCW2, AL           ;80130 OPERATION CONTROL WORD 2
    IN      AL, STATUS_PORT_chB           ;SAVE 8274 ERROR STATE
    MOV         ERROR_8274, AL
    MOV     AL, 30H
    OUT     COMMAND_PORT_chB, AL          ;RESET ERROR CONDITION
    CALL    AAINX
    IRET
$EJ   ;
```

```
;***********************************************
;     SYSTICK INTERRUPT HANDLER
;         80130 TIMERO INTERRUPTS AT 10 MILLISEC INTERVALS FOR AMX CLOCK
;***********************************************
TIMERO_80130:
      PUSH    AX              ;SAVE THE REGISTER
      PUSH  DS                ;SAVE SEGMENT
      MOV   AX, DATA          ;DATA SEGMENT VALUE
      MOV   DS, AX                  ;SET UP DS
;************************* TAKE CARE OF WATCH DOG **********************
      PUSH  BX                ;SAVE BX
      PUSH  ES                ;SAVE ES
      XOR   BX, BX                  ;SET BX TO ZERO
      MOV   ES, DIO_ADDRESS         ;GET DIO BOARD ADDRESS
      MOV   WORD PTR ES:[BX], BX    ;HIT WATCH DOG
      POP   ES                ;RESTORE ES
      POP   BX                ;SAVE BX
;************************** TEST APPLICATION CLOCK ***********************
      MOV   AX, CLOCK_COUNT         ;GET APPLICATION TICKER
      DEC   AX                ;DECREMENT CLOCK
      JGE   TM01              ;JUMP IF NOT ZERO OR LESS
;********************* BUMP LONG STATUS LONG STATUS CLOCK *****************
      CALL  DECREMENT_STATUS_CLOCK  ;BUMP CLOCK IN LONG STATUS
;*************************** TEST THE STACK ****************************
      MOV   AX, TEST_PATTERN  ;GET STACK TEST PATTERN
      CMP   STBOT, AX         ;LOOK AT BOTTOM OF STACK
      JNE   TM20              ;GENERATE ERROR
      CMP   STINT, AX         ;LOOK AT INT'S STACK
      JNE   TM21              ;GENERATE ERROR
      CMP   STTMR, AX         ;LOOK AT TMR'S STACK
      JNE   TM22              ;GENERATE ERROR
      CMP   STCOM, AX         ;LOOK AT COM'S STACK
      JNE   TM23              ;GENERATE ERROR
      CMP   STSUB, AX         ;LOOK AT SUB'S STACK
      JNE   TM24              ;GENERATE ERROR
      CMP   STTRN, AX         ;LOOK AT TRN'S STACK
      JNE   TM25              ;GENERATE ERROR
      CMP   STACT, AX         ;LOOK AT ACT'S STACK
      JNE   TM26              ;GENERATE ERROR
      CMP   STCMD, AX         ;LOOK AT CMD'S STACK
      JNE   TM27              ;GENERATE ERROR
      CMP   STHCU, AX         ;LOOK AT HCU'S STACK
```

```
     JNE   TM28              ;GENERATE ERROR
     CMP   STINI, AX         ;LOOK AT INI'S STACK
     JNE   TM29              ;GENERATE ERROR
     CMP   STEXE, AX         ;LOOK AT EXE'S STACK
     JNE   TM30              ;GENERATE ERROR
;************************* RESTART THE CLOCK **********************
     MOV   AX, CLOCK_ROLLOVER      ;RESET CLOCK VALUE
;************************** SAVE THE CLOCK ************************
TM01:
     MOV   CLOCK_COUNT, AX         ;SAVE CLOCK FOR NEXT TIME
;*************************** RESET 80130 ************************
     MOV     AL, 062H        ;CONTROL WORD TO RESET 80130
                             ; 6 = END OF INTERRUPT
                             ; 2 = TIMERO CONNECTED TO IR2
     OUT     MASTER_PIC_OCW2, AL   ;80130 OPERATION CONTROL WORD 2
;**************************** NORMAL RETURN ***********************
     ADD   USER_TIME,1H            ;Increment LSB of time-clock
     ADC   USER_TIME+2H,0H         ;Increment MSB of time-clock

     POP   DS                ;RESTORE THE DS
     POP     AX              ;RESTORE THE REGISTER
     CALL    AACLK                 ;TICK THE CLOCK
     IRET
$EJ   ;
;**********************************************************
;  STACK ERROR EXITS
;**********************************************************
TM20:
     PUSH  ERROR_CODE_FC00         ;SET UB ERROR CODE - BOTTOM
     JMP SHORT   TM40              ;JUMP TO CALL VSYSBUG
TM21:
     PUSH  ERROR_CODE_FC01         ;SET UP ERROR CODE - INT
     JMP SHORT   TM40              ;JUMP TO CALL VSYSBUG
TM22:
     PUSH  ERROR_CODE_FC02         ;SET UP ERROR CODE - TMR
     JMP SHORT   TM40              ;JUMP TO CALL VSYSBUG
TM23:
     PUSH  ERROR_CODE_FC03         ;SET UP ERROR CODE - COM
     JMP SHORT   TM40              ;JUMP TO CALL VSYSBUG
TM24:
     PUSH  ERROR_CODE_FC04         ;SET UP ERROR CODE - SUB
     JMP SHORT   TM40              ;JUMP TO CALL VSYSBUG
```

```
TM25:
      PUSH  ERROR_CODE_FC05          ;SET UP ERROR CODE - TRN
      JMP SHORT   TM40               ;JUMP TO CALL VSYSBUG
TM26:
      PUSH  ERROR_CODE_FC06          ;SET UP ERROR CODE - ACT
      JMP SHORT   TM40               ;JUMP TO CALL VSYSBUG
TM27:
      PUSH  ERROR_CODE_FC07          ;SET UP ERROR CODE - CMD
      JMP SHORT   TM40               ;JUMP TO CALL VSYSBUG
TM28:
      PUSH  ERROR_CODE_FC08          ;SET UP ERROR CODE - HCU
      JMP SHORT   TM40               ;JUMP TO CALL VSYSBUG
TM29:
      PUSH  ERROR_CODE_FC09          ;SET UP ERROR CODE - INI
      JMP SHORT   TM40               ;JUMP TO CALL VSYSBUG
TM30:
      PUSH  ERROR_CODE_FC0A          ;SET UP ERROR CODE - EXE
TM40:
      PUSH    0                  ; First arg. not used
      CALL  VSYSBUG                  ;ERROR EXIT
V3_8274_CODE       ENDS
      END
```

```
/*EK2_DUMMY   EK2_DUMMY   EK2_DUMMY   EK2_DUMMY   EK2_DUMMY   EK2_DUMMY   EK2_DUMMY
EK2_DUMMY   EK2_DUMMY   EK2_DUMMY  EK2_DUMMY
*****************************************************************************************
************************************************
**
                                        **
**                                    EEEEEEEEEEEEEEE       TTTTTTTTTTTTT
NNNNNNN       NNNNN                         **
**                                    EEEEEEEEEEEEEE        TTTTTTTTTTT
NNNNNNNN      NNNNN                         **
**                                    EEEEE             A        TTTT        OOO
NNNNNNNNN     NNNNN                         **
**                                EEEEEEEEEEEE     AAA      TTT      OOOOOOOO   NNNNN
NNNN  NNNNN                             **
**                                EEEEEEEEEEE     AAAAA     TTT      OOOOOOOO   NNNNN
NNNN NNNNN                              **
**                                EEEEE                     TTTT       OOO      NNNNN
 NNNNNNNNN                              **
**                                EEEEEEEEE      AAAAAAA    TTTTT               NNNNN
  NNNNNNNN                              **
**                                EEEEEEEE      AAAAAAAAA   TTTTTTT             NNNNN
   NNNNNNN                              **
**
                                        **
**          This software (firmware) developed by EATON-KENWAY is proprietary.  Source
code on listings or any other media        **
**          is not for sale or loan and may not be copied or transferred to any vendor,
buyer, or consultant.  Executable        **
**            code is available in ROM and is sold with the original product or as a
product upgrade.  Buyer shall not            **
**           copy or distribute ROM's with E-K firmware to any third party without the
prior written approval of EATON-KENWAY.   **
**             Title to and ownership of the software shall at all times remain with
EATON-KENWAY.    The information  in this      **
**            is subject to change without notice  and should not be construed as a
commitment by EATON-KENWAY.                    **
**
                                        **
**          EATON-KENWAY   assumes  no  responsibility  for  the  use or reliability
of  its  software on  equipment which      **
**            is  not supplied EATON-KENWAY or has been modified without EATON-KENWAY
approval.                                    **
```

```
**
                                              **
**          Copyright 1989
                KENWAY, INCORPORATED      **
*************************************************************************************
**********************************************
 EK2_DUMMY   EK2_DUMMY   EK2_DUMMY   EK2_DUMMY   EK2_DUMMY   EK2_DUMMY   EK2_DUMMY
EK2_DUMMY   EK2_DUMMY   EK2_DUMMY   EK2_DUMMY
        DATE CREATED:  Feb 89
        AUTHOR:        Vehicle Group
        DESCRIPTION:
            xxx......           ....
        PROGRAM HISTORY:
        Date        Initials/No.        Description
        ---------   ------------        ----------------------------------------
* * * * * * * * * * * * * * * * * * * * * * * * * * * * * * * * * * * * * * * * * * *
* * * * * * * * * * * * * * * * * * * * * * */
/* E-K dummy routines for MALLOC, READ, WRITE
   Compile instructions
      IC86 ek2_dummy.c ROM LARGE MOD186    (* note the large model *)
*/
void *malloc( unsigned a)
{
}
int read( int a, void *b, unsigned c)
{
}
int write( int a, const *b, unsigned c)
{
}
```

```
/*E-K_DUMMY   E-K_DUMMY   E-K_DUMMY   E-K_DUMMY   E-K_DUMMY   E-K_DUMMY   E-K_DUMMY
E-K_DUMMY   E-K_DUMMY   E-K_DUMMY  E-K_DUMMY
*****************************************************************************************
************************************************
**
                                                   **
**                                             EEEEEEEEEEEEEEE       TTTTTTTTTTTTT
NNNNNNN      NNNNN                                     **
**                                             EEEEEEEEEEEEEE        TTTTTTTTTTT
NNNNNNNN     NNNNN                                     **
**                                             EEEEE            A         TTTT        OOO
NNNNNNNNN    NNNNN                                     **
**                                        EEEEEEEEEEEE     AAA      TTT      OOOOOOOO   NNNNN
NNNN  NNNNN                                      **
**                                        EEEEEEEEEEE     AAAAA     TTT      OOOOOOOO   NNNNN
NNNN NNNNN                                       **
**                                        EEEEE                     TTTT       OOO      NNNNN
 NNNNNNNNN                                       **
**                                        EEEEEEEEE     AAAAAAA    TTTTT                NNNNN
  NNNNNNNN                                       **
**                                        EEEEEEEE     AAAAAAAAA   TTTTTTT              NNNNN
   NNNNNNN                                       **
**
                                                   **
**        This software (firmware) developed by EATON-KENWAY is proprietary.  Source
code on listings or any other media        **
**        is not for sale or loan and may not be copied or transferred to any vendor,
buyer, or consultant.  Executable        **
**          code is available in ROM and is sold with the original product or as a
product upgrade.  Buyer shall not            **
**         copy or distribute ROM's with E-K firmware to any third party without the
prior written approval of EATON-KENWAY.    **
**           Title to and ownership of the software shall at all times remain with
EATON-KENWAY.    The information  in this       **
**           is subject to change without notice  and should not be construed as a
commitment by EATON-KENWAY.                     **
**
                                                   **
**         EATON-KENWAY   assumes  no  responsibility  for  the  use or reliability
of  its  software on  equipment which      **
**          is  not supplied EATON-KENWAY or has been modified without EATON-KENWAY
approval.                                    **
```

```
**
                                                  **
**        Copyright 1989
              KENWAY, INCORPORATED        **
**********************************************************************************
***********************************************
 E-K_DUMMY   E-K_DUMMY   E-K_DUMMY   E-K_DUMMY   E-K_DUMMY   E-K_DUMMY   E-K_DUMMY
E-K_DUMMY   E-K_DUMMY   E-K_DUMMY   E-K_DUMMY
        DATE CREATED:  Feb 89
        AUTHOR:        Vehicle Group
        DESCRIPTION:
            xxx......           ....
        PROGRAM HISTORY:
        Date        Initials/No.       Description
        ---------   ------------       ---------------------------------------
* * * * * * * * * * * * * * * * * * * * * * * * * * * * * * * * * * * * * * * * * * *
* * * * * * * * * * * * * * * * * * * * * * */
#define MS_DOS    0   /* _create.c - See Part 1 */
#define DEBUG 0     /* _semapho.c  - See Part 2 */
/* This modual has 3 parts. It creates dummy definitions to
   replace variables and functions defined for ram based MSDOS or RMX operating
   systems that show as undefined in E-K rom systems.
       Part 1 : Modification of INTEL's _create.c routine
       Part 2 : Inclusion of INTEL's _semapho.c routine in entireity
*/

/* Replacement of _CREATE.C */
/*   to create dummy definitions for
 * _exit_create() - allocate memory for struct _exit
 * _stdio_create() - allocate memory for struct _stdio
 * _thread_create() - allocate memory for struct _thread
 * _exit_ptr() - get pointer to struct _exit
 * _stdio_ptr() - get pointer to struct _stdio
 * _thread_ptr() - get pointer to struct _thread
 * $Version: 1.13 $
 * Copyright (c) 1988 Intel Corporation, ALL RIGHTS RESERVED.
 */
#define MS_DOS    0   /* changed (from '1') at Eaton-Kenway for ROMable code */
#include <stdio.h>
#include <reent.h>
#include <time.h>
#if MS_DOS
```

```
#include <dos.h>
#include <io.h>
#include <fileio3.h>
extern void _main0();
extern int  _main2();
extern void _main4();
extern void _mainlast();
#pragma fixedparams(_get_misc_parms, dqgetsize)
extern void _get_misc_parms();
extern unsigned   dqgetsize();
int _osfile[FOPEN_MAX] = {            /* initialize DOS file control */
      _IOASCII | _IOREAD,             /* stdin */
      _IOASCII | _IOWRT,              /* stdout */
      _IOASCII | _IOWRT | _IONBF      /* stderr */
};
unsigned    _psp;
unsigned far      *_pspseg;
unsigned    _proglen;
unsigned    _heapmod;
unsigned    _amblksize  = 0x2000;
unsigned    _dataseg;
#endif
static struct _exit _exit_str;             /* allocate for _exit statically */
static struct _stdio _stdio_str;    /* allocate for _stdio statically */
static struct {
      struct _thread    t;
      struct tm   gmtime_buffer;
} _thread_str;                      /* allocate for _thread statically */
struct _exit *_exit_create(size_t size)
{
#if MS_DOS
      struct regval     regs;
      struct
      {
            unsigned    udi2dos;
            unsigned    psp;
            void        *memory;
      } misc;
      unsigned    status;
      long        data_bytes;
      void near   *near_heap;
      unsigned    near_heap_bytes;
```

```
      void far     *far_heap;
      unsigned     far_heap_paras;
      _get_misc_parms(&misc);
      _psp = misc.psp;
      _pspseg = (void far *)((unsigned long)_psp << 16);
#if !_FAR_DATA_                 /* small and medium model */
      _dataseg = (unsigned long)(void far *)&_dataseg >> 16;
      near_heap = misc.memory;
      if (misc.udi2dos)
      {
            data_bytes = dqgetsize(_dataseg, &status);
            far_heap = _dosf48(1);
            _proglen = 1;
            _heapmod = FP_SEG(far_heap);
      }
      else
      {
            data_bytes = 0x10000;
            far_heap = (void far *)((_dataseg + 0x1000L) << 16);
            _heapmod = _psp;
      }
      near_heap_bytes = data_bytes - (unsigned)near_heap;
      far_heap_paras = 1;
#else                           /* compact and large model */
      near_heap = 0;
      near_heap_bytes = 0;
      far_heap = misc.memory;
      if (misc.udi2dos)
      {
            _heapmod = FP_SEG(far_heap);
            _proglen = far_heap_paras = dqgetsize(_heapmod, &status) >> 4;
      }
      else
      {
            _heapmod = _psp;
            far_heap_paras = _amblksize >> 4;
      }
#endif
      if (!misc.udi2dos)
      {
            regs.ax = 0x4a00;
            regs.es = _psp;
```

```
            regs.bx = _proglen = FP_SEG(far_heap) + far_heap_paras - _psp;
            if (sysint21(&regs, &regs) & 1)
            {
            static      char const far    msg[] = "Insufficient memory\r\n$";
                  regs.ax = 0x0900;
                  regs.dx = FP_OFF(msg);
                  regs.ds = FP_SEG(msg);
                  sysint21(&regs, &regs);
                  regs.ax = 0x4c01;
            }
            _pspseg[1] = _psp + _proglen;
      }
      _main0(near_heap, near_heap_bytes, far_heap, far_heap_paras);
      _main2();               /* process environment variable */
      _main4();               /* process interrupts */
#endif
      return (&_exit_str);
}
struct _stdio *_stdio_create(size_t size)
{
#if MS_DOS
      close(3);
      close(4);
#endif
      return (&_stdio_str);
}
struct _thread *_thread_create(size_t size)
{
#if MS_DOS
      _mainlast();                  /* set up the program clock */
#endif
      return (&_thread_str.t);
}
struct _exit *_exit_ptr(void)
{
      return (&_exit_str);
}
struct _stdio *_stdio_ptr(void)
{
      return (&_stdio_str);
}
struct _thread *_thread_ptr(void)
```

```
{
      return (&_thread_str.t);
}

/* _semaphore_init() - initialize semaphore
 * _semaphore_wait() - wait for the event to occur
 * _semaphore_signal() - clear the event
 * $Version: 1.5 $
 * Copyright (c) 1988 Intel Corporation, ALL RIGHTS RESERVED.
 */
#include <conio.h>
#include <reent.h>
/* #define DEBUG 0    - Moved to head of file */
void _semaphore_init(void **sema)
{
#if DEBUG
      *sema = sema;
#endif
}
static void **top;       /* EK mod omitted initialization "=0" */
void _semaphore_wait(void **sema)
{
#if DEBUG
      if (*sema != sema)
      {
            cprintf("_semaphore_wait: ERROR: %p != %p\n", *sema, sema);
      }
      if (top != 0)
      {
            cprintf("_semaphore_wait: WARNING: %p != NULL\n", top);
      }
      *sema = top;
      top = sema;
#endif
}
void _semaphore_signal(void **sema)
{
#if DEBUG
      if (sema != top)
      {
            cprintf("_semaphore_signal: ERROR: %p != %p\n", sema, top);
      }
```

```
      top = *sema;
      *sema = sema;
#endif
}
```

```
/* kalman kalman kalman kalman kalman kalman kalman kalman kalman kalman kalman kalman
kalman kalman
*****************************************************************************************
************************************************
**
                                          **
**                                    EEEEEEEEEEEEEEE     TTTTTTTTTTTTT
NNNNNNN      NNNNN                          **
**                                    EEEEEEEEEEEEEE      TTTTTTTTTTT
NNNNNNNN     NNNNN                          **
**                                    EEEEE            A       TTTT      OOO
NNNNNNNNN    NNNNN                          **
**                                EEEEEEEEEEEE    AAA    TTT    OOOOOOOO  NNNNN
NNNN  NNNNN                             **
**                                EEEEEEEEEEE    AAAAA    TTT    OOOOOOOO  NNNNN
NNNN NNNNN                              **
**                                EEEEE                   TTTT      OOO    NNNNN
 NNNNNNNNN                              **
**                                EEEEEEEEE    AAAAAAA    TTTTT            NNNNN
  NNNNNNNN                              **
**                                EEEEEEEE   AAAAAAAAA    TTTTTTT          NNNNN
   NNNNNNN                              **
**
                                          **
**        This software (firmware) developed by EATON-KENWAY is proprietary.  Source
code on listings or any other media       **
**        is not for sale or loan and may not be copied or transferred to any vendor,
buyer, or consultant.  Executable       **
**          code is available in ROM and is sold with the original product or as a
product upgrade.  Buyer shall not            **
**         copy or distribute ROM's with E-K firmware to any third party without the
prior written approval of EATON-KENWAY.   **
**           Title to and ownership of the software shall at all times remain with
EATON-KENWAY.   The information  in this      **
**           is subject to change without notice  and should not be construed as a
commitment by EATON-KENWAY.                     **
**
                                          **
**         EATON-KENWAY   assumes  no  responsibility  for  the  use or reliability
of  its  software on  equipment which        **
**          is  not supplied EATON-KENWAY or has been modified without EATON-KENWAY
approval.                                     **
```

```
**
                                        **
**          Copyright 1989
                 KENWAY, INCORPORATED    **
************************************************************************************
**********************************************
   kalman kalman kalman kalman kalman kalman kalman kalman kalman kalman kalman kalman
kalman kalman
        DATE CREATED:  Aug 90
        AUTHOR:        Vehicle Group
        DESCRIPTION:
            xxx......            ....
        PROGRAM HISTORY:
        Date          Initials/No.        Description
        ---------     ------------        ----------------------------------------
* * * * * * * * * * * * * * * * * * * * * * * * * * * * * * * * * * * * * * * * * * *
* * * * * * * * * * * * * * * * * * * * * * */
/* * * * * * * * * * * * * * * * * * * */
/* I N C L U D E   F I L E S        */
/* * * * * * * * * * * * * * * * * * * */
#include <math.h>
#include <stdio.h>
#include <stdlib.h>
#include "v4mesgs.k"
#include "v4motion.k"
#include "v4hcommn.k"
#include "v4init_d.k"
#include "v4vars.k"
#if defined(SIMULATION)
  #include <memory.h>
  #include "esimtype.p"
#endif

/* * * * * * * * * * * * * * * * * * * */
/* P R O T O T Y P E S               */
/* * * * * * * * * * * * * * * * * * * */
void azimuth_initialization(void);
void calculate_A_matrix(void);
void calculate_B_matrix(void);
void calculate_C_matrix(void);
void calculate_P_matrix(void);
void calculate_phi_matrix(void);
```

```
void calculate_Q_matrix(void);
void calculate_sigma(void);
double fix_angle( double );
void init_ip( );
void init_sigma(void);
void initialize_P_matrix(void);
void kalman_azimuth(void);
void kalman_init(void);
void kalman_xy(void);
void propogate_P_matrix(void);
void update_wheels(void);

/* * * * * * * * * * * * * * * * * * * * * * * * * * * * * * * * * * * * */
/* D E F I N E S                                                        */
/* * * * * * * * * * * * * * * * * * * * * * * * * * * * * * * * * * * * */
#if defined(SIMULATION)
  /*=========================================================*/
  /* these values are loaded from disk files when kalman has */
  /* been compiled to be run on the simulator.               */
  /*=========================================================*/

  /* initial p matrix diagonal values */
  double exp_delta_x_f;
  double exp_delta_y_f;
  double exp_delta_theta_f;
  double exp_delta_cal_rw;
  double exp_delta_cal_lw;
  double exp_delta_wheel_base;
  double exp_delta_gyro_drift;
  double exp_delta_omega_mkv;
  double exp_delta_omega_rw;
  double p12, p13, p23;

  /* initial V (noise) matrix diagonal values */
  double v11, v22, v33, v77, v88, v99;
  /* r_down_range, r_cross_range, r_azimuth from file */
  double rdr, rcr, ra;
#else
  /*=========================================================*/
  /* these values are defined as constants when kalman has   */
  /* been compiled to run in the vehicle.                    */
  /*=========================================================*/
```

```
 /* initail values for main diagonal of the P matrix.                          */
 #define EXP_DELTA_X_F          3200.0         /* downrange in mm's           */
 #define EXP_DELTA_Y_F        358400.0         /* crossrange in mm's          */
 #define EXP_DELTA_THETA_F         0.011       /* factory heading in rads     */
 #define EXP_DELTA_CAL_RW          0.0001      /* rt whl cal                  */
 #define EXP_DELTA_CAL_LW          0.0001      /* lf whl cal                  */
 #define EXP_DELTA_WHEEL_BASE      0.0         /* wheel base in mm's          */
 #define EXP_DELTA_GYRO_DRIFT      0.0         /* gyro drift in radians       */
 #define EXP_DELTA_OMEGA_MKV       0.0         /* mkv in radians              */
 #define EXP_DELTA_OMEGA_RW        0.0007      /* random walk in radians      */
 #define P12                   23930.0
 #define P13                       5.981
 #define P23                      44.72

 /* initial values for main diagonal of the noise matrix V.                    */
 #define V11                       0.0001
 #define V22                       0.0001
 #define V33                       0.00001
 #define V77                       0.0
 #define V88                       0.0
 #define V99                       0.000025

 /* inital value for r_down_range, r_cross_range, r_azimuth                    */
 #define RDR                      12.0         /* r_down_range                */
 #define RCR                      12.0         /* r_cross_range               */
 #define RA                        0.000001    /* r_azimuth                   */
#endif

/* * * * * * * * * * * * * * * * * * * */
/* V A R I A B L E S                 */
/* * * * * * * * * * * * * * * * * * * */
/*==================================*/
/* VARIABLES FOR PHI MATRIX         */
/*==================================*/
struct phi_matrix
  {
    double  _13, _14, _15;
    double  _23, _24, _25;
    double  _34, _35, _36;
    double  _78, _79, _88;
  }phi;
```

```
struct sigma_matrix
  {
    double  _13, _14, _15;
    double  _23, _24, _25;
    double  _34, _35, _36;
    double  _13_last, _14_last, _15_last;
    double  _23_last, _24_last, _25_last;
    double  _34_last, _35_last, _36_last;
  }sigma;

double   tau_k;                    /* kalman cycle time                  */
unsigned char phi_is_running;

/*================================*/
/* define variables for Q matrix */
/*================================*/
struct q_matrix
  {
    double  _11, _12, _13;
    double  _21, _22, _23;
    double  _31, _32, _33;
    double  _77, _88, _99;
  }q;

  double  v_11;                     /* C_theta_rw   'calibration constant */
  double  v_22;                     /* C_theta_lw                         */
  double  v_33;                     /* C_s+enc                            */
  double  v_77;                     /* C_wng((rad/sec)^2 / sec)           */
  double  v_88;                     /* C_mkv                              */
  double  v_99;                     /* C_rw((rad/sec)^2 / sec)            */

/*===================================*/
/* define variables for the P matrix */
/* at time(n) and at time(n-1).      */
/*===================================*/
double  tau_k_by_2;
struct p_matrix
  {
    double  _11, _12, _13, _14, _15, _16, _17, _18, _19;
    double  _21, _22, _23, _24, _25, _26, _27, _28, _29;
    double  _31, _32, _33, _34, _35, _36, _37, _38, _39;
```

```
    double  _41, _42, _43, _44, _45, _46, _47, _48, _49;
    double  _51, _52, _53, _54, _55, _56, _57, _58, _59;
    double  _61, _62, _63, _64, _65, _66, _67, _68, _69;
    double  _71, _72, _73, _74, _75, _76, _77, _78, _79;
    double  _81, _82, _83, _84, _85, _86, _87, _88, _89;
    double  _91, _92, _93, _94, _95, _96, _97, _98, _99;
  }pn; /* p now */

struct p_last_matrix
  {
    double  _11, _12, _13, _14, _15, _16, _17, _18, _19;
    double  _21, _22, _23, _24, _25, _26, _27, _28, _29;
    double  _31, _32, _33, _34, _35, _36, _37, _38, _39;
    double  _41, _42, _43, _44, _45, _46, _47, _48, _49;
    double  _51, _52, _53, _54, _55, _56, _57, _58, _59;
    double  _61, _62, _63, _64, _65, _66, _67, _68, _69;
    double  _71, _72, _73, _74, _75, _76, _77, _78, _79;
    double  _81, _82, _83, _84, _85, _86, _87, _88, _89;
    double  _91, _92, _93, _94, _95, _96, _97, _98, _99;
  }pl; /*p last */

/*=====================================*/
/* define intermediate matrix variables */
/*=====================================*/
struct a_matrix
  {
    double  _11, _12, _13;
    double  _21, _22, _23;
    double  _31, _32, _33;
    double  _77, _88, _99;
  }a;

struct b_matrix
  {
    double  _11, _12, _13, _14, _15, _16, _17, _18, _19;
    double  _21, _22, _23, _24, _25, _26, _27, _28, _29;
    double  _31, _32, _33, _34, _35, _36, _37, _38, _39;
    double  _71, _72, _73, _74, _75, _76, _77, _78, _79;
    double  _81, _82, _83, _84, _85, _86, _87, _88, _89;
  }b;

struct c_matrix
```

```
{
  double  _11, _12, _13, _17, _18;
  double  _21, _22, _23, _27, _28;
  double  _31, _32, _33, _37, _38;
  double  _41, _42, _43, _47, _48;
  double  _51, _52, _53, _57, _58;
  double  _61, _62, _63, _67, _68;
  double  _71, _72, _73, _77, _78;
  double  _81, _82, _83, _87, _88;
  double  _91, _92, _93, _97, _98;
}c;


/*============================*/
/* variables used as constants */
/*============================*/


/*==================================================*/
/* variables used in calculating kalman state vector */
/*==================================================*/
struct kn_vector
  {
    double _11, _21, _31, _41, _51, _61, _71, _81, _91;
    double _12, _22, _32, _42, _52, _62, _72, _82, _92;
    double _13, _23, _33, _43, _53, _63, _73, _83, _93;
  }kn;
struct kd_vector
  {
    double _11, _12, _13;
    double      _22, _23;
    double           _33;
  }kd;
struct kdi_vector
  {
    double _11, _12, _13;
    double      _22, _23;
    double           _33;
  }kdi;
struct k_vector
  {
    double _11, _21, _31, _41, _51, _61, _71, _81, _91;
```

```
    double _12, _22, _32, _42, _52, _62, _72, _82, _92;
    double _13, _23, _33, _43, _53, _63, _73, _83, _93;
  }k;

struct dx_vector  /* kalman system update factors */
  {
    double xf;
    double yf;
    double tf;
    double rw;
    double lw;
    double wb;
    double table_angle;
    double mkv;
    double random_walk;
  }dx;
struct state_vector  /* kalman system update factors */
  {
    double xf;
    double yf;
    double tf;
    double starb;
    double port;
    double wb;
    double table_angle;
    double mkv;
    double random_walk;
  }state;
struct ph_matrix
  {
    double _11, _21, _31, _41, _51, _61, _71, _81, _91;
    double _12, _22, _32, _42, _52, _62, _72, _82, _92;
  }ph;

struct i_hph_matrix
  {
    double _11, _12;
    double _21, _22;
  }i_hph;
#define KALMAN_SIZE 8    /* always 1 less than number of rows/cols */
double z_down_range_estimate, z_cross_range_estimate, z_azimuth_estimate;
double r_down_range, r_cross_range, r_azimuth;
```

```
double d;
double delta_z;
unsigned long tau_time_last;
double x_sign;      /* test   must be -1.0 or 1.0 */
/*==============================================================*/
/* variables used for determining the time it takes for kalman    */
/* to run.                                                         */
/* when at the waypoint and kalman_done = TRUE then the kalman    */
/* update cycle was successfully completed and kalman_time        */
/* contains the number of 10ms clock ticks it took kalman to run. */
/* when at the waypoint and kalman_done = FALSE then the kalman   */
/* update cycle was not successfully completed and the number of  */
/* 10ms clock ticks in between the start of the kalman update and */
/* the waypoint is contained in kalman_time, kalman_extra_time    */
/* will contain the time kalman took to execute.                  */
/*==============================================================*/
unsigned long kalman_extra_time;
unsigned long kalman_start_time;
unsigned long kalman_time;
unsigned char kalman_running;
unsigned char kalman_done;
unsigned char at_waypoint;

/*========================*/
/* external declarations */
/*========================*/
extern  double xvf, yvf;
extern  double tfv, tfvi, tfv_last;
extern  double delta_yvf, delta_xvf;
extern  double delta_xrwn, delta_xlwn;
extern  double sa;
extern  double s_mkv;
extern  double mm_per_radian;
extern  double dimension__wheelbase;
extern  double sin_tfv, cos_tfv;
extern  double omega_mkv_last;
extern  double gamma_ft, gamma_ft_last;
extern  double z_azimuth;
extern  double z_down_range, z_cross_range;
extern  double tip;
extern  double tip_base;
extern  unsigned long gamma_time_last;
```

```
extern  unsigned long user_time;
extern  unsigned total_nav_cycles;
extern  mv_rcrd_type *pt__mvq;
extern  double   delta_1;               /* Y component of ums_y__delta_m */
extern  double   delta_2;               /* X component of ums_y__delta_m */
/* * * * * * * * * * * * * * * * * * * * * * * * * * * * * * * * * * * * * * */
/* AZIMUTH INITIALIZATION                                                     */
/* determines the rate of drift on the inertial platform                      */
/* * * * * * * * * * * * * * * * * * * * * * * * * * * * * * * * * * * * * * */
void azimuth_initialization(void)
{ z_azimuth = fix_angle( tip + gamma_ft - tfvi );
  tau_k = (double)(user_time - tau_time_last) * TICKS_2_SECS;
  state.random_walk -= z_azimuth / tau_k;
  init_ip( );
}

/* * * * * * * * * * * * * * * * * * * * * * * * * * * * * * * * * * * * * * */
/* CALCULATE A MATRIX                                                         */
/* the A matrix is the first intermediate step in calculating the P matrix.*/
/*                                                                            */
/*         A = [P(n-1) + Q(n)]                                                */
/* * * * * * * * * * * * * * * * * * * * * * * * * * * * * * * * * * * * * * */
void calculate_A_matrix(void)
{
  a._11 = pl._11 + q._11;
  a._12 = pl._12 + q._12;
  a._13 = pl._13 + q._13;
  a._21 = pl._21 + q._21;
  a._22 = pl._22 + q._22;
  a._23 = pl._23 + q._23;
  a._31 = pl._31 + q._31;
  a._32 = pl._32 + q._32;
  a._33 = pl._33 + q._33;
  a._77 = pl._77 + q._77;
  a._88 = pl._88 + q._88;
  a._99 = pl._99 + q._99;
} /* end of A matrix */

/* * * * * * * * * * * * * * * * * * * * * * * * * * * * * * * * * * * * * * */
/* CALCULATE B MATRIX                                                         */
/* the B matrix is the 2nd intermediate step in calculating the P matrix.    */
/*                                                                            */
```

```
/*         B = PHI(n) * [P(n-1) + Q(n)]                                    */
/*                      or                                                 */
/*                    PHI(n) * A                                           */
/* * * * * * * * * * * * * * * * * * * * * * * * * * * * * * * * * * * * * */
void calculate_B_matrix(void)
{
  b._11 =      a._11 + (phi._13 * a._31) + (phi._14 * pl._41) + (phi._15 * pl._51);
  b._12 =      a._12 + (phi._13 * a._32) + (phi._14 * pl._42) + (phi._15 * pl._52);
  b._13 =      a._13 + (phi._13 * a._33) + (phi._14 * pl._43) + (phi._15 * pl._53);
  b._14 = pl._14 + (phi._13 * pl._34) + (phi._14 * pl._44) + (phi._15 * pl._54);
  b._15 = pl._15 + (phi._13 * pl._35) + (phi._14 * pl._45) + (phi._15 * pl._55);
  b._16 = pl._16 + (phi._13 * pl._36) + (phi._14 * pl._46) + (phi._15 * pl._56);
  b._17 = pl._17 + (phi._13 * pl._37) + (phi._14 * pl._47) + (phi._15 * pl._57);
  b._18 = pl._18 + (phi._13 * pl._38) + (phi._14 * pl._48) + (phi._15 * pl._58);
  b._19 = pl._19 + (phi._13 * pl._39) + (phi._14 * pl._49) + (phi._15 * pl._59);
  b._21 =      a._21 + (phi._23 * a._31) + (phi._24 * pl._41) + (phi._25 * pl._51);
  b._22 =      a._22 + (phi._23 * a._32) + (phi._24 * pl._42) + (phi._25 * pl._52);
  b._23 =      a._23 + (phi._23 * a._33) + (phi._24 * pl._43) + (phi._25 * pl._53);
  b._24 = pl._24 + (phi._23 * pl._34) + (phi._24 * pl._44) + (phi._25 * pl._54);
  b._25 = pl._25 + (phi._23 * pl._35) + (phi._24 * pl._45) + (phi._25 * pl._55);
  b._26 = pl._26 + (phi._23 * pl._36) + (phi._24 * pl._46) + (phi._25 * pl._56);
  b._27 = pl._27 + (phi._23 * pl._37) + (phi._24 * pl._47) + (phi._25 * pl._57);
  b._28 = pl._28 + (phi._23 * pl._38) + (phi._24 * pl._48) + (phi._25 * pl._58);
  b._29 = pl._29 + (phi._23 * pl._39) + (phi._24 * pl._49) + (phi._25 * pl._59);
  b._31 =      a._31 + (phi._34 * pl._41) + (phi._35 * pl._51) + (phi._36 * pl._61);
  b._32 =      a._32 + (phi._34 * pl._42) + (phi._35 * pl._52) + (phi._36 * pl._62);
  b._33 =      a._33 + (phi._34 * pl._43) + (phi._35 * pl._53) + (phi._36 * pl._63);
  b._34 = pl._34 + (phi._34 * pl._44) + (phi._35 * pl._54) + (phi._36 * pl._64);
  b._35 = pl._35 + (phi._34 * pl._45) + (phi._35 * pl._55) + (phi._36 * pl._65);
  b._36 = pl._36 + (phi._34 * pl._46) + (phi._35 * pl._56) + (phi._36 * pl._66);
  b._37 = pl._37 + (phi._34 * pl._47) + (phi._35 * pl._57) + (phi._36 * pl._67);
  b._38 = pl._38 + (phi._34 * pl._48) + (phi._35 * pl._58) + (phi._36 * pl._68);
  b._39 = pl._39 + (phi._34 * pl._49) + (phi._35 * pl._59) + (phi._36 * pl._69);

  b._71 = pl._71 + (phi._78 * pl._81) + (phi._79 * pl._91);
  b._72 = pl._72 + (phi._78 * pl._82) + (phi._79 * pl._92);
  b._73 = pl._73 + (phi._78 * pl._83) + (phi._79 * pl._93);
  b._74 = pl._74 + (phi._78 * pl._84) + (phi._79 * pl._94);
  b._75 = pl._75 + (phi._78 * pl._85) + (phi._79 * pl._95);
  b._76 = pl._76 + (phi._78 * pl._86) + (phi._79 * pl._96);
  b._77 = pl._77 + (phi._78 * pl._87) + (phi._79 * pl._97);
  b._78 = pl._78 + (phi._78 * pl._88) + (phi._79 * pl._98);
```

```
  b._79 = pl._79 + (phi._78 * pl._89) + (phi._79 *  a._99);
  b._81 = phi._88 * pl._81;
  b._82 = phi._88 * pl._82;
  b._83 = phi._88 * pl._83;
  b._84 = phi._88 * pl._84;
  b._85 = phi._88 * pl._85;
  b._86 = phi._88 * pl._86;
  b._87 = phi._88 * pl._87;
  b._88 = phi._88 * a._88;
  b._89 = phi._88 * pl._89;
} /* end of B matrix */

/* * * * * * * * * * * * * * * * * * * * * * * * * * * * * * * * * * * * * * */
/* CALCULATE C MATRIX                                                          */
/* the C matrix is the 3rd intermediate step in calculating the P matrix.     */
/*                                                                             */
/*                                              T                              */
/*           C = PHI(n) * [P(n-1) + Q(n)] * PHI(n)                             */
/*                                                                             */
/*                                  or                                         */
/*                                        T                                    */
/*                              B * PHI(n)                                     */
/* * * * * * * * * * * * * * * * * * * * * * * * * * * * * * * * * * * * * * */
void calculate_C_matrix(void)
{
  c._11 = b._11 + (b._13 * phi._13) + (b._14 * phi._14) + (b._15 * phi._15);
  c._12 = b._12 + (b._13 * phi._23) + (b._14 * phi._24) + (b._15 * phi._25);
  c._13 = b._13 + (b._14 * phi._34) + (b._15 * phi._35) + (b._16 * phi._36);

  c._17 = b._17 + (b._18 * phi._78) + (b._19 * phi._79);
  c._18 = b._18 * phi._88;

  c._21 = b._21 + (b._23 * phi._13) + (b._24 * phi._14) + (b._25 * phi._15);
  c._22 = b._22 + (b._23 * phi._23) + (b._24 * phi._24) + (b._25 * phi._25);
  c._23 = b._23 + (b._24 * phi._34) + (b._25 * phi._35) + (b._26 * phi._36);

  c._27 = b._27 + (b._28 * phi._78) + (b._29 * phi._79);
  c._28 = b._28 * phi._88;

  c._31 = b._31 + (b._33 * phi._13) + (b._34 * phi._14) + (b._35 * phi._15);
  c._32 = b._32 + (b._33 * phi._23) + (b._34 * phi._24) + (b._35 * phi._25);
  c._33 = b._33 + (b._34 * phi._34) + (b._35 * phi._35) + (b._36 * phi._36);
```

```
c._37 = b._37 + (b._38 * phi._78) + (b._39 * phi._79);
c._38 = b._38 * phi._88;

c._41 = pl._41 + (pl._43 * phi._13) + (pl._44 * phi._14) + (pl._45 * phi._15);
c._42 = pl._42 + (pl._43 * phi._23) + (pl._44 * phi._24) + (pl._45 * phi._25);
c._43 = pl._43 + (pl._44 * phi._34) + (pl._45 * phi._35) + (pl._46 * phi._36);

c._47 = pl._47 + (pl._48 * phi._78) + (pl._49 * phi._79);
c._48 = pl._48 * phi._88;

c._51 = pl._51 + (pl._53 * phi._13) + (pl._54 * phi._14) + (pl._55 * phi._15);
c._52 = pl._52 + (pl._53 * phi._23) + (pl._54 * phi._24) + (pl._55 * phi._25);
c._53 = pl._53 + (pl._54 * phi._34) + (pl._55 * phi._35) + (pl._56 * phi._36);

c._57 = pl._57 + (pl._58 * phi._78) + (pl._59 * phi._79);
c._58 = pl._58 * phi._88;
c._61 = pl._61 + (pl._63 * phi._13) + (pl._64 * phi._14) + (pl._65 * phi._15);
c._62 = pl._62 + (pl._63 * phi._23) + (pl._64 * phi._24) + (pl._65 * phi._25);
c._63 = pl._63 + (pl._64 * phi._34) + (pl._65 * phi._35) + (pl._66 * phi._36);

c._67 = pl._67 + (pl._68 * phi._78) + (pl._69 * phi._79);
c._68 = pl._68 * phi._88;
c._71 = b._71 + (b._73 * phi._13) + (b._74 * phi._14) + (b._75 * phi._15);
c._72 = b._72 + (b._73 * phi._23) + (b._74 * phi._24) + (b._75 * phi._25);
c._73 = b._73 + (b._74 * phi._34) + (b._75 * phi._35) + (b._76 * phi._36);

c._77 = b._77 + (b._78 * phi._78) + (b._79 * phi._79);
c._78 = b._78 * phi._88;
c._81 = b._81 + (b._83 * phi._13) + (b._84 * phi._14) + (b._85 * phi._15);
c._82 = b._82 + (b._83 * phi._23) + (b._84 * phi._24) + (b._85 * phi._25);
c._83 = b._83 + (b._84 * phi._34) + (b._85 * phi._35) + (b._86 * phi._36);

c._87 = b._87 + (b._88 * phi._78) + (b._89 * phi._79);
c._88 = b._88 * phi._88;
c._91 = pl._91 + (pl._93 * phi._13) + (pl._94 * phi._14) + (pl._95 * phi._15);
c._92 = pl._92 + (pl._93 * phi._23) + (pl._94 * phi._24) + (pl._95 * phi._25);
c._93 = pl._93 + (pl._94 * phi._34) + (pl._95 * phi._35) + (pl._96 * phi._36);

c._97 = pl._97 + (pl._98 * phi._78) + (a._99 * phi._79);
c._98 = pl._98 * phi._88;
} /* end of C matrix */
```

```
/* * * * * * * * * * * * * * * * * * * * * * * * * * * * * * * * * * * * * */
/* CALCULATE PHI MATRIX COEFFICIENTS                                         */
/* * * * * * * * * * * * * * * * * * * * * * * * * * * * * * * * * * * * * */
void calculate_phi_matrix(void)
{
  /* calculate phi values using sigma values */
  phi._13 = -sigma._13;
  phi._14 = sigma._14 * 0.5;
  phi._15 = sigma._15 * 0.5;
  phi._23 = sigma._23;
  phi._24 = sigma._24 * 0.5;
  phi._25 = sigma._25 * 0.5;
  phi._34 = sa * sigma._34;
  phi._35 = -sa * sigma._35;
  phi._36 = -sa * sigma._36;
  phi._78 = (1.0 - exp(-s_mkv * tau_k)) * s_mkv;
      /*  phi._79 = tau_k; */
  phi._79 = 0.0;
  phi._88 = exp(-s_mkv * tau_k);
  /* save last values (n-1)'s */
  sigma._13_last = 0.0;
  sigma._14_last = 0.0;
  sigma._15_last = 0.0;
  sigma._23_last = 0.0;
  sigma._24_last = 0.0;
  sigma._25_last = 0.0;
  sigma._34_last = 0.0;
  sigma._35_last = 0.0;
  sigma._36_last = 0.0;
} /* end of calculate phi matrix coefficients */

/* * * * * * * * * * * * * * * * * * * * * * * * * * * * * * * * * * * * * */
/* CALCULATE P MATRIX COEFFICIENTS                                           */
/*                                         T                                 */
/* P = PHI(n) * [P(n-1) + * Q(n)] * PHI(n)  + * Q(n))                        */
/*                                or                                         */
/*                     C + Q(n)                                              */
/*                                                                           */
/* * * * * * * * * * * * * * * * * * * * * * * * * * * * * * * * * * * * * */
void calculate_P_matrix(void)
```

```
{
  /* build the P(n) matrix */
  pn._11 = c._11 + q._11;
  pn._12 = c._12 + q._12;
  pn._13 = c._13 + q._13;
  pn._14 = b._14;
  pn._15 = b._15;
  pn._16 = b._16;
  pn._17 = c._17;
  pn._18 = c._18;
  pn._19 = b._19;
  pn._21 = c._21 + q._21;
  pn._22 = c._22 + q._22;
  pn._23 = c._23 + q._23;
  pn._24 = b._24;
  pn._25 = b._25;
  pn._26 = b._26;
  pn._27 = c._27;
  pn._28 = c._28;
  pn._29 = b._29;
  pn._31 = c._31 + q._31;
  pn._32 = c._32 + q._32;
  pn._33 = c._33 + q._33;
  pn._34 = b._34;
  pn._35 = b._35;
  pn._36 = b._36;
  pn._37 = c._37;
  pn._38 = c._38;
  pn._39 = b._39;
  pn._41 = c._41;
  pn._42 = c._42;
  pn._43 = c._43;
  pn._44 = pl._44;
  pn._45 = pl._45;
  pn._46 = pl._46;
  pn._47 = c._47;
  pn._48 = c._48;
  pn._49 = pl._49;
  pn._51 = c._51;
  pn._52 = c._52;
  pn._53 = c._53;
  pn._54 = pl._54;
```

```
pn._55 = pl._55;
pn._56 = pl._56;
pn._57 = c._57;
pn._58 = c._58;
pn._59 = pl._59;
pn._61 = c._61;
pn._62 = c._62;
pn._63 = c._63;
pn._64 = pl._64;
pn._65 = pl._65;
pn._66 = pl._66;
pn._67 = c._67;
pn._68 = c._68;
pn._69 = pl._69;
pn._71 = c._71;
pn._72 = c._72;
pn._73 = c._73;
pn._74 = b._74;
pn._75 = b._75;
pn._76 = b._76;
pn._77 = c._77 + q._77;
pn._78 = c._78;
pn._79 = b._79;
pn._81 = c._81;
pn._82 = c._82;
pn._83 = c._83;
pn._84 = b._84;
pn._85 = b._85;
pn._86 = b._86;
pn._87 = c._87;
pn._88 = c._88 + q._88;
pn._89 = b._89;
pn._91 = c._91;
pn._92 = c._92;
pn._93 = c._93;
pn._94 = pl._94;
pn._95 = pl._95;
pn._96 = pl._96;
pn._97 = c._97;
pn._98 = c._98;
pn._99 = a._99 + q._99;
} /* end of calc P matrix */
```

```
/* * * * * * * * * * * * * * * * * * * * * * * * * * * * * * * * * * * * * * */
/* CALCULATE Q MATRIX COEFFICIENTS                                               */
/* calculates                                                                    */
/*                    T  * Q                                                     */
/*                     k    (k)                                                  */
/* * * * * * * * * * * * * * * * * * * * * * * * * * * * * * * * * * * * * * */
void calculate_Q_matrix(void)
{
double v11_x_phi_14;
double v11_x_phi_24;
double v22_x_phi_15;
double v22_x_phi_25;
double v33_x_phi_13;

  v11_x_phi_14 =  v_11 * phi._14;
  v11_x_phi_24 =  v_11 * phi._24;
  v22_x_phi_15 =  v_22 * phi._15;
  v22_x_phi_25 =  v_22 * phi._25;
  v33_x_phi_13 =  v_33 * phi._13;
  q._11 =         0.5 * ( ((v11_x_phi_14 * phi._14) +
                           (v22_x_phi_15 * phi._15) +
                           (v33_x_phi_13 * phi._13)) );
  q._12 = q._21 = 0.5 * ( ((v11_x_phi_14 * phi._24) +
                          (v22_x_phi_15 * phi._25) +
                          (v33_x_phi_13 * phi._23)) );
  q._13 = q._31 = 0.5 * ( ((v11_x_phi_14 * phi._34) +
                          (v22_x_phi_15 * phi._35)) );
  q._22 =         0.5 * ( ((v11_x_phi_24 * phi._24) +
                          (v22_x_phi_25 * phi._25) +
                          (v_33 * phi._23 * phi._23)) );

  q._23 = q._32 = 0.5 * ( ((v11_x_phi_24 * phi._34) +
                           (v22_x_phi_25 * phi._35)) );
  q._33 =         0.5 * ( ((v_11 * phi._34 * phi._34) +
                           (v_22 * phi._35 * phi._35)) );
  q._77 = v_77;
  q._88 = v_88;
  q._99 = v_99 * 0.5 * (tau_k * tau_k);
} /* end of calculate q coefficients */

/* * * * * * * * * * * * * * * * * * * * * * * * * * * * * * * * * * * * * * */
/* CALCULATE SIGMA                                                               */
```

```
/* * * * * * * * * * * * * * * * * * * * * * * * * * * * * * * * * * * * * */
void calculate_sigma(void)
{
  /* calculate sigma values */
  sigma._13 = sigma._13_last + delta_yvf;
  sigma._14 = sigma._14_last + (cos_tfv * delta_xrwn);
  sigma._15 = sigma._15_last + (cos_tfv * delta_xlwn);
  sigma._23 = sigma._23_last + delta_xvf;
  sigma._24 = sigma._24_last + (sin_tfv * delta_xrwn);
  sigma._25 = sigma._25_last + (sin_tfv * delta_xlwn);
  sigma._34 = sigma._34_last + delta_xrwn;
  sigma._35 = sigma._35_last + delta_xlwn;
  sigma._36 = sigma._36_last + (tfv - tfv_last);    /* delta_tfv */
  /* save last values (n-1)'s */
  sigma._13_last = sigma._13;
  sigma._14_last = sigma._14;
  sigma._15_last = sigma._15;
  sigma._23_last = sigma._23;
  sigma._24_last = sigma._24;
  sigma._25_last = sigma._25;
  sigma._34_last = sigma._34;
  sigma._35_last = sigma._35;
  sigma._36_last = sigma._36;
} /* end of calculate_sigma */

/* * * * * * * * * * * * * * * * * * * * * * * * * * * * * * * * * * * * * */
/* INITIALIZE P MATRIX                                                      */
/* * * * * * * * * * * * * * * * * * * * * * * * * * * * * * * * * * * * * */
void initialize_P_matrix(void)
{
int i;
double *ptr;
  /* initial p(n) matrix is initialized to zero */
  ptr = &pn._11;
  for(i = 0; i < 81 ;i++)
    {
      *ptr++ = 0.0;
    }

  /* initial P(n-1) matrix is the zero matrix then the diagonal is put in it */
  ptr = &pl._11;
  for(i = 0; i < 81 ;i++)
```

```
    {
      *ptr++ = 0.0;
    }
  /* initial P(n-1) matrix is a diagonal matrix */
  #if defined(SIMULATION)
    pl._11 = exp_delta_x_f;         /* EXP_DELTA_X_F;          */
    pl._22 = exp_delta_y_f;         /* EXP_DELTA_Y_F;          */
    pl._33 = exp_delta_theta_f;     /* EXP_DELTA_THETA_F;      */
    pl._44 = exp_delta_cal_rw;      /* EXP_DELTA_CAL_RW;       */
    pl._55 = exp_delta_cal_lw;      /* EXP_DELTA_CAL_LW;       */
    pl._66 = exp_delta_wheel_base;  /* EXP_DELTA_WHEEL_BASE; */
    pl._77 = exp_delta_gyro_drift;  /* EXP_DELTA_GYRO_DRIFT; */
    pl._88 = exp_delta_omega_mkv;   /* EXP_DELTA_OMEGA_MKV;  */
    pl._99 = exp_delta_omega_rw;    /* EXP_DELTA_OMEGA_RW;   */
    pl._12 = pl._21 = p12;
    pl._13 = pl._31 = p13;
    pl._23 = pl._32 = p23;
  #else
    pl._11 = EXP_DELTA_X_F;
    pl._22 = EXP_DELTA_Y_F;
    pl._33 = EXP_DELTA_THETA_F;
    pl._44 = EXP_DELTA_CAL_RW;
    pl._55 = EXP_DELTA_CAL_LW;
    pl._66 = EXP_DELTA_WHEEL_BASE;
    pl._77 = EXP_DELTA_GYRO_DRIFT;
    pl._88 = EXP_DELTA_OMEGA_MKV;
    pl._99 = EXP_DELTA_OMEGA_RW;
    pl._12 = pl._21 = P12;
    pl._13 = pl._31 = P13;
    pl._23 = pl._32 = P23;
  #endif
} /* end of initailize p matrix */

/* * * * * * * * * * * * * * * * * * * * * * * * * * * * * * * * * * * * * */
/* INITIALIZE SIGMA                                                         */
/* sigma(n-1) is initialized to zero prior to every move.                   */
/* * * * * * * * * * * * * * * * * * * * * * * * * * * * * * * * * * * * * */
void init_sigma(void)
{
  sigma._13_last = 0.0;
  sigma._14_last = 0.0;
  sigma._15_last = 0.0;
```

```
  sigma._23_last = 0.0;
  sigma._24_last = 0.0;
  sigma._25_last = 0.0;
  sigma._34_last = 0.0;
  sigma._35_last = 0.0;
  sigma._36_last = 0.0;
}

/* * * * * * * * * * * * * * * * * * * * * * * * * * * * * * * * * * * * * * */
/* KALMAN AZIMUTH                                                             */
/* computes dx's for azimuth observation.                                    */
/* inputs:  uses public variables,                                           */
/*          double z_azimuth  delta of gyro and encoder calc angle.          */
/* * * * * * * * * * * * * * * * * * * * * * * * * * * * * * * * * * * * * * */
void kalman_azimuth(void)
{
unsigned i, j;
double *p_ptr, *p_ptr_last, *k_ptr;
  /* set time markers */
  at_waypoint       = FALSE;
  kalman_running    = TRUE;
  kalman_start_time = user_time;
  propogate_P_matrix();
  /* calculate d */
  d = pn._33 - pn._73 - pn._37 + pn._77 + r_azimuth;

  /* calculate k's */
  k._11 = (pn._13 - pn._17) / d;
  k._21 = (pn._23 - pn._27) / d;
  k._31 = (pn._33 - pn._37) / d;
  k._41 = (pn._43 - pn._47) / d;
  k._51 = (pn._53 - pn._57) / d;
  k._61 = (pn._63 - pn._67) / d;
  k._71 = (pn._73 - pn._77) / d;
  k._81 = (pn._83 - pn._87) / d;
  k._91 = (pn._93 - pn._97) / d;

  /* calculate dx's */
  dx.xf          = 0.0;   /* = z_azimuth * k._11; */
  dx.yf          = 0.0;   /* = z_azimuth * k._21; */
  dx.tf          = 0.0;   /* = z_azimuth * k._31; */
  dx.rw          = 0.0;   /* = z_azimuth * k._41; */
```

```
dx.lw          = 0.0;   /* = z_azimuth * k._51; */
dx.wb          = 0.0;   /* = z_azimuth * k._61; */
dx.table_angle = z_azimuth * k._71;
dx.mkv         = z_azimuth * k._81;
dx.random_walk = z_azimuth * k._91;
/*=====================================================*/
/* calculate new P(n) by multiplying a column vector   */
/* times a row vector to produce a new 9 x 9 P matrix. */
/* this is easier than doing 81 seperate calculations. */
/*                                  T                  */
/*                P3 = P2 - D * K * K                  */
/*=====================================================*/
p_ptr      = &pn._11;
k_ptr      = &k._11;
p_ptr_last = &pl._11;

for(i = 0; i < 9; i++)
  {
    for(j = 0; j < 9; j++)
      {
        *p_ptr_last++ = *p_ptr++ - (d * (*(k_ptr + i) * *(k_ptr + j)));
      }
  }
/* update state matrix */
state.xf          += dx.xf;
state.yf          += dx.yf;
state.tf          += dx.tf;
state.wb          += dx.wb * sa;
state.table_angle  = dx.table_angle + gamma_ft;
state.mkv         += dx.mkv;
state.random_walk += dx.random_walk;
/* update all others */
update_wheels();
gamma_ft_last = state.table_angle;

/* mark ending time */
if(!at_waypoint)
  {
    /* time from start to end when completed before waypoint */
    kalman_time = user_time - kalman_start_time;
  }
else
```

```
    {
      /* time from start to end when completed after waypoint */
      kalman_extra_time = user_time - kalman_start_time;
    }
  kalman_running = FALSE;
} /* end of kalman azimuth */

/* * * * * * * * * * * * * * * * * * * * * * * * * * * * * * * * * * * * * * */
/* KALMAN INITIALIZE                                                         */
/* * * * * * * * * * * * * * * * * * * * * * * * * * * * * * * * * * * * * * */
void kalman_init(void)
{ x_sign = -1.0;      /* can be set to 1.0 or -1.0 for test */
  #if defined(SIMULATION)
    r_down_range    = rdr;
    r_cross_range   = rcr;
    r_azimuth       = ra;

    v_11            = v11;
    v_22            = v22;
    v_33            = v33;
    v_77            = v77;
    v_88            = v88;
    v_99            = v99;
  #else
    r_down_range    = RDR;
    r_cross_range   = RCR;
    r_azimuth       = RA;

    v_11            = V11;
    v_22            = V22;
    v_33            = V33;
    v_77            = V77;
    v_88            = V88;
    v_99            = V99;
  #endif
  init_sigma( );      /* zero last sigma's */
  /* initialize state vector */
  state.xf          = 0.0;
  state.yf          = 0.0;
  state.tf          = 0.0;
  state.starb       = 0.0;
  state.port        = 0.0;
```

```
  state.wb          = 0.0;
  state.table_angle = 0.0;
  state.mkv         = 0.0;
  state.random_walk = 0.0;
  initialize_P_matrix();
} /* end of initialize kalman */

/* * * * * * * * * * * * * * * * * * * * * * * * * * * * * * * * * * * * * * * */
/*                                                                              */
/* KALMAN XY                                                                    */
/* inputs:  uses public variables,
/*          double ums_y__delta_m  r dist from vehicle to corrected position */
/*          double z_down_range  x dist from vehicle to corrected position */
/*          double z_cross_range y dist from vehicle to corrected position */
/* * * * * * * * * * * * * * * * * * * * * * * * * * * * * * * * * * * * * * * */
void kalman_xy(void)
{
int i, j, a, b;
double det;
double *k_ptr;
double *kn_ptr;
double *dx_ptr;
double *pl_ptr;
double *pn_ptr;
  /* set time markers */
  at_waypoint       = FALSE;
  kalman_running    = TRUE;
  kalman_start_time = user_time;
  propogate_P_matrix();
  delta_1 *= x_sign;     /* delta_1(2) from update_marker_found(); test: x_sign = -1.0
 or 1.0 */
  delta_2 *= x_sign;

   kn._11 = pn._11 + (delta_1 * pn._13);
   kn._21 = pn._21 + (delta_1 * pn._23);
   kn._31 = pn._31 + (delta_1 * pn._33);
   kn._41 = pn._41 + (delta_1 * pn._43);
   kn._51 = pn._51 + (delta_1 * pn._53);
   kn._61 = pn._61 + (delta_1 * pn._63);
   kn._71 = pn._71 + (delta_1 * pn._73);
   kn._81 = pn._81 + (delta_1 * pn._83);
   kn._91 = pn._91 + (delta_1 * pn._93);
```

```
kn._12 = pn._12 + (delta_2 * pn._13);
kn._22 = pn._22 + (delta_2 * pn._23);
kn._32 = pn._32 + (delta_2 * pn._33);
kn._42 = pn._42 + (delta_2 * pn._43);
kn._52 = pn._52 + (delta_2 * pn._53);
kn._62 = pn._62 + (delta_2 * pn._63);
kn._72 = pn._72 + (delta_2 * pn._73);
kn._82 = pn._82 + (delta_2 * pn._83);
kn._92 = pn._92 + (delta_2 * pn._93);
kn._13 = pn._13 - (pn._19 * tau_k);
kn._23 = pn._23 - (pn._29 * tau_k);
kn._33 = pn._33 - (pn._39 * tau_k);
kn._43 = pn._43 - (pn._49 * tau_k);
kn._53 = pn._53 - (pn._59 * tau_k);
kn._63 = pn._63 - (pn._69 * tau_k);
kn._73 = pn._73 - (pn._79 * tau_k);
kn._83 = pn._83 - (pn._89 * tau_k);
kn._93 = pn._93 - (pn._99 * tau_k);
kd._11 = kn._11 + (delta_1 * kn._31) + r_down_range;
kd._22 = kn._22 + (delta_2 * kn._32) + r_cross_range;
kd._33 = kn._33 - (tau_k * kn._93) + r_azimuth;
kd._12 = kn._12 + (delta_1 * kn._32);
kd._13 = kn._13 + (delta_1 * kn._33);
kd._23 = kn._23 + (delta_2 * kn._33);
det = (kd._11 * ((kd._22 * kd._33) - (kd._23 * kd._23))) -
       kd._33 *   kd._12 * kd._12  -
       kd._22 *   kd._13 * kd._13  +
       2.0    *   kd._12 * kd._13  * kd._23;
kdi._11 = ((kd._22 * kd._33) - (kd._23 * kd._23)) / det;
kdi._22 = ((kd._11 * kd._33) - (kd._13 * kd._13)) / det;
kdi._33 = ((kd._11 * kd._22) - (kd._12 * kd._12)) / det;
kdi._12 = ((kd._13 * kd._23) - (kd._12 * kd._33)) / det;
kdi._23 = ((kd._12 * kd._13) - (kd._11 * kd._23)) / det;
kdi._13 = ((kd._12 * kd._23) - (kd._22 * kd._13)) / det;

k_ptr  = &k._11;
kn_ptr = &kn._11;
for(j = 0; j < 9; j++)
  {
    a = j + 9;
    b = j + 18;
```

```
    *(k_ptr + j) = *(kn_ptr + j) * kdi._11 +
                   *(kn_ptr + a) * kdi._12 +
                   *(kn_ptr + b) * kdi._13;
    *(k_ptr + a) = *(kn_ptr + j) * kdi._12 +
                   *(kn_ptr + a) * kdi._22 +
                   *(kn_ptr + b) * kdi._23;
    *(k_ptr + b) = *(kn_ptr + j) * kdi._13 +
                   *(kn_ptr + a) * kdi._23 +
                   *(kn_ptr + b) * kdi._33;
  }
dx_ptr = &dx.xf;
for(i = 0; i < 9; i++)
  {
    *(dx_ptr + i) = *(k_ptr + i)      * z_down_range +
                    *(k_ptr + i + 9)  * z_cross_range +
                    *(k_ptr + i + 18) * z_azimuth;
  }
/*=====================================================*/
/* calculate new P(n) by multiplying a column vector   */
/* times a row vector to produce a new 9 x 9 P matrix. */
/* this is easier than doing 81 seperate calculations. */
/*=====================================================*/
pl_ptr = &pl._11;
pn_ptr = &pn._11;
for(i = 0; i < 9; i++)
  {
    for(j = 0; j < 9; j++)
      {
        *(pl_ptr + (9 * i) + j) =  *(pn_ptr + (9 * i) + j) -
                                  ((*(k_ptr + i)      * *(kn_ptr + j)) +
                                   (*(k_ptr + i + 9)  * *(kn_ptr + j + 9)) +
                                   (*(k_ptr + i + 18) * *(kn_ptr + j + 18)));
      }
  }
/* update state matrix */
state.xf            = dx.xf;
state.yf            = dx.yf;
state.tf            = tfv + dx.tf;
state.wb           += dx.wb * sa;
state.table_angle   = dx.table_angle + gamma_ft;
state.mkv          += dx.mkv;
state.random_walk += dx.random_walk;
```

```
  gamma_ft = gamma_ft_last = 0.0;
  tip = 0.0;
  tip_base = state.tf;
  set_encoder((ENCD__CLR | ENCD__C_INT) + (ENCD__INERT_PLAT_BIT));
  gamma_time_last = user_time;
  /* update all others */
  update_wheels();
  /* mark ending time */
  if(!at_waypoint)
    {
      /* time from start to end when completed before waypoint */
      kalman_time = user_time - kalman_start_time;
    }
  else
    {
      /* time from start to end when completed after waypoint */
      kalman_extra_time = user_time - kalman_start_time;
    }
  kalman_running = FALSE;
} /* end of kalman update */

/* * * * * * * * * * * * * * * * * * * * * * * * * * * * * * * * * * * * */
/* PROPOGATE P MATRIX                                                     */
/* * * * * * * * * * * * * * * * * * * * * * * * * * * * * * * * * * * * */
void propogate_P_matrix(void)
{
  tau_k = (double)(user_time - tau_time_last) * TICKS_2_SECS;
  tau_time_last = user_time;
  total_nav_cycles = 0;
  phi_is_running = TRUE;
  calculate_phi_matrix();
  phi_is_running = FALSE;
  calculate_Q_matrix();
  calculate_A_matrix();
  calculate_B_matrix();
  calculate_C_matrix();
  calculate_P_matrix();
} /* end of propogate p matrix */

/* * * * * * * * * * * * * * * * * * * * * * * * * * * * * * * * * * * * */
/* UPDATE WHEELS                                                          */
/* updates the encoder wheel scales (MM's per encoder tick).              */
```

```
/* * * * * * * * * * * * * * * * * * * * * * * * * * * * * * * * * * * * * */
void update_wheels(void)
{
  *state_lf += dx.lw;
  *state_rt += dx.rw;
  omega_mkv_last = state.mkv;
  mm_per_radian  = dimension__wheelbase; /*  * (1.0 + state.wb); */
} /* end of update wheels */
```

```
/* move2way move2way move2way move2way move2way move2way move2way move2way move2way
move2way move2way move2way move2way move2way
*****************************************************************************************
***********************************************
**
                                              **
**                                  EEEEEEEEEEEEEEE       TTTTTTTTTTTTT
NNNNNNN      NNNNN                            **
**                                  EEEEEEEEEEEEEE        TTTTTTTTTTT
NNNNNNNN     NNNNN                            **
**                                  EEEEE            A        TTTT        OOO
NNNNNNNNN    NNNNN                            **
**                              EEEEEEEEEEEE     AAA      TTT      OOOOOOOO   NNNNN
NNNN  NNNNN                              **
**                              EEEEEEEEEEE     AAAAA     TTT      OOOOOOOO   NNNNN
NNNN NNNNN                              **
**                              EEEEE                     TTTT      OOO       NNNNN
 NNNNNNNNN                              **
**                              EEEEEEEEE     AAAAAAA     TTTTT               NNNNN
  NNNNNNNN                              **
**                              EEEEEEEE     AAAAAAAAA    TTTTTTT             NNNNN
   NNNNNNN                              **
**
                                              **
**        This software (firmware) developed by EATON-KENWAY is proprietary.  Source
code on listings or any other media       **
**        is not for sale or loan and may not be copied or transferred to any vendor,
buyer, or consultant.  Executable       **
**          code is available in ROM and is sold with the original product or as a
product upgrade.  Buyer shall not          **
**         copy or distribute ROM's with E-K firmware to any third party without the
prior written approval of EATON-KENWAY.   **
**           Title to and ownership of the software shall at all times remain with
EATON-KENWAY.   The information  in this      **
**           is subject to change without notice  and should not be construed as a
commitment by EATON-KENWAY.                **
**
                                              **
**          EATON-KENWAY  assumes  no  responsibility  for  the  use or reliability
of  its  software on  equipment which      **
**           is  not supplied EATON-KENWAY or has been modified without EATON-KENWAY
approval.                                  **
```

```
**
                                              **
**          Copyright 1989
                 KENWAY, INCORPORATED     **
************************************************************************************
**********************************************
   move2way move2way move2way move2way move2way move2way move2way move2way move2way
move2way move2way move2way move2way move2way
        DATE CREATED:  Feb 89
        AUTHOR:        Vehicle Group
        DESCRIPTION:
            xxx......            ....
        PROGRAM HISTORY:
        Date        Initials/No.        Description
        ---------   ------------        ---------------------------------------
* * * * * * * * * * * * * * * * * * * * * * * * * * * * * * * * * * * * * * * * * * *
* * * * * * * * * * * * * * * * * * * * * * */
/* * * * * * * * * * * * * * * * * * * */
/* INCLUDE FILES                     */
/* * * * * * * * * * * * * * * * * * * */
#include <stdio.h>
#include <stdlib.h>
#include <math.h>
#include "v4mesgs.k"
#include "v4motion.k"
#include "v4hcommn.k"
#include "v4init_d.k"
#include "v4vars.k"
#if defined(SIMULATION)
  #include "esimtype.p"
  #include "constant.c"
#endif

/* * * * * * * * * * * * * * * * * * * */
/* DEFINES                           */
/* * * * * * * * * * * * * * * * * * * */
#define PI_OVER_2 (PI / 2.0)      /*  90 */
#define PI_OVER_3 (PI / 3.0)      /*  60 */
#define PI_OVER_4 (PI / 4.0)      /*  45 */
#define PI_OVER_6 (PI / 6.0)      /*  30 */
#define TRUE 1
#define FALSE 0
```

```
#define ROTATE_RADIUS 60.0  /* 1/8 wheelbase defined in MM's was 269.875 */
#define WINDOW__457_2MM 457.2
/* * * * * * * * * * * * * * * * * * * * */
/* PROTOTYPES                            */
/* * * * * * * * * * * * * * * * * * * * */
void calculate_polar_coefficients(void);
void calculate_linear_coefficients(void);
unsigned char define_enc_orientation(unsigned orientation);
void drive_motors(void);
void drive_straight(void);
void init_encoders(void);
void init_ip(void);
void init_nav_position(double x_init, double y_init, double theta_init);
void init_nav_variables(void);
void mov_init_master();
void navigation(void);
void turn(void);
void update_marker_found( );
/* * * * * * * * * * * * * * * * * * * * */
/* EXTERNAL PROTOTYPES                   */
/* * * * * * * * * * * * * * * * * * * * */
void   calculate_sigma(void);
void   kalman_init(void);
void   init_sigma(void);
void   m_c_p__move_setup(void);
void   m_c_p__move();
void   m_c_p__state(char);
void   wait__til_mail();
double fix_angle(double);
/* * * * * * * * * * * * * * * * * * * * */
/* LOCAL PUBLIC VARIABLES                */
/* * * * * * * * * * * * * * * * * * * * */
/*==============================*/
/* commanded position variables */
/*==============================*/
double   xwf, ywf;              /* target waypoint pos in factory frame, where were
going                */
/*==============================*/
/* straight line variables      */
/*==============================*/
double   a0,a1,a3,a4,a5;       /* straight line coefficients
                  */
```

```
double   pvi;                     /* phi vehicle initial, heading vehicle to waypoint X
                  */
double   sin_tw, cos_tw;
double   tew, taw, tdw;           /* theta err waypt, theta actual waypt, theta desired
waypt             */
double   tw;                      /* theta waypoint, angle waypoint X to factory X
                  */
double   xofi,yofi;                 /* intermediate value, starting pos of waypoint in
factory frame           */
double   xvfi,yvfi;                /* initial calculated vehicle pos in factory frame,
where were really at */
double   xvw, yvw;                /* when traveling, this is the current pos of vehicle
in waypoint frame  */
double   xvw_last;                /* last position of the vehicle in the waypoint frame
                  */
double   xvwi,yvwi;               /* vehicle pos in waypoint frame initial
                  */
double   ydw;                     /* desired y pos in waypoint frame
                  */
double   ydw_last;               /* last desired position of the vehicle in the waypoint
frame             */
double   yvw_last;                /* last position of the vehicle in the waypoint frame
                  */
double   zero_y_pt;
/*==============================*/
/* turn variables               */
/*==============================*/
double   b0,b2,b3,b4;             /* turn coefficients
                  */
double   delta_x,delta_y;
double   one_half_wheel_base;
double   pt,pv,pv_last;         /* total turn angle, present vehicle angle, last vehicle
angle             */
double   rt,rd,rvp;               /* turn radius, desired radius, vehicle pos in radius
                  */
double   tf;                      /* theta final, turn until you reach this angle
                  */
double   xvp,yvp;                 /* x,y position in polar system during turn
                  */
/*==============================*/
/* navigation variables         */
/*==============================*/
```

```
double   cos_tfv, sin_tfv;     /* trig values of last and current factory heading
                */
double   delta_xrw,delta_xlw;  /* right and left encoder differences
                */
double   delta_ticks_rt;
double   delta_ticks_lt;
double   delta_xv;
double   delta_xvf,delta_yvf;
double   *enc_lf_count, enc_lf_last_count;
double   *enc_rt_count, enc_rt_last_count;
double   fwd_progress;
double   gamma_ft, gamma_ft_last;
double   heading_error;
double   heading_error_factor;
double   ip_drift;
double   ip_ticks_2_radians;   /* conversion factor for inertial platform
                */
double   mm_per_radian;
double   omega_ft;
double   omega_mkv, omega_mkv_last;
double   port_count, starb_count;
double   sa;                   /* same as radians_per_mm, used by kalman
                */
double   s_mkv;
double   tft;
double   tfv;                  /* current vehicle heading in factory frame
                */
double   tfv_average;           /* trend in heading, used for heading corrections by
update_marker_found */
double   tfv_last;             /* last vehicle heading in factory frame
                */
double   tfvi;                 /* initial vehicle heading in factory frame
                */
double   ticks_per_mm;
double   tip;                  /* theta inertial platform
                */
double   tip_base;
double   ttv;                  /* theta, angle between table and vehicle
                */
double   ttv_last;
double   ttvi;                 /* theta, intial angle between the table and vehicle
                */
```

```
double   xvf  yvf;              /* current calculated vehicle pos in the factory frame
                  */
double   xvf last,yvf_last;
unsigned lon  gamma_time;
unsigned lon  gamma_time_last;
/*=====================================*/
/* S parameters and drive parameters */
/*=====================================*/
double   dumm _wr, dummy_ep;
double    ep, p_last,ep_last_last;  /* epsilon path, error of desired position vs.
actual positi             */
double   s0, s , s2, s3, s4, s5;
double   wr_l  t,wr_last_last;

/*=============================*/
/* update mark r variables      */
/* public vars used by kalman   */
/*=============================*/
unsigned char   agnet_defined_in_zone; /* set when magnet is found in zone */
double   z_down range;           /* distance to correct x position   */
double   z_cro   range;          /* distance to correct y position   */
double   ums_y__ elta_m;          /* dist to magnet in vehicle frame  */
double   z_azi   h;              /* diff of tfv and corrected gyro   */
double   delta_1                 /* Y component of ums_y__delta_m */
double   delta_2;                /* X component of ums_y__delta_m */
/*=============================*/
/* all others                   */
/*=============================*/
double        dx_t _scl;      /* debug test on heading correction */
int           mv_t  rn_rot;
unsigned      nav_c cle_time;
double        nav_g ide_cycle_time;
unsigned      secon _pass;
struct
  {
    double ports;
    double starb;
  }encd_raw;
double  mm_conversio  factor;
u_m_log_type *pt__um

/* * * * * * * * * * *   * * * * * * * * */
```

```
/* E X T E R N A L S                    */
/* * * * * * * * * * * * * * * * * * * */
extern ums_offset_type ums_offset;
extern double setpt;
extern double ip_drift_sum;
#if defined(KALMAN)
  extern struct dx_vector  /* kalman system update factors */
          {
            double xf;
            double yf;
            double tf;
            double rw;
            double lw;
            double wb;
            double table_angle;
            double mkv;
            double random_walk;
          }dx;
  extern struct state_vector  /* kalman system update factors */
          {
            double xf;
            double yf;
            double tf;
            double starb;
            double port;
            double wb;
            double table_angle;
            double mkv;
            double random_walk;
          }state;

        struct tmp_dx_vector
          {
            double xf;
            double yf;
            double tf;
          }tmp_dx;

          unsigned total_nav_cycles;
          double   *state_rt, *state_lf;
  extern  unsigned char phi_is_running;
  extern  double   rdr, rcr, ra;
```

```
  extern   unsigned long tau_time_last;
  /*==============================================================*/
  /* variables used for determining the time it takes for kalman   */
  /* to run.  all variables are owned by kalman.c                   */
  /* when at the waypoint and kalman_done = TRUE then the kalman    */
  /* update cycle was successfully completed and kalman_time        */
  /* contains the number of 10ms clock ticks it took kalman to run. */
  /* when at the waypoint and kalman_done = FALSE then the kalman   */
  /* update cycle was not successfully completed and the number of  */
  /* 10ms clock ticks in between the start of the kalman update and */
  /* the waypoint is contained in kalman_time, kalman_extra_time    */
  /* will contain the time kalman took to execute.                  */
  /*==============================================================*/
  extern unsigned long kalman_start_time;
  extern unsigned long kalman_time;
  extern unsigned long user_time;
  extern unsigned char kalman_running;
  extern unsigned char kalman_done;
  extern unsigned char at_waypoint;
#endif

#if defined(SIMULATION)
  unsigned char okay_to_update_io;
  double        dynamic_factor;
  double        random_factor;
  double ports_wheel_constant;     /* affects encoder outputs in simulator  */
  double starb_wheel_constant;     /*   "                "           "      */
  extern unsigned char ums_has_been_read;
  extern double y_displacement;
  extern double y_displacement_last;
  extern double encoder_in_[6];    /* internal encoder input channel 0 -> 5 */
  extern double true_ticks_2meter_port;
  extern double true_ticks_2meter_starb;
  extern double true_mm_per_radian;
  extern double xvf_true, xvf_true_last;
  extern double yvf_true, yvf_true_last;
  extern double tft_true;
  extern double tfv_true;
  extern double ttv_true_last;
  extern double r_triple_prime;
  extern double r_double_prime;
  #if defined(KALMAN)
```

```
    extern double exp_delta_x_f;
    extern double exp_delta_y_f;
    extern double exp_delta_theta_f;
    extern double exp_delta_cal_rw;
    extern double exp_delta_cal_lw;
    extern double exp_delta_wheel_base;
    extern double exp_delta_gyro_drift;
    extern double exp_delta_omega_mkv;
    extern double exp_delta_omega_rw;
    extern double v11, v22, v33, v77, v88, v99;
    extern double p12, p13, p23;
  #endif
#endif
#include "v4mv_wir.k"

/* * * * * * * * * * * * * * * * * * * * * * * * * * * * * * * * * * * * * * */
/* MAIN PROGRAM                                                                */
/* * * * * * * * * * * * * * * * * * * * * * * * * * * * * * * * * * * * * * */
void move__waypoint(void)
{
  for(init_encoders(); mvq.excut < mvq.load ; mvq.excut++)
    {
      pt__mvq = pt__mvq_nxt;
      pt__mvq_nxt = &mvq.lst[(mvq.excut + 1) & MVQ__END_INDX];
      #if defined(KALMAN)
        init_sigma();
        tmp_dx.xf = dx.xf;
        tmp_dx.yf = dx.yf;
        tmp_dx.tf = dx.tf;
        dx.xf = dx.yf = dx.tf = 0.0;
      #else
        z_down_range = z_cross_range = heading_error = 0.0;
      #endif

      /* setup encoder addressing */
      mcp.orientation = define_enc_orientation(pt__mvq->path);

      veh_status.wait = pt__mvq->estim;
      veh_status.status_set   =   (   mcp.orientation   ==   FRONT_FORW   )   ?   (
veh_status.status_set | FORWARD_IS_FRONT_V ) :
                              ( veh_status.status_set & ~FORWARD_IS_FRONT_V );
```

```
/*=====================================*/
/* determine vehicle orientation and if */
/* necessary correct the heading       */
/*=====================================*/
if(mcp.orientation_last != mcp.orientation)
  {
    ttvi = tfvi = tft = fix_angle( tfvi + PI );   /* between -180 and +180 */
    init_ip();
    init_encoders();
    mcp.orientation_last = mcp.orientation;
  }

/* get move parameters from the motion queue */
xwf = pt__mvq->x;
ywf = pt__mvq->y;
/* straight line segment */
if(pt__mvq->command == MV__STR_SEG)
  {
    /*=====================================*/
    /* determine if a magnet is defined in  */
    /* the current move segment.           */
    /*=====================================*/
    if((pt__mvq->ums_x) && (pt__mvq->ums_y))
    magnet_defined_in_zone = TRUE;
    else
    magnet_defined_in_zone = FALSE;
    /*=====================================*/
    /* get termination angle from the motion*/
    /* queue and calc new coefficients.    */
    /*=====================================*/
    tw = pt__mvq->heading;
    calculate_linear_coefficients();

    /*=====================================*/
    /* drive straight segment.             */
    /* nav/guidance inner loop.  drives the*/
    /* vehicle until the move is completed */
    /* in the waypoint frame.              */
    /*=====================================*/
    for(m_c_p__move_setup();  ;wait__til_mail(nav_cycle_time))
      {
        drive_straight();
```

```
          #if defined(KALMAN)
          /*==========================================*/
          /* if a magnet was not defined in this move  */
          /* segment then do a kalman azimuth update.  */
          /*==========================================*/
          /* NO KALMAN AZIMUTH UPDATE!
          if((!magnet_defined_in_zone) && (xvw >= (0.9 * xvwi)))
            {
              magnet_defined_in_zone = TRUE;
              z_azimuth = (tip + gamma_ft) - tfv;
              send__mail(vsubmt,RUN__KALMAN_AZIMUTH);
            }
          */
          #endif
          /*==========================================*/
          /* test for x position of the vehicle in the */
          /* waypoint frame to be > total distance,    */
          /* then were done.                           */
          /*==========================================*/
          if(xvw >= xvwi) break;
          #if defined(SIMULATION)
            okay_to_update_io = TRUE;
          #endif
        }
    } /* end of move straight line segment */
  else
  if(pt__mvq->command == MV__TURN_SEG)
    {
      /*====================================*/
      /* determine if a magnet is defined in */
      /* the current move segment.          */
      /*====================================*/
      if((pt__mvq->ums_x) && (pt__mvq->ums_y))
      magnet_defined_in_zone = TRUE;
      else
      magnet_defined_in_zone = FALSE;
      /*====================================*/
      /* initialize these values before a turn*/
      /* only.                              */
      /*====================================*/
      ep_last = ep_last_last = wr_last = wr_last_last = 0.0;
```

```
/*=====================================*/
/* get angle for new heading from the   */
/* motion queue.  calc coefficients.    */
/*=====================================*/
tf = pt__mvq->heading;
calculate_polar_coefficients();

/*====================================*/
/* drive turn segment.                */
/* nav/guidance inner loop.  drives the*/
/* vehicle until the move is completed */
/* in the waypoint frame.             */
/*====================================*/
for(m_c_p__move_setup();  ;wait__til_mail(nav_cycle_time))
  {
    turn();

    #if defined(KALMAN)
    /*==========================================*/
    /* if a magnet was not defined in this move  */
    /* segment then do a kalman azimuth update.  */
    /*==========================================*/
    /* NO KALMAN AZIMUTH UPDATES!
    if((!magnet_defined_in_zone) && (fabs(pv) >= (0.9 * fabs(pt))))
      {
        magnet_defined_in_zone = TRUE;
        z_azimuth = (tip + gamma_ft) - tfv;
        send__mail(vsubmt,RUN__KALMAN_AZIMUTH);
      }
    */
    #endif
    /*==========================================*/
    /* test for the angle of the vehicle in the  */
    /* waypoint frame to be > the terminating    */
    /* angle, then were done.                    */
    /*==========================================*/
    if((fabs(pv) >= fabs(pt)) || (fabs(pv - pv_last) > PI_OVER_2)) break;
    pv_last = pv;
    #if defined(SIMULATION)
      okay_to_update_io = TRUE;
    #endif
  }
```

```
      /*====================================*/
      /* initialize these values after a turn*/
      /* only.                               */
      /*====================================*/
      ep = ep_last = ep_last_last = wr_last = wr_last_last = 0.0;
      #if defined(KALMAN)
      #else
        heading_error = 0.0;    /* no heading corrections after turns */
      #endif

    } /* end of move turn segment */
  else
  if(pt__mvq->command == MV__DEFN_POS)
    {
      xvf        = pt__mvq->x;
      yvf        = pt__mvq->y;
      tfvi = tfv = pt__mvq->heading;      /* future add a rigorous calculation to
determine heading */
      init_ip();
      mcp.orientation = mcp.orientation_last = pt__mvq->path & FRONT_FORW;
      #if defined(SIMULATION)
        xvf_true = xvf;
        yvf_true = yvf;
        tfv_true = tfv;
      #endif
    }
  else
  if(pt__mvq->command == MV__ON_WIRE)
    {
      mov__wire( );
    }
  else
  if(pt__mvq->command == MV__INSRT_XY)
    {
      init_nav_position(pt__mvq->x,pt__mvq->y,pt__mvq->heading);
    }
  else
    {
      vsysbug( pt__mvq->command, 0xB01E);   /* undefined move command */
    }

  if( pt__mvq->last_trns_indx )     /* update status, sequence no. completed */
```

```
        {
          veh_status.previous_zone = veh_status.current_zone;
             if(   command_queue[   CQ_WRAP(pt__mvq->last_trns_indx)
].cmdx.xyh_mov.sequence_no )
            {
             veh_status.current_zone = command_queue[ CQ_WRAP(pt__mvq->last_trns_indx)
].cmdx.xyh_mov.zone;
              veh_status.sequence_no=command_queue[ CQ_WRAP(pt__mvq->last_trns_indx)
].cmdx.xyh_mov.sequence_no;
            }
          cq_indx.nxt_exec = pt__mvq->last_trns_indx +1;
        }

      /* if stopping after move */
      if(pt__mvq->path & MANDITORY_STOP)
        {
         m_c_p__state(BRAKES_DSABLD);
         init_encoders();
        }
      /* save values after move */
      #if defined(KALMAN)
        /* kalman cycle time measurement */
        at_waypoint = TRUE;
        if(kalman_running)
          {
           /*==========================================*/
           /* kalman not finished, time is between start */
           /* of kalman update and the waypoint.         */
           /*==========================================*/
           kalman_time = user_time - kalman_start_time;
           kalman_done = FALSE;
          }
        else
          {
           /*=============================================*/
           /* kalman is finished, time is between start    */
           /* of kalman update and finish of kalman update.*/
           /*=============================================*/
           kalman_done = TRUE;
          }

        xvfi = xvf_last = xvf + dx.xf;
```

```
    yvfi = yvf_last = yvf + dx.yf;
    tft  = tfvi     = tfv + dx.tf * dx_tf_scl;
  #else
    xvfi = xvf_last = xvf + z_down_range;
    yvfi = yvf_last = yvf + z_cross_range;
    tft  = tfvi     = tfv + heading_error;
  #endif
  ttv_last = tew = 0.0;
  second_pass = 0;

  if( fabs(encd_raw.ports) > 6000000.0 /* arbitrary value less than 83?????.0 to
prevent rollover */ )
    {
      set_encoder( (ENCD__LOAD | ENCD__C_INT) | ENCD__ADD | ENCD__STARB_WHL_ADR,
-(long)encd_raw.starb );
      enc_lf_last_count = enc_rt_last_count = 0.0;
      port_count -= encd_in.ports;
      starb_count -= encd_in.starb;
      set_encoder( (ENCD__LOAD | ENCD__C_INT) | ENCD__ADD | ENCD__PORTS_WHL_ADR,
-(long)encd_raw.ports );
    }
  #if defined(SIMULATION)
    tft_true            = tfv_true;
    xvf_true_last       = xvf_true;
    yvf_true_last       = yvf_true;
    ums_has_been_read   = FALSE;
    y_displacement      = 0.0;
    y_displacement_last = 100000.0;
    ttv_true_last       = 0.0;
  #endif
 }
}  /* end of move__waypoint */

/* * * * * * * * * * * * * * * * * * * * * * * * * * * * * * * * * * * * * */
/* CALCULATE_LINEAR_COEFFICIENTS                                            */
/* calculates the coefficients used in the straight path equations.        */
/* * * * * * * * * * * * * * * * * * * * * * * * * * * * * * * * * * * * * */
void calculate_linear_coefficients(void)
{
double x2,x3,x4,x5;
double x_diff, y_diff;
double dummy_xvwi;
```

```
/* calculate straight line coefficients */
pvi = tfvi - tw;          /* current heading - desired heading    */
cos_tw = cos(tw);         /* calculate now save time later        */
sin_tw = sin(tw);
x_diff = xwf - xvfi;      /* where you want to be - where you are */
y_diff = ywf - yvfi;
xvwi = (cos_tw * x_diff) + (sin_tw * y_diff);
yvwi = (-sin_tw * x_diff) + (cos_tw * y_diff);
dummy_xvwi = xvwi;
xvwi = 0.9 * dummy_xvwi;

x2   = xvwi * xvwi;
x3   = x2 * xvwi;
x4   = x3 * xvwi;
x5   = x4 * xvwi;
yvwi = -yvwi;
a0   = yvwi - ep;
a1   = tan(pvi);
a3   = ((-10.0 * a0) / x3) - ((6.0 * a1) / x2);
a4   = (( 15.0 * a0) / x4) + ((8.0 * a1) / x3);
a5   = ((- 6.0 * a0) / x5) - ((3.0 * a1) / x4);
zero_y_pt = xvwi;
xvwi = dummy_xvwi;

xofi      = xwf - (xvwi * cos_tw);
yofi      = yvfi - (yvwi * cos_tw);
ydw_last = yvw_last = a0;
xvw = xvw_last = 0.0;
mv_turn_rot = 0;       /* standard move */
}/* end of calculate linear coefficients */

/* * * * * * * * * * * * * * * * * * * * * * * * * * * * * * * * * * * * */
/* CALCULATE_POLAR_COEFFICIENTS                                          */
/* calculates the coefficients used in the turn path equations.          */
/* * * * * * * * * * * * * * * * * * * * * * * * * * * * * * * * * * * * */
void calculate_polar_coefficients(void)
{
  /* calculate phi total (total angle to turn)              */
  pt = fabs(tf - tfvi);
  if(pt >  PI) pt = fabs(pt - TWO_PI);
  rt = xwf;
```

```
  /* if turn is clockwise(right turn) then negate pt */
  if( rt < 0.0 ) pt = -pt;
  /* if turn radius is less than the ROTATE RADIUS then the turn will always be a
rotate.        */
  /* when omega_r gets very large the wheels will turn in opposite directions, causing
a rotate. */
  if( fabs(rt) <= ROTATE_RADIUS )
  {
    init_encoders();   /* assume vehicle previously stopped */
    mcp.wr = (rt > 0.0) ? 1000.0 : -1000.0;
    mv_turn_rot = 1;       /* rotate */
  }
  else
  {
    /* calculate turn coefficients */
    b0 = rt;
    b2 = rt * 0.5;
    b3 = -rt/pt;
    b4 = b2/(pt * pt);
    mv_turn_rot = 0;
  }
  /*============================================*/
  /* calculate sin & cos of angle orthogonal to  */
  /* vehicle at last commanded heading.  this is */
  /* used in calculating the desired turn curve. */
  /*============================================*/
  tw     = tfvi - PI_OVER_2;
  cos_tw = cos(tw);
  sin_tw = sin(tw);
  pv_last = 0.0;
  pvi = atan2(0.0,rt);

  /* setup enables MCP to track distances */
  xvwi = fabs( rt * pt );
  xvw = 0.0;
}/* end of calculate polar coefficients */

/* * * * * * * * * * * * * * * * * * * * * * * * * * * * * * * * * * * * * * */
/* DEFINE ENCODER ORIENTATION                                                */
/* determines which direction is forward based on the input value and        */
/* assigns the encoder addressing.                                           */
/* returns 0x04 if front is forward or 0x00 if rear is forward               */
```

```
/* * * * * * * * * * * * * * * * * * * * * * * * * * * * * * * * * * * * * */
unsigned char define_enc_orientation(unsigned orientation)
{
  if(orientation & FRONT_FORW)
    {
      enc_lf_count /*addr*/ = &encd_in.ports;
      enc_rt_count /*addr*/ = &encd_in.starb;
      #if defined(KALMAN)
        state_lf              = &state.port;
        state_rt              = &state.starb;
      #endif
    }
  else
    {
      enc_lf_count /*addr*/ = &encd_in.starb;
      enc_rt_count /*addr*/ = &encd_in.ports;
      #if defined(KALMAN)
        state_lf              = &state.starb;
        state_rt              = &state.port;
      #endif
    }
  return(orientation & FRONT_FORW);
}

/* * * * * * * * * * * * * * * * * * * * * * * * * * * * * * * * * * * * * */
/* DRIVE MOTORS                                                            */
/* * * * * * * * * * * * * * * * * * * * * * * * * * * * * * * * * * * * * */
void drive_motors(void)
{
  mcp.wr = (s1 * wr_last) +
           (s2 * wr_last_last) +
           (s3 * ep) +
           (s4 * ep_last) +
           (s5 * ep_last_last);
  /* send new wheel ratio to motion control processor */
  m_c_p__move();

  /* update last values */
  ep_last_last  = ep_last;
  ep_last       = ep;
  wr_last_last  = wr_last;
  wr_last       = mcp.wr;
```

```
}/* end of drive motors */

/* * * * * * * * * * * * * * * * * * * * * * * * * * * * * * * * * * * * * */
/* DRIVE STRAIGHT                                                           */
/* continiously calculates the position of the vehicle in the waypoint     */
/* frame.  calculates the error in where we should be as to where were at  */
/* and generates an error used to calculate the wheel speed ratio.         */
/* * * * * * * * * * * * * * * * * * * * * * * * * * * * * * * * * * * * * */
void drive_straight(void)
{
double x;
double x_diff, y_diff;
double x3, x4, x5;
  x_diff = xvf - xofi;
  y_diff = yvf - yofi;
  xvw = (cos_tw * x_diff) + (sin_tw * y_diff);
  yvw = (-sin_tw * x_diff) + (cos_tw * y_diff);
  if(xvw >= 0.0)
    {
      x3 = xvw * xvw * xvw;
      x4 = xvw * x3;
      x5 = xvw * x4;
      /*==================================================================*/
      /* when the x position in the waypoint is zero_y_pt% of the total length */
      /* to travel then calc the postion error (ep) using zero, this will     */
      /* cause the vehicle to converge on the path and hopefully it will be   */
      /* traveling straight upon arrival at the waypoint.                     */
      /*==================================================================*/
      if(xvw >= zero_y_pt)
        {
          ydw = 0.0;
        }
      else
        {
          ydw = a0 +
               (a1 * xvw) +  /* xvw^1 */
               (a3 * x3 ) +  /* xvw^3 */
               (a4 * x4 ) +  /* xvw^4 */
               (a5 * x5 );   /* xvw^5 */
        }
      if(second_pass++)
        {
```

```
        /* calculate theta actual in waypoint frame */
        taw = atan2((yvw - yvw_last),(xvw - xvw_last));

        /* theta desired in waypoint is atan2(delta_y / delta_x) */
        tdw = atan2((ydw - ydw_last),(xvw - xvw_last));
        /* theta err waypt = theta actual - theta desired */
        tew = taw - tdw;
      }
    else
      {
        tew = tdw = taw = 0.0;
      }

    /*==================================================================*/
    /* ep is the difference between the current waypoint position of   */
    /* the vehicle and the desired waypoint position.  this calculates */
    /* this difference and rotates it such that the error is orthogonal*/
    /* to the direction of travel.                                     */
    /*==================================================================*/
    ep = ((yvw - ydw) * cos(taw));
  }
 else
 ep = 0.0;

 drive_motors();

 /* save waypoint position at (n-1) */
 xvw_last = xvw;
 yvw_last = yvw;
 ydw_last = ydw;
}

/* * * * * * * * * * * * * * * * * * * * * * * * * * * * * * * * * * * * * */
/*                                                                       */
/* INIT ENCODERS                                                         */
/* the vehicle must be stopped!                                          */
/* * * * * * * * * * * * * * * * * * * * * * * * * * * * * * * * * * * * * */
void init_encoders(void)
{
  set_encoder( (ENCD__CLR | ENCD__C_INT) + (ENCD__STARB_WHL_BIT | ENCD__PORTS_WHL_BIT
| ENCD__SUM1_WHL_BIT) );
  *enc_rt_count = *enc_lf_count = enc_rt_last_count = enc_lf_last_count = port_count
= starb_count = 0.0;
```

```
  mcp.wr = ep = ep_last = ep_last_last = wr_last = wr_last_last = 0.0;
  put_bit_discrete_out( OGUIDM_SELECT_COMP_GUIDANCE, COMPUTER_GUIDANCE );    /* make
"put_byte"  wire guidance only */
  put_bit_discrete_out( OANTF_SELECT_FRONT_GUIDANCE, mcp.orientation );
  delay( 40 MS__TIMEOUT );      /* allow instrumentation to settle; force stop long
enough to notice */
}

/* * * * * * * * * * * * * * * * * * * * * * * * * * * * * * * * * * * * * * */
/* INIT INERTIAL PLATFORM                                                      */
/* * * * * * * * * * * * * * * * * * * * * * * * * * * * * * * * * * * * * * */
void init_ip(void)
{
  #if defined(KALMAN)
    gamma_ft = gamma_ft_last = 0.0;
    tip = 0.0;
    tip_base = tfvi;
    set_encoder((ENCD__CLR | ENCD__C_INT) + (ENCD__INERT_PLAT_BIT));
    tau_time_last = gamma_time_last = user_time;
  #endif
} /* init inertial platform */

/* * * * * * * * * * * * * * * * * * * * * * * * * * * * * * * * * * * * * * */
/* INIT NAVIGATION POSITION                                                    */
/* * * * * * * * * * * * * * * * * * * * * * * * * * * * * * * * * * * * * * */
void init_nav_position(double x_init, double y_init, double theta_init)
{
  xvf = xvf_last = xvfi = x_init;
  yvf = yvf_last = yvfi = y_init;
  tft = tfvi = tfv = tfv_last = theta_init;
  ttv_last = 0.0;
  init_ip();
  init_encoders();
}

/* * * * * * * * * * * * * * * * * * * * * * * * * * * * * * * * * * * * * * */
/* INIT NAVIGATION VARIABLES                                                   */
/* initializes all necessary values to thier proper state.                     */
/* * * * * * * * * * * * * * * * * * * * * * * * * * * * * * * * * * * * * * */
void init_nav_variables(void)
{
  /* set these variables to 0.0 */
```

```
xvw_last = z_down_range  = xvf_last = xvfi = xofi = xvf = 0.0;
yvw_last = z_cross_range = yvf_last = yvfi = yofi = yvf = ydw_last = 0.0;
tft = ttvi = tfvi = tfv_last = ttv_last = 0.0;
heading_error = fwd_progress = port_count = starb_count = 0.0;

second_pass = 0;
u_m_log_indx = -1;
init_encoders();

/* inertial platform initialization */
tfvi = tfv; /* DO NOT MOVE! this must be done before init_ip */
init_ip();
#if defined(KALMAN)
  state.random_walk = 0.0;
#endif
ip_ticks_2_radians = TWO_PI / IP__TICKS_PER_REV;
#if defined(SIMULATION)
  /* then do this */
  ip_drift_sum = 0.0;
  encoder_in_[IP_ENCODER] = 0.0;
  ports_wheel_constant = 1.0;
  starb_wheel_constant = 1.0;
  true_ticks_2meter_port  = 1.0 / ticks_per_mm;
  true_ticks_2meter_starb = 1.0 / ticks_per_mm;
#else
  one_half_wheel_base  = dimension__wheelbase * 0.5;
  mm_per_radian        = dimension__wheelbase;
  ticks_per_mm         = (encd_scal.ports + encd_scal.starb) * 0.5;
  nav_cycle_time       = 3;
#endif
nav_guide_cycle_time = (double)nav_cycle_time * 0.010;
#if defined(KALMAN)
  /* initialize kalman variables */
  #if defined(SIMULATION)
    /*=======================================================*/
    /* ip drift for simulation is defined as:                */
    /* ip_drift = ip enc ticks * (2pi/ip enc ticks per rev)  */
    /* ip drift is that many rads per nav/guide cycle.       */
    /*=======================================================*/
    ip_drift = 0.007 * TWO_PI / IP__TICKS_PER_REV;
  #endif
#endif
```

```
  navigation( );  /* get most current tip */
} /* init_nav_variables */

/* * * * * * * * * * * * * * * * * * * * * * * * * * * * * * * * * * * * * */
/* MOVE INIT MASTER                                                        */
/* * * * * * * * * * * * * * * * * * * * * * * * * * * * * * * * * * * * */
void mov_init_master()
{
#if defined(SIMULATION)
FILE *coeff_file;
FILE *noise_file;
  heading_error_factor = 1.0;
  coeff_file = fopen("coeff.fil","r");
  fscanf(coeff_file,"%lf %lf %lf %lf %lf %lf %lf %lf %lf %lf %lf %lf %lf %lf %lf %u",
                     &mm_per_radian,
                     &ticks_per_mm,
                     &one_half_wheel_base,
                     &ums_offset.x,
                     &ums_offset.y,
                     &ums_offset.x_scale,
                     &dynamic_factor,
                     &random_factor,
                     &s0,&s1,&s2,&s3,&s4,&s5,
                     &true_mm_per_radian,
                     &nav_cycle_time);
  fclose(coeff_file);
  #if defined(KALMAN)
    noise_file = fopen("noise.fil","r");
    fscanf(noise_file,"%lf %lf %lf %lf %lf %lf %lf %lf %lf %lf %lf %lf %lf %lf %lf %lf
%lf %lf %lf %lf %lf",
                       &exp_delta_x_f,
                       &exp_delta_y_f,
                       &exp_delta_theta_f,
                       &exp_delta_cal_rw,
                       &exp_delta_cal_lw,
                       &exp_delta_wheel_base,
                       &exp_delta_gyro_drift,
                       &exp_delta_omega_mkv,
                       &exp_delta_omega_rw,
                       &v11,
                       &v22,
                       &v33,
```

```
                    &v77,
                    &v88,
                    &v99,
                    &p12,
                    &p13,
                    &p23,
                    &rdr,
                    &rcr,
                    &ra);
   fclose(noise_file);
 #endif


#else
  heading_error_factor = 1.30 / 2.0;  /* alpha / 2alpha */
  s1  =  0.17930;
  s2  =  0.07590;
  s3  = -1.6579;
  s4  =  2.8522;
  s5  = -1.2275;
  tfv = tfvi = 0.0;
  dx_tf_scl = 0.5;    /* debug test (use partial heading correction */
#endif
#if defined(KALMAN)
  sa = 1.0 / mm_per_radian;  /* radians_per_mm used by kalman */
  total_nav_cycles  = 0;
  state.random_walk = 0.0;
  s_mkv             = 0.0;
  omega_mkv_last    = 0.0;      /* ip_drift; */
  kalman_init();
#endif
} /* end of mov_init_master */

/* * * * * * * * * * * * * * * * * * * * * * * * * * * * * * * * * * * * * */
/* NAVIGATION                                                              */
/* * * * * * * * * * * * * * * * * * * * * * * * * * * * * * * * * * * * * */
void navigation(void)
{
  /*=================================================================*/
  /* get encoder ticks, for wheels, multiply count time MM conversion*/
  /* factor (ticks to MM).  for inertial platform (ip) just read.    */
  /*=================================================================*/
```

```
  encd_in.ports   =   (   encd_raw.ports   =   get_encoder(ENCD__PORTS_WHL_ADR)   )   *
scal_tick_2meter.ports;
  encd_in.starb   =   (   encd_raw.starb   =   get_encoder(ENCD__STARB_WHL_ADR)   )   *
scal_tick_2meter.starb;
  /* adjust encoder sign by direction of vehicle */
  if(mcp.orientation == REAR_FORW)
    {
      encd_in.ports = -encd_in.ports;
      encd_in.starb = -encd_in.starb;
    }
      /* find discrete and average differences between encoder counts */
  delta_xrw = ( *enc_rt_count - enc_rt_last_count );
  delta_xlw = ( *enc_lf_count - enc_lf_last_count );
  #if defined(KALMAN)
    delta_xrw *= ( 1.0 + *state_rt );  /* scale by kalman conversion factors */
    delta_xlw *= ( 1.0 + *state_lf );
  #endif
  delta_xv  = 0.5 * (delta_xrw + delta_xlw);
  ttv = ttv_last + (delta_xrw - delta_xlw) / mm_per_radian;      /* compute change in
heading */
  /* calculate vehicle heading in the factory frame */
  tfv = fix_angle( tft + ttv );

  #if defined(SIMULATION)
    /* update ip encoder ticks */
    simulate_true_vehicle();
    inertial_platform_simulation();
  #endif

  /* calculate the heading of the intertial platform */
  encd_in.ip     = (double)get_encoder(ENCD__INERT_PLAT_ADR);
  tip = fix_angle(tip_base + (encd_in.ip * ip_ticks_2_radians));

  /*==============================================================*/
  /* calculate trig functions of current and last factory headings */
  /* these are public values used here and in calculating the phi  */
  /* matrix used by kalman.                                        */
  /*==============================================================*/
  cos_tfv = (cos(tfv) + cos(tfv_last)) * 0.5;
  sin_tfv = (sin(tfv) + sin(tfv_last)) * 0.5;
  /*================================================*/
  /* find vehicle position in factory coordinates.   */
```

```
  /* the delta's are also used in the kalman update. */
  /*==============================================*/
  delta_xvf = cos_tfv * delta_xv;
  delta_yvf = sin_tfv * delta_xv;
  xvf = xvf_last + delta_xvf;
  yvf = yvf_last + delta_yvf;
  #if defined(SIMULATION)
    r_double_prime = hypot(xvf - xvf_last,yvf - yvf_last);
  #endif
  #if defined(KALMAN)
    /* calculate markov noise parameters used by kalman     */
    omega_mkv = omega_mkv_last * (1.0 - s_mkv);
    omega_ft  = omega_mkv + /* ip_drift + */ state.random_walk;
    gamma_time = user_time - gamma_time_last;
    gamma_ft  = fix_angle(gamma_ft_last + ((gamma_time * 0.010) * omega_ft));
    gamma_time_last = user_time;
    omega_mkv_last = omega_mkv;
    gamma_ft_last  = gamma_ft;

    /* calculate coefficients used in the kalman phi matrix */
    if(!phi_is_running) calculate_sigma();
    total_nav_cycles++;
  #endif
  /* update last values */
  enc_rt_last_count = *enc_rt_count;
  enc_lf_last_count = *enc_lf_count;
  ttv_last = ttv;
  tfv_last = tfv;
  xvf_last = xvf;
  yvf_last = yvf;
} /* end of navigation */

/* * * * * * * * * * * * * * * * * * * * * * * * * * * * * * * * * * * * */
/* TURN                                                                  */
/* * * * * * * * * * * * * * * * * * * * * * * * * * * * * * * * * * * * */
void turn(void)
{
  double x2,x3,x4;
  double x_diff, y_diff;
  if( mv_turn_rot )
    {
      pv = *enc_rt_count / one_half_wheel_base;
```

```
      m_c_p__move( );
    }
  else
    {
      /* Compute positions (solve matrix) */
      x_diff = xvf - xvfi;
      y_diff = yvf - yvfi;
      xvp    = (cos_tw * x_diff) + (sin_tw * y_diff) + rt;
      yvp    = (-sin_tw * x_diff) + (cos_tw * y_diff);
      pv     = atan2(yvp,xvp) - pvi;

      /* compute exponential values */
    x2 = pv * pv;
    x3 = pv * x2;
    x4 = pv * x3;

      /* calc error (desired position in the radius "rd" - rvp */
    rd = b0 +
      (b2 * x2) +
      (b3 * x3) +
      (b4 * x4);
    rvp = sqrt((xvp * xvp) + (yvp * yvp));
    if(pt < 0.0) rvp = -rvp;
    ep = rd - rvp;
    drive_motors();
  }
    xvw = fabs( pv * rt );         /* distance used by MCP speed control */
} /* end of turn */

/* * * * * * * * * * * * * * * * * * * * * * * * * * * * * * * * * * * * * */
/* UPDATE MARKER FOUND                                                       */
/* called whenever the UMS crosses over a magnet.  all magnets are read      */
/* only expected magnet positions are used, all other update variables used*/
/* by the handcontroller for diagnostics.                                    */
/* * * * * * * * * * * * * * * * * * * * * * * * * * * * * * * * * * * * * */
void update_marker_found( )
{
double   ums_x_offset;
double   xvf_adj, yvf_adj;
double   sin__tfv_at_mag;       /* trig values of tfv when magnet sensed */
double   cos__tfv_at_mag;
double   y_err;
```

```
/*==================================================*/
/* adjust calculations according to direction of    */
/* travel.  also...                                  */
/* scale the UMS output to MM's.    the UMS sends a */
/* number between 0 and 127 and 0 and -128.          */
/* y_ums * (152.4MM / 128 bits)                      */
/*==================================================*/
if(mcp.orientation == FRONT_FORW)
  {
    ums_y__delta_m = ((double)y_ums * 1.19063) - ums_offset.y;
    ums_x_offset = ums_offset.x;
  }
else
  {
    ums_y__delta_m = -( ( (double)y_ums * 1.19063 ) - ums_offset.y );
    ums_x_offset = -ums_offset.x;
  }

/*=================================================================*/
/* make certain that we have the most current position and heading */
/* but only in real vehicle not simulator!!!!!!!!!!!!!             */
/*=================================================================*/
#if defined(SIMULATION)
#else
  navigation();
#endif

pt__ums              = &u_m_log[++u_m_log_indx & U_M_LOG_MSK];
pt__ums->pos_y       = ums_y__delta_m;
pt__ums->avrg_err_x = xvf;
pt__ums->avrg_err_y = yvf;
pt__ums->heading     = tfv;
pt__ums->ip_heading = fix_angle( tip + gamma_ft );
if((motion_translation_enabled) &&
   (pt__mvq->ums_x != 0.0) && (pt__mvq->ums_y != 0.0) &&
   (fabs(xvf - pt__mvq->ums_x) < WINDOW__457_2MM) &&
   (fabs(yvf - pt__mvq->ums_y) < WINDOW__457_2MM))
  {
    sin__tfv_at_mag = sin(tfv);
    cos__tfv_at_mag = cos(tfv);

    /* calc errors in position */
```

```
#if defined(SIMULATION)
  xvf_adj        = xvf - (ums_x_offset + r_triple_prime) * cos__tfv_at_mag;
  yvf_adj        = yvf - (ums_x_offset + r_triple_prime) * sin__tfv_at_mag;
#else
  ums_x_offset  += ums_offset.x_scale * setpt;
  xvf_adj        = xvf - (ums_x_offset * cos__tfv_at_mag);
  yvf_adj        = yvf - (ums_x_offset * sin__tfv_at_mag);
#endif
delta_2 = ums_y__delta_m * sin__tfv_at_mag;    /* X component of ums_y */
delta_1 = ums_y__delta_m * cos__tfv_at_mag;    /* Y component of ums_y */
pt__ums->veh_err_x = z_down_range  = pt__mvq->ums_x - (xvf_adj + delta_2);
pt__ums->veh_err_y = z_cross_range = pt__mvq->ums_y - (yvf_adj - delta_1);
pt__ums->mark_x = &pt__mvq->ums_x;
pt__ums->mark_y = &pt__mvq->ums_y;
#if defined(KALMAN)
  /*********************************************/
  /* run kalman using public variables        */
  /* ums_y__delta_m, z_down_range, z_cross_range */
  /*********************************************/
  z_azimuth = fix_angle((tip+gamma_ft) - tfv);
  send__mail(vsubmt, RUN__KALMAN_XY);
#else
  /* calc errors in heading */
  fwd_progress  = (encd_in.ports - port_count) +
                  (encd_in.starb - starb_count);
  y_err         = (-sin__tfv_at_mag * (xvf - pt__mvq->ums_x)) +
                  ( cos__tfv_at_mag * (yvf - pt__mvq->ums_y));
  heading_error  =  atan2(4.0  *  (ums_y__delta_m  -  y_err),  fwd_progress)  *
heading_error_factor;
  port_count    = encd_in.ports;
  starb_count   = encd_in.starb;
#endif
    }
  else
    {
      pt__ums->mark_x     = 0;
    }
} /* end of update marker found */
```

```
/* V4ACTprocs    V4ACTprocs    V4ACTprocs    V4ACTprocs    V4ACTprocs    V4ACTprocs
V4ACTprocs   V4ACTprocs   V4ACTprocs   V4ACTprocs
*******************************************************************************************
**********************************************
**
                                          **
**                                    EEEEEEEEEEEEEE      TTTTTTTTTTTT
NNNNNNN      NNNNN                            **
**                                    EEEEEEEEEEEEE       TTTTTTTTTT
NNNNNNNN     NNNNN                            **
**                                    EEEEE           A       TTTT       OOO
NNNNNNNNN    NNNNN                            **
**                                EEEEEEEEEEEE     AAA      TTT      OOOOOOOO  NNNNN
NNNN  NNNNN                           **
**                                EEEEEEEEEEE     AAAAA     TTT      OOOOOOOO  NNNNN
NNNN NNNNN                            **
**                                EEEEE                     TTTT       OOO     NNNNN
 NNNNNNNNN                            **
**                                EEEEEEEEE     AAAAAAA     TTTTT              NNNNN
  NNNNNNNN                            **
**                                EEEEEEEE     AAAAAAAAA    TTTTTTT            NNNNN
   NNNNNNN                            **
**
                                          **
**        This software (firmware) developed by EATON-KENWAY is proprietary.  Source
code on listings or any other media       **
**        is not for sale or loan and may not be copied or transferred to any vendor,
buyer, or consultant.  Executable        **
**          code is available in ROM and is sold with the original product or as a
product upgrade.  Buyer shall not          **
**         copy or distribute ROM's with E-K firmware to any third party without the
prior written approval of EATON-KENWAY.   **
**          Title to and ownership of the software shall at all times remain with
EATON-KENWAY.    The information  in this       **
**          is subject to change without notice  and should not be construed as a
commitment by EATON-KENWAY.                **
**
                                          **
**          EATON-KENWAY  assumes  no  responsibility  for  the  use or reliability
of  its  software on  equipment which      **
**          is  not supplied EATON-KENWAY or has been modified without EATON-KENWAY
approval.                                  **
```

```
**
                                              **
**          Copyright 1989
                 KENWAY, INCORPORATED         **
*********************************************************************************
*********************************************
  V4ACTprocs    V4ACTprocs    V4ACTprocs    V4ACTprocs    V4ACTprocs    V4ACTprocs
V4ACTprocs   V4ACTprocs   V4ACTprocs   V4ACTprocs
    DATE CREATED:  Feb 89
    AUTHOR:        Vehicle Group
    DESCRIPTION:
      xxx......          ....
    PROGRAM HISTORY:
    Date       Initials/No.       Description
    ---------  ------------       ---------------------------------------
 * * * * * * * * * * * * * * * * * * * * * * * * * * * * * * * * * * * * * * * * * *
* * * * * * * * * * * * * * * * * * * * * * * */
#include <stdlib.h>
#include <stdio.h>
#include <string.h>
#include <math.h>
#include "V4MESGS.K"        /* definition of vehicle messages */
#include "V4MOTION.K"       /* definition of motion constants */
#include "V4INIT_D.K"       /* function prototypes for assembler(VINIT) routines */
#include "V4VARS.K"         /* definition of common variables and constants */

void read_guid_antennas( )
{ antn_valu.insd = GUIDANCE_ANTENNA( motion__io.antn_ch_insd );
  antn_valu.outs = GUIDANCE_ANTENNA( motion__io.antn_ch_outs );
}  /* read_guid_antennas */

void read_guid_ant__average( )
{    antn_valu.insd    =    min(    255,    (    antn_valu.insd    +GUIDANCE_ANTENNA(
motion__io.antn_ch_insd ) ) /2 );
  antn_valu.outs    =    min(    255,    (    antn_valu.outs    +GUIDANCE_ANTENNA(
motion__io.antn_ch_outs ) ) /2 );
}  /* read_guid_ant__average */

void calib_varbls__define( )
{ encd_scal.sum = encd_scal.ports + encd_scal.starb;
  scal_tick_2meter.ports = 1.0 / encd_scal.ports;  /* mult instead of div for faster
computation */
```

```
  scal_tick_2meter.starb = 1.0 / encd_scal.starb;
  scal_tick_2meter.sum = 1.0 / encd_scal.sum;
    /* following variables defines distances in encoder counts used to perform vehicle
movement;
       NOTE: encoder counts per inch is different for different vehicle types */
    /* minimum creep distane = 1.25 in. before event; event_tolerance_count previously
added to decel dist */
  virtual_adjust_encoder_count = ROUND( int, 1.25 /*in.*/ * encd_scal.sum );     /*
creep last 1.25 in.(decel) */
  after_move_tolerance_count = ROUND( int, 12.0 /*in.*/ * encd_scal.sum );    /* look
for event tolerance */
  after_turn_tolerance_count = ROUND( int, 18.0 /*in.*/ * encd_scal.sum );    /* look
for event tolerance */
  after_turn_decel_dist_count = after_turn_tolerance_count +
virtual_adjust_encoder_count;
  after_move_decel_dist_count = after_move_tolerance_count +
virtual_adjust_encoder_count;
  turn_re_acqui_dist_range_raw = ROUND( int, RE_ACQUI_DIST_RANGE_C * encd_scal.sum );
  turn_trans_dist_scale = 16.0 /*divisions per in.*/  / encd_scal.sum;     /* turn
transistion turn ratios scaler index */
  minimum_distance_count = ROUND( int, 2.5 /*in.*/ * encd_scal.sum );     /* encoder
counts */
      /* if( raw_dist change < than this:  increase speed (10 ms base) */
  dist__raw_creep_min = max( 1, ROUND( int, encd_scal.sum * 0.025 /*in.*/ ) );
      /* if( raw_dist change > than this:  decrease speed (10 ms base) */
  dist__raw_creep_max = max( dist__raw_creep_min +2, ROUND( int, encd_scal.sum * 0.055
/*in.*/ ) );
  encoder_interp_tolerance_count = ROUND( int, 10.0 /*in.*/ * encd_scal.sum );
      /* move: look for event window; don't forget the tolerance distance */
  event_window__after_move    =    after_move_tolerance_count    +    ROUND(    int,
AFTER_MOVE_WINDOW_G * encd_scal.sum );
      /* after turn: look for event window; don't forget the tolerance distance */
  event_window__after_turn    =    after_turn_tolerance_count    +    ROUND(    int,
AFTER_TURN_WINDOW_G * encd_scal.sum );
      /* prevent overflow in accel_decel_action routine */
}  /* calib_varbls__define */

#define  IS_OFF 0
#define  CMND__OSCILLATE  3
#define  DISCR__SPKR21  0x21    /* speaker frequency control discrete out */
#define  DISCR__SPKR08  0x08    /* speaker frequency control discrete out */
#define  DISCR__E_STP_LITE11  11    /* E_stop light frequency control discrete out */
```

```
void set_vehicle_alarms( unsigned horn_frequency, unsigned horn_pulse_frequency,
unsigned light_freq__e_stp )
                                                                          /       *
*************************************************************************************
********************************
    horn_frequency or light_freq__e_stp:  if( value is greater than or equal to 256
then bypass setting,
    if( value is equal to 0 then reset or clear the discrete, otherwise oscillate
discrete at the parameter value

*************************************************************************************
******************************** */
{ if( horn_frequency < 256 )
  { if( horn_frequency )
    { set_bit_discrete_out( DISCR__SPKR21, CMND__OSCILLATE, horn_frequency );
      set_bit_discrete_out( DISCR__SPKR08, CMND__OSCILLATE, horn_pulse_frequency );
    }
    else
    { put_bit_discrete_out( DISCR__SPKR21, IS_OFF );
      put_bit_discrete_out( DISCR__SPKR08, IS_OFF );
    }
  }
  if( light_freq__e_stp < 256 )
  { if( light_freq__e_stp ) set_bit_discrete_out( DISCR__E_STP_LITE11, CMND__OSCILLATE,
light_freq__e_stp );
    else put_bit_discrete_out( DISCR__E_STP_LITE11, IS_OFF );
  }
} /* set_vehicle_alarms */

VEH_EXTERN unsigned error_code;
VEH_EXTERN unsigned auto_reset;
void vsysbug_alarms( )
    /* called by:  vsysbug in VINIT, enters error code into status, flashes e-stop
light, sounds speaker */
{ if( error_code > 2 )    /* restart without actual error */
    veh_status.vehicle_error = error_code;       /* re-enter error which may have been
cleared by VCOMT */
  else auto_reset = 12345;    /* Hcu will initiate auto reset on this code */
} /* vsysbug_alarms */

   /* computes motion related variables, Called by HCU whenever the value of any
configurable variables are modified. */
```

```
void define_distance( )
{ half_wheel_base = dimension__wheelbase * 0.5;
  dim__wire_x_2_cntrln = 209.55;  /* mm (8.25") */
  spd_setpt_scale = speed_setpoint_calib /200.0  /* fpm (AGVC messages units) */;
  cnfg_f_r.fr.setpt_lmt    =    (unsigned    char)(cnfg_f_r.fr.auto_spd_limit    *
speed_setpoint_calib );
  cnfg_f_r.rr.setpt_lmt    =    (unsigned    char)(cnfg_f_r.rr.auto_spd_limit    *
speed_setpoint_calib );
  rotate_radius_radian = half_wheel_base * RADIANS_PER_DEG;
  calib_varbls__define( );
  accel_base_conv = 419.1 / motion_accel_decel_rate;
  rotate_accel_factor = 1;    /* accelerate increment */
  front_rotate_stop_distance = cnfg_f_r.fr.dim_2_wire_x - 95.25;
  rear_rotate_stop_distance  = cnfg_f_r.rr.dim_2_wire_x - 95.25;
  front_pivot_stop_distance  = rear_pivot_stop_distance = 63.5;
  radius_turn_setpt_scale   =   (   turn_speed_max   -turn_speed_min   )   /   (double)(
MAX_TURN_RADIUS - MIN_TURN_RADIUS )
    * speed_setpoint_calib * 0.001 /*mm2meters*/;
  radius_turn_offset = turn_speed_min * speed_setpoint_calib * 0.001;

  motion_warning_delay = max( 50 MS__TIMEOUT, motion_warning_delay );
  warning_signal_wait_time = -(int)( motion_warning_delay /20 );      /* negative
distinguishs from normal wait time */
     /* obstacle detection active related variables:  /2 scales the factor( 1.0 = 128
) avoiding unsigned overflows */
  max_obstacle_ref = max( 0, min( 240, max_obstacle_ref ) );    /* force limits */
  min_obstacle_setpoint = max( -50, min( max_obstacle_ref, min_obstacle_setpoint ) );
  /* force limits */
  min_obstacle_setpt_scaled = min_obstacle_setpoint /2;
  obstacle_range_span =( max_obstacle_ref -min_obstacle_setpoint ) /2 /*scaled*/;
  calibration_active_flag =( motion_control_switches & CALIBRATION_CNFG_BIT ) ==
CALIBRATION_CNFG_BIT;
  antenna_upper_threshold = max( 0, 192 - guid_ant_noise_offset );    /* 192 = 75% of
5 volts 256 */
} /* define_distance */

void initialize_motion( )   /* called by HCU to initialize HCU configurable variables
*/
{
#if defined( L_SHORT )        /* Shortened GL40 Vehicle */
  cnfg_f_r.fr.dim_2_end = cnfg_f_r.rr.dim_2_end = 704.85;  /* mm (27.75") */
  cnfg_f_r.fr.dim_2_mag_lf = cnfg_f_r.fr.dim_2_mag_rt = 704.85;  /* mm (27.75") */
```

```
  cnfg_f_r.rr.dim_2_mag_lf = cnfg_f_r.rr.dim_2_mag_rt = 704.85;  /* mm (27.75") */
  cnfg_f_r.fr.dim_2_wire_x = cnfg_f_r.rr.dim_2_wire_x = 704.85;  /* mm (27.75") */
  sensed_wire_turn_radius = 704.85; /* mm (27.75") */
#elif defined( L_LONG )        /* Long GL40 Vehicle */
  cnfg_f_r.fr.dim_2_end = cnfg_f_r.rr.dim_2_end = 755.65;  /* mm (29.75") */
  cnfg_f_r.fr.dim_2_mag_lf = cnfg_f_r.fr.dim_2_mag_rt = 755.65;  /* mm (29.75") */
  cnfg_f_r.rr.dim_2_mag_lf = cnfg_f_r.rr.dim_2_mag_rt = 755.65;  /* mm (29.75") */
  cnfg_f_r.fr.dim_2_wire_x = cnfg_f_r.rr.dim_2_wire_x = 755.65;  /* mm (29.75") */
  sensed_wire_turn_radius = 755.65; /* mm (29.75") */
#else
  This..line..will cause a compile error because no vehicle type was specified;
#endif
#if defined( L_SHORT ) || defined( L_LONG )       /* ANY GL40 vehicle */
  motion_accel_decel_rate = 0.33;   /* meters per sec^2 */
  dim__drv_wheelbase = 742.0;        /* m-meters - apprx 30.00in.  distance between
wheel drives */
  dimension__wheelbase = 1069.0;    /* m-meters - apprx 41.85in.  distance between
wheel encoders */
  encd_scal.ports = 9.734;        /* ticks per m-meter */
  encd_scal.starb = 9.714;
  wr_gain.unity = 120.0 * 120.0;          /* setpoint(110)^2.0 where gain = 1 */
  wr_gain.min_limit = 10.0 * 10.0;        /* setpoint(10)^2.0 where gain is max */
  wr_gain.exp = 1.3;

  ums_offset.x = 5.0;            /* (m-meters) UMS in vehicle frame */
  ums_offset.y = -3.0;
  ums_offset.x_scale = 0.127;

  max_rotate_speed = 46;
  turn_speed_max = 1000.0;   /* mm/sec */
  turn_speed_min = 635.0;
  cnfg_f_r.fr.auto_spd_limit = cnfg_f_r.rr.auto_spd_limit = 1.0;  /* M/sec (200 fpm)
*/
#endif
      /* ANY Vehicle */
  guid_ant_noise_offset = 20;
  speed_setpoint_calib = 243.0;   /* counts at 1 meter per sec */
  battery_condition_scale = 13;
  load_cleared_timer = 5 SEC__TIMEOUT;     /* warning signal timer after the load
misaligned flag been cleared */
  motion_warning_delay = 50 MS__TIMEOUT;
  turn_ratio_bias = 100;              /* 100% of radius */
```

```
  speaker_freq_movement = 2;
  speaker_duration_movement = 0xE5;
  light_duration_movement = 0xE5;
  speaker_freq_turn = 3;
  speaker_duration_turn = 0x7F;
  light_duration_turn = 0x7F;
    /* automatic restart related variables */
  auto_recovery_delay = 5 SEC__TIMEOUT;        /* 5 seconds */
  previous_fine_unit = 0;    /* no previous command */
  previous_path_dscrpt = 0;
  agvc_commanded_speed = 100;
  after_rotate = NOT_ROTATE_V;
  radius_turn_gain = 3;
  radius_turn_wait_time = 40 MS__TIMEOUT;
  bumper_recovery_threshold = 0;
    /* default settings, all others false */
  motion_control_switches  =  (  LOAD_SENSING_CNFG_BITS  |  CALIBRATION_CNFG_BIT  |
OBSTACLE_DETCT_CNFG_BIT );
  max_obstacle_ref = 240;       /* obstacle detection active related variables */
  min_obstacle_setpoint = 0;
  veh_status.cmd_id = VEHICLE_LONG_STATUS_V;
  veh_status.sequence_no = 0;
  veh_status.wait = 0;
  veh_status.sequence_error = 0;
  veh_status.vehicle_error = 0;
  veh_status.error = 0;
    /* Latency adjustment for processing time( both software and hardware )  NOTE:
needs more investigation */
  wire_cross_encoder_adjustment = 4;
  magnet_encoder_adjustment = 4;
    /* define subsystem speed */
  max_platform_speed = 55;
}  /* initialize_motion( ) */
```

```
/* V4CMDT  V4CMDT  V4CMDT  V4CMDT  V4CMDT  V4CMDT  V4CMDT  V4CMDT  V4CMDT  V4CMDT
V4CMDT  V4CMDT  V4CMDT  V4CMDT  V4CMDT  V4CMDT
*****************************************************************************************
*********************************************
**
                                           **
**                                    EEEEEEEEEEEEEEE       TTTTTTTTTTTTT
NNNNNNN      NNNNN                               **
**                                    EEEEEEEEEEEEEE        TTTTTTTTTTT
NNNNNNNN     NNNNN                               **
**                                    EEEEE               A       TTTT       OOO
NNNNNNNNN    NNNNN                               **
**                                EEEEEEEEEEEE     AAA     TTT     OOOOOOOO  NNNNN
NNNN  NNNNN                                **
**                                EEEEEEEEEEE     AAAAA    TTT     OOOOOOOO  NNNNN
NNNN NNNNN                                 **
**                                EEEEE                    TTTT      OOO     NNNNN
 NNNNNNNNN                                 **
**                                EEEEEEEEE     AAAAAAA    TTTTT             NNNNN
  NNNNNNNN                                 **
**                                EEEEEEEE     AAAAAAAAA   TTTTTTT           NNNNN
   NNNNNNN                                 **
**
                                           **
**        This software (firmware) developed by EATON-KENWAY is proprietary. Source
code on listings or any other media        **
**        is not for sale or loan and may not be copied or transferred to any vendor,
buyer, or consultant.  Executable        **
**          code is available in ROM and is sold with the original product or as a
product upgrade.  Buyer shall not copy        **
**        or distribute ROM's with E-K firmware to any third party without the prior
written approval of  EATON-KENWAY.        **
**          Title to and ownership of the software shall at all times remain with
EATON-KENWAY.   The information in this        **
**          is subject to change without notice and should not be construed as a
commitment by EATON-KENWAY.                **
**
                                           **
**          EATON-KENWAY  assumes  no  responsibility  for  the  use or reliability
of its software on  equipment which        **
**          is  not supplied EATON-KENWAY or has been modified without EATON-KENWAY
approval.                                  **
```

```
**
                                                     **
**          Copyright 1989
                 KENWAY, INCORPORATED        **
*************************************************************************************
**********************************************
  V4CMDT  V4CMDT  V4CMDT  V4CMDT  V4CMDT  V4CMDT  V4CMDT  V4CMDT  V4CMDT  V4CMDT
V4CMDT  V4CMDT  V4CMDT  V4CMDT  V4CMDT  V4CMDT

        DATE CREATED:  Feb 89
        AUTHOR:        Vehicle Group

        DESCRIPTION:
            The command processor schedules received commands.  Processing commands is
done in synchronously.
            For example, the vehicle TOP cannot be raised or lowered while the vehicle
is in motion.

        PROGRAM HISTORY:
        Date         Initials/No.        Description
        ---------    ------------        ---------------------------------------
* * * * * * * * * * * * * * * * * * * * * * * * * * * * * * * * * * * * * * * * * * *
* * * * * * * * * * * * * * * * * * * * * * */

#include <stdlib.h>
#include <stdio.h>
#include <string.h>
#include <math.h>

#include "V4MESGS.K"          /* definition of vehicle messages */
#include "V4VARS.K"          /*  definition of common variables for two or more tasks
*/
#include "V4MOTION.K"     /* Motion definitions */
#include "V4INIT_D.K"

void  vsysbug( unsigned debug_var, unsigned cmd_error_no );
/* void  load_command_string ( unsigned char idx );  future */

#define  MAIL_ADDRS_FIELD  0xFF00
#define  MAIL_STATUS_FIELD  0x00FF        /* right byte */

typedef enum { XFER__COMPLETE_CMD, XFER__HEADR_ONLY }  xfer_type;
```

```
typedef struct
{   unsigned char c_leng;
  unsigned char c_catg;
} cmnd_def_typ;

const cmnd_def_typ CMND_DEF[] =    /* command_lengths(as sent from AGVC, command_types
*/
{  /*00*/    REQUEST_STATUS_LENGTH,                  V_IMMED_CMD,
INITIALIZE_VEHICLE_LENGTH,       V_INIT_CMD,
          MOVE_TO_MAGNET_LENGTH,                     V_MOTION_CMD,
MOVE_TO_VIRTUAL_LENGTH,          V_MOTION_CMD,
  /*04*/  MOVE_TO_INTERSECTION_LENGTH,  V_MOTION_CMD,          TURN_LENGTH,
          V_MOTION_CMD,
          ROTATE_LENGTH,                             V_MOTION_CMD,
SET_VEHICLE_SPEED_LENGTH,        V_MOTION_CMD,
  /*08*/      GCL_SUBSYSTEM_COMMAND_LENGTH,      V_SUB_SYS_CMD,
GCS_SUBSYSTEM_COMMAND_LENGTH,    V_SUB_SYS_CMD,
          GCN_SUBSYSTEM_COMMAND_LENGTH,      V_SUB_SYS_CMD,
GCR_SUBSYSTEM_COMMAND_LENGTH,    V_SUB_SYS_CMD,
  /*12*/  GCF_SUBSYSTEM_COMMAND_LENGTH,  V_SUB_SYS_CMD,        POLL_VEHICLE_LENGTH,
          V_IMMED_CMD,
          0 /* LONG agvc STAT UNUSED */, V_IMMED_CMD,          0 /* SHORT agvc STAT
UNUSED */, V_IMMED_CMD,
  /*16*/  MAGNET_UTURN_LENGTH,          V_MOTION_CMD,          VIRTUAL_UTURN_LENGTH,
        V_MOTION_CMD,
          INTERSECTION_UTURN_LENGTH,    V_MOTION_CMD,          S_MOV_MAGNET_LENGTH,
          V_MOTION_CMD,
  /*20*/    S_MOV_VIRTUAL_LENGTH,                    V_MOTION_CMD,
S_MOV_INTERSECTION_LENGTH,       V_MOTION_CMD,
          AGVC_STAT_ERR_CODE_LENGTH,             V_IMMED_CMD,
SET_VEHICLE_TO_SLEEP_LENGTH,     V_IMMED_CMD,
  /*24*/  LENG__OPT_CONTROL,            V_MOTION_CMD,          LENG__SET_LOAD_ID,
          V_IMMED_CMD,
          LENG__REQ_LOAD_ID,            V_IMMED_CMD,           0 /*veh_load_ID to
VTC*/,      V_IMMED_CMD,
  /*28*/    GCL_SUBCON_COMMAND_LENGTH,             V_SUB_SYS_CMD,
GCS_SUBSYSTEM_COMMAND_LENGTH,    V_IMMED_CMD,
          GCN_SUBSYSTEM_COMMAND_LENGTH,  V_SUB_SYS_CMD,        0 /*NAK_V CIA/AGVC
reserved*/,  V_IMMED_CMD,
  /*32*/  0 /* AGVC__DCIA_MSG_V rsvd */, V_IMMED_CMD,        0 /*DCIA__AGVC_MSG_V
*/,         V_IMMED_CMD,
          LENG__X_Y_H__MOV,             V_MOTION_CMD,          LENG__X_Y_H__SET,
```

```
        V_MOTION_CMD,
/*36*/  LENG__X_Y__MARKER,          V_MOTION_CMD,          LENG__X_Y_H__INSRT,
        V_MOTION_CMD,
        LENG__X_Y_H__MOV_MRKR,      V_MOTION_CMD,          0,
        V_IMMED_CMD /*terminator*/
};

commands_type *pt__cq;
unsigned  mail__raw;

                                                          /                    *
************************************************************************************
   Wait at mailbox for incoming mail.
   +----|----|----|----|----|----|----|----|----|----|----|----|----|----|----|--+
   | 1 | 1 | 0 |err |  ---source ID---  |   - - ---status field--- - -        |
   +----|----|----|----|----|----|----|----|----|----|----|----|----|----|----|--+
    15   14  13   12    11   10    9    8    7    6    5    4    3    2    1    0
   Handcontroller/motion messages
    command_processor_master = STATUS FIELD = 2      ( HCU in AUTO )
    power up restart = STATUS FIELD = 3      ( Power up in automatic mode )
   source ID: 0=INI  1=HCU  2=CMD  3=ACT  4=TRN  5=SUB  6=COM

************************************************************************************
*/

void  wait__cmdt_mail( unsigned timeout )
{ mail__raw = wait__mail ( timeout );
  if( mail__raw > TIMEOUT__MAILBX )
  { if( ( mail__raw < MAIL__HCU ) || ( mail__raw > ( COMMN_BUFFR_LOADED | 0xFF) ) )
vsysbug( mail__raw, 0x9104 );
  }
}  /* wait__cmdt_mail( ) */


/* void parse_buffer_2_que( unsigned char  *pt__buffr )  -  separate/xfer from
commun_buffer to command_queue */

  struct
  { unsigned char  catagory;
    unsigned char  id;
    unsigned  leng;
  } cmndx;
```

```
void xfer_cmnd_2_cq_rcrd( commands_type *pt__cq, char record_offset, void* pt__buffr,
unsigned xfr_leng )
  { memset( pt__cq, 0, sizeof(commands_type) );    /* clear record */
    memcpy( (char*)pt__cq  +2 /*generic*/ +record_offset, pt__buffr, xfr_leng );
    pt__cq->cmd_typ = cmndx.catagory;
    pt__cq->cmdx.bs_flds.cmd_id = cmndx.id;
    pt__cq->e_1.after_turn_flag = 2;
    cq_indx.nxt_stor++;
  }  /* xfer_cmnd_2_cq_rcrd */

void  parse_buffer_2_que( unsigned char  *pt__buffr )   /* separate/xfer from
commun_buffer to command_queue */
{ cmnd_buf_type  *pt__cmd;
  unsigned char  *pt__buffr_end;
  unsigned char  temp_b;

  if(  cq_indx.nxt_stor  >=  (cq_indx.nxt_exec  +CMD_QUE__SIZE  )  )  vsysbug(
cq_indx.nxt_exec, 0x910C );    /* C-QUE OVERFLOW */

  if( ( *pt__buffr ) && ( *pt__buffr < CMD_BUFF_END ) )    /* 0 < length(byt 0) <
MAX_LENG) */
  { pt__buffr_end = pt__buffr + *pt__buffr /*length*/;    /* last char in command
string */
        /*  1st cmnd start at next byte */
    for( ++pt__buffr; pt__buffr < pt__buffr_end; pt__buffr += cmndx.leng )
    { pt__cmd  =  (cmnd_buf_type*)pt__buffr;          /* dummy assignment to match
commands_type */
      cmndx.id = pt__cmd->dc.bs_flds.cmd_id;
      cmndx.leng = CMND_DEF[ cmndx.id ].c_leng;

      if( (cmndx.leng == 0) || (cmndx.id >= END_OF_COMMANDS) ) vsysbug( *pt__buffr,
0x9103 ); /* message format err */

      pt__cq = &command_queue[ CQ_WRAP(cq_indx.nxt_stor) ];
      cmndx.catagory = CMND_DEF[ cmndx.id ].c_catg;

      switch( cmndx.catagory )
      { case V_MOTION_CMD :
          switch (cmndx.id)
          { case X_Y_H__INSRT :   /* makes 2 commands/records */
                 xfer_cmnd_2_cq_rcrd(   pt__cq,   OFFSET__ID_SEQ,
&pt__cmd->da.xyh_mvinsrt.prv_zone, LENG__INSRT_SUFFIX );
```

```
            pt__cq->cmdx.bs_flds.cmd_id = X_Y_H__INSRT;    /* overwrite ID */

            pt__cq = &command_queue[ CQ_WRAP(cq_indx.nxt_stor) ];
            xfer_cmnd_2_cq_rcrd( pt__cq, 0, pt__cmd, LENG__X_Y_H__MOV );
            pt__cq->cmdx.bs_flds.cmd_id = X_Y_H__MOV;      /* overwrite ID */
            continue;

          case X_Y_H__MOV_MRKR :    /* makes 2 commands/records */
            xfer_cmnd_2_cq_rcrd(     pt__cq,     OFFSET__ID_SEQ     +OFFSET__ZN_PTH,
&pt__cmd->da.xyh_mvmrk.m1_x, LENG__XY_COORD_FLDS);
            pt__cq->cmdx.bs_mov.cmd_id = X_Y__MARKER;     /* overwrite ID */
            pt__cq->cmdx.bs_mov.path = pt__cmd->dc.bs_mov.path & UPDATE_MRKR_SPECF;
/* overwrite path */

            pt__cq = &command_queue[ CQ_WRAP(cq_indx.nxt_stor) ];
            xfer_cmnd_2_cq_rcrd( pt__cq, 0, pt__cmd, LENG__X_Y_H__MOV );
            pt__cq->cmdx.bs_mov.cmd_id = X_Y_H__MOV;      /* overwrite ID */
            continue;
        }

        xfer_cmnd_2_cq_rcrd( pt__cq, 0, pt__cmd, cmndx.leng );

        switch( cmndx.id)     /* edit commands for expanded fields in vehicle that
AGVC message doesn't have */
        { case VIRTUAL_UTURN_V :
          case VIRTUAL_STURN_V :
            pt__cq->cmdx.bs_mov.radius = pt__cmd->dc.vir_uturn.xradius;    /* use
vir_uturn as s_turn generic */
          case MOVE_TO_VIRTUAL_V :    /* fall through */
            pt__cq->cmdx.bs_mov.fine = 0;
            break;

          case ROTATE_V :
            pt__cq->cmdx.rotate.path = pt__cmd->dc.rotate.xpath;
            pt__cq->cmdx.rotate.xpath = 0;
            break;

        }
        break;

      case V_SUB_SYS_CMD :
        xfer_cmnd_2_cq_rcrd( pt__cq, 0, pt__cmd, 2 );
```

```
#if defined ( GS40X )
          /* not debugged    memcpy( ?ADR gcs_sub_cmd, ??pt__buffr, 2);
          pt__cq->cmdx.gcs_sub_cmd.shuttle_eset = *( ??pt__buffr +2 );
          */
#elif defined ( GS40X )
          /* not debugged    memcpy( ?ADR gcn_sub_cmd, ??pt__buffr, 2);
          memcpy( &pt__cq->gcn_sub_cmd.fork_set, ??pt__buffr+2, 3);
          */
#else     /* default GL40    -- force old_command_format to new_command_format */
          pt__cq->cmdx.gcl_sub_cmd.top_eset = pt__cmd->dc.gcl_old_styl_cmd.top_eset;
#endif
          break;

        case V_IMMED_CMD :
        case V_INIT_CMD  :
          switch ( cmndx.id )
          { case SET_LOAD_ID_V :
              load_id_number.cmd_id = VEHICLE_LOAD_ID_V;
              memcpy( load_id_number.id_load_num, &pt__cmd->dc.load_id.lstring_len, 16
);
            case REQUEST_VEHICLE_LOAD_ID_V :  /* fall through */
              veh_status.wait = 0;
              continue;    /* Do not put into que */

            case AGVC_STATUS_ERR_CODE_V :
              temp_b = pt__cmd->dc.agvc_stat_er.agvc_status;
              if( ( temp_b > 0 ) && ( temp_b < 0xF0 ) ) agvc_err_status = temp_b;
              continue;    /* Do not put into que */

            case INITIALIZE_VEHICLE_V :
              memset( command_queue, 0, sizeof(command_queue) );    /* clear buffer */
              xfer_cmnd_2_cq_rcrd( &command_queue[0], 0, pt__cmd, cmndx.leng );
              command_queue[0].cmd_queue_translate = 1;
              cq_indx.nxt_exec = cq_indx.nxt_setup = cq_indx.nxt_stor = 1;      /*
initialize command_que index's */

              disable_communications( );
              veh_status.cmd_id = VEHICLE_LONG_STATUS_V;
              veh_status.previous_zone = command_queue[0].cmdx.init_veh.from_zone;
              veh_status.current_zone = command_queue[0].cmdx.init_veh.at_zone;
              veh_status.sequence_no = 0;
              veh_status.wait = 0;
```

```
            veh_status.sequence_error = ven_status.vehicle_error = veh_status.error
= 0;
            enable_communications( );

            do_long_status_flag = TRUE;
            agvc_err_status = AGVC_NO_ERRORS;
            send__mail( vtrnmt, CMDT_2_TRNS_BAS );
            send__mail( vsubmt, CMDT_2_SUBS_BAS );
            delay( 1 SEC__TIMEOUT );    /* for for tasks to initialize */
            break;

          case SLEEP_CMD_V :
            /*    FUTURE    send__mail ( vhcumt, 16#C20A );
            break;
            */
          default :
            vsysbug ( cmndx.id, 0x910A );    /* unknown command */
        }
        break;

      default :
        vsysbug  ( CMND_DEF[ cmndx.id ].c_catg, 0x910B );     /* unknown command
catagory */
      }
    }
  }
  else vsysbug( *pt__buffr, 0x9102 );    /* message too long or 0 */

  *pt__buffr = 0;  /* clear buffer (set leng=0) */
  oncom( );
}  /* parse_buffer_2_que */


void  schedule_qued_cmnds(  )        /*    schedule  commands  to  subsystems  or
translation-action.  */
{ int  indx__initial_setup = cq_indx.nxt_setup;
  int  motion_found = 0;
  int  subs_found = 0;        /* future concurrent motion */
  commands_type *pt__cq_prev;

  if( mail_cmdt == 0 )   /* no mail pending to motion or subsystems */
  { pt__cq_prev = &command_queue[ CQ_WRAP( cq_indx.nxt_setup -1) ];
```

```
while( cq_indx.nxt_setup < cq_indx.nxt_stor /* unscheduled commands in Que */ )
{ pt__cq = &command_queue[ CQ_WRAP(cq_indx.nxt_setup) ];

  switch ( pt__cq->cmd_typ )
  { case V_MOTION_CMD :
      if( ( pt__cq_prev->cmd_typ == V_MOTION_CMD /* Prev cmnd also motion? */ ) ||
        ( cq_indx.nxt_exec >= cq_indx.nxt_setup    /* all commands scheduled
completed? */ ) )
      { motion_found++;   /* motion commands may be accumulated before mailed */
        cq_indx.nxt_setup++;
        pt__cq_prev = pt__cq;
        break;
      }
      else goto send_commands;

    case V_SUB_SYS_CMD :
      if( ( motion_found == 0 /* no motion commands ready */ )  &&
          ( cq_indx.nxt_exec >= cq_indx.nxt_setup  /* all commands scheduled
completed? */ ) )
      {  if((  sub_system_process_flags  ==  1  )  &&  pt__cq_prev->cmd_typ  ==
V_SUB_SYS_CMD )
           veh_status.wait = 15;
         subs_found++;     /* concurrent motion in future */
         cq_indx.nxt_setup++;
         pt__cq_prev = pt__cq;
      }      /* until concurrent motion, subs cmnds can't be accumulated */
      goto send_commands;

    default :
      vsysbug ( 0, 0x9105 /* illegal command type */ );
  } /* end switch */
} /* end while */

send_commands:
 if( motion_found )
 { mail_cmdt = indx__initial_setup;
   send__mail( vtrnmt, CMDT_2_TRNS_BAS + motion_found );
 }
 if( subs_found )
 { mail_cmdt = indx__initial_setup;
   send__mail( vsubmt, CMDT_2_SUBS_BAS + subs_found );
```

```
    }
  }
} /* schedule_qued_cmnds( ) */
#define  FLAG__CMD_BUF_RDY  0x02
#define  FLAG__CMD_MSTR  0x01
#define  MAIL__CMDT_STRT  0xC000void  vcmdt_main( )          /* *** TASK command
processor MAIN *** */
{ unsigned  vcmdt_status;    /* flags, conditions  */
  VCMD_LONG_STATUS = VEHICLE_LONG_STATUS_V;        /* set up for vcomt modual to use
the 'c' level definitions as constants */
  LONG_STATUS_LENGTH = sizeof( veh_status_type );
  VCMD_SHORT_STATUS = VEHICLE_SHORT_STATUS_V;
  SHORT_STATUS_LENGTH = sizeof( veh_short_status_type );          /*  *************
wait vehicle inserted from HCU  or Auto-Restart(power up) *************  */
  for(  mail__raw  =  0;  mail__raw  !=  INSERTING_VEHICLE   &&   mail__raw  !=
AUTOMATIC_RESTART; wait__cmdt_mail( TIMEOUT__FOREVER ) );
  mail_cmdt = 0;    /* initialize this flag */
            /*  **************** wait until auto and agvc commands ***************  */
  for( vcmdt_status = 0; ; wait__cmdt_mail( TIMEOUT__FOREVER ) )
  { switch ( mail__raw )           /* The following events may occur in any order */
    { case COMMAND_PROCESSOR_MASTER :      /* HCU unplugged, cmd_master */
      case AUTOMATIC_RESTART :             /* power up in while in automatic */
        vcmdt_status |= FLAG__CMD_MSTR;      /*  set cmd_master flag  */
        break;      case COMMN_BUFFR_LOADED :          /* Commands from AGVC received
by Communication */
        cq_indx.nxt_exec = cq_indx.nxt_setup = cq_indx.nxt_stor = 1;   /* reset, keep
relative wrap on circular que */
        parse_buffer_2_que( command_buffer );
        vcmdt_status |= FLAG__CMD_BUF_RDY;     /* set agvc_commands in buff flag */
        break;
    }
    if( vcmdt_status == ( FLAG__CMD_BUF_RDY | FLAG__CMD_MSTR ) ) break;
  }
          /* program restarts on switch to manual */
  for( mail__raw = MAIL__CMDT_STRT /* force schedule on first pass */; /*forever*/;
wait__cmdt_mail( 3 SEC__TIMEOUT ) )
  { if( cq_indx.nxt_exec >= cq_indx.nxt_setup ) veh_status.wait = 0;   /* all commands
setup, executed; notify AGVC */    switch ( mail__raw & MAIL_ADDRS_FIELD )
    { case COMMN_BUFFR_LOADED :
        parse_buffer_2_que(  command_buffer  );     /*  fall  through  */        case
MAIL__MOTION :      /* Move command complete */
      case MAIL__SUBSYS :      /* Subsystem command complete */
```

```
      case MAIL__CMDT_STRT :  /* First pass startup */
        schedule_qued_cmnds( );
        break;
    }
  }
}  /* vcmdt_main */
```

```
/*    DISP_MEM    DISP_MEM    DISP_MEM    DISP_MEM    DISP_MEM    DISP_MEM    DISP_MEM
  DISP_MEM    DISP_MEM    DISP_MEM
*******************************************************************************************
**********************************************
**
                                         **
**                                   EEEEEEEEEEEEEEE      TTTTTTTTTTTTT
NNNNNNN      NNNNN                           **
**                                   EEEEEEEEEEEEEE       TTTTTTTTTTT
NNNNNNNN     NNNNN                           **
**                                  EEEEE            A        TTTT       OOO
NNNNNNNNN    NNNNN                           **
**                              EEEEEEEEEEEE     AAA      TTT      OOOOOOOO  NNNNN
NNNN   NNNNN                          **
**                              EEEEEEEEEEE     AAAAA     TTT      OOOOOOOO  NNNNN
NNNN NNNNN                           **
**                              EEEEE                     TTTT       OOO      NNNNN
 NNNNNNNNN                           **
**                              EEEEEEEEE      AAAAAAA    TTTTT                NNNNN
  NNNNNNNN                           **
**                              EEEEEEEE      AAAAAAAAA   TTTTTTT              NNNNN
   NNNNNNN                           **
**          This software (firmware) developed by EAATON-KENWAY is proprietary.  Source
code on listings or any other media        **
**          is not for sale or loan and may not be copied or transferred to any vendor,
buyer, or consultant.  Executable         **
**            code is available in ROM and is sold with the original product or as a
product upgrade.  Buyer shall not              **
**           copy or distribute ROM's with E-K firmware to any third party without the
prior written approval of EATON-KENWAY.    **
**             Title to and ownership of the software shall at all times remain with
EATON-KENWAY.    The information  in this      **
**             is subject to change without notice  and should not be construed as a
commitment by EATON-KENWAY.                        **
**
                                          **
**          EATON-KENWAY   assumes  no  responsibility  for  the  use or reliability
of  its  software on  equipment which      **
**           is  not supplied EATON-KENWAY or has been modified without EATON-KENWAY
approval.                                     **
**
                                          **
```

```
**          Copyright 1989
                 KENWAY, INCORPORATED     **
***********************************************************************************
**********************************************
    DISP_MEM    DISP_MEM    DISP_MEM    DISP_MEM    DISP_MEM    DISP_MEM    DISP_MEM
  DISP_MEM    DISP_MEM    DISP_MEM
    DATE CREATED:  Feb 89
    AUTHOR:        Vehicle Group
    DESCRIPTION:
      xxx......              ....
    PROGRAM HISTORY:
    Date         Initials/No.        Description
    ---------    ------------        ---------------------------------------- */
#pragma extend
#include <stdio.h>
#include <stdlib.h>
#include <string.h>
#include <math.h>
#include "V4MESGS.K"           /* definition of vehicle messages */
#include "V4MOTION.K"          /*  definition of the motion constants */
#include "V4HCOMMN.K"          /* definition of hand control constants */
#include "V4INIT_D.K"          /* function prototypes for assembler(VINIT) routines */
#include "V4VARS.K"            /*  definition of common variables for two or more tasks
*/

#define     FRMT_HEX_T    "x"
#define     FRMT_HEX      'x'
#define     FRMT_SGN_T    "d"
#define     FRMT_SGN      'd'
#define     FRMT_USGN_T   "u"
#define     FRMT_USGN     'u'
#define     FRMT_ASC_T    "c"
#define     FRMT_ASC      'c'
#define     SIZ_BYT_T     "b"
#define     SIZ_BYT       'b'
#define     SIZ_WRD_T     "w"
#define     SIZ_WRD       'w'
#define     SIZ_LNG_T     "l"
#define     SIZ_LNG       'l'
#define     FRMT_DFLT_T   "f"
#define     FRMT_DFLT     'f'
#define     DSPL_DATA_T   "a"
```

```
#define    DSPL_DATA    'a'
#define    DEF_ADDR_T   "e"
#define    DEF_ADDR     'e'
#define    DEF_FRMT_T   "g"
#define    DEF_FRMT     'g'
#define    SUB_RECD_T   "h"
#define    SUB_RECD     'h'
#define    ADD_RECD_T   "i"
#define    ADD_RECD     'i'
#define    INC_OFFS_T   "j"
#define    INC_OFFS     'j'
#define    DEC_OFFS_T   "k"
#define    DEC_OFFS     'k'
#define    INC_BYTE_T   "r"
#define    INC_BYTE     'r'
#define    DEC_BYTE_T   "s"
#define    DEC_BYTE     's'

typedef struct
{ union
  { struct
    { unsigned offst;
      unsigned sgmnt;
    } cx;
    char far *ptr;
  }cp;
} var_type;
typedef struct
{ int indx;
  unsigned char line;
  unsigned char col;
} mdfy_type;
var_type vr_df;
unsigned char data_typ;
unsigned char frmt_typ;
unsigned max_entries;
int rcd_leng;
unsigned data__siz;
char *ptr__out_frmt;
char *ptr__in_frmt;
unsigned password_is( );
void display_mem_init()     /* called by external module to initialize this utility */
```

```
{ vr_df.cp.ptr = (char*)command_buffer;
  rcd_leng = 16;
  data_typ = SIZ_BYT;
  data__siz = 1;
  frmt_typ = FRMT_HEX;
  ptr__out_frmt = " %02X  ";
  ptr__in_frmt = "%X";
  max_entries = 16;
}

void display_memory( )
{ enum { REQ_ADR_SGMT, REQ_ADR_OFST, REQ_RCD_LNG, NO_REFRESH, REFRESH_DATA } writ_cntl;
  unsigned datam__max;
  unsigned items__count;
  unsigned d_m__inpt;
  unsigned out_indx;
  unsigned input_avail;
  char far *prnt_ptr;
  char far *prev_ptr = 0;
  mdfy_type mdfy;          /* indx > 0 else disabled */
  password_status = ILLEGAL_PASSWORD;
  for( mdfy.indx = -1, mail_hcu = DSPL_DATA; ; )
  { switch ( mail_hcu )
    { case NO_MAIL__TIMEOUT :
        break;
      case DSPL_DATA :     /* fall through */
        sprintf( output_string,  MOVE_CURS COLM_0 LINE_4 FORMFEED
            ESC "1PrevDisp"  PREV_DISPLAY_T  "\r"
            ESC "2AddrFrmt"  DEF_ADDR_T  "\r"
            ESC "3Sh->Byte"  INC_BYTE_T  "\r"
            ESC "4Entr    "  BLANK "\r"
            ESC "5        "  DEC_OFFS_T "\r"    /* this prompt will be overwritten */
            ESC "6        "  SUB_RECD_T "\r"    /* this prompt will be overwritten */
            ESC "7        "  ADD_RECD_T "\r"    /* this prompt will be overwritten */
            ESC "8        "  INC_OFFS_T "\r"    /* this prompt will be overwritten */
            MOVE_CURS COLM_0 LINE_3 "%c %c  %04X:%04X <%03X>  Siz/Format Err", data_typ
 & 0x5F, frmt_typ,
              vr_df.cp.cx.sgmnt, vr_df.cp.cx.offst, rcd_leng );
        write_b( WR__DETACHED_CMND, output_string );
        mdfy.col = (unsigned char)( ( abs(mdfy.indx) -1 ) * (80 /max_entries) );  /*
 temp: string_position */
        mdfy.line = (LINE_COL_BASE +4) + ( mdfy.col /20 );   /* string_position /
```

```
no_cols_per_row */
        mdfy.col = (LINE_COL_BASE -0) + (mdfy.col %20);        /* string_position ->
actualy col_in_row */
        datam__max = min(max_entries, rcd_leng);
        writ_cntl = REFRESH_DATA;
        break;
      case DEF_FRMT  :
        sprintf( output_string, FORMFEED
            ESC "1Byte Typ"  SIZ_BYT_T "\r"
            ESC "2Word Typ"  SIZ_WRD_T "\r"
            ESC "3Long Typ"  SIZ_LNG_T "\r"
            ESC "4Dfltpnt "  FRMT_DFLT_T "\r"
            ESC "5Un- sign"  FRMT_USGN_T  "\r"
            ESC "6Sign dec"  FRMT_SGN_T  "\r"
            ESC "7Hex  -- "  FRMT_HEX_T  "\r"
            ESC "8Asci -- "  FRMT_ASC_T"\r"
            MOVE_CURS COLM_0 LINE_6 "Entr<TYP>then FRMT    -- %c -- %c -- ", data_typ
& 0x5F, frmt_typ );
        write_b( WR__DETACHED_CMND, output_string );
        writ_cntl = NO_REFRESH;
        break;
      case DEF_ADDR  :
        sprintf( output_string,  FORMFEED
            ESC "1DSPLdata"  DSPL_DATA_T  "\r"
            ESC "2For-mat "  DEF_FRMT_T  "\r"
            ESC "3<-ShByte"  DEC_BYTE_T  "\r"
            ESC "4Entr    "  BLANK "\r"
            MOVE_CURS COLM_0 LINE_3 "%c %c  ....:%04X <%03X>" MOVE_CURS COLM_5 LINE_3,
data_typ & 0x5F, frmt_typ,
               vr_df.cp.cx.offst, rcd_leng );
        write_b( WR__DETACHED_CMND, output_string );
        writ_cntl = REQ_ADR_SGMT;
        mdfy.indx = -1;    /* point to 1st value, and disable modify */
        break;
      case FRMT_HEX  :
        ptr__out_frmt = (data_typ == SIZ_LNG) ? " %08LX " : (data_typ == SIZ_WRD) ? "
%04X" : " %02X  "/*byte*/;
        ptr__in_frmt = (data_typ == SIZ_LNG) ? "%LX" : "%X" /*word or byte*/;
        max_entries = (data_typ == SIZ_LNG) ? 8 : (data_typ == SIZ_WRD) ? 16 :
16/*byte*/;
        frmt_typ = FRMT_HEX;
            mail_hcu = DSPL_DATA;
```

```
        continue;
      case FRMT_SGN  :
        ptr__out_frmt = (data_typ == SIZ_LNG) ? " %19Ld" : (data_typ == SIZ_WRD) ? "
%7d  " : " %3d "/*byte*/;
        ptr__in_frmt = (data_typ == SIZ_LNG) ? "%Ld" : "%d" /* word/byte */;
        max_entries  =  (data_typ  ==  SIZ_LNG)  ?  4  :  (data_typ  ==  SIZ_WRD)  ?  8  :
16/*byte*/;
        frmt_typ = FRMT_SGN;
            mail_hcu = DSPL_DATA;
        continue;
      case FRMT_USGN :
        ptr__out_frmt = (data_typ == SIZ_LNG) ? " %19Lu" : (data_typ == SIZ_WRD) ? "
%7u  " : " %3u "/*byte*/;
        ptr__in_frmt = (data_typ == SIZ_LNG) ? "%Lu" : "%u" /* word/byte */;
        max_entries  =  (data_typ  ==  SIZ_LNG)  ?  4  :  (data_typ  ==  SIZ_WRD)  ?  8  :
16/*byte*/;
        frmt_typ = FRMT_USGN;
            mail_hcu = DSPL_DATA;
        continue;
      case SIZ_BYT :
      case SIZ_WRD :
      case SIZ_LNG :
        data_typ = mail_hcu;
        data__siz = (data_typ == SIZ_BYT) ? 1 : (data_typ == SIZ_WRD) ? 2 : 4;
        mail_hcu = DEF_FRMT;
        continue;
      case FRMT_ASC :
        ptr__out_frmt = " %c";
        ptr__in_frmt = "%c";
        max_entries = 40;
        data__siz = 1;
        data_typ = SIZ_BYT;
        frmt_typ = FRMT_HEX;
            mail_hcu = DSPL_DATA;
        continue;
      case FRMT_DFLT :
        ptr__out_frmt = " %19.12g";
        ptr__in_frmt = "%f";
        max_entries = 4;
        data__siz = 8;      /* all floats are double */
        frmt_typ = data_typ = FRMT_DFLT;
            mail_hcu = DSPL_DATA;
```

```
        continue;
      case INPUT_TERMINAL_HANDLER :
        if( writ_cntl <= REQ_RCD_LNG )
        { input_avail = sscanf( in_characters, "%x", &d_m__inpt );
          if( writ_cntl == REQ_ADR_SGMT )
          { if( input_avail ) vr_df.cp.cx.sgmnt = d_m__inpt;
            sprintf( output_string, MOVE_CURS COLM_5 LINE_3 "%4X:...." MOVE_CURS
COLM_10 LINE_3, vr_df.cp.cx.sgmnt );
            writ_cntl++;
          }
          else if( writ_cntl == REQ_ADR_OFST )
          { if( input_avail ) vr_df.cp.cx.offst = d_m__inpt;
            sprintf( output_string, MOVE_CURS COLM_10 LINE_3 "%4X <..." MOVE_CURS
COLM_16 LINE_3, vr_df.cp.cx.offst );
            writ_cntl++;
          }
          else
          { if( input_avail && ( d_m__inpt <= 0x100 ) ) rcd_leng = d_m__inpt;
            mail_hcu = DSPL_DATA;
            continue;
          }
          write_b( WR__DETACHED_CMND, output_string );
          break;
        }
        else if( mdfy.indx > 0 )
        { input_avail = ( data_typ == FRMT_DFLT ) ?
            sscanf( in_characters, "%lf", (double*)(vr_df.cp.ptr +((mdfy.indx -1) *
data__siz)) ) :
            sscanf( in_characters, ptr__in_frmt, vr_df.cp.ptr +((mdfy.indx -1) *
data__siz) );
          if( input_avail )
          { if( mdfy.indx < datam__max ) mdfy.indx++;
            else vr_df.cp.ptr += data__siz;    /* add unit(byte, word, long, dfloat)
*/
          }
          else mdfy.indx = -mdfy.indx; /* disable (toggle) */
        }
        else if ( ( password_status == STANDARD_PASSWORD ) || ((password_status =
password_is( )) == STANDARD_PASSWORD) )
          mdfy.indx = -mdfy.indx;      /* enable (toggle) */
        mail_hcu = DSPL_DATA;
        continue;
```

```
      default:
        switch( mail_hcu )
        { case ADD_RECD :
            vr_df.cp.ptr += (unsigned)rcd_leng;
            mdfy.indx = -1;
            break;
          case SUB_RECD :
            vr_df.cp.ptr -= (unsigned)rcd_leng;
            mdfy.indx = -1;
            break;
          case INC_OFFS  :
            if( ( mdfy.indx > 0 ) && ( mdfy.indx < datam__max ) ) mdfy.indx ++;
            else vr_df.cp.ptr += data__siz;    /* add unit(byte, word, long, dfloat)
*/
            break;
          case DEC_OFFS  :
            if(mdfy.indx > 1 ) mdfy.indx--;
            else vr_df.cp.ptr -= data__siz;
            break;
          case INC_BYTE :
            vr_df.cp.ptr++;
            break;
          case DEC_BYTE :
            vr_df.cp.ptr--;
            break;
          default: goto dsp_mem_mail;
        }
        mail_hcu = DSPL_DATA;
        continue;
      case PREV_DISPLAY :
      case EXIT_PROCEDURE :
        return;
    } /* switch */
    if( writ_cntl == REFRESH_DATA )
    { prnt_ptr = vr_df.cp.ptr;
      for( items__count = 1, out_indx = 4; items__count <= datam__max; prnt_ptr +=
data__siz, items__count++)
      {  if( data_typ == SIZ_BYT )
           out_indx += sprintf( &output_string[ out_indx ], ptr__out_frmt, *(unsigned
char far*)prnt_ptr );
         else if( data_typ == SIZ_WRD )
           out_indx += sprintf( &output_string[ out_indx ], ptr__out_frmt, *(unsigned
```

```
far*)prnt_ptr );
         else if(data_typ == SIZ_LNG )
           out_indx += sprintf( &output_string[ out_indx ], ptr__out_frmt, *(long
far*)prnt_ptr );
         else if( data_typ == FRMT_DFLT )
           out_indx += sprintf( &output_string[ out_indx ], ptr__out_frmt, *(double
far*)prnt_ptr );
         else
           break;
      }
      if( mdfy.indx > 0 )
      { sprintf(&output_string[ out_indx ], MOVE_CURS "%c%c>%s" MOVE_CURS "%c%c",
mdfy.col, mdfy.line,
          (data__siz == 1) ? "**" : ((data__siz == 2) ? "* * " : "* * * * "),
mdfy.col+1, mdfy.line );
        writ_cntl = NO_REFRESH;
      }
      write_b( WR__DETACHED_CMND, output_string );
    }
    dsp_mem_mail:
      wait__mail_hcu( 250 MS__TIMEOUT );
  }
} /* display_memory */
```

```
/* V4HCOMMN.K    V4HCOMMN.K    V4HCOMMN.K    V4HCOMMN.K    V4HCOMMN.K    V4HCOMMN.K
 V4HCOMMN.K    V4HCOMMN.K    V4HCOMMN.K
******************************************************************************************
**********************************************
**
                                          **
**                                    EEEEEEEEEEEEEEE      TTTTTTTTTTTTT
NNNNNNN      NNNNN                            **
**                                    EEEEEEEEEEEEEE       TTTTTTTTTTT
NNNNNNNN     NNNNN                            **
**                                    EEEEE               A       TTTT        OOO
NNNNNNNNN    NNNNN                            **
**                                EEEEEEEEEEEE      AAA       TTT       OOOOOOOO  NNNNN
NNNN  NNNNN                            **
**                                EEEEEEEEEEE      AAAAA      TTT       OOOOOOOO  NNNNN
NNNN NNNNN                            **
**                                EEEEE                       TTTT        OOO     NNNNN
 NNNNNNNNN                            **
**                                EEEEEEEEE      AAAAAAA     TTTTT                NNNNN
  NNNNNNNN                            **
**                                EEEEEEEE      AAAAAAAAA    TTTTTTT              NNNNN
   NNNNNNN                            **
**
                                          **
**        This software (firmware) developed by EATON-KENWAY is proprietary.  Source
code on listings or any other media       **
**        is not for sale or loan and may not be copied or transferred to any vendor,
buyer, or consultant.  Executable        **
**          code is available in ROM and is sold with the original product or as a
product upgrade.  Buyer shall not           **
**         copy or distribute ROM's with E-K firmware to any third party without the
prior written approval of EATON-KENWAY.   **
**           Title to and ownership of the software shall at all times remain with
EATON-KENWAY.    The information  in this       **
**           is subject to change without notice  and should not be construed as a
commitment by EATON-KENWAY.                   **
**
                                          **
**         EATON-KENWAY   assumes  no  responsibility  for  the  use or reliability
of  its  software on  equipment which       **
**          is  not supplied EATON-KENWAY or has been modified without EATON-KENWAY
approval.                                  **
```

```
**
                                                    **
**          Copyright 1989
                 KENWAY, INCORPORATED      **
************************************************************************************
**********************************************
   V4HCOMMN.K    V4HCOMMN.K    V4HCOMMN.K    V4HCOMMN.K    V4HCOMMN.K    V4HCOMMN.K
 V4HCOMMN.K    V4HCOMMN.K    V4HCOMMN.K
    DATE CREATED:  Feb 89
    AUTHOR:         Vehicle Group
    DESCRIPTION:
        xxx......            ....
    PROGRAM HISTORY:
    Date          Initials/No.        Description
    ---------    ------------        ---------------------------------------
* * * * * * * * * * * * * * * * * * * * * * * * * * * * * * * * * * * * * * * * * * *
* * * * * * * * * * * * * * * * * * * * * * */
    /* bit definitions */
#define  BIT_0  0x01
#define  BIT_1  0x02
#define  BIT_2  0x04
#define  BIT_3  0x08
#define  BIT_4  0x10
#define  BIT_5  0x20
#define  BIT_6  0x40
#define  BIT_7  0x80
#define  DEVICE_FIELD  0x100        /* bit_8 */
#define  WATCH_DOG  0
#define  ANALOG_OUT  1
#define  ANALOG_IN  2
#define  ENCODER  3
#define  DISCRETE_IN  4
#define  DISCRETE_OUT  5
#define  MASTER_RESET  7

#define  IS__ON  1
#define  IS__OFF  0
#define  ARE__OFF  IS__OFF
#define  LOW_TO_HIGH_INTERRUPT  BIT_7
#define  HIGH_TO_LOW_INTERRUPT  0    /* BIT_7*IS__OFF */
#define  INTERRUPT_ON_LOW_TO_HIGH  0x01
#define  INTERRUPT_ON_HIGH_TO_LOW  0x02
```

```
#define  INTERRUPT_ON_ANY_CHANGE   0x00
#define  PORT_1  1                                     /* port of i/o byte in 8742
*/
#define  PORT_4  4                                     /* port of i/o byte in 8742
*/
#define  PORT_1_COMPLETE_MASK  0x3f       /* 2#01111111 */
#define  PORT_4_COMPLETE_MASK  0xff       /* 2#11111111 */
    /* HCU interrupt and input points  for the  set_mask() and get_() PROCEDURES */
#define  VEHICLE_BRAKES_POINT  8
#define  HARDWARE_POWER_ENABLED_POINT  9
#define  HCU_FRONT_CONNECT_POINT  10
#define  HCU_REAR_CONNECT_POINT  11
#define  TOP_UP_LIMIT_SW_POINT  12
#define  TOP_DOWN_LIMIT_SW_POINT  13
#define  TOP_LOAD_PRESENT_POINT  14
#define  FRONT_PORT_MAGNET_POINT  33                      /*  8#41 */
#define  REAR_STARBOARD_MAGNET_POINT  36              /*  8#44 */
#define  DISABLE_INTERRUPT  0x0000
#define  ENABLE_LOW_TO_HIGH  0x0001
#define  ENABLE_HIGH_TO_LOW  0x0100
#define  ENABLE_HIGH_AND_LOW (ENABLE_LOW_TO_HIGH | ENABLE_HIGH_TO_LOW)
#define  LOW_TO_HIGH_MASK  0x0001
#define  HIGH_TO_LOW_MASK  0x0100
#define  HIGH_AND_LOW_MASK (LOW_TO_HIGH_MASK | HIGH_TO_LOW_MASK)

    /* the HCU <--> motion tasks, the HCU <--> platform tasks, and between  HCU <-->
HCU procedures. */
    /* messages sent to VTC in the VEHICLE_ERROR field that are not errors  (range
1-99) */
#define  HCU_INSERT__AGVC_MANUAL  1
#define  HCU_INSERT__AGVC_AUTOMATIC  2
#define  HCU__AGVC_REMOVE_VEH  3
#define  OSLPWK_SLEEP_DISCRETE_ADDRESS  17              /* byte 4 bit 0  */
#define  VEHICLE_IS_ASLEEP  0x1010              /* future for Arlington vehicle */
  /* Vehicle operational states */
#define  NO_MAIL__TIMEOUT  0x01                      /* mail box        (value RMX
returns on timeout) */
#define  INPUT_TERMINAL_HANDLER  0x02                      /* value returned from
wait__mail when terminal handler reads input */
    /* 03 is available */
#define  START  0x04
#define  NOT_ESTABLISHED  0x05                      /* communications */
```

```
#define ESTABLISHED 0x06
#define EXIT_PROCEDURE 0x07                                  /* exit procedure flag */
#define DEAD 0x08                                            /* vehicle startup states */
    /* 09 is available */
        /* see I/O assignments hardware unit connects */
#define HAND_CONTROL_FRONT_CONNECT      ( DISCRETE_IN * DEVICE_FIELD |
LOW_TO_HIGH_INTERRUPT | '\012' ) /* DI10. [0A] */
#define HAND_CONTROL_REAR_CONNECT       ( DISCRETE_IN * DEVICE_FIELD |
LOW_TO_HIGH_INTERRUPT | '\013' ) /* DI11. [0B] */
#define HAND_CONTROL_FRONT_DISCONNECT   ( DISCRETE_IN * DEVICE_FIELD |
HIGH_TO_LOW_INTERRUPT | '\012' ) /* DI10. [0A] */
#define HAND_CONTROL_REAR_DISCONNECT    ( DISCRETE_IN * DEVICE_FIELD |
HIGH_TO_LOW_INTERRUPT | '\013' ) /* DI11. [0B] */
#define WHEEL_BRAKES_SET                ( DISCRETE_IN * DEVICE_FIELD |
LOW_TO_HIGH_INTERRUPT | '\010' ) /* DI08. [08] */
#define WHEEL_BRAKES_RELEASED           ( DISCRETE_IN * DEVICE_FIELD |
HIGH_TO_LOW_INTERRUPT | '\010' ) /* DI08. [08] */
#define EMERGENCY_STOP_SET              ( DISCRETE_IN * DEVICE_FIELD |
HIGH_TO_LOW_INTERRUPT | '\011' ) /* DI09. [09] */
#define EMERGENCY_STOP_RELEASED         ( DISCRETE_IN * DEVICE_FIELD |
LOW_TO_HIGH_INTERRUPT | '\011' ) /* DI09. [09] */
#define WHEEL_BRKS__PWR_ENBLD_MASK ( BIT_0 | BIT_1 )            /* port 1 */
#define HARDWR_OVRRIDE_ENABL 6                                  /* OORIDE-n */
  /* discrete in conditions for wheels and E-stop */
#define SET_WHEEL_BRAKES BIT_0
#define RELEASE_WHEEL_BRAKES ~SET_WHEEL_BRAKES
#define RELEASE_EMERGENCY_STOP BIT_1
#define SET_EMERGENCY_STOP ~RELEASE_EMERGENCY_STOP

   /* Various HCU states and options */
#define MANUAL_OPER_T "!"                       /* 33. */
#define MANUAL_OPER '!'
#define AQUIRE_FLOOR_T "#"                      /* 34. */
#define AQUIRE_FLOOR '#'
#define AQUIRE_WIRE_T "S"                       /* 35. */
#define AQUIRE_WIRE 'S'
#define AUTO_OPERTN_T "&"                       /* 38. */
#define AUTO_OPERTN '&'
#define TRACK_WIRE_T "\'"                       /* 39. */
#define TRACK_WIRE '\047'
#define MASTER_MENU_T "("                       /* 40. */
#define MASTER_MENU '('
```

```
#define  SELECT_MODE_T  ")"                                /* 41.  */
#define  SELECT_MODE    ')'
#define  SELECT_DIAGNOSTIC_T  "*"                          /* 42.  */
#define  SELECT_DIAGNOSTIC    '*'
#define  CONFIGURE_T  "+"                                  /* 43.  */
#define  CONFIGURE    '+'
    /* available value here                               --44. , */
#define  STATUS_T  "-"                                     /* 45.  */
#define  STATUS    '-'
#define  I_O_TEST_T  "."                                   /* 46.  */
#define  I_O_TEST    '.'
#define  CPU_MEM_TEST_T  "/"                               /* 47.  */
#define  CPU_MEM_TEST    '/'
#define  COMMAND_QUES_T  "0"                               /* 48.  */
#define  COMMAND_QUES    '0'
#define  READ_DISCRETE_T  "2"                              /* 50.  */
#define  READ_DISCRETE    '2'
#define  READ_ANALOG_T  "3"                                /* 51.  */
#define  READ_ANALOG    '3'
#define  MODIFY_DISCRETE_T  "4"                            /* 52.  */
#define  MODIFY_DISCRETE    '4'
#define  MODIFY_ANALOG_T  "5"                              /* 53.  */
#define  MODIFY_ANALOG    '5'
#define  CHECK_ENCODER_T  "6"                              /* 54.  */
#define  CHECK_ENCODER    '6'
#define  SEL_STATUS_T  "7"                                 /* 55.  */
#define  SEL_STATUS    '7'
#define  PULSE_DISCRETES_T  "8"                        /* 56.  */
#define  PULSE_DISCRETES    '8'
#define  INTRP_HIST_DSPLY_T  "9"                           /* 57.  */
#define  INTRP_HIST_DSPLY    '9'
    /* available values here */
/* #define  SELECT_NEXT_T  "xx"                                --61.  */
#define  PREV_DISPLAY_T  ">"                                /* 62.  */
#define  PREV_DISPLAY    '>'
#define  ILLEGAL_PASSWORD  0
#define  STANDARD_PASSWORD  1
#define  MASTER_PASSWORD  2
    /* work around for padapt inability to use procedural parameters */
#define  NO_OPERATION_SELECTOR  0
#define  JOYSTICK_WHEEL_SELECTOR  1
#define  JOYSTICK_TRACKING_SELECTOR  2
```

```
#define  JOYSTICK_PLATFORM_SELECTOR  3
#define  FIND_THE_WIRE_SELECTOR  4
#define  AUTOMATIC_SELECTOR  5
    /* Various command selections or options */
#define  STOP_AND_WAIT  '@'                              /* 64 */
#define  MOVE_FORWARD  'A'                               /* 65 */
#define  CURRENT_CODE_T  "A"
#define  CURRENT_CODE    'A'
#define  MOVE_BACKWARD  'B'                              /* 66 */
#define  COMMUNICATIONS_CODE_T  "B"
#define  COMMUNICATIONS_CODE    'B'
#define  SELECT_TURN_T  "C"                              /* 67 */
#define  SELECT_TURN    'C'
#define  DISCRETE_I_O_CODE_T  "C"
#define  DISCRETE_I_O_CODE    'C'
#define  SELECT_ROTATE_T  "D"                            /* 68 */
#define  SELECT_ROTATE    'D'
#define  ANALOG_I_O_CODE_T  "D"
#define  ANALOG_I_O_CODE    'D'
#define  MOVE_ON_WIRE_T  "E"                             /* 69 */
#define  MOVE_ON_WIRE    'E'
#define  STEP__NEXT_DSPLY_T  "F"                         /* 70 */
#define  STEP__NEXT_DSPLY    'F'
    /* 71..72 available */
#define  ROTATE_LEFT_T  "I"                              /* 73 */
#define  ROTATE_LEFT    'I'
#define  ROTATE_RIGHT_T  "J"                             /* 74 */
#define  ROTATE_RIGHT    'J'
#define  PLATFORM_T  "P"                                 /* 80 */
#define  PLATFORM    'P'
#define  RAISE_TOP  0x60                                  /* 96. ` */
#define  LOWER_TOP  'a'                                  /* 97 */
#define  HCU_AUTO_T  "a"
#define  HCU_AUTO    'a'
#define  SCROLL_UP_T  "b"                              /* command queue scroll options
98 */
#define  SCROLL_UP    'b'
#define  SCROLL_DOWN_T  "c"                              /* 99 */
#define  SCROLL_DOWN    'c'
#define  MODIFY_COMMAND_T  "d"                           /* 100 */
#define  MODIFY_COMMAND    'd'
#define  MORE_DIAGNOSTICS_T  "g"                         /* 103 */
```

```
#define  MORE_DIAGNOSTICS    'g'
#define  CLEAR_EVENT_X_ENTRY_T  "g"
#define  CLEAR_EVENT_X_ENTRY    'g'
#define  CLEAR_ENCODERS_T  "h"
#define  CLEAR_ENCODERS    'h'
#define  TOGGLE_DATA_DSPLY_T  "i"
#define  TOGGLE_DATA_DSPLY    'i'
#define  DEBUG_SPECIAL_DSPLY_T  "j"
#define  DEBUG_SPECIAL_DSPLY    'j'
#define  SHOW_MEMORY_T  "k"
#define  SHOW_MEMORY    'k'
#define  ENCODER_DIAG_T  "l"
#define  ENCODER_DIAG    'l'

#define  DEAD_TEXT_T  "dead"
#define  MANUAL_TEXT  "OFFwire"
#define  ACQUISITION_TEXT  "ONwire "
    /*  The following constants define various commands. values are determined by the
hardware interface requirements */
#define  VEHICLE_READY_FLAG  BIT_1                            /* 2=ready, variable
vehicle_ready */
#define  ANTENNA_SENSING_THRESHOLD  25                  /*  10% of 255 */
#define  ANTENNA_NOISE_THRESHOLD  5                     /*  2% of 255 */
#define  DUOBLE_ANTENNA_NOISE_THRESHOLD  ANTENNA_NOISE_THRESHOLD*2
#define  STARB_ANT_CHN  5                     /* see I/O assignment (Vin04) */
#define  PORTS_ANT_CHN  4                      /* see I/O assignment (Vin05) */
#define  ANTENNA_HARDWARE_SETTLING_TIME  5             /*  time hardware filters
need to settle out after switching frequencies */
#define  ANTENNA_CENTERED_LEVEL  10                           /* minimum level when
antennas are centered */
    /* [motion] source flag to extract information useful to motion */
#define  FREQUENCY_BIT  BIT_6                         /* bit in control byte 4 to
select frequency sensing */
#define  GUIDANCE_BIT  BIT_5                          /* bit in control byte 4 to
select computer to hardware wire tracking */
#define  ANTENNA_BIT_C  BIT_4                         /* bit in control byte 4 to
select front | rear antenna */
#define  MOTION_TOP_TACH_SELECT  BIT_7           /* bit in control byte 4 to select
which tach is used for analog control */
#define  HARDWR_PWR_ENABL  7                    /* bit that will pickup up relay to
enable vehicle movement(control byte 0) */
#define  MANUAL_CONTROL_MASK  ( GUIDANCE_BIT | MOTION_TOP_TACH_SELECT )
```

```
#define MANUAL_CONTROL_COMMAND MANUAL_CONTROL_MASK
#define ODACT_SELECT_DRIVE_TACH 39 /* (byte 4 bit 7)8#47 */
#define OGUIDM_SELECT_COMP_GUIDANCE 37 /* (byte 4 bit 5)8#45 */
#define COMPUTER_GUIDANCE GUIDANCE_BIT /* any n & n zero non 1 value */
#define HARDWARE_GUIDANCE 0 /* GUIDANCE_BIT & IS__OFF */
#define NOT_OVER_WIRE 0
#define OVER_WIRE 1
#define OFREQ1_SELECT_GUID_FREQ_1 38 /* (byte 4 bit 6)8#46 */
#define FREQ_1 FREQUENCY_BIT /* any non zero value */
#define FREQ_2 0 /* FREQUENCY_BIT & IS_OFF */
#define IMAGSF_STARBOARD_FRONT_MAGNET 33 /* discrete in channel 8#41
*/
#define IMAGPF_PORTSIDE_FRONT_MAGNET 34 /* discrete in channel 8#42
*/
#define IMAGSB_STARBOARD_BACK_MAGNET 35 /* discrete in channel 8#43
*/
#define IMAGPB_PORTSIDE_BACK_MAGNET 36 /* discrete in channel 8#44
*/
#define IWRXF1_FREQ1_WIRE_CROSS 37 /* discrete in channel 8#45
*/
#define IWRXF2_FREQ2_WIRE_CROSS 38 /* discrete in channel 8#46
*/
#define MAGNET_SF_X_EVENT ( ( DISCRETE_IN * DEVICE_FIELD ) | LOW_TO_HIGH_INTERRUPT
| IMAGSF_STARBOARD_FRONT_MAGNET )
#define MAGNET_PF_X_EVENT ( ( DISCRETE_IN * DEVICE_FIELD ) | LOW_TO_HIGH_INTERRUPT
| IMAGPF_PORTSIDE_FRONT_MAGNET )
#define MAGNET_SB_X_EVENT ( ( DISCRETE_IN * DEVICE_FIELD ) | LOW_TO_HIGH_INTERRUPT
| IMAGSB_STARBOARD_BACK_MAGNET )
#define MAGNET_PB_X_EVENT ( ( DISCRETE_IN * DEVICE_FIELD ) | LOW_TO_HIGH_INTERRUPT
| IMAGPB_PORTSIDE_BACK_MAGNET )
#define F1_WIRE_X_EVENT ( ( DISCRETE_IN * DEVICE_FIELD ) | LOW_TO_HIGH_INTERRUPT
| IWRXF1_FREQ1_WIRE_CROSS )
#define F2_WIRE_X_EVENT ( ( DISCRETE_IN * DEVICE_FIELD ) | LOW_TO_HIGH_INTERRUPT
| IWRXF2_FREQ2_WIRE_CROSS )

#define IOVRW_ANT_OVER_WIRE 32 /* Input point */
#define OANTF_SELECT_FRONT_GUIDANCE 36 /* (byte 4 bit 4)8#44 see I/O
assignment 0=front, 1=rear */
#define DISCRETE_BITS_0_THRU_7 0 /* port 0 of the D i/o board
digital out controller */
#define OPTF_FRONT_PORTSIDE_CONTACTOR BIT_0 /* port 0 */
#define OPTB_BACK_PORTSIDE_CONTACTOR BIT_1 /* port 0 */
```

```
#define  OSBF_FRONT_STARBOARD_CONTACTOR  BIT_2            /* port 0 */
#define  OSBB_BACK_STARBOARD_CONTACTOR  BIT_3             /* port 0 */
#define  OSBF_SHUTTLE_LEFT_CONTACTOR  OSBF_FRONT_STARBOARD_CONTACTOR
#define  OSBB_SHUTTLE_RIGHT_CONTACTOR  OSBB_BACK_STARBOARD_CONTACTOR
#define  OPTF_RAISE_TOP_CONTACTOR  OPTF_FRONT_PORTSIDE_CONTACTOR
#define  OPTB_LOWER_TOP_CONTACTOR  OPTB_BACK_PORTSIDE_CONTACTOR
#define  OSPSS_VEHICLE_BRAKE_RELEASE  BIT_4         /* port 0  (4 quadrant chopper
vehicles, spare on others) */
   /* SEE MEMO 'i/o ASSIGNMEMTS FOR LIFT TOP VEHICLE' 2#00011111 */
#define MOTION_MASK  ( OPTF_FRONT_PORTSIDE_CONTACTOR | OPTB_BACK_PORTSIDE_CONTACTOR
|  OSBF_FRONT_STARBOARD_CONTACTOR  |\
                    OSBB_BACK_STARBOARD_CONTACTOR  |  OSPSS_VEHICLE_BRAKE_RELEASE )
          /* (port 0) 2#00000110 */
#define        ROTATE_LEFT_COMMAND        (    OPTB_BACK_PORTSIDE_CONTACTOR        |
OSPSS_VEHICLE_BRAKE_RELEASE  | OSBF_FRONT_STARBOARD_CONTACTOR )
          /* (port 0) 2#00001001 */
#define        ROTATE_RIGHT_COMMAND       (    OPTF_FRONT_PORTSIDE_CONTACTOR       |
OSPSS_VEHICLE_BRAKE_RELEASE | OSBB_BACK_STARBOARD_CONTACTOR )
          /* (port 0) 2#00000101 */
#define        FRONT_DIRECTION        (    OPTF_FRONT_PORTSIDE_CONTACTOR        |
OSPSS_VEHICLE_BRAKE_RELEASE  | OSBF_FRONT_STARBOARD_CONTACTOR )
          /* (port 0) 2#00001010 */
#define REAR_DIRECTION  ( OPTB_BACK_PORTSIDE_CONTACTOR | OSPSS_VEHICLE_BRAKE_RELEASE
| OSBB_BACK_STARBOARD_CONTACTOR )
   /*  following are used only in the track wire mode, */
   /*  while values reflect contactor settings only the unique value is important */
#define  FRONT_PIVOT_LEFT  OSBF_FRONT_STARBOARD_CONTACTOR
#define  FRONT_PIVOT_RIGHT  OPTF_FRONT_PORTSIDE_CONTACTOR
#define  REAR_PIVOT_LEFT  OPTB_BACK_PORTSIDE_CONTACTOR
#define  REAR_PIVOT_RIGHT  OSBB_BACK_STARBOARD_CONTACTOR
#define  TRACK_TURN_THRESHOLD  50      /* joystick offset to initialte a turn in
track-mode */

   /* [motion] source flag to extract information useful to motion */
#define  TACHP_AI__PORTSIDE_TACH  7                    /* SEE i/o ASSIGNMENTS */
#define  TACHS_AI__STARBOARD_TACH  6                   /* see I/O assignments */
#define  SPDP_AO__PORTSIDE_WHEEL  0                   /* see I/O assignments same
control as for platform */
                                                       /* see I/O assignments */
#define  SPDS_AO__STARBOARD_WHEEL  1                   /* for shuttle vehicle */
#define  SPDS_AO__SHUTTLE_MOTOR  1                     /* hardware nomenclature
#define  SPDHC_AI__SPEED_JOYSTICK  2
Vin02 */
```

```
#define  DIRHC_AI__DIRECTION_JOYSTICK  3                    /* hardware nomenclature
Vin03 */
#define  WAITING_MESSAGE  "waiting"
#define  RAISE_MESSAGE  " raise"
#define  EXTENDED_MESSAGE  "--up--"
#define  LOWER_MESSAGE  " lower"
#define  SECURE_MESSAGE  "-down-"
#define  MIDDLE_MESSAGE  "middle"
#define  FORWARD_MESSAGE  "forward "
#define  BACKWARD_MESSAGE  "man BKWD"
#define  TRACK_BACKWARD_MESSAGE  "trckBKWD"
#define  ROTATE_LEFT_MESSAGE  "rot.left"
#define  ROTATE_RIGHT_MESSAGE  "rot.rght"
#define  RIGHT_MESSAGE  " right"                            /*  for shuttle veh */
#define  LEFT_MESSAGE  " left "                             /*  for shuttle veh */
#define  R_EXTENDED_MESSAGE  "-right"                       /*  for shuttle veh */
#define  L_EXTENDED_MESSAGE  "-left-"                       /*  for shuttle veh */
  /*  The following constants define platform messages and values */
    /* the lift top platform Digital Out port 0 bits 4,5 (points DO04,DO05) */
#define  OTBRK_N_DO__TOP_BRAKE  12                          /* brake release */
#define  OSBRK_N_DO__SHUTTLE_BRAKE  13                      /* SHUTTLE BRAKE RELEASE */
#define  ILSUP_DI__TOP_UP  12                               /* limit switch to detect
top up */
#define  ILSDWN_DI__TOP_DOWN  13                            /* limit switch to detect
top down */
#define  ISEOTR_DI__EOT_RIGHT  18                           /* end of travel right sw.,
shuttle veh */
#define  ISEOTL_DI__EOT_LEFT  16                            /* end of travel left sw.,
shuttle veh */

    /* see memo 'I/O assignmemts for lift top vehicle' 2#00010011 */
#define PLATFORM_MASK  ( OPTF_FRONT_PORTSIDE_CONTACTOR | OPTB_BACK_PORTSIDE_CONTACTOR
| OSBF_FRONT_STARBOARD_CONTACTOR | \
                     OSBB_BACK_STARBOARD_CONTACTOR )
#define  STOP_PLATFORM  0    /* (OPTF_RAISE_TOP_CONTACTOR | OPTB_LOWER_TOP_CONTACTOR
| OSBF_SHUTTLE_LEFT_CONTACTOR |
                             OSBB_SHUTTLE_RIGHT_CONTACTOR) OFF  modified for lift
and/or shuttle control */
#define  UP_COMMAND  ( OPTF_RAISE_TOP_CONTACTOR  )   /* modified for lift and/or
shuttle control */
#define  DOWN_COMMAND  ( OPTB_LOWER_TOP_CONTACTOR )  /* modified for lift and/or
shuttle control */
```

```
#define LEFT_COMMAND ( OSBF_SHUTTLE_LEFT_CONTACTOR )   /* shuttle vehicle operations
*/
#define RIGHT_COMMAND ( OSBB_SHUTTLE_RIGHT_CONTACTOR ) /* shuttle vehicle operations
*/
                                                          /* dig IN sense status */
#define  SECURE  0
#define  TOP_BETWEEN  1
#define  EXTENDED  2
#define  SPEAKER_CONTROL  BIT_0                              /* port 1 bit to turn
speaker off */
#define  PORTSIDE_LIGHTS_CONTROL  BIT_1                     /* port 1 bit to control
lights */
#define  STARBOARD_LIGHTS_CONTROL  BIT_2                    /* port 1 bit to control
lights */
    /* HCU_control_switches  masks */
#define  HCU_AUTO_MASTER_MASK  0x01                        /* 2#00000001
HCU task */
       /* Hand Controller commands                  Digital In port 1 bits 2,3(points
DI10,DI11) */
#define  HAND_CONTROL_CONNECTION_MASK   ( BIT_2 | BIT_3 )                          /*
set bits in 'port_1'  */
#define  LONG_BEEP  120                                    /* length of audible error
responce */
#define  HARSH_TONE  100                                     /* frequency of audible
error responce */
#define  WARNING_5_SEC  255
#define  PLEASENT_TONE  250                                /* 500hz /2 */
        /* real time clock constants */
#define  MS__TIMEOUT   /10
#define  SEC__TIMEOUT  *100
#define  MIN__TIMEOUT  *6000
#define  TIMEOUT__FOREVER  0xFFFF
    /* Various other useful constants */
#define  NONE  0
#define  BATTERY_VOLTAGE_CHANNEL  1                          /* see I/O assignments
(Vin01) */

  /* the 2 following definitions generate code by work around INTEL 'C' problem
    formating hex output (%4X) with number greater than 0x8000
#define INTEL_HEX_FRMT "%1X%03X"
#define INTEL_HEX_FIX(a) (a>>12), (a & 0x0FFF)
  */
#define INTEL_HEX_FRMT "%04X"
```

```
#define INTEL_HEX_FIX(a) (a)
 /* Definitions of ASCII control characters */
#define  FUNCTION_FLAG  '\036'      /* function key message flag <rs> */
#define  BLANK  " "                 /* space or blank */
#define  STX  "\002"                /* <start text>  'transparent mode' */
#define  ESC  "\033"                /* <escape> 'attention character' */
#define  DEL  "\177"                /* delete character command */
#define  CR  "\r"                   /* carriage return */
#define  BELL  "\007"               /* <bell> command */
#define  SO  "\016"                 /* <shift out> 'prompt protect' */
#define  CLEAR_LINE  "
                                      "
#define  FORMFEED  "\033\014  \r\r"    /* <form feed> "clear display leave in mode 0"
*/
                                              /* VT102 cursoraddress command */
#define  MOVE_CURS "\033\131"
#define  LINE_COL_BASE  '\240'              /* offset to make line/column numbers
into VT102 format */
#define  LINE_0  "\240"          /*  VT102 format */
#define  LINE_1  "\241"          /*  VT102 format */
#define  LINE_2  "\242"          /*  VT102 format */
#define  LINE_3  "\243"          /*  VT102 format */
#define  LINE_4  "\244"          /*  VT102 format */
#define  LINE_5  "\245"          /*  VT102 format */
#define  LINE_6  "\246"          /*  VT102 format */
#define  LINE_7  "\247"          /*  VT102 format */
#define  COLM_0  "\240"        /*  VT102 format */
#define  COLM_1  "\241"        /*  VT102 format */
#define  COLM_2  "\242"        /*  VT102 format */
#define  COLM_3  "\243"        /*  VT102 format */
#define  COLM_4  "\244"        /*  VT102 format */
#define  COLM_5  "\245"        /*  VT102 format */
#define  COLM_6  "\246"        /*  VT102 format */
#define  COLM_8  "\250"        /*  VT102 format */
#define  COLM_9  "\251"        /*  VT102 format */
#define  COLM_10  "\252"       /*  VT102 format */
#define  COLM_11  "\253"       /*  VT102 format */
#define  COLM_12  "\254"       /*  VT102 format */
#define  COLM_14  "\256"       /*  VT102 format */
#define  COLM_15  "\257"       /*  VT102 format */
#define  COLM_16  "\260"       /*  VT102 format */

#define  HOME_CURSOR    MOVE_CURS  COLM_0  LINE_7
#define  ACTION_ECHO_ADDRESS    MOVE_CURS  COLM_10  LINE_6
```

```
#define  OPTION_ADDRESS    MOVE_CURS  COLM_0  LINE_6
#define  PROMPT_ADDRESS    MOVE_CURS  COLM_0  LINE_5
#define  LOCK_CURSOR    MOVE_CURS  COLM_0  LINE_7  ESC  "\027"    /* <ctrl w(ETB)>
"keypad lock (all undefined keys)" */
#define  COLM_LOCK  ESC  "\016"                    /* <ctrl n>  lock the column at
this point where it is */
#define  SIMULATION_FLAG  "+"                          /* To simulate real-time
events from the keypad for debug */
#define  FULL_SCALE_OUTPUT   255
#define  MAX_JOYSTICK_SPD   128    /* a/d reading minus center */
#define  HCU_READY_CODE    0x0001
#define  JOYSTK_SPD_THRSHOLD  16
#define  JOYSTK_DIR_THRSHOLD  18
#define  HCU_FRONT_CONNECT_MASK    0x04       /* port 1 bit 2;        */
#define  HCU_REAR_CONNECT_MASK    0x08        /* port 1 bit 3;        */
#define  HAND_CONTROL_CONNECT_MASK   ( HCU_FRONT_CONNECT_MASK | HCU_REAR_CONNECT_MASK
)    /* port 1 bits 2 and 3 */
typedef  enum { NORMAL_UPDATE, SELECT_CONTACTOR_AFTER_STOP } contactor_chng_msg_flg;
typedef  enum { CURRENT_STATUS, DISCRETE_STATUS, ANALOG_STATUS, COMMUNICATIONS_STATUS
} display_types;
typedef struct
{ unsigned *log_variable_pointer;
   char log_variable_length;
} debug_config_type;
extern void compute_battery_status( int averaging_index );
/* extern void init_batt_backed_vars_sub_sys( ); */
            /* ********** FUNCTION PROTOCALS DECLARATIONS *********** */
void request_status_display( );
void wait__mail_hcu( unsigned  timeout_period/* Unit=10ms */ );
void platform_control_with_joystick( );
void get_platform_status( );
void calibrate_platform_controls( );
void configure_vehicle( );


/*************************************************************************************
*****************
  Variable definitions for communications status displays

*************************************************************************************
*****************/
extern unsigned rcvcont;        /* receive control byte  */
extern unsigned rcvmcnt;        /* receive message counter */
extern unsigned rcvlen;         /* receive message length */
```

```
extern unsigned rcvecnt;          /* receive error counter */
extern unsigned rcvecod;          /* receive error code */
extern unsigned xmtcont;          /* transmit control byte */
extern unsigned xmtecnt;          /* transmit error counter */
extern unsigned xmtecod;          /* transmit error code */
extern unsigned xmtcnt;           /* transmit message counter */

/*********************************************************************************
****************
  Variables necessary for display of vehicle error conditions and debug of other tasks
through the hand control displays

*********************************************************************************
****************/
extern unsigned error_count;          /* ram/rom test error accumulator */
extern unsigned error_segment;        /* segment from vsysbug when an error occurs */
extern unsigned error_offset;          /* offset from vsysbug when an error occurs */
extern unsigned error_code;          /* code from vsysbug when an error occurs */
extern unsigned error_vrbl;          /* variable from vsysbug, if used, on error */
extern unsigned error_device;         /* device from vsysbug when if an i/o error occurs
*/
extern unsigned error_status;         /* device from vsysbug when if an i/o error occurs
*/
extern unsigned non_token_pointer;
extern unsigned non_token_buffer[64];

                                                                    /                 *
*********************************************************************************
**************
     "HCU_EXTERN" is a macro "#define" in each modual set "extern" or blank depending
on the modual
        to define global variables

*********************************************************************************
*************** */
#if defined(HCU_PUBLIC)
#define HCU_EXTERN
#else
#define HCU_EXTERN extern
#endif
   /* PUBLIC */
HCU_EXTERN unsigned record_length;
HCU_EXTERN unsigned memory_segment;
HCU_EXTERN unsigned memory_offset;
```

```
/***************************************************************************
****************
  various other variables declared for hand controller use and are maintained as public
to aid in debug

****************************************************************************
*****************/
HCU_EXTERN char  in_characters[40];
HCU_EXTERN char  output_string[256];
HCU_EXTERN char  *hcu_mode_text;
HCU_EXTERN char  *vehicle_action_text;
HCU_EXTERN char  *platform_action_text;
HCU_EXTERN char  write_err_msg;
HCU_EXTERN display_types    display_selection;
HCU_EXTERN enum  { DSPL_DISABLED, DSPL_ENABLED } display_in_automatic ;
HCU_EXTERN unsigned  man_cntrl_tsk;
HCU_EXTERN unsigned  man_cntrl_tsk_prv;
HCU_EXTERN unsigned  hcu_mode;
HCU_EXTERN unsigned  mail_hcu;
HCU_EXTERN unsigned  action;
HCU_EXTERN unsigned  auto_reset;        /* bumper reset under some conditions */
HCU_EXTERN unsigned  vehicle_ready;
HCU_EXTERN enum  {CTR_OPEN, CTR_CLOSNG, CTR_CLOSD } contactor_status;
HCU_EXTERN contactor_chng_msg_flg    contactor_updat_msg_flg;    /* flag to inhibit
update when an error message is displayed */
HCU_EXTERN char  encode_error;

HCU_EXTERN int  left_antenna_level;          /* analog level of antenna values 0-255
*/
HCU_EXTERN int  right_antenna_level;         /* analog level of antenna values 0-255
*/
HCU_EXTERN int  last_left_antenna_level;     /* analog level of antenna values 0-255
*/
HCU_EXTERN int  last_right_antenna_level;        /* analog level of antenna values
0-255 */
HCU_EXTERN int  left_wheel_speed;              /* status as determined by the motion
task */
HCU_EXTERN int  right_wheel_speed;             /* status as determined by the motion
task */
HCU_EXTERN int  hcu_ports_whl_spd;
HCU_EXTERN int  hcu_starb_whl_spd;
HCU_EXTERN int  joystick_speed;          /*  0-255 configurable control range */
HCU_EXTERN int   joystick_direction;             /*   0 is port whl hrdw guid and
```

```
starboard whl at joy speed, 128 is both wheels
                                              at joy_speed. 255 is starbd wheel
hardware guid and port wheel at joy spd */
HCU_EXTERN int  max_rotate_acqui_speed;      /* maximum speed the vehicle may rotate
when acquiring the wire */
HCU_EXTERN int  battery_voltage;
HCU_EXTERN int  joystick_direction_center;      /* calibration when hand control is
plugged in for joy stick */
HCU_EXTERN int  joystick_speed_center;          /* calibration when hand control is
plugged in for joy stick */
HCU_EXTERN unsigned  guidance_frequency_select;
HCU_EXTERN unsigned  track_wire_turn;           /* tracking turn type */
HCU_EXTERN unsigned  antenna__settling_delay;
HCU_EXTERN double speed__man;                   /* memory for manual speed calcs */
HCU_EXTERN double dirctn__man;                 /* memory for manual direction calcs
*/
```

```
/*      v3init_DEF   v3init_DEF   v3init_DEF   v3init_DEF   v3init_DEF   v3init_DEF
v3init_DEF  v3init_DEF  v3init_DEF  v3init_DEF
**************************************************************************************
**********************************************
**
                                              **
                                            EEEEEEEEEEEEEEE       TTTTTTTTTTTTT
**                                                 **
NNNNNNN       NNNNN                         EEEEEEEEEEEEEE        TTTTTTTTTTT
**                                                 **
NNNNNNNN      NNNNN                         EEEEE              A        TTTT       OOO
**                                                 **
NNNNNNNNN     NNNNN                     EEEEEEEEEEEE    AAA     TTT     OOOOOOOO  NNNNN
**                                          **
NNNN   NNNNN                            EEEEEEEEEEE     AAAAA   TTT     OOOOOOOO  NNNNN
**                                          **
NNNN NNNNN                              EEEEE                   TTTT      OOO     NNNNN
**                                          **
 NNNNNNNNN                              EEEEEEEEE     AAAAAAA   TTTTT             NNNNN
**                                          **
  NNNNNNNN                              EEEEEEEE     AAAAAAAAA  TTTTTTT           NNNNN
**                                          **
   NNNNNNN
**
                                              **
**        This software (firmware) developed by EATON-KENWAY is proprietary.  Source
code on listings or any other media       **
**        is not for sale or loan and may not be copied or transferred to any vendor,
buyer, or consultant.  Executable        **
**          code is available in ROM and is sold with the original product or as a
product upgrade.  Buyer shall not             **
**         copy or distribute ROM's with E-K firmware to any third party without the
prior written approval of EATON-KENWAY.   **
**          Title to and ownership of the software shall at all times remain with
EATON-KENWAY.   The information  in this      **
**          is subject to change without notice  and should not be construed as a
commitment by EATON-KENWAY.                    **
**
                                              **
**          EATON-KENWAY   assumes  no  responsibility  for  the  use or reliability
of  its  software on  equipment which       **
**          is  not supplied EATON-KENWAY or has been modified without EATON-KENWAY
approval.                                     **
```

```
**
                                                  **
**          Copyright 1989
                 KENWAY, INCORPORATED     **
*************************************************************************************
**********************************************
   v3init_DEF  v3init_DEF  v3init_DEF  v3init_DEF  v3init_DEF  v3init_DEF  v3init_DEF
v3init_DEF  v3init_DEF  v3init_DEF
   DATE CREATED:  Feb 89
   AUTHOR:        Vehicle Group
   DESCRIPTION:
     declares vinit procedures.
   PROGRAM HISTORY:
   Date        Initials/No.        Description
   ---------   ------------        ----------------------------------------
* * * * * * * * * * * * * * * * * * * * * * * * * * * * * * * * * * * * * * * * * *
* * * * * * * * * * * * * * * * * * * * * * */
  /* define functions to be compatable with assembler's UPPER CASE */
#define  break_echain     BREAK_ECHAIN
#define  put_analog_out    PUT_ANALOG_OUT
#define  get_analog_out    GET_ANALOG_OUT
#define  get_analog_in    GET_ANALOG_IN
#define  set_analog_in    SET_ANALOG_IN
#define  set_encoder    SET_ENCODER
#define  get_encoder    GET_ENCODER
#define  set_bit_discrete_in    SET_BIT_DISCRETE_IN
#define  get_bit_discrete_in    GET_BIT_DISCRETE_IN
#define  get_byte_discrete_in    GET_BYTE_DISCRETE_IN
#define  set_byte_discrete_in    SET_BYTE_DISCRETE_IN
#define  set_bit_discrete_out    SET_BIT_DISCRETE_OUT
#define  put_bit_discrete_out    PUT_BIT_DISCRETE_OUT
#define  get_bit_discrete_out    GET_BIT_DISCRETE_OUT
#define  put_byte_discrete_out    PUT_BYTE_DISCRETE_OUT
#define  get_byte_discrete_out    GET_BYTE_DISCRETE_OUT
#define  m_c_p__discretes  M_C_P__DISCRETES
#define  wait__mail    WAIT__MAIL
#define  send__mail    SEND__MAIL
#define  delay      DELAY
#define  set_mask    SET_MASK
#define  enable_communications    ENABLE_COMMUNICATIONS
#define  disable_communications    DISABLE_COMMUNICATIONS
#define  enable_interrupts    ENABLE_INTERRUPTS
```

```
#define disable_interrupts   DISABLE_INTERRUPTS
#define get_hcu    GET_HCU
#define read_hcu    READ_HCU
#define vsysbug    VSYSBUG
#define autocom  AUTOCOM
#define oncom  ONCOM
#define offcom  OFFCOM
#define transon  TRANSON
#define transoff  TRANSOFF
#define WR__DETACHED_CMND  0x0001        /* 1 */
#define WR__ATTACHED_MASK   0x0002       /* 2x10 */

#if defined( EAGL )   /* new DIO board */
#define FND_CHN(A,B) ((A)|(1<<(B)))
#else   /* WIRE  -- old DIO board */
#define FND_CHN(A,B) (B)
#endif
void put_analog_out( unsigned command, ... /* variable int args */ );
  /* address(channel): 0-3
     arguements(1-4): 0-255 range */

#if defined( EAGL ) /* new DIO board */
#define PUT_AO__WHLS(A,B) {put_analog_out( DRIVE_WHEELS, (A), (B) );}
#else
#define PUT_AO__WHLS(A,B) { put_analog_out( A_OUT_CH__STARB_DRV, (A) ); put_analog_out(
A_OUT_CH__PORTS_DRV, (B) ); }
#endif
unsigned get_analog_out( unsigned command );
  /* address(channel): 0-3
     returned value: 0-255    */
unsigned get_analog_in( unsigned address );
  /* address(channel): 0-15
     returned value: 0-255 */
void set_analog_in( unsigned address, unsigned action, unsigned action_arguement );
  /* set up interrupt
     address(channel): 0-15
     action:  disable interrupt, set low int, clear low int, set high int, clear hig
int, , clear scan, set scan */
void set_encoder( unsigned char command, ... );
  /* set up encoder counter interrupt functions
     command (byte)  "1 0 a b 0 x x x"  Set encoder to / add to encoder
       where a = { 1(enable interupts)/ 0(disable interrupt) }
```

```
        b = { 1 = add to current value }
        "xxx" = single counter number(address) range= 0-5
    data parameter is a (long integer ) of the encoder counts to be set(added)
  command(byte)  "0 0 n e d c b a" enable encoder(s) interrupt and clear.
    where a = { 1(enable interupts)/ 0(disable interrupt) }
          "edcba" are bits corresponding to counters(addr) 4,3,2,1,0
  command(byte)  "0 1.0 n e d c b a" enable encoder(s) interrupt (do not clear).
    where a = { 1(enable interupts)/ 0(disable interrupt) }
          "edcba" are bits corresponding to counters(addr) 4,3,2,1,0
 */
double get_encoder( unsigned char command );
  /* read (16 bits)
     command byte "0 0 0 0 n x x x"
       where xxx in bits 2,1,0 is a decimal number 0-5.
           'n' in bit 3 specifies a clear after read.
     returned value: -8,388,608.0 to +8,388,607.0 ticks (roll over is possible) */

void set_bit_discrete_in( unsigned address, unsigned action );
  /* set up interrupt
     address: 0-39
     actions: both edges, lowTOhigh, highTOlow, disable( ) */
unsigned get_bit_discrete_in( unsigned address );
  /* address: 0-39
     returned value: low=0, high=1 */
unsigned get_byte_discrete_in( unsigned address );
  /* address: 0-4
     returned value: low=0, 1=high for each bit in the byte */
void set_byte_discrete_in( unsigned address, unsigned mask, unsigned action );
  /* address: 0-4
     action: both edges, lowTOhigh, highTOlow, disable
     mask: bits set are those to be processed. */
void set_bit_discrete_out( unsigned address, unsigned action, unsigned pulse_length );
  /* set up interrupt
     address: 0-43
     action: pulse(w/interrupt, pulse (w/o interrupt), oscillate(w/interrupt),
      oscillate(w/o interrupt),reset interrupt, set interrupt */
void put_bit_discrete_out( unsigned address, unsigned arguement );
  /* address: 0-39
     arguement: low=0, high=1 */
unsigned get_bit_discrete_out( unsigned address );
  /* address: 0-39
     returned value: low=0, high=1 */
```

```
void m_c_p__discretes( unsigned mask, unsigned action );
  /* bytes address 0, bits 0-4 only        Now controlled through MCP processor
     mask: bits set indicate bits of byte to be affected
     action: level of bits indicate new bit values. */
void put_byte_discrete_out( unsigned address, unsigned mask, unsigned action );
  /* address: 0-4          bits 0-4 not valid for this interface
     mask: bits set indicate bits of byte to be affected
     action: level of bits indicate new bit values. */
unsigned get_byte_discrete_out( unsigned address );
  /* address: 0-4
     returned value: low=0, 1=high for each bit in the byte */

unsigned wait__mail( unsigned wait_time );
  /* Receive mail interface with AMX */
void send__mail( unsigned mailbox, unsigned message );
  /* mailbox interface routine written in assembler */
void break_echain( );    /* cause a software break of the E chain; (requires hardware
modification to DIO board) */
void delay( unsigned clock_ticks );
void set_mask( unsigned i_o_device, unsigned i_o_point, unsigned task_mask, unsigned
interrupt_action );
void enable_communications( );
void disable_communications( );
void enable_interrupts( );
void disable_interrupts( );
void get_hcu( char *characters );
  /* transfer character i/o from terminal handler buffer(segment) to program buffer */
void read_hcu( );
  /* start a read sequence from the terminal handler then return to the program */
unsigned write_b( char specification, char *string__begn_addr );
/*      specification     Bit 0(LSB)    Detached write (start then return)
                          Bit 1       attached write (suspend until complete or timeout)
                          Bit 8         output prompt after attached write(only)
        string__begn_addr         bytes 1-n character string    */
void vsysbug( unsigned err_mesg, unsigned err_code_no );
   /* ********** EXTERNAL PROCEDURE DECLARATIONS *********** */
void autocom( );          /* communications control */
void oncom( );            /* communications control */
void offcom( );           /* communications control */
void transon( );             /* turn on the communications transmit clocks ( trouble
shooting ) */
void transoff( );           /* turn off the communications transmit clocks ( trouble
```

```
shooting ) */
/* this block used with v4mcpemu when not debugging debugging from VXmcpemu */
/* #define m_c_p__state_c  m_c_p__state */
/* this block used with v4mcpemu when not debugging debugging from VXmcpemu */
void m_c_p__init( double, double );
void m_c_p__state_c( mcp_state_type );
```

```
/*  V2LIFT  V2LIFT  V2LIFT  V2LIFT  V2LIFT  V2LIFT  V2LIFT  V2LIFT  V2LIFT  V2LIFT
V2LIFT  V2LIFT  V2LIFT  V2LIFT  V2LIFT  V2LIFT
************************************************************************************
**********************************************
**
                                        **
**                                    EEEEEEEEEEEEEEE      TTTTTTTTTTTTT
NNNNNNN      NNNNN                            **
**                                    EEEEEEEEEEEEEE       TTTTTTTTTTT
NNNNNNNN     NNNNN                            **
**                                    EEEEE            A       TTTT       OOO
NNNNNNNNN    NNNNN                            **
**                               EEEEEEEEEEEE     AAA      TTT     OOOOOOOO  NNNNN
NNNN   NNNNN                            **
**                               EEEEEEEEEEE      AAAAA    TTT     OOOOOOOO  NNNNN
NNNN  NNNNN                             **
**                               EEEEE                     TTTT      OOO     NNNNN
 NNNNNNNNN                              **
**                               EEEEEEEEE      AAAAAAA    TTTTT             NNNNN
  NNNNNNNN                              **
**                               EEEEEEEE      AAAAAAAAA   TTTTTTT           NNNNN
   NNNNNNN                              **
**
                                        **
**        This software (firmware) developed by EATON-KENWAY is proprietary.  Source
code on listings or any other media        **
**        is not for sale or loan and may not be copied or transferred to any vendor,
buyer, or consultant.  Executable          **
**          code is available in ROM and is sold with the original product or as a
product upgrade.  Buyer shall not          **
**         copy or distribute ROM's with E-K firmware to any third party without the
prior written approval of EATON-KENWAY.    **
**           Title to and ownership of the software shall at all times remain with
EATON-KENWAY.   The information  in this       **
**           is subject to change without notice  and should not be construed as a
commitment by EATON-KENWAY.                 **
** .
                                        **
**         EATON-KENWAY   assumes  no  responsibility  for  the  use or reliability
of  its  software on  equipment which      **
**          is  not supplied EATON-KENWAY or has been modified without EATON-KENWAY
approval.                                  **
```

```
**
                                                **
**          Copyright 1989
                 KENWAY, INCORPORATED     **
*****************************************************************************
*************************************************
   V2LIFT  V2LIFT  V2LIFT  V2LIFT  V2LIFT  V2LIFT  V2LIFT  V2LIFT  V2LIFT  V2LIFT
V2LIFT  V2LIFT  V2LIFT  V2LIFT  V2LIFT  V2LIFT
    DATE CREATED:  Feb 89
    AUTHOR:        Vehicle Group
    DESCRIPTION:                 LIFT TOP control unit
      xxx......           ....
    PROGRAM HISTORY:
    Date        Initials/No.       Description
    ---------   ------------       ----------------------------------------
* * * * * * * * * * * * * * * * * * * * * * * * * * * * * * * * * * * * * * * * * * *
* * * * * * * * * * * * * * * * * * * * * * */
#define  PLATFRM_JYSTK_THRSHOLD  14         /*  level at which analog value trips
discrete  */
#define  PLATFRM_JYSTK_OFST  PLATFRM_JYSTK_THRSHOLD -4    /*  adjustment for top
control  */
#define  AO__LIFT_DRV ( FND_CHN(AO__DIR_WR, A_OUT_CH__PORTS_DRV) )
void  calibrate_platform_controls(  )   /* called by CALIBRATION routine for top
calibration -- dummy for GL40/GL40S */
{ return;
}

int get_adjusted_analog( unsigned  analog_channel, int  analog_center_offset );
void platform_control_with_joystick( )
{ int  joystick_value;
  joystick_value=get_adjusted_analog(SPDHC_AI__SPEED_JOYSTICK,joystick_speed_center
);
  if( joystick_value > PLATFRM_JYSTK_THRSHOLD )
  { if( get_bit_discrete_in( ILSUP_DI__TOP_UP ) )
    { put_bit_discrete_out( ODACT_SELECT_DRIVE_TACH, IS__OFF );
      platform_setpoint = 0;
      action = STOP_PLATFORM;
      platform_action_text = EXTENDED_MESSAGE;
    }
    else
    { put_bit_discrete_out( ODACT_SELECT_DRIVE_TACH, IS__ON );
      platform_setpoint = joystick_value -PLATFRM_JYSTK_OFST;
```

```
      action = UP_COMMAND;
      platform_action_text= RAISE_MESSAGE;
    }
  }
  else if( joystick_value < -PLATFRM_JYSTK_THRSHOLD )
  { if( get_bit_discrete_in( ILSDWN_DI__TOP_DOWN ) )
    { put_bit_discrete_out( ODACT_SELECT_DRIVE_TACH, IS__OFF );
      platform_setpoint = 0;
      action = STOP_PLATFORM;
      platform_action_text = SECURE_MESSAGE;
    }
    else
    { put_bit_discrete_out( ODACT_SELECT_DRIVE_TACH, IS__ON );
      platform_setpoint = -joystick_value -PLATFRM_JYSTK_OFST;
      action = DOWN_COMMAND;
      platform_action_text = LOWER_MESSAGE;
    }
  }
  else
  { put_bit_discrete_out( ODACT_SELECT_DRIVE_TACH, IS__OFF );
    platform_setpoint = 0;
    action = STOP_PLATFORM;
  }
  command_vehicle_contactors( STOP_WHEELS, action );
  if( platform_setpoint > 0 )
  { platform_setpoint = platform_setpoint / 2;       /*  arbitrary scaling of joystick
value  */
    put_bit_discrete_out( OTBRK_N_DO__TOP_BRAKE, IS__ON );
  }
  else
  { put_bit_discrete_out( OTBRK_N_DO__TOP_BRAKE, IS__OFF );
    platform_setpoint = 0;
  }
  put_analog_out( AO__LIFT_DRV, platform_setpoint );
} /* platform_control_with_joystick */

void basic_update( )
{ if( contactor_updat_msg_flg == SELECT_CONTACTOR_AFTER_STOP )
    write_b( WR__DETACHED_CMND, MOVE_CURS  COLM_12  LINE_6  "-STOP-  Before selection"
LOCK_CURSOR );
  else
  { sprintf( output_string, MOVE_CURS  COLM_12  LINE_6  "%s"  HOME_CURSOR  "%7.7s %4.4s
```

```
%7.7s"  LOCK_CURSOR,
      platform_action_text, hcu_mode_text,
      tracking_command == FREQ_1 ? "<F1>" : tracking_command == FREQ_2 ? "<F2>" :
">f?<", vehicle_action_text );
    write_b( WR__DETACHED_CMND, output_string );
  }
} /* basic_update */

void  get_platform_status( )
{   if(   get_bit_discrete_in(    ILSUP_DI__TOP_UP    )    )    platform_action_text    =
EXTENDED_MESSAGE;
  else  if(  get_bit_discrete_in(  ILSDWN_DI__TOP_DOWN  )  )  platform_action_text  =
SECURE_MESSAGE;
  else platform_action_text = MIDDLE_MESSAGE;
}  /* get_platform_status */

void platform_control( )
{ contactor_updat_msg_flg = NORMAL_UPDATE;
  delay( 100 MS__TIMEOUT );
  put_bit_discrete_out( OGUIDM_SELECT_COMP_GUIDANCE, IS__ON );
  action = STOP_PLATFORM;
  command_vehicle_contactors( STOP_WHEELS, action );
  for( ; ; wait__mail_hcu( 100 MS__TIMEOUT ) )    /*  wait HCU selection, veh mess  */
  { switch( mail_hcu )
    { case NO_MAIL__TIMEOUT   :
        break;
      case PREV_DISPLAY :
      case EXIT_PROCEDURE :
        delay( 100 MS__TIMEOUT );        /* allow vactt to terminate action */
        put_bit_discrete_out( OGUIDM_SELECT_COMP_GUIDANCE, IS__OFF );
        delay( 100 MS__TIMEOUT );        /* allow vactt to terminate action */
        return;
      case STATUS   :
        request_status_display( );  /* fall through */
      default :
        man_cntrl_tsk = PLATFORM_CNTRL;
        write_b( WR__DETACHED_CMND, FORMFEED
          ESC  "1MAS-TER "  MASTER_MENU_T  "\r"
          ESC  "2PREVsel." PREV_DISPLAY_T  "\r"
          ESC  "3sta-tus " STATUS_T  "\r"
          MOVE_CURS COLM_1 LINE_4  "L I F T   T O P" MOVE_CURS COLM_1 LINE_5 "C O N T
 R O L" LOCK_CURSOR );
```

```
        get_platform_status( );
    } /* switch */
  basic_update( );         /*  display basic control state( MANUAL, ACQUISITION, etc.
)  */
  }
}
```

```
/* V4liftt  V4liftt  V4liftt  V4liftt  V4liftt  V4liftt  V4liftt  V4liftt  V4liftt
V4liftt  V4liftt  V4liftt  V4liftt  V4liftt
*****************************************************************************************
**********************************************
**                                                      **
                                           EEEEEEEEEEEEEEE       TTTTTTTTTTTTT
**
NNNNNNN      NNNNN                                          **
**                                         EEEEEEEEEEEEEE        TTTTTTTTTTT
NNNNNNNN     NNNNN                                          **
**                                         EEEEE             A        TTTT        OOO
NNNNNNNNN    NNNNN                                          **
**                                     EEEEEEEEEEEE     AAA      TTT     OOOOOOOO   NNNNN
NNNN   NNNNN                                          **
**                                     EEEEEEEEEEE     AAAAA     TTT     OOOOOOOO   NNNNN
NNNN NNNNN                                          **
**                                     EEEEE                     TTTT      OOO      NNNNN
 NNNNNNNNN                                          **
**                                     EEEEEEEEE      AAAAAAA    TTTTT              NNNNN
  NNNNNNNN                                          **
**                                     EEEEEEEE      AAAAAAAAA   TTTTTTT            NNNNN
   NNNNNNN                                          **
**
                                                    **
**        This software (firmware) developed by EATON-KENWAY is proprietary.  Source
code on listings or any other media        **
**        is not for sale or loan and may not be copied or transferred to any vendor,
buyer, or consultant.  Executable        **
**          code is available in ROM and is sold with the original product or as a
product upgrade.  Buyer shall not          **
**         copy or distribute ROM's with E-K firmware to any third party without the
prior written approval of EATON-KENWAY.   **
**          Title to and ownership of the software shall at all times remain with
EATON-KENWAY.    The information  in this      **
**          is subject to change without notice  and should not be construed as a
commitment by EATON-KENWAY.                     **
**
                                                    **
**        EATON-KENWAY   assumes  no  responsibility  for  the  use or reliability
of  its  software on  equipment which      **
**         is  not supplied EATON-KENWAY or has been modified without EATON-KENWAY
approval.                                          **
```

```
**
                                              **
**          Copyright 1989
                 KENWAY, INCORPORATED      **
***********************************************************************************
**********************************************
   V4liftt  V4liftt  V4liftt  V4liftt  V4liftt  V4liftt  V4liftt  V4liftt  V4liftt
V4liftt  V4liftt  V4liftt  V4liftt  V4liftt
    DATE CREATED:  Oct 90
    AUTHOR:        Vehicle Group
    DESCRIPTION:
          processes commands for the liftop vehicle (lift or lower top).  Commands
received through a mailbox.
    PROGRAM HISTORY:
    Date        Initials/No.       Description
    ---------   ------------       ----------------------------------------
* * * * * * * * * * * * * * * * * * * * * * * * * * * * * * * * * * * * * * * * * *
* * * * * * * * * * * * * * * * * * * * * * */
#include <stdlib.h>
#include <stdio.h>
#include <string.h>
#include <math.h>
#include "V4MESGS.K"          /* definition of vehicle messages */
#include "V4HCOMMN.K"
#include "V4VARS.K"          /*  definition of common variables for two or more tasks
*/
#include "V4MOTION.K"
#include "V4INIT_D.K"
void vsysbug(  unsigned cmd_id, unsigned cmd_error_no );
void lights_sound__chng( unsigned light_duration, unsigned speaker_duration, unsigned
speaker_freq, light_cmd_type light_cmd );
void e_stop_enunciator( unsigned action );
void kalman_xy( );         /* motion KALMAN filter routines run in this task */
void kalman_azimuth( );

#define  TEST__NON_FATAL 0
#define  TEST__FATAL 1
#define  ITUP_DI_BYT1_BITMSK    BIT_4
#define  ITDWN_DI_BYT1_BITMSK   BIT_5
#define  IENBL_DI_BYT1_BITMSK   BIT_1
#define  ITUP_DI_BIT     12
#define  ITDWN_DI_BIT    13
```

```
const motion__io_def_type FRONT_IS_FORWARD_IO_C = { ENCD__PORTS_WHL_ADR,
ENCD__STARB_WHL_ADR,
  A_OUT_CH__PORTS_DRV, A_OUT_CH__STARB_DRV, VIN_LEFT_ANTENNA_G, VIN_RIGHT_ANTENNA_G,
0, MOVEMENT_V, ACT_NOP_V };
  const motion__io_def_type REAR_IS_FORWARD_IO_C = { ENCD__STARB_WHL_ADR,
ENCD__PORTS_WHL_ADR,
  A_OUT_CH__STARB_DRV, A_OUT_CH__PORTS_DRV, VIN_RIGHT_ANTENNA_G, VIN_LEFT_ANTENNA_G,
0, MOVEMENT_V, ACT_NOP_V };
  /* Turns */
  const motion__io_def_type LEFT_FRONT_C = { ENCD__PORTS_WHL_ADR, ENCD__STARB_WHL_ADR,
  A_OUT_CH__PORTS_DRV, A_OUT_CH__STARB_DRV, VIN_LEFT_ANTENNA_G, VIN_RIGHT_ANTENNA_G,
0, PORTSIDE_V, TURN_RIGHT_FRONT_V };
  const motion__io_def_type RIGHT_REAR_C = { ENCD__PORTS_WHL_ADR, ENCD__STARB_WHL_ADR,
  A_OUT_CH__PORTS_DRV, A_OUT_CH__STARB_DRV, VIN_LEFT_ANTENNA_G, VIN_RIGHT_ANTENNA_G,
0, PORTSIDE_V, TURN_LEFT_REAR_V };
  const motion__io_def_type LEFT_REAR_C = { ENCD__STARB_WHL_ADR, ENCD__PORTS_WHL_ADR,
  A_OUT_CH__STARB_DRV, A_OUT_CH__PORTS_DRV, VIN_RIGHT_ANTENNA_G, VIN_LEFT_ANTENNA_G,
0, STARBOARD_V, TURN_RIGHT_REAR_V };
  const motion__io_def_type RIGHT_FRONT_C = { ENCD__STARB_WHL_ADR,
ENCD__PORTS_WHL_ADR,
  A_OUT_CH__STARB_DRV, A_OUT_CH__PORTS_DRV, VIN_RIGHT_ANTENNA_G, VIN_LEFT_ANTENNA_G,
0, STARBOARD_V, TURN_LEFT_FRONT_V };
  /* Rotates */
  const motion__io_def_type ROT_IO__RIGHT_FRONT_C = {ENCD__STARB_WHL_ADR,
ENCD__PORTS_WHL_ADR, A_OUT_CH__STARB_DRV,
  A_OUT_CH__PORTS_DRV, VIN_RIGHT_ANTENNA_G, VIN_LEFT_ANTENNA_G, ROTATE_RIGHT_COMMAND_G,
MOVEMENT_V, ACT_NOP_V };
  const motion__io_def_type ROT_IO__RIGHT_REAR_C = {ENCD__STARB_WHL_ADR,
ENCD__PORTS_WHL_ADR, A_OUT_CH__STARB_DRV,
  A_OUT_CH__PORTS_DRV, VIN_LEFT_ANTENNA_G, VIN_RIGHT_ANTENNA_G, ROTATE_RIGHT_COMMAND_G,
MOVEMENT_V, ACT_NOP_V };
  const motion__io_def_type ROT_IO__LEFT_FRONT_C = { ENCD__PORTS_WHL_ADR,
ENCD__STARB_WHL_ADR, A_OUT_CH__PORTS_DRV,
  A_OUT_CH__STARB_DRV, VIN_LEFT_ANTENNA_G, VIN_RIGHT_ANTENNA_G, ROTATE_LEFT_COMMAND_G,
MOVEMENT_V, ACT_NOP_V };
  const motion__io_def_type ROT_IO__LEFT_REAR_C = {ENCD__PORTS_WHL_ADR,
ENCD__STARB_WHL_ADR, A_OUT_CH__PORTS_DRV,
  A_OUT_CH__STARB_DRV, VIN_RIGHT_ANTENNA_G, VIN_LEFT_ANTENNA_G, ROTATE_LEFT_COMMAND_G,
MOVEMENT_V, ACT_NOP_V };
#else
      /* move to event */
  extern const motion__io_def_type FRONT_IS_FORWARD_IO_C;
```

```
  extern const motion__io_def_type  REAR_IS_FORWARD_IO_C;
      /*  Turns  */
  extern const motion__io_def_type  LEFT_FRONT_C;
  extern const motion__io_def_type  RIGHT_REAR_C;
  extern const motion__io_def_type  LEFT_REAR_C;
  extern const motion__io_def_type  RIGHT_FRONT_C;
      /*  Rotates  */
  extern const motion__io_def_type  ROT_IO__RIGHT_FRONT_C;
  extern const motion__io_def_type  ROT_IO__RIGHT_REAR_C;
  extern const motion__io_def_type  ROT_IO__LEFT_FRONT_C;
  extern const motion__io_def_type  ROT_IO__LEFT_REAR_C;
#endif
```

```
      case RUN__KALMAN_XY :
        kalman_xy( );
        continue;

      default :
        return mail;
    }
  }
} /* wait__s_tsk_mail */

void move__top( )
{ unsigned status;
  unsigned long error_time;
  top__command = (unsigned)top_cq_pt->cmdx.gcl_sub_cmd.top_eset +1;  /* (+1)translate
0,1 to bit_0, bit_1 (0x01,0x02) */
  if( top__command > DOWN_COMMAND ) vsysbug( top__command, ERR__ILLEGAL_COMMAND );
  if( sub_system_process_flags & SUB_SYS_PRECOMPLETION_MASK ) /* *** pre-completetion,
force final conditions *** */
  { if( top__command == DOWN_COMMAND )
    { veh_status.ss.gcl_m.gcl_f = 0;
      veh_status.status_set &= (~LOAD_PRESENT_V);
    }
    else
    { veh_status.ss.gcl_m.gcl_f = GCL_UP;
      veh_status.status_set |= LOAD_PRESENT_V;
    }
    set_veh_status( NO__ERROR );
  }
  else veh_status.wait = sub_sys_platform_wait;
  cntrl__top( top__command );    /* command platform */
  status__action_cmplt  =  (  top__command  ==  UP_COMMAND  )  ?  ITUP_DI_BYT1_BITMSK  :
ITDWN_DI_BYT1_BITMSK;
  error_time  =  user_time  +(unsigned  long)(  (sub_sys_platform_wait  *  20)  +(7
SEC__TIMEOUT) );
        /***** wait til defined limit switch makes contact or time out *****/
  for( ; ( (status = defn__lift_status( TEST__NON_FATAL )) & status__action_cmplt ) ==
0; wait__s_tsk_mail( 100 MS__TIMEOUT) )
  { if( user_time > error_time ) vsysbug( 0, ERR__TOP_MOTION_TIMEOUT );    /* top
timeout error */
    if( status & IENBL_DI_BYT1_BITMSK ) continue;     /* E-chain intact */
    else    /* E-chain broken */
    { cntrl__top( STOP_PLATFORM );      /* stop platform motion */
```

```
      e_stop_enunciator( IS__ON );
                        /* wait FOREVER or E-chain reset, or program restart */
      for( ; ( (status = defn__lift_status( TEST__NON_FATAL )) & IENBL_DI_BYT1_BITMSK
) == 0; wait__s_tsk_mail( 500 MS__TIMEOUT) );
      e_stop_enunciator( IS__OFF );
      cntrl__top( top__command );    /* restart platform */
    }
  } /* for */

  cntrl__top( STOP_PLATFORM );
  set_veh_status( NO__ERROR );
  top__command = UNDF_TOP_CMND;
  cq_indx.nxt_exec++;
  send__mail( vcmdmt, MAIL__SUBSYS );
}  /* move__top */

void lift_main( )
{ unsigned status;
  unsigned top__mail;
  initialize_subsys( );
               /*  **************  wake-up loop ******************* */
  for( top__mail = 0;
      (top__mail != COMMAND_PROCESSOR_MASTER) && (top__mail != AUTOMATIC_RESTART);
       top__mail = wait__s_tsk_mail( TIMEOUT__FOREVER )
     ) status = defn__lift_status( TEST__NON_FATAL );
  set_mask( DISCRETE_IN, ITDWN_DI_BIT, TOPS__BOTH_EDGE_MSK, TOPS__BOTH_EDGE_MSK );
  set_mask( DISCRETE_IN, ITUP_DI_BIT, TOPS__BOTH_EDGE_MSK, TOPS__BOTH_EDGE_MSK );
  set_mask(    DISCRETE_IN,    HARDWARE_POWER_ENABLED_POINT,    TOPS__BOTH_EDGE_MSK,
TOPS__BOTH_EDGE_MSK );
               /* **************** Automatic loop ********************** */
  for ( ;   /* forever loop */   ; top__mail = wait__s_tsk_mail( 2 SEC__TIMEOUT ) )
  { if( (top__mail > CMDT_2_SUBS_BAS) && (top__mail <= (CMDT_2_SUBS_BAS +10)) ) /*from
CMDT, not INIT, (10 cmnds max future)*/
    { cq_indx.curr = mail_cmdt;
      top_cq_pt = &command_queue[ CQ_WRAP( cq_indx.curr ) ];
      mail_cmdt = 0;        /* enable command processor */
      if( top_cq_pt->cmd_typ != V_SUB_SYS_CMD ) vsysbug( (unsigned)top_cq_pt->cmd_typ,
ERR__NOT_SUBSYS_CMND );    /* Not subsystem command */
      else move__top( );
    }
    else status = defn__lift_status( TEST__FATAL );   /* monitor lift status */
  }
```

```
}  /* lift_main */
```

```
/* V4MESGS        V4MESGS        V4MESGS        V4MESGS        V4MESGS        V4MESGS
V4MESGS        V4MESGS        V4MESGS        V4MESGS
*******************************************************************************************
*************************************************
**
                                          **
**                                        EEEEEEEEEEEEEE        TTTTTTTTTTTTT
NNNNNNN      NNNNN                               **
**                                        EEEEEEEEEEEEE         TTTTTTTTTTT
NNNNNNNN     NNNNN                               **
**                                        EEEEE                 A          TTTT        OOO
NNNNNNNNN    NNNNN                               **
**                                   EEEEEEEEEEEE       AAA       TTT      OOOOOOOO   NNNNN
NNNN  NNNNN                                 **
**                                   EEEEEEEEEEE       AAAAA      TTT      OOOOOOOO   NNNNN
NNNN NNNNN                                  **
**                                   EEEEE                        TTTT       OOO      NNNNN
 NNNNNNNNN                                  **
**                                   EEEEEEEEE        AAAAAAA     TTTTT               NNNNN
  NNNNNNNN                                  **
**                                   EEEEEEEE        AAAAAAAAA    TTTTTTT             NNNNN
   NNNNNNN                                  **
**
                                          **
**        This software (firmware) developed by EATON-KENWAY is proprietary.  Source
code on listings or any other media        **
**        is not for sale or loan and may not be copied or transferred to any vendor,
buyer, or consultant.  Executable        **
**          code is available in ROM and is sold with the original product or as a
product upgrade.  Buyer shall not          **
**         copy or distribute ROM's with E-K firmware to any third party without the
prior written approval of EATON-KENWAY.    **
**           Title to and ownership of the software shall at all times remain with
EATON-KENWAY.    The information  in this        **
**           is subject to change without notice  and should not be construed as a
commitment by EATON-KENWAY.                   **
**
                                          **
**        EATON-KENWAY   assumes  no  responsibility  for  the  use or reliability
of  its  software on  equipment which      **
**         is  not supplied EATON-KENWAY or has been modified without EATON-KENWAY
approval.                                    **
```

```
**
                                                          **
**          Copyright 1989
                 KENWAY, INCORPORATED      **
************************************************************************************
**********************************************
   V4MESGS       V4MESGS       V4MESGS       V4MESGS       V4MESGS       V4MESGS
V4MESGS      V4MESGS      V4MESGS      V4MESGS
    DATE CREATED:  Feb 89
    AUTHOR:        Vehicle Group
    DESCRIPTION:
      xxx......           ....
    PROGRAM HISTORY:
    Date          Initials/No.        Description
    ---------     ------------        ----------------------------------------
* * * * * * * * * * * * * * * * * * * * * * * * * * * * * * * * * * * * * * * * * *
* * * * * * * * * * * * * * * * * * * * * * */
  /*  VTC to vehicle message definitions */
#define  REQUEST_STATUS_LENGTH              2    /* request status command length*/
#define  INITIALIZE_VEHICLE_LENGTH          6    /* initialize command length*/
#define  MOVE_TO_MAGNET_LENGTH              9    /* move to magmet command length*/
#define  MOVE_TO_VIRTUAL_LENGTH             7    /* move to virtual command length    */
#define  MOVE_TO_INTERSECTION_LENGTH        9    /* move to intersec command length   */
#define  S_MOV_MAGNET_LENGTH               10    /* s-move to magmet command length   */
#define  S_MOV_VIRTUAL_LENGTH               8    /* s-move to virtual command length */
#define  S_MOV_INTERSECTION_LENGTH         10    /* s-move to inter command length    */
#define  TURN_LENGTH                        5    /* turn command length  */
#define  MAGNET_UTURN_LENGTH               10    /* Magnet U-turn command length */
#define  VIRTUAL_UTURN_LENGTH               8    /* Virtual U-turn command length*/
#define  INTERSECTION_UTURN_LENGTH         10    /* Inter. U-turn command length */
#define  ROTATE_LENGTH                      4    /* rotate command length*/
#define  SET_VEHICLE_SPEED_LENGTH           3    /* vehicle speed command length */
#define  SET_VEHICLE_TO_SLEEP_LENGTH        2    /* vehicle sleep command length */
#define  GCL_SUBCON_COMMAND_LENGTH          6    /* gcl subsystem command length */
#define  GCL_SUBSYSTEM_COMMAND_LENGTH       3    /* gcl subsystem command length */
#define  GCS_SUBSYSTEM_COMMAND_LENGTH       3    /* gcs subsystem command length */
#define  GCN_SUBSYSTEM_COMMAND_LENGTH       5    /* gcn subsystem command length */
#define  GCR_SUBSYSTEM_COMMAND_LENGTH       3    /* gcr subsystem command length */
#define  GCF_SUBSYSTEM_COMMAND_LENGTH       4    /* gcf subsystem command length */
#define  POLL_VEHICLE_LENGTH                1    /* poll vehicle command length  */
#define  AGVC_STAT_ERR_CODE_LENGTH          2    /* length, AGVC err msg to veh */
#define  LENG__SET_LOAD_ID                 18    /* length, load id message*/
```

```
#define  LENG__REQ_LOAD_ID              2    /* length, request load id msg*/
#define  LENG__OPT_CONTROL              4    /* length, optional control   */
#define  LENG__X_Y_H__MOV              13    /* length, x,y move command */
#define  LENG__X_Y_H__SET              13    /* length, set x,y,h command */
#define  LENG__X_Y__MARKER             11    /* length, x,y marker command */
#define  LENG__INSRT_SUFFIX            14    /* Length mag1, mag2 x,y's appended to
insert command */
#define  LENG__MRKR_SUFFIX             8    /* Length mag1 appended to move with mag
command */
#define  LENG__XY_COORD_FLDS            6    /* Length(total) of x,y (3byte) fields
*/
#define  LENG__X_Y_H__INSRT           (LENG__X_Y_H__MOV + LENG__INSRT_SUFFIX)  /*
length, x,y,h insert command (27)*/
#define  LENG__X_Y_H__MOV_MRKR         (LENG__X_Y_H__MOV + LENG__MRKR_SUFFIX)  /*
length, x,y,h mkrk command (19)*/
    /* Command ID's */
#define  REQUEST_STATUS_V             0
#define  INITIALIZE_VEHICLE_V         1
#define  MOVE_TO_MAGNET_V             2
#define  MOVE_TO_VIRTUAL_V            3
#define  MOVE_TO_INTERSECTION_V       4
#define  TURN_V                       5
#define  ROTATE_V                     6
#define  SET_VEHICLE_SPEED_V          7
#define  GCL_SUBSYSTEM_COMMAND_V      8
#define  GCS_SUBSYSTEM_COMMAND_V      9
#define  GCN_SUBSYSTEM_COMMAND_V     10
#define  GCR_SUBSYSTEM_COMMAND_V     11
#define  GCF_SUBSYSTEM_COMMAND_V     12
#define  POLL_VEHICLE_V              13
#define  VEHICLE_LONG_STATUS_V       14
#define  VEHICLE_SHORT_STATUS_V      15
#define  MAGNET_UTURN_V              16
#define  VIRTUAL_UTURN_V             17
#define  INTERSECTION_UTURN_V        18
#define  MAGNET_STURN_V              19
#define  VIRTUAL_STURN_V             20
#define  INTERSECTION_STURN_V        21
#define  AGVC_STATUS_ERR_CODE_V      22
#define  SLEEP_CMD_V                 23
#define  OPTIONAL_CONTROL_V          24
#define  SET_LOAD_ID_V               25
```

```
#define  REQUEST_VEHICLE_LOAD_ID_V   26
#define  VEHICLE_LOAD_ID_V           27
#define  GCL_SUBCON_COMMAND_V        28
#define  GCS_SUBCON_COMMAND_V        29
#define  GCN_SUBCON_COMMAND_V        30
#define  NAK_V                       31    /* reserved CIA unit not vehicle */
#define  AGVC__DCIA_MSG_V            32    /* reserved AGVC to DCIA (not vehicle) */
#define  DCIA__AGVC_MSG_V            33    /* reserved DCIA to AGVC (not vehicle) */
#define  X_Y_H__MOV                  34    /* Eagle - AGVC move command */
#define  X_Y_H__SET                  35    /* initialize vehicle position */
#define  X_Y__MARKER                 36    /* EAGLE - AGVC update marker command */
#define  X_Y_H__INSRT                37    /* insert vehicle position */
#define  X_Y_H__MOV_MRKR             38    /* combined x_y_h_mov and x_y_mrkr */
#define  END_OF_COMMANDS             39    /* This message must be last !!! */
  /*  End of message Definitions */

#define  OFFSET__ID_SEQ  2    /* id-1, seq=1 */
#define  OFFSET__ZN_PTH  3    /* zone-2, path=1 */
#define  RETRY     /* message_eset */
#define  NO_RETRY    /* message_eset */
typedef enum { GCL_M, GCS_M, GCN_M, GCR_M, GCF_M }  model_type;
typedef  struct
{ unsigned  total_msgs;                  /* [0] */
  unsigned char  total_errors;           /* [2] */
  unsigned char  last_error_kind;        /* [3] */
  unsigned char  retries;                /* [4] */
} veh_comm_status_type;
typedef  struct
{ unsigned char  cmd_id;              /* [0] */
  unsigned char  sequence_no;         /* [1] */
} base_type,
  request_status_type;
typedef  struct
{ unsigned char  cmd_id;              /* [0] */
  unsigned char  sequence_no;         /* [1] */
  unsigned  at_zone;                  /* [2] */
  unsigned  from_zone;                /* [4] */
} initialize_vehicle_type;
typedef struct
{ unsigned char  cmd_id;          /* [0] */
  unsigned char  sequence_no;     /* [1] */
  unsigned marker_id;             /* [2] */
```

```
  unsigned char path;           /* [4]   0 = mag, 0x20(bit 5) = wireX */
  unsigned char x_f[3];         /* [5]   3 byte extended integer; X coord in factory
frame, 1/20", (Range: +/- 419430", [6.6mi]) */
  unsigned char y_f[3];         /* [8]   3 byte extended integer; Y coord in factory
frame, 1/20", (Range: +/- 419430", [6.6mi]) */
} xy_mark_type;
typedef struct
{ unsigned char  cmd_id;        /* [0] */
  unsigned char  sequence_no;   /* [1] */
  unsigned  zone;               /* [2] */
  unsigned char  path;          /* [4]   Bits 0 & 1:   00 - dead reckon ( not used in
turn/rotate commands )
                                                01 - follow ( acquire in turn/rotate

commands ) f1
                                                10 - follow ( acquire in turn/rotate

commands ) f2
                                                11 - follow ( use internal generator
                                          Bit 2 - Forward_is_<f>ront(1)/<r>ear(0)
                                          Bit 3 - X,Y defined from <c>enter(1), else <

>veh end(0 default)
                                          Bit 4 - Forced <s>ingle(1) Linear Move else

optimize(0 default)
                                          Bit   5   -   marker   type(reserved   for

xyh_mov_mag_type)<m>agmet(0 default), <w>ire(1)
                                          Bit 6 - future
                                          Bit 7 - <m>anditory(1) STOP at end of zone
                                */
  unsigned char x_f[3];         /* [5]   3 byte extended integer; X coord in factory
frame, 1/20", (Range: +/- 419430", [6.6mi]) */
  unsigned char y_f[3];         /* [8]   3 byte extended integer; Y coord in factory
frame, 1/20", (Range: +/- 419430", [6.6mi]) */
  unsigned heading;             /* [11]  word (fixed point, 1/100", range 0 - 359.99
deg) */
} xyh_mov_type;

typedef struct                  /* This is an extension into the next record for insert
*/
{ unsigned char  cmd_id;        /* [0]  not from AGVC, added by VEH */
  unsigned char  sequence_no;   /* [1]  Set to Zero */
  unsigned prv_zone;            /* [2, 13]   word */
  unsigned char m1_x[3];          /* [4, 15]   3 byte extended integer; X coord in
factory frame, 1/20", (Range: +/- 419430", [6.6mi]) */
```

```
  unsigned char m1_y[3];           /* [7, 18]   3 byte extended integer; Y coord in
factory frame, 1/20", (Range: +/- 419430", [6.6mi]) */
  unsigned char m2_x[3];           /* [10,21]   3 byte extended integer; X coord in
factory frame, 1/20", (Range: +/- 419430", [6.6mi]) */
  unsigned char m2_y[3];           /* [13,24]   3 byte extended integer; Y coord in
factory frame, 1/20", (Range: +/- 419430", [6.6mi]) */
} xyh_insrt_type;
/* ******************* Description of Insert type from AGVC *****************  */
/* Instruction is broken into two commands/records in the command_queues        */
    typedef struct                                                               */
    { unsigned char  cmd_id;         /*  [0]                                     */
      unsigned char  sequence_no;    /*  [1]                                     */
      unsigned  zone;                /*  [2]                                     */
      unsigned char  path;           /*  [4]    See xyh_mov_type                 */
      unsigned char x_f[3];          /*  [5]    See   "                          */
      unsigned char y_f[3];          /*  [8]    See   "                          */
      unsigned heading;              /* [11]    See   "                          */
/* --------- the following fields converted to a X_Y__INSERT command and put    */
/*                  before the actual move command                               */
      unsigned prv_zone;             /* [13]    See xyh_insrt_type               */
      unsigned char m1_x[3];         /* [15]          "                          */
      unsigned char m1_y[3];         /* [18]          "                          */
      unsigned char m2_x[3];         /* [21]          "                          */
      unsigned char m2_y[3];         /* [24]          "                          */
    } agvc_xyh_insrt_type;                                                       */
/* ************************************************************************** */
/* ******************* Description of MOVE with MAGS type from AGVC *********  */
/* Instruction is broken into two commands/records in the command_ques          */
    typedef struct                                                               */
    { unsigned char  cmd_id;         /*  [0]                                     */
      unsigned char  sequence_no;    /*  [1]                                     */
      unsigned  zone;                /*  [2]                                     */
      unsigned char  path;           /*  [4]    See xyh_mov_type                 */
      unsigned char x_f[3];          /*  [5]    See   "                          */
      unsigned char y_f[3];          /*  [8]    See   "                          */
      unsigned heading;              /* [11]    See   "                          */
/* --------- the following fields converted to a X_Y__MARKER command and put    */
/*                  before the actual move command                               */
      unsigned mrkr_id;              /* [13]    See xyh_mark_type                */
      unsigned char m1_x[3];         /* [15]          "                          */
      unsigned char m1_y[3];         /* [18]          "                          */
    } agvc_xyh_mrk_type;
```

```
/* ************************************************************************** */

typedef  struct
{ unsigned char  cmd_id;          /* [0] */
  unsigned char  sequence_no;     /* [1] */
  unsigned  zone;                 /* [2] */
  unsigned char  path;            /* [4]   Bits 0 & 1:   00 - dead reckon ( not used in
turn/rotate commands )
                                                  01 - follow ( acquire in turn/rotate
commands ) f1
                                                  10 - follow ( acquire in turn/rotate
commands ) f2
                                                  11 - illegal
                                           Bit 2 - forward_is_front
                                           Bit 3     turn(rotate) right/else left (
turn/rotate type commands only)
                                           Bit 4 - calibration ( move intersection or
magnet commands only ) */
  unsigned  distance;             /* [5]  coarse distance (65ft max) */
  unsigned  fine;                 /* [7]  fine distance (65ft max) when used (magnet &
intersection events) */
  unsigned char  radius;          /* [9]  when used (s-turn, u-turn) */
} bas_mv_type;             /* used as base for all vehicle movement types ( including
u-turn, s-turn) */
typedef  struct
{ unsigned char  cmd_id;          /* [0] */
  unsigned char  sequence_no;     /* [1] */
  unsigned  zone;                 /* [2] */
  unsigned char  path;            /* [4]   Bits 0 & 1:   00 - dead reckon
                                                  01 - follow f1
                                                  10 - follow f2
                                                  11 - illegal
                                           Bit 2 - forward_is_front
                                           Bit 4 - calibration */
  unsigned  distance;             /* [5]  coarse distance (65ft max) */
  unsigned  fine;                 /* [7]  fine distance (65ft max) */
} move_to_intersection_type;        /* use as move_event_type for all common useage */
typedef  struct
{ unsigned char  cmd_id;                 /* [0] */
  unsigned char  sequence_no;            /* [1] */
  unsigned  zone;                 /* [2] */
  unsigned char  path;            /* [4]   Bits 0 & 1:   00 - dead reckon
```

```
                                   01 - follow f1
                                   10 - follow f2
                                   11 - illegal
                                 Bit 2 - forward_is_front
                                 Bit 4 - calibration */
  unsigned  distance;          /* [5]  coarse distance (65ft max) */
  unsigned  fine;              /* [7]  fine distance (65ft max) */
} move_to_magnet_type;

typedef  struct
{ unsigned char  cmd_id;       /* [0] */
  unsigned char  sequence_no;  /* [1] */
  unsigned  zone;              /* [2] */
  unsigned char  path;         /* [4]   Bits 0 & 1:    00 - dead reckon
                                              01 - follow f1
                                              10 - follow f2
                                              11 - illegal
                                        Bit 2 - forward_is_front     */
  unsigned  distance;          /* [5]  coarse distance (65ft max) */
} move_to_virtual_type;
typedef  struct
{ unsigned char  cmd_id;       /* [0] */
  unsigned char  sequence_no;  /* [1] */
  unsigned char  angle;        /* [2]     0..180 whole degrees */
  unsigned char  radius;       /* [3] */
  unsigned char  path;         /* [4]     Bit 0    -terminate on f1
                                          Bit 1    -terminate on f2
                                          Bit 2    -forward_is_front
                                          Bit 3    -turn right/else left     */

} turn_type;
typedef  struct
{ unsigned char  cmd_id;       /* [0] */
  unsigned char  sequence_no;  /* [1] */
  unsigned char  angle;        /* [2]     0..180 whole degrees */
  unsigned char  xpath;        /* [3]   Bit 0  -terminate on f1 ( force into "path"
 in command processor 4/17/89 )
                                          Bit 1  -terminate on f2
                                          Bit 2    -forward_is_front
                                          Bit 3    -rotate right      */
  unsigned char  path;         /* [3]     Bit 0    -terminate on f1
                                          Bit 1    -terminate on f2
                                          Bit 2    -forward_is_front
```

```
                                        Bit 3    -rotate right      */
} rotate_type;
typedef  struct
{ unsigned char  cmd_id;           /* [0] */
  unsigned char  sequence_no;      /* [1] */
  unsigned char  speed;             /* vehicle speed, LSB=2 ft/min, Minimum=0 ft/min,
Maximum=510 ft/min */
} set_vehicle_speed_type;

typedef  struct
{ unsigned char  cmd_id;           /* [0] */
  unsigned char  sequence_no;      /* [1] */
  unsigned  zone;                  /* [2] */
  unsigned char  path;             /* [4]    Bit 0 - terminate with f1
                                             Bit 1 - terminate with f2
                                             Bit 2 - forward_is_front
                                             Bit 3 - U-turn right  */
  unsigned  distance;              /* [5]  coarse distance (65ft max) */
  unsigned  fine;                  /* [7]  fine distance (65ft max) */
  unsigned char  radius;           /* [9] */
} intersection_uturn_type;      /* use as S-turn_event_type for all common useage */

typedef  struct
{ unsigned char  cmd_id;           /* [0] */
  unsigned char  sequence_no;      /* [1] */
  unsigned  zone;                  /* [2] */
  unsigned char  path;             /* [4]    Bit 0 - terminate with f1
                                             Bit 1 - terminate with f2
                                             Bit 2 - forward_is_front
                                             Bit 3 - U-turn right  */
  unsigned  distance;              /* [5]  coarse distance (65ft max) */
  unsigned  fine;                  /* [7]  fine distance (65ft max) */
  unsigned char  radius;           /* [9] */
} magnet_uturn_type;
typedef  struct
{ unsigned char  cmd_id;           /* [0] */
  unsigned char  sequence_no;      /* [1] */
  unsigned  zone;                  /* [2] */
  unsigned char  path;             /* [4]    Bit 0 - terminate with f1
                                             Bit 1 - terminate with f2
                                             Bit 2 - forward_is_front
                                             Bit 3 - U-turn right  */
```

```
  unsigned  distance;             /* [5]  coarse distance (65ft max) */
  unsigned char  xradius;        /* [7] AGVC field, command processor moves to radius
field, forces dummy_fine_field = 0 */
  unsigned char  xdummy;          /* [8]  not used ( part of dummy fine field )*/
  unsigned char  radius;          /* [9] */
} virtual_uturn_type;
typedef  struct
{ unsigned char  cmd_id;          /* [0] */
  unsigned char  sequence_no;     /* [1] */
  unsigned  zone;                 /* [2] */
  unsigned char  path;            /* [4]    Bit 0 - terminate with f1
                                            Bit 1 - terminate with f2
                                            Bit 2 - forward_is_front
                                            Bit 3 - S-turn right  */
  unsigned  distance;             /* [5]  coarse distance (65ft max) */
  unsigned  fine;                 /* [7]  fine distance (65ft max) */
  unsigned char  radius;          /* [9] */
} intersection_sturn_type;       /* use as S-turn_event_type for all common useage */

typedef  struct
{ unsigned char  cmd_id;          /* [0] */
  unsigned char  sequence_no;     /* [1] */
  unsigned  zone;                 /* [2] */
  unsigned char  path;            /* [4]    Bit 0 - terminate with f1
                                            Bit 1 - terminate with f2
                                            Bit 2 - forward_is_front
                                            Bit 3 - S-turn right  */
  unsigned  distance;             /* [5]  coarse distance (65ft max) */
  unsigned  fine;                 /* [7]  fine distance (65ft max) */
  unsigned char  radius;          /* [9] */
} magnet_sturn_type;
typedef  struct
{ unsigned char  cmd_id;          /* [0] */
  unsigned char  sequence_no;     /* [1] */
  unsigned  zone;                 /* [2] */
  unsigned char  path;            /* [4]    Bit 0 - terminate with f1
                                            Bit 1 - terminate with f2
                                            Bit 2 - forward_is_front
                                            Bit 3 - S-turn right  */
  unsigned  distance;             /* [5]  coarse distance (65ft max) */
  unsigned char  xradius;        /* [7] AGVC field, command processor moves to radius
field, forces dummy_fine_field = 0 */
```

```
  unsigned char  xdummy;           /* [8]  not used ( part of dummy fine field )*/
  unsigned char  radius;           /* [9] */
} virtual_sturn_type;
typedef  struct
{ unsigned char  cmd_id;           /* [0] */
  unsigned char  sequence_no;      /* [1] */
} sleep_command_type;
typedef  struct
{ unsigned char  cmd_id;           /* [0] */
  unsigned char  agvc_status;      /* [1]   All values are in hex.     from AGVC to
VEH.
                                              00 - null state.  No action
                                              FF - initialize_vehicle msg recv. */

} agvc_stat_err_code_type;

typedef  struct
{ unsigned char  cmd_id;           /* [0] */
  unsigned char  sequence_no;      /* [1] */
  unsigned char  lstring_len;      /* [2]   New field for 'C' */
  unsigned char  load_id[15];      /* [3] LSTRING */
} set_load_id_type;    /* sent from vtc to veh to store a load_id */
typedef  struct
{ unsigned char  cmd_id;           /* [0] */
  unsigned char  sequence_no;      /* [1] */
  unsigned char  lstring_len;      /* [2]   New field for 'C' */
  /* unsigned char  load_id[15];      [3] LSTRING  Send from AGVC, but not put is que
*/
} load_id_type;    /* See set_load_id_type(used as dummy for diagnostic display only)
*/
typedef  struct
{ unsigned char  cmd_id;           /* [0] */
  unsigned char  sequence_no;      /* [1] */
} request_vehicle_load_id_type;   /* from AGVC to veh */
/*  This  message  is  sent  from  veh  to  AGVC  (after  AGVC  requests  with  a
request_vehicle_load_id_type  ) */
typedef  struct
{ unsigned char  cmd_id;           /* [0] */
  unsigned char  sequence_no;      /* [1] */
  unsigned char  wait;             /* [2] */
  unsigned char  lstring_len;      /* [3]   New field for 'C' */
  unsigned char  id_load_num[15]; /* [4] LSTRING */
} vehicle_load_id_type;
```

```
*
/
*****************************************************************************************
********************************
  The two gcl messages below are in the format that the VTC will send them to the
vehicle.  When the vehicle receives
  either one, it will format them to the gcl message type listed above.  This is done
so that 'old' or 'new' VTC
  software will be compatible with 'old' or 'new' vehicle firmware.
*****************************************************************************************
************************************ */
typedef  struct       /* new gcl(lift) subsystem command format -- See gcl_subcon */
{ unsigned char  cmd_id;              /* [0] */
  unsigned char  sequence_no;         /* [1] */
  unsigned  con_status;               /* [2] */
  unsigned char  top_eset;              /* [4]:    ( RAISE_TOP, LOWER_TOP, HOME_TOP,
POSITION_TOP ) */
  unsigned char  position;            /* [5] */
} gcl_subsystem_command_type;
typedef  struct
{ unsigned char  cmd_id;           /* [0] */
  unsigned char  sequence_no;      /* [1] */
  unsigned char  top_eset;         /* [2]    ( RAISE_TOP, LOWER_TOP ) */
} gcl_subsystem_old_cmnd_type;
typedef  struct
{ unsigned char  cmd_id;              /* [0] */
  unsigned char  sequence_no;         /* [1] */
  unsigned  con_status;               /* [2] */
  unsigned char  shuttle_eset;          /* [4]     ( pickup_right,     pickup_left,
deposit_right, deposit_left, home_s ) */
} gcs_subsystem_command_type;

  /* Fork-Set for GFN */
#define  PICKUP_LOAD_N          0x8000;
#define  DEPOSIT_LOAD_N          0x4000;
#define  SCANNERS_ON_N          0x2000;
#define  SCANNERS_OFF_N          0x1000;
#define  EXTEND_FORKS_N          0x0800;
#define  RETRACT_FORKS_N          0x0400;
#define  EXTEND_BUMPER_N          0x0200;
#define  RETRACT_BUMPER_N          0x0100;
#define  POSITION_FORKS_N          0x0080;
#define  HOME_SUBSYSTEMS_N          0x0040;
#define  ROTATE_FORKS_LEFT_N          0x0020;
```

```
#define  ROTATE_FORKS_RIGHT_N       0x0010;
#define  EXTEND_STABILIZERS_N       0x0008;
#define  RETRACT_STABILIZERS_N      0x0004;
#define  MAG_HOME_REF_N        0x0002;
/*     future         0x0001 */
typedef  struct
{ unsigned char  cmd_id;            /* [0] */
  unsigned char  sequence_no;       /* [1] */
  unsigned  con_status;             /* [2] */
  unsigned char  forks_set;         /* [4] See defines above for values */
  unsigned char  fork_height;       /* [6] */
} gcn_subsystem_command_type;

typedef  struct
{ unsigned char  cmd_id;            /* [0] */
  unsigned char  sequence_no;       /* [1] */
  unsigned  con_status;             /* [2] */
  unsigned    char       rollers_eset;                  /*    [4]              (
right_deposit,left_deposit,forward_deposit,aft_deposit,right_pickup,
                        left_pickup,forward_pickup,aft_pickup ) */

} gcr_subsystem_command_type;
typedef  struct
{ unsigned char  cmd_id;           /* [0] */
  unsigned char  sequence_no;      /* [1] */
  unsigned  con_status;            /* [2] */
  unsigned    char       fork_eset;                    /*    [4]              (
position_forks_f,pickup_load_f,deposit_load_f, home_f ) */
  unsigned char  height;           /* [5]    0 = no fork motion */
} gcf_subsystem_command_type;
typedef  struct
{ unsigned char  cmd_id;            /* [0] */
} poll_vehicle_type;

#define  LOAD_PRESENT_V          0x0080
#define  E_STOPPED_V          0x0040
#define  FRONT_BUMPER_V          0x0020
#define  FORWARD_IS_FRONT_V      0x0010
#define  PALLET_HOLE_FRONT_V      0x0008
#define  HIGH_SPEED_ESTOP_V      0x0004
#define  GCL_UP             0x0080
#define  GCL_HOME          0x0040
#define  SHUTTLE_UP         0x0080
```

```
#define  SHUTTLE_EXTENDED       0x0040
#define  GCN_FORKS_EXTENDED      0x0080
#define  GCN_BUMPER_EXTENDED      0x0040
#define  GCN_STAB_EXTENDED      0x0020
#define  GCN_FORKS_ROTATED      0x0010
#define  GCN_FORKS_HOME          0x0008
#define  GCN_FORKS_ALT_HOME      0x0004
#define  GCR_CONVEYOR_ON_RIGHT      0x0080
#define  GCR_CONVERYOR_ON_LEFT      0x0040
#define  GCF_FORKS_UP          0x0080
#define  GCF_FORKS_EXTENDED      0x0040
#define  GCF_FORKS_ROTATED_RIGHT 0x0020
#define  GCF_FORKS_ROTATED_LEFT 0x0010
typedef  struct
{ unsigned char    cmd_id;            /* [0] */
  unsigned char    sequence_no;        /* [1] */
  unsigned         wait;               /* Wait time before polling again LSB=1/20 sec,
maximum=3276 sec
                                          if=0 vehicle is assumed to be stopped on this
last event. */
  unsigned         previous_zone;      /* Last zone of vehicle  */
  unsigned         current_zone;       /* Current location zone of veh. */
  unsigned char    battery_level;      /* Vehicle battery level */
  unsigned char    sequence_error;     /* Seq. no.in which error occured */
  unsigned         vehicle_error;      /* Vehicle error */
  unsigned         error;              /* Coding error in program   */
  unsigned         status_set;         /* see type_def stat_type  */
  model_type       model;               /* model type included because PASCAL records
included this See typedef model_type */
  union
  { struct
    { unsigned         gcl_f;    /* ( gcl_up, gcl_home) */
      unsigned char    gcl_lift_height;
    } gcl_m;
    struct
    { unsigned         gcs_f;    /* (shuttle_up, shuttle_extended ) */
      unsigned char    unused;
    } gcs_m;
    struct
    { unsigned gcn_f;     /* (gcn_forks_extended,
                          gcn_bumper_extended,
                          gcn_stab_extended,
```

```
                        gcn_forks_rotated,
                        gcn_forks_home,
                        gcn_forks_alt_home */
      unsigned char  gcn_fork_height;
    } gcn_m;
    struct
    { unsigned        gcr_f;    /* (gcr_conveyor_on_right, gcr_conveyor_on_left) */
      unsigned char   unused;
    } gcr_m;
    struct
    { unsigned gcf_f;     /* (gcf_forks_up,
                        gcf_forks_extended,
                        gcf_forks_rotated_right,
                        gcf_forks_rotated_left */
      unsigned char  gcn_fork_height;
    } gcf_m;
  }ss;
  char veh_stat_unused;
} veh_status_type;
typedef  struct
{ unsigned char  cmd_id;          /* [0] */
  unsigned char  sequence_no;       /* [1] */
  unsigned  wait;                    /* [2] Wait Time to next polling LSB=1/20 sec,
Max=3276 sec
                                         if 0 vehicle assumed to be stopped on last

event. */
} veh_short_status_type;
typedef  struct
{ unsigned char  cmd_id;          /* [0] */
  unsigned char  sequence_no;       /* [1] */
  unsigned  option;                 /* [2]  BIT(Set) DEFINITION
                                            Bit 0 obstacle detect ON
                                            Bit 1 obstacle detect OFF */

} optional_control_type;
```

```
/*V4MOTIONDEF   V4MOTIONDEF   V4MOTIONDEF   V4MOTIONDEF   V4MOTIONDEF   V4MOTIONDEF
V4MOTIONDEF        V4MOTIONDEF        V4MOTIONDEF        V4MOTIONDEF
**********************************************************************************
**********************************************
 ****                                     EEEEEEEEEEEEEE      TTTTTTTTTTTT
                                                ****
NNNNNNN    NNNNN
EEEEEEEEEEEEE      TTTTTTTTTTT                NNNNNNNN    NNNNN
     ****                                   EEEEE            A        TTTT      OOO
                                                  ****
   NNNNNNNNN   NNNNN
 EEEEEEEEEEEE      AAA      TTT      OOOOOOOO  NNNNN NNNN  NNNNN
      ****                                       EEEEEEEEEEE      AAAAA      TTT
                                                        ****
OOOOOOOO  NNNNN  NNNN NNNNN
       EEEEE                       TTTT      OOO      NNNNN   NNNNNNNNN
             ****                                     EEEEEEEEE      AAAAAAA     TTTTT
                                                           ****
            NNNNN    NNNNNNNN
          EEEEEEEE      AAAAAAAAA   TTTTTTT            NNNNN      NNNNNNN
               ****
                                                              ****       This software
(firmware) developed by EATON-KENWAY is proprietary.  Source code on listings or any
other media       ****            is not for sale or loan and may not be copied or
transferred to any vendor, buyer, or consultant.  Executable        ****         code
is available in ROM and is sold with the original product or as a product upgrade.
Buyer shall not         ****          copy or distribute ROM's with E-K firmware to
any third party without the prior written approval of EATON-KENWAY.    ****
Title to and ownership of the software shall at all times remain with EATON-KENWAY.
 The information  in this     ****          is subject to change without notice  and
should not be construed as a commitment by EATON-KENWAY.                        ****

                               ** **                    EATON-KENWAY      assumes    no
responsibility  for  the  use or reliability  of  its  software on  equipment which
  ****          is  not supplied EATON-KENWAY or has been modified without EATON-KENWAY
                                                   ****
approval.

  ** **           Copyright 1989
                                          K E N W A Y ,    I N C O R P O R A T E D
**********************************************************************************
************************************************ V4MOTIONDEF V4MOTIONDEF V4MOTIONDEF
V4MOTIONDEF    V4MOTIONDEF    V4MOTIONDEF    V4MOTIONDEF    V4MOTIONDEF    V4MOTIONDEF
V4MOTIONDEF     DATE CREATED:  Feb 89    AUTHOR:        Vehicle Group    DESCRIPTION:
   xxx......           ....   PROGRAM HISTORY:    Date          Initials/No.
Description   ---------   -----------      ---------------------------------------*
```

```
* * * * * * * * * * * * * * * * * * * * * * * * * * * * * * * * * * * * * * * * * * * *
* * * * * * * * * * * * * * * * * * * * */#define IN_BIT <<#define FROM_BIT >>#define
DO__BYTE_0    0#define  DO__BYTE_4    4#define  DO__BYTE_1    1#define  DI__BYTE_0
0#define  DI__BYTE_1    1#define  DI__BYTE_4    4
```

```
/*  Define channel number for devices  */#define  AO__DIR_WR    0x00#define
AO__DIR_RD    0xD0#define  VIN_CURRENT_G    0#define  VIN_VOLTS_G    1#define
VIN_LEFT_ANTENNA_G    4#define  VIN_RIGHT_ANTENNA_G    5#define  VIN_TACHS_G
6#define  VIN_TACHP_G   7#define  A_OUT_CH__PORTS_DRV   0        /* old DIO
board */#define  A_OUT_CH__STARB_DRV   1#define  DRIVE_WHEELS   ( AO__DIR_WR | 0x03
)  /* bits 1(starb), 0(ports) new DIO board */#define  NOP_CHANNEL    255#define
GET_AO_DISCRETES 0xC0        /* control code to read discrets 0-4 on new DIO board
*/#define  LINE_3_G   3#define  LINE_4_G   4#define  LINE_5_G   5#define  LINE_6_G
  6#define  LINE_7_G   7#define  LINE_8_G   8#define  LINE_9_G   9#define  LINE_32_G
  32#define  LINE_33_G   33#define  LINE_34_G   34#define  LINE_35_G   35#define
LINE_36_G   36#define  LINE_37_G   37#define  LINE_38_G   38#define  LINE_39_G
39#define  LINE_40_G    40  /*  Constants for procedure set_encoder_in and encoder
channels */#define  ENCD__STARB_WHL_ADR   0#define  ENCD__PORTS_WHL_ADR   1#define
ENCD__INERT_PLAT_ADR  2#define  ENCD__FUTURE_ADR    3#define  ENCD__SUM1_WHL_ADR
4#define   ENCD__SUM2_WHL_ADR     5#define   ENCD__STARB_WHL_BIT     (1  IN_BIT
ENCD__STARB_WHL_ADR)#define       ENCD__PORTS_WHL_BIT               (1    IN_BIT
ENCD__PORTS_WHL_ADR)#define       ENCD__INERT_PLAT_BIT              (1    IN_BIT
ENCD__INERT_PLAT_ADR)#define      ENCD__FUTURE_BIT                   (1    IN_BIT
ENCD__FUTURE_ADR)#define  ENCD__SUM1_WHL_BIT    (1 IN_BIT  ENCD__SUM1_WHL_ADR)   /*
ENCD__SUM2_WHL_BIT     does not exist */
```

```
#define ENCD__LOAD 0x80 /* load counter */#define ENCD__CLR 0x00 /*
clear counter */#define ENCD__NO_CLR 0x40#define ENCD__S_INT 0x20 /* set
interrupt */#define ENCD__C_INT 0x00 /* clear interrupt */#define ENCD__ADD
0x10 /* sum value into encoder */#define ENABLE_OR_DISABLE_SUM_INT_G 3#define
ENABLE_SUM_INTERRUPT 1/* byte 0 of discrete in -- estop diagnostic
--------------------------------------------------------------------------
------- ¦ 7 ¦ 6 ¦ 5 ¦ 4 ¦ 3 ¦ 2 ¦ 1
¦ 0 ¦
--------------------------------------------------------------------------
------ ¦rear bumper¦front bumper¦ push but ¦ S o/load ¦ P o/load ¦ spare ¦ spare
¦ v e h t o p ¦
--------------------------------------------------------------------------
------*/#define ESTOP_BUMPER_CLEAR_G 0xF9#define BRAKES_CHANNEL_G 8#define
ESTOP_CHANNEL_G 9 /* byte 0 of discrete out - contactor */ /*
--------------------------------------------------------------------------
¦ 7 ¦ 6 ¦ 5 ¦ 4 ¦ 3 ¦ 2 ¦ 1 ¦ 0
¦
--------------------------------------------------------------------------
----- ¦ XX ¦ XX ¦ bmpr reset ¦ cont Top ¦ cot S R ¦ cont S F ¦ cont P R
¦ c o n t P F ¦
--------------------------------------------------------------------------
- - - - - N a r r o w A i s l e F o r k v e h i c l e
--------------------------------------------------------------------------
----- ¦ 7 ¦ 6 ¦ 5 ¦ 4 ¦ 3 ¦ 2 ¦ 1
¦ 0 ¦
--------------------------------------------------------------------------
----- ¦ XX ¦ XX ¦ bmpr reset ¦ rel brak ¦ cont S R ¦ cont S F ¦ cont P R
¦ c o n t P F ¦
--------------------------------------------------------------------------
----- */#define BUMPER_RESET_CHANNEL_G 5#define PULSE_WO_INTERRUPT 1#define
FRONT_PORT_CONT_ADDR_G 0#define BACKW_PORT_CONT_ADDR_G 1#define
FRONT_STBD_CONT_ADDR_G 2#define BACKW_STBD_CONT_ADDR_G 3#define STOP_WHEELS
0x00#define FRONT_PIVOT_LEFT_G 0x04#define FRONT_PIVOT_RIGHT_G 0x01#define
REAR_PIVOT_LEFT_G 0x02#define REAR_PIVOT_RIGHT_G 0x08#define
MASK__WHL_CONTACTOR 0x1F /* mask of byte 0 of do */#define
ROTATE_LEFT_COMMAND_G 0x16#define ROTATE_RIGHT_COMMAND_G 0x19#define
FRONT_DIRECTION_G 0x15#define REAR_DIRECTION_G 0x1A
```

```
/*      b y t e   4   o f   d i s c r e t e   o u t   */      /*
------------------------------------------------------------------------
|  15  |  14  |  13  |    12   |   11   |   10   ,   9   |   8
                                                            |
------------------------------------------------------------------------
-----  |   7  |   6  |   5  |    4    |    3    |    2   |   1   |
                                                  0             |
------------------------------------------------------------------------
-----  |   XX  |   XX  |   XX   | rel top br | E stop lt | stbd lt  | port lt  |
s   p    k                     d      r      i      v       e           |
------------------------------------------------------------------------
----- */#define   SPEAKER_DRIVE_ADDR_G     8#define   PORT_LIGHT_ADDR_G      9#define
STBD_LIGHT_ADDR_G     10#define  E_STOP_LIT_ADDR_G     11#define  OSCILLATE_CMD_G    3
 /*  oscillate with out interrupt */#define  CONTACTOR_ADDR_G     0    /*  byte 0 of
discrete out */#define  REL_BRAKES_ADDR_G     4#define  SPEAKER_DRIVE_FREQ_ADDR_G    33
 /*   in  byte  4  od  discrete  out  */    /*    byte  4  of  discrete  out  */    /*
------------------------------------------------------------------------
-------  |   39   |    38   |    37   |   36   |   35       |    34    |
3  3                       | `                  3  2                      |
------------------------------------------------------------------------
---------  |   7   |     6    |    5    |     4   |    3      |     2    |
   1                    |                     0                         |
------------------------------------------------------------------------
---------  | mot tach | freqency1 | control  |  antenna | D wire-X S | D wire-X P | spk
f          r          e          q    |                X          X             |
------------------------------------------------------------------------
--------- */#define MOTION_TACH_ADDR_G    39#define FOLLOW_FREQ_1_ADDR_G    38#define
DEAD_RECKON_ADDR_G             37#define         FRONT_GUIDE_ANT_ADD_G          36#define
DISABLE_RIGHT_WIREX_ADDR_G        35#define   DISABLE_LEFT_WIREX_ADDR_G         34#define
GUIDANCE_ADDR_G        4     /* byte 4 of discrete out */#define  GUIDANCE_MASK_G
0xF0#define  MONITOR_F1_G                 0x40#define  MONITOR_F2_G              0x00#define
PROGRAM_GUIDANCE_G             0x20#define       HARDWARE_GUIDANCE_G           0x00#define
FRONT_FORW__ANTN_BIT         0x10#define        REAR_FORW__ANTN_BIT            0x00#define
DISABLE_LEFT_WIREX               0x04#define     DISABLE_RIGHT_WIREX           0x08#define
MOTION_ANALOG_TACH_G    0x80#define  HARDWARE_GUIDANCE_F1_G    ( HARDWARE_GUIDANCE_G |
MONITOR_F1_G )#define   HARDWARE_GUIDANCE_F2_G   ( HARDWARE_GUIDANCE_G | MONITOR_F2_G
)#define     PROGRAM_GUIDANCE_F1_G       (  PROGRAM_GUIDANCE_G  |  MONITOR_F1_G  )#define
PROGRAM_GUIDANCE_F2_G   ( PROGRAM_GUIDANCE_G | MONITOR_F2_G )
```

```
#define ENABLE_WIRE_CROSS_G 0#define DISABLE_BOTH_WIRE_CROSS_G 0x0C#define
SELECT_PORTSIDE_WIRE_CROSS_G 0x04#define SELECT_STARBOARD_WIRE_CROSS_G 0x08 /*
mask for byte 4 of discrete out */#define MASK_GUID_FREQ_G 0x60#define
MASK_ANTR_GUID_FREQ_G 0x70#define MASK_WIRE_CROSS_G 0x0C /* byte 4 of discrete
i n * / / *
--------------------------------------------------------------------------------
¦ 7 ¦ 6 ¦ 5 ¦ 4 ¦ 3 ¦ 2 ¦ 1 ¦ 0
¦
--------------------------------------------------------------------------------
----- ¦ braker ¦ wire-x F2¦ wire-x F1¦ mag R S ¦ mag R P ¦ mag F P ¦ mag F S ¦
o v e r w i r e ¦
--------------------------------------------------------------------------------
---- */#define ANTENNA_OVERWIRE_ADDR_G 32#define ANTENNA_IS_OVERWIRE_G 1#define
MAGNET_FRONT_STBD_G 33 /* 0x21 */#define MAGNET_FRONT_PORT_G 34 /* 0x22
*/#define MAGNET_REAR_PORT_G 35 /* 0x23 */#define MAGNET_REAR_STBD_G 36
 /* 0x24 */#define WIRE_X_FREQ_1_G 37#define WIRE_X_FREQ_2_G 38#define
F1_WIREX_SENSED_G 0x20#define F2_WIREX_SENSED_G 0x40 /* define message token
*/ /* ---------------------------------------------------------------------------
 ¦15 14 13 12 11 10 9 8 7 6 5 4 3 2 1 0 ¦
---------------------------------------------------------------------------- ¦
interr ¦ ¦ device # ¦ s ¦ status ¦
---------------------------------------------------------------------------- ¦
msg ¦ ¦ task id ¦ mode ¦
--------------------------------------------------------------------------------
*/#ifndef MS__TIMEOUT /* real time clock constants */#define MS__TIMEOUT
 /10#define SEC__TIMEOUT *100#define MIN__TIMEOUT *6000#define TIMEOUT__FOREVER
0xFFFF#endif#define TIMEOUT__MAILBX 1#define CREEP_SPEED_WAIT_TIME_G
DELAY__50_MS /* delay until encoder next read */
```

```
/* [motion] source flag to extract information useful to motion *//* the following
defines the mailbox constants for 1 word messages between the HCU and other various
t        a        s        k        s    *        /        /          *
---------------------------------------------------------------------------
 |    |    |err |    |    |    |    |    |    |    |    |    |    |    |    | 1
 |  1 |  x |0/1 |  ---source ID       |  ---   status field  ----           |
---------------------------------------------------------------------------
15   14   13  12   11   10    9    8    7    6    5    4    3    2    1    0  */
  /* MAIL definitions */#define TASKID_FIELD      8#define MESSAGE_FLAG  0xC000
                    /* 3 in bit field */#define   FROM_COMMAND_PROCESSOR
0xD000#define   HAND_CONTROL_ID       1#define   COMMAND_PROCESSOR_ID     2#define
MOTION_ACTION_ID    3#define  MOTION_TRANSLATION_ID    4#define   SUBSYSTEM_ID
5#define  COMMN_ID   6#define  COMMN_BUFFR_LOADED     0xC600#define  CMDT_2_SUBS_BAS
    0xC200#define  CMDT_2_TRNS_BAS          0xD000#define  MAIL__MOTION
0xC300#define   MAIL__SUBSYS              0xC500#define  MAIL__HCU
0xC100#define  RUN__KALMAN_AZIMUTH 0xC3FF#define  RUN__KALMAN_XY 0xC3FE  /*  from HCU
to action or translation */#define  HAND_CONTROL_MASTER       ( MESSAGE_FLAG | (
HAND_CONTROL_ID IN_BIT   TASKID_FIELD ) | 0x01 )            /* C101 */#define
COMMAND_PROCESSOR_MASTER ( MESSAGE_FLAG | ( HAND_CONTROL_ID IN_BIT  TASKID_FIELD ) |
0x02  )       /*  C102  */#define   INSERTING_VEHICLE          ( MESSAGE_FLAG | (
HAND_CONTROL_ID IN_BIT  TASKID_FIELD ) | 0x06 )     /* C106 to cmnd task, */#define
AUTOMATIC_RESTART          ( MESSAGE_FLAG | ( HAND_CONTROL_ID IN_BIT  TASKID_FIELD ) |
0x03  )          /* C103 */#define  TRACK_MASTER                 ( MESSAGE_FLAG | (
HAND_CONTROL_ID IN_BIT   TASKID_FIELD ) | 0x04 )             /* C104 */#define
HCU_CNTRL_MAN              ( MESSAGE_FLAG | ( HAND_CONTROL_ID IN_BIT  TASKID_FIELD ) |
0x10  )            /* C110 */#define  HCU_CNTRL_INSRT          ( MESSAGE_FLAG | (
HAND_CONTROL_ID IN_BIT   TASKID_FIELD ) | 0x11 )             /* C111 */#define
PLATFORM_CNTRL             ( MESSAGE_FLAG | ( HAND_CONTROL_ID IN_BIT  TASKID_FIELD ) |
0x12  )            /* C112 */#define  HCU_INSRT_FLOOR          ( MESSAGE_FLAG | (
HAND_CONTROL_ID IN_BIT   TASKID_FIELD ) | 0x13 )             /* C113 */#define
ACTION_MESSAGE_ID          ( MESSAGE_FLAG | ( MOTION_ACTION_ID IN_BIT  TASKID_FIELD ) )
    /* C300 to cmd task */#define  EMERGENCY_STOP              ( MESSAGE_FLAG | (
MOTION_ACTION_ID IN_BIT   TASKID_FIELD ) | 0x02 )            /* C302 */#define
PUT_VEHICLE_ASLEEP        ( MESSAGE_FLAG | ( COMMAND_PROCESSOR_ID IN_BIT  TASKID_FIELD
) | 0x0A )      /* C20A */#define  HCU_CLEAR_MAN  0          /* release action task
from driving vehicle */  /*  FROM TRANS TO ACT, AFTER COMMAND TRNASLATED */#define
WAKEUP_ACTION             ( MESSAGE_FLAG | ( MOTION_TRANSLATION_ID IN_BIT  TASKID_FIELD
) | 1 )                   /* C401  */    /*   from subsystem to action */#define
SCANNER_CLEARED_MESG      ( MESSAGE_FLAG | ( SUBSYSTEM_ID IN_BIT  TASKID_FIELD ) | 0 )
          /* C500 */#define  SCANNER_BLOCKED_MESG     ( MESSAGE_FLAG | ( SUBSYSTEM_ID
IN_BIT  TASKID_FIELD ) | 1 )                /* C501 */#define  SUBSYSTEM_STATUS_CHANGE
( MESSAGE_FLAG | ( SUBSYSTEM_ID IN_BIT  TASKID_FIELD ) | 0x02 )  /*load_status change
```

```
C502*/#define  NO_EVENT_FOUND_MESG    0#define  SUB_SYS_PRECOMPLETION_MASK  0x0001
        /* 2#0000000000000001 */ /*#define  SHUTTLE_BIN_RECOVERY_MASK  0x0002
        2#0000000000000010 */ /*#define  TIP_SENSOR__REVSERVE_C  0x0004
      2#0000000000000100 */
```

```
#define ANALOG_OUT_G 1#define ANALOG_IN_G 2#define ENCODER_G 3#define
DISCRETE_IN 4#define DISCRETE_OUT_G 5#define U_M_S__ID 6#define
HIGH_INTERRUPT 0x0080#define INTERRUPT_FLAG 0x8000#define END_OF_COMMAND_G
(int)0x00FF#define ENCODER_INTERRUPT_MESG_G ( INTERRUPT_FLAG ¦ ( ENCODER_G IN_BIT
TASKID_FIELD ) ¦ 0x0000 ) /*0x8300*/#define ENCODER_SUM_INTERRUPT_MESG_G (
INTERRUPT_FLAG ¦ ( ENCODER_G IN_BIT TASKID_FIELD ) ¦ 0x0003 ) /*0x8303*/#define
ENCODER_HIGH_SUM_INT_MESG_G ( ENCODER_SUM_INTERRUPT_MESG_G ¦ HIGH_INTERRUPT )
 /*0x8383*/#define ENCODER_ERR_SUM_INT_MESG_G ( ENCODER_SUM_INTERRUPT_MESG_G ¦
0x0040 ) /*0x8384*/#define BREAKER_TRIPPED_MESG_G (
INTERRUPT_FLAG ¦ ( DISCRETE_IN IN_BIT TASKID_FIELD ) ¦ LINE_39_G )
/*0x8427*/#define LOST_GUIDANCE_MESG ( INTERRUPT_FLAG ¦ ( DISCRETE_IN IN_BIT
TASKID_FIELD ) ¦ 0x0020 ) /*0x8420*/#define FRONT_STBD_MAG_SOUTH (
INTERRUPT_FLAG ¦ ( DISCRETE_IN IN_BIT TASKID_FIELD ) ¦ MAGNET_FRONT_STBD_G )
/*0x8421*/#define FRONT_PORT_MAG_SOUTH ( INTERRUPT_FLAG ¦ ( DISCRETE_IN IN_BIT
TASKID_FIELD ) ¦ MAGNET_FRONT_PORT_G ) /*0x8422*/#define REAR_PORT_MAG_SOUTH (
INTERRUPT_FLAG ¦ ( DISCRETE_IN IN_BIT TASKID_FIELD ) ¦ MAGNET_REAR_PORT_G )
/*0x8423*/#define REAR_STBD_MAG_SOUTH ( INTERRUPT_FLAG ¦ ( DISCRETE_IN IN_BIT
TASKID_FIELD ) ¦ MAGNET_REAR_STBD_G ) /*0x8424*/#define WIRE_CROSS_F1_MESG (
INTERRUPT_FLAG ¦ ( DISCRETE_IN IN_BIT TASKID_FIELD ) ¦ 0x00A5 )
/*0x84A5*/#define WIRE_CROSS_F2_MESG ( INTERRUPT_FLAG ¦ ( DISCRETE_IN IN_BIT
TASKID_FIELD ) ¦ 0x00A6 ) /*0x84A6*/#define EVENT_TEMPLATE (
INTERRUPT_FLAG ¦ ( DISCRETE_IN IN_BIT TASKID_FIELD ) ¦ 0x0020 )
/*0x8420*/#define EVENT_MASK 0xFF70#define BRAKES_RELEASED_MESG_G (
INTERRUPT_FLAG ¦ ( DISCRETE_IN IN_BIT TASKID_FIELD ) ¦ LINE_8_G )
/*0x8408*/#define BRAKES_SET_MESG_G ( INTERRUPT_FLAG ¦ ( DISCRETE_IN IN_BIT
TASKID_FIELD ) ¦ 0x0088 ) /*0x8488*/#define
EMERGENCY_STOP_SET_MESG_G ( INTERRUPT_FLAG ¦ ( DISCRETE_IN IN_BIT TASKID_FIELD ) ¦
LINE_9_G ) /*0x8409*/#define RECOVER_FROM_ESTOP_G ( INTERRUPT_FLAG ¦ (
DISCRETE_IN IN_BIT TASKID_FIELD ) ¦ 0x0089 ) /*0x8489*/#define
U_M__INTERRUPT ( INTERRUPT_FLAG ¦ ( U_M_S__ID IN_BIT TASKID_FIELD ) ¦ 0x0000 )
 /*0x8600*/ /* ******************************** define S bit
****************************************************************** */#define
HIGH2LOW_INTERRUPT 0x00#define LOW2HIGH_INTERRUPT 0x80#define
COUNT_DOWN_INTERRUPT 0x00#define COUNT_UP_INTERRUPT 0x80#define
NOT_COUNTING_INTERRUPT 0xC0#define NO_ENCODER_INTERRUPT_EXPECT_G 0x01#define
CLEAR_INTERRUPT 0x0000
```

```
/*  ************************* parameter used to set up set mask routine for track
wire  mode  *********************     */#define    BOTH_EDGE_MASK        0x0101#define
HIGH2LOW_MASK_G             0x0100#define     LOW2HIGH_MASK_G             0x0001#define
SET_BOTH_EDGE_INTERRUPT       0x0101#define   SET_HIGH2LOW_INTERRUPT      0x0100#define
SET_LOW2HIGH_INTERRUPT        0x0001#define    ACT_BOTH_EDGE_MASK_G        0x0404#define
ACT_HIGH2LOW_MASK_G          0x0400#define    ACT_LOW2HIGH_MASK_G         0x0004#define
ACT_SET_BOTH_EDGE_INTERRUPT           0x0404#define     ACT_SET_HIGH2LOW_INTERRUPT
0x0400#define  ACT_SET_LOW2HIGH_INTERRUPT   0x0004  /*  ******************************
path bits ****************************************************************  */#define
ROTATE_WITHOUT_CENTER_G  0x10#define     CALIBRATION_ON_G                    0x10#define
SOUTH_MAG_FIRST_G         0x20#define  RIGHT_MAGNET_G           0x40#define  LEFT_MAGNET_G
        0x80#define   FREQUENCY_MASK              (3 IN_BIT 0)        /* 0x03 */#define
TPS_XMIT                     (3 IN_BIT 0)#define  DEAD_RECKON_CMD            0x00
/*(0 IN_BITS 0,1) */#define  FOLLOW_F1_CMD_G         (1 IN_BIT 0)      /* 0x01 */#define
FOLLOW_F2_CMD_G            (1 IN_BIT 1)      /* 0x02 */#define  GEN_OWN_GUID_FREQ        (3
IN_BIT 0)       /* 0x03 */#define   DIRECTION_CMD_MASK        (1 IN_BIT 2)       /* 0x04
*/#define   FRONT_FORW                  (1 IN_BIT 2)       /* 0x04 */#define  REAR_FORW
        0x00             /* (0 IN_BIT 2) */#define  DIM__SPECFD_VEH_CNTR     (1 IN_BIT
3)     /* 0x08 (for translation)*/#define  TPS__PRE_TURN_ON          (1 IN_BIT 3)      /*
0x08 (for motion, after translation) */#define  FORCE_SNGL_LIN_MOV        (1 IN_BIT 4)
   /* 0x10 */#define  UPDATE_MRKR_PRES          (1 IN_BIT 5)#define  UPDATE_MRKR_SPECF
    (1 IN_BIT 6)    /* mag=0, wire-x=1 */#define  MANDITORY_STOP             (1 IN_BIT 7)
   /* 0x80 */#define  UPDATE_MRKR_MASK           ( UPDATE_MRKR_PRES | UPDATE_MRKR_SPECF
)#define   TPS_PATH_MASK   (DIRECTION_CMD_MASK | FREQUENCY_MASK)
```

```
/*  define motion control switches these switches are controlled by HCU */#define
LOAD__PRSNT_CHCK  (1 IN_BIT  8)        /* 0x0100:   when load present attempting a
deposit */#define  LOAD__VACNT_CHCK  (1 IN_BIT  9)              /* 0x0200:      when
attempting a pickup */#define  OBSTACLE_DETCT_CNFG_BIT    (1 IN_BIT  4)     #define
LOAD_SENSING_CNFG_BITS              (LOAD__PRSNT_CHCK  |  LOAD__VACNT_CHCK   )#define
CALIBRATION_CNFG_BIT          (1  IN_BIT    10)#define    LOAD__SENCE_CHN     9#define
LOAD__VACNT_THRSHLD  50    /* load vacant >= value */#define  OBSTACLE__AGVC_ENABLES
( 1  IN_BIT  0)#define  OBSTACLE__AGVC_DISABLES ( 1  IN_BIT  1)    /* M_C_P constants
*/#define   BRAKE_TIMEOUT         50        /*  50  *  30mx  =  1.5secs  */typedef  enum{
BRAKES_DSABLD,                    BRAKES_ENABLD,                     BRAKES_SET,
BRAKES_RELEASING,                  BRAKES_RELEASED,                    OBSTC_ENABLD,
  OBSTC_DSABLD,                       SOFT_ESTOP                     } mcp_state_type;#define
TPS_SETPT_CMND 0x98      /* Change Setpoint command with TPS */#define TPS_CTRL_CMND
0x90     /* Turn on TPS and start control */#define TPS_SETUP_CMND 0xA0     /* Turn on
TPS  without  control  (pre-setup)  */    /*      ******************** track  wire  mode
********************  */#define  ANTENNA_CENTER_THRESHOLD_G     20      /*   10% of 255
*/#define  ANTENNA_SENSING_THRESHOLD_G      16#define  ANTENNA_NOISE_THRESHOLD_G      4
 /*      1.7%    of    255    */#define        NOT_OVERWIRE_THRESHOLD_G              10#define
ANTENNA_CENTERED_LEVEL_G       10        /*    typical  level  when  antennas  are  centered
*/#define    ACCELERATE_FACTOR_G        2#define    DECELERATE_FACTOR_G           -2#define
SAFE_CONTACTOR_SWITCH_SPEED     2     /*   feet/min */#define  LINEAR_SLOWDOWN_FACTOR_G
  4#define   PIVOT_WHEEL_MINIMUM_SPEED      0#define  PIVOT_DECELERATE_FACTOR_G      1
/*  1% of outside wheel speed */#define  PIVOT_ACCELERATE_FACTOR_G      90     /*   % of
outside wheel speed */#define  MAX_HCU_SPEED_G     60#define  LEAD_TIME_G          0.2
 /* seconds */#define  ANTENNA_DISTANCE_FACTOR_G     0.01273777     /*  ( 3"/4.6 V * 5v
/256 counts) "/unit of antenna difference */#define  PIVOT_COMPLETION_SPEED_FACTOR_G
  0.75     /*  ratio pivot_wheel_speed / outside_wheel_speed  at acquisition */#define
MINIMUM_VEHICLE_SPEED     4     /*  feet/min */#define  STOP_VEHICLE_SPEED      0
```

```
/* ****************************************** others
************************************** */#define IP__TICKS_PER_REV 7200.0#define
DIST__COARS_UNT 20.0 /* base unit in VTC distance fields */#define
TURN__ANGL_MIN 30.0 /* 30 degrees */ #define MIN_TURN_RADIUS 711.2
/* mm (30")*/#define MAX_TURN_RADIUS 2032.0 /* mm (80")*/#define
THRESHOLD__ROTATE_TURN 25.0 /* mm ( 1") */#define RE_ACQUI_DIST_RANGE_C 24.86
/* mm */#define MAX_RADIUS_TURN_SPEED_G 210 /* output speed */#define
MAX_CREEP_SPEED 20#define SPD_SETPT_MAX 255 /* 5 volts */#define
MAXIMUM_SETPOINT_CHANGE_G 20 /* speed setpoint */#define MAXIMUM_TURN_SPEED_G
200 /* speed setpoint */#define MAX_DEAD_RECKON_SPEED_G 120 /*
output setpoint */#define MINIMUM_TURN_ANGLE 30 /* 30 degrees */
 #define ACCEL_DECEL_SPD_COMPU_SCALE_G 16 /* used in compute speed routines
- accel_decel_setup, accel_decel_action and in define_distance to compute max
decel distance and not get overflow in computation */#define CREEP_SPEED_G 4#define
SCALE_BASE_256_G 256#define RATIO_ADJUST_G SCALE_BASE_256_G * 2 DIV 10 /*
0.2 of SCALE_BASE_256_G */#define DIST__MIN_MOVE 50.0/*mm*/#define
NO_AGVC_MESSAGE 0 /* AGVC error status */#define AGVC_NO_ERRORS
0xFF /* AGVC error status */ /* ***************** TRANSLATION/ACTION PATH
MASKS ******************* */#define PATH_SEGM_CONSTANT_MASK OBSTACLE_DETCT_CNFG_BIT
 /* MAINTAINED FROM MOVE to MOVE; future Add FREQ and DIRECTION */#define
PATH_SEGM_UNIQUE_MASK LOAD_SENSING_CNFG_BITS /* MUST BE DEFINED FOR EACH MOVE;
future Add others */#define NO_HCU_XY_INSERT 0xB100#define LENGTH_ERR_XY_INSERT
0xB101 /* ******************** Math Constants ************************ */#define
PI 3.1415926535897932 /* 180 */#define TWO_PI (PI * 2.0) /* 360 */#define
THREE_PI (PI * 3.0) /* 540 */#define RADIANS_PER_DEG 0.01745329252#define
DEGS_PER_RADIAN 57.29577951#define FROM_100THS 0.01#define TO_100THS 100.0#define
X100__PI 18000 /* 100ths degrees */#define X100__2_PI 36000 /* 100ths degrees
*/#define INSRT_LNGTH_TOLERANCE 0.1 /* 10% */#define MM_FROM__20THS_INCH (1.270005
/ 256.0) /* 1/20 in/unit * 25.4 mm/in, shifted right 1 byte(/256.0) */#define
EXTD_INT_MASK 0xFFFFFF00L /* extended int (3 byte) to LONG data field */#define
INCH_FROM__20THS (0.05 / 256.0)#define MM_2_INCH 0.3936992374#define TICKS_2_SECS
0.010
```

```
/*     v4mv_wir    v4mv_wir    v4mv_wir    v4mv_wir    v4mv_wir    v4mv_wir    v4mv_wir
v 4 m v _ w i r          v 4 m v _ w i r          v 4 m v _ w i r          v 4 m v _ w i r
*********************************************************************************************
************************************************************

 ****                                          EEEEEEEEEEEEEE      TTTTTTTTTTTT
                                                     ****
NNNNNNN      NNNNN
EEEEEEEEEEEEEE        TTTTTTTTTTT               NNNNNNNN     NNNNN
     ****                                     EEEEE               A        TTTT        OOO
   NNNNNNNNN    NNNNN                                 ****
 EEEEEEEEEEEE      AAA       TTT        OOOOOOOO  NNNNN NNNN   NNNNN
      ****                                           EEEEEEEEEEE        AAAAA       TTT
OOOOOOOO  NNNNN   NNNN NNNNN                                  ****
        EEEEE                       TTTT        OOO       NNNNN    NNNNNNNNN
             ****                                      EEEEEEEEE       AAAAAAA      TTTTT
            NNNNN     NNNNNNNN                                   ****
          EEEEEEEE        AAAAAAAAA    TTTTTTT            NNNNN       NNNNNNN
                ****
                                                                       ****      This software
(firmware) developed by EATON-KENWAY is proprietary.  Source code on listings or any
other media       ****          is not for sale or loan and may not be copied or
transferred to any vendor, buyer, or consultant.  Executable        ****         code
is available in ROM and is sold with the original product or as a product upgrade.
Buyer shall not          ****          copy or distribute ROM's with E-K firmware to
any third party without the prior written approval of EATON-KENWAY.    ****
Title to and ownership of the software shall at all times remain with EATON-KENWAY.
 The information  in this     ****         is subject to change without notice  and
should not be construed as a commitment by EATON-KENWAY.                          ****

                                  **  **                 EATON-KENWAY     assumes    no
responsibility  for  the  use or reliability  of  its  software on  equipment which
  ****         is  not supplied EATON-KENWAY or has been modified without EATON-KENWAY
approval.                                         ****

  ****          Copyright 1989
                                    K E N W A Y ,     I N C O R P O R A T E D
*********************************************************************************************
*************************************************          v4mv_wir    v4mv_wir    v4mv_wir
 v4mv_wir   v4mv_wir   v4mv_wir   v4mv_wir   v4mv_wir   v4mv_wir   v4mv_wir   v4mv_wir
   DATE CREATED:  Oct 90    AUTHOR:        Vehicle Group    DESCRIPTION:        xxx......
          ....    PROGRAM HISTORY:     Date          Initials/No.          Description
---------   -----------       ---------------------------------------* * * * * * *
```

```
* * * * * * * * * * * * * * * * * * * * * * * * * * * * * * * * *//* Bits 0-1: 00
- dead reckon ( not used in turn/rotate commands )          01 - follow F1
     10 - follow F2          11 - follow ( use internal generator       Bit 2:
Vehicle Orientation (Forward_is_Front= TRUE)     3: X,Y defined from center(1), else
Forward end(0,default)(may be spare)       4: Obstacle detection( on(1), off(0) )
   5: Update Marker Present(1)        6: Update Marker Type (Magnet=0, wire-x=1)
   7: MANDITORY_STOP at end of seq.(regardless of next segment speed)  MV__STR_SEG(
34[0x22]; MV__TURN_SEG( 35[0x23]*/typedef struct { unsigned first;   /* first point
in sequencial group */  unsigned  last;    /* last point in sequencial group */
unsigned mask;   /* setup mask for all points in group */  unsigned  intrpt;   /*
interrupt def for all points in group */  unsigned  error_id;   /* vsysbug error to
be  returned  when  error  occurs  using  this  group  */}  termn_evnts_type;const
termn_evnts_type   TRMN_EVNT__WIRE_X  =        { WIRE_X_FREQ_1_G,  WIRE_X_FREQ_2_G,
ACT_LOW2HIGH_MASK_G,  ACT_SET_LOW2HIGH_INTERRUPT,  0xB022  /*  vsysbug  */  };const
termn_evnts_type      TRMN_EVNT__MAGN_FRNT   =         {   MAGNET_FRONT_STBD_G,
MAGNET_FRONT_PORT_G, ACT_HIGH2LOW_MASK_G, ACT_SET_HIGH2LOW_INTERRUPT, 0xB020 /* vsysbug
*/  };const  termn_evnts_type   TRMN_EVNT__MAGN_REAR  =        { MAGNET_REAR_PORT_G,
MAGNET_REAR_STBD_G, ACT_HIGH2LOW_MASK_G, ACT_SET_HIGH2LOW_INTERRUPT, 0xB020 /* vsysbug
*/ };const termn_evnts_type ` *pt__trmn_evnt;       /* pointer to structure const */
/*  External  calls  */void  m_c_p__tps(  unsigned,  unsigned  );typedef  enum    {
EVNT_NOT_REQUIRED,      /* 0 */                EVNT_REQUIRED,         /* 1 */
        EVNT_WIRE_X_REQD,        /* 2 */                EVNT_MAG_X_REQD          /* 3
specification converted to EVNT_WIRE_X_REQD; Future GWC mag event type */
 } evnt_stat_typ;evnt_stat_typ event_status;double xvw_wnd_end, xvw_wnd_strt; void
event__defn_intrrpts(  unsigned  action  ){  unsigned    discrete_in_pnt;    for(
discrete_in_pnt  =  pt__trmn_evnt->first;  discrete_in_pnt  <=  pt__trmn_evnt->last;
discrete_in_pnt++ )      set_mask( DISCRETE_IN, discrete_in_pnt, pt__trmn_evnt->mask,
action );;} /* event__defn_intrrpts */ void update_wire_nav( )  /* navigational update
when using wire */{ xvw = pt__mvq->y;  /*  xvw event,  correct Xvw */  distw.coord =
xvw + distw.seg_bg;   /* correct total distance(X) */  z_down_range = pt__mvq->ums_x
- xvf;   /* assume no latency for now */  z_cross_range = pt__mvq->ums_y - yvf;    /*
assume no latency for now */  heading_error = z_down_range = z_cross_range = 0.0;
event_status = EVNT_NOT_REQUIRED;    /* event found, another is not required */
event__defn_intrrpts( CLEAR_INTERRUPT );  #if defined(KALMAN)   /* in future test so
this  is  only  done  with  EAGLE  controls  (not  guide  wire)     */
/*==========================================*/          /* run kalman using public
variables         */        /* delta_magnet, z_down_range, z_cross_range */
/*==========================================*/  z_azimuth = fix_angle((tip+gamma_ft)
-  tfv);        send__mail(vsubmt,RUN__KALMAN_XY);      #endif}  /*  update_wire_nav
*//**********************************************//* mv_wir__setup  setup a single
move on wire *//************************************************/void mv_wir__setup(
){ event_status = (evnt_stat_typ)( ( pt__mvq->path & UPDATE_MRKR_MASK) >> 5 );  /*
```

```
isolate event bits */   if( event_status == EVNT_MAG_X_REQD )      event_status =
EVNT_WIRE_X_REQD;        /* change when AGVC supports */   if( event_status >=
EVNT_WIRE_X_REQD ) /* wire-X event */  { if( event_status == EVNT_MAG_X_REQD )  /*
mag-X event */          pt__trmn_evnt = ( pt__mvq->path & DIRECTION_CMD_MASK ) ?
&TRMN_EVNT__MAGN_FRNT  : &TRMN_EVNT__MAGN_REAR;       else          pt__trmn_evnt =
&TRMN_EVNT__WIRE_X; /* wire-X */    event__defn_intrrpts( pt__trmn_evnt->intrpt );
xvw_wnd_strt  =  pt__mvq->y  /*Xdistance  to  event*/   -   pt__mvq->x  /*window*/;
xvw_wnd_end =  pt__mvq->y /*Xdistance to event*/  +  pt__mvq->x /*window*/;  }  xvw =
0.0;  xvwi = pt__mvq->len_seg;  distw.seg_bg = distw.coord;  m_c_p__move_setup( ); }
/* mv_wir__setup *//**********************************************//*  mov__wire:
move vehicle on wire       *//************************************************/extern
unsigned controls;void mov__wire( ){ for( mv_wir__setup( ); ; )  /* move until end of
segment */  { if( (controls != TPS_XMIT) && (get_bit_discrete_in(IOVRW_ANT_OVER_WIRE)
== NOT_OVER_WIRE) )     vsysbug( 0, 0xB096/* lost wire */ );   /* temporary until TPS
provides this data */    distw.coord +=  fabs( delta_xv );      /* total distance
traveled */     xvw = distw.coord - distw.seg_bg;      /* distance traveled in move
segment */     if( event_status >= EVNT_WIRE_X_REQD )       /* unfound event within
segment */     {              /*  wire-X (or magnet event)       and       in window
*/      if( ( (action_mail & EVENT_MASK ) == EVENT_TEMPLATE ) && ( xvw >= xvw_wnd_strt
) )       { update_wire_nav( );         continue;   /* bypass wait__til_mail */      }
    else if( xvw > xvw_wnd_end )         /* past window, missed marker? */
vsysbug( 0, pt__trmn_evnt->error_id );     }     else if( xvw >= xvwi )      break;
/* no event required, end of move? */     m_c_p__move( );       wait__til_mail( 30
MS__TIMEOUT );    } /*for*/   distw.coord -=   xvw - xvwi;       /* OVERRUN latency
correction */} /* mov__wire */
```

```
/* V4Vars     V4Vars     V4Vars     V4Vars     V4Vars     V4Vars     V4Vars     V4Vars
V4Vars     V4Vars     V4Vars     V4Vars     V4Vars
*****************************************************************************************
************************************************
**
                                                **
**                                        EEEEEEEEEEEEEEE       TTTTTTTTTTTTT
NNNNNNN       NNNNN                               **
**                                        EEEEEEEEEEEEEE        TTTTTTTTTTT
NNNNNNNN      NNNNN                               **
**                                        EEEEE               A        TTTT        OOO
NNNNNNNNN     NNNNN                               **
**                                     EEEEEEEEEEEE     AAA      TTT      OOOOOOOO   NNNNN
NNNN   NNNNN                               **
**                                     EEEEEEEEEEE     AAAAA     TTT      OOOOOOOO   NNNNN
NNNN NNNNN                                 **
**                                     EEEEE                     TTTT       OOO      NNNNN
 NNNNNNNNN                                 **
**                                     EEEEEEEEE     AAAAAAA     TTTTT               NNNNN
  NNNNNNNN                                 **
**                                     EEEEEEEE     AAAAAAAAA    TTTTTTT             NNNNN
   NNNNNNN                                 **
**
                                               **
**        This software (firmware) developed by EATON-KENWAY is proprietary.  Source
code on listings or any other media       **
**        is not for sale or loan and may not be copied or transferred to any vendor,
buyer, or consultant.  Executable       **
**          code is available in ROM and is sold with the original product or as a
product upgrade.  Buyer shall not          **
**         copy or distribute ROM's with E-K firmware to any third party without the
prior written approval of EATON-KENWAY.   **
**           Title to and ownership of the software shall at all times remain with
EATON-KENWAY.   The information  in this      **
**           is subject to change without notice  and should not be construed as a
commitment by EATON-KENWAY.                    **
**
                                               **
**          EATON-KENWAY   assumes  no  responsibility  for  the  use or reliability
of  its  software on  equipment which     **
**           is  not supplied EATON-KENWAY or has been modified without EATON-KENWAY
approval.                                    **
```

```
**
                                                 **
**          Copyright 1989
                 KENWAY, INCORPORATED       **
*******************************************************************************
**********************************************
  V4Vars     V4Vars     V4Vars     V4Vars     V4Vars     V4Vars     V4Vars     V4Vars
V4Vars     V4Vars     V4Vars     V4Vars     V4Vars
  DATE CREATED:  Feb 89
  AUTHOR:        Vehicle Group
  DESCRIPTION:
    xxx......            ....
  PROGRAM HISTORY:
  Date          Initials/No.        Description
  ---------    ------------        ---------------------------------------
* * * * * * * * * * * * * * * * * * * * * * * * * * * * * * * * * * * * * * * * * * *
* * * * * * * * * * * * * * * * * * * * * * */

#define  TRUE  1
#define  FALSE 0
  /* *****************  The following are consts are from vcmdt ************* */
#define  CMD_BUFF_LEN    256
#define  CMD_BUFF_END    (CMD_BUFF_LEN -1)
#define  CMD_QUE__SIZE  32    /* number of records in command_queue */
#define  CMD_QUE__END_INDX  (CMD_QUE__SIZE -1)
#define  MVQ__SIZE  16              /* records in move queue */
#define  MVQ__END_INDX (MVQ__SIZE -1)
#define  MVQ__MAX_UNEXCUTD  (MVQ__SIZE -3)
#define  AFTER_TURN_WINDOW_G    18     /*  window(") to look for event after turn */
#define  AFTER_MOVE_WINDOW_G    12     /*  window(") to look for event after move */
#define  MAX_COMMANDED_SPEED    240    /*  ft/min */
#define  DIST__TABL_UNITS  10
#define  DIST__TABLE_MAX  ( ( MAX_COMMANDED_SPEED -1) / DIST__TABL_UNITS )
#define  FIXD_PT_SCAL  100.0
#ifndef  min         /* conflict when used with microsoft 'C' */
#define  min(a,b)  ( ((a) < (b)) ? (a) : (b) )    /* 'a' & 'b' are non incremental
expressions (not a++) */
#define  max(a,b)  ( ((a) > (b)) ? (a) : (b) )
#endif
/*#define  ROUND(t,a)   ((t)(a))*/      /* (level 3 optimization) 't' is type int,
unsigned, char; 'a' is a float expression */
#define  ROUND(t,a)   ((t)( 0.5 +(a) )) /*(optm levl 0-2 't' is type int, unsigned,
```

```
char; 'a' is a float expression */
#define  I_ROUND(a)  ((int)((a) +(((a)>=0.0) ? 0.5 : -0.5) )) /*(optm levl 0-2 't'ype
is int, unsigned, char; 'a'= float expr */
#define  NEGATE_WRD(a) ((unsigned)(-(int)(a)))
#define  CQ_WRAP(a)  ((a) & CMD_QUE__END_INDX)        /* 'a'= variable */
#define  GUIDANCE_ANTENNA(a) (max( get_analog_in((a)) -guid_ant_noise_offset, 0))
typedef  enum { RADIUS_TURN_C, S_TURN_C, COMPLETE_S_TURN_C } turn_option_type;
typedef    enum  {  NONACTIVE,  ACTIVE,  ALREADY_SLOWDOWN,  NONSTOP,  STOPPED  }
vehicle_status_type;
typedef   enum  {  CLEAR_OF_WIRE_E,  INSIDE_ANT_APPROACH_E,  OUTSIDE_ANT_APPROACH_E,
ANTENNAS_CENTERED_E } guidance_status_type;
typedef enum { V_MOTION_CMD, V_SUB_SYS_CMD, V_INIT_CMD, V_IMMED_CMD, V_CMND_EXTENSION
} command_type;
typedef    enum   {  PORTSIDE_V,  STARBOARD_V,  MOVEMENT_V,  WARNING_V,  IDLE_V  }
light_cmd_type;
typedef  enum { NO_INTERRUPT, STOP_DISTANCE_INTERRUPT, MINIMUM_DISTANCE_INTERRUPT }
hcu_encoder_actions;
typedef     enum   {   NOT_ROTATE_V,   NORMAL_ROTATE_V,   SPECIAL_180_ROTATE_V   }
after_rotate_type;
typedef  enum { IGNORE_V, AFTER_TURN_V, AFTER_MOVE_V } after_turn_or_move_type;
typedef  enum
{ ACTQ_IS_EMPTY_V, ACT_NOP_V, MAG_CREEP_V, MAG_ACCEL_V, MAG_DECEL_V,              /*
0..4 */
  VIR_ACCEL_V, VIR_DECEL_V, INT_CREEP_V, INT_ACCEL_V, INT_DECEL_V,
/* 5..9 */
  TURN_RIGHT_FRONT_V,   TURN_LEFT_FRONT_V,   TURN_RIGHT_REAR_V,   TURN_LEFT_REAR_V,
ROTATE_RIGHT_FRONT_V,    /* 10..14 */
  ROTATE_LEFT_FRONT_V,   ROTATE_RIGHT_REAR_V,   ROTATE_LEFT_REAR_V,   ROT_ACCEL_V,
ROT_DECEL_V,            /* 15..19 */
  ROT_ROTATE_V, PARK_VEHICLE_V, COMPLETE_CMD_V, FINE_POSITION_V, SET_SPEED_V,
       /* 20..24 */
  INITIAL_VEH_V, PREPARE_FOR_TURN_V, STABZ_TURN_V, ROT_STABZ_V,
 /* 25..28 */
  VIR_NOP_V, OPTIONAL_CONTROL_CMD_V                           /* 29..30 */
} act_status_type;
typedef enum
{ MV__NOP,         /* end of que, position for next move */
  MV__DEFN_POS,    /* define vehicle position in factory frame */
  MV__STR_SEG,     /* Move with straight segment algorithm */
  MV__TURN_SEG,    /* Move with turn segment algorithm */
  MV__INSRT_XY,    /* XY coord with events Insert procedure */
  MV__INSRT_WIRE, /* Wire guidance insert procedure */
```

```
  MV__ON_WIRE,     /* and other commands from "act_status_type" when wire added */
  MV__UNDF         /* undefined, may be used in future */
} mvq_cmnd_type;
typedef struct
{ char  enc_chn_insd;
  char  enc_chn_outs;
  char  ao_chn_insd;
  char  ao_chn_outs;
  char  antn_ch_insd;
  char  antn_ch_outs;
  char  contactor;
  light_cmd_type  lights;
  act_status_type  next_cmd;    /*  used exclusively for S-turns  */
}  motion__io_def_type;
typedef union
{  int ndx[2];
   struct
   { int outsd;
     int insd;
   } rfr;
} i_o__ref_type;
typedef struct
{ int outs;
  int insd;
} in_out_type;
  /* defines pointer to a debug log file.  Each required file is defined by     a
file_spec as followed.  */
typedef struct
{ unsigned  *log_pointer;    /* first address of the log file(array) */
  unsigned  length_mask;           /* 15, 31, 63, etc */
  unsigned  index;              /* offset into log file  Range    (0 .. length_mask)
*/
} log_file_spec_type;
typedef struct
{ unsigned char  event_flag;
  unsigned char  after_turn_flag;
  int  distance_count_down;
} encoder_log_q_type;

typedef struct
{ mvq_cmnd_type command;          /* MV__STR_SEG( 34[0x22]; MV__TURN_SEG( 35[0x23] */
  unsigned path;                      /* Bits 0-1:  00 - dead reckon ( not used in
```

```
turn/rotate commands )
                                              01 - follow F1
                                              10 - follow F2
                                              11 - follow ( use internal generator
                                       Bit 2: Vehicle Orientation (Forward_is_Front= TRUE)
                                           3: X,Y defined from center(1), else Forward
end(0,default)
                                              (reused by motion after translation as flag
to note pre-turn-on for wire sensing )
                                           4: Obstacle detection[ on(1), off(0) ]
                                           5: Update Marker Present(1)
                                           6: Update Marker Type (Magnet=0, wire-x=1)
                                           7: MANDITORY_STOP at end of seq.(regardless of
next segment speed)
                                           8: LOAD-SENSING (load present on deposit)
                                           9: LOAD-SENSING (no load on pickup)
                                          10: CALIBRATION
                                          11-15 spare
                                   */
  unsigned  last_trns_indx;          /* 0 if intermediate move, else index of last
translated command */
  unsigned char estim;             /* estimated time to complete manuever(5ths of sec) */
  unsigned char setpt;               /* actual speed used in zone, range 0-255 apprx=
0-63.75 meters per min */
  double x;                         /* X-coord(destination waypoint in factory)  */
                                    /*    Turn radius for turn moves */
                                    /*   Marker Window size (+/-) in wire guided moves */
  double y;                         /* X-coord(destination waypoint in factory) */
                                    /*    Unused in turns */
                                    /*    X-distance to marker in wired guided moves */
  double heading;                   /* desired veh-fact destination heading */
  double len_acl;                    /* length(dist) of accel( computed from delta speed
from prev segment) */
                                    /* also AGVC  X-coords dummy for 1st magnet during
insertion */
  double len_dcl;                  /* length(dist) of decel( computed from delta speed to
next segment) */
                                    /* also AGVC  Y-coords dummy for 1st magnet during
insertion */
  double len_seg;                   /* (estimated)length of 'x' in waypoint frame */
                                    /*    X-distance dimension for wired guided moves */
  double ums_x;                      /* UpdateMarkerSystemX-coordinate, 0=not_used; 2nd
```

```
UpdateMarkerCoord(insertion) */
                                    /* also AGVC  X-coords dummy for 2nd magnet during
insertion */
  double ums_y;                       /* UpdateMarkerSystemY-coordinate, 0=not_used; 2nd
UpdateMarkerCoord(insertion) */
                                    /* also AGVC  Y-coords dummy for 2nd magnet during
insertion */
  /* etc. */
} mv_rcrd_type;
typedef struct
{ unsigned excut;    /* execute this record next */
  unsigned load;    /* load this record next */
  mv_rcrd_type lst[ MVQ__SIZE ];  /* que list of commands */
} mvq_type;

typedef struct
{ double left;
  double right;
} mcp_whls_type;
typedef struct
{ unsigned char orientation;
  unsigned char orientation_last;
  unsigned char setpt;
  double distn;
  double wr;       /* Omega(ratio) - deviation */
} mcp_sp_dv_type;

typedef struct
{ double x;
  double y;
  double x_scale;
} ums_offset_type;
typedef struct
{ double x;
  double y;
  double ang;
} x_y_postn_type;
typedef struct
{ double unity;        /* (speed at 1.0 gain)^2 (squared) */
  double min_limit;    /* min speed gain limit(squared)*/
  double exp;          /* exponential gain control of wr */
} cntrl_gain_type;
```

```
typedef struct
{ double ports;  /* ticks per meter */
  double starb;
  double sum;
} encd_scal_type;
#define U_M_LOG_SZ  2         /* must be a multiple of 2 */
#define U_M_LOG_MSK (U_M_LOG_SZ -1)
typedef struct
{ double pos_y;           /* y distance measured by U_M_S */
  double heading;       /* average value of last "n" heading values */
  double *mark_x;       /* address marker position as specified by AGVC */
  double *mark_y;       /* address marker position as specified by AGVC */
  double veh_err_x;     /* vehicle position referenced to marker coordinates */
  double veh_err_y;     /* vehicle position referenced to marker coordinates */
  double avrg_err_x;    /* future - running average (time base 4)--tmp X */
  double avrg_err_y;    /* future - running average (time base 4)--tmp Y */
  double ip_heading;
} u_m_log_type;

typedef union          /* common definition of commands */
{ base_type  bs_flds;    /* basic fields msg_typ, seq_numb, for use with all common
command fields */
  xy_mark_type xy_marker;      /* define location of magnet marker */
  xyh_mov_type xyh_mov;        /* move to x,y,heading(factory coords */
  xyh_mov_type xyh_defn;       /* define new x,y,heading(factory coords */
  xyh_insrt_type insrt_prfx;      /* define insert, marker locations */

  bas_mv_type  bs_mov;         /* basic fields,  for use with standard move fields */
  move_to_magnet_type  mov_to_mag;
  move_to_virtual_type  mov_to_vir;
  move_to_intersection_type  mov_to_intr;
  rotate_type  rotate;
  turn_type  turn;
  magnet_uturn_type  bs_uturn;        /* for use with common uturn fields */
  magnet_uturn_type  magnet_uturn;
  virtual_uturn_type  vir_uturn;
  intersection_uturn_type  intrsec_uturn;
  magnet_sturn_type  bs_sturn;        /* for use with common sturn fields */
  magnet_sturn_type  magnet_sturn;
  virtual_sturn_type  vir_sturn;
  intersection_sturn_type  intrsec_sturn;
  set_vehicle_speed_type  set_speed;
```

```
  gcl_subsystem_old_cmnd_type  gcl_old_styl_cmd;
  gcl_subsystem_command_type  gcl_sub_cmd;
  gcs_subsystem_command_type  gcs_sub_cmd;
  gcn_subsystem_command_type  gcn_sub_cmd;
  gcr_subsystem_command_type  gcr_sub_cmd;
  gcf_subsystem_command_type  gcf_sub_cmd;
  request_status_type  req_stats;
  initialize_vehicle_type  init_veh;
  poll_vehicle_type  poll_veh;
  agvc_stat_err_code_type  agvc_stat_er;
  sleep_command_type  sleep_cmd;
  load_id_type  load_id;
  optional_control_type  optional_control;
} cmd_def_type;
typedef union      /* commands send from agvc but split in veh */
{ agvc_xyh_mrk_type  xyh_mvmrk;    /* split to defn_marker, defn_mov commands */
  agvc_xyh_insrt_type  xyh_mvinsrt; /* split to insert and defn_move commands */
} agvc_cmd_def_type;
typedef union     /* commands sent from AGVC */
{ agvc_cmd_def_type  da;
  cmd_def_type  dc;
} cmnd_buf_type;
typedef  struct
{ unsigned char  cmd_typ;                              /* [0] */
  unsigned char  cmd_queue_translate;                  /* [1] */
  cmd_def_type cmdx;           /* common definition of commands */     /* [2] */
  encoder_log_q_type  e_l;     /* encoder logging fields */
} commands_type;

  /*  PUBLICS FROM VINIT  */
extern unsigned  vinimt;        /* INITIALIZATION MAILBOX TOKEN */
extern unsigned  vhcumt;        /* HAND CONTROLLER MAILBOX TOKEN */
extern unsigned  vcmdmt;        /* COMMAND PROCESSOR MAILBOX TOKEN */
extern unsigned  vactmt;        /* ACTION (MOTION) MAILBOX TOKEN */
extern unsigned  vtrnmt;        /* TRANSLATION (MOTION) MAILBOX TOKEN */
extern unsigned  vsubmt;        /* SUBSYSTEMS MAILBOX TOKEN */
extern unsigned  vcommt;        /* COMMUNICATIONS MAILBOX TOKEN */
extern veh_status_type  veh_status;
extern vehicle_load_id_type  load_id_number;
/* -- "VEH_EXTERN" each modual set "extern" or blank(public) defining moduals global
variables */
#if defined(VEH_PUBLIC)
```

```
#define VEH_EXTERN
#else
#define VEH_EXTERN extern
#endif
  /* ************* PUBLICS FROM VCOMT **************** */
VEH_EXTERN char  comena;
VEH_EXTERN unsigned comstat;
  /* *************** Shared Variables - MOV and TRANSLATION ****************  */
VEH_EXTERN mvq_type  mvq;
VEH_EXTERN mv_rcrd_type *pt__mvq_prv;
VEH_EXTERN mv_rcrd_type *pt__mvq;
VEH_EXTERN mv_rcrd_type *pt__mvq_nxt;
VEH_EXTERN mcp_sp_dv_type  mcp;
VEH_EXTERN int  y_ums;        /* UMS  y value read */
VEH_EXTERN u_m_log_type  u_m_log[ U_M_LOG_SZ ];    /* log last two Update Markers  */
VEH_EXTERN unsigned  u_m_log_indx;       /* use ( value & U_M_LOG_MSK) for array
reference and handle rollover */
VEH_EXTERN x_y_postn_type ins_vm2;      /* insert coords -- Vehicle when passing(with
x_latency) Magnet2 */
VEH_EXTERN x_y_postn_type ins_m1_m2;      /* insert coords -- Magnet2 relative to
Magnet1 */
VEH_EXTERN x_y_postn_type ins_vr;       /* insert coords -- Vehicle at "R"est after
passing Magnet2 */
VEH_EXTERN double pos_y_m2;            /* y(UMS) offset in vehicle frame at magnet2
*/
VEH_EXTERN struct     /* wire-guidance distance variables */
{ double coord;       /* 'x' coordinate ( 'y' doesn't exist on wire */
  double seg_bg;       /* 'x' at beginning of zone */
  double moved;       /* length moved in 'x' for each seg = "abs(coord - seg_bg)"  */
} distw;
VEH_EXTERN struct
  { unsigned nxt_stor;      /* next queue position to store command */
    unsigned nxt_setup;     /* next command to be setup for execution */
    unsigned nxt_exec;      /* next command to be executed */
    unsigned curr;          /* current command being executed */
    unsigned bundl_end;     /* the end of a command bundle sent to move */
  } cq_indx;

VEH_EXTERN commands_type  command_queue[ CMD_QUE__SIZE ];   /* [0..CMD_QUE__END_INDX]
*/
VEH_EXTERN unsigned char  transl_seq_agvc;
VEH_EXTERN int  turn_re_acqui_dist_range_raw;
```

```
VEH_EXTERN char  motion_translation_enabled;
VEH_EXTERN char  creep_to_first_event;
VEH_EXTERN double  turn_trans_dist_scale;
VEH_EXTERN  double  half_wheel_base;

typedef struct
{ double dim_2_end;
  double dim_2_wire_x;
  double dim_2_mag_rt;
  double dim_2_mag_lf;
  double auto_spd_limit;
  unsigned char setpt_lmt;
} bi_dir_type;
typedef struct
{ bi_dir_type fr;
  bi_dir_type rr;
} fr_rr_cnfg_type;
VEH_EXTERN fr_rr_cnfg_type cnfg_f_r;
VEH_EXTERN  struct
{ double ports;
  double starb;
  double ip;
} encd_in;
VEH_EXTERN  double  rotate_radius_radian;
VEH_EXTERN unsigned  vehicle_length_unit;
  /* ****************** publics from vcmdt ************* */
VEH_EXTERN unsigned char  command_buffer[ CMD_BUFF_LEN ];
VEH_EXTERN unsigned  mail_cmdt;   /* mail box data sent to motion or subsystems */
  /* for communications task (used as constants) */
VEH_EXTERN unsigned  SHORT_STATUS_LENGTH;      /* 1st 4 bytes of veh_status */
VEH_EXTERN unsigned  LONG_STATUS_LENGTH;       /* total bytes in veh_status */
VEH_EXTERN int  VCMD_LONG_STATUS;
VEH_EXTERN int  VCMD_SHORT_STATUS;
VEH_EXTERN unsigned  msg_attempts;
VEH_EXTERN unsigned  msg_complete;
VEH_EXTERN unsigned  msg_errors;
VEH_EXTERN char  do_long_status_flag;
VEH_EXTERN unsigned  agvc_err_status;
VEH_EXTERN unsigned long user_time;

  /*  variables defined in subsystem */
VEH_EXTERN char  top__lift_status;    /* TRUE:  load present */
```

```
  /*  simulator vcomt  */
VEH_EXTERN int  sim_cmd_buffers_count;
VEH_EXTERN int  tot_num_of_sim_cmd_buffers;
  /*  The following common variables apply to motion only  */
VEH_EXTERN motion__io_def_type  motion__io;
VEH_EXTERN unsigned char  vehicle_orientation;    /* hand control connected to front
or back determines whether front or rear is forward */
VEH_EXTERN unsigned  antenna_over_wire;
VEH_EXTERN unsigned  last_guidance_frequency;
VEH_EXTERN unsigned  last_motion_control;   /*  memory to check last contactor command
for motion */
VEH_EXTERN unsigned  tracking_command;        /* set by HCU or Motion */
VEH_EXTERN int  portside_wheel_setpoint;    /* set by HCU when not in automatic else
*/
VEH_EXTERN int  starboard_wheel_setpoint;
VEH_EXTERN int  portside_wheel_analog_center;
VEH_EXTERN int  starboard_wheel_analog_center;
VEH_EXTERN int  joystick_trackwire_speed;    /*  0-255 is 0 to 51.0 fpm */
VEH_EXTERN unsigned  wheel_contactor_command;        /* set by HCU */
  /*  [platforms] source flag to extract information useful to platforms  */
VEH_EXTERN unsigned  platform_contactor_command;    /* set by HCU */
VEH_EXTERN int  platform_setpoint;    /* set by HCU when not in automatic else, set by
command string */
  /* [command processor] source flag to extract information useful to command processor
*/
VEH_EXTERN unsigned  status_of_communications;
  /*  variables are shared between ACTION and HCU */
VEH_EXTERN int  micro_action;
VEH_EXTERN unsigned  dr_intent;
  /*  variables used between action and vactprocs */
VEH_EXTERN int  rotate_accel_factor;
VEH_EXTERN int  stop_distance_counts;
VEH_EXTERN  double  front_rotate_stop_distance;
VEH_EXTERN  double  rear_rotate_stop_distance;
VEH_EXTERN  double  front_pivot_stop_distance;
VEH_EXTERN  double  rear_pivot_stop_distance;
VEH_EXTERN int  mot_starboard_wheel_speed;
VEH_EXTERN int  mot_portside_wheel_speed;
VEH_EXTERN in_out_type  antn_valu;
VEH_EXTERN i_o__ref_type whl_setpt;

VEH_EXTERN int  current_encoder_reading;
```

```
VEH_EXTERN int  last_encoder_reading;
VEH_EXTERN int  wait_state_count;    /*  used in state 2 only */
VEH_EXTERN int  pivot_wait_state_count;
VEH_EXTERN int  last_speed;
VEH_EXTERN int  last_pivot_speed;
VEH_EXTERN unsigned  tracking_frequency;    /*  save what frequency we are tracking at
*/
VEH_EXTERN unsigned  contactor;        /*  save this contactor for wait state */
VEH_EXTERN unsigned  move_direction;       /*  according to vehical orientation */
VEH_EXTERN unsigned  encoder_channel;
VEH_EXTERN char  encoder_is_negative;
VEH_EXTERN unsigned  encoder_interrupt_status;
VEH_EXTERN hcu_encoder_actions  encoder_action_num_hcu;
VEH_EXTERN unsigned  action_mail;
VEH_EXTERN int  indx__cq_transl;       /*  point to command queue 0..15;used only in
translation */
VEH_EXTERN after_turn_or_move_type  after_turn_or_move;   /*  used to decide whats the
minimum decelerate distance */
VEH_EXTERN  double  speed_setpoint_calib;   /* output counts equal to full scale (1.0
meter per sec ) */
VEH_EXTERN  double  spd_setpt_scale;       /* convert fpm from AGVC to setpoint */
VEH_EXTERN  double  sensed_wire_turn_radius;
VEH_EXTERN  double  dim__wire_x_2_cntrln;
VEH_EXTERN  double  radius_turn_setpt_scale;   /*  linear slope for computeing radius
turn setpoint */
VEH_EXTERN  double  radius_turn_offset;       /*  linear slope for computeing radius
turn setpoint */
VEH_EXTERN int  max_rotate_setpoint;
VEH_EXTERN int  default_turn_wait_time;      /*  time to complete sensed event radius
turn */
VEH_EXTERN int  default_turn_os_wh_setpoint;   /*  outside wheel speed */
VEH_EXTERN unsigned  default_turn_accel_raw_dist;   /*  distance to accel to outside
wheel speed */
VEH_EXTERN int  warning_signal_wait_time;
VEH_EXTERN int  antenna_upper_threshold;

  /*  variables defining distances in raw encoder counts, counts_per_inch may be unique
for each vehicle type  */
VEH_EXTERN int  after_move_tolerance_count;
VEH_EXTERN int  after_turn_tolerance_count;
VEH_EXTERN int  virtual_adjust_encoder_count;
VEH_EXTERN int  after_turn_decel_dist_count;
```

```
VEH_EXTERN int  after_move_decel_dist_count;
VEH_EXTERN int  minimum_distance_count;
VEH_EXTERN int  dist__raw_creep_min;
VEH_EXTERN int  dist__raw_creep_max;
VEH_EXTERN int  encoder_interp_tolerance_count;
VEH_EXTERN int  event_window__after_move;
VEH_EXTERN int  event_window__after_turn;
VEH_EXTERN char  calibration_active_flag;
VEH_EXTERN unsigned u_m_insrt_indx;
VEH_EXTERN int  obstacle_range_span;          /* obstacle detection related variables
*/
VEH_EXTERN char  obstacle_detection_active;     /*  TRUE - obstacle detection active,
variable controlled by AGVC,
      motion_control_switches(set by HCU) can overwrite this variable */
/*  Start BBR -- MASTER_INITIALIZE_FLAG_BEGIN  some things initialized once only --
Start BBR */
  VEH_EXTERN char  revision_id[12];
  VEH_EXTERN char  vehicle_name[20];
  VEH_EXTERN char  password_key[20];
  VEH_EXTERN unsigned char  sub_sys_platform_wait;
  VEH_EXTERN unsigned  sub_system_process_flags;  /*  used by subsystems for general
flag set */
  VEH_EXTERN unsigned  clock_count;
  VEH_EXTERN unsigned  clock_rollover;
  VEH_EXTERN unsigned  vehicle_number;          /* 0 to 255 */
  VEH_EXTERN unsigned  load_cleared_timer;

  VEH_EXTERN  encd_scal_type encd_scal;
  VEH_EXTERN  encd_scal_type scal_tick_2meter;   /* (1.0 / encd_scal  for  fast calc)
*/

  VEH_EXTERN double  dimension__wheelbase;     /* dimension between encoders in meters
*/
  VEH_EXTERN double  dim__drv_wheelbase;       /* dimension between drives in meters
*/
  VEH_EXTERN ums_offset_type ums_offset;              /* UMS Offsets x and y */
  VEH_EXTERN cntrl_gain_type wr_gain;                          /* dynamic gain for
wr(omega_ratio) 'a'= (setpt at base gain(1))^2.0 */
                                                   /* 'b' = min gain^2.0 */
  VEH_EXTERN double  accel_base_conv;           /* base to convert distances for a
given accel/decel */
  VEH_EXTERN double  motion_accel_decel_rate;     /* meters per sec^2 */
```

```
  VEH_EXTERN double  turn_speed_min;
  VEH_EXTERN double  turn_speed_max;
  VEH_EXTERN int   zero_speed_threshold;          /* highest safe speed to switch
contactors; joystick 0 threshold */
  VEH_EXTERN int  turn_ratio_bias;
  VEH_EXTERN int  battery_condition_scale;
  VEH_EXTERN int  max_rotate_speed;
  VEH_EXTERN unsigned  speaker_freq_movement;
  VEH_EXTERN unsigned  speaker_duration_movement;
  VEH_EXTERN unsigned  light_duration_movement;
  VEH_EXTERN unsigned  speaker_freq_turn;
  VEH_EXTERN unsigned  speaker_duration_turn;
  VEH_EXTERN unsigned  light_duration_turn;
  VEH_EXTERN unsigned  motion_warning_delay;
  VEH_EXTERN char  bumper_recovery_threshold;
  VEH_EXTERN unsigned  auto_recovery_delay;
  VEH_EXTERN unsigned  radius_turn_wait_time;
  VEH_EXTERN int  radius_turn_gain;
  VEH_EXTERN char  max_platform_speed;

  VEH_EXTERN char  logical_load_present_flag;
  /*  vehicle may overshoot after sensing event, may be speed related, this factor
adjusts distance by speed,
    investigate this in the future */
  VEH_EXTERN char wire_cross_encoder_adjustment;   /* adjust physical event senseing
lost counts */
  VEH_EXTERN char  magnet_encoder_adjustment;    /*  adjust physical event senseing
lost counts */
  /*  automatic restart variables */
  VEH_EXTERN char  previous_path_dscrpt;    /*  used in u-turn and automatic recovery
after power off/on */
  VEH_EXTERN unsigned  previous_fine_unit;    /*  save fine distance to adjust next
move command */
  VEH_EXTERN unsigned  option;
  VEH_EXTERN int  agvc_commanded_speed;
  VEH_EXTERN after_rotate_type  after_rotate;        /*  notify of previous rotate
command */
  VEH_EXTERN unsigned  motion_control_switches;     /*  defines switches, obstacle
detection, calibration, etc
                                                    Bit 4 - Obstacle detection active
                                                    Bit 8 - Load Sensing - Full stand
and Loaded vehicle
```

```
                                                        Bit 9 - Load Sending - Empty
stand and Empty vehicle
                                                           (if bit 8 is set bit 9 must
be set)
                                                        Bit 10 - Calibration */
  VEH_EXTERN unsigned  hcu_mode_switches;           /* control of Hcu options */
  /*  obstacle detection active related variables  */
  /*  variable derived from obstacle_detection_active AND AGVC message, set / reset by
command processor, used in motion */
  VEH_EXTERN int  max_obstacle_ref;
  VEH_EXTERN int  min_obstacle_setpoint;
  VEH_EXTERN int  min_obstacle_setpt_scaled;
       /*  variables used in HCU */
  VEH_EXTERN int  guid_ant_noise_offset;
  VEH_EXTERN int  battery_voltage_scale;
  VEH_EXTERN int  battery_current_scale;
  VEH_EXTERN int  acceleration_factor;        /* acceleration limit when using joy
stick */
  VEH_EXTERN int  deceleration_factor;        /* deceleration limit when using joy
stick */
  VEH_EXTERN int  right_turn_threshold;      /* turn setting when in track_wire_mode.
*/
  VEH_EXTERN int  left_turn_threshold;       /* turn setting when in track_wire_mode.
*/
  VEH_EXTERN int  man_forward_speed_base;       /* speed_base ratios HCU speeds from
normal vehicle speeds */
  VEH_EXTERN int  acqui_forward_speed_base;    /* speed_base ratios HCU speeds from
normal vehicle speeds */
  VEH_EXTERN int  forward_speed_base;         /* speed_base ratios HCU speeds from
normal vehicle speeds */
  VEH_EXTERN int  backward_speed_base;         /* (negative) speed_base ratios HCU
speeds from normal vehicle speeds */
  VEH_EXTERN int  maximum_forward_speed;       /*  for motion use */
/* End of BBR -- MASTER_INITIALIZE_FLAG_END -- End of BBR */

  /*  variables used in shuttle top system only */
VEH_EXTERN char  load_orientation_enable;
  /*  variables used in all vehicle software */
VEH_EXTERN unsigned distance_table[ DIST__TABLE_MAX +1 ];
VEH_EXTERN int password_status;
#if defined(VEH_PUBLIC)
  /*  move to event  */
```

```
const motion__io_def_type FRONT_IS_FORWARD_IO_C = { ENCD__PORTS_WHL_ADR,
ENCD__STARB_WHL_ADR,
 A_OUT_CH__PORTS_DRV, A_OUT_CH__STARB_DRV, VIN_LEFT_ANTENNA_G, VIN_RIGHT_ANTENNA_G,
0, MOVEMENT_V, ACT_NOP_V };
 const motion__io_def_type REAR_IS_FORWARD_IO_C = { ENCD__STARB_WHL_ADR,
ENCD__PORTS_WHL_ADR,
 A_OUT_CH__STARB_DRV, A_OUT_CH__PORTS_DRV, VIN_RIGHT_ANTENNA_G, VIN_LEFT_ANTENNA_G,
0, MOVEMENT_V, ACT_NOP_V };
 /* Turns */
 const motion__io_def_type LEFT_FRONT_C = { ENCD__PORTS_WHL_ADR, ENCD__STARB_WHL_ADR,
 A_OUT_CH__PORTS_DRV, A_OUT_CH__STARB_DRV, VIN_LEFT_ANTENNA_G, VIN_RIGHT_ANTENNA_G,
0, PORTSIDE_V, TURN_RIGHT_FRONT_V };
 const motion__io_def_type RIGHT_REAR_C = { ENCD__PORTS_WHL_ADR, ENCD__STARB_WHL_ADR,
 A_OUT_CH__PORTS_DRV, A_OUT_CH__STARB_DRV, VIN_LEFT_ANTENNA_G, VIN_RIGHT_ANTENNA_G,
0, PORTSIDE_V, TURN_LEFT_REAR_V };
 const motion__io_def_type LEFT_REAR_C = { ENCD__STARB_WHL_ADR, ENCD__PORTS_WHL_ADR,
 A_OUT_CH__STARB_DRV, A_OUT_CH__PORTS_DRV, VIN_RIGHT_ANTENNA_G, VIN_LEFT_ANTENNA_G,
0, STARBOARD_V, TURN_RIGHT_REAR_V };
 const motion__io_def_type RIGHT_FRONT_C = { ENCD__STARB_WHL_ADR,
ENCD__PORTS_WHL_ADR,
 A_OUT_CH__STARB_DRV, A_OUT_CH__PORTS_DRV, VIN_RIGHT_ANTENNA_G, VIN_LEFT_ANTENNA_G,
0, STARBOARD_V, TURN_LEFT_FRONT_V };
 /* Rotates */
 const motion__io_def_type ROT_IO__RIGHT_FRONT_C = {ENCD__STARB_WHL_ADR,
ENCD__PORTS_WHL_ADR, A_OUT_CH__STARB_DRV,
 A_OUT_CH__PORTS_DRV, VIN_RIGHT_ANTENNA_G, VIN_LEFT_ANTENNA_G, ROTATE_RIGHT_COMMAND_G,
MOVEMENT_V, ACT_NOP_V };
 const motion__io_def_type ROT_IO__RIGHT_REAR_C = {ENCD__STARB_WHL_ADR,
ENCD__PORTS_WHL_ADR, A_OUT_CH__STARB_DRV,
 A_OUT_CH__PORTS_DRV, VIN_LEFT_ANTENNA_G, VIN_RIGHT_ANTENNA_G, ROTATE_RIGHT_COMMAND_G,
MOVEMENT_V, ACT_NOP_V };
 const motion__io_def_type ROT_IO__LEFT_FRONT_C = { ENCD__PORTS_WHL_ADR,
ENCD__STARB_WHL_ADR, A_OUT_CH__PORTS_DRV,
 A_OUT_CH__STARB_DRV, VIN_LEFT_ANTENNA_G, VIN_RIGHT_ANTENNA_G, ROTATE_LEFT_COMMAND_G,
MOVEMENT_V, ACT_NOP_V };
 const motion__io_def_type ROT_IO__LEFT_REAR_C = {ENCD__PORTS_WHL_ADR,
ENCD__STARB_WHL_ADR, A_OUT_CH__PORTS_DRV,
 A_OUT_CH__STARB_DRV, VIN_RIGHT_ANTENNA_G, VIN_LEFT_ANTENNA_G, ROTATE_LEFT_COMMAND_G,
MOVEMENT_V, ACT_NOP_V };
#else
    /* move to event */
 extern const motion__io_def_type FRONT_IS_FORWARD_IO_C;
```

```
  extern const motion__io_def_type  REAR_IS_FORWARD_IO_C;
      /*  Turns  */
  extern const motion__io_def_type  LEFT_FRONT_C;
  extern const motion__io_def_type  RIGHT_REAR_C;
  extern const motion__io_def_type  LEFT_REAR_C;
  extern const motion__io_def_type  RIGHT_FRONT_C;
      /*  Rotates  */
  extern const motion__io_def_type  ROT_IO__RIGHT_FRONT_C;
  extern const motion__io_def_type  ROT_IO__RIGHT_REAR_C;
  extern const motion__io_def_type  ROT_IO__LEFT_FRONT_C;
  extern const motion__io_def_type  ROT_IO__LEFT_REAR_C;
#endif
```

```
/*  V4HCU_AA    V4HCU_AA    V4HCU_AA    V4HCU_AA    V4HCU_AA    V4HCU_AA    V4HCU_AA
V4HCU_AA   V4HCU_AA   V4HCU_AA   V4HCU_AA
*****************************************************************************************
************************************************
**
                                            **
**                                      EEEEEEEEEEEEEEE      TTTTTTTTTTTTT
NNNNNNN      NNNNN                              **
**                                      EEEEEEEEEEEEEE       TTTTTTTTTTT
NNNNNNNN     NNNNN                              **
**                                      EEEEE              A        TTTT        OOO
NNNNNNNNN    NNNNN                              **
**                                  EEEEEEEEEEEE      AAA      TTT       OOOOOOOO   NNNNN
NNNN  NNNNN                                 **
**                                  EEEEEEEEEEE      AAAAA     TTT       OOOOOOOO   NNNNN
NNNN NNNNN                                  **
**                                  EEEEE                      TTTT        OOO      NNNNN
 NNNNNNNNN                                  **
**                                  EEEEEEEEE       AAAAAAA    TTTTT                NNNNN
  NNNNNNNN                                  **
**                                  EEEEEEEE      AAAAAAAAA    TTTTTTT              NNNNN
   NNNNNNN                                  **
**
                                            **
**        This software (firmware) developed by EATON-KENWAY is proprietary.  Source
code on listings or any other media       **
**        is not for sale or loan and may not be copied or transferred to any vendor,
buyer, or consultant.  Executable       **
**          code is available in ROM and is sold with the original product or as a
product upgrade.  Buyer shall not           **
**         copy or distribute ROM's with E-K firmware to any third party without the
prior written approval of EATON-KENWAY.   **
**           Title to and ownership of the software shall at all times remain with
EATON-KENWAY.   The information  in this      **
**           is subject to change without notice  and should not be construed as a
commitment by EATON-KENWAY.                   **
**
                                            **
**          EATON-KENWAY   assumes  no  responsibility  for  the  use or reliability
of  its  software on  equipment which      **
**          is  not supplied EATON-KENWAY or has been modified without EATON-KENWAY
approval.                                  **
```

```
**
                                                  **
**          Copyright 1989
                 KENWAY, INCORPORATED       **
************************************************************************************
*********************************************
  V4HCU_AA   V4HCU_AA   V4HCU_AA   V4HCU_AA   V4HCU_AA   V4HCU_AA   V4HCU_AA   V4HCU_AA
 V4HCU_AA   V4HCU_AA   V4HCU_AA
    DATE CREATED:  Feb 89
    AUTHOR:        Vehicle Group
    DESCRIPTION:
      xxx......             ....
    PROGRAM HISTORY:
    Date        Initials/No.        Description
    ---------   ------------        ---------------------------------------
* * * * * * * * * * * * * * * * * * * * * * * * * * * * * * * * * * * * * * * * * * *
* * * * * * * * * * * * * * * * * * * * * */
          /*  "EXTERN" #defines" global(blank) or "extern" memory */
#include <stdio.h>
#include <stdlib.h>
#include <string.h>
#include <math.h>
#define VEH_PUBLIC
#define HCU_PUBLIC
#include "V4MESGS.K"          /* definition of vehicle messages */
#include "V4MOTION.K"         /*  definition of the motion constants */
#include "V4HCOMMN.K"         /* definition of hand control constants */
#include "V4INIT_D.K"        /* function prototypes for assembler(VINIT) routines */
#include "V4VARS.K"          /*  definition of common variables for two or more tasks
*/
extern const char revision_mstr[];
extern mv_rcrd_type *pt__mvq;
extern double xvf, yvf;
extern double tfv, tfvi, tip;
double base_speed;
unsigned insert_request;    /* temporary buffer to allow request to hold during AGVC
activity */
void init_nav_position( double x, double y, double angl );
void insert_on_wire( );
void insert_on_floor( );
void automatic_display_master( );
void basic_update( );
```

```
void define_distance( );
void hand_control_menu( );
void platform_control( );
void set_vehicle_alarms( unsigned horn_frequency, unsigned horn_pulse_frequency,
unsigned light_freq__e_stp );
void initialize_motion( );
void initialize_subsys( );
void display_memory( );
void display_mem_init( );
void mov_init_master( );
void display__u_m_s_log( );

#define DEFAULT_PASSWORD "ABC"
#define DEFAULT_NAME "N O E L L E"
void initialize( )   /* Power Up initialization sequences, master initialize( firware
replacement ) */
{ unsigned point;
  unsigned temporary_error_code;
        /* master initialization necessary? */
  if( strcmp( revision_id, revision_mstr) )
  { non_token_pointer = 0;        /* clear/reset */
    for ( point= 0; point <= 15; point++ ) non_token_buffer[ point ] = 0;
    man_forward_speed_base = 80;        /*  1/128 speed_base ratios HCU speeds from
normal vehicle speeds */
    acqui_forward_speed_base = 60;        /*  1/128 speed_base ratios HCU speeds from
normal vehicle speeds */
    backward_speed_base = 140;        /*  ( must be negative )3/4 1/128 speed_base
ratios HCU speeds normal vehicle speeds */
    maximum_forward_speed = 80;        /*  feet/min   for motion use */
    strcpy( password_key, DEFAULT_PASSWORD );  /* Default password */
    strcpy( vehicle_name, DEFAULT_NAME );    /* Default vehicle name */
    vehicle_number = 0;
    hcu_mode_switches = 0;
    motion_control_switches = 0;        /*forced setup ( all switches off ) of these
option*/
    battery_voltage_scale = ( 255 /*100%scale*/ *100 /*fixed point*/ ) / 60 /*volts(
assumed battey voltage )*/;
    clock_rollover = 20;
    auto_reset = 0;        /* no automatic pickup of bumper reset on startup */
    veh_status.sequence_error = 0;
    veh_status.vehicle_error = veh_status.error = 0;
    veh_status.status_set = 0;
```

```
    veh_status.ss.gcl_m.gcl_f = 0;          /*this will reset GCS and GNF too*/
    display_mem_init( );
    initialize_motion( );
    initialize_subsys( );
    mov_init_master( );
    configure_vehicle( );        /* force mechanic to consider configuration with new
firmware or initialization error */
  }
  else
  { /*prepare for master initialization should errors occur in standard initialization
      errors ususally occur when illegal values are HCU configured causing un/over flow
calculations */
    revision_id[0] = 0;    /* temporary, to force master-init if error occurs during
remainder of initialization */
  }
  clock_count = clock_rollover;    /* force wait time counter to resset */
  forward_speed_base = man_forward_speed_base;     /*  1/128 speed_base ratios HCU
speeds from normal vehicle speeds */
  zero_speed_threshold = 4;           /* highest safe speed to switch contactors, and
joystick low-limit */
  acceleration_factor = 2;            /* acceleration limit when using joy stick */
  deceleration_factor = 4;            /* deceleration limit when using joy stick */
  right_turn_threshold  = TRACK_TURN_THRESHOLD;           /*  turn  setting  when  in
track_wire_mode. */
  left_turn_threshold  = -TRACK_TURN_THRESHOLD;           /*  turn  setting  when  in
track_wire_mode. */
  vehicle_action_text = WAITING_MESSAGE;
  display_in_automatic = DSPL_DISABLED;
  rcvmcnt = 0;             /* reset communications */
  msg_complete = 0;         /* reset communications */
      /*interrupts  brake  release,  power  disabled,  hcu  in(front/rear),  top  limit
sw(raised/lowered), load present */
  set_byte_discrete_in( PORT_1, PORT_1_COMPLETE_MASK, INTERRUPT_ON_ANY_CHANGE );
      /*interrupts  guidance  tracking,  magnets  (  front/rear  (portside/starboard),
wire-X( f1/f2 ), motor breaker */
  set_byte_discrete_in( PORT_4, PORT_4_COMPLETE_MASK, INTERRUPT_ON_ANY_CHANGE );
      /*set up interrupt table for the interrupts necessary to run the hand control
programs*/
  for ( point = VEHICLE_BRAKES_POINT; point <= HCU_REAR_CONNECT_POINT; point++ )
    set_mask(  DISCRETE_IN,  point,  (  HIGH_TO_LOW_MASK  |  LOW_TO_HIGH_MASK  ),  (
ENABLE_HIGH_TO_LOW | ENABLE_LOW_TO_HIGH ) );
  temporary_error_code = error_code;        /* save to restore later if there are no
```

```
errors in initialization */
  disable_interrupts( );                          /* allow no others tasks during this
initialization */
  error_code = 0x8003;    /* initialization error; restored if no error occurs during
initialization */
  user_time = 0L;         /* reset master time clock */
  define_distance( );
    /*abort future  /master initializations/  when no errors occur during standard
initialization that terminate the program*/
  error_code = temporary_error_code;    /* no errors, restore previous error code */
  enable_interrupts( );                 /* restore other tasks */
  do_long_status_flag   = 1;
  strncpy( revision_id, revision_mstr, 12);    /* set-restore revision control after
initialization */
} /* initialize */

void clear_communications_status( )  /**  Clear proceedure for various communications
status displays  **/
{ rcvcont = rcvmcnt = rcvlen = rcvecnt = rcvecod = 0;
  xmtcont = xmtecnt = xmtecod = xmtcnt = 0;
}  /* clear_communications_status */

void command_vehicle_contactors( unsigned  motion_control, unsigned platform_cntrl )

/*************************************************************************************
************************************
  Controls various relays and power contactors. Parameters of this function are
designed to control motion and platforms
  simultaneously when the hardware supports it, however currently the code provides an
interlock between motion and tops.

**************************************************************************************
************************************/
{     /*safe to switch contactors?*/
  hcu_ports_whl_spd    =    get_analog_in(    TACHP_AI__PORTSIDE_TACH     )    -
portside_wheel_analog_center;     /* make +/- */
  hcu_starb_whl_spd    =    get_analog_in(    TACHS_AI__STARBOARD_TACH    )    -
starboard_wheel_analog_center;
  if( ( abs( hcu_ports_whl_spd ) <= zero_speed_threshold ) && ( abs( hcu_starb_whl_spd
) <= zero_speed_threshold ) )
  { m_c_p__discretes( ( MOTION_MASK | PLATFORM_MASK ), ( STOP_WHEELS & STOP_PLATFORM
) );
    if( motion_control )
    { m_c_p__discretes( MOTION_MASK, motion_control );
```

```
      last_motion_control = motion_control;
    }
    if( platform_cntrl ) m_c_p__discretes( PLATFORM_MASK, platform_cntrl );
    contactor_updat_msg_flg = NORMAL_UPDATE;
  }
  else contactor_updat_msg_flg = SELECT_CONTACTOR_AFTER_STOP;
}  /* command_vehicle_contactors */

void notify_all_tasks( unsigned  message )   /* Send mail to "action", "subsystems",
and "cmd processor" tasks */
{ send__mail( vactmt, message );
  send__mail( vsubmt, message );
  send__mail( vcmdmt, message );
}  /* notify_all_tasks */

void notify_action_tasks( unsigned  message )    /***  Send mail to "action", and
"subsystems" tasks  ***/
{ send__mail( vactmt, message );
  send__mail( vsubmt, message );
}  /* notify_action_tasks */

void kill_wheel_motion( )
{ PUT_AO__WHLS( 0, 0 );
  delay( 40 MS__TIMEOUT );
  speed__man = dirctn__man = 0.0;
}  /* kill_wheel_motion */

void stop_vehicle( )   /*   stop vehicle, set analog outputs to 0, open contactors,
notify other tasks, etc. */
{ kill_wheel_motion( );
  m_c_p__discretes( ( MOTION_MASK | PLATFORM_MASK ), ( STOP_WHEELS & STOP_PLATFORM )
);
  contactor_status = CTR_OPEN;
  wheel_contactor_command = STOP_WHEELS;        /* kill track mode too */
  put_bit_discrete_out( OTBRK_N_DO__TOP_BRAKE, IS__OFF );    /* apply top brake */
  action = STOP_AND_WAIT;
  vehicle_action_text = WAITING_MESSAGE;
  delay( 40 MS__TIMEOUT );
  get_platform_status( );
}  /* stop_vehicle */

void read_antennas( )       /****  Control all functions related to guidance antennas
```

```
****/
{ switch( antenna__settling_delay )
  { case ( ANTENNA_HARDWARE_SETTLING_TIME +1 ) :        /* 2nd read of antennas */
      left_antenna_level = ( left_antenna_level          /* filtered */
        + GUIDANCE_ANTENNA( vehicle_orientation == FRONT_FORW ? STARB_ANT_CHN :
PORTS_ANT_CHN )) /2;
      right_antenna_level = ( right_antenna_level        /* filtered */
        + GUIDANCE_ANTENNA( vehicle_orientation == FRONT_FORW ? PORTS_ANT_CHN :
STARB_ANT_CHN )) /2;
      if( ( left_antenna_level +right_antenna_level ) > ANTENNA_SENSING_THRESHOLD )
antenna_over_wire = OVER_WIRE;
      else
      { antenna_over_wire = NOT_OVER_WIRE;
        guidance_frequency_select = guidance_frequency_select == FREQ_1 ? FREQ_2 :
FREQ_1;     /* Toggle */
        put_bit_discrete_out( OFREQ1_SELECT_GUID_FREQ_1, guidance_frequency_select );
/* Toggle freq for next read */
        antenna__settling_delay = 0;    /* re-start settling time */
      }
      break;
    case ANTENNA_HARDWARE_SETTLING_TIME :    /* 1st read of antennas */
      left_antenna_level = GUIDANCE_ANTENNA( vehicle_orientation == FRONT_FORW ?
STARB_ANT_CHN : PORTS_ANT_CHN );
      right_antenna_level = GUIDANCE_ANTENNA( vehicle_orientation == FRONT_FORW ?
PORTS_ANT_CHN : STARB_ANT_CHN );
      last_guidance_frequency = guidance_frequency_select;
    default :        /* fall through */
      antenna__settling_delay = ( antenna__settling_delay +1 ) & 0x000F /* forced
settling restart time */;
  }
} /* read_antennas */

int get_adjusted_analog( unsigned  analog_channel, int  analog_center_offset )
  /*  read analog point, provide range adjustment, ex: centering 0-255 value to -128
to 127 range */
{ int analog_value = get_analog_in( analog_channel ) - analog_center_offset;
  return ( abs( analog_value ) <= zero_speed_threshold ? 0 : analog_value );
} /* get_adjusted_analog */

void read_joystick( )
{ joystick_speed = get_adjusted_analog( SPDHC_AI__SPEED_JOYSTICK, joystick_speed_center
);
```

```
  joystick_direction    =    get_adjusted_analog(    DIRHC_AI__DIRECTION_JOYSTICK,
joystick_direction_center );
}  /* read_joystick */

void read_and_average_joystick( )
{ joystick_speed = ( joystick_speed +get_adjusted_analog( SPDHC_AI__SPEED_JOYSTICK,
joystick_speed_center ) ) / 2;
  joystick_direction    =    (    joystick_direction    +get_adjusted_analog(
DIRHC_AI__DIRECTION_JOYSTICK, joystick_direction_center ) ) / 2;
}  /* read_and_average_joystick */

void seq_emergency_stop( char *error_message )        /*  provides as orderly as
possible vehicle emergency stop */
#define  STATUS_SELECT_T    "a"
#define  STATUS_SELECT     'a'
{ delay( 1 SEC__TIMEOUT);  /* wait for MCP to perform controlled E-stop */
  put_bit_discrete_out( HARDWR_PWR_ENABL, IS__OFF );          /*  E-stop vehicle */
  put_bit_discrete_out( HARDWR_OVRRIDE_ENABL, IS__OFF );      /*  reset override */
  stop_vehicle( );
  vehicle_ready &= SET_EMERGENCY_STOP;        /* reset bit */
  if( option != EMERGENCY_STOP_SET )
  { sprintf( output_string, FORMFEED
        ESC "1MAS-TER " MASTER_MENU_T  "\r"
        ESC "4sel.stat" STATUS_SELECT_T  "\r"
        MOVE_CURS COLM_0 LINE_4 "EMERGENCY STOP       %-18s    RESET to restart"
LOCK_CURSOR,
      error_message );
    write_b( WR__DETACHED_CMND, output_string );
  }
  do
  { wait__mail_hcu( TIMEOUT__FOREVER );
    if( mail_hcu == STATUS_SELECT ) request_status_display( );
  } while ( mail_hcu != EXIT_PROCEDURE );
  option = EMERGENCY_STOP_SET;
}  /* seq_emergency_stop */

void switch_to_manual_mode( )     /****  mode switch to manual, provide necessary
functions ( lights, horns, etc ) ****/
#define    SPEAKR_FREQ_DRV   1
{ tracking_command = COMPUTER_GUIDANCE;
  put_bit_discrete_out( OGUIDM_SELECT_COMP_GUIDANCE, COMPUTER_GUIDANCE );   /* combine
with next statment in cleanup */
```

```
  put_byte_discrete_out(  PORT_4,  (  MANUAL_CONTROL_MASK  |  SPEAKR_FREQ_DRV  ),
MANUAL_CONTROL_MASK );
  put_byte_discrete_out(  PORT_1,  (  SPEAKER_CONTROL  |  PORTSIDE_LIGHTS_CONTROL  |
STARBOARD_LIGHTS_CONTROL ), ARE__OFF );
  forward_speed_base = man_forward_speed_base;
  hcu_mode = MANUAL_OPER;
  hcu_mode_text = MANUAL_TEXT;
  action = STOP_WHEELS;
}  /* switch_to_manual_mode */

   /*   1.50 = 6/4(integer calcs) * 1/2(scale setpoint's to hcu_?_whl_spd's) = (x * 3)
/4  */
#define RUNAWY_SCAL(a)  ( (a * 3 ) /4 )
void runaway_wheel_check( )      /****  Moniters vehicle in manual only for a runaway
wheel( motor ). ****/
{   int   runaway_setpoint   =   RUNAWY_SCAL(   max(   portside_wheel_setpoint,
 starboard_wheel_setpoint ) );
  int spd_temp_prev = max( abs(hcu_ports_whl_spd), abs(hcu_starb_whl_spd) );
  int spd_temp;

  hcu_ports_whl_spd   =   get_analog_in(   TACHP_AI__PORTSIDE_TACH   )   -
portside_wheel_analog_center;   /* make +/- */
  hcu_starb_whl_spd   =   get_analog_in(   TACHS_AI__STARBOARD_TACH   )   -
starboard_wheel_analog_center;
  spd_temp = max( abs(hcu_ports_whl_spd), abs(hcu_starb_whl_spd) );

     /* speed > 1.33 setpoint?  - -  speed > base_thresh?  - -  not decelerating?
*/
  if(  (  spd_temp  >  runaway_setpoint  )  &&  (  spd_temp  >  30  )  &&  (  spd_temp  >
spd_temp_prev ) )
    seq_emergency_stop( "runaway wheel/tach" );
  }  /* runaway_wheel_check */

void wait__mail_hcu( unsigned  timeout_period /* Unit=10ms */ )
  /* Waits for mail at HCU mailbox, preprocess mail (E-stops, special conditions, etc)
*/
{ u_m_log_type *pt__log;
  mail_hcu = wait__mail( timeout_period );
  switch ( mail_hcu )
  { case INPUT_TERMINAL_HANDLER :
      get_hcu( in_characters );
      read_hcu( );                /* restart the terminal handler input */
```

```
    if( in_characters[0] == FUNCTION_FLAG )
    { if( (mail_hcu = (unsigned)in_characters[1] ) == MASTER_MENU )
      { option = mail_hcu;
        mail_hcu = EXIT_PROCEDURE;
      }
    }         /* fall through */
  case NO_MAIL__TIMEOUT :
  case PUT_VEHICLE_ASLEEP :
    return;
}
if( ( mail_hcu & 0xFF00 ) == U_M__INTERRUPT )
{ if( ins_vm2.x == 0.0 )     /* zero'd when in insert mode */
  { pt__log = &u_m_log[ u_m_log_indx & U_M_LOG_MSK ];
    switch ( u_m_log_indx - u_m_insrt_indx )
    { case 1:        /* initialize position at 1st magnet */
        init_nav_position( ums_offset.x, pt__log->pos_y, 0.0 );
        pt__log->avrg_err_x = xvf;
        pt__log->avrg_err_y = yvf;
        pt__log->heading = tfvi;
        break;

      case 2:        /* log position at 2nd magnet */
        ins_vm2.x = pt__log->avrg_err_x;
        ins_vm2.y = pt__log->avrg_err_y;
        ins_vm2.ang = pt__log->heading;
        pos_y_m2 = pt__log->pos_y;
        break;
    }
  }
  mail_hcu = NO_MAIL__TIMEOUT;
  return;
}

mail_hcu &= 0x7FFF;
if(  (  mail_hcu  ==  HAND_CONTROL_FRONT_DISCONNECT  )  ||  (  mail_hcu  ==
HAND_CONTROL_REAR_DISCONNECT ) )
{ option = mail_hcu;
  man_cntrl_tsk = HCU_CLEAR_MAN;    /* release action task from driving vehicle */
  mail_hcu = EXIT_PROCEDURE;
}
else if( ( option != AUTO_OPERTN ) && ( option != I_O_TEST ) )
{ switch ( mail_hcu )
```

```
  { case EMERGENCY_STOP_SET :
      seq_emergency_stop( "hardware trip" );
      mail_hcu = EXIT_PROCEDURE;
      return;
    case WHEEL_BRAKES_SET :
      delay( 50 MS__TIMEOUT );  /* check contact bounce */
      if( get_bit_discrete_in( BRAKES_CHANNEL_G ) )
      { kill_wheel_motion( );
        vehicle_ready |= SET_WHEEL_BRAKES;    /* set bit */
      }
      break;
    case WHEEL_BRAKES_RELEASED :
      vehicle_ready &= RELEASE_WHEEL_BRAKES;    /* reset bit */
      read_and_average_joystick( );
      break;
    case EMERGENCY_STOP_RELEASED :
      vehicle_ready |= RELEASE_EMERGENCY_STOP;    /* set bit */
      break;
  }
  mail_hcu = NO_MAIL__TIMEOUT;
 }
}  /* wait__mail_hcu */

void calibrate_i_o( )
  /* *** Calibrate vehicle analog inputs: joystick, tachometer, etc  *** */
#define  TEST_COUNT_LIMIT   128      /* approx. 2.5 secs */
#define  ANLG_MID_RANG   128             /* mid range on analog input */
#define  MAX__JOYSTK_ERR   28             /* about 20% */
{ int test_count;
  int joystick_speed_average = 0;
  int joystick_direction_average = 0;
  write_b( WR__DETACHED_CMND, FORMFEED          /*  "bypass"  header  intentionally
overwritten, function key still active */
    ESC "8  bypass"  MASTER_MENU_T "\r"
    MOVE_CURS  COLM_0  LINE_3  "Joy Stick          Calibration Period  leave stick
centered"  LOCK_CURSOR );
  for(test_count = 0; ; test_count++ )
  { joystick_speed_average += get_analog_in( SPDHC_AI__SPEED_JOYSTICK );
    joystick_direction_average += get_analog_in( DIRHC_AI__DIRECTION_JOYSTICK );
    portside_wheel_analog_center += get_analog_in( TACHP_AI__PORTSIDE_TACH );
    starboard_wheel_analog_center += get_analog_in( TACHS_AI__STARBOARD_TACH );
    if( test_count == TEST_COUNT_LIMIT )
```

```
      write_b( WR__DETACHED_CMND, FORMFEED
        ESC "8  bypass"  MASTER_MENU_T  "\r"
        MOVE_CURS  COLM_0  LINE_3  "Joy Stick Failure\rReplace Hand Control"
        CLEAR_LINE  LOCK_CURSOR );
    if( test_count % 8 == 0 )
    { joystick_speed_average /= 8;        /* new average */
      joystick_direction_average /= 8;
      if( ( abs( joystick_speed_center -joystick_speed_average ) <= 2 ) &&
          ( abs( joystick_direction_center -joystick_direction_average ) <= 2 ) &&
          ( abs( joystick_speed_average - ANLG_MID_RANG ) <= MAX__JOYSTK_ERR ) &&
          ( abs( joystick_direction_average - ANLG_MID_RANG ) <= MAX__JOYSTK_ERR ) )
      { mail_hcu = MASTER_MENU;
        portside_wheel_analog_center /= 8;
        starboard_wheel_analog_center /= 8;
        break;
      }
      else
      { joystick_speed_center = joystick_speed_average;

        joystick_direction_center = joystick_direction_average;

        joystick_speed_average = joystick_direction_average = 0;
        portside_wheel_analog_center = starboard_wheel_analog_center = 0;
      }
    }
    wait__mail_hcu( 20 MS__TIMEOUT )/* wait HCU selection */;
    if( mail_hcu == EXIT_PROCEDURE )      /* The following messages are internally
generated */
    { mail_hcu = option;
      break;
    }
  }
  calibrate_platform_controls( );
}  /* calibrate_i_o */

/* joystick_commands_vehicle( ) */
  int temp_bs_spd;
  int ctr_dly_cnt;
  void setup_rotate( unsigned rot_cmnd,  unsigned rot_actn,  char *rot_mesg )
  { command_vehicle_contactors( rot_cmnd, STOP_PLATFORM );
    action = rot_actn;
    vehicle_action_text = rot_mesg;
```

```
    max_rotate_acqui_speed = 40;        /* arbitrary speed limit */
    temp_bs_spd = 250; /* limit 70fpm */
    contactor_status = CTR_CLOSNG;
    put_bit_discrete_out( OANTF_SELECT_FRONT_GUIDANCE, vehicle_orientation );
    /*put_bit_discrete_out( OGUIDM_SELECT_COMP_GUIDANCE, COMPUTER_GUIDANCE );*/
  } /* setup_rotate */
  void joystk_stop_veh( )
  { put_bit_discrete_out( ODACT_SELECT_DRIVE_TACH, IS__OFF );
    stop_vehicle( );
    base_speed = 0.0;
    if( ( action == MOVE_ON_WIRE ) && ( abs( joystick_direction ) > 40 ) && ( hcu_mode
!= MANUAL_OPER ) )
    { switch_to_manual_mode( );
      delay( 200 MS__TIMEOUT );
      vehicle_action_text = WAITING_MESSAGE;
    }
  }   /* joystk_stop_veh */
void joystick_commands_vehicle( )
{ int joystk_temp;
  double whl_stpt_outside;
  double whl_ratio_inside;
  double speed__man_prev;
  whl_setpt.rfr.insd = whl_setpt.rfr.outsd = 0;
  read_and_average_joystick( );
  if( contactor_status == CTR_CLOSD )
  { if( vehicle_ready == VEHICLE_READY_FLAG )
    { if( (action == ROTATE_RIGHT ) || (action == ROTATE_LEFT) )
      { joystk_temp = (joystick_direction > JOYSTK_DIR_THRSHOLD) ? ( joystick_direction
-JOYSTK_DIR_THRSHOLD ) :
          ( ( joystick_direction < (-JOYSTK_DIR_THRSHOLD) ) ? (joystick_direction
+JOYSTK_DIR_THRSHOLD) : 0 );
        joystk_temp /= ( option == AQUIRE_WIRE ) ? 2 : 1;
        dirctn__man = 0.0;
      }
      else
      { joystk_temp = (joystick_direction > JOYSTK_DIR_THRSHOLD) ? ( joystick_direction
-JOYSTK_DIR_THRSHOLD ) :
          ( ( joystick_direction < (-JOYSTK_DIR_THRSHOLD) ) ? (joystick_direction
+JOYSTK_DIR_THRSHOLD) : 0 );
        dirctn__man = ( action == MOVE_ON_WIRE ) ? 0.0 :
          dirctn__man +( ( (double)joystk_temp - dirctn__man ) * 0.070 );
        joystk_temp = (joystick_speed > JOYSTK_SPD_THRSHOLD) ? ( joystick_speed
```

```
-JOYSTK_SPD_THRSHOLD ) :
          ( ( joystick_speed < (-JOYSTK_SPD_THRSHOLD) ) ? (joystick_speed
+JOYSTK_SPD_THRSHOLD) : 0 );
      }

      speed__man_prev = speed__man;
      speed__man += ( (double)joystk_temp - speed__man_prev ) * 0.051;
           /* diff signs(direction change)?  */      /* move speed__man to 0.0 */
      if( ( (speed__man > 0.0) && (speed__man_prev < 0.0) ) || ( (speed__man < 0.0) &&
(speed__man_prev > 0.0) ) )
        speed__man = speed__man_prev * 0.50;
      if( fabs( speed__man ) < 0.05 ) speed__man = 0.0;  /* round speed to exact zero
*/
      whl_stpt_outside = fabs( speed__man * base_speed );
      whl_setpt.rfr.outsd = min( FULL_SCALE_OUTPUT, ROUND( int, whl_stpt_outside ) );
      whl_ratio_inside = 1.0 -fabs( dirctn__man * ( 1.90 / 128.0 ) );
      whl_setpt.rfr.insd  =   max( 0, min( whl_setpt.rfr.outsd, ROUND( int,
whl_stpt_outside * whl_ratio_inside ) ) );
    }
    if( speed__man == 0.0 )
    { joystk_stop_veh( );
      return;
    }
  }
  else if( contactor_status == CTR_OPEN )
  { if( joystick_speed > (JOYSTK_SPD_THRSHOLD +4) )        /* test forwards */
    { if( hcu_mode == AQUIRE_WIRE )
      { action = MOVE_ON_WIRE;
        temp_bs_spd = acqui_forward_speed_base;
      }
      else
      { action = MOVE_FORWARD;
        temp_bs_spd = forward_speed_base;
        /*put_bit_discrete_out( OGUIDM_SELECT_COMP_GUIDANCE, COMPUTER_GUIDANCE );*/
      }
      put_bit_discrete_out( OANTF_SELECT_FRONT_GUIDANCE, vehicle_orientation );
      vehicle_action_text = FORWARD_MESSAGE;
      contactor_status = CTR_CLOSNG;
      command_vehicle_contactors(  (  vehicle_orientation  ==  FRONT_FORW  )  ?
FRONT_DIRECTION : REAR_DIRECTION, STOP_PLATFORM );
    }
    else if( joystick_speed < (-JOYSTK_SPD_THRSHOLD -4) )        /* test backwards */
```

```
   { if( ( hcu_mode == AQUIRE_WIRE ) && ( get_bit_discrete_in( IOVRW_ANT_OVER_WIRE )
!= NOT_OVER_WIRE ) )
      { vehicle_action_text = TRACK_BACKWARD_MESSAGE;
        action = MOVE_ON_WIRE;
      }
      else
      { vehicle_action_text = BACKWARD_MESSAGE;
        action = MOVE_BACKWARD;
        /*put_bit_discrete_out( OGUIDM_SELECT_COMP_GUIDANCE, COMPUTER_GUIDANCE );*/
      }
      contactor_status = CTR_CLOSNG;
      temp_bs_spd = backward_speed_base;
      if( vehicle_orientation == FRONT_FORW )
      { put_bit_discrete_out( OANTF_SELECT_FRONT_GUIDANCE, REAR_FORW );    /* antenna
at opposite end */
        command_vehicle_contactors( REAR_DIRECTION, STOP_PLATFORM );
      }
      else
      { put_bit_discrete_out( OANTF_SELECT_FRONT_GUIDANCE, FRONT_FORW );   /* antenna
at opposite end */
        command_vehicle_contactors( FRONT_DIRECTION, STOP_PLATFORM );
      }
    }
    else if( hcu_mode != AQUIRE_WIRE )
    { if( joystick_direction < (-JOYSTK_DIR_THRSHOLD -4) )          /* rotate left? */
        setup_rotate( ROTATE_LEFT_COMMAND, ROTATE_LEFT, ROTATE_LEFT_MESSAGE );
      else if( joystick_direction > (JOYSTK_DIR_THRSHOLD +4) )        /* rotate right?
*/
        setup_rotate( ROTATE_RIGHT_COMMAND, ROTATE_RIGHT, ROTATE_RIGHT_MESSAGE );
    }
    if( contactor_status == CTR_CLOSNG )
    { base_speed = (double)MAX_JOYSTICK_SPD / (double)temp_bs_spd;
      put_bit_discrete_out( ODACT_SELECT_DRIVE_TACH, IS__ON );
      ctr_dly_cnt = 0;
    }
  }
  else if( vehicle_ready == VEHICLE_READY_FLAG ) contactor_status = CTR_CLOSD;
  else if( ++ctr_dly_cnt > 50 ) joystk_stop_veh( );
  if( ( vehicle_orientation == FRONT_FORW ) ^ ( dirctn__man >= 0.0 ) )
  { portside_wheel_setpoint = whl_setpt.rfr.insd;
    starboard_wheel_setpoint = whl_setpt.rfr.outsd;
  }
```

```
  else
  { portside_wheel_setpoint = whl_setpt.rfr.outsd;
    starboard_wheel_setpoint = whl_setpt.rfr.insd;
  }
  runaway_wheel_check( );
  PUT_AO__WHLS( starboard_wheel_setpoint, portside_wheel_setpoint );
} /* joystick_commands_vehicle */

/* void find_the_wire( )    ****    */
  void set_to_tracking( )
  { if( action != MOVE_FORWARD )        /* rotates ? */
    { put_bit_discrete_out( ODACT_SELECT_DRIVE_TACH, IS__OFF );
      stop_vehicle( );
    }
    put_bit_discrete_out( OFREQ1_SELECT_GUID_FREQ_1, last_guidance_frequency );
    /*put_bit_discrete_out( OGUIDM_SELECT_COMP_GUIDANCE, HARDWARE_GUIDANCE );*/
    hcu_mode = AQUIRE_WIRE;
    hcu_mode_text = ACQUISITION_TEXT;
    forward_speed_base = acqui_forward_speed_base;
    tracking_command = last_guidance_frequency;
    clear_communications_status( );
    action = MOVE_ON_WIRE;
  }   /* set_to_tracking */
void find_the_wire( )
{ if( ( antenna_over_wire == OVER_WIRE )  &&  ( action != MOVE_BACKWARD )  &&  ( action
!= STOP_WHEELS ) )
  { if( ( tracking_command != FREQ_1 ) || ( tracking_command != FREQ_2 ) )
    { if( ( left_antenna_level +ANTENNA_NOISE_THRESHOLD )  <  last_left_antenna_level
)
      {   if(   (    right_antenna_level    -ANTENNA_NOISE_THRESHOLD    )       >
last_right_antenna_level )
        { if( right_antenna_level > left_antenna_level ) set_to_tracking( );
          else  max_rotate_acqui_speed  =  max(  5,  abs(  right_antenna_level  -
left_antenna_level ) / 4 );
        }
      }
      else   if(   (    right_antenna_level    +ANTENNA_NOISE_THRESHOLD    )     <
last_right_antenna_level )
      { if( ( left_antenna_level -ANTENNA_NOISE_THRESHOLD ) > last_left_antenna_level
)
        { if( left_antenna_level > right_antenna_level ) set_to_tracking( );
          else  max_rotate_acqui_speed  =  max(  5,  abs(  right_antenna_level  -
```

```
left_antenna_level ) / 4 );
        }
      }
      else if( ( left_antenna_level >= ANTENNA_CENTERED_LEVEL )  &&        /* is
vehicle already centered? */
        (   abs(   left_antenna_level   -right_antenna_level   )   <=   (   4   *
ANTENNA_NOISE_THRESHOLD /3 ) ) ) set_to_tracking( );
    }
  }
  last_left_antenna_level = ( abs( left_antenna_level - last_left_antenna_level ) >
ANTENNA_NOISE_THRESHOLD ) ?
    left_antenna_level : last_left_antenna_level;
  last_right_antenna_level = ( abs( right_antenna_level - last_right_antenna_level )
> ANTENNA_NOISE_THRESHOLD ) ?
    right_antenna_level : last_right_antenna_level;
}  /* find_the_wire */

#define    BACKDOOR_PASSWORD    "F+E-A3+-D-+CB++97-+"
unsigned password_is( )
{ char random_password_key[ 10 ];
  char temp_password[ 10 ];
  unsigned retry_count;
  unsigned random_password_char;
  unsigned temp;
  for( retry_count = 0; retry_count <= 4; retry_count++ )
  { switch ( mail_hcu )
    { case NO_MAIL__TIMEOUT :
        mail_hcu = EXIT_PROCEDURE;
      case EXIT_PROCEDURE :
        return ILLEGAL_PASSWORD;
      case INPUT_TERMINAL_HANDLER :
        in_characters[ strlen(in_characters) -1 ] = 0;     /* take off <cr> from
in-string */
        if( strcmp( in_characters, temp_password ) == 0 )
          return STANDARD_PASSWORD;
        else if( strcmp( in_characters, BACKDOOR_PASSWORD ) == 0 )
          return MASTER_PASSWORD;
      default :    /* fall through */
        strcpy( temp_password, ".........");
        random_password_char = (unsigned)user_time % ( temp = strlen( password_key )
);    /* random within string leng */
        temp_password[ random_password_char ] = ' ';    /* put confusion blank into
```

```
string */
        temp_password[ temp ] = 0;        /* set temp_password length = password_key
length */
        sprintf( output_string, FORMFEED
              ESC "1MAS-TER "  MASTER_MENU_T  "\r"
              ESC "4ENTR    "  BLANK  "\r"
              "\r\r%sPASSWORD?%s\r",
            temp_password, temp_password );
        write_b( WR__DETACHED_CMND, output_string );       /* write the display format
and setup the softkeys. */
        strcpy( temp_password, password_key );
        strcpy(    &temp_password[    random_password_char     ],     &temp_password[
random_password_char +1 ] );
        wait__mail_hcu( 5 MIN__TIMEOUT );       /* wait for a HCU selection or vehicle
message */
    } /* switch */
  }
  mail_hcu = EXIT_PROCEDURE;
  return ILLEGAL_PASSWORD;
}  /* password_is */

#define  OUTPT_DISPLAY_T   "a"
#define  OUTPT_DISPLAY   'a'
#define  INPUT_DISPLAY_T   "c"
#define  INPUT_DISPLAY   'c'
#define  UPDATE_MRKR_T   "d"
#define  UPDATE_MRKR   'd'
#define  SET_CHAR   '#'
#define  TIMER_CHAR '+'     /* Bits 0-3 have been redesigned to be timers only */
void display_discretes( )
{ unsigned  bit_indx;
  unsigned  byte_indx;
  unsigned  display_function;
  unsigned  writ_indx;
  unsigned  bit_buff;
  unsigned  bit_mask;
  for( mail_hcu = INPUT_DISPLAY; ; wait__mail_hcu( 10 MS__TIMEOUT ) )
  { switch ( mail_hcu )
     {  case INPUT_DISPLAY :
        case OUTPT_DISPLAY :
        sprintf( output_string, FORMFEED
            ESC "1PrevDisp"  PREV_DISPLAY_T  "\r"
```

```
          ESC "3INTR    "  INTRP_HIST_DSPLY_T  "\r"       /* select next display */
          ESC "4Updt    "  UPDATE_MRKR_T  "\r"
          ESC "5        "  STEP__NEXT_DSPLY_T  "\r"       /* select next display */
          "%s" MOVE_CURS  COLM_10  LINE_2  "%7s\r 0 1 2 3 4 5 6 7 8 9"  LOCK_CURSOR,
        mail_hcu == INPUT_DISPLAY ?
          ESC "2sel.OUT "  OUTPT_DISPLAY_T "\r" :  ESC "2sel. IN " INPUT_DISPLAY_T
"\r",
        mail_hcu == INPUT_DISPLAY ? "OUTPUT" : "INPUT" );
      write_b( WR__DETACHED_CMND, output_string );
      display_function = mail_hcu;
      break;
    case INTRP_HIST_DSPLY :
    case UPDATE_MRKR :
    case PREV_DISPLAY :
    case EXIT_PROCEDURE :
    case STEP__NEXT_DSPLY :
      return;
  } /* switch */
  writ_indx = 3;     /* point at 1st '_' -2 */
  strcpy( output_string, MOVE_CURS  COLM_0  LINE_4  "0- - - - - - - - - -1- - - - -
- - - - -"
    "2- - - - - - - - - -3- - - - - - - - - -"  LOCK_CURSOR );
  for( byte_indx = 0; byte_indx <= 4; byte_indx++ )
   {   bit_buff    =    (    display_function    ==    INPUT_DISPLAY    )    ?
(unsigned)get_byte_discrete_in( byte_indx ) :
      (unsigned)get_byte_discrete_out( byte_indx );
    for( bit_mask = 0x01 /*0b00000001*/; bit_mask <= 0x00FF; bit_mask <<= 1 )
    { writ_indx += 2;
      if( bit_buff & bit_mask ) output_string[ writ_indx ] =       /* OUTPUT and
points 0-3: timer char */
        ( (display_function == OUTPT_DISPLAY) && (byte_indx == 0) && (bit_mask <
0x0F) ) ? TIMER_CHAR : SET_CHAR;
    }
  }
  write_b( WR__DETACHED_CMND, output_string );
  delay( 140 MS__TIMEOUT );
 }
} /* display_discretes */

void display_analogs( )
#define    CHN_0_7_T    "a"    /* hcu function trigger character */
#define    CHN_0_7    'a'
```

```
#define     CHN_8_15_T    "b"
#define     CHN_8_15    'b'
#define     ANALG_OUT_DSPLY_T    "c"
#define     ANALG_OUT_DSPLY    'c'
#define     MAX_OUTP_CHAN     3
{ int analog;
  unsigned chan;
  unsigned char discrete;
  int last_chan;
  int  writ_indx;
  for( mail_hcu = CHN_0_7; ; wait__mail_hcu( 200 MS__TIMEOUT ) /* wait HCU selection,
veh mesg */ )
  { switch ( mail_hcu )
    { case CHN_0_7 :
        write_b( WR__DETACHED_CMND, FORMFEED
          ESC "1prevdisp"  PREV_DISPLAY_T  "\r"
          ESC "2AnlgOUT "  ANALG_OUT_DSPLY_T  "\r"
          ESC "4A-in8-15"  CHN_8_15_T  "\r"
          ESC "5         "  STEP__NEXT_DSPLY_T  "\r"
          MOVE_CURS  COLM_0  LINE_3  "  ch:val IN ch:val"  LOCK_CURSOR );
        last_chan = 7;
        break;
      case CHN_8_15 :
        write_b( WR__DETACHED_CMND, FORMFEED
          ESC "1prevdisp"  PREV_DISPLAY_T  "\r"
          ESC "2AnlgOUT "  ANALG_OUT_DSPLY_T  "\r"
          ESC "3A-in0-07"  CHN_0_7_T  "\r"
          ESC "5         "  STEP__NEXT_DSPLY_T  "\r"
          MOVE_CURS  COLM_0  LINE_3  "  ch:val IN ch:val"  LOCK_CURSOR );
        last_chan = 15;
        break;
      case ANALG_OUT_DSPLY :
        write_b( WR__DETACHED_CMND, FORMFEED
          ESC "1prevdisp"  PREV_DISPLAY_T  "\r"
          ESC "3A-in0-07"  CHN_0_7_T  "\r"
          ESC "4A-in8-15"  CHN_8_15_T  "\r"
          ESC "5         "  STEP__NEXT_DSPLY_T  "\r"
          MOVE_CURS  COLM_0  LINE_3  "  ch:val OT ch:val"
          MOVE_CURS  COLM_0  LINE_6  " MCP 0 1 2 3 4 DISC"  LOCK_CURSOR );
        last_chan = MAX_OUTP_CHAN;
        break;
      case PREV_DISPLAY :
```

```
    case EXIT_PROCEDURE :
    case STEP__NEXT_DSPLY :
      return;
  }
  strcpy( output_string, MOVE_CURS  COLM_0  LINE_4);
  writ_indx = 4;
  for( chan = max(0, last_chan -7); chan <= last_chan; chan++ )
  { analog = last_chan != MAX_OUTP_CHAN ? get_analog_in( chan ) : get_analog_out(
FND_CHN( AO__DIR_RD, chan ) );
    writ_indx += sprintf(&output_string[ writ_indx ], "%4d:%03d  ", chan, analog);
  }
  if( last_chan == MAX_OUTP_CHAN)   /* display discretes with Analog Output */
  { writ_indx += sprintf(&output_string[ writ_indx ], MOVE_CURS COLM_5 LINE_7 );
    discrete = get_analog_out( GET_AO_DISCRETES );
    for( chan = 1; chan < 0x1F /*00011111*/; chan <<= 1)
      writ_indx += sprintf(&output_string[ writ_indx ], "%c ", (chan & discrete) ?
'#' : '-' );
  }
  write_b( WR__DETACHED_CMND, output_string );
 }
} /* display_analogs */

const char intrp_dscrp[ /*0-6*/ ][5] = { "xxxx", "aOUT", "anIN", "encd", "dgIN",
"dOUT", "xxxx" };
#define    RESET_BUF_PTR_T   "c"    /* hcu function trigger character */
#define    RESET_BUF_PTR    'c'
#define    LAST_GROUP_T    "u"
#define    LAST_GROUP    'u'
#define    NEXT_GROUP_T    "v"
#define    NEXT_GROUP    'v'
void display_interrupts( )
{ unsigned  last__intrpt_buf_indx = 0xFFFF;        /* force update */
  int  index;
  int  o_indx;
  int  displ_indx;
  int  display_offset = 0;        /* beginning of display */
  unsigned temporary;
  write_b( WR__DETACHED_CMND, FORMFEED
    ESC "1prevdisp"  PREV_DISPLAY_T  "\r"      ESC "2LASTgrp "  LAST_GROUP_T  "\r"
    ESC "3NEXTgrp "  NEXT_GROUP_T  "\r"       ESC "4RsetPntr"  RESET_BUF_PTR_T  "\r"
    ESC "5         "  STEP__NEXT_DSPLY_T  "\r"  LOCK_CURSOR );        /* select next
 display */
```

```
for( ; ; wait__mail_hcu( 200 MS__TIMEOUT ) )
{ switch ( mail_hcu )
  { case NEXT_GROUP :
      display_offset = max( 0, display_offset -8 );
      last__intrpt_buf_indx = 0xFFFF;       /* force update */
      break;
    case LAST_GROUP :
      display_offset = min( 64-8, display_offset +8 );
      last__intrpt_buf_indx = 0xFFFF;       /* force update */
      break;
    case RESET_BUF_PTR :
      for( index= 0; index <= 63; index++ ) non_token_buffer[ index ] = 0;
      non_token_pointer = 0;            /* clear/reset */
      break;
    case PREV_DISPLAY :
    case EXIT_PROCEDURE :
    case STEP__NEXT_DSPLY :
      return;
  }
  if( non_token_pointer != last__intrpt_buf_indx )
  { last__intrpt_buf_indx = non_token_pointer;
    displ_indx  =  (  last__intrpt_buf_indx  /2  /*bytes  per  word*/)  +63/*wrap*/
-display_offset;
    o_indx = sprintf( output_string, MOVE_CURS  COLM_2  LINE_3 "-%4u >> -%-4u\r",
display_offset, display_offset +7 );
    for( index = 0; index <= 7; ++index, --displ_indx )
    { temporary = non_token_buffer[ displ_indx & 0x003F ];
      if( temporary == 0x0055 ) o_indx += sprintf( &output_string[ o_indx ], "   -
-    " );
      else o_indx += sprintf( &output_string[ o_indx ], "%c.%-4.4s%03d ",
        ( temporary & 0x80 ) ? 'H' : 'L', intrp_dscrp[ (temporary >> 8) & 0x07 ],
temporary & 0x3F );
    }
    write_b( WR__DETACHED_CMND, output_string );
  }
 }
}  /* display_interrupts */

void display_communications_status( )
#define     CLEAR__RESET_T  "A"    /* hcu function trigger character */
#define     CLEAR__RESET  'A'
#define     CLEAR__ERRS_T   "B"
```

```
#define    CLEAR__ERRS   'B'
#define    COMM__LOG_T   "C"
#define    COMM__LOG   'C'
{ unsigned xmit_control;
  unsigned receive_error_code;
  unsigned xmit_error_code;
  int mast_enc;
  write_b( WR__DETACHED_CMND, FORMFEED
    ESC "1prevdisp"  PREV_DISPLAY_T  "\r"
    ESC "2clr rset"  CLEAR__RESET_T  "\r"
    ESC "3clr E cd"  CLEAR__ERRS_T  "\r"
    ESC "4commlog "  COMM__LOG_T   "\r"
    ESC "5         "  STEP__NEXT_DSPLY_T  "\r"        /* select next display */
    MOVE_CURS  COLM_0  LINE_3  "      "  LOCK_CURSOR );
  receive_error_code  =  xmit_error_code = 0;
  for( mail_hcu = 0; ; wait__mail_hcu( 200 MS__TIMEOUT ) )
  { switch ( mail_hcu )
    { case CLEAR__RESET :
        clear_communications_status( );
        receive_error_code  =  xmit_error_code = 0;
        break;
      case CLEAR__ERRS :
        receive_error_code  =  rcvecod  =  xmit_error_code  =  xmtecod = 0;
        break;
      case PREV_DISPLAY :
      case EXIT_PROCEDURE :
      case STEP__NEXT_DSPLY :
      case COMM__LOG :
        return;
    }
    if( ( ( receive_error_code & 0x00FE )==0x00E0 ) || ( receive_error_code==0 )
)receive_error_code = rcvecod & 0x00FF;
    if( ( xmit_error_code == 0x000D ) || ( xmit_error_code == 0 ) ) xmit_error_code =
xmtecod & 0x00FF;
    sprintf( output_string, MOVE_CURS  COLM_0  LINE_3
      "RMcnt%-5u Rlen%-5u"
      "REcnt%-5u REcd " INTEL_HEX_FRMT
      "Xmcnt%-5u\r"
      "XEcnt%-5u XEcd " INTEL_HEX_FRMT  LOCK_CURSOR,
      rcvmcnt, rcvlen, rcvecnt, INTEL_HEX_FIX(receive_error_code), xmtcnt, xmtecnt,
INTEL_HEX_FIX(xmit_error_code) );
    write_b( WR__DETACHED_CMND, output_string );
```

```
  }
} /* display_communications_status */

void display_comm_log( )
#define    CLEAR__RESET_T   "A"
#define    CLEAR__RESET    'A'
{  write_b( WR__DETACHED_CMND, FORMFEED
     ESC "1prevdisp"  PREV_DISPLAY_T  "\r"
     ESC "2clr rset"  CLEAR__RESET_T  "\r"
     ESC "5         "  STEP__NEXT_DSPLY_T  "\r"    /* select next display */
     MOVE_CURS  COLM_0  LINE_3  "  MESSAGE   " );
   for( ; ; wait__mail_hcu( 200 MS__TIMEOUT ) )
   {    switch ( mail_hcu )
      { case CLEAR__RESET :
          msg_attempts = msg_complete = msg_errors = 0;
          break;
        case PREV_DISPLAY :
        case EXIT_PROCEDURE :
        case STEP__NEXT_DSPLY :
          return;
      }
      sprintf( output_string, MOVE_CURS COLM_0 LINE_4 " Attempts%9d\r Completions %5d\r
Errors%11d\r" LOCK_CURSOR,
        msg_attempts, msg_complete, msg_errors );
      write_b( WR__DETACHED_CMND, output_string );
   }
}  /* display_comm_log */

#define  ENCODER_0_T  "p"
#define  ENCODER_0    'p'
#define  ENCODER_1_T  "q"
#define  ENCODER_1    'q'
#define  ENCODER_2_T  "r"
#define  ENCODER_2    'r'
#define  ENCODER_3_T  "s"
#define  ENCODER_3    's'
#define  ENCODER_4_T  "t"
#define  ENCODER_4    't'
#define  ENCODER_5_T  "u"
#define  ENCODER_5    'u'
unsigned char encdr;
void modify_encoders( )
```

```
{ long xx;
  unsigned char set_add = 0;
  for( encdr = 0xFF; ; wait__mail_hcu( 5 MIN__TIMEOUT ) /* wait HCU selection, veh mess
*/ )
  { switch ( mail_hcu )
    { case ENCODER_0 :
      case ENCODER_1 :
      case ENCODER_2 :
      case ENCODER_3 :
      case ENCODER_4 :
/*    case ENCODER_5 :     */
        encdr = mail_hcu & 0x07;
        sprintf(output_string, MOVE_CURS  COLM_1  LINE_7  "ENCD[%u] . . . ." MOVE_CURS
COLM_9  LINE_7, encdr );
        write_b( WR__DETACHED_CMND, output_string );
        break;
      case ENCODER_5 :
        set_add = set_add ? 0 : ENCD__ADD;
        break;

      case NO_MAIL__TIMEOUT :
      case EXIT_PROCEDURE :
      case  PREV_DISPLAY :
        return;
      case INPUT_TERMINAL_HANDLER :
        if( (encdr <= 5) && (sscanf(in_characters, "%ld", &xx) == 1) )
        { if ( password_status == STANDARD_PASSWORD || ( password_status = password_is(
) ) == STANDARD_PASSWORD )
            set_encoder( (ENCD__LOAD | ENCD__C_INT) | set_add | (encdr), xx );
          else encdr = 0xF0;
        }
        else encdr = 0xF1;
      default :
        sprintf( output_string, FORMFEED
          ESC "1PrevDspl"  PREV_DISPLAY_T  "\r"
          ESC "2Enc0port"  ENCODER_0_T "\r"
          ESC "3Enc1star"  ENCODER_1_T "\r"
          ESC "4ENTR    "  BLANK  "\r"
          ESC "5Enc2gyro"  ENCODER_2_T "\r"
          ESC "6Enc3spar"  ENCODER_3_T "\r"
          ESC "7Enc4sum1"  ENCODER_4_T "\r"
          /*ESC "8Enc5sum2"  ENCODER_5_T "\r"*/
```

```
          ESC "8ToggAdd "  ENCODER_5_T "\r"
          MOVE_CURS  COLM_0  LINE_6  "SetEncMail(%3s)=%4X <%2X>%+8ld %6s",
            set_add  ?  "add"  :  "set",  mail_hcu,  encdr,  xx,  (encdr==0xF1)  ?  "In
Err":(encdr==0xF0) ? "PassWd" : " " );
        write_b( WR__DETACHED_CMND, output_string );
        break;
    } /* switch */
  }
}  /* modify_encoders */

/*  void display_current_status( )    */
#define     NO_TRK     0
#define     NO_TRK_F1     1
#define     TRK_F1     2
#define     NO_TRK_F2     3
#define     TRK_F2     4
#define     NO_X     0
#define     X_F1     1
#define     X_F2     2
#define     X_F1F2     3
#define     X_MAG     4
#define     INITIAL_EVNT_X_TIME     12
#define     SETUP_DISP  'z'
#define  write_zone_to_zone_distance  /* filter out close signals */ \
      zone_distance_outp  =  abs(  zone_distance  -  distance__at_last_zone  )  >
min_distance_test_level ? \
        abs( zone_distance - distance__at_last_zone) : zone_distance_outp; \
      distance__at_last_zone = zone_distance;
const char trck_dscrpt[ /*0-4*/ ][5] = {"-f-", "f1", "<F1>", "f2", "<F2>" };
const char evnt_dscrpt[ /*0-4*/ ][5] = {" ", "Xf1", "Xf2", "X1X2", "Xmag" };
double get_encoder__sum( )
{ double encoder_value = get_encoder( ENCD__SUM1_WHL_ADR );
  return (vehicle_orientation == REAR_FORW) ? -encoder_value : encoder_value;
}  /* get_encoder__sum */
void display_current_status( )
{ char data_display_switch = 0;
  int dummy;
  int leng;        /* sprintf */
  int event_x_timer = 0;
  int indx_x = 0;
  int indx = 0;
  double d_dummy;
```

```
  double encoder__left_wheel;
  double encoder__right_wheel;
  double encoder__gyro;
  double encoder__wheel_sum;
  double encoder__wheel_sum_last;
  double distance__at_last_zone;
  double zone_distance;
  double zone_distance_outp = 0.0;
  double wheel_encoder_scale = 1.0 / encd_scal.sum;
  double min_distance_test_level = 8.0 /wheel_encoder_scale;    /* back calculate for
a fast integer test */
  for( dummy = IMAGSF_STARBOARD_FRONT_MAGNET; dummy <= IWRXF2_FREQ2_WIRE_CROSS; dummy++
)
    set_mask( DISCRETE_IN, (unsigned)dummy, LOW_TO_HIGH_MASK, ENABLE_LOW_TO_HIGH );
  zone_distance = distance__at_last_zone = encoder__wheel_sum_last = get_encoder__sum(
);  /* initialize this value */
  for( mail_hcu = SETUP_DISP; ; wait__mail_hcu( 200 MS__TIMEOUT ) )    /* wait for a
HCU selection or vehicle message */
  { switch ( mail_hcu )                      /* The following messages are internally
generated */
    { case F1_WIRE_X_EVENT :
      case F2_WIRE_X_EVENT :
        indx_x = ( event_x_timer >= ( INITIAL_EVNT_X_TIME -1 ) ) ? X_F1F2 :    /* other
wire cross being displayed */
          ( mail_hcu == F1_WIRE_X_EVENT ) ? X_F1 : X_F2;
        zone_distance = get_encoder__sum( );    /* dummy */
        write_zone_to_zone_distance;
        event_x_timer = INITIAL_EVNT_X_TIME;          /* display a long time but then
clear */
        break;
      case MAGNET_SF_X_EVENT :
      case MAGNET_PF_X_EVENT :
      case MAGNET_SB_X_EVENT :
      case MAGNET_PB_X_EVENT :
        zone_distance = get_encoder__sum( );    /* dummy */
        if( ( vehicle_orientation == FRONT_FORW  &&
            ( ( mail_hcu == MAGNET_SF_X_EVENT )  ||  ( mail_hcu == MAGNET_PF_X_EVENT
) ) )
            || ( ( mail_hcu == MAGNET_SB_X_EVENT )  ||  ( mail_hcu == MAGNET_PB_X_EVENT
) ) )
          write_zone_to_zone_distance;
        indx_x = X_MAG;
```

```
        event_x_timer = INITIAL_EVNT_X_TIME;        /* display a long time but then
clear */
        break;
      case CLEAR_EVENT_X_ENTRY :
        indx_x = NO_X;
        event_x_timer = 0;
        break;
      case DEBUG_SPECIAL_DSPLY :
      case SHOW_MEMORY  :
      case PREV_DISPLAY :
      case EXIT_PROCEDURE :
      case STEP__NEXT_DSPLY :
        for( dummy = IMAGSF_STARBOARD_FRONT_MAGNET; dummy <= IWRXF2_FREQ2_WIRE_CROSS;
dummy++ )
          set_mask( DISCRETE_IN, dummy, LOW_TO_HIGH_MASK, DISABLE_INTERRUPT );
        return;
      case TOGGLE_DATA_DSPLY :
        data_display_switch = (data_display_switch +1) & 3;
        break;
      case ENCODER_DIAG :
        modify_encoders( );
      case SETUP_DISP :
        write_b( WR__DETACHED_CMND, FORMFEED
          ESC "1PREVdply"  PREV_DISPLAY_T  "\r"
          ESC "2Clr Encd"  CLEAR_ENCODERS_T  "\r"
          ESC "3         "  ENCODER_DIAG_T  "\r"
          ESC "4         "  SHOW_MEMORY_T  "\r"
          ESC "5         "  STEP__NEXT_DSPLY_T  "\r"        /* select next display */
          ESC "6         "  DEBUG_SPECIAL_DSPLY_T  "\r"        /* select next display
*/
          ESC "7         "  CLEAR_EVENT_X_ENTRY_T  "\r"
          ESC "8         "  TOGGLE_DATA_DSPLY_T  "\r"
          MOVE_CURS  COLM_15  LINE_0  "     "
          MOVE_CURS  COLM_10  LINE_1  " rcv  ms_c"          /* communications test
*/
          MOVE_CURS  COLM_0  LINE_3
          " .====<W>====.      "
          "|             |     "
          "<             >     "
          "|             |     "
          " `====<W>===='      " );
        break;
```

```
    case CLEAR_ENCODERS :
        if( option != AUTO_OPERTN )
        {  set_encoder(   (ENCD__CLR   |   ENCD__C_INT)   |   (ENCD__SUM1_WHL_BIT   |
ENCD__STARB_WHL_BIT | ENCD__PORTS_WHL_BIT) );
          encoder__wheel_sum_last = 0.0;
        }
        zone_distance  =  distance__at_last_zone  =  encoder__wheel_sum_last;        /*
initialize this value */
        zone_distance_outp = 0.0;
        break;
    }
/*     encoder__left_wheel = (encdr <= 5 ) ? get_encoder( encdr ) : -12345.12; */
     encoder__left_wheel = get_encoder( ENCD__PORTS_WHL_ADR );
     encoder__right_wheel = get_encoder( ENCD__STARB_WHL_ADR );
     encoder__wheel_sum_last = encoder__wheel_sum = get_encoder__sum( );
        /* mult by 2 = crude scaling */
    left_wheel_speed   =   2   *   (   get_analog_in(   TACHP_AI__PORTSIDE_TACH   )   -
portside_wheel_analog_center );
    right_wheel_speed   =   2   *   (   get_analog_in(   TACHS_AI__STARBOARD_TACH   )   -
starboard_wheel_analog_center );
    left_antenna_level = GUIDANCE_ANTENNA( STARB_ANT_CHN );
    right_antenna_level = GUIDANCE_ANTENNA( PORTS_ANT_CHN );
    if( vehicle_orientation == REAR_FORW )
    { dummy = left_antenna_level;              /* swap, do not change sign */
      left_antenna_level = right_antenna_level;
      right_antenna_level = dummy;
      dummy = -left_wheel_speed;              /* change sign and swap */
      left_wheel_speed = -right_wheel_speed;
      right_wheel_speed = dummy;
      d_dummy = -encoder__left_wheel;
      encoder__left_wheel = -encoder__right_wheel;
      encoder__right_wheel = d_dummy;
    }
    dummy = /* voltage base */ 100 * get_analog_in( BATTERY_VOLTAGE_CHANNEL );
    battery_voltage = ( dummy +battery_voltage_scale / 2 ) / battery_voltage_scale;
    dummy /= ( battery_voltage_scale / 10 ) -440;    /* 44.0 volts base =440 */
    if(   last_guidance_frequency   ==   FREQ_1   )   indx   =   (   tracking_command   !=
COMPUTER_GUIDANCE ) ? TRK_F1 : NO_TRK_F1;
    else  if(  last_guidance_frequency  ==  FREQ_2  )  indx  =  (  tracking_command  !=
COMPUTER_GUIDANCE ) ? TRK_F2 : NO_TRK_F2;
    else indx = NO_TRK;
    if( event_x_timer-- <= 0 ) indx_x = NO_X;
```

```
    leng = sprintf( output_string, MOVE_CURS  COLM_10 LINE_0  "%3dV:%4d"  MOVE_CURS
COLM_10 LINE_2 "%4d-%-4d"
        MOVE_CURS  COLM_15  LINE_4  "%3d"  MOVE_CURS  COLM_15  LINE_6  "%3d"
        MOVE_CURS  COLM_15  LINE_5  "%4s"  MOVE_CURS  COLM_11  LINE_5 "%s\r",
        battery_voltage, min( 255, max( 0, ( dummy*32 ) / 10 ) ), rcvmcnt & 0x0FFF,
msg_complete & 0x0FFF,
         left_antenna_level,   right_antenna_level,   &trck_dscrpt[indx][0],
&evnt_dscrpt[indx_x][0] );

    switch( data_display_switch )
    { case 0:     /* zone distances */
        leng += sprintf( &output_string[leng], MOVE_CURS  COLM_1  LINE_4 "%8.1f/%-3d"
          MOVE_CURS  COLM_1 LINE_5  "[%8.1f]" MOVE_CURS  COLM_1  LINE_6 "%8.1f/%-3d",
          (( encoder__wheel_sum - distance__at_last_zone ) * wheel_encoder_scale),
left_wheel_speed,
          zone_distance_outp,   (encoder__wheel_sum   *   wheel_encoder_scale),
right_wheel_speed );
        break;

      case 1:     /* raw encoder counts */
        leng   +=   sprintf(   &output_string[leng],   MOVE_CURS     COLM_1     LINE_4
"l%+08.0f/%-4d"
          MOVE_CURS    COLM_1    LINE_5   "s%+08.0f  "  MOVE_CURS    COLM_1    LINE_6
"r%+08.0f/%-4d", encoder__left_wheel,
          left_wheel_speed, encoder__wheel_sum, encoder__right_wheel, right_wheel_speed
);
        break;
      case 2:     /* X,Y,heading */
        leng += sprintf( &output_string[leng], MOVE_CURS  COLM_1  LINE_4 "dX%+09.1f"
          MOVE_CURS  COLM_1  LINE_5 "dY%+9.1f " MOVE_CURS  COLM_1  LINE_6 "Hd %-7.3f
 ", xvf, yvf, tfv );
        break;
      case 3:     /* inertial platform (gyro) */
        leng += sprintf( &output_string[leng], MOVE_CURS  COLM_1  LINE_4 "GYr %+08.0f"
          MOVE_CURS  COLM_1  LINE_5 "GYs %-8.4f " MOVE_CURS  COLM_1  LINE_6 "ENs %-8.4f
",
            (double)get_encoder(ENCD__INERT_PLAT_ADR), tip, tfv );
        break;
    }
    write_b( WR__DETACHED_CMND, output_string );
  }
}  /* display_current_status */
```

```
#define     COMM_LOG     'C'
void request_status_display( )     /*pointer to routine to control with*/
{ for( ; ; )
  { switch ( display_selection )
    { case DISCRETE_STATUS :
        display_discretes( );
        break;
      case ANALOG_STATUS :
        display_analogs( );
        break;
      case COMMUNICATIONS_STATUS :
        display_communications_status( );
        break;
      default :
        display_selection = CURRENT_STATUS;
        display_current_status( );
    } /* switch */
    switch ( mail_hcu )
    { case STEP__NEXT_DSPLY :
        display_selection++;
        break;
      case COMM_LOG :
        display_comm_log( );
        break;
      case INTRP_HIST_DSPLY :
        display_interrupts( );
        break;
      case UPDATE_MRKR :
        display__u_m_s_log( );
        break;
      case DEBUG_SPECIAL_DSPLY :
/*                display__debug_special( );
        break;          */
      case SHOW_MEMORY :
        display_memory( );
        break;
      case PREV_DISPLAY :
      case EXIT_PROCEDURE :
        return;
    }
  }
}  /* request_status_display */
```

```
#define    HARDWARE_OVERRIDE_T  "z"
#define    HARDWARE_OVERRIDE    'z'
void manual_operation( )       /*initialize manual display, setup for display format
*/
{ contactor_updat_msg_flg = NORMAL_UPDATE;
  switch_to_manual_mode( );
  mcp.orientation_last = mcp.orientation = vehicle_orientation;
  for ( mail_hcu = 0; ; )
  { switch ( mail_hcu )
    { case NO_MAIL__TIMEOUT :
        break;
      #if defined (WIRE)
      case AQUIRE_WIRE :
        insert_on_wire( );
        if( option == AUTO_OPERTN ) return;
        continue;
      #endif

      case AQUIRE_FLOOR :
        insert_on_floor( );
        if( option == AUTO_OPERTN ) return;
        continue;
      case PLATFORM :
        put_bit_discrete_out( REL_BRAKES_ADDR_G, IS__OFF );
        platform_control( );
        continue;
      case HARDWARE_OVERRIDE :
        vehicle_ready |= RELEASE_EMERGENCY_STOP;
        put_bit_discrete_out( HARDWR_OVRRIDE_ENABL, IS__ON );        /* Set Override
*/
        break;
      case EXIT_PROCEDURE :
        put_bit_discrete_out( HARDWR_OVRRIDE_ENABL, IS__OFF );      /* reset override
*/
        set_mask( U_M_S__ID, 0/*only line*/, HIGH_AND_LOW_MASK, DISABLE_INTERRUPT );
        man_cntrl_tsk = HCU_CLEAR_MAN;    /* notify v2actt */
        return;
      case STATUS :
        request_status_display( );
      default :
        offcom( );
        write_b( WR__DETACHED_CMND, FORMFEED
```

```
          ESC "1MAS-TER "  MASTER_MENU_T  "\r"
          ESC "2sta-tus "  STATUS_T  "\r"
          ESC "3LIFTtop "  PLATFORM_T  "\r"
          ESC "4Override"  HARDWARE_OVERRIDE_T  "\r"
          ESC "7INstWire"  AQUIRE_WIRE_T  "\r"
          ESC "8INstFlor"  AQUIRE_FLOOR_T  "\r"
          MOVE_CURS  COLM_1  LINE_4  "MANUAL\rOPERATION" );
        put_bit_discrete_out( REL_BRAKES_ADDR_G, IS__ON );
        set_mask( U_M_S__ID, 0/*only line*/, HIGH_AND_LOW_MASK, ENABLE_HIGH_AND_LOW );
/* init wake-up on new magnet */
        man_cntrl_tsk = HCU_CNTRL_MAN;          /* notify v?actt */
        send__mail( vactmt, HCU_CNTRL_MAN );    /* notify v?actt */
    } /* switch */
    basic_update( );           /* update the basic state of control( MANUAL_OPER,
AQUIRE_WIRE, etc. ) */
    wait__mail_hcu( 200 MS__TIMEOUT );      /* wait for a HCU selection or vehicle
message */
  }
}  /* manual_operation */

#define    AGVC__MANUAL_T     "b"
#define    AGVC__MANUAL    'b'
#define    AGVC__AUTOMATIC_T     "c"
#define    AGVC__AUTOMATIC    'c'
#define    AGVC__REMOVE_VEH_T  "d"
#define    AGVC__REMOVE_VEH    'd'
#define    ZONES_OK_T  "f"
#define    ZONES_OK    'f'
#define    INSERT_MANUAL_T  "g"
#define    INSERT_MANUAL    'g'
#define    INSERT_AUTOMATIC_T  "h"
#define    INSERT_AUTOMATIC    'h'
void hcu_insert_details( )
{ unsigned dummy_word;
  unsigned temp_rcvmcnt;
  unsigned  step;        /* initialize display */
  for( step = 0; ; wait__mail_hcu( TIMEOUT__FOREVER ) /* wait HCU selection, veh mess
*/)
  { switch ( mail_hcu )             /* The following selections are made from the HCU
*/
    { case INPUT_TERMINAL_HANDLER :         /* logic for answer/responce entries */
        if( sscanf( in_characters, "%d", &dummy_word ) )
```

```
        { if( ++step == 1 ) veh_status.previous_zone = dummy_word;
          else if( step == 2 ) veh_status.current_zone = dummy_word;
        }
        else step = ( step -1 ) & 0x0003;
        break;
      case ZONES_OK :
        step = 2;
        break;
      case AGVC__MANUAL :
        insert_request = HCU_INSERT__AGVC_MANUAL;
        mail_hcu = AUTO_OPERTN;
        return;
      case AGVC__AUTOMATIC :
        insert_request = HCU_INSERT__AGVC_AUTOMATIC;
        mail_hcu = AUTO_OPERTN;
        return;
      case INSERT_MANUAL :
        insert_request = HCU_INSERT__AGVC_MANUAL;
        mail_hcu = AQUIRE_WIRE;
        return;
      case INSERT_AUTOMATIC :
        insert_request = HCU_INSERT__AGVC_AUTOMATIC;
        mail_hcu = AQUIRE_WIRE;
        return;
      case AGVC__REMOVE_VEH :
        temp_rcvmcnt = rcvmcnt;    /* notes when a new message occurs in following loop
*/
        veh_status.vehicle_error = HCU__AGVC_REMOVE_VEH;
        for( ; mail_hcu != EXIT_PROCEDURE; wait__mail_hcu( 1 SEC__TIMEOUT ) )
        { sprintf(output_string, FORMFEED
              ESC "1MAS-TER " MASTER_MENU_T "\r"
              MOVE_CURS COLM_0 LINE_5 "%s" LOCK_CURSOR,
            ( tracking_command != FREQ_1   &&   tracking_command != FREQ_2 ) ?
"Vehicle\rNOT Inserted" :
            rcvmcnt > temp_rcvmcnt ? "AGVC acknowledges\rDrive Vehicle Away" :
            "Wait up to 30 sec\rFor AGVC Responce" );
          write_b( WR__DETACHED_CMND, output_string );         /* write the display
format and setup the softkeys. */
        }
      case EXIT_PROCEDURE :        /* fall through */
        option = MASTER_MENU;
        return;
```

```
    }

    sprintf(output_string,  FORMFEED
        ESC "1MAS-TER "  MASTER_MENU_T  "\r"
        ESC "4ENTR    "  BLANK  "\r"
        "%s"  MOVE_CURS  COLM_0  LINE_6  "Zones%4d->>-%-4d\r%s",
      step < 2 ?
        ESC "2RE- MOVE"  AGVC__REMOVE_VEH_T  "\r"
        ESC "3Same Zns"  ZONES_OK_T  "\r"
        :
        ESC "2AGVC MAN"  AGVC__MANUAL_T  "\r"
        ESC "3AGVCAUTO"  AGVC__AUTOMATIC_T  "\r"
        ESC "6INSR MAN"  INSERT_MANUAL_T  "\r"
        ESC "7INSRAUTO"  INSERT_AUTOMATIC_T  "\r",
      veh_status.previous_zone, veh_status.current_zone, step == 0 ? " from ? " :
      step == 1 ? "   to ? " : "Insert, SELECT Mode " );
    write_b( WR__DETACHED_CMND, output_string );       /* write the display format and
setup the softkeys. */
  }
}  /* HCU_insert_details */

/*  void automatic_operation( ) */
#define     PATH5_DFIN_T      "l"
#define     PATH5_DFIN        'l'
#define     PATH6_DFIN_T      "m"
#define     PATH6_DFIN        'm'
#define     PATH7_DFIN_T      "n"
#define     PATH7_DFIN        'n'
#define     PATH8_DFIN_T      "o"
#define     PATH8_DFIN        'o'
#define     HERTZ__500HZ    2            /* control to 8742 */
#define     HERTZ__10HZ    90            /* control to 8742 */
#define     HERTZ__1_2HALF    0x81        /* ( 129 )frequency to blink lights */
#define     IENBL_HRDWR_ENABLED    9
#define     AUTO_DSPLY__TOGGLE_T  "y"
#define     AUTO_DSPLY__TOGGLE    'y'
#define     BYPASS_RRUN_T  "x"
#define     BYPASS_RRUN    'x'
#include "V4PTHDEF.K"    /* definition of paths 5,6,7,8 in AGVC communications format
*/
typedef enum { AUTO__NOT_READY, PASS_STAT_CHKS, SWITCH__AUTO_OPERTN } auto_stat_type;
  void load_rom_path( unsigned char const *path_adr )
```

```
  { offcom( );    /* kill communications */
    memcpy( command_buffer, path_adr, (unsigned)*path_adr +1 );
    send__mail( vcmdmt, COMMN_BUFFR_LOADED );    /* notify, buffer loaded */
  }
void automatic_operation( )
{ auto_stat_type  automatic_status;
  unsigned dummy_word;
  int indx;
  unsigned bypass_selected = ILLEGAL_PASSWORD;
  man_cntrl_tsk = HCU_CLEAR_MAN;    /* notify v2actt, release action task from driving
vehicle */
  veh_status.sequence_no = 0;
  veh_status.wait = 0;
  agvc_err_status = NO_AGVC_MESSAGE;
  clear_communications_status( );
  send__mail( vcmdmt, INSERTING_VEHICLE );
  compute_battery_status(  0 /*averaging period*/ );
  for( automatic_status = AUTO__NOT_READY; ; )
  { if( mail_hcu == AUTO_OPERTN )      /* write the display format and setup the
softkeys. */
    { sprintf(output_string, FORMFEED
        ESC "1Prevdisp"  PREV_DISPLAY_T  "\r"
        ESC "2BypsRrun"  BYPASS_RRUN_T "\r"
        ESC "3AutoDspl"  AUTO_DSPLY__TOGGLE_T  "\r"
        ESC "5         "  PATH5_DFIN_T "\r"
        ESC "6         "  PATH6_DFIN_T "\r"
        ESC "7         "  PATH7_DFIN_T "\r"
        ESC "8         "  PATH8_DFIN_T "\r"
        MOVE_CURS  COLM_0  LINE_3  "INSERT    Dsply%3s  STATUS",
        display_in_automatic ? "ON " : "OFF" );    /* toggle */
      write_b( WR__DETACHED_CMND, output_string );
    }
    indx = sprintf( output_string, MOVE_CURS  COLM_0  LINE_5);
    if( error_code )          /* codes 1-99 reserved as messages not errors */
      sprintf( &output_string[ indx ], "ERROR Number %2X    %20s%20s" LOCK_CURSOR,
error_code, "Clear Error",
        " Automatic Operation" );
    else
    { if( automatic_status == AUTO__NOT_READY )
      { automatic_status = PASS_STAT_CHKS;    /* initialize for test */
        if( vehicle_number == 0 )          /* undifined vehicle number */
        { automatic_status = AUTO__NOT_READY;
```

```
          sprintf( &output_string[ indx ], "%20s%40s", "UNDEFINED Veh No(0)", " " );
          indx += 20;
        }
        if( (ins_vm2.x == 0.0) && (tracking_command != FREQ_1) && (tracking_command !=
FREQ_2) )    /* not inserted */
        { automatic_status = AUTO__NOT_READY;
          sprintf( &output_string[ indx ], "%20s%40s", "INSERT Err(MAG/WIRE)", " " );
          indx += 20;
        }
        if( get_bit_discrete_in( IENBL_HRDWR_ENABLED ) == 0 ) /* not reset */
        { automatic_status = AUTO__NOT_READY;
          sprintf( &output_string[ indx ], "%20s%40s", "RESET(E-chain)" " " );
          indx += 20;
        }

        if( automatic_status == PASS_STAT_CHKS )
        { do_long_status_flag = 1;
          if( rcvmcnt == 0 )
          { automatic_status = AUTO__NOT_READY;
            sprintf( &output_string[ indx ], "%20s%40s", "Waiting AGVC POLL", " " );
            veh_status.vehicle_error = insert_request;
          }
          else if( agvc_err_status == NO_AGVC_MESSAGE )
          { automatic_status = AUTO__NOT_READY;
            sprintf( &output_string[ indx ], "%20s%40s", "Waiting AGVC COMMAND", " "
);

            veh_status.vehicle_error = insert_request;
          }
          else if( agvc_err_status != AGVC_NO_ERRORS )     /* AGVC     command error
recieved? */
          { automatic_status = AUTO__NOT_READY;
            sprintf( &output_string[ indx ], "Err # " INTEL_HEX_FRMT "%10s%-40s",
               INTEL_HEX_FIX((unsigned)agvc_err_status), " ",
               agvc_err_status == 0x04 ? "Invalid ZONE entry" : "Error REMOVE vehicle"
);
          }
        }
      }
    }
    if( automatic_status > AUTO__NOT_READY )
    { if( automatic_status == PASS_STAT_CHKS )
      { set_vehicle_alarms( HERTZ__500HZ, HERTZ__10HZ, IS__OFF );    /* horn */
```

```
        automatic_status = SWITCH__AUTO_OPERTN;
      }
      sprintf( &output_string[ indx ], "%20s%20s%20s", "AUTOMATIC", "RELEASE hand
control", "stand CLEAR" );
    }
    output_string[ 64 ] = '\0';          /* force end of string */
    write_b( WR__DETACHED_CMND, output_string );
    wait__mail_hcu( 700 MS__TIMEOUT );          /* wait ( blink off, message, or HCU
selection ) */
    switch ( mail_hcu )
    { case NO_MAIL__TIMEOUT :
        if( automatic_status > AUTO__NOT_READY)
        { sprintf( &output_string[ indx ], "%20s", " " );  /* blank for blink */
          delay( 300 MS__TIMEOUT );          /* wait (blink off) */
          write_b( WR__DETACHED_CMND, output_string );
        }
        break;
        /* The following selections are made from the HCU */
      case AUTO_DSPLY__TOGGLE :
        display_in_automatic = display_in_automatic == DSPL_ENABLED ? DSPL_DISABLED :
DSPL_ENABLED;     /* toggle */
        mail_hcu = AUTO_OPERTN;     /* force update */
        break;
      case PATH5_DFIN :
      case PATH6_DFIN :
      case PATH7_DFIN :
      case PATH8_DFIN :
        mvq.load = 1;

        switch ( mail_hcu )
        { case PATH5_DFIN :
            load_rom_path( PATH_5 );
            break;
          case PATH6_DFIN :
            load_rom_path( PATH_6 );
            break;
          case PATH7_DFIN :
            load_rom_path( PATH_7 );
            break;
          case PATH8_DFIN :
            load_rom_path( PATH_8 );
        }
```

```
            /* fall through */
      case BYPASS_RRUN :
        if( bypass_selected == ILLEGAL_PASSWORD ) bypass_selected = password_is( );
 /* not selected? */
        if( bypass_selected != STANDARD_PASSWORD ) break; /* no bypass? */
        display_in_automatic = DSPL_ENABLED;
        option = AUTO_OPERTN;
        mail_hcu = EXIT_PROCEDURE;
        automatic_status = SWITCH__AUTO_OPERTN;  /* setup to renotify other tasks */
      case EXIT_PROCEDURE :     /* fall through */
        if(  automatic_status  !=  SWITCH__AUTO_OPERTN  )  vsysbug(  HAND_CONTROL_ID,
HCU_READY_CODE );    /*re-start*/
        if(    (option    ==    HAND_CONTROL_FRONT_DISCONNECT)    ||    (option    ==
HAND_CONTROL_REAR_DISCONNECT) ) option = AUTO_OPERTN;
        veh_status.vehicle_error = insert_request = 0; /* clear any AGVC reqst */
        if( option == AUTO_OPERTN )    /* HCU disconnected or bypassed */
        { man_cntrl_tsk = HCU_CLEAR_MAN;    /* notify v2actt, release action task from
driving vehicle */
          mvq.excut = 1;
          pt__mvq = &mvq.lst[1];
          set_vehicle_alarms( HERTZ__500HZ, HERTZ__1_2HALF, IS__OFF );
          delay( 250 MS__TIMEOUT );        /* wait for manual in auto to reset */
          notify_all_tasks( COMMAND_PROCESSOR_MASTER );
        }
      case PREV_DISPLAY :    /* fall through */
        return;
    }
  }
}  /* automatic_operation */

#if defined( WIRE )
void insert_on_wire( )
{ contactor_updat_msg_flg = NORMAL_UPDATE;        /*initialize acquisition display,
setup for display format */
  ins_vm2.x = 111111.1;     /* FLAG, Make sure UMS interrupt does not reset Navigation
X,Y */
  insert_request = 0;    /* clear request */
  if( veh_status.vehicle_error <= HCU__AGVC_REMOVE_VEH ) veh_status.vehicle_error = 0;
/* clear any AGVC reqst */
  for( mail_hcu = 0; ; )
  { switch ( mail_hcu )
    { case NO_MAIL__TIMEOUT :
```

```
          break;
        #if defined (WIRE)
        case TRACK_WIRE :
          track_wire_diagnostic( );
          continue;
        #endif

        case PLATFORM :
          put_bit_discrete_out( REL_BRAKES_ADDR_G, IS__OFF );
          platform_control( );        /* separate menu selection */
          continue;
        case HCU_AUTO :
          hcu_insert_details( );
          continue;
        case AUTO_OPERTN :
          automatic_operation( );
          continue;
        case PREV_DISPLAY :
        case EXIT_PROCEDURE :
          return;
        case STATUS :
          request_status_display( );    /* fall through */
        default :
          write_b( WR__DETACHED_CMND, FORMFEED
              ESC "1Man-ual "  PREV_DISPLAY_T  "\r"
              ESC "2Sta-tus "  STATUS_T  "\r"
              ESC "3LIFTtop "  PLATFORM_T  "\r"
             #if defined (WIRE)
              ESC "4TRCKwire"  TRACK_WIRE_T  "\r"
             #endif
              ESC "7HCU auto" HCU_AUTO_T "\r"
              ESC "8AGVCAUTO" AUTO_OPERTN_T "\r"
              MOVE_CURS  COLM_0  LINE_4  "Insert\rVehicle" );
          option = AQUIRE_WIRE;
          put_bit_discrete_out( REL_BRAKES_ADDR_G, IS__ON );
          man_cntrl_tsk = HCU_CNTRL_INSRT;    /* notify v?actt */
    } /* switch */
    basic_update( );    /* update the basic state of control( MANUAL_OPER, AQUIRE_WIRE,
etc. ) */
    wait__mail_hcu( 200 MS__TIMEOUT );      /* wait for a HCU selection or vehicle
message */
  }
```

```
} /* insert_on_wire */
#endif

void insert_on_floor( )
{ u_m_insrt_indx = u_m_log_indx;    /* initialize indexes for inserting */
  ins_vm2.x = 0.0;       /* FLAG, not zero after magnet2 passed during insert */
  contactor_updat_msg_flg = NORMAL_UPDATE;        /*initialize acquisition display,
setup for display format */
  autocom( );       /* enable communications 1st time */
  insert_request = 0;    /* clear request */

  if( veh_status.vehicle_error <= HCU__AGVC_REMOVE_VEH ) veh_status.vehicle_error = 0;
/* clear any AGVC reqst */
  for( mail_hcu = 0; ; )
  { switch ( mail_hcu )
    { case NO_MAIL__TIMEOUT :
        break;
      case PLATFORM :
        put_bit_discrete_out( REL_BRAKES_ADDR_G, IS__OFF );
        platform_control( );        /* separate menu selection */
        continue;
      case HCU_AUTO :
        hcu_insert_details( );
        continue;
      case AUTO_OPERTN :
        ins_vr.x = xvf;     /* save current relative(insert) position for insertion
procedure */
        ins_vr.y = yvf;
        ins_vr.ang = tfv;
        automatic_operation( );
        continue;
      case PREV_DISPLAY :
      case EXIT_PROCEDURE :
        set_mask( U_M_S__ID, 0/*only line*/, HIGH_AND_LOW_MASK, DISABLE_INTERRUPT );
        return;
      case STATUS :
        request_status_display( );     /* fall through */
      default :
        set_mask( U_M_S__ID, 0/*only line*/, HIGH_AND_LOW_MASK, ENABLE_HIGH_AND_LOW );
/* init wake-up on new magnet */
        write_b( WR__DETACHED_CMND, FORMFEED
            ESC "1Man-ual "  PREV_DISPLAY_T  "\r"
```

```
            ESC "2Sta-tus "  STATUS_T  "\r"
            ESC "3LIFTtop "  PLATFORM_T  "\r"
            ESC "7HCU auto" HCU_AUTO_T "\r"
            ESC "8AGVCAUTO" AUTO_OPERTN_T "\r"
            MOVE_CURS  COLM_0  LINE_3  "Insert\rFloor" );
          option = AQUIRE_WIRE;
          put_bit_discrete_out( REL_BRAKES_ADDR_G, IS__ON );
          set_mask( U_M_S__ID, 0/*only line*/, HIGH_AND_LOW_MASK, ENABLE_HIGH_AND_LOW
);  /* init wake-up on new magnet */
          man_cntrl_tsk = HCU_INSRT_FLOOR;    /* notify v?actt */
    } /* switch */
    wait__mail_hcu( 100 MS__TIMEOUT );     /* wait for a HCU selection or vehicle
message */
    sprintf( output_string, MOVE_CURS COLM_0 LINE_5 "m1:m2 %-4d\rX %-8.6g%Y %-8.6gH
%-8.5g U %-6.2f",
      u_m_log_indx -u_m_insrt_indx, xvf, yvf, tfv, u_m_log( u_m_log_indx & U_M_LOG_MSK
].pos_y );
    write_b( WR__DETACHED_CMND, output_string );
  }
}  /* insert_on_floor */

void wait__til_mail(unsigned wait_time);    /* See V?actt */
void hcu_cntrl_master( )       /* TASK = V?ACTT,  call manual control routines in HCU
code */
{  for(  man_cntrl_tsk_prv  =  man_cntrl_tsk;  man_cntrl_tsk  &&  (action_mail  !=
COMMAND_PROCESSOR_MASTER);
       wait__til_mail(30 MS__TIMEOUT) /* don't hog processor, throw away v2actt mail
with HCU cntrls */ )
  { if( man_cntrl_tsk_prv != man_cntrl_tsk )
    { man_cntrl_tsk_prv = man_cntrl_tsk;
      stop_vehicle( );
    }
    switch( man_cntrl_tsk )
    {    case HCU_CNTRL_INSRT :
           if( hcu_mode == MANUAL_OPER )
           { read_antennas( );    /* read alternate frequencies if available */
             find_the_wire( );
           }
         case HCU_INSRT_FLOOR :
         case HCU_CNTRL_MAN :
           joystick_commands_vehicle( );
           break;
```

```
#if defined (WIRE)
 case TRACK_MASTER :
   /* track_wire_from_joystick( );      See old versions */
   break;
#endif
 case PLATFORM_CNTRL :
   platform_control_with_joystick( );
   break;
 default :
   stop_vehicle( );
   man_cntrl_tsk = HCU_CLEAR_MAN;    /* release action task from driving vehicle
*/
   /*put_bit_discrete_out( OGUIDM_SELECT_COMP_GUIDANCE, IS__ON );*/
   return;
   }
  }
} /* hcu_cntrl_master */

#define    HERTZ__500    2
#define    HERTZ__30    32
void vehicle_sleep( )    /* no hardware, no code test */
{ unsigned frequency;    /* dummy */
  stop_vehicle( );
  veh_status.vehicle_error = VEHICLE_IS_ASLEEP;
  delay( 1 SEC__TIMEOUT );
  for( frequency = HERTZ__500; frequency <= HERTZ__30; frequency++ )    /*sleep alarm*/
  { set_vehicle_alarms( frequency, IS__ON, ( frequency | 0xC0 ) );
      /* update handcontroller message if someone connects it */
    write_b( WR__DETACHED_CMND, FORMFEED  "\r\rVehicle SLEEPING\rTo recover!\r Power
OFF, then ON"  LOCK_CURSOR );
    delay( 1 SEC__TIMEOUT );
  }
  set_vehicle_alarms( frequency, IS__ON, IS__ON );
  put_bit_discrete_out( OSLPWK_SLEEP_DISCRETE_ADDRESS, IS__ON );
  for( ; ; delay( 2 SEC__TIMEOUT ) )  /* disappear down this hole, lock out world,
update HCU message if re-connected */
    write_b( WR__DETACHED_CMND, FORMFEED  "\r\rVehicle SLEEPING\rTo recover!\r Power
OFF, then ON"  LOCK_CURSOR );
} /* vehicle_sleep */

void reset_vehicle( )
{ stop_vehicle( );
```

```
  antenna_over_wire = NOT_OVER_WIRE;    /* read antennas first thing */
  last_guidance_frequency = guidance_frequency_select = FREQ_1;
  put_bit_discrete_out( OFREQ1_SELECT_GUID_FREQ_1, guidance_frequency_select );   /*
toggle freq next read */
  put_bit_discrete_out( REL_BRAKES_ADDR_G, IS__OFF );
  left_antenna_level    =    right_antenna_level    =    last_right_antenna_level    =
last_left_antenna_level = 0; /* out of range */
  tracking_command = COMPUTER_GUIDANCE;
  left_wheel_speed = right_wheel_speed = 0;
  platform_setpoint = 0;    /* set by HCU when not in automatic else */
  status_of_communications = NOT_ESTABLISHED;
  action = STOP_WHEELS;
  man_cntrl_tsk = HCU_CLEAR_MAN;    /* notify v2actt, release action task from driving
vehicle */
  option = DEAD;
}  /* reset_vehicle */

#define    FOLLOW_F1_CMD    0x01         /* 2#00000001 */
#define    FOLLOW_F2_CMD    0x02         /* 2#00000010 */
#define    FRONT__FRWD_CMD    0x04  /* 2#00000100 */
#define    D_OUT__PORTS_LIGHT    9
#define    D_OUT__STARB_LIGHT    10
#define    D_OUT__E_STOP_LIGHT    11
#define    IENBL_HRDWR_ENABLED    9
#define    HERTZ__1000    1    /* control to 8742 */
#define    HERTZ__200    5    /* control to 8742 */
#define    HERTZ__20    70    /* control to 8742 */
#define    HERTZ__1_2HALF    0x81    /* ( 129 )frequency to blink lights */
#define    SECONDS__2    0x86
unsigned  wake_up__auto_recovery( )
{ set_vehicle_alarms( HERTZ__1000, HERTZ__20, HERTZ__1_2HALF );     /* sound: notify
to reset(button) */
  put_bit_discrete_out( D_OUT__E_STOP_LIGHT, IS__ON );    /* light E-stop light */
  put_bit_discrete_out( HARDWR_PWR_ENABL, IS__ON );
  for( option = MANUAL_OPER; mail_hcu != EXIT_PROCEDURE; wait__mail_hcu( 1 SEC__TIMEOUT
) )
  { if( get_bit_discrete_in( IENBL_HRDWR_ENABLED ) )    /* RESET enabled */
    { set_vehicle_alarms( IS__OFF, IS__OFF, IS__OFF );    /* turn off estop light and
horn */
      /*put_bit_discrete_out( OGUIDM_SELECT_COMP_GUIDANCE, HARDWARE_GUIDANCE );*/
      if( ( previous_path_dscrpt & FREQUENCY_MASK ) == FOLLOW_F1_CMD )
        put_bit_discrete_out( OFREQ1_SELECT_GUID_FREQ_1, FREQ_1 );
```

```
      else if( ( previous_path_dscrpt & FREQUENCY_MASK ) ==  FOLLOW_F2_CMD )
        put_bit_discrete_out( OFREQ1_SELECT_GUID_FREQ_1, FREQ_2 );
      else return 0x8001;     /* auto_recovery: undefined guidance freq */
      delay( 1 SEC__TIMEOUT );    /* delay for hardware guidance to settle down */
      if( get_bit_discrete_in( IOVRW_ANT_OVER_WIRE ) == NOT_OVER_WIRE ) return 0x8002;
  /* recovery, no guidance */
      put_bit_discrete_out( D_OUT__PORTS_LIGHT, IS__ON );    /* turn on ports lights
*/
      put_bit_discrete_out( D_OUT__STARB_LIGHT, IS__ON );    /* turn on starb lights
*/
      set_vehicle_alarms( HERTZ__200, SECONDS__2, IS__OFF );   /* horn with worble */
      compute_battery_status( /*averaging*/ 0 /*period*/ );
      for( ; mail_hcu != EXIT_PROCEDURE; wait__mail_hcu( 1 SEC__TIMEOUT ) )
      { if( rcvmcnt )         /* message(s) received */
        { vehicle_orientation =              /* setup vehicle orientation for action
module */
            ( previous_path_dscrpt & DIRECTION_CMD_MASK ) == FRONT__FRWD_CMD ?
FRONT_FORW : REAR_FORW;
          notify_all_tasks( AUTOMATIC_RESTART );    /* vehicle now in automatic mode
*/
          set_vehicle_alarms( IS__OFF, IS__OFF, IS__OFF );   /* horns and E-stop light
*/
          option = AUTO_OPERTN;     /* restore option */
          return 0;     /* recovered: exit in automatic, error code = 0 */
        }
      }
      break;
    }
  }
  return 0x8007;     /* aborted by operator */
}  /* wake_up__auto_recovery */

/*  void vhcutc_main(.)    hand_control_main ( vhcutc to be compatable with assembler
stub ) */
#define     ERROR_RESET_T   "e"
#define     ERROR_RESET     'e'
#define     HCU_DISCONNECTED     0
#define     HERTZ__1000_C     1     /* control to 8742 */
#define     HERTZ__20_C     70    /* control to 8742 */
#define     HERTZ__1_2HALF     0x81     /* ( 129 )frequency to blink lights */
#define     BUMPER_RESET_CHANNEL     5
#define     PULSE_WO_INTRPT     1
```

```
struct err_typ
{ unsigned err_code;
  char err_msg[20];
} const ERROR_TEXT[] =
  { 0x8002,"NoWire AutoPwrUP",      0x8003,"Initialization",      0x8004,"HCU not
connected",   0x8005,"E-stop AutoPwrUP",
    0x8010,"No XY's defined",     0x8011,"XY-Insert LengErr",
      0x9101,"Auto 2 Times",
    0x9102,"Bad Cmnd",            0x9103,"Bad Cmnd",          0x9104,"Bad Mail",
      0x9105,"Bad Mail",
    0x9106,"CmndQue Lift",          0x9107,"Cmnd Seq. No.",       0xA080,"AutoPwrUP
w/E-stop",  0xA080,"Setup( TX )",
    0xA001,"Get error",           0xB001,"DR-state",          0xB002,"Encoder range",
     0xB003,"DR-intent",
    0xB004,"BAD wakeup mode",    0xB005,"BAD motion mode",  0xB006,"BAD act.message",
   0xB007,"BAD ENC/trackwr",
    0xB008,"BAD  ENC  chan",                   0xB00B,"BAD  mail",
0xB00D,"Direct.orientation",  0xB00F,"Unkn CMND tran Q",
    0xB010,"Contactor output",    0xB011,"Unimplemented",     0xB012,"Auto Cntrl w/o
cmnd", 0xB013,"No CMNDS to trans",
    0xB014,"Invalid SETPT cmnd",  0xB015,"Action QUE OvFlw",  0xB016,"Action QUE
UndFlw",    0xB017,"Encoder QUE OvFlw",
    0xB018,"Encoder QUE UndFlw",  0xB01B,"Transl que OvFlw",  0xB01C,"Trans que
UndFlw",    0xB01D,"Unknown command",
    0xB01F,"Turn zone too small", 0xB020,"Missed MAGNET",    0xB021,"Bad Last Cmnd",
     0xB022,"Missed WIRE X",
    0xB024,"Missed GUIDEWIRE",   0xB025,"Turn que UndFlw",  0xB026,"Turn que UndFlw",
   0xB027,"BRAKE fail/KeyByps",
    0xB028,"DISTANCE too small",  0xB02A,"Bad cmnd",          0xB02B,"Bad cmnd",
      0xB02C,"Bad cmnd",
    0xB02F,"Bad cmnd",             0xB031,"Bad cmnd",           0xB032,"Actn already
awake",  0xB033,"FineDist w/o decel",
    0xB034,"Stop/contactor err",   0xB035,"BRAKES notReleasd", 0xB036,"No mov aftr
trn/rot", 0xB038,"Bad direction",
    0xB039,"Bad U-turn",            0xB03D,"Bad mail",             0xB03E,"Bad PATH
rot/trn",     0xB03F,"Proc call Err",
    0xB041,"Neg. fine distance",  0xB043,"Braker tripped",    0xB044,"Bad cmnd",
      0xB045,"Slide after E-stop",
    0xB047,"Bad rot. cmnd",      0xB048,"Bad S-turn cmnd",  0xB049,"Bad U-turn cmnd",
   0xB050,"Load control status",
    0xB051,"Combined short zone", 0xB052,"Excess slip, rot.", 0xB053,"Bad turn radius",
   0xB054,"Set Enc fail/fin-dis",
```

```
    0xB060,"Bad option cmnd",      0xB07E,"No ENCODER int.",    0xB08C,"Non-recover
 E-STOP",  0xB096,"Lost GUIDANCE",
    0xD301,"Lift TIMEOUT",        0xD302,"Lift MOVEMENT",     0xD307,"Not lift cmnd",
     0xE880,"8274 status",
    0xE801,"8274 error",          0xF080,"DIO board init",    0xF001,"DIO send test",
     0xF002,"DIO rec. test",
    0xF003, "DIO-AN_OUT-FIFO",     0xF180,"DIO Int.0",         0xF106,"DIO Int.6",
    0xF107,"DIO Int.7",
    0xF201,"Put MESSAGE",
    0xF202,"Start task",          0xF203,"Cannot wake task",  0xF300,"Bad Intpt",
      0xFC80,"STK OvFlw",
    0xFC80,"INT STK OvFlw",       0xFC01,"TMR STK OvFlw",     0xFC02,"COM STK OvFlw",
     0xFC03,"SUB STK OvFlw",
    0xFC04,"TRN STK OvFlw",       0xFC05,"ACT STK OvFlw",     0xFC06,"CMD STK OvFlw",
     0xFC07,"HCU STK OvFlw",
    0xFC08,"INI STK OvFlw",       0xFC09,"EXE STK OvFlw",     0xFFFE,"Int. check",
      0xFFFF,"Undefined Int Msk",
         /* insert additional errors before here */
    0x8888,"Undefined Error"
  };
#define    N_ERRS  ( sizeof ERROR_TEXT / sizeof ERROR_TEXT[ 0 ] -1 )
  void write_error( )
  { unsigned dict_indx;
    unsigned write_count;
    veh_status.vehicle_error = error_code;    /* set error in long status field */
    do_long_status_flag = 1;
              /* search for error code match */
    for ( dict_indx = 0; ( dict_indx < N_ERRS ) && ( error_code != ERROR_TEXT[
dict_indx ].err_code ); dict_indx++ );
    write_count = sprintf( output_string, FORMFEED
        ESC "1ERR rset" ERROR_RESET_T "\r" MOVE_CURS  COLM_0  LINE_4  "Fatal Err "
INTEL_HEX_FRMT ", "
        INTEL_HEX_FRMT"\r%s"        LOCK_CURSOR,    INTEL_HEX_FIX(error_code),
INTEL_HEX_FIX(error_vrbl),
        ERROR_TEXT[ dict_indx ].err_msg );
    if( ( error_code >= 0xF000 ) && ( error_code <= 0xF004 ) )
    { sprintf( &output_string[ write_count ], MOVE_CURS COLM_0 LINE_6  "Dev# %2d Stat
"INTEL_HEX_FRMT" Hx"  LOCK_CURSOR,
        error_device /2, INTEL_HEX_FIX(error_status) );
    }
    else if( error_code == 0xF300 )
    { sprintf( &output_string[ write_count ], MOVE_CURS  COLM_0  LINE_6  "INTR ADDR
```

```
"INTEL_HEX_FRMT":"INTEL_HEX_FRMT LOCK_CURSOR,
        INTEL_HEX_FIX(error_segment), INTEL_HEX_FIX(error_offset) );
    }
    write_b( WR__DETACHED_CMND, output_string );
  } /* write_error */
  void restart_in_manual( )
  { option = MANUAL_OPER;
    vsysbug ( HAND_CONTROL_ID, 0 );     /*re-start, killing active tasks, forcing
READY_CODE */
  }  /* restart_in_manual */
  void hcu_control()     /* **************** HCU connected/ manual operation required
*********** */
  { initialize( );
    reset_vehicle( );
    switch_to_manual_mode( );
    hcu_mode_text = DEAD_TEXT_T;
    hcu_mode = DEAD;
    set_vehicle_alarms( IS__OFF, IS__OFF, IS__OFF );
    if( auto_reset == 12345 )    /* automatic pickup of bumper reset */
    { set_bit_discrete_out( BUMPER_RESET_CHANNEL, PULSE_WO_INTRPT, 100 /*pulse length*/
);
      auto_reset = 0;
    }
    vehicle_ready = get_byte_discrete_in( PORT_1 );
    veh_status.status_set &= ~E_STOPPED_V;
    if( vehicle_ready  &  HCU_FRONT_CONNECT_MASK )    /* rear is forward? (connected
in front) */
    { vehicle_orientation = REAR_FORW;   /* front connection: rear = forward direction
*/
      veh_status.status_set &= ~FORWARD_IS_FRONT_V;
    }
    else    /* default front is forward */
    { vehicle_orientation = FRONT_FORW;
      veh_status.status_set |= FORWARD_IS_FRONT_V;
      if( ( vehicle_ready  &  HCU_REAR_CONNECT_MASK ) == 0 )  /* HCU connection not
sensed */
      { error_code = 0x8004;    /* DI does not sense hand controller */
        write_error( );
        delay( 5 SEC__TIMEOUT );    /* wait for awhile */
      }
    }
    error_code = 0;
```

```
    veh_status.vehicle_error = veh_status.error = (unsigned)(veh_status.sequence_error
= 0);
    offcom( );
    put_bit_discrete_out( HARDWR_PWR_ENABL, IS__ON );
    put_bit_discrete_out( OANTF_SELECT_FRONT_GUIDANCE, vehicle_orientation );
    calibrate_i_o( );
    option = MANUAL_OPER;
    mail_hcu = MASTER_MENU;
    vehicle_ready &= WHEEL_BRKS__PWR_ENBLD_MASK;    /* isolate wheel brakes and Estop
bits (ready == bits off) */
    display_in_automatic = DSPL_DISABLED;
    hand_control_menu( );     /* set-up the master menu display */
    write_err_msg = 0;
    if( option != AUTO_OPERTN ) restart_in_manual( ); /* returned in auto */
  }    /* hcu_control */
void vhcutc_main( )    /* hand_control_main ( vhcutc to be compatable with assembler
stub ) */
{ unsigned hcu_connect_stat;
  unsigned prev_connect_stat = 0;
  unsigned base__timeout_period = 2 SEC__TIMEOUT;

  read_hcu( );         /* start the terminal handler input for the first time */
  compute_battery_status( 1 /*averaging period*/ );
  encdr = 0xFF;      /* temporary debug */
  if( option == AUTO_OPERTN && error_code == 0 && error_count == 0 /*RAM/ROM errs*/ )
error_code = wake_up__auto_recovery( );
  else
  { option = MANUAL_OPER;
    stop_vehicle( );
        /*  RAM/ROM error             no keys pressed to ackn                  wait
acknowledge */
    while ( ( error_count > 0 ) && ( mail_hcu != INPUT_TERMINAL_HANDLER ) )
wait__mail_hcu( TIMEOUT__FOREVER );
  }
                  /* wait for a HCU selection or vehicle message */
  for( mail_hcu = NO_MAIL__TIMEOUT, write_err_msg = 0  ; ; wait__mail_hcu(
base__timeout_period ) )
  { if( write_err_msg )   write_error( );        /* attempt to write hand control
RS232 */
    else if( error_code > HCU_READY_CODE )
    { autocom( );        /* enable communications before sending message to AGVC */
      option = MANUAL_OPER;
```

```
      display_in_automatic = DSPL_DISABLED;
      set_vehicle_alarms( HERTZ__1000, HERTZ__20, HERTZ__1_2HALF );      /* sounc
external alarms */
      write_error( );
      write_err_msg++;
    }
    switch ( mail_hcu )
    { default :
        base__timeout_period = 0 /* seconds */;
        hcu_connect_stat = get_byte_discrete_in( PORT_1 ) & HAND_CONTROL_CONNECT_MASK;
              /* change: hcu connect status? */
        if( hcu_connect_stat != prev_connect_stat )   /* discretes unsettled */
        { prev_connect_stat = hcu_connect_stat;
          break;
        }
        else  if(  (  !hcu_connect_stat     /*disconnected*/)  ||  (error_code  >
HCU_READY_CODE) ) break;
      case INPUT_TERMINAL_HANDLER :            /* fall through */
        { if( (option == AUTO_OPERTN) && (display_in_automatic == DSPL_ENABLED) )
automatic_display_master( );
          else if( option == MANUAL_OPER ) hcu_control( );
          else restart_in_manual( );
        }
        break;
      case ERROR_RESET :
        restart_in_manual( );     /* no return -- code restarts */
      case PUT_VEHICLE_ASLEEP :
        vehicle_sleep( );    /* blackhole, only way out is power down and restart */
    }  /* switch */
    base__timeout_period = min( base__timeout_period +500 MS__TIMEOUT, 4 SEC__TIMEOUT
); /* incr period */
  }    /* for */
}  /* vhcutc_main */
```

```
/*    V4HCU_CC   V4HCU_CC   V4HCU_CC   V4HCU_CC   V4HCU_CC   V4HCU_CC   V4HCU_CC
V4HCU_CC   V4HCU_CC   V4HCU_CC   V4HCU_CC
*************************************************************************************
**********************************************
**
                                            **
**                                     EEEEEEEEEEEEEEE      TTTTTTTTTTTTT
NNNNNNN     NNNNN                              **
**                                     EEEEEEEEEEEEEE       TTTTTTTTTTT
NNNNNNNN    NNNNN                              **
**                                     EEEEE              A       TTTT       OOO
NNNNNNNNN   NNNNN                              **
**                                EEEEEEEEEEEE     AAA      TTT      OOOOOOOO   NNNNN
NNNN  NNNNN                          **
**                                EEEEEEEEEEE     AAAAA     TTT      OOOOOOOO   NNNNN
NNNN NNNNN                           **
**                                EEEEE                     TTTT       OOO      NNNNN
 NNNNNNNNN                           **
**                                EEEEEEEEE      AAAAAAA    TTTTT               NNNNN
  NNNNNNNN                           **
**                                EEEEEEEE      AAAAAAAAA   TTTTTTT             NNNNN
   NNNNNNN                           **
**
                                            **
**        This software (firmware) developed by EATON-KENWAY is proprietary.  Source
code on listings or any other media      **
**        is not for sale or loan and may not be copied or transferred to any vendor,
buyer, or consultant.  Executable       **
**          code is available in ROM and is sold with the original product or as a
product upgrade.  Buyer shall not          **
**         copy or distribute ROM's with E-K firmware to any third party without the
prior written approval of EATON-KENWAY.   **
**          Title to and ownership of the software shall at all times remain with
EATON-KENWAY.    The information  in this      **
**          is subject to change without notice  and should not be construed as a
commitment by EATON-KENWAY.                  **
**
                                            **
**         EATON-KENWAY  assumes  no  responsibility  for  the  use or reliability
of  its  software on  equipment which     **
**          is  not supplied EATON-KENWAY or has been modified without EATON-KENWAY
approval.                                  **
```

```
**
                                                      **
**          Copyright 1989
                 KENWAY, INCORPORATED      **
*********************************************************************************
********************************************
  V4HCU_CC   V4HCU_CC   V4HCU_CC   V4HCU_CC   V4HCU_CC   V4HCU_CC   V4HCU_CC   V4HCU_CC
 V4HCU_CC   V4HCU_CC   V4HCU_CC
    DATE CREATED:  Feb 89
    AUTHOR:          Vehicle Group
    DESCRIPTION:
      xxx......            ....
    PROGRAM HISTORY:
    Date         Initials/No.        Description
    ---------    ------------        ----------------------------------------
* * * * * * * * * * * * * * * * * * * * * * * * * * * * * * * * * * * * * * * * * * *
* * * * * * * * * * * * * * * * * * * * * * */
#include <stdio.h>
#include <stdlib.h>
#include <string.h>
#include <math.h>
#include "V4MESGS.K"          /* definition of vehicle messages */
#include "V4MOTION.K"         /*  definition of the motion constants */
#include "V4HCOMMN.K"         /* definition of hand control constants */
#include "V4INIT_D.K"        /* function prototypes for assembler(VINIT) routines */
#include "V4VARS.K"          /*  definition of common variables for two or more tasks
*/
void basic_update( );
void calibrate_i_o( );
void command_vehicle_contactors( );
void define_distance( );
void display_analogs( );
void display_discretes( );
void display_interrupts( );
void display_memory( );
void wait__mail_hcu( unsigned  timeout_period /* Unit=10ms */ );
void manual_operation( );
unsigned password_is( );
void platform_control( );
void seq_emergency_stop( char *error_message );
void stop_vehicle( );
void modify_analogs( char *change_flg );
```

```
unsigned char define_enc_orientation( unsigned orientation );
extern double xvf, yvf;
extern double ep, tew;
extern double tfv, tfvi;
   /* platform control functions, based on COMPILER CONTROL parameters */
#if defined( GL40 )
#include "V4LIFT.K"
#endif

/* void display_command_queue( ) */
#define    CONCURRENT_STATUS_MASK    0x0001       /* 0b0000000000000001 */
#define    LAST_GROUP_T  "a"
#define    LAST_GROUP    'a'
#define    NEXT_GROUP_T  "b"
#define    NEXT_GROUP    'b'
#define    UNITS_T       "c"
#define    UNITS         'c'
#define    UPD_CURR_T    "d"
#define    UPD_CURR      'd'
#define    PNT2LAST      1        /* point, make "nxt_?(indx)" into last index */
  void print_logs( encoder_log_q_type  *lg_ptr, int indx )
    { sprintf(&output_string[ indx ], " Wndw %2d %5.1f %2d\r", lg_ptr->after_turn_flag
== 0 ? AFTER_MOVE_WINDOW_G :
        lg_ptr->after_turn_flag == 1 ? AFTER_TURN_WINDOW_G : -1 /* n/a */,
        lg_ptr->distance_count_down != 32767 ? (double)lg_ptr->distance_count_down
/encd_scal.sum : -0.001/* n/a */,
        lg_ptr->distance_count_down != 32767 ? lg_ptr->event_flag : 0 /* n/a */ );
    }  /* print_logs */
void display_command_queue( )
{ commands_type  *c_ptr;
  double x, y;
  long coord_temp;
  unsigned path;
  unsigned dummy_word;
  unsigned mask;
  int indx;   /* sprintf position */
  int indx__q_top;
  int indx__q_bttm;
  int indx__1st_dply;
  unsigned unit_s = 0;   /* default metric */

  for( mail_hcu = UPD_CURR; ; )
```

```
{ switch ( mail_hcu )
  { case LAST_GROUP :
      indx__1st_dply--;
      break;
    case NEXT_GROUP :
      indx__1st_dply++;
      break;
    case UNITS :        /* toggle between metric(mm) and english(in) */
      unit_s = (unit_s +1) & 1;
      break;
    case UPD_CURR :     /* display the most current command and indexes */
      indx__q_top = indx__1st_dply = cq_indx.nxt_stor -1;
      indx__q_bttm = indx__q_top -CMD_QUE__END_INDX;
      break;

    case PREV_DISPLAY :
      return;
  } /* switch */
  indx__1st_dply = min( indx__q_top, max( indx__q_bttm, indx__1st_dply) );
  sprintf(output_string, FORMFEED
    ESC "1PrvD     " PREV_DISPLAY_T "\r"
    ESC "2LAST     " LAST_GROUP_T "\r"
    ESC "3NEXT     " NEXT_GROUP_T "\r"
    ESC "4         " UNITS_T "\r"
    ESC "8         " UPD_CURR_T "\r"
    MOVE_CURS  COLM_16  LINE_0  "s%3u"  MOVE_CURS  COLM_16  LINE_1  "c%3u  AGVC
Commands(%2s's)%5u%5u%5u%5u",
     command_queue[   indx__q_top   &   0x1F   ].cmdx.bs_flds.sequence_no,
veh_status.sequence_no,
    (unit_s) ? "in" : "mm",
    cq_indx.nxt_stor  -PNT2LAST,  cq_indx.nxt_setup  -PNT2LAST,  cq_indx.nxt_exec
-PNT2LAST, indx__1st_dply );
  write_b( WR__DETACHED_CMND, output_string );
  delay( 100 MS__TIMEOUT );    /* allow message to write */

    c_ptr = &command_queue[ indx__1st_dply & 0x1F ];
      switch ( c_ptr->cmdx.bs_flds.cmd_id )
      { case X_Y_H__MOV :  /* Eagle - AGVC move command */
          coord_temp = (*((long*)(&c_ptr->cmdx.xyh_mov.x_f[0] -1))) & EXTD_INT_MASK;
          x   =   (double)coord_temp   *   (   (unit_s)   ?   INCH_FROM__20THS   :
MM_FROM__20THS_INCH );   /* scale to metric */
          coord_temp = (*((long*)(&c_ptr->cmdx.xyh_mov.y_f[0] -1))) & EXTD_INT_MASK;
```

```
           y  =  (double)coord_temp  *  (  (unit_s)  ?  INCH_FROM__20THS  :
MM_FROM__20THS_INCH );   /* scale to metric */
           indx = sprintf(output_string, "MXY%1d%c%c%c%c zn%-5d%4dxy%9.1f%9.1f   hd
%06.1f deg\r",
             c_ptr->cmdx.xyh_mov.path & 0x03 /* freq 0,1 */,
             ( c_ptr->cmdx.xyh_mov.path & 0x04 ) ? 'f' : 'r',         /* 'f'ront -
'r'ear  forward */
             ( c_ptr->cmdx.xyh_mov.path & 0x08 ) ? 'c' : '-',        /* 'c'enter -
'-'end coords */
             ( c_ptr->cmdx.xyh_mov.path & 0x10 ) ? 'd' : '-',        /* 'd'irect -
'-'optimized translation */
             ( c_ptr->cmdx.xyh_mov.path & 0x80 ) ? 'S' : '-',          /* 'S'top
manditory at end */
             c_ptr->cmdx.xyh_mov.zone, c_ptr->cmdx.xyh_mov.sequence_no, x, y,
             (double)c_ptr->cmdx.xyh_mov.heading * FROM_100THS );
           break;
         case X_Y__MARKER :     /* EAGLE - AGVC update marker command */
           coord_temp   =   (*((long*)(&c_ptr->cmdx.xy_marker.x_f[0]   -1)))    &
EXTD_INT_MASK;
           x   =   (double)coord_temp   *   (   (unit_s)   ?   INCH_FROM__20THS   :
MM_FROM__20THS_INCH );   /* scale to metric */
           coord_temp   =   (*((long*)(&c_ptr->cmdx.xy_marker.y_f[0]   -1)))    &
EXTD_INT_MASK;
           y   =   (double)coord_temp   *   (   (unit_s)   ?   INCH_FROM__20THS   :
MM_FROM__20THS_INCH );   /* scale to metric */
           indx = sprintf(output_string, "mrkrXY%c -- %-5d%4dxy%9.1f%9.1f\r",
             ( c_ptr->cmdx.xy_marker.path & 0x20 ) ? 'w' : 'm',  /* 'w'ire - 'm'agmet
*/
             c_ptr->cmdx.xy_marker.marker_id, c_ptr->cmdx.xy_marker.sequence_no, x,
y );
           break;
         case X_Y_H__SET  :    /* initialize vehicle position */
           coord_temp=(*((long*)(&c_ptr->cmdx.xyh_defn.x_f[0]-1)))&EXTD_INT_MASK;
           x   =   (double)coord_temp   *   (   (unit_s)   ?   INCH_FROM__20THS   :
MM_FROM__20THS_INCH );   /* scale to metric */
           coord_temp=(*((long*)(&c_ptr->cmdx.xyh_defn.y_f[0]-1)))&EXTD_INT_MASK;
           y   =   (double)coord_temp   *   (   (unit_s)   ?   INCH_FROM__20THS   :
MM_FROM__20THS_INCH );   /* scale to metric */
           indx = sprintf(output_string, "SXY%1d%c%c%c%c zn%-5d%4dxy%9.1f%9.1f   hd
%06.1f deg\r",
             c_ptr->cmdx.xyh_defn.path & 0x03,                      /* freq 0,1 */
             ( c_ptr->cmdx.xyh_defn.path & 0x04 ) ? 'f' : 'r',       /* 'f'ront -
```

```
'r'ear  forward */
            ( c_ptr->cmdx.xyh_defn.path & 0x08 ) ? 'c' : '-',        /* 'c'enter /
'-'end coords */
            ( c_ptr->cmdx.xyh_defn.path & 0x10 ) ? 'd' : '-',        /* 'd'irect -
'-'optimized translation */
            ( c_ptr->cmdx.xyh_defn.path & 0x80 ) ? 'S' : ' ',          /* 'S'top
manditory at end */
            c_ptr->cmdx.xyh_defn.zone, c_ptr->cmdx.xyh_defn.sequence_no,
            x, y, (double)c_ptr->cmdx.xyh_defn.heading * FROM_100THS );
          break;
        case X_Y_H__INSRT  :    /* insert vehicle at position */
          coord_temp   =    (*((long*)(&c_ptr->cmdx.insrt_prfx.m1_x[0]   -1)))    &
EXTD_INT_MASK;
          x   =   (double)coord_temp   *   (   (unit_s)   ?   INCH_FROM__20THS   :
MM_FROM__20THS_INCH );   /* scale to metric */
          coord_temp   =    (*((long*)(&c_ptr->cmdx.insrt_prfx.m1_y[0]   -1)))    &
EXTD_INT_MASK;
          y   =   (double)coord_temp   *   (   (unit_s)   ?   INCH_FROM__20THS   :
MM_FROM__20THS_INCH );   /* scale to metric */
          indx   =   sprintf(output_string,   "IXY                       zn%-5d%4d
Coords(m1/m2)\rxy%9.1f%9.1f",
            c_ptr->cmdx.insrt_prfx.prv_zone, c_ptr->cmdx.insrt_prfx.sequence_no, x,
y );
          coord_temp   =    (*((long*)(&c_ptr->cmdx.insrt_prfx.m2_x[0]   -1)))    &
EXTD_INT_MASK;
          x   =   (double)coord_temp   *   (   (unit_s)   ?   INCH_FROM__20THS   :
MM_FROM__20THS_INCH );   /* scale to metric */
          coord_temp   =    (*((long*)(&c_ptr->cmdx.insrt_prfx.m2_y[0]   -1)))    &
EXTD_INT_MASK;
          y   =   (double)coord_temp   *   (   (unit_s)   ?   INCH_FROM__20THS   :
MM_FROM__20THS_INCH );   /* scale to metric */
          indx = sprintf( &output_string[indx], "xy%9.1f%9.1f", x, y );
          break;
        case SET_VEHICLE_SPEED_V :
          sprintf(output_string, "spd%5d fpm%8d     - - - - -\r\r",
            c_ptr->cmdx.set_speed.speed, c_ptr->cmdx.bs_flds.sequence_no );
          break;
        case OPTIONAL_CONTROL_V :
            sprintf(output_string,   "options   control%5d%36s",
c_ptr->cmdx.bs_flds.sequence_no, " " );
          for ( indx = 23, mask = 0x8000 /* MSB 0b1000000000000000 */; mask != 0;
mask >>=1 )
```

```
            { output_string[++indx] = mask & c_ptr->cmdx.optional_control.option ? '1'
: '0';
              if( mask & 0x0100 ) indx += 15;
              else  if(  mask  &  0x1010  )  output_string[++indx]  =  '-';        /*
_####_####_####_#### */
            }
            output_string[++indx] = '\r';
            output_string[++indx] = '\0';
            break;
#if defined( GL40WIRE )
          case MOVE_TO_INTERSECTION_V :
          case MOVE_TO_VIRTUAL_V :
          case MOVE_TO_MAGNET_V :
            indx = sprintf(output_string, "mov%c%c%5d f%ld%7d%7.1f/%-4.1f %4s\r",
              ( c_ptr->cmdx.bs_flds.cmd_id == MOVE_TO_INTERSECTION_V ) ? 'I' :
                ( c_ptr->cmdx.bs_flds.cmd_id == MOVE_TO_VIRTUAL_V ) ? 'V' : 'M',
              ( c_ptr->cmdx.bs_mov.path & 0x04 ) ? 'f' : 'r',          /* 'f'ront -
'r'ear  forward */
              c_ptr->cmdx.bs_mov.zone, c_ptr->cmdx.bs_mov.path & 0x03 /* freq 0,1 */,
              c_ptr->cmdx.bs_flds.sequence_no,   (double)c_ptr->cmdx.bs_mov.distance
/20.0,
              (double)c_ptr->cmdx.bs_mov.fine /20.0,    /* virtual fine forced =0.0)
*/
              ( c_ptr->cmdx.bs_mov.path & 0x10 ) ? "calb" : " " /* Calib bit */ );
            print_logs( &c_ptr->e_l, indx );
            break;
          case TURN_V :
            sprintf(output_string, "Trn%c%c f%ld%12d%5ddegs %4.1f rad\r\r",
              ( c_ptr->cmdx.bs_mov.path & 0x8 )? 'R' : 'L',
              ( c_ptr->cmdx.bs_mov.path & 0x4 ) ? 'f' : 'r',
              c_ptr->cmdx.bs_mov.path & 3, c_ptr->cmdx.bs_flds.sequence_no,
              c_ptr->cmdx.turn.angle ? c_ptr->cmdx.turn.angle : 90,
              c_ptr->cmdx.turn.radius  ? (double)c_ptr->cmdx.turn.radius /2.0 : 30.0
);
            break;
          case ROTATE_V :
            sprintf(output_string, "Rot%c%c f%ld%12d%5ddeg %9s\r\r",
              ( c_ptr->cmdx.bs_mov.path & 0x8 ) ? 'R' : 'L',
              ( c_ptr->cmdx.bs_mov.path & 0x4 ) ? 'f' : 'r',
              c_ptr->cmdx.bs_mov.path & 3, c_ptr->cmdx.bs_flds.sequence_no,
              c_ptr->cmdx.rotate.angle ? c_ptr->cmdx.rotate.angle : 90,
              ( c_ptr->cmdx.bs_mov.path & 0x10 ) ? "w/o cntrg" : "center" );
```

```
          break;
        case MAGNET_UTURN_V :
        case VIRTUAL_UTURN_V :
        case INTERSECTION_UTURN_V :
        case MAGNET_STURN_V :
        case VIRTUAL_STURN_V :
        case INTERSECTION_STURN_V :
          dummy_word = (unsigned)( ( c_ptr->cmdx.bs_flds.cmd_id -MAGNET_UTURN_V ) %
3 );
          indx = sprintf(output_string, "%ctn%c%c%c%5d f%1d%6d%7.1f/%-4.1f%4d rad\r",
              c_ptr->cmdx.bs_flds.cmd_id >= MAGNET_STURN_V ? 'S' : 'U',    /* S-turn
or U-turn */
              dummy_word == 0 ? 'M' : (dummy_word == 1 ? 'V' : 'I'),
              ( c_ptr->cmdx.bs_mov.path & 0x8 ) ? 'R' : 'L', /* 'R'ight - 'L'eft */
              ( c_ptr->cmdx.bs_mov.path & 0x04 ) ? 'f' : 'r',        /* 'f'ront -
'r'ear  forward */
              c_ptr->cmdx.bs_mov.zone, c_ptr->cmdx.bs_mov.path & 0x03 /* freq 0,1 */,
              c_ptr->cmdx.bs_flds.sequence_no, (double)c_ptr->cmdx.bs_mov.distance
/20.0,
              (double)c_ptr->cmdx.bs_mov.fine   /20.0   /*   virtual   =0.0)   */,
c_ptr->cmdx.bs_mov.radius );
          print_logs( &c_ptr->e_l, indx );
          break;
#endif
/* #if defined( GL40 ) */
        case GCL_SUBSYSTEM_COMMAND_V :
          sprintf( output_string, "LIFT%8s%8d  - - %10s\r\r",
            c_ptr->cmdx.gcl_sub_cmd.top_eset == RAISE_TOP ? "Raise" :
            c_ptr->cmdx.gcl_sub_cmd.top_eset == LOWER_TOP ? "Lower" : " - -",
c_ptr->cmdx.bs_flds.sequence_no,
            ( c_ptr->cmdx.gcl_sub_cmd.con_status & CONCURRENT_STATUS_MASK ) ?
"ConCurrent" : " - - - - -");
          break;
/* #endif */
        case INITIALIZE_VEHICLE_V :
          sprintf(output_string,  "initialize%10d     zones%5d  >  %-5d\r\r",
c_ptr->cmdx.bs_flds.sequence_no,
            c_ptr->cmdx.init_veh.from_zone, c_ptr->cmdx.init_veh.at_zone );
          indx__q_bttm = indx__1st_dply;    /* force bottom to initialize position
*/
          break;
        default:
```

```
          sprintf( output_string, ". . . . . . .%9d   Command %-5\r\r",
            c_ptr->cmdx.init_veh.sequence_no, c_ptr->cmdx.bs_flds.cmd_id );
        } /* switch */

      write_b( WR__DETACHED_CMND, output_string );
    wait__mail_hcu( 5 MIN__TIMEOUT );
  } /* for */
}  /* display_command_queue */

char const MV_MSG[][4] = { "nop", "pos", "mvS", "mvT", "inS", "inW", "mvW", "und"};
void display_move_queue( )
{ mv_rcrd_type  *m_ptr;
  double x, y;
  long coord_temp;
  unsigned dummy_word;
  int indx;
  int indx__q_top;
  int indx__q_bttm;
  int indx__1st_dply;
  unsigned unit_s = 0;   /* default metric */

  for( mail_hcu = UPD_CURR; ; wait__mail_hcu( 5 MIN__TIMEOUT ) )
  { switch ( mail_hcu )
    { case LAST_GROUP :
        indx__1st_dply--;
        break;
      case NEXT_GROUP :
        indx__1st_dply++;
        break;
      case UNITS :         /* toggle between metric(mm) and english(in) */
        unit_s = (unit_s +1) & 1;
        break;
      case UPD_CURR :     /* display the most current command and indexes */
        indx__q_top = indx__1st_dply = mvq.load -1;
        indx__q_bttm = indx__q_top -MVQ__END_INDX;
        break;

      case PREV_DISPLAY :
        return;
    } /* switch */
    indx__1st_dply = min( indx__q_top, max( indx__q_bttm, indx__1st_dply) );
    m_ptr = &mvq.1st[ indx__1st_dply & MVQ__END_INDX ];
```

```
    indx = sprintf( output_string, FORMFEED
      ESC "1PrvD     " PREV_DISPLAY_T "\r"
      ESC "2LAST     " LAST_GROUP_T "\r"
      ESC "3NEXT     " NEXT_GROUP_T "\r"
      ESC "4         " UNITS_T "\r"
      ESC "8         " UPD_CURR_T "\r"
      MOVE_CURS COLM_15 LINE_0 "%5u" MOVE_CURS COLM_15 LINE_1 "%5u%2s's MvQ t%-3d
i%5u%3s p%02X sp%-3d ci%-4d",
      mvq.load -PNT2LAST, mvq.excut -PNT2LAST, (unit_s) ? "in" : "mm", m_ptr->estim,
indx__lst_dply,
      &MV_MSG[ min( (unsigned)m_ptr->command, (unsigned)MV__UNDF ) ][0],
      m_ptr->path, m_ptr->setpt, m_ptr->last_trns_indx );
    if( unit_s )
      indx   =   sprintf(   &output_string[indx],   "xy%9.1f%9.1f   h   %06.1f
seg%7.1fAD%9.1f%9.1fxy%9.1f%9.1f",
        m_ptr->x * MM_2_INCH, m_ptr->y * MM_2_INCH, m_ptr->heading * DEGS_PER_RADIAN,
m_ptr->len_seg * MM_2_INCH,
        m_ptr->len_acl  *  MM_2_INCH,  m_ptr->len_dcl  *  MM_2_INCH,  m_ptr->ums_x  *
MM_2_INCH, m_ptr->ums_y * MM_2_INCH );
    else
      indx   =   sprintf(   &output_string[indx],   "xy%9.1f%9.1f   h   %06.1f
seg%7.1fAD%9.1f%9.1fxy%9.1f%9.1f",
        m_ptr->x, m_ptr->y, m_ptr->heading * DEGS_PER_RADIAN, m_ptr->len_seg,
        m_ptr->len_acl, m_ptr->len_dcl, m_ptr->ums_x, m_ptr->ums_y );

    write_b( WR__DETACHED_CMND, output_string );
  } /* for */
}  /* display_move_queue */

void show_load_id( )
{    for( ; ; wait__mail_hcu( 5 MIN__TIMEOUT )  /* wait HCU selection, vehicle message
*/ )
    { switch ( mail_hcu )
      { case NO_MAIL__TIMEOUT :
        case EXIT_PROCEDURE :
          return;
        case INPUT_TERMINAL_HANDLER :
          if ( in_characters[ 0 ] > '0' )     /* legal characters in string */
          { load_id_number.lstring_len = strlen( in_characters ) -1;
            in_characters[ load_id_number.lstring_len ] = 0;      /* clear <cr> from
end of string */
            strncpy( (char*)load_id_number.id_load_num, in_characters, 15 );
```

```
          }
          break;
      } /* switch */
      sprintf( output_string, FORMFEED
          ESC "1MAS-TER "  MASTER_MENU_T "\r"
          ESC "4ENTR    "  BLANK  "\r"
          MOVE_CURS  COLM_0  LINE_4  "LOAD ID\r  = %-16s\r" HOME_CURSOR  " ?",
        load_id_number.id_load_num );
      write_b( WR__DETACHED_CMND, output_string );        /* write the display format
and setup the softkeys. */
    }
}  /* show_load_id */

#define    SELECT_LOAD_T  "n"
#define    SELECT_LOAD    'n'
void mode_selection ( )
{      stop_vehicle( );         /* make sure the vehicle is stopped!!!! */
    for ( mail_hcu = 0; ; wait__mail_hcu( 200 MS__TIMEOUT ) /* wait HCU selection, veh
mess */ )
    { get_platform_status( );
      switch ( mail_hcu )
      { case NO_MAIL__TIMEOUT :
          basic_update( );    /* update basic control dsply( MANUAL_OPER, AQUIRE_WIRE,
etc. ) */
          continue;
        case SELECT_LOAD :
          show_load_id( );
          break;
        case EXIT_PROCEDURE :
          return;
        case STATUS :
          request_status_display( );
          break;
      } /* switch */
          write_b( WR__DETACHED_CMND, FORMFEED
            ESC "1MAS-TER "  MASTER_MENU_T  "\r"
            ESC "2sta-tus "  STATUS_T  "\r"
            ESC "3LOAD ID "  SELECT_LOAD_T  "\r"
            OPTION_ADDRESS  "SEL.optn"  LOCK_CURSOR );
    }
 }  /* mode_selection */
```

```
/*  void configure_vehicle( )    ( initialize display )    */
#define    NEXT_ENTRY_T  "m"
#define    NEXT_ENTRY    'm'
#define    PREV_ENTRY_T  "n"
#define    PREV_ENTRY    'n'
#define    MISC_ENTRIES_T  "o"
#define    MISC_ENTRIES    'o'
#define    DIMENSION_ENTRIES_T  "p"
#define    DIMENSION_ENTRIES    'p'
#define    DYNAMIC_ENTRIES_T  "q"
#define    DYNAMIC_ENTRIES    'q'
#define    SPD_CALC_FACTOR   16384    /* dummy used to calculate speeds ( change when
real calibration done ) */
#define    HEADER_1    1
#define    HEADER_2    2
#define    NO_SCALE    1.0
#define    METERS_2_MMETERS 1000.0
#define    MMETERS_2_MMETERS 1.0
#define    METERS_2_METERS 1.0
#define    MMETERS_2_METERS 0.001
typedef  enum { CHR_T, INT_T, UNSIGNED_T, HEX_T, FLOAT_T, SFLOAT_T, DOUBLE_T, STRNG_T
} cnfg_var_type;
typedef  enum { DISPLAY_CNFG, MODIFY_CNFG } cnfg_task_type;
typedef enum
{ CONFIGURE_MISC_Z,        /* do not insert selections on this line */
    VEHICLE_NUMBER_Z,     MOTION_WARNING_DELAY_Z,     BUMPER_RECOVERY_THRESHOLD_Z,
AUTO_RECOVERY_DELAY_Z,
    BATTERY_VOLTAGE_SCALE_Z, BATTERY_CONDITION_SCALE_Z,
    LOAD_CLEARED_TIMER_Z, SUB_SYS_PLATFORM_WAIT_Z, SUB_SYS_PRECOMPLETION_Z,
/* #if defined( GL40 ) */
      MAX_PLATFORM_SPEED_Z, LOAD_SENSING_Z,
/* #endif */
     /*HCU_AS_AGVC_Z,*/    MASTER_INITIALIZE_Z,    SPEAKER_FREQ_MOVEMENT_Z,
SPEAKER_FREQ_TURN_Z,
    SPEAKER_DURATION_MOVEMENT_Z, SPEAKER_DURATION_TURN_Z, LIGHT_DURATION_MOVEMENT_Z,
LIGHT_DURATION_TURN_Z,
    PASSWORD_Z, VEHICLE_NAME_Z,
  CONFIGURE_DIMENSIONS_Z,     /* do not insert selections on this line */
    PORTS_ENC_CALIB_Z,     STARB_ENC_CALIB_Z,     WHEELBASE_DRV_Z,     WHEELBASE_ENCD_Z,
UMS_OFFSET_X_Z, UMS_OFFSET_X_SC_Z, UMS_OFFSET_Y_Z,
    DIMENSION_WHEEL__FRONT_Z,     DIMENSION_WHEEL__REAR_Z,     DIM_WHEEL__LF_FR_MAG_Z,
DIM_WHEEL__RT_FR_MAG_Z,
```

```
    DIM_WHEEL__LF_RR_MAG_Z, DIM_WHEEL__RT_RR_MAG_Z, DIM_WHEEL__FR_WIRE_X_Z,
    DIM_WHEEL__RR_WIRE_X_Z, DIMEN_CNTR__WIRE_X_Z,
  CONFIGURE_DYNAMICS_Z,         /* do not insert selections on line */
     MAX_FORWD_MANL_SPD_Z,    MAX_BACKWD_SPD_Z,    MAX_FORWD_ACQUI_SPD_Z,
SPEED_SETPOINT_CALIB_Z,
    TURN_RATIO_SETUP_Z, FRONT_VEH_SPD_LIMIT_AUTO_Z, REAR_VEH_SPD_LIMIT_AUTO_Z,
    MAX_ROTATE_SPEED_Z,    MAX_RADIUS_TURN_SPEED_Z,    MIN_RADIUS_TURN_SPEED_Z,
SENSED_WIRE_TURN_RADIUS_Z,
     /*ACQUISITION_WINDOW_DEGREES_Z,    WIRE_X_ENCODER_ADJUSTMENT_Z,
MAGNET_ENCODER_ADJUSTMENT_Z,*/
    ACCELERATION_CONTROL_Z, GUID_ANT_NOISE_OFFSET_Z,
    AUTO_CALIB_ACTV_Z,    OBSTACLE_DETECTION_ACTIVE_Z,    MIN_OBSTACLE_SETPOINT_Z,
MAX_OBSTACLE_REF_Z,
  CONFIGURE_END_Z
} selections;
  double dummy_real;
  int dummy;
  int dummy_2;
  unsigned dummy_word;
  unsigned dummy_word_2;
  char dummy_chr;
  char  temporary_string[ 20 ];
  selections  local_selection;
  cnfg_task_type cnfg_task;
  unsigned classification;
  int setup_prompt( char header )
  { return sprintf( output_string, FORMFEED
      ESC "1PrevDisp"  PREV_DISPLAY_T "\r"
      ESC "%cNext    "  NEXT_ENTRY_T  "\r"
      ESC "%cPrev    "  PREV_ENTRY_T  "\r"
      ESC "4Entr    "  BLANK  "\r"  PROMPT_ADDRESS,
      header == HEADER_1 ?  '8'  :  '3', header == HEADER_1 ?  '5'  :  '2' );
  }  /* setup_prompt */
  void dsply_show_bit( unsigned *bit_fld, unsigned mask, char *prompt )
  { unsigned input;
    if( cnfg_task == MODIFY_CNFG )    /* defined in calling procedure */
    { sscanf( in_characters, "%d", &input  );
      *bit_fld =  input  ?  ( *bit_fld | mask /*bit(s)OFF*/ ) :  ( *bit_fld & (~mask)
 /*bit(s) ON*/ );
    }
    else    /* DISPLAY_CNFG */
    { sprintf( &output_string[ setup_prompt(HEADER_1) ], prompt, ( *bit_fld & mask )
```

```
? " ON" : "OFF" );
      write_b( WR__DETACHED_CMND, output_string);
    }
  }  /* dsply_show_bit */
  void display__modify ( void *passed_arg,  double scale,  char hdr_typ, cnfg_var_type
var_typ, char *prompt )
  { char *outstr_ptr;
    if( cnfg_task == MODIFY_CNFG )    /* defined in calling procedure */
    {     switch ( var_typ )    /* arguement type */
        { case UNSIGNED_T :
            sscanf( in_characters, "%d", (unsigned*)passed_arg );   /* use %d because
%u does work */
            break;
          case HEX_T :
            sscanf( in_characters, "%x", (unsigned*)passed_arg );
            break;
          case INT_T :
            sscanf( in_characters, "%d", (int*)passed_arg );
            break;
          case CHR_T :    /* unsigned */
            sscanf( in_characters, "%d", &dummy );
            (*(char*)passed_arg) = (unsigned char)min(255, max(0, dummy) );
            break;
          case DOUBLE_T :
            sscanf( in_characters, "%lf", &dummy_real );
            (*(double*)passed_arg) = dummy_real * scale;
            break;
          case FLOAT_T :
            sscanf( in_characters, "%lf", &dummy_real );
            (*(int*)passed_arg) = ROUND( int, dummy_real * scale );
            break;
          case SFLOAT_T :
            sscanf( in_characters, "%lf", &dummy_real );
            (*(char*)passed_arg) = ROUND( unsigned char, dummy_real * scale );
            break;
          case STRNG_T :
            in_characters[ min( 9, strlen( in_characters ) -1 ) ] = 0;       /* Remove
<cr>; limit string length */
            strcpy( (char*)passed_arg, in_characters );
            break;
        } /* switch */
    }
```

```
else     /* DISPLAY_CNFG */
{ outstr_ptr = output_string + setup_prompt( hdr_typ );
    switch ( var_typ )
    { case CHR_T :
        sprintf( outstr_ptr, prompt, (*(unsigned char*)passed_arg) );
        break;
      case UNSIGNED_T :
      case HEX_T :
      case INT_T:
        sprintf( outstr_ptr, prompt, (*(int*)passed_arg) );
        break;
      case DOUBLE_T:
        dummy_real = (double)(*(double*)passed_arg) / scale;
        sprintf( outstr_ptr, prompt, dummy_real );
        break;
      case FLOAT_T:
        dummy_real = (double)(*(int*)passed_arg) /scale;
        sprintf( outstr_ptr, prompt, dummy_real );
        break;
      case SFLOAT_T:
        dummy_real = (double)(*(char*)passed_arg) /scale;
        sprintf( outstr_ptr, prompt, dummy_real );
        break;
      case STRNG_T :
        sprintf( outstr_ptr, prompt, passed_arg );
        break;
    } /* switch */
    write_b( WR__DETACHED_CMND, output_string);
  }
} /* display__modify */
void select_and_display_prompt( cnfg_task_type set_cnfg_task )
{ cnfg_task = set_cnfg_task;
  if ( classification == MISC_ENTRIES )
  { local_selection = local_selection <= CONFIGURE_MISC_Z ? CONFIGURE_DIMENSIONS_Z -1
:
              local_selection  >=  CONFIGURE_DIMENSIONS_Z  ?  CONFIGURE_MISC_Z  +1  :
local_selection;
    switch ( local_selection )
    /* miscelanious */
    { case VEHICLE_NUMBER_Z :
        display__modify( &vehicle_number, 0.0, HEADER_1, UNSIGNED_T, "Veh.Numb %3u"
HOME_CURSOR "NUMBER? " );
```

```
        break;
      case SPEAKER_FREQ_MOVEMENT_Z :
        display__modify( &speaker_freq_movement, 0.0, HEADER_1, UNSIGNED_T,
          "Speaker Frequency    ( auto ) moving %4u" HOME_CURSOR "scale factor? " );
        break;
      case SPEAKER_DURATION_MOVEMENT_Z :
        display__modify( &speaker_duration_movement, 0.0, HEADER_2,   HEX_T,
          "Speaker duration     ( auto )moving %2X"  HOME_CURSOR  "Hex format? " );
        break;
      case SPEAKER_FREQ_TURN_Z :
        display__modify( &speaker_freq_turn, 0.0, HEADER_1, UNSIGNED_T,
          "Speaker Frequency    ( auto )turn %4u"  HOME_CURSOR  "scale factor? " );
        break;
      case SPEAKER_DURATION_TURN_Z :
        display__modify( &speaker_duration_turn, 0.0, HEADER_2,   HEX_T,
          "Speaker duration     ( auto )turn %2X"  HOME_CURSOR  "Hex format? " );
        break;
      case LIGHT_DURATION_MOVEMENT_Z :
        display__modify( &light_duration_movement, 0.0, HEADER_2,   HEX_T,
          "Light  duration      ( auto )move   %2X"  HOME_CURSOR  "Hex format? " );
        break;
      case LIGHT_DURATION_TURN_Z :
        display__modify( &light_duration_turn , 0.0, HEADER_2,   HEX_T,
          "Light  duration      ( auto )turn   %2X"  HOME_CURSOR  "Hex format? " );
        break;
/* #if defined( GL40 ) */
      case MAX_PLATFORM_SPEED_Z :
        display__modify( &max_platform_speed, 0.0, HEADER_1, CHR_T,
          "Lift-TOP max. speed ( automatic ) %3u"  HOME_CURSOR  "raw(30-99)? " );
        break;
      case LOAD_SENSING_Z :
        dsply_show_bit( &motion_control_switches, LOAD_SENSING_CNFG_BITS,
          "Load Sensing Control Status %3s"  HOME_CURSOR  "On(1)/Off(0) ? " );
        break;
/* #endif */
      case MOTION_WARNING_DELAY_Z :
        display__modify( &motion_warning_delay, 100.0, HEADER_1, FLOAT_T,
          "Motion WarningDelay  ( starting ) %4.1f"  HOME_CURSOR  "Seconds ? " );
        break;
      case LOAD_CLEARED_TIMER_Z :
        display__modify( &load_cleared_timer, 0.0, HEADER_1, UNSIGNED_T,
          "Wait time after      load misaligned %4u"  HOME_CURSOR  "raw counts? " );
```

```
        break;
      case SUB_SYS_PLATFORM_WAIT_Z :
        display__modify( &sub_sys_platform_wait, 5.0, HEADER_1, SFLOAT_T,
          "Time to complete    Top action %4.1f"  HOME_CURSOR  "Seconds ? " );
        break;
      case SUB_SYS_PRECOMPLETION_Z :
        dsply_show_bit( &sub_system_process_flags, SUB_SYS_PRECOMPLETION_MASK,
          "Top pre-completion  Set %3s"  HOME_CURSOR  "On(1)/Off(0)? " );
        break;
      case BATTERY_VOLTAGE_SCALE_Z :
        dummy_2 = get_analog_in( BATTERY_VOLTAGE_CHANNEL ) * 100;
        dummy_real = (double)battery_voltage_scale;
        display__modify( &dummy_2, dummy_real, HEADER_1, FLOAT_T, /*(BATTERY_VOLT_CHAN
*100)/battery_volt_scale*/
          "Battery Voltage     curr. reading %4.1f"  HOME_CURSOR  "Est. value? " );
        break;
      case BATTERY_CONDITION_SCALE_Z :
        display__modify( &battery_condition_scale, 0.0, HEADER_1, INT_T,
          "Battery Condition   calib.    %4d"  HOME_CURSOR  "scale factor? " );
        break;
      case BUMPER_RECOVERY_THRESHOLD_Z :
        display__modify( &bumper_recovery_threshold, 0.0, HEADER_1, CHR_T,
          "Bumper will recover this setpoint %4u"  HOME_CURSOR  "raw(0-255)? " );
        break;
      case AUTO_RECOVERY_DELAY_Z :
        display__modify( &auto_recovery_delay, 100.0, HEADER_1, FLOAT_T,
          "Auto Bumper recover Delay time %4f"  HOME_CURSOR  "sec.(0-100.)? " );
        break;
      case MASTER_INITIALIZE_Z :
        display__modify( &dummy_word, 0.0, HEADER_1, UNSIGNED_T,    /* no display of
this variable */
          "master initialize"  HOME_CURSOR );
        break;
      case PASSWORD_Z :
        display__modify( password_key, 0.0, HEADER_2,  STRNG_T,     /* no display of
this variable */
          "password  %-10s"  HOME_CURSOR  "PASSWORD? " );
        break;
      case VEHICLE_NAME_Z :
        display__modify( vehicle_name, 0.0, HEADER_2,  STRNG_T,
          "name %-19s"  HOME_CURSOR  "NAME? " );
        break;
```

```
    default :
      local_selection = CONFIGURE_MISC_Z +1;
  } /* switch */
}
  /* dimensions */
else if ( classification == DIMENSION_ENTRIES )
{ local_selection = local_selection <= CONFIGURE_DIMENSIONS_Z ? CONFIGURE_DYNAMICS_Z
-1 :
            local_selection >= CONFIGURE_DYNAMICS_Z ? CONFIGURE_DIMENSIONS_Z +1 :
local_selection;
  switch ( local_selection )
  { case PORTS_ENC_CALIB_Z :
      display__modify( &encd_scal.ports, MMETERS_2_METERS, HEADER_1, DOUBLE_T,
        "Portside ENC  Calib.Ticks %9.6f/m"  HOME_CURSOR  "Counts/m? " );
      break;
    case STARB_ENC_CALIB_Z :
      display__modify( &encd_scal.starb, MMETERS_2_METERS, HEADER_1, DOUBLE_T,
        "Starboard ENC Calib.Ticks %9.6f/m"  HOME_CURSOR  "Counts/m? " );
      break;
    case WHEELBASE_ENCD_Z :
      display__modify( &dimension__wheelbase, MMETERS_2_MMETERS, HEADER_1, DOUBLE_T,
        "Dim:ENC-ENC %8.6f Meters?  " );
      break;
    case WHEELBASE_DRV_Z :
      display__modify( &dim__drv_wheelbase, MMETERS_2_MMETERS, HEADER_1, DOUBLE_T,
        "Dim:DRV-DRV %8.6f Meters?  " );
      break;
    case UMS_OFFSET_X_Z :
      display__modify( &ums_offset.x, MMETERS_2_MMETERS, HEADER_1, DOUBLE_T,
        "OffsetUMS.X %8.5f M-Meters?  " );
      break;
    case UMS_OFFSET_X_SC_Z :
      display__modify( &ums_offset.x_scale, MMETERS_2_MMETERS, HEADER_1, DOUBLE_T,
        "OfstUMS.Xscl %7.4f MM/setpt? " );
      break;
    case UMS_OFFSET_Y_Z :
      display__modify( &ums_offset.y, MMETERS_2_MMETERS, HEADER_1, DOUBLE_T,
        "OffsetUMS.Y %8.5f M-Meters?  " );
      break;
    case DIMENSION_WHEEL__FRONT_Z :
      display__modify( (double*)&cnfg_f_r.fr.dim_2_end, MMETERS_2_MMETERS, HEADER_1,
DOUBLE_T,
```

```
          "dimension! wheel to vehicle front %6.2f"  HOME_CURSOR  "mm? " );
        break;
      case DIMENSION_WHEEL__REAR_Z :
        display__modify( (double*)&cnfg_f_r.rr.dim_2_end, MMETERS_2_MMETERS, HEADER_1,
DOUBLE_T,
          "dimension! wheel to vehicle rear %6.2f"  HOME_CURSOR  "mm? " );
        break;
      case DIM_WHEEL__LF_FR_MAG_Z :
        display__modify(   (double*)&cnfg_f_r.fr.dim_2_mag_lf,    MMETERS_2_MMETERS,
HEADER_1, DOUBLE_T,
          "Wheel-Mag,Left Frnt Actual dim. %6.2f"  HOME_CURSOR  "mm? " );
        break;
      case DIM_WHEEL__RT_FR_MAG_Z :
        display__modify(   (double*)&cnfg_f_r.fr.dim_2_mag_rt,    MMETERS_2_MMETERS,
HEADER_1, DOUBLE_T,
          "Wheel-Mag,RightFrnt Actual dim. %6.2f"  HOME_CURSOR  "mm? " );
        break;
      case DIM_WHEEL__LF_RR_MAG_Z :
        display__modify(   (double*)&cnfg_f_r.rr.dim_2_mag_lf,    MMETERS_2_MMETERS,
HEADER_1, DOUBLE_T,
          "Wheel-Mag,Left Rear Actual dim. %6.2f"  HOME_CURSOR  "mm? " );
        break;
      case DIM_WHEEL__RT_RR_MAG_Z :
        display__modify(   (double*)&cnfg_f_r.rr.dim_2_mag_rt,    MMETERS_2_MMETERS,
HEADER_1, DOUBLE_T,
          "Wheel-Mag,RightRear Actual dim. %6.2f"  HOME_CURSOR  "mm? " );
        break;
      case DIM_WHEEL__FR_WIRE_X_Z :
        display__modify(   (double*)&cnfg_f_r.fr.dim_2_wire_x,    MMETERS_2_MMETERS,
HEADER_1, DOUBLE_T,
          "Wheel--front wire X Actual dim. %6.2f"  HOME_CURSOR  "mm? " );
        break;
      case DIM_WHEEL__RR_WIRE_X_Z :
        display__modify(   (double*)&cnfg_f_r.rr.dim_2_wire_x,    MMETERS_2_MMETERS,
HEADER_1, DOUBLE_T,
          "Wheel--Rear  wire X Actual dim. %6.2f"  HOME_CURSOR  "mm? " );
        break;
      case DIMEN_CNTR__WIRE_X_Z :
        display__modify( &dim__wire_x_2_cntrln, MMETERS_2_MMETERS, HEADER_1, DOUBLE_T,
          "Center to wire X    Dimension %6.2f"  HOME_CURSOR  "  inches? " );
        break;
      default :
```

```
        local_selection = CONFIGURE_DIMENSIONS_Z +1;
    } /* switch */
  }
  else if ( classification == DYNAMIC_ENTRIES )
  { local_selection = local_selection <= CONFIGURE_DYNAMICS_Z ? CONFIGURE_END_Z -1 :
              local_selection  >=  CONFIGURE_END_Z  ?  CONFIGURE_DYNAMICS_Z  +1  :
local_selection;
    switch ( local_selection )
    { case MAX_FORWD_MANL_SPD_Z :
        dummy = SPD_CALC_FACTOR / man_forward_speed_base;
        display__modify( &dummy, 0.0, HEADER_1, INT_T,
          "max. MANUAL\r forward SPD %3d"  HOME_CURSOR  "ENTER SPEED? " );
        break;
      case MAX_BACKWD_SPD_Z :
        dummy = SPD_CALC_FACTOR / backward_speed_base;
        display__modify( &dummy, 0.0, HEADER_1, INT_T,
          "max. MANUAL\rbackward SPD %3d"  HOME_CURSOR  "ENTER SPEED? " );
        break;
      case MAX_FORWD_ACQUI_SPD_Z :
        dummy = SPD_CALC_FACTOR / acqui_forward_speed_base;
        display__modify( &dummy, 0.0, HEADER_1, INT_T,
          "maximum forward and\racquisition SPD %3d"  HOME_CURSOR  "ENTER SPEED? " );
        break;
      case SPEED_SETPOINT_CALIB_Z :
        display__modify( &speed_setpoint_calib, 1.0, HEADER_1, DOUBLE_T,
          "Speed to Setpoint   Calib.  %6.2f"  HOME_CURSOR  "Counts / Mtr? " );
        break;
      case TURN_RATIO_SETUP_Z :
        display__modify( &turn_ratio_bias, 1.0, HEADER_1, FLOAT_T,
          "turn setup           ( ratio )  %6.2f"  HOME_CURSOR  "Percent ? " );
        break;
      case FRONT_VEH_SPD_LIMIT_AUTO_Z :
        display__modify(   (double*)&cnfg_f_r.fr.auto_spd_limit,   MMETERS_2_MMETERS,
 HEADER_1, DOUBLE_T,
          "Front Veh Spd Limit (Automatic) %6.2d"  HOME_CURSOR  "metr/sec? " );
        break;
      case REAR_VEH_SPD_LIMIT_AUTO_Z :
        display__modify(   (double*)&cnfg_f_r.rr.auto_spd_limit,   MMETERS_2_MMETERS,
 HEADER_1, DOUBLE_T,
          "Rear Veh Spd Limit (Automatic) %6.2d"  HOME_CURSOR  "metr/sec? " );
        break;
      case MAX_ROTATE_SPEED_Z :
```

```
display__modify( &max_rotate_speed, 0.0, HEADER_1, INT_T,
  "Maximum rotation    speed      %5d"  HOME_CURSOR  "scale factor? " );
break;
case MIN_RADIUS_TURN_SPEED_Z :
  display__modify( &turn_speed_min, METERS_2_MMETERS, HEADER_1, DOUBLE_T,
    "TURN speed           .750 M  turn %5d"  HOME_CURSOR  "meters/sec?   " );
  break;
case MAX_RADIUS_TURN_SPEED_Z :
  display__modify( &turn_speed_max, METERS_2_MMETERS, HEADER_1, DOUBLE_T,
    "TURN speed           2.0 M   turn %5d"  HOME_CURSOR  "meters/sec?   " );
  break;
case SENSED_WIRE_TURN_RADIUS_Z :
  display__modify(   &sensed_wire_turn_radius,   METERS_2_MMETERS,   HEADER_1,
DOUBLE_T,
    "Sensed Wire Turn    Radius %8.4fm"  HOME_CURSOR  "apprx.rad(m)? " );
  break;
case ACCELERATION_CONTROL_Z :
  display__modify(&motion_accel_decel_rate,METERS_2_METERS,HEADER_1,DOUBLE_T,

    "Acceleration_rate   meters/sec^2 %6.2f"  HOME_CURSOR  "meters? "  );
  break;
case AUTO_CALIB_ACTV_Z :
  dsply_show_bit( &motion_control_switches, CALIBRATION_CNFG_BIT,
    "Auto.  calibration  Status %3s"  HOME_CURSOR  "On(1)/Off(0) ? " );
  break;
case GUID_ANT_NOISE_OFFSET_Z :
  display__modify( &guid_ant_noise_offset, 0.0, HEADER_1, INT_T,
    "Guidance antenna    noise threshold %3d"  HOME_CURSOR  "level (0-40)? " );
  break;
case OBSTACLE_DETECTION_ACTIVE_Z :
  dsply_show_bit( &motion_control_switches, OBSTACLE_DETCT_CNFG_BIT,
    "Obstacle detection  Status %3s"  HOME_CURSOR  "On(1)/Off(0) ? " );
  break;
case MIN_OBSTACLE_SETPOINT_Z :
  display__modify( &min_obstacle_setpoint, 0.0, HEADER_1, INT_T,
       "Obstacles:  STOP at  This  Point %3d"  HOME_CURSOR  "ENTER -50/200? " );
  break;
case MAX_OBSTACLE_REF_Z :
  display__modify( &max_obstacle_ref, 0.0, HEADER_1, INT_T,
    "Obstacles:  DECEL at This  Point %3d"  HOME_CURSOR  "Enter 40/240? " );
  break;
default :
```

```
        local_selection = CONFIGURE_DYNAMICS_Z +1;
    } /* switch */
  }
  else
  { classification = CONFIGURE;
    write_b( WR__DETACHED_CMND, FORMFEED
        ESC "1Mas-ter "  MASTER_MENU_T  "\r"
        ESC "2Misc    "  MISC_ENTRIES_T  "\r"
        ESC "3veh.dim."  DIMENSION_ENTRIES_T  "\r"
        ESC "4dynamics"  DYNAMIC_ENTRIES_T  "\r"
        MOVE_CURS  COLM_1  LINE_5  "C O N F I G U R E   V E H I C L E\r"  LOCK_CURSOR
);
  }
}  /* select_and_display_prompt */
  void manual_speed_calc ( int *speed_dummy )
  { sscanf( in_characters, "%d", &dummy );
    *speed_dummy = SPD_CALC_FACTOR / dummy;
  }  /* manual_speed_calc */
void configure_vehicle( )    /* initialize display */
{ if ( password_is( ) != ILLEGAL_PASSWORD )
  { for( mail_hcu = CONFIGURE; ; wait__mail_hcu( 5 MIN__TIMEOUT ) )    /* wait for a
HCU selection or vehicle message */
    { switch ( mail_hcu )
      { case NEXT_ENTRY :
          local_selection++;
          break;
        case PREV_ENTRY :
          local_selection--;
          break;
        case MISC_ENTRIES :
          classification = MISC_ENTRIES;
          local_selection  = CONFIGURE_MISC_Z +1;
          break;
        case DIMENSION_ENTRIES :
          classification = DIMENSION_ENTRIES;
          local_selection  = CONFIGURE_DIMENSIONS_Z +1;
          break;
        case DYNAMIC_ENTRIES :
          classification = DYNAMIC_ENTRIES;
          local_selection  = CONFIGURE_DYNAMICS_Z +1;
          break;
        case INPUT_TERMINAL_HANDLER :
```

```
switch ( local_selection )
{ case MAX_FORWD_MANL_SPD_Z :
    manual_speed_calc ( &man_forward_speed_base );
    break;
  case MAX_FORWD_ACQUI_SPD_Z :
    manual_speed_calc ( &acqui_forward_speed_base );
    break;
  case MAX_BACKWD_SPD_Z :
    manual_speed_calc ( &backward_speed_base );
    break;
  case BATTERY_VOLTAGE_SCALE_Z :
    sscanf( in_characters, "%f", dummy_real );
    battery_voltage_scale = ROUND( int, dummy_2 / dummy_real );
    break;
  case MASTER_INITIALIZE_Z :
    sscanf( in_characters, "%u", &dummy_word );
    if ( dummy_word == 5555 )    /* secret code for a master initialize */
    { revision_id[0] = 0;     /* delete REVISION ID STRING */
      write_b( WR__DETACHED_CMND, FORMFEED
        ESC "1          "  MASTER_MENU_T "\r"
        "\rPOWER UP again\r" );
      wait__mail_hcu( 5 MIN__TIMEOUT );
      mail_hcu = EXIT_PROCEDURE;
      return;
      }
      break;
  default :
    select_and_display_prompt( MODIFY_CNFG );
} /* switch */
break;
case NO_MAIL__TIMEOUT :
case EXIT_PROCEDURE :
  write_b(  WR__DETACHED_CMND,   FORMFEED    MOVE_CURS     COLM_0     LINE_4
"RE-CONFIGURING\rVEHICLE"  LOCK_CURSOR );
  define_distance( );
  delay( 1 SEC__TIMEOUT );  /* allow time to read message */
  option = MASTER_MENU;
  mail_hcu = EXIT_PROCEDURE;        /* fall through */
  return;
default :
  classification = CONFIGURE;
} /* switch */
```

```
      select_and_display_prompt( DISPLAY_CNFG );
    } /* for */
  }
}  /* configure_vehicle */

#define  NEXT_POINT_T  "a"
#define  NEXT_POINT    'a'
#define  INCREMENT_VAL_T  "c"
#define  INCREMENT_VAL    'c'
#define  DECREMENT_VAL_T  "d"
#define  DECREMENT_VAL    'd'
#define  NEW_VALUE_T  "e"
#define  NEW_VALUE    'e'
#define  SWITCH_ANLG_DISC_T "f"
#define  SWITCH_ANLG_DISC   'f'
#define  C_COLM_4  '\244'
#define  C_COLM_5  '\245'
#define  C_COLM_10  '\252'
#define  C_LINE_4  '\244'
#define  C_LINE_5  '\245'
#define  C_LINE_7  '\247'
void modify_analogs( char *change_flg )
{ char  column = C_COLM_4;
  char  line = C_LINE_4;
  int  indx;
  int  analog;
  int  increment_rate = 0;
  int  point = 0;
  unsigned  mask;
  unsigned  discretes;
  unsigned  dsply_pt;
  unsigned  put_ao_cmnd = FND_CHN(AO__DIR_WR, 0);
  unsigned  get_ao_cmnd = FND_CHN(AO__DIR_RD, 0);
  if ( password_status == STANDARD_PASSWORD || ( password_status = password_is( ) ) ==
STANDARD_PASSWORD )
  { *change_flg = 1;
    write_b( WR__DETACHED_CMND, FORMFEED
      ESC "1PREVdisp"  PREV_DISPLAY_T  "\r"
      ESC "2NEXTpnt "  NEXT_POINT_T  "\r"
      ESC "3SWTHA--D"  SWITCH_ANLG_DISC_T "\r"
      ESC "4MODFval "  NEW_VALUE_T  "\r"
      ESC "5inc up  "  INCREMENT_VAL_T  "\r"
```

```
    ESC "8 dec dwn"  DECREMENT_VAL_T  "\r"
    MOVE_CURS COLM_4 LINE_3 "Analog" MOVE_CURS COLM_0 LINE_6 "Disc 0 1 2 3 4 retes");
  for( ; ; wait__mail_hcu( 200 MS__TIMEOUT ) /* wait HCU selection, veh mess */ )
  { switch ( mail_hcu )
    { case INCREMENT_VAL :
        if( point <= 3)
        { increment_rate = max( 16, min( increment_rate +2, 80 ) );
          put_analog_out( put_ao_cmnd, min( 255, get_analog_out( get_ao_cmnd ) + (
increment_rate /16 ) ) );
        }
        break;
      case DECREMENT_VAL :
        if( point <= 3)
        { increment_rate = max( 16, min( increment_rate +2, 80 ) );
              put_analog_out(   put_ao_cmnd,   (unsigned)max(   0,
(int)get_analog_out(get_ao_cmnd) - (increment_rate /16) ) );
        }
        break;
      case SWITCH_ANLG_DISC :
        point = (point < 4) ? 3 : -1;
      case NEXT_POINT :
        point = ( point +1 ) % 9;
        if( point <= 3 )      /* analog */
        { column =  (char)(( point & 1 ) ? C_COLM_10 : C_COLM_4 );
          line = (char)(( point & 2 ) ? C_LINE_5 : C_LINE_4 );
          put_ao_cmnd = FND_CHN(AO__DIR_WR, (char)point);
          get_ao_cmnd = FND_CHN(AO__DIR_RD, (char)point);
        }
        else
        { mask = 1 << (point -4);
          column = (char)((point -4) * 2 + C_COLM_5);
          line = C_LINE_7;
        }
        break;
      case NEW_VALUE :
        if( point <= 3)
        { sprintf(output_string, ESC "4ENTR     " BLANK "\r" MOVE_CURS "%c%cxxx"
MOVE_CURS "%c%c",column+2,line,column+2,line);
          write_b( WR__DETACHED_CMND, output_string );
          do
          {  wait__mail_hcu( 5 MIN__TIMEOUT );    /* wait for a HCU selection or
vehicle message */
```

```
            } while ( mail_hcu > INPUT_TERMINAL_HANDLER );
            if( mail_hcu == INPUT_TERMINAL_HANDLER && ( sscanf( in_characters, "%d",
&analog ) == 1 ) )
            { put_analog_out( put_ao_cmnd, (unsigned)min( 255, analog ) );
              write_b( WR__DETACHED_CMND, ESC "4MODFval "  NEW_VALUE_T  "\r" );
            }
            else   write_b( WR__DETACHED_CMND, ESC "4MODFval "  NEW_VALUE_T  "\r"
HOME_CURSOR " Entry Error/Abort " );
          }
          else m_c_p__discretes( mask, ~discretes );
          break;
        case PREV_DISPLAY :
        case EXIT_PROCEDURE :
          return;
        default :
          increment_rate /= 4;
      } /* switch */
      delay( 50 MS__TIMEOUT );
      strcpy( output_string, MOVE_CURS  COLM_0  LINE_6 );
      for(indx=4,   dsply_pt=0;   dsply_pt   <=3;   dsply_pt++)   indx   +=   sprintf(
&output_string[indx], MOVE_CURS "%c%c%1d:%03d",
        (dsply_pt & 1) ? C_COLM_10 : C_COLM_4, (dsply_pt & 2) ? C_LINE_5 : C_LINE_4,
dsply_pt, get_analog_out( FND_CHN(AO__DIR_RD, dsply_pt)));
      discretes = get_analog_out( GET_AO_DISCRETES );
      indx += sprintf( &output_string[indx], MOVE_CURS COLM_5 LINE_7 );

      for( dsply_pt = 1; dsply_pt < 0x1F/*0b00011111*/; dsply_pt <<= 1)
        indx += sprintf(&output_string[ indx ], "%c ", (discretes & dsply_pt) ? '#' :
'-' );
      sprintf( &output_string[indx], MOVE_CURS "%c%c", column, line );
      write_b( WR__DETACHED_CMND, output_string );
    }
  }
  else
    mail_hcu = PREV_DISPLAY;
} /* modify_analogs */

#define    MOVE_RIGHT_T  "A"
#define    MOVE_RIGHT     'A'
#define    MOVE_DOWN_T   "B"
#define    MOVE_DOWN      'B'
#define    TOGGLE_T   "C"
```

```
#define    TOGGLE     'C'
#define    MOVE_LEFT_T   "D"
#define    MOVE_LEFT     'D'
#define    MOVE_UP_T   "E"
#define    MOVE_UP     'E'
#define    OFFSET     5
#define    SET_CHAR     '#'
#define    CLEAR_CHAR     '-'
#define    TIMER_CHAR  '+'       /* former output points 0-3 may now be used as timers
only */
void modify_discretes( char *change_flg )
{ unsigned discrete_out;
  unsigned last_discrete_out;
  unsigned point;
  unsigned last_point = 39;
  unsigned blink_curs = 0x0000;
  PUT_AO__WHLS( starboard_wheel_setpoint = 0, portside_wheel_setpoint = 0 );
  if ( password_status == STANDARD_PASSWORD || ( password_status = password_is( ) ) ==
STANDARD_PASSWORD )
  { write_b( WR__DETACHED_CMND, FORMFEED
      ESC "1prevdisp"  PREV_DISPLAY_T  "\r"
      ESC "2 ->      "  MOVE_RIGHT_T  "\r"
      ESC "8 ->      "  MOVE_RIGHT_T  "\r"    /* this prompt will be overwritten */
      ESC "5 <-      "  MOVE_LEFT_T  "\r"    /* this prompt will be overwritten */
      ESC "3 up      "  MOVE_UP_T  "\r"
      ESC "7         "  MOVE_DOWN_T  "\r"     /* this prompt overwritten */
      ESC "4tog-gle "  TOGGLE_T  "\r"
      MOVE_CURS  COLM_0  LINE_3  " 0 1 2 3 4 5 6 7 8 9" );
    sprintf( output_string, MOVE_CURS COLM_0 LINE_4 "0%19s1%19s2%19s3%19s", " ", " ",
" ", " " );
    for( point = 0; point <= last_point; point++ )
    { if( point > 4) discrete_out = get_bit_discrete_out( point ) ? SET_CHAR :
CLEAR_CHAR;
      else discrete_out = '+';
      output_string[ 2 * point +OFFSET] = discrete_out;
    }

    for( last_point = point; ; wait__mail_hcu( 90 MS__TIMEOUT ) /* wait HCU selection,
veh mess */ )
    { switch ( mail_hcu )
      { case MOVE_RIGHT :
          point++;
```

```
          break;
        case MOVE_LEFT :
          point += 39;  /* ( -1 +40 = 39 with a positive value on wrap around */
          break;
        case MOVE_UP :
          point += 30;
          break;
        case MOVE_DOWN :
          point += 10;
          break;
        case PREV_DISPLAY :
        case EXIT_PROCEDURE :
          return;
        case TOGGLE :
          last_discrete_out = discrete_out;
          discrete_out = (discrete_out != CLEAR_CHAR) ? CLEAR_CHAR : ( (point < 4) ?
TIMER_CHAR : SET_CHAR ); /* toggle value */
          put_bit_discrete_out( point, (discrete_out != CLEAR_CHAR) ? 1 : 0 );
          blink_curs = 0x0000;       /* force screen update */
          *change_flg = 1;
      } /* switch */
      if( point != last_point )
      { output_string[ 2 * last_point +OFFSET ] = last_discrete_out;
        last_point = point %= 40;    /* 0-3(now timers) See analog out discretes */
        discrete_out = get_bit_discrete_out( point ) ? ( (point < 4) ? TIMER_CHAR :
SET_CHAR ) : CLEAR_CHAR;
        blink_curs = 0x0000;
      }
      if( ( 0x0003 & blink_curs++) == 0 )
      { output_string[ 2 * point +OFFSET ] = ( blink_curs & 0x0004 ) ? discrete_out :
' ';
        write_b( WR__DETACHED_CMND, output_string );
      }
    }
  }
  else mail_hcu = PREV_DISPLAY;
}  /* modify_discretes */

char enter__osc_puls( unsigned dscrt_cmnd, char legend1[], char legend2[] )
{ unsigned control_code;
  unsigned dscrt_pt;
  sprintf( output_string, MOVE_CURS   COLM_0   LINE_5   "%5s Discrete? xx   %40s"
```

```
MOVE_CURS  COLM_16  LINE_5, legendl, " " );
  write_b( WR__DETACHED_CMND, output_string );
  wait__mail_hcu( 5 MIN__TIMEOUT );    /* wait for a HCU selection or vehicle message
*/
  if( mail_hcu == INPUT_TERMINAL_HANDLER  &&  sscanf( in_characters, "%d", &dscrt_pt
)  &&  dscrt_pt < 40 )
  { sprintf( output_string, MOVE_CURS  COLM_14  LINE_5  "# %02d\r%14s? xx" MOVE_CURS
COLM_16  LINE_6,
      dscrt_pt, legend2 );    /* rewrite data */
    write_b( WR__DETACHED_CMND, output_string );
    wait__mail_hcu( 5 MIN__TIMEOUT );    /* wait for a HCU selection or vehicle message
*/
    if(  mail_hcu  ==  INPUT_TERMINAL_HANDLER   &&   sscanf(  in_characters,  "%d",
&control_code )  &&  control_code < 256 )
    { sprintf( output_string, MOVE_CURS  COLM_14  LINE_6  "# %03d  ", control_code );
  /* rewrite data */
      set_bit_discrete_out( dscrt_pt, dscrt_cmnd, control_code );
    }
    else
    { strcpy( output_string, MOVE_CURS  COLM_0  LINE_7  "Entry Err: Control" );
    }
  }
  else strcpy( output_string, MOVE_CURS  COLM_0  LINE_6  "Entry Err: Discrete" );
  write_b( WR__DETACHED_CMND, output_string );
} /* enter__osc_puls */
#define     PULSE_DISCRETE_T   "A"
#define     PULSE_DISCRETE     'A'
#define     OSCILLATE_DISCRETE_T  "B"
#define     OSCILLATE_DISCRETE    'B'
#define     PULSE_COMMAND      1     /* i/o command */
#define     OSCILLATE_COMMAND     3     /* i/o command */
void modify_pulse_discretes( char *change_flg )
{     for( ; ; wait__mail_hcu( 5 MIN__TIMEOUT ) /* wait HCU selection, veh mess */ )
    { switch ( mail_hcu )
      { case PULSE_DISCRETE :
          enter__osc_puls( PULSE_COMMAND, "Pulse", "Period Code" );
          break;
        case OSCILLATE_DISCRETE :
          enter__osc_puls( OSCILLATE_COMMAND, "Osclt", "Freq. Code" );
          break;
        case NO_MAIL__TIMEOUT :
          option = MASTER_MENU;    /* timeout is this display is an error condition */
```

```
        mail_hcu = EXIT_PROCEDURE;     /* fall through */
      case EXIT_PROCEDURE :
      case  PREV_DISPLAY :
        return;
      default :
        if ( password_status == STANDARD_PASSWORD || ( password_status = password_is(
) ) == STANDARD_PASSWORD )
          { *change_flg = 1;
            write_b( WR__DETACHED_CMND, FORMFEED
              ESC "1prevoptn"  PREV_DISPLAY_T  "\r"
              ESC "2pulsdscr"  PULSE_DISCRETE_T  "\r"
              ESC "3oscldscr"  OSCILLATE_DISCRETE_T  "\r"
              ESC "4ENTR     "  BLANK  "\r"
              MOVE_CURS  COLM_0  LINE_3  "Oscillate / Pulse\r"  LOCK_CURSOR );
            break;
          }
          else
          { mail_hcu = PREV_DISPLAY;
            return;
          }
    } /* switch */
  }
}  /* modify_pulse_discretes */

#define    DEF_SETPT_T   "A"
#define    DEF_SETPT     'A'
#define    DEF_RATIO_T   "B"
#define    DEF_RATIO     'B'
#define    DEF_INDX_T    "C"
#define    DEF_INDX      'C'
#define    EXEC_CNTRL_T  "D"
#define    EXEC_CNTRL    'D'
#define    MODF_CNTRL_T  "E"
#define    MODF_CNTRL    'E'
#define    TPS_DIAG_T    "F"
#define    TPS_DIAG      'F'
#define    TPSCTRL_T     "G"
#define    TPSCTRL       'G'
/* ****  TEST MCP temporary variable list **** */
extern double setpt, ratio_c, wr;
extern double test_setpt, test_ratio_c;
extern unsigned test_indx, test_mcp, wr_indx;
```

```
void m_c_p__tps( unsigned, unsigned );
/* ****  TEST MCP temporary variable list **** */
void m_c_p__diagnostic( )
{   unsigned select;
    unsigned tps_ctrl = 0;       /* default to MCP mode */

    test_mcp = 1;   /* inhibit other task from using MCP */
    test_ratio_c = min(9.99, max(-9.99, test_ratio_c) );
    test_setpt = min(256.0, max(0.0, test_setpt) );

    for( ; ; wait__mail_hcu( 5 MIN__TIMEOUT ) /* wait HCU selection, veh mess */ )
    { switch ( mail_hcu )
      { case DEF_SETPT :
          display__modify( &test_setpt, 1.0, HEADER_1, DOUBLE_T, "SETPoinT %8.5f"
HOME_CURSOR "Test Val? " );
          select = DEF_SETPT;
          continue;
        case DEF_RATIO :
          display__modify( &test_ratio_c, 1.0, HEADER_1, DOUBLE_T, "Ratio_c %8.5f"
HOME_CURSOR "Test Val? " );
          select = DEF_RATIO;
          continue;
        case DEF_INDX :
          display__modify( &test_indx, 0.0, HEADER_2,    HEX_T, "Control Index %4X"
HOME_CURSOR  "Hex Value? " );
          select = DEF_INDX;
          continue;
        case TPSCTRL :
          display__modify( &tps_ctrl, 0.0, HEADER_2,  HEX_T, "TPS Control Param %4X"
HOME_CURSOR  "Hex Value? " );
          select = TPSCTRL;
          continue;

        case NO_MAIL__TIMEOUT :
          continue;

        case INPUT_TERMINAL_HANDLER :
          cnfg_task = MODIFY_CNFG;

          switch ( select )
          { case DEF_SETPT :
              display__modify( &test_setpt, 1.0, HEADER_1, DOUBLE_T, "SETPoinT %8.5f"
```

```
HOME_CURSOR "Test Val? " );
            break;
          case DEF_RATIO :
            display__modify( &test_ratio_c, 1.0, HEADER_1, DOUBLE_T, "Ratio_c %8.5f"
HOME_CURSOR "Test Val? " );
            tps_ctrl = 0;      /* way out */
            break;
          case DEF_INDX :
            display__modify( &test_indx, 0.0, HEADER_2,  HEX_T, "Control Index %4X"
HOME_CURSOR  "Hex Value? " );
            break;
          case TPSCTRL :
            display__modify( &tps_ctrl, 0.0, HEADER_2,  HEX_T, "TPS Control Param
%4X"  HOME_CURSOR  "Hex Value? " );
            m_c_p__tps( tps_ctrl = TPS_CTRL_CMND | (tps_ctrl & 0x07), test_indx /*
tps offset*/ );
        } /* switch */
        break;
      case EXIT_PROCEDURE :
      case  PREV_DISPLAY :
        test_mcp = 0;      /* let real stuff rip */
        return;
      case MODF_CNTRL :
        write_b( WR__DETACHED_CMND, FORMFEED
          ESC "1INDX     "  DEF_INDX_T   "\r"
          ESC "2SET PNT "  DEF_SETPT_T  "\r"
          ESC "3RAT-IO-C"  DEF_RATIO_T  "\r"
          ESC "4ENTR     "  BLANK         "\r"
          ESC "8 TPS ctl"  TPSCTRL_T     "\r"  LOCK_CURSOR );
        continue;

      case EXEC_CNTRL :
        test_mcp = 2;
        tps_ctrl = 0;
        break;

      case TPS_DIAG :
        m_c_p__tps( tps_ctrl = TPS_SETPT_CMND, (unsigned)test_setpt );
    } /* switch */
    cnfg_task = DISPLAY_CNFG;
    select = 0;
    if(tps_ctrl)     /* TPS mode */
```

```
    { sprintf(output_string, FORMFEED
        ESC "1Exit     "  PREV_DISPLAY_T  "\r"
        ESC "2MODF     "  MODF_CNTRL_T   "\r"
        ESC "3TPS      "  TPS_DIAG_T "\r"
        ESC "4MCP      "  EXEC_CNTRL_T  "\r"
        MOVE_CURS  COLM_0  LINE_3  " Setpt   TPS    IndxM %6.1f %4XH  %4XH %6.1f
  %4X" LOCK_CURSOR,
          setpt, tps_ctrl, wr_indx, test_setpt, test_indx );
        write_b( WR__DETACHED_CMND, output_string );
    }
    else      /* MCP mode */
    { sprintf(output_string, FORMFEED
        ESC "1Exit     "  PREV_DISPLAY_T  "\r"
        ESC "2MODF     "  MODF_CNTRL_T   "\r"
        ESC "3TPS      "  TPS_DIAG_T "\r"
        ESC "4MCP      "  EXEC_CNTRL_T  "\r"
        MOVE_CURS  COLM_0  LINE_3  "  Setpt  Ratio  indxM %6.1f %6.3f %4XH %6.1f
%6.3f %4X" LOCK_CURSOR,
          setpt, ratio_c, wr_indx, test_setpt, test_ratio_c, test_indx );
        write_b( WR__DETACHED_CMND, output_string );
    }
   }
}  /* m_c_p__diagnostic */

#define DISP_HOLD_T     "a"
#define DISP_HOLD       'a'
#define DISP_XY_PERIOD  (500 MS__TIMEOUT)
void display_xy_position( )
{ unsigned delay_period;

  for( mail_hcu = 0; ; wait__mail_hcu( delay_period ) )
  { switch ( mail_hcu )
    { case NO_MAIL__TIMEOUT :
          sprintf(   output_string,   MOVE_CURS   COLM_0   LINE_3
"XY:%-8.6g%,%-8.6gH:%-8.5g,%-8.5g Ep%7.5g Te%7.5g Wr %-8.5g  ",
         xvf, yvf, tfv, tfv * 57.29577951, ep, tew, mcp.wr );
         write_b( WR__DETACHED_CMND, output_string );
        break;
      case DISP_HOLD :
        delay_period  =  (delay_period  ==  DISP_XY_PERIOD)  ?  TIMEOUT__FOREVER  :
DISP_XY_PERIOD;
        sprintf(   output_string,   MOVE_CURS   COLM_12   LINE_2   "(%5s)",
```

```
(delay_period==DISP_XY_PERIOD )? "500ms" : "Hold " );
        write_b( WR__DETACHED_CMND, output_string );
        break;
      case PREV_DISPLAY :
      case EXIT_PROCEDURE :
        return;
      default :
        sprintf( output_string, FORMFEED
            ESC "1PrevDisp"  PREV_DISPLAY_T  "\r"
            ESC "2Hold     "  DISP_HOLD_T  "\r"
            MOVE_CURS  COLM_10  LINE_1  "X-Y Posit" MOVE_CURS COLM_12 LINE_2 "(500ms)"
);
        write_b( WR__DETACHED_CMND, output_string );
        delay_period = DISP_XY_PERIOD;
    } /* switch */
  }
}  /* display_xy_position */

void display__u_m_s_log( )
#define      CURR_RCRD_T  "a"
#define      CURR_RCRD    'a'
#define      LAST_RCRD_T  "b"
#define      LAST_RCRD    'b'
#define      CL__U_M_S_T  "c"
#define      CL__U_M_S    'c'
{ u_m_log_type  *um_log;
  unsigned prnt_indx, tmp_indx;
  for( mail_hcu = CURR_RCRD; ; wait__mail_hcu( 15 SEC__TIMEOUT ) /* wait HCU selection,
veh mess */ )
  { switch ( mail_hcu )
    { case PREV_DISPLAY :
        return;
      case LAST_RCRD :  /* Select current -1 record */
        tmp_indx = ( u_m_log_indx == 0xFFFF ) ? 0xFFFF : u_m_log_indx -1;
        break;
      case CL__U_M_S :     /* reset-clear U-M-log index */
        for( u_m_log_indx = 0; u_m_log_indx <= 1; u_m_log_indx++ )
        { um_log = &u_m_log[ u_m_log_indx ];
          um_log->pos_y = 0;
          um_log->mark_x = 0;       /* address */
        }
        u_m_log_indx = 0xFFFF;
```

```
      default :       /* CURR_RCRD: Select latest record */
        delay( 50 MS__TIMEOUT );     /* make sure update in motion task has run */
        tmp_indx = u_m_log_indx;
    } /* switch */
    um_log = &u_m_log[ tmp_indx & U_M_LOG_MSK ];
    prnt_indx = sprintf( output_string, FORMFEED
      ESC "1Prev     "  PREV_DISPLAY_T  "\r"
      ESC "2Curr     "  CURR_RCRD_T  "\r"
      ESC "3Last     "  LAST_RCRD_T  "\r"
      ESC "4Clr      "  CL__U_M_S_T  "\r"
      MOVE_CURS COLM_0 LINE_2 "I=%-6d Y=%-9.7gH=%6.3f/%-6.3f" MOVE_CURS COLM_2 LINE_4
" X  m-meters  Y\r",
        tmp_indx, um_log->pos_y, um_log->heading, um_log->ip_heading );
    if( tmp_indx == 0xFFFF )    /* "address" undefined? */
      sprintf(  &output_string[  prnt_indx  ],  MOVE_CURS  COLM_4  LINE_5  "Empty  Log"
MOVE_CURS COLM_5 LINE_6 "Cleared\r" );
    else if( um_log->mark_x == 0 )
      sprintf( &output_string[ prnt_indx ], "XY%9.7g%9.7g'Y' valid - Manual\r-or- Out
of Window",
        um_log->avrg_err_x, um_log->avrg_err_y );
    else
    { sprintf( &output_string[ prnt_indx ], "XY%9.7g%9.7gMr%9.7g%9.7gEr%9.7g%9.7g",
um_log->avrg_err_x, um_log->avrg_err_y,
        *(um_log->mark_x), *(um_log->mark_y), um_log->veh_err_x, um_log->veh_err_y );
    }

    write_b( WR__DETACHED_CMND, output_string );
  }
}  /* display__u_m_s_log */

#define    SETUP_COMM_CLOCKS_T  "A"
#define    SETUP_COMM_CLOCKS    'A'
#define    BREAK_E_CHAIN_T  "E"
#define    BREAK_E_CHAIN    'E'
void additional_diagnostics( )
{ char  output_flag = 0;
    for( ; ; wait__mail_hcu( 5 MIN__TIMEOUT ) /* wait HCU selection, veh mess */ )
    { switch ( mail_hcu )
      { case SETUP_COMM_CLOCKS :
          if (  password_is( ) == STANDARD_PASSWORD )
          { write_b( WR__DETACHED_CMND, FORMFEED
              ESC "1MAS-TER "  MASTER_MENU_T  "\r"
```

```
            MOVE_CURS  COLM_5  LINE_0  "COMMUNICATION"  MOVE_CURS  COLM_6  LINE_1
"C L O C K S"
            MOVE_CURS  COLM_6  LINE_2  "are ON\rExit to Master Menu\r will reset
clocks"  LOCK_CURSOR);
          transon( );
          for( ; mail_hcu != EXIT_PROCEDURE; ) wait__mail_hcu( TIMEOUT__FOREVER );
          transoff( );
          output_flag = 1;
        }
        continue;
      case BREAK_E_CHAIN :
        break_echain( );
      case NO_MAIL__TIMEOUT :
      case EXIT_PROCEDURE :
        if ( output_flag ) seq_emergency_stop( "I O diagnostics" );
        return;
    } /* switch */
    write_b( WR__DETACHED_CMND, FORMFEED
      ESC "1MAS-TER "  MASTER_MENU_T  "\r"
      ESC "3COMMCLKs"  SETUP_COMM_CLOCKS_T  "\r"
      ESC "5Brk Echn"  BREAK_E_CHAIN_T  "\r"  LOCK_CURSOR );
  }
}  /* additional_diagnostics */

void i_o_diagnostic( )
{ char  change_flag = 0;
  password_status = ILLEGAL_PASSWORD;
  for( ; ; )
  { switch ( mail_hcu )
    {      case READ_DISCRETE :
             display_discretes( );
             continue;
           case INTRP_HIST_DSPLY :        /* called from within READ_DISCRETE */
             display_interrupts( );
             continue;
           case READ_ANALOG :
             display_analogs( );
             continue;
           case MODIFY_DISCRETE :
             modify_discretes( &change_flag );
             continue;
           case PULSE_DISCRETES :
```

```
          modify_pulse_discretes( &change_flag );
          continue;
        case MODIFY_ANALOG :
          modify_analogs( &change_flag );
          continue;
        case NO_MAIL__TIMEOUT :
        case EXIT_PROCEDURE :
          if ( change_flag ) seq_emergency_stop( "I O diagnostics" );
          return;
    } /* switch */
    write_b( WR__DETACHED_CMND, FORMFEED
        ESC "1MAS-TER "  MASTER_MENU_T  "\r"
        ESC "3readdscr"  READ_DISCRETE_T  "\r"
        ESC "4readanal"  READ_ANALOG_T  "\r"
        ESC "6Pulsdscr"  PULSE_DISCRETES_T  "\r"
        ESC "7set dscr"  MODIFY_DISCRETE_T  "\r"
        ESC "8set anal"  MODIFY_ANALOG_T  "\r"
        MOVE_CURS    COLM_0    LINE_6    "MUST be on BLOCKS\rbefore output TESTS"
LOCK_CURSOR );
    wait__mail_hcu( 5 MIN__TIMEOUT ); /* wait HCU selection, veh mess */
  }
}   /* i_o_diagnostic */

#define    MOVE_QUES_T  "z"
#define    MOVE_QUES    'z'
void diagnostic_selections( )
{ for( ; ; wait__mail_hcu( 5 MIN__TIMEOUT )/* wait for a HCU selection or vehicle
message */ )
  { switch ( mail_hcu )
    { case CONFIGURE :
        configure_vehicle( );
        break;
      case I_O_TEST :
        i_o_diagnostic( );
        continue;
      case CPU_MEM_TEST :
        display_memory( );
        continue;
      case COMMAND_QUES :
        display_command_queue( );
        continue;
      case MOVE_QUES :
```

```
        display_move_queue( );
        continue;
      case NO_MAIL__TIMEOUT :
        mail_hcu = EXIT_PROCEDURE;
      case EXIT_PROCEDURE :
        return;
    } /* switch */
    stop_vehicle( );
    write_b( WR__DETACHED_CMND, FORMFEED
      ESC "1MAS-TER "  MASTER_MENU_T  "\r"
      ESC "3MOV ques"  MOVE_QUES_T  "\r"
      ESC "5CONFvehl"  CONFIGURE_T  "\r"
      ESC "6CMNDques"  COMMAND_QUES_T  "\r"
      ESC "7I/O test"  I_O_TEST_T  "\r"
      ESC "8DISPmem "   CPU_MEM_TEST_T   "\r" );     /* write display format, setup
softkeys. */
    basic_update( );   /* update the basic state of control( MANUAL_OPER, AQUIRE_WIRE,
etc. ) */
  }
}  /* diagnostic_selections */

#define  AUTO_DISPLAY_T    "f"
#define  AUTO_DISPLAY      'f'
#define  SELECT_U_M_LOG_T  "c"
#define  SELECT_U_M_LOG    'c'
#define  XY_POSITION_T     "x"
#define  XY_POSITION       'x'
#define  MCP_DIAG_T        "y"
#define  MCP_DIAG          'y'

void automatic_display_master( )
{ unsigned option__save = option;
  for( mail_hcu = 0; ; wait__mail_hcu( TIMEOUT__FOREVER )    /* wait HCU selection,
vehicle message */ )
  { switch ( mail_hcu )
    { case SELECT_U_M_LOG :
        set_mask( U_M_S__ID, 0/*only line*/, HIGH_AND_LOW_MASK, ENABLE_HIGH_AND_LOW );
/* init wake-up on new magnet */
        display__u_m_s_log( );
        set_mask( U_M_S__ID, 0/*only line*/, HIGH_AND_LOW_MASK, DISABLE_INTERRUPT );
        break;
      case STATUS :
```

```
      request_status_display( );
      break;
    case CPU_MEM_TEST :
      display_memory( );
      break;
    case XY_POSITION :
      display_xy_position( );
      break;
    case COMMAND_QUES :
      display_command_queue( );
      break;
    case MOVE_QUES :
      display_move_queue( );
      continue;
    case MCP_DIAG :
      m_c_p__diagnostic( );
      break;

    case AUTO_DISPLAY :
      display_in_automatic = ( display_in_automatic == DSPL_DISABLED ) ? DSPL_ENABLED
: DSPL_DISABLED;
      break;
    case EXIT_PROCEDURE :
      if ( option == MASTER_MENU )    display_in_automatic = DSPL_DISABLED;
      else    option = option__save;    /* restore option */
      return;
  } /* switch */
  sprintf( output_string, FORMFEED
    ESC "1MAS-TER "  MASTER_MENU_T  "\r"
    ESC "2STATblok"  STATUS_T  "\r"
/*  ESC "3AUTOdspl"  AUTO_DISPLAY_T  "\r"   */
    ESC "3MOV Ques"  MOVE_QUES_T  "\r"
    ESC "4UpdtMrkr"  SELECT_U_M_LOG_T  "\r"
    ESC "5Mcp Diag"  MCP_DIAG_T "\r"
    ESC "6CMNDques"  COMMAND_QUES_T  "\r"
    ESC "7DISPmem "  CPU_MEM_TEST_T  "\r"
    ESC "8X-Y pstn"  XY_POSITION_T  "\r"
    HOME_CURSOR  "AUTO-displays %-3s"  LOCK_CURSOR, display_in_automatic ? "ON" :
"OFF" );    /* toggle */
  write_b( WR__DETACHED_CMND, output_string );    /* write the display format and
setup the softkeys. */
}
```

```
} /* automatic_display_master */

void hand_control_menu( )
{ if ( ( HCU_FRONT_CONNECT_MASK & get_byte_discrete_in( PORT_1 ) ) ) /* rear is
front if connected in the front */
  { vehicle_orientation = define_enc_orientation( REAR_FORW ); /* front connection,
hence rear is forward direction */
    veh_status.status_set &= ( !FORWARD_IS_FRONT_V );
  }
  else/*default front is forward*/
  { vehicle_orientation = define_enc_orientation( FRONT_FORW );
    veh_status.status_set |= FORWARD_IS_FRONT_V;
  }
  option = MASTER_MENU;
  mail_hcu = MANUAL_OPER;
                      /* wait for a HCU selection or vehicle message */
  for ( ; error_code == 0; )
  { man_cntrl_tsk = HCU_CLEAR_MAN;     /* notify v2actt, release action task from
driving vehicle */
    stop_vehicle( );         /* make sure the vehicle is stopped!!!! */
    switch ( mail_hcu )
    { case MANUAL_OPER :
        manual_operation( );
        continue;
      case SELECT_MODE :
        mode_selection( );
        continue;
      case PREV_DISPLAY :
        break;
      case MORE_DIAGNOSTICS :
        additional_diagnostics( );
        break;
      case SELECT_DIAGNOSTIC :
        diagnostic_selections( );
        calibrate_i_o( );     /* fall through */
      case EXIT_PROCEDURE :
        if( option != MASTER_MENU ) return;
    } /* switch */
    option = mail_hcu = MASTER_MENU;
    sprintf( output_string, FORMFEED
        ESC "1MAN-UAL "  MANUAL_OPER_T  "\r"
        ESC "2SlctOPTN"  SELECT_MODE_T  "\r"
```

```
        ESC "3SlctDIAG"  SELECT_DIAGNOSTIC_T  "\r"
        ESC "4MoreDIAG"  MORE_DIAGNOSTICS_T  "\r"
        MOVE_CURS COLM_0 LINE_4 "M A S T E R  M E N U%-15s %03d\r(C)89 EK %-11.11s",
        vehicle_name, vehicle_number, revision_id );
    write_b( WR__DETACHED_CMND, output_string );
    wait__mail_hcu( TIMEOUT__FOREVER );
  }
} /* hand control_menu */
```

```
/*  v4mcpemul  v4mcpemul  v4mcpemul  v4mcpemul  v4mcpemul  v4mcpemul  v4mcpemul
v4mcpemul  v4mcpemul  v4mcpemul  v4mcpemul v4mcp
*****************************************************************************************
***********************************************
**
                                            **
**                                        EEEEEEEEEEEEEEE       TTTTTTTTTTTTT
NNNNNNN      NNNNN                                **
**                                        EEEEEEEEEEEEEE        TTTTTTTTTTT
NNNNNNNN     NNNNN                                **
**                                        EEEEE              A        TTTT       OOO
NNNNNNNNN    NNNNN                                **
**                                    EEEEEEEEEEEE     AAA      TTT      OOOOOOO    NNNNN
NNNN   NNNNN                              **
**                                    EEEEEEEEEEE     AAAAA     TTT      OOOOOOO    NNNNN
NNNN NNNNN                                **
**                                    EEEEE                     TTTT      OOO       NNNNN
 NNNNNNNNN                                **
**                                    EEEEEEEEE      AAAAAAA    TTTTT               NNNNN
  NNNNNNNN                                **
**                                    EEEEEEEE     AAAAAAAAA    TTTTTTT             NNNNN
   NNNNNNN                                **
**
                                            **
**        This software (firmware) developed by EATON-KENWAY is proprietary.  Source
code on listings or any other media       **
**        is not for sale or loan and may not be copied or transferred to any vendor,
buyer, or consultant.  Executable        **
**          code is available in ROM and is sold with the original product or as a
product upgrade.  Buyer shall not               **
**         copy or distribute ROM's with E-K firmware to any third party without the
prior written approval of EATON-KENWAY.   **
**           Title to and ownership of the software shall at all times remain with
EATON-KENWAY.   The information  in this      **
**           is subject to change without notice  and should not be construed as a
commitment by EATON-KENWAY.                    **
**
                                            **
**         EATON-KENWAY  assumes  no  responsibility  for  the  use or reliability
of  its  software on  equipment which      **
**           is  not supplied EATON-KENWAY or has been modified without EATON-KENWAY
approval.                                    **
```

```
**
                                                  **
**         Copyright 1989
                KENWAY, INCORPORATED     **
************************************************************************************
**********************************************
  v4mcpemul   v4mcpemul   v4mcpemul   v4mcpemul   v4mcpemul   v4mcpemul   v4mcpemul
v4mcpemul  v4mcpemul  v4mcpemul  v4mcpemul  v4mcp
    DATE CREATED:  Feb 89
    AUTHOR:        Vehicle Group
    DESCRIPTION:
      xxx......            ....
* * * * * * * * * * * * * * * * * * * * * * * * * * * * * * * * * * * * * * * * * * *
* * * * * * * * * * * * * * * * * * * * * * */
#include  <stdlib.h>
#include  <stdio.h>
#include  <string.h>
#include  <math.h>
#include  "V4MESGS.K"
#include  "V4MOTION.K"
#include  "V4INIT_D.K"       /* function prototypes for assembler(VINIT) routines */
#include  "V4VARS.K"
#include  "V4HCOMMN.K"
    /* variables from navigation and guidance */
extern double xvw, xvwi;
extern double delta_xlw, delta_xrw;

#define  ARBITRARY_DIST 10000.0
#define  MCP_OFF  0
#define  MCP_ON  1
#define  OBST_AVER  8
#define  ALOG_IN__OBS_DETECT_CHN 9
#define  WR__ABS_MAX  100.0
#define  MIN_ACEL 5        /* min index to force fast accelerations from 0 */
    /* define acceleration-deceleration wheel setpoint curve; index range [0-128] */
    /* curve = ( SIN(x) ) where as varied from 0-PI/2 in 256 steps */
float const SPD__FROM_DIST[] =
{ 0.0020, 0.0061, 0.0122, 0.0184, 0.0245, 0.0306, 0.0368, 0.0429, 0.0490, 0.0551,
0.0613, 0.0674, 0.0735, 0.0796, 0.0857, 0.0919,
  0.0980, 0.1041, 0.1102, 0.1163, 0.1224, 0.1284, 0.1345, 0.1406, 0.1467, 0.1527,
0.1588, 0.1649, 0.1709, 0.1770, 0.1830, 0.1890,
  0.1950, 0.2011, 0.2071, 0.2131, 0.2191, 0.2250, 0.2310, 0.2370, 0.2429, 0.2489,
```

```
0.2548, 0.2607, 0.2667, 0.2726, 0.2785, 0.2844,
  0.2902, 0.2961, 0.3020, 0.3078, 0.3136, 0.3195, 0.3253, 0.3311, 0.3368, 0.3426,
0.3484, 0.3541, 0.3598, 0.3656, 0.3713, 0.3770,
  0.3826, 0.3883, 0.3939, 0.3996, 0.4052, 0.4108, 0.4164, 0.4220, 0.4275, 0.4330,
0.4386, 0.4441, 0.4496, 0.4550, 0.4605, 0.4659,
  0.4713, 0.4767, 0.4821, 0.4875, 0.4928, 0.4982, 0.5035, 0.5088, 0.5141, 0.5193,
0.5245, 0.5298, 0.5349, 0.5401, 0.5453, 0.5504,
  0.5555, 0.5606, 0.5657, 0.5707, 0.5758, 0.5808, 0.5857, 0.5907, 0.5956, 0.6006,
0.6055, 0.6103, 0.6152, 0.6200, 0.6248, 0.6296,
  0.6343, 0.6391, 0.6438, 0.6485, 0.6531, 0.6578, 0.6624, 0.6670, 0.6715, 0.6760,
0.6806, 0.6850, 0.6895, 0.6939, 0.6983, 0.7027,
  0.7071, 0.7114, 0.7157, 0.7200, 0.7242, 0.7284, 0.7326, 0.7368, 0.7409, 0.7450,
0.7491, 0.7531, 0.7572, 0.7612, 0.7651, 0.7691,
  0.7730, 0.7768, 0.7807, 0.7845, 0.7883, 0.7921, 0.7958, 0.7995, 0.8032, 0.8068,
0.8104, 0.8140, 0.8175, 0.8211, 0.8245, 0.8280,
  0.8314, 0.8348, 0.8382, 0.8415, 0.8448, 0.8481, 0.8513, 0.8545, 0.8577, 0.8608,
0.8639, 0.8670, 0.8700, 0.8730, 0.8760, 0.8790,
  0.8819, 0.8847, 0.8876, 0.8904, 0.8932, 0.8959, 0.8986, 0.9013, 0.9039, 0.9065,
0.9091, 0.9117, 0.9142, 0.9166, 0.9191, 0.9215,
  0.9238, 0.9262, 0.9285, 0.9307, 0.9329, 0.9351, 0.9373, 0.9394, 0.9415, 0.9435,
0.9456, 0.9475, 0.9495, 0.9514, 0.9533, 0.9551,
  0.9569, 0.9587, 0.9604, 0.9621, 0.9637, 0.9653, 0.9669, 0.9685, 0.9700, 0.9715,
0.9729, 0.9743, 0.9757, 0.9770, 0.9783, 0.9795,
  0.9807, 0.9819, 0.9831, 0.9842, 0.9852, 0.9863, 0.9873, 0.9882, 0.9891, 0.9900,
0.9909, 0.9917, 0.9924, 0.9932, 0.9939, 0.9945,
  0.9951, 0.9957, 0.9963, 0.9968, 0.9972, 0.9977, 0.9981, 0.9984, 0.9987, 0.9990,
0.9993, 0.9995, 0.9996, 0.9998, 0.9999, 0.9999,
  1.0000
};          /* 256 */
    /* curve = Reverse of ( SIN(x) ) above: Look up the distance index from the
percentage of zone setpoint */
unsigned char const DIST__FROM_SPD[] =
{  0,  1,  2,  2,  3,  4,  4,  5,  6,  6,  7,  8,  8,  9,  9, 10, 11, 11, 12, 13, 13,
14, 15, 15, 16, 16, 17, 18, 18, 19, 20, 20,
   21, 22, 22, 23, 23, 24, 25, 25, 26, 27, 27, 28, 29, 29, 30, 31, 31, 32, 33, 33, 34,
34, 35, 36, 36, 37, 38, 38, 39, 40, 40, 41,
   42, 42, 43, 44, 44, 45, 46, 46, 47, 48, 48, 49, 50, 50, 51, 52, 52, 53, 54, 54, 55,
56, 56, 57, 58, 58, 59, 60, 60, 61, 62, 62,
   63, 64, 65, 65, 66, 67, 67, 68, 69, 69, 70, 71, 71, 72, 73, 74, 74, 75, 76, 76, 77,
78, 79, 79, 80, 81, 81, 82, 83, 84, 84, 85,
   86, 87, 87, 88, 89, 90, 90, 91, 92, 93, 93, 94, 95, 96, 96, 97, 98, 99,
99,100,101,102,103,103,104,105,106,106,107,108,109,110,
```

```
111,111,112,113,114,115,115,116,117,118,119,120,121,121,122,123,124,125,126,127,128,
128,129,130,131,132,133,134,135,136,137,138,

139,140,141,142,143,144,145,146,147,148,149,150,151,152,153,154,155,156,157,158,160,
161,162,163,164,165,167,168,169,170,172,173,

174,175,177,178,180,181,182,184,185,187,188,190,192,193,195,197,199,200,202,204,206,
209,211,213,216,218,221,224,228,232,236,242,
  255
};          /* 256 */

/*  **************The  following  tables  are  built  with  these  definitions:
**********************************************
  FF(+)=FrontForw(1), RF=RearForw(0) from vehicle_direction,
  OutsideWheel=VehicleWheel  set  to  specfd  speed,  InsideWheel=wheel  ratioed  to
OutsideWheel
    InsideWheelSpeed <= OutsideWheelSpeed (always)
  Lao=LeftAnalogOut, Rao=RightAnalogOut, IW=InsideWheel, Ow=OutsideWheel
  Left-Right side:  When "FF" Leftside=Portside, Rightside=Starboard,
            When "RF": Leftside=Starboard, Rightside=Portside,
  Contactors: RS=RearStarboard, RP=RearPortside, FS=FrontStarboard, FP=FrontPortside
              FP=( FF & LOA[+spd] ) |  ( RF & RAO[-spd] )
              FS=( RF & LOA[-spd] )  | ( FF & RAO[+spd] )
              RP=( FF & LOA[-spd] ) |  ( RF & RAO[+spd] )
              RS=( RF & LOA[+spd] )  | ( FF & RAO[-spd] )
  DEV=value specified to control wheels.  When DEV >=0(1+): Ow=Left, Iw=Right
                                  DEV  <0(0): Ow=Right, Iw=Left
  Encoders, When "FF" LeftWhlEncDist = PortEncDist, RightWhlEncDist = StarbEncDist
        When "RF" LeftWhlEncDist = (-)StarbEncDist, RightWhlEncDist = (-)PortEncDist
  Control Array                         Insd/Outsd Indx    Encoder In
    Address            Contactors        for Analog Out    DIO Channels
   |Dv+|FF+|Iw+|Ow+|   |RS |FS |RP |FP |  |Ports |Starb |  | Iwhl | Owhl |
   |---------------|   |---------------|  |-------------|  |-------------|
   | 0 | 0 | 0 | 0 |   | 0 | 1 | 0 | 1 |  |Owhl-0|Iwhl-1|  |Strb-0|Port-1|  Insd/Outsd
Indx references structure
   | 0 | 0 | 0 | 1 |   | 1 | 0 | 0 | 1 |  |  0   |  1   |  |     0|     1|  "encd"
where 0(Owhl) and 1(Iwhl) are
   | 0 | 0 | 1 | 0 |   | 0 | 1 | 1 | 0 |  |  0   |  1   |  |     0|     1|  the
structure elements.
   | 0 | 0 | 1 | 1 |   | 1 | 0 | 1 | 0 |  |  0   |  1   |  |     0|     1|
   |---------------|   |---------------|  |-------------|  |-------------|
   | 0 | 1 | 0 | 0 |   | 1 | 0 | 1 | 0 |  |Iwhl-1|Owhl-0|  |Port-1|Strb-0|  "Encoder
In" references the port/starb
   | 0 | 1 | 0 | 1 |   | 1 | 0 | 0 | 1 |  |  1   |  0   |  |     1|     0|  encoders
```

```
and assigns them to Iwhl or
    | 0 | 1 | 1 | 0 |   | 0 | 1 | 1 | 0 |   |  1   |  0   |  |    1 |    0 |    Owhl.
    | 0 | 1 | 1 | 1 |   | 0 | 1 | 0 | 1 |   |  1   |  0   |  |    1 |    0 |
    |---------------|   |---------------|   |-------------|  |-------------|
    | 1 | 0 | 0 | 0 |   | 0 | 1 | 0 | 1 |   |Iwhl-1|Owhl-0|  |Port-1|Strb-0|
    | 1 | 0 | 0 | 1 |   | 0 | 1 | 1 | 0 |   |  1   |  0   |  |    1 |    0 |
    | 1 | 0 | 1 | 0 |   | 1 | 0 | 0 | 1 |   |  1   |  0   |  |    1 |    0 |
    | 1 | 0 | 1 | 1 |   | 1 | 0 | 1 | 0 |   |  1   |  0   |  |    1 |    0 |
    |---------------|   |---------------|   |-------------|  |-------------|
    | 1 | 1 | 0 | 0 |   | 1 | 0 | 1 | 0 |   |Owhl-0|Iwhl-1|  |Strb-0|Port-1|
    | 1 | 1 | 0 | 1 |   | 0 | 1 | 1 | 0 |   |  0   |  1   |  |    0 |    1 |
    | 1 | 1 | 1 | 0 |   | 1 | 0 | 0 | 1 |   |  0   |  1   |  |    0 |    1 |
    | 1 | 1 | 1 | 1 |   | 0 | 1 | 0 | 1 |   |  0   |  1   |  |    0 |    1 |
***'---------------'***'---------------'**'-------------'**'-------------'
******************/
  /* define contactors, analog out I/O channel[ports(0)/starb(1) = outs(0)/insd(1)],
    for DEV/front-back combinations, and  Enc-In(outside/inside) = Channel[ports(1),
starb(0)] */
struct
{ unsigned char cntctr;   /* contactor settings */
  unsigned char ao_ps;    /* analog_out portside */
  unsigned char ao_sb;    /* analog_out starboard */
  unsigned char ei_iw;    /* encoder_in inside  */
  unsigned char ei_ow;    /* encoder_in outside */
} const IO_CHAN[] =
{ 0x05, 0, 1, 0, 1,  0x09, 0, 1, 0, 1,  0x06, 0, 1, 0, 1,  0x0A, 0, 1, 0, 1,  /* rear
forw(0)   -  'Dev' Negative(0) */
  0x0A, 1, 0, 1, 0,  0x09, 1, 0, 1, 0,  0x06, 1, 0, 1, 0,  0x05, 1, 0, 1, 0,  /* front
forw(1)  -  'Dev' Negative(0) */
  0x05, 1, 0, 1, 0,  0x06, 1, 0, 1, 0,  0x09, 1, 0, 1, 0,  0x0A, 1, 0, 1, 0,  /* rear
forw(0)   -  'Dev' Positive(1) */
  0x0A, 0, 1, 0, 1,  0x06, 0, 1, 0, 1,  0x09, 0, 1, 0, 1,  0x05, 0, 1, 0, 1   /* front
forw(1)  -  'Dev' Positive(1) */
};

double setpt, setpt_zone;
double k_ratio_gain;     /* gain in ratio calculation */
double ratio_c; /* [now(current)], [calculated] */
double dim__enc_drv_ratio;       /* ratio of the enc->enc and drv->drv dimensions */
double xvw_beg;
unsigned char indx_veh, indx_veh_prv;
int scaled__xvw, scaled__xvwi, scaled__x_total;
```

```
int dist__initl_ofst, dist__final_ofst;
unsigned controls;      /* Eagle=0, else wire */
/* ****  See assembler interface to REAL MCP and V4MCPEMU.C for the emulation logic */
  void m_c_p__control_c( /*double, double,*/ unsigned char );     /* ( unsigned, int,
unsigned char ) in Assembler */
  void m_c_p__obst_c( double a, double b );
  void m_c_p__initialize( );
  void m_c_p__tps( unsigned, unsigned);
  void navigation( );

/* ****  TEST MCP temporary variable **** */
  double test_setpt, test_ratio_c;
  unsigned test_indx, test_mcp, save_wr;
/* ****  TEST MCP temporary variable **** */
void m_c_p__init(double dim__drv_2_drv, double dim__enc_2_enc )
{ m_c_p__state_c( BRAKES_DSABLD );
  m_c_p__state_c( OBSTC_DSABLD );
  dist__initl_ofst = dist__final_ofst = 0;
  dim__enc_drv_ratio = dim__drv_2_drv / dim__enc_2_enc;
  k_ratio_gain = 1.0;
  setpt = 0.0;
  controls = 0;    /* force a setup first time around */
  m_c_p__initialize( );
}  /* m_c_p__init */

extern int mv_turn_rot;
unsigned wr_indx;
void m_c_p__move( )
{ int indx;
  wr_indx = ( (mcp.wr >= 0.0) << 3 ) | mcp.orientation     /* redefine deviation, &
orientation status */;
  scaled__xvw = max( scaled__xvw, (int)( (xvw -xvw_beg) * pt__mvq->len_dcl ) );    /*
len_acl alias as index-scaling */
  indx = max( MIN_ACEL, scaled__xvw + dist__initl_ofst );
/* acceleration */
  indx = min( indx, ( ( scaled__xvwi - scaled__xvw ) + dist__final_ofst ) );    /*
deceleration_1(waypoint dist) */
  indx = max( 0, min( indx, ( scaled__x_total - scaled__xvw ) ) );              /*
deceleration_2(total dist) */
  setpt = ( indx < 256 ) ? (double)SPD__FROM_DIST[ indx ] * setpt_zone +0.11 :
setpt_zone;
  if( controls )
```

```
    ratio_c = 1.0;     /* forced for wire guidance */
  else                  /* eagle controls */
  { if( mv_turn_rot )
      ratio_c = -1.0;   /* rotate: force inside wheel to turn backwards */
    else    /* standard move(straight/turn) */
    {        /* "wr" dynamic gain( setpoint and wr ) */
      ratio_c /*wr_alias*/ = fabs( mcp.wr );
      ratio_c /*wr_alias*/ = max( ratio_c, pow( ratio_c, wr_gain.exp ) ) *
        ( wr_gain.unity / max( wr_gain.min_limit, setpt * setpt ) );
      ratio_c  /*ratio_e  alias*/  =  (  k_ratio_gain  -  ratio_c/*wr_alias*/  )  /  (
k_ratio_gain + ratio_c/*wr_alias*/ );
      if( fabs( 1.0 -fabs(ratio_c) ) < 0.000001 )
        ratio_c = 1.0;   /* math (0.0 / 0.0)  */
      else
      { ratio_c/*turn_radius dummy*/ = ( ratio_c + 1.0 ) / ( 1.0 -ratio_c );
        ratio_c/*calc*/  =  (  ratio_c  -  dim__enc_drv_ratio  )  /  (  ratio_c  +
dim__enc_drv_ratio );
      }
    }
  }
  m_c_p__control_c(/* setpt, ratio_c,*/ wr_indx );
}  /* m_c_p__move */

void m_c_p__move_setup( )
{ mv_rcrd_type *ptr_mq;
  unsigned n, n_plus4;
  double x_totl;     /* summing variable for all x_waypoints */
  m_c_p__state_c( BRAKES_ENABLD );
  setpt_zone = (double)pt__mvq->setpt;
  /* ************** move this code to V4TRNT ******************************* */
    x_totl/*alias*/ = setpt_zone / speed_setpoint_calib;    /* conv setpt to meters per
sec */
    pt__mvq->len_acl/*alias  ac/dc_distance*/  =  (  x_totl  *  x_totl/*aliases*/  )  *
accel_base_conv;
  /*      ****  1/(dist/256) : allow mult instead of div when used */
    pt__mvq->len_dcl/*alias    ac/dc_dist.scal*/    =     256.0/*max    index*/    /
pt__mvq->len_acl/*alias*/;
  /* ************** move this code to V4TRNT ******************************* */
  dist__initl_ofst = max(MIN_ACEL, (int)DIST__FROM_SPD[ min(256, (unsigned)( 256.0 *
(setpt / setpt_zone) ) ) ] );
  dist__final_ofst = ( pt__mvq->path & MANDITORY_STOP ) ? 0 :
    (unsigned)DIST__FROM_SPD[ ( 256 * (unsigned)min( pt__mvq->setpt, pt__mvq_nxt->setpt
```

```
) ) / (unsigned)pt__mvq->setpt );
  xvw_beg = xvw;
  x_totl = xvwi - xvw_beg;      /* can be initialized in middle of zone */
  n = mvq.excut +1;    /* next zone */
                          /* Sum distance to travel(up to 4 moves) */
  for( n_plus4 = min( n+4, mvq.load -1); n <= n_plus4; n++)
  { ptr_mq = &mvq.lst[ n & MVQ__END_INDX ];
    if( (ptr_mq->command == MV__STR_SEG) || (ptr_mq->command == MV__TURN_SEG) ||
(ptr_mq->command == MV__ON_WIRE) )
        x_totl += ptr_mq->len_seg;  /* TRANSL estimated "xvwi" totals */
    else break;
    if( ptr_mq->path & MANDITORY_STOP ) break;
  }
  scaled__x_total = x_totl * pt__mvq->len_dcl; /*alias ac/dc_dist.scal*/
  scaled__xvwi = xvwi * pt__mvq->len_dcl; /*alias ac/dc_dist.scal*/
  scaled__xvw = 0;
  navigation( );
  if( (n = pt__mvq_nxt->path & FREQUENCY_MASK) )    /* Wire in next segment? Select
guidance in advance(allow to settle) */
  { if(n == TPS_XMIT)
      m_c_p__tps( TPS_SETUP_CMND | (pt__mvq->path & TPS_PATH_MASK), 0 );  turn on tps
xmitter without tps control */
    put_bit_discrete_out( OFREQ1_SELECT_GUID_FREQ_1, (n == 1) ? FREQ_1 : FREQ_2 );
    pt__mvq_nxt->path |= TPS__PRE_TURN_ON;    /* flag that freqency has been selected
in prev move */
  }

  if( controls != (pt__mvq->path & FREQUENCY_MASK) )      /* Any change from previous
"controls"? */
  { controls = pt__mvq->path & FREQUENCY_MASK;    /* calc new "controls" */
    put_bit_discrete_out( OFREQ1_SELECT_GUID_FREQ_1, (controls == 1) ? FREQ_1 : FREQ_2
);
                 0 /*wire offset*/ );    /* notify M_C_P ( eagle / wire ) */
    if( !(pt__mvq->path & TPS__PRE_TURN_ON ) )    /* On this zone and Off prev zone */
    { if( controls == TPS_XMIT)
      { m_c_p__tps( TPS_SETUP_CMND | TPS_XMIT, 0 );  turn on tps xmitter without tps
control */
        delay( 2 SEC__TIMEOUT ); /* instrumentation must settle */
      }
      else
        delay( 60 MS__TIMEOUT ); /* instrumentation must settle */
    }
```

```
    m_c_p__tps(TPS_CTRL_CMND | (pt__mvq->path & TPS_PATH_MASK), (controls == TPS_XMIT)
? 10 /* range +/-127 temp debug offst*/ :
  }
}  /* m_c_p__move_setup */

/*  void m_c_p__control_c( (*double, double,*) unsigned char )        */
  double
    setpt_n,
    creep_offst,
    dist__increment,
    obstc_setpt, obstc_a_scl,  obstc_b_scl;
  unsigned char
    brake_delay_cnt;
  mcp_state_type
    brakes_rlsd, obst_enbld;

  void stop__apply_brakes( )
  { if(controls)
      m_c_p__tps( TPS_SETPT_CMND, 0 );    /* internally sets brakes, turns contactors
off */
    else
    { PUT_AO__WHLS( 0, 0 );
      delay( 40 MS__TIMEOUT);
      m_c_p__discretes(  0x1F, 0 );    /* contactors off and brakes set */
    }
    delay( 40 MS__TIMEOUT);
    brakes_rlsd = min( brakes_rlsd, BRAKES_SET );
    whl_setpt.rfr.insd = whl_setpt.rfr.outsd = 0;
    creep_offst = 0.0;
    indx_veh_prv = 0xFF;    /* guarantee a change next time used */
  } /* stop__apply_brakes */
  void m_c_p__state_c( mcp_state_type state )
  { switch (state)
    { case BRAKES_DSABLD :
        stop__apply_brakes( );
        brakes_rlsd = BRAKES_DSABLD;
        return;
      case BRAKES_ENABLD:
        brakes_rlsd = max(brakes_rlsd, BRAKES_ENABLD);
        return;
      case OBSTC_ENABLD:
        obstc_setpt = 255.0;
```

```
      case OBSTC_DSABLD:     /* fall thru */
        obst_enbld = state;
        return;
    }
  } /* m_c_p__state_c */
  void m_c_p__discretes(  unsigned mask, unsigned action );
  void m_c_p__obst_c( double a, double b )
  { obstc_a_scl = a;
    obstc_b_scl = b;
  }  /* m_c_p__obst_c */
        /* ****  EMULATOR in 186, Interface call when real MCP is ready ***** */
void m_c_p__control_c( /*double setpt_n, double ratio_c,*/ unsigned char indx_veh_bas
)
{ setpt_n = setpt;
  /*
  if( obst_enbld == OBSTC_ENABLD )
  { obstc_setpt = ( ( (OBST_AVER -1.0) * obstc_setpt) +( ( (double)get_analog_in(
ALOG_IN__OBS_DETECT_CHN )
         -obstc_a_scl ) * obstc_b_scl)) /OBST_AVER;
    setpt_n = min( setpt_n, obstc_setpt );
  }
 */
  if( setpt_n < 20.0 )
  { if( setpt_n > 0.01 )       /* greater than 0.0 */
    { dist__increment = (fabs(delta_xrw) + fabs(delta_xlw)) * 0.5/*average*/;
      if( dist__increment < (120.0/*MMperSEC*/ / 33.3/*CYCLESperSEC*/ ) ) creep_offst
+= 0.2;
      else  if(  dist__increment  >  (200.0/*MMperSEC*/  /  33.3/*CYCLESperSEC*/)  )
creep_offst -= 0.2;
      setpt_n = max( 1.0, min( (20.0 + 12.0), setpt_n +creep_offst ) );
    }
    else
      setpt_n = creep_offst = 0.0;
  }
  else if( creep_offst > 0.0 )
  { creep_offst -= 0.4;
    setpt_n += creep_offst;
  }
  whl_setpt.rfr.outsd = min( 255, max( 0, I_ROUND( setpt_n ) ) );
  if( whl_setpt.rfr.outsd > 0 )     /* move vehicle under control */
  {        /* (true MCP) whl_setpt.rfr.insd = (int)(setpt_n * (ratio_c -ratio_gain *
((encd..insd..whl / encd..outsd..whl) -ratio_c) ) ) */
```

```
   whl_setpt.rfr.insd = I_ROUND( setpt_n * ratio_c );     /* temporary for MCP
simulation */
   indx_veh   =   indx_veh_bas   |   ((whl_setpt.rfr.insd   >=   0)   <<   1)   |   1
/*whl_setpt.rfr.outsd >= 0 */;
   if( indx_veh != indx_veh_prv )
   { if(brakes_rlsd >= BRAKES_ENABLD )
     { m_c_p__discretes( 0x1F, 0x10/*BRAKES*/ | IO_CHAN[indx_veh].cntctr );
       if( brakes_rlsd == BRAKES_RELEASED );
       else if( brakes_rlsd <=  BRAKES_SET )  /* wait for break released message */
       { brake_delay_cnt = 0;
         brakes_rlsd = BRAKES_RELEASING;
         return;
       }
       else if(brakes_rlsd == BRAKES_RELEASING)
       { if( get_bit_discrete_in( BRAKES_CHANNEL_G ) )
         { if( ++brake_delay_cnt < BRAKE_TIMEOUT )
             return;
           else
             vsysbug( 0, 0xB035 );    /* Can not release brakes */
         }
         else
           brakes_rlsd = BRAKES_RELEASED;
       }
       indx_veh_prv = indx_veh;
     }
     else
       return;  /* ignor speed requests */
   }
   if( controls )
     m_c_p__tps(TPS_SETPT_CMND | (pt__mvq->path & TPS_PATH_MASK), whl_setpt.rfr.outsd
 );   /* wire guided */
   else
   { whl_setpt.rfr.insd = min( whl_setpt.rfr.outsd, abs(whl_setpt.rfr.insd) );
     PUT_AO__WHLS( (unsigned char)whl_setpt.ndx[IO_CHAN[indx_veh].ao_ps], (unsigned
 char)whl_setpt.ndx[IO_CHAN[indx_veh].ao_sb] );
   }
  }
  else
    stop__apply_brakes( );
 }  /* m_c_p__control_c */
```

```
/* V4movt  V4movt  V4movt  V4movt  V4movt  V4movt  V4movt  V4movt  V4movt  V4movt
V4movt  V4movt  V4movt  V4movt  V4movt  V4movt
*************************************************************************************
**********************************************
**                                            **
                                         EEEEEEEEEEEEEE       TTTTTTTTTTTTT
**                                                **
NNNNNNN     NNNNN                        EEEEEEEEEEEEE        TTTTTTTTTTT
**                                                **
NNNNNNNN    NNNNN                        EEEEE          A        TTTT       OOO
**                                                **
NNNNNNNNN   NNNNN                    EEEEEEEEEEEE     AAA      TTT      OOOOOOOO  NNNNN
**                                       **
NNNN  NNNNN                          EEEEEEEEEEE     AAAAA     TTT      OOOOOOOO  NNNNN
**                                      **
NNNN NNNNN                           EEEEE                     TTTT       OOO     NNNNN
**                                      **
 NNNNNNNNN                           EEEEEEEEE      AAAAAAA    TTTTT              NNNNN
**                                      **
  NNNNNNNN                           EEEEEEEE      AAAAAAAAA   TTTTTTT            NNNNN
**                                      **
   NNNNNNN
**                                            **
**        This software (firmware) developed by EATON-KENWAY is proprietary.  Source
code on listings or any other media       **
**        is not for sale or loan and may not be copied or transferred to any vendor,
buyer, or consultant.  Executable       **
**          code is available in ROM and is sold with the original product or as a
product upgrade.  Buyer shall not          **
**         copy or distribute ROM's with E-K firmware to any third party without the
prior written approval of EATON-KENWAY.   **
**           Title to and ownership of the software shall at all times remain with
EATON-KENWAY.   The information  in this     **
**           is subject to change without notice  and should not be construed as a
commitment by EATON-KENWAY.                  **
**                                            **
**          EATON-KENWAY  assumes  no  responsibility  for  the  use or reliability
of  its  software on  equipment which      **
**          is  not supplied EATON-KENWAY or has been modified without EATON-KENWAY
approval.                                      **
```

```
**
                                                   **
**          Copyright 1989
                KENWAY, INCORPORATED      **
************************************************************************************
**********************************************
  V4movt   V4movt   V4movt   V4movt   V4movt   V4movt   V4movt   V4movt   V4movt   V4movt
V4movt  V4movt  V4movt  V4movt  V4movt  V4movt
    DATE CREATED:  Feb 89
    AUTHOR:        Vehicle Group
    DESCRIPTION:
      xxx......              ....
    PROGRAM HISTORY:
    Date         Initials/No.        Description
    ---------    ------------        ---------------------------------------
* * * * * * * * * * * * * * * * * * * * * * * * * * * * * * * * * * * * * * * * * * *
* * * * * * * * * * * * * * * * * * * * * * */
#include  <stdlib.h>
#include  <stdio.h>
#include  <string.h>
#include  <math.h>
#include  "V4HCOMMN.K"
#include  "V4MESGS.K"
#include  "V4MOTION_DEF.K"
#include  "V4VARS.K"
#include  "V4INIT_DEF.K"      /* function prototypes for assembler(VINIT) routines */
void hcu_cntrl_master( );
void update_marker_found( );
void init_nav_variables( );    /* located in move2way code */
void move__waypoint( );
double fix_angle(double);
void azimuth_initialization( );

#define  CMND__NOT_READY  -1
#define  DELAY__SPKR_FRQ  2
#define  WARNING__DURATION    0x7E
#define  SPKR__E_STP_FRQ  1
#define  SPD__DIST_SCALE  64    /* upper limit of speed_array_const array */
#define  ALOG_IN__OBS_DETECT_CHN  9
#define  SPD__RAW_CREEP  3
#define   INTLK__E_STP   0x80                    /* 2x10000000      pseudo SET for
motion__interlocks */
```

```
#define   INTLK__LOAD_ALIGNMENT   0x40              /*  2x01000000      pseudo  SET  for
motion__interlocks */
#define   INTLK__SCANNER   0x20                     /*  2x00100000      pseudo  SET  for
motion__interlocks */
#define   INTLK__FRK_TIP   0x10                     /*  2x00010000      pseudo  SET  for
motion__interlocks */
#define   INTLK__LOAD_PRSNT   0x08                  /*  2x00001000      pseudo  SET  for
motion__interlocks */
typedef  enum    {   MOTN_STAT_ACCEL,   MOTN_STAT_PREPAR_STOP,   MOTN_PARKED   }
motion__status_type;
typedef enum  { FOLLOW_WIRE, DEAD_RECKONING, ACQUIRING_WIRE } action_state_type;

action_state_type  action_state;
act_status_type  current_act_status;
enum  { DLY_NORM, DLY_BFOR_RCOVRY, DLY_AFT_RCOVRY, DLY_LONG } rcovry_swtch__e_stop;
 /* delays before action */
motion__status_type  motion__status;
unsigned char  seq_no__actv;
unsigned char  seq_no__prev;
unsigned  zone_no__actv;
unsigned  zone_no__prev;
unsigned  prev_cmnd_path;
double  positn__y;
double  positn__y_integral;
int  positn__prev;     /* distance, antn */
int  control_change;
int  creep__cycle_multiplier;
int  creep_wheel;         /* speed modification at creep speeds when vehicle appears
stalled */
int  dist__total_raw;
int  dist__moved_raw;
int  dist__prev_move_raw;
int  dist__current_raw;
int  dist__raw_accel_decel;
int  dist__raw_creep_min_x;
int  dist__raw_creep_max_x;
int  dist__raw_e_stop;
int  dist__e_stp_pre_adj;    /* subtract from current distance */
int  dist__e_stp_adj;    /* subtract from next distance */
int  obstacle_measurement;
int  setpt__moving;        /* normal curve output setpoint in move action */
int  setpt__end_prev_act;    /* output setpoint at beginning of each action */
```

```
int  setpt__final;
int  setpt__change;
int  running_increment;
int  turn__compl__wait_time_chng;
int  turn__compl__dist_raw;
int  turn__nxt_zn_leng_chng;
int  turn__raw_decel_dist_adj;        /* the adjust distance in decel action */
in_out_type ant_level;
in_out_type dist__raw;

unsigned  period__mailbx_delay;
unsigned  speed_base;
unsigned  distance_base;
unsigned char  brakes_set;
unsigned char  motn_dirctn__sign;    /* negative = TRUE */
unsigned char  turn__radius;        /* TRUE: radius turn; FALSE: not radius turn i.e.
sensed event turn */
unsigned char  turn__after;          /* TRUE: previous command turn; set FALSE after
move to event */
unsigned char  rotate__after;   /* TRUE: previous command rotate; set FALSE after move
to event */
unsigned  speaker__prev_duration;
unsigned  speaker__prev_frq;
unsigned  light__prev_duration;
light_cmd_type  light__prev_cmnd;
char  prev_command_memory;
char  vehicle_command;
unsigned  dist__calib_unit;
int  dist__raw_calib_starbd;
int  dist__raw_calib_portsd;
int  encoder_compensation_scale;
enum  calib_stat_type { CALIBRATION__NONE, CALIBRATION__ACTV, CALIBRATION__REDEFINE }
calibration_status;
unsigned char  physical_event_adjustment;
unsigned char  interlocks__motion;     /* "psudo SET" noting abnormal conditions
requiring vehicle to slow to stop */
int  interlock__speed_ratio;
unsigned char d_out__byte_0_mem;
/* variables used by kalman to compute the gyro drift */
extern double tip;
extern double gamma_ft;
extern double tfvi;
```

```
/*   *******************************************              PROTOTYPES
******************************************* */
void wait__til_mail( unsigned  wait_time );
void lights_sound__chng( unsigned light_duration, unsigned speaker_duration, unsigned
speaker_freq, light_cmd_type light_cmd );
guidance_status_type  get_guidance_status( );

void mailbx__cleanup( )    /* clean up mail before setting up next encoder interrupt
*/
{  for(  wait__til_mail(  0  MS__TIMEOUT  );  action_mail  !=  TIMEOUT__MAILBX  ;
wait__til_mail( 0 MS__TIMEOUT ) );
}  /* mailbx__cleanup( ) */

void mailbx__set_delay( unsigned delay )
{ period__mailbx_delay = max( 1, delay );
  dist__raw_creep_min_x = dist__raw_creep_min * (int)period__mailbx_delay /2;   /* set
windows for creeping */
  dist__raw_creep_max_x  =  max(  dist__raw_creep_min_x  +1,  dist__raw_creep_max  *
(int)period__mailbx_delay /2 );
  running_increment = max( 1, (int)delay -1 );
}

void stop_drive_wheels( )
{ int  delay_index;
  m_c_p__state_c( BRAKES_DSABLD );
  for( delay_index = 1 ; delay_index <= 40; delay_index++ )   /* wait for mcp to set
brakes */
  { if( get_bit_discrete_in( BRAKES_CHANNEL_G ) ) return;
    else delay( 50 MS__TIMEOUT );
  }
  vsysbug( 0, 0xB027 );    /* Brake failure or keyed bypass */
}  /* stop_drive_wheels */
void e_stop_enunciator( unsigned action )
{ if( action )
  { put_bit_discrete_out( E_STOP_LIT_ADDR_G, IS__ON );            /* turn on E-stop
light */
    lights_sound__chng(   WARNING__DURATION,   WARNING__DURATION,   SPKR__E_STP_FRQ,
WARNING_V );
  }
  else
  { put_bit_discrete_out( E_STOP_LIT_ADDR_G, IS__OFF );           /* Turn off E-stop
light */
```

```
    lights_sound__chng( 0, 0, 0, IDLE_V );        /* turn OFF horns, turn on lights */
  }
}   /* e_stop_enunciator */
void software_e_stop( )
{ /* m_c_p__state( E_STOP );
     delay( 1500 MS__TIMEOUT );     wait for M_C_P  Estop */
  break_echain( );
  stop_drive_wheels( );
  e_stop_enunciator( TRUE );
} /* software_e_stop */

#define BATT__LEVL_CHARGD  52
#define BATT__STAT__MAX  255
#define BATT__STAT__MIN  0
#define BATT__STAT__DEFAULT  204
void compute_battery_status( int  averaging_index )
{ int  current_battery_status;
  /* status = max_possible<255> -( charged_battery_level  <back scaled to raw>  - raw
analog in value ) /condition_factor */
  current_battery_status = BATT__STAT__MAX
    -( BATT__LEVL_CHARGD * battery_voltage_scale - get_analog_in( VIN_VOLTS_G ) * 100
) / battery_condition_scale;
            /* FORCE level to default( 80% ) when average=0 */
  if(   averaging_index    ==    0    )   veh_status.battery_level    =    (char)    max(
BATT__STAT__DEFAULT, current_battery_status );
  else
  {   current_battery_status    =   max(   BATT__STAT__MIN,   min(   BATT__STAT__MAX,
current_battery_status ) );    /* range check  */
          /* running average = ( old running average * ( periods -1 ) + current_status
) / periods */
    veh_status.battery_level    =    (char)(    (    (int)veh_status.battery_level    *    (
averaging_index-1 )
      +current_battery_status ) / averaging_index );
  }
}  /* compute_battery_status */

void path__cntrl( )   /* special control actions at beginning of every move */
{ unsigned  dummy_error;
  /************* Only changes from prev path segment are executed.  Compare prev and
curr at beginning of move *********/
  if(    /*temp*/prev_cmnd_path    =    (pt__mvq->path    ^    prev_cmnd_path)    &
PATH_SEGM_CONSTANT_MASK ) /* take action on bit change */
```

```
  { if( motion_control_switches & OBSTACLE_DETCT_CNFG_BIT & prev_cmnd_path )      /*
obstacle detect on/off control by AGVC */
      m_c_p__state_c( ( pt__mvq->path & OBSTACLE_DETCT_CNFG_BIT ) ? OBSTC_ENABLD :
OBSTC_DSABLD );
    /* move some of MOVE2WAY logic here when FREQ & DIR added to mask */
  }
  prev_cmnd_path = pt__mvq->path;
  /************* Execute(at beginning of segm) if bit is set. *********/
  if( pt__mvq->path & PATH_SEGM_UNIQUE_MASK )       /* take action if bit is true */
  {   /* load detection control, declare error when vehicle is commanded to deposit
load and a load is sensed
          in P&D, or when vehicle is commanded to pickup and a load is not sensed in
P&D */
    if( motion_control_switches & LOAD_SENSING_CNFG_BITS & LOAD__PRSNT_CHCK )      /*
switched on from HCU */
    { if( get_analog_in( LOAD__SENCE_CHN ) > LOAD__VACNT_THRSHLD ) return;    /* vacant
on present check */
      dummy_error = 0x3100;     /* P&D loaded, Veh loaded */
      m_c_p__state_c( SOFT_ESTOP );  /* software e_stop, formerly break_echain( ); */
      /* do something to define a new move command */
    }
    else if( motion_control_switches & LOAD_SENSING_CNFG_BITS & LOAD__VACNT_CHCK )
/* switched on from HCU */
    { if( get_analog_in( LOAD__SENCE_CHN ) < LOAD__VACNT_THRSHLD ) return;       /*
present on vacant check */
      dummy_error = 0x3101;     /* P&D empty, Veh empty */
      m_c_p__state_c( SOFT_ESTOP );  /* software e_stop, formerly break_echain( ); */
      /* do something to define a new move command */
    }
  }
}  /* path__cntrl */

void navigation( );
void wait__til_mail( unsigned wait_time )
{ action_mail = wait__mail ( ( rcovry_swtch__e_stop == DLY_NORM ) ? wait_time : 3
SEC__TIMEOUT );

  if( action_mail == U_M__INTERRUPT )
  { update_marker_found( );
    action_mail = TIMEOUT__MAILBX;
  }
  else if( action_mail != TIMEOUT__MAILBX )
```

```
{ switch ( action_mail )
  {
   #if 0
    case TIMEOUT__MAILBX :
      switch( rcovry_swtch__e_stop )
      { case DLY_NORM :
          goto exit; /* fast return under normal conditions */

        case DLY_BFOR_RCOVRY :
          if( interlocks__motion == INTLK__E_STP )     /* no other bits set, try
automatic bumper recovery */
            set_bit_discrete_out( BUMPER_RESET_CHANNEL_G, PULSE_WO_INTERRUPT, 100 /*
pulse length */ );
          break;

        case DLY_AFT_RCOVRY :
          if( interlocks__motion == 0 )        /* no bits set */
          { interlock__speed_ratio = 0;    /* unlock ratio speed control */
            rcovry_swtch__e_stop = DLY_NORM;
          }
          break;

        default :
          rcovry_swtch__e_stop = DLY_NORM;                                         /*
manual_initialization */
      }
      break;
   #endif

     case EMERGENCY_STOP_SET_MESG_G :
       stop_drive_wheels( );
       e_stop_enunciator( IS__ON );
       break;
     case RECOVER_FROM_ESTOP_G  :
       if( interlocks__motion == INTLK__E_STP )    /* no other bits set */
       { e_stop_enunciator( IS__OFF );

         veh_status.status_set &= ~( E_STOPPED_V | HIGH_SPEED_ESTOP_V );
         do_long_status_flag = TRUE;         /* notify AGVC vehicle ready */
         interlocks__motion &= ~INTLK__E_STP;
         rcovry_swtch__e_stop = DLY_AFT_RCOVRY;      /* setup delay after E-stop
recovery */
```

```
        dist__raw_e_stop = get_encoder( ENCD__SUM1_WHL_ADR )     /* adjust encoder
after e-stop */
          +( ( motn_dirctn__sign ) ? dist__e_stp_pre_adj : -dist__e_stp_pre_adj );
       }
       else    /* interlocks not clear, insure E-chain opens */
       { interlocks__motion |= INTLK__E_STP;
         break_echain( );
         action_mail = TIMEOUT__MAILBX;     /* E-stop again, send real e-stop when
message recieved */
       }
       break;
     case BREAKER_TRIPPED_MESG_G :    /* CB2 breaker tripped or power down */
       stop_drive_wheels( );
       delay( 5 SEC__TIMEOUT );    /* delay differentiates between breaker trip &
power off */
       vsysbug( 0, 0xB043 );    /* breaker tripped,  not executed on power down(not
an error) */
     default :  ;  /* ignore it */
    } /* switch */
  }
  navigation( );
} /* wait__til_mail */

     /* change lights and horn only if current parameters != previous parameters */
void lights_sound__chng( unsigned light_duration, unsigned speaker_duration, unsigned
speaker_freq, light_cmd_type  light_cmd )
{ if( ( speaker_duration != speaker__prev_duration ) || ( speaker_freq !=
speaker__prev_frq )
    || ( light_duration != light__prev_duration ) || ( light_cmd != light__prev_cmnd
) )
  {        /* turn on both lights, make sure both lights will go on/off at same time
*/
    if( light_cmd == IDLE_V )        /* turn lights ON and horns OFF */
    { put_bit_discrete_out( PORT_LIGHT_ADDR_G, IS__ON );
      put_bit_discrete_out( STBD_LIGHT_ADDR_G, IS__ON );
      put_bit_discrete_out( SPEAKER_DRIVE_ADDR_G, 0 );
      put_bit_discrete_out( SPEAKER_DRIVE_FREQ_ADDR_G, 0 );
    }
    else
    { put_bit_discrete_out( PORT_LIGHT_ADDR_G, IS__OFF );
      put_bit_discrete_out( STBD_LIGHT_ADDR_G, IS__OFF );
      set_bit_discrete_out( SPEAKER_DRIVE_ADDR_G, OSCILLATE_CMD_G, speaker_duration );
```

```
      set_bit_discrete_out( SPEAKER_DRIVE_FREQ_ADDR_G, OSCILLATE_CMD_G, speaker_freq
);
      if( light_cmd == WARNING_V )
      { set_bit_discrete_out( PORT_LIGHT_ADDR_G, OSCILLATE_CMD_G, speaker_duration );
        set_bit_discrete_out( STBD_LIGHT_ADDR_G, OSCILLATE_CMD_G, speaker_duration );
      }
      else if(  light_cmd == MOVEMENT_V )
      { set_bit_discrete_out( PORT_LIGHT_ADDR_G, OSCILLATE_CMD_G, light_duration );
        set_bit_discrete_out( STBD_LIGHT_ADDR_G, OSCILLATE_CMD_G, light_duration );
      }
      else if( light_cmd == PORTSIDE_V ) set_bit_discrete_out( PORT_LIGHT_ADDR_G,
OSCILLATE_CMD_G, light_duration );
      else if( light_cmd == STARBOARD_V ) set_bit_discrete_out( STBD_LIGHT_ADDR_G,
OSCILLATE_CMD_G, light_duration );
    }
    light__prev_duration = light_duration;
    speaker__prev_duration = speaker_duration;
    speaker__prev_frq = speaker_freq;
    light__prev_cmnd = light_cmd;
  }
}  /* lights_sound__chng */

void main_act( )         /* main routine of action module */
  /*  2. command_processor_master     automatic              * Receive commands from
command processor
                  MOTION ACTION MAIL FORMAT
    ---------------------------------------------------------------------------------
    | 15   14   13   12   11   10    9    8    7    6    5    4    3    2    1    0
|
    ---------------------------------------------------------------------------------
    |  interr   | unused  |   device #      |                status
|
    | msg       |         |   task id       |                mode
|
    *-*-*-*-*-*-*-*-*-*-*-*-*-*-*-*-*-*-*-*-*-*-*-*-*-*-*-*-*-*-*-*-*-*-*-*-*-*-*-*-*
     -BITS-
    15..14: flag field: 10 : interrupt; 11 : inter-task message
    13..12: unused field
    11.. 8: device/task id
      interrupt: device number
      inter_task message:    0001 : hand control, 0010 : AGVC control, 0011 : motion;
    7 .. 0: status/mode
```

```
interrupt: status : line or channel number, inter-task message: mode,
hand control: notifies modes changes, computer control: AGVC command queue index

-*-*-*-*-*-*-*-*-*-*-*-*-*-*-*-*-*-*-*-*-*-*-*-*-*-*-*-*-*-*-*-*-*-*-*-*-*-*-*-*-*/
{ stop_drive_wheels( );
  rcovry_swtch__e_stop = DLY_NORM;          /* manual_initialization */
  motion_translation_enabled = FALSE;
  interlocks__motion = 0;
  init_nav_variables( );    /* located in move2way code */
  set_mask(   U_M_S__ID,   0/*only   line*/,   ACT_BOTH_EDGE_MASK_G,
ACT_SET_BOTH_EDGE_INTERRUPT );
  for( action_mail=0;   ; )
  { switch( action_mail )
    { case HCU_CNTRL_MAN :
        hcu_cntrl_master( );    /* jump to manual control routines in HCU code */
        continue;
      case COMMAND_PROCESSOR_MASTER :
        agvc_commanded_speed = 100;
        obstacle_detection_active = FALSE;
        creep_to_first_event = TRUE;
        goto auto_start;
      case AUTOMATIC_RESTART :
        creep_to_first_event = FALSE;
        goto auto_start;
    }
    wait__til_mail( TIMEOUT__FOREVER );
  }
 auto_start :      /*init__automatic*/
  if( get_bit_discrete_in( LINE_39_G /* breaker */ ) == 0 /* opened */ ) vsysbug( 0,
0xB043 /* breaker tripped */ );
  else compute_battery_status ( /* force level to 80% */ 0 /* period */ );
  setpt__moving = setpt__end_prev_act = 0;        /* vehicle is stopped */
  speaker__prev_duration = 0;
  speaker__prev_frq = 0;
  light__prev_duration = 0;
  light__prev_cmnd = IDLE_V;
  prev_cmnd_path = 0;
  seq_no__actv = veh_status.sequence_no;
  zone_no__prev = veh_status.previous_zone;
  zone_no__actv = veh_status.current_zone;
  set_mask(   DISCRETE_IN,   BRAKES_CHANNEL_G,   ACT_BOTH_EDGE_MASK_G,
ACT_SET_BOTH_EDGE_INTERRUPT );
```

```
  set_mask(    DISCRETE_IN,    ESTOP_CHANNEL_G,    ACT_BOTH_EDGE_MASK_G,
ACT_SET_BOTH_EDGE_INTERRUPT );    /* e stop */
  set_mask( DISCRETE_IN, LINE_32_G, ACT_HIGH2LOW_MASK_G, ACT_SET_HIGH2LOW_INTERRUPT
);/* lost of guidance */
  set_mask( DISCRETE_IN, LINE_39_G, ACT_HIGH2LOW_MASK_G, ACT_SET_HIGH2LOW_INTERRUPT );
  /* drive motor breaker opened */
        /* enable sum encoder interrupt */
     /* NOTE: encoder only has one type of interrupt - zero crossing brakes released
or set interrupt */
  set_mask(    ENCODER_G,    ENCD__SUM1_WHL_ADR,    ACT_BOTH_EDGE_MASK_G,
ACT_SET_BOTH_EDGE_INTERRUPT );
  prev_command_memory = vehicle_command = INITIALIZE_VEHICLE_V;
  d_out__byte_0_mem = STOP_WHEELS;
  motion_translation_enabled = TRUE;
  distw.coord = 0.0;      /* wire guided initialization */

  init_nav_variables( );    /* located in move2way code */
  m_c_p__init(    dim__drv_wheelbase/*between    drive    wheels*/,
dimension__wheelbase/*between encoders*/ );
  for( ;  /*no exit, only restart*/ ; wait__til_mail( 500 MS__TIMEOUT ) )
  { azimuth_initialization( );
    compute_battery_status (/*average*/ 32 /*periods*/ );
    if( mvq.load > mvq.excut )      /* commands in MVQ(motion que) */
    { for( ; interlocks__motion; )  /* checking for abnormal_interlocks */
      { put_bit_discrete_out( E_STOP_LIT_ADDR_G, IS__ON );          /* turn on E-stop
light */
        wait__til_mail( 5 SEC__TIMEOUT );
      }
      lights_sound__chng(  WARNING__DURATION,  WARNING__DURATION,  DELAY__SPKR_FRQ,
WARNING_V );
      delay( motion_warning_delay );        /* let lights and horns go for awhile */
             /* temporary, change this into move2way to handles turns, etc */
      lights_sound__chng(    light_duration_movement,    speaker_duration_movement,
speaker_freq_turn, WARNING_V );
      move__waypoint( );
      stop_drive_wheels( );   /* and disable brakes */
      send__mail( vcmdmt, MAIL__MOTION );
        /* This is necessary since the AGVC can end a command sequence with non move
commands(speed, options, etc) */
      if( mvq.excut >= mvq.load )   /* send last translated sequence no. to AGVC */
      { cq_indx.nxt_exec = max( cq_indx.nxt_exec, cq_indx.curr );
        if( command_queue[ CQ_WRAP(cq_indx.nxt_exec -1) ].cmdx.bs_flds.sequence_no )
```

```
        veh_status.sequence_no  =  command_queue[  CQ_WRAP(cq_indx.nxt_exec  -1)
].cmdx.bs_flds.sequence_no ;
      }
      lights_sound__chng( 0, 0, 0, IDLE_V );        /* turn OFF horns, turn on lights
*/
    }
  }
}  /* main_act */
```

```
/*   V4TMHD   TERM_HANDLER   V4TMHD  TERM_HANDLER   V4TMHD   TERM_HANDLER   V4TMHD
TERM_HANDLER   V4TMHD  TERM_HANDLER   V4TMHD
**************************************************************************************
***********************************************
**                                               **
**                                         EEEEEEEEEEEEEEE      TTTTTTTTTTTTT
NNNNNNN       NNNNN                                **
**                                         EEEEEEEEEEEEEE       TTTTTTTTTTT
NNNNNNNN      NNNNN                                **
**                                        EEEEE             A        TTTT        OOO
NNNNNNNNN     NNNNN                                **
**                                   EEEEEEEEEEEE     AAA      TTT      OOOOOOOO   NNNNN
NNNN   NNNNN                             **
**                                   EEEEEEEEEEE     AAAAA     TTT      OOOOOOOO   NNNNN
NNNN NNNNN                             **
**                                   EEEEE                     TTTT       OOO      NNNNN
 NNNNNNNNN                             **
**                                   EEEEEEEEE      AAAAAAA    TTTTT               NNNNN
  NNNNNNNN                             **
**                                   EEEEEEEE      AAAAAAAAA   TTTTTTT             NNNNN
   NNNNNNN                             **
**                                                 **
**        This software (firmware) developed by EATON-KENWAY is proprietary.  Source
code on listings or any other media           **
**        is not for sale or loan and may not be copied or transferred to any vendor,
buyer, or consultant.  Executable           **
**          code is available in ROM and is sold with the original product or as a
product upgrade.  Buyer shall not                **
**          copy or distribute ROM's with E-K firmware to any third party without the
prior written approval of EATON-KENWAY.   **
**           Title to and ownership of the software shall at all times remain with
EATON-KENWAY.   The information  in this      **
**           is subject to change without notice  and should not be construed as a
commitment by EATON-KENWAY.                        **
**                                                 **
**          EATON-KENWAY  assumes  no  responsibility  for  the  use or reliability
of  its  software on  equipment which        **
**           is  not supplied EATON-KENWAY or has been modified without EATON-KENWAY
approval.                                          **
```

```
**
                                                        **
**          Copyright 1989
                     KENWAY, INCORPORATED       **
*****************************************************************************************
************************************************
  V4TMHD   TERM_HANDLER    V4TMHD  TERM_HANDLER    V4TMHD   TERM_HANDLER    V4TMHD
TERM_HANDLER   V4TMHD  TERM_HANDLER   V4TMHD
    DATE CREATED:   Feb 89
    AUTHOR:         Vehicle Group
    DESCRIPTION:
      xxx......             ....
    PROGRAM HISTORY:
    Date         Initials/No.        Description
    ---------    ------------        ----------------------------------------
* * * * * * * * * * * * * * * * * * * * * * * * * * * * * * * * * * * * * * * * * * *
* * * * * * * * * * * * * * * * * * * * * * */
#include <stdlib.h>
#include <stdio.h>
#include <string.h>
#include <ctype.h>
#include "V4MOTION.K"
#include "V4INIT_DEF.K"
#define  SPACE  '\040'
#define  BACKSPACE  '\010'
#define  CARR_RTRN  '\015'
#define  LINEFEED  '\012'
#define  CANCEL  '\030'
#define  RS_CHAR  '\036'
#define  DEL_CHAR  '\177'
#define  X_ON_CHAR  '\021'
#define  X_OFF_CHAR  '\023'
#define  PROMPT_1st_CHAR  '\076'    /* > */
#define  PROMPT_2nd_CHAR  '\007'        /* bell */
#define  IDLE  0x00         /* 2x00 */
#define  TIMEOUT__FOREVER  0xFFFF
#define  BYTE_MASK  0xFF
#define  CHAR_MASK__7_BITS  0x7F
#define  X_OFF_MASK  0x02         /* 2x00000010 */
#define  WRITE_ON  0x01              /* 2x00000001 */
#define  WR__BUFF_MOD  0xFF          /* 255 */
#define  WR__BUFF_LEN  WR__BUFF_MOD +1
```

```
#define  RD__TRANSPARENT  0x01         /* 2x01 */
#define  RD__CHAR_WO_ECHO  0x02        /* 2x10    without echo */
#define  RD__CHAR_W_ECHO  0x03         /* 2x11    with echo */
#define  RD__MODE_MASK  0x03            /* 2x11 */
#define  RD__SUPPRESS_ECHO  0x8000       /* 2x1000000000000000 */
#define  RD__FUNCTION_MASK  0x0C         /* 2x1100 */
#define  RD__BUFF_LENG  63            /* must be a 2**n  -1 length */
#define  RD__SUSPEND_RESUME_LEVEL  0x02    /* 2x00000010 */
#define  RD__START_DETACHED   0x08       /* 2x1000 */
#define  RD__ATTACHED  0x04              /* 2x0100 */
#define  RD__TERMINATED  2            /* compatable with old RMX message */
#define  RD__ECHO_MASK  (RD__MODE_MASK  |  RD__SUPPRESS_ECHO)
#define  RD__LOCK_MASK  0x4000           /* 2x0100000000000000 */
#define  RD__TRANSL_TO_UPPER  0x10       /* 2x00010000 */
#define  RD__ENBL_DEL_SEQ_ECHO  0x80       /* 2x10000000 */
#define  RD__ECHO_LF__W_CR  0x20          /* 2x00100000 */
#define  RD__OUTPUT_PROMPT  0x0100       /* 2x0000000100000000 */
#define  RD__DETACHED__W_ECHO  (RD__CHAR_W_ECHO | RD__START_DETACHED)    /* start
command */
#define  WR__SUSPEND_RESUME_LEVEL  0x01    /* 2x00000001 */
#define  WR__BUF_EFFECTIVE_LEN  256 -1/*padding*/
#define  WR__CLEAR  0x0000
#define  WR__CMND_FLD_MSK  0x0003        /* 2x11 */
#define  WR__DETACHED_CMND  0x0001        /* 1 */
#define  WR__ATTACHED_MASK   0x0002        /* 2x10 */
#define  WR__ATTACHED_CMND   0x0002        /* 2 */
#define  WR__LOCK_MASK  0x0400       /* 2x0000010000000000      lockout other tasks
during setup */
#define  WR__BUF_SPACE_MSK  0x0200     /* 2x0000001000000000 */
#define  WR__OUTPUT_PROMPT  0x0100     /* 2x0000000100000000 */
typedef  enum { RD__NO_ERROR, RD__NORM_CR_TERM, RD__BUFF_FULL, RD__DETACHED_COMPLT,
RD__BUSY, RD__TIMEOUT,
        RD__NO_DATA_AVAIL, RD__ILLEGAL_CMND } rd__stat_typ;
unsigned  ch_b__wr__stat;      /* bit 0  = write(off=0, on=1), bit 1 = Xon=0, Xoff=1
*/
unsigned  ch_b__wr__callng_tsk_id;
char  ch_b__wr_buff[ WR__BUFF_LEN ];
unsigned  ch_b__wr__end_indx;
unsigned  ch_b__wr__next_indx;
unsigned  ch_b__wr_spec;       /* Byte = 0     IDLE
                Bit 0(LSB)   Detached write in progress (also command)
                Bit 1        attached write in progress (also command)
```

```
                 Bit 8        output prompt after attached write(only)
                 Bit 14        WR setup in progress (set by handler)
                 Bit 15        WR attached forced by pending chars from detached
                write request (bit set by handler not a command)     */
unsigned  ch_b__rd__callng_tsk_id;
rd__stat_typ  ch_b__rd_stat;
char  ch_b__rd_char;
char  *ch_b__rd_buff_data_addr;
unsigned  ch_b__rd_buf__leng;
unsigned  ch_b__rd__max_leng;
unsigned  ch_b__rd_spec;      /* Bit 0(LSB)&1   0 = idle,
                                                1 = transparent,
                                                2 = character no echo,
                                                3 = character with echo
                                 Bits 2,3      01  = Read(suspend until complete or
timeout)
                                              10 = Start detached read(format in bits
0,1 are not "idle") and return
                                 Bit 4         convert to upper case
                                 Bit 5         echo CR & LF on CR
                                 Bit 6         ignor LF on input
                                 Bit 7         enable <bs><sp><bs> sequence on delete
                                 Bit 8         output prompt after read
                                 Bit 14           lock, setup in progress (forced by
handler)     */
rd__stat_typ  rd__error;
char ch_b__rd_buff[64];

    /* make compatable with assemble upper case declaration */
#define  aagetn   AAGETN
#define  start_output__ch_b  START_OUTPUT__CH_B
#define  disable_interrupts  DISABLE_INTERRUPTS
#define  enable_interrupts  ENABLE_INTERRUPTS
#define  send__mail  SEND__MAIL
#define  suspend SUSPEND
#define  resume RESUME
extern unsigned aagetn( );       /* AMX assembler routine: get number of current
executing task */
extern void ch_b__start_output( );
extern void disable_interrupts( );
extern void enable_interrupts( );
extern void send__mail( unsigned mailbox, unsigned message );    /* mailbox interface
```

```
(assembler) */
extern void suspend(char level, unsigned task_id, unsigned timeout );
extern unsigned resume( char level, unsigned task_id );
void initialize_term_handler( )
{ for( ch_b_wr__end_indx = 0; ch_b__wr__end_indx <= WR__BUFF_MOD; ) ch_b__wr_buff[
ch_b__wr__end_indx++ ] = '\0';
  ch_b__wr__stat = ch_b__wr_spec = WR__CLEAR;
  ch_b__rd__max_leng = 0;
  ch_b__rd_spec = 0;
  ch_b__rd_stat = RD__NO_ERROR;
}  /* initialize_term_handler */
void output_master( )
{ ch_b__wr__stat &=  ~WRITE_ON;
  if(   ch_b__wr_spec   &   WR__ATTACHED_CMND   )   resume(   WR__SUSPEND_RESUME_LEVEL,
ch_b__wr__callng_tsk_id );
  ch_b__wr_spec = WR__CLEAR;
}  /* output_master */

unsigned write_b( char specification, char *string__begn_addr )
/*      specification      Bit 0(LSB)    Detached write (start then return)
             Bit 1         attached write (suspend until complete or timeout)
             Bit 8         output prompt after attached write(only)
     string__begn_addr          bytes 1-n character string    */
{ char  *string__end_addr;
  unsigned retry;
  int str_len = strlen( string__begn_addr );
  for( retry = 25; retry; --retry)
  { disable_interrupts( );
    if(  ch_b__wr_spec )        /* busy for various reasons? */
    { enable_interrupts( );
      delay( 5 /*50ms*/ );   /* get in line and try later */
    }
    else
    { ch_b__wr_spec |= WR__LOCK_MASK;        /* lock out other tasks */
      enable_interrupts( );
      ch_b__wr__end_indx = ch_b__wr__next_indx = 0;
      for(   string__end_addr   =   string__begn_addr   +str_len;   string__end_addr   >
string__begn_addr; string__begn_addr++ )
        ch_b__wr_buff[ ch_b__wr__end_indx++ ] =  *string__begn_addr;
      if( specification  &  WR__ATTACHED_CMND )     /* attached write specified? */
      { if( ( specification  &  RD__OUTPUT_PROMPT )  ==  WR__OUTPUT_PROMPT )
        { ch_b__wr_buff[ ch_b__wr__end_indx++ ] = PROMPT_1st_CHAR;
```

```
          ch_b__wr_buff[ ch_b__wr__end_indx++ ] = SPACE;
          ch_b__wr_buff[ ch_b__wr__end_indx++ ] = PROMPT_2nd_CHAR;
        }

        ch_b__wr__callng_tsk_id = aagetn( ); /* get task id from AMX */
        ch_b__wr_spec = WR__ATTACHED_CMND;       /* keep all tasks out */
        ch_b__start_output( );
        while( ch_b__wr_spec & WR__ATTACHED_CMND )
          suspend(WR__SUSPEND_RESUME_LEVEL, ch_b__wr__callng_tsk_id, 25 /*250ms*/);
      }
      else
      { ch_b__wr_spec = WR__DETACHED_CMND;    /* write in progress, but let tasks ack
in */
        ch_b__start_output( );
      }
      return ( ch_b__wr_spec | 0x8000/*retry error*/ );
    }
  }
  return ch_b__wr_spec;
}  /* write_b */

/*    void ch_b__read_serv( )     function and subordinate functions */
  void echo_character( char character )
  { if( ( ch_b__rd_spec   &   RD__ECHO_MASK )   ==   RD__CHAR_W_ECHO )      /* echo
character? */
    { ch_b__wr_buff[ ch_b__wr__end_indx++ ] = character; /*no check, full outpt buff
*/
      if( ( ch_b__wr_spec  &  WR__CMND_FLD_MSK )  ==  WR__CLEAR )    /* output idle */
      { ch_b__wr_spec |=  WR__DETACHED_CMND;
        ch_b__start_output( );
      }
    }
  }  /* echo_character */
  void put_char_read_buffer( )
  { unsigned  unused;    /* dummy for send__mail call */
    *(ch_b__rd_buff_data_addr + ch_b__rd_buf__leng) = ch_b__rd_char;          /* save
char read */
    *(ch_b__rd_buff_data_addr + (++ch_b__rd_buf__leng) ) = 0;      /* and string end
null */
    if( ch_b__rd_buf__leng >= ch_b__rd__max_leng )
    { if( ( ch_b__rd_spec  &  RD__FUNCTION_MASK )  ==  RD__ATTACHED )
        resume( RD__SUSPEND_RESUME_LEVEL, ch_b__rd__callng_tsk_id );    /* attached -
```

```
activate calling task  */
      else
        send__mail( ch_b__rd__callng_tsk_id, RD__TERMINATED );   /* detached - notify
calling task */
      ch_b__rd_stat = RD__BUFF_FULL;        /* overflow pending */
      ch_b__rd_spec = IDLE;    /* turn off read */
    }
  } /* put_char_read_buffer */
void ch_b__read_serv( )
{ unsigned  unused;    /* dummy for send__mail call */
  switch ( ch_b__rd_spec & RD__MODE_MASK )
  { case  RD__CHAR_WO_ECHO :
    case  RD__CHAR_W_ECHO :    /* character mode with or without echo */
      ch_b__rd_char = toascii( ch_b__rd_char );
      if( isprint( ch_b__rd_char ) )    /* displayable character */
      {  if(  ch_b__rd_spec    &    RD__TRANSL_TO_UPPER  )  ch_b__rd_char  =  toupper(
ch_b__rd_char );
        echo_character( ch_b__rd_char );
        put_char_read_buffer( );
        break;
      }
      switch ( ch_b__rd_char )
      { case  CARR_RTRN :
        case  LINEFEED :         /* <cr> put into buffer */
          *(ch_b__rd_buff_data_addr + ch_b__rd_buf__leng) = CARR_RTRN; /* save <cr> */
          *(ch_b__rd_buff_data_addr + (++ch_b__rd_buf__leng) ) = 0;     /* and string
end null */
          if( ( ch_b__rd_spec  &  RD__FUNCTION_MASK )  ==  RD__ATTACHED )
            resume( RD__SUSPEND_RESUME_LEVEL, ch_b__rd__callng_tsk_id );   /* attached
- activate calling task  */
          else
            send__mail( ch_b__rd__callng_tsk_id, RD__TERMINATED );     /* detached -
notify calling task */
          echo_character( CARR_RTRN );
          if( ch_b__rd_spec & RD__ECHO_LF__W_CR ) echo_character( LINEFEED );
          if( ch_b__rd_spec  &  RD__OUTPUT_PROMPT )
          { echo_character( PROMPT_1st_CHAR );
            echo_character( PROMPT_2nd_CHAR );
            echo_character( SPACE );
          }

          ch_b__rd_spec = IDLE;    /* turn off read */
```

```
          ch_b__rd_stat = RD__NORM_CR_TERM;          /* end of sequence */
          break;
        case  CANCEL :
          *ch_b__rd_buff_data_addr = 0;
          ch_b__rd_buf__leng = 0;     /* reset(clear) buffer */
          break;
        case  RS_CHAR :     /* special funtion key */
          put_char_read_buffer( );
          ch_b__rd_spec = ( ch_b__rd_spec | RD__SUPPRESS_ECHO );
          break;
        case DEL_CHAR :     /* delete char, echo character only */
          if( ch_b__rd_spec & RD__ENBL_DEL_SEQ_ECHO )
          { echo_character ( BACKSPACE );
            echo_character ( SPACE );
            echo_character ( BACKSPACE );
          }
          else echo_character ( DEL_CHAR );
          if( ch_b__rd_buf__leng ) *(ch_b__rd_buff_data_addr + (--ch_b__rd_buf__leng)
) = 0;      /* --count, delete last char in buff */
          break;
        case X_ON_CHAR :
          ch_b__wr__stat = ch_b__wr__stat & ( ~X_OFF_MASK );    /* permit write output
*/
          if( ch_b__wr__end_indx > ch_b__wr__next_indx ) ch_b__start_output( );
          break;
        case X_OFF_CHAR :
          ch_b__wr__stat = ( ch_b__wr__stat | X_OFF_MASK );    /* inhibit write outout
*/
          break;
        default :        /* all other characters, echo, process as real character */
          echo_character( '~' );
          echo_character( '~' );
          put_char_read_buffer( );
      }
      break;
    case RD__TRANSPARENT :             /* transparent mode */
      put_char_read_buffer( );
      break;
    default :            /* idle */
      switch ( ch_b__rd_char )
      { case X_ON_CHAR :
          ch_b__wr__stat = ch_b__wr__stat & ( ~X_OFF_MASK );    /* permit write output
```

```
*/
          if( ch_b__wr__end_indx > ch_b__wr__next_indx ) ch_b__start_output( );
          break;
        case X_OFF_CHAR :
          ch_b__wr__stat = ( ch_b__wr__stat | X_OFF_MASK );    /* inhibit write outout
*/
          break;
      }
  }
}  /* ch_b__read_serv */

/* void read_b( unsigned specification, unsigned timeout, char *read_string_addr, char
max_length, rd__stat_typ *rd__error )
  specification -  Bits 0,1( LSBs )
             00 (0) = idle,
             01 (1) = transparent,
             10 (2) = character no echo,
             11 (3) = character with echo
          Bits 2,3    01 = Attached read (suspend until complete or timeout)
               10 = Start detached read(format in bits 0,1 are not "idle") and return
          Bit 4        convert to upper case
          Bit 5        echo CR & LF on CR
          Bit 6        ignor LF on input
          Bit 7        enable <bs><sp><bs> sequence on delete
          Bit 8        output prompt after read        */
  void start_read( unsigned specification, char *read_string_addr, char max_length )
  { ch_b__rd__callng_tsk_id = aagetn( );       /* AMX call to get current task ID */
    ch_b__rd_buff_data_addr = read_string_addr;
    *ch_b__rd_buff_data_addr = 0;
    ch_b__rd_buf__leng = 0;             /* clear the buffer */
    ch_b__rd__max_leng = max_length;
    ch_b__rd_spec = specification;        /* starts read  and keep handler locked */
  }  /* start_read */
void read_b( unsigned specification, unsigned timeout, char *read_string_addr, char
max_length, rd__stat_typ *rd__error )
{ disable_interrupts( );         /* lock everyone out for if check */
  if( ch_b__rd_spec == IDLE )
  { ch_b__rd_spec = RD__LOCK_MASK;    /* without starting a read, lockout other tasks
*/
    enable_interrupts( );
    *rd__error = RD__NO_ERROR;
    switch ( specification & RD__FUNCTION_MASK )
```

```
    { case RD__START_DETACHED :
        start_read( specification, read_string_addr, max_length );
        break;
      case RD__ATTACHED :
        ch_b__rd_stat = RD__TIMEOUT;       /* pre-set error before suspend, for later
check */
        start_read( specification, read_string_addr, max_length );
        suspend( RD__SUSPEND_RESUME_LEVEL, ch_b__rd__callng_tsk_id, timeout );    /*
read and wait until complete */
        *rd__error = ch_b__rd_stat;        /* status of current action */
        ch_b__rd_spec = IDLE;        /* unlock read handler */
        break;
      default :
        ch_b__rd_spec = IDLE;        /* unlock read handler */
        *rd__error = RD__ILLEGAL_CMND;        /* status of current action */
    }
  }
  else
  { enable_interrupts( );
    *rd__error = RD__BUSY;
  }
}  /* read_b */

void read_hcu( )        /* start a detached read  --  compatable with old */
{ read_b( RD__DETACHED__W_ECHO /* start */, 0 /* not appl */, ch_b__rd_buff /* not appl
*/, RD__BUFF_LENG, &rd__error );
}  /* read_hcu */

void get_hcu( char *read_string )      /* copy term_hand_buffer to read_string  --
compatable with old */
{ strncpy( read_string, ch_b__rd_buff, 40 );
}  /* get_hcu */

  /*    ************ The following sudo-code routines are provided in an assembler
modual ****************
void output_interrupt_handler_chB( )
{ out_byte( acknowledge interrupt this device );    (* Assume interrupts turned off by
hardware at this time *)
  if( ch_b__wr__next_indx >= ch_b__wr__end_indx )    (* output complete? *)
    output_master( );                (* notify task *)
  else if( ( ch_b__wr__stat & ( ~( X_OFF_MASK | WRITE_ON ) ) ) == WRITE_ON )
    out_byte( output_device_C, ch_b__wr_buff[ ++ch_b__wr__next_indx ] );
```

```
  else
    ch_b__wr__stat &= ( ~WRITE_ON );     (* turn bit off *)
  out_byte( turn on processor interrupts );
} (* output_interrupt_handler_chB *)
void ch_b__start_output( )
{ (* Assume interrupts are turned off by the hardware at this time *)
  if( ( ch_b__wr__stat & ( ~( X_OFF_MASK ¦ WRITE_ON ) ) ) == WR__CLEAR )
  { ch_b__wr__stat ¦= WRITE_ON;     (* turn bit on *)
    out_byte( OUTPUT_DEVICE, ch_b__wr_buff[ ++ch_b__wr__next_indx ] );
  }
} ( * stat_output_chB * )
void read_interrupt_handler_ch_b( )
{  (* Assume interrupts are off at this time *)
  write_byte( acknowledge interrupt this device );
  read_byte( read the byte, ch_b__rd_char );
      (* SEE if interrupts can be enabled here, without enabling read device *)
  ch_b__read_serv( );
  out_byte( turn on processor interrupts );
} (* read_interrupt_handler_chB *)
*/
```

```
/* V4TRNT V4TRNT V4TRNT V4TRNT V4TRNT V4TRNT V4TRNT V4TRNT V4TRNT V4TRNT
V4TRNT V4TRNT V4TRNT V4TRNT V4TRNT V4TRNT
**************************************************************************************
**********************************************
**
                                        **
**                                 EEEEEEEEEEEEEEE      TTTTTTTTTTTTT
NNNNNNN       NNNNN                        **
**                                 EEEEEEEEEEEEEE       TTTTTTTTTTT
NNNNNNNN      NNNNN                        **
**                                 EEEEE             A        TTTT        OOO
NNNNNNNNN     NNNNN                        **
**                             EEEEEEEEEEEE      AAA       TTT       OOOOOOOO   NNNNN
NNNN  NNNNN                        **
**                             EEEEEEEEEEE      AAAAA      TTT       OOOOOOOO   NNNNN
NNNN NNNNN                       **
**                             EEEEE                       TTTT        OOO      NNNNN
 NNNNNNNNN                       **
**                             EEEEEEEEE       AAAAAAA     TTTTT                NNNNN
  NNNNNNNN                       **
**                             EEEEEEEE       AAAAAAAAA    TTTTTTT              NNNNN
   NNNNNNN                       **
**
                                        **
**        This software (firmware) developed by EATON-KENWAY is proprietary.  Source
code on listings or any other media       **
**        is not for sale or loan and may not be copied or transferred to any vendor,
buyer, or consultant.  Executable       **
**          code is available in ROM and is sold with the original product or as a
product upgrade.  Buyer shall not        **
**         copy or distribute ROM's with E-K firmware to any third party without the
prior written approval of EATON-KENWAY.   **
**           Title to and ownership of the software shall at all times remain with
EATON-KENWAY.    The information  in this      **
**           is subject to change without notice  and should not be construed as a
commitment by EATON-KENWAY.               **
**
                                        **
**         EATON-KENWAY  assumes  no  responsibility  for  the  use or reliability
of  its  software on  equipment which       **
**          is  not supplied EATON-KENWAY or has been modified without EATON-KENWAY
approval.                                **
```

```
**
                                                **
**          Copyright 1989
                 KENWAY, INCORPORATED       **
*****************************************************************************************
***********************************************
  V4TRNT  V4TRNT  V4TRNT  V4TRNT  V4TRNT  V4TRNT  V4TRNT  V4TRNT  V4TRNT  V4TRNT
V4TRNT  V4TRNT  V4TRNT  V4TRNT  V4TRNT  V4TRNT
    DATE CREATED:  Feb 89
    AUTHOR:        Vehicle Group
    DESCRIPTION:
      xxx......             ....
    PROGRAM HISTORY :
    Date        Initials/No.        Description
    ---------   ------------        ----------------------------------------
* * * * * * * * * * * * * * * * * * * * * * * * * * * * * * * * * * * * * * * * * * * *
* * * * * * * * * * * * * * * * * * * * * * */
#include <stdlib.h>
#include <stdio.h>
#include <string.h>
#include <math.h>
#include "V4MESGS.K"        /* definition of vehicle messages */
#include "V4MOTION.K"    /* definition of motion constants */
#include "V4VARS.K"       /* definition of common variables and constants */
#include "V4INIT_D.K"
void compt_pos__veh_factory( );    /* remove this call from move2way */
void vsysbug( unsigned  task_id,  unsigned  error_no );

#define  FULL 1                 /* data transformation */
#define  XY_ONLY 0                 /* data transformation */
#define  MAIL_SRC_FLD  0xF000     /* source of mail field mask */
#define  FACTORY_FRAME 0
#define  WAYPOINT_FRAME 1
#define  FORCED_STRAIGHT_THRESHOLD (18.0 * RADIANS_PER_DEG )
#define  WIRE_TRANS_MAX   ( 5.0 * RADIANS_PER_DEG )
#define MV__ARC_TOLERANCE  0.98
#define MV__MIN_LENG  50.0     /* mmeters */
#define NEXT_RCRD 1
#define U_MOVE_APPROX   3.016686    /* approx 178dg */
#define U_MOVE_HEADING  3.139847324  /* 179.9 dg because 180 deg has math computation
problems */
```

```
typedef struct
{ double x;
  double y;
  double heading;
  unsigned path;
} mv_frame_typ;
struct
{ unsigned char setpt;
  unsigned path;
  double x;
  double y;
  double heading;
  double mrkr_x;
  double mrkr_y;
} shadow_mv;
int  tcomplete__s5;
unsigned  translation_mail;
unsigned  mirror_wypnt;
double cos__f_h;
double sin__f_h;
struct
{ mv_rcrd_type  *prv;
  mv_rcrd_type  *cur;
  mv_rcrd_type  *nxt;
} tpt_mq;
mv_frame_typ factory;
mv_frame_typ wypnt;
commands_type  *tpt_cq;
bi_dir_type *f_r__adr;

void updat_mq_indx( )   /* update the move que indexes and clear next move que record
*/
{ tpt_mq.prv = tpt_mq.cur;
  tpt_mq.cur = tpt_mq.nxt;
  tpt_mq.nxt = &mvq.lst[ (mvq.load +1) & MVQ__END_INDX ];  /* increment mvq.load after
translation complete */
  memset( tpt_mq.nxt, 0, sizeof(mv_rcrd_type) );    /* clear record (debug) */
}
double fix_angle( double angle )
{ if( angle > PI ) return ( angle - TWO_PI );
  else if (angle < -PI ) return ( angle + TWO_PI );
  else return angle;
```

```
} /* fix_angle */

#define PATH_MSTR_MASK (FREQUENCY_MASK | DIRECTION_CMD_MASK | DIM__SPECFD_VEH_CNTR |
MANDITORY_STOP)
void transform_coords( unsigned full_conversion )   /***  scale and re-define vehicle
position as center of vehicle ***/
{ long conv_dummy;
  int temp;

  conv_dummy = (*((long*)(&tpt_cq->cmdx.xyh_mov.x_f[0] -1))) & EXTD_INT_MASK;
  factory.x = (double)conv_dummy * MM_FROM__20THS_INCH;   /* scale to metric */
  conv_dummy = (*((long*)(&tpt_cq->cmdx.xyh_mov.y_f[0] -1))) & EXTD_INT_MASK;
  factory.y = (double)conv_dummy * MM_FROM__20THS_INCH;
  if( full_conversion )
  { factory.path = tpt_cq->cmdx.xyh_mov.path & PATH_MSTR_MASK;
    f_r__adr = ( factory.path & DIRECTION_CMD_MASK ) ? &cnfg_f_r.fr : &cnfg_f_r.rr;
     temp   =   (tpt_cq->cmdx.xyh_mov.heading   <=   X100__PI)   ?
(int)tpt_cq->cmdx.xyh_mov.heading :
      -(int)( X100__2_PI - tpt_cq->cmdx.xyh_mov.heading );
    factory.heading = ( RADIANS_PER_DEG * FROM_100THS ) * (double)temp;
    cos__f_h = cos( factory.heading );
    sin__f_h = sin( factory.heading );
    if( !(factory.path & DIM__SPECFD_VEH_CNTR) )   /* x-y specified as veh front/rear
(not center) coords */
    { factory.x -= f_r__adr->dim_2_end * cos__f_h;   /* shift coordinates to reference
vehicle center */
      factory.y -= f_r__adr->dim_2_end * sin__f_h;
      factory.path &= ~DIM__SPECFD_VEH_CNTR;
    }
  }
} /* transform_coords */

void compute_wypnt( mv_frame_typ *bs_coord )
{ double delta_x;
  double delta_y;
  delta_x = bs_coord->x - shadow_mv.x;
  delta_y = bs_coord->y - shadow_mv.y;
  wypnt.x = ( cos__f_h * delta_x ) + ( sin__f_h * delta_y );   /* sin, cos set in
transform_coords */
  wypnt.y = ( cos__f_h * delta_y ) - (sin__f_h * delta_x );
} /* compute_wypnt */
```

```
void compt_pos__veh_factory( )    /* compute veh pos relative to 2nd mag, change
reference to factory */
{ double sin_ang;   /* trig dummies */
  double cos_ang;
  double b_ang;   /* angle "B"etween M1 and M2 in insertion frame */
  double c_ang;   /* angle between M1 and M2 in factory frame */
  double vehicle_measured_leng, factory_defined_leng;

  if( ins_vm2.x == 0.0 ) vsysbug( HAND_CONTROL_ID, NO_HCU_XY_INSERT );  /* Manual Hcu
insert past 2 magnets not followed */
  sin_ang = sin(ins_vm2.ang);   /* trig dummies for fast calc */
  cos_ang = cos(ins_vm2.ang);

                /* Calc X,Y position of magnet2 in insertion frame */
  ins_m1_m2.x = ins_vm2.x - ( cos_ang * ums_offset.x - sin_ang * pos_y_m2 );
  ins_m1_m2.y = ins_vm2.y - ( sin_ang * ums_offset.x + cos_ang * pos_y_m2 );

  c_ang = atan2( tpt_mq.cur->ums_y /*Y_f_m2*/ - tpt_mq.cur->len_dcl /*Y_f_m1*/,     /*
angle between M1 & M2 in factory frame */
                tpt_mq.cur->ums_x /*X_f_m2*/ - tpt_mq.cur->len_acl /*X_f_m1*/ );
  b_ang = atan2( ins_m1_m2.y, ins_m1_m2.x );    /* angle "B"etween M1 & M2 in insertion
frame */
                        /* test for length agreement bwtween AGVC defined zone and
measured zone */
  factory_defined_leng  =  sqrt(  (  (tpt_mq.cur->ums_x  -  tpt_mq.cur->len_acl)  *
(tpt_mq.cur->ums_x - tpt_mq.cur->len_acl) )
   +  (  (tpt_mq.cur->ums_y   -   tpt_mq.cur->len_dcl)   *   (tpt_mq.cur->ums_y   -
tpt_mq.cur->len_dcl) ) );
  vehicle_measured_leng = sqrt( ins_m1_m2.x * ins_m1_m2.x + ins_m1_m2.y * ins_m1_m2.y);

                        /* Insert: lengths Measured & AGVC agreement? */
  if(  fabs(  1.0  -  factory_defined_leng  /  vehicle_measured_leng  )  >
INSRT_LNGTH_TOLERANCE ) vsysbug( HAND_CONTROL_ID, LENGTH_ERR_XY_INSERT );
                /* Calc X.Y position of Vehicle in factory frame */
  c_ang /*temp*/ = b_ang - c_ang;
  sin_ang = sin( c_ang );
  cos_ang = cos( c_ang );
  ins_vr.x /*temp*/ -= ins_m1_m2.x;
  ins_vr.y /*temp*/ -= ins_m1_m2.y;
  tpt_mq.cur->x = shadow_mv.x = tpt_mq.cur->ums_x /*m2_factory*/ + (cos_ang * ins_vr.x)
+(sin_ang * ins_vr.y);
  tpt_mq.cur->y  =  shadow_mv.y  =  tpt_mq.cur->ums_y  /*m2_factory*/  +  (-sin_ang  *
```

```
ins_vr.x) +(cos_ang * ins_vr.y);
  tpt_mq.cur->heading = shadow_mv.heading = fix_angle( ins_vr.ang - c_ang );
} /* compt_pos__veh_factory */

void defn__wir_mov( )
{ double temp_y = wypnt.y;
  updat_mq_indx( );
  if( fabs(wypnt.heading) > WIRE_TRANS_MAX ) vsysbug( 0, 0xB104 );     /* approach to
wire not parrallel */
  if(wypnt.y > 50.0) vsysbug( 0, 0xB105 );     /* wire path too crooked */
  tpt_mq.cur->x /*window*/ = 300.0;   /* MM, FUTURE: make this dynamic */
  tpt_mq.cur->len_seg /* wire.x */ = wypnt.x;
  tpt_mq.cur->path = shadow_mv.path;
  if( shadow_mv.path & (UPDATE_MRKR_PRES | UPDATE_MRKR_SPECF) )
  { tpt_mq.cur->ums_x = shadow_mv.mrkr_x;
    tpt_mq.cur->ums_y = shadow_mv.mrkr_y;
    if( shadow_mv.path & UPDATE_MRKR_SPECF )   /* wire-X marker? */
    { tpt_mq.cur->ums_x -= (f_r__adr->dim_2_end * cos__f_h);   /* shift coordinates to
reference vehicle center */
      tpt_mq.cur->ums_y -= (f_r__adr->dim_2_end * sin__f_h);
      compute_wypnt( (mv_frame_typ*)&tpt_mq.cur->ums_x );     /* compute mrkr x,y;
wypnt.x/y now contains mrkr info */
      tpt_mq.cur->y = wypnt.x;    /* distance to marker */
      if( fabs(temp_y - wypnt.y) > 10.0 ) vsysbug( 0, 0xB106 );     /* marker defined
off wire path */
    }
  }
  shadow_mv.x = factory.x;
  shadow_mv.y = factory.y;
  shadow_mv.heading = tpt_mq.cur->heading = factory.heading;
  tpt_mq.cur->path = shadow_mv.path;
  tpt_mq.cur->last_trns_indx = cq_indx.curr;
  tpt_mq.cur->setpt = min( f_r__adr->setpt_lmt, shadow_mv.setpt );
  tpt_mq.cur->estim = 5;
  tpt_mq.cur->command = MV__ON_WIRE;
  mvq.load++;
} /* defn__wir_mov */

void defn__lin_mov( unsigned char frame /* 0=fctry, 1=wypnt */, double wypnt_lng )
{ updat_mq_indx( );
  if( frame )       /* WAYPOINT_FRAME */
  { if(mirror_wypnt)
```

```
      wypnt.y = -wypnt.y;
    else
      wypnt.heading = -wypnt.heading;

    shadow_mv.x = tpt_mq.cur->x = factory.x - ( cos__f_h * wypnt.x -sin__f_h * wypnt.y
);
    shadow_mv.y = tpt_mq.cur->y = factory.y - ( sin__f_h * wypnt.x +cos__f_h * wypnt.y
);
    shadow_mv.heading  =  tpt_mq.cur->heading  =  fix_angle(  factory.heading  -
wypnt.heading );
    tpt_mq.cur->path = shadow_mv.path & ~(UPDATE_MRKR_PRES | UPDATE_MRKR_SPECF |
MANDITORY_STOP);
    tpt_mq.cur->last_trns_indx = 0;   /* no indx on intermediate moves */
  }
  else      /* FACTORY FRAME */
  { shadow_mv.x = tpt_mq.cur->x = factory.x;
    shadow_mv.y = tpt_mq.cur->y = factory.y;
    shadow_mv.heading = tpt_mq.cur->heading = factory.heading;
    tpt_mq.cur->path = shadow_mv.path;
    tpt_mq.cur->last_trns_indx = cq_indx.curr;
  }
  tpt_mq.cur->len_seg = wypnt_lng;
  if( shadow_mv.path & (UPDATE_MRKR_PRES | UPDATE_MRKR_SPECF) )
  { tpt_mq.cur->ums_x = shadow_mv.mrkr_x;
    tpt_mq.cur->ums_y = shadow_mv.mrkr_y;
  }
  tpt_mq.cur->setpt = min( f_r__adr->setpt_lmt, shadow_mv.setpt );
  tpt_mq.cur->estim = 5;
  tpt_mq.cur->command = MV__STR_SEG;
  mvq.load++;
} /* defn__lin(ear)_mov */

void defn__arc_mov( unsigned char frame /* 0=fact, 1=waypt*/, double radius, double
angle )
{ unsigned temp;
  updat_mq_indx( );
  radius = max( THRESHOLD__ROTATE_TURN, radius );
  tpt_mq.cur->x /*radius*/ = mirror_wypnt ? radius : -radius; /* <+>left, <->right*/
  /* tpt_mq.cur->y = 0.0;    not used in turn command */
  tpt_mq.cur->heading = shadow_mv.heading = factory.heading;
  tpt_mq.cur->len_seg = fabs(1.05 * radius * angle);
  if(frame)   /* WAYPOINT */
```

```
  { tpt_mq.cur->path = shadow_mv.path & ~(UPDATE_MRKR_PRES | UPDATE_MRKR_SPECF |
MANDITORY_STOP);
    tpt_mq.cur->last_trns_indx = 0;   /* no sequence on intermediate moves */
  }
  else        /* FACTORY */
  { tpt_mq.cur->path = shadow_mv.path;
    tpt_mq.cur->last_trns_indx = cq_indx.curr;
    shadow_mv.x = factory.x;
    shadow_mv.y = factory.y;
  }
  if(radius < ( THRESHOLD__ROTATE_TURN * 2 ) )
  { tpt_mq.prv->path |= MANDITORY_STOP;   /* stop before forced rotate */
    tpt_mq.cur->path |= MANDITORY_STOP;   /* stop after forced rotate */
    temp = 60;    /* setpt */
  }
  else
  { temp =  ( radius > MIN_TURN_RADIUS ) ?
      ROUND(unsigned,  radius_turn_offset  +radius_turn_setpt_scale  *  (radius  -
MIN_TURN_RADIUS)) : /*711mm - 2032mm radius*/
      max( 20, ROUND(unsigned, radius / MIN_TURN_RADIUS * radius_turn_offset) );
           /*0 - 711.0mm radius*/
  }
  tpt_mq.cur->setpt = min( (unsigned char)min( (unsigned)f_r__adr->setpt_lmt, temp ),
shadow_mv.setpt );
  if( shadow_mv.path & (UPDATE_MRKR_PRES | UPDATE_MRKR_SPECF) )
  { tpt_mq.cur->ums_x = shadow_mv.mrkr_x;
    tpt_mq.cur->ums_y = shadow_mv.mrkr_y;
  }
  tpt_mq.cur->estim = 5;
  tpt_mq.cur->command = MV__TURN_SEG;
  mvq.load++;
} /* defn__arc_mov */

void defn__x_y_mov( )   /* translate single AGVC move to 1-3 vehicle move segments */
{ double wypnt_x_arc;
  double wypnt_x_intrsct;
  double tmp_var, tmp_y;
  double tan__ang_dvd_2;
  double sin_w;

  transform_coords( FULL );
  if( (shadow_mv.path ^ factory.path) & DIRECTION_CMD_MASK )  /* change in direction?
```

```
*/
  { shadow_mv.heading = fix_angle( tpt_mq.cur->heading + PI );
    tpt_mq.cur->path |= MANDITORY_STOP;   /* force previous move to stop */
  }
  shadow_mv.path = (shadow_mv.path & (~PATH_MSTR_MASK)) | factory.path;
  compute_wypnt( (mv_frame_typ*)&factory.x );    /* compute waypoint x,y, leave in
wypnt.x/y */
  wypnt.heading = fix_angle( factory.heading - shadow_mv.heading ); /* Initial heading
in waypoint frame */
  if( shadow_mv.path & FREQUENCY_MASK ) defn__wir_mov( );   /* wire guided move */
            /* limited(small) change of direction    ---    forced linear move
*/
  else    if(    (fabs(wypnt.heading)    <=    FORCED_STRAIGHT_THRESHOLD)    ||
(tpt_cq->cmdx.xyh_mov.path & FORCE_SNGL_LIN_MOV) )    /* small waypoint heading */
  { if( wypnt.x > 0.0 ) defn__lin_mov( FACTORY_FRAME, wypnt.x );
    else vsysbug( 0, 0xB102 ); /* illegal coordinate (future: build a recovery motion)
*/
  }
  else    /* translate to waypoint frame; make additional tests */
  { if( wypnt.y < 0.0 )            /* mirror transformation */
    { mirror_wypnt = 1;
      wypnt.y = -wypnt.y;
    }
    else
    { mirror_wypnt = 0;
      wypnt. heading = -wypnt.heading;
    }

    if(  fabs(wypnt.  heading)  >  U_MOVE_APPROX  /*  178dg*/  )  wypnt.  heading  =
U_MOVE_HEADING;   /* 179.9 dg */
    if( wypnt.heading < 0.0 ) vsysbug( 0, 0xB103 );    /* illegal heading, in the
future build a recovery motion */
    tan__ang_dvd_2 = tan( wypnt.heading /2.0 );
    wypnt_x_arc = wypnt.y / tan__ang_dvd_2 /*tan(theta)*/;
    wypnt_x_intrsct  = wypnt.y  /  tan( wypnt.heading ); /* compute intersection of
current heading in waypoint frame */

    if( wypnt.x >= (wypnt_x_arc * MV__ARC_TOLERANCE) )   /* Enough X-dimension in
waypoint for turn */
    { wypnt.x -= wypnt_x_arc;   /* intermediate destination and moves */
      tmp_var /*radius*/ = (wypnt_x_arc - wypnt_x_intrsct) / tan__ang_dvd_2;
      if( ( wypnt.x > DIST__MIN_MOVE ) )   /* enough X distance to follow turn with
```

```
a straight */
      { defn__arc_mov( WAYPOINT_FRAME, tmp_var, wypnt.heading );
        defn__lin_mov( FACTORY_FRAME, wypnt.x );
      }
      else defn__arc_mov( FACTORY_FRAME, tmp_var, wypnt.heading );     /* accept an
approximate move */
    }
    else  if(  wypnt.x  >  (wypnt_x_intrsct  +150.0)  )  /*  destination  between
(x-intersection & x with 150mm min curvature) */
    {    /* large heading angle and x(in waypoint) less than possible arc movement */
      sin_w = sin( wypnt.heading );
      tmp_var = wypnt.x - wypnt_x_intrsct;
      tmp_y = wypnt.y;
      wypnt.y = tmp_var * sin_w;
      wypnt.x = (tmp_var + (tmp_var * cos( wypnt.heading ) ) );
      defn__lin_mov( WAYPOINT_FRAME, (tmp_y -wypnt.y) /sin_w );   /* intermediate move
*/
      defn__arc_mov( FACTORY_FRAME, tmp_var /tan__ang_dvd_2 /*radius*/, wypnt.heading
);    /* final move */
    }
    else if( wypnt.x > 0.0 )
    {  if(  (wypnt_x_arc  /wypnt.x)  <  0.35  )        /*  test  ((wypnt.y/wypnt.x)
/tan(wypnt.heading)) < .35 */
         defn__lin_mov(  FACTORY_FRAME,  wypnt.x  );      /*  Single  linear-move(low
overshoot) possible? See write up */
       else  /* destination < (x-intersection +300mm)*/
       { wypnt.x *= 0.5;    /* take a path 1/2 way in between */
         wypnt.y = wypnt.x;
         wypnt.heading = PI /2.0;      /* intermediate destination */

         defn__lin_mov( WAYPOINT_FRAME, (wypnt.y -wypnt.x) );    /* intermediate move
*/
         defn__arc_mov( FACTORY_FRAME, wypnt.y /*radius*/, wypnt.heading );    /* final
move */
       }
    }
    else vsysbug( 0, 0xB102 ); /* illegal coordinate (future: build a recovery motion)
*/
  }
  shadow_mv.path &= ~(UPDATE_MRKR_PRES | UPDATE_MRKR_SPECF);      /* clear marker
definition (same as clearing x,y's) */
} /* defn__x_y_mov */
```

```
void defn__x_y_position( )
{ transform_coords( FULL);
  updat_mq_indx( );
  tpt_mq.cur->command = MV__DEFN_POS;
  tpt_mq.cur->heading = shadow_mv.heading = factory.heading;
  tpt_mq.cur->x = shadow_mv.x = factory.x;
  tpt_mq.cur->y = shadow_mv.y = factory.y;
  tpt_mq.cur->path  =  shadow_mv.path  =  (shadow_mv.path  &  (~PATH_MSTR_MASK))  |
factory.path;
  shadow_mv.path &= ~(UPDATE_MRKR_PRES | UPDATE_MRKR_SPECF | DIM__SPECFD_VEH_CNTR);
 /* clear marker definition (same as clearing x,y's) */
  mvq.load++;
} /* defn__x_y_position */

void defn__x_y_mrkr( )
{ transform_coords( XY_ONLY );
  shadow_mv.mrkr_x = factory.x;
  shadow_mv.mrkr_y = factory.y;
  shadow_mv.path    |=    (UPDATE_MRKR_PRES    |    (tpt_cq->cmdx.xy_marker.path    &
UPDATE_MRKR_SPECF) ? UPDATE_MRKR_SPECF : 0);
} /* defn__x_y_mrkr */

void defn__x_y_insert( )  /* Two magnets are defined for insert, 1st with X_Y_MARKER
command, 2nd with this command */
{ long conv_dummy;
  mvq.load = mvq.excut = 1; /* Initialize indexes */
  tpt_mq.nxt = pt__mvq_nxt = &mvq.lst[ 1 /*mvq.load=1*/];
  updat_mq_indx( );
  conv_dummy = (*((long*)(&tpt_cq->cmdx.insrt_prfx.m1_x[0] -1))) & EXTD_INT_MASK;
  tpt_mq.cur->len_acl/*x*/ = (double)conv_dummy * MM_FROM__20THS_INCH;   /* scale to
metric */
  conv_dummy = (*((long*)(&tpt_cq->cmdx.insrt_prfx.m1_y[0] -1))) & EXTD_INT_MASK;
  tpt_mq.cur->len_dcl/*y*/ = (double)conv_dummy * MM_FROM__20THS_INCH;   /* scale to
metric */
  conv_dummy = (*((long*)(&tpt_cq->cmdx.insrt_prfx.m2_x[0] -1))) & EXTD_INT_MASK;
  tpt_mq.cur->ums_x = shadow_mv.mrkr_x = (double)conv_dummy * MM_FROM__20THS_INCH;
/* scale to metric */
  conv_dummy = (*((long*)(&tpt_cq->cmdx.insrt_prfx.m2_y[0] -1))) & EXTD_INT_MASK;
  tpt_mq.cur->ums_y = shadow_mv.mrkr_x = (double)conv_dummy * MM_FROM__20THS_INCH;
/* scale to metric */
  tpt_mq.cur->setpt = max( 30/*slow default insert*/, shadow_mv.setpt);
  tpt_mq.cur->path = (tpt_cq +NEXT_RCRD)->cmdx.xyh_mov.path & PATH_MSTR_MASK;  /* path
```

```
for next record applies to insert */
  shadow_mv.path = tpt_mq.cur->path  & ~DIM__SPECFD_VEH_CNTR;
  tpt_mq.cur->command = MV__INSRT_XY;
  compt_pos__veh_factory( );     /* compute the vehicle position and heading in the
factory */
  mvq.load++;
} /* defn__x_y_insert */

void main_trn( )
    /****************************************************************************
     *  function : wait at mailbox to recieve message from other tasks and process the
message.
     *  Mail format, following is the construct of motion translation mail
     *  15  14  13  12  11  10   9   8   7   6   5   4   3   2   1   0 ¦
     * -----------------------------------------------------------------
     * ¦ interrupt/mail ¦         total/from command processor        ¦
     * -----------------------------------------------------------------
     *  15..12 : flag field(mail type) : 1000=interrupt; 1100=message; 1101=cmdt_procr
msg
     *  11.. 0 : mail source
     ****************************************************************************/
{ for( ; (translation_mail = wait__mail( TIMEOUT__FOREVER )) != CMDT_2_TRNS_BAS; );
/* wait til vcmdt notifies automatic starting */
  for( ; /*NEVER EXIT */ ; translation_mail = wait__mail( TIMEOUT__FOREVER ) )
  { if( (translation_mail & 0xFF00) != CMDT_2_TRNS_BAS )
    { if(translation_mail != 8 ) vsysbug( translation_mail, 0xB00B );    /* message
from unexpected source */
      else return;      /* debug option */
    }

    if( translation_mail == CMDT_2_TRNS_BAS )     /* I N I T I A L I Z E */
    { memset(&mvq, 0, sizeof(mvq) );    /* Initialize indexes, clear move queues(mvq)
*/
      shadow_mv.path = 0;
      shadow_mv.heading = 0.0;
      shadow_mv.setpt = 30;      /* slow(creep) speed */
      shadow_mv.mrkr_x = shadow_mv.mrkr_y = 0.0;
      mvq.excut = mvq.load = 1;
      tpt_mq.prv = tpt_mq.cur = tpt_mq.nxt = pt__mvq_nxt = &mvq.lst[1 /*mvq.load*/];
    }
    else      /* convert/translate command list */
    { cq_indx.curr = mail_cmdt;    /* get start of packet indx from mail */
```

```
      cq_indx.bundl_end = cq_indx.curr +(unsigned)( translation_mail & 0x00FF );  /*
end of que to be translated */
      for( ; cq_indx.curr < cq_indx.bundl_end; ++cq_indx.curr )
      {    /* Test que overflow(must have 2 max for translate and NULL records
available) before continuing */
        for( ; (mvq.load - mvq.excut) > MVQ__MAX_UNEXCUTD ; ) translation_mail =
wait__mail( 5 SEC__TIMEOUT );

        tpt_cq = &command_queue[ CQ_WRAP(cq_indx.curr) ];
        if( tpt_cq->cmd_typ == V_MOTION_CMD )
        { tpt_cq->cmd_queue_translate = 1;          /* tag tranalation complete in
command queue */

          switch ( tpt_cq->cmdx.bs_flds.cmd_id )                 /* decode command */
          { case X_Y_H__MOV :
              defn__x_y_mov( );
              break;
            case X_Y__MARKER :
              defn__x_y_mrkr( );
              continue;
            case SET_VEHICLE_SPEED_V :        /* convert speed to setpt */
              shadow_mv.setpt = (unsigned char)min( speed_setpoint_calib, ROUND(
unsigned,
                (double)tpt_cq->cmdx.set_speed.speed * spd_setpt_scale ) );
              continue;
            case OPTIONAL_CONTROL_V :
              if( tpt_cq->cmdx.optional_control.option  & OBSTACLE_DETCT_CNFG_BIT &
motion_control_switches )
              { if(tpt_cq->cmdx.optional_control.option & OBSTACLE__AGVC_ENABLES ) /*
ON ( ON with both "on" & "off" bits) */
                  shadow_mv.path |= OBSTACLE_DETCT_CNFG_BIT;
                else if(tpt_cq->cmdx.optional_control.option & OBSTACLE__AGVC_DISABLES
) /* OFF */
                  shadow_mv.path &= ~OBSTACLE_DETCT_CNFG_BIT;
              }
              /* add other future options here */
              break;
            case X_Y_H__SET :
              defn__x_y_position( );
              break;
            case X_Y_H__INSRT :
              defn__x_y_insert( );
```

```
            break;
          case MOVE_TO_MAGNET_V :      /*  to be included for eagle in the future */
          case MOVE_TO_VIRTUAL_V :
          case MOVE_TO_INTERSECTION_V :
            /*  defn__mov2event( tpt_cq->cmdx.bs_mov.cmd_id );
            break;
            */
          case TURN_V :              /*  to be included for eagle in the future */
             /*  defn__turn( );  also put vsysbug into decode_turn
             break;
            */
          case ROTATE_V :            /*  to be included for eagle in the future */
             /*  defn__rotate( );
             break;
            */
          case MAGNET_UTURN_V :      /*  to be included for eagle in the future */
          case VIRTUAL_UTURN_V :
          case INTERSECTION_UTURN_V :
             /*  defn__uturn( tpt_cq->cmdx.bs_uturn.cmd_id );
             break;
            */
          case MAGNET_STURN_V :      /*  to be included for eagle in the future */
          case VIRTUAL_STURN_V :
          case INTERSECTION_STURN_V :
             /*  decode__sturn( tpt_cq->cmdx.bs_sturn.cmd_id );
             break;
            */
          default :
            tpt_cq->cmd_queue_translate = 0;       /* untag tranalation complete in
command queue */
            vsysbug( cq_indx.curr, 0xB01D /*29*/ ); /* unrecognized command */
        }

        send__mail( vactmt, WAKEUP_ACTION );      /* wakeup "action task" */
      }
      else  vsysbug( cq_indx.curr, 0xB03D /* 61 */ ); /* subsystem message received
*/
    } /* for */
    mail_cmdt = 0;               /* Clear mail(flag) for next bundle */
  }
 } /* for */
}  /* main_trn */
```

```
/*  v2vers    v2vers    v2vers    v2vers    v2vers    v2vers    v2vers    v2vers
v2vers    v2vers    v2vers    v2vers    v2vers
*****************************************************************************************
**********************************************
**
                                                         **
**                                                  EEEEEEEEEEEEEEE      TTTTTTTTTTTTT
NNNNNNN      NNNNN                                          **
**                                                  EEEEEEEEEEEEEE       TTTTTTTTTTT
NNNNNNNN     NNNNN                                          **
**                                                  EEEEE                 A        TTTT        OOO
NNNNNNNNN    NNNNN                                          **
**                                              EEEEEEEEEEEE     AAA     TTT     OOOOOOOO  NNNNN
NNNN  NNNNN                                         **
**                                              EEEEEEEEEEE     AAAAA    TTT     OOOOOOOO  NNNNN
NNNN NNNNN                                          **
**                                              EEEEE                    TTTT      OOO     NNNNN
 NNNNNNNNN                                          **
**                                              EEEEEEEEE     AAAAAAA    TTTTT             NNNNN
  NNNNNNNN                                          **
**                                              EEEEEEEE     AAAAAAAAA   TTTTTTT           NNNNN
   NNNNNNN                                          **
**
                                                       **
**        This software (firmware) developed by EATON-KENWAY is proprietary.  Source
code on listings or any other media        **
**        is not for sale or loan and may not be copied or transferred to any vendor,
buyer, or consultant.  Executable        **
**          code is available in ROM and is sold with the original product or as a
product upgrade.  Buyer shall not             **
**        copy or distribute ROM's with E-K firmware to any third party without the
prior written approval of EATON-KENWAY.   **
**          Title to and ownership of the software shall at all times remain with
EATON-KENWAY.   The information  in this      **
**          is subject to change without notice  and should not be construed as a
commitment by EATON-KENWAY.                   **
**
                                                     **
**        EATON-KENWAY   assumes  no  responsibility  for  the  use or reliability
of  its  software on  equipment which      **
**        is  not supplied EATON-KENWAY or has been modified without EATON-KENWAY
approval.                                   **
```

```
**
                                                         **
**         Copyright 1989
                KENWAY, INCORPORATED     **
*************************************************************************************
**********************************************
  v2vers   v2vers   v2vers   v2vers   v2vers   v2vers   v2vers   v2vers   v2vers
v2vers   v2vers   v2vers   v2vers   v2vers
    DATE CREATED:  Feb 89
    AUTHOR:        Vehicle Group
    DESCRIPTION:
          Provices an interface to display the Vehicle Class Stamp
    PROGRAM HISTORY:
    Date         Initials/No.        Description
    ---------    ------------        ---------------------------------------
* * * * * * * * * * * * * * * * * * * * * * * * * * * * * * * * * * * * * * * * * * *
* * * * * * * * * * * * * * * * * * * * * * */

#if defined( EAGL )
#define V_TYP "E-"
#else    /* default #if defined( WIRE ) */
#define V_TYP "G-"
#endif

#if defined( L_SHORT )
#define V_LENG "S-"
#else   /* default #if defined( L_LONG ) */
#define V_LENG "L-"
#endif

#if defined( GL40 )
#define V_TOP "L40"
#else  /* default */
#define V_TOP "-?-"
#endif

const char revision_mstr[] = { V_LENG V_TYP REVISION };

/* v2vers */
```

What is claimed and desired to be secured by Letters Patent is:

1. A system for non-guidewire navigation and guidance of an automated guided vehicle across a floor, the system comprising:

a plurality of reference points disposed in said floor;

a wireless receiver disposed on said vehicle which receives a wireless control signal, said wireless control signal including a predetermined destination and being sent from an off-vehicle controller;

a processor which selects and calculates a guidepath from a plurality of possible guidepaths based upon a current vehicle position which comprises an origin for and bearing of the selected guidepath, and based upon said predetermined destination;

a plurality of reference point sensors disposed on said vehicle which generate position information by detecting said plurality of reference points, said position information being used by a vehicle navigation and guidance system to constrain said vehicle to said selected guidepath such that the path actually traversed by said vehicle comprises said predetermined destination.

2. A system according to claim 1, wherein said wireless receiver also receives a desired vehicle exit bearing from said off-vehicle controller.

3. A system according to claim 1, wherein said selected guidepath is also selected and calculated based upon a desired vehicle exit bearing away from said predetermined destination.

4. A system according to claim 1, wherein said guidepath comprises a plurality of guidepath segments separated by a plurality of intermediate destinations, wherein said wireless receiver also receives said plurality of intermediate destinations, and wherein said selecting and calculating means further selects and calculates said plurality of guidepath segments based upon said plurality of intermediate destinations.

5. A system according to claim 1, wherein each of said plurality of reference points comprises a stationary permanent magnet.

6. A system according to claim 1, wherein each of said plurality of reference points comprises a stationary magnet which provides a sensible magnetic field that diminishes with increasing distance from the center of said magnetic field;

wherein said plurality of reference point sensors comprises a plurality of magnetic-field sensors, and wherein each of said plurality of magnetic-field sensors produce a search variable representing sensed magnetic field strength;

and wherein said vehicle navigation and guidance system further includes a memory disposed on said vehicle, said memory having a plurality of predetermined patterns of magnetic field strength stored therein as a function of distance from the center of a magnetic field to a sensor on said vehicle, and a sensor processor disposed on said vehicle and coupled to said memory, said sensor processor processing said search variables and computing a mean estimated lateral position of said magnetic field center relative to said vehicle based upon an interpolation of each search variable within said stored predetermined pattern.

7. A system according to claim 1, wherein said plurality of reference point sensors are dynamically calibrated as said vehicle travels between each of said plurality of floor disposed reference points.

8. A system according to claim 1, wherein said plurality of reference points each comprise a magnet which emits a detectable field which is unipolar in character.

9. A system according to claim 1, wherein said plurality of reference point sensors include first and second reference point sensors, said first and second reference point sensors having a center-to-center separation distance;

and wherein said first and second reference point sensors are used to measure the position of said traversed reference point relative to said vehicle more precisely than one-half said center-to-center separation distance.

10. A system according to claim 1, wherein said vehicle further includes a digital-to-analog (D/A) converter, said D/A converter digitizing an output of one of said plurality of reference point sensors, said output being digitized so as to be assigned one of a plurality of possible values, said plurality of possible values including a first value, said first value corresponding to a minimum distance measurement between said one reference point sensor and said one reference point, a second value, said second value corresponding to a maximum distance measurement between said one reference point sensor and said one reference point, a range of intermediate values, said range of intermediate values corresponding to a range of distance measurements in between said maximum distance measurement and said minimum distance measurement;

and wherein said navigation and guidance system measures the position of said traversed reference point relative to said vehicle based on said digitized output.

11. A system according to claim 1, wherein each of said plurality of reference points comprises a magnet, wherein said plurality of reference point sensors are hall effect sensors disposed in a single transverse array, and wherein said single transverse array of hall effect sensors senses only a single reference point at each measurement site.

12. A method of causing an automated guided vehicle to reach a predetermined destination comprising the steps of:

(a) providing a floor comprising a pathway marked by at least one floor disposed reference point for non-guidewire navigation and guidance of said vehicle, said pathway comprising said predetermined destination;

(b) sending a wireless control signal from a central control system, said wireless control signal including information pertaining to a location of said predetermined destination;

(c) receiving and utilizing said wireless control signal at said automated guided vehicle;

(d) optionally obtaining floor related, vehicle-generated coordinate signals through vehicle detection of information from said floor disposed reference point;

(e) communicating said vehicle-generated coordinate signals and said control signal to a vehicle-borne navigation and guidance system; and (f) calculating, in said navigation and guidance system, a guide path comprising exit target coordinates and an exit bearing for said vehicle from said pathway along which said vehicle is to be navigated and guided.

13. A method according to claim 12, further comprising the step of sending additional wireless control signals from said central control system so as to selectively direct the automatic guided vehicle along at least a portion of the pathway toward said predetermined destination.

14. A method according to claim 12, wherein it is necessary to repeat the steps (b) through (e) to cause said vehicle to reach said predetermined destination, and further comprising the step of repeating the steps (b) through (e) until said vehicle reaches said predetermined destination.

15. A method according to claim 12, wherein said guidepath comprises a plurality of guidepath segments separated by a plurality of intermediate destinations, and further comprising the steps of sending a plurality of additional wireless control signals having information pertaining to locations of said plurality of intermediate destinations; and calculating said plurality of guidepath segments based on said information pertaining to said locations of said plurality of intermediate destinations.

16. A method according to claim 12, wherein said reference point is a stationary permanent magnet, and wherein said reference point provides said navigation and guidance system with positional reference information.

17. A method according to claim 16, wherein the obtaining step further comprises the steps of (a) mounting said permanent magnet in said floor to provide a sensible magnetic field;

(b) providing an array of magnetic-field sensors on said vehicle;

(c) storing a plurality of predetermined patterns of magnetic field strength as a function of distance from the center of a magnetic field to one of said sensors on said vehicle;

(d) sensing said magnetic field emanating from said magnet with said sensors thereby producing a plurality of voltages representative of sensed magnetic field strength, each of said sensors producing one of said plurality of voltages;

(e) converting said plurality of voltages into a plurality of distance values, said converting step including the step of accessing said stored plurality of predetermined patterns of magnetic field strength; and (f) estimating the position of said vehicle based upon said converting step.

18. A method according to claim 12, wherein the obtaining step (d) further comprises the step of deriving bearing related signals from a vehicle tuning fork gyro for use by said navigation and guidance system.

19. A method according to claim 18, wherein the obtaining step (d) further comprises the step of controlling the orientation of said tuning fork gyro using an inertial platform.

20. A method according to claim 12, wherein the obtaining step (d) further comprises the step of deriving signals from wheel encoders which measure differential in wheel rotations for use by said navigation and guidance system.

21. A method according to claim 12, wherein the obtaining step (d) further comprises the step of obtaining signals from stationary update markers along one portion of said pathway and obtaining signals from a guidewire along another portion of said pathway.

22. A method according to claim 12, wherein during said guidepath calculating step (f), said guidepath is calculated based upon a then current vehicle position which comprises an origin for and bearing of said selected guidepath, and based upon said predetermined destination and a desired vehicle exit bearing from said predetermined destination.

23. A method for controlling movement of an automated guided vehicle which operates in a self-contained guidance mode whereby said vehicle operates up to a given speed and moves from one path segment to another path segment, comprising the following steps:

(a) providing a floor comprising a pathway, said pathway comprising a vehicle target destination;

(b) sending from a non-vehicle source a move command comprising said vehicle target destination for said vehicle;

(c) receiving said move command by said automated guided vehicle;

(d) decoding said move command related to said vehicle target destination of said vehicle;

(e) transferring said decoded move command to an on-board vehicle controller; and (f) calculating, in said on-board vehicle controller, a guide path for said vehicle to cause said vehicle to move toward said vehicle target destination.

24. A method according to claim 23, wherein said move command sent during the step (a) also comprises a direction for said vehicle at said vehicle target destination.

25. A method according to claim 23, wherein the step (c) is performed in a background area of a multi-tasking operation in a computer on-board said vehicle.

26. A method according to claim 23, wherein it is necessary to repeat the steps (b) through (e) to enable said vehicle to reach said target destination, and further comprising the step of repeating steps (b) through (e) whereby subsequent move commands are received timely such that said vehicle continues without slowing down.

27. A method according to claim 23, wherein said guidepath comprises a plurality of guidepath segments separated by a plurality of intermediate destinations, and further comprising the steps of sending a plurality of additional move commands comprising said plurality of intermediate destinations for said vehicle;

selecting and calculating said plurality of guidepath segments based on said plurality of intermediate destinations.

28. A method according to claim 23, further comprising the step of providing said on-board vehicle controller with positional reference information, said information providing step being performed by a reference point.

29. A method according to claim 28, wherein said reference point is a stationary permanent magnet disposed in said floor along which said vehicle moves.

30. A method according to claim 29, further comprising the steps of (a) mounting said magnet in said floor to provide a sensible magnetic field;

(b) providing an array of magnetic-field sensors on said vehicle;

(c) storing a plurality of predetermined patterns of magnetic field strength as a function of distance from the center of a magnetic field to one of said sensors on said vehicle;

(d) sensing said magnetic field emanating from said magnet with said sensors, said sensing step producing a plurality of voltages representative of sensed magnetic field strength;

(e) converting said plurality of voltages into a plurality of distance values, said converting step including the step of accessing said stored plurality of predetermined patterns of magnetic field strength; and (f) estimating the position of said vehicle based upon said converting step.

31. A method according to claim 23, wherein during said guidepath calculating step said guidepath is calculated based upon a then current vehicle position which comprises an origin for and bearing of the selected guidepath, and based upon said vehicle target destination and a desired vehicle exit bearing from said target destination.

32. An automated guided vehicle system for autonomous navigation of an automated guided vehicle along a pathway on a floor to a predetermined destination, the system comprising:

a plurality of widely-spaced, floor-disposed reference points which mark said pathway for non-guidewire navigation and guidance of said vehicle;

a guide path comprising exit target coordinates for said vehicle from said pathway along which said vehicle is to be navigated and guided, said guide path enabling said vehicle to navigate said pathway;

a vehicle controller having a vehicle controller transceiver, said vehicle controller transceiver sending a wireless control signal to said vehicle which includes information pertaining to a location of said predetermined destination; and said vehicle, said vehicle further including a vehicle transceiver which receives said wireless control signal from said vehicle controller, said vehicle transceiver in conjunction with said vehicle controller transceiver forming a wireless communication link, a navigation and guidance system which utilizes said wireless control signal from said vehicle controller transceiver, said navigation and guidance system including an encoder which measures distance traveled by said vehicle, a gyro which measures bearing of vehicle travel, a reference point sensor system including a plurality of sensors which generates position information by detecting said floor disposed reference points, and a processor which processes said position information from said reference point sensor system and information from said encoder and said gyro to enable said automatic guided vehicle to follow said guide path autonomously.

33. An automated guided vehicle system according to claim 32, wherein said plurality of reference point sensors are dynamically calibrated as said vehicle travels between each of said plurality of floor disposed reference points.

34. An automated guided vehicle system according to claim 32, wherein said plurality of reference points each comprise a magnet which emits a detectable field which is unipolar in character.

35. An automated guided vehicle system according to claim 32, wherein said plurality of reference point sensors include first and second reference point sensors, said first and second reference point sensors having a center-to-center separation distance;

and wherein said first and second reference point sensors are used to measure the position of said traversed reference point relative to said vehicle more precisely than one-half said center-to-center separation distance.

36. An automated guided vehicle system according to claim 32, wherein said vehicle further includes a digital-to-analog (D/A) converter, said D/A converter digitizing an output of one of said plurality of reference point sensors, said output being digitized so as to be assigned one of a plurality of possible values, said plurality of possible values including a first value, said first value corresponding to a minimum distance measurement between said one reference point sensor and said one reference point, a second value, said second value corresponding to a maximum distance measurement between said one reference point sensor and said one reference point, a range of intermediate values, said range of intermediate values corresponding to a range of distance measurements in between said maximum distance measurement and said minimum distance measurement;

and wherein said navigation and guidance system measures the position of said traversed reference point relative to said vehicle based on said digitized output.

37. An automated guided vehicle system according to claim 32, wherein each of said plurality of reference points comprises a magnet, wherein said plurality of reference point sensors are hall effect sensors disposed in a single transverse array, and wherein said single transverse array of hall effect sensors senses only a single reference point at each measurement site.

38. A method of causing an automated guided vehicle to reach a predetermined destination comprising the steps of:

(a) disposing a plurality of reference points in a floor for non-guidewire navigation and guidance of said vehicle, said reference points marking a pathway, said pathway extending from a vehicle origin to said predetermined destination;

(b) determining a guide path comprising exit target coordinates and an exit bearing for said vehicle from said pathway along which said vehicle is to be navigated and guided;

(c) sending a wireless control signal from an off-vehicle controller, said wireless control signal including information pertaining to a location of said predetermined destination;

(d) receiving and utilizing said wireless control signal at said automated guided vehicle; and (e) autonomously traversing said guide path, said traversing step including the step of constraining said vehicle to said guide path such that the path actually traversed by said vehicle is substantially the same as said guide path, said constraining step including the steps of (1) generating information pertaining to a linear distance traveled by said vehicle and communicating said linear distance information to a vehicle-borne navigation and guidance system, (2) generating information pertaining to bearing of said vehicle and communicating said bearing information to said vehicle-borne navigation and guidance system, and (3) generating floor-related position information by detecting said floor disposed reference points, and communicating said floor-related position information to said vehicle-borne navigation and guidance system.

39. A method according to claim 38, wherein said guide path is determined after said automated guided vehicle is put into operation, and wherein the combination of the determining and traversing steps further comprises the following substeps:

determining a sequence of reference points which extend non-colinearly from said vehicle origin to said predetermined destination, said sequence of reference points including first, second, and third reference points, providing said automated guided vehicle with the coordinates of said first, second and third reference points, calculating a first calculated path segment, said first calculated path segment extending from said vehicle origin to said first reference point, said first calculated path segment being calculated based upon said vehicle origin, a bearing away from said vehicle origin, said coordinates of said first reference point, and a desired vehicle bearing at said first reference point, traversing a first traversed path segment to said first reference point, wherein said first traversed path segment is substantially the same as said first calculated path segment, and wherein differences between said first traversed path segment and said first calculated path segment are attributable at least in part to vehicle travel error, obtaining a first vehicle position measurement from said first reference point, said first vehicle position measurement indicating the coordinates of said vehicle when said vehicle reaches said first reference point, calculating a second calculated path segment, said second calculated path segment extending from said coordinates of said vehicle when said vehicle reaches said first reference point to said coordinates of said second reference point, said second calculated path segment being calculated based upon said coordinates of said vehicle obtained from said first reference point, a bearing of said vehicle when said vehicle reaches said first reference point, said coordinates of said second reference point and a desired vehicle bearing at said second reference point, traversing a second traversed path segment to said second reference point, wherein said second traversed path segment is substantially the same as said second calculated path segment, and wherein differences between said second traversed path segment and said second calculated path segment are attributable at least in part to vehicle travel error, obtaining a second vehicle position measurement from said second reference point, said second vehicle position measurement indicating the coordinates of said vehicle when said vehicle reaches said second reference point, calculating a third calculated path segment, said third calculated path segment extending from said coordinates of said vehicle when said vehicle reaches said second reference point to said coordinates of said third reference point, said third calculated path segment being calculated based upon said coordinates of said vehicle obtained from said second reference point, a bearing of said vehicle when said vehicle reaches said second reference point, said coordinates of said third reference point and a desired vehicle bearing at said third reference point, and traversing a third traversed path segment to said third reference point, wherein said third traversed path segment is substantially the same as said third calculated path segment, and wherein differences between said third traversed path segment and said third calculated path segment are attributable at least in part to vehicle travel error, and wherein said first, second and third traversed path segments, and additional traversed path segments if necessary, extend from said vehicle origin to said predetermined destination.

40. A method according to claim 38, wherein said guide path comprises a plurality of guide path segments, each guide path segment being calculated based upon an actual vehicle position at an origin of the guide path segment, an actual bearing away from said origin, an endpoint of said guide path segment, and a desired vehicle bearing at said endpoint.

41. A method according to claim 38, wherein said guide path is formed of a sequence of reference points which are disposed non-colinearly with respect to each other, said sequence of reference points being a subset of said plurality of reference points.

42. A method according to claim 38, wherein said guide path is formed of at least one straight path segment and at least one curved path segment, the combination of said at least one straight path segment and at least one curved path segment being disposed between two consecutive reference points, and wherein said at least one straight path segment and said at least one curved path segment are separately calculated.

43. A method according to claim 38, wherein said guide path determining step further includes the step of calculating a guidepath, and wherein said guide path calculating step further includes the steps of (1) generating a coefficient which at least partially defines a curved path segment, (2) calculating said curved path segment based on said coefficient, (3) sequentially combining said curved path segment with a straight line segment, and (4) repeating said (1) generating, (2) calculating and (3) combining steps as necessary until said guide path has been determined.

44. A method according to claim 38, wherein said guide path determining step further includes the steps of (1) determining a sequence of reference points which extend non-colinearly from said vehicle origin to said desired vehicle destination, (2) providing said vehicle with the coordinates of said sequence of reference points, and (3) calculating a sequence of guide path segments based on said coordinates of said sequence of reference points, wherein said individual reference points mark entry ends and departure ends of at least some individual guide path segments.

45. A method according to claim 38, further comprising the step of dynamically calibrating a plurality of reference point sensors which detect said floor disposed reference points, said plurality of reference point sensors being dynamically calibrated such that calibration occurs as said vehicle travels between each of said plurality of floor disposed reference points.

46. A method according to claim 38, wherein said plurality reference points each comprise a magnet which emits a detectable field which is unipolar in character.

47. A method according to claim 38, further comprising the step of providing said vehicle with a plurality of reference point sensors including at least first and second reference point sensors, said first and second reference point sensors having a center-to-center separation distance;

and wherein the step of generating floor-related position information further includes the step of making a position measurement, the position measurement representing the position of said vehicle with respect to one of said floor disposed reference points, said position measurement being substantially more precise than one-half the center-to-center separation distance.

48. A method according to claim 47, and wherein the step of generating floor-related position information further comprises the steps of sensing one of said plurality of reference points with said plurality of reference point sensors, digitizing an output of one of said plurality of reference point sensors, said output being digitized so as to be assigned one of a plurality of possible values, said plurality of possible values including a first value, said first value corresponding to a minimum distance measurement between said one reference point sensor and said one reference point, a second value, said second value corresponding to a maximum distance measurement between said one reference point sensor and said one reference point, a range of intermediate values, said range of intermediate values corresponding to a range of distance measurements in between said maximum distance measurement and said minimum distance measurement, and determining the position of said vehicle based on said digitized output.

49. A method according to claim 48, wherein each of said plurality of reference points comprises a magnet, wherein said step of generating floor-related position information is performed by a single transverse array of hall effect sensors, and wherein said single transverse array of hall effect sensors senses only a single reference point at each measurement site.

* * * * *

UNITED STATES PATENT AND TRADEMARK OFFICE

CERTIFICATE OF CORRECTION

PATENT NO. : B1 5,650,703
DATED : March 2, 1999
INVENTOR(S) : Yardley et al.

It is certified that error appears in the above-identified patent and that said Letters Patent is hereby corrected as shown below:

Please note that the following corrections apply to the above-identified Reexamination Certificate.

Column 4, line 3, after "size" insert -- of --.

Column 4, line 41, delete "is" and substitute -- being -- therefor.

Column 4, line 49, delete "vehicle receives" and substitute -- vehicles receive -- therefor.

Column 6, line 1, delete "which".

ON THE TITLE PAGE

[73] Assignee: "Harris Trust and Savings Bank, Chicago, Ill." should read -- HK Systems, Inc., New Berlin, WI. --.

Signed and Sealed this

Eighth Day of May, 2001

*Attest:*

Nicholas P. Godici

NICHOLAS P. GODICI

*Attesting Officer*

*Acting Director of the United States Patent and Trademark Office*

US005650703B1

REEXAMINATION CERTIFICATE (3747th)

United States Patent [19]

[11] B1 5,650,703

Yardley et al.

[45] Certificate Issued Mar. 2, 1999

[54] DOWNWARD COMPATIBLE AGV SYSTEM AND METHODS

[75] Inventors: James V. Yardley, Centerville; Gary L. Whatcott, Holladay; John A. M. Petersen; Bryan A. Bloomfield, both of Bountiful; Vaughn W. Guest, Farmington; Rick S. Mottes, Roy; Robert K. Forman, Taylorsville; L. Bruce Christensen, Kaysville, all of Utah; Joseph Zuercher, Brookfield; Herman P. Schutten, Milwaukee, both of Wis.

[73] Assignee: Harris Trust and Savings Bank, Chicago, Ill.

Reexamination Request:

No. 90/004,773, Sep. 30, 1997

Reexamination Certificate for:

| | |
|---|---|
| Patent No.: | **5,650,703** |
| Issued: | **Jul. 22, 1997** |
| Appl. No.: | **637,919** |
| Filed: | **Apr. 25, 1996** |

Related U.S. Application Data

[62] Division of Ser. No. 251,560, Jul. 18, 1994, which is a division of Ser. No. 908,691, Jun. 26, 1992, Pat. No. 5,341,130, which is a division of Ser. No. 621,486, Dec. 3, 1990, Pat. No. 5,281,901, which is a continuation-in-part of Ser. No. 618,793, Nov. 27, 1990, Pat. No. 5,187,664, and Ser. No. 602,609, Oct. 24, 1990, Pat. No. 5,191,528, which is a continuation-in-part of Ser. No. 545,174, Jun. 28, 1990, abandoned.

[51] Int. Cl.[6] .......... B62D 1/28

[52] U.S. Cl. .......... 318/587; 318/586; 901/1; 180/167; 180/168; 364/424.02

[58] Field of Search .......... 318/587, 586; 901/1, 3; 180/167, 168; 364/424.02, 449

[56] References Cited

U.S. PATENT DOCUMENTS 2,847,080 8/1958 Zworykin et al. .

3,245,493 4/1966 Barrett, Jr. .

(List continued on next page.)

FOREIGN PATENT DOCUMENTS 0 159 680 4/1985 European Pat. Off. .

(List continued on next page.)

OTHER PUBLICATIONS

Cox, Ingemar J. "Blanche—An Experiment in Guidance and Navigation of an Autonomous Robot Vehicle," *IEEE Trans*

(List continued on next page.)

*Primary Examiner*—Paul Ip

[57] ABSTRACT

An automated guided vehicle (AGV) control system which is downward compatible with existing guidewire systems providing both guidewire navigation and communication and autonomous navigation and guidance and wireless communication between a central controller and each vehicle. FIGS. 90, 91, 92, 93, and 94 provide a map showing relative orientation of the schematic circuits seen in FIGS. 90A–B, 91A–B, 92A–B, 93A–B, and 94A–B, respectively over paths marked by update markers which may be spaced well apart, such as fifty feet. Redundant measurement capability using inputs from linear travel encoders from the vehicle's drive wheels, position measurements from the update markers, and bearing measurements from a novel angular rate sensing apparatus, in combination with the use of a Kalman filter, allows correction for navigation and guidance errors caused by such factors as angular rate sensor drift, wear, temperature changes, aging, and early miscalibration during vehicle operation. The control system employs high frequency two-way data transmission and reception capability over the guidewires and via wireless communications. The same data rates and message formats are used in both guidewire and wireless communications systems. Substantially the same communications electronics are used for the central controller and each vehicle. Novel navigation and guidance algorithms are used to select and calculate a non-linear path to each next vehicle waypoint when the vehicle is operating in the autonomous mode. The non-linear path originates with an initial direction equal to the heading of the vehicle as it enters the path and a waypoint heading defined as part of the message received from the central control system which plans and controls travel of each vehicle in the system.

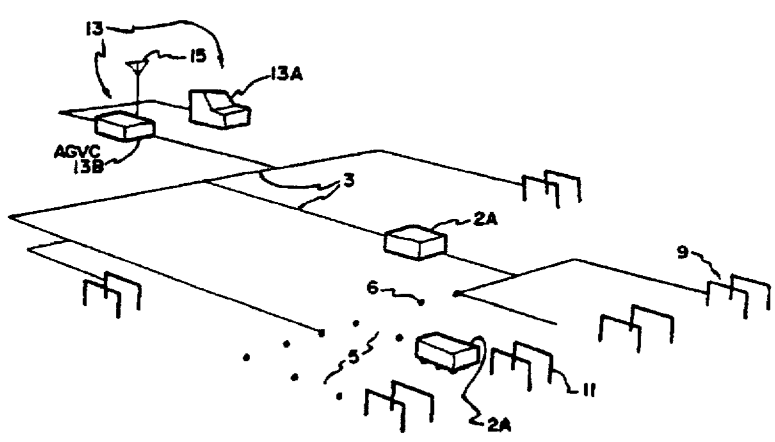

U.S. PATENT DOCUMENTS

| | | |
|---|---|---|
| 3,738,443 | 6/1973 | Kubo . |
| 3,845,289 | 10/1974 | French . |
| 3,881,568 | 5/1975 | Ando et al. . |
| 3,925,641 | 12/1975 | Kashio . |
| 3,933,099 | 1/1976 | Sieb . |
| 4,084,241 | 4/1978 | Tsumura . |
| 4,139,889 | 2/1979 | Ingels . |
| 4,278,142 | 7/1981 | Kono . |
| 4,309,758 | 1/1982 | Halsall et al. . |
| 4,328,545 | 5/1982 | Halsall et al. . |
| 4,347,573 | 8/1982 | Friedland . |
| 4,347,730 | 9/1982 | Fisher et al. . |
| 4,465,155 | 8/1984 | Collins . |
| 4,500,970 | 2/1985 | Daemmer . |
| 4,515,221 | 5/1985 | van der Lely . |
| 4,530,056 | 7/1985 | MacKinnon et al. . |
| 4,541,049 | 9/1985 | Ahlbom . |
| 4,556,940 | 12/1985 | Katoo et al. . |
| 4,613,804 | 9/1986 | Swenson . |
| 4,622,644 | 11/1986 | Hansen . |
| 4,626,995 | 12/1986 | Lofgren et al. . |
| 4,628,453 | 12/1986 | Kamejima et al. . |
| 4,647,784 | 3/1987 | Stephens . |
| 4,653,002 | 3/1987 | Barry . |
| 4,680,715 | 7/1987 | Pawelek . |
| 4,698,775 | 10/1987 | Koch et al. . |
| 4,706,120 | 11/1987 | Slaughter et al. . |
| 4,714,124 | 12/1987 | Laib . |
| 4,727,492 | 2/1988 | Reeve et al. . |
| 4,731,613 | 3/1988 | Endo et al. . |
| 4,745,551 | 5/1988 | Wand . |
| 4,750,123 | 6/1988 | Christian . |
| 4,758,959 | 7/1988 | Thoone et al. . |
| 4,772,832 | 9/1988 | Okazaki et al. . |
| 4,779,203 | 10/1988 | McClure et al. . |
| 4,791,570 | 12/1988 | Sherman et al. . |
| 4,792,907 | 12/1988 | Ikeda et al. . |
| 4,811,228 | 3/1989 | Hyyppä . |
| 4,816,998 | 3/1989 | Ahlbom . |
| 4,817,000 | 3/1989 | Eberhardt . |
| 4,829,442 | 5/1989 | Kadanoff et al. . |
| 4,847,773 | 7/1989 | van Helsdingen et al. . |
| 4,847,774 | 7/1989 | Tomikawa et al. . |
| 4,852,677 | 8/1989 | Okazaki . |
| 4,860,209 | 8/1989 | Sugimoto et al. . |
| 4,866,617 | 9/1989 | Matsuda et al. . |
| 4,879,658 | 11/1989 | Takashima et al. . |
| 4,882,694 | 11/1989 | Brubaker et al. . |
| 4,887,013 | 12/1989 | Doth . |
| 4,902,948 | 2/1990 | Sherman et al. . |
| 4,908,557 | 3/1990 | Sudare et al. . |
| 4,918,607 | 4/1990 | Wible . |
| 4,926,103 | 5/1990 | Summerville et al. . |
| 4,939,651 | 7/1990 | Onishi . |
| 4,940,925 | 7/1990 | Wand et al. . |
| 4,979,113 | 12/1990 | Roberts et al. . |
| 4,982,329 | 1/1991 | Tabata et al. . |
| 4,990,841 | 2/1991 | Elder . |
| 4,999,782 | 3/1991 | BeVan . |
| 5,029,088 | 7/1991 | Minami . |
| 5,048,637 | 9/1991 | Lomasney . |
| 5,068,654 | 11/1991 | Husher . |
| 5,075,693 | 12/1991 | McMillan et al. . |
| 5,109,340 | 4/1992 | Kanayama . |
| 5,109,940 | 5/1992 | Yardley . |
| 5,111,401 | 5/1992 | Everett, Jr. et al. . |
| 5,127,486 | 7/1992 | Yardley et al. . |
| 5,154,248 | 10/1992 | Schwager et al. . |
| 5,154,249 | 10/1992 | Yardley . |
| 5,163,001 | 11/1992 | Luke, Jr. . |
| 5,175,415 | 12/1992 | Guest . |
| 5,175,480 | 12/1992 | McKeefery et al. . |
| 5,179,329 | 1/1993 | Nishikawa et al. . |
| 5,187,664 | 2/1993 | Yardley et al. . |
| 5,191,528 | 3/1993 | Yardley et al. . |
| 5,202,832 | 4/1993 | Lisy . |
| 5,204,814 | 4/1993 | Noonan et al. . |
| 5,216,605 | 6/1993 | Yardley et al. . |
| 5,220,263 | 6/1993 | Onishi et al. . |
| 5,229,941 | 7/1993 | Hattori . |
| 5,245,335 | 9/1993 | Hill et al. . |
| 5,255,195 | 10/1993 | Mochizuki et al. . |
| 5,267,173 | 11/1993 | Tanizawa et al. . |
| 5,280,431 | 1/1994 | Summerville et al. . |
| 5,281,901 | 1/1994 | Yardley et al. . |
| 5,283,739 | 2/1994 | Summerville et al. . |
| 5,329,449 | 7/1994 | Tanizawa et al. . |
| 5,341,540 | 8/1994 | Soupert et al. . |
| 5,347,456 | 9/1994 | Zhang et al. . |
| 5,367,456 | 11/1994 | Summerville et al. . |
| 5,369,591 | 11/1994 | Broxmeyer . |
| 5,387,853 | 2/1995 | Ono . |
| 5,610,815 | 3/1997 | Gudat et al. . |

FOREIGN PATENT DOCUMENTS

| | | |
|---|---|---|
| 29 01 318 A 1 | 1/1979 | Germany . |
| 30 03 287 A 1 | 1/1980 | Germany . |
| 39 12 353 A 1 | 4/1989 | Germany . |
| 57-93406 | 6/1982 | Japan . |

OTHER PUBLICATIONS actions on Robotics and Automation, vol. 7, No. 2, Apr. 1991, pp. 193–204.

Cox, Ingemar J., David A. Kapilow, Walter J. Kropfi, & Jonathan E. Shopiro, "Real-time Software for Robotics," *AT&T Technical Journal*, vol. 67, No. 2, Mar./Apr. 1988, pp. 61–72.

Cox, Ingemar J. & Narain H. Gehani, "Exception Handling in Robotics," *Computer*, vol. 22, No. 3, Mar. 1989, pp. 43–49.

Cox, I.J. & J.B. Kruskal, "Determining the 2– or 3–Dimensional Similarity Transformation between a Point Set and a Model Made of Lines and Arcs," *Proceedings of the 28th IEEE Conference on Decision and Control*, vol. 2, pp. 1167–1172, Dec. 13–15, 1989.

Eisenreich, N., A. Herzog, F. Sinn, & H.P. Kugler, "Combined Navigation and Anti–collision Sensor for Transport Robots," *Sensors and Actuators*, vol. 20 (1989), pp. 207–212.

Paul, Richard P. *Robot Manipulators: Mathematics, Programming, and Control*, MIT Press, 1981.

Fraunhofer–Gesellschaft Wir informieren: Seitengabel–FTS brochure in German, undated.

Autonome Robert Gmbh AR Caesar ATS Autonomes Transport System brochure in German and English translation, undated.

IBEO Gmbh Lasertechnik Sensors for Colliosion |sic| Protection, Laser for Collision Protection, undated brochure.

IBEO Laser Distance Sensors PS 2, PS10 undated brochure.

IBEO Laser Distance Sensors PS50, PS100 undated brochure.

IBEO GmbH Lasertechnik Laser Distance Sensor PS100E undated brochure.

Regalbediengeräte AKL/HRL–Systeme, Electrolux Constructor undated brochure in German.

Verpackungstechnishes Dienstleistungszentrum undated brochure in German.

*IEEE NAECON 1984,* "Fast Reaction and High Reliability of Strapdown Navigation Systems Using Ring Laser Gyros", S.P. Divakaruni & C.E. Mueller, vol. 1, pp. 315–322.

*IEEE Plans '84 Position Location and Navigation Symposium,* "Laser Gyro Land Navigation System Performance Predictions and Field Results", C.E. Mueller & G. Adams, pp. 81–90.

*Transactions of the ASME,* "Evaluation and Time–Scaling of Trajectories for Wheeled Mobile Robots", T.J. Graettinger & B.H. Krogh, vol. 111, Jun. 1989, pp. 222–231.

Hitachi Cable, Ltd., "Commercial applications of mass–produced fiber optic gyros", H. Kajioka et al.

*IROS '90,* "Towards a New Frontier of Applications", vol. 1.

*IEEE/RSJ IROS '89,* "The Autonomous Mobile Robots and its Applications", IEEE Cat. No. 89TH0265–9, pp. i–xv.

"Autonomous Robot Vehicles", I.J. Cox & G.T. Wilfong.

*Int. J. Prod. Res.,* 1989, "Virtual flow paths for free–ranging automated guided vehicle systems", R.J. Gaskins et al., vol. 27, pp. 91–100.

"Automated Guided Vehicles and Automated Manufacturing", R.K. Miller, 1987.

Vehicle Dispatch, pp. 29–30.

*Int. J. Prod. Res.,* 1989, "A LISP–based controller for free–ranging automated guided vehicle systems", F. Taghaboni & J.M.A. Tanchoco, pp. 173–188.

Cox, Ingemar J. "Blanche: An autonomous robot vehicle for structured environments," *1988 IEEE International Conference on Robotics and Automation Proceedings,* vol. 2, Apr. 24–29, 1988.

Auch, W. and Schlemper, E., "Fiber Optic Gyroscope," *Electrical Communications,* vol. 58, No. 3, 1984.

Leonard, John, Hugh Durrant–Whyte, and Ingemar J. Cox. "Dynamic Map Building for an Autonomous Mobile Robot," *IEEE International Workshop on Intelligent Robots and Systems IROS '90,*pp. 89–96.

Autonome Roboter GmbH & Co. KG AR Caesar ATS Automated Transport System undated German and English brochures.

Asama, H.: Yatsumoto, A. and Yoshiki., "Design of Autonomous and Distributed Robot System: Actress," *Proceedings,* IEEE/RSJ International Workshop on Intelligent Robots and Systems '89 (Sep. 4–6, 1989).

Miller, Richard K., "Automated Guided Vehicles and Automated Manufacturing," *Society of Manufacturing Engineers,* Chapters 1, 2, and 3, 1987.

Mueller, Conrad E. and Adams, Gary, "Laser Gyro Land Navigation System Performance Predictions and Field Results," *Proceedings,* IEEE Plans '84 Position Location and Navigation Symposium (Nov. 26–29, 1984).

Murata, Satoshi, "Onboard Locating System," IEEE/RSJ International Workshop on Intelligent Robots and Systems '89 (Sep. 4–6, 1989).

Banta, Larry E., "Advanced Dead Reckoning Navigation for Mobile Robots," PH.D. Thesis, Georgia Institute of Technology (Jan. 1987).

Durrant–Whyte, Hugh F. and Leonard, John J., Navigating by Correlating Geometric Sensor Data,: IEEE/RSJ International Workshop on Intelligent Robots and Systems '89 (Sep. 4–6, 1989).

Kajiwara, T.; Yamaguchi, J. and Kanemoto,J., "A Security Guard Robot which Patrols Using Map Information," *Proceedings,* IEEE/RSJ International Workshop on Intelligent Robots and Systems '89 (Sep. 4–6, 1989).

Kanayama, Y., "Locomotion Functions for a Mobile Robot Language," *Proceedings,* IEEE/RSJ International Workshop on Intelligent Robots and Systems '89 (Sep. 4–6, 1989).

Liscano, R. and Green, D., "Design and Implementation on a Trajectory Generator for an Indoor Mobile Robot," *Proceedings,* IEEE/RSJ International Workshop on Intelligent Robots and Systems '89 (Sep. 4–6, 1989).

Nelson, Winston L., "Continuous Steering—Function Control of Robot Carts," *IEEE Transactions on Industrial Electronics,* vol. 36, No. 3, Aug. 1989.

Nelson, Winston L. and Cox, Ingemar J., "Local Path Control for an Autonomous Vehicle," *Proceedings,* 1988 IEEE International Conference on Robotics and Automation (Apr. 24–29, 1988).

Singh, Sanjiv Jeff, and Shin, Dong Hun, Position Based Path Tracking for Wheeled Mobile Robots, IEEE/RSJ International Workshop on Intelligent Robots and Systems '89 (Sep. 4–6, 1989).

Takahashi, A.; Hongo, T.; Nino Miya, Y. and Sugimoto, G., "Local Path Planning and Motion Control for AGV in Positioning," *Proceedings,* IEEE/RSJ International Workshop on Intelligent Robots and Systems '89 (Sep. 4–6, 1989).

Yamashita, T.; Murata, M.; Onishi, M. and Tabata, H., "Start of Autonomous Mobile Robots' Operation in Clean Room," *Proceedings,* IEEE/RSJ International Workshop on Intelligent Robots and Sytems '89 (Sep. 4–6, 1989).

Zapata R.; Thevenon, J.B.; Perrier, M. and Pommier, E., "Path Planning and Trajectory Planning for Non–Holonomic Mobile Robots," *Proceedings,* IEEE/RSJ International Workshop on Intelligent Robots and Systems '89 (Sep. 4–6, 1989).

Amans, Robert L. "Wireless Guidance: Is It Necessary?" *Automated Manufacturing Exhibition & Conference,* Greenville, South Carolina, Apr. 12–14, 1988, pp. 1–11.

Clayton, Larry D., Errol P. EerNisse, Roger W. Ward, Robert B. Wiggins. "Miniature Crystalline Quartz Electromechanical Structures," *IEEE Workshop Micro Electromechanical Systems,* Feb. 20–22, 1989, Salt Lake City, Utah.

Miller, Gabriel and Eric R. Wagner. "An Optical Rangefinder for Autonomous Robot Cart Navigation," *Proceedings of SPIE—The International Society for Optical Engineering,* William J. Wolfe and Wendell H. Chun, eds., vol. 852 Mobile Robots II (1987), pp. 132–144.

Wilfong, Gordon T. "Motion Planning for an Autonomous Vehicle," *Proceedings,* 1988 IEEE International Conference on Robotics and Automation, Apr. 24–29, 1988, vol. 1, pp. 529–533.

Leonard, John, Hugh Durrant–Whyte, and Ingemar Cox. "Dynamic Map Building for an Autonomous Mobile Robot," *IEEE International Workshop on Intelligent Robots and Systems,* pp. 89–96.

Hugh Durrant–Whyte, Eduardo Nebot, Steve Scheding, Sala Sukkarieh, Steve Clark, *The Design of Ultra–High Integrity Navigation Systems for Large Autonomous Vehicles,* Dept. Mech. Engrg. University of Sydney, NSW 2006, Australia, |hugh, nebot, scheding, sala, clark|@tiny.me.su.oz.au (Undated).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–7, 11–20, 22, 32, 33, 36–38, 40, 41, 45 and 47–49 is confirmed.

Claims 8, 10, 21, 34, 39, 42–44 and 46 are cancelled.

Claims 9, 23 and 35 are determined to be patentable as amended.

Claims 24–31, dependent on an amended claim, are determined to be patentable.

New claims 50–64 are added and determined to be patentable.

9. A system according to claim 1, wherein said plurality of reference point sensors include first and second reference point sensors, said first and second reference point sensors having a center-to-center separation distance;

and wherein said first and second reference point sensors are used to measure the position of [said] *a* traversed reference point relative to said vehicle more precisely than one-half said center-to-center separation distance.

23. A method for controlling movement of an automated guided vehicle which operates in a self-contained guidance mode whereby said vehicle operates up to a given speed and moves from one path segment to another path segment, comprising the following steps:

(a) providing a floor comprising a pathway, *said pathway being marked by a plurality of spaced apart reference points that are each disposed in said floor,* said pathway comprising a vehicle target destination;

(b) sending from a non-vehicle source a move command comprising said vehicle target destination for said vehicle;

(c) receiving said move command by said automated guided vehicle;

(d) decoding said move command related to said vehicle target destination of said vehicle;

(e) transferring said decoded move command to an on-board vehicle controller; [and]

(f) calculating, in said on-board vehicle controller, a guide path for said vehicle to cause said vehicle to move toward said vehicle target destination*; and*

*(g) generating position information by detecting a single one of said reference points.*

35. A system according to claim 32, wherein said plurality of reference point sensors include first and second reference point sensors, said first and second reference point sensors having a center-to-center separation distance;

and wherein said first and second reference point sensors are used to measure the position of [said] *a* traversed reference point relative to said vehicle more precisely than one-half said center-to-center separation distance.

*50. A system according to claim 1, wherein said off-vehicle controller comprises an off-board management computer in communication with an off-board computer connected to a wireless radio that is connected to an antenna.*

*51. A system according to claim 1, wherein said off-vehicle controller comprises an off-board computer connected to a wireless radio that is connected to an antenna.*

*52. A system according to claim 51, wherein said wireless radio comprises a transceiver.*

*53. A system according to claim 1, wherein said off-vehicle controller comprises an automatic guided vehicle controller connected to a management computer that controls said automatic guided vehicle controller.*

*54. A system for non-guidewire navigation and guidance of an automated guided vehicle along a predetermined pathway across a floor, the system comprising:*

*a plurality of widely spaced apart and generally cylindrical reference points disposed in said floor;*

*a wireless receiver which is disposed on said vehicle and which receives a wireless control signal, said wireless control signal including a predetermined destination and being sent from an off-vehicle controller;*

*a processor which selects and calculates a guidepath, that does not require any guidewire for navigation or guidance of said guidepath, from a plurality of possible guidepaths based upon a current vehicle position which comprises an origin for and bearing of the selected guidepath, and based upon said predetermined destination;*

*a plurality of reference point sensors which are disposed on said vehicle adjacent said floor and which generate position information by detecting a single one of said plurality of reference points, said position information being used by a vehicle navigation and guidance system to constrain said vehicle to said selected and calculated guidepath such that the path actually traversed by said vehicle comprises said predetermined destination;*

*wherein said vehicle navigation and guidance system further comprises*

*a gyroscope on board said vehicle for enabling an estimate of a direction of said vehicle to be determined;*

*a wheel encoder carried by said vehicle and in operable communication with said floor for enabling an estimate of a distance travelled by said vehicle to be determined;*

*a Kalman filter having at least two error state variables for utilizing said position information, said direction estimate, and said distance travelled estimate and providing corrections to an estimated position and an estimated bearing of said vehicle; and*

*wherein one of said error state variables relates to a correction to said estimated position of said vehicle and another of said error state variables relates to a correction to said estimated bearing of said vehicle.*

*55. A system according to claim 54, wherein said error state variable related to said correction to said estimated position of said vehicle comprises 1) a first error state variable that provides a correction to an estimated X-coordinate of said estimated position and 2) a second error state variable that provides a correction to an esti-*

*mated Y-coordinate of said estimated position, and wherein said Kalman filter further comprises 1) an error state variable that provides a calibrating correction to said wheel encoder, 2) an error state variable that provides a calibrating correction to said gyro.*

*56. A system according to claim 54, further comprising a steering algorithm that is used with said position information to constrain said vehicle to said selected and calculated guidepath.*

*57. A system according to claim 54 wherein said processor also 1) selects a guidepath-related calculation that said processor implements based upon i) whether said vehicle is traveling along a straight line portion of said pathway or ii) whether said vehicle is traveling along a curved portion of said predetermined pathway, 2) implements said selected guidepath-related calculation providing a result from said selected guidepath-related calculation, and 3) uses said result from said selected guidepath-related calculation in calculating said guidepath.*

*58. An automated guided vehicle system for autonomous navigation of an automated guided vehicle along a predetermined pathway on a floor to a predetermined destination without using any guidewire, the system comprising:*

- *a plurality of widely spaced, discrete, floor-disposed, magnetic-field emanating reference points that mark said predetermined pathway for non-guidewire navigation and guidance of said vehicle wherein 1) said reference points are widely spaced apart by as much as fifty feet between adjacent said reference points, and 2) each of said plurality of said reference points are disposed in said floor such that no portion of any of said plurality of said reference points extends above said floor;*
- *a guide path comprising exit target coordinates for said vehicle from said predetermined pathway along which said vehicle is to be navigated and guided, said guide path enabling said vehicle to navigate said predetermined pathway such that said vehicle follows said predetermined pathway;*
- *a vehicle controller not on board said vehicle having a vehicle controller transceiver, said vehicle controller transceiver sending a wireless control signal to said vehicle which includes information pertaining to a location of said predetermined destination; and said vehicle further including*
- *a vehicle transceiver which is on board said vehicle and which receives said wireless control signal from said vehicle controller, said vehicle transceiver in conjunction with said vehicle controller transceiver forming a wireless communications link;*
- *a navigation and guidance system which is on board said vehicle and which utilizes said wireless control signal from said vehicle controller, said navigation and guidance system including*
  - *a first encoder, which is on board said vehicle and which includes a first wheel in contact with said floor, and which measures a first distance traveled by said vehicle;*
  - *a second encoder, which is on board said vehicle and which includes a second wheel in contact with said floor, and which measures a second distance traveled by said vehicle;*
  - *a gyro on board said vehicle which measures a bearing of vehicle travel;*
  - *a reference point sensor system including a plurality of magnetic field sensing sensors arranged in an array on board said vehicle that 1) is transverse to a lengthwise direction of said vehicle, 2) is longer than the size one of said reference points, and 3) generates position information by detecting a single one of said reference points from a single passage by said vehicle over said single one of said reference points from which a coordinate location can be determined;*
  - *a processor which processes while said vehicle is moving 1) said position information from said reference point sensor system and 2) said information from said first encoder of said first distance travelled measured, 3) said information from said second encoder of said second distance travelled measured, and 4) said information from said gyro of said bearing, and using a Kalman filter wherein said processor generates 1) a correction to an estimated coordinate position of said vehicle and 2) a correction for each of said first encoder, said second encoder, and said gyro to be applied before i) said first encoder measures said first distance travelled in the future, ii) said second encoder measures said second distance travelled in the future, and iii) said gyro measures said bearing in the future, wherein said corrections and said position information are used to enable said vehicle to follow said guide path autonomously without using any guidewire.*

*59. An automated guided vehicle system according to claim 58, wherein said guide path is calculated by said processor.*

*60. An automated guided vehicle system according to claim 59, further comprising an automatic guided vehicle steer-related calculation performed by said processor to enable said vehicle to steer such that it follows said guide path autonomously without using any guidewire to thereby enable said vehicle to follow said predetermined pathway.*

*61. An automated guided vehicle system according to claim 60, wherein each said reference point comprises a generally cylindrical magnet.*

*62. An automated guided vehicle system according to claim 60, wherein said predetermined pathway comprises a plurality of spaced apart points with each of which is defined by an X-coordinate and a Y-coordinate.*

*63. An automated guided vehicle system according to claim 58, 1) comprising a plurality of said vehicles, 2) wherein said vehicle controller i) sends a said wireless control signal for one of said plurality of said vehicles and ii) sends a said wireless control signal for the other of said plurality of said vehicles, 3) wherein said transceiver of each of said plurality of said vehicle receives said control signals, and 4) wherein each of said wireless control signals is uniquely addressable to one of said plurality of said vehicles.*

*64. A method for controlling movement of an automated guided vehicle which operates in a self-contained guidance mode whereby said vehicle operates up to a given speed and moves from one path segment to another path segment without the use of any guidewire, comprising the following steps:*

*(a) providing 1) a floor comprising a predetermined pathway which is not marked by any guidewire and which is made up of a plurality of said path segments, said pathway comprising a vehicle target destination that is a desired location on said pathway where said automated guided vehicle seeks to go, with said pathway being marked by a plurality of spaced apart reference points wherein each of said reference points i) is disposed in said floor such that no portion of each*

*said reference point extends above said floor, and ii) comprises a singular device that designates a unique known coordinate position and the sensing of which permits updating of an estimated coordinate position of said vehicle such that said estimated coordinate position of said vehicle at least approaches an actual position of said vehicle, 2) a sensor on board said vehicle for enabling an estimate of distance travelled by said vehicle to be determined, 3) a gyroscope on board said vehicle for enabling an estimate of a bearing of said vehicle to be determined with said gyroscope having a drift error, and 4) a reference point sensor on board said vehicle for sensing one of said plurality of said reference points;*

(*b*) *sending from a non-vehicle source a move command comprising said vehicle target destination for said vehicle;*

(*c*) *receiving said move command by said automated guided vehicle while said vehicle is moving;*

(*d*) *decoding said move command related to said vehicle target destination of said vehicle in a decoding area located in a first location on board said vehicle;*

(*e*) *transferring said decoded move command to an on board vehicle controller, wherein said on board vehicle controller is located at a second location on board said vehicle and which is connected to said decoding area located in said first location on board said vehicle;*

(*f*) *sensing a single one of said reference points while said vehicle is moving during a single passage of said vehicle over said single one of said reference points;*

(*g*) *determining a coordinate position from said sensing of said single one of said reference points;*

(*h*) *estimating a distance travelled by said vehicle;*

(*i*) *estimating a bearing of said vehicle;*

(*j*) *updating an estimated coordinate position of said vehicle using said coordinate position determined using said sensing of said single one of said reference points;*

(*k*) *generating a value that comprises a calibrating correction that is used thereafter in estimating said distance travelled by said vehicle;*

(*l*) *generating a value that comprises a calibrating correction to said drift error of said gyroscope; and*

(*m*) *calculating, in said on board vehicle controller, a guide path for said vehicle to cause said vehicle to move toward said vehicle target destination in following said pathway.*

* * * * *